US010521579B2

(12) United States Patent
Van Os et al.

(10) Patent No.: US 10,521,579 B2
(45) Date of Patent: Dec. 31, 2019

(54) IMPLEMENTATION OF BIOMETRIC AUTHENTICATION

(71) Applicant: Apple Inc., Cupertino, CA (US)

(72) Inventors: Marcel Van Os, San Francisco, CA (US); Peter D. Anton, San Francisco, CA (US); Lynne Devine, San Francisco, CA (US); Nathan De Vries, San Francisco, CA (US); Alan C. Dye, San Francisco, CA (US); Daamun Mohseni, Pleasanton, CA (US); Grant Paul, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,115

(22) Filed: Sep. 28, 2018

(65) Prior Publication Data

US 2019/0080072 A1 Mar. 14, 2019

Related U.S. Application Data

(63) Continuation of application No. 16/125,267, filed on Sep. 7, 2018.

(Continued)

(51) Int. Cl.

*G06F 21/32* (2013.01)
*G06F 3/044* (2006.01)

(Continued)

(52) U.S. Cl.

CPC .............. *G06F 21/32* (2013.01); *G06F 3/016* (2013.01); *G06F 3/044* (2013.01); *G06F 3/04883* (2013.01); *G06F 2221/2117* (2013.01)

(58) Field of Classification Search

CPC ........ G06F 21/32; G06F 3/044; G06F 3/0488; G06F 3/04883

See application file for complete search history.

(56) References Cited

U.S. PATENT DOCUMENTS 5,615,384 A 3/1997 Allard et al.
5,801,763 A 9/1998 Suzuki (Continued)

FOREIGN PATENT DOCUMENTS

AU 2015100708 A4 7/2015
AU 2015100709 A4 7/2015

(Continued)

OTHER PUBLICATIONS

Corrected Notice of Allowance received for U.S. Appl. No. 15/845,794, dated Feb. 25, 2019, 2 pages.

(Continued)

*Primary Examiner* — Linglan E Edwards
(74) *Attorney, Agent, or Firm* — Dentons US LLP

(57) ABSTRACT

The present disclosure relates generally to implementing biometric authentication, including providing user interfaces for: a biometric enrollment process tutorial, aligning a biometric feature for enrollment, enrolling a biometric feature, providing hints during a biometric enrollment process, application-based biometric authentication, autofilling biometrically secured fields, unlocking a device using biometric authentication, retrying biometric authentication, managing transfers using biometric authentication, interstitial user interfaces during biometric authentication, preventing retrying biometric authentication, cached biometric authentication, autofilling fillable fields based on visibility criteria, automatic log-in using biometric authentication, retrying biometric authentication at a credential entry user interface, providing indications of error conditions during biometric authentication, providing indications about the biometric sensor during biometric authentication, and orienting the device to enroll a biometric feature.

42 Claims, 585 Drawing Sheets

Related U.S. Application Data

(60) Provisional application No. 62/679,955, filed on Jun. 3, 2018, provisional application No. 62/581,025, filed on Nov. 2, 2017, provisional application No. 62/557,130, filed on Sep. 11, 2017, provisional application No. 62/556,413, filed on Sep. 9, 2017.

(51) Int. Cl.
*G06F 3/0488* (2013.01)
*G06F 3/01* (2006.01)

(56) References Cited

U.S. PATENT DOCUMENTS 5,815,657 A 9/1998 Williams et al.
5,828,773 A 10/1998 Setlak et al.
5,838,306 A 11/1998 O'Connor et al.
5,917,913 A 6/1999 Wang
5,933,134 A 8/1999 Shieh
5,974,150 A 10/1999 Kaish et al.
6,111,517 A 8/2000 Atick et al.
6,141,436 A 10/2000 Srey et al.
6,151,208 A 11/2000 Bartlett
6,151,593 A 11/2000 Cho et al.
6,219,793 B1 4/2001 Li et al.
6,260,027 B1 7/2001 Takahashi et al.
6,282,656 B1 8/2001 Wang
6,289,114 B1 9/2001 Mainguet
6,317,835 B1 11/2001 Bilger et al.
6,323,846 B1 11/2001 Westerman et al.
6,337,919 B1 1/2002 Dunton
6,398,646 B1 6/2002 Wei et al.
6,408,087 B1 6/2002 Kramer
6,421,453 B1 7/2002 Kanevsky et al.
6,570,557 B1 5/2003 Westerman et al.
6,573,883 B1 6/2003 Bartlett
6,618,806 B1 9/2003 Brown et al.
6,639,584 B1 10/2003 Li
6,677,932 B1 1/2004 Westerman
6,709,333 B1 3/2004 Bradford et al.
6,720,860 B1 4/2004 Narayanaswami
6,795,569 B1 9/2004 Setlak
6,941,001 B1 9/2005 Bolle et al.
6,980,081 B2 12/2005 Anderson
7,027,619 B2 4/2006 Pavlidis et al.
7,030,860 B1 4/2006 Hsu et al.
7,039,221 B1 5/2006 Tumey et al.
7,057,607 B2 6/2006 Mayoraz et al.
7,099,850 B1 8/2006 Man et al.
7,124,300 B1 10/2006 Lemke
7,155,411 B1 12/2006 Blinn et al.
7,190,816 B2 3/2007 Mitsuyu et al.
7,239,728 B1 7/2007 Choi et al.
7,305,350 B1 12/2007 Bruecken
7,346,778 B1 3/2008 Guiter et al.
7,370,244 B2 5/2008 Breitling et al.
7,414,613 B2 8/2008 Simelius
7,415,720 B2 8/2008 Jung
7,420,546 B2 9/2008 Abdallah et al.
7,454,192 B1 11/2008 Zhu
7,496,527 B2 2/2009 Silverstein et al.
7,529,563 B1 5/2009 Pitroda
7,542,592 B2 6/2009 Singh et al.
7,546,470 B2 6/2009 Schultz
7,630,522 B2 12/2009 Popp et al.
7,633,076 B2 12/2009 Huppi et al.
7,644,019 B2 1/2010 Woda et al.
7,676,748 B1 3/2010 Barrus et al.
7,689,508 B2 3/2010 Davis et al.
7,697,729 B2 4/2010 Howell et al.
7,705,737 B2 4/2010 Senga
7,730,401 B2 6/2010 Gillespie et al.
7,734,930 B2 6/2010 Kirovski et al.
7,738,916 B2 6/2010 Fukuda
7,818,399 B1 10/2010 Ross, Jr. et al.
7,860,536 B2 12/2010 Jobs et al.
7,877,455 B2 1/2011 Lamparello et al.
7,921,297 B2 4/2011 Ortiz et al.
RE42,574 E 7/2011 Cockayne
8,006,299 B2 8/2011 Suominen
8,018,440 B2 9/2011 Townsend et al.
8,042,157 B2 10/2011 Bennett et al.
8,050,997 B1 11/2011 Nosek et al.
8,060,571 B2 11/2011 Rao
8,095,634 B2 1/2012 Rao
8,112,787 B2 2/2012 Buer
8,121,945 B2 2/2012 Rackle et al.
8,145,912 B2 3/2012 McLean
8,195,507 B2 6/2012 Postrel
8,195,576 B1 6/2012 Grigg et al.
8,254,647 B1 8/2012 Nechyba et al.
8,311,514 B2 11/2012 Bandyopadhyay et al.
8,336,086 B2 12/2012 Seo
8,341,557 B2 12/2012 Pisula et al.
8,392,259 B2 3/2013 MacGillivray et al.
8,395,658 B2 3/2013 Corson
8,396,265 B1 3/2013 Ross et al.
8,438,400 B2 5/2013 Hoghaug et al.
8,452,654 B1 5/2013 Wooters et al.
8,453,940 B2 6/2013 Diamond
8,467,766 B2 6/2013 Rackley et al.
8,554,694 B1 10/2013 Ward et al.
8,571,937 B2 10/2013 Rose et al.
8,583,549 B1 11/2013 Mohsenzadeh
8,606,640 B2 12/2013 Brody et al.
8,638,385 B2 1/2014 Bhogal
8,706,628 B2 4/2014 Phillips
8,762,272 B1 6/2014 Cozens et al.
8,763,896 B2 7/2014 Kushevsky et al.
8,769,624 B2 7/2014 Cotterill
8,782,775 B2 7/2014 Fadell et al.
8,788,838 B1 7/2014 Fadell et al.
8,831,677 B2 9/2014 Villa-Real
8,880,055 B1 11/2014 Clement et al.
8,892,474 B1 11/2014 Inskeep et al.
8,924,259 B2 12/2014 Neighman et al.
8,924,292 B1 12/2014 Ellis et al.
8,931,703 B1 1/2015 Mullen et al.
8,942,420 B2 1/2015 Kim et al.
8,943,580 B2 1/2015 Fadell et al.
8,949,902 B1 2/2015 Fabian-Isaacs et al.
8,963,806 B1 2/2015 Starner et al.
9,002,322 B2 4/2015 Cotterill
9,038,167 B2 5/2015 Fadell et al.
9,053,293 B2 6/2015 Latzina
9,128,601 B2 9/2015 Fadell et al.
9,134,896 B2 9/2015 Fadell et al.
9,177,130 B2 11/2015 Nechyba et al.
9,179,298 B2 11/2015 Jung et al.
9,250,795 B2 2/2016 Fadell et al.
9,253,375 B2 * 2/2016 Milanfar .............. H04N 5/2171
9,269,083 B1 2/2016 Jarajapu et al.
9,274,647 B2 3/2016 Fadell et al.
9,304,624 B2 4/2016 Fadell et al.
9,305,310 B2 4/2016 Radhakrishnan et al.
9,324,067 B2 4/2016 Van Os et al.
9,329,771 B2 5/2016 Fadell et al.
9,355,393 B2 5/2016 Purves et al.
9,411,460 B2 8/2016 Dumont et al.
9,483,763 B2 11/2016 Van Os et al.
9,495,531 B2 11/2016 Fadell et al.
9,519,771 B2 12/2016 Fadell et al.
9,519,901 B1 12/2016 Dorogusker
9,569,605 B1 2/2017 Schneider et al.
9,600,709 B2 3/2017 Russo
9,779,585 B2 10/2017 Dupuis et al.
9,817,549 B2 * 11/2017 Chandrasekaran ... G06F 3/0482
9,842,330 B1 12/2017 Van Os et al.
9,847,999 B2 12/2017 Van Os et al.
10,003,738 B2 * 6/2018 Lautenbach ....... H04N 5/23222
10,073,541 B1 * 9/2018 Baldwin ............. G06F 3/04883
10,248,779 B2 4/2019 Song et al.
2001/0031072 A1 10/2001 Dobashi et al.
2001/0039497 A1 11/2001 Hubbard

(56) References Cited

U.S. PATENT DOCUMENTS

2001/0044906 A1 11/2001 Kanevsky et al.
2001/0047488 A1 11/2001 Verplaetse et al.
2002/0015024 A1 2/2002 Westerman et al.
2002/0023215 A1 2/2002 Wang et al.
2002/0029169 A1 3/2002 Oki et al.
2002/0059295 A1 5/2002 Ludtke et al.
2002/0095588 A1 7/2002 Shigematsu et al.
2002/0097145 A1 7/2002 Tumey et al.
2002/0136435 A1 9/2002 Prokoski
2002/0141586 A1 10/2002 Margalit et al.
2002/0169673 A1 11/2002 Prorock et al.
2002/0170782 A1 11/2002 Millikan
2002/0190960 A1 12/2002 Kuo et al.
2002/0191029 A1 12/2002 Gillespie et al.
2002/0191817 A1 12/2002 Sato et al.
2003/0006280 A1 1/2003 Seita et al.
2003/0028639 A1 2/2003 Yamamoto et al.
2003/0046557 A1 3/2003 Miller et al.
2003/0048173 A1 3/2003 Shigematsu et al.
2003/0061157 A1 3/2003 Hirka et al.
2003/0097413 A1 5/2003 Vishik et al.
2003/0115490 A1 6/2003 Russo et al.
2003/0118217 A1 6/2003 Kondo et al.
2003/0120934 A1 6/2003 Ortiz
2003/0132974 A1 7/2003 Bodin
2003/0138136 A1 7/2003 Umezaki et al.
2003/0142227 A1 7/2003 Van Zee
2003/0163710 A1 8/2003 Ortiz et al.
2003/0181201 A1 9/2003 Bomze et al.
2003/0188183 A1 10/2003 Lee et al.
2003/0200184 A1 10/2003 Dominguez et al.
2003/0210127 A1 11/2003 Anderson
2004/0030934 A1 2/2004 Mizoguchi et al.
2004/0073432 A1 4/2004 Stone
2004/0076310 A1 4/2004 Hersch et al.
2004/0085300 A1 5/2004 Matusis
2004/0085351 A1 5/2004 Tokkonen
2004/0088564 A1 5/2004 Norman
2004/0113819 A1 6/2004 Gauthey et al.
2004/0122685 A1 6/2004 Bunce
2004/0131237 A1 7/2004 Machida
2004/0135801 A1 7/2004 Thompson et al.
2004/0169722 A1 9/2004 Pena
2004/0172562 A1 9/2004 Berger et al.
2004/0181695 A1 9/2004 Walker
2004/0196400 A1 10/2004 Stavely et al.
2004/0229560 A1 11/2004 Maloney
2004/0230843 A1 11/2004 Jansen
2004/0239648 A1 12/2004 Abdallah et al.
2004/0242200 A1 12/2004 Maeoka et al.
2004/0250138 A1 12/2004 Schneider
2004/0254891 A1 12/2004 Blinn et al.
2004/0260955 A1 12/2004 Mantyla
2005/0024341 A1 2/2005 Gillespie et al.
2005/0040962 A1 2/2005 Funkhouser et al.
2005/0041841 A1 2/2005 Yoo et al.
2005/0060554 A1 3/2005 O’donoghue
2005/0071188 A1 3/2005 Thuerk
2005/0071635 A1 3/2005 Furuyama
2005/0078855 A1 4/2005 Chandler et al.
2005/0079896 A1 4/2005 Kokko et al.
2005/0093834 A1 5/2005 Abdallah et al.
2005/0093868 A1 5/2005 Hinckley
2005/0097171 A1 5/2005 Hikichi
2005/0097608 A1 5/2005 Penke et al.
2005/0100198 A1 5/2005 Nakano et al.
2005/0105778 A1 5/2005 Sung et al.
2005/0111708 A1 5/2005 Chou
2005/0113071 A1 5/2005 Nagata
2005/0114686 A1 5/2005 Ball et al.
2005/0144452 A1 6/2005 Lynch et al.
2005/0145244 A1 7/2005 Hong
2005/0169503 A1 8/2005 Howell et al.
2005/0174325 A1 8/2005 Setlak
2005/0187873 A1 8/2005 Labrou et al.
2005/0193118 A1 9/2005 Le et al.
2005/0204173 A1 9/2005 Chang
2005/0206501 A1 9/2005 Farhat
2005/0221798 A1 10/2005 Sengupta et al.
2005/0226472 A1 10/2005 Komura
2005/0250538 A1 11/2005 Narasimhan et al.
2005/0253814 A1 11/2005 Ghassabian
2005/0253817 A1 11/2005 Rytivaara et al.
2005/0254086 A1 11/2005 Shouno
2006/0000900 A1 1/2006 Fernandes et al.
2006/0021003 A1 1/2006 Fisher et al.
2006/0032908 A1 2/2006 Sines
2006/0056664 A1 3/2006 Iwasaki
2006/0064313 A1 3/2006 Steinbarth et al.
2006/0064372 A1 3/2006 Gupta
2006/0075228 A1 4/2006 Black et al.
2006/0075250 A1 4/2006 Liao
2006/0078176 A1 4/2006 Abiko et al.
2006/0080525 A1 4/2006 Ritter et al.
2006/0093183 A1 5/2006 Hosoi
2006/0093192 A1 5/2006 Bechtel
2006/0097172 A1 5/2006 Park
2006/0102843 A1 5/2006 Bazakos et al.
2006/0104488 A1 5/2006 Bazakos et al.
2006/0115130 A1 6/2006 Kozlay
2006/0116555 A1 6/2006 Pavlidis et al.
2006/0120707 A1 6/2006 Kusakari et al.
2006/0136087 A1 6/2006 Higashiura
2006/0136734 A1 6/2006 Telek et al.
2006/0156028 A1 7/2006 Aoyama et al.
2006/0165060 A1 7/2006 Dua
2006/0173749 A1 8/2006 Ward et al.
2006/0179404 A1 8/2006 Yolleck et al.
2006/0192868 A1 8/2006 Wakamori
2006/0206709 A1 9/2006 Labrou et al.
2006/0208065 A1 9/2006 Mendelovich et al.
2006/0214910 A1 9/2006 Mizuno et al.
2006/0219776 A1 10/2006 Finn
2006/0224645 A1 10/2006 Kadi
2006/0234764 A1 10/2006 Gamo et al.
2006/0239517 A1 10/2006 Creasey et al.
2006/0274920 A1 12/2006 Tochikubo et al.
2006/0282671 A1 12/2006 Burton
2006/0285663 A1 12/2006 Rathus et al.
2006/0288226 A1 12/2006 Kowal
2006/0288234 A1 12/2006 Azar et al.
2006/0294007 A1 12/2006 Barthelemy
2006/0294025 A1 12/2006 Mengerink
2007/0008066 A1 1/2007 Fukuda
2007/0013662 A1 1/2007 Fauth
2007/0014439 A1 1/2007 Ando
2007/0016958 A1 1/2007 Bodepudi et al.
2007/0021194 A1 1/2007 Aida
2007/0061126 A1 3/2007 Russo et al.
2007/0061889 A1 3/2007 Sainaney
2007/0067642 A1 3/2007 Singhal
2007/0073649 A1 3/2007 Kikkoji et al.
2007/0089164 A1 4/2007 Gao et al.
2007/0096765 A1 5/2007 Kagan
2007/0106942 A1 5/2007 Sanaka et al.
2007/0109274 A1 5/2007 Reynolds
2007/0110287 A1 5/2007 Kim et al.
2007/0131759 A1 6/2007 Cox et al.
2007/0143628 A1 6/2007 Genda
2007/0150842 A1 6/2007 Chaudhri et al.
2007/0180492 A1 8/2007 Hassan et al.
2007/0186106 A1 8/2007 Ting et al.
2007/0189583 A1 8/2007 Shimada et al.
2007/0194110 A1 8/2007 Esplin et al.
2007/0194113 A1 8/2007 Esplin et al.
2007/0204037 A1 8/2007 Kunz et al.
2007/0208743 A1 9/2007 Sainaney
2007/0220273 A1 9/2007 Campisi
2007/0226778 A1 9/2007 Pietruszka
2007/0230773 A1 10/2007 Nagao et al.
2007/0236330 A1 10/2007 Cho et al.
2007/0236475 A1 10/2007 Wherry
2007/0239921 A1 10/2007 Toorians et al.
2007/0250573 A1 10/2007 Rothschild

(56) References Cited

U.S. PATENT DOCUMENTS

2007/0253604 A1 11/2007 Inoue et al.
2007/0254712 A1 11/2007 Chitti
2007/0255564 A1 11/2007 Yee et al.
2007/0259716 A1 11/2007 Mattice et al.
2007/0260558 A1 11/2007 Look
2007/0277224 A1 11/2007 Osborn et al.
2007/0280515 A1 12/2007 Goto
2008/0001703 A1 1/2008 Goto
2008/0032801 A1 2/2008 Brunet De Courssou
2008/0040265 A1 2/2008 Rackley, III et al.
2008/0041936 A1 2/2008 Vawter
2008/0042983 A1 2/2008 Kim et al.
2008/0048878 A1 2/2008 Boillot
2008/0049984 A1 2/2008 Poo et al.
2008/0052181 A1 2/2008 Devitt-carolan et al.
2008/0054081 A1 3/2008 Mullen
2008/0069412 A1 3/2008 Champagne et al.
2008/0072045 A1 3/2008 Mizrah
2008/0078831 A1 4/2008 Johnson et al.
2008/0092245 A1 4/2008 Alward et al.
2008/0114678 A1 5/2008 Bennett et al.
2008/0120707 A1 5/2008 Ramia
2008/0133931 A1 6/2008 Kosaka
2008/0165255 A1 7/2008 Christie et al.
2008/0172598 A1 7/2008 Jacobsen et al.
2008/0178283 A1 7/2008 Pratt et al.
2008/0208681 A1 8/2008 Hammad et al.
2008/0208762 A1 8/2008 Arthur et al.
2008/0212849 A1 9/2008 Gao
2008/0229409 A1 9/2008 Miller et al.
2008/0246917 A1 10/2008 Phinney et al.
2008/0250481 A1 10/2008 Beck et al.
2008/0292144 A1 11/2008 Kim
2008/0309632 A1 12/2008 Westerman et al.
2008/0314971 A1 12/2008 Faith et al.
2008/0317292 A1 12/2008 Baker et al.
2009/0005165 A1 1/2009 Arezina et al.
2009/0006292 A1 1/2009 Block
2009/0006991 A1 1/2009 Lindberg et al.
2009/0030793 A1 1/2009 Fordyce, III
2009/0031375 A1 1/2009 Sullivan et al.
2009/0036165 A1 2/2009 Brede
2009/0037326 A1 2/2009 Chitti et al.
2009/0037742 A1 2/2009 Narayanaswami
2009/0054044 A1 2/2009 Ikemori et al.
2009/0057396 A1 3/2009 Barbour et al.
2009/0061837 A1 3/2009 Chaudhri et al.
2009/0063851 A1 3/2009 Nijdam
2009/0064055 A1 3/2009 Chaudhri et al.
2009/0067685 A1 3/2009 Boshra et al.
2009/0067689 A1 3/2009 Porter et al.
2009/0074255 A1 3/2009 Holm
2009/0083847 A1 3/2009 Fadell et al.
2009/0083850 A1 3/2009 Fadell et al.
2009/0094134 A1 4/2009 Toomer et al.
2009/0094681 A1 4/2009 Sadler et al.
2009/0106558 A1 4/2009 Delgrosso et al.
2009/0119754 A1 5/2009 Schubert
2009/0122149 A1 5/2009 Ishii
2009/0135678 A1 5/2009 Godat
2009/0158390 A1 6/2009 Guan
2009/0159696 A1 6/2009 Mullen
2009/0160609 A1 6/2009 Lin et al.
2009/0164878 A1 6/2009 Cottrille
2009/0165107 A1 6/2009 Tojo et al.
2009/0173784 A1 7/2009 Yang
2009/0176565 A1 7/2009 Kelly
2009/0182674 A1 7/2009 Patel et al.
2009/0187423 A1 7/2009 Kim
2009/0193514 A1 7/2009 Adams et al.
2009/0195469 A1 8/2009 Lim et al.
2009/0199188 A1 8/2009 Fujimaki
2009/0201257 A1 8/2009 Saitoh et al.
2009/0210308 A1 8/2009 Toomer et al.
2009/0224874 A1 9/2009 Dewar et al.
2009/0228938 A1 9/2009 White et al.
2009/0241169 A1 9/2009 Dhand et al.
2009/0258667 A1 10/2009 Suzuki et al.
2009/0307139 A1 12/2009 Mardikar et al.
2009/0327744 A1 12/2009 Hatano
2009/0328162 A1 12/2009 Kokumai et al.
2010/0008535 A1 1/2010 Abulafia et al.
2010/0008545 A1 1/2010 Ueki et al.
2010/0023449 A1 1/2010 Skowronek et al.
2010/0026453 A1 2/2010 Yamamoto et al.
2010/0034432 A1 2/2010 Ono et al.
2010/0042517 A1 2/2010 Paintin et al.
2010/0042835 A1 2/2010 Lee et al.
2010/0078471 A1 4/2010 Lin et al.
2010/0078472 A1 4/2010 Lin et al.
2010/0082481 A1 4/2010 Lin et al.
2010/0082485 A1 4/2010 Lin et al.
2010/0107229 A1 4/2010 Najafi et al.
2010/0114731 A1 5/2010 Kingston et al.
2010/0146384 A1 6/2010 Peev et al.
2010/0153265 A1 6/2010 Hershfield et al.
2010/0158327 A1 6/2010 Kangas et al.
2010/0161434 A1 6/2010 Herwig et al.
2010/0164684 A1 7/2010 Sasa et al.
2010/0164864 A1 7/2010 Chou
2010/0185871 A1 7/2010 Scherrer et al.
2010/0191570 A1 7/2010 Michaud et al.
2010/0205091 A1 8/2010 Graziano et al.
2010/0216425 A1 8/2010 Smith
2010/0223145 A1 9/2010 Dragt
2010/0243741 A1 9/2010 Eng
2010/0265204 A1 10/2010 Tsuda
2010/0267362 A1 10/2010 Smith et al.
2010/0269156 A1 10/2010 Hohlfeld et al.
2010/0273461 A1 10/2010 Choi
2010/0275259 A1 10/2010 Adams et al.
2010/0302016 A1 12/2010 Zaborowski
2010/0306107 A1 12/2010 Nahari
2010/0311397 A1 12/2010 Li
2010/0313263 A1 12/2010 Uchida et al.
2011/0013813 A1 1/2011 Yamamoto et al.
2011/0054268 A1 3/2011 Fidacaro et al.
2011/0078025 A1 3/2011 Shrivastav
2011/0088086 A1 4/2011 Swink et al.
2011/0099079 A1 4/2011 White
2011/0106671 A1 5/2011 Minnis et al.
2011/0122294 A1 5/2011 Suh et al.
2011/0138166 A1 6/2011 Peszek et al.
2011/0138450 A1 6/2011 Kesanupalli et al.
2011/0142234 A1 6/2011 Rogers
2011/0145049 A1 6/2011 Hertel et al.
2011/0149874 A1 6/2011 Reif
2011/0159959 A1 6/2011 Mallinson et al.
2011/0175703 A1 7/2011 Benkley, III
2011/0184820 A1 7/2011 Mon et al.
2011/0187497 A1 8/2011 Chin
2011/0201306 A1 8/2011 Ali Al-harbi
2011/0202417 A1 8/2011 DeWakar et al.
2011/0214158 A1 9/2011 Pasquero et al.
2011/0218849 A1 9/2011 Rutigliano et al.
2011/0225057 A1 9/2011 Webb et al.
2011/0230769 A1 9/2011 Yamazaki
2011/0231914 A1 9/2011 Hung
2011/0244795 A1 10/2011 Sueyoshi et al.
2011/0244796 A1 10/2011 Khan et al.
2011/0251892 A1 10/2011 Laracey
2011/0286640 A1 11/2011 Kwon et al.
2011/0300829 A1 12/2011 Nurmi et al.
2012/0009896 A1 1/2012 Bandyopadhyay et al.
2012/0024947 A1 2/2012 Naelon
2012/0028609 A1 2/2012 Hruska
2012/0036029 A1 2/2012 Esplin et al.
2012/0072546 A1 3/2012 Etchegoyen
2012/0078751 A1 3/2012 Macphail et al.
2012/0084210 A1 4/2012 Farahmand
2012/0089507 A1 4/2012 Zhang et al.
2012/0101881 A1 4/2012 Taylor et al.
2012/0101887 A1 4/2012 Harvey et al.
2012/0109764 A1 5/2012 Martin et al.

(56) References Cited

U.S. PATENT DOCUMENTS

2012/0123937 A1 5/2012 Spodak
2012/0136780 A1 5/2012 El-awady et al.
2012/0139698 A1 6/2012 Tsui et al.
2012/0185397 A1 7/2012 Levovitz
2012/0191603 A1 7/2012 Nuzzi
2012/0197740 A1 8/2012 Grigg et al.
2012/0200489 A1 8/2012 Miyashita et al.
2012/0209748 A1 8/2012 Small
2012/0215553 A1 8/2012 Leston
2012/0215647 A1 8/2012 Powell et al.
2012/0221464 A1 8/2012 Pasquero et al.
2012/0232968 A1 9/2012 Calman et al.
2012/0238363 A1 9/2012 Watanabe et al.
2012/0245985 A1 9/2012 Cho et al.
2012/0245986 A1 9/2012 Regan et al.
2012/0271712 A1 10/2012 Katzin et al.
2012/0280917 A1 11/2012 Toksvig et al.
2012/0283871 A1 11/2012 Chai et al.
2012/0284185 A1 11/2012 Mettler et al.
2012/0290376 A1 11/2012 Dryer et al.
2012/0290449 A1 11/2012 Mullen et al.
2012/0290472 A1 11/2012 Mullen et al.
2012/0291121 A1 11/2012 Huang et al.
2012/0293438 A1 11/2012 Chaudhri et al.
2012/0310760 A1 12/2012 Phillips et al.
2012/0311499 A1 12/2012 Dellinger et al.
2012/0317023 A1 12/2012 Moon et al.
2012/0322370 A1 12/2012 Lee
2012/0322371 A1 12/2012 Lee
2013/0006746 A1 1/2013 Moore
2013/0013499 A1 1/2013 Kalgi
2013/0030934 A1 1/2013 Bakshi et al.
2013/0031217 A1 1/2013 Rajapakse
2013/0047034 A1 2/2013 Salomon et al.
2013/0047233 A1 2/2013 Fisk et al.
2013/0050263 A1 2/2013 Khoe et al.
2013/0054336 A1 2/2013 Graylin
2013/0067545 A1 3/2013 Hanes
2013/0074194 A1 3/2013 White et al.
2013/0080272 A1 3/2013 Ronca et al.
2013/0080275 A1 3/2013 Ronca et al.
2013/0082819 A1 4/2013 Cotterill
2013/0085931 A1 4/2013 Runyan
2013/0085936 A1 4/2013 Law et al.
2013/0086637 A1 4/2013 Cotterill
2013/0102281 A1 4/2013 Kande et al.
2013/0103519 A1 4/2013 Kountotsis et al.
2013/0110719 A1 5/2013 Carter et al.
2013/0124319 A1 5/2013 Hodge et al.
2013/0124423 A1 5/2013 Fisher
2013/0129162 A1 5/2013 Cheng et al.
2013/0144706 A1 6/2013 Qawami et al.
2013/0145448 A1 6/2013 Newell
2013/0151360 A1 6/2013 Scipioni et al.
2013/0151414 A1 6/2013 Zhu et al.
2013/0159178 A1 6/2013 Colon et al.
2013/0179304 A1 7/2013 Swist
2013/0189953 A1 7/2013 Mathews
2013/0198112 A1 8/2013 Bhat
2013/0200146 A1 8/2013 Moghadam
2013/0212655 A1 8/2013 Hoyos et al.
2013/0216108 A1 8/2013 Hwang et al.
2013/0218721 A1 8/2013 Borhan et al.
2013/0222323 A1 8/2013 Mckenzie
2013/0226792 A1 8/2013 Kushevsky et al.
2013/0232073 A1 9/2013 Sheets et al.
2013/0238455 A1 9/2013 Laracey
2013/0239202 A1 9/2013 Adams et al.
2013/0243264 A1 9/2013 Aoki
2013/0246202 A1 9/2013 Tobin
2013/0262857 A1 10/2013 Neuman et al.
2013/0275300 A1 10/2013 Killian et al.
2013/0279768 A1 10/2013 Boshra
2013/0282533 A1 10/2013 Foran-owens et al.
2013/0297414 A1 11/2013 Goldfarb et al.
2013/0304651 A1 11/2013 Smith
2013/0320080 A1 12/2013 Olson et al.
2013/0326563 A1 12/2013 Mulcahy et al.
2013/0332358 A1 12/2013 Zhao
2013/0332364 A1 12/2013 Templeton et al.
2013/0332826 A1 12/2013 Karunamuni et al.
2013/0333006 A1 12/2013 Tapling et al.
2013/0336527 A1 12/2013 Nechyba et al.
2013/0336545 A1 12/2013 Pritikin et al.
2013/0346273 A1 12/2013 Stockton et al.
2013/0346302 A1 12/2013 Purves et al.
2014/0003677 A1 1/2014 Han et al.
2014/0006285 A1 1/2014 Chi et al.
2014/0019352 A1 1/2014 Shrivastava
2014/0025513 A1 1/2014 Cooke et al.
2014/0025520 A1 1/2014 Mardikar et al.
2014/0036099 A1 2/2014 Balassanian
2014/0052553 A1 2/2014 Uzo
2014/0058860 A1 2/2014 Roh et al.
2014/0058935 A1 2/2014 Mijares
2014/0058941 A1 2/2014 Moon et al.
2014/0068740 A1 3/2014 Lecun et al.
2014/0070957 A1 3/2014 Longinotti-buitoni et al.
2014/0074407 A1 3/2014 Hernandez-silveira et al.
2014/0074569 A1 3/2014 Francis et al.
2014/0074635 A1 3/2014 Reese et al.
2014/0074716 A1 3/2014 Ni
2014/0074717 A1 3/2014 Evans
2014/0081854 A1 3/2014 Sanchez et al.
2014/0089196 A1 3/2014 Paya et al.
2014/0094124 A1 4/2014 Dave et al.
2014/0094143 A1 4/2014 Ayotte
2014/0095225 A1 4/2014 Williams et al.
2014/0099886 A1 4/2014 Monroe
2014/0101056 A1 4/2014 Wendling
2014/0112555 A1 4/2014 Fadell et al.
2014/0115695 A1 4/2014 Fadell et al.
2014/0118519 A1 5/2014 Sahin
2014/0122331 A1 5/2014 Vaish et al.
2014/0128035 A1 5/2014 Sweeney
2014/0129435 A1 5/2014 Pardo et al.
2014/0129441 A1 5/2014 Blanco et al.
2014/0134947 A1 5/2014 Stouder-studenmund
2014/0138435 A1 5/2014 Khalid
2014/0140587 A1 5/2014 Ballard et al.
2014/0143145 A1 5/2014 Kortina et al.
2014/0149198 A1 5/2014 Kim et al.
2014/0156531 A1 6/2014 Poon et al.
2014/0164082 A1 6/2014 Sun et al.
2014/0164241 A1 6/2014 Neuwirth
2014/0172533 A1 6/2014 Andrews et al.
2014/0173450 A1 6/2014 Akula
2014/0181747 A1 6/2014 Son
2014/0187163 A1 7/2014 Fujita
2014/0187856 A1 7/2014 Holoien et al.
2014/0188673 A1 7/2014 Graham et al.
2014/0195815 A1 7/2014 Taveau et al.
2014/0197234 A1 7/2014 Hammad
2014/0207659 A1 7/2014 Erez et al.
2014/0207680 A1 7/2014 Rephlo
2014/0222664 A1 8/2014 Milne
2014/0236840 A1 8/2014 Islam
2014/0244365 A1 8/2014 Price et al.
2014/0244493 A1 8/2014 Kenyon et al.
2014/0244495 A1 8/2014 Davis et al.
2014/0254891 A1 9/2014 Lee et al.
2014/0258292 A1 9/2014 Thramann et al.
2014/0258828 A1 9/2014 Lymer et al.
2014/0279442 A1 9/2014 Luoma et al.
2014/0279474 A1 9/2014 Evans et al.
2014/0279497 A1 9/2014 Qaim-maqami et al.
2014/0279556 A1 9/2014 Priebatsch et al.
2014/0282987 A1 9/2014 Narendra et al.
2014/0292396 A1 10/2014 Bruwer et al.
2014/0297385 A1 10/2014 Ryan
2014/0298432 A1 10/2014 Brown
2014/0304809 A1 10/2014 Fadell et al.
2014/0311447 A1 10/2014 Surnilla et al.
2014/0337207 A1 11/2014 Zhang et al.

(56) References Cited

U.S. PATENT DOCUMENTS

2014/0337931 A1 11/2014 Cotterill
2014/0344082 A1 11/2014 Soundararajan
2014/0344904 A1 11/2014 Venkataramani et al.
2014/0359140 A1 12/2014 Shankarraman
2014/0372309 A1 12/2014 Shirey et al.
2014/0375835 A1* 12/2014 Bos ........................ H04N 5/232 348/220.1
2014/0380465 A1 12/2014 Fadell et al.
2015/0002696 A1 1/2015 He et al.
2015/0006376 A1 1/2015 Nuthulapati et al.
2015/0012417 A1 1/2015 Joao et al.
2015/0012425 A1 1/2015 Mathew
2015/0012435 A1 1/2015 Ramavarjula et al.
2015/0014141 A1 1/2015 Rao et al.
2015/0019944 A1 1/2015 Kalgi
2015/0039494 A1 2/2015 Sinton et al.
2015/0043790 A1 2/2015 Ono et al.
2015/0044965 A1 2/2015 Kamon et al.
2015/0046336 A1 2/2015 Cummins
2015/0051846 A1 2/2015 Masuya
2015/0056957 A1 2/2015 Mardikar et al.
2015/0058146 A1 2/2015 Gaddam et al.
2015/0058191 A1 2/2015 Khan et al.
2015/0066758 A1 3/2015 Denardis et al.
2015/0074418 A1* 3/2015 Lee ........................ G06F 21/45 713/186
2015/0074615 A1* 3/2015 Han .................. G06K 9/00033 715/863
2015/0077362 A1 3/2015 Seo
2015/0089636 A1 3/2015 Martynov et al.
2015/0095174 A1 4/2015 Dua
2015/0095175 A1 4/2015 Dua
2015/0120545 A1 4/2015 Fiore et al.
2015/0121405 A1 4/2015 Ekselius et al.
2015/0124053 A1 5/2015 Tamura et al.
2015/0127539 A1 5/2015 Ye et al.
2015/0135282 A1 5/2015 Kong et al.
2015/0146945 A1 5/2015 Han et al.
2015/0154589 A1 6/2015 Li
2015/0170146 A1 6/2015 Ji et al.
2015/0178878 A1 6/2015 Huang
2015/0186152 A1 7/2015 Jothiswaran et al.
2015/0186636 A1 7/2015 Tharappel et al.
2015/0186871 A1 7/2015 Laracey
2015/0195133 A1 7/2015 Sheets et al.
2015/0208244 A1 7/2015 Nakao
2015/0213560 A1 7/2015 Aabye et al.
2015/0215128 A1 7/2015 Pal
2015/0220924 A1 8/2015 Bakker
2015/0227922 A1 8/2015 Filler
2015/0229750 A1 8/2015 Zhou et al.
2015/0235055 A1 8/2015 An et al.
2015/0242611 A1 8/2015 Cotterill
2015/0242837 A1 8/2015 Yarbrough et al.
2015/0249540 A1 9/2015 Khalil et al.
2015/0254661 A1 9/2015 Lanc
2015/0257004 A1 9/2015 Shanmugam et al.
2015/0286694 A1 10/2015 Kaplinger et al.
2015/0295921 A1 10/2015 Cao
2015/0302493 A1 10/2015 Batstone et al.
2015/0302510 A1 10/2015 Godsey et al.
2015/0324615 A1 11/2015 Matsumoto et al.
2015/0334567 A1 11/2015 Chen et al.
2015/0339652 A1 11/2015 Park et al.
2015/0348001 A1 12/2015 Van Os et al.
2015/0348002 A1 12/2015 Van Os et al.
2015/0348009 A1 12/2015 Brown et al.
2015/0348014 A1 12/2015 Van Os et al.
2015/0348018 A1 12/2015 Campos et al.
2015/0348029 A1 12/2015 Van Os et al.
2015/0365400 A1 12/2015 Cox
2016/0005024 A1 1/2016 Harrell
2016/0005028 A1 1/2016 Mayblum et al.
2016/0012417 A1 1/2016 Mizon
2016/0012465 A1 1/2016 Sharp
2016/0019536 A1 1/2016 Ortiz et al.
2016/0021003 A1 1/2016 Pan
2016/0034887 A1 2/2016 Lee
2016/0050199 A1 2/2016 Ganesan
2016/0063235 A1 3/2016 Tussy
2016/0086176 A1 3/2016 Silva pinto et al.
2016/0092665 A1 3/2016 Cowan et al.
2016/0092877 A1 3/2016 Chew
2016/0100156 A1* 4/2016 Zhou ........................ H04B 3/20 348/14.08
2016/0104228 A1 4/2016 Sundaresan
2016/0132864 A1 5/2016 Barrese et al.
2016/0134488 A1 5/2016 Straub et al.
2016/0147987 A1 5/2016 Jang et al.
2016/0148384 A1 5/2016 Bud et al.
2016/0154956 A1 6/2016 Fadell et al.
2016/0180305 A1 6/2016 Dresser et al.
2016/0188860 A1 6/2016 Lee et al.
2016/0224966 A1 8/2016 Van Os et al.
2016/0224973 A1 8/2016 Van Os et al.
2016/0232513 A1 8/2016 Purves et al.
2016/0232516 A1 8/2016 Dayan et al.
2016/0241543 A1 8/2016 Jung et al.
2016/0241555 A1 8/2016 Vo et al.
2016/0253665 A1 9/2016 Van Os et al.
2016/0267779 A1 9/2016 Kuang
2016/0294557 A1 10/2016 Baldwin et al.
2016/0314290 A1 10/2016 Baca et al.
2016/0335495 A1 11/2016 Kim et al.
2016/0342832 A1 11/2016 Bud et al.
2016/0345172 A1 11/2016 Cotterill
2016/0350522 A1 12/2016 Chi et al.
2016/0358133 A1 12/2016 Van Os et al.
2016/0358134 A1 12/2016 Van Os et al.
2016/0358167 A1 12/2016 Van Os et al.
2016/0358168 A1 12/2016 Van Os et al.
2016/0358180 A1 12/2016 Van Os et al.
2016/0358199 A1 12/2016 Van Os et al.
2016/0364561 A1 12/2016 Lee
2016/0378961 A1 12/2016 Park
2016/0378966 A1 12/2016 Alten
2017/0004507 A1 1/2017 Henderson et al.
2017/0017834 A1 1/2017 Sabitov et al.
2017/0032375 A1 2/2017 Van Os et al.
2017/0046704 A1 2/2017 Büchner et al.
2017/0054731 A1 2/2017 Cotterill
2017/0063851 A1 3/2017 Kim et al.
2017/0070680 A1 3/2017 Kobayashi
2017/0147186 A1 5/2017 Velusamy et al.
2017/0169202 A1 6/2017 Duggan et al.
2017/0169204 A1 6/2017 Fadell et al.
2017/0180637 A1* 6/2017 Lautenbach ....... H04N 5/23222
2017/0185760 A1 6/2017 Wilder
2017/0193214 A1 7/2017 Shim et al.
2017/0193314 A1 7/2017 Kim et al.
2017/0199997 A1 7/2017 Fadell et al.
2017/0244703 A1 8/2017 Lee et al.
2017/0300897 A1 10/2017 Ferenczi et al.
2017/0329949 A1* 11/2017 Civelli .................. G06F 1/1686
2017/0339151 A1 11/2017 Van Os et al.
2017/0357972 A1 12/2017 Van Os et al.
2017/0357973 A1 12/2017 Van Os et al.
2018/0021954 A1* 1/2018 Fischer ...................... B25J 5/00 700/253
2018/0068313 A1 3/2018 Van Os et al.
2018/0082282 A1 3/2018 Van Os et al.
2018/0109629 A1 4/2018 Van Os et al.
2018/0114010 A1 4/2018 Van Os et al.
2018/0117944 A1 5/2018 Lee
2018/0144178 A1 5/2018 Han et al.
2018/0158066 A1 6/2018 Van Os et al.
2018/0173928 A1 6/2018 Han et al.
2018/0173929 A1 6/2018 Han et al.
2018/0173930 A1 6/2018 Han et al.
2018/0276673 A1 9/2018 Van Os et al.
2018/0302790 A1 10/2018 Cotterill
2019/0050867 A1 2/2019 Van Os et al.
2019/0080066 A1 3/2019 Van Os et al.
2019/0080070 A1 3/2019 Van Os et al.

(56) References Cited

U.S. PATENT DOCUMENTS

| | | | |
|---|---|---|---|
| 2019/0080071 | A1 | 3/2019 | Van Os et al. |
| 2019/0080189 | A1 | 3/2019 | Van Os et al. |
| 2019/0124510 | A1 | 4/2019 | Cotterill et al. |
| 2019/0220647 | A1 | 7/2019 | Han et al. |
| 2019/0243957 | A1 | 8/2019 | Fadell et al. |
| 2019/0289079 | A1 | 9/2019 | Van Os et al. |

FOREIGN PATENT DOCUMENTS

| | | | |
|---|---|---|---|
| AU | 2016100796 | A4 | 6/2016 |
| CN | 1163669 | A | 10/1997 |
| CN | 1183475 | A | 6/1998 |
| CN | 1220433 | A | 6/1999 |
| CN | 1452739 | A | 10/2003 |
| CN | 1484425 | A | 3/2004 |
| CN | 1685357 | A | 10/2005 |
| CN | 1742252 | A | 3/2006 |
| CN | 1801708 | A | 7/2006 |
| CN | 1836397 | A | 9/2006 |
| CN | 1908981 | A | 2/2007 |
| CN | 101035335 | A | 9/2007 |
| CN | 101171604 | A | 4/2008 |
| CN | 101268470 | A | 9/2008 |
| CN | 101299694 | A | 11/2008 |
| CN | 101341718 | A | 1/2009 |
| CN | 101730907 | A | 6/2010 |
| CN | 101796764 | A | 8/2010 |
| CN | 102065148 | A | 5/2011 |
| CN | 102164213 | A | 8/2011 |
| CN | 102209321 | A | 10/2011 |
| CN | 102282578 | A | 12/2011 |
| CN | 102396205 | A | 3/2012 |
| CN | 102663303 | A | 9/2012 |
| CN | 102737313 | A | 10/2012 |
| CN | 102833423 | A | 12/2012 |
| CN | 103188280 | A | 7/2013 |
| CN | 103413218 | A | 11/2013 |
| CN | 103701605 | A | 4/2014 |
| CN | 103778533 | A | 5/2014 |
| CN | 104038256 | A | 9/2014 |
| CN | 104077534 | A | 10/2014 |
| CN | 104252675 | A | 12/2014 |
| CN | 105320864 | A | 2/2016 |
| CN | 105787718 | A | 7/2016 |
| CN | 105844468 | A | 8/2016 |
| DE | 10153591 | A1 | 5/2003 |
| EP | 0593386 | A2 | 4/1994 |
| EP | 0923018 | A2 | 6/1999 |
| EP | 1422589 | A1 | 5/2004 |
| EP | 1626330 | A1 | 2/2006 |
| EP | 1645989 | A2 | 4/2006 |
| EP | 1736908 | A2 | 12/2006 |
| EP | 1950678 | A1 | 7/2008 |
| EP | 2309410 | A1 | 4/2011 |
| EP | 2654275 | A1 | 10/2013 |
| EP | 2674889 | A2 | 12/2013 |
| EP | 2701107 | A1 | 2/2014 |
| EP | 2725537 | A1 | 4/2014 |
| EP | 2993619 | A1 | 3/2016 |
| EP | 3057024 | A1 | 8/2016 |
| EP | 3076334 | A1 | 10/2016 |
| GB | 2184576 | A | 6/1987 |
| GB | 2312040 | A | 10/1997 |
| GB | 2313460 | A | 11/1997 |
| GB | 2360618 | A | 9/2001 |
| GB | 2466038 | A | 6/2010 |
| GB | 2500321 | A | 9/2013 |
| JP | 4-158434 | A | 6/1992 |
| JP | 6-284182 | A | 10/1994 |
| JP | 7-146942 | A | 6/1995 |
| JP | 9-128208 | A | 5/1997 |
| JP | 9-221950 | A | 8/1997 |
| JP | 10-69346 | A | 3/1998 |
| JP | 10-232934 | A | 9/1998 |
| JP | 10-269358 | A | 10/1998 |
| JP | 11-39385 | A | 2/1999 |
| JP | 11-73530 | A | 3/1999 |
| JP | 11-185016 | A | 7/1999 |
| JP | 11-242745 | A | 9/1999 |
| JP | 11-272769 | A | 10/1999 |
| JP | 2000-259477 | A | 9/2000 |
| JP | 2000-315118 | A | 11/2000 |
| JP | 2001-92554 | A | 4/2001 |
| JP | 2001-331758 | A | 11/2001 |
| JP | 2002-99854 | A | 4/2002 |
| JP | 2002-149171 | A | 5/2002 |
| JP | 2002-515145 | A | 5/2002 |
| JP | 2002-183093 | A | 6/2002 |
| JP | 2002-207525 | A | 7/2002 |
| JP | 2002-288137 | A | 10/2002 |
| JP | 2003-16398 | A | 1/2003 |
| JP | 2003-67343 | A | 3/2003 |
| JP | 2003-143290 | A | 5/2003 |
| JP | 2003-298689 | A | 10/2003 |
| JP | 2003-346059 | A | 12/2003 |
| JP | 2004-86866 | A | 3/2004 |
| JP | 2004-252736 | A | 9/2004 |
| JP | 2004-258738 | A | 9/2004 |
| JP | 2004-265353 | A | 9/2004 |
| JP | 2004-287592 | A | 10/2004 |
| JP | 2004-532477 | A | 10/2004 |
| JP | 2004-313459 | A | 11/2004 |
| JP | 2004-334788 | A | 11/2004 |
| JP | 2004-348600 | A | 12/2004 |
| JP | 2004-348601 | A | 12/2004 |
| JP | 2004-356816 | A | 12/2004 |
| JP | 2005-4490 | A | 1/2005 |
| JP | 2005-71225 | A | 3/2005 |
| JP | 2005-84991 | A | 3/2005 |
| JP | 2005-122700 | A | 5/2005 |
| JP | 2005-202578 | A | 7/2005 |
| JP | 2005-521961 | A | 7/2005 |
| JP | 2005-523505 | A | 8/2005 |
| JP | 2005-327076 | A | 11/2005 |
| JP | 2005-339425 | A | 12/2005 |
| JP | 2006-12080 | A | 1/2006 |
| JP | 2006-31182 | A | 2/2006 |
| JP | 2006-85559 | A | 3/2006 |
| JP | 2006-093912 | A | 4/2006 |
| JP | 2006-107288 | A | 4/2006 |
| JP | 2006-114018 | A | 4/2006 |
| JP | 2006-115043 | A | 4/2006 |
| JP | 2006-163960 | A | 6/2006 |
| JP | 2006-172180 | A | 6/2006 |
| JP | 2006-189999 | A | 7/2006 |
| JP | 2006-191245 | A | 7/2006 |
| JP | 2006-197071 | A | 7/2006 |
| JP | 2006-202278 | A | 8/2006 |
| JP | 2006-215705 | A | 8/2006 |
| JP | 2006-221468 | A | 8/2006 |
| JP | 2006-259931 | A | 9/2006 |
| JP | 2006-277670 | A | 10/2006 |
| JP | 2006-303701 | A | 11/2006 |
| JP | 2006-308375 | A | 11/2006 |
| JP | 2007-11667 | A | 1/2007 |
| JP | 2007-34637 | A | 2/2007 |
| JP | 2007-52574 | A | 3/2007 |
| JP | 2007-58397 | A | 3/2007 |
| JP | 2007-71008 | A | 3/2007 |
| JP | 2007-128201 | A | 5/2007 |
| JP | 2007-135149 | A | 5/2007 |
| JP | 2007-148801 | A | 6/2007 |
| JP | 2007-219665 | A | 8/2007 |
| JP | 2007-226293 | A | 9/2007 |
| JP | 2007-334637 | A | 12/2007 |
| JP | 2008-250601 | A | 10/2008 |
| JP | 2009-15543 | A | 1/2009 |
| JP | 2009-49878 | A | 3/2009 |
| JP | 2009-99076 | A | 5/2009 |
| JP | 2009-134521 | A | 6/2009 |
| JP | 2010-9513 | A | 1/2010 |
| JP | 2010-86281 | A | 4/2010 |
| JP | 2010-271762 | A | 12/2010 |
| JP | 2010-271779 | A | 12/2010 |

(56) References Cited

FOREIGN PATENT DOCUMENTS

| | | | |
|---|---|---|---|
| JP | 2010-541046 | A | 12/2010 |
| JP | 2011-54120 | A | 3/2011 |
| JP | 2011-97287 | A | 5/2011 |
| JP | 2011-519439 | A | 7/2011 |
| JP | 2012-8951 | A | 1/2012 |
| JP | 2012-504273 | A | 2/2012 |
| JP | 2012-508930 | A | 4/2012 |
| JP | 2012-114676 | A | 6/2012 |
| JP | 2012-164070 | A | 8/2012 |
| JP | 2012-194661 | A | 10/2012 |
| JP | 2012-198625 | A | 10/2012 |
| JP | 2012-215981 | A | 11/2012 |
| JP | 2012-529699 | A | 11/2012 |
| JP | 2013-20496 | A | 1/2013 |
| JP | 2013-30052 | A | 2/2013 |
| JP | 2013-34322 | A | 2/2013 |
| JP | 2013-530445 | A | 7/2013 |
| JP | 2013-533532 | A | 8/2013 |
| JP | 5267966 | B2 | 8/2013 |
| JP | 2013-218663 | A | 10/2013 |
| JP | 2013-222410 | A | 10/2013 |
| JP | 2014-41616 | A | 3/2014 |
| JP | 2014-44719 | A | 3/2014 |
| JP | 2014-44724 | A | 3/2014 |
| JP | 2014-75155 | A | 4/2014 |
| JP | 2014-191653 | A | 10/2014 |
| JP | 2015-14923 | A | 1/2015 |
| JP | 6023162 | B2 | 11/2016 |
| KR | 10-2002-0022295 | A | 3/2002 |
| KR | 2002-0019031 | A | 3/2002 |
| KR | 10-2002-0087665 | A | 11/2002 |
| KR | 10-2004-0049502 | A | 6/2004 |
| KR | 10-2005-0061975 | A | 6/2005 |
| KR | 10-2006-0098024 | A | 9/2006 |
| KR | 10-0652624 | B1 | 12/2006 |
| KR | 10-2007-0026808 | A | 3/2007 |
| KR | 10-0805341 | B1 | 2/2008 |
| KR | 10-2008-0064395 | A | 7/2008 |
| KR | 10-2010-0074218 | A | 7/2010 |
| KR | 10-2011-0056561 | A | 5/2011 |
| KR | 10-2012-0040693 | A | 4/2012 |
| KR | 10-1184865 | B1 | 9/2012 |
| KR | 10-2013-0027326 | A | 3/2013 |
| KR | 10-1253392 | B1 | 4/2013 |
| KR | 10-2013-0116905 | A | 10/2013 |
| KR | 10-1330962 | B1 | 11/2013 |
| KR | 10-2014-0018019 | A | 2/2014 |
| KR | 10-2014-0026263 | A | 3/2014 |
| KR | 10-2014-0027029 | A | 3/2014 |
| KR | 10-2014-0055429 | A | 5/2014 |
| KR | 10-2014-0105309 | A | 9/2014 |
| KR | 10-2014-0121764 | A | 10/2014 |
| KR | 10-2014-0137400 | A | 12/2014 |
| KR | 10-2016-0012636 | A | 2/2016 |
| KR | 10-2016-0045633 | A | 4/2016 |
| KR | 10-2016-0054573 | A | 5/2016 |
| KR | 10-1820573 | B1 | 1/2018 |
| TW | 200529636 | A | 9/2005 |
| TW | 200601176 | A | 1/2006 |
| TW | 200642408 | A | 12/2006 |
| TW | 200919255 | A | 5/2009 |
| WO | 1997/41528 | A1 | 11/1997 |
| WO | 1998/58346 | A1 | 12/1998 |
| WO | 1999/44114 | A1 | 9/1999 |
| WO | 2001/80017 | A1 | 10/2001 |
| WO | 2003/083793 | A2 | 10/2003 |
| WO | 2004/029862 | A1 | 4/2004 |
| WO | 2005/008568 | A1 | 1/2005 |
| WO | 2005/020036 | A2 | 3/2005 |
| WO | 2005/106774 | A2 | 11/2005 |
| WO | 2006/051462 | A1 | 5/2006 |
| WO | 2007/000012 | A1 | 1/2007 |
| WO | 2007/029710 | A1 | 3/2007 |
| WO | 2007/041834 | A1 | 4/2007 |
| WO | 2007/060102 | A1 | 5/2007 |
| WO | 2007/070014 | A1 | 6/2007 |
| WO | 2007/072447 | A2 | 6/2007 |
| WO | 2007/073422 | A1 | 6/2007 |
| WO | 2007/076210 | A1 | 7/2007 |
| WO | 2007/116521 | A1 | 10/2007 |
| WO | 2008/008101 | A2 | 1/2008 |
| WO | 2008/024454 | A1 | 2/2008 |
| WO | 2008/147457 | A1 | 12/2008 |
| WO | 2010/039337 | A2 | 4/2010 |
| WO | 2010/056484 | A2 | 5/2010 |
| WO | 2010/077960 | A2 | 7/2010 |
| WO | 2010/120972 | A1 | 10/2010 |
| WO | 2010/128442 | A2 | 11/2010 |
| WO | 2011/074500 | A1 | 6/2011 |
| WO | 2012/083113 | A2 | 6/2012 |
| WO | 2013/000150 | A1 | 1/2013 |
| WO | 2013/023224 | A2 | 2/2013 |
| WO | 2013/066659 | A1 | 5/2013 |
| WO | 2013/096943 | A1 | 6/2013 |
| WO | 2013/103912 | A1 | 7/2013 |
| WO | 2013/177548 | A1 | 11/2013 |
| WO | 2014/074407 | A1 | 5/2014 |
| WO | 2014/147297 | A1 | 9/2014 |
| WO | 2015/009581 | A1 | 1/2015 |
| WO | 2015/030912 | A1 | 3/2015 |
| WO | 2015/051361 | A1 | 4/2015 |
| WO | 2015/062410 | A1 | 5/2015 |
| WO | 2015/112868 | A1 | 7/2015 |
| WO | 2015/187608 | A1 | 12/2015 |
| WO | 2016/201037 | A1 | 12/2016 |
| WO | 2017/030223 | A1 | 2/2017 |

OTHER PUBLICATIONS

Extended European Search Report received for European Patent Application No. 18208881.5, dated Jan. 8, 2019, 7 pages.

Intention to Grant received for European Patent Application No. 12773460.6, dated Feb. 4, 2019, 8 pages.

Intention to Grant received for European Patent Application No. 131711459, dated Feb. 21, 2019, 8 pages.

International Search Report and Written Opinion received for PCT Patent Application No. PCT/US2018/049289, dated Feb. 19, 2019, 12 pages.

Notice of Allowance received for Danish Patent Application No. PA201770714, dated Feb. 15, 2019, 2 pages.

Notice of Allowance received for Danish Patent Application No. PA201770715, dated Feb. 15, 2019, 2 pages.

Notice of Allowance received for Korean Patent Application No. 10-2018-7032467, dated Jan. 28, 2019, 4 pages (1 page of English Translation and 3 pages of Official Copy).

Notice of Allowance received for U.S. Appl. No. 15/470,752, dated Feb. 7, 2019, 11 pages.

Notice of Allowance received for U.S. Appl. No. 15/845,794, dated Feb. 14, 2019, 6 pages.

Office Action received for Australian Patent Application No. 2018200628, dated Jan. 24, 2019, 3 pages.

Office Action received for Australian Patent Application No. 2018279788, dated Feb. 8, 2019, 4 pages.

Office Action received for Chinese Patent Application No. 201480058054.1, dated Jan. 22, 2019, 6 pages (2 pages of English Translation and 4 pages of Official Copy).

Office Action received for Korean Patent Application No. 10-2014-7008348, dated Jan. 22, 2019, 16 pages (1 page of English Translation and 15 pages of Official Copy).

Office Action received for Korean Patent Application No. 10-2016-0152210, dated Jan. 29, 2019, 7 pages (3 pages of English Translation and 4 pages of Official Copy).

Office Action received for Korean Patent Application No. 10-2017-7034558, dated Dec. 15, 2018, 15 pages (7 pages of English Translation and 8 pages of Official Copy).

Final Office Action Received for U.S. Appl. No. 14/871,635, dated May 3, 2019, 32 pages.

Final Office Action received for U.S. Appl. No. 15/866,341, dated May 14, 2019, 10 pages.

(56) References Cited

OTHER PUBLICATIONS

Non-Final Office Action received for U.S. Appl. No. 15/433,320, dated May 2, 2019, 27 pages.
Notice of Allowance received for Japanese Patent Application No. 2017-540616, dated Apr. 23, 2019, 4 pages (1 page of English Translation and 3 pages of Official Copy).
Notice of Allowance received for U.S. Appl. No. 15/250,152, dated May 1, 2019, 12 pages.
Notice of Allowance received for U.S. Appl. No. 15/903,456, dated May 1, 2019, 6 pages.
Office Action received for Chinese Patent Application No. 201810338826.7, dated Apr. 3, 2019, 21 pages (13 pages of English Translation and 8 pages of Official Copy).
Office Action received for European Patent Application No. 16804040.0, dated May 13, 2019, 12 pages.
Office Action received for Japanese Patent Application No. 2018-113081, dated Apr. 9, 2019, 6 pages (3 pages of English Translation and 3 pages of Official Copy).
Office Action received for Taiwanese Patent Application No. 107138003, dated Mar. 20, 2019, 6 pages (3 pages of English Translation and 3 pages of Official Copy).
Pre-Brief Appeal Conference decision received for U.S. Appl. No. 14/869,831, mailed on Jan. 18, 2019, 3 pages.
Kurihara et al., "Torisetsu of OS X that we want to know", Mac Fan, Japan, Mai Navi Co., Ltd., 2013, vol. 21, No. 6, 8pages (Official copy only) ((See Communication under 37 CFR § 1.98(a) (3)).
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Final Office Action received for U.S. Appl. No. 14/503,296, dated Apr. 24, 2019, 5 pages.
Intention to Grant received for Danish Patent Application No. PA201770804, dated Apr. 10, 2019, 2 pages.
Non-Final Office Action received for U.S. Appl. No. 15/351,230, dated Apr. 18, 2019, 16 pages.
Notice of Allowance received for U.S. Appl. No. 15/894,221, dated Apr. 11, 2019, 5 pages.
Office Action received for Australian Patent Application No. 2017317605, dated Apr. 11, 2019, 4 pages.
Office Action received for Australian Patent Application No. 2018202559, dated Apr. 8, 2019, 4 pages.
Office Action received for Chinese Patent Application No. 201510284896.5, dated Mar. 6, 2019, 13 pages (4 pages of English Translation and 9 pages of Official Copy).
Record of Oral Hearing received for U.S. Appl. No. 13/243,045, dated Apr. 1, 2019, 18 pages.
Search Report and Opinion received for Danish Patent Application No. PA201870855, dated Apr. 3, 2019, 12 pages.
Decision to Refuse received for European Patent Application No. 18154163.2, dated May 17, 2019, 22 pages.
Extended European Search Report received for European Patent Application No. 19150528.8, dated May 15, 2019, 9 pages.
Final Office Action received for U.S. Appl. No. 15/274,910, dated May 31, 2019, 31 pages.
Minutes of the Oral Proceedings received for European Patent Application No. 18154163.2, mailed on May 17, 2019, 7 pages.
Non-Final Office Action received for U.S. Appl. No. 15/782,068, dated Jun. 3, 2019, 17 Pages.
Notice of Acceptance received for Australian Patent Application No. 2019201101, dated May 6, 2019, 3 pages.
Notice of Allowance received for U.S. Appl. No. 15/945,610, dated May 20, 2019, 7 pages.
Office Action received for Chinese Patent Application No. 201810094316.X, dated Apr. 28, 2019, 9 pages (3 pages of English Translation and 6 pages of Official Copy).
Office Action received for European Patent Application No. 18713408.5, dated May 20, 2019, 5 pages.
Preliminary Opinion before oral proceedings received for European Patent Application No. 18154163.2, mailed on Apr. 16, 2019, 12 pages.
Non-Final Office Action received for U.S. Appl. No. 16/164,561, dated Jan. 4, 2019, 14 pages.
Notice of Allowance received for U.S. Appl. No. 15/294,439, dated Jan. 8, 2019, 8 pages.
Office Action received for Chinese Patent Application No. 201710094150.7, dated Dec. 19, 2018, 12 Pages (5 pages of English Translation and 7 pages of Official Copy).
Supplemental Notice of Allowance received for U.S. Appl. No. 14/870,694, dated Jan. 17, 2019, 3 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/031748, dated Dec. 20, 2018, 10 pages.
Non-Final Office Action received for U.S. Appl. No. 16/147,023, dated Dec. 26, 2018, 17 pages.
Office Action received for Korean Patent Application No. 10-2018-7033301, dated Dec. 14, 2018, 6 pages (2 pages of English Translation and 4 pages of Official Copy).
Office Action received for Korean Patent Application No. 10-2018-7028845, dated Dec. 10, 2018, 8 pages (4 pages of English Translation and 4 pages of Official copy).
Extended European Search Report received for European Patent Application No. 18190250.3, dated Nov. 9, 2018, 6 pages.
International Preliminary Report on Patentability received for PCT Patent Application No. PCT/US2017/032240, dated Nov. 29, 2018, 29 pages.
Notice of Allowance received for Japanese Patent Application No. 2016-131998, dated Nov. 30, 2018, 4 pages (1 page of English Translation and 3 pages of Official copy).
Notice of Allowance received for Japanese Patent Application No. 2017-085582, dated Nov. 30, 2018, 4 pages (1 page of English Translation and 3 pages of Official copy).
Notice of Allowance received for U.S. Appl. No. 14/870,694, dated Dec. 11, 2018, 6 pages.
Notice of Allowance received for U.S. Appl. No. 15/900,047, dated Dec. 5, 2018, 10 pages.
Office Action received for Australian Patent Application No. 2016270323, dated Nov. 26, 2018, 4 pages.
Office Action received for Australian Patent Application No. 2016270775, dated Nov. 26, 2018, 5 pages.
Office Action received for Australian Patent Application No. 2017266867, dated Dec. 6, 2018, 3 pages.
Office Action received for Australian Patent Application No. 2018202712, dated Nov. 20, 2018, 12 pages.
Office Action Received for Australian Patent Application No. 2018203732, dated Nov. 30, 2018, 3 pages.
Office Action received for Chinese Patent Application No. 201810094316.X, dated Oct. 29, 2018, 12 pages (5 pages of English Translation and 7 pages of Official Copy).
Office Action received for Danish Patent Application No. PA201770782, dated Nov. 22, 2018, 3 pages.
Office Action received for Danish Patent Application No. PA201870371, dated Nov. 20, 2018, 3 pages.
Office Action received for European Patent Application No. 16803996.4, dated Nov. 29, 2018, 12 pages.
Summons to Attend Oral Proceedings received for European Patent Application No. 18154163.2, mailed on Nov. 29, 2018, 9 pages.
Corrected Notice of Allowance received for U.S. Appl. No. 15/294,439, dated Mar. 13, 2019, 4 pages.
Decision on Appeal received for U.S. Appl. No. 13/243,045, mailed on Mar. 18, 2019, 10 Pages.
Decision to Refuse received for European Patent Application No. 16201195.1, dated Mar. 4, 2019, 23 pages.
International Preliminary Report on Patentability received for PCT Patent Application No. PCT/US2017/058368, dated Feb. 19, 2019, 5 pages.
NHDANH-Protocol Corp, "How to Enroll Face Enbioaccess T9 Nitgen Korea—Đăng Ký Khuôn Mặt Enbioaccess T9 Nitgen",

(56) References Cited

OTHER PUBLICATIONS

Available online at <https://www.youtube.com/watch?v=mFn03PD4NIE>, Mar. 30, 2017, 1 page.
Notice of Acceptance received for Australian Patent Application No. 2017266867, dated Mar. 6, 2019, 3 pages.
Notice of Allowance received for Japanese Patent Application No. 2016-569665, dated Feb. 22, 2019, 4 pages (1 Page of English Translation and 3 Pages of Official Copy).
Notice of Allowance received for Korean Patent Application No. 10-2018-7022895, dated Feb. 22, 2019, 4 pages (1 page of English Translation and 3 pages of Official Copy).
Notice of Allowance received for Korean Patent Application No. 10-2018-7033301, dated Feb. 20, 2019, 5 pages ( 2 Pages of English Translation and 3 Pages of Official Copy).
Notice of Allowance received for Korean Patent Application No. 10-2014-7008348, dated Feb. 21, 2019, 5 pages (2 Pages of English Translation and 3 Pages of Official Copy).
Notice of Allowance received for U.S. Appl. No. 15/872,685, dated Mar. 8, 2019, 10 pages.
Notice of Allowance received for U.S. Appl. No. 15/894,221, dated Mar. 4, 2019, 2 pages.
Office Action received for Australian Patent Application No. 2017317605, dated Feb. 22, 2019, 4 pages.
Office Action received for Australian Patent Application No. 2018200485, dated Feb. 20, 2019, 6 pages.
Office Action received for Australian Patent Application No. 2018203732, dated Feb. 26, 2019, 5 pages.
Office Action received for Australian Patent Application No. 2018312629, dated Feb. 25, 2019, 4 pages.
Office Action received for Australian Patent Application No. 2019201101, dated Feb. 28, 2019, 3 pages.
Office Action received for Chinese Patent Application No. 201610459968.X, dated Feb. 22, 2019, 11 pages (5 Pages of English Translation and 6 pages of Official Copy).
Office Action received for Chinese Patent Application no. 201410407626.4, dated Feb. 12, 2019, 13 pages (3 Pages of English Translation and 10 pages of Official Copy).
Office Action received for Danish Patent Application No. PA201770712, dated Mar. 1, 2019, 3 pages.
Office Action received for Japanese Patent Application No. 2017-562050, dated Feb. 1, 2019, 15 pages (8 pages of English Translation and 7 pages of Official Copy).
Office Action received for Japanese Patent Application No. 2017-562330, dated Jan. 18, 2019, 11 pages (6 pages of English Translation and 5 pages of Official Copy).
Office Action received for Taiwanese Patent Application No. 104117508, dated Jan. 25, 2019, 24 pages (5 pages of English Translation and 19 pages of Official Copy).
PSP Security Ltd, "AccuFACE features", Available online at <https://www.youtube.com/watch?v=p3jvGoEbioY>, Oct. 14, 2009, 1 page.
PSP Security Ltd, "PSP Security—AccuFACE Step by Step Enrollment Process", Available online at <https://www.youtube.com/watch?v=0lIF5OOdya0>, Oct. 14, 2009, 1 page.
Supplemental Notice of Allowance received for U.S. Appl. No. 14/870,726, dated Mar. 6, 2019, 6 pages.
Decision on Appeal received for Korean Patent Application No. 10-2015-7010262, dated Dec. 21, 2018, 16 pages (3 pages of English Translation and 13 pages of Official Copy).
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Notice of Allowance received for Japanese Patent Application No. 2016-558332, dated Jan. 11, 2019, 4 pages (1 page of English Translation and 3 pages of Official Copy).
Notice of Allowance received for Korean Patent Application No. 10-2017-7015582, dated Dec. 27, 2018, 5 pages (2 pages of English Translation and 3 pages of Official copy).
Notice of Allowance received for U.S. Appl. No. 15/894,221, dated Feb. 1, 2019, 5 pages.
Office Action received for Australian Patent Application No. 2018101014, dated Jan. 18, 2019, 5 pages.
Office Action Received for Australian Patent Application No. 2018202559, dated Jan. 16, 2019, 6 pages.
Office Action received for Chinese Patent Application No. 201510284715.9, dated Dec. 21, 2018, 22 pages (5 pages of English Translation and 17 pages of Official Copy).
Office Action received for Chinese Patent Application No. 201610371774.4, dated Dec. 19, 2018, 13 pages (5 pages of English Translation and 8 pages of Official copy).
Office Action received for Chinese Patent Application No. 201610371856.9, dated Dec. 19, 2018, 12 pages (5 pages of English Translation and 7 pages of Official Copy).
Office Action received for Chinese Patent Application No. 201780002648.4, dated Dec. 5, 2018, 13 pages (5 pages of English Translation and 8 pages of Official Copy).
Search Report received for Germany Patent Application No. 202017005507.4, dated Jan. 2, 2019, 6 pages (1 page of English Translation and 5 pages of Official Copy).
Advisory Action received for U.S. Appl. No. 15/250,152, dated Mar. 25, 2019, 5 pages.
Certificate of Examination received for Australian Patent Application No. 2018101014, dated Mar. 20, 2019, 2 pages.
Extended European Search Report received for European Patent Application No. 17810682.9, dated Mar. 26, 2019, 7 pages.
International Preliminary Report on Patentability received for PCT Patent Application No. PCT/US2017/49500, dated Mar. 21, 2019, 14 pages.
Notice of Acceptance received for Australia Patent Application No. 2019200360, dated Mar. 15, 2019, 3 pages.
Notice of Allowance received for Japanese Patent Application No. 2016-224507, dated Mar. 26, 2019, 3 pages (1 page of English Translation and 2 pages of Official Copy).
Notice of Allowance received for U.S. Appl. No. 15/899,966, dated Mar. 21, 2019, 7 pages.
Office Action received for Australian Patent Application No. 2018200485, dated Mar. 15, 2019, 4 pages.
Office Action received for Australian Patent Application No. 2018202712, dated Mar. 22, 2019, 5 pages.
Office Action received for Chinese Patent Application No. 201610069731.0, dated Mar. 5, 2019, 10 pages (5 pages of English Translation and 5 pages of Official Copy).
Office Action received for Chinese Patent Application No. 201710093861.2, dated Mar. 5, 2019, 6 pages (3 pages of English Translation and 3 pages of Official Copy).
Office Action received for Chinese Patent Application No. 201780002398.4, dated Feb. 27, 2019, 6 pages (3 pages of English Translation and 3 pages of Official Copy).
Summons to Attend Oral Proceedings received for European Patent Application No. 16703893.4, dated Mar. 26, 2019, 14 pages.
Advisory Action received for U.S. Appl. No. 15/274,910, dated Aug. 12, 2019, 3 pages.
Corrected Notice of Allowance received for U.S. Appl. No. 15/866,341, daed Aug. 21, 2019, 3 pages.
Corrected Notice of Allowance received for U.S. Appl. No. 15/866,341, dated Aug. 26, 2019, 3 pages.
Decision on Appeal received for U.S. Appl. No. 14/612,214, mailed on Sep. 3, 2019, 10 pages.
Decision to Grant received for Danish Patent Application No. PA201770804, dated Jun. 28, 2019., 2 pages.
Decision to Grant received for European Patent Application No. 12773460.6, dated Jun. 27, 2019, 2 pages.
Decision to Grant received for European Patent Application No. 13171145,9, dated Jul. 11, 2019, 2 pages.
Decision to Grant received for Japanese Patent Application No. 2017-075031, dated Jul. 1, 2019, 3 pages. (1 page of English Translation and 2 pages of Official Copy).
Decision to Refuse received for European Patent Application No. 16703893.4, dated Jul. 24, 2019, 22 pages.
European Search Report received for European Patent Application No. 19171661.2, dated Jul. 17, 2019, 6 pages.
Examiner's answer to Appeal Brief received for U.S. Appl. No. 14/869,831, dated Aug. 12, 2019, 16 pages.

(56) References Cited

OTHER PUBLICATIONS

Final Office Action received for U.S. Appl. No. 14/869,877, dated Jun. 11, 2019, 35 pages.
Final Office Action received for U.S. Appl. No. 16/147,023, dated Jul. 23, 2019, 18 pages.
Intention to Grant received for Danish Patent Application No. PA201770782, dated Aug. 8, 2019, 2 pages.
Intention to Grant received for European Patent Application No. 12773460.6, dated Jun. 17, 2019, 4 pages.
Minutes of Oral Proceeding received for European Patent Application No. 16703893.4, mailed on Jul. 22, 2019, 9 pages.
Non-Final Office Action received for U.S. Appl. No. 13/243,045, dated Jun. 12, 2019, 11 pages.
Notice of Acceptance received for Australian Patent Application No. 2018200628, dated Jun. 13, 2019, 3 pages.
Notice of Allowance received for Chinese Patent Application No. 201480058054.1, dated Jul. 8, 2019, 2 pages (1 page of English Translation and 1 page of Official Copy).
Notice of Allowance received for Chinese Patent Application No. 201780002398.4, dated Jun. 17, 2019, 2 pages (1 page of English Translation and 1 page of Official Copy).
Notice of Allowance received for Korean Patent Application No. 10-2017-7034677, dated May 27, 2019, 5 pages (2 pages of English Translation and 3 pages of Official Copy).
Notice of Allowance received for U.S. Appl. No. 14/503,296, dated Aug. 28, 2019, 12 pages.
Notice of Allowance received for U.S. Appl. No. 15/866,341, dated Jul. 26, 2019, 8 pages.
Notice of Allowance received for U.S. Appl. No. 15/894,221, dated Aug. 13, 2019, 2 pages.
Office Action received for Australian Patent Application No. 2016270323, dated May 29, 2019, 4 pages.
Office Action received for Australian Patent Application No. 2016270775, dated May 29, 2019, 3 pages.
Office Action received for Australian Patent Application No. 2018202559, dated Jul. 19, 2019, 5 pages.
Office Action received for Australian Patent Application No. 2018203732, dated Jun. 6, 2019, 4 pages.
Office Action received for Chinese Patent Application No. 201510284715.9, dated Jun. 19, 2019, 26 pages (8 pages of English Translation and 18 pages of Official Copy).
Office Action received for Chinese Patent Application No. 201610371774.4, dated Jul. 8, 2019, 6 pages (3 pages of English Translation and 3 pages of Official copy).
Office Action received for Chinese Patent Application No. 201610371856.9, dated Jul. 10, 2019, 6 pages (3 pages of English Translation and 3 pages of Official Copy).
Office Action received for Chinese Patent Application No. 201780002648.4, dated Jun. 12, 2019, 11 pages (5 pages of English Translation and 6 pages of Official Copy).
Office Action received for Chinese Patent Application No. 201810094316.X, dated Aug. 5, 2019, 9 pages (3 pages of English Translation and 6 pages of Official Copy).
Office Action received for Chinese Patent Application No. 201810338038.8, dated May 14, 2019, 26 pages (13 pages of English Translation and 13 pages of Official Copy).
Office Action received for European Patent Application No. 16201159.7, dated Jun. 12, 2019, 10 pages.
Office Action received for European Patent Application No. 18208881.5, dated Jun. 11, 2019, 5 pages.
Office Action received for European Patent Application No. 18830326.7, dated Aug. 27, 2019, 6 pages.
Office Action received for European Patent Application No. 19171661.2, dated Aug. 7, 2019, 7 pages.
Office Action received for Japanese Patent Application No. 2016-224506, dated May 14, 2019, 22 pages (11 pages of English Translation and 11 pages of Official Copy).
Office Action received for Japanese Patent Application No. 2018-560107, dated Jun. 14, 2019, 26 pages (13 pages of English Translation and 13 pages of Official Copy).
Office Action received for Korean Patent Application No. 10-2016-0152210, dated May 30, 2019, 8 pages (4 pages of English Translation and 4 pages of Official copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2017-0022582, dated Jul. 31, 2019, 5 pages (2 pages of English Translation and 3 pages of Official Copy).
Office Action received for Korean Patent Application No. 10-2017-7012145, dated Jul. 18, 2019, 5 pages ( 2 Pages of English Translation and 3 Pages of Official Copy).
Office Action received for Korean Patent Application No. 10-2017-7034558, dated Jun. 4, 2019, 7 pages (3 pages of English Translation and 4 pages of Official Copy).
Office Action received for Korean Patent Application No. 10-2018-7019643, dated Jul. 2, 2019, 12 pages (5 pages of English Translation and 7 pages of Official Copy).
Office Action received for Korean Patent Application No. 10-2018-7028845, dated Jun. 19, 2019, 7 pages (3 pages of English Translation and 4 pages of Official Copy).
Office Action received for Korean Patent Application No. 10-2019-7014494, dated Jun. 14, 2019, 11 pages (5 pages of English Translation and 6 pages of Official Copy).
Office Action received for Korean Patent Application No. 10-2019-7014988, dated Jul. 19, 2019, 9 pages (4 pages of English Translation and 5 pages of Official Copy).
Office Action received for Taiwanese Patent Application No. 104117508, dated May 22, 2019, 7 pages (3 pages of English Translation and 4 pages of Official Copy).
Result of Consultation received for European Patent Application No. 16703893.4, dated Jun. 7, 2019, 3 pages.
Kawai, Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31(Official Copy only) {See Communication under 37 CFR § 1.98(a) (3)}.
Final Office Action received for U.S. Appl. No. 16/164,561, dated Sep. 5, 2019, 12 pages.
Notice of Allowance received for U.S. Appl. No. 16/131,767, dated Sep. 6, 2019, 7 pages.
Office Action received for Australian Patent Application No. 2018202712, dated Sep. 2, 2019, 4 pages.
Office Action received for Chinese Patent Application No. 201710094150.7, dated Jul. 31, 2019, 6 pages (2 pages of English Translation and 4 pages of Official Copy).
Extended European Search Report received for European Patent Application No. 19160344.8, dated Jun. 14, 2019, 7 pages.
Office Action received for Danish Patent Application No. PA201770713, dated Jun. 7, 2019, 4 pages.
Notice of Acceptance received for Australian Patent Application No. 2017317605, dated Aug. 28, 2019, 3 pages.
Notice of Allowance received for Chinese Patent Application No. 201610069731.0, dated Sep. 6, 2019, 2 pages (1 page of English Translation and 1 page of Official Copy).
Notice of Allowance received for Taiwanese Patent Application No. 107138003, dated Aug. 30, 2019, 4 pages (1 page of English Translation and 3 pages of Official Copy).
Notice of Allowance received for U.S. Appl. No. 15/782,068, dated Sep. 24, 2019, 7 pages.
Office Action received for Chinese Patent Application No. 201610459968.X, dated Aug. 23, 2019, 12 pages (5 pages of English Translation and 7 pages of Official Copy).
Office Action received for European Patent Application No. 18830326.7, dated Sep. 16, 2019, 6 pages.
Advisory Action received for U.S. Appl. No. 14/503,296, dated Oct. 2, 2015, 3 pages.
Advisory Action received for U.S. Appl. No. 14/869,715, dated Feb. 8, 2017, 3 pages.
Advisory Action received for U.S. Appl. No. 14/869,715, dated May 18, 2017, 6 pages.
Advisory Action received for U.S. Appl. No. 14/869,877, dated Jan. 5, 2017, 3 pages.

(56) References Cited

OTHER PUBLICATIONS

Advisory Action received for U.S. Appl. No. 14/870,793, dated Apr. 13, 2017, 3 pages.
Advisory Action received for U.S. Appl. No. 15/137,944, dated May 11, 2017, 6 pages.
Certificate of Examination received for Australian Patent Application No. 2017101425, dated Jan. 17, 2018, 2 pages.
Certification of Examination received for Australian Patent Application No. 2017100553, dated Jan. 17, 2018, 2 pages.
Corrected Notice of Allowance received for U.S. Appl. No. 15/017,436, dated Sep. 2, 2016, 5 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/357,873, dated Jan. 19, 2018, 2 pages.
Corrected Notice of Allowance received for U.S. Appl. No. 15/357,873, dated Mar. 16, 2018, 2 pages.
Decision to Grant received for Danish Patent Application No. PA201670042, dated Mar. 19, 2018, 2 pages.
Decision to Grant received for Danish Patent Application No. PA201670628, dated Nov. 20, 2017, 2 pages.
Decision to Grant received for European Patent Application No. 14853215.3, dated Sep. 27, 2018, 2 pages.
Decision to Refuse received for European Patent Application No. 12770400.5, dated Nov. 8, 2018, 12 pages.
"Does Apple Pay change payment?", Mac Fan, Japan, Mynavi Publishing Corporation, vol. 22, No. 11 common No. 381, Nov. 1, 2014, 11 pages (4 pages of English Translation and 7 pages of Official Copy).
Examiner's Answer to Appeal Brief received for U.S. Appl. No. 14/870,793, dated Apr. 16, 2018, 15 pages.
Extended European Search Report received for European Patent Application No. 14853215.3, dated Sep. 13, 2016, 9 pages.
Extended European Search Report received for European Patent Application No. 16177139.9, dated Nov. 4, 2016, 7 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 16803996.4, dated Feb. 7, 2018, 8 pages.
Extended European Search Report received for European Patent Application No. 16804040.0, dated Feb. 26, 2018, 9 pages.
Extended European Search Report received for European Patent Application No. 17799904.2, dated Jul. 30, 2018, 7 pages.
Extended European Search Report received for European Patent Application No. 18154163.2, dated Mar. 2, 2018, 4 pages.
Final Office Action Received for U.S. Appl. No. 14/871,654, dated Nov. 16, 2017, 32 pages.
Final Office Action received for U.S. Appl. No. 13/248,882, dated Dec. 4, 2013, 22 pages.
Final Office Action received for U.S. Appl. No. 14/285,378, dated Jul. 23, 2015, 19 pages.
Final Office Action received for U.S. Appl. No. 14/480,183, dated Jun. 28, 2017, 14 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/612,214, dated Dec. 7, 2015, 13 pages.
Final Office Action received for U.S. Appl. No. 14/869,715, dated Jun. 17, 2016, 35 pages.
Final Office Action received for U.S. Appl. No. 14/869,715, dated Mar. 7, 2017, 41 pages.
Final Office Action received for U.S. Appl. No. 14/869,715, dated Oct. 6, 2016, 37 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 14/869,877, dated Apr. 26, 2018, 18 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action Received for U.S. Appl. No. 14/871,635, dated Jan. 18, 2018, 33 pages.
Final Office Action received for U.S. Appl. No. 15/137,944, dated Feb. 27, 2017, 10 pages.
Final Office Action received for U.S. Appl. No. 15/470,752, dated Mar. 13, 2018, 14 pages.
Final Office Action received for U.S. Appl. No. 15/872,685, dated Oct. 26, 2018, 10 pages.
Final Office Action received for U.S. Appl. No. 15/899,966, dated Nov. 5, 2018, 10 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received for U.S. Appl. No. 14/870,694, dated Apr. 7, 2017, 16 pages.
Intention to Grant received for Danish patent Application No. PA201670042, dated Jan. 29, 2018, 2 pages.
Intention to Grant received for Danish Patent Application No. PA201670628, dated Aug. 28, 2017, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
Intention to Grant received for European Patent Application No. 14853215.3, dated Jun. 27, 2018, 9 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2014/054800, dated Mar. 31, 2016, 27 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/033751, dated Dec. 14, 2017, 11 pages.
International Preliminary Report on Patentability received for PCT Patent Application No. PCT/US2016/034175, dated Dec. 14, 2017, 14 pages.

(56) References Cited

OTHER PUBLICATIONS

International Search Report and Written Opinion received for PCT Application No. PCT/US2015/033326, dated Aug. 10, 2015, 13 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2016/033751, dated Oct. 5, 2016, 14 pages.
International Search Report and Written Opinion received for PCT Patent Application No. PCT/US2016/034175, dated Oct. 7, 2016, 17 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fee received for PCT Patent Application No. PCT/US2017/058368, dated Dec. 14, 2017, 2 pages.
Invitation to Pay Additional Fees received for PCT Patent Application No. PCT/US2014/054800, dated Oct. 31, 2014, 2 pages.
Invitation to Pay Additional Fees received for PCT Patent Application No. PCT/US2016/033751, dated Jul. 22, 2016, 2 pages.
Invitation to Pay Additional Fees received for PCT Patent Application No. PCT/US2016/034175, dated Aug. 11, 2016, 3 pages.
"IOS Security", White Paper, Available online at: https://web.archive.org/web/20150526223200/http://www.apple.com/business/docs/iOS _Security_Guide.pdf, Apr. 2015, 55 pages.
Minutes of the Oral Proceedings received for European Application No. 12770400.5, mailed on Nov. 6, 2018, 7 pages.
Non-Final Office Action received for U.S. Appl. No. 14/869,715, dated Jan. 29, 2016, 62 pages.
Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/869,877, dated Oct. 5, 2018, 19 pages.
Non-Final Office Action received for U.S. Appl. No. 14/870,793, dated Apr. 19, 2016, 17 pages.
Non-Final Office Action received for U.S. Appl. No. 15/274,910, dated Oct. 18, 2018, 26 pages.
Non-Final Office Action received for U.S. Appl. No. 15/899,966, dated May 4, 2018, 10 pages.
Non-Final Office Action received for U.S. Appl. No. 15/900,047, dated May 8, 2018, 7 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/480,183, dated Oct. 18, 2016, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/612,214, dated Jul. 29, 2015, 12 pages.
Non-Final Office Action received for U.S. Appl. No. 14/642,366, dated Aug. 24, 2015, 7 pages.
Non-Final Office Action received for U.S. Appl. No. 14/869,715, dated Oct. 11, 2016, 37 pages.
Non-Final Office Action received for U.S. Appl. No. 14/870,726, dated Sep. 16, 2016, 12 pages.
Non-Final Office Action Received for U.S. Appl. No. 14/871,635, dated May 5, 2017, 23 pages.
Non-Final Office Action Received for U.S. Appl. No. 14/871,635, dated Nov. 16, 2018, 36 pages.
Non-Final Office Action Received for U.S. Appl. No. 14/871,654, dated May 4, 2017, 23 pages.
Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/269,801, dated Dec. 30, 2016, 17 pages.
Non-Final Office Action received for U.S. Appl. No. 15/274,086, dated Jan. 11, 2017, 21 pages.
Non-Final Office Action received for U.S. Appl. No. 15/294,439, dated Jan. 26, 2018, 18 pages.
Non-Final Office Action received for U.S. Appl. No. 15/470,752, dated Aug. 28, 2018, 12 pages.
Non-Final Office Action received for U.S. Appl. No. 15/470,752, dated Jul. 28, 2017, 11 pages.
Non-Final Office Action received for U.S. Appl. No. 15/845,794, dated Oct. 15, 2018, 8 pages.
Non-Final Office Action received for U.S. Appl. No. 15/866,341, dated Nov. 13, 2018, 11 pages.

(56) References Cited

OTHER PUBLICATIONS

Non-Final Office Action received for U.S. Appl. No. 15/872,685, dated Mar. 27, 2018, 9 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/945,610, dated Sep. 20, 2018, 9 pages.
Non-Final Office Action received for U.S. Appl. No. 14/870,694, dated Sep. 23, 2016, 13 pages.
Notice of Acceptance received for Australian Patent Application No. 2014334869, dated Jan. 3, 2018, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016201310, dated Feb. 21, 2018, 3 pages.
Notice of Acceptance received for Australian Patent Application No. 2016203896, dated Mar. 2, 2018, 3 pages.
Notice of Acceptance received for Australian Patent Application No. 2016203898 dated Feb. 21, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Allowance received for Australian Patent Application No. 2015202397, dated Feb. 15, 2017, 3 pages.
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201520357381.9, dated Jul. 29, 2015, 4 pages (2 pages of English Translation and 2 pages of Official Copy).
Notice of Allowance received for Chinese Patent Application No. 201520358683.8, dated Mar. 10, 2016, 5 pages (3 pages of English Translation and 2 pages of Official Copy).
Notice of Allowance received for Chinese Patent Application No. 201620480708.6, dated Apr. 20, 2017, 3 pages (2 pages of English Translation and 1 page of Official Copy).
Notice of Allowance received for Chinese Patent Application No. 201620480846.4, dated Apr. 20, 2017, 3 pages (2 pages of English Translation and 1 page of Official Copy).
Notice of Allowance received for Japanese Patent Application No. 2013-098406, dated Jan. 23, 2017, 18 pages (Official Copy only) {See Communication under 37 CFR § 1.98(a) (3)}.
Notice of Allowance received for Japanese Patent Application No. 2015-083696, dated Jan. 6, 2017, 3 pages (Official Copy Only) {See Communication under 37 CFR § 1.98(a) (3)}.
Notice of Allowance received for Japanese Patent Application No. 2016-224508, dated Jun. 20, 2017, 3 pages (Official Copy only) {See Communication under 37 CFR § 1.98(a) (3)}.
Notice of Allowance received for Japanese Patent Application No. 2016-540927, dated May 14, 2018, 4 pages (1 page of English Translation and 3 pages of Official copy).
Notice of Allowance received for Japanese Patent Application No. 2017-013383, dated Mar. 31, 2017, 3 pages (Official Copy Only) {See Communication under 37 CFR § 1.98(a) (3)}.
Notice of Allowance received for Japanese Patent Application No. 2018-008937, dated Jul. 2, 2018, 4 pages (1 page of English Translation and 3 pages of Official copy).
Notice of Allowance received for Japanese Patent Application No. 2018-504997, dated Aug. 3, 2018, 4 pages (1 page of English Translation and 3 pages of Official copy).
Notice of Allowance received for Korean Patent Application No. 10-2016-7009347, dated May 10, 2018, 4 pages (1 page of English Translation and 3 pages of Official copy).
Notice of Allowance received for Korean Patent Application No. 10-2016-7009632, dated Aug. 17, 2018, 4 pages (1 page of English Translation and 3 pages of Official copy).
Notice of Allowance received for Korean Patent Application No. 10-2017-0022365, dated Mar. 27, 2018, 4 pages (1 page of English Translation and 3 pages of Official copy).
Notice of Allowance received for Korean Patent Application No. 10-2017-0022546, dated Feb. 27, 2018, 4 pages (1 page of English Translation and 3 pages of Official Copy).
Notice of Allowance received for Korean Patent Application No. 10-2017-7024513, dated Apr. 20, 2018, 5 pages (2 pages of English Translation and 3 pages of Official copy).
Notice of Allowance received for Korean Patent Application No. 10-2018-7001854, dated Aug. 21, 2018, 4 pages (1 page of English Translation and 3 pages of Official Copy).
Notice of Allowance received for Taiwanese Patent Application No. 103131074, dated Nov. 17, 2015, 3 pages (Official Copy only) {See Communication under 37 CFR § 1.98(a) (3)}.
Notice of Allowance received for Taiwanese Patent Application No. 103136545, dated Nov. 27, 2017, 4 pages (1 page of English Translation and 3 pages of Official Copy).
Notice of Allowance received for Taiwanese Patent Application No. 104140890, dated Oct. 25, 2017, 5 pages (Official Copy Only) {See Communication under 37 CFR § 1.98(a) (3)}.
Notice of Allowance received for Taiwanese Patent Application No. 106141250, dated May 24, 2018, 7 pages (3 pages of English Translation and 4 pages of Official Copy).
Notice of Allowance received for Taiwanese Patent Application No. 107121719, dated Sep. 27, 2018, 7 pages (3 pages of English Translation and 4 pages of Official Copy).
Notice of Allowance received for the U.S. Appl. No. 14/503,381, dated Dec. 16, 2015, 8 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/142,669, dated Aug. 25, 2016, 2 pages.
Notice of Allowance received for U.S. Appl. No. 14/142,669, dated Jun. 14, 2016, 5 pages.
Notice of Allowance received for U.S. Appl. No. 14/142,669, dated Sep. 21, 2016, 2 pages.
Notice of Allowance received for U.S. Appl. No. 14/285,378, dated May 19, 2016, 10 pages.
Notice of Allowance received for U.S. Appl. No. 14/480,183, dated Nov. 29, 2017, 7 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,364, dated Jun. 16, 2016, 11 pages.
Notice of Allowance received for U.S. Appl. No. 14/642,366, dated Jan. 14, 2016, 8 pages.
Notice of Allowance received for U.S. Appl. No. 14/869,715, dated Dec. 19, 2017, 32 pages.
Notice of Allowance received for U.S. Appl. No. 14/870,694, dated Jul. 31, 2018, 7 pages.
Notice of Allowance received for U.S. Appl. No. 14/870,726, dated Sep. 11, 2018, 9 pages.
Notice of Allowance received for U.S. Appl. No. 14/871,654, dated May 22, 2018, 22 pages.
Notice of allowance received for U.S. Appl. No. 15/017,436, dated May 27, 2016, 17 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/137,944, dated Dec. 21, 2017, 8 pages.

(56) References Cited

OTHER PUBLICATIONS

Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/294,439, dated Sep. 10, 2018, 9 pages.
Notice of Allowance received for U.S. Appl. No. 15/357,873, dated Aug. 23, 2017, 10 pages.
Notice of Allowance received for U.S. Appl. No. 15/899,996, dated Apr. 24, 2018, 9 pages.
Office Action received for Australian Patent Application No. 2017100558, dated Feb. 27, 2018, 3 pages.
Office Action received for European Patent Application No. 15168475.0, dated Oct. 5, 2018, 4 pages.
Office Action received for European Patent Application No. 15728352.4, dated Jan. 25, 2018, 10 pages.
Office Action received for Japanese Patent Application No. 2016-224507, dated Dec. 1, 2017, 14 pages (7 pages of English Translation and 7 pages of Official Copy).
Office Action received for Australian Patent Application No. 2012200716, dated Nov. 15, 2013, 3 pages.
Office Action received for Australian Patent Application No. 2014204462, dated Apr. 29, 2016, 3 pages.
Office Action received for Australian Patent Application No. 2014334869, dated Jan. 11, 2017, 4 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016100795, dated Aug. 12, 2016, 6 pages.
Office Action received for Australian Patent Application No. 2016100795, dated Feb. 6, 2017, 3 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016102031, dated Feb. 28, 2017, 4 pages.
Office Action received for Australian Patent Application No. 2016201310, dated Feb. 28, 2017, 3 pages.
Office Action received for Australian Patent Application No. 2016203896, dated Jan. 19, 2018, 4 pages.
Office Action received for Australian Patent Application No. 2016203896, dated Mar. 6, 2017, 3 pages.
Office Action received for Australian Patent Application No. 2016203898, dated Dec. 19, 2017, 4 pages.
Office Action received for Australian Patent Application No. 2016203898, dated Feb. 17, 2017, 3 pages.
Office Action received for Australian Patent Application No. 2017100070, dated Mar. 16, 2017, 6 pages.
Office Action received for Australian Patent Application No. 2017100231, dated Apr. 13, 2017, 3 pages.
Office Action received for Australian Patent Application No. 2017100328, dated May 16, 2017, 3 pages.
Office Action received for Australian Patent Application No. 2017100328, dated Oct. 16, 2017, 6 pages.
Office Action received for Australian Patent Application No. 2017100553, dated Aug. 4, 2017, 5 pages.
Office Action received for Australian Patent Application No. 2017100558, dated Sep. 1, 2017, 5 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2018101014, dated Sep. 19, 2018, 4 pages.
Office Action received for Australian Patent Application No. 2018200485, dated Mar. 15, 2018, 3 pages.
Office Action received for Australian Patent Application No. 2018203732, dated Jun. 21, 2018, 3 pages.
Office Action received for Chinese Patent Application No. 201410407626.4, dated May 21, 2018, 13 pages (4 Page of English Translation and 9 pages of Official Copy).
Office Action received for Chinese Patent Application No. 201410407626.4, dated Oct. 31, 2016, 10 pages (4 pages of English Translation and 6 pages of Official Copy).
Office Action received for Chinese Patent Application No. 201410407626.4, dated Sep. 11, 2017, 11 pages (3 pages of English Translation and 8 pages of Official Copy).
Office Action received for Chinese Patent Application No. 201480058054.1, dated May 3, 2018, 18 pages (4 pages of English Translation and 14 pages of Official Copy).
Office Action received for Chinese Patent Application No. 201510284896.5, dated Jun. 28, 2018, 15 pages (4 pages of English Translation and 11 pages of Official Copy).
Office Action received for Chinese Patent Application No. 201520358683.8, dated Sep. 2, 2015, 4 pages (2 pages of English Translation and 2 pages of Official Copy).
Office Action received for Chinese Patent Application No. 201610459968.X, dated Aug. 23, 2018, 14 pages (6 pages of English Translation and 8 pages of Official Copy).
Office Action received for Chinese Patent Application No. 201620101636.X, dated May 25, 2016, 3 pages (1 page of English Translation and 2 pages of Official Copy).
Office Action received for Chinese Patent Application No. 201620101636.X, dated Oct. 13, 2016, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).
Office Action received for Chinese Patent Application No. 201620480708.6, dated Sep. 14, 2016, 3 pages (1 page of English Translation and 2 pages of Official Copy).
Office Action received for Chinese Patent Application No. 201620480846.4, dated Jan. 9, 2017, 3 pages (1 page of English Translation and 2 pages of Official Copy).
Office Action received for Chinese Patent Application No. 201620480846.4, dated Sep. 14, 2016, 3 pages (1 page of English Translation and 2 pages of Official Copy).

(56) References Cited

OTHER PUBLICATIONS

Office Action received for Chinese Patent Application No. 201620509362.8, dated Feb. 10, 2017, 2 pages (Official Copy only) {See Communication under 37 CFR § 1.98(a) (3)}.
Office Action received for Chinese Patent Application No. 201620509362.8, dated Oct. 21, 2016, 3 pages (1 page of English Translation and 2 pages of Official Copy).
Office Action received for Chinese Patent Application No. 201620509515.9, dated Nov. 9, 2016, 2 pages (1 page of English Translation and 1 page of Official Copy).
Office Action received for Chinese Patent Application No. 201710093861.2, dated Sep. 14, 2018, 15 pages (6 pages of English Translation and 9 pages of Official copy).
Office Action received for Chinese Patent Application No. 201780002398.4, dated Sep. 12, 2018, 17 pages (5 pages of English Translation and 12 pages of Official Copy).
Office Action Received for Danish Patent Application No. PA201670709, dated Jul. 21, 2017, 4 pages.
Office Action Received for Danish Patent Application No. PA201670709, dated Nov. 30, 2016, 10 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670363, dated Feb. 12, 2018, 2 pages.
Office Action received for Danish Patent Application No. PA201670363, dated Jun. 1, 2017, 5 pages.
Office Action received for Danish Patent Application No. PA201670363, dated Nov. 4, 2016, 11 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201670710, dated Dec. 8, 2016, 10 pages.
Office Action received for Danish Patent Application No. PA201670710, dated Sep. 25, 2017, 6 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for Danish Patent Application No. PA201770712, dated Jul. 20, 2018, 4 pages.
Office Action received for Danish Patent Application No. PA201770713, dated Apr. 18, 2018, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201770782, dated Jan. 26, 2018, 8 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for Danish Patent Application No. PA201770804, dated Nov. 6, 2018, 4 pages.
Office Action received for Danish Patent Application No. PA201870370, dated Nov. 9, 2018, 4 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action Received for European Patent Application No. 13171145.9, dated Apr. 28, 2016, 5 pages.
Office Action Received for European Patent Application No. 13171145.9, dated May 3, 2018, 4 pages.
Office Action received for European Patent Application No. 15168475.0, dated Dec. 19, 2016, 5 pages.
Office Action received for European Patent Application No. 15727291.5, dated Jan. 15, 2018, 8 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated Sep. 17, 2018, 7 pages.
Office Action received for European Patent Application No. 18154163.2, dated Apr. 11, 2018, 6 pages.
Office Action received for German Patent Application No. 202015004267.8, dated Nov. 4, 2015, 4 pages (3 pages of English Translation and 1 page of Official Copy).
Office Action received for German Patent Application No. 202017005507.4, dated Feb. 5, 2018, 2 pages (1 page of English Translation and 1 page of Official Copy).
Office Action received for Japanese Patent Application No. 2013-098406, dated Jul. 19, 2016, 10 pages (5 pages of English Translation and 5 pages of Official Copy).
Office Action received for Japanese Patent Application No. 2015-083696, dated Jun. 17, 2016, 12 pages (7 pages of English Translation and 5 pages of Official Copy).
Office Action received for Japanese Patent Application No. 2016-131998, dated Aug. 10, 2018, 9 pages (5 pages of English Translation and 4 pages of Official copy).
Office Action received for Japanese Patent Application No. 2016-131998, dated Sep. 25, 2017, 10 pages (5 pages of English translation and 5 pages of Official Copy).
Office Action received for Japanese Patent Application No. 2016-224507, dated Jun. 16, 2017, 16 pages (8 pages of English Translation and 8 pages of Official Copy).
Office Action received for Japanese Patent Application No. 2016-540927, dated Jun. 20, 2017, 12 pages (7 pages of English Translation and 5 pages of Official Copy).

(56) References Cited

OTHER PUBLICATIONS

Office Action received for Japanese Patent Application No. 2016-558332, dated Dec. 8, 2017, 12 pages (6 pages of English translation and 6 pages of Official copy).
Office Action received for Japanese Patent Application No. 2016-558332, dated Jul. 27, 2018, 9 pages (4 pages of English Translation and 5 pages of Official Copy).
Office Action received for Japanese Patent Application No. 2016-569665, dated Aug. 20, 2018, 9 pages (4 pages of English Translation and 5 pages of Official Copy).
Office Action received for Japanese Patent Application No. 2016-569665, dated Jan. 19, 2018, 10 pages (5 pages of English Translation and 5 pages of Official Copy).
Office Action received for Japanese Patent Application No. 2017-075031, dated Jul. 30, 2018, 16 pages (8 pages of English Translation and 8 pages of Official Copy).
Office Action received for Japanese Patent Application No. 2017-085582, dated Jul. 2, 2018, 11 pages (6 pages of English Translation and 5 pages of Official Copy).
Office Action received for Japanese Patent Application No. 2017-540616, dated Jan. 12, 2018, 24 pages (13 pages of English Translation and 11 pages of Official Copy).
Office Action received for Japanese Patent Application No. 2017-540616, dated Jul. 27, 2018, 20 pages (11 pages of English Translation and 9 pages of Official copy).
Office Action received for Korean Patent Application No. 10-2015-7010262, dated Mar. 8, 2017, 6 pages (3 pages of English Translation and 3 pages of Official Copy).
Office Action received for Korean Patent Application No. 10-2015-7010262, dated May 24, 2016, 10 pages (3 pages of English Translation and 7 pages of Official Copy).
Office Action received for Korean Patent Application No. 10-2016-0152210, dated May 14, 2018, 13 pages (6 pages of English Translation and 7 pages of Official Copy).
Office Action received for Korean Patent Application No. 10-2016-7009347, dated Feb. 18, 2018, 9 pages (4 pages of English Translation and 5 pages of Official Copy).
Office Action received for Korean Patent Application No. 10-2016-7009632, dated Feb. 2, 2018, 11 pages (5 pages of English Translation and 6 pages of Official Copy).
Office Action received for Korean Patent Application No. 10-2016-7035555, dated Dec. 26, 2017, 5 pages (2 pages of English Translation and 3 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-0022365, dated Jun. 26, 2017, 10 pages (4 pages of English Translation and 6 pages of Official Copy).
Office Action received for Korean Patent Application No. 10-2017-0022546, dated Jun. 21, 2017, 12 pages (5 pages of English Translation and 7 pages of Official copy).
Office Action received for Korean Patent Application No. 10-2017-0022582, dated Sep. 19, 2018, 6 pages (2 pages of English Translation and 4 pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2017-7015582, dated Apr. 5, 2018, 8 pages (4 pages of English Translation and 4 pages of Official Copy).
Office Action received for Korean Patent Application No. 10-2017-7015582, dated Jun. 12, 2017, 9 pages (4 pages of English Translation and 5 pages of Official Copy).
Office Action received for Korean Patent Application No. 10-2017-7034677, dated Nov. 1, 2018, 5 pages (2 pages of English Translation and 3 pages of Official Copy).
Office Action received for Korean Patent Application No. 10-2018-7001854, dated Apr. 2, 2018, 13 pages (6 pages of English Translation and 7 pages of Official Copy).
Office Action received for Korean Patent Application No. 10-2018-7022895, dated Aug. 17, 2018, 8 pages (3 pages of English Translation and 5 pages of Official Copy).
Office Action received for Korean Patent Application No. 10-2016-7009347, dated Mar. 9, 2017, 15 pages (7 pages of English Translation and 8 pages of Official Copy).
Office Action received for Taiwan Patent Application No. 103136545, dated May 25, 2016, 7 pages (3 pages of English Translation and 4 pages of Official Copy).
Office Action received for Taiwan Patent Application No. 103131074, dated Jul. 21, 2015, 16 pages (7 pages of English Translation and 9 pages of Official Copy).
Office Action received for Taiwanese Patent Application No. 104117508, dated Jul. 14, 2017, 9 pages (4 pages of English Translation and 5 pages of Official Copy).
Office Action received for Taiwanese Patent Application No. 104117508, dated Jul. 20, 2016, 19 pages (8 pages of English Translation and 11 pages of Official Copy).
Office Action received for Taiwanese Patent Application No. 104117508, dated Mar. 20, 2017, 22 pages (9 pages of English Translation and 13 pages of Official Copy).
Real Solution of two-step-authentication Password Management for Authentication Enhancement, Fukuda Takao, Nikkei PC, JPN, Nikkei Business Publications, Inc., No. 694, Mar. 24, 2014, 11 pages (3 pages of English translation and 8 pages of Official Copy).
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Summons to Attend Oral Proceedings received for European Patent Application No. 12770400.5, dated Mar. 19, 2018, 10 pages.
Summons to Attend Oral Proceedings received for European Patent Application No. 16201195.1, dated Sep. 4, 2018, 21 pages.
Supplemental Notice of Allowance received for U.S. Appl. No. 15/899,996, dated Jul. 25, 2018, 2 pages.
Third Party Observations received for European Patent Application No. 15168475.0, dated Jul. 19, 2016, 4 pages.
Decision to Refuse received for European Patent Application No. 08834386.8, dated Apr. 8, 2013, 8 pages.
Office Action received for European Patent Application No. 08834386.8, dated Aug. 23, 2010, 4 pages.
Summons to Attend Oral Proceedings received for European Patent Application No. 08834386.8, mailed on Aug. 24, 2012, 4 pages.
Notice of Allowance received for Taiwanese Patent Application No. 097134592, dated Aug. 12, 2014, 3 pages. (Official Copy only) {See Communication under 37 CFR § 1.98(a) (3)}.
Notice of Allowance received for Taiwanese Patent Application No. 101107082, dated Oct. 22, 2014, 2 pages. (Official Copy only) {See Communication under 37 CFR § 1.98(a) (3)}.
Office Action received for Taiwanese Patent Application No. 101107082, dated Jul. 7, 2014, 21 pages (7 pages of English Translation and 14 pages of Official Copy).
Notice of Allowance received for Korean Patent Application No. 10-2010-7008899, dated Feb. 12, 2016, 3 pages (1 page of English Translation and 2 pages of official copy).
Office Action received for Korean Patent Application No. 10-2010-7008899, dated Aug. 17, 2014, 7 pages (3 pages of English Translation and 4 pages of Official copy).
Office Action received for Korean Patent Application No. 10-2010-7008899, dated Feb. 3, 2015, 7 pages (3 pages of English Translation and 4 pages of Official Copy).
Office Action received for Korean Patent Application No. 10-2010-7008899, dated Jan. 28, 2013, 5 pages (2 pages of English Translation and 3 pages of Official Copy).
Office Action received for Korean Patent Application No. 10-2010-7008899, dated Jun. 12, 2015, 4 pages (2 pages of English Translation and 2 pages of Official Copy).

(56) References Cited

OTHER PUBLICATIONS

Office Action received for Korean Patent Application No. 10-2010-7008899, dated Mar. 29, 2012, 6 pages (2 pages of English Translation and 4 pages of Official Copy).
Office Action received for Korean Patent Application No. 10-2010-7008899, dated May 30, 2011, 4 pages (2 pages of English Translation and 2 pages of Official copy).
Decision from Intellectual Property Tribunal received for Korean Patent Application No. 10-2011-7023152, mailed on Feb. 17, 2015, 22 pages (7 pages of English Translation and 15 pages of Official Copy).
Office Action received for Korean Patent Application No. 10-2011-7023152, dated Apr. 22, 2014, 6 pages (3 pages of English Translation and 3 pages of Official copy).
Notice of Allowance received for Korean Patent Application No. 10-2014-7004771, dated Oct. 29, 2015, 3 pages (1 page of English Translation and 2 pages of Official Copy).
Office Action received for Korean Patent Application No. 10-2014-7004771, dated Jun. 12, 2015, 6 pages (3 pages English Translation and 3 pages of Official Copy).
Office Action received for Korean Patent Application No. 10-2014-7004771, dated Apr. 22, 2014, 5 pages (2 pages of English Translation and 3 pages of Official Copy).
Office Action received for Korean Patent Application No. 10-2014-7004771, dated Oct. 21, 2014, 7 pages (3 pages of English Translation and 4 pages of Official copy).
Notice of Allowance received for Korean Patent Application No. 10-2014-7004772, dated Feb. 12, 2016, 4 pages (1 page of English Translation and 3 pages of Official Copy).
Office Action received for Korean Patent Application No. 10-2014-7004772, dated Apr. 22, 2014, 8 pages (3 pages of English translation and 5 pages of Official Copy).
Office Action received for Korean Patent Application No. 10-2014-7004772, dated Oct. 21, 2014, 5 pages (2 pages of English Translation and 3 pages of official copy).
Notice of Allowance received for Korean Patent Application No. 10-2014-7004773, dated Jan. 7, 2016, 3 pages (1 page of English Translation and 2 pages of Official Copy).
Office Action received for Korean Patent Application No. 10-2014-7004773, dated Apr. 22, 2014, 9 pages (4 pages of English Translation and 5 pages of Official Copy).
Office Action received for Korean Patent Application No. 10-2014-7004773, dated Jun. 12, 2015, 6 pages (3 pages English Translation and 3 pages of Official Copy).
Office Action received for Korean Patent Application No. 10-2014-7004773, dated Oct. 21, 2014, 9 pages (4 pages of English Translation and 5 pages of Official Copy).
Notice of Allowance received for Korean Patent Application No. 10-2014-7025441, dated Feb. 26, 2016, 3 pages (1 page of English Translation and 2 pages of Official Copy).
Notice of Preliminary Rejection received for Korean Patent Application No. 10-2014-7025441, dated Jun. 12, 2015, 9 pages (4 pages of English Translation and 5 pages of Official Copy).
Office Action received for Korean Patent Application No. 10-2014-7025441, dated Oct. 21, 2014, 5 pages (2 pages of English Translation and 3 pages of official copy).
Notice of Allowance received for Korean Patent Application No. 10-2015-7004548, dated Feb. 26, 2016, 3 pages (1 page of English Translation and 2 pages of Official Copy).
Notice of Preliminary Rejection received for Korean Patent Application No. 10-2015-7004548, dated Jun. 12, 2015, 8 pages (4 pages of English Translation and 4 pages of Official Copy).
Notice of Preliminary Rejection received from Korean Patent Application No. 10-2015-7010262, dated Jun. 12, 2015, 5 pages (2 pages of English Translation and 3 pages of Official Copy).
Office Action received for Taiwan Patent Application No. 103136545, dated Nov. 2, 2015, 39 pages (15 pages of English Translation and 24 pages of Official Copy).
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, Oct. 17, 2013, 17 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Supplemental Notice of Allowance received for U.S. Appl. No. 12/207,370, dated Aug. 8, 2013, 2 pages.
Advisory Action received for U.S. Appl. No. 12/207,374, dated Feb. 25, 2013, 3 pages.
Advisory Action received for U.S. Appl. No. 12/207,374, dated May 15, 2014, 3 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Non-Final Office Action received for U.S. Appl. No. 12/207,374, dated Apr. 15, 2011, 13 pages.
Non-Final Office Action received for U.S. Appl. No. 12/207,374, dated Jun. 7, 2013, Jun. 7, 2013, 26 pages.
Non-Final Office Action received for U.S. Appl. No. 12/207,374, dated May 24, 2012, 20 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Decision to Grant received for the European Patent Application No. 12181538.5, dated Jul. 2, 2015, 1 page.
Extended European Search Report received for European Patent Application No. 12181538.5, dated Oct. 23, 2012, 6 pages.
Intention to Grant received for European Patent Application No. 12181538.5, dated Feb. 20, 2015, 8 pages.
Office Action received for European Patent Application No. 12181538.5, dated Dec. 16, 2013, 4 pages.
Final Office Action received for U.S. Appl. No. 13/243,045, dated Aug. 5, 2015, 10 pages.
Non-Final Office Action received for U.S. Appl. No. 13/243,045, dated Mar. 17, 2015, 9 pages.
Non-Final Office Action received for U.S. Appl. No. 13/243,326, dated Feb. 14, 2013, Feb. 14, 2013, 13 pages.
Notice of Allowance received for U.S. Appl. No. 13/243,326, dated Sep. 23, 2013, Sep. 23, 2013, 11 pages.
Extended European Search Report (includes Partial European Search Report and European Search Opinion) received for European Patent Application No. 13171145.9, dated Feb. 5, 2014, 6 pages.
Notice of Allowance received for U.S. Appl. No. 14/142,657, dated Jan. 8, 2015, 5 pages.
Notice of Allowance received for U.S. Appl. No. 14/142,657, dated Jul. 23, 2015, 2 pages.
Notice of Allowance received for U.S. Appl. No. 14/142,657, dated Jun. 29, 2015, 7 pages.
Notice of Allowance received for U.S. Appl. No. 14/142,657, dated Sep. 10, 2014, 9 pages.
Notice of Allowance received for U.S. Appl. No. 14/142,661, dated Aug. 3, 2015, 10 pages.
Notice of Allowance received for U.S. Appl. No. 14/142,661, dated Sep. 28, 2015, 9 pages.
Notice of Allowance received for U.S. Appl. No. 14/142,661, dated Dec. 3, 2015, 2 pages.
Final Office Action received for U.S. Appl. No. 14/142,669, dated Jun. 12, 2015, 14 pages.
Non-Final Office Action received for U.S. Appl. No. 14/142,669, dated Oct. 28, 2015, 14 pages.
Non-Final Office Action received for U.S. Appl. No. 14/142,669, dated Sep. 12, 2014, 11 pages.

(56) References Cited

OTHER PUBLICATIONS

Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Advisory Action received for U.S. Appl. No. 14/311,214, dated Feb. 10, 2015, 4 pages.
Final Office Action received for U.S. Appl. No. 14/311,214, dated Jan. 8, 2015, 12 pages.
Final Office Action received for U.S. Appl. No. 14/311,214, dated Sep. 24, 2015, 15 pages.
Non-Final Office Action received for U.S. Appl. No. 14/311,214, dated Apr. 10, 2015, 12 pages.
Non-Final Office Action received for U.S. Appl. No. 14/311,214, dated Sep. 18, 2014, 10 pages.
Notice of Allowance received for U.S. Appl. No. 14/311,214, dated Jan. 21, 2016, 7 pages.
Final Office Action received for U.S. Appl. No. 14/479,088, dated Mar. 11, 2015, 10 pages.
Non-Final Office Action received for U.S. Appl. No. 14/479,088, dated Jul. 6, 2015, 10 pages.
Non-Final Office Action received for U.S. Appl. No. 14/479,088, dated Nov. 18, 2014, 8 pages.
Notice of Allowance received for U.S. Appl. No. 14/479,088, dated Nov. 12, 2015, 7 pages.
Notice of Allowance received for U.S. Appl. No. 14/479,088, dated Mar. 9, 2016, 2 pages.
Notice of Allowance received for U.S. Appl. No. 14/479,088, dated Dec. 23, 2015, 5 pages.
Notice of Allowance received for U.S. Appl. No. 14/479,088, dated Jan. 11, 2016, 2 pages.
Notice of Allowance received for U.S. Appl. No. 14/661,796, dated Jul. 7, 2015, 10 pages.
Notice of Allowance received for U.S. Appl. No. 14/661,796, dated Jul. 23, 2015, 2 pages.
Notice of Allowance received for U.S. Appl. No. 14/873,023, dated Dec. 23, 2015, 10 pages.
Notice of Allowance received for U.S. Appl. No. 14/873,023, dated Jan. 14, 2016, 2 pages.
Notice of Allowance received for U.S. Appl. No. 15/357,873, dated Jan. 8, 2018, 9 pages.
Extended European Search Report (includes Partial European Search Report and European Search Opinion) received for European Patent Application No. 15168475.0, dated Oct. 21, 2015, 6 pages.
Notice of Acceptance received for Australian Patent Application No. 2008305338, dated Oct. 27, 2011, 1 page.
Office Action received for Australian Patent Application No. 2008305338, dated Mar. 21, 2011, 3 pages.
Office Action received for Australian Patent Application No. 2008305338, dated Oct. 19, 2010, 3 pages.
Notice of Allowance received for Chinese Patent Application No. 200880108306.1, dated Oct. 28, 2014, 2 pages (Official Copy only) {See Communication under 37 CFR § 1.98(a) (3)}.
Office Action received for Chinese Patent Application No. 200880108306.1, dated Aug. 24, 2011, 10 pages (English Translation only).
Office Action received for Chinese Patent Application No. 200880108306.1, dated Mar. 20, 2012, 8 pages (English Translation only).
Office Action received for Chinese Patent Application No. 200880108306.1, dated Mar. 27, 2014, 6 pages (3 pages of English Translation and 3 pages of Official Copy).
Office Action received for Japanese Patent Application No. 2010-525891, dated Jun. 12, 2012, 11 pages (5 pages of English Translation and 6 pages of Official Copy).
Office Action received for Australian Patent Application No. 2012200716, dated Jul. 16, 2014, 4 pages.
Examiner's Pre-Review Report received for Japanese Patent Application No. 2013-098406, dated Oct. 8, 2015, 7 pages (4 pages of English Translation and 3 pages of Official Copy).
Office Action received for Japanese Patent Application No. 2013-098406, dated Dec. 9, 2013, Dec. 9, 2013, 12 pages (6 pages of English Translation and 6 pages of Official Copy).
Office Action received for Japanese Patent Application No. 2013-098406, dated Dec. 15, 2014, 12 pages (7 pages of English Translation and 5 pages of Official Copy).
Office Action received from Japanese Patent Application No. 2013-098406, dated May 8, 2015, 14 pages (9 pages of English Translation and 5 pages of Official Copy).
Office Action received for Australian Patent Application No. 2014204462, dated May 8, 2015, 4 pages.
Examination Report received for Australian Patent Application No. 2015202397, dated Feb. 29, 2016, 4 pages.
Adrianisen, "Samsung Galaxy S8 Face Recognition—Register Your Face Review!", Available online at: https://www.youtube.com/watch?v=04KVPaCJq94, Apr. 27, 2017, 1 page.
CV Meerkat, "Extracting Face Orientation in Real-time", Available online at: https://www.youtube.com/watch?v=Ugwfnjx6UYw, Jul. 22, 2016, 3 pages.
Drareni Jamil, "Face Tracking and Head Pose Estimation with Open CV", Available online at: https://www.youtube.com/watch?v=Etj_aktbnwM, Jun. 9, 2013, 3 pages.
IDEX, "IDEX Fingerprint Sensor Mobile Glass Display", Youtube, available at: https://www.youtube.com/watch?v=X1dAIP5sFzw, Apr. 11, 2013, 2 pages.
IPHONEBLOG, "i0S 5.0.1 Security Flaw—Bypass the Passcode—Access Camera Roll", Youtube, available at: https://www.youtube.com/watch?v=qd0Fwgaymb0, Feb. 24, 2012, 2 pages.
Komachi, Aneem, "Time Attendance—Face Recognition—Biometrics", Available at: https://www.youtube.com/watch?v=asclTiiiSbc, Feb. 9, 2010, 1 page.
NAVER BLOG, "How to Use Smart Wallet and Registered Card", Online Available at: http://feena74.blog.me/140185758401, Mar. 29, 2013, 20 pages.
Okazolab, "Kinect Based 3D Head Tracking in Behavioural Research", Available online at: https://www.youtube.com/watch?v=nigRvT9beQw, Aug. 8, 2012, 3 pages.
ONEFACEIN, "[How It Works] Securing Your Smartphone with OneFaceIn", Biometric Password Manager, Available at: https://www.youtube.com/watch?v=h-JG5SPxBQ0, Dec. 2, 2016, 1 page.
International Preliminary Report on Patentability received for PCT Patent Application No. PCT/US2008/075738, completed on Jan. 28, 2010, 15 pages.
International Search Report and Written Opinion received for PCT Patent Application No. PCT/US2008/075738, dated Jul. 2, 2009, 14 pages.
International Search Report and Written Opinion received for PCT Patent Application No. PCT/US2014/054800, dated Jan. 29, 2015, 33 pages.
PHONE4U, "iPhone 4S Tips 'N' Tricks: Access the Camera from the Lock Screen—Phones 4u", Online Available at: https://www.youtube.com/watch?v=C8eDN4Vu2mg, Dec. 9, 2011, 2 pages.
Phonebuff, "How to Use Face Unlock on Android 4.0 ICS", Online Available at: https://www.youtube.com/watch?v=0ASf6jkpFKE, Dec. 15, 2011, 1 page.
Plaisant et al., "Touchscreen Toggle Switches: Push or slide? Design Issues and Usability Study", Technical Report CAR-TR-521, CS-TR-2557, Nov. 1990, pp. 1-10.
Riley et al., "Instruction, Feedback and Biometrics: The User Interface for Fingerprint Authentication System", Interact 2009, Part II, LNCS 5727, IFPI International Federation for Information Processing, 2009, pp. 293-305.
Schofield Tim, "Face Unlock Demonstration on the HTC EVO 4G LTE", Available at: https://www.youtube.com/watch?v=TNL9Or_9SWg, May 31, 2012, 1 page.
Sensory Trulysecure, "AppLock Face/Voice Recognition", Available at: https://www.youtube.com/watch?v=odax5O51aT0, May 27, 2015, 1 page.

(56) References Cited

OTHER PUBLICATIONS

Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, 16 pages (Official Copy only) {See Communication under 37 CFR § 1.98(a) (3)}.
Thanakulmas Thanit, "MasterCard Identity Check Facial Recognition Biometrics", Available at: https://www.youtube.com/watch?v=g4sMbrkt1gl, Oct. 10, 2016, 1 page.
Videoreborn, "Motorola Atrix 4g: Wet Fingerprint Scanner Better Than iPhone 5S Finger Print Scanner!", Online Available at: https://www.youtube.com/watch?v=MSJIIG93MPg, Mar. 16, 2011, 2 pages.
Extended European Search Report received for European Patent Application No. 19160348.9, dated Jul. 19, 2019, 6 pages.
Office Action received for Korean Patent Application No. 10-2019-7004734, dated Jul. 4, 2019, 7 pages (2 pages of English Translation and 5 pages of Official Copy).
Office Action received for Korean Patent Application No. 10-2019-7005925, dated Jul. 4, 2019, 24 pages (11 pages of English Translation and 13 pages of Official Copy).
European Search Report received for European Patent Application No. 17865509.8, dated Oct. 2, 2019, 5 pages.
Extended European Search Report received for European Patent Application No. 19186538.5, dated Oct. 9, 2019, 10 pages.
"Giving Apple Pay a Try", The Consumer Credit Monthly, Kinzai Institute for Financial Affairs, Inc, vol. 33, No. 1, ISSN: 0288-8122, 2015, 7 pages (Official Copy only) (See Communication under 37 CFR § 1.98(a) (3)).
Notice of Allowance received for Chinese Patent Application No. 201710093861.2, dated Sep. 24, 2019, 4 pages (1 page of English Translation and 3 pages of Official Copy).
Notice of Allowance received for Japanese Patent Application No. 2017-562330, dated Sep. 20, 2019, 4 pages (1 page of English Translation and 3 pages of Official Copy).
Notice of Allowance received for Japanese Patent Application No. 2018-241505, dated Oct. 4, 2019, 4 pages (1 page of English Translation and 3 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2019-7003374, dated Oct. 4, 2019, 9 pages (2 pages of English Translation and 7 pages of Official Copy).
Notice of Allowance received for Taiwanese Patent Application No. 104117508, dated Sep. 18, 2019, 5 pages (2 pages of English Translation and 3 pages of Official Copy).
Office Action received for Chinese Patent Application No. 201510284896.5, dated Sep. 3, 2019, 9 pages (2 pages of English Translation and 7 pages of Official Copy).
Office Action received for European Patent Application No. 17865509.8, dated Oct. 10, 2019, 6 pages.
Office Action received for Japanese Patent Application No. 2019-096220, dated Sep. 9, 2019, 8 pages (4 pages of English Translation and 4 pages of Official Copy).
Office Action received for Korean Patent Application No. 10-2017-7034558, dated Sep. 25, 2019, 9 pages (4 pages of English Translation and 5 pages of Official Copy).
"QR code", Wikipedia, Sep. 28, 2011, pp. 1-9.
Search Report and Opinion received for Danish Patent Application No. PA201970127, dated Oct. 4, 2019, 9 pages.
Summons to Attend Oral Proceedings received for European Patent Application No. 16803996.4, dated Oct. 2, 2019, 16 pages.
How to Smartphone, "Samsung Galaxy S7-screen rotation on/off", Available Online at https://www.youtube.com/watch?v=np54sEEI11E, see video from 1:10 to 1:30., Dec. 12, 2016, 3 pages.
Office Action received for Korean Patent Application No. 10-2019-7003374, dated Jun. 10, 2019, 7 pages (2 pages of English Translation and 5 pages of official copy).
Office Action received for Korean Patent Application No. 10-2019-7003836, dated Jun. 14, 2019, 7 pages (2 pages of English Translation and 5 pages of Official Copy).

* cited by examiner

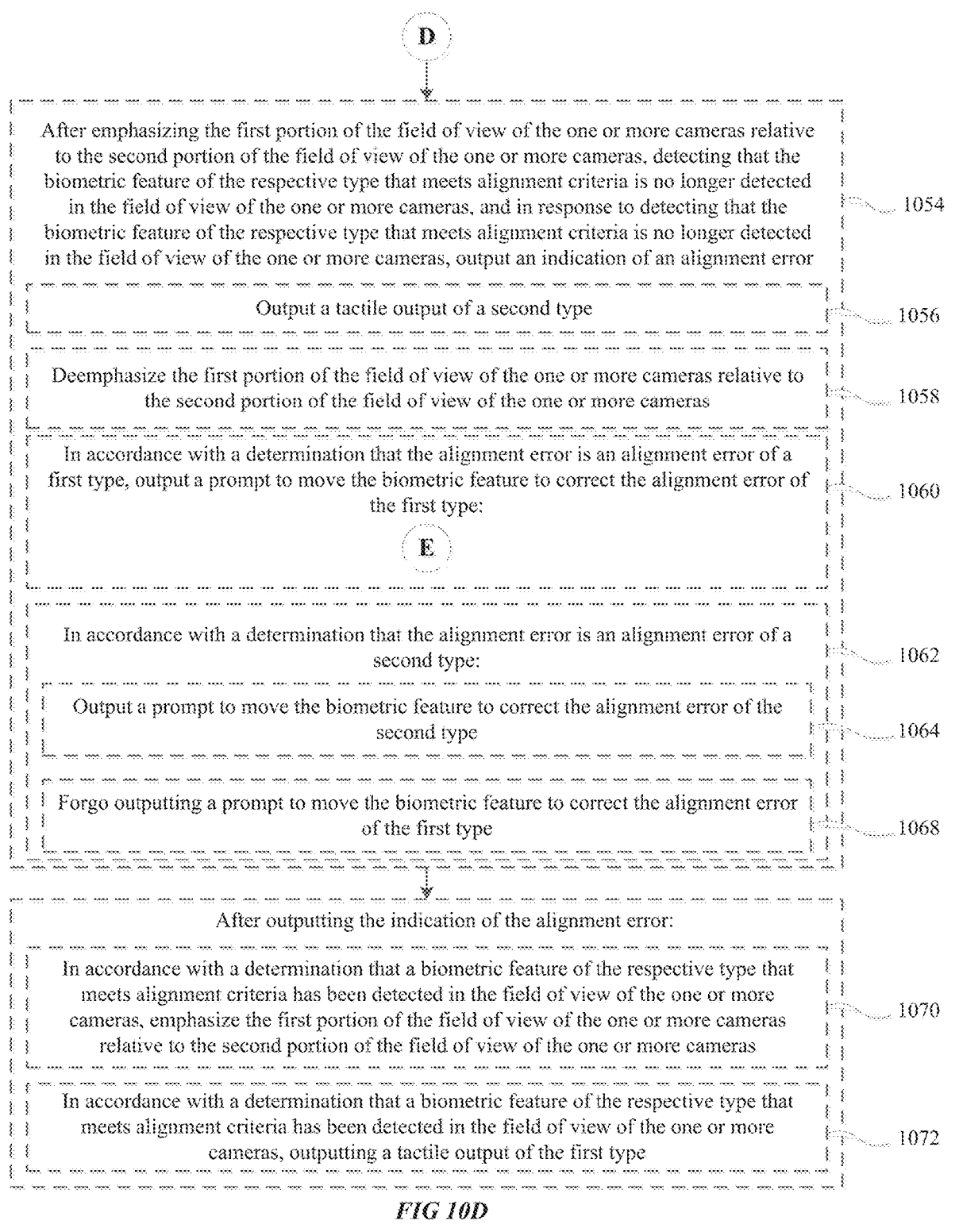

D

After emphasizing the first portion of the field of view of the one or more cameras relative to the second portion of the field of view of the one or more cameras, detecting that the biometric feature of the respective type that meets alignment criteria is no longer detected in the field of view of the one or more cameras, and in response to detecting that the biometric feature of the respective type that meets alignment criteria is no longer detected in the field of view of the one or more cameras, output an indication of an alignment error 1054

Output a tactile output of a second type 1056

Deemphasize the first portion of the field of view of the one or more cameras relative to the second portion of the field of view of the one or more cameras 1058

In accordance with a determination that the alignment error is an alignment error of a first type, output a prompt to move the biometric feature to correct the alignment error of the first type: 1060

E

In accordance with a determination that the alignment error is an alignment error of a second type: 1062

Output a prompt to move the biometric feature to correct the alignment error of the second type 1064

Forgo outputting a prompt to move the biometric feature to correct the alignment error of the first type 1068

After outputting the indication of the alignment error:

In accordance with a determination that a biometric feature of the respective type that meets alignment criteria has been detected in the field of view of the one or more cameras, emphasize the first portion of the field of view of the one or more cameras relative to the second portion of the field of view of the one or more cameras 1070

In accordance with a determination that a biometric feature of the respective type that meets alignment criteria has been detected in the field of view of the one or more cameras, outputting a tactile output of the first type 1072

*FIG 10D*

Figure 14B:
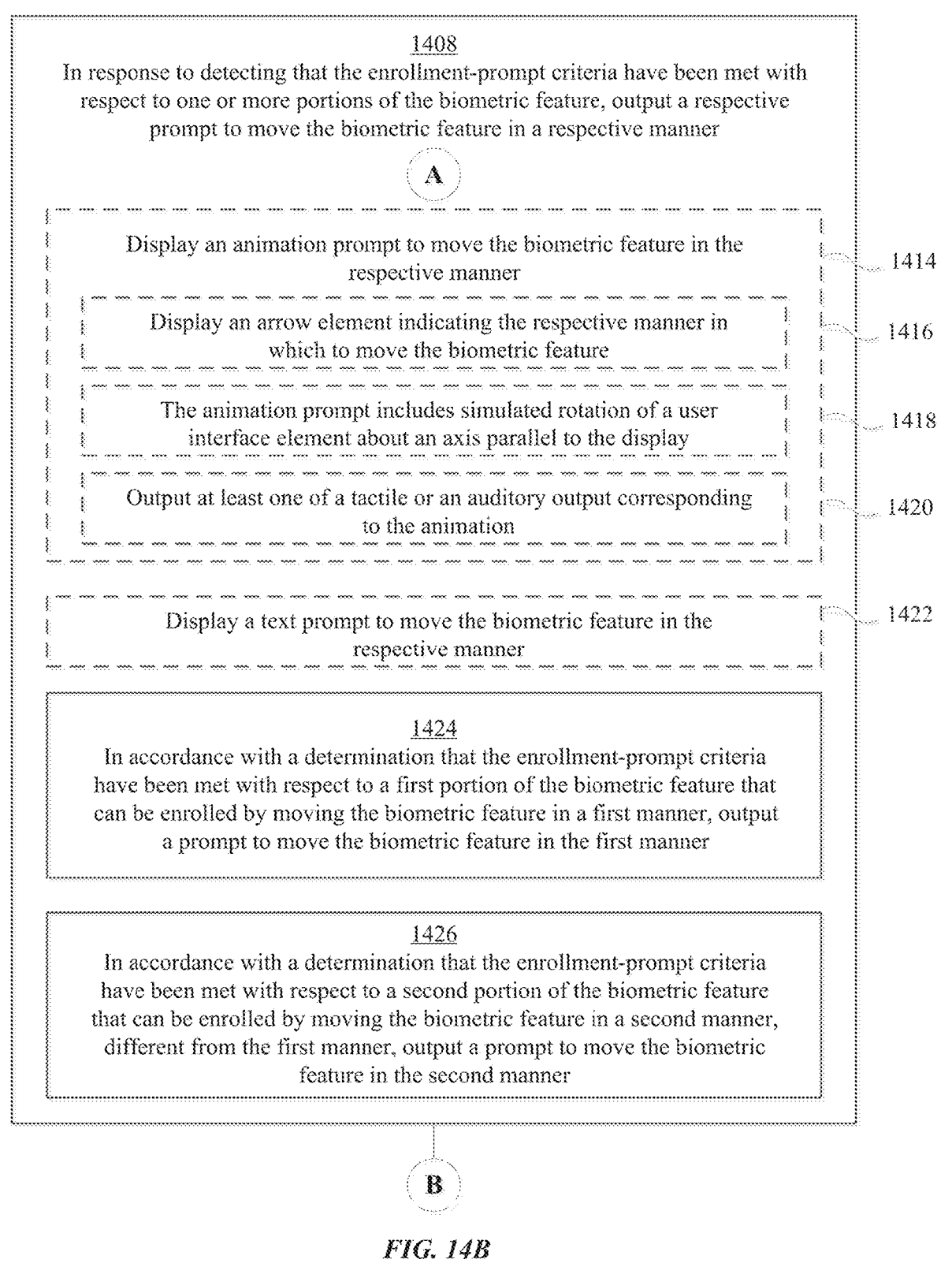

1408
In response to detecting that the enrollment-prompt criteria have been met with respect to one or more portions of the biometric feature, output a respective prompt to move the biometric feature in a respective manner

A

Display an animation prompt to move the biometric feature in the respective manner 1414

Display an arrow element indicating the respective manner in which to move the biometric feature 1416

The animation prompt includes simulated rotation of a user interface element about an axis parallel to the display 1418

Output at least one of a tactile or an auditory output corresponding to the animation 1420

Display a text prompt to move the biometric feature in the respective manner 1422

1424
In accordance with a determination that the enrollment-prompt criteria have been met with respect to a first portion of the biometric feature that can be enrolled by moving the biometric feature in a first manner, output a prompt to move the biometric feature in the first manner 1426
In accordance with a determination that the enrollment-prompt criteria have been met with respect to a second portion of the biometric feature that can be enrolled by moving the biometric feature in a second manner, different from the first manner, output a prompt to move the biometric feature in the second manner

Figure 14C:
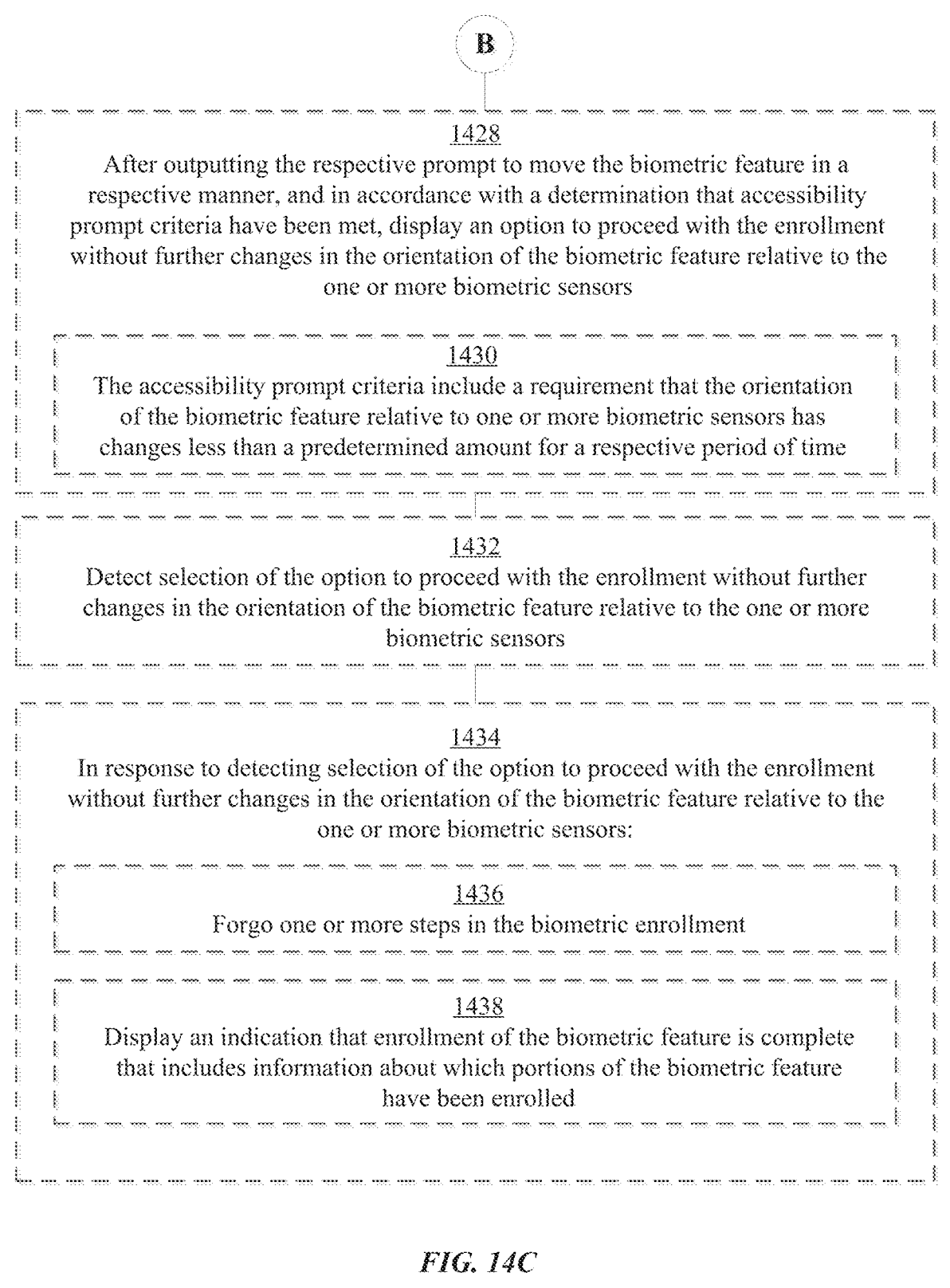

1428
After outputting the respective prompt to move the biometric feature in a respective manner, and in accordance with a determination that accessibility prompt criteria have been met, display an option to proceed with the enrollment without further changes in the orientation of the biometric feature relative to the one or more biometric sensors 1430
The accessibility prompt criteria include a requirement that the orientation of the biometric feature relative to one or more biometric sensors has changes less than a predetermined amount for a respective period of time 1432
Detect selection of the option to proceed with the enrollment without further changes in the orientation of the biometric feature relative to the one or more biometric sensors 1434
In response to detecting selection of the option to proceed with the enrollment without further changes in the orientation of the biometric feature relative to the one or more biometric sensors:

1436
Forgo one or more steps in the biometric enrollment

1438
Display an indication that enrollment of the biometric feature is complete that includes information about which portions of the biometric feature have been enrolled

Figure 16C:
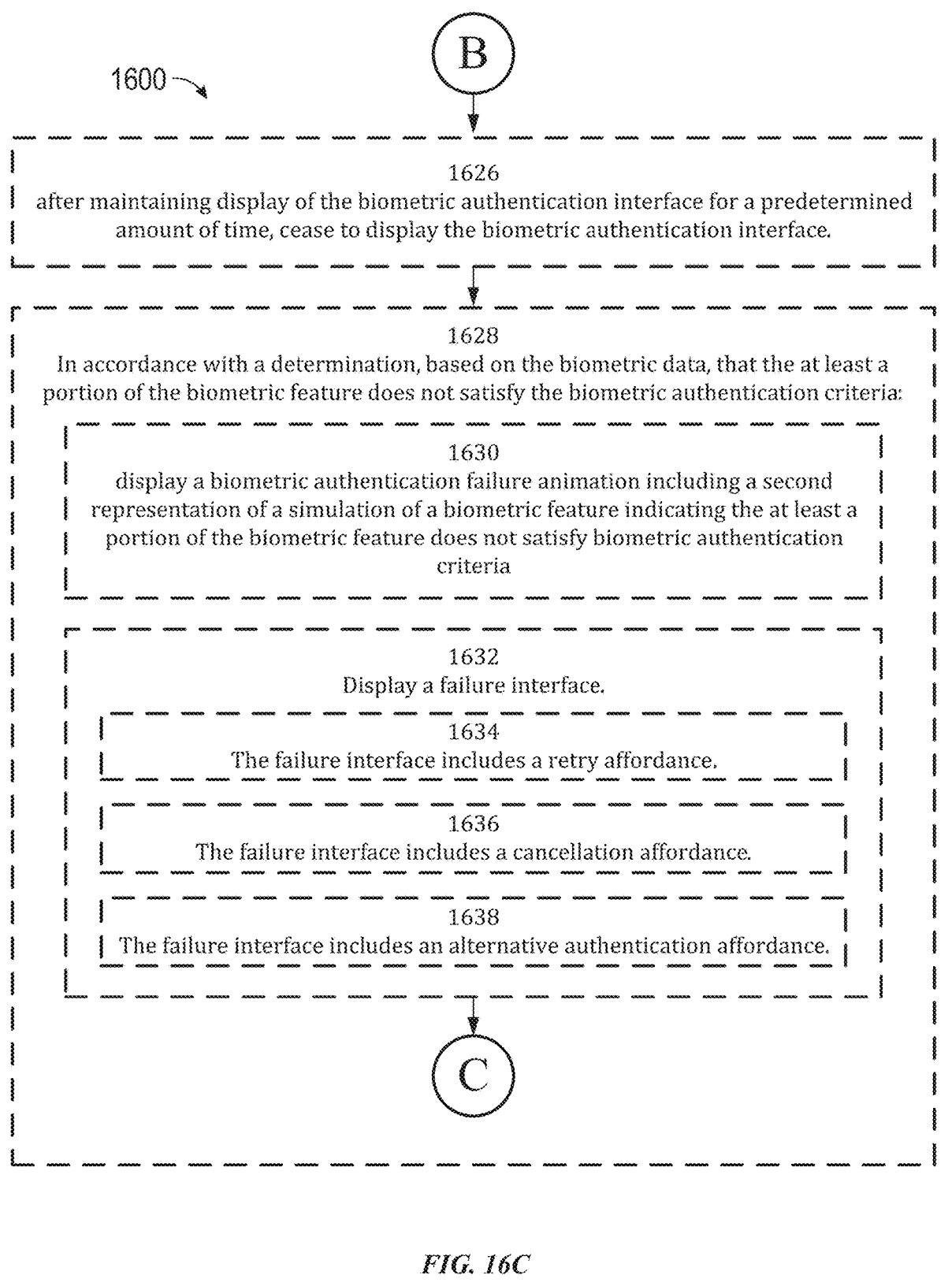

1626
after maintaining display of the biometric authentication interface for a predetermined amount of time, cease to display the biometric authentication interface.

1628
In accordance with a determination, based on the biometric data, that the at least a portion of the biometric feature does not satisfy the biometric authentication criteria:

1630
display a biometric authentication failure animation including a second representation of a simulation of a biometric feature indicating the at least a portion of the biometric feature does not satisfy biometric authentication criteria 1632
Display a failure interface.

1634
The failure interface includes a retry affordance.

1636
The failure interface includes a cancellation affordance.

1638
The failure interface includes an alternative authentication affordance.

Figure 16D:
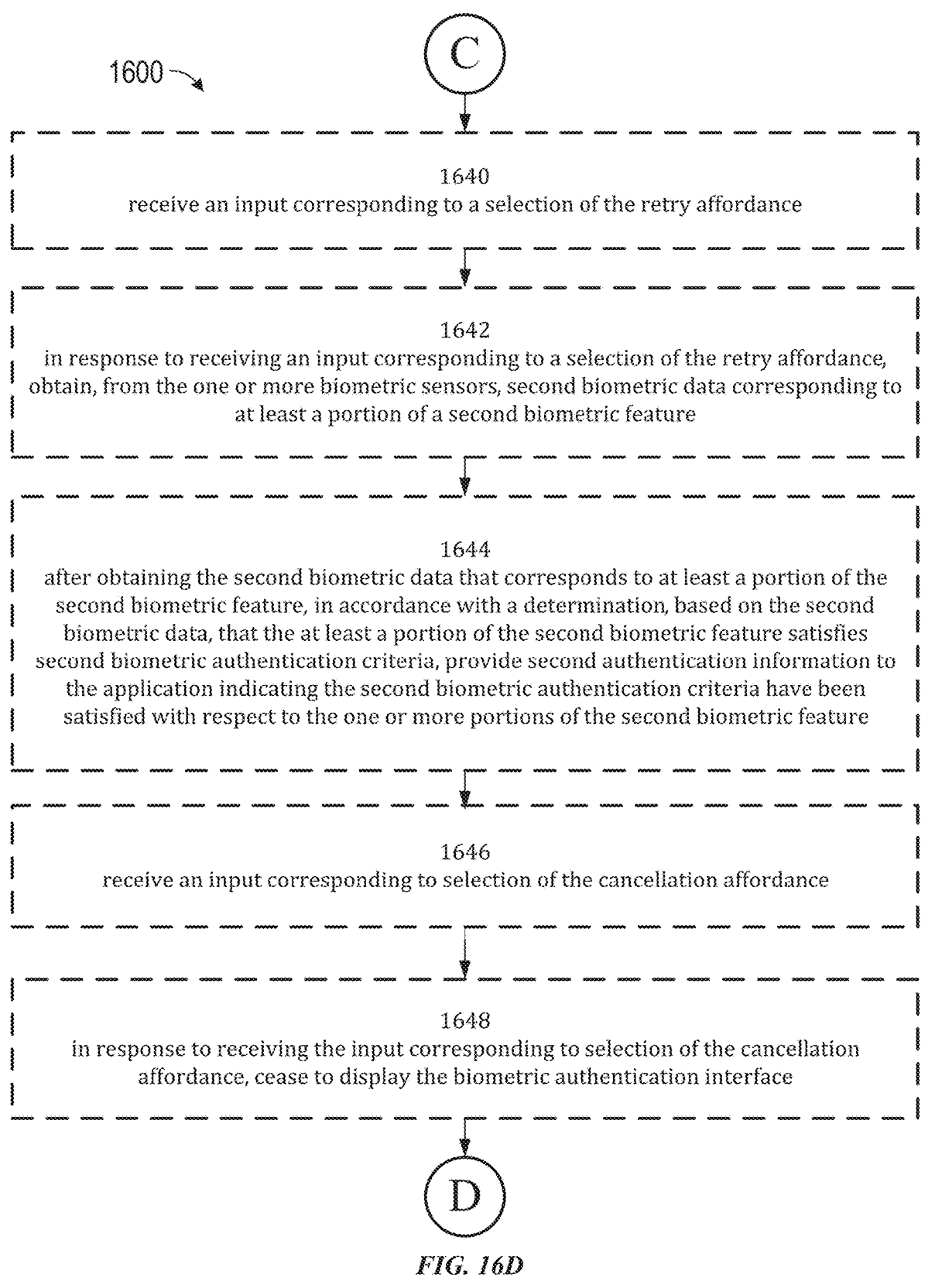

1640
receive an input corresponding to a selection of the retry affordance 1642
in response to receiving an input corresponding to a selection of the retry affordance, obtain, from the one or more biometric sensors, second biometric data corresponding to at least a portion of a second biometric feature 1644
after obtaining the second biometric data that corresponds to at least a portion of the second biometric feature, in accordance with a determination, based on the second biometric data, that the at least a portion of the second biometric feature satisfies second biometric authentication criteria, provide second authentication information to the application indicating the second biometric authentication criteria have been satisfied with respect to the one or more portions of the second biometric feature 1646
receive an input corresponding to selection of the cancellation affordance 1648
in response to receiving the input corresponding to selection of the cancellation affordance, cease to display the biometric authentication interface

Process 2000

Figure 20C:
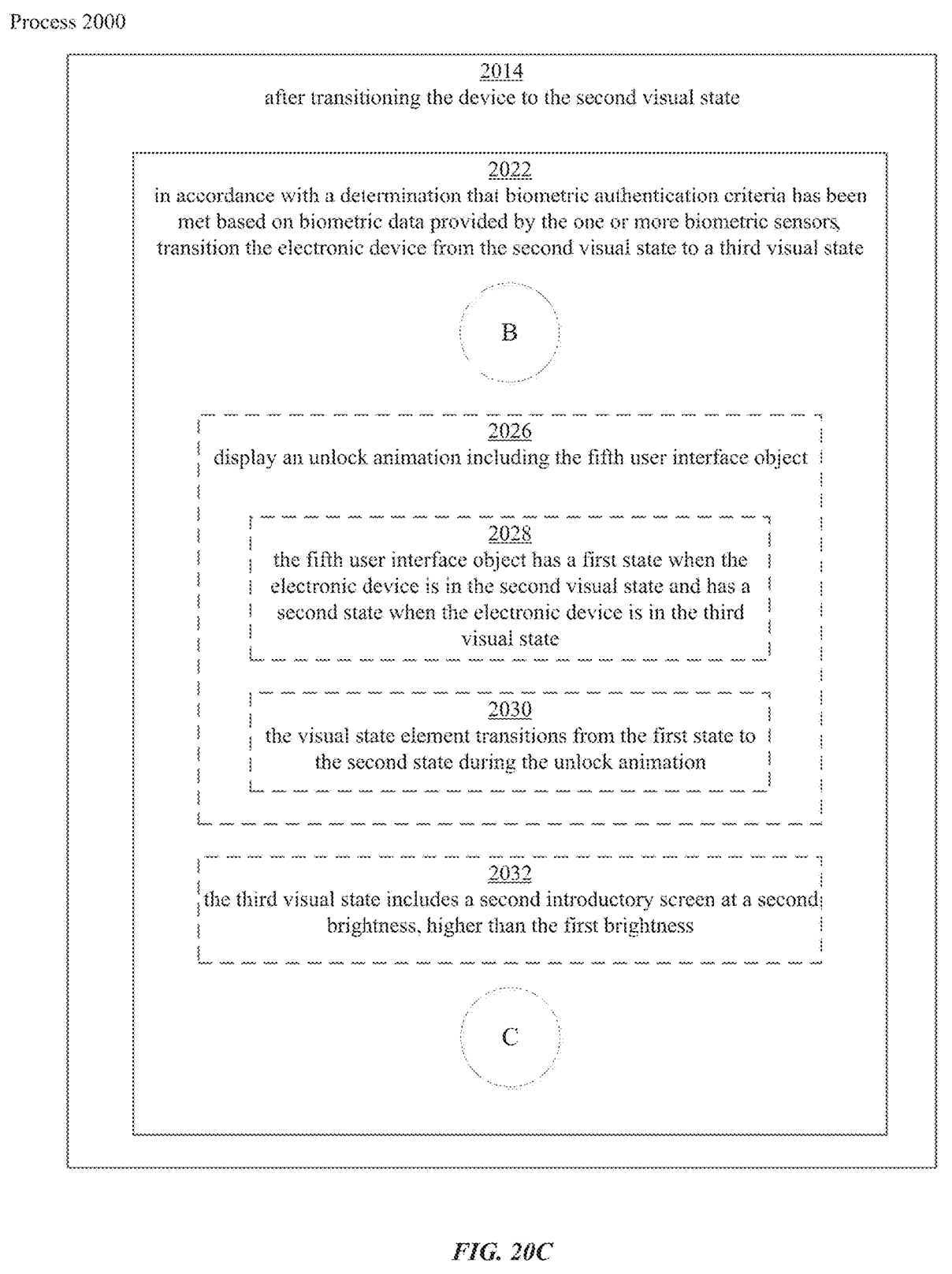

Process 2000

2014
after transitioning the device to the second visual state 2022
in accordance with a determination that biometric authentication criteria has been met based on biometric data provided by the one or more biometric sensors, transition the electronic device from the second visual state to a third visual state

B 2026
display an unlock animation including the fifth user interface object 2028
the fifth user interface object has a first state when the electronic device is in the second visual state and has a second state when the electronic device is in the third visual state 2030
the visual state element transitions from the first state to the second state during the unlock animation 2032
the third visual state includes a second introductory screen at a second brightness, higher than the first brightness

Process 2000

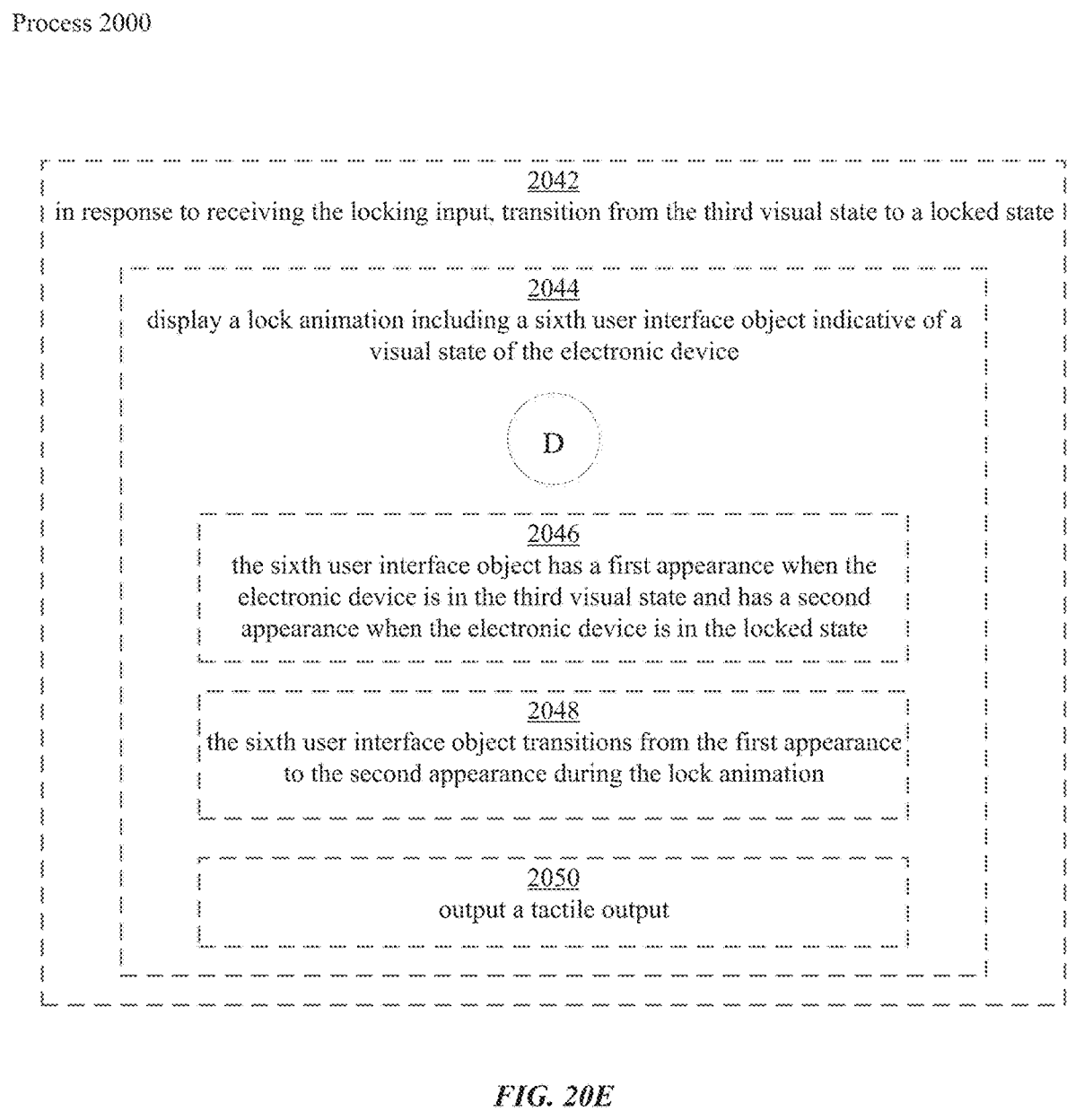

Process 2000

2042
in response to receiving the locking input, transition from the third visual state to a locked state 2044
display a lock animation including a sixth user interface object indicative of a visual state of the electronic device

D 2046
the sixth user interface object has a first appearance when the electronic device is in the third visual state and has a second appearance when the electronic device is in the locked state 2048
the sixth user interface object transitions from the first appearance to the second appearance during the lock animation 2050
output a tactile output

*FIG. 20E*

Process 2000

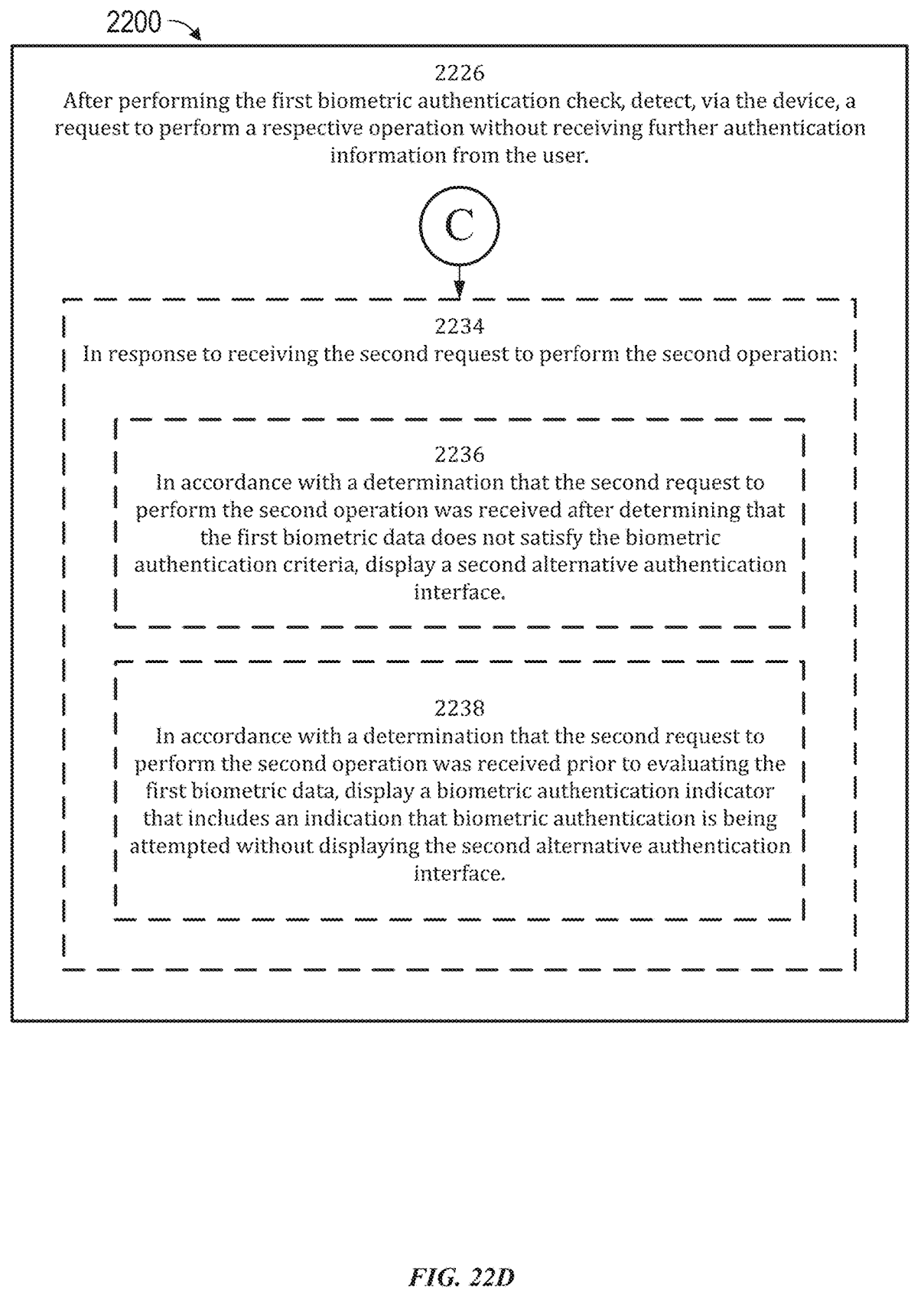

2200

2226
After performing the first biometric authentication check, detect, via the device, a request to perform a respective operation without receiving further authentication information from the user.

C

2234
In response to receiving the second request to perform the second operation:

2236
In accordance with a determination that the second request to perform the second operation was received after determining that the first biometric data does not satisfy the biometric authentication criteria, display a second alternative authentication interface.

2238
In accordance with a determination that the second request to perform the second operation was received prior to evaluating the first biometric data, display a biometric authentication indicator that includes an indication that biometric authentication is being attempted without displaying the second alternative authentication interface.

*FIG. 22D*

INTERSTITIAL LOCK SCREEN TO APPLICATION
NO FACE IN VIEW TO PASSCODE ENTRY

Process 2700

Process 2700

Process 2700

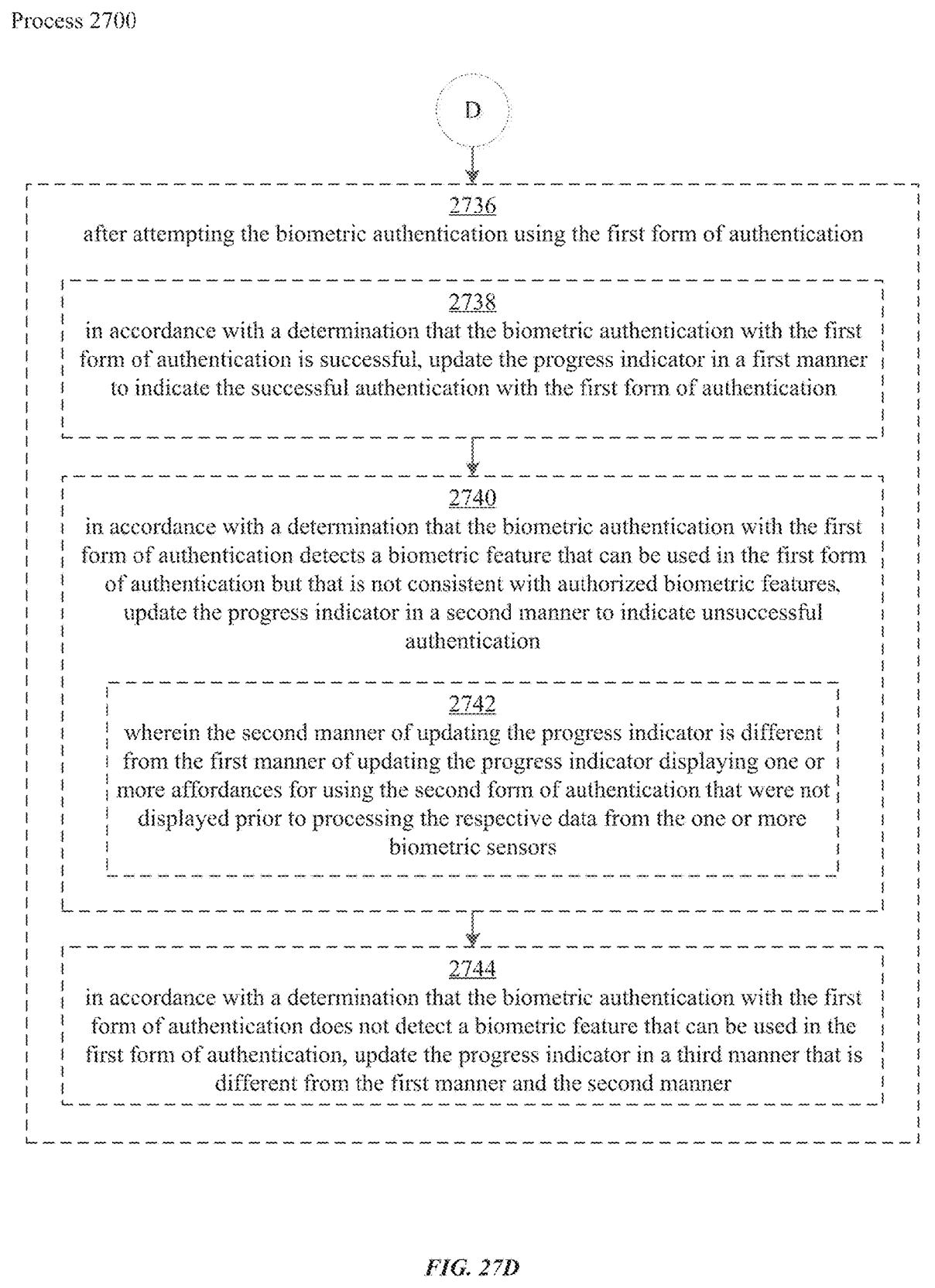

D 2736
after attempting the biometric authentication using the first form of authentication 2738
in accordance with a determination that the biometric authentication with the first form of authentication is successful, update the progress indicator in a first manner to indicate the successful authentication with the first form of authentication 2740
in accordance with a determination that the biometric authentication with the first form of authentication detects a biometric feature that can be used in the first form of authentication but that is not consistent with authorized biometric features, update the progress indicator in a second manner to indicate unsuccessful authentication 2742
wherein the second manner of updating the progress indicator is different from the first manner of updating the progress indicator displaying one or more affordances for using the second form of authentication that were not displayed prior to processing the respective data from the one or more biometric sensors 2744
in accordance with a determination that the biometric authentication with the first form of authentication does not detect a biometric feature that can be used in the first form of authentication, update the progress indicator in a third manner that is different from the first manner and the second manner

*FIG. 27D*

Figure 27E:
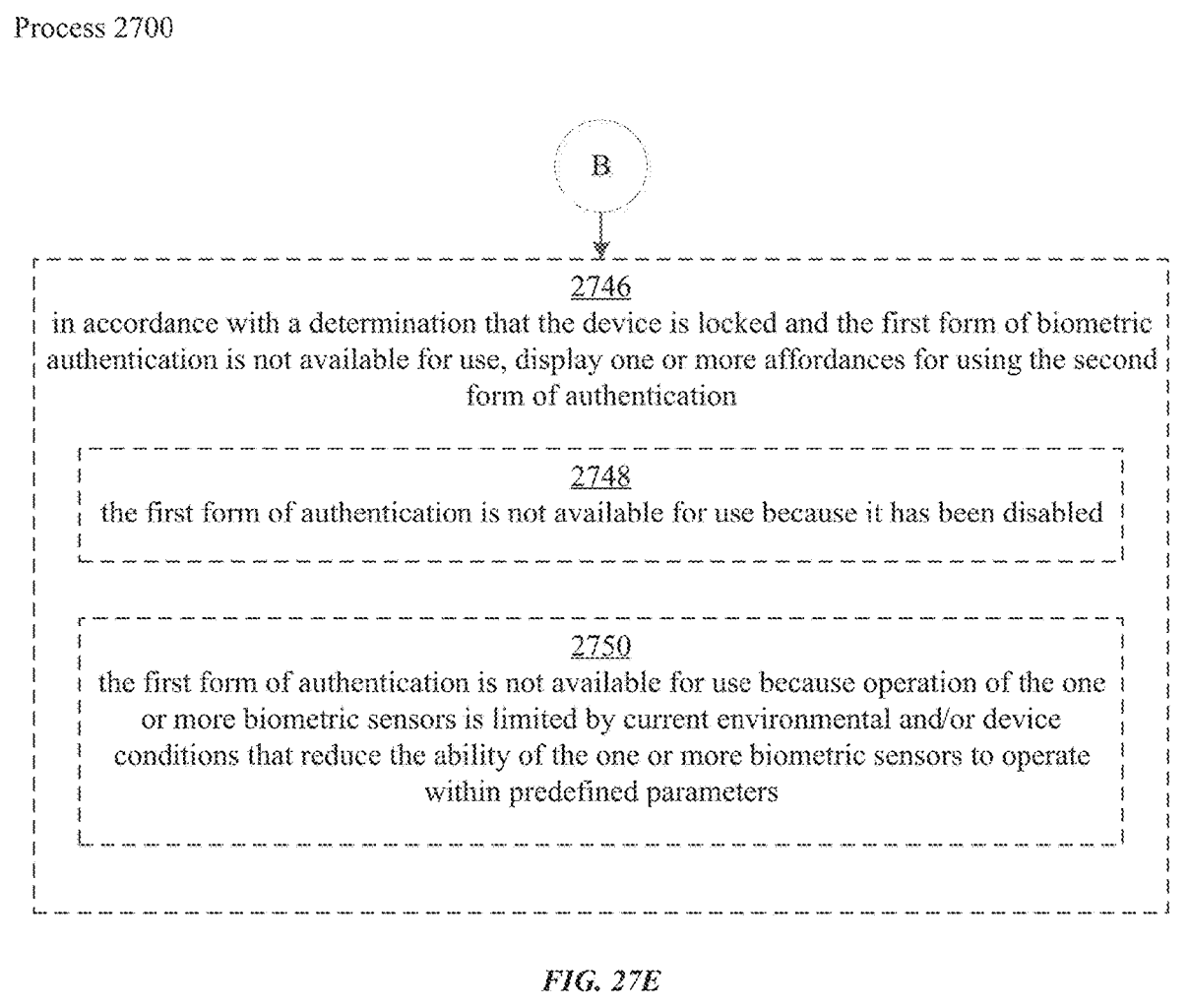

Process 2700

B 2746
in accordance with a determination that the device is locked and the first form of biometric authentication is not available for use, display one or more affordances for using the second form of authentication 2748
the first form of authentication is not available for use because it has been disabled 2750
the first form of authentication is not available for use because operation of the one or more biometric sensors is limited by current environmental and/or device conditions that reduce the ability of the one or more biometric sensors to operate within predefined parameters

*FIG. 28A*
2803
2800
2802
10:09
ONLINESTORE.COM
WELCOME
LOGIN
SHOP
NEW ARRIVALS
2804

*FIG. 28AA*
2803
2800
2802
10:09
ONLINESTORE.COM
WELCOME
BACK, JANE!
LOG OUT
SHOP
NEW ARRIVALS
2862

Figure 29B:
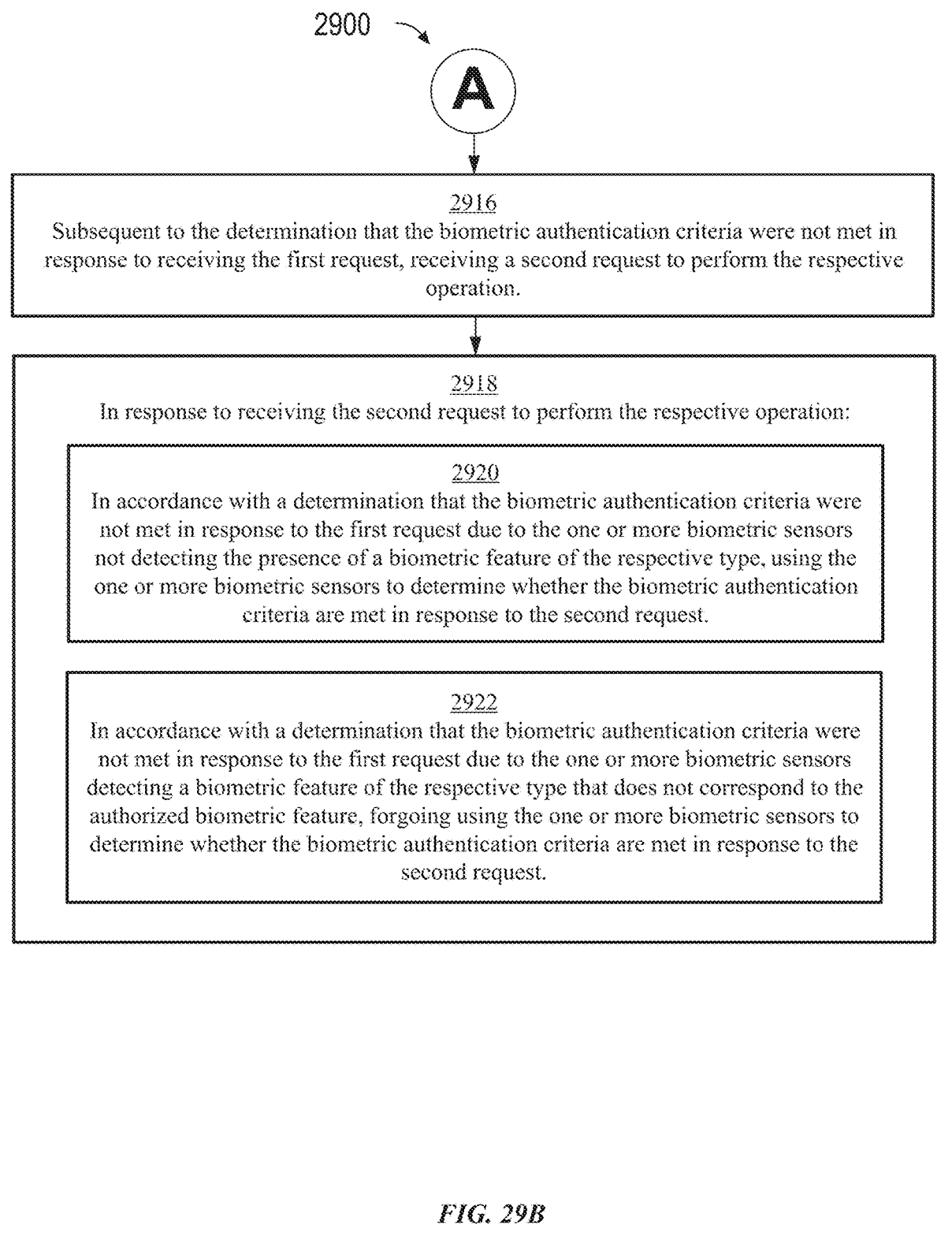

2916
Subsequent to the determination that the biometric authentication criteria were not met in response to receiving the first request, receiving a second request to perform the respective operation.

2918
In response to receiving the second request to perform the respective operation:

2920
In accordance with a determination that the biometric authentication criteria were not met in response to the first request due to the one or more biometric sensors not detecting the presence of a biometric feature of the respective type, using the one or more biometric sensors to determine whether the biometric authentication criteria are met in response to the second request.

2922
In accordance with a determination that the biometric authentication criteria were not met in response to the first request due to the one or more biometric sensors detecting a biometric feature of the respective type that does not correspond to the authorized biometric feature, forgoing using the one or more biometric sensors to determine whether the biometric authentication criteria are met in response to the second request.

*FIG. 30L*
3003
3000
3002
10:09
SHOP.ONLINE.COM
SHOP
JANE
LOGOUT
3048
NEW ARRIVALS
CLOTHES
SHOES
ACCESSORIES
PAST ORDERS
BLOG
USER PREFERENCES

*FIG. 30M*
3003
3000
3002
10:09
SHOP.ONLINE.COM
3050
SHOP
JANE
LOGOUT
3052
3048
NEW ARRIVALS
CLOTHES
SHOES
ACCESSORIES
PAST ORDERS
BLOG
USER PREFERENCES

*FIG. 30X*
3003
3000
3002
10:09
SHOP.ONLINE.COM
SHOP
USERNAME
PASSWORD
LOGIN
3038

Figure 31A:
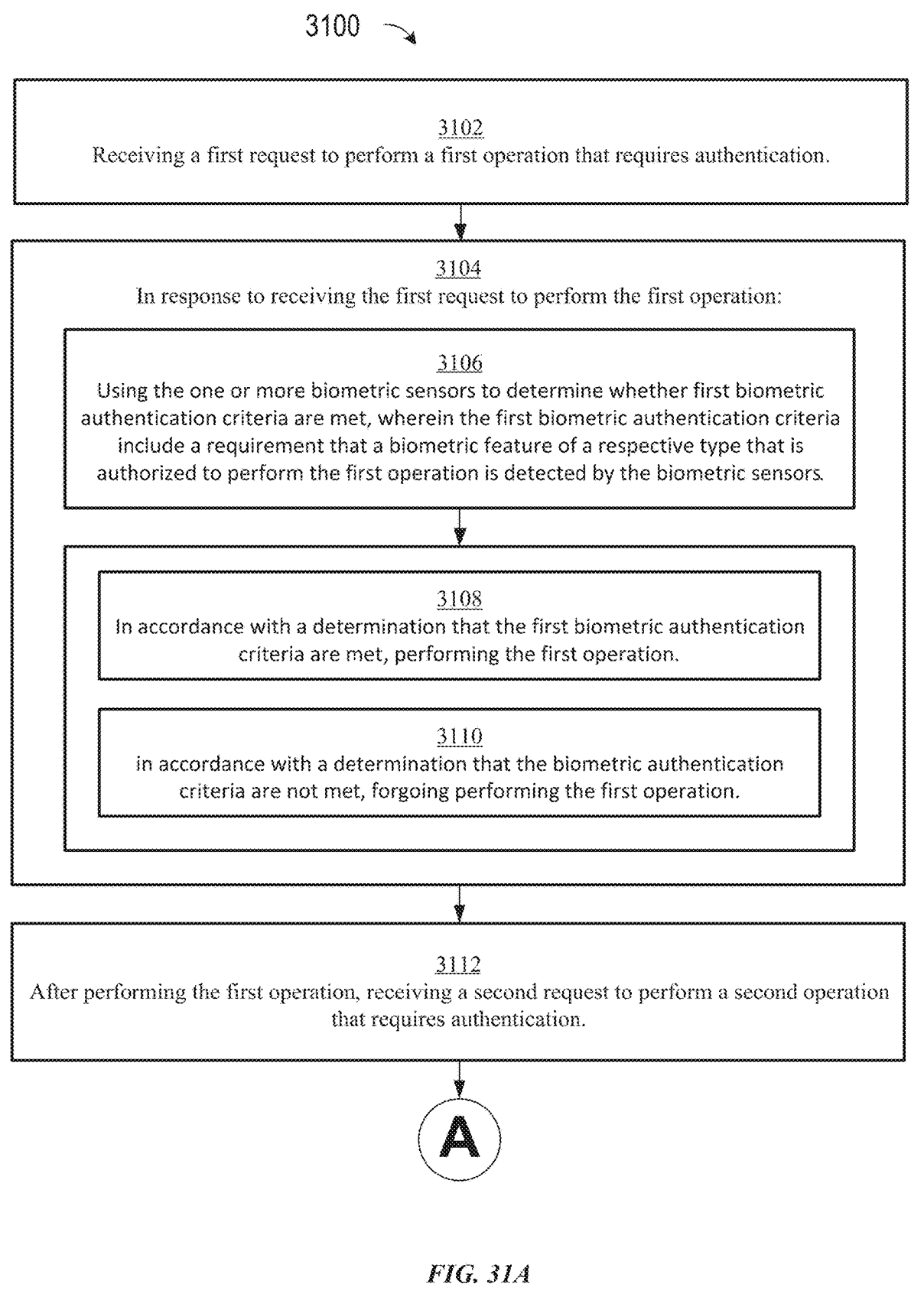

3102
Receiving a first request to perform a first operation that requires authentication.

3104
In response to receiving the first request to perform the first operation:

3106
Using the one or more biometric sensors to determine whether first biometric authentication criteria are met, wherein the first biometric authentication criteria include a requirement that a biometric feature of a respective type that is authorized to perform the first operation is detected by the biometric sensors.

3108
In accordance with a determination that the first biometric authentication criteria are met, performing the first operation.

3110
in accordance with a determination that the biometric authentication criteria are not met, forgoing performing the first operation.

3112
After performing the first operation, receiving a second request to perform a second operation that requires authentication.

*FIG. 34D*
3403
3400
3402
10:09
ONLINESTORE.COM
WELCOME
BACK, JANE!
LOG OUT
SHOP
NEW ARRIVALS
3416

*FIG. 34K*
3403
3400
3402
10:09
ONLINESTORE.COM
WELCOME
BACK, JANE!
LOG OUT
SHOP
NEW ARRIVALS
3416

Figure 37A:
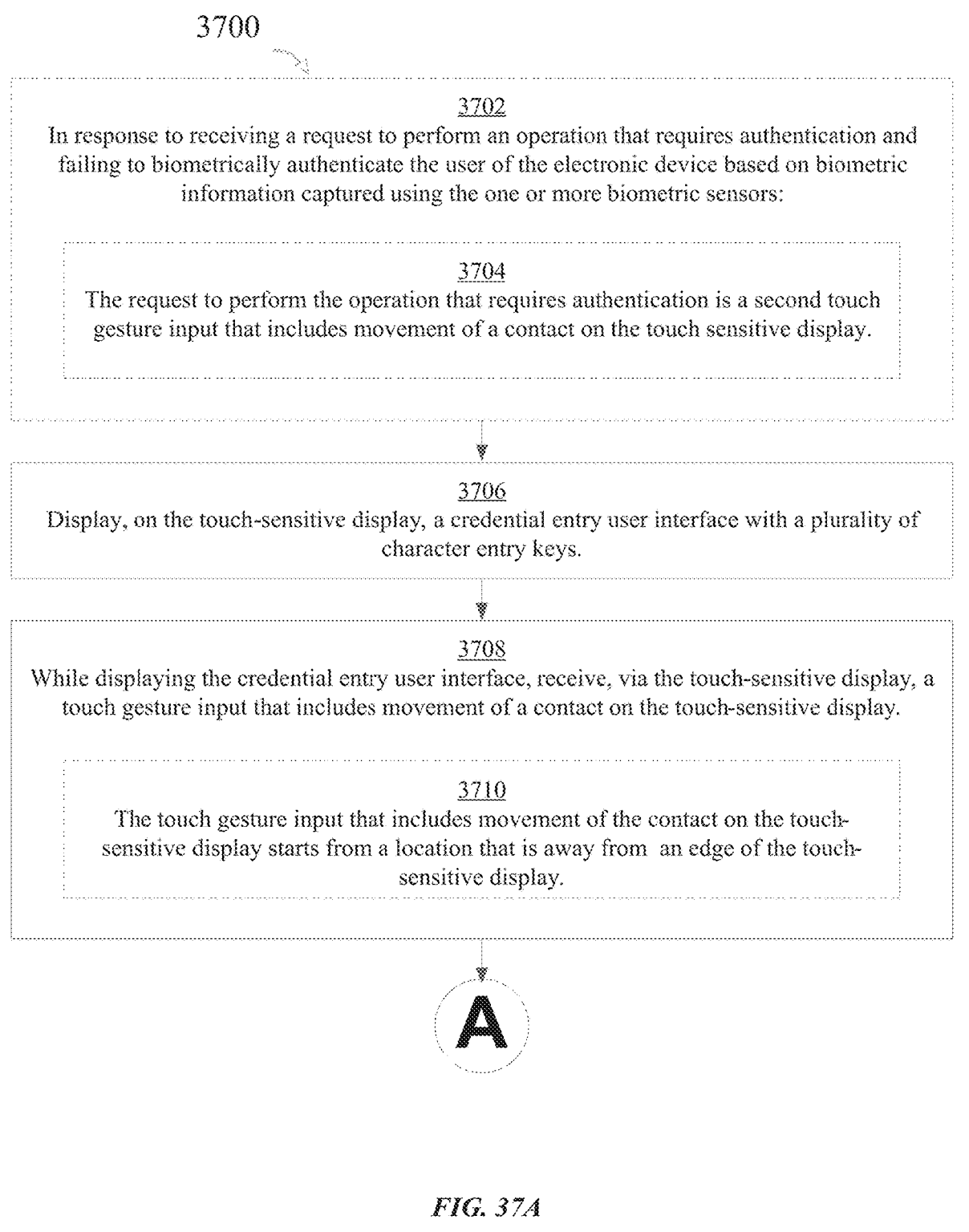

3702
In response to receiving a request to perform an operation that requires authentication and failing to biometrically authenticate the user of the electronic device based on biometric information captured using the one or more biometric sensors:

3704
The request to perform the operation that requires authentication is a second touch gesture input that includes movement of a contact on the touch sensitive display.

3706
Display, on the touch-sensitive display, a credential entry user interface with a plurality of character entry keys.

3708
While displaying the credential entry user interface, receive, via the touch-sensitive display, a touch gesture input that includes movement of a contact on the touch-sensitive display.

3710
The touch gesture input that includes movement of the contact on the touch-sensitive display starts from a location that is away from an edge of the touch-sensitive display.

Figure 37B:
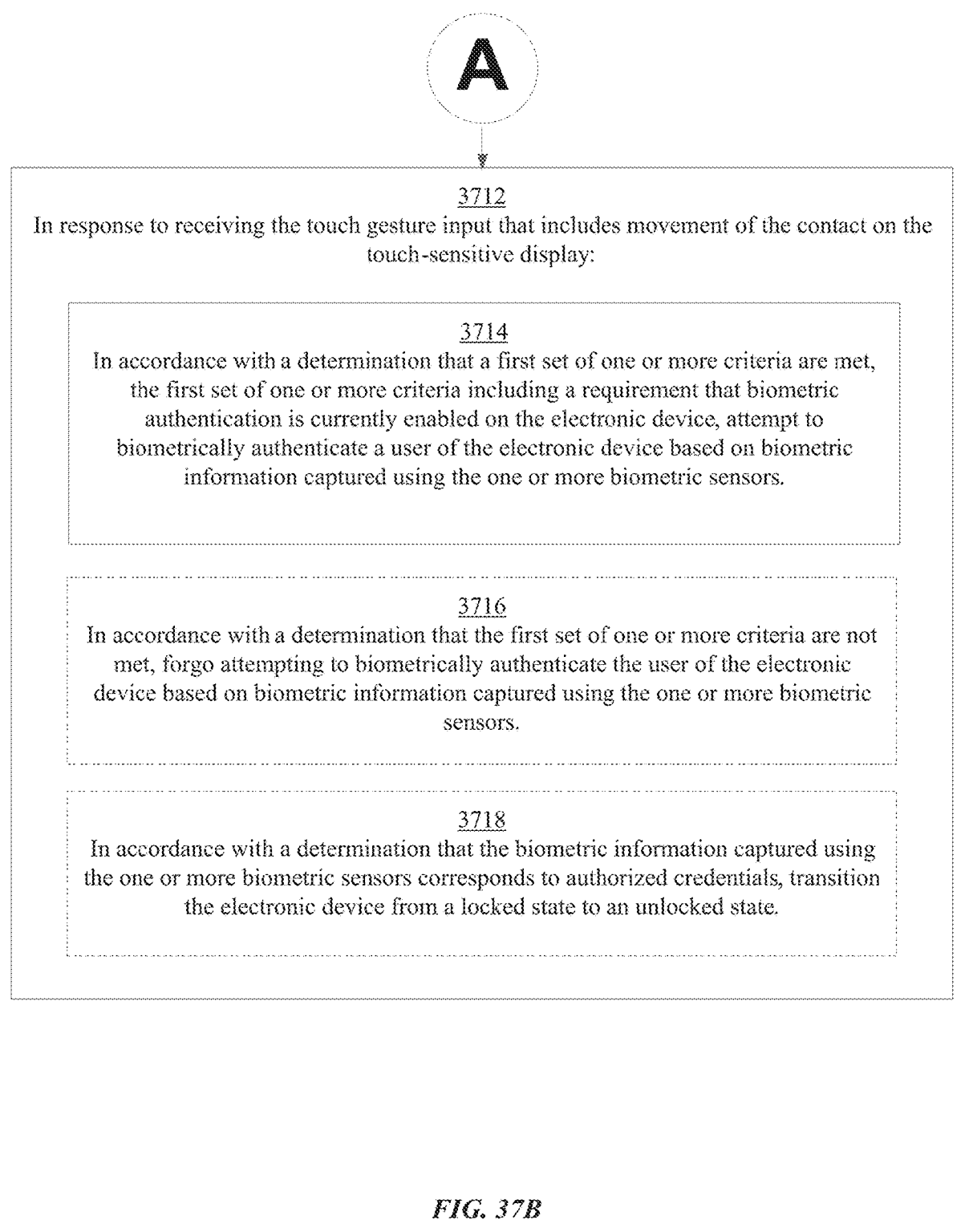

3712
In response to receiving the touch gesture input that includes movement of the contact on the touch-sensitive display:

3714
In accordance with a determination that a first set of one or more criteria are met, the first set of one or more criteria including a requirement that biometric authentication is currently enabled on the electronic device, attempt to biometrically authenticate a user of the electronic device based on biometric information captured using the one or more biometric sensors.

3716
In accordance with a determination that the first set of one or more criteria are not met, forgo attempting to biometrically authenticate the user of the electronic device based on biometric information captured using the one or more biometric sensors.

3718
In accordance with a determination that the biometric information captured using the one or more biometric sensors corresponds to authorized credentials, transition the electronic device from a locked state to an unlocked state.

*FIG. 38C*
3800
3802
3803
10:09
TUESDAY,AUGUST 1
3804
3808
MESSAGES
NOW
JOHN APPLESEED
MAX
3812
MIN

*FIG. 38D*
3800
3802
3803
10:09
TUESDAY,AUGUST 1
3804
3808
MESSAGES
NOW
JOHN APPLESEED
MAX
3812
MIN

*FIG. 38F*
3800
3802
3803
10:09
TUESDAY,AUGUST 1
3804
3808
MESSAGES
NOW
JOHN APPLESEED
MAX
3812
MIN

*FIG. 38G*
3800
3802
3803
3814A
MOVE CLOSER
10:09
3804
TUESDAY,AUGUST 1
3808
MESSAGES
NOW
JOHN APPLESEED
MAX
3812
MIN

*FIG. 38M*
3800
3802
3803
3804
10:09
TUESDAY,AUGUST 1
3808
MESSAGES
NOW
JOHN APPLESEED
MAX
3812
MIN

*FIG. 38Y*
3803
3800
3814D
3802
SENSOR COVERED
10:09
TUESDAY,AUGUST 1
3808
MESSAGES
NOW
JOHN APPLESEED

Figure 39A:
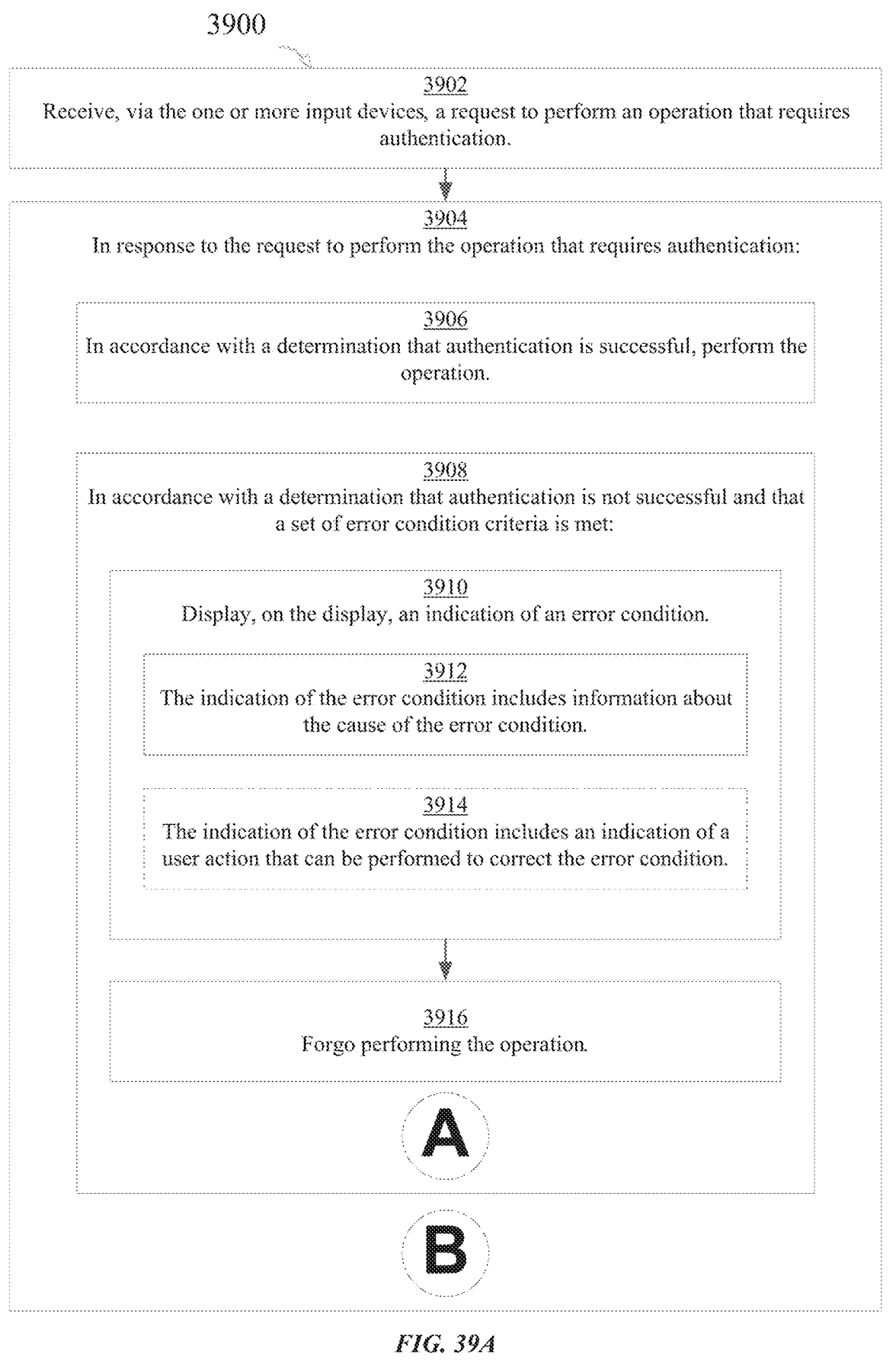

3902
Receive, via the one or more input devices, a request to perform an operation that requires authentication.

3904
In response to the request to perform the operation that requires authentication:

3906
In accordance with a determination that authentication is successful, perform the operation.

3908
In accordance with a determination that authentication is not successful and that a set of error condition criteria is met:

3910
Display, on the display, an indication of an error condition.

3912
The indication of the error condition includes information about the cause of the error condition.

3914
The indication of the error condition includes an indication of a user action that can be performed to correct the error condition.

3916
Forgo performing the operation.

Figure 39B:
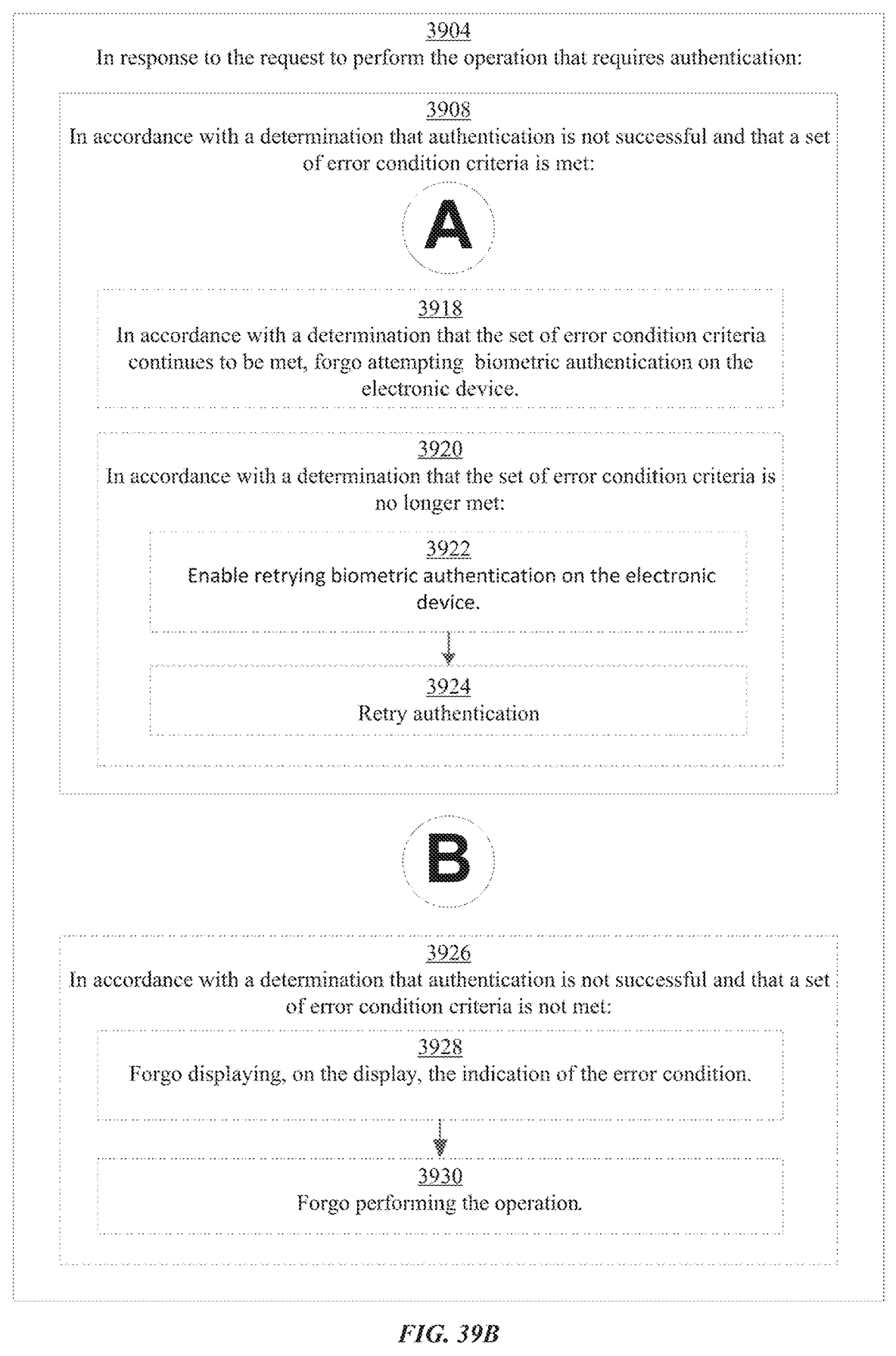

3904
In response to the request to perform the operation that requires authentication:

3908
In accordance with a determination that authentication is not successful and that a set of error condition criteria is met:

A

3918
In accordance with a determination that the set of error condition criteria continues to be met, forgo attempting biometric authentication on the electronic device.

3920
In accordance with a determination that the set of error condition criteria is no longer met:

3922
Enable retrying biometric authentication on the electronic device.

3924
Retry authentication

B

3926
In accordance with a determination that authentication is not successful and that a set of error condition criteria is not met:

3928
Forgo displaying, on the display, the indication of the error condition.

3930
Forgo performing the operation.

Figure 41A:
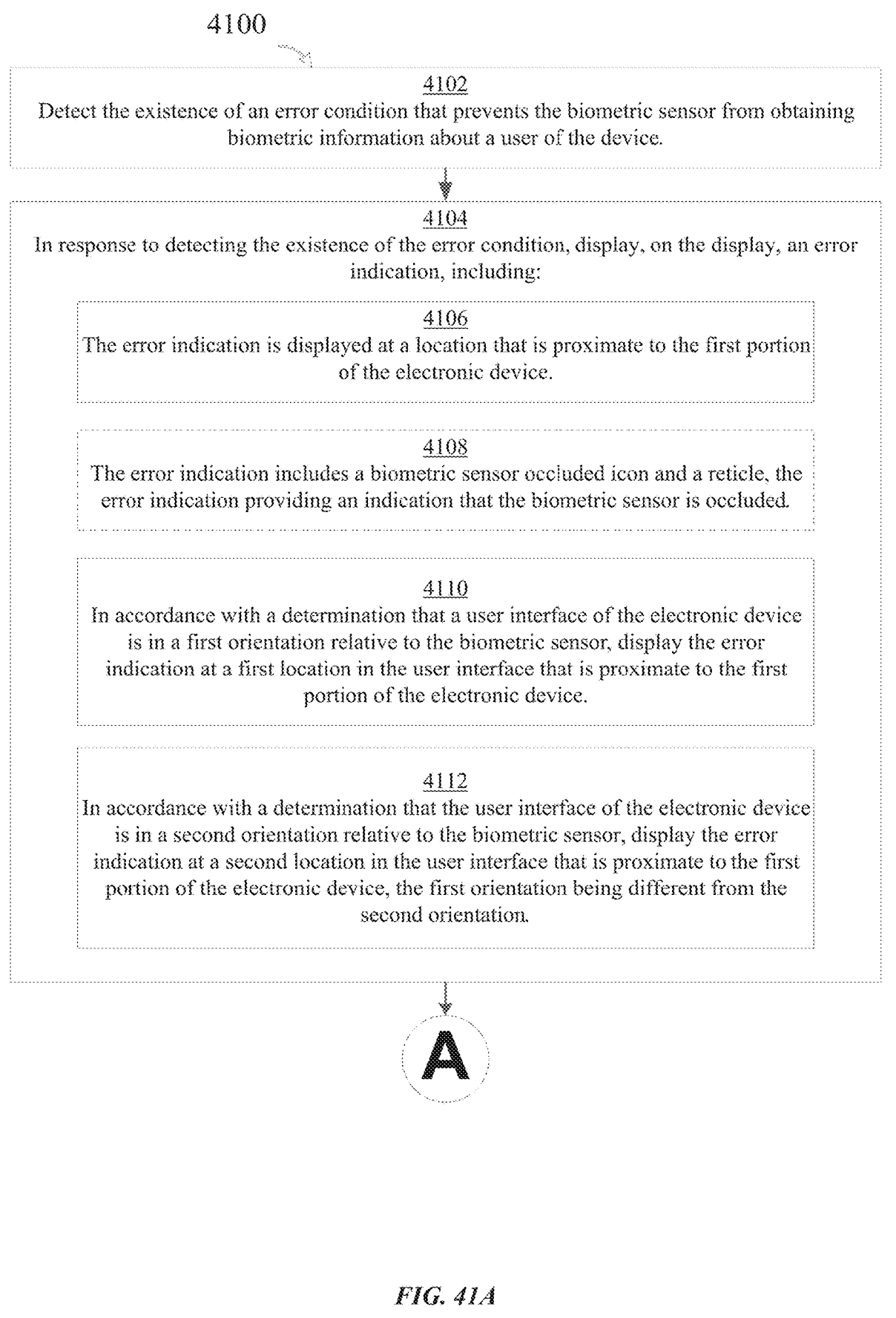

4102
Detect the existence of an error condition that prevents the biometric sensor from obtaining biometric information about a user of the device.

4104
In response to detecting the existence of the error condition, display, on the display, an error indication, including:

4106
The error indication is displayed at a location that is proximate to the first portion of the electronic device.

4108
The error indication includes a biometric sensor occluded icon and a reticle, the error indication providing an indication that the biometric sensor is occluded.

4110
In accordance with a determination that a user interface of the electronic device is in a first orientation relative to the biometric sensor, display the error indication at a first location in the user interface that is proximate to the first portion of the electronic device.

4112
In accordance with a determination that the user interface of the electronic device is in a second orientation relative to the biometric sensor, display the error indication at a second location in the user interface that is proximate to the first portion of the electronic device, the first orientation being different from the second orientation.

Figure 41B:
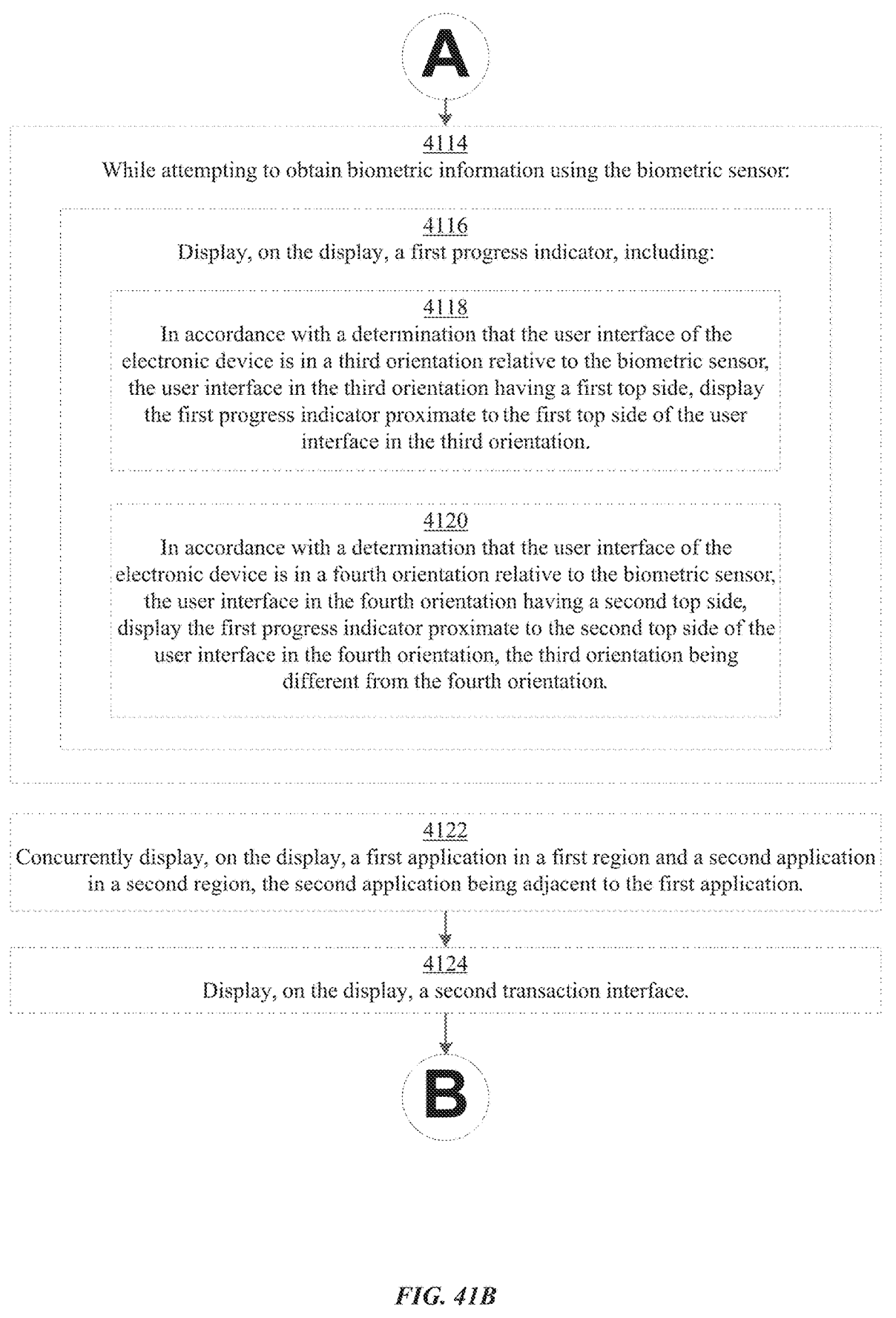

4114
While attempting to obtain biometric information using the biometric sensor:

4116
Display, on the display, a first progress indicator, including:

4118
In accordance with a determination that the user interface of the electronic device is in a third orientation relative to the biometric sensor, the user interface in the third orientation having a first top side, display the first progress indicator proximate to the first top side of the user interface in the third orientation.

4120
In accordance with a determination that the user interface of the electronic device is in a fourth orientation relative to the biometric sensor, the user interface in the fourth orientation having a second top side, display the first progress indicator proximate to the second top side of the user interface in the fourth orientation, the third orientation being different from the fourth orientation.

4122
Concurrently display, on the display, a first application in a first region and a second application in a second region, the second application being adjacent to the first application.

4124
Display, on the display, a second transaction interface.

Figure 41C:
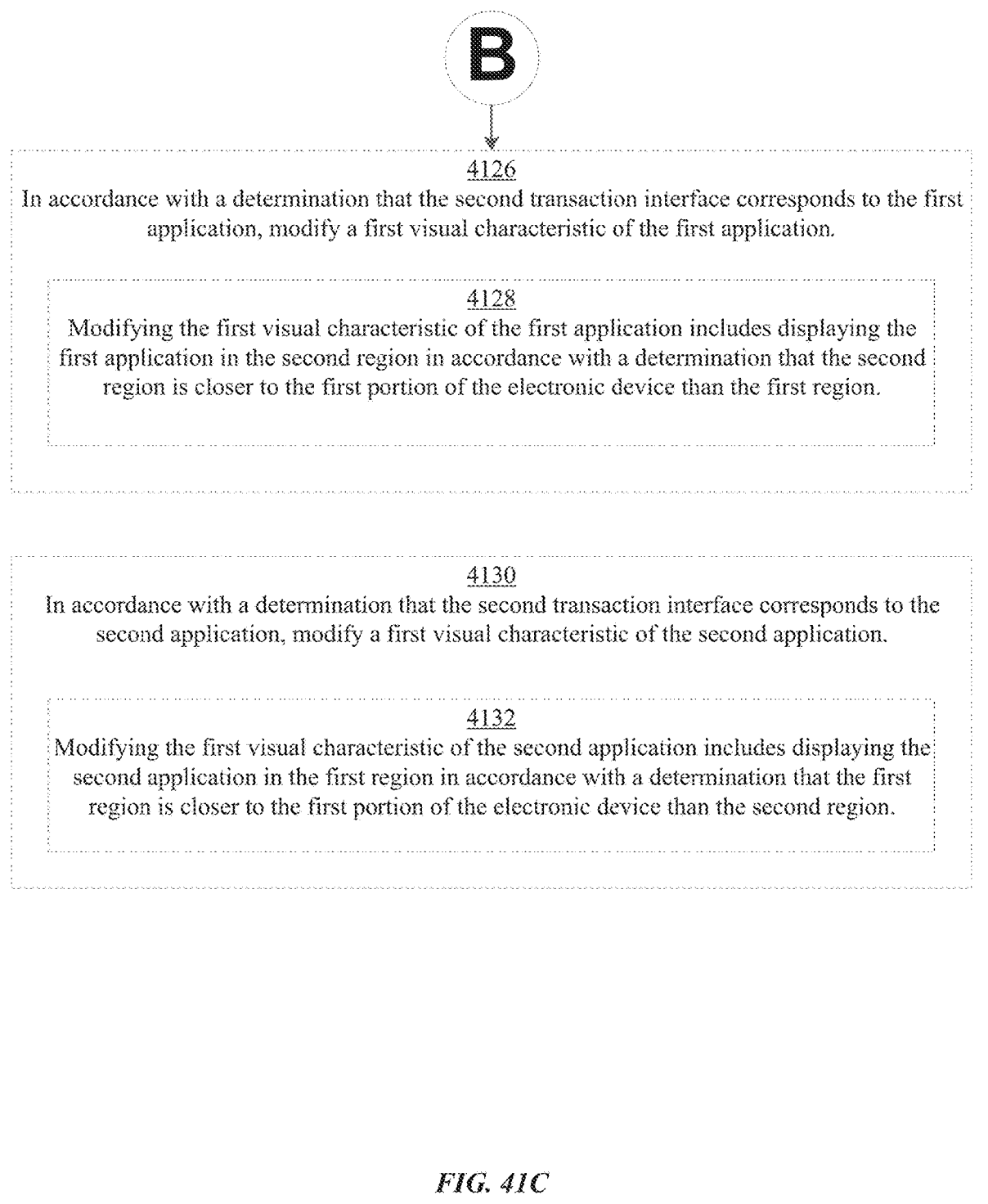

4126
In accordance with a determination that the second transaction interface corresponds to the first application, modify a first visual characteristic of the first application.

4128
Modifying the first visual characteristic of the first application includes displaying the first application in the second region in accordance with a determination that the second region is closer to the first portion of the electronic device than the first region.

4130
In accordance with a determination that the second transaction interface corresponds to the second application, modify a first visual characteristic of the second application.

4132
Modifying the first visual characteristic of the second application includes displaying the second application in the first region in accordance with a determination that the first region is closer to the first portion of the electronic device than the second region.

Figure 43A:
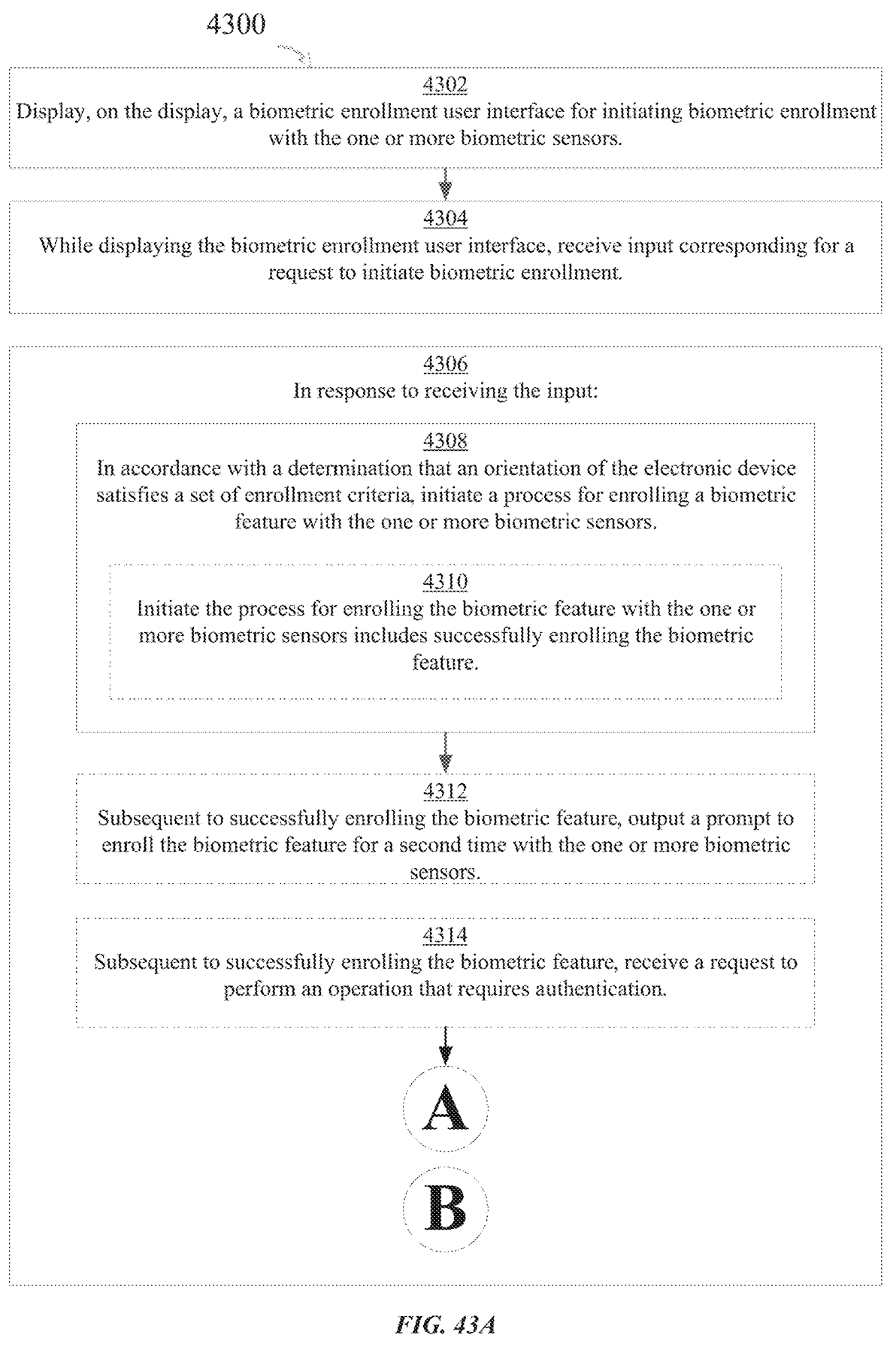

4302
Display, on the display, a biometric enrollment user interface for initiating biometric enrollment with the one or more biometric sensors.

4304
While displaying the biometric enrollment user interface, receive input corresponding for a request to initiate biometric enrollment.

4306
In response to receiving the input:

4308
In accordance with a determination that an orientation of the electronic device satisfies a set of enrollment criteria, initiate a process for enrolling a biometric feature with the one or more biometric sensors.

4310
Initiate the process for enrolling the biometric feature with the one or more biometric sensors includes successfully enrolling the biometric feature.

4312
Subsequent to successfully enrolling the biometric feature, output a prompt to enroll the biometric feature for a second time with the one or more biometric sensors.

4314
Subsequent to successfully enrolling the biometric feature, receive a request to perform an operation that requires authentication.

Figure 43B:
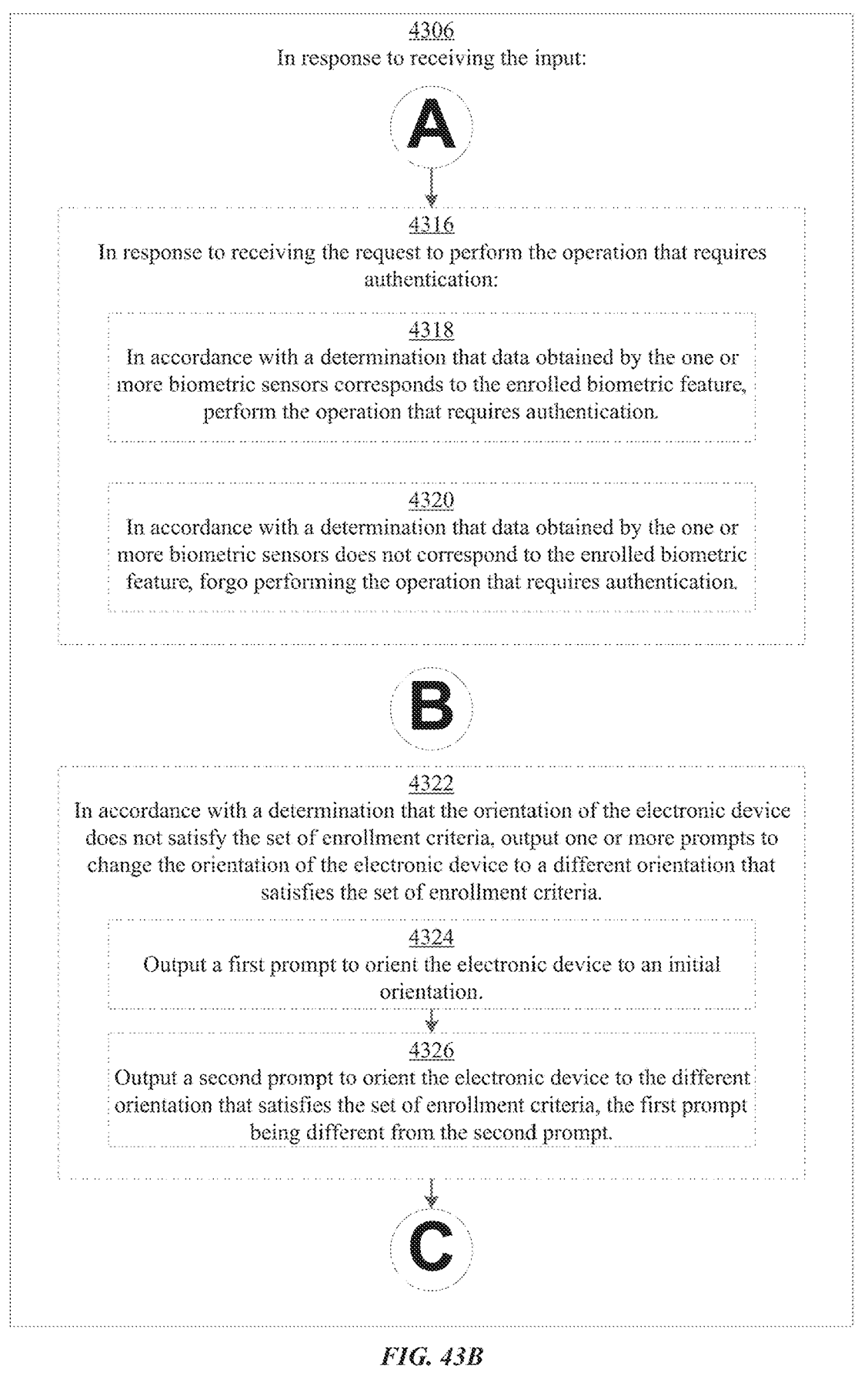

4306
In response to receiving the input:

A

4316
In response to receiving the request to perform the operation that requires authentication:

4318
In accordance with a determination that data obtained by the one or more biometric sensors corresponds to the enrolled biometric feature, perform the operation that requires authentication.

4320
In accordance with a determination that data obtained by the one or more biometric sensors does not correspond to the enrolled biometric feature, forgo performing the operation that requires authentication.

B

4322
In accordance with a determination that the orientation of the electronic device does not satisfy the set of enrollment criteria, output one or more prompts to change the orientation of the electronic device to a different orientation that satisfies the set of enrollment criteria.

4324
Output a first prompt to orient the electronic device to an initial orientation.

4326
Output a second prompt to orient the electronic device to the different orientation that satisfies the set of enrollment criteria, the first prompt being different from the second prompt.

IMPLEMENTATION OF BIOMETRIC AUTHENTICATION

CROSS-REFERENCE TO RELATED APPLICATIONS

This application is a continuation of U.S. patent application Ser. No. 16/125,267, "IMPLEMENTATION OF BIOMETRIC AUTHENTICATION," filed Sep. 7, 2018, which claims priority to U.S. Provisional Patent Application Nos. 62/556,413, "FACE ENROLLMENT AND AUTHENTICATION," filed Sep. 9, 2017; 62/557,130, "IMPLEMENTATION OF BIOMETRIC AUTHENTICATION," filed Sep. 11, 2017; 62/581,025, "IMPLEMENTATION OF BIOMETRIC AUTHENTICATION," filed Nov. 2, 2017; and 62/679,955, "IMPLEMENTATION OF BIOMETRIC AUTHENTICATION," filed Jun. 3, 2018. All of these applications are incorporated by reference herein in their entirety.

FIELD

The present disclosure relates generally to biometric authentication, and more specifically to interfaces and techniques for enrollment and authentication of biometric features.

BACKGROUND

Biometric authentication, for instance of a face, iris, or fingerprint, using electronic devices is a convenient and efficient method of authenticating users of the electronic devices. Biometric authentication allows a device to quickly and easily verify the identity of any number of users.

BRIEF SUMMARY

Some techniques for implementing biometric authentication using electronic devices, however, are generally cumbersome. For example, some existing techniques, such as those directed to facial recognition, require a user to almost perfectly align a biometric feature in a same manner during both enrollment and each iteration of authentication. Deviation from the alignment of the biometric feature often results in a false negative result. As a result, a user is, optionally, required to unnecessarily perform multiple iterations of biometric authentication, or is, optionally, discouraged from using the biometric authentication altogether. As another example, some existing techniques rely solely on a two-dimensional representation of a biometric feature. As a result, authentication of a user is, optionally, limited by virtue of a failure to analyze one or more three-dimensional characteristics of the biometric feature and also optionally requires a user to unnecessarily perform additional iterations of biometric authentication. In view of the foregoing drawbacks, existing techniques require more time than necessary, wasting both user time and device energy. This latter consideration is particularly significant in the operation of battery-operated devices.

Accordingly, the present technique provides electronic devices with faster, more efficient methods and interfaces for implementing biometric authentication. Such methods and interfaces optionally complement or replace other methods for implementing biometric authentication. Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive input required at computing devices, such as smartphones and smartwatches.

In accordance with some examples, a method is described, the method comprising: at an electronic device with one or more input devices, one or more biometric sensors, and a display: displaying, on the display, a first user interface; while displaying the first user interface, detecting an occurrence of a condition that corresponds to introduction of a biometric enrollment process for enrolling a biometric feature; in response to detecting the occurrence of the condition that corresponds to introduction of the biometric enrollment process, displaying a biometric enrollment introduction interface, wherein displaying the biometric enrollment introduction interface includes concurrently displaying: a representation of a simulation of the biometric feature; and a simulated progress indicator; while displaying the biometric enrollment introduction interface, displaying an instructional animation that includes displaying movement of the representation of the simulation of the biometric feature and incremental advancement of the simulated progress indicator; after displaying at least a portion of the instructional animation, detecting an occurrence of a condition that corresponds to initiation of the biometric enrollment process; and in response to detecting the occurrence of the condition that corresponds to initiation of the biometric enrollment process: displaying a progress indicator that corresponds to the simulated progress indicator; and displaying, at a location that was previously occupied by the representation of the simulation of the biometric feature in the biometric enrollment introduction interface, a representation of the biometric feature of the user as determined by the one or more biometric sensors of the device.

In accordance with some examples, a non-transitory computer-readable medium is described, the non-transitory computer-readable storage medium comprising one or more programs configured to be executed by one or more processors of an electronic device with one or more input devices, one or more biometric sensors, and a display, the one or more programs including instructions for: displaying, on the display, a first user interface; while displaying the first user interface, detecting an occurrence of a condition that corresponds to introduction of a biometric enrollment process for enrolling a biometric feature; in response to detecting the occurrence of the condition that corresponds to introduction of the biometric enrollment process, displaying a biometric enrollment introduction interface, wherein displaying the biometric enrollment introduction interface includes concurrently displaying: a representation of a simulation of the biometric feature; and a simulated progress indicator; while displaying the biometric enrollment introduction interface, displaying an instructional animation that includes displaying movement of the representation of the simulation of the biometric feature and incremental advancement of the simulated progress indicator; after displaying at least a portion of the instructional animation, detecting an occurrence of a condition that corresponds to initiation of the biometric enrollment process; and in response to detecting the occurrence of the condition that corresponds to initiation of the biometric enrollment process: displaying a progress indicator that corresponds to the simulated progress indicator; and displaying, at a location that was previously occupied by the representation of the simulation of the biometric feature in the biometric enrollment introduction interface, a representation of the biometric feature of the user as determined by the one or more biometric sensors of the device.

In accordance with some examples, a transitory computer-readable medium is described, the transitory computer-readable storage medium comprising one or more programs configured to be executed by one or more processors of an electronic device with one or more input devices, one or more biometric sensors, and a display, the one or more programs including instructions for: displaying, on the display, a first user interface; while displaying the first user interface, detecting an occurrence of a condition that corresponds to introduction of a biometric enrollment process for enrolling a biometric feature; in response to detecting the occurrence of the condition that corresponds to introduction of the biometric enrollment process, displaying a biometric enrollment introduction interface, wherein displaying the biometric enrollment introduction interface includes concurrently displaying: a representation of a simulation of the biometric feature; and a simulated progress indicator; while displaying the biometric enrollment introduction interface, displaying an instructional animation that includes displaying movement of the representation of the simulation of the biometric feature and incremental advancement of the simulated progress indicator; after displaying at least a portion of the instructional animation, detecting an occurrence of a condition that corresponds to initiation of the biometric enrollment process; and in response to detecting the occurrence of the condition that corresponds to initiation of the biometric enrollment process: displaying a progress indicator that corresponds to the simulated progress indicator; and displaying, at a location that was previously occupied by the representation of the simulation of the biometric feature in the biometric enrollment introduction interface, a representation of the biometric feature of the user as determined by the one or more biometric sensors of the device.

In accordance with some examples, an electronic device is described, the electronic device comprising: one or more input devices; one or more biometric sensors; a display; one or more processors; and memory storing one or more programs configured to be executed by the one or more processors, the one or more programs including instructions for: displaying, on the display, a first user interface; while displaying the first user interface, detecting an occurrence of a condition that corresponds to introduction of a biometric enrollment process for enrolling a biometric feature; in response to detecting the occurrence of the condition that corresponds to introduction of the biometric enrollment process, displaying a biometric enrollment introduction interface, wherein displaying the biometric enrollment introduction interface includes concurrently displaying: a representation of a simulation of the biometric feature; and a simulated progress indicator; while displaying the biometric enrollment introduction interface, displaying an instructional animation that includes displaying movement of the representation of the simulation of the biometric feature and incremental advancement of the simulated progress indicator; after displaying at least a portion of the instructional animation, detecting an occurrence of a condition that corresponds to initiation of the biometric enrollment process; and in response to detecting the occurrence of the condition that corresponds to initiation of the biometric enrollment process: displaying a progress indicator that corresponds to the simulated progress indicator; and displaying, at a location that was previously occupied by the representation of the simulation of the biometric feature in the biometric enrollment introduction interface, a representation of the biometric feature of the user as determined by the one or more biometric sensors of the device.

In accordance with some examples, an electronic device is described, the electronic device comprising: one or more input devices; one or more biometric sensors; a display; means for displaying, on the display, a first user interface; means for while displaying the first user interface, detecting an occurrence of a condition that corresponds to introduction of a biometric enrollment process for enrolling a biometric feature; means for in response to detecting the occurrence of the condition that corresponds to introduction of the biometric enrollment process, displaying a biometric enrollment introduction interface, wherein displaying the biometric enrollment introduction interface includes concurrently displaying: a representation of a simulation of the biometric feature; and a simulated progress indicator; means for while displaying the biometric enrollment introduction interface, displaying an instructional animation that includes displaying movement of the representation of the simulation of the biometric feature and incremental advancement of the simulated progress indicator; means for after displaying at least a portion of the instructional animation, detecting an occurrence of a condition that corresponds to initiation of the biometric enrollment process; and means for in response to detecting the occurrence of the condition that corresponds to initiation of the biometric enrollment process: means for displaying a progress indicator that corresponds to the simulated progress indicator; and means for displaying, at a location that was previously occupied by the representation of the simulation of the biometric feature in the biometric enrollment introduction interface, a representation of the biometric feature of the user as determined by the one or more biometric sensors of the device.

In accordance with some examples, a method is described, the method comprising: at an electronic device with one or more cameras and a display: displaying, on the display, a first user interface; while displaying the first user interface, detecting an occurrence of a condition that corresponds to initiating a biometric enrollment process for enrolling a respective type of biometric feature; in response to detecting the occurrence of a condition that corresponds to initiating the biometric enrollment process, displaying, on the display, a digital viewfinder including a preview of image data captured by the one or more cameras; and after initiating the biometric enrollment process: in accordance with a determination that a biometric feature of the respective type that meets alignment criteria has been detected in afield of view of the one or more cameras, emphasizing a first portion of the field of view of the one or more cameras relative to a second portion of the field of view of the one or more cameras; and in accordance with a determination that the biometric feature of the respective type that meets alignment criteria has not been detected in the field of view of the one or more cameras, maintaining display of the digital viewfinder without emphasizing the first portion of the field of view of the one or more cameras relative to the second portion of the field of view of the one or more cameras.

In accordance with some examples, a non-transitory computer-readable medium is described, the non-transitory computer-readable storage medium comprising one or more programs configured to be executed by one or more processors of an electronic device with one or more cameras and a display, the one or more programs including instructions for: displaying, on the display, a first user interface; while displaying the first user interface, detecting an occurrence of a condition that corresponds to initiating a biometric enrollment process for enrolling a respective type of biometric feature; in response to detecting the occurrence of a condition that corresponds to initiating the biometric enrollment process, displaying, on the display, a digital viewfinder including a preview of image data captured by the one or more cameras; and after initiating the biometric enrollment process: in accordance with a determination that a biometric feature of the respective type that meets alignment criteria has been detected in afield of view of the one or more cameras, emphasizing a first portion of the field of view of the one or more cameras relative to a second portion of the field of view of the one or more cameras; and in accordance with a determination that the biometric feature of the respective type that meets alignment criteria has not been detected in the field of view of the one or more cameras, maintaining display of the digital viewfinder without emphasizing the first portion of the field of view of the one or more cameras relative to the second portion of the field of view of the one or more cameras.

In accordance with some examples, a transitory computer-readable medium is described, the transitory computer-readable storage medium comprising one or more programs configured to be executed by one or more processors of an electronic device with one or more cameras and a display, the one or more programs including instructions for: displaying, on the display, a first user interface; while displaying the first user interface, detecting an occurrence of a condition that corresponds to initiating a biometric enrollment process for enrolling a respective type of biometric feature; in response to detecting the occurrence of a condition that corresponds to initiating the biometric enrollment process, displaying, on the display, a digital viewfinder including a preview of image data captured by the one or more cameras; and after initiating the biometric enrollment process: in accordance with a determination that a biometric feature of the respective type that meets alignment criteria has been detected in afield of view of the one or more cameras, emphasizing a first portion of the field of view of the one or more cameras relative to a second portion of the field of view of the one or more cameras; and in accordance with a determination that the biometric feature of the respective type that meets alignment criteria has not been detected in the field of view of the one or more cameras, maintaining display of the digital viewfinder without emphasizing the first portion of the field of view of the one or more cameras relative to the second portion of the field of view of the one or more cameras.

In accordance with some examples, an electronic device is described, the electronic device comprising: one or more cameras; a display; one or more processors; and memory storing one or more programs configured to be executed by the one or more processors, the one or more programs including instructions for: displaying, on the display, a first user interface; while displaying the first user interface, detecting an occurrence of a condition that corresponds to initiating a biometric enrollment process for enrolling a respective type of biometric feature; in response to detecting the occurrence of a condition that corresponds to initiating the biometric enrollment process, displaying, on the display, a digital viewfinder including a preview of image data captured by the one or more cameras; and after initiating the biometric enrollment process: in accordance with a determination that a biometric feature of the respective type that meets alignment criteria has been detected in afield of view of the one or more cameras, emphasizing a first portion of the field of view of the one or more cameras relative to a second portion of the field of view of the one or more cameras; and in accordance with a determination that the biometric feature of the respective type that meets alignment criteria has not been detected in the field of view of the one or more cameras, maintaining display of the digital view-finder without emphasizing the first portion of the field of view of the one or more cameras relative to the second portion of the field of view of the one or more cameras.

In accordance with some examples, an electronic device is described, the electronic device comprising: one or more cameras; a display; one or more processors; means for displaying, on the display, a first user interface; means for while displaying the first user interface, detecting an occurrence of a condition that corresponds to initiating a biometric enrollment process for enrolling a respective type of biometric feature; means for in response to detecting the occurrence of a condition that corresponds to initiating the biometric enrollment process, displaying, on the display, a digital viewfinder including a preview of image data captured by the one or more cameras; and after initiating the biometric enrollment process: means for in accordance with a determination that a biometric feature of the respective type that meets alignment criteria has been detected in afield of view of the one or more cameras, emphasizing a first portion of the field of view of the one or more cameras relative to a second portion of the field of view of the one or more cameras; and means for in accordance with a determination that a biometric feature of the respective type that meets alignment criteria has not been detected in the field of view of the one or more cameras, maintaining display of the digital viewfinder without emphasizing the first portion of the field of view of the one or more cameras relative to the second portion of the field of view of the one or more cameras.

In accordance with some examples, a method is described, the method comprising: at an electronic device with one or more biometric sensors and a display: concurrently displaying, on the display a biometric enrollment interface, wherein displaying the biometric enrollment interface includes concurrently displaying: a representation of a biometric feature, wherein the representation of the biometric feature has an orientation determined based on an alignment of the biometric feature to one or more biometric sensors of the device; and a progress indicator including a first progress-indicator portion at a first position on the display relative to the representation of the biometric feature and a second progress-indicator portion at a second position on the display relative to the representation of the biometric feature, wherein the representation of the biometric feature is displayed between the first position and the second position on the display; while concurrently displaying the representation of the biometric feature and the progress indicator, detecting a change in the orientation of the biometric feature relative to the one or more biometric sensors; and in response to detecting the change in the orientation of the biometric feature relative to the one or more biometric sensors: in accordance with a determination that the change in the orientation of the biometric feature meets enrollment criteria for a first portion of the biometric feature that corresponds to the first progress-indicator portion, updating one or more visual characteristics of the first progress-indicator portion; and in accordance with a determination that the change in the orientation of the biometric feature meets enrollment criteria for a second portion of the biometric feature that corresponds to the second progress-indicator portion, updating one or more visual characteristics of the second progress-indicator portion.

In accordance with some examples, a non-transitory computer-readable medium is described, the non-transitory computer-readable storage medium comprising one or more programs configured to be executed by one or more processors of an electronic device with one or more biometric sensors and a display, the one or more programs including instructions for: concurrently displaying, on the display a biometric enrollment interface, wherein displaying the biometric enrollment interface includes concurrently displaying: a representation of a biometric feature, wherein the representation of the biometric feature has an orientation determined based on an alignment of the biometric feature to one or more biometric sensors of the device; and a progress indicator including a first progress-indicator portion at a first position on the display relative to the representation of the biometric feature and a second progress-indicator portion at a second position on the display relative to the representation of the biometric feature, wherein the representation of the biometric feature is displayed between the first position and the second position on the display; while concurrently displaying the representation of the biometric feature and the progress indicator, detecting a change in the orientation of the biometric feature relative to the one or more biometric sensors; and in response to detecting the change in the orientation of the biometric feature relative to the one or more biometric sensors: in accordance with a determination that the change in the orientation of the biometric feature meets enrollment criteria for a first portion of the biometric feature that corresponds to the first progress-indicator portion, updating one or more visual characteristics of the first progress-indicator portion; and in accordance with a determination that the change in the orientation of the biometric feature meets enrollment criteria for a second portion of the biometric feature that corresponds to the second progress-indicator portion, updating one or more visual characteristics of the second progress-indicator portion.

In accordance with some examples, a transitory computer-readable medium is described, the transitory computer-readable storage medium comprising one or more programs configured to be executed by one or more processors of an electronic device with one or more biometric sensors and a display, the one or more programs including instructions for: concurrently displaying, on the display a biometric enrollment interface, wherein displaying the biometric enrollment interface includes concurrently displaying: a representation of a biometric feature, wherein the representation of the biometric feature has an orientation determined based on an alignment of the biometric feature to one or more biometric sensors of the device; and a progress indicator including a first progress-indicator portion at a first position on the display relative to the representation of the biometric feature and a second progress-indicator portion at a second position on the display relative to the representation of the biometric feature, wherein the representation of the biometric feature is displayed between the first position and the second position on the display; while concurrently displaying the representation of the biometric feature and the progress indicator, detecting a change in the orientation of the biometric feature relative to the one or more biometric sensors; and in response to detecting the change in the orientation of the biometric feature relative to the one or more biometric sensors: in accordance with a determination that the change in the orientation of the biometric feature meets enrollment criteria for a first portion of the biometric feature that corresponds to the first progress-indicator portion, updating one or more visual characteristics of the first progress-indicator portion; and in accordance with a determination that the change in the orientation of the biometric feature meets enrollment criteria for a second portion of the biometric feature that corresponds to the second progress-indicator portion, updating one or more visual characteristics of the second progress-indicator portion.

In accordance with some examples, an electronic device is described, the electronic device comprising: one or more biometric sensors; a display; one or more processors; and memory storing one or more programs configured to be executed by the one or more processors, the one or more programs including instructions for concurrently displaying, on the display a biometric enrollment interface, wherein displaying the biometric enrollment interface includes concurrently displaying: a representation of a biometric feature, wherein the representation of the biometric feature has an orientation determined based on an alignment of the biometric feature to one or more biometric sensors of the device; and a progress indicator including a first progress-indicator portion at a first position on the display relative to the representation of the biometric feature and a second progress-indicator portion at a second position on the display relative to the representation of the biometric feature, wherein the representation of the biometric feature is displayed between the first position and the second position on the display; while concurrently displaying the representation of the biometric feature and the progress indicator, detecting a change in the orientation of the biometric feature relative to the one or more biometric sensors; and in response to detecting the change in the orientation of the biometric feature relative to the one or more biometric sensors: in accordance with a determination that the change in the orientation of the biometric feature meets enrollment criteria for a first portion of the biometric feature that corresponds to the first progress-indicator portion, updating one or more visual characteristics of the first progress-indicator portion; and in accordance with a determination that the change in the orientation of the biometric feature meets enrollment criteria for a second portion of the biometric feature that corresponds to the second progress-indicator portion, updating one or more visual characteristics of the second progress-indicator portion.

In accordance with some examples, an electronic device is described, the electronic device comprising: one or more biometric sensors; a display; means for concurrently displaying, on the display a biometric enrollment interface, wherein displaying the biometric enrollment interface includes concurrently displaying: a representation of a biometric feature, wherein the representation of the biometric feature has an orientation determined based on an alignment of the biometric feature to one or more biometric sensors of the device; and a progress indicator including a first progress-indicator portion at a first position on the display relative to the representation of the biometric feature and a second progress-indicator portion at a second position on the display relative to the representation of the biometric feature, wherein the representation of the biometric feature is displayed between the first position and the second position on the display; means for while concurrently displaying the representation of the biometric feature and the progress indicator, detecting a change in the orientation of the biometric feature relative to the one or more biometric sensors; and means for in response to detecting the change in the orientation of the biometric feature relative to the one or more biometric sensors: means for in accordance with a determination that the change in the orientation of the biometric feature meets enrollment criteria for a first portion of the biometric feature that corresponds to the first progress-indicator portion, updating one or more visual characteristics of the first progress-indicator portion; and means for in accordance with a determination that the change in the orientation of the biometric feature meets enrollment criteria for a second portion of the biometric feature that corresponds to the second progress-indicator portion, updating one or more visual characteristics of the second progress-indicator portion.

In accordance with some examples, a method is described, the method comprising: at an electronic device with one or more biometric sensors and a display: displaying, on the display, a biometric enrollment user interface for enrolling a biometric feature, wherein displaying the biometric enrollment user interface includes displaying a representation of the biometric feature, wherein the appearance of the representation of the biometric feature changes as the orientation of the biometric feature relative to the one or more biometric sensors changes; while displaying the biometric enrollment user interface, detecting that enrollment-prompt criteria have been met with respect to one or more portions of the biometric feature; and in response to detecting that the enrollment-prompt criteria have been met with respect to one or more portions of the biometric feature, outputting a respective prompt to move the biometric feature in a respective manner, wherein the respective prompt is selected based on an enrollment state of one or more portions of the biometric feature, including: in accordance with a determination that the enrollment-prompt criteria have been met with respect to a first portion of the biometric feature that can be enrolled by moving the biometric feature in a first manner, outputting the respective prompt includes outputting a prompt to move the biometric feature in the first manner; and in accordance with a determination that the enrollment-prompt criteria have been met with respect to a second portion of the biometric feature that can be enrolled by moving the biometric feature in a second manner, different from the first manner, outputting the respective prompt includes outputting a prompt to move the biometric feature in the second manner.

In accordance with some examples, a non-transitory computer-readable medium is described, the non-transitory computer-readable storage medium comprising one or more programs configured to be executed by one or more processors of an electronic device with one or more biometric sensors and a display, the one or more programs including instructions for: displaying, on the display, a biometric enrollment user interface for enrolling a biometric feature, wherein displaying the biometric enrollment user interface includes displaying a representation of the biometric feature, wherein the appearance of the representation of the biometric feature changes as the orientation of the biometric feature relative to the one or more biometric sensors changes; while displaying the biometric enrollment user interface, detecting that enrollment-prompt criteria have been met with respect to one or more portions of the biometric feature; and in response to detecting that the enrollment-prompt criteria have been met with respect to one or more portions of the biometric feature, outputting a respective prompt to move the biometric feature in a respective manner, wherein the respective prompt is selected based on an enrollment state of one or more portions of the biometric feature, including: in accordance with a determination that the enrollment-prompt criteria have been met with respect to a first portion of the biometric feature that can be enrolled by moving the biometric feature in a first manner, outputting the respective prompt includes outputting a prompt to move the biometric feature in the first manner; and in accordance with a determination that the enrollment-prompt criteria have been met with respect to a second portion of the biometric feature that can be enrolled by moving the biometric feature in a second manner, different from the first manner, outputting the respective prompt includes outputting a prompt to move the biometric feature in the second manner.

In accordance with some examples, a transitory computer-readable medium is described, the transitory computer-readable storage medium comprising one or more programs configured to be executed by one or more processors of an electronic device with one or more biometric sensors and a display, the one or more programs including instructions for: displaying, on the display, a biometric enrollment user interface for enrolling a biometric feature, wherein displaying the biometric enrollment user interface includes displaying a representation of the biometric feature, wherein the appearance of the representation of the biometric feature changes as the orientation of the biometric feature relative to the one or more biometric sensors changes; while displaying the biometric enrollment user interface, detecting that enrollment-prompt criteria have been met with respect to one or more portions of the biometric feature; and in response to detecting that the enrollment-prompt criteria have been met with respect to one or more portions of the biometric feature, outputting a respective prompt to move the biometric feature in a respective manner, wherein the respective prompt is selected based on an enrollment state of one or more portions of the biometric feature, including: in accordance with a determination that the enrollment-prompt criteria have been met with respect to a first portion of the biometric feature that can be enrolled by moving the biometric feature in a first manner, outputting the respective prompt includes outputting a prompt to move the biometric feature in the first manner; and in accordance with a determination that the enrollment-prompt criteria have been met with respect to a second portion of the biometric feature that can be enrolled by moving the biometric feature in a second manner, different from the first manner, outputting the respective prompt includes outputting a prompt to move the biometric feature in the second manner.

In accordance with some examples, an electronic device is described, the electronic device comprising: one or more biometric sensors; a display; one or more processors; and memory storing one or more programs configured to be executed by the one or more processors, the one or more programs including instructions for displaying, on the display, a biometric enrollment user interface for enrolling a biometric feature, wherein displaying the biometric enrollment user interface includes displaying a representation of the biometric feature, wherein the appearance of the representation of the biometric feature changes as the orientation of the biometric feature relative to the one or more biometric sensors changes; while displaying the biometric enrollment user interface, detecting that enrollment-prompt criteria have been met with respect to one or more portions of the biometric feature; and in response to detecting that the enrollment-prompt criteria have been met with respect to one or more portions of the biometric feature, outputting a respective prompt to move the biometric feature in a respective manner, wherein the respective prompt is selected based on an enrollment state of one or more portions of the biometric feature, including: in accordance with a determination that the enrollment-prompt criteria have been met with respect to a first portion of the biometric feature that can be enrolled by moving the biometric feature in a first manner, outputting the respective prompt includes outputting a prompt to move the biometric feature in the first manner; and in accordance with a determination that the enrollment-prompt criteria have been met with respect to a second portion of the biometric feature that can be enrolled by moving the biometric feature in a second manner, different from the first manner, outputting the respective prompt includes outputting a prompt to move the biometric feature in the second manner.

In accordance with some examples, an electronic device is described, the electronic device comprising: one or more biometric sensors; a display; means for displaying, on the display, a biometric enrollment user interface for enrolling a biometric feature, wherein displaying the biometric enrollment user interface includes displaying a representation of the biometric feature, wherein the appearance of the representation of the biometric feature changes as the orientation of the biometric feature relative to the one or more biometric sensors changes; means for while displaying the biometric enrollment user interface, detecting that enrollment-prompt criteria have been met with respect to one or more portions of the biometric feature; and means for in response to detecting that the enrollment-prompt criteria have been met with respect to one or more portions of the biometric feature, outputting a respective prompt to move the biometric feature in a respective manner, wherein the respective prompt is selected based on an enrollment state of one or more portions of the biometric feature, including: means for in accordance with a determination that the enrollment-prompt criteria have been met with respect to a first portion of the biometric feature that can be enrolled by moving the biometric feature in a first manner, outputting the respective prompt includes outputting a prompt to move the biometric feature in the first manner; and means for in accordance with a determination that the enrollment-prompt criteria have been met with respect to a second portion of the biometric feature that can be enrolled by moving the biometric feature in a second manner, different from the first manner, outputting the respective prompt includes outputting a prompt to move the biometric feature in the second manner.

In accordance with some examples, a method is described, the method comprising: at an electronic device with one or more biometric sensors and a display: concurrently displaying, on the display: an application interface corresponding to an application; and a biometric authentication interface controlled by an operating system of the electronic device, wherein the biometric authentication interface is displayed over a portion of the application interface; while displaying the biometric authentication interface, obtaining, from the one or more biometric sensors, biometric data corresponding to at least a portion of a biometric feature; and in accordance with a determination, based on the biometric data, that the at least a portion of the biometric feature satisfies biometric authentication criteria: providing authentication information to the application indicating the biometric authentication criteria have been satisfied with respect to the one or more portions of the biometric feature; and after providing authentication information to the application, maintaining display of the biometric authentication interface for a predetermined amount of time.

In accordance with some examples, a non-transitory computer-readable medium is described, the non-transitory computer-readable storage medium comprising one or more programs configured to be executed by one or more processors of an electronic device with one or more biometric sensors and a display, the one or more programs including instructions for: concurrently displaying, on the display: an application interface corresponding to an application; and a biometric authentication interface controlled by an operating system of the electronic device, wherein the biometric authentication interface is displayed over a portion of the application interface; while displaying the biometric authentication interface, obtaining, from the one or more biometric sensors, biometric data corresponding to at least a portion of a biometric feature; and in accordance with a determination, based on the biometric data, that the at least a portion of the biometric feature satisfies biometric authentication criteria: providing authentication information to the application indicating the biometric authentication criteria have been satisfied with respect to the one or more portions of the biometric feature; and after providing authentication information to the application, maintaining display of the biometric authentication interface for a predetermined amount of time.

In accordance with some examples, a transitory computer-readable medium is described, the transitory computer-readable storage medium comprising one or more programs configured to be executed by one or more processors of an electronic device with one or more biometric sensors and a display, the one or more programs including instructions for: concurrently displaying, on the display: an application interface corresponding to an application; and a biometric authentication interface controlled by an operating system of the electronic device, wherein the biometric authentication interface is displayed over a portion of the application interface; while displaying the biometric authentication interface, obtaining, from the one or more biometric sensors, biometric data corresponding to at least a portion of a biometric feature; and in accordance with a determination, based on the biometric data, that the at least a portion of the biometric feature satisfies biometric authentication criteria: providing authentication information to the application indicating the biometric authentication criteria have been satisfied with respect to the one or more portions of the biometric feature; and after providing authentication information to the application, maintaining display of the biometric authentication interface for a predetermined amount of time.

In accordance with some examples, an electronic device is described, the electronic device comprising: one or more biometric sensors; a display; one or more processors; and memory storing one or more programs configured to be executed by the one or more processors, the one or more programs including instructions for concurrently displaying, on the display: an application interface corresponding to an application; and a biometric authentication interface controlled by an operating system of the electronic device, wherein the biometric authentication interface is displayed over a portion of the application interface; while displaying the biometric authentication interface, obtaining, from the one or more biometric sensors, biometric data corresponding to at least a portion of a biometric feature; and in accordance with a determination, based on the biometric data, that the at least a portion of the biometric feature satisfies biometric authentication criteria: providing authentication information to the application indicating the biometric authentication criteria have been satisfied with respect to the one or more portions of the biometric feature; and after providing authentication information to the application, maintaining display of the biometric authentication interface for a predetermined amount of time.

In accordance with some examples, an electronic device is described, the electronic device comprising: one or more biometric sensors; a display; means for concurrently displaying, on the display: an application interface corresponding to an application; and a biometric authentication interface controlled by an operating system of the electronic device, wherein the biometric authentication interface is displayed over a portion of the application interface; means for while displaying the biometric authentication interface, obtaining, from the one or more biometric sensors, biometric data corresponding to at least a portion of a biometric feature; and means for in accordance with a determination, based on the biometric data, that the at least a portion of the biometric feature satisfies biometric authentication criteria: means for providing authentication information to the application indicating the biometric authentication criteria have been satisfied with respect to the one or more portions of the biometric feature; and means for after providing authentication information to the application, maintaining display of the biometric authentication interface for a predetermined amount of time.

In accordance with some examples, a method is described, the method comprising: at an electronic device with one or more biometric sensors and a display: displaying, on the display, an application interface including a fillable field; while displaying the application interface, receiving a request to autofill the fillable field of the application interface; and in response to receiving the request to autofill the fillable field of the application interface: in accordance with a determination that the fillable field of the application interface is associated with data of a first type, autofilling the fillable field with data of the first type; and in accordance with a determination that the fillable field of the application is associated with data of a second type and that at least a portion of a biometric feature, determined based on the data obtained from the one or more biometric sensors that corresponds to the biometric feature, satisfies biometric authentication criteria, autofilling the fillable field with data of the second type.

In accordance with some examples, a non-transitory computer-readable medium is described, the non-transitory computer-readable storage medium comprising one or more programs for execution by one or more processors of an electronic device with one or more biometric sensors and a display, the one or more programs comprising instructions for: displaying, on the display, an application interface including a fillable field; while displaying the application interface, receiving a request to autofill the fillable field of the application interface; and in response to receiving the request to autofill the fillable field of the application interface: in accordance with a determination that the fillable field of the application interface is associated with data of a first type, autofilling the fillable field with data of the first type; and in accordance with a determination that the fillable field of the application is associated with data of a second type and that at least a portion of a biometric feature, determined based on the data obtained from the one or more biometric sensors that corresponds to the biometric feature, satisfies biometric authentication criteria, autofilling the fillable field with data of the second type.

In accordance with some examples, a transitory computer-readable medium is described, the transitory computer-readable storage medium comprising one or more programs for execution by one or more processors of an electronic device with one or more biometric sensors and a display, the one or more programs comprising instructions for: displaying, on the display, an application interface including a fillable field; while displaying the application interface, receiving a request to autofill the fillable field of the application interface; and in response to receiving the request to autofill the fillable field of the application interface: in accordance with a determination that the fillable field of the application interface is associated with data of a first type, autofilling the fillable field with data of the first type; and in accordance with a determination that the fillable field of the application is associated with data of a second type and that at least a portion of a biometric feature, determined based on the data obtained from the one or more biometric sensors that corresponds to the biometric feature, satisfies biometric authentication criteria, autofilling the fillable field with data of the second type.

In accordance with some examples, an electronic device is described, the electronic device comprising: one or more biometric sensors; a display; one or more processors; and memory storing one or more programs configured to be executed by the one or more processors, the one or more programs including instructions for displaying, on the display, an application interface including a fillable field; while displaying the application interface, receiving a request to autofill the fillable field of the application interface; and in response to receiving the request to autofill the fillable field of the application interface: in accordance with a determination that the fillable field of the application interface is associated with data of a first type, autofilling the fillable field with data of the first type; and in accordance with a determination that the fillable field of the application is associated with data of a second type and that at least a portion of a biometric feature, determined based on the data obtained from the one or more biometric sensors that corresponds to the biometric feature, satisfies biometric authentication criteria, autofilling the fillable field with data of the second type.

In accordance with some examples, an electronic device is described, the electronic device comprising: one or more biometric sensors; a display; means for displaying, on the display, an application interface including a fillable field; means for while displaying the application interface, receiving a request to autofill the fillable field of the application interface; and means for in response to receiving the request to autofill the fillable field of the application interface: means for in accordance with a determination that the fillable field of the application interface is associated with data of a first type, autofilling the fillable field with data of the first type; and means for in accordance with a determination that the fillable field of the application is associated with data of a second type and that at least a portion of a biometric feature, determined based on the data obtained from the one or more biometric sensors that corresponds to the biometric feature, satisfies biometric authentication criteria, autofilling the fillable field with data of the second type.

In accordance with some examples, a method is described, the method comprising: at an electronic device having one or more biometric sensors and a display: detecting that device wake criteria have been met; in response to detecting that the device wake criteria have been met transitioning the electronic device from a first visual state to a second visual state; and after transitioning the device to the second visual state: in accordance with a determination that biometric authentication criteria has been met based on biometric data provided by the one or more biometric sensors, transitioning the electronic device from the second visual state to a third visual state, wherein the transition from the second visual state to the third visual state is a continuation of the transition from the first visual state to the second visual state; and in accordance with a determination that biometric authentication criteria has been not met based on biometric data provided by the one or more biometric sensors, maintaining the electronic device in the second visual state.

In accordance with some examples, a non-transitory computer-readable medium is described, the non-transitory computer-readable storage medium comprising one or more programs configured to be executed by one or more processors of an electronic device with one or more biometric sensors and a display, the one or more programs including instructions for: detecting that device wake criteria have been met; in response to detecting that the device wake criteria have been met transitioning the electronic device from a first visual state to a second visual state; and after transitioning the device to the second visual state: in accordance with a determination that biometric authentication criteria has been met based on biometric data provided by the one or more biometric sensors, transitioning the electronic device from the second visual state to a third visual state, wherein the transition from the second visual state to the third visual state is a continuation of the transition from the first visual state to the second visual state; and in accordance with a determination that biometric authentication criteria has been not met based on biometric data provided by the one or more biometric sensors, maintaining the electronic device in the second visual state.

In accordance with some examples, a transitory computer-readable medium is described, the transitory computer-readable storage medium comprising one or more programs configured to be executed by one or more processors of an electronic device with one or more biometric sensors and a display, the one or more programs including instructions for: detecting that device wake criteria have been met; in response to detecting that the device wake criteria have been met transitioning the electronic device from a first visual state to a second visual state; and after transitioning the device to the second visual state: in accordance with a determination that biometric authentication criteria has been met based on biometric data provided by the one or more biometric sensors, transitioning the electronic device from the second visual state to a third visual state, wherein the transition from the second visual state to the third visual state is a continuation of the transition from the first visual state to the second visual state; and in accordance with a determination that biometric authentication criteria has been not met based on biometric data provided by the one or more biometric sensors, maintaining the electronic device in the second visual state.

In accordance with some examples, an electronic device is described, the electronic device comprising: one or more biometric sensors; a display; one or more processors; and memory storing one or more programs configured to be executed by the one or more processors, the one or more programs including instructions for detecting that device wake criteria have been met; in response to detecting that the device wake criteria have been met transitioning the electronic device from a first visual state to a second visual state; and after transitioning the device to the second visual state: in accordance with a determination that biometric authentication criteria has been met based on biometric data provided by the one or more biometric sensors, transitioning the electronic device from the second visual state to a third visual state, wherein the transition from the second visual state to the third visual state is a continuation of the transition from the first visual state to the second visual state; and in accordance with a determination that biometric authentication criteria has been not met based on biometric data provided by the one or more biometric sensors, maintaining the electronic device in the second visual state.

In accordance with some examples, an electronic device is described, the electronic device comprising: one or more biometric sensors; a display; means for detecting that device wake criteria have been met; means for in response to detecting that the device wake criteria have been met transitioning the electronic device from a first visual state to a second visual state; and means for after transitioning the device to the second visual state: means for in accordance with a determination that biometric authentication criteria has been met based on biometric data provided by the one or more biometric sensors, transitioning the electronic device from the second visual state to a third visual state, wherein the transition from the second visual state to the third visual state is a continuation of the transition from the first visual state to the second visual state; and means for in accordance with a determination that biometric authentication criteria has been not met based on biometric data provided by the one or more biometric sensors, maintaining the electronic device in the second visual state.

In accordance with some examples, a method is described, the method comprising: at an electronic device having one or more biometric sensors and a display: while the electronic device is in a locked state, detecting a condition that is associated with performing a biometric authentication check using a biometric sensor without an explicit input from the user requesting biometric authentication; and in response to detecting the condition, performing a first biometric authentication check, including: capturing first biometric data using the one or more biometric sensors; after capturing the first biometric data: in accordance with a determination that the first biometric data satisfies biometric authentication criteria, transitioning the device from the locked state to an unlocked state; and in accordance with a determination that the first biometric data does not satisfy the biometric authentication criteria, maintaining the device in the locked state; after the performing the first biometric authentication check, detecting, via the device, a request to perform a respective operation without receiving further authentication information from the user; and in response to detecting the request to perform the respective operation: in accordance with a determination that the respective operation does not require authentication, performing the respective operation; in accordance with a determination that the respective operation requires authentication and that the device is in the unlocked state, performing the respective operation; and in accordance with a determination that the respective operation requires authentication and that the device is in the locked state: capturing second biometric data using the one or more biometric sensors without an explicit input from the user requesting a second biometric authentication check; and after capturing the second biometric data, performing the second biometric authentication check, including: in accordance with a determination that the second biometric data satisfies the biometric authentication criteria, performing the respective operation; and in accordance with a determination that the second biometric data does not satisfy the biometric authentication criteria, forgoing performance of the respective operation.

In accordance with some examples, a non-transitory computer-readable medium is described, the non-transitory computer-readable storage medium comprising one or more programs configured to be executed by one or more processors of an electronic device with one or more biometric sensors and a display, the one or more programs including instructions for: while the electronic device is in a locked state, detecting a condition that is associated with performing a biometric authentication check using a biometric sensor without an explicit input from the user requesting biometric authentication; and in response to detecting the condition, performing a first biometric authentication check, including: capturing first biometric data using the one or more biometric sensors; after capturing the first biometric data: in accordance with a determination that the first biometric data satisfies biometric authentication criteria, transitioning the device from the locked state to an unlocked state; and in accordance with a determination that the first biometric data does not satisfy the biometric authentication criteria, maintaining the device in the locked state; after the performing the first biometric authentication check, detecting, via the device, a request to perform a respective operation without receiving further authentication information from the user; and in response to detecting the request to perform the respective operation: in accordance with a determination that the respective operation does not require authentication, performing the respective operation; in accordance with a determination that the respective operation requires authentication and that the device is in the unlocked state, performing the respective operation; and in accordance with a determination that the respective operation requires authentication and that the device is in the locked state: capturing second biometric data using the one or more biometric sensors without an explicit input from the user requesting a second biometric authentication check; and after capturing the second biometric data, performing the second biometric authentication check, including: in accordance with a determination that the second biometric data satisfies the biometric authentication criteria, performing the respective operation; and in accordance with a determination that the second biometric data does not satisfy the biometric authentication criteria, forgoing performance of the respective operation.

In accordance with some examples, a transitory computer-readable medium is described, the transitory computer-readable storage medium comprising one or more programs configured to be executed by one or more processors of an electronic device with one or more biometric sensors and a display, the one or more programs including instructions for: while the electronic device is in a locked state, detecting a condition that is associated with performing a biometric authentication check using a biometric sensor without an explicit input from the user requesting biometric authentication; and in response to detecting the condition, performing a first biometric authentication check, including: capturing first biometric data using the one or more biometric sensors; after capturing the first biometric data: in accordance with a determination that the first biometric data satisfies biometric authentication criteria, transitioning the device from the locked state to an unlocked state; and in accordance with a determination that the first biometric data does not satisfy the biometric authentication criteria, maintaining the device in the locked state; after the performing the first biometric authentication check, detecting, via the device, a request to perform a respective operation without receiving further authentication information from the user; and in response to detecting the request to perform the respective operation: in accordance with a determination that the respective operation does not require authentication, performing the respective operation; in accordance with a determination that the respective operation requires authentication and that the device is in the unlocked state, performing the respective operation; and in accordance with a determination that the respective operation requires authentication and that the device is in the locked state: capturing second biometric data using the one or more biometric sensors without an explicit input from the user requesting a second biometric authentication check; and after capturing the second biometric data, performing the second biometric authentication check, including: in accordance with a determination that the second biometric data satisfies the biometric authentication criteria, performing the respective operation; and in accordance with a determination that the second biometric data does not satisfy the biometric authentication criteria, forgoing performance of the respective operation.

In accordance with some examples, an electronic device is described, the electronic device comprising: one or more biometric sensors; a display; one or more processors; and memory storing one or more programs configured to be executed by the one or more processors, the one or more programs including instructions for while the electronic device is in a locked state, detecting a condition that is associated with performing a biometric authentication check using a biometric sensor without an explicit input from the user requesting biometric authentication; and in response to detecting the condition, performing a first biometric authentication check, including: capturing first biometric data using the one or more biometric sensors; after capturing the first biometric data: in accordance with a determination that the first biometric data satisfies biometric authentication criteria, transitioning the device from the locked state to an unlocked state; and in accordance with a determination that the first biometric data does not satisfy the biometric authentication criteria, maintaining the device in the locked state; after the performing the first biometric authentication check, detecting, via the device, a request to perform a respective operation without receiving further authentication information from the user; and in response to detecting the request to perform the respective operation: in accordance with a determination that the respective operation does not require authentication, performing the respective operation; in accordance with a determination that the respective operation requires authentication and that the device is in the unlocked state, performing the respective operation; and in accordance with a determination that the respective operation requires authentication and that the device is in the locked state: capturing second biometric data using the one or more biometric sensors without an explicit input from the user requesting a second biometric authentication check; and after capturing the second biometric data, performing the second biometric authentication check, including: in accordance with a determination that the second biometric data satisfies the biometric authentication criteria, performing the respective operation; and in accordance with a determination that the second biometric data does not satisfy the biometric authentication criteria, forgoing performance of the respective operation.

In accordance with some examples, an electronic device is described, the electronic device comprising: one or more biometric sensors; a display; means for while the electronic device is in a locked state, detecting a condition that is associated with performing a biometric authentication check using a biometric sensor without an explicit input from the user requesting biometric authentication; and means for in response to detecting the condition, performing a first biometric authentication check, including: means for capturing first biometric data using the one or more biometric sensors; means for after capturing the first biometric data: means for in accordance with a determination that the first biometric data satisfies biometric authentication criteria, transitioning the device from the locked state to an unlocked state; and means for in accordance with a determination that the first biometric data does not satisfy the biometric authentication criteria, maintaining the device in the locked state; means for after the performing the first biometric authentication check, detecting, via the device, a request to perform a respective operation without receiving further authentication information from the user; and means for in response to detecting the request to perform the respective operation: means for in accordance with a determination that the respective operation does not require authentication, performing the respective operation; means for in accordance with a determination that the respective operation requires authentication and that the device is in the unlocked state, performing the respective operation; and means for in accordance with a determination that the respective operation requires authentication and that the device is in the locked state: means for capturing second biometric data using the one or more biometric sensors without an explicit input from the user requesting a second biometric authentication check; and means for after capturing the second biometric data, performing the second biometric authentication check, including: means for in accordance with a determination that the second biometric data satisfies the biometric authentication criteria, performing the respective operation; and means for in accordance with a determination that the second biometric data does not satisfy the biometric authentication criteria, forgoing performance of the respective operation.

In accordance with some examples, a method is described, the method comprising: at an electronic device with a display, a button, and one or more biometric sensors separate from the button: while the electronic device is in a first state in which a respective function of the device is disabled, detecting one or more activations of the button; and in response to detecting the one or more activations of the button: capturing, with the one or more biometric sensors that are separate from the button, biometric data; in accordance with a determination that the biometric data satisfies biometric authentication criteria, transitioning the electronic device to a second state in which the respective function of the device is enabled; and in accordance with a determination that the biometric data does not satisfy the biometric authentication criteria, maintaining the electronic device in the first state and displaying, on the display, an indication that biometric authentication has failed.

In accordance with some examples, a non-transitory computer-readable medium is described, the non-transitory computer-readable storage medium comprising one or more programs configured to be executed by one or more processors of an electronic device with a display, a button, and one or more biometric sensors separate from the button, the one or more programs including instructions for: while the electronic device is in a first state in which a respective function of the device is disabled, detecting one or more activations of the button; and in response to detecting the one or more activations of the button: capturing, with the one or more biometric sensors that are separate from the button, biometric data; in accordance with a determination that the biometric data satisfies biometric authentication criteria, transitioning the electronic device to a second state in which the respective function of the device is enabled; and in accordance with a determination that the biometric data does not satisfy the biometric authentication criteria, maintaining the electronic device in the first state and displaying, on the display, an indication that biometric authentication has failed.

In accordance with some examples, a transitory computer-readable medium is described, the transitory computer-readable storage medium comprising one or more programs configured to be executed by one or more processors of an electronic device with a display, a button, and one or more biometric sensors separate from the button, the one or more programs including instructions for: while the electronic device is in a first state in which a respective function of the device is disabled, detecting one or more activations of the button; and in response to detecting the one or more activations of the button: capturing, with the one or more biometric sensors that are separate from the button, biometric data; in accordance with a determination that the biometric data satisfies biometric authentication criteria, transitioning the electronic device to a second state in which the respective function of the device is enabled; and in accordance with a determination that the biometric data does not satisfy the biometric authentication criteria, maintaining the electronic device in the first state and displaying, on the display, an indication that biometric authentication has failed.

In accordance with some examples, an electronic device is described, the electronic device comprising: a display; a button; one or more biometric sensors separate from the button; one or more processors; and memory storing one or more programs configured to be executed by the one or more processors, the one or more programs including instructions for: while the electronic device is in a first state in which a respective function of the device is disabled, detecting one or more activations of the button; and in response to detecting the one or more activations of the button: capturing, with the one or more biometric sensors that are separate from the button, biometric data; in accordance with a determination that the biometric data satisfies biometric authentication criteria, transitioning the electronic device to a second state in which the respective function of the device is enabled; and in accordance with a determination that the biometric data does not satisfy the biometric authentication criteria, maintaining the electronic device in the first state and displaying, on the display, an indication that biometric authentication has failed.

In accordance with some examples, an electronic device is described, the electronic device comprising: a display; a button; one or more biometric sensors separate from the button; means for while the electronic device is in a first state in which a respective function of the device is disabled, detecting one or more activations of the button; and means for in response to detecting the one or more activations of the button: means for capturing, with the one or more biometric sensors that are separate from the button, biometric data; means for in accordance with a determination that the biometric data satisfies biometric authentication criteria, transitioning the electronic device to a second state in which the respective function of the device is enabled; and means for in accordance with a determination that the biometric data does not satisfy the biometric authentication criteria, maintaining the electronic device in the first state and displaying, on the display, an indication that biometric authentication has failed.

In accordance with some examples, a method is described, the method comprising: at an electronic device having one or more biometric sensors and a display: detecting a request to perform a respective operation that requires authentication; and in response to detecting the request to perform the respective operation that requires authentication: in accordance with a determination that the device is unlocked, performing the respective operation; and in accordance with a determination that the device is locked and a first form of authentication is available for use, wherein the first form of authentication is a form of biometric authentication based on data obtained by the one or more biometric sensors, displaying, on the display, an authentication indicator for the first form of authentication without displaying one or more affordances for using a second form of authentication.

In accordance with some examples, a non-transitory computer-readable medium is described, the non-transitory computer-readable storage medium comprising one or more programs configured to be executed by one or more processors of an electronic device with one or more biometric sensors and a display, the one or more programs including instructions for: detecting a request to perform a respective operation that requires authentication; and in response to detecting the request to perform the respective operation that requires authentication: in accordance with a determination that the device is unlocked, performing the respective operation; and in accordance with a determination that the device is locked and a first form of authentication is available for use, wherein the first form of authentication is a form of biometric authentication based on data obtained by the one or more biometric sensors, displaying, on the display, an authentication indicator for the first form of authentication without displaying one or more affordances for using a second form of authentication.

In accordance with some examples, a transitory computer-readable medium is described, the transitory computer-readable storage medium comprising one or more programs configured to be executed by one or more processors of an electronic device with one or more biometric sensors and a display, the one or more programs including instructions for: detecting a request to perform a respective operation that requires authentication; and in response to detecting the request to perform the respective operation that requires authentication: in accordance with a determination that the device is unlocked, performing the respective operation; and in accordance with a determination that the device is locked and a first form of authentication is available for use, wherein the first form of authentication is a form of biometric authentication based on data obtained by the one or more biometric sensors, displaying, on the display, an authentication indicator for the first form of authentication without displaying one or more affordances for using a second form of authentication.

In accordance with some examples, an electronic device is described, the electronic device comprising: one or more biometric sensors; a display; one or more processors; and memory storing one or more programs configured to be executed by the one or more processors, the one or more programs including instructions for detecting a request to perform a respective operation that requires authentication; and in response to detecting the request to perform the respective operation that requires authentication: in accordance with a determination that the device is unlocked, performing the respective operation; and in accordance with a determination that the device is locked and a first form of authentication is available for use, wherein the first form of authentication is a form of biometric authentication based on data obtained by the one or more biometric sensors, displaying, on the display, an authentication indicator for the first form of authentication without displaying one or more affordances for using a second form of authentication.

In accordance with some examples, an electronic device is described, the electronic device comprising: one or more biometric sensors; a display; means for detecting a request to perform a respective operation that requires authentication; and means for in response to detecting the request to perform the respective operation that requires authentication: means for in accordance with a determination that the device is unlocked, performing the respective operation; and means for in accordance with a determination that the device is locked and a first form of authentication is available for use, wherein the first form of authentication is a form of biometric authentication based on data obtained by the one or more biometric sensors, displaying, on the display, an authentication indicator for the first form of authentication without displaying one or more affordances for using a second form of authentication.

In accordance with some examples, a method is described, the method comprising: at an electronic device with one or more biometric sensors: receiving a first request to perform a respective operation that requires authentication; in response to receiving the first request to perform the respective operation: using the one or more biometric sensors to determine whether biometric authentication criteria are met, wherein the biometric authentication criteria include a requirement that a biometric feature of a respective type that is authorized to perform the respective operation is detected by the biometric sensors; in accordance with a determination that the biometric authentication criteria are met, performing the respective operation; and in accordance with a determination that the biometric authentication criteria are not met, forgoing performing the respective operation; subsequent to the determination that the biometric authentication criteria were not met in response to receiving the first request, receiving a second request to perform the respective operation; and in response to receiving the second request to perform the respective operation: in accordance with a determination that the biometric authentication criteria were not met in response to the first request due to the one or more biometric sensors not detecting the presence of a biometric feature of the respective type, using the one or more biometric sensors to determine whether the biometric authentication criteria are met in response to the second request; and in accordance with a determination that the biometric authentication criteria were not met in response to the first request due to the one or more biometric sensors detecting a biometric feature of the respective type that does not correspond to the authorized biometric feature, forgoing using the one or more biometric sensors to determine whether the biometric authentication criteria are met in response to the second request.

In accordance with some examples, a non-transitory computer-readable medium is described, the non-transitory computer-readable storage medium storing one or more programs configured to be executed by one or more processors of an electronic device with one or more biometric sensors, the one or more programs including instructions for: receiving a first request to perform a respective operation that requires authentication; in response to receiving the first request to perform the respective operation: using the one or more biometric sensors to determine whether biometric authentication criteria are met, wherein the biometric authentication criteria include a requirement that a biometric feature of a respective type that is authorized to perform the respective operation is detected by the biometric sensors; in accordance with a determination that the biometric authentication criteria are met, performing the respective operation; and in accordance with a determination that the biometric authentication criteria are not met, forgoing performing the respective operation; subsequent to the determination that the biometric authentication criteria were not met in response to receiving the first request, receiving a second request to perform the respective operation; and in response to receiving the second request to perform the respective operation: in accordance with a determination that the biometric authentication criteria were not met in response to the first request due to the one or more biometric sensors not detecting the presence of a biometric feature of the respective type, using the one or more biometric sensors to determine whether the biometric authentication criteria are met in response to the second request; and in accordance with a determination that the biometric authentication criteria were not met in response to the first request due to the one or more biometric sensors detecting a biometric feature of the respective type that does not correspond to the authorized biometric feature, forgoing using the one or more biometric sensors to determine whether the biometric authentication criteria are met in response to the second request.

In accordance with some examples, a transitory computer-readable medium is described, the transitory computer-readable storage medium storing one or more programs configured to be executed by one or more processors of an electronic device with one or more biometric sensors, the one or more programs including instructions for: receiving a first request to perform a respective operation that requires authentication; in response to receiving the first request to perform the respective operation: using the one or more biometric sensors to determine whether biometric authentication criteria are met, wherein the biometric authentication criteria include a requirement that a biometric feature of a respective type that is authorized to perform the respective operation is detected by the biometric sensors; in accordance with a determination that the biometric authentication criteria are met, performing the respective operation; and in accordance with a determination that the biometric authentication criteria are not met, forgoing performing the respective operation; subsequent to the determination that the biometric authentication criteria were not met in response to receiving the first request, receiving a second request to perform the respective operation; and in response to receiving the second request to perform the respective operation: in accordance with a determination that the biometric authentication criteria were not met in response to the first request due to the one or more biometric sensors not detecting the presence of a biometric feature of the respective type, using the one or more biometric sensors to determine whether the biometric authentication criteria are met in response to the second request; and in accordance with a determination that the biometric authentication criteria were not met in response to the first request due to the one or more biometric sensors detecting a biometric feature of the respective type that does not correspond to the authorized biometric feature, forgoing using the one or more biometric sensors to determine whether the biometric authentication criteria are met in response to the second request.

In accordance with some examples, an electronic device is described, the electronic device comprising: one or more biometric sensors; one or more processors; and memory storing one or more programs configured to be executed by the one or more processors, the one or more programs including instructions for: receiving a first request to perform a respective operation that requires authentication; in response to receiving the first request to perform the respective operation: using the one or more biometric sensors to determine whether biometric authentication criteria are met, wherein the biometric authentication criteria include a requirement that a biometric feature of a respective type that is authorized to perform the respective operation is detected by the biometric sensors; in accordance with a determination that the biometric authentication criteria are met, performing the respective operation; and in accordance with a determination that the biometric authentication criteria are not met, forgoing performing the respective operation; subsequent to the determination that the biometric authentication criteria were not met in response to receiving the first request, receiving a second request to perform the respective operation; and in response to receiving the second request to perform the respective operation: in accordance with a determination that the biometric authentication criteria were not met in response to the first request due to the one or more biometric sensors not detecting the presence of a biometric feature of the respective type, using the one or more biometric sensors to determine whether the biometric authentication criteria are met in response to the second request; and in accordance with a determination that the biometric authentication criteria were not met in response to the first request due to the one or more biometric sensors detecting a biometric feature of the respective type that does not correspond to the authorized biometric feature, forgoing using the one or more biometric sensors to determine whether the biometric authentication criteria are met in response to the second request.

In accordance with some examples, an electronic device is described, the electronic device comprising: one or more biometric sensors; means for receiving a first request to perform a respective operation that requires authentication; means, responsive to receiving the first request to perform the respective operation, for: using the one or more biometric sensors to determine whether biometric authentication criteria are met, wherein the biometric authentication criteria include a requirement that a biometric feature of a respective type that is authorized to perform the respective operation is detected by the biometric sensors; in accordance with a determination that the biometric authentication criteria are met, performing the respective operation; and in accordance with a determination that the biometric authentication criteria are not met, forgoing performing the respective operation; means, subsequent to the determination that the biometric authentication criteria were not met in response to receiving the first request, for receiving a second request to perform the respective operation; and means, responsive to receiving the second request to perform the respective operation, for: in accordance with a determination that the biometric authentication criteria were not met in response to the first request due to the one or more biometric sensors not detecting the presence of a biometric feature of the respective type, using the one or more biometric sensors to determine whether the biometric authentication criteria are met in response to the second request; and in accordance with a determination that the biometric authentication criteria were not met in response to the first request due to the one or more biometric sensors detecting a biometric feature of the respective type that does not correspond to the authorized biometric feature, forgoing using the one or more biometric sensors to determine whether the biometric authentication criteria are met in response to the second request.

In accordance with some examples, a method is described, the method comprising: at an electronic device with one or more biometric sensors: receiving a first request to perform a first operation that requires authentication; in response to receiving the first request to perform the first operation: using the one or more biometric sensors to determine whether first biometric authentication criteria are met, wherein the first biometric authentication criteria include a requirement that a biometric feature of a respective type that is authorized to perform the first operation is detected by the biometric sensors; in accordance with a determination that the first biometric authentication criteria are met, performing the first operation; and in accordance with a determination that the biometric authentication criteria are not met, forgoing performing the first operation; after performing the first operation, receiving a second request to perform a second operation that requires authentication; and in response to receiving the second request: in accordance with a determination that re-authentication criteria have been met, using the one or more biometric sensors to determine whether second biometric authentication criteria are met, wherein the second biometric authentication criteria include a requirement that a biometric feature of a respective type that is authorized to perform the second operation is detected by the biometric sensors; and in accordance with a determination that the re-authentication criteria have not been met, performing the second operation without performing biometric authentication and forgoing using the one or more biometric sensors to determine whether the second biometric authentication criteria are met.

In accordance with some examples, a non-transitory computer-readable medium is described, the non-transitory computer-readable storage medium storing one or more programs configured to be executed by one or more processors of an electronic device with one or more biometric sensors, the one or more programs including instructions for: receiving a first request to perform a first operation that requires authentication; in response to receiving the first request to perform the first operation: using the one or more biometric sensors to determine whether first biometric authentication criteria are met, wherein the first biometric authentication criteria include a requirement that a biometric feature of a respective type that is authorized to perform the first operation is detected by the biometric sensors; in accordance with a determination that the first biometric authentication criteria are met, performing the first operation; and in accordance with a determination that the biometric authentication criteria are not met, forgoing performing the first operation; after performing the first operation, receiving a second request to perform a second operation that requires authentication; and in response to receiving the second request: in accordance with a determination that re-authentication criteria have been met, using the one or more biometric sensors to determine whether second biometric authentication criteria are met, wherein the second biometric authentication criteria include a requirement that a biometric feature of a respective type that is authorized to perform the second operation is detected by the biometric sensors; and in accordance with a determination that the re-authentication criteria have not been met, performing the second operation without performing biometric authentication and forgoing using the one or more biometric sensors to determine whether the second biometric authentication criteria are met.

In accordance with some examples, a transitory computer-readable medium is described, the transitory computer-readable storage medium storing one or more programs configured to be executed by one or more processors of an electronic device with one or more biometric sensors, the one or more programs including instructions for: receiving a first request to perform a first operation that requires authentication; in response to receiving the first request to perform the first operation: using the one or more biometric sensors to determine whether first biometric authentication criteria are met, wherein the first biometric authentication criteria include a requirement that a biometric feature of a respective type that is authorized to perform the first operation is detected by the biometric sensors; in accordance with a determination that the first biometric authentication criteria are met, performing the first operation; and in accordance with a determination that the biometric authentication criteria are not met, forgoing performing the first operation; after performing the first operation, receiving a second request to perform a second operation that requires authentication; and in response to receiving the second request: in accordance with a determination that re-authentication criteria have been met, using the one or more biometric sensors to determine whether second biometric authentication criteria are met, wherein the second biometric authentication criteria include a requirement that a biometric feature of a respective type that is authorized to perform the second operation is detected by the biometric sensors; and in accordance with a determination that the re-authentication criteria have not been met, performing the second operation without performing biometric authentication and forgoing using the one or more biometric sensors to determine whether the second biometric authentication criteria are met.

In accordance with some examples, an electronic device is described, the electronic device comprising: one or more biometric sensors; one or more processors; and memory storing one or more programs configured to be executed by the one or more processors, the one or more programs including instructions for: receiving a first request to perform a first operation that requires authentication; in response to receiving the first request to perform the first operation: using the one or more biometric sensors to determine whether first biometric authentication criteria are met, wherein the first biometric authentication criteria include a requirement that a biometric feature of a respective type that is authorized to perform the first operation is detected by the biometric sensors; in accordance with a determination that the first biometric authentication criteria are met, performing the first operation; and in accordance with a determination that the biometric authentication criteria are not met, forgoing performing the first operation; after performing the first operation, receiving a second request to perform a second operation that requires authentication; and in response to receiving the second request: in accordance with a determination that re-authentication criteria have been met, using the one or more biometric sensors to determine whether second biometric authentication criteria are met, wherein the second biometric authentication criteria include a requirement that a biometric feature of a respective type that is authorized to perform the second operation is detected by the biometric sensors; and in accordance with a determination that the re-authentication criteria have not been met, performing the second operation without performing biometric authentication and forgoing using the one or more biometric sensors to determine whether the second biometric authentication criteria are met.

In accordance with some examples, an electronic device is described, the electronic device comprising: one or more biometric sensors; means for receiving a first request to perform a first operation that requires authentication; means, responsive to receiving the first request to perform the first operation, for: using the one or more biometric sensors to determine whether first biometric authentication criteria are met, wherein the first biometric authentication criteria include a requirement that a biometric feature of a respective type that is authorized to perform the first operation is detected by the biometric sensors; in accordance with a determination that the first biometric authentication criteria are met, performing the first operation; and in accordance with a determination that the biometric authentication criteria are not met, forgoing performing the first operation; means, after performing the first operation, receiving a second request to perform a second operation that requires authentication, for; and means, responsive to receiving the second request, for: in accordance with a determination that re-authentication criteria have been met, using the one or more biometric sensors to determine whether second biometric authentication criteria are met, wherein the second biometric authentication criteria include a requirement that a biometric feature of a respective type that is authorized to perform the second operation is detected by the biometric sensors; and in accordance with a determination that the re-authentication criteria have not been met, performing the second operation without performing biometric authentication and forgoing using the one or more biometric sensors to determine whether the second biometric authentication criteria are met.

In accordance with some examples, a method is described, the method comprising: at an electronic device with a display: receiving a request to display a first portion of respective content; and in response to the request to display the first portion of the respective content: displaying, on the display, at least the first portion of the respective content, the respective content including an element associated with an authentication operation; in accordance with a determination that the element associated with the authentication operation meets visibility criteria, initiating biometric authentication; and in accordance with a determination that the element associated with the authentication operation does not meet the visibility criteria, forgoing initiating biometric authentication.

In accordance with some examples, a non-transitory computer-readable medium is described, the non-transitory computer-readable storage medium storing one or more programs configured to be executed by one or more processors of an electronic device with a display, the one or more programs including instructions for: receiving a request to display a first portion of respective content; and in response to the request to display the first portion of the respective content: displaying, on the display, at least the first portion of the respective content, the respective content including an element associated with an authentication operation; in accordance with a determination that the element associated with the authentication operation meets visibility criteria, initiating biometric authentication; and in accordance with a determination that the element associated with the authentication operation does not meet the visibility criteria, forgoing initiating biometric authentication.

In accordance with some examples, a transitory computer-readable medium is described, the transitory computer-readable storage medium comprising one or more programs configured to be executed by one or more processors of an electronic device with a display, the one or more programs including instructions for: receiving a request to display a first portion of respective content; and in response to the request to display the first portion of the respective content: displaying, on the display, at least the first portion of the respective content, the respective content including an element associated with an authentication operation; in accordance with a determination that the element associated with the authentication operation meets visibility criteria, initiating biometric authentication; and in accordance with a determination that the element associated with the authentication operation does not meet the visibility criteria, forgoing initiating biometric authentication.

In accordance with some examples, an electronic device is described, the electronic device comprising: a display; one or more processors; and memory storing one or more programs configured to be executed by the one or more processors, the one or more programs including instructions for: receiving a request to display a first portion of respective content; and in response to the request to display the first portion of the respective content: displaying, on the display, at least the first portion of the respective content, the respective content including an element associated with an authentication operation; in accordance with a determination that the element associated with the authentication operation meets visibility criteria, initiating biometric authentication; and in accordance with a determination that the element associated with the authentication operation does not meet the visibility criteria, forgoing initiating biometric authentication.

In accordance with some examples, an electronic device is described, the electronic device comprising: a display; means for receiving a request to display a first portion of respective content; and means, responsive to the request to display the first portion of the respective content, for: displaying, on the display, at least the first portion of the respective content, the respective content including an element associated with an authentication operation; in accordance with a determination that the element associated with the authentication operation meets visibility criteria, initiating biometric authentication; and in accordance with a determination that the element associated with the authentication operation does not meet the visibility criteria, forgoing initiating biometric authentication.

In accordance with some examples, a method is described, the method comprising: at an electronic device with a display and one or more biometric sensors: detecting a predefined operation corresponding to a credential submission user interface having a credential submission user interface element; and in response to detecting the predefined operation: in accordance with a determination that biometric authentication via the one or more biometric sensors is available, displaying, on the display, the credential submission user interface with a visual indication that presentation of a biometric feature that meets biometric authentication criteria to the one or more biometric sensors will cause credentials to be submitted via the credential submission user interface element.

In accordance with some examples, a non-transitory computer-readable medium is described, the non-transitory computer-readable storage medium storing one or more programs configured to be executed by one or more processors of an electronic device with a display and one or more biometric sensors, the one or more programs including instructions for: detecting a predefined operation corresponding to a credential submission user interface having a credential submission user interface element; and in response to detecting the predefined operation: in accordance with a determination that biometric authentication via the one or more biometric sensors is available, displaying, on the display, the credential submission user interface with a visual indication that presentation of a biometric feature that meets biometric authentication criteria to the one or more biometric sensors will cause credentials to be submitted via the credential submission user interface element.

In accordance with some examples, a transitory computer-readable medium is described, the transitory computer-readable storage medium storing one or more programs configured to be executed by one or more processors of an electronic device with a display and one or more biometric sensors, the one or more programs including instructions for: detecting a predefined operation corresponding to a credential submission user interface having a credential submission user interface element; and in response to detecting the predefined operation: in accordance with a determination that biometric authentication via the one or more biometric sensors is available, displaying, on the display, the credential submission user interface with a visual indication that presentation of a biometric feature that meets biometric authentication criteria to the one or more biometric sensors will cause credentials to be submitted via the credential submission user interface element.

In accordance with some examples, an electronic device is described, the electronic device comprising: a display; one or more biometric sensors; one or more processors; and memory storing one or more programs configured to be executed by the one or more processors, the one or more programs including instructions for: detecting a predefined operation corresponding to a credential submission user interface having a credential submission user interface element; and in response to detecting the predefined operation: in accordance with a determination that biometric authentication via the one or more biometric sensors is available, displaying, on the display, the credential submission user interface with a visual indication that presentation of a biometric feature that meets biometric authentication criteria to the one or more biometric sensors will cause credentials to be submitted via the credential submission user interface element.

In accordance with some examples, an electronic device is described, the electronic device comprising: a display; one or more biometric sensors; means for detecting a predefined operation corresponding to a credential submission user interface having a credential submission user interface element; and means, responsive to detecting the predefined operation, for: in accordance with a determination that biometric authentication via the one or more biometric sensors is available, displaying, on the display, the credential submission user interface with a visual indication that presentation of a biometric feature that meets biometric authentication criteria to the one or more biometric sensors will cause credentials to be submitted via the credential submission user interface element.

In accordance with some examples, a method is described, the method comprising: at an electronic device with a touch-sensitive display and one or more biometric sensors: displaying, on the touch-sensitive display, a credential entry user interface with a plurality of character entry keys; while displaying the credential entry user interface, receiving, via the touch-sensitive display, a touch gesture input that includes movement of a contact on the touch-sensitive display; and in response to receiving the touch gesture input that includes movement of the contact on the touch-sensitive display: in accordance with a determination that a first set of one or more criteria are met, the first set of one or more criteria including a requirement that biometric authentication is currently enabled on the electronic device, attempting to biometrically authenticate a user of the electronic device based on biometric information captured using the one or more biometric sensors.

In accordance with some examples, a non-transitory computer-readable medium is described, the non-transitory computer-readable storage medium comprising one or more programs configured to be executed by one or more processors of an electronic device with a touch-sensitive display and one or more biometric sensors, the one or more programs including instructions for: displaying, on the touch-sensitive display, a credential entry user interface with a plurality of character entry keys; while displaying the credential entry user interface, receiving, via the touch-sensitive display, a touch gesture input that includes movement of a contact on the touch-sensitive display; and in response to receiving the touch gesture input that includes movement of the contact on the touch-sensitive display: in accordance with a determination that a first set of one or more criteria are met, the first set of one or more criteria including a requirement that biometric authentication is currently enabled on the electronic device, attempting to biometrically authenticate a user of the electronic device based on biometric information captured using the one or more biometric sensors.

In accordance with some examples, a transitory computer-readable medium is described, the transitory computer-readable storage medium comprising one or more programs configured to be executed by one or more processors of an electronic device with a touch-sensitive display and one or more biometric sensors, the one or more programs including instructions for: displaying, on the touch-sensitive display, a credential entry user interface with a plurality of character entry keys; while displaying the credential entry user interface, receiving, via the touch-sensitive display, a touch gesture input that includes movement of a contact on the touch-sensitive display; and in response to receiving the touch gesture input that includes movement of the contact on the touch-sensitive display: in accordance with a determination that a first set of one or more criteria are met, the first set of one or more criteria including a requirement that biometric authentication is currently enabled on the electronic device, attempting to biometrically authenticate a user of the electronic device based on biometric information captured using the one or more biometric sensors.

In accordance with some examples, an electronic device is described, the electronic device comprising: one or more biometric sensors; a touch-sensitive display; one or more processors; and memory storing one or more programs configured to be executed by the one or more processors, the one or more programs including instructions for: displaying, on the touch-sensitive display, a credential entry user interface with a plurality of character entry keys; while displaying the credential entry user interface, receiving, via the touch-sensitive display, a touch gesture input that includes movement of a contact on the touch-sensitive display; and in response to receiving the touch gesture input that includes movement of the contact on the touch-sensitive display: in accordance with a determination that a first set of one or more criteria are met, the first set of one or more criteria including a requirement that biometric authentication is currently enabled on the electronic device, attempting to biometrically authenticate a user of the electronic device based on biometric information captured using the one or more biometric sensors.

In accordance with some examples, an electronic device is described, the electronic device comprising: one or more biometric sensors; a touch-sensitive display; means for displaying, on the touch-sensitive display, a credential entry user interface with a plurality of character entry keys; means for, while displaying the credential entry user interface, receiving, via the touch-sensitive display, a touch gesture input that includes movement of a contact on the touch-sensitive display; and means for, in response to receiving the touch gesture input that includes movement of the contact on the touch-sensitive display: in accordance with a determination that a first set of one or more criteria are met, the first set of one or more criteria including a requirement that biometric authentication is currently enabled on the electronic device, attempting to biometrically authenticate a user of the electronic device based on biometric information captured using the one or more biometric sensors.

In accordance with some embodiments, a method is described, the method comprising: at an electronic device with a display and one or more input devices: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, a non-transitory computer-readable medium is described, the non-transitory computer-readable storage medium comprising one or more programs configured to be executed by one or more processors of an electronic device with a display and one or more input devices, the one or more programs including instructions for: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, a transitory computer-readable medium is described, the transitory computer-readable storage medium comprising one or more programs configured to be executed by one or more processors of an electronic device with a display and one or more input devices, the one or more programs including instructions for: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, an electronic device is described, the electronic device comprising: one or more input devices; a display; one or more processors; and memory storing one or more programs configured to be executed by the one or more processors, the one or more programs including instructions for: receiving, via the one or more input devices, a request to perform an operation that requires authentication; and in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, an electronic device is described, the electronic device comprising: one or more input devices; a display; means for receiving, via the one or more input devices, a request to perform an operation that requires authentication; and means for, in response to the request to perform the operation that requires authentication: in accordance with a determination that authentication is successful, performing the operation; and in accordance with a determination that authentication is not successful and that a set of error condition criteria is met: displaying, on the display, an indication of an error condition, wherein the indication includes information about the cause of the error condition; and forgoing performing the operation.

In accordance with some examples, a method is described, the method comprising: at an electronic device with a display and a biometric sensor at a first portion of the electronic device: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, a non-transitory computer-readable medium is described, the non-transitory computer-readable storage medium comprising one or more programs configured to be executed by one or more processors of an electronic device with a display and a biometric sensor at a first portion of the electronic device, the one or more programs including instructions for: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, a transitory computer-readable medium is described, the transitory computer-readable storage medium comprising one or more programs configured to be executed by one or more processors of an electronic device with a display and a biometric sensor at a first portion of the electronic device, the one or more programs including instructions for: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, an electronic device is described, the electronic device comprising: a biometric sensor at a first portion of the electronic device; a display; one or more processors; and memory storing one or more programs configured to be executed by the one or more processors, the one or more programs including instructions for: detecting the existence of an error condition that prevents the biometric sensor from obtaining biometric information about a user of the device; in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, an electronic device is described, the electronic device comprising: a biometric sensor at a first portion of the electronic device; a display; means for detecting the existence of an error condition that prevents the biometric sensor from obtaining biometric information about a user of the device; means for, in response to detecting the existence of the error condition, displaying, on the display, an error indication, wherein the error indication is displayed at a location that is proximate to the first portion of the electronic device, including: in accordance with a determination that a user interface of the electronic device is in a first orientation relative to the biometric sensor, displaying the error indication at a first location in the user interface that is proximate to the first portion of the electronic device; and in accordance with a determination that the user interface of the electronic device is in a second orientation relative to the biometric sensor, displaying the error indication at a second location in the user interface that is proximate to the first portion of the electronic device, the first orientation being different from the second orientation.

In accordance with some examples, a method is described, the method comprising: at an electronic device with a display and one or more biometric sensors: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, a non-transitory computer-readable medium is described, the non-transitory computer-readable storage medium comprising one or more programs configured to be executed by one or more processors of an electronic device with a display and one or more biometric sensors, the one or more programs including instructions for: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, a transitory computer-readable medium is described, the transitory computer-readable storage medium comprising one or more programs configured to be executed by one or more processors of an electronic device with a display and one or more biometric sensors, the one or more programs including instructions for: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, an electronic device is described, the electronic device comprising: one or more biometric sensors; a display; one or more processors; and memory storing one or more programs configured to be executed by the one or more processors, the one or more programs including instructions for: displaying, on the display, a biometric enrollment user interface for initiating biometric enrollment with the one or more biometric sensors; while displaying the biometric enrollment user interface, receiving input corresponding for a request to initiate biometric enrollment; and in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

In accordance with some examples, an electronic device is described, the electronic device comprising: one or more biometric sensors; a display; means for displaying, on the display, a biometric enrollment user interface for initiating biometric enrollment with the one or more biometric sensors; means for, while displaying the biometric enrollment user interface, receiving input corresponding for a request to initiate biometric enrollment; and means for, in response to receiving the input: in accordance with a determination that an orientation of the electronic device satisfies a set of enrollment criteria, initiating a process for enrolling a biometric feature with the one or more biometric sensors; and in accordance with a determination that the orientation of the electronic device does not satisfy the set of enrollment criteria, outputting one or more prompts to change the orientation of the electronic device to a different orientation that satisfies the set of enrollment criteria.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for implementing biometric authentication, thereby increasing the effectiveness, efficiency, and user satisfaction with such devices. Such methods and interfaces optionally complement or replace other methods for implementing biometric authentication.

DESCRIPTION OF THE FIGURES

For a better understanding of the various described examples, reference should be made to the Description of Embodiments below, in conjunction with the following drawings in which like reference numerals refer to corresponding parts throughout the figures.

FIGS. 10A-10F are a flow diagram illustrating methods of aligning a biometric feature for enrollment.

FIGS. 14A-14C are a flow diagram illustrating methods of providing hints during a biometric enrollment process.

FIGS. 16A-16E are a flow diagram illustrating methods of application-based biometric authentication.

FIGS. 20A-20F are a flow diagram illustrating methods of unlocking a device using biometric authentication.

FIGS. 22A-22F are a flow diagram illustrating methods of for retrying biometric authentication.

FIGS. 27A-27E are a flow diagram illustrating methods of providing interstitial user interfaces during biometric authentication.

FIGS. 29A-29B are a flow diagram illustrating methods of preventing retrying biometric authentication.

FIGS. 31A-31B are a flow diagram illustrating methods of cached biometric authentication.

FIGS. 37A-37B are flow diagrams illustrating a method for retrying biometric authentication at a credential entry user interface using an electronic device, in accordance with some examples.

FIGS. 39A-39B are flow diagrams illustrating a method for providing indications of error conditions during biometric authentication, in accordance with some examples

FIGS. 41A-41C are flow diagrams illustrating a method for providing indications about the biometric sensor during biometric authentication, in accordance with some examples.

FIGS. 43A-43C are flow diagrams illustrating a method for orienting the device to enroll a biometric feature, in accordance with some examples.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for implementing biometric authentication of biometric features. For example, there is a need for electronic devices that provide a convenient and efficient method for enrolling one or more portions of a biometric feature. For another example, there is a need for electronic devices that provide a quick and intuitive technique for selectively accessing secure data in accordance with biometric authentication. For another example, there is a need for electronic devices that provide a quick and intuitive technique for enabling a function of a device in accordance with biometric authentication. Such techniques can reduce the cognitive burden on a user who enrolls a biometric feature and/or biometrically authenticates with a device, thereby enhancing overall productivity. Further, such techniques can reduce processor and battery power otherwise wasted on redundant user inputs.

Figure 6:
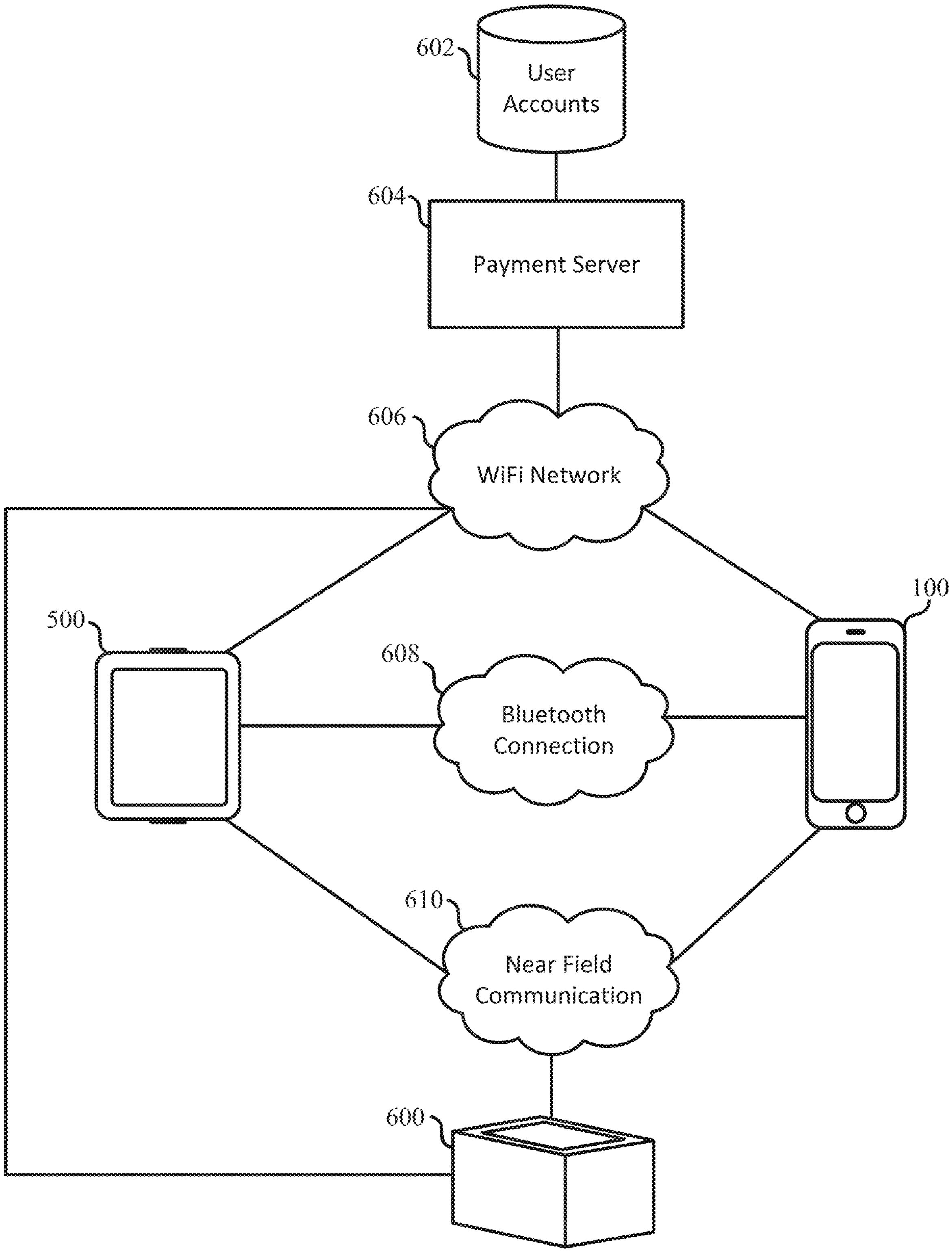
FIG. 6 illustrates exemplary devices connected via one or more communication channels, in accordance with some embodiments.
Figure 7A:
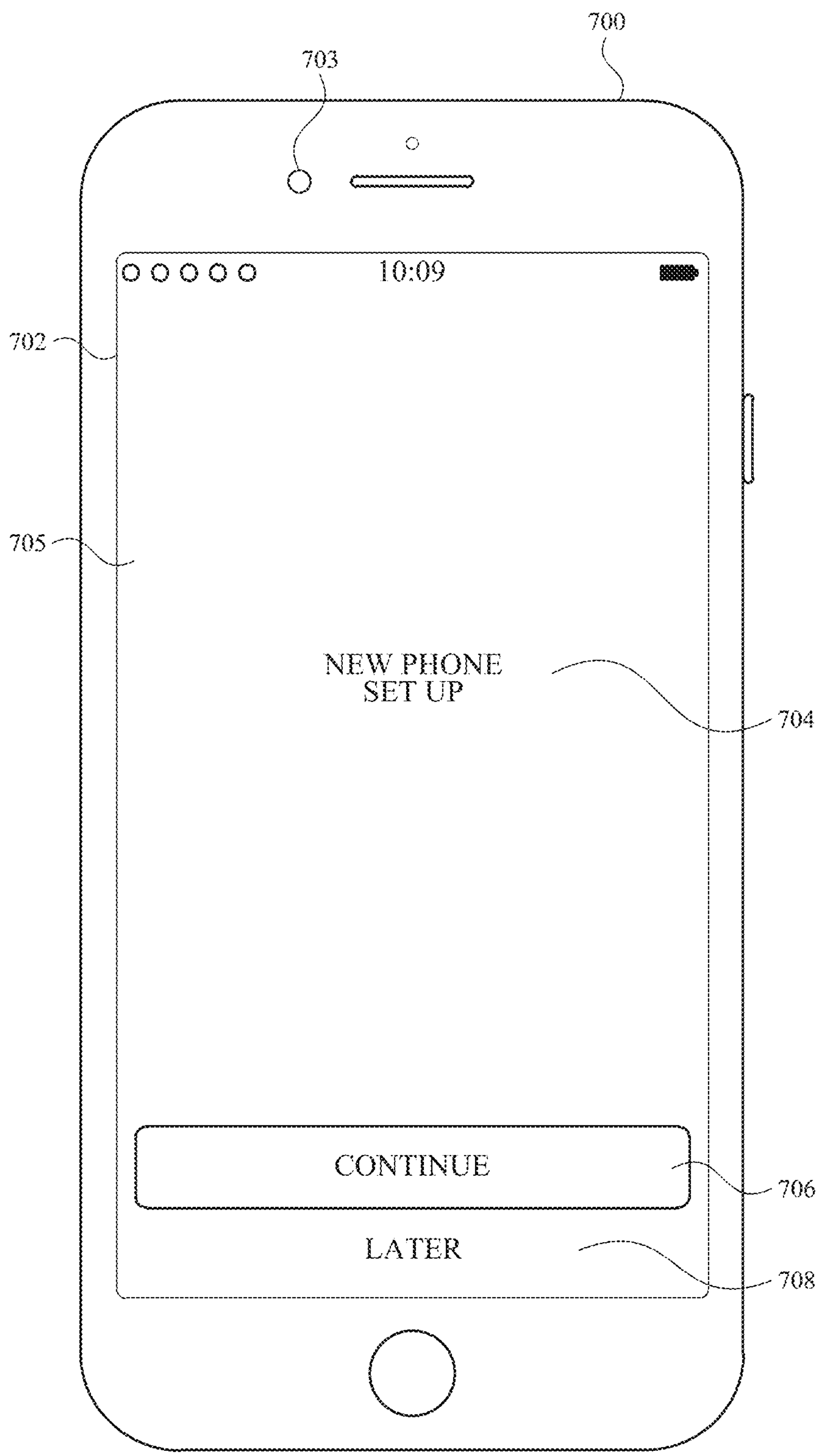
FIGS. 7A-7S illustrate exemplary user interfaces for a biometric enrollment process tutorial, in accordance with some examples.
Figure 7S:
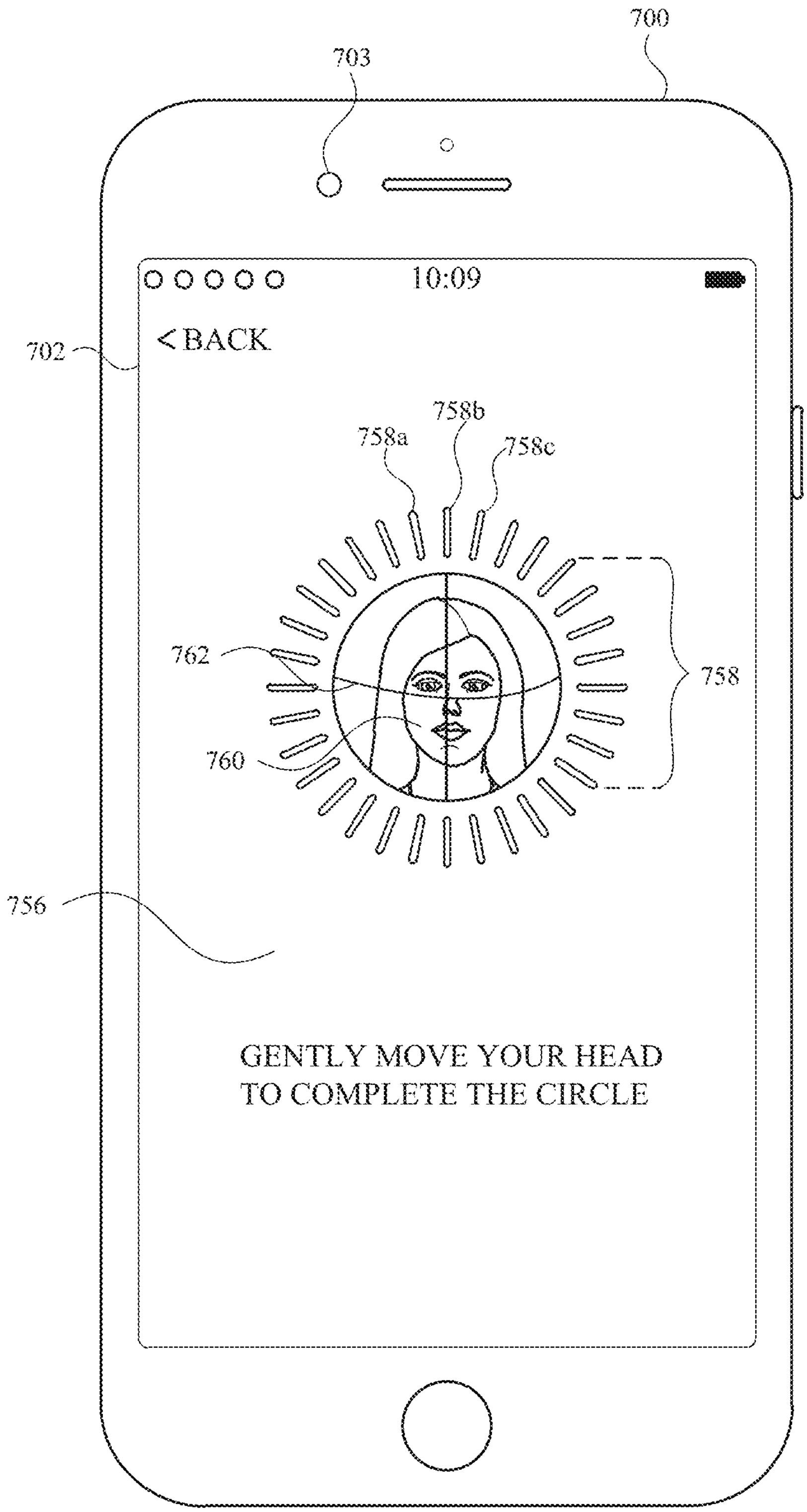
Figure 8A:
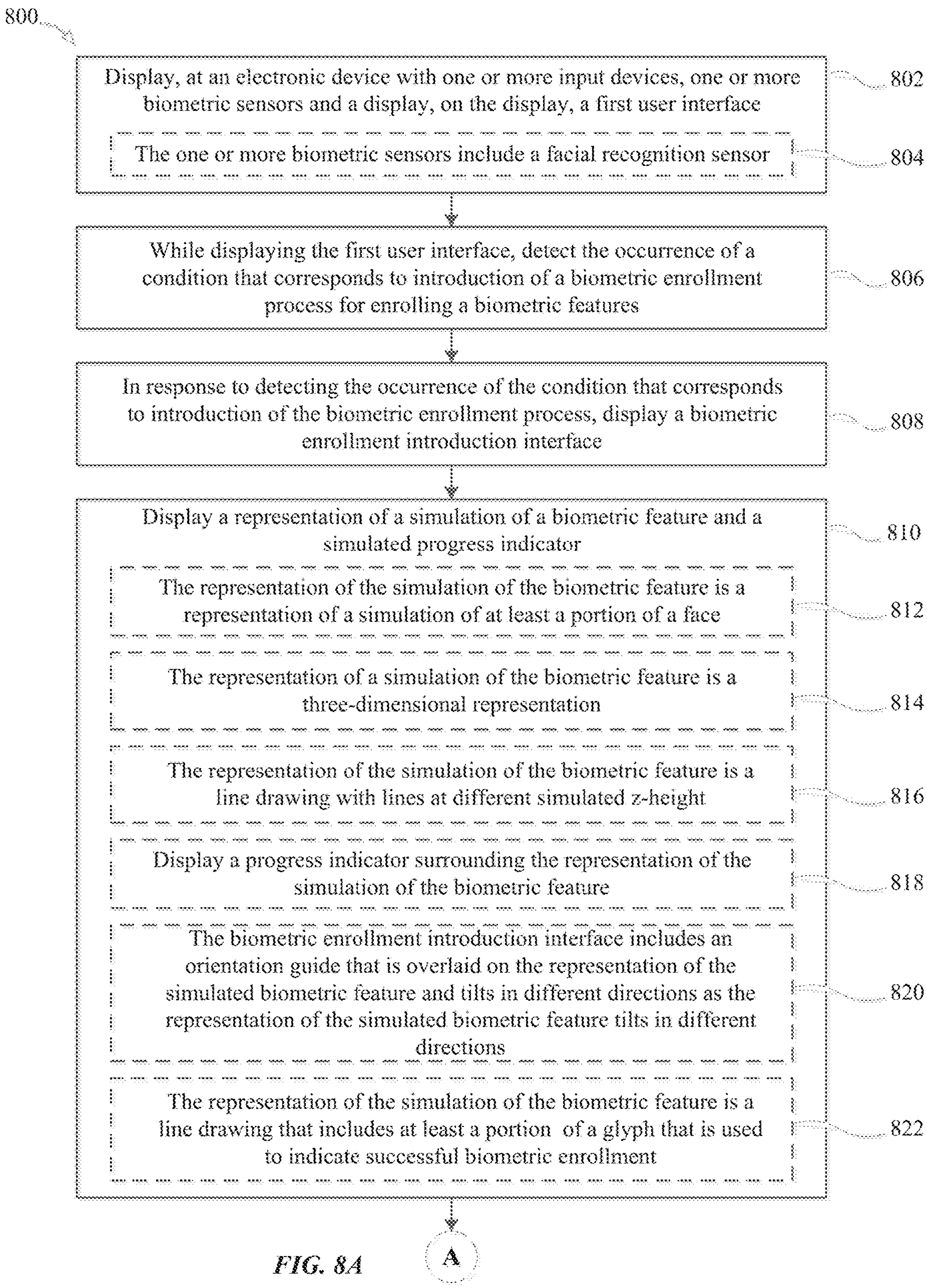
FIGS. 8A-8C are a flow diagram illustrating methods of a biometric enrollment process tutorial.
Figure 8B:
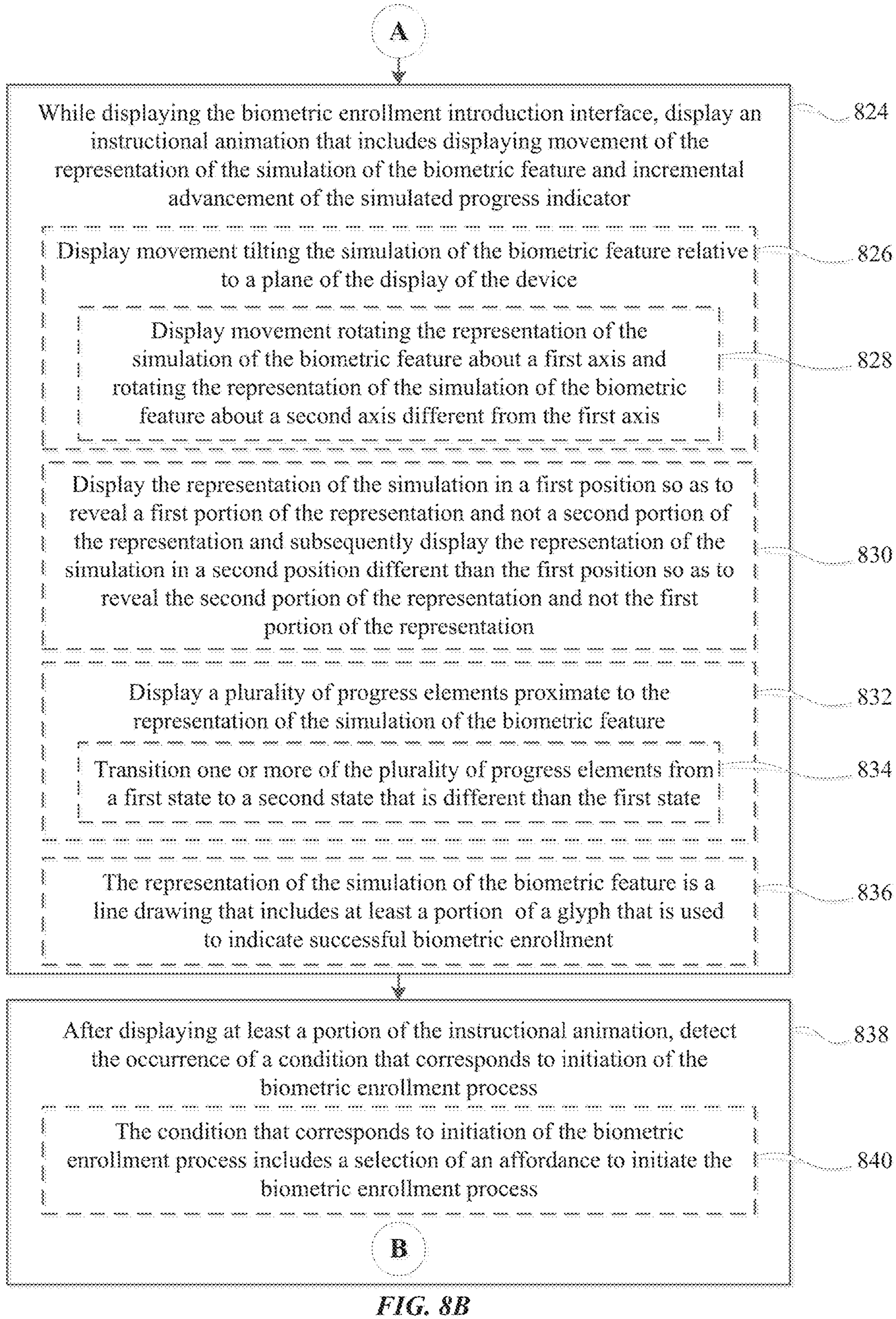
Figure 8C:
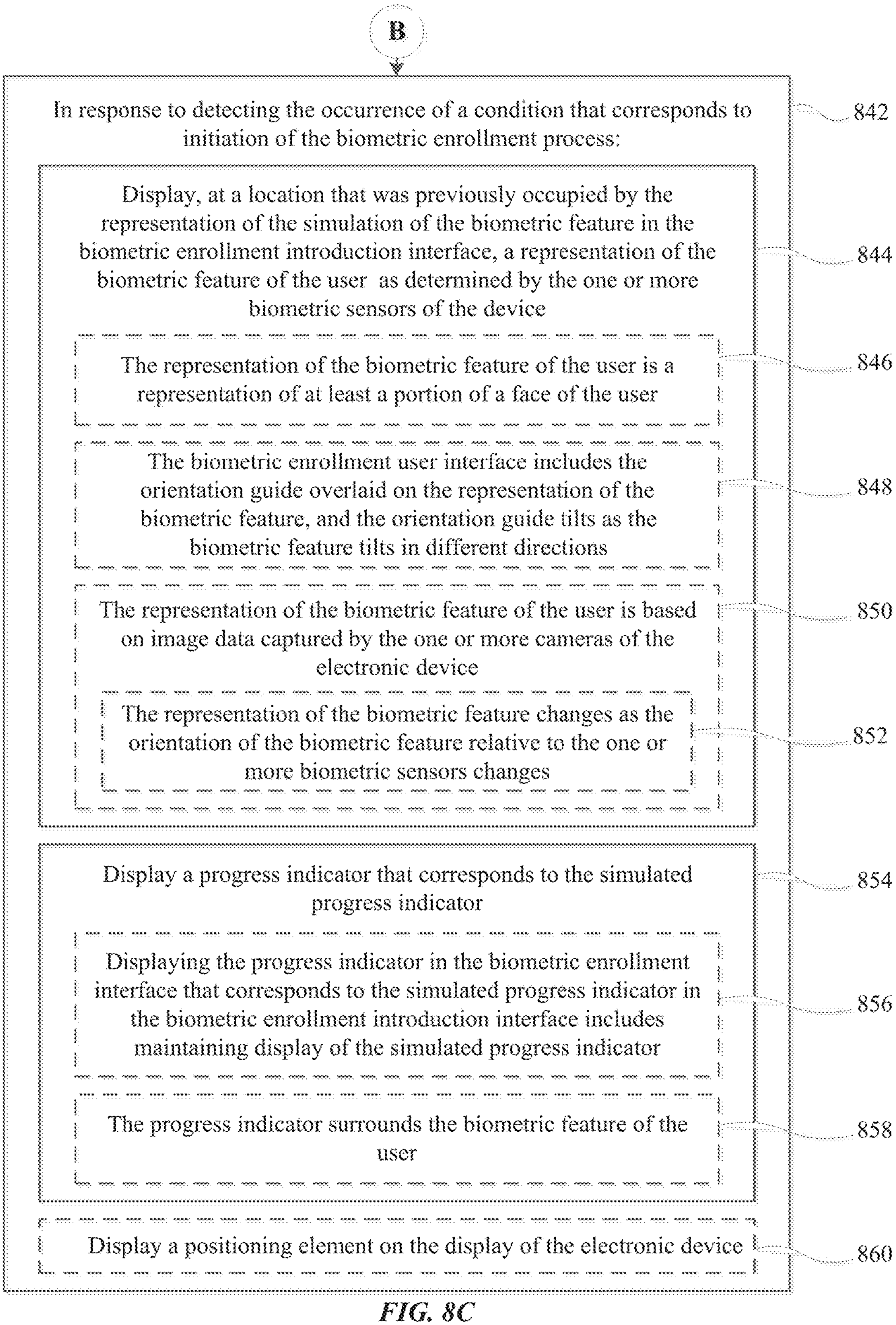
Figure 9A:
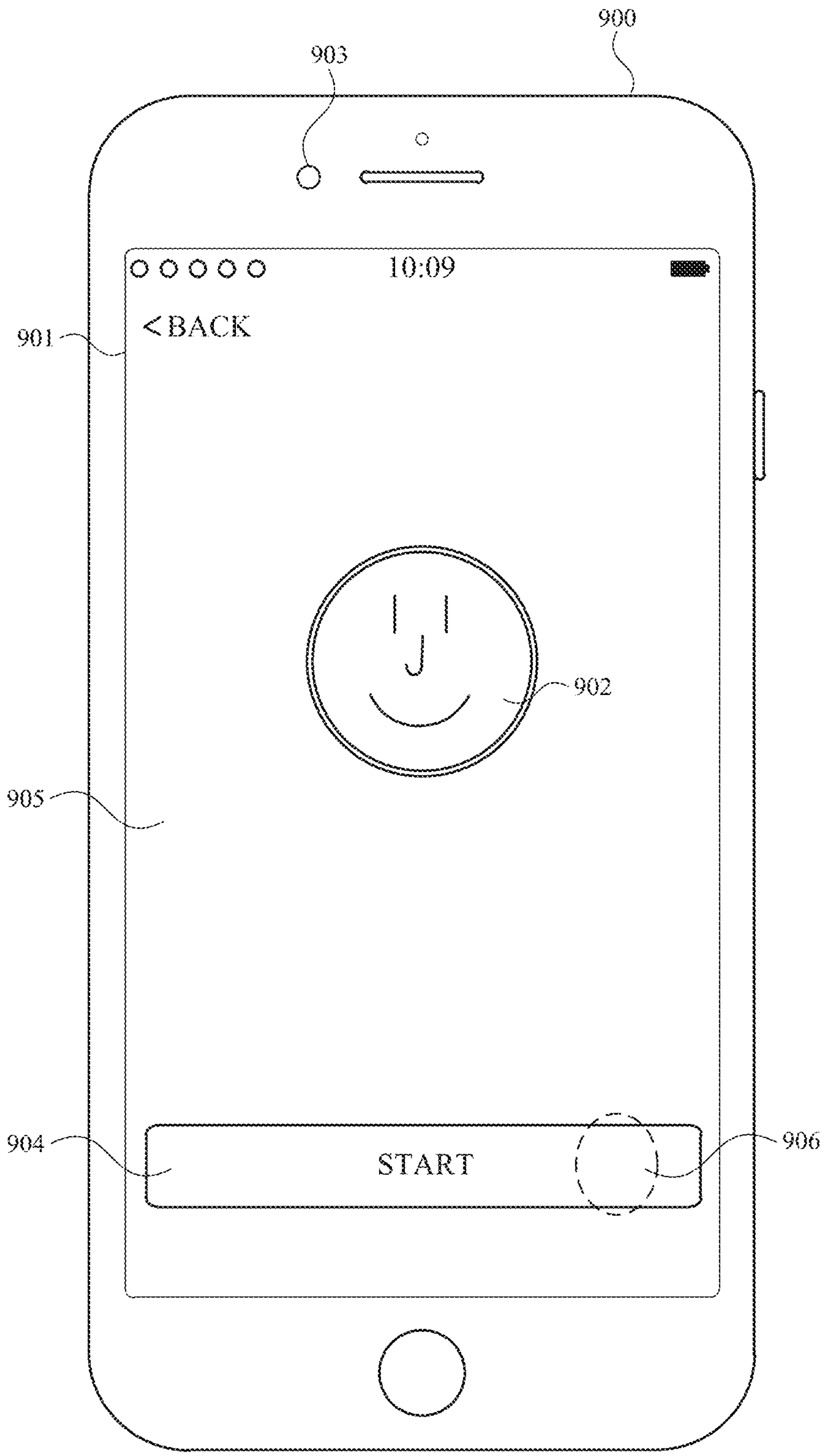
FIGS. 9A-9AE illustrate exemplary user interfaces for aligning a biometric feature for enrollment.
Figure 11A:
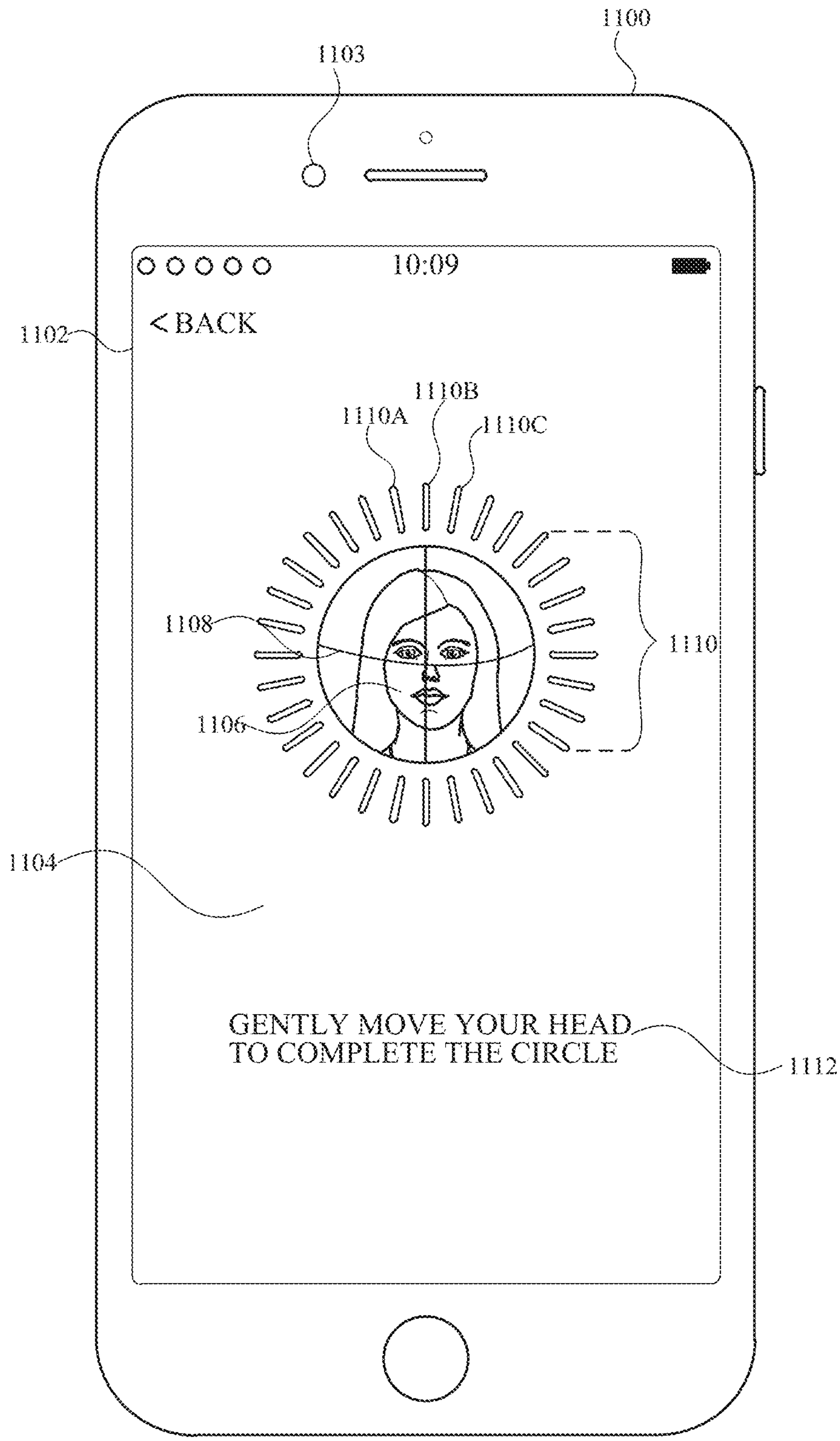
FIGS. 11A-11O illustrate exemplary user interfaces for enrolling a biometric feature.
Figure 11O:
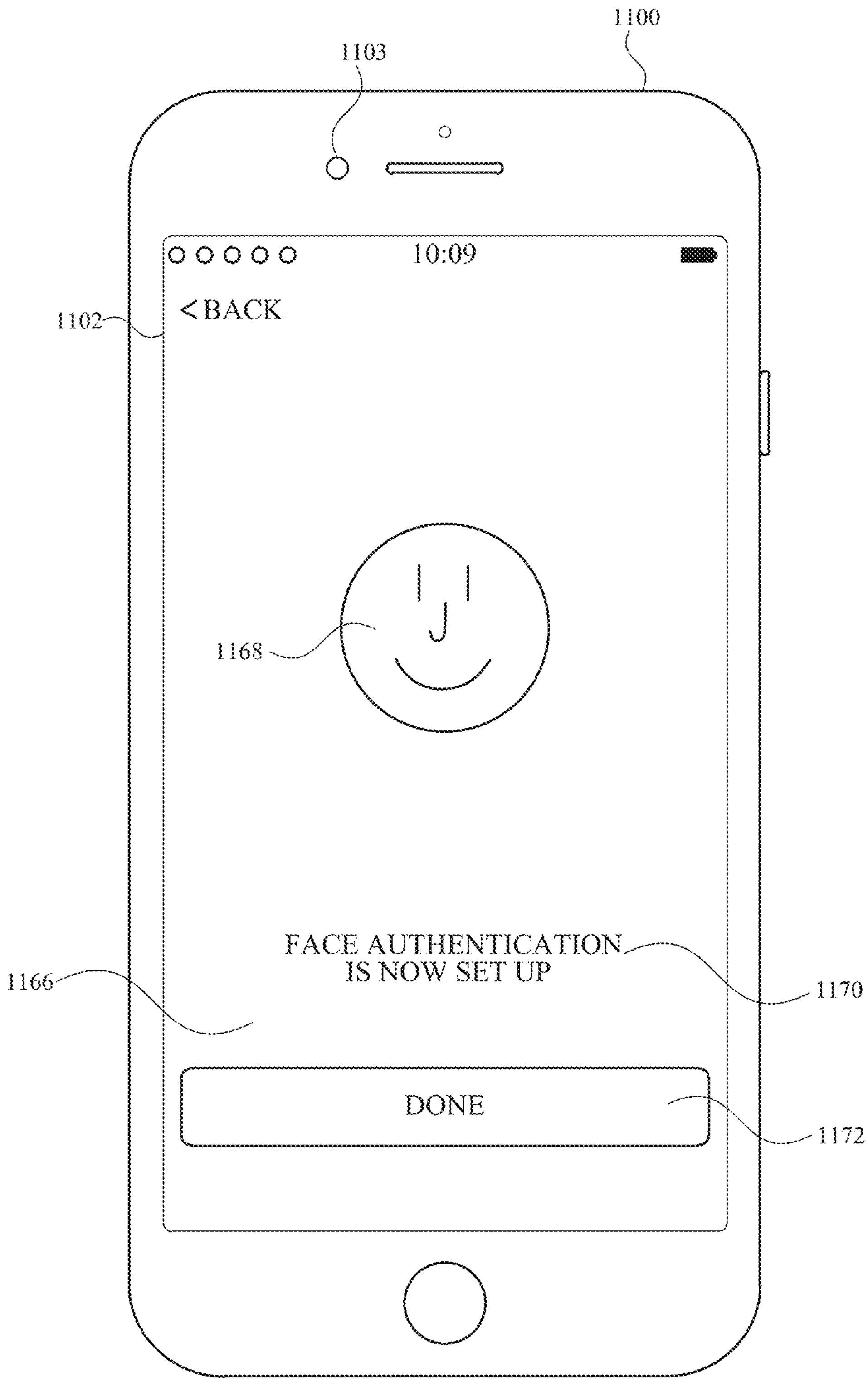
Figure 12A:
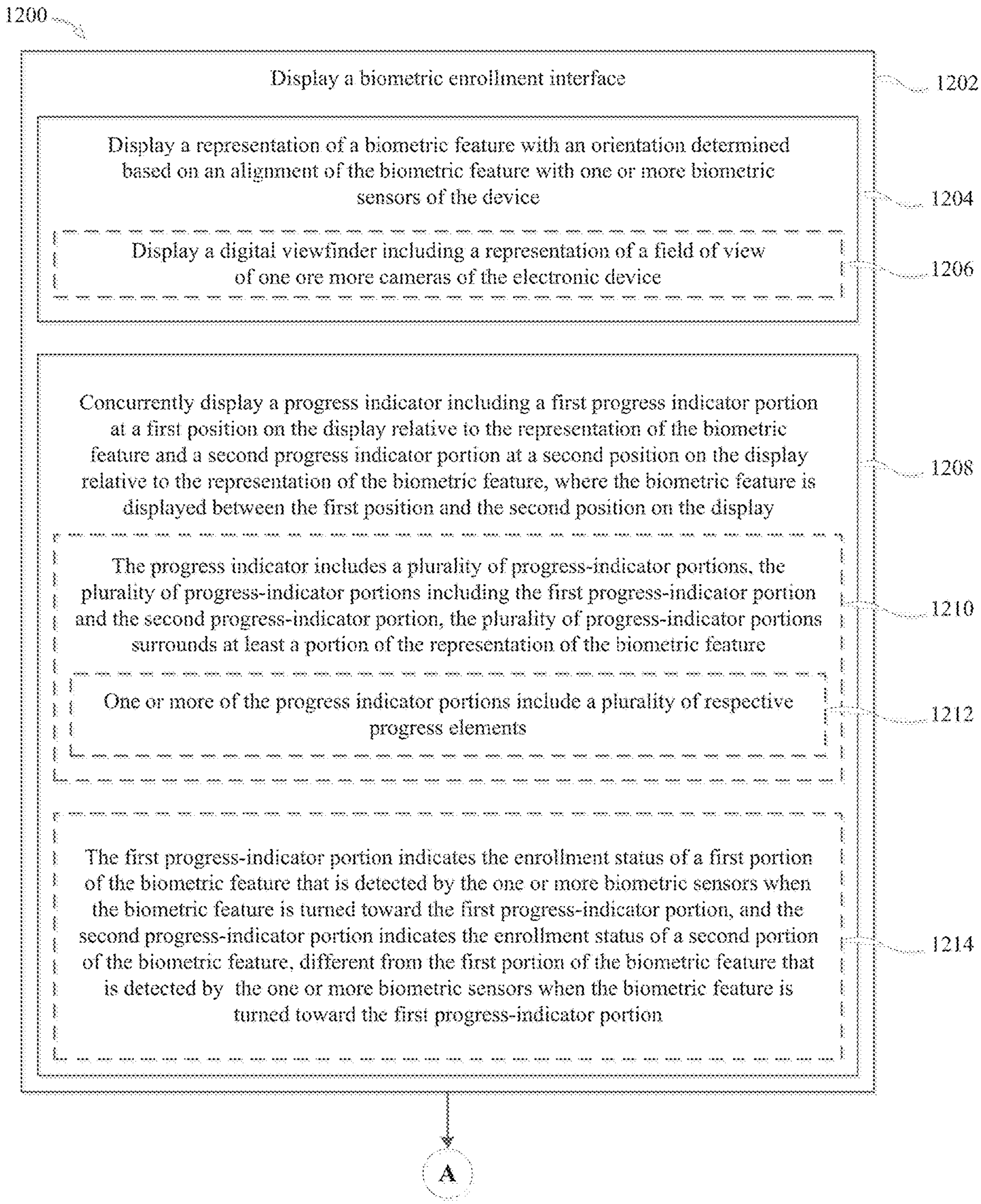
FIGS. 12A-12B are a flow diagram illustrating methods of enrolling a biometric feature.
Figure 12B:
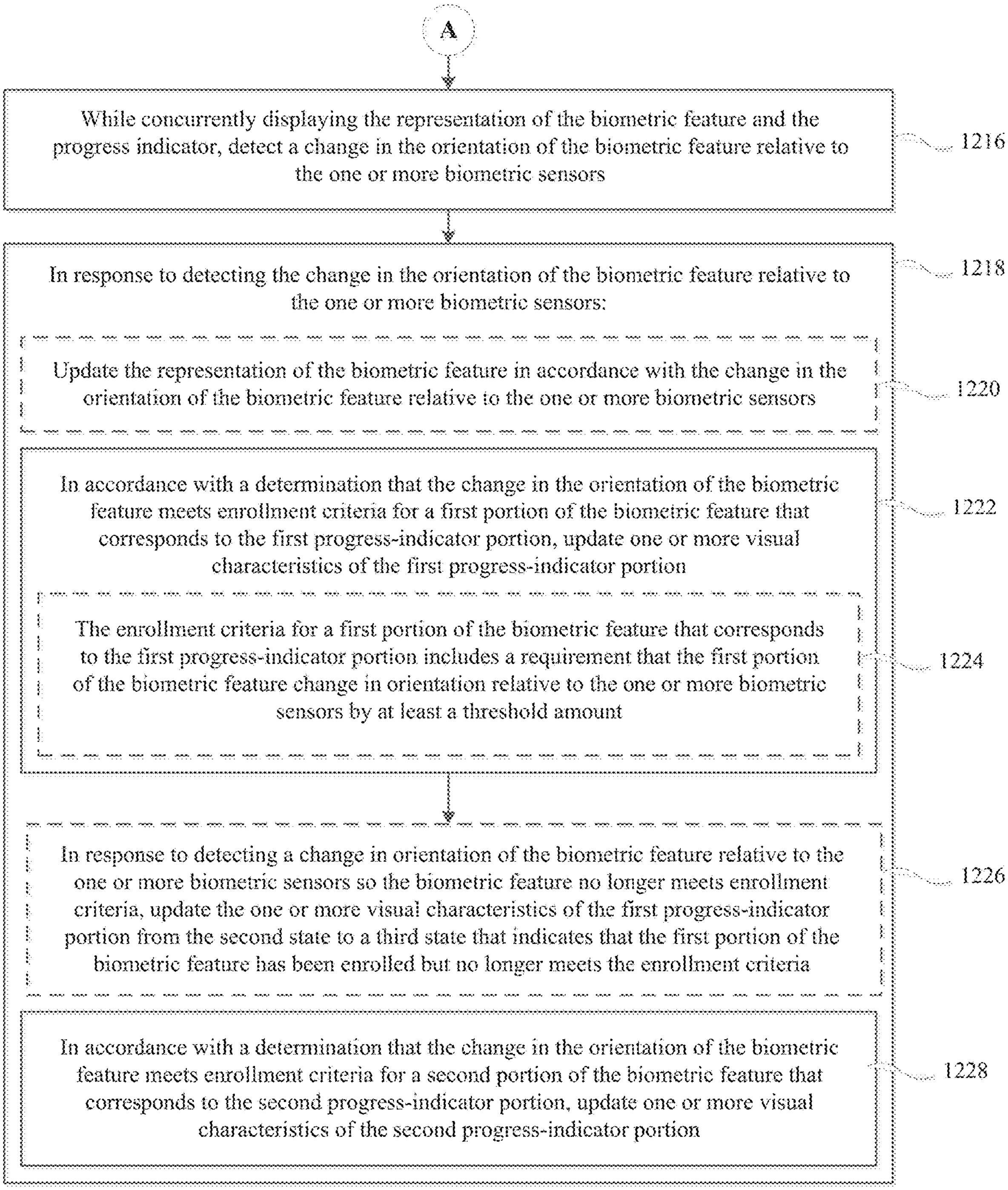
Figure 13A:
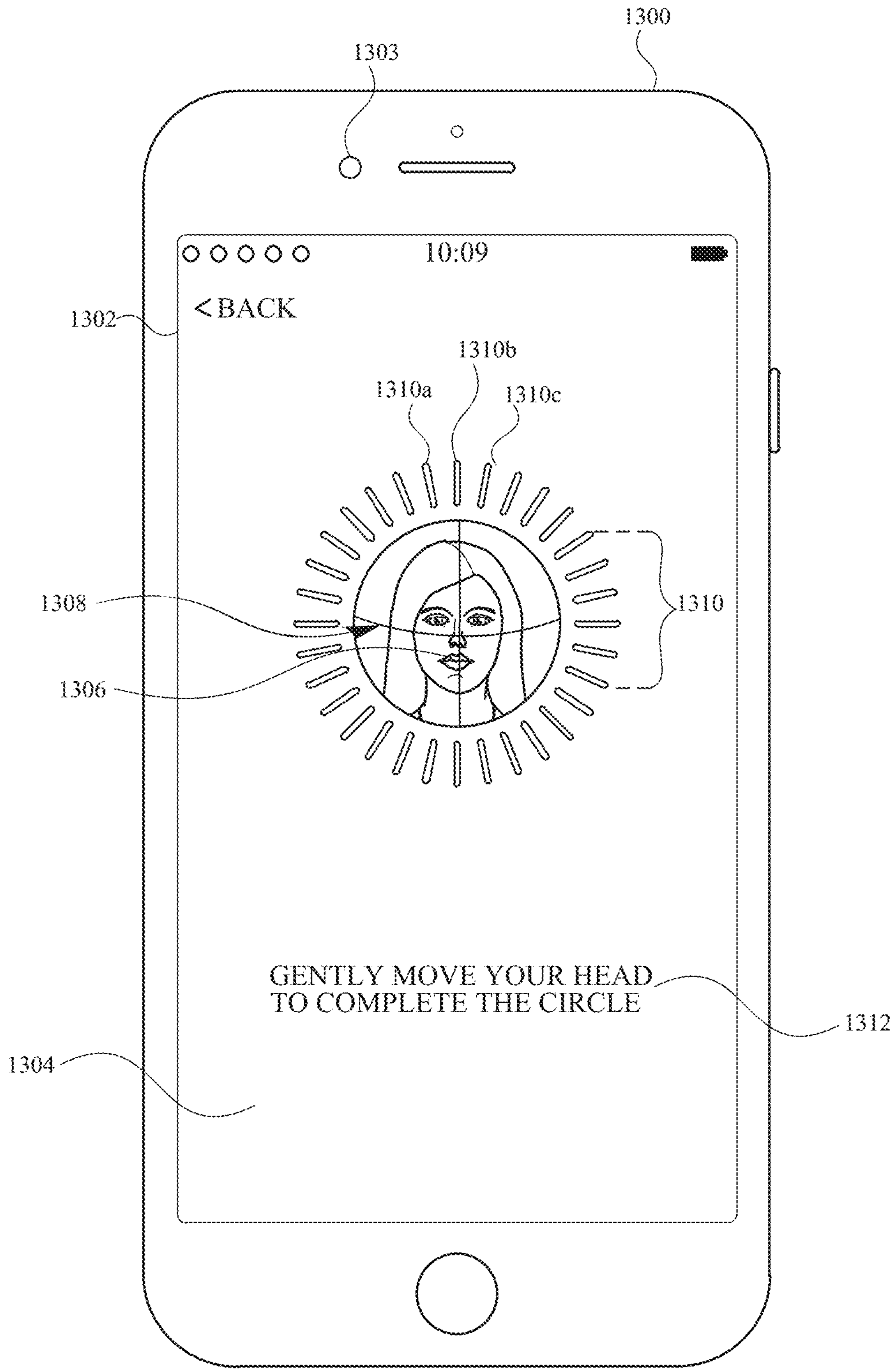
FIGS. 13A-13R illustrate exemplary user interfaces for providing hints during a biometric enrollment process.
Figure 13R:
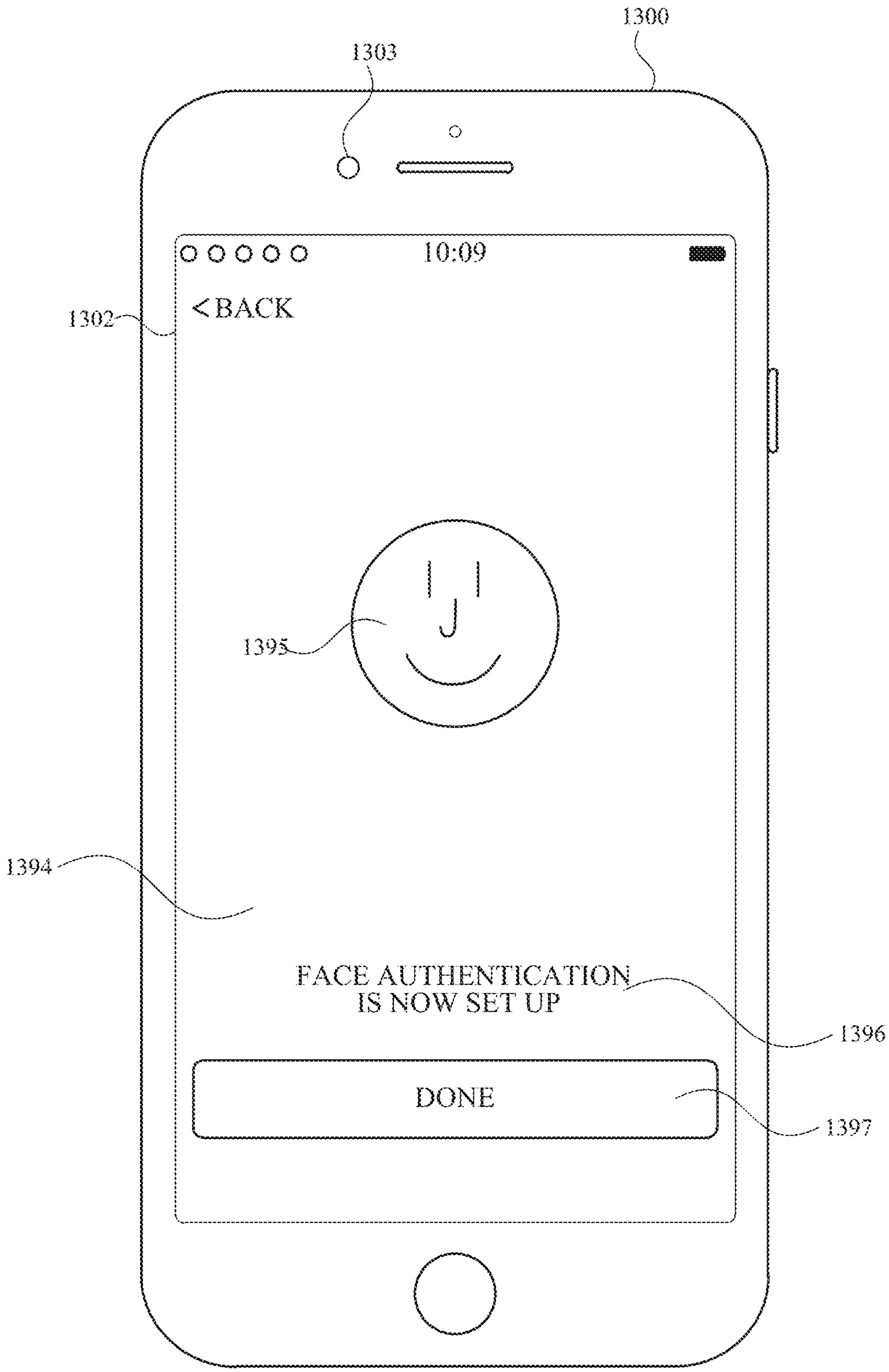
Figure 14A:
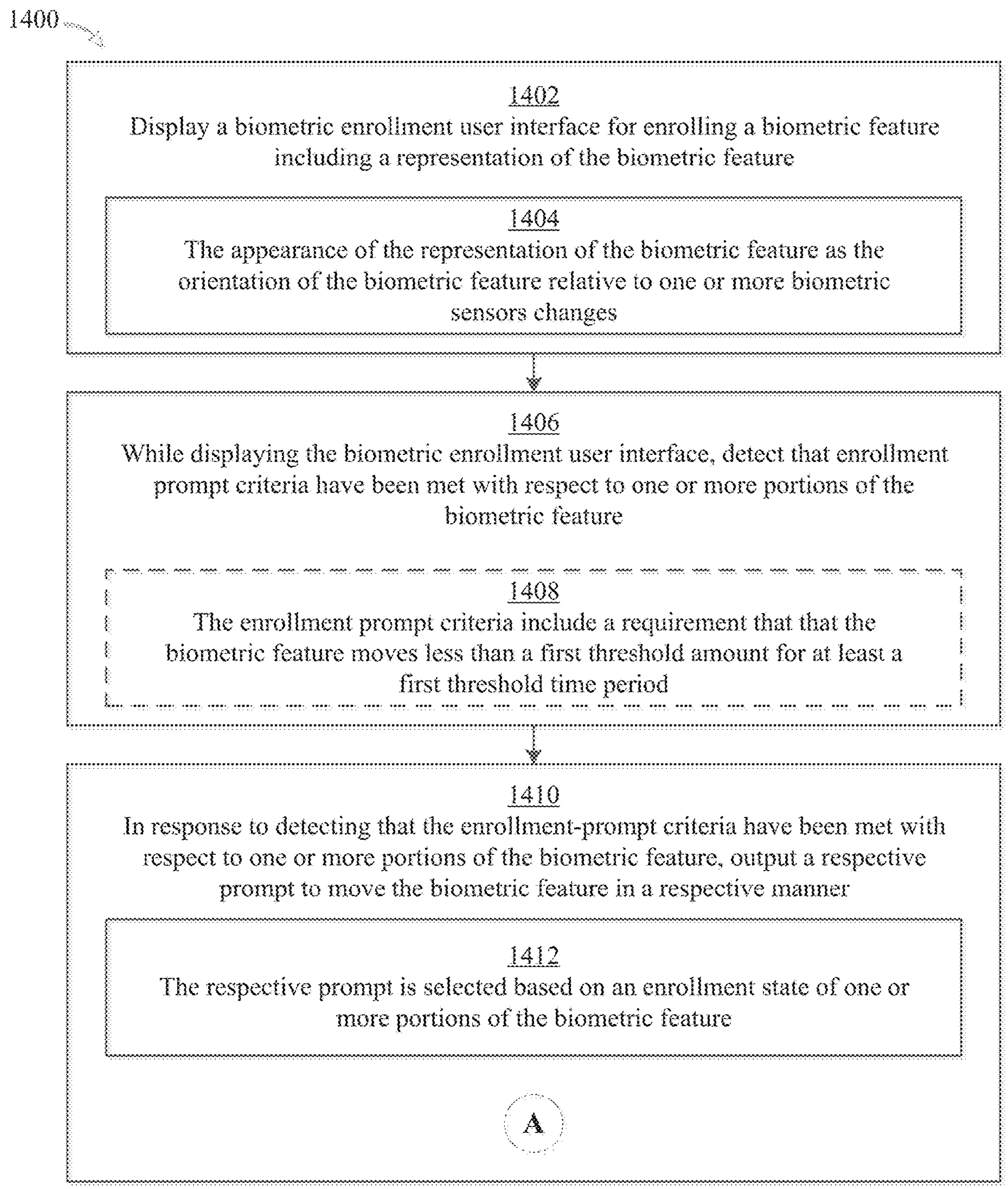
Figure 15A:
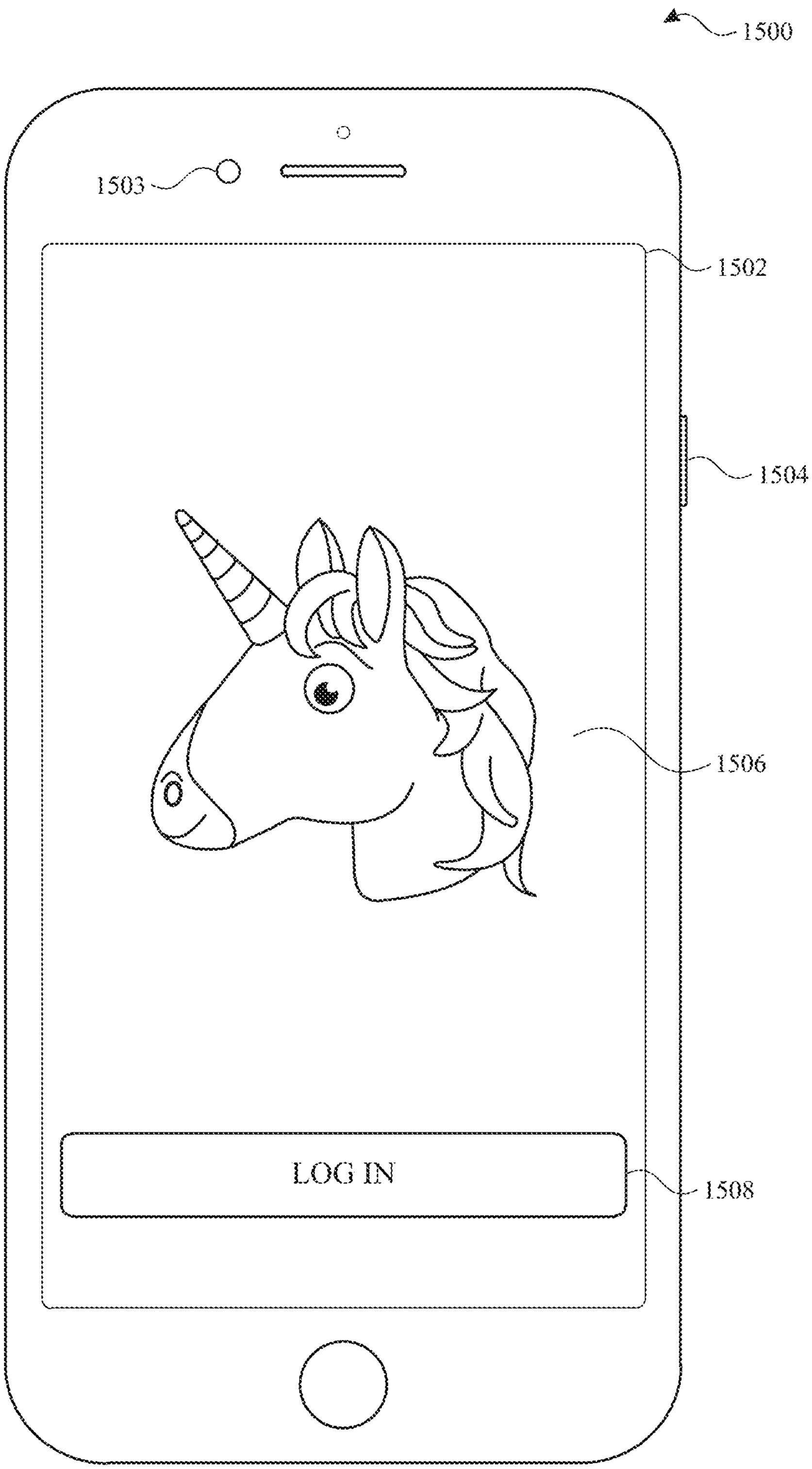
FIGS. 15A-15T illustrate exemplary user interfaces for application-based biometric authentication.
Figure 15B:
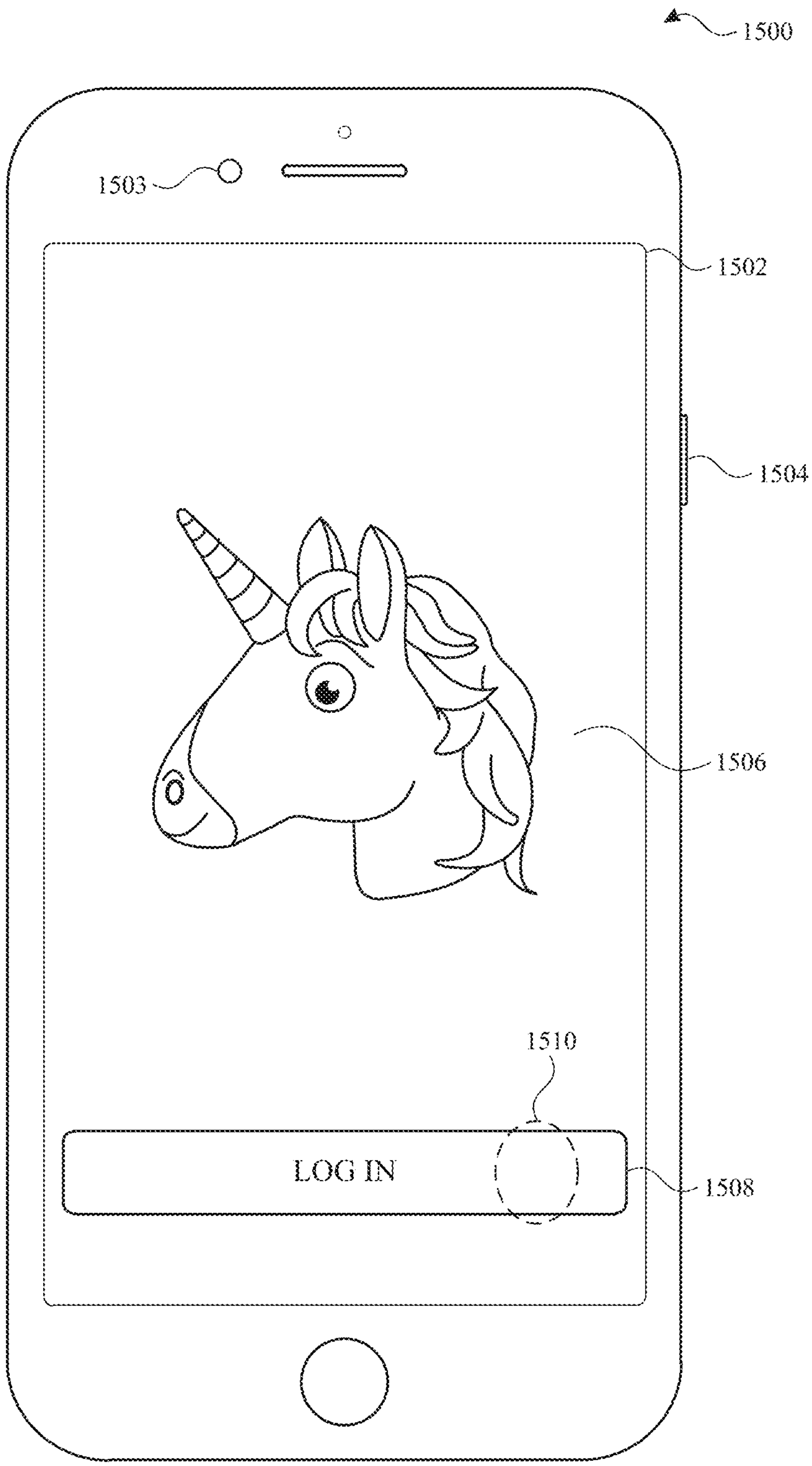
Figure 17A:
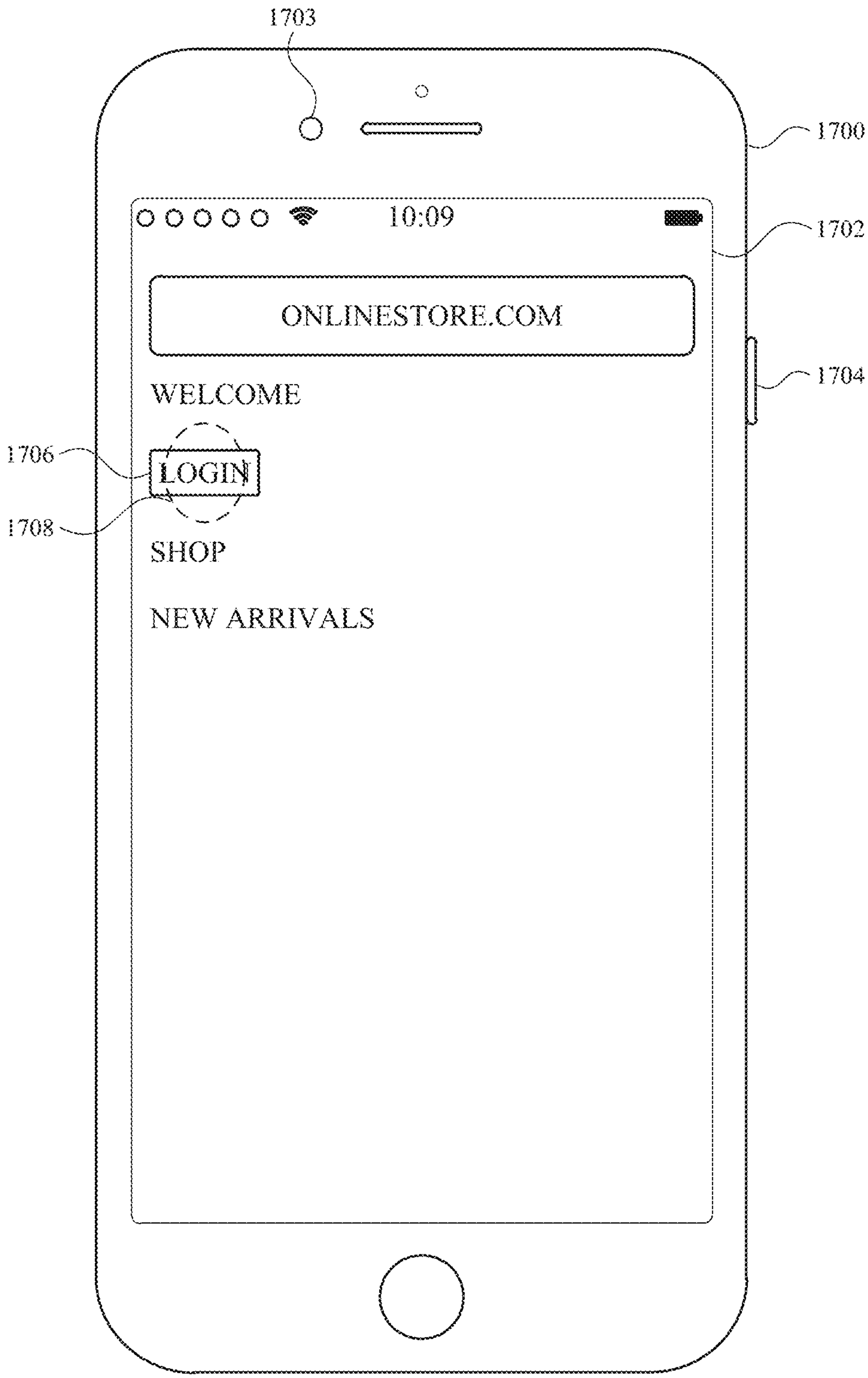
FIGS. 17A-17AI illustrate exemplary user interfaces for autofilling biometrically secured fields.
Figure 18A:
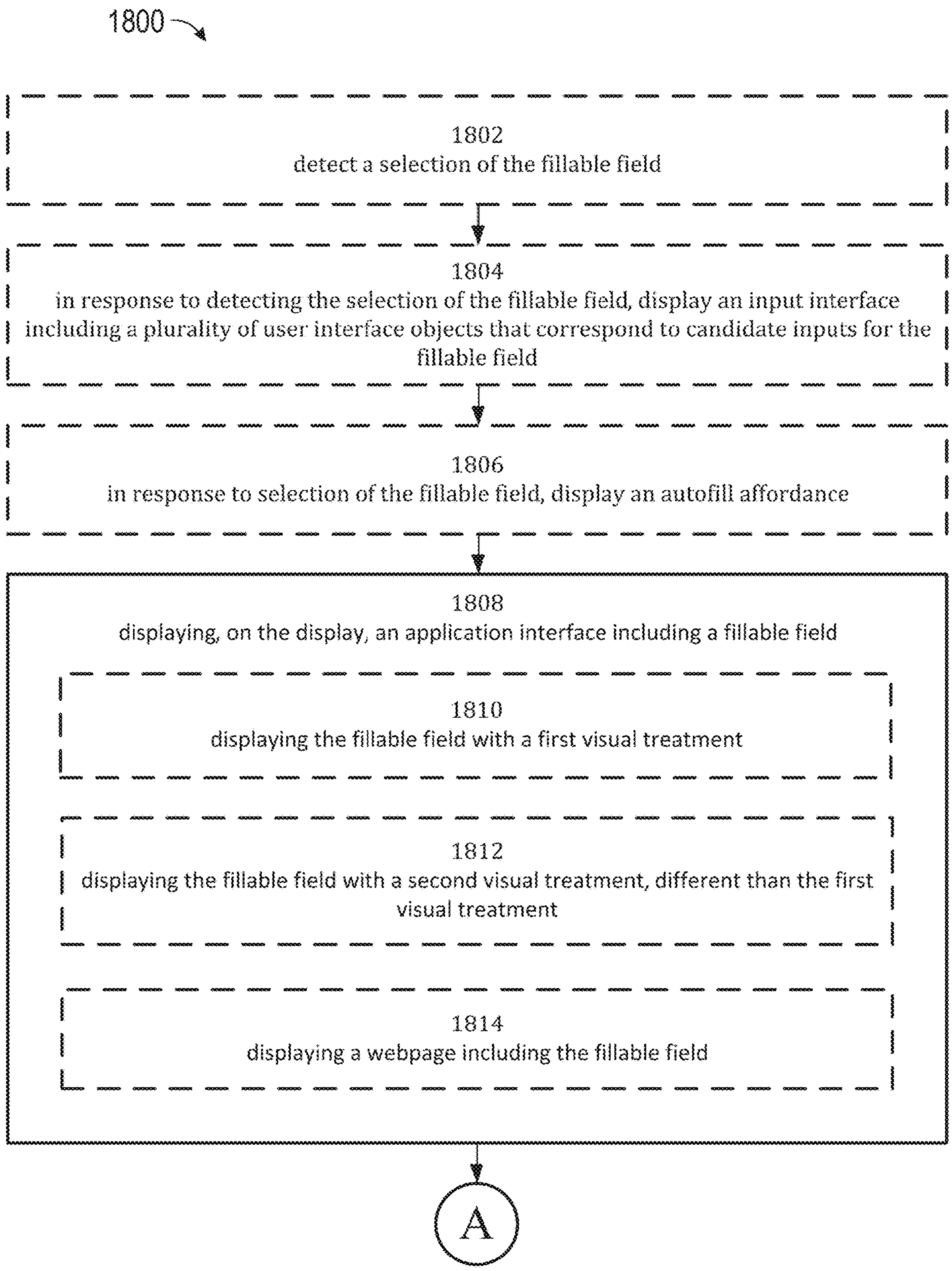
FIGS. 18A-18D are a flow diagram illustrating methods of autofilling biometrically secured fields.
Figure 18B:
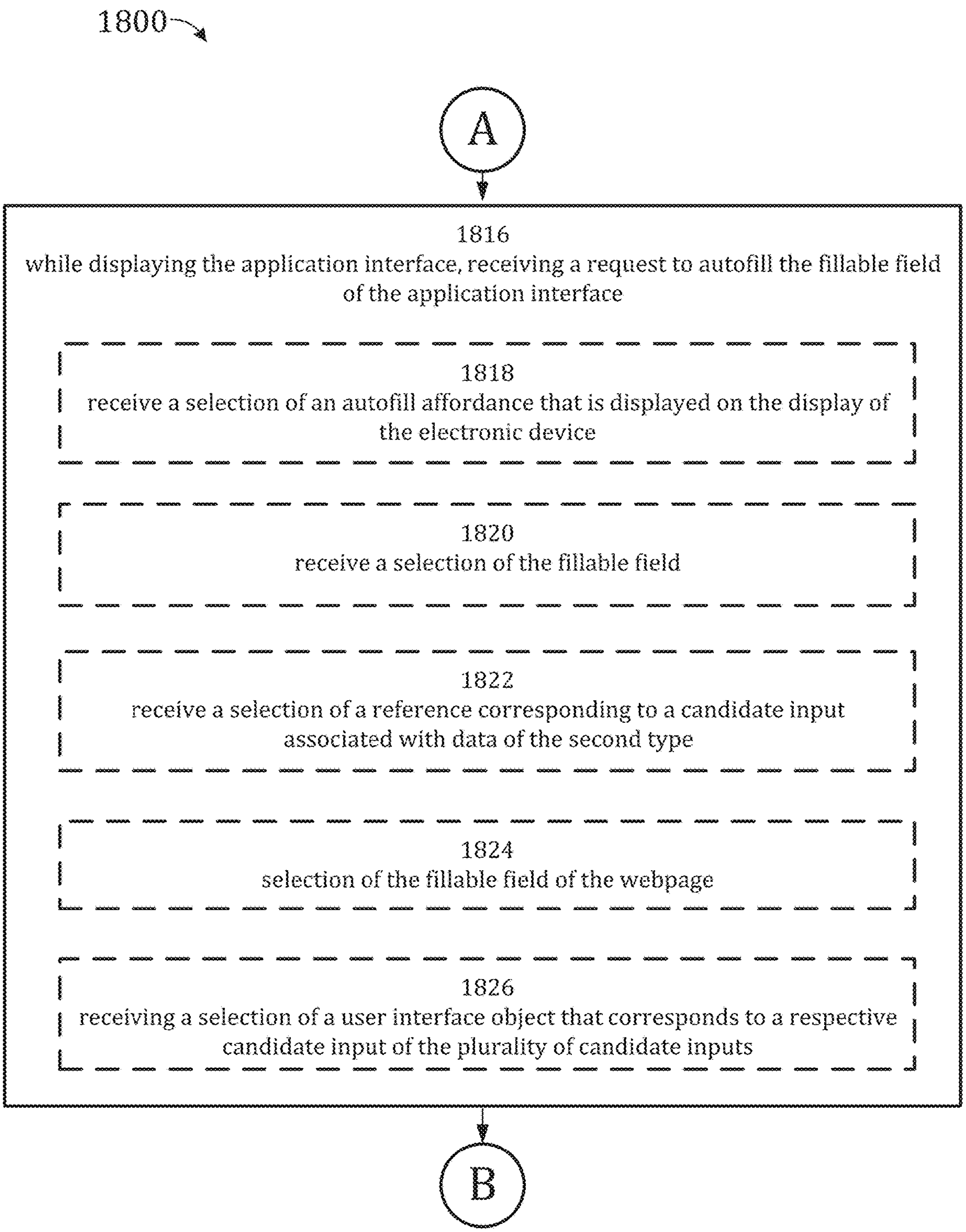
Figure 18C:
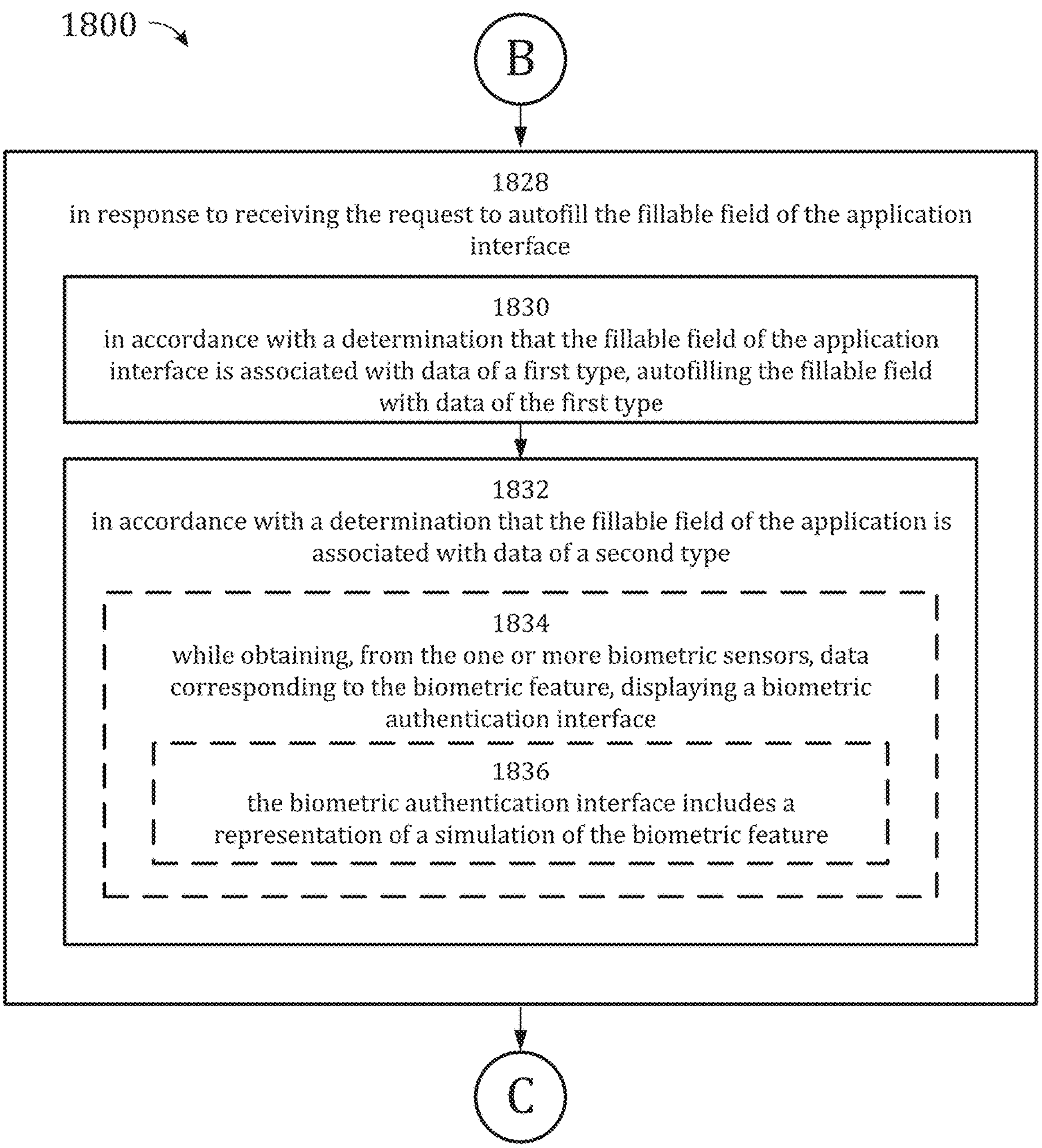
Figure 18D:
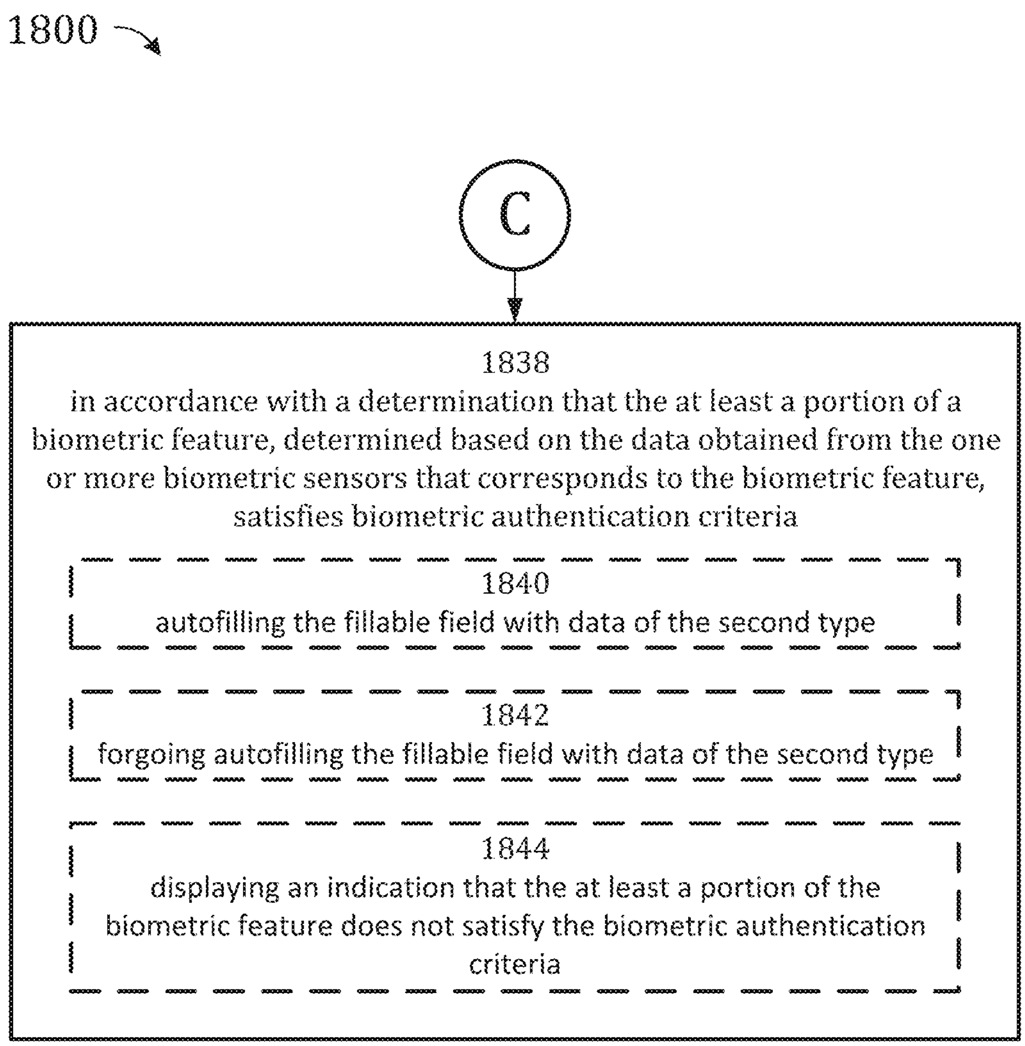
Figure 19A:
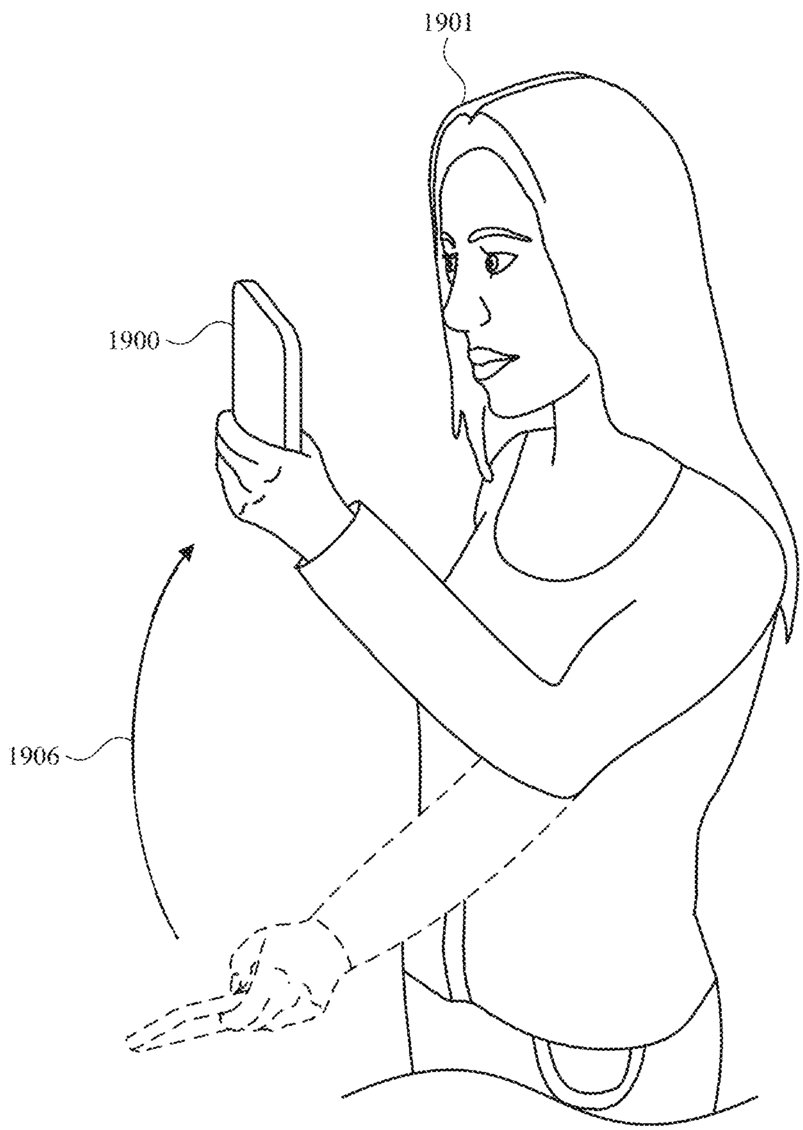
FIGS. 19A-19AB illustrate exemplary user interfaces for unlocking a device using biometric authentication.
Figure 21A:
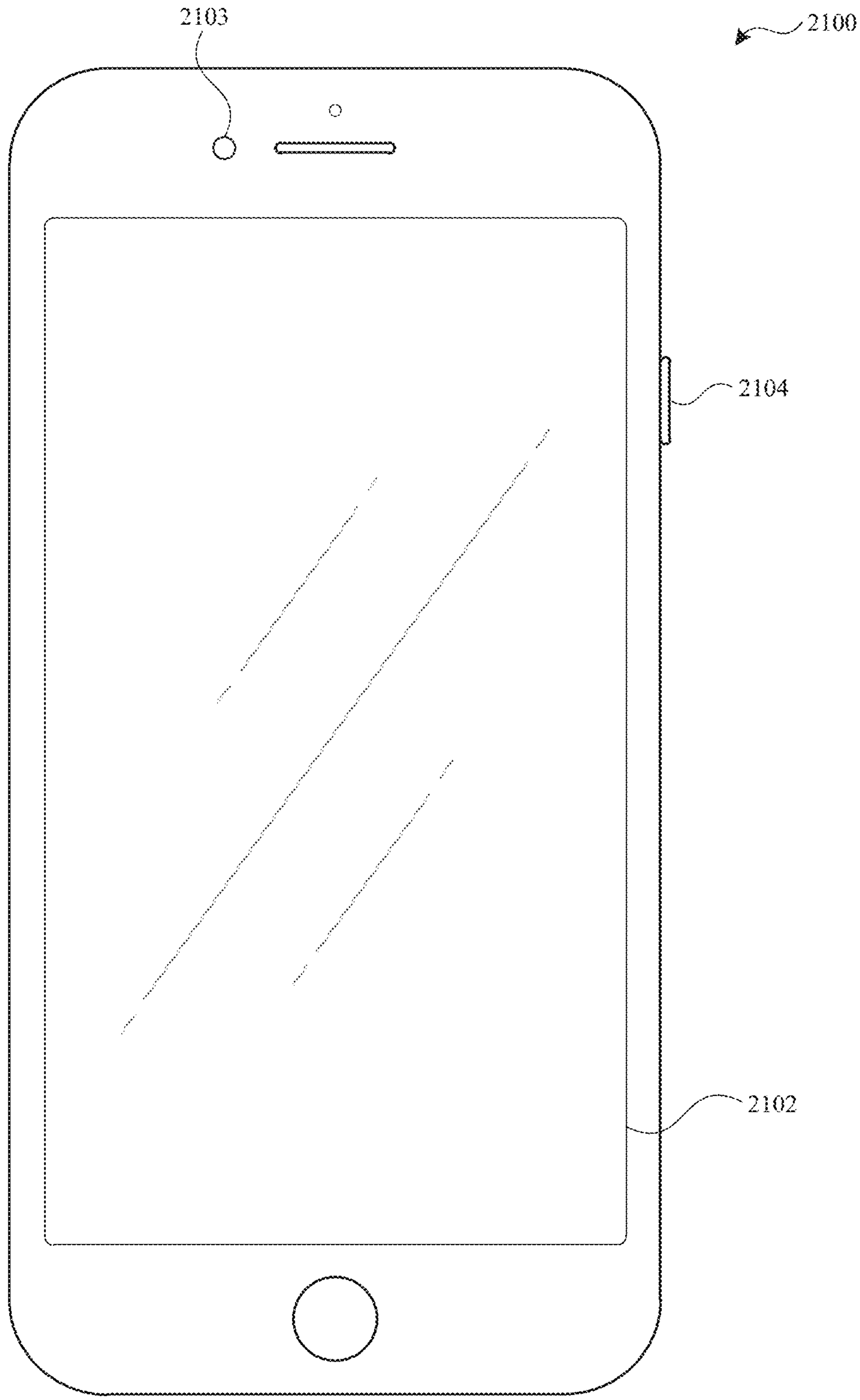
FIGS. 21A-21AQ illustrate exemplary user interfaces for retrying biometric authentication
Figure 23A:
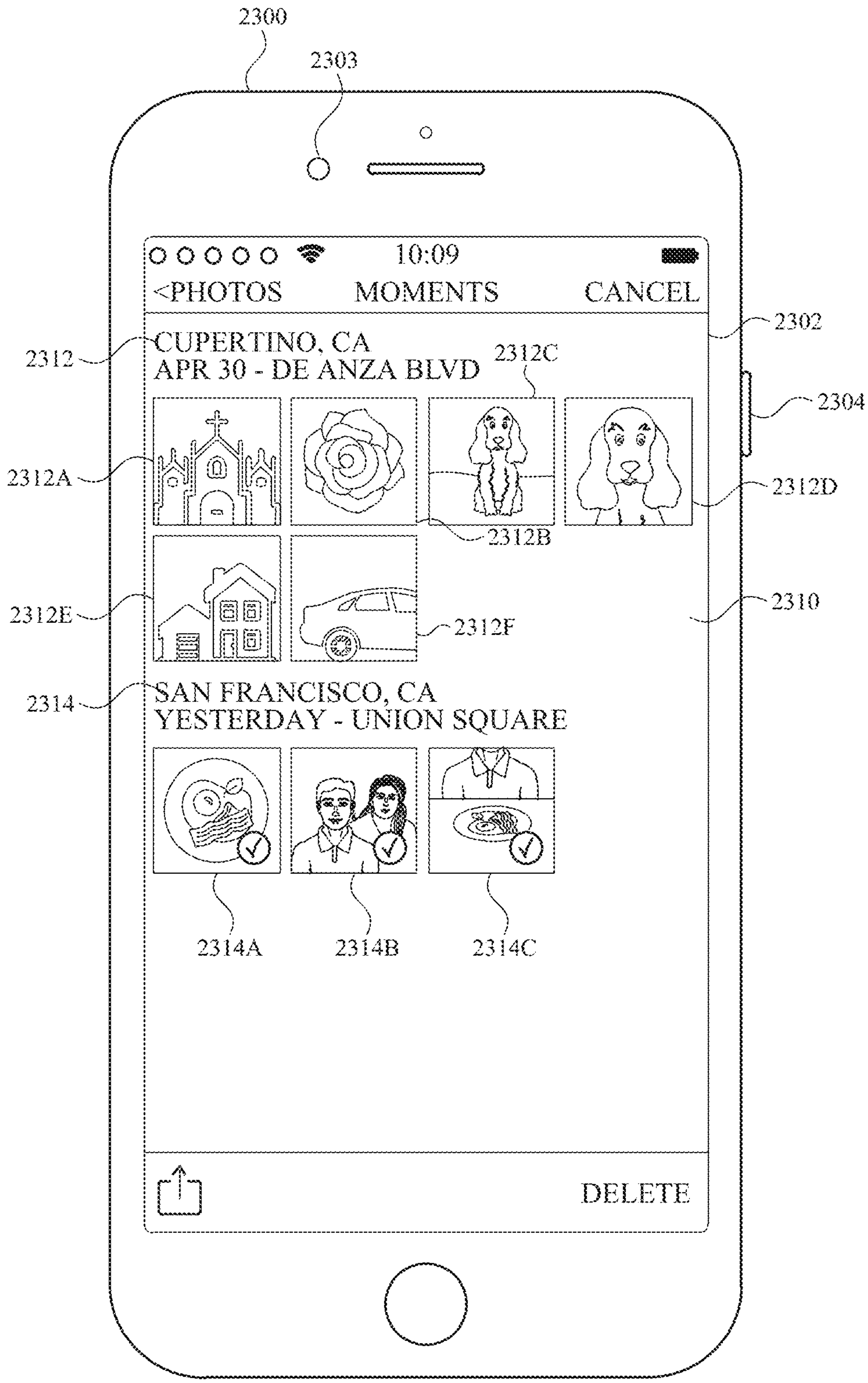
FIGS. 23A-23Q illustrate exemplary user interfaces for managing transfers using biometric authentication.
Figure 23Q:
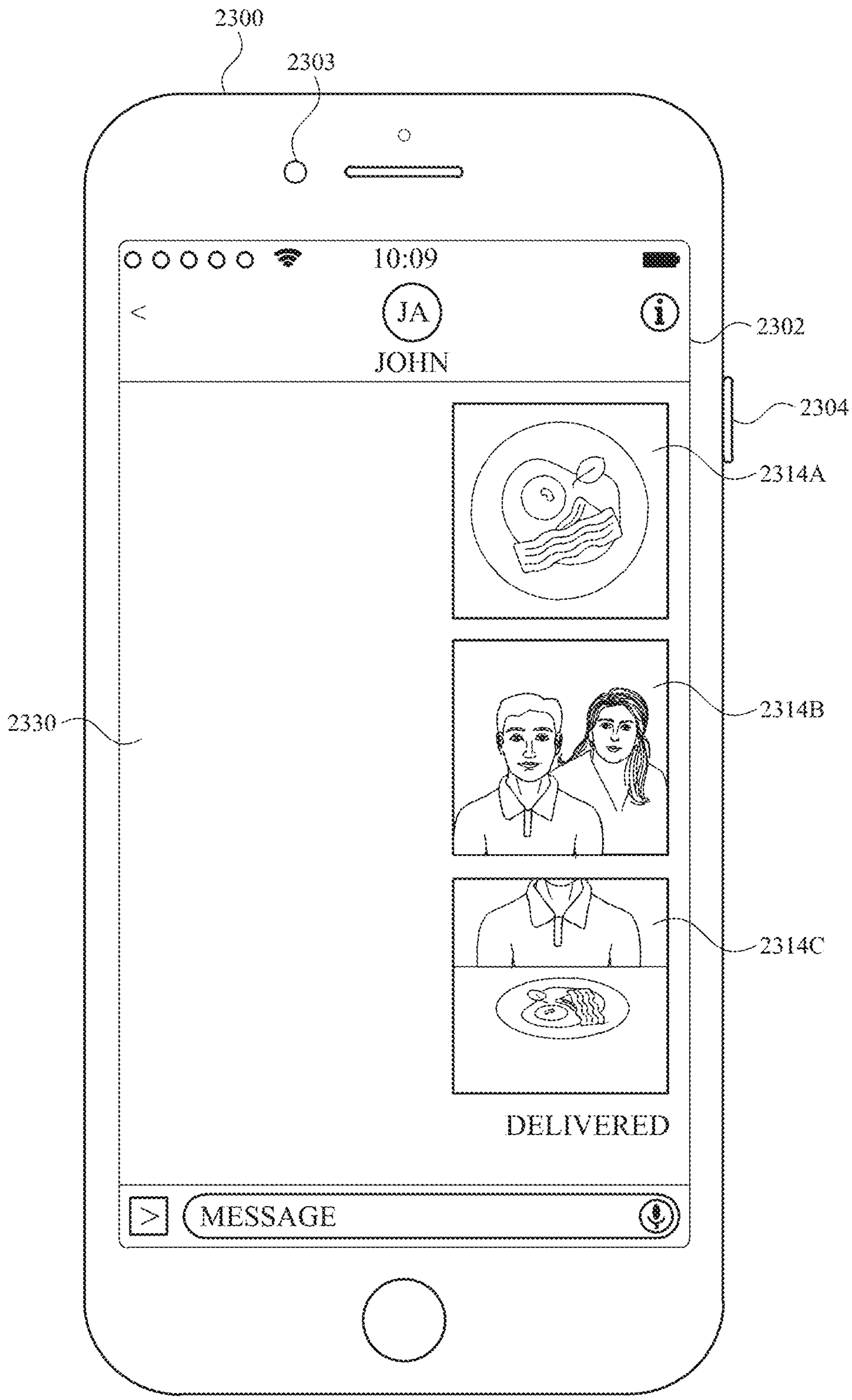
Figure 24A:
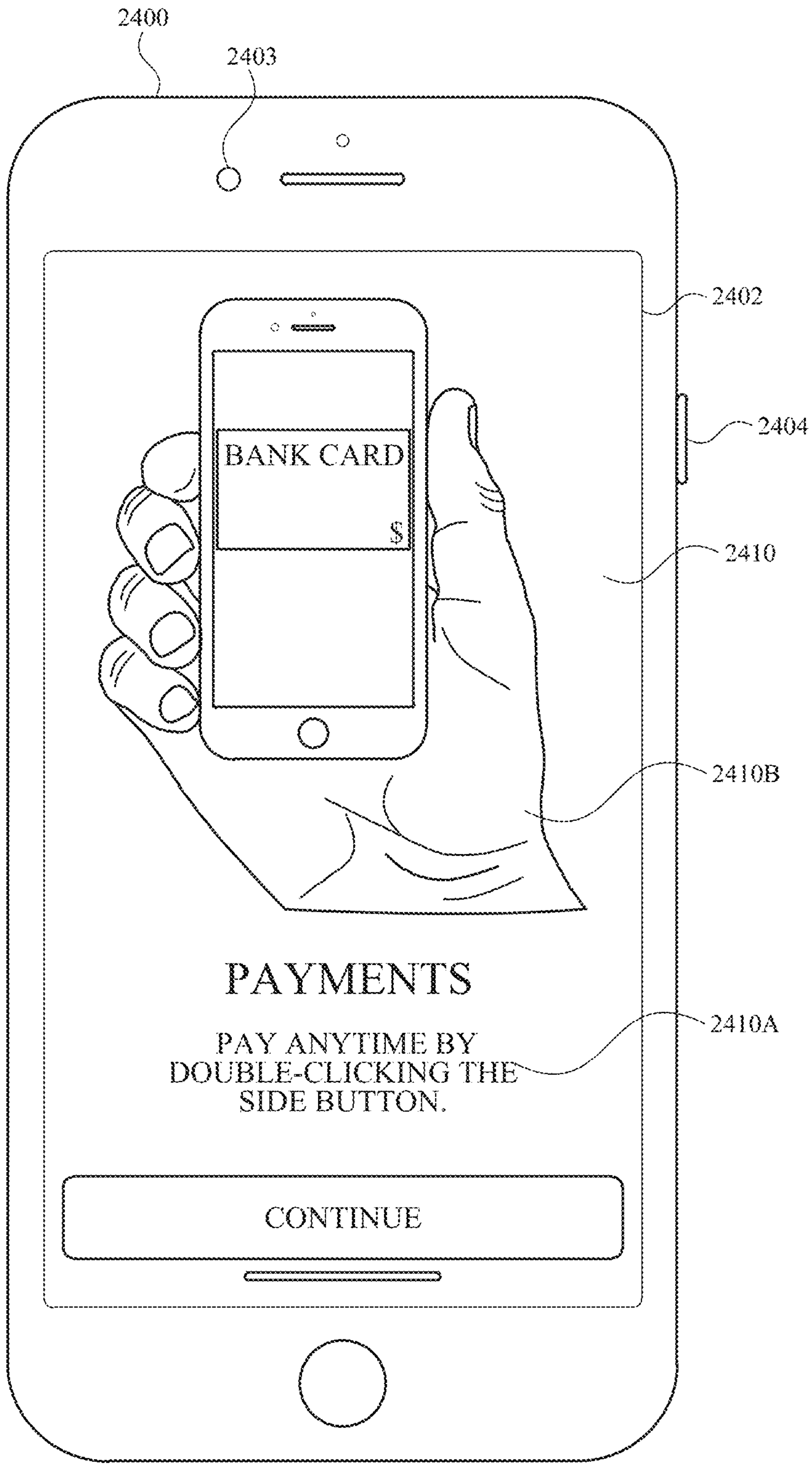
FIGS. 24A-24BC illustrate exemplary user interfaces for managing transfers using biometric authentication.
Figure 24B:
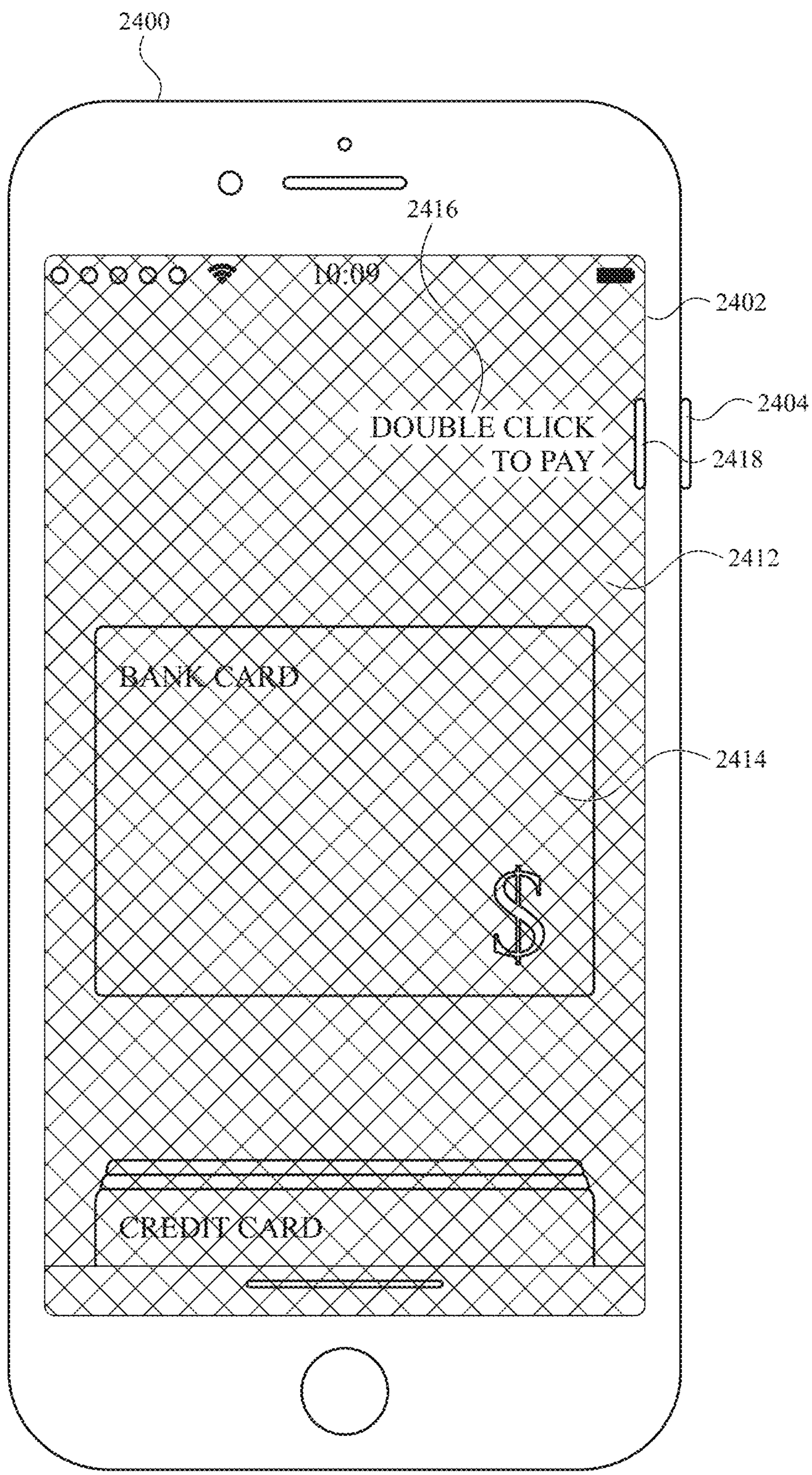
Figure 25A:
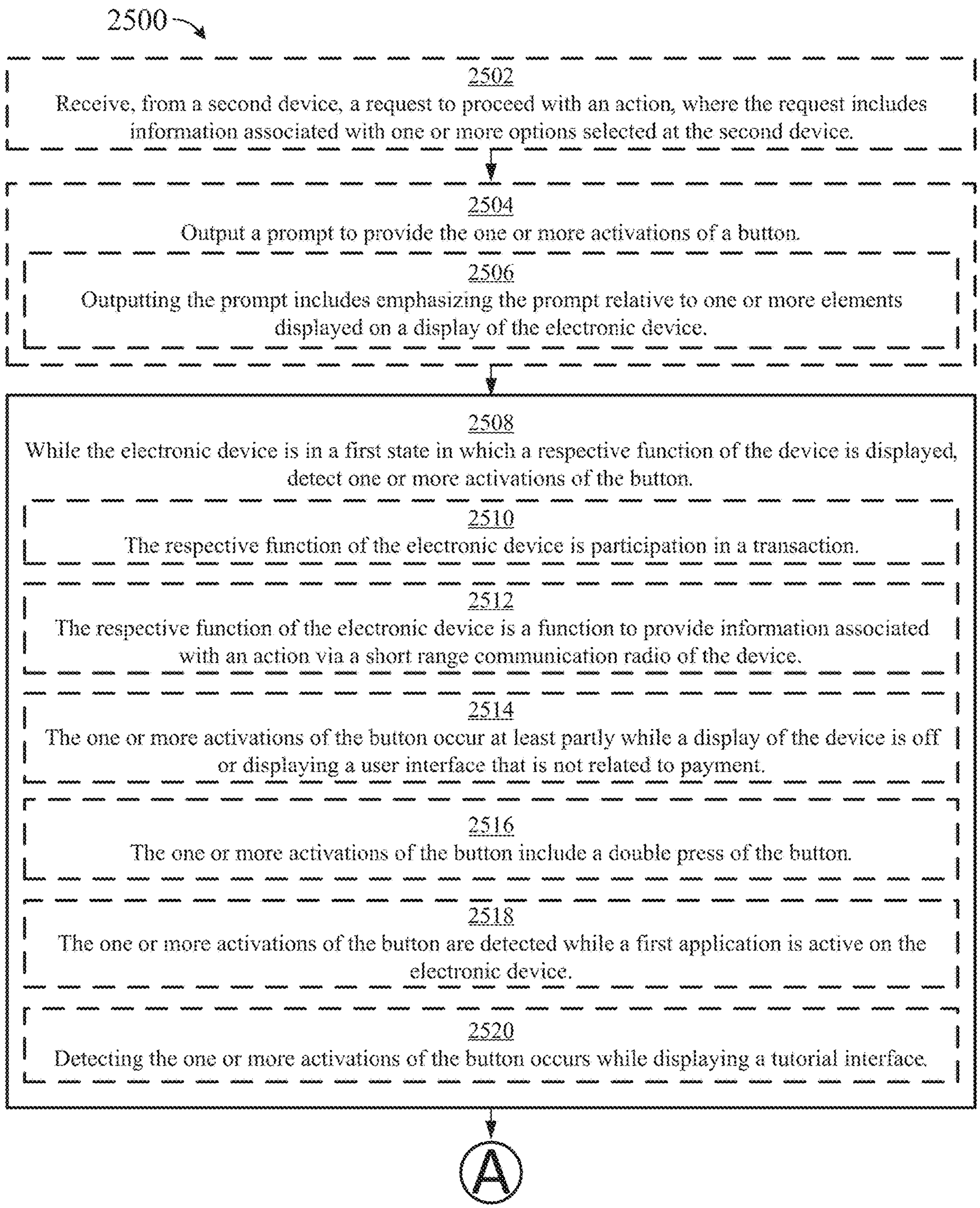
FIGS. 25A-25C are a flow diagram illustrating methods of managing transfers using biometric authentication.
Figure 25B:
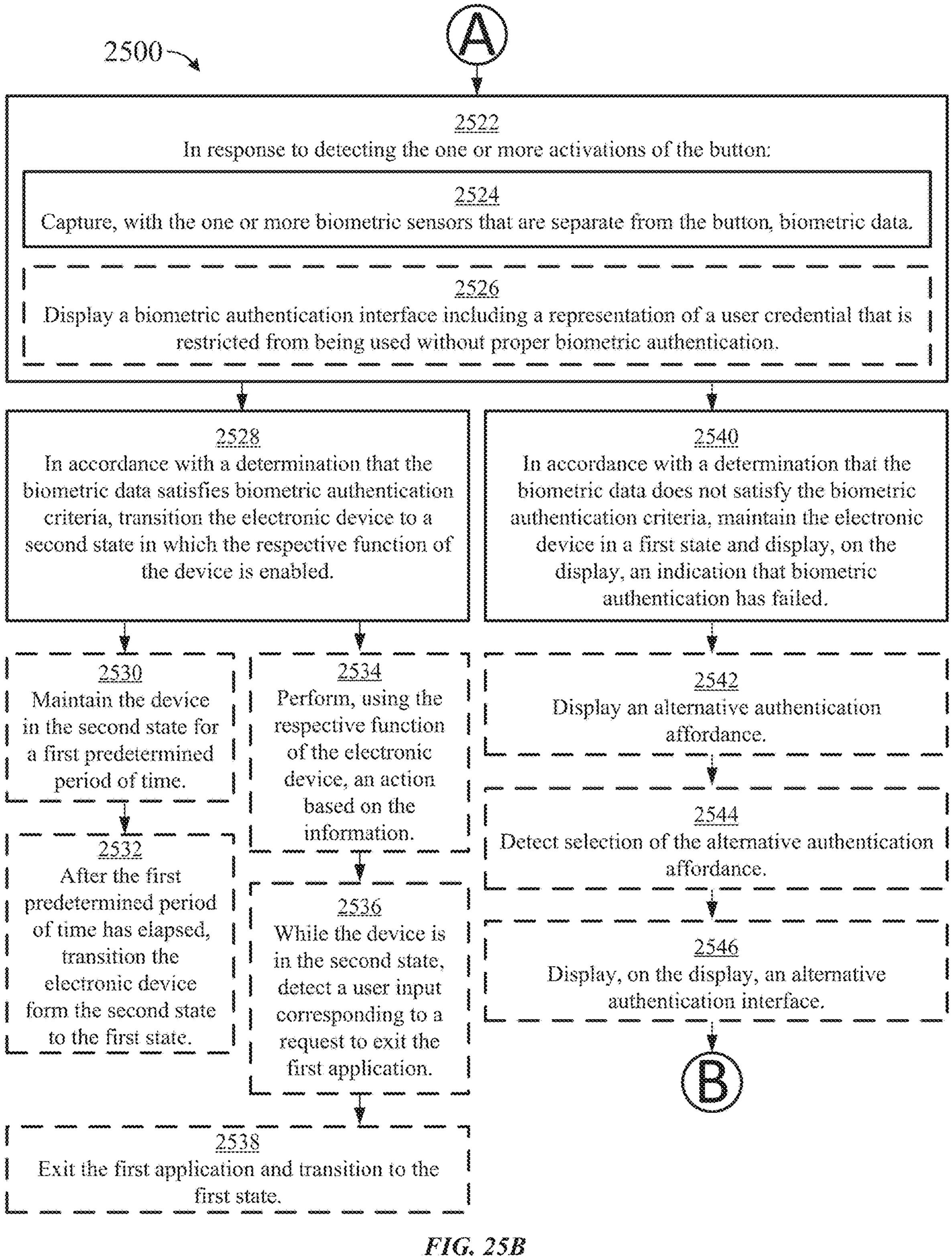
Figure 25C:
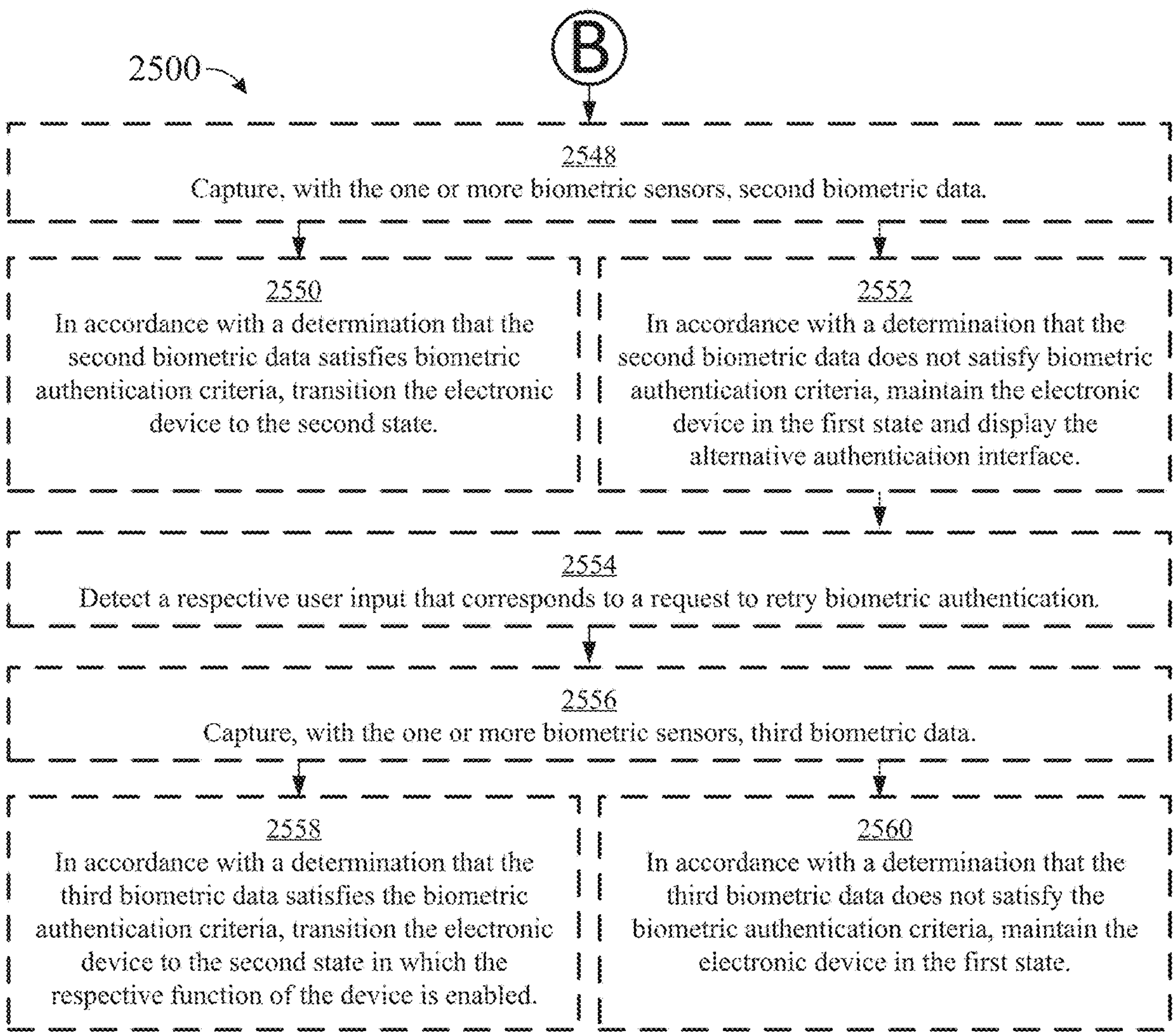
Figure 26A:
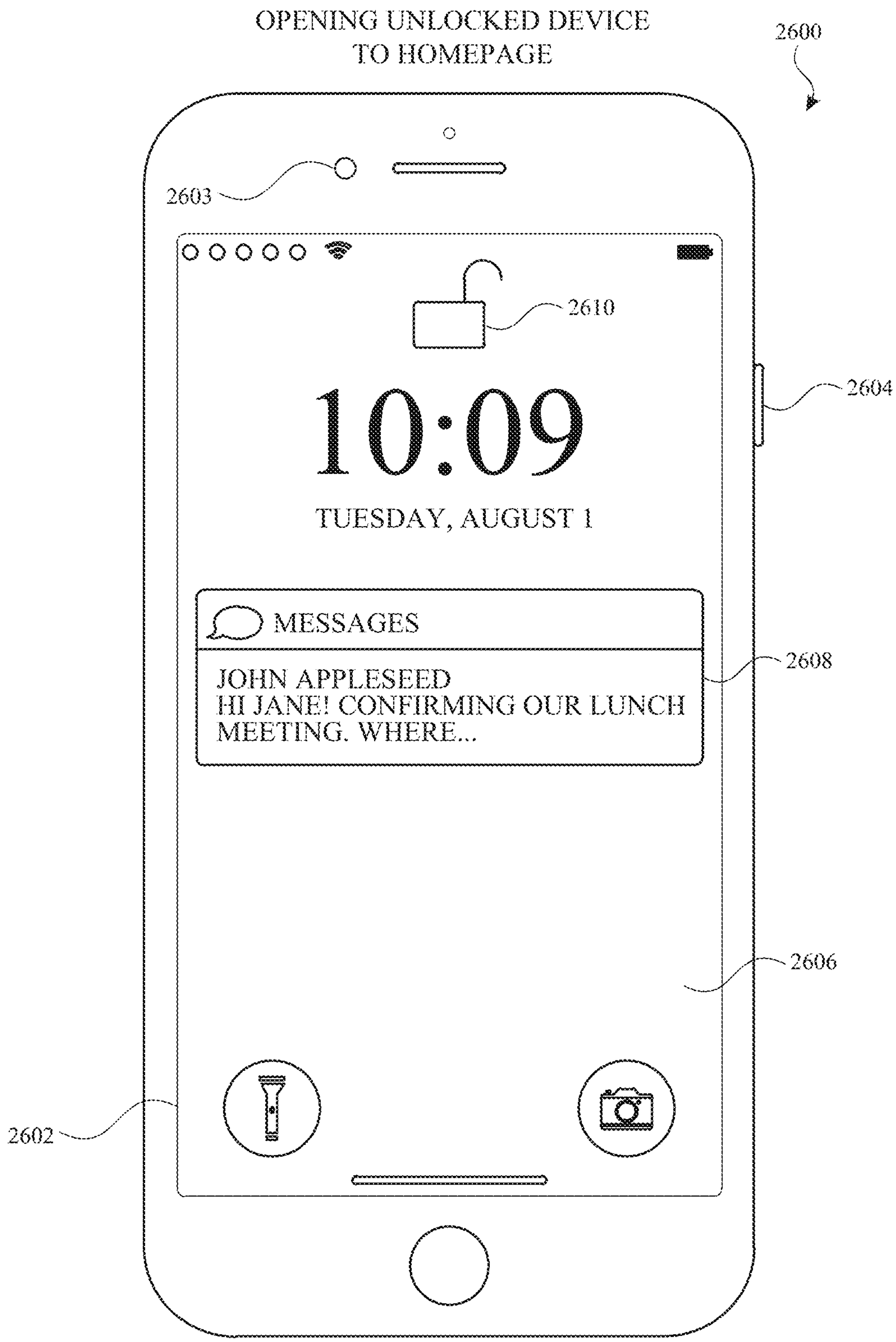
FIGS. 26A-26AS illustrate exemplary user interfaces for providing interstitial user interfaces during biometric authentication.
Figure 28A:
FIGS. 28A-28AA illustrate exemplary user interfaces for preventing retrying biometric authentication.
Figure 29A:
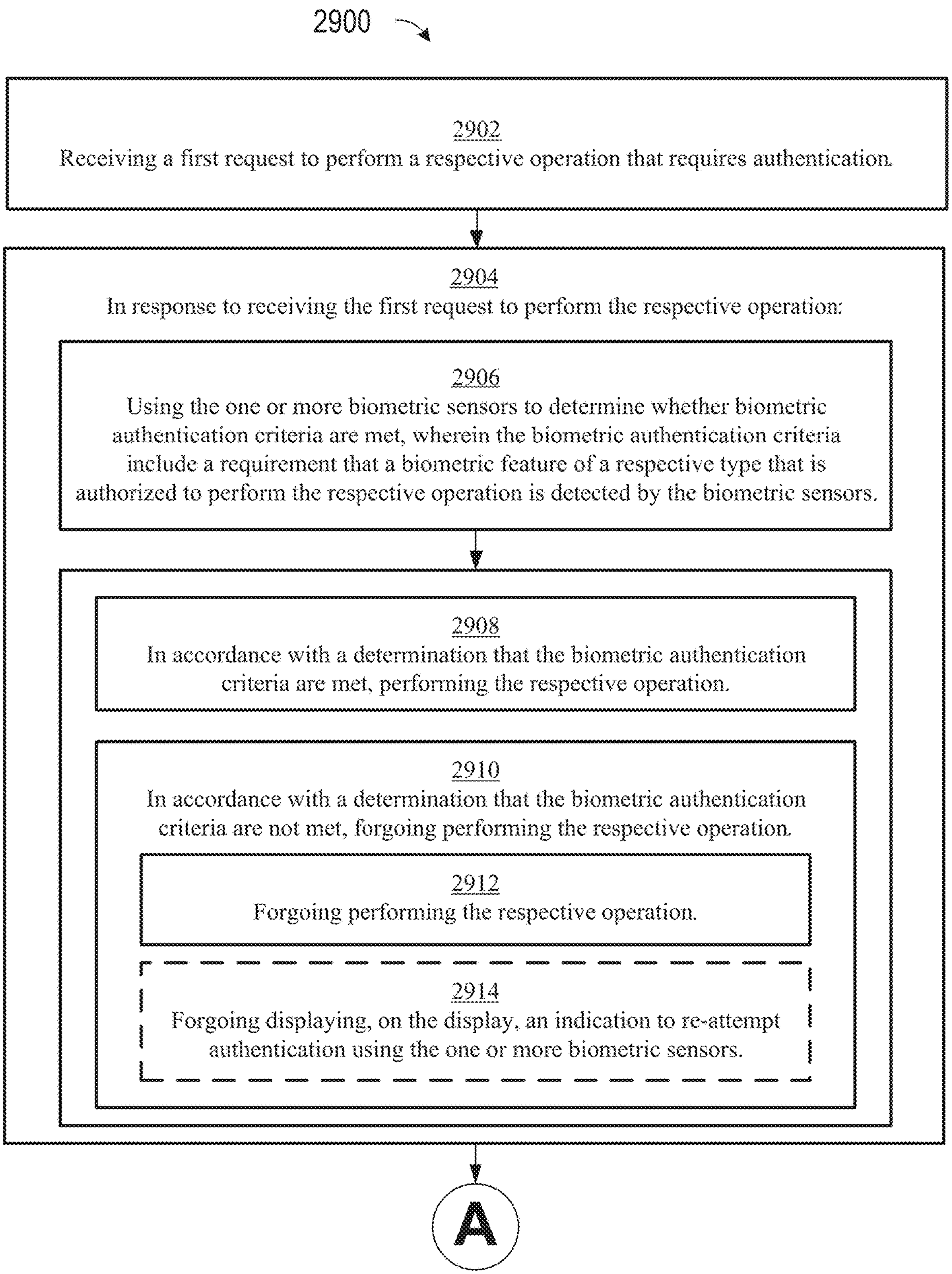
Figure 30A:
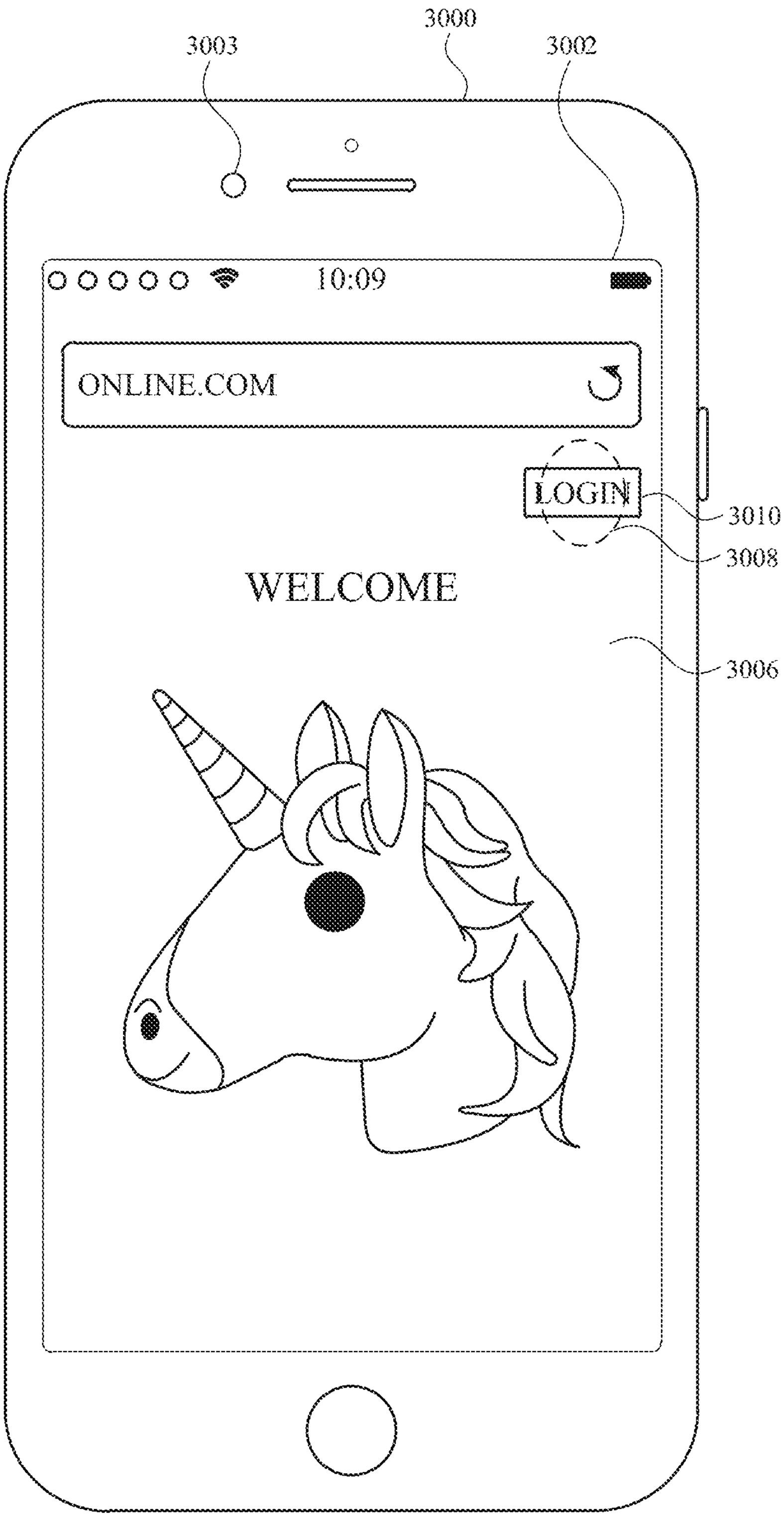
FIGS. 30A-30AL illustrate exemplary user interfaces for cached biometric authentication.

Below, FIGS. 1A-1C, 2, 3, 4A-4B, and 5A-5H provide a description of exemplary devices for performing the techniques for implementing biometric authentication. FIG. 6 illustrates exemplary devices connected via one or more communication channels, in accordance with some embodiments. FIGS. 7A-7S illustrate exemplary user interfaces for a biometric enrollment process tutorial, in accordance with some embodiments. FIGS. 8A-8C are a flow diagram illustrating methods of a biometric enrollment process tutorial. The user interfaces in FIGS. 7A-7S are used to illustrate the processes described below, including the processes in FIGS. 8A-8C. FIGS. 9A-9AE illustrate exemplary user interfaces for aligning a biometric feature for enrollment. FIGS. 10A-10F are a flow diagram illustrating methods of aligning a biometric feature for enrollment. The user interfaces in FIGS. 9A-9AE are used to illustrate the processes described below, including the processes in FIGS. 10A-10F. FIGS. 11A-11O illustrate exemplary user interfaces for enrolling a biometric feature. FIGS. 12A-12B are a flow diagram illustrating methods of enrolling a biometric feature. The user interfaces in FIGS. 11A-11O are used to illustrate the processes described below, including the processes in FIGS. 12A-12B. FIGS. 13A-13R illustrate exemplary user interfaces for providing hints during a biometric enrollment process. FIGS. 14A-14C are a flow diagram illustrating methods of providing hints during a biometric enrollment process. The user interfaces in FIGS. 13A-13R are used to illustrate the processes described below, including the processes in FIGS. 14A-14C. FIGS. 15A-15T illustrate exemplary user interfaces for application-based biometric authentication. FIGS. 16A-16E are a flow diagram illustrating methods of application-based biometric authentication. The user interfaces in FIGS. 15A-15T are used to illustrate the processes described below, including the processes in FIGS. 16A-16E. FIGS. 17A-17AI illustrate exemplary user interfaces for autofilling biometrically secured fields. FIGS. 18A-18D are a flow diagram illustrating methods of autofilling biometrically secured fields. The user interfaces in FIGS. 17A-17AI are used to illustrate the processes described below, including the processes in FIGS. 18A-18D. FIGS. 19A-19AB illustrate exemplary user interfaces for unlocking a device using biometric authentication. FIGS. 20A-20F are a flow diagram illustrating methods of unlocking a device using biometric authentication. The user interfaces in FIGS. 19A-19AB are used to illustrate the processes described below, including the processes in FIGS. 20A-20F. FIGS. 21A-21AQ illustrate exemplary user interfaces for retrying biometric authentication FIGS. 22A-22F are a flow diagram illustrating methods of for retrying biometric authentication. The user interfaces in FIGS. 21A-21AQ are used to illustrate the processes described below, including the processes in FIGS. 22A-22F. FIGS. 23A-23Q illustrate exemplary user interfaces for managing transfers using biometric authentication. FIGS. 24A-24BC illustrate exemplary user interfaces for managing transfers using biometric authentication. FIGS. 25A-25C are a flow diagram illustrating methods of managing transfers using biometric authentication. The user interfaces in FIGS. 23A-23Q and FIGS. 24A-24BC are used to illustrate the processes described below, including the processes in FIGS. 25A-25C. FIGS. 26A-26AS illustrate exemplary user interfaces for providing interstitial user interfaces during biometric authentication. FIGS. 27A-27E are a flow diagram illustrating methods of providing interstitial user interfaces during biometric authentication. The user interfaces in FIGS. 26A-26AS are used to illustrate the processes described below, including the processes in FIGS. 27A-27E. FIGS. 28A-28AA illustrate exemplary user interfaces for preventing retrying biometric authentication. FIGS. 29A-29B are a flow diagram illustrating methods of preventing retrying biometric authentication. The user interfaces in FIGS. 28A-28AA are used to illustrate the processes described below, including the processes in FIGS. 29A-29B. FIGS. 30A-30AL illustrate exemplary user interfaces for cached biometric authentication. FIGS. 31A-

Figure 32A:
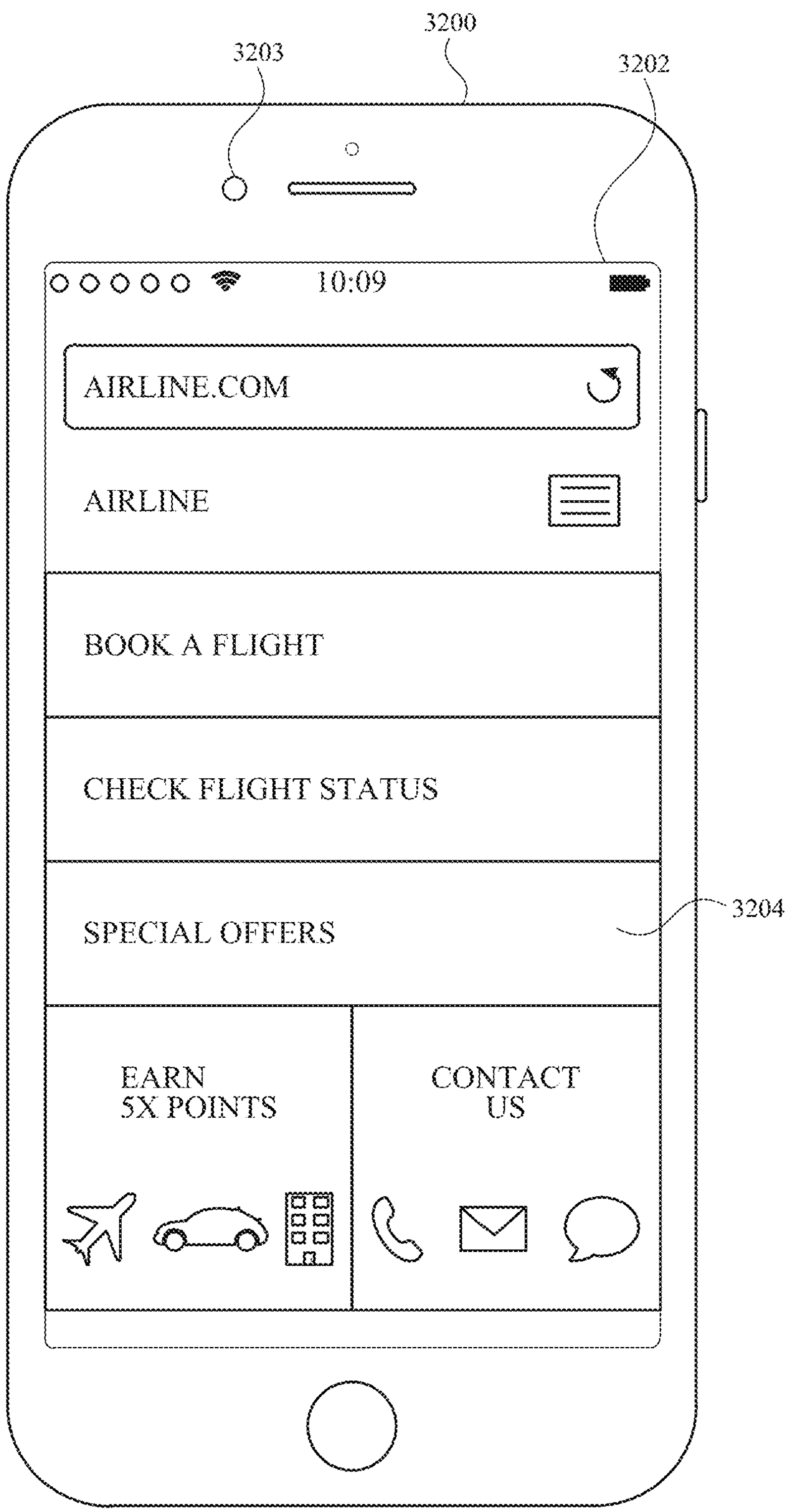
FIGS. 32A-32W illustrate exemplary user interfaces for autofilling fillable fields based on visibility criteria.
Figure 32W:
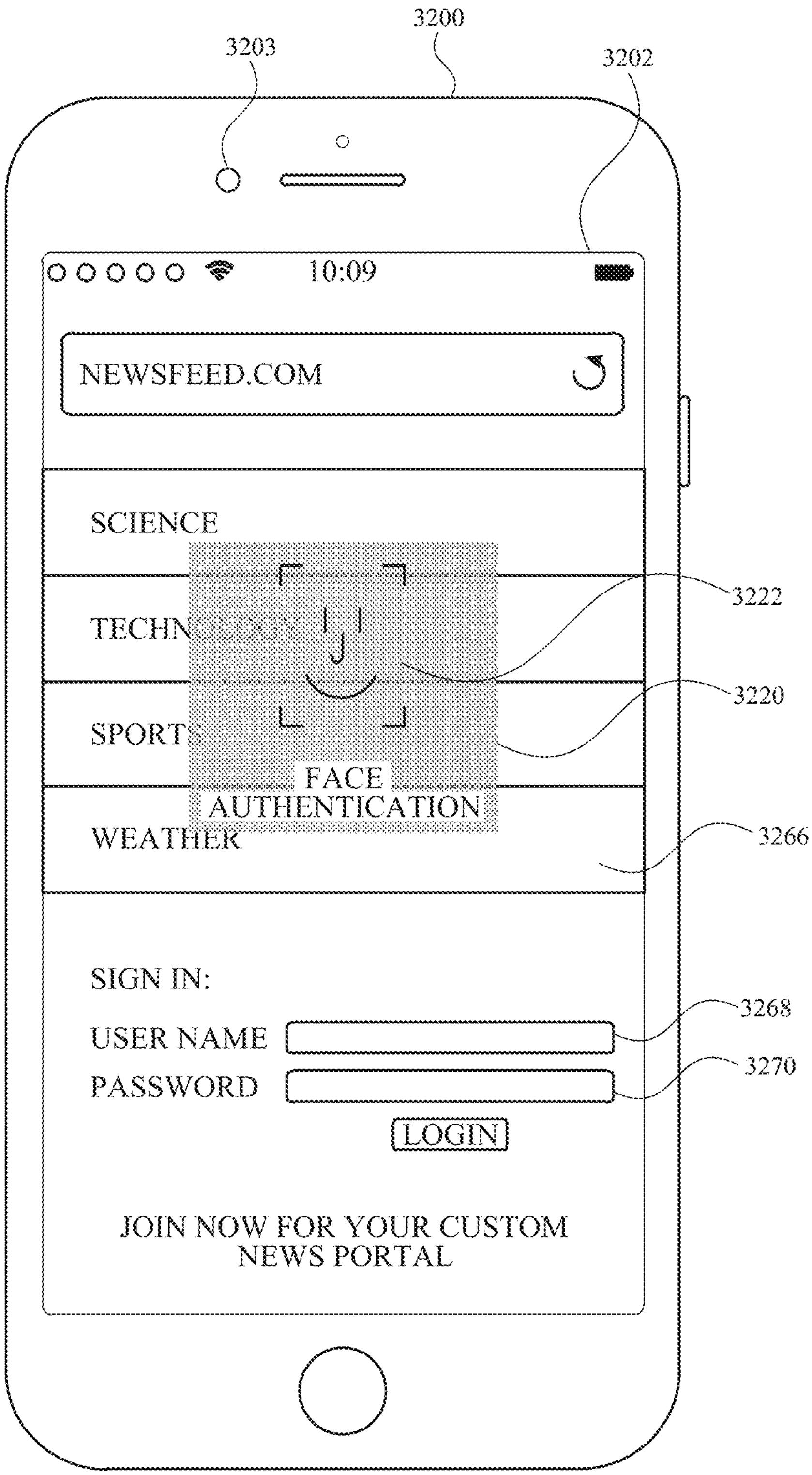
Figure 33:
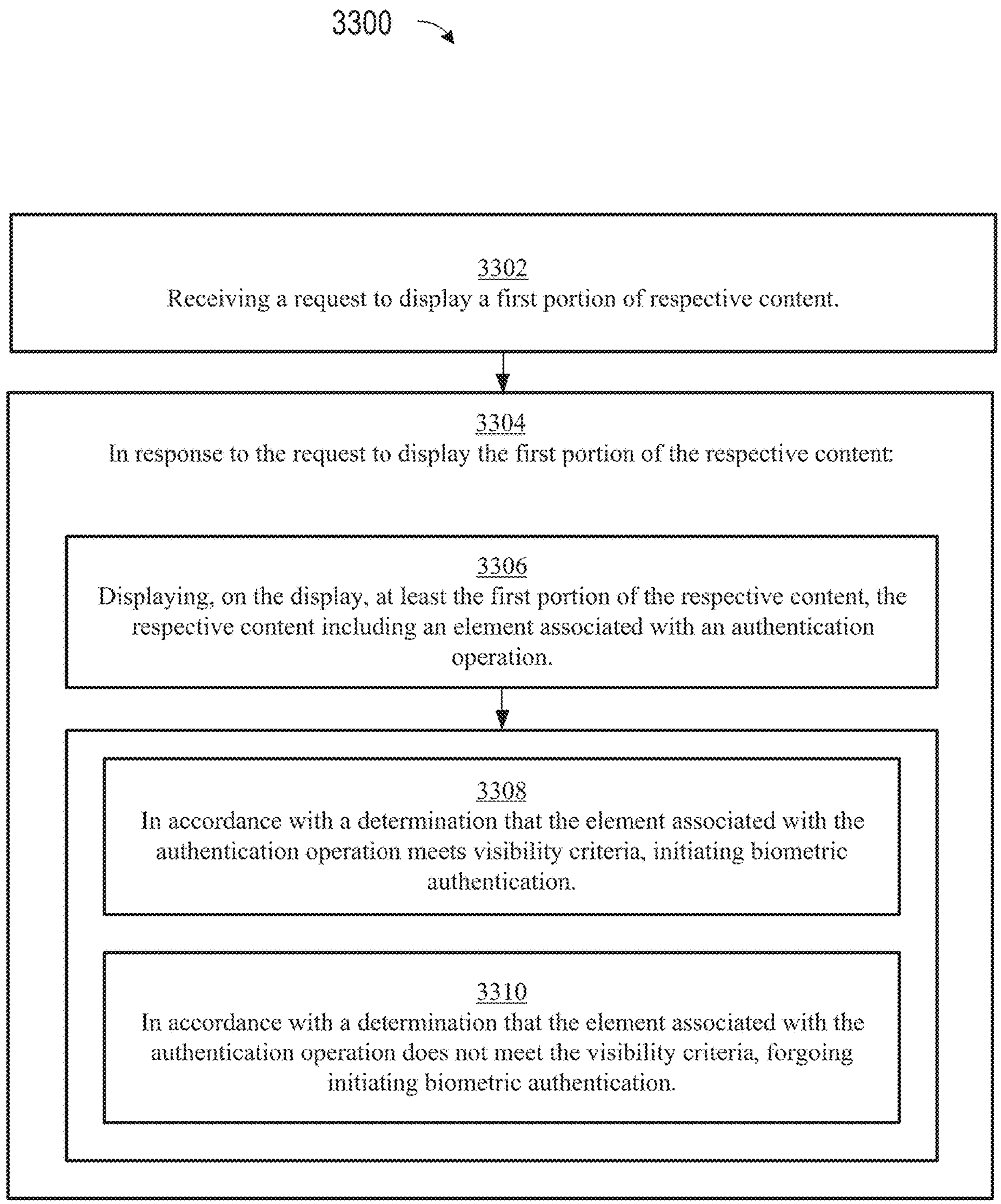
FIG. 33 is a flow diagram illustrating methods of autofilling fillable fields based on visibility criteria.
Figure 34A:
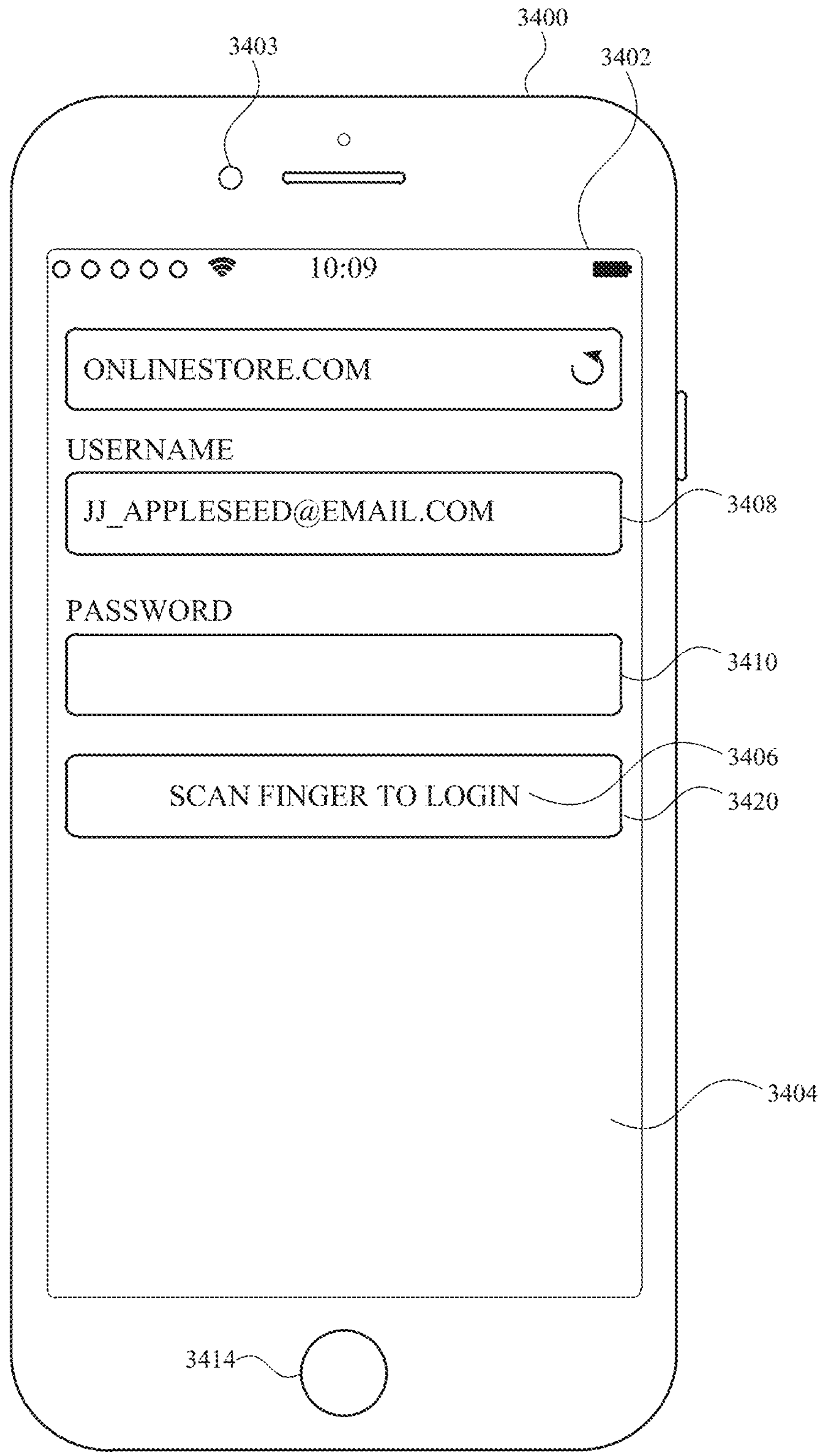
FIGS. 34A-34N illustrate exemplary user interfaces for automatic log-in using biometric authentication.
Figure 34N:
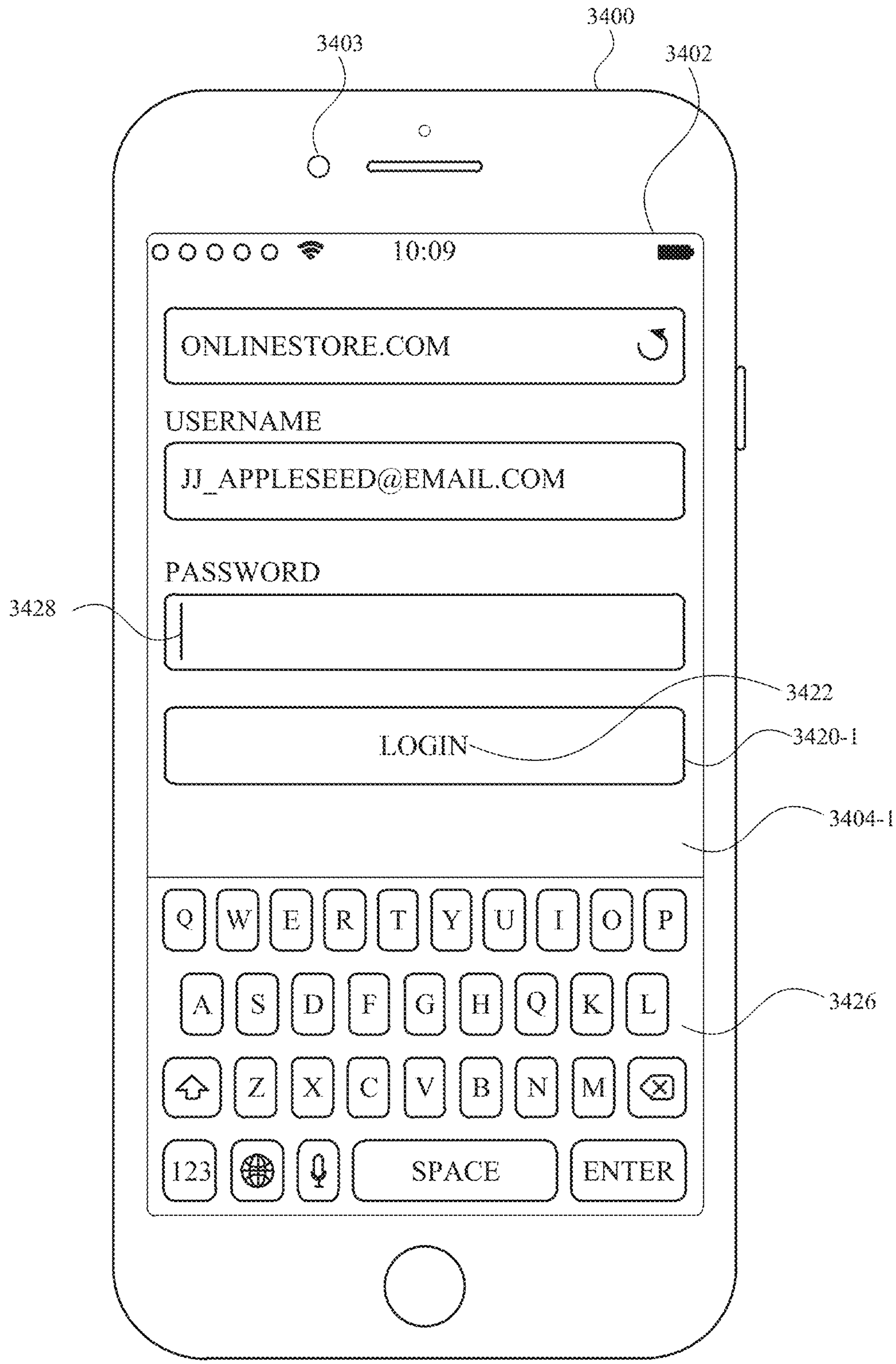
Figure 35:
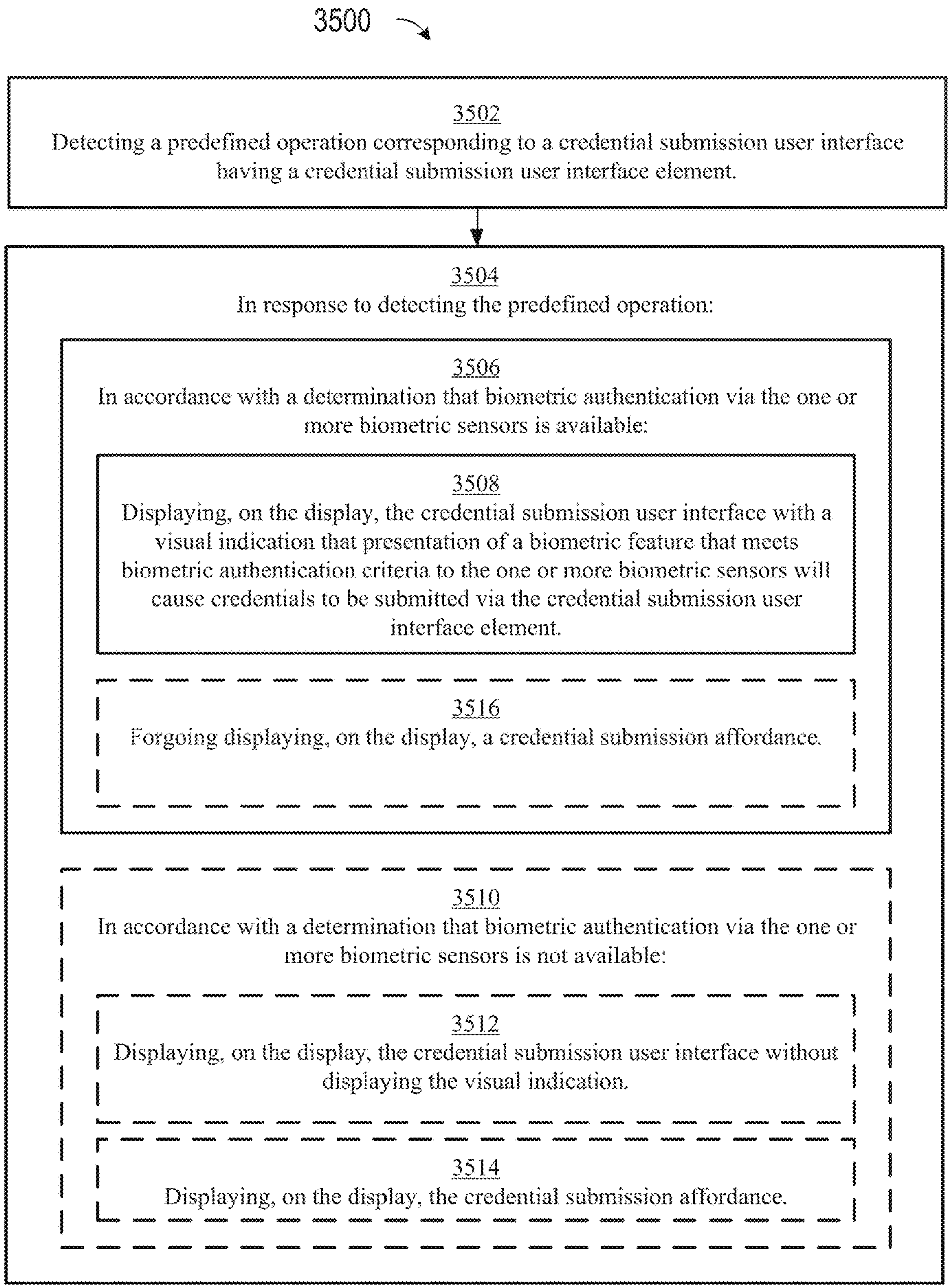
FIG. 35 is a flow diagram illustrating methods of automatic log-in using biometric authentication.
Figure 38A:
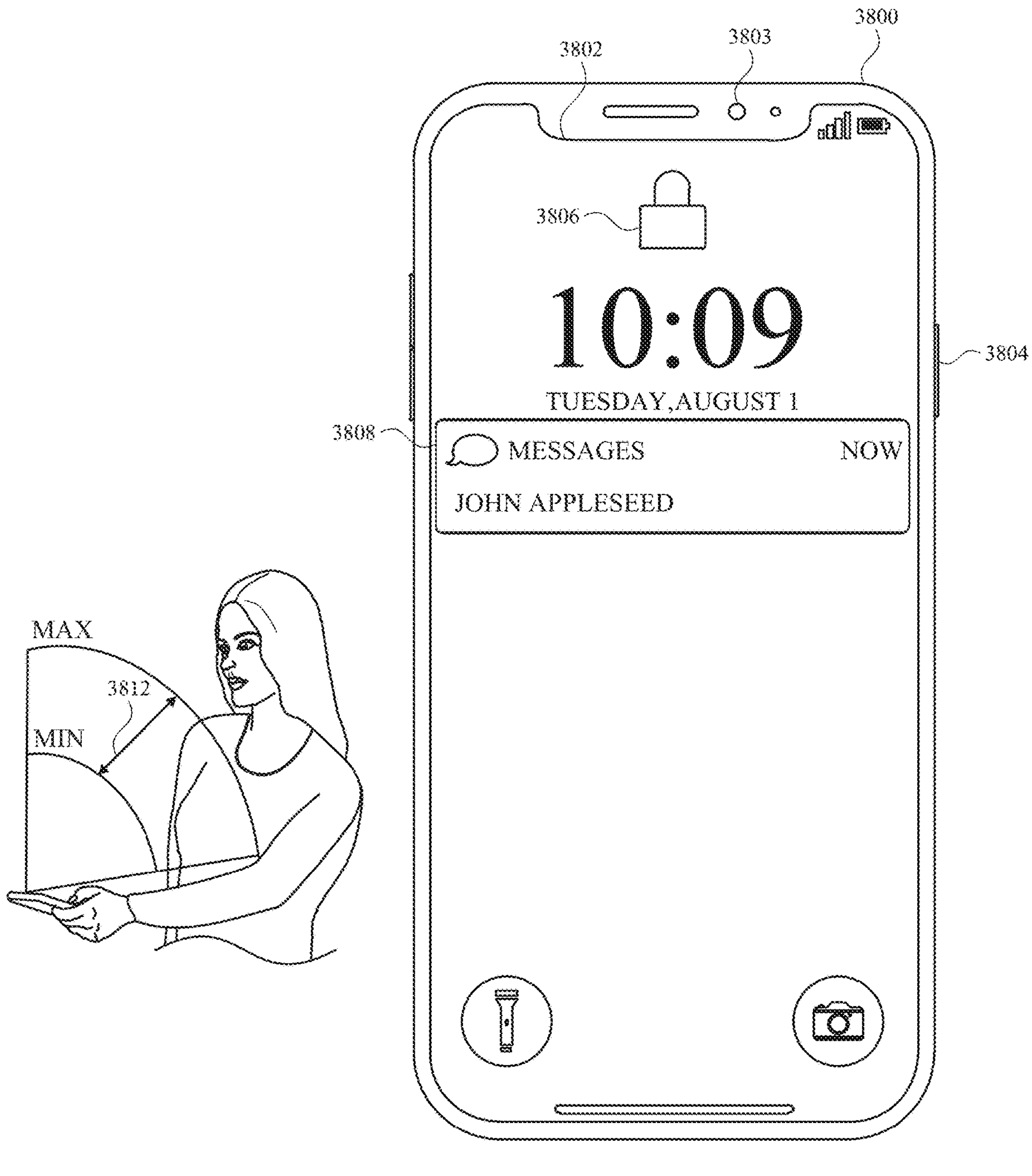
FIGS. 38A-38AD illustrate exemplary user interfaces for providing indications of error conditions during biometric authentication, in accordance with some examples.
Figure 40A:
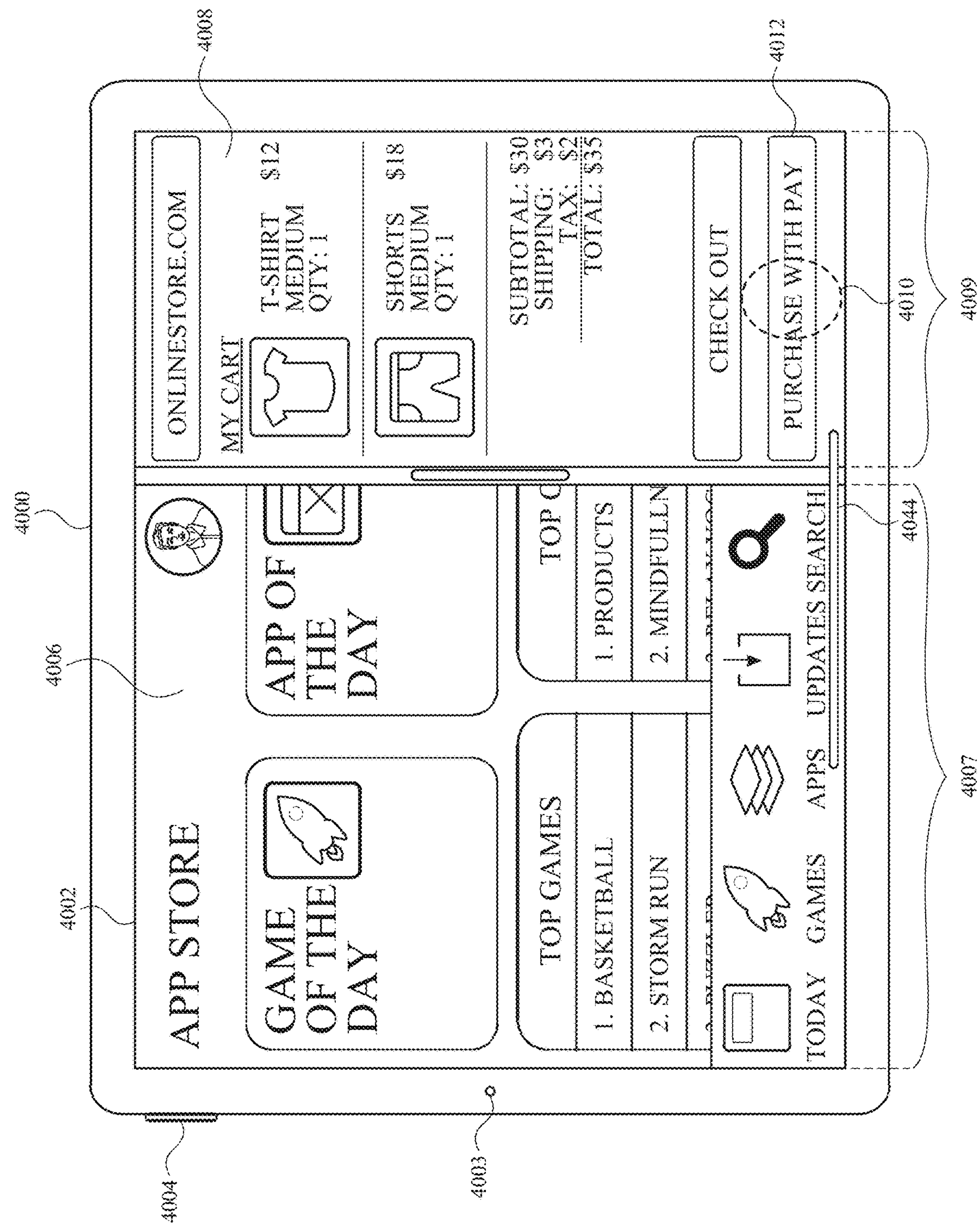
FIGS. 40A-40U illustrate exemplary user interfaces for providing indications about the biometric sensor during biometric authentication, in accordance with some examples.
Figure 42A:
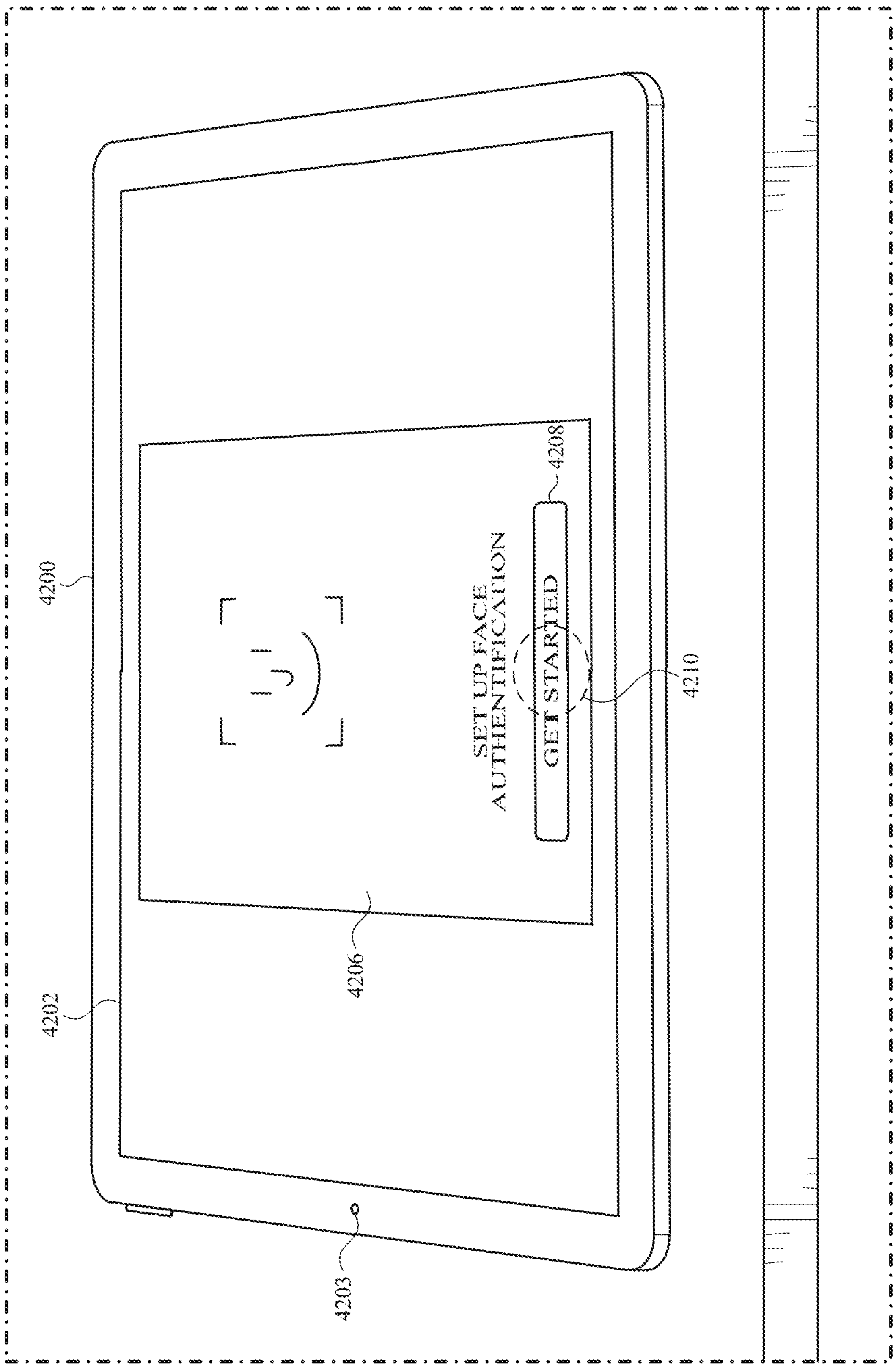
FIGS. 42A-42P illustrate exemplary user interfaces for orienting the device to enroll a biometric feature, in accordance with some examples
Figure 42P:
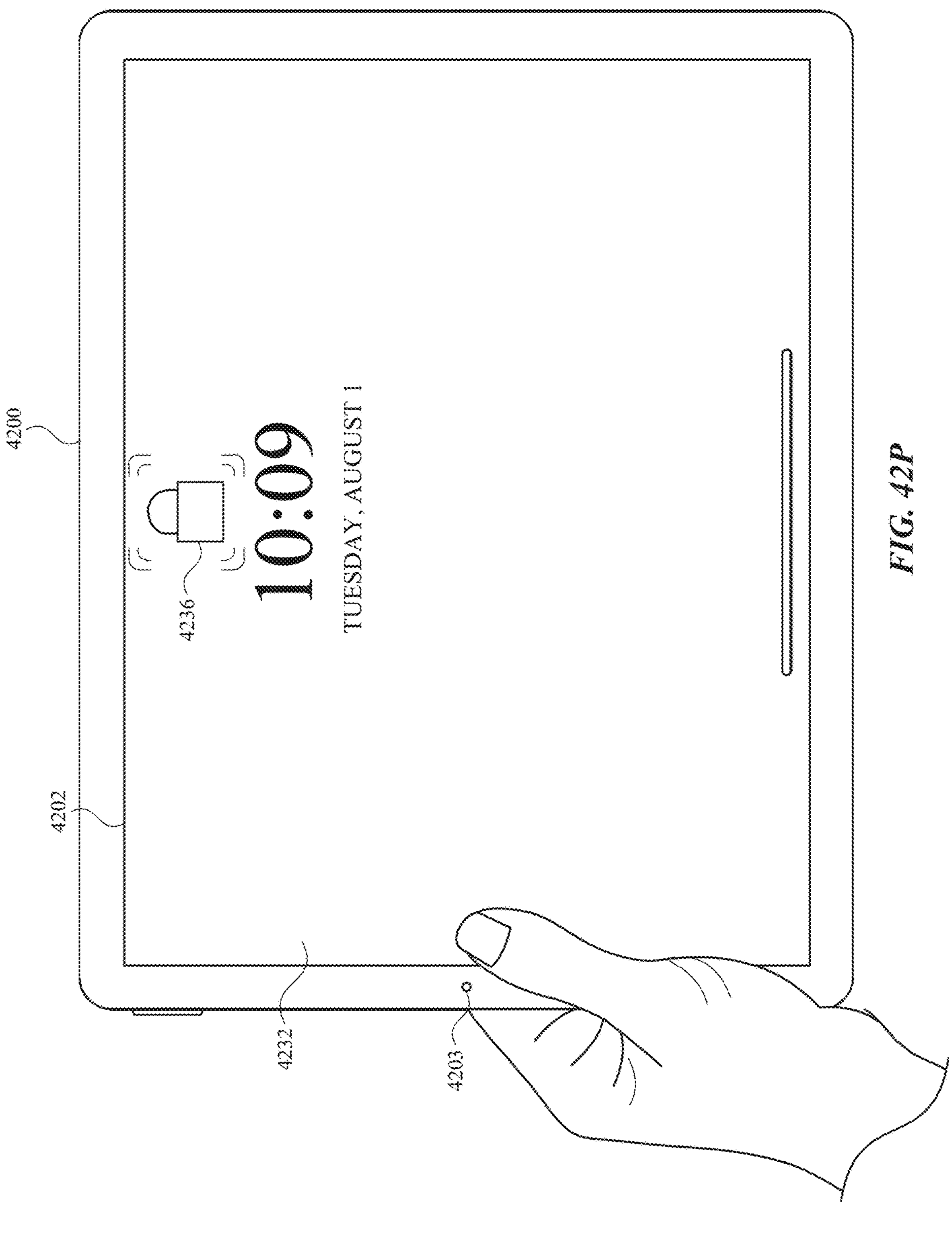
Figure 43C:
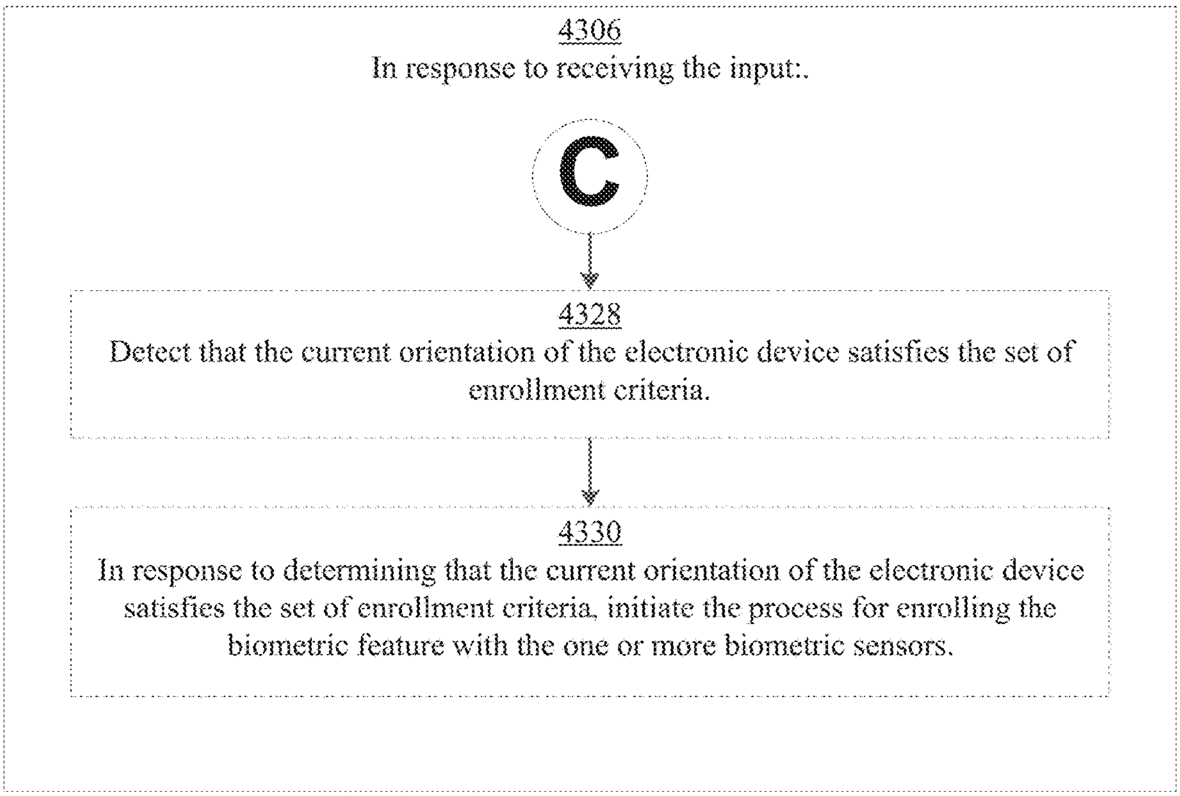

31B are a flow diagram illustrating methods of cached biometric authentication. The user interfaces in FIGS. 30A-30AL are used to illustrate the processes described below, including the processes in FIGS. 31A-31B. FIGS. 32A-32W illustrate exemplary user interfaces for autofilling fillable fields based on visibility criteria. FIG. 33 is a flow diagram illustrating methods of autofilling fillable fields based on visibility criteria. The user interfaces in FIGS. 32A-32W are used to illustrate the processes described below, including the processes in FIG. 33. FIGS. 34A-34N illustrate exemplary user interfaces for automatic log-in using biometric authentication. FIG. 35 is a flow diagram illustrating methods of automatic log-in using biometric authentication. The user interfaces in FIGS. 34A-34N are used to illustrate the processes described below, including the processes in FIG. 35. FIGS. 36A-36L illustrate exemplary user interfaces for retrying biometric authentication at a credential entry user interface. FIGS. 37A-37B are flow diagrams illustrating a method for retrying biometric authentication at a credential entry user interface. The user interfaces in FIGS. 36A-36L are used to illustrate the processes described below, including the processes in FIGS. 37A-37B. FIGS. 38A-38AD illustrate exemplary user interfaces for providing indications of error conditions during biometric authentication. FIGS. 39A-39B are flow diagrams illustrating a method for providing indications of error conditions during biometric authentication. The user interfaces in FIGS. 38A-38AD are used to illustrate the processes described below, including the processes in FIGS. 39A-39B. FIGS. 40A-40U illustrate exemplary user interfaces for providing indications about the biometric sensor during biometric authentication. FIGS. 41A-41C are flow diagrams illustrating a method for providing indications about the biometric sensor during biometric authentication. The user interfaces in FIGS. 40A-40U are used to illustrate the processes described below, including the processes in FIGS. 41A-41C. FIGS. 42A-42P illustrate exemplary user interfaces for orienting the device to enroll a biometric feature. FIGS. 43A-43C are flow diagrams illustrating a method for orienting the device to enroll a biometric feature. The user interfaces in FIGS. 42A-42P are used to illustrate the processes described below, including the processes in FIGS. 43A-43C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
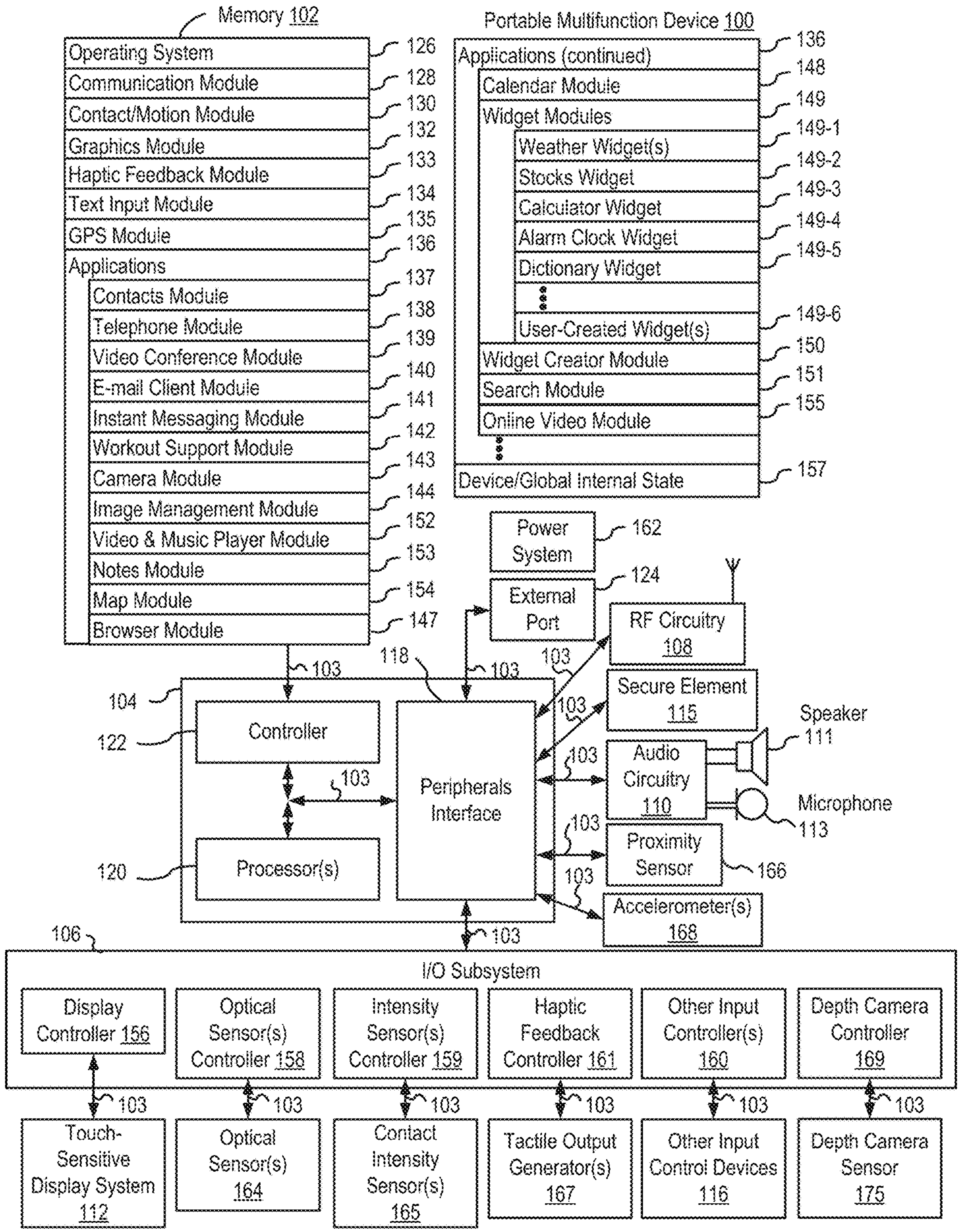
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that is, in some circumstances, otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs can invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
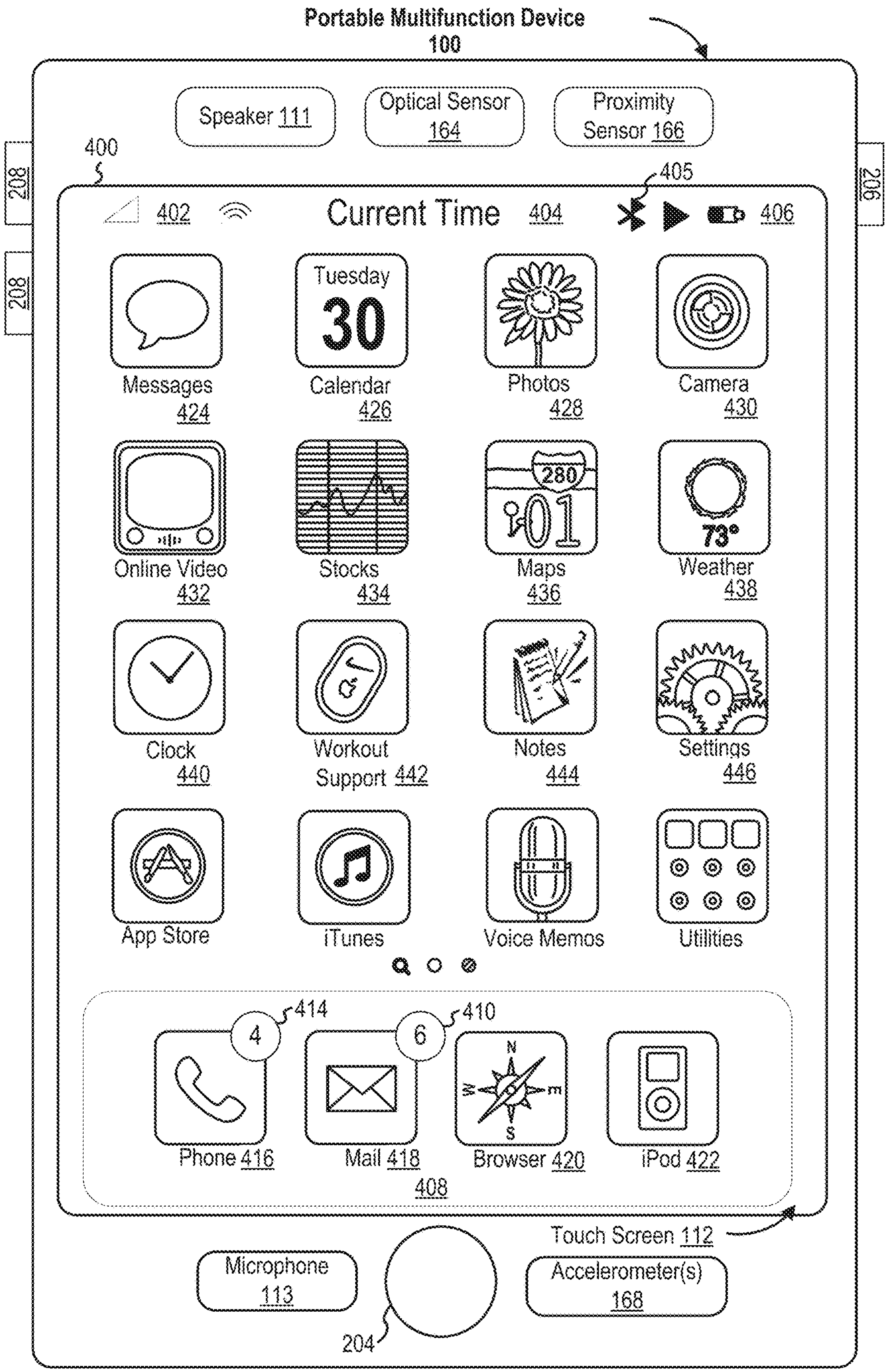
FIG. 4A illustrates an exemplary user interface for a menu of applications on a portable multifunction device in accordance with some embodiments.
Figure 4B:
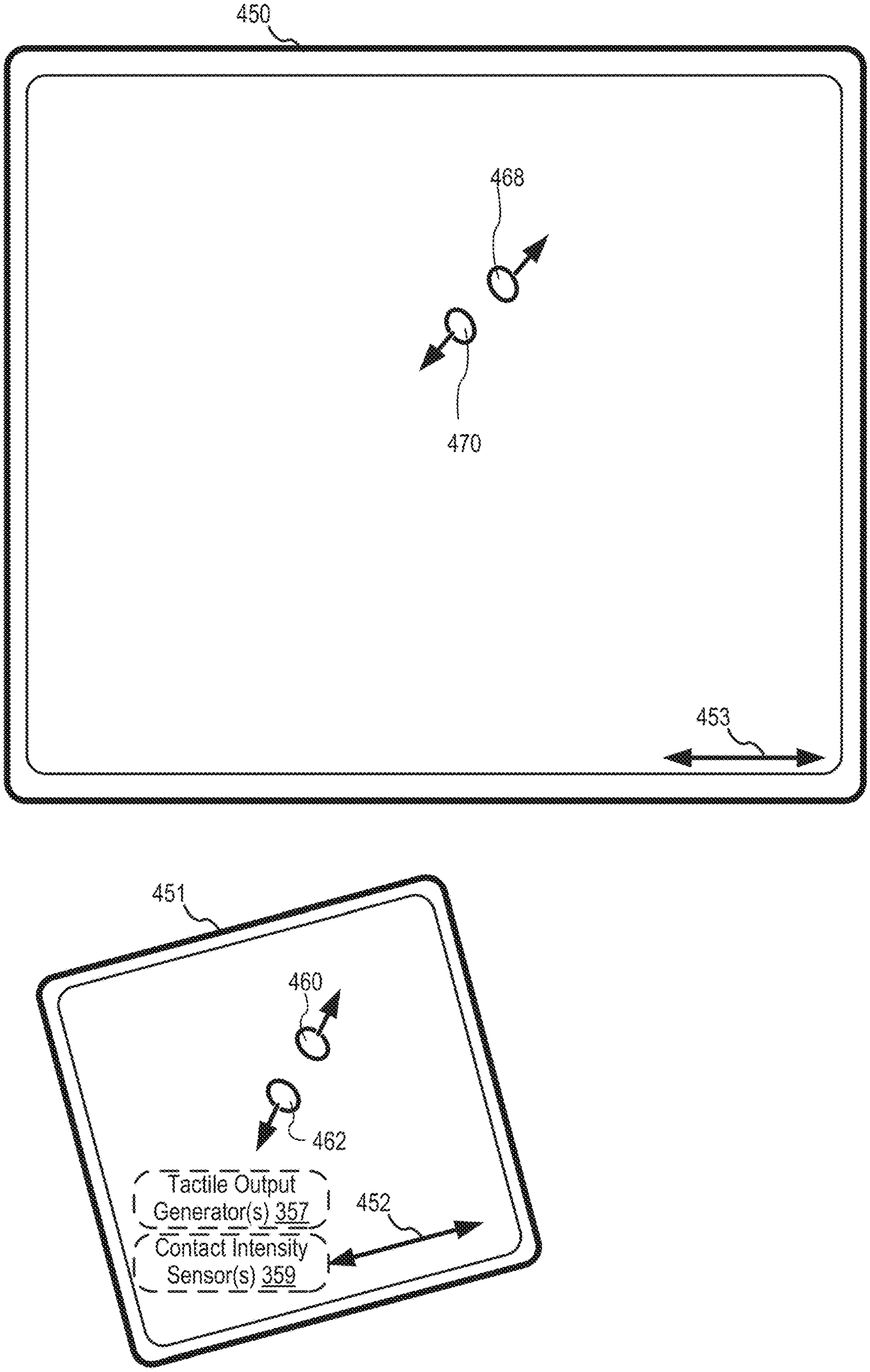
FIG. 4B illustrates an exemplary user interface for a multifunction device with a touch-sensitive surface that is separate from the display in accordance with some embodiments.
Figure 4C:
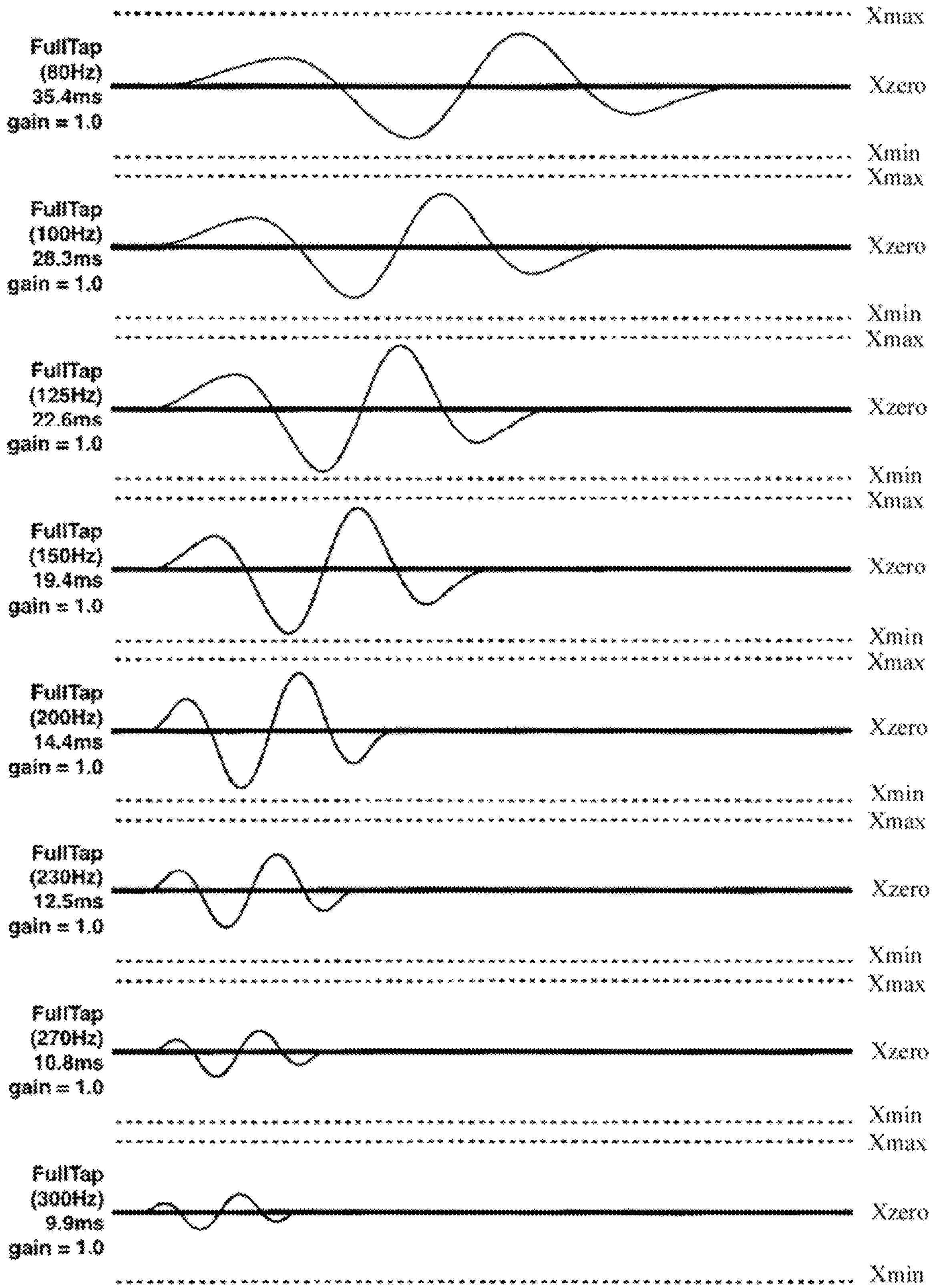
FIGS. 4C-4H illustrate exemplary tactile output patterns that have a particular waveform, in accordance with some embodiments.
Figure 4D:
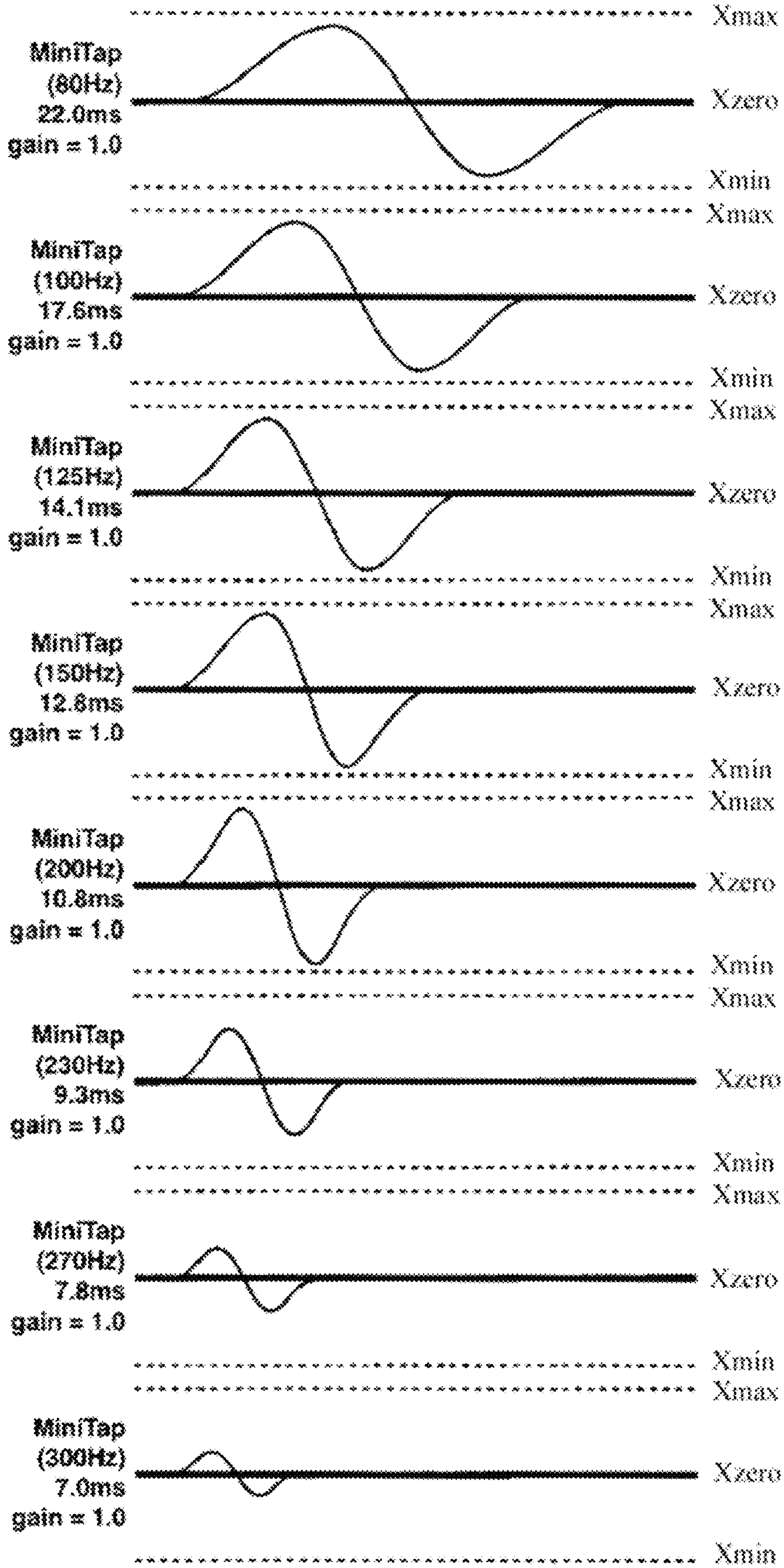
Figure 4E:
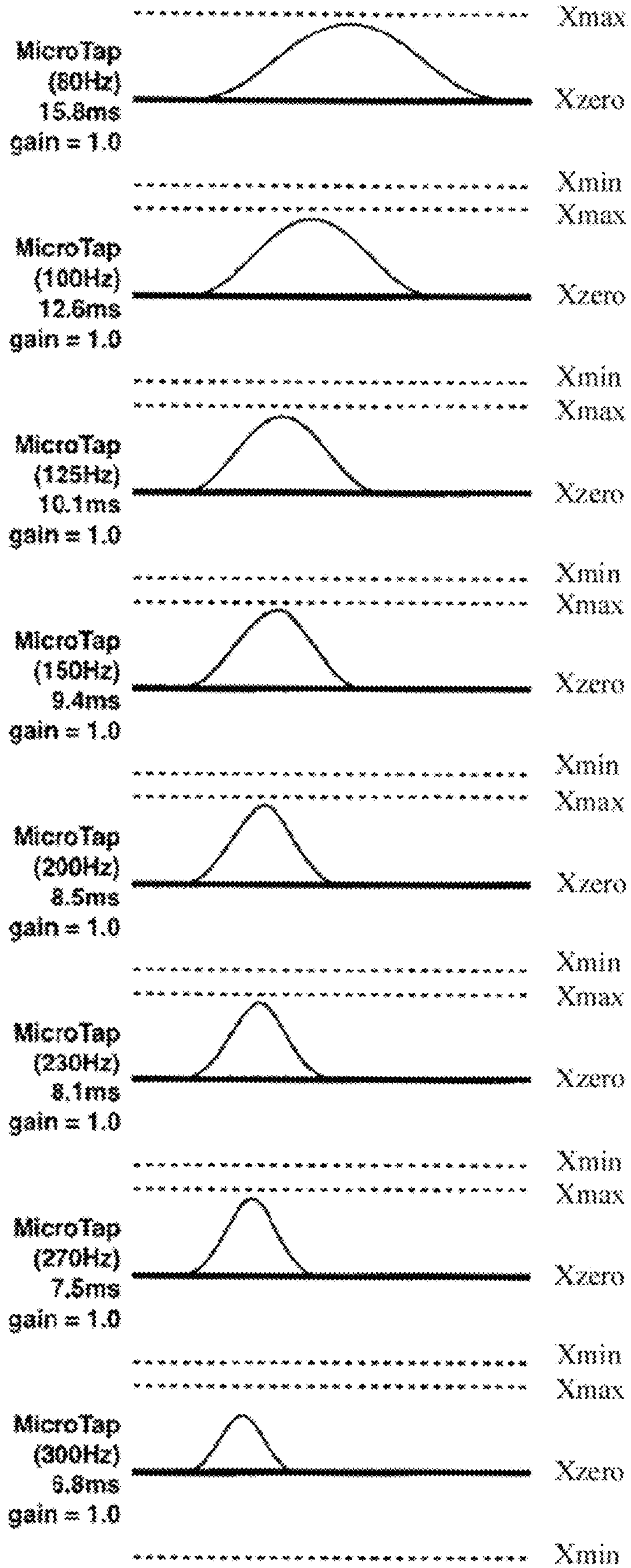
Figure 4F:
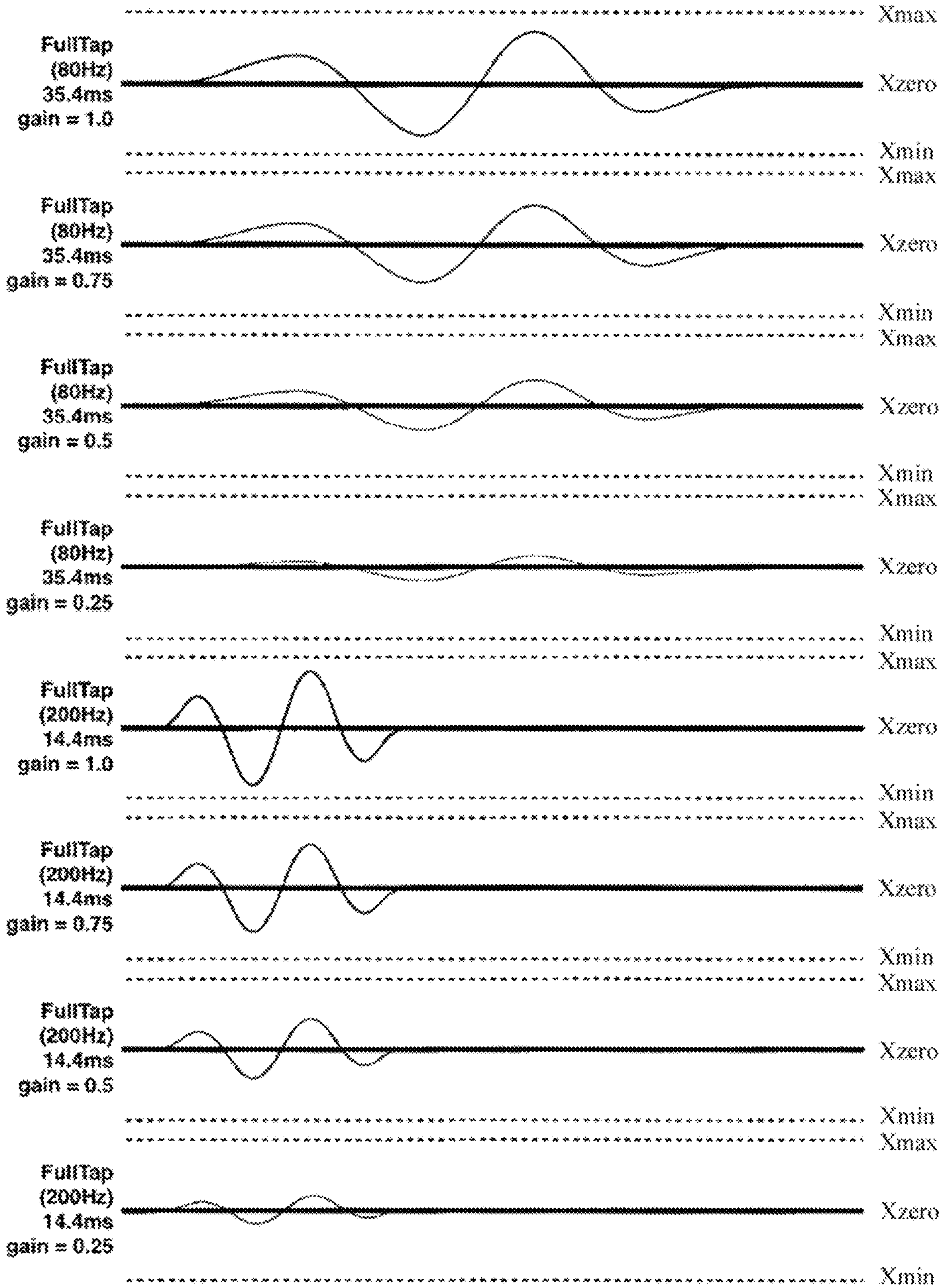
Figure 4G:
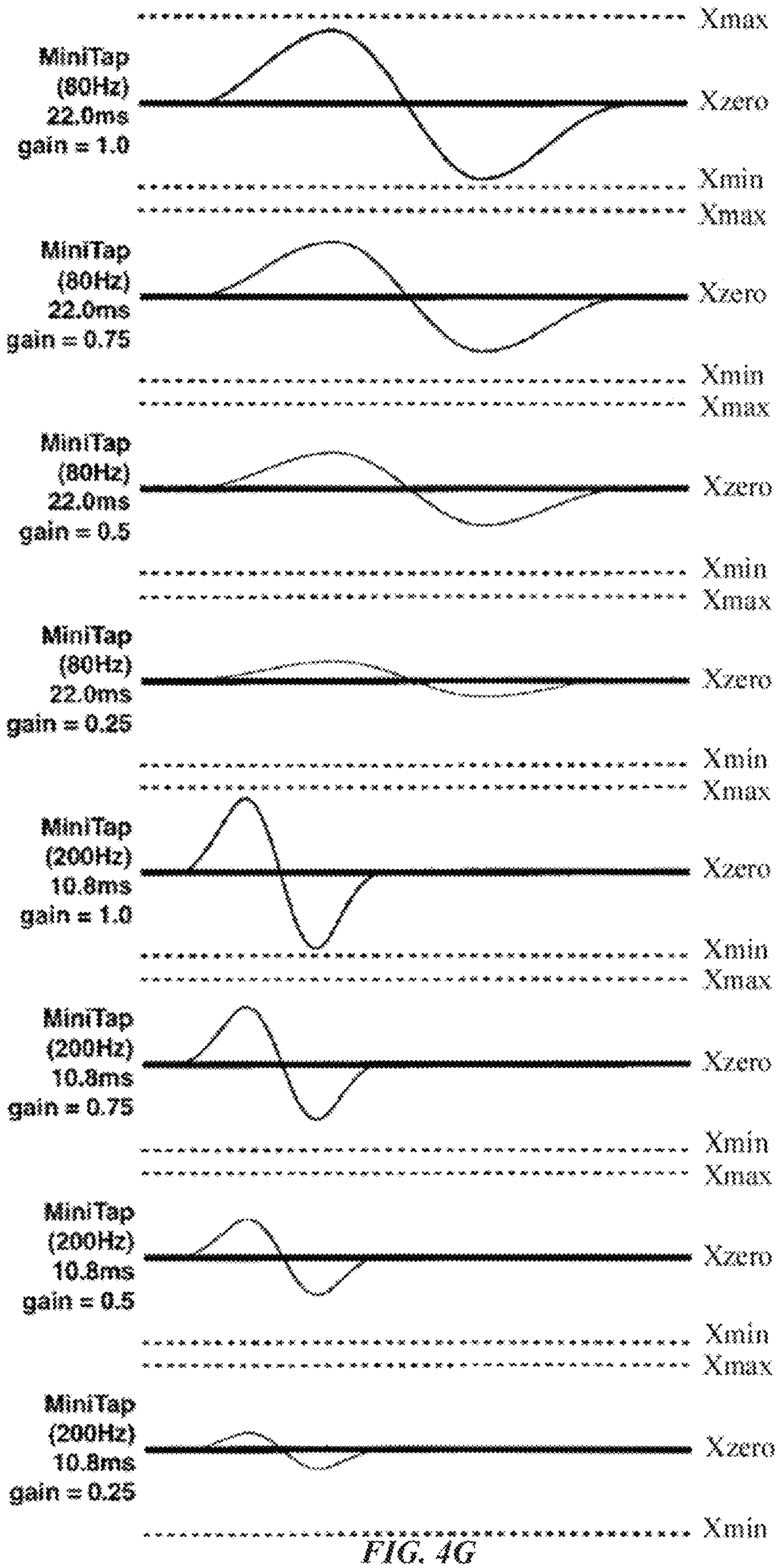
Figure 4H:
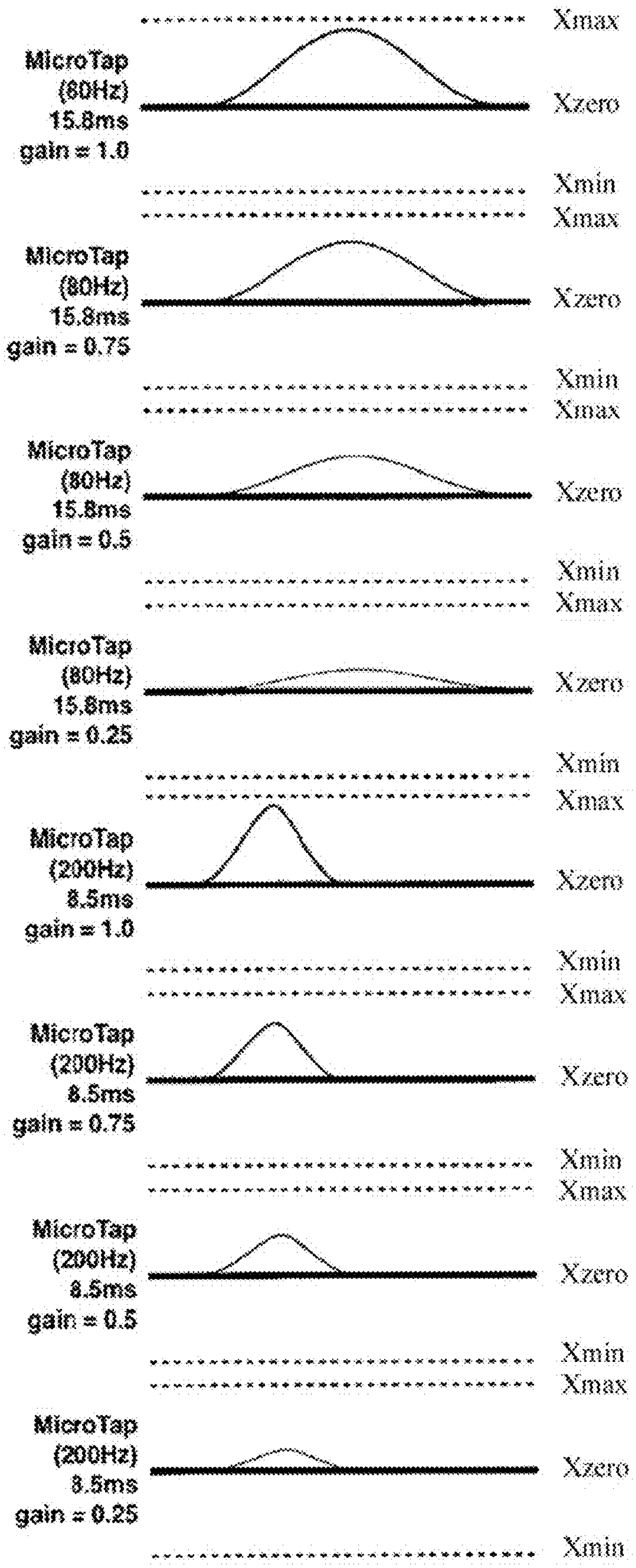

FIGS. 4C-4E provide a set of sample tactile output patterns that can be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4F-4H, which are each shown with variants having a gain of 1.0, 0.75, 0.5, and 0.25. As shown in FIGS. 4F-4H, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4C-4H show tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in FIG. 4C (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4D (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4E (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4C-4H include $x_{min}$ and $x_{max}$ values which represent the maximum and minimum extent of movement of the moveable mass. For larger electronic devices with larger moveable masses, there can be larger or smaller minimum and maximum extents of movement of the mass. The examples shown in FIGS. 4C-4H describe movement of a mass in 1 dimension, however similar principles would also apply to movement of a moveable mass in two or three dimensions.

As shown in FIGS. 4C-4E, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4C-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4C). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency can take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4C-4E, a tactile output pattern also has a characteristic amplitude that affects the amount of energy that is contained in a tactile signal, or a "strength" of a haptic sensation that can be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern can be modulated by an "envelope" and the peaks of adjacent cycles can have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 4C-4E for illustrative purposes, tactile output patterns with other frequencies, amplitudes, and waveforms can be used for similar purposes. For example, waveforms that have between 0.5 to 4 cycles can be used. Other frequencies in the range of 60 Hz-400 Hz can be used as well. Table 1 provides examples of particular haptic feedback behaviors, configurations, and examples of their use.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, depth camera controller 169, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, device 100 also includes (or is in communication with) one or more fingerprint sensors. The one or more fingerprint sensors are coupled to peripherals interface 118. Alternately, the one or more fingerprint sensors are, optionally, coupled to an input controller 160 in I/O subsystem 106. However, in one common embodiment, fingerprint identification operations are performed using secured dedicated computing hardware (e.g., one or more processors, memory and/or communications busses) that has additional security features so as to enhance security of the fingerprint information determined by the one or more fingerprint sensors. As used herein, a fingerprint sensor is a sensor that is capable of distinguishing fingerprint features (sometimes called "minutia features") of the ridges and valleys of skin such as those found on the fingers and toes of humans. A fingerprint sensor can use any of a variety of techniques to distinguish the fingerprint features, including but not limited to: optical fingerprint imaging, ultrasonic fingerprint imaging, active capacitance fingerprint imaging and passive capacitance fingerprint imaging. In addition to distinguishing fingerprint features in fingerprints, in some embodiments, the one or more fingerprint sensors are capable of tracking movement of fingerprint features over time and thereby determining/characterizing movement of the fingerprint over time on the one or more fingerprint sensors. While the one or more fingerprint sensors can be separate from the touch-sensitive surface (e.g., Touch-Sensitive Display System 112), it should be understood that in some implementations, the touch-sensitive surface (e.g., Touch-Sensitive Display System 112) has a spatial resolution that is high enough to detect fingerprint features formed by individual fingerprint ridges and is used as a fingerprint sensor instead of, or in addition to, the one or more fingerprint sensors. In some embodiments, device 100 includes a set of one or more orientation sensors that are used to determine an orientation of a finger or hand on or proximate to the device (e.g., an orientation of a finger that is over one or more fingerprint sensors). Additionally, in some embodiments, the set of one or more orientation sensors are used in addition to or instead of a fingerprint sensor to detect rotation of a contact that is interacting with the device (e.g., in one or more of the methods described below, instead of using a fingerprint sensor to detect rotation of a fingerprint/contact, the set of one or more orientation sensors is used to detect rotation of the contact that includes the fingerprint, with or without detecting features of the fingerprint).

In some embodiments, features of fingerprints and comparisons between features of detected fingerprints and features of stored fingerprints are performed by secured dedicated computing hardware (e.g., one or more processors, memory and/or communications busses) that are separate from processor(s) 120, so as to improve security of the fingerprint data generated, stored and processed by the one or more fingerprint sensors. In some embodiments, features of fingerprints and comparisons between features of detected fingerprints and features of enrolled fingerprints are performed by processor(s) 120 using a fingerprint analysis module.

In some embodiments, during an enrollment process, the device (e.g., a fingerprint analysis module or a separate secure module in communication with the one or more fingerprint sensors) collects biometric information about one or more fingerprints of the user (e.g., identifying relative location of a plurality of minutia points in a fingerprint of the user). After the enrollment process has been completed the biometric information is stored at the device (e.g., in a secure fingerprint module) for later use in authenticating detected fingerprints. In some embodiments, the biometric information that is stored at the device excludes images of the fingerprints and also excludes information from which images of the fingerprints could be reconstructed so that images of the fingerprints are not inadvertently made available if the security of the device is compromised. In some embodiments, during an authentication process, the device (e.g., a fingerprint analysis module or a separate secure module in communication with the one or more fingerprint sensors) determines whether a finger input detected by the one or more fingerprint sensors includes a fingerprint that matches a previously enrolled fingerprint by collecting biometric information about a fingerprint detected on the one or more fingerprint sensors (e.g., identifying relative locations of a plurality of minutia points in the fingerprint detected on the one or more fingerprint sensors) and comparing the biometric information that corresponds to the detected fingerprint to biometric information that corresponds to the enrolled fingerprints(s). In some embodiments, comparing the biometric information that corresponds to the detected fingerprint to biometric information that corresponds to the enrolled fingerprints(s) includes comparing a type and location of minutia points in the biometric information that corresponds to the detected fingerprint to a type and location of minutia points in the biometric information that corresponds to the enrolled fingerprints. However the determination as to whether or not a finger input includes a fingerprint that matches a previously enrolled fingerprint that is enrolled with the device is, optionally, performed using any of a number of well known fingerprint authentication techniques for determining whether a detected fingerprint matches an enrolled fingerprint.

Device 100 optionally also includes one or more depth camera sensors 175. FIG. 1A shows a depth camera sensor coupled to depth camera controller 169 in I/O subsystem 106. Depth camera sensor 175 receives data from the environment, projected through a sensor. In conjunction with imaging module 143 (also called a camera module), depth camera sensor 175 camera is optionally used to determine a depth map of different portions of an image captured by the imaging module 143. In some embodiments, a depth camera sensor is located on the front of device 100 so that the user's image with depth information is available for use by different functions of the device such as video conferencing capturing selfies with depth map data, and authenticating a user of the device. In some embodiments, the position of depth camera sensors 175 can be changed by the user (e.g., by rotating the lens and the sensor in the device housing) so that a depth camera sensors 175 is used along with the touch screen display for both video conferencing and still and/or video image acquisition.

Figure 3:
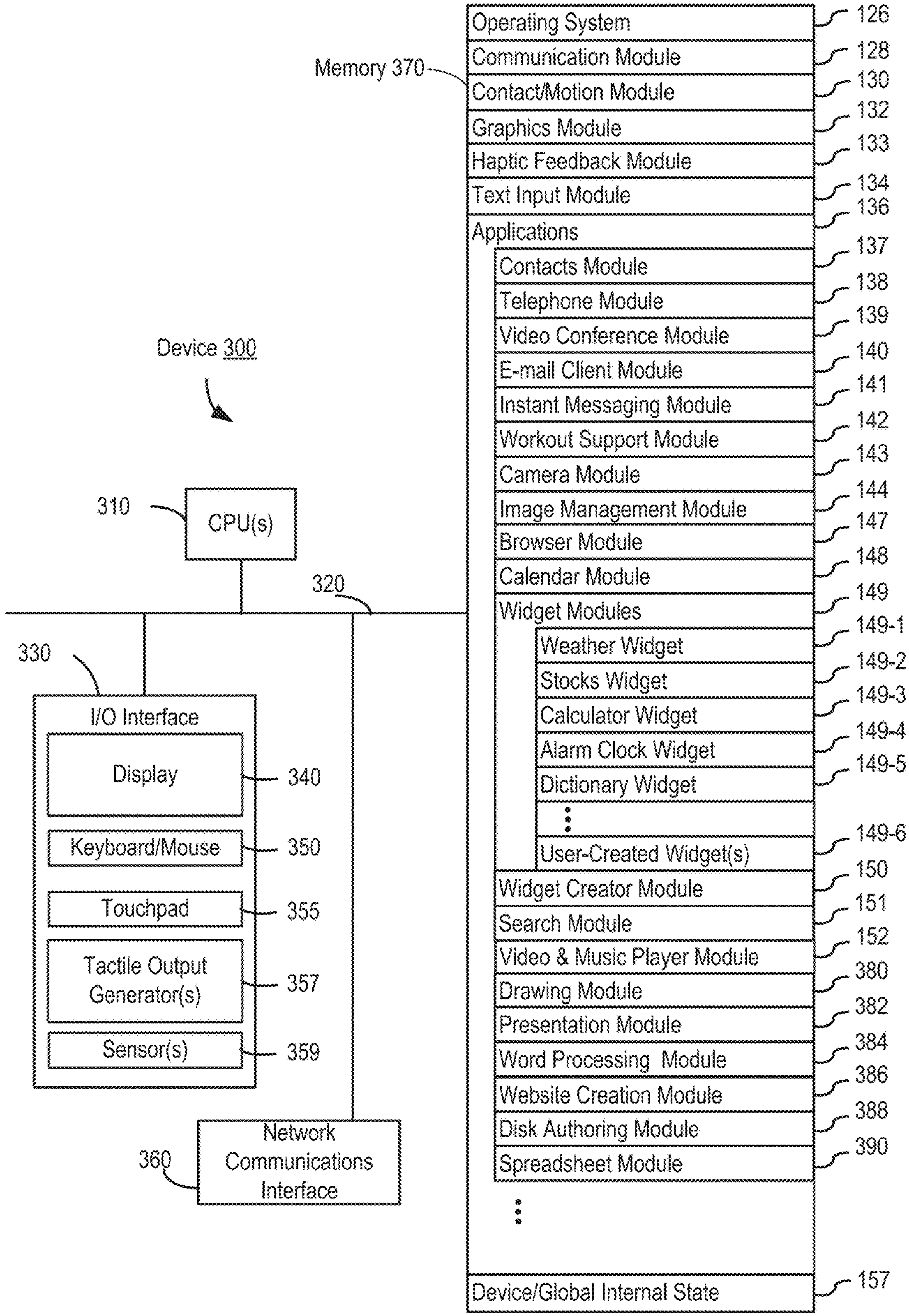
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
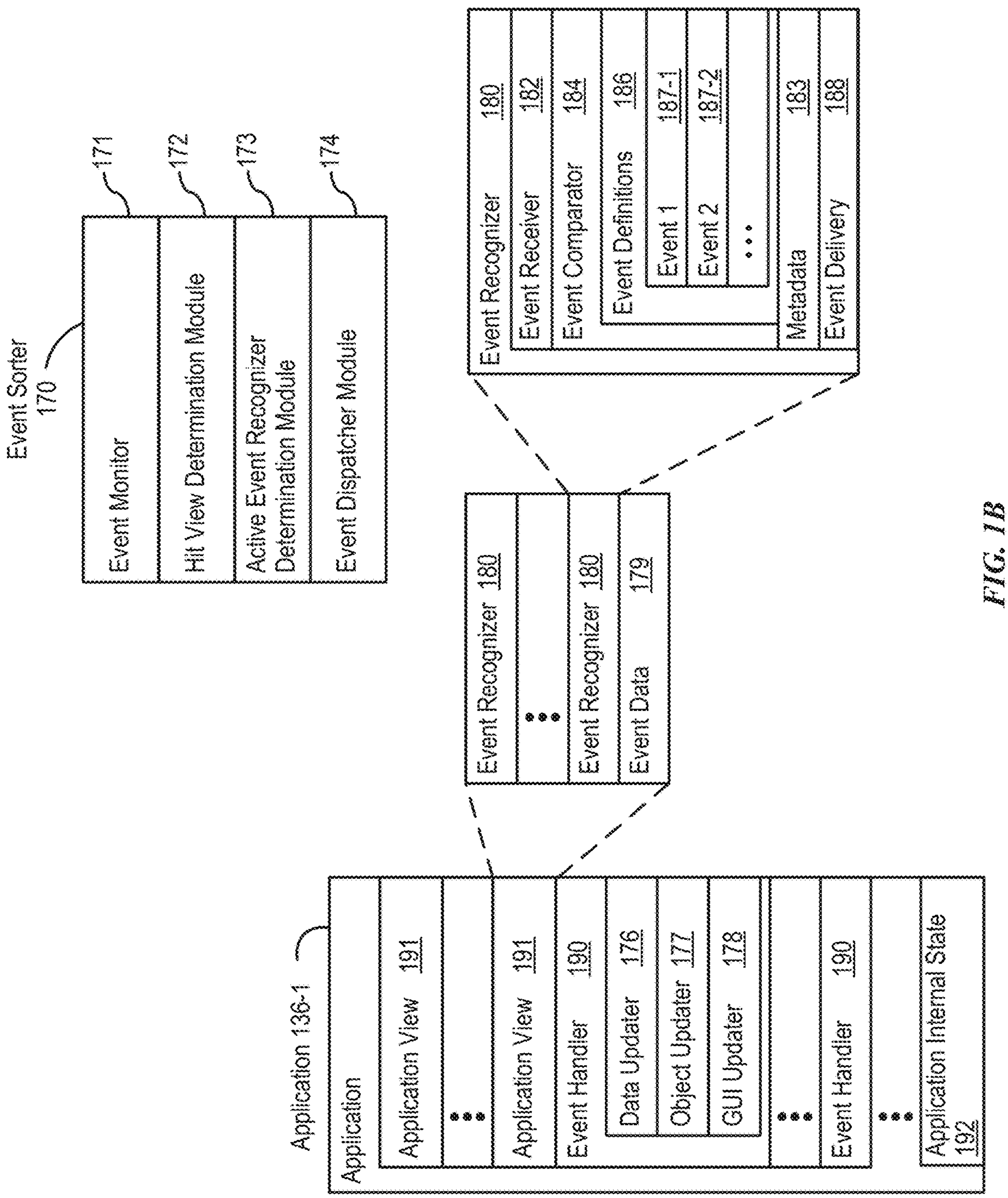
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

Figure 1C:
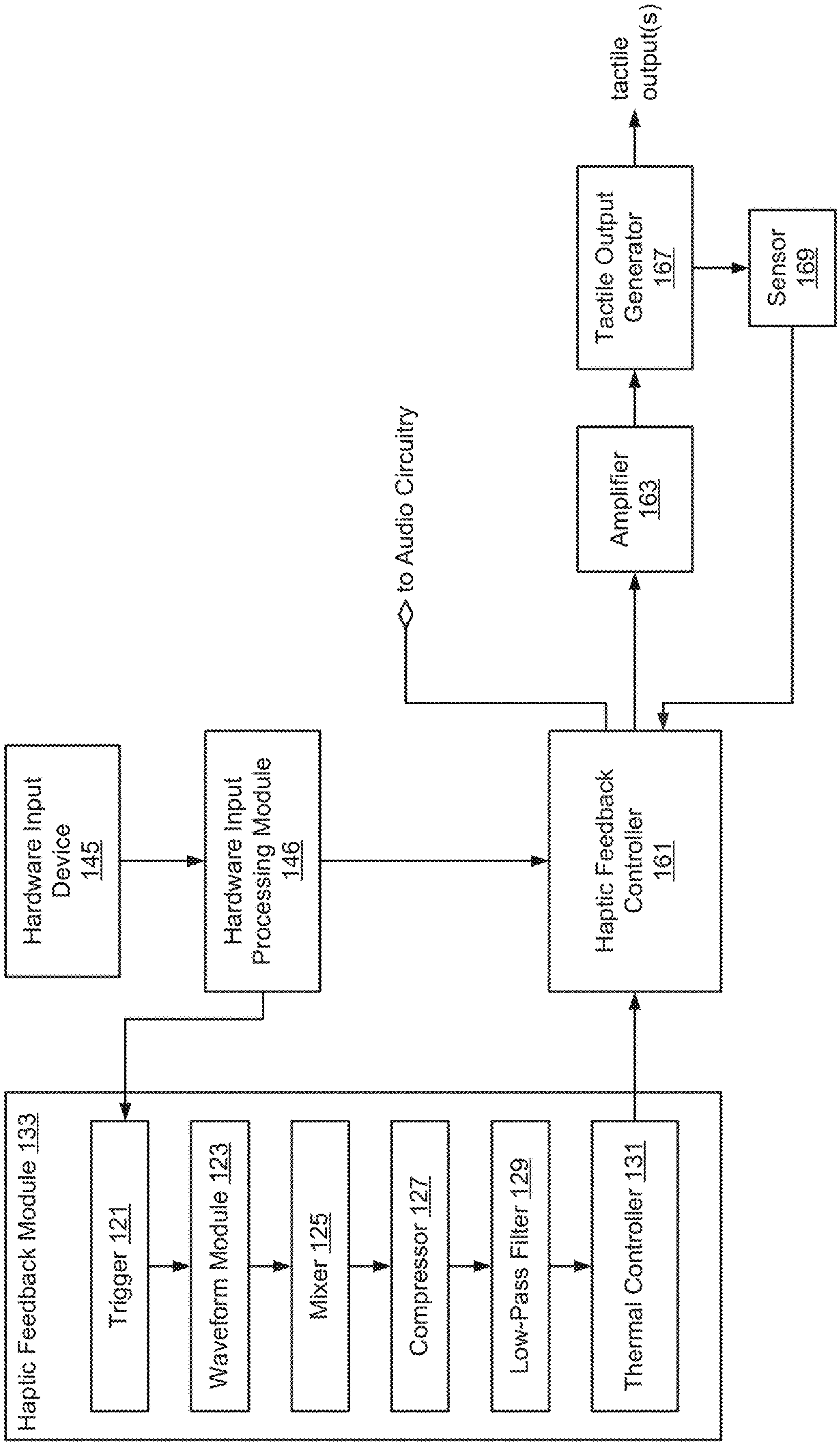
FIG. 1C is a block diagram illustrating exemplary components for generating a tactile output, in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4C-4D).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs can vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
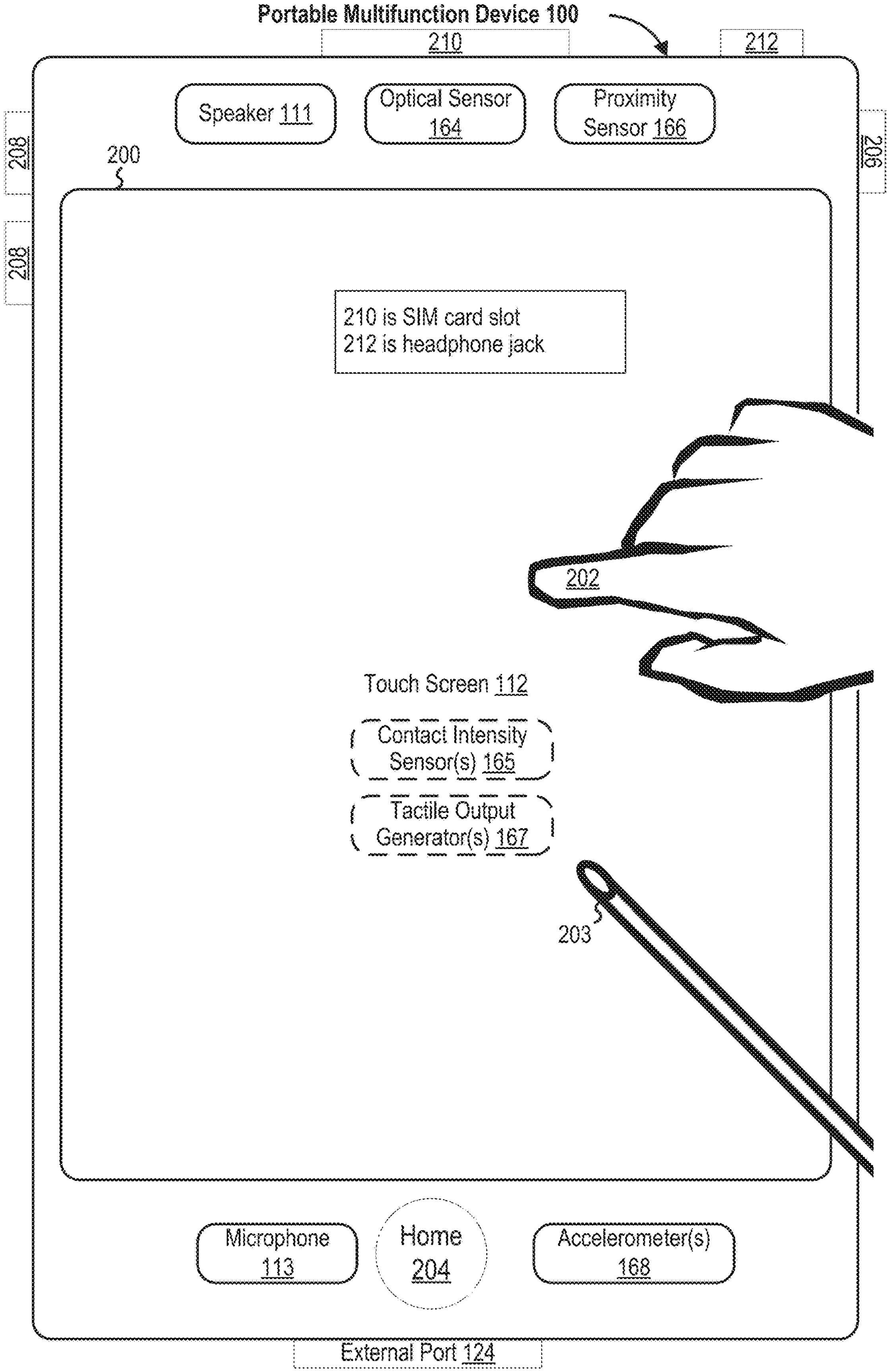
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
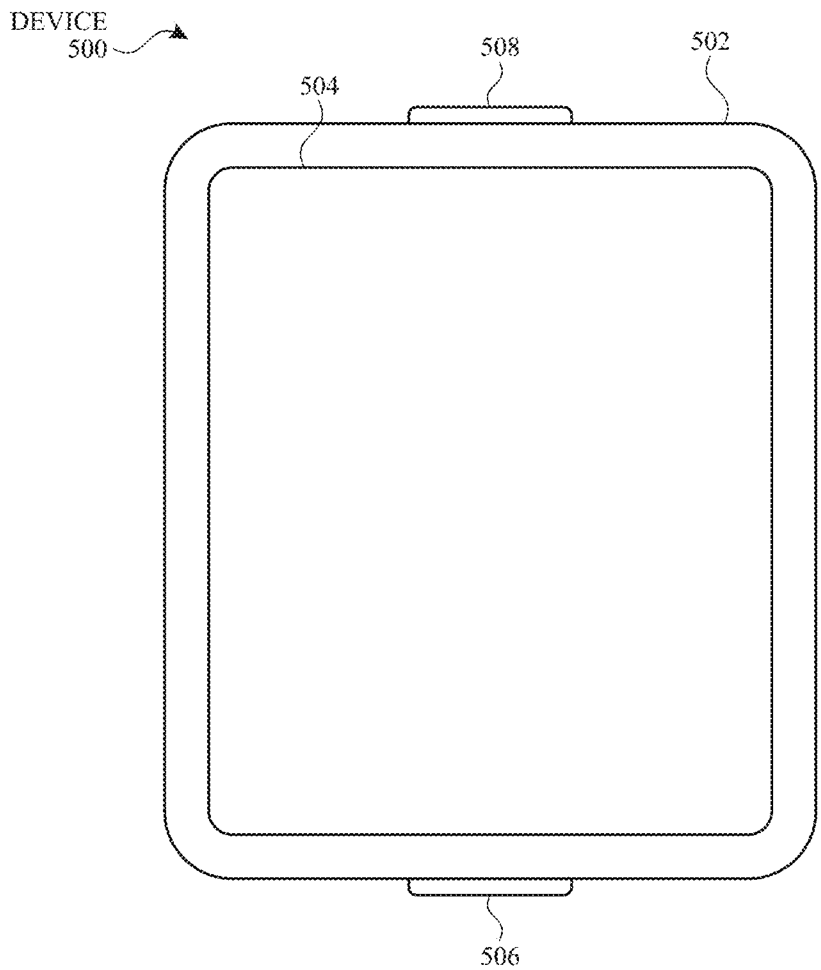
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
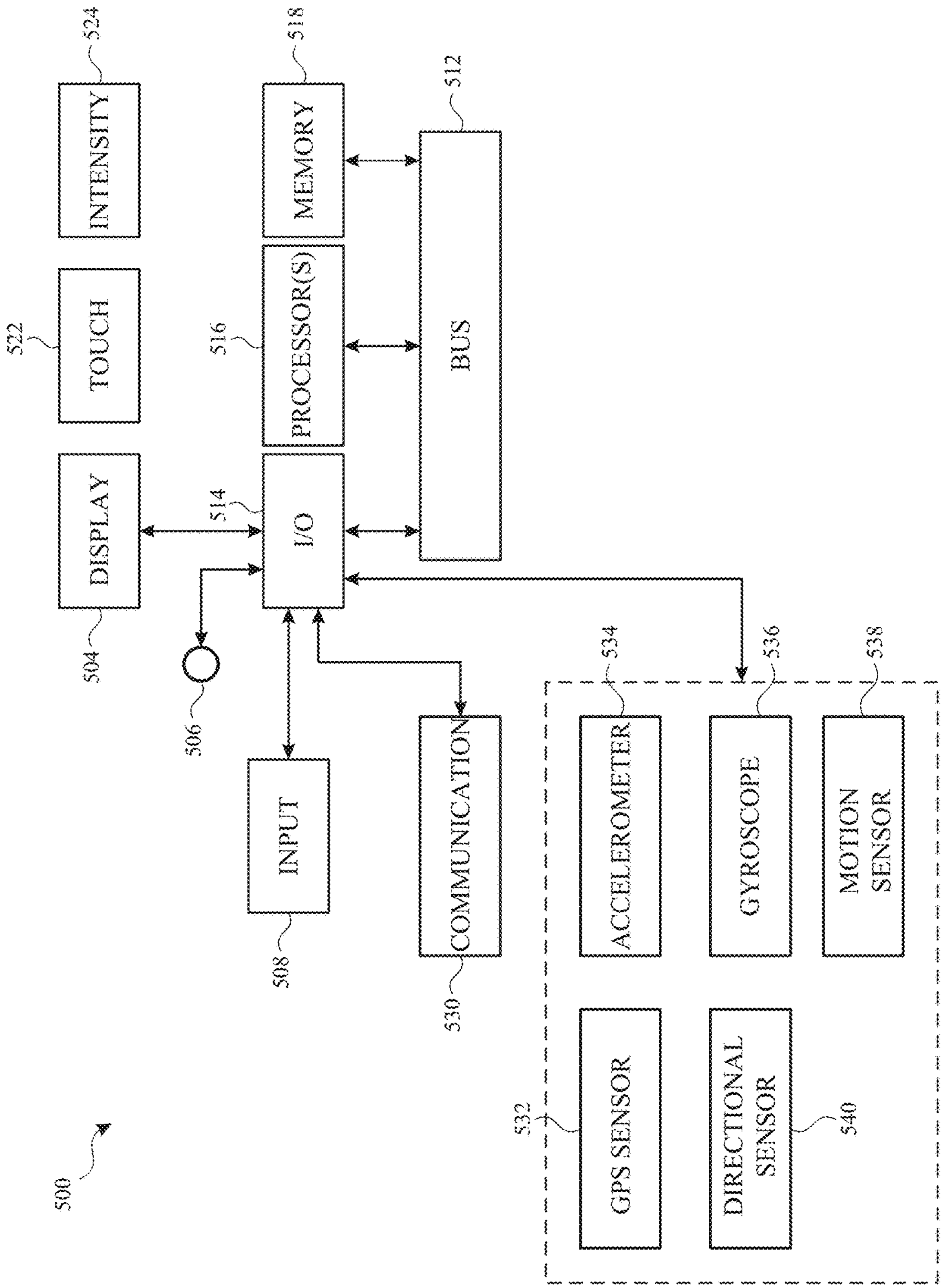
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800, 1000, 1200, 1400, 1600, 1800, 2000, 2200, 2500, 2700, 2900, 3100, 3300, 3500, 3700, 3900, 4100, 4300 (FIGS. 8, 10, 12, 14, 16, 18, 20, 22, 25, 27, 29, 31, 33, 35, 37, 39, 41, 43). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
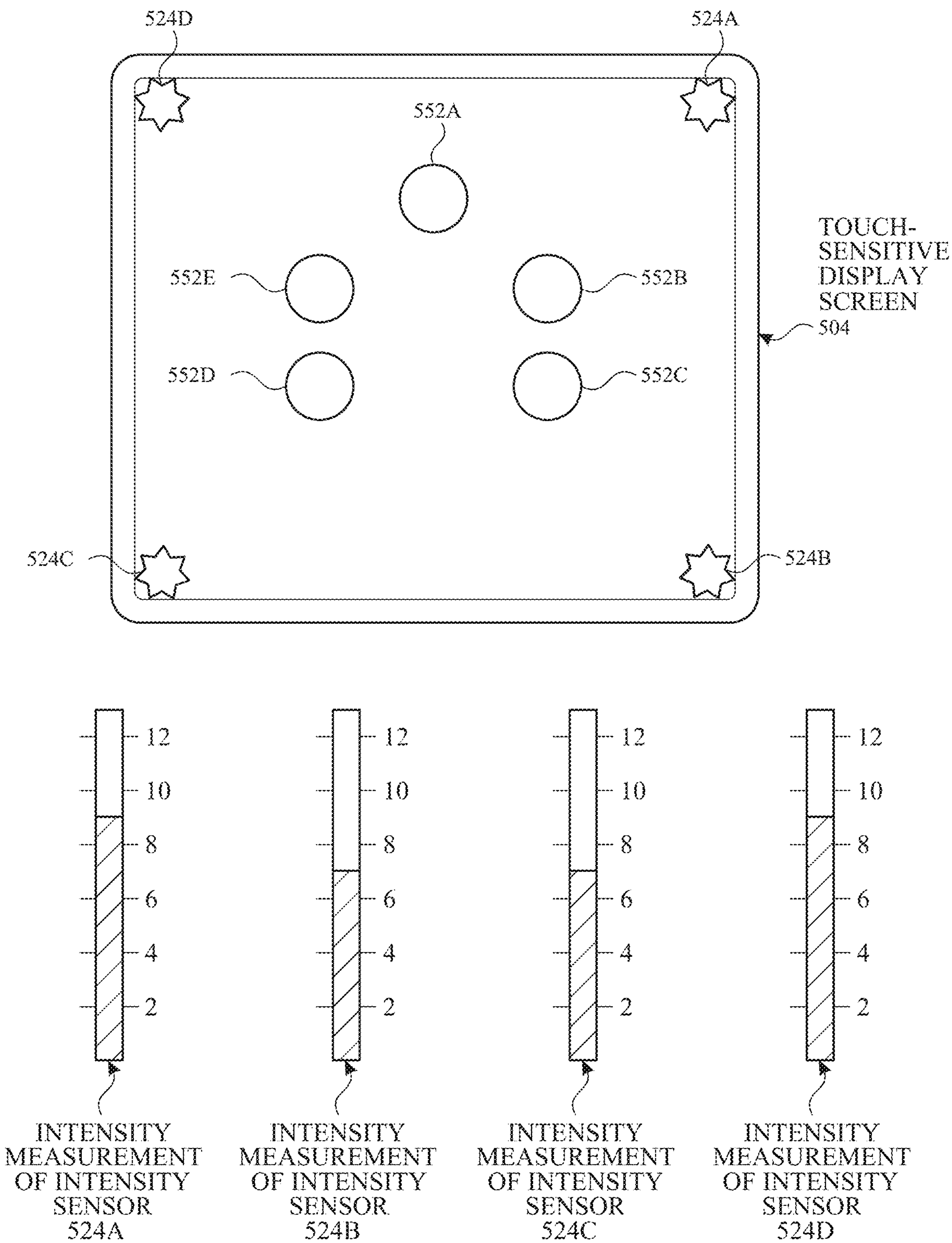
FIGS. 5C-5D illustrate exemplary components of a personal electronic device having a touch-sensitive display and intensity sensors in accordance with some embodiments.
Figure 5D:
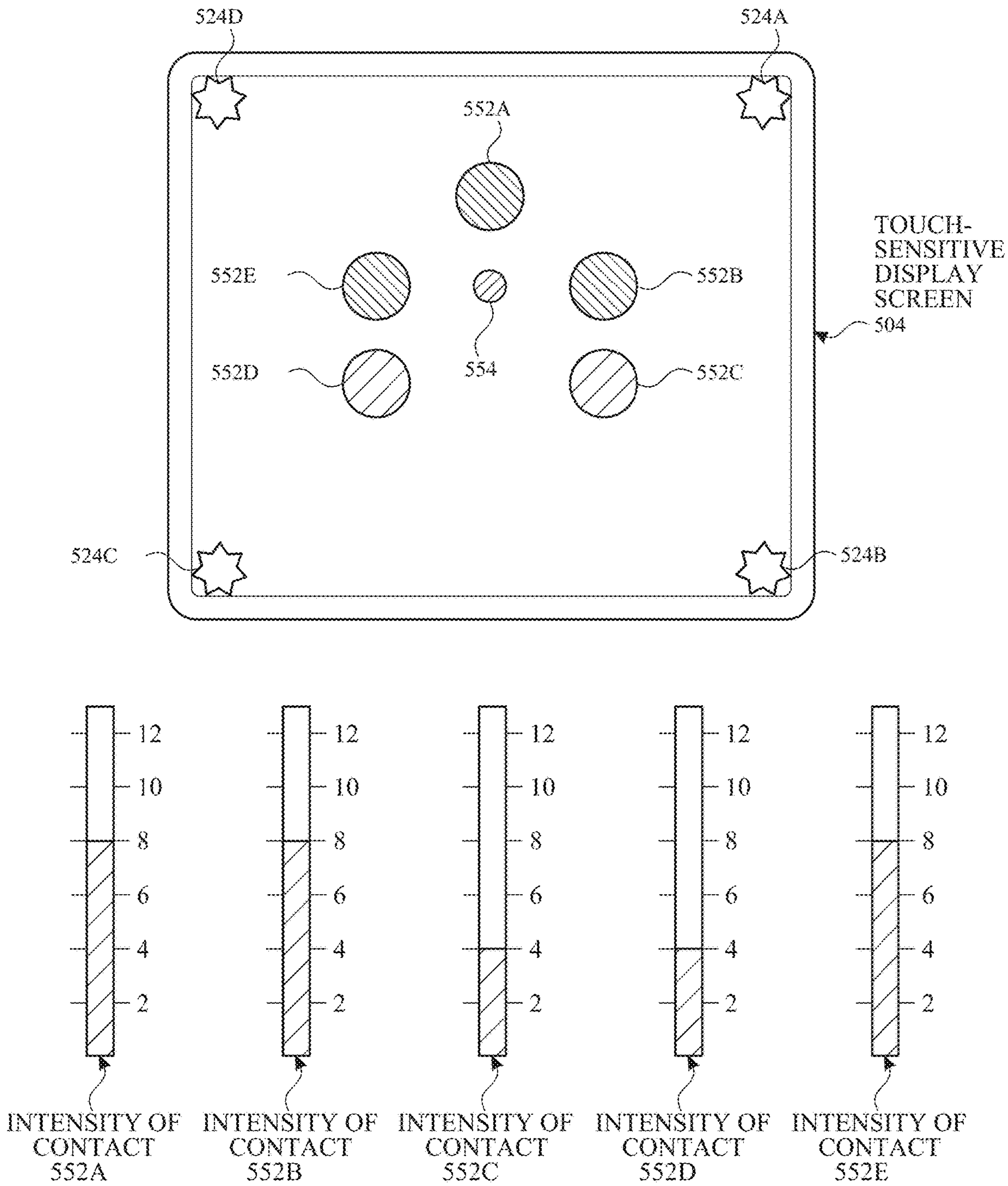

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
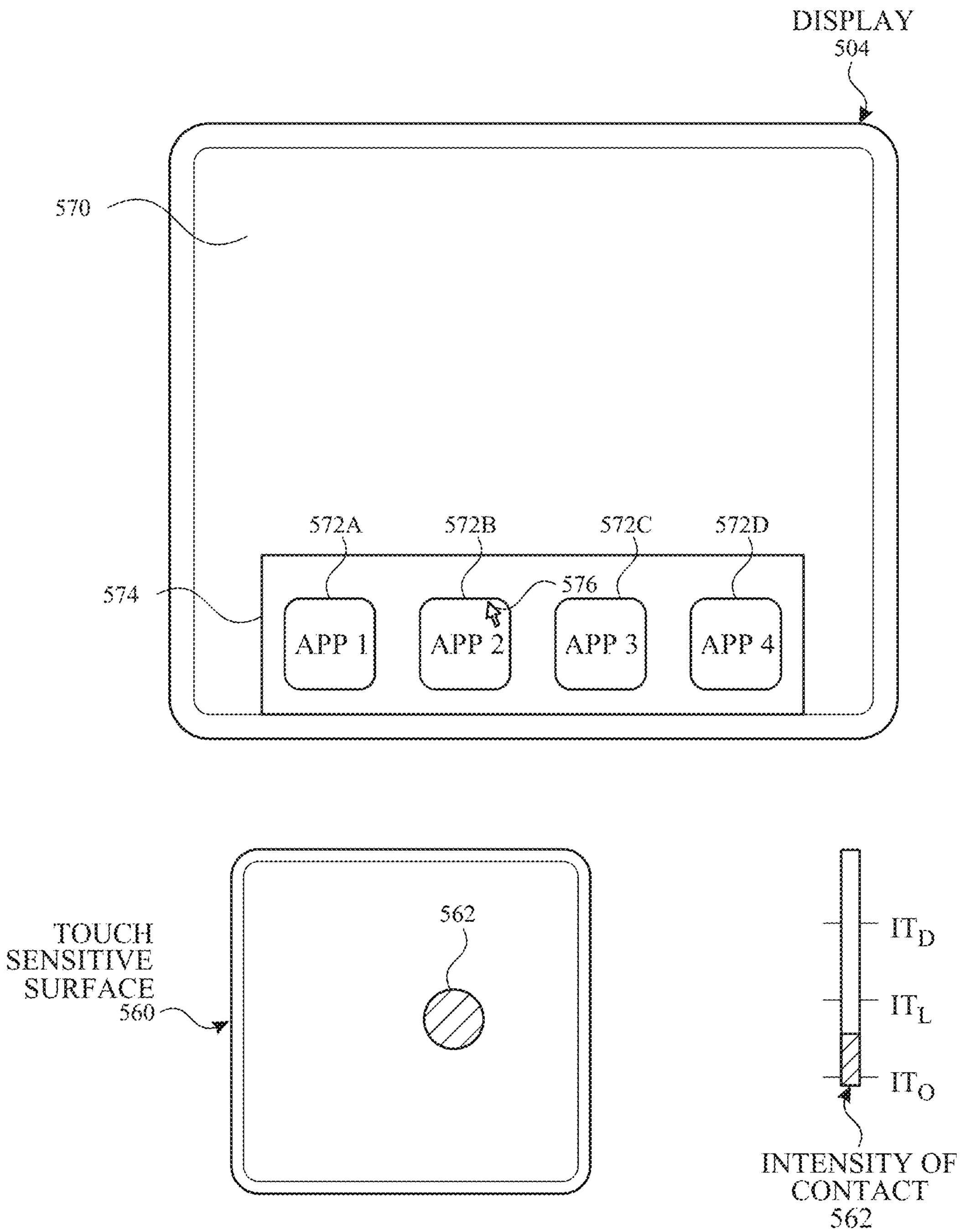
FIGS. 5E-5H illustrate exemplary components and user interfaces of a personal electronic device in accordance with some embodiments.
Figure 5F:
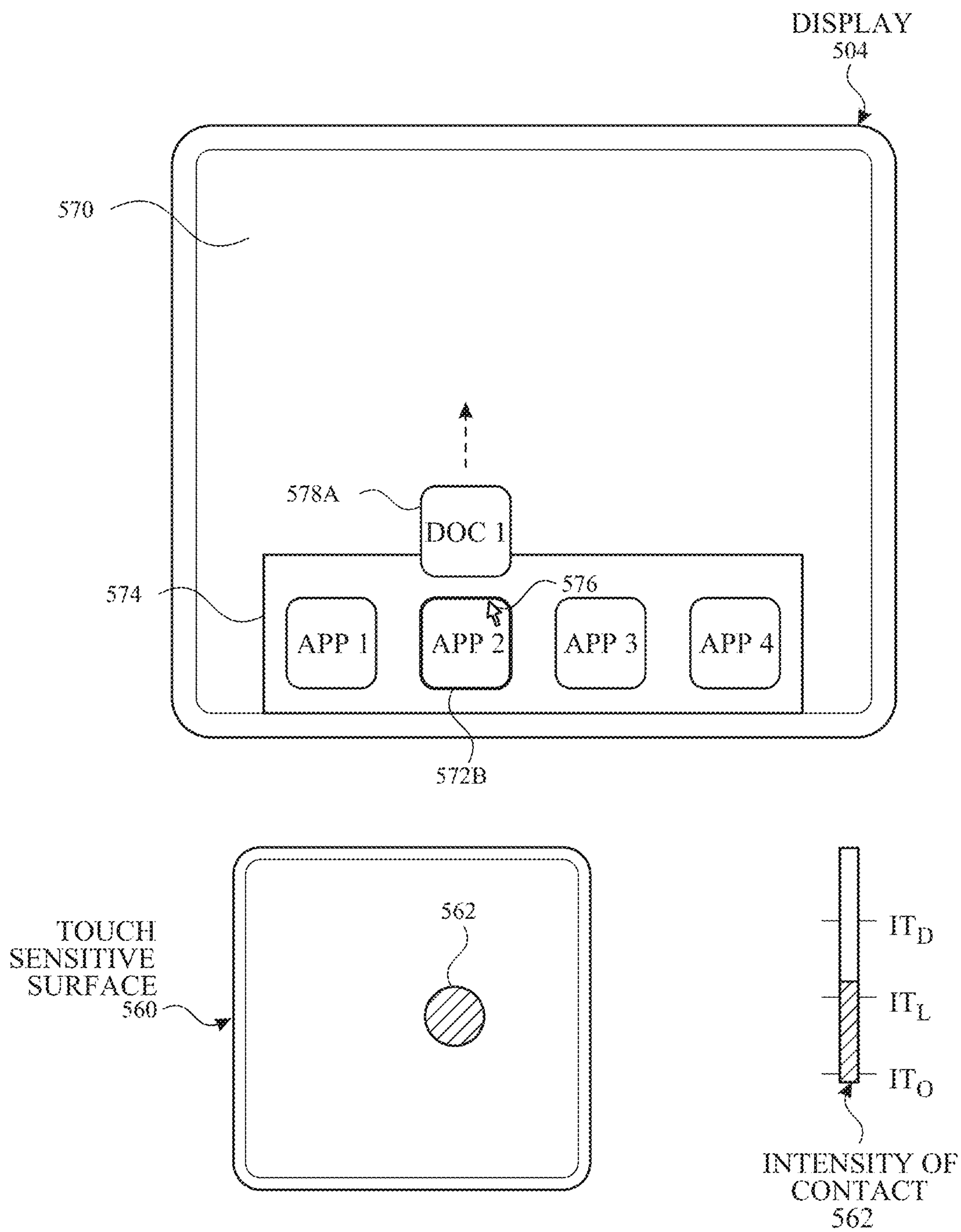
Figure 5G:
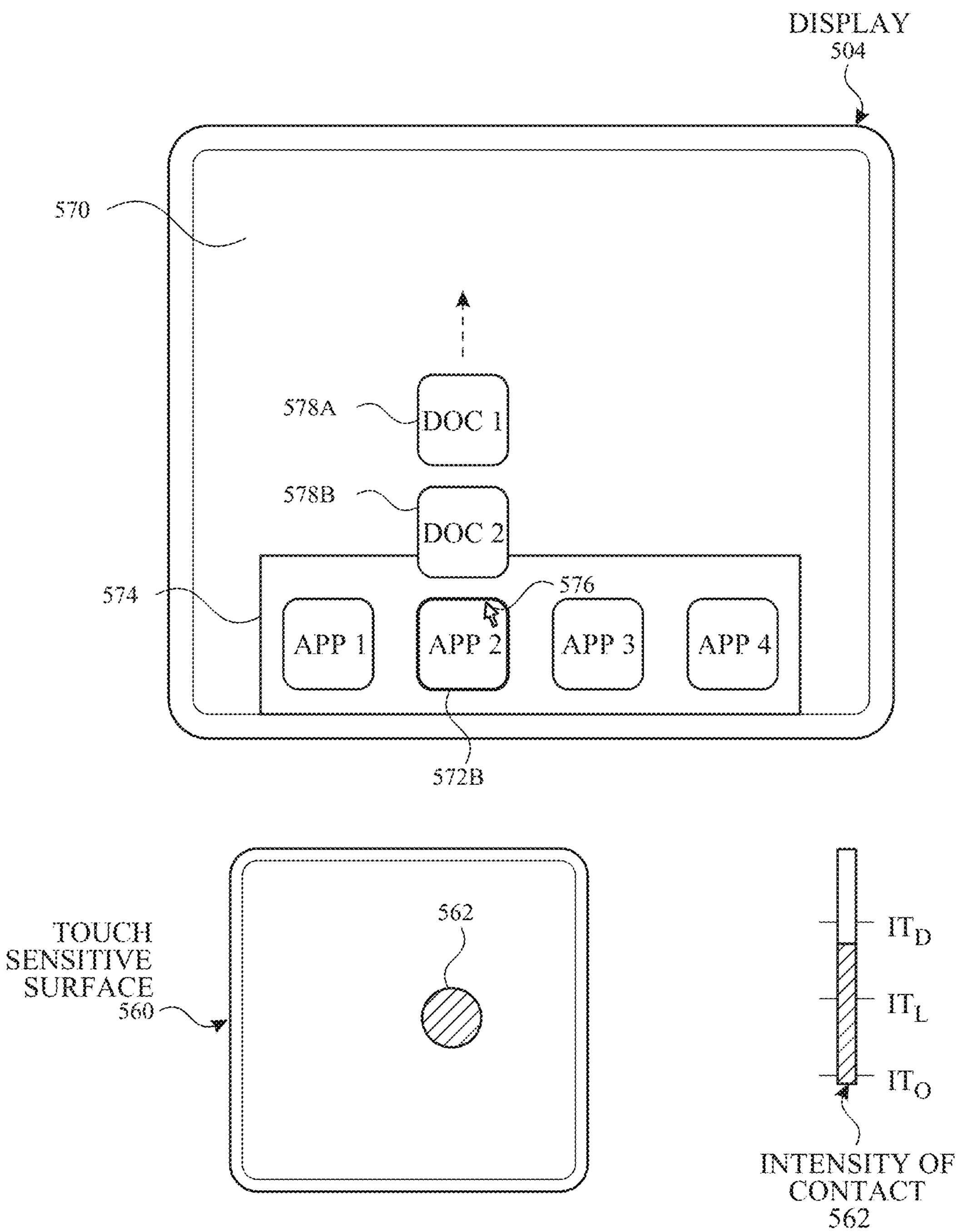
Figure 5H:
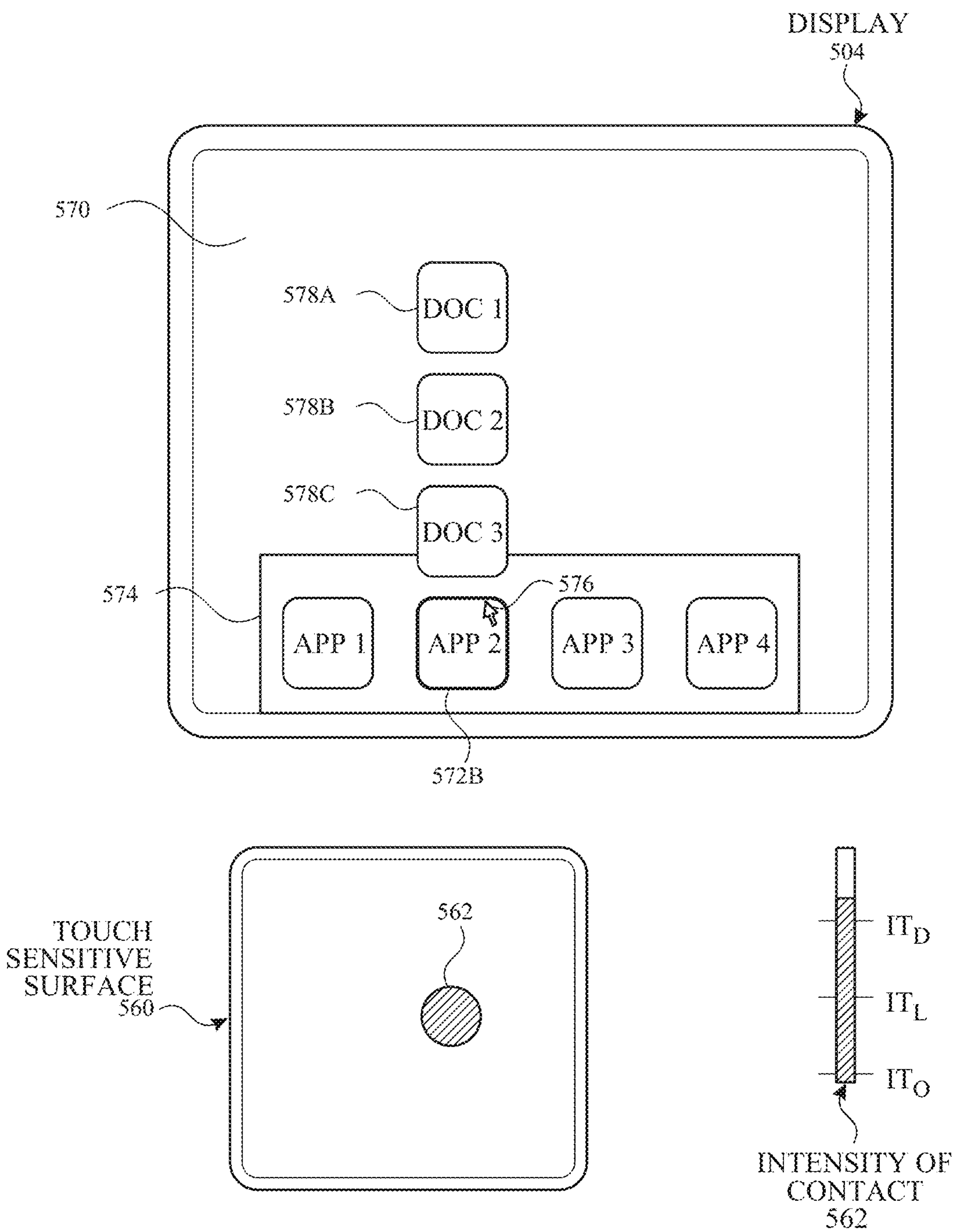

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations optionally includes navigation between user interfaces, activation or deactivation of a predefined set of functions, and activation or deactivation of certain applications. The locked state can be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state optionally responds to a limited set of user inputs, including input that corresponds to an attempt to transition the device to the unlocked state or input that corresponds to powering the device off.

In some examples, a secure element (e.g., 115) is a hardware component (e.g., a secure microcontroller chip) configured to securely store data or an algorithm such that the securely stored data is not accessible by the device without proper authentication information from a user of the device. Keeping the securely stored data in a secure element that is separate from other storage on the device prevents access to the securely stored data even if other storage locations on the device are compromised (e.g., by malicious code or other attempts to compromise information stored on the device). In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7S illustrate exemplary user interfaces for providing an instructional tutorial for enrolling a biometric feature on an electronic device (e.g., device 100, device 300, or device 500), in accordance with some examples. The user interfaces in these figures are used to illustrate the processes described below, including the processes in FIG. 8.

FIG. 7A illustrates an electronic device 700 (e.g., portable multifunction device 100, device 300, or device 500). In the exemplary example illustrated in FIGS. 7A-7S, electronic device 700 is a smartphone. In other examples, electronic device 1500 can be a different type of electronic device, such as a wearable device (e.g., a smartwatch). Electronic device 700 has a display 702, one or more input devices (e.g., touchscreen of display 1502, a button, a microphone), and a wireless communication radio. In some examples, the electronic device includes a plurality of cameras. In some examples, the electronic device includes only one camera. In some examples, the electronic device includes one or more biometric sensors (e.g., biometric sensor 703) which, optionally, include a camera, such as an infrared camera, a thermographic camera, or a combination thereof. In some examples, one or more of the biometric sensor is a biometric sensor (e.g., facial recognition sensor), such as those described in U.S. Ser. No. 14/341,860, "Overlapping Pattern Projector," filed Jul. 14, 2014, U.S. Pub. No. 2016/0025993 and U.S. Ser. No. 13/810,451, "Scanning Projects and Image Capture Modules For 3D Mapping," U.S. Pat. No. 9,098,931, which are hereby incorporated by reference in their entirety for any purpose. In some examples, the electronic device includes a depth camera, such as an infrared camera, a thermographic camera, or a combination thereof. In some examples, the device further includes a light-emitting device (e.g., light projector), such as an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some examples, the lighting effects described herein are displayed using disparity information from two cameras (e.g., two visual light cameras) for rear facing images and using depth information from a depth camera combined with image data from a visual light camera for front facing images (e.g., selfie images). In some examples, the same user interface is used when the two visual light cameras are used to determine the depth information and when the depth camera is used to determine the depth information, providing the user with a consistent experience, even when using dramatically different technologies to determine the information that is used when generating the lighting effects. In some examples, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

As shown in FIG. 7A, device 700 displays device set-up user interface 702 on display 701. In some examples, device set-up user interface 702 is displayed when device 700 is first powered up by a user (e.g., when a factory-sealed device is first powered on). In some examples, device-set-up user interface 702 is displayed upon resetting device 700 to factory settings. Phone set-up user interface 702 includes one or more prompts 704. In the example of FIG. 7A, prompt 704 is plain text that prompts the user to proceed with initial device set-up (e.g., language selection, authentication measures, etc.). Device set-up interface 702 includes one or more affordances, such as continue affordance 706 and skip affordance 708. In some examples, in response to detecting a user input corresponding to activation of skip affordance 708, device 700 optionally displays a primary user interface, such as the user interface of FIG. 4A, without set-up of one or more features.

Figure 7B:
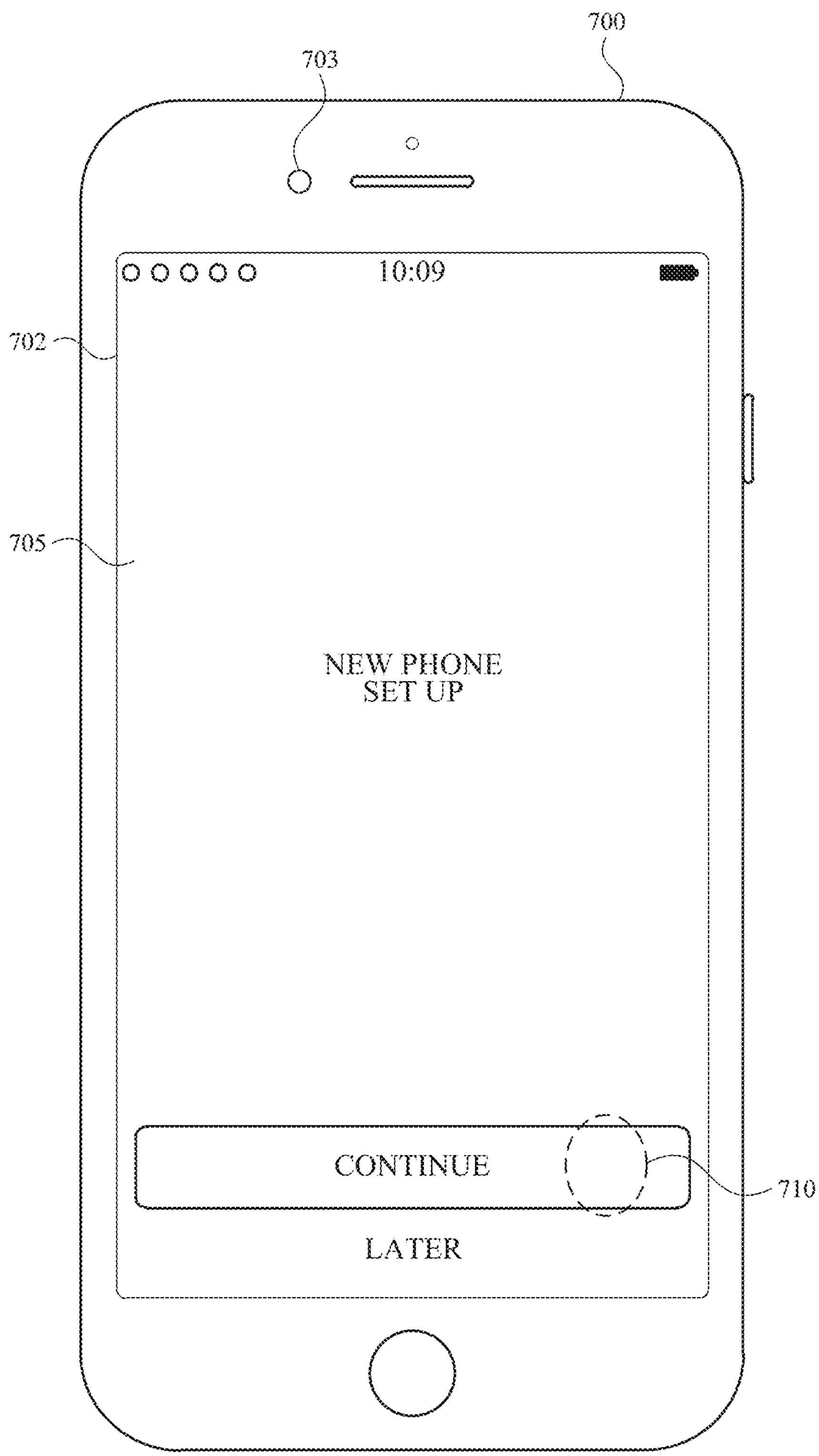

As illustrated in FIG. 7B, while displaying the set-up interface 702, the electronic device 700 detects activation (e.g., selection) of the continue affordance 706. In some examples, the activation is a tap gesture 710 on contact area 710 at continue affordance 706. In some examples where display 700 is a touch sensitive display, the activation of the continue affordance is a touch, swipe, or other gesture on the display surface at contact area 710. In some examples where display 700 is not touch sensitive, the user input is a keyboard input or activation of continue affordance 706 with a focus selector (e.g., a mouse cursor).

Figure 7C:
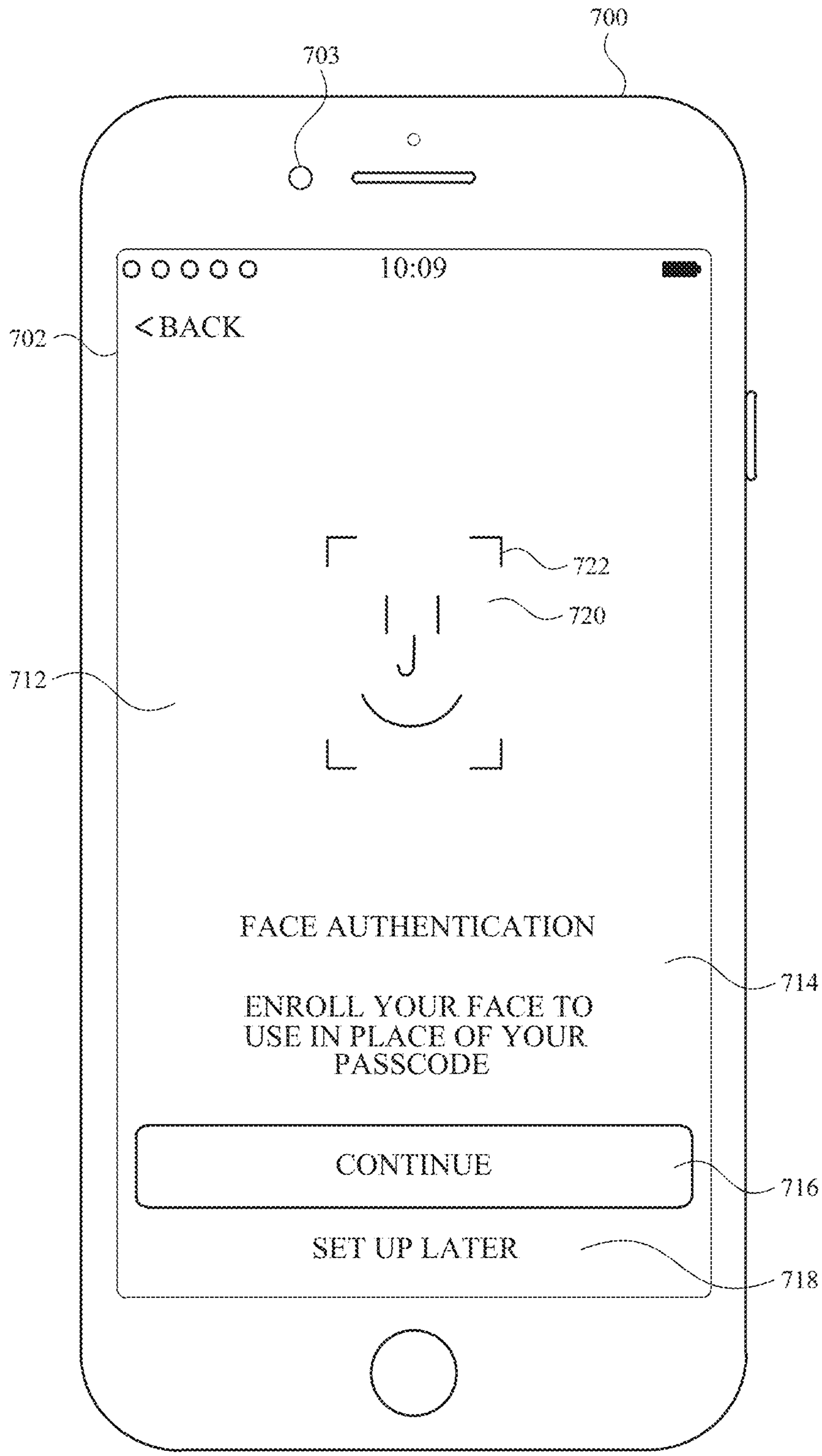

In response to detecting activation of continue affordance 706, the device displays face authentication tutorial interface 712 as shown in FIG. 7C. In some examples, face authentication set-up interface 712 is displayed in response to finishing a prior stage of a device set-up user interface process, or in response to selecting a face authentication enrollment option in a settings user interface. Face authentication set-up interface 712 includes one or more prompts 714, continue affordance 716 and later affordance 718. In the example of FIG. 7C, prompt 714 is plain text indicating that the user has an option set up face authentication in lieu of a numerical passcode. Face authentication set-up interface 712 also includes a graphical representation of a face (e.g., biometric authentication glyph 720) that is displayed within framing element 722. In the example of FIG. 7C, framing element 722 is a rectangular shape surrounding biometric authentication glyph 720 such that only the corners of the rectangle are displayed. In some examples, the framing element is, optionally, a solid rectangle or any other shape (e.g., a circle or oval) surrounding glyph 720. In some examples, framing element 722 helps indicate to a user how to properly position their face relative to biometric sensor 703 in combination with the additional features described below.

Figure 7D:
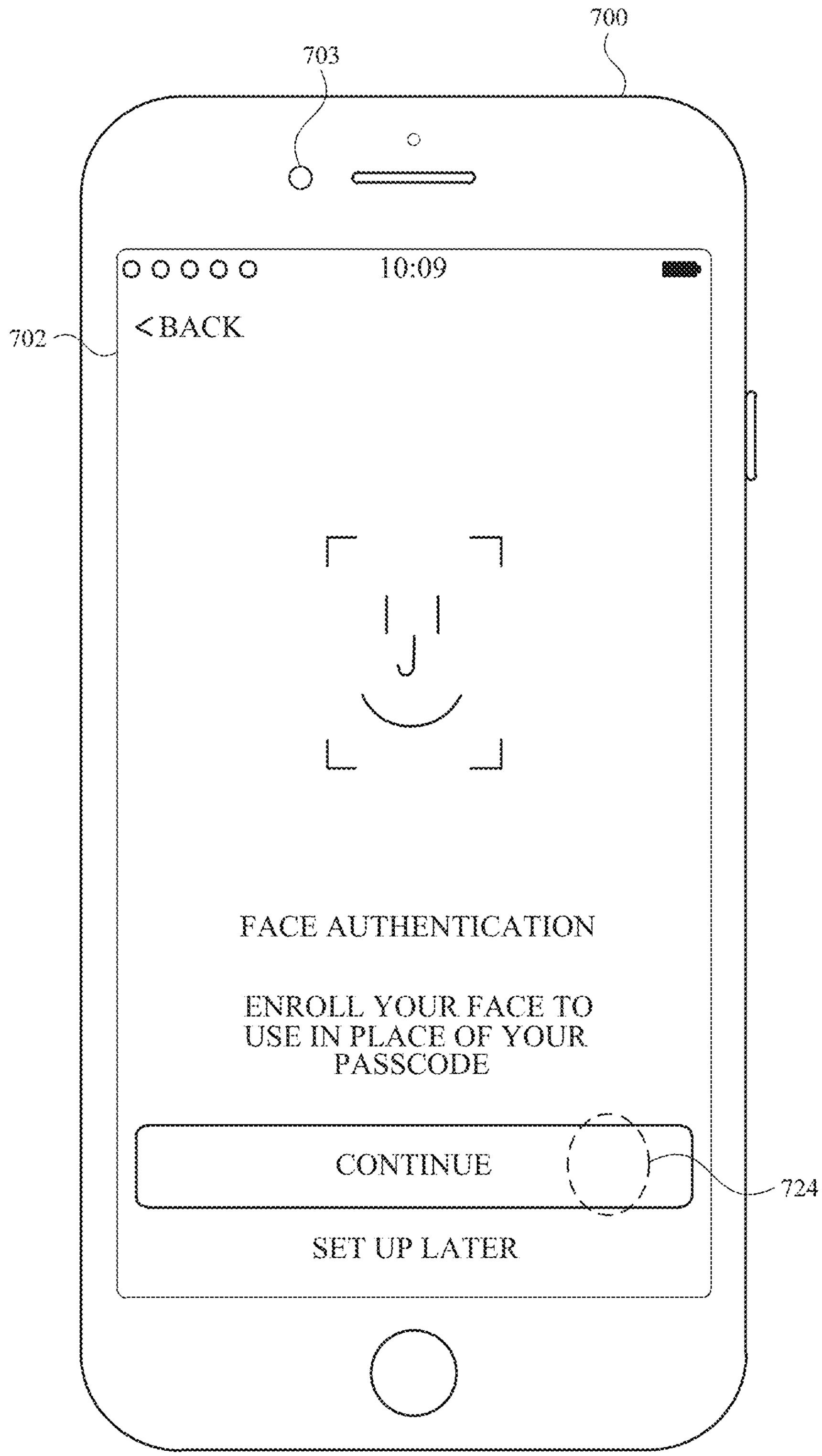

Turning to FIG. 7D, device 700 detects activation (e.g., selection) of the continue affordance 716. In some examples, the activation is a tap gesture 724 at continue affordance 716. In some examples where display 701 is a touch sensitive display, the activation of the continue affordance is a touch, swipe, or other gesture on the display surface at contact area 724. In some examples where display 701 is not touch sensitive, the user input is a keyboard input or activation of continue affordance 716 with a focus selector (e.g., a mouse cursor).

Figure 7E:
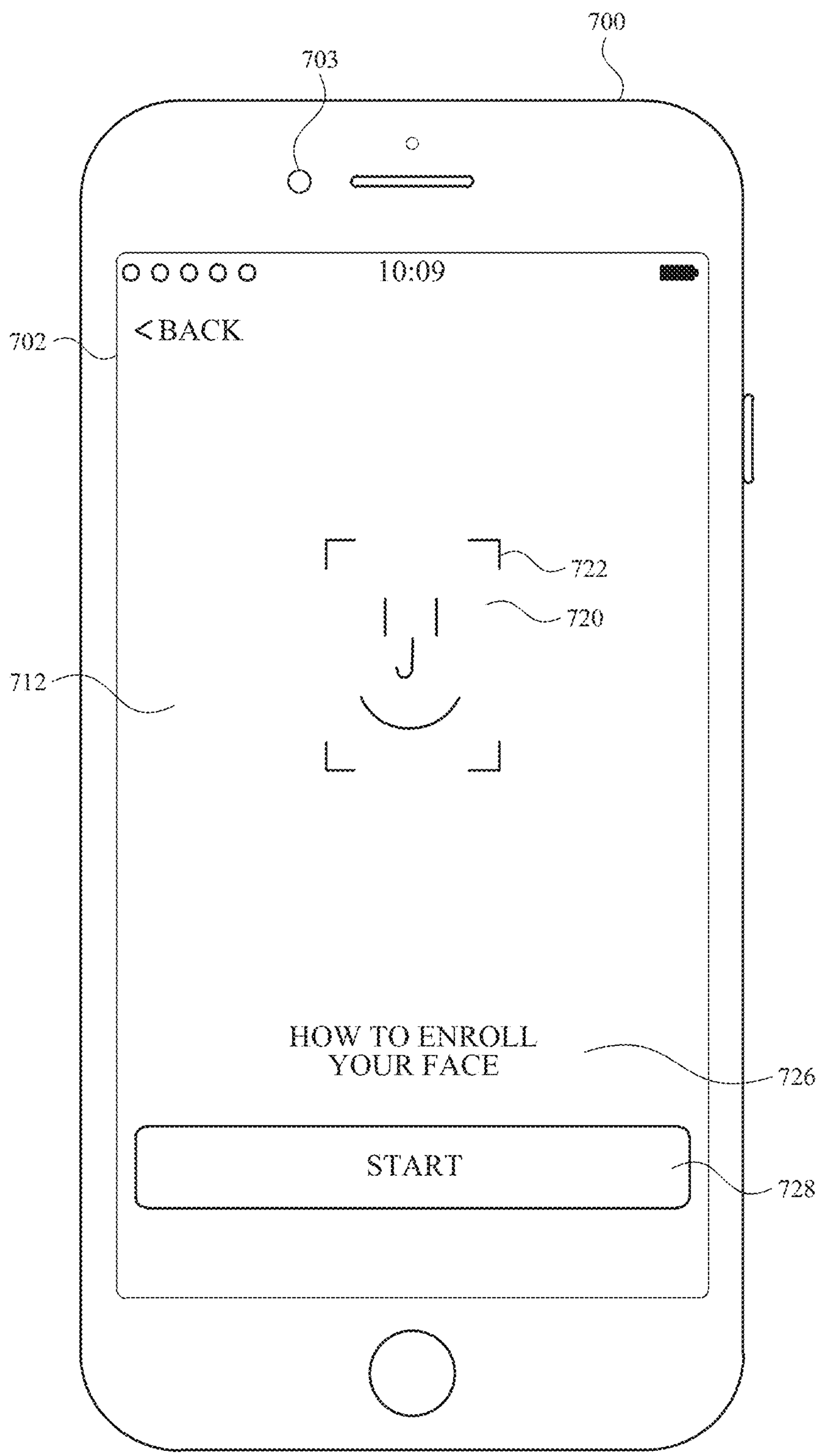

In response to detecting selection of continue affordance 716, device 700 displays (e.g., replaces the display of prompt 714 with) prompt 726, as illustrated in FIG. 7E. Additionally, the device replaces the display of continue affordance 716 with start affordance 728. Upon selection of continue affordance 716, device 700 maintains (e.g., continues to) display glyph 720 and framing element 722.

Figure 7F:
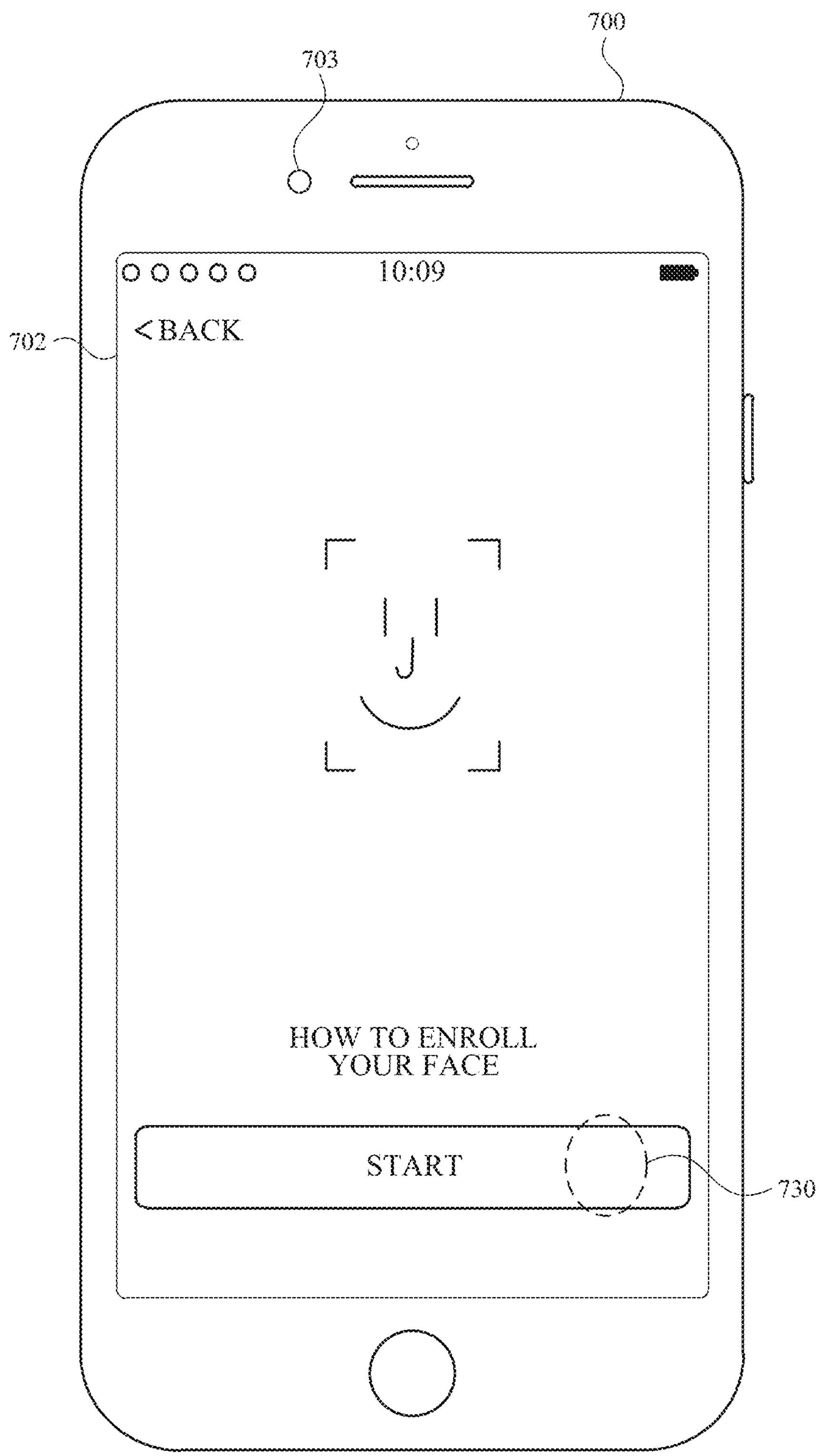

Turning to FIG. 7F, device 700 detects activation (e.g., selection) of start affordance 728. In some examples, the activation is a tap gesture 730 at start affordance 7728. Activation of start affordance 728 optionally indicates a user request to initiate face authentication enrollment (e.g., set-up) process.

As shown in FIGS. 7H-7Q, device 700 displays face authentication tutorial interface 732 in response to detecting selection of start affordance 728. Concurrently, the device displays an instructional animation (e.g., a tutorial) that indicates to the user how to properly position and move his or her face relative to biometric sensor 703 such that device 700 will be able to gather sufficient biometric (e.g., facial imaging) data needed for secure (e.g., biometric) authentication. The details of the tutorial interface and instructional animation are described below.

Figure 7G:
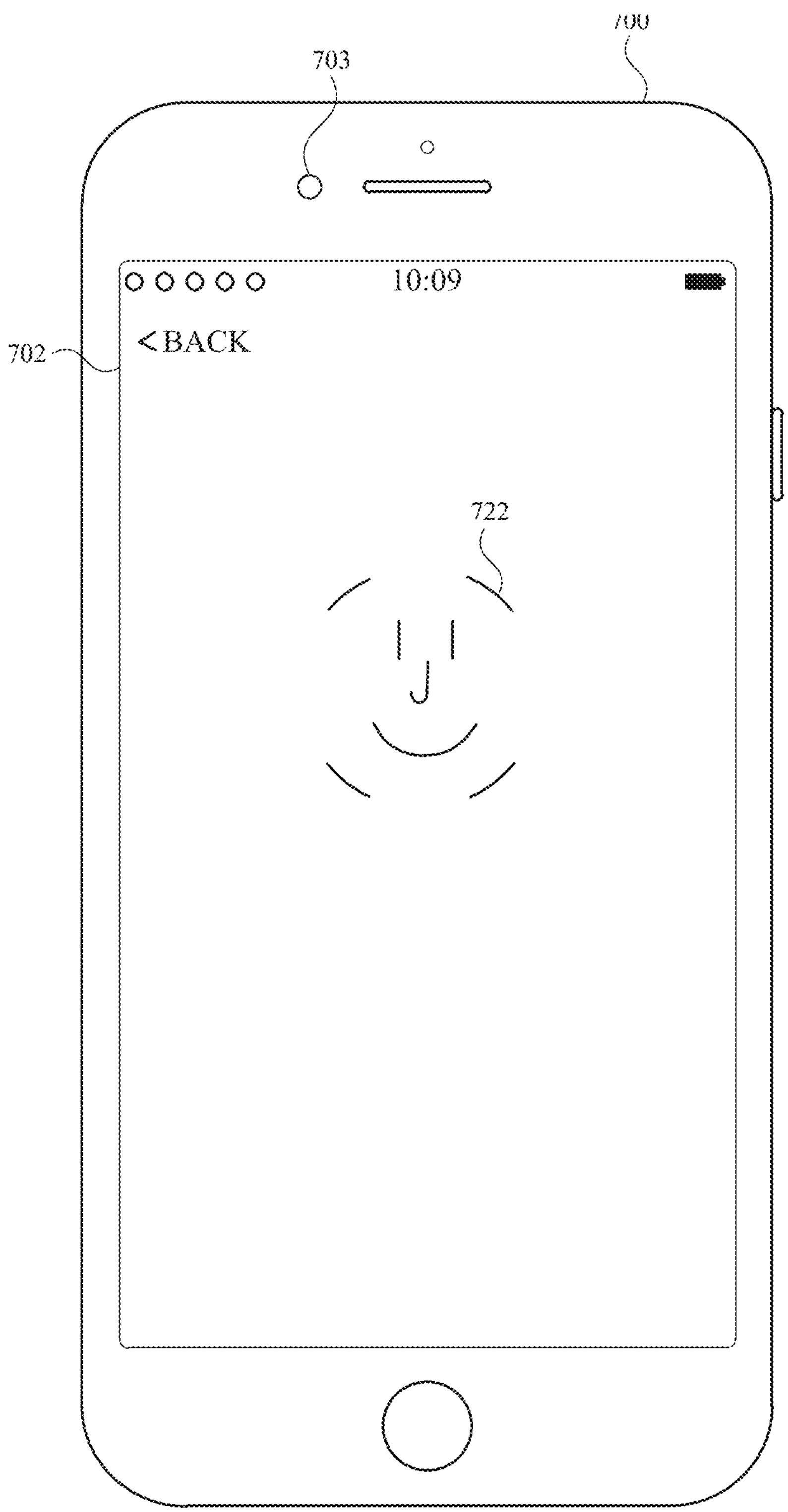
Figure 7H:
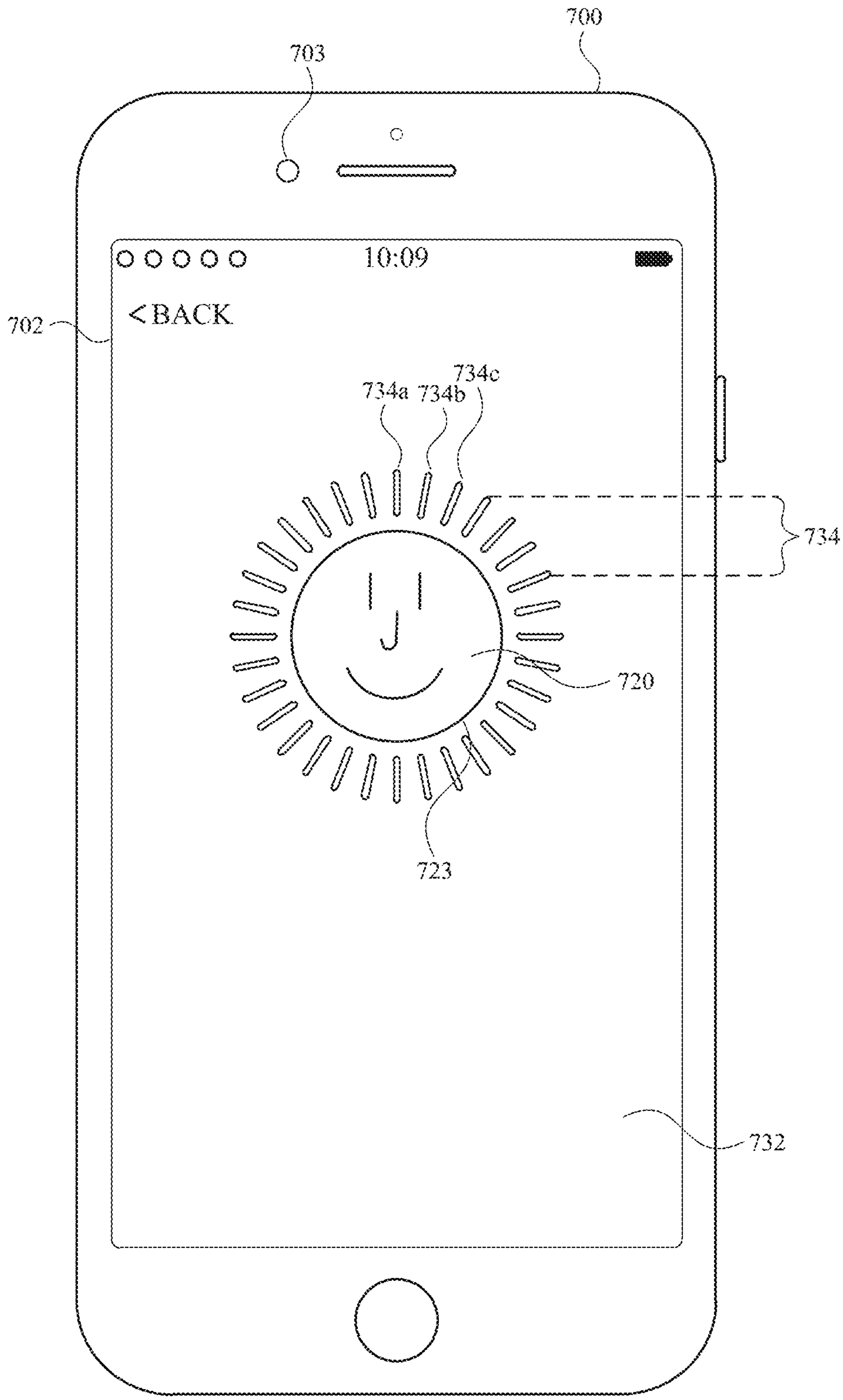

As illustrated in FIGS. 7G-7H, device 700 alters the display of framing element 722 to become a single, continuous framing element 723 that surrounds glyph 720. As shown in FIG. 7G, the device 700 optionally rounds each corner of framing element 722 into portion of a circle and merge and/or contract the portions to form a continuous circle (e.g., framing element 723 as shown in FIG. 7H) surrounding glyph 720.

As shown in FIG. 7H, device 700 concurrently displays instructional progress meter 734 proximate to and/or surrounding glyph 720. In the example of FIG. 7H, instructional progress meter 734 is composed of a set of progress elements (e.g., progress ticks 734*a*, 734*b*, and 734*c*) that are evenly distributed around glyph 720. In the example of FIG. 7H, progress ticks 734*a*, 734*b*, and 734*c* are equidistant and extend radially outward from glyph 720, for instance, forming a circle around it. In some examples, these progress elements are, optionally, dots, circles, line segments, or any other suitable discrete elements. In some examples, these progress elements are, optionally, arranged around glyph 720 in square, rectangular, elliptical, or any other suitable pattern.

Figure 7I:
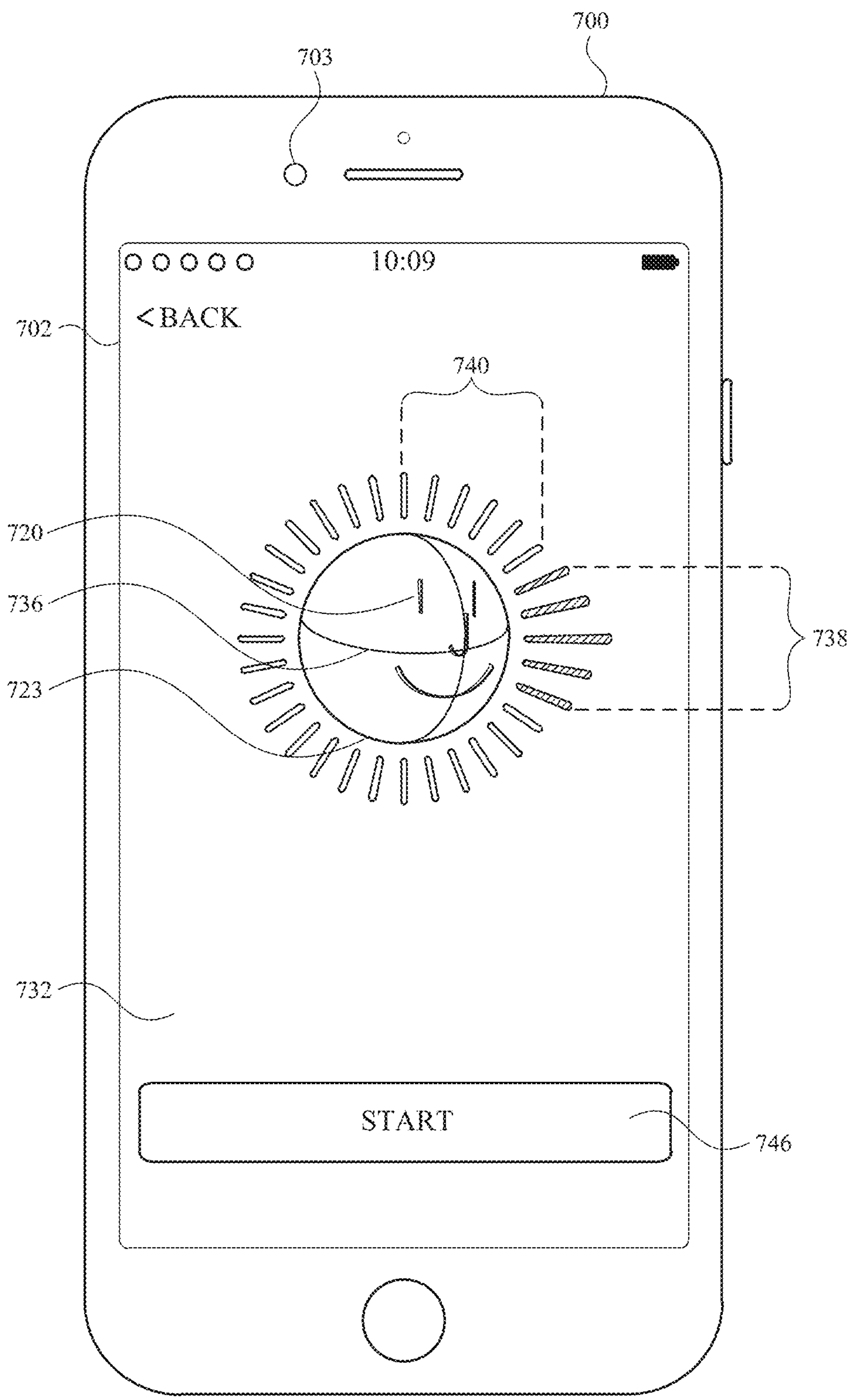

While displaying face authentication tutorial interface 732 (e.g., glyph surrounded by framing element 723 and instructional progress meter 734), device 700 begins to display an instructional animation illustrating the process of enrolling a user's facial data, as shown in FIG. 7I. As described in more detail below with reference to FIGS. 7I-7P, device 700 displays movement of glyph 720 in a circular motion and corresponding advancement of instructional progress meter 734 to emulate successful face authentication.

At the start of the instructional animation, device 700 overlays orientation guide 736 on top of the display of glyph 720. In the example of FIG. 7I, orientation guide 736 is a pair of intersecting curved lines (e.g., crosshairs) that extend from framing element 723 and glyph 720 such that they appear to bulge outwards from the plane of the display (e.g., in a simulated z-direction). In some examples, in combination with circular framing element 723, the arcs of orientation, guide 736 give the otherwise two-dimensional glyph 720 a three-dimensional appearance, as if it were located on the surface of a sphere. In general, the instructional animation maintains orientation guide 736 at a fixed position relative to the center of glyph 720 such that the orientation guide appears to rotate and tilt along with (e.g., in the same directions as) the facial representation. In some examples, glyph 720 itself is a three-dimensional representation of a face, such as a three-dimensional line drawing with lines at a simulated z-height. In such examples, orientation guide 736 is, optionally, omitted. In this case, when the facial representation tilts in different directions, the lines at different z-heights appear to move relative to one another based on a simulated parallax effect to give the appearance of three-dimensional movement.

Device 700 begins the instructional animation on face authentication tutorial interface 732 by displaying movement (e.g., rotation and/or tilt) of glyph 720 and orientation guide 736 in a first direction (e.g., up, down, left, or right). In the example of FIG. 7I, glyph 720 and the overlaid orientation guide 736 tilt to the right relative to a vertical axis extending from the plane of display 700. Tilting glyph 720 in this manner optionally reveals part of the simulated face (e.g., the left side of the face) and hide another part of the simulated face (e.g., the right side of the face) to further give the appearance of a three-dimensional head tilting or rotating in a particular direction.

As illustrated in FIG. 7I, device 700 changes the appearance of a subset of the progress elements as glyph 720 (and/or orientation guide 736) tilts towards them. In particular, progress elements in meter portion 738 optionally elongates and/or changes color from their initial state when the facial graphic tilts towards them. This elongation and/or color change is, optionally, more pronounced as glyph 720 tilts further in their direction. In some examples, progress elements in meter portion 738 optionally changes in appearance in other manners as well. For example, additionally and/or alternatively, the line thickness, number, or pattern of the progress elements optionally change. Changing the appearance of progress elements in this manner indicates to the user that biometric sensor 703 is configured to capture image data of a corresponding portion of the face when oriented in that direction. While displaying the instructional animation, device 700 maintains the display progress elements towards which the face graphic has not yet been tilted (e.g., elements of meter portion 740) in an initial state. In the example of FIG. 7I, device 700 displays progress elements in the initial state as unfilled outlines.

Figure 7J:
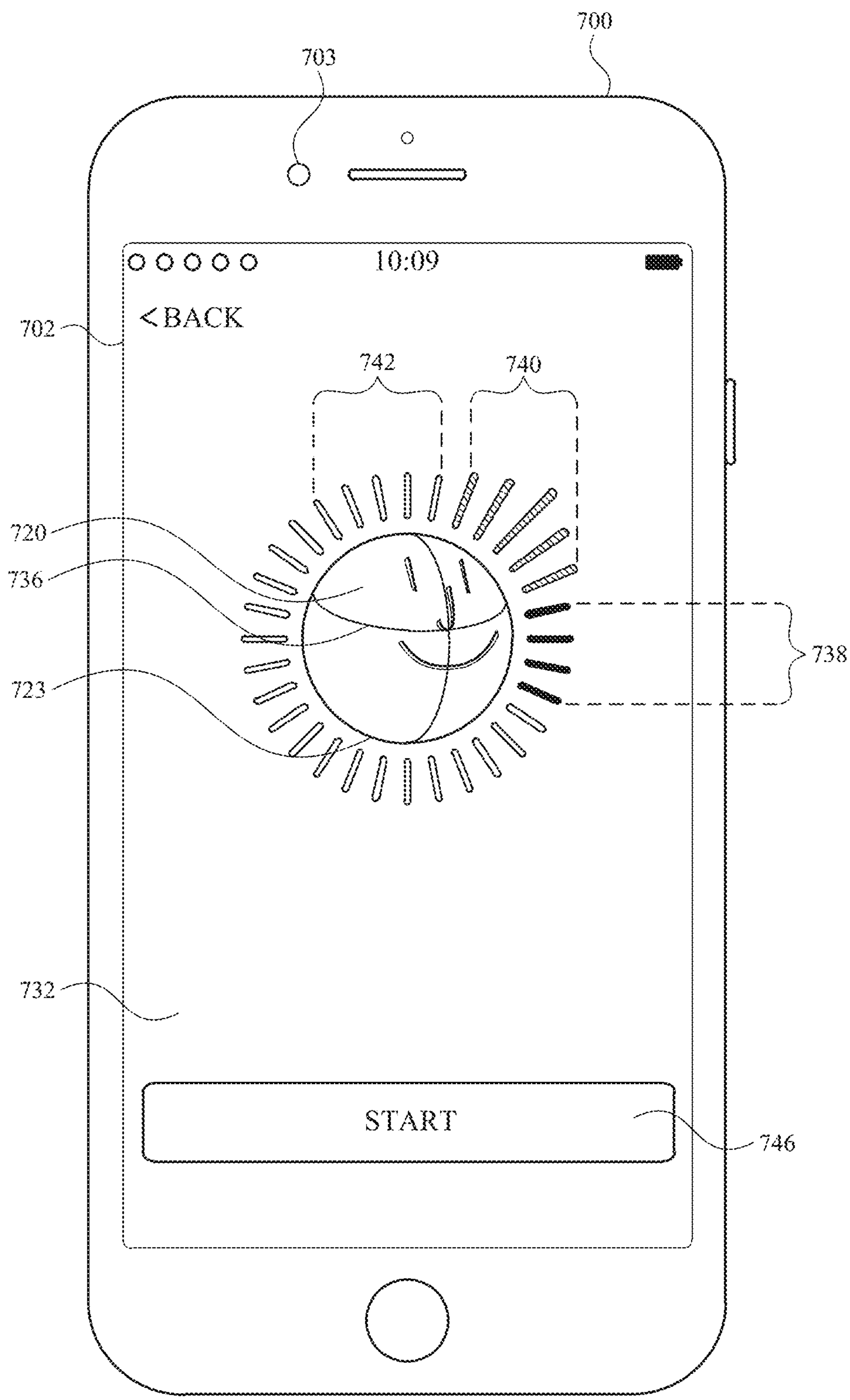

In some examples, device 700 thereafter rotates glyph 720 about a second axis parallel to the plane of the display such that the simulated face appears to tilt upwards or downwards. In the example of FIG. 7J, glyph 720 appears tilted upwards from its position in FIG. 7I such that the simulated face is pointing up and to the right. While rotating glyph 720 in this manner, device 700 changes the appearance of corresponding meter portion 740, which was previously in the initial state, as shown in FIG. 7I. The device changes the appearance of meter portion 740 in the same manner as described above with respect to FIG. 7I (e.g., by elongating and/or changing color of progress elements in this portion of the instructional progress meter). Concurrently, device 700 transitions progress elements in meter portion 738, corresponding to the portion of the facial representation that was enrolled in FIG. 7I, to a second state. Progress elements in the success state (e.g., the progress elements in meter portion 738) differ in shape, color, line width, etc. from progress elements in the initial state. In the example of FIG. 7I, progress elements in the success state are displayed with the same size and width of progress elements in the initial state (e.g., progress elements in meter portion 742), but are darkened and/or filled in to indicate that the facial representation has already been oriented in that direction.

Figure 7K:
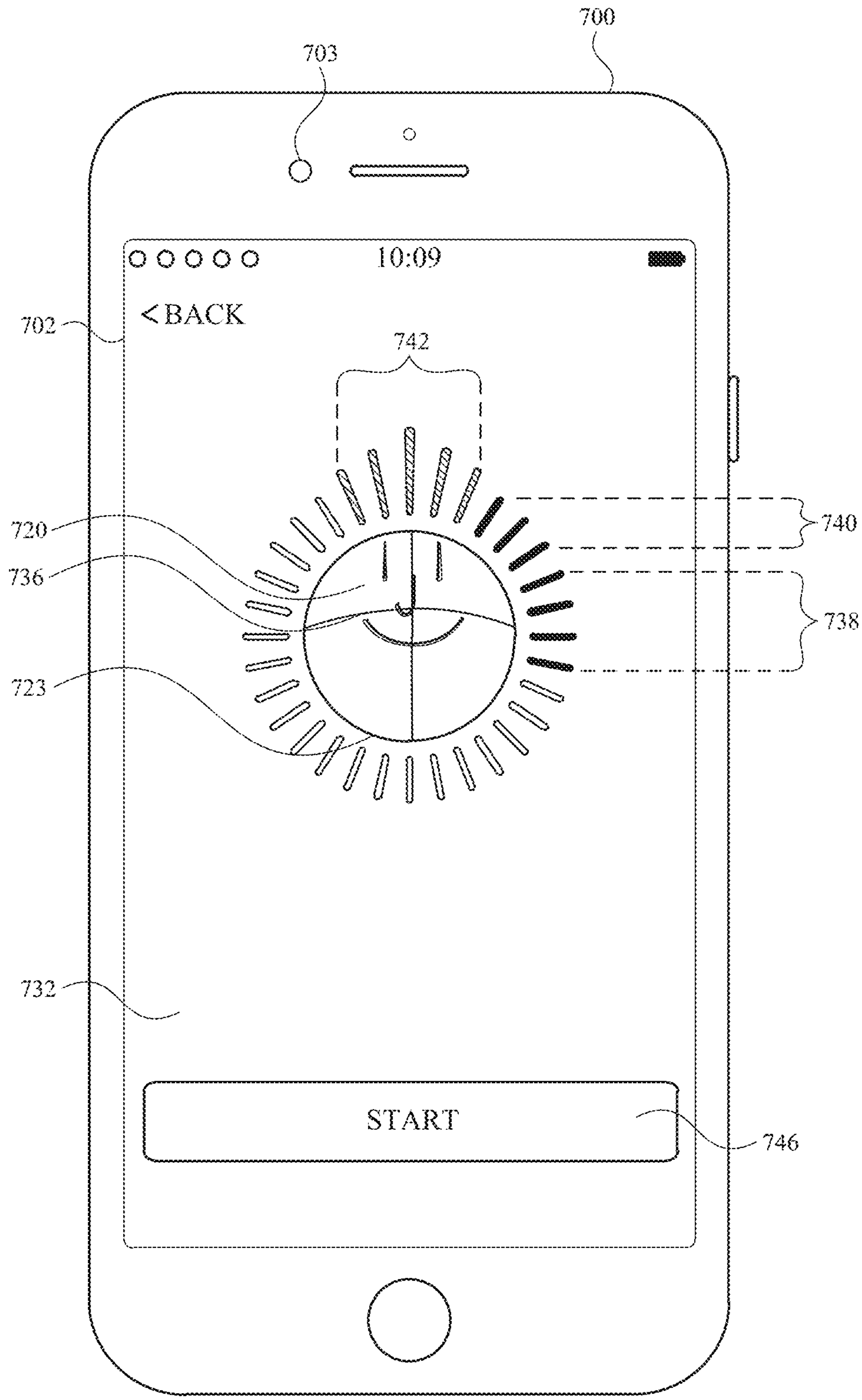

FIG. 7K illustrates further tilt and/or rotation of glyph 720 and orientation guide 736 until the simulated face appears to be looking upwards. As described above, device 700 changes appearance (e.g., elongates and/or changes color) of progress elements in meter portion 742 as glyph 720 is oriented in their direction. Concurrently, device 700 transitions progress elements in meter portion 740 to the success state after the simulated face was previously, but is no longer oriented in their direction. Progress elements in meter portion 738 remain in the success state. In general, the appearance of progress elements that have been transitioned to the success state is not modified thereafter. In this manner, device 700 changes the appearance of elements in instructional progress meter 734 in response to displaying movement of glyph 720.

Figure 7L:
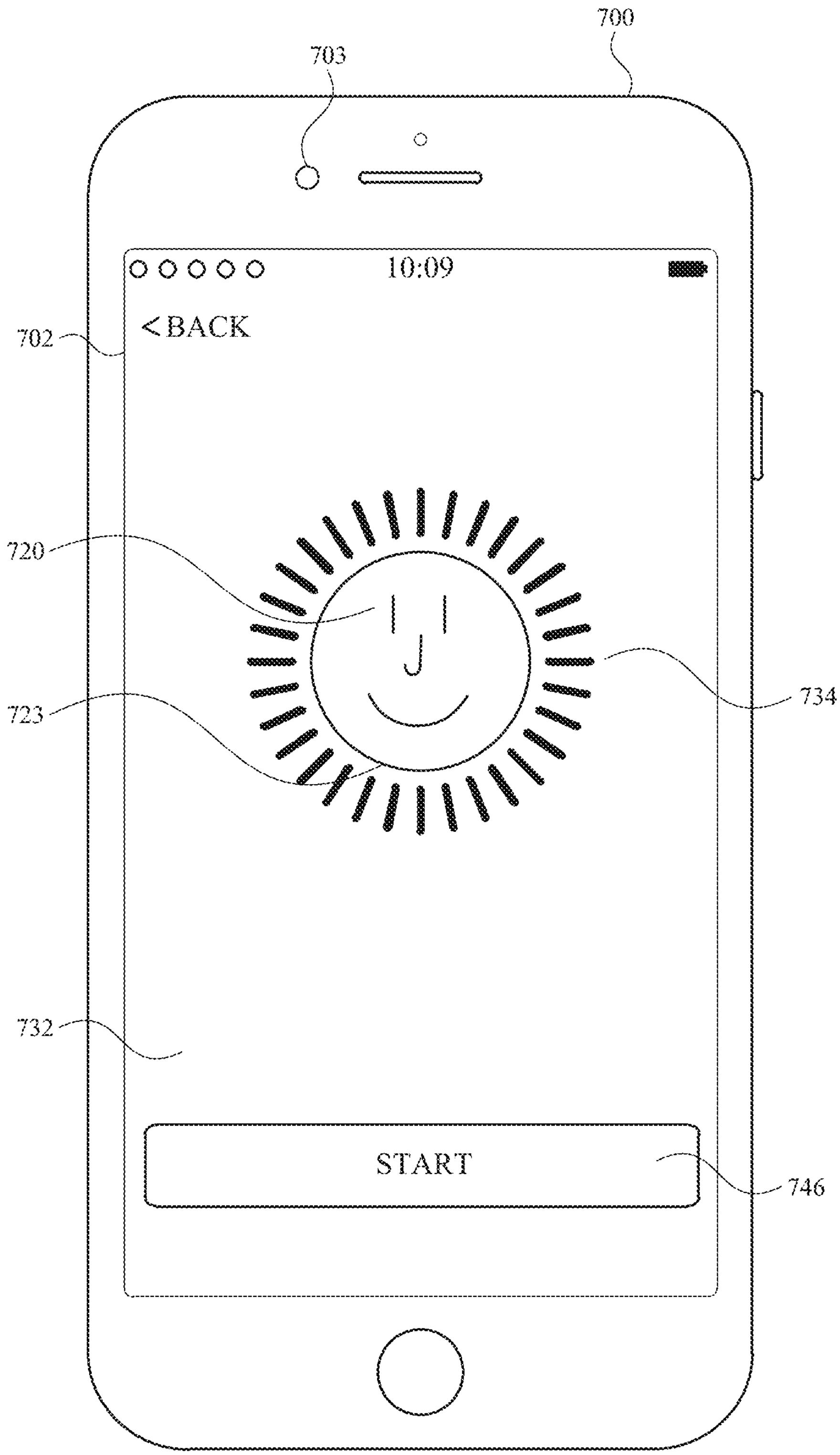
Figure 7M:
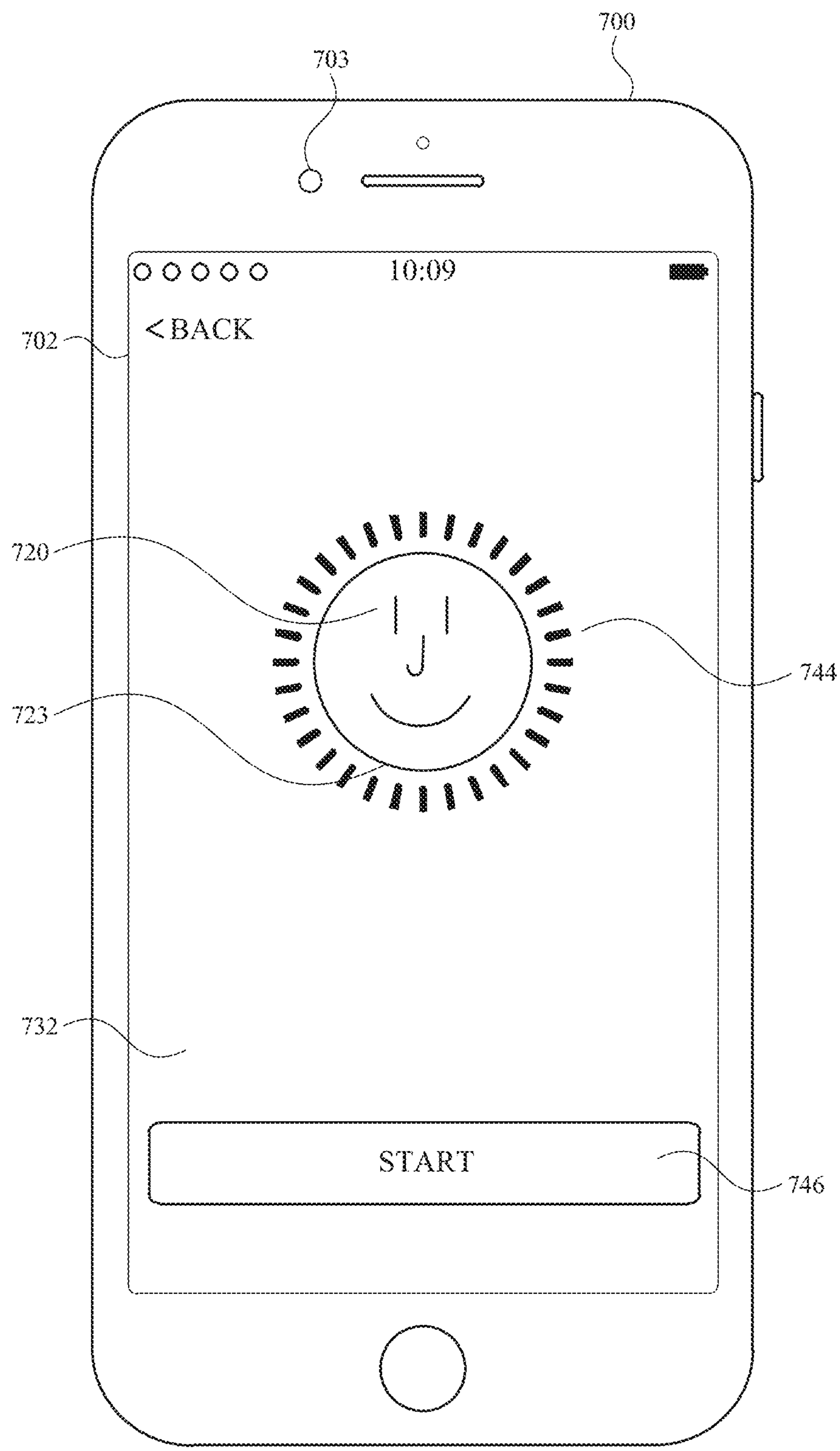
Figure 7N:
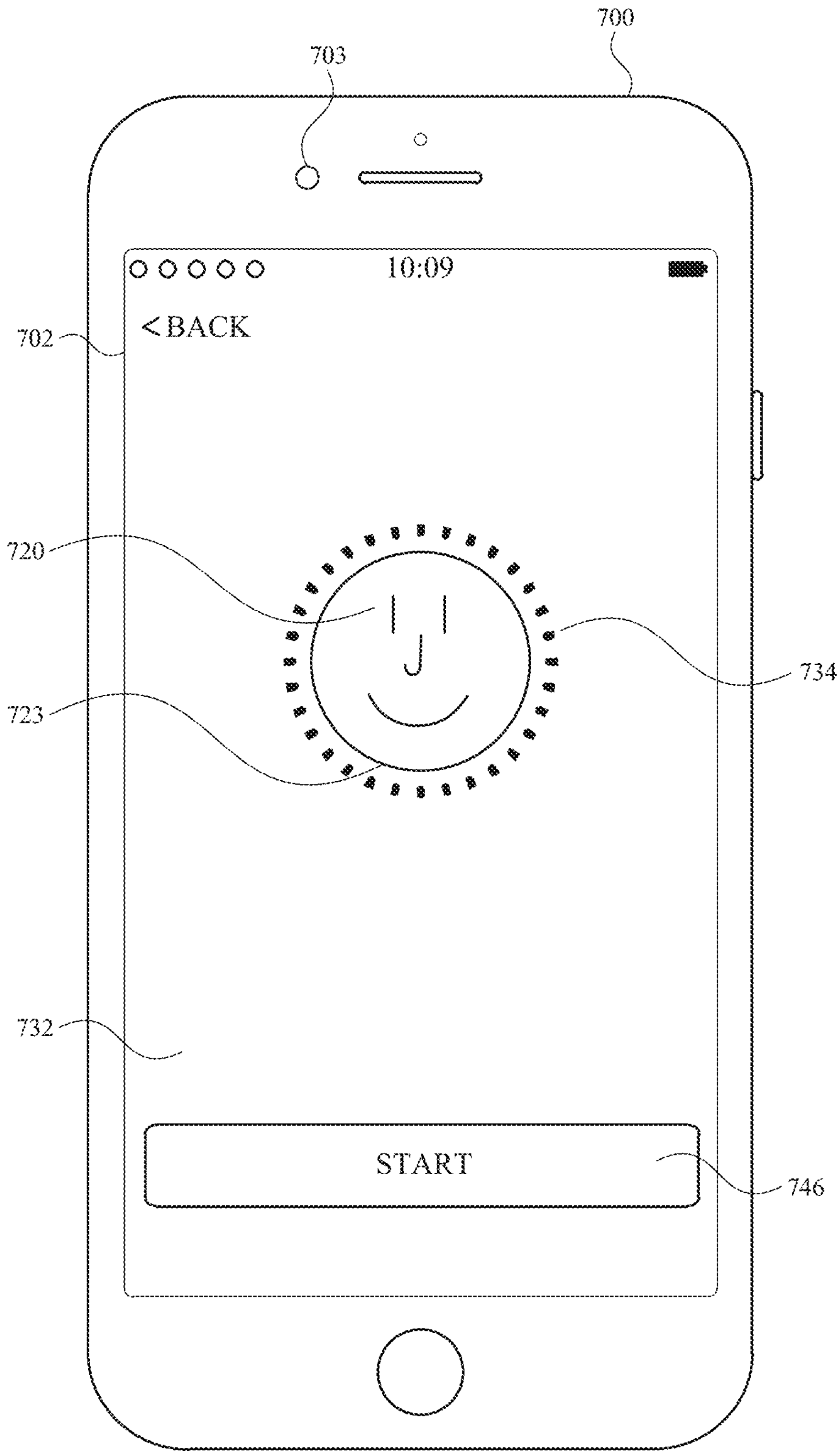
Figure 7O:
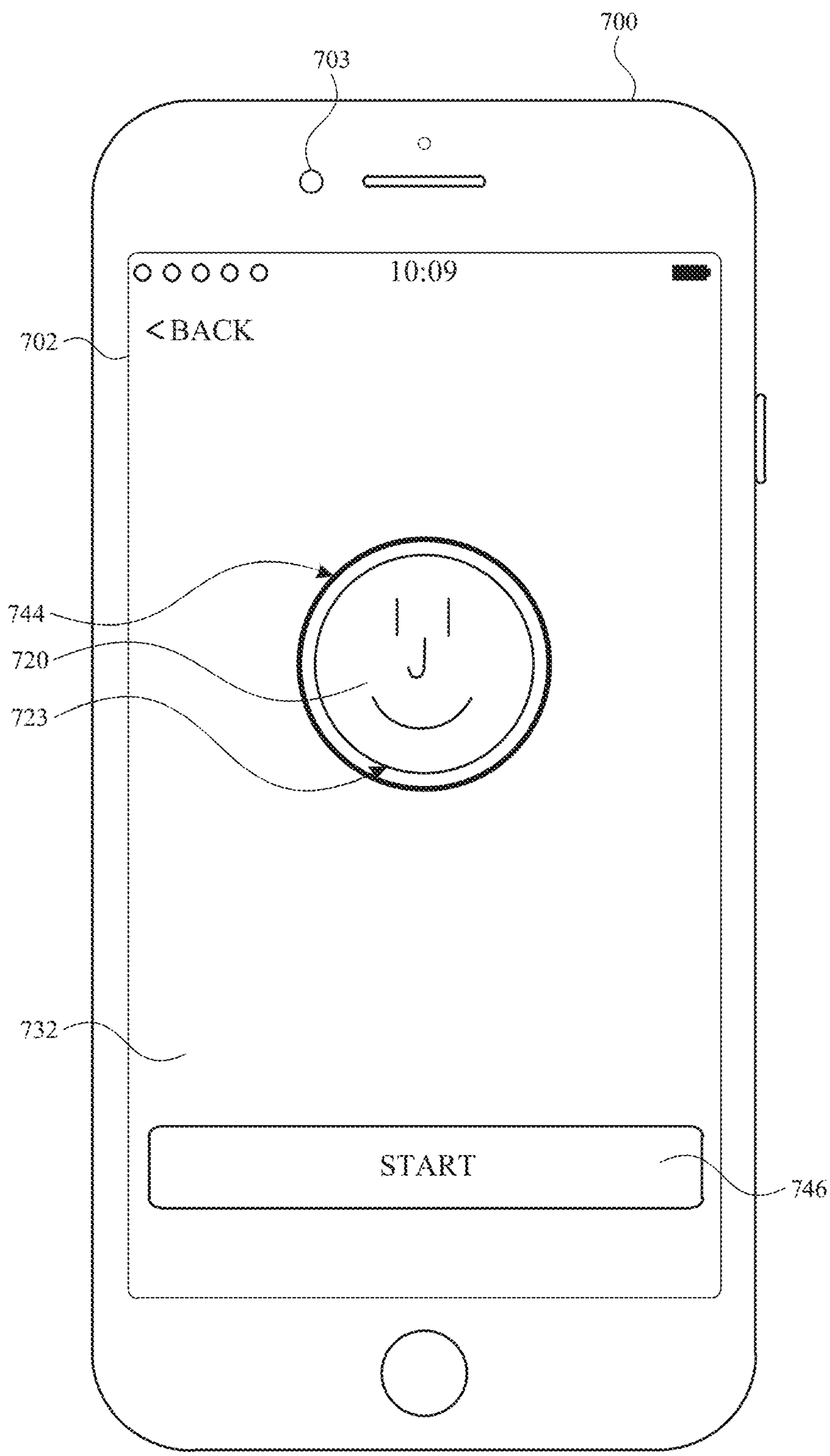

In some examples, during the instructional animation, device 700 optionally continues to display rotation and/or tilt of glyph 720 until it has displayed a complete circular (e.g., clockwise, counterclockwise) motion of simulated face (e.g., until glyph 720 returns to the right-tilt orientation shown in FIG. 7I). Likewise, device 700 incrementally transitions elements of instructional progress meter 734 to the success state as glyph 720 is rotated past them, as described above. After displaying a full rotation of the simulated face, the device displays all progress elements of instructional progress meter 734 in the success state, as shown in FIG. 7L. In some examples, device 700 ceases to display orientation guide 736 and returns glyph 720 to its initial position after a full rotation is displayed.

Figure 7P:
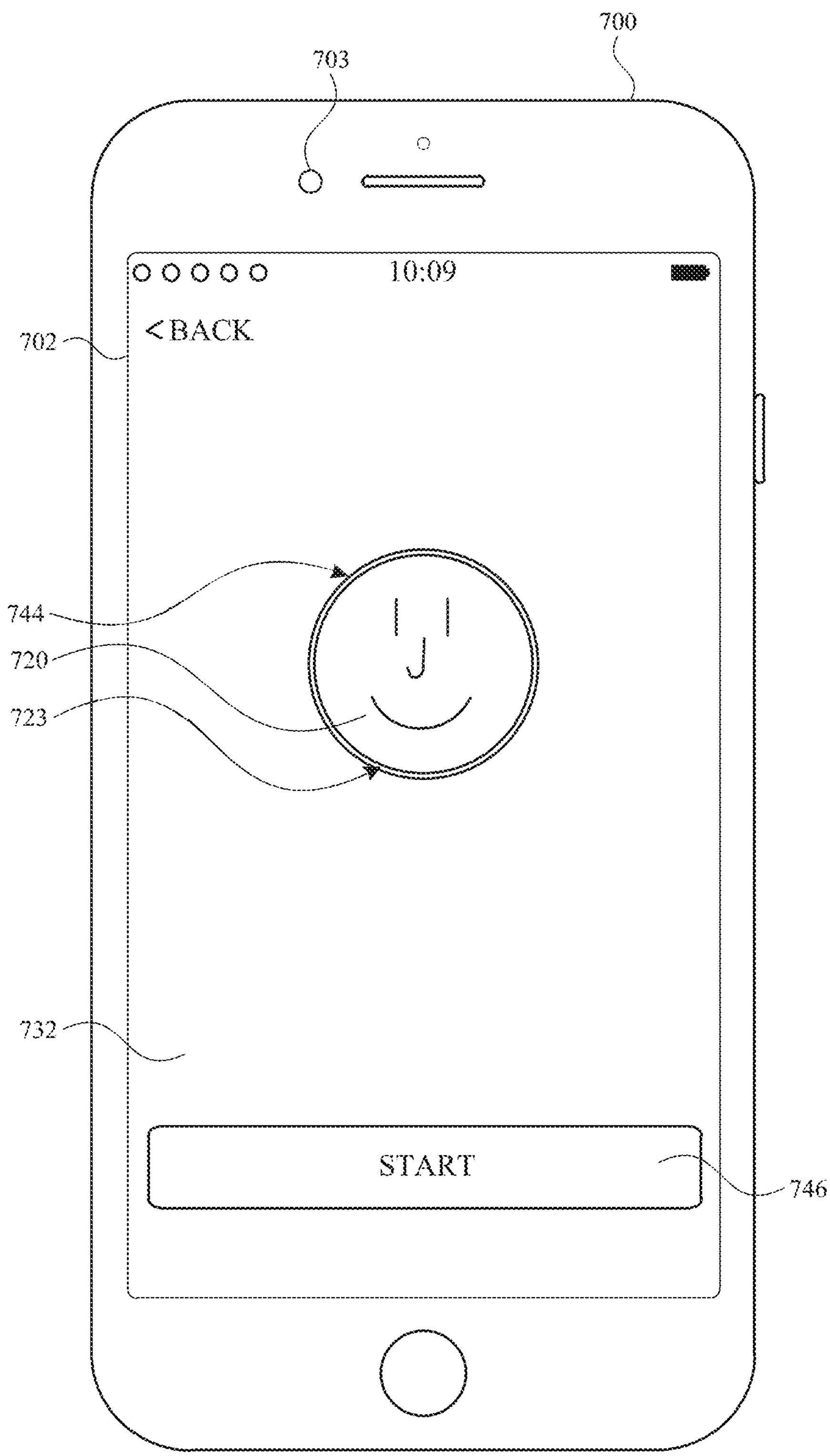

After all progress elements of instructional progress meter 724 have been transitioned to the success state, device 700 transitions progress meter 734 (e.g., the progress meter itself) to a authentication-success state, such as a solid circle surrounding glyph 720. Displaying progress meter 724 in the authentication-success state optionally indicates successful face authentication set up. With reference to FIGS. 7L-70, device 700 transitions display of the discrete progress tick of instructional progress meter 734 to the authentication-success state by shortening each progress tick and merging them together into a continuous, solid circle (e.g., success-state meter 744) surrounding glyph 720. In the example of FIGS. 70 and 7P, the circle contracts around glyph 720 until the radius of success-state meter 744 is substantially the same as the radius of framing element 723 (e.g., as shown in FIG. 7P).

As shown in FIGS. 7I-7Q, face authentication tutorial interface 732 also includes start affordance 746 that is, optionally, displayed throughout the face authentication tutorial. In some examples, start affordance 746 is enabled for activation after the instructional animation is complete (e.g., after device 700 displays instructional progress meter 734 in the authentication-success state of FIG. 7Q). In other examples, start affordance 746 is enabled for activation any time during display of the face authentication tutorial animation prior to completion of the instruction animation.

Figure 7Q:
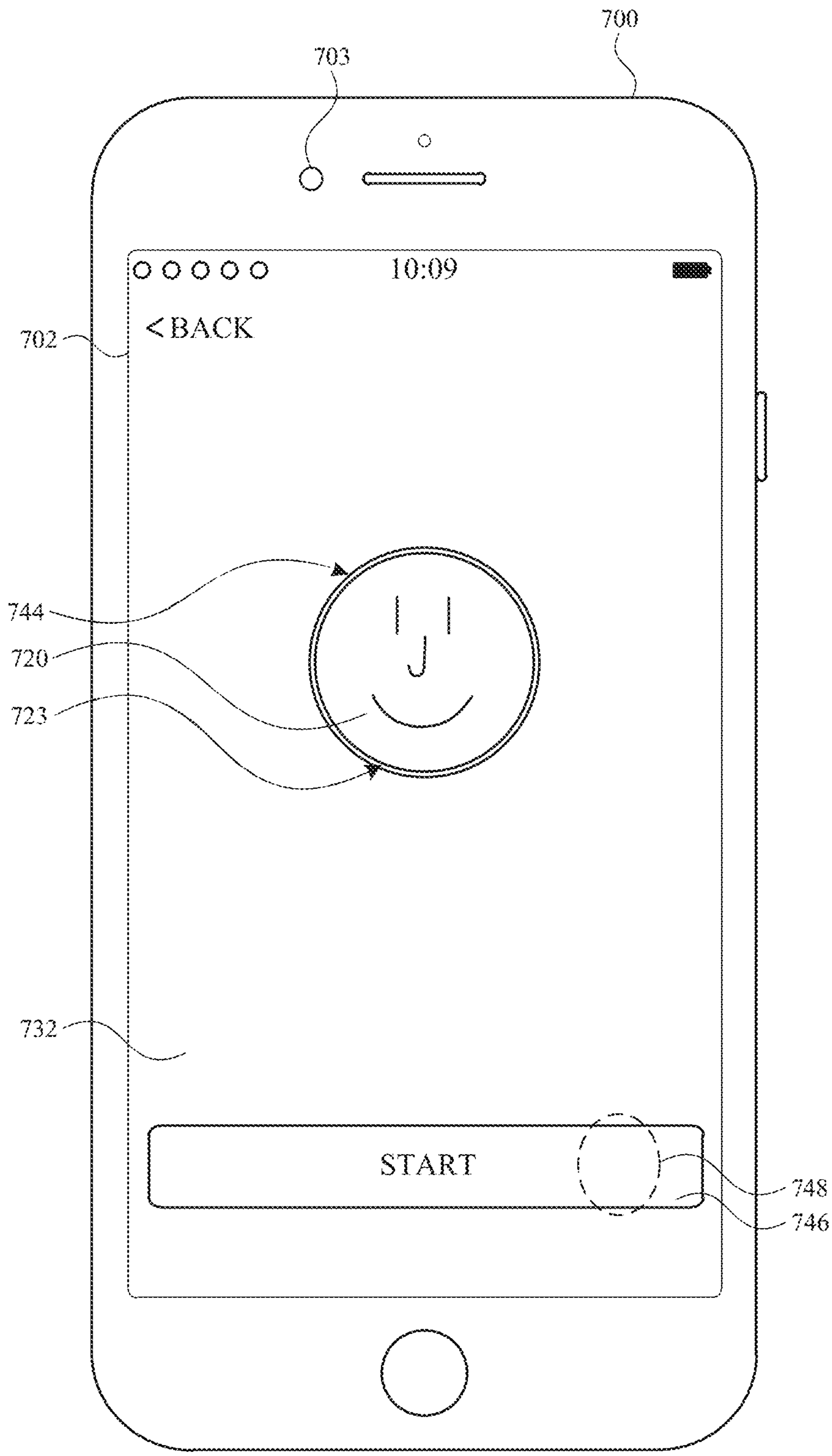
Figure 7R:
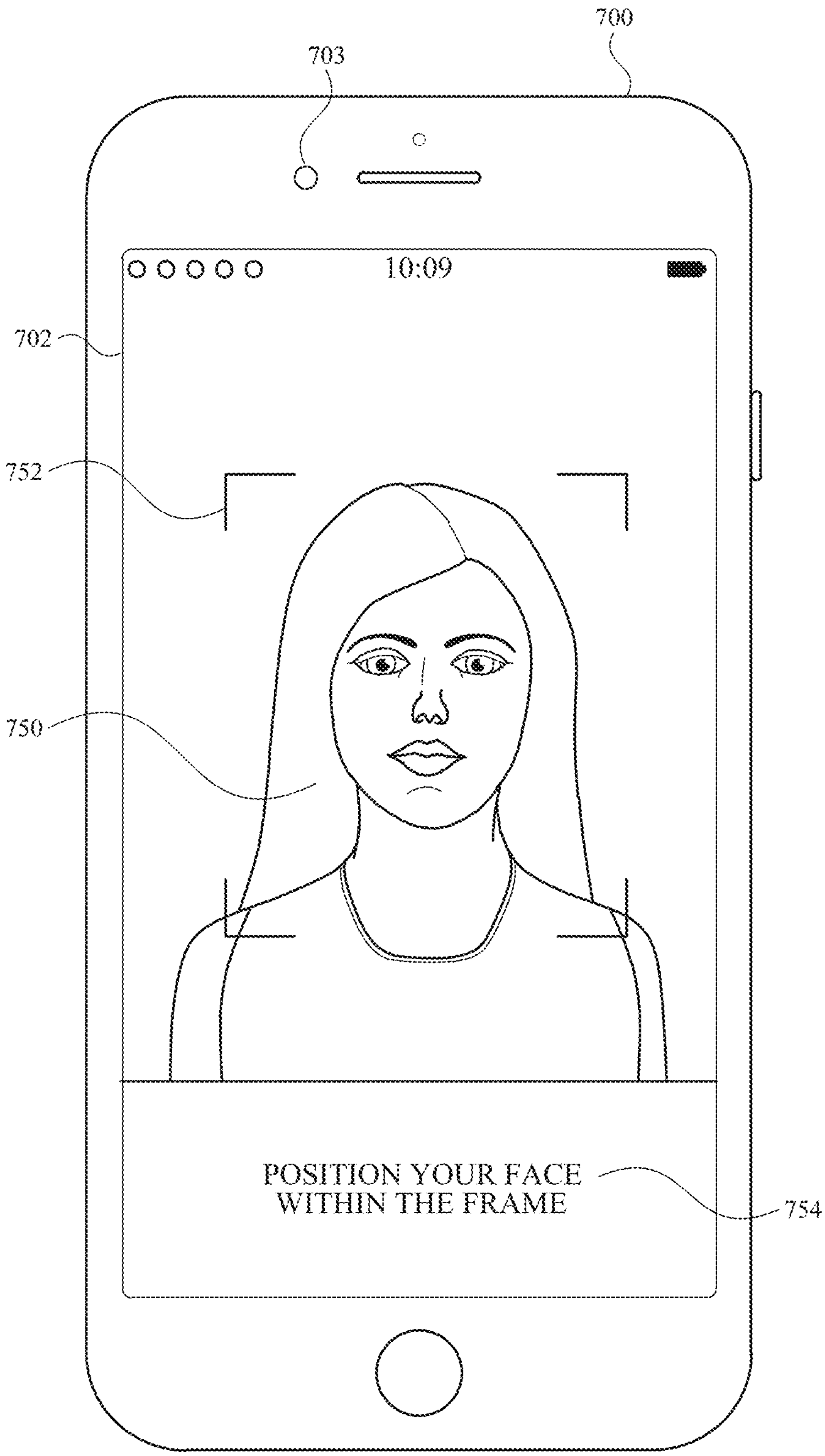

Turning now to FIG. 7Q, device 700 detects activation (e.g., selection) of start affordance 746. In some examples, the activation is a user input that corresponds to a request to begin face authentication set-up. In response to detecting activation of start affordance 746, device 700 replaces the display of glyph 720 with an image 750 of the user's face captured by biometric sensor 703 as shown in FIG. 7R. In some examples, image 748 is a live preview of the field of view of biometric sensor 703. In other examples, image 750 is a wire-frame representation of the user's face based on movement of the user's face in the field of view of the optical sensors. Thus, image 750 changes (e.g., continually updates) as the position and orientation of the user's face relative to biometric sensor changes.

As shown in FIG. 7R, device 700 also displays positioning element 752 around user image 750. In some examples, positioning element 752 optionally has similar or identical visual properties as framing element 722 that was initially positioned surrounding glyph 720 in FIGS. 7C-7F. In some examples, the positioning element is displayed to emphasize a predetermined portion of the display of the electronic device, indicating where the user should position his or her face relative to biometric sensors for subsequent face authentication set-up. In some examples, the positioning element a shape (e.g., a square) that at least partially partitions the predetermined display portion from the other parts of the display. Device 700 also displays prompt 754, text that prompts the user to move his/or her face relative to the optical sensors such that user image 750 appears inside positioning element 750.

Turning now to FIG. 7S, in response to detecting that user image 750 has been properly positioned within positioning element 750 (e.g., the user's face is properly aligned with biometric sensor 703), device 700 displays face authentication enrollment interface 756. In the example of FIG. 7S, face authentication enrollment interface 756 includes progress meter 758 and user image 760. In some examples, enrollment interface 756 includes orientation guide 762, a set of curved lines (e.g., crosshairs) that appear to extend out of the plane of the display to Progress meter 758 optionally has some or all of the features of instructional progress indicator 734 that is displayed during the face authentication tutorial animation. In the example of FIG. 7S, progress meter 758 also includes a set of progress elements (e.g., progress ticks 758*a*, 758*b*, and 758*c*) that are distributed around user 750. Further description of alignment of a user's face with respect to the optical sensors can be found below with respect to FIGS. 9A-9AE and FIGS. 11A-11O FIGS. 8A-8C is a flow diagram illustrating a method for providing an instructional tutorial for enrolling a biometric feature on an electronic device in accordance with some examples. Method 800 is performed at a device (e.g., 100, 300, 500, 700) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light, a structured light projector, or a combination thereof. The light-emitting device is, optionally, used to illuminate the biometric feature (e.g., the face) during capture of biometric data of the biometric features by the one or more biometric sensors. Some operations in method 2000 are, optionally, combined, the orders of some operations are, optionally, changed, and some operations are, optionally, omitted.

As described below, method 800 provides an intuitive way for providing an instructional tutorial for enrolling a biometric feature on an electronic device. The method reduces the cognitive burden on a user for enrolling a biometric feature on the device, thereby creating a more efficient human-machine interface. For battery-operated computing devices, enabling a user to enroll a biometric feature faster and more efficiently conserves power and increases the time between battery charges.

The device displays (802), on the display, a first user interface (e.g., face authentication set-up interface 712). While displaying the first user interface, the device detects (806) the occurrence of a condition that corresponds to introduction of a biometric enrollment process for enrolling a biometric feature (e.g., a face, finger, eye, voice, etc.). In some examples, the occurrence of a condition is an input that corresponds to a request to initiate the biometric enrollment process, such as finishing a prior stage of a device setup user interface process or selecting a biometric enrollment option in a settings user interface. In some examples, the biometric feature is used for authentication at the device.

In response to detecting the occurrence of the condition that corresponds to introduction of the biometric enrollment process, the device displays (808) a biometric enrollment introduction interface (e.g., face authentication tutorial interface 732). Displaying the biometric enrollment introduction interface includes concurrently displaying (810) a representation of a simulation of the biometric feature (e.g., 720, an animation of a biometric feature such as an animated face/head or a video of a biometric feature) and a simulated progress indicator (e.g., instructional progress meter 734, a displayed element that indicates progress of enrollment). In some examples, the simulated progress indicator is located proximate to the representation of the simulation of the biometric feature. In some examples, the simulated progress indicator includes a plurality of progress elements (e.g., progress elements 734*a*, 734*b*, and 734*c*) that are, optionally, distributed around the simulation of the biometric feature, such as a set of tick marks that extend (e.g., radially extend) outward from the simulation of the biometric feature and form an elliptical shape such as a circle.

In some examples, the representation of the simulation of the biometric feature is a representation (812) of a simulation of at least a portion of a face (e.g., 720). In some examples, the representation is a representation of a simulation of a portion of a face. In some examples, the representation is a representation of a simulation of a face in its entirety. In some examples, the simulation of the biometric feature is a representation of a generic face such as a line drawing that includes eyes, nose, and a mouth. In some examples, the representation of a simulation of the biometric feature is a three-dimensional representation (814). For example, the representation of a simulation of the biometric feature is a three-dimensional rendered object. Alternatively, the instructional animation is optionally a 2D animation instead.

In some examples, the representation of the simulation of the biometric feature is a line drawing (816) with lines at different simulated z-height (e.g., a 3-D representation of 720). For example, when the line drawing of the face is tilted in different directions, the lines at different simulated z-heights appear to move relative to one another based on a simulated parallax effect. In some examples, the biometric enrollment introduction interface includes (820) an orientation guide (e.g., orientation guide 736, a curved line that curves backward in a simulated z direction, as described in greater detail below with reference to method 1200) that is overlaid on the representation of the simulated biometric feature (e.g., 720) and tilts in different directions as the representation of the simulated biometric feature tilts in different directions.

While displaying the biometric enrollment introduction interface, the device displays (824) an instructional animation (e.g., movement of 720 and advancement of instructional progress indicator 734 shown in FIGS. 7H-7L) that includes displaying movement (e.g., tilt and/or rotation) of the representation of the simulation of the biometric feature and incremental advancement of the progress indicator (e.g., progress elements of the progress indicator change color and/or shape in response to display of movement of the representation of the simulation of the biometric feature). Displaying an instructional animation that includes movement of the representation of the simulation of the biometric feature and incremental advancement of the simulated progress indicator illustrates, in advance, proper user inputs required for a subsequent biometric enrollment process (e.g., method 1200 and/or 1400) and therefore helps the user intuitively recognize how to quickly and properly enroll their biometric features, reducing the duration for which the device needs to display biometric enrollment interfaces (e.g., 756) during this process and reducing the number of user inputs performed at those interfaces. Reducing the number of inputs and amount of time needed to perform the enrollment operation enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device displays (826) movement tilting the simulation of the biometric feature relative to a plane of the display of the device. For example, movement of the representation of the simulation includes rotation of the representation of the simulation along an axis normal to plane of the display of the device. In some examples, tilting relative to biometric sensor and/or the field of view of the sensor defines the plane of the display. In another example, the device displays (828) movement rotating the representation of the simulation of the biometric feature about a first axis (e.g., an axis normal to display 700) and rotating the representation of the simulation of the biometric feature about a second axis (e.g., an axis in the plane of display 700) different than the first axis. In some examples, the first axis is a vertical axis such that movement of the representation is from left to right and/or right to left. In some examples, the first axis is normal to the second axis. For example, the second axis is optionally a horizontal axis such that movement of the representation is downward and/or upward. In some examples, the first axis is any axis other than an axis normal to the display of the device (e.g., the representation rotates in any direction), and second axis is the axis normal to the display of the device. In this example, the simulated head optionally moves in a circular pattern around the second axis. Displaying movement tilting the simulation of the biometric feature relative to a plane of the display illustrates, in advance, proper user inputs required for a subsequent biometric enrollment process (e.g., method 1200 and/or 1400) and therefore helps the user intuitively recognize how to quickly and properly enroll their biometric features, reducing the duration for which the device needs to display biometric enrollment interfaces (e.g., 756) during this process and reducing the number of user inputs performed at those interfaces. Reducing the number of inputs and amount of time needed to perform the enrollment operation enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, when displaying the instructional animation, the device optionally displays (830) the representation of the simulation of the biometric feature in a first position so as to reveal a first portion of the representation (e.g., a first side of 720) and not a second portion of the representation (e.g., a second, different side of 720). Subsequently, the device optionally displays the representation of the simulation of the biometric feature in a second position different than the first position so as to reveal the second portion of the representation and not the first portion of the representation. In the example that the biometric feature is a face, the simulated face optionally tilts in a first direction to reveal a first portion of the simulated face and then tilts in a second direction to reveal a second portion of the simulated face. Displaying the simulated biometric feature in a first orientation and subsequently displaying the simulated biometric feature in a second, different orientation illustrates, in advance, proper user inputs required for a subsequent biometric enrollment process (e.g., method 1200 and/or 1400) and therefore helps the user intuitively recognize how to quickly and properly enroll their biometric features, reducing the duration for which the device needs to display biometric enrollment interfaces (e.g., 756) during this process and reducing the number of user inputs performed at those interfaces. Reducing the number of inputs and amount of time needed to perform the enrollment operation enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device displays the simulated progress indicator (e.g., 734) surrounding the representation of the simulation of the biometric feature (e.g., 720). For example, the simulated progress indicator is displayed such that the simulated progress indicator surrounds (or substantially surrounds) a portion or all of the representation of simulation of the biometric feature. In some examples, the simulated progress indicator is centered around the representation of the biometric feature of the user. In some examples, displaying the simulated progress indicator includes displaying (832) a plurality of progress elements (e.g., dots, circles, or line segments such as progress ticks 734*a*, 734*b*, and 734*c*) proximate the representation of the simulation of the biometric feature (e.g., face graphic 720). In some examples, progress elements are equidistant from the representation and/or radially extend outward from the representation. In some examples, the progress elements are arranged in a circular, square, rectangular, or elliptical pattern.

In some examples, when displaying incremental advancement of the simulated progress indicator, the device transitions (834) one or more of the plurality of progress elements from a first state to a second state different than the first state. For example, in the first state, the progress elements are, optionally, of a first color and/or a first length, and in the second state, the progress elements are, optionally, of a second color different than the first color and/or a second length different than the first length. In some examples, progress elements optionally change in appearance in other manners as well. For example, the progress elements optionally change in line thickness, number, pattern, etc. Changing the display of portions of the simulated progress indicator allows the user to recognize that the changes in orientation of the simulated biometric feature illustrated in the instructional animation are required to properly enroll his/or her biometric features. This helps illustrate, in advance, proper user inputs required for a subsequent biometric enrollment process (e.g., method 1200 and/or 1400), reducing the duration for which the device needs to display biometric enrollment interfaces (e.g., 756) during this process and reducing the number of user inputs performed at those interfaces. Reducing the number of inputs and amount of time needed to perform the enrollment operation enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the representation of the simulation of the biometric feature is a line drawing (836) that includes at least a portion (e.g., some or all) of a glyph (e.g., success-state progress meter 744) that is used to indicate successful biometric enrollment. In some examples, one or more progress elements of the simulated progress indicator are all updated to a second state (e.g., green and lengthened, or the state of meter portion 738 in FIG. 7J) and are not modified thereafter. In some examples, when each of the progress elements has been updated to the second state, the simulated progress indicator transitions to a success state (e.g., success-state progress meter 744). In some examples, transitioning the simulated progress indicator to the success state includes transitioning the simulated progress indicator to a solid circle surrounding the representation of simulation of biometric feature.

After displaying at least a portion of the instructional animation, the device detects (838) the occurrence of a condition that corresponds to initiation of the biometric enrollment process. In some examples, the condition that corresponds to initiation of the biometric enrollment process includes (840) a selection of an affordance to initiate the biometric enrollment process. For example, the condition is an input (e.g., user input at contact area 748) that corresponds to a request to “start enrollment” such as a tap on a “start enrollment” or “next” affordance (e.g., start affordance 746), optionally followed by aligning a biometric feature of the user with the one or more biometric sensors. A more detailed description of the biometric enrollment process is described in greater detail herein with reference to method 900. In some examples, the electronic device provides a tactile and/or auditory output in response to selection of the affordance.

In response (842) to detecting the occurrence of the condition that corresponds to initiation of the biometric enrollment process, the device displays (844), at a location that was previously occupied by the representation of the simulation of the biometric feature in the biometric enrollment introduction interface (e.g., face authentication tutorial interface 732), a representation of the biometric feature of the user (e.g., user image 750, a face of the user, a finger of the user, an eye of the user, a hand of the user) as determined by the one or more biometric sensors of the device. In some examples, the device optionally displays an enrollment progress user interface (e.g., 756) after the representation of the biometric feature of the user (e.g., 750, 760) has been aligned with the one or more biometric sensors (e.g., 703)

In some examples, the representation is a representation (846) of a portion of the user’s face (e.g., a portion of user image 750). In some examples, the representation is a representation of the user’s face in its entirety. In some examples, the representation of the biometric feature of the user is a representation of the user that is specific to the user. For example, the representation of the user is images of the user’s face or a wireframe that matches contours of the user’s face.

In some examples, the biometric enrollment user interface includes (848) the orientation guide (e.g., orientation guide 736, orientation guide 762) overlaid on the representation of the biometric feature (e.g., user image 750). The orientation guide optionally tilts as the biometric feature tilts in different directions. Displaying an orientation guide that moves as along with the user’s biometric feature provides the user with feedback about the orientation of his or her biometric features relative to the biometric sensors of the device in three-dimensional space, enabling the user to place his or her biometric features in proper orientations more quickly during a subsequent enrollment process (e.g., method 1200 and/or method 1400). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the representation of the biometric feature (e.g., 750) of the user is based on (850) image data captured by the one or more cameras (e.g., 703) of the electronic device. For example, the representation of the biometric feature of the user is, optionally, successive images of the user captured by the one or more cameras (e.g., 703), or a wireframe that is based on movement of the user's features in a field of view of the one or more cameras. In some examples, the representation of the biometric feature changes (852) as the orientation of the biometric feature relative to the one or more biometric sensors changes. Updating the orientation of the displayed representation of the biometric feature provides the user with feedback about the orientation of his or her biometric features relative to the biometric sensors of the device, enabling the user to place his or her biometric features in a proper orientation more quickly during a subsequent enrollment process (e.g., method 1200 and/or method 1400). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In response to detecting the occurrence of a condition that corresponds to initiation of the biometric enrollment process, the device also displays (854) a progress indicator (e.g., 756) that corresponds to the simulated progress indicator (e.g., a progress indicator that has some or all of the features of the progress indicator displayed surrounding the simulation of the biometric feature such as a plurality of progress elements that are distributed around a representation of the biometric feature of the user). In some examples, displaying the progress indicator includes maintaining (856) the display of the simulated progress indicator. For example, the simulated progress indicator is returned to an initial state (e.g., the state of progress elements 734*a*, 734*b*, and 734*c* in FIG. 7H) and used to show incremental enrollment progress of the user in a same or similar manner used to show incremental enrollment progress of the simulated biometric feature. Displaying an enrollment progress indicator that corresponds (e.g., is similar) to the simulated progress indicator allows the user to quickly associate changes in orientation of the simulated biometric feature and corresponding advancement of the simulated progress indicator illustrated during the instructional animation with the proper inputs required during a subsequent enrollment process (e.g., method 1200 and/or 1400). This in turn enables the user to more quickly complete the enrollment process, reducing the duration for which the device needs to display biometric enrollment interfaces (e.g., 756) during this process and reducing the number of user inputs performed at those interfaces. Reducing the number of inputs and amount of time needed to perform the enrollment operation enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device displays (858) the progress indicator (e.g., 758) surrounding the representation of the biometric feature of the user (e.g., 760). For example, the progress indicator optionally has some or all of the features of the progress indicator that is displayed surrounding the simulation of the biometric feature. These features optionally include a plurality of progress elements (e.g., 758*a*, 758*b*, 758*c*) that are distributed around a representation of the biometric feature of the user. For example, the progress indicator is displayed such that the progress indicator surrounds (or substantially surrounds) a portion or all of the representation of the biometric feature of the user. In some examples, the progress indicator is centered around the representation of the biometric feature of the user.

In some examples, in response to detecting the occurrence of the condition that corresponds to initiation of the biometric enrollment process, the device displays (860) a positioning element (e.g., positioning element 752) on the display of the electronic device. In some examples, the positioning element is displayed to emphasize a predetermined portion of the display of the electronic device (e.g., 756, 758). In some examples, the positioning element indicates where a user should position the representation of the biometric feature of the user (e.g., 750) for subsequent biometric feature enrollment. In some examples, the positioning element is an object visually at least partially partitioning first and second portions of the display (e.g., display portion 756 and display portion 758). The positioning element is a shape, such a square in some examples, and is optionally segmented. Displaying a positioning element that frames a particular portion of the digital viewfinder allows the user to quickly recognize whether the position and/or orientation of his or her biometric features within the biometric sensor's field of view is optimal for a subsequent biometric enrollment process (e.g., method 1200 and/or 1400), enabling the user to place his or her biometric features in a proper orientation more quickly. Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

Note that details of the processes described above with respect to method 800 (e.g., FIGS. 8A-C) are also applicable in an analogous manner to the methods described below. For example, method 800 optionally includes one or more of the characteristics of the various methods described below with reference to methods 1000, 1200, 1400, 1600, 1800, 2000, 2200, 2500, and 2700. For another example, the orientation guide described in method 1200 can be applied with respect to the instructional animation displayed on face authentication tutorial interface (e.g., 732). For another example, one or more aspects of biometric enrollment described in method 1200 can be applied with respect to the enrollment interface (e.g., 756). For another example, one or more aspects of hints described in method 1400 can be applied to display of the face authentication tutorial interface (e.g., 732).

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 8A-8C are, optionally, implemented by components depicted in FIGS. 1A-1B. For example, displaying operation 802, detecting operation 806, displaying operation 810, displaying operation 824, detecting operation 838, displaying operation 844, and displaying operation 854 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9AE illustrate exemplary user interfaces for instructional tutorial for enrolling a biometric feature on an electronic device (e.g., device 100, device 300, device 500, or device 700), in accordance with some examples. The user interfaces in these figures are used to illustrate the processes described below, including the processes in FIG. 10.

FIG. 9A illustrates an electronic device 900 (e.g., portable multifunction device 100, device 300, device 500, or device 700). In the exemplary example illustrated in FIGS. 9A-9AE electronic device 900 is a smartphone. In other examples, electronic device 900 can be a different type of electronic device, such as a wearable device (e.g., a smartwatch). Electronic device 900 has a display 901, one or more input devices (e.g., touchscreen of display 901, a button, a microphone), and a wireless communication radio. In some examples, the electronic device includes a plurality of cameras. In some examples, the electronic device includes only one camera. In some examples, the electronic device includes one or more biometric sensors (e.g., biometric sensor 903) which, optionally, include a camera, such as an infrared camera, a thermographic camera, or a combination thereof. In some examples, the one or more biometric sensors 903 are the one or more biometric sensors 703. In some examples, the device further includes a light-emitting device (e.g., light projector). such as an IR flood light, a structured light projector, or a combination thereof. The light-emitting device is, optionally, used to illuminate the biometric feature (e.g., the face) during capture of biometric data of biometric features by the one or more biometric sensors.

As illustrated in FIG. 9A, device 900 displays a face authentication introduction interface 905. In some examples, face authentication introduction interface 905 is similar to the face authentication tutorial interface 732 described above in connection with FIG. 7S. By way of example, face authentication introduction interface 905 includes face graphic 902, which is, optionally, the same as or similar to glyph 720, described above with respect to face authentication tutorial interface 732. Additionally or alternatively, device 900 optionally also display success-state instructional progress meter 907, which is, optionally, the same or similar to success-state instructional progress meter 744 in FIG. 7P-7Q. Face authentication introduction interface 905 also includes a start button 904 (e.g., a start affordance). As shown in FIG. 9A, device 900 detects activation (e.g., selection) of start affordance 904. For example, activation is, optionally, a user input at contact area 906 on start affordance 904. This user input will, in some circumstances, correspond to a request to begin face authentication set-up (e.g., start face enrollment).

Figure 9B:
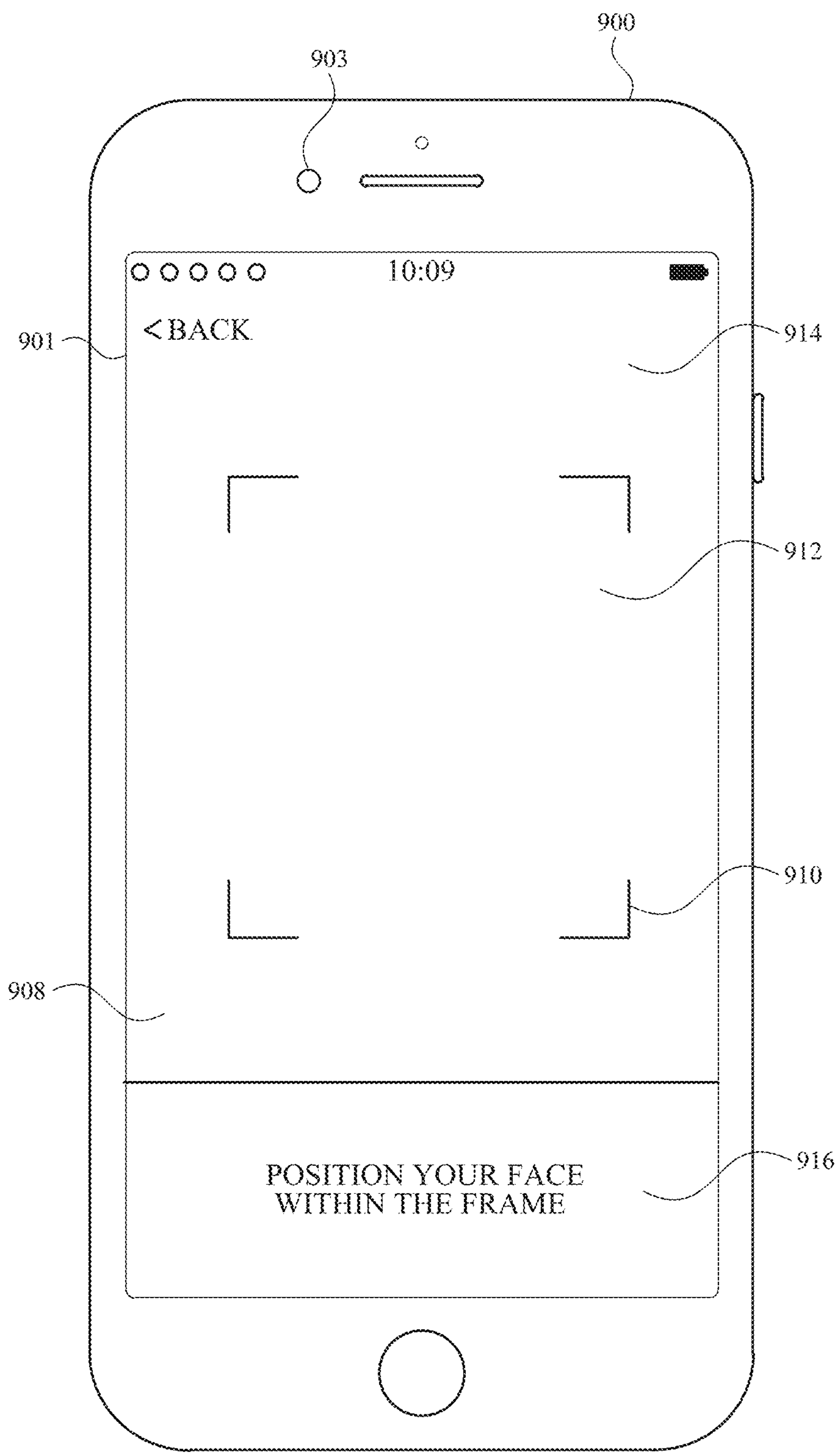

In some examples, in response to detecting user selection of start button 904, device 900 displays face alignment interface 908 as shown in FIG. 9B. Face alignment interface 908 includes positioning element 910, which is a framing circle or brackets that, in some examples, indicates an alignment boundary. In some examples, the positioning element 910 identifies an inner display portion 912 and an outer display portion 912. In some examples, the electronic device determines a biometric feature of a user is properly aligned when substantially positioned in the inner display portion 912 in a predetermined manner. In some examples, positioning element 910 partitions inner display portion 912 from outer display portion 914. In general, if the user's face is positioned relative to biometric sensor 903 such that a portion of the image of the user appears in outer display portion 914, the user's face will, in some circumstances, not be properly aligned with the cameras. As such, face alignment interface 908 also includes a text prompt 916 instructing the user to position his or her face inside of positioning element 910 (e.g., within inner display portion 812).

Figure 9C:
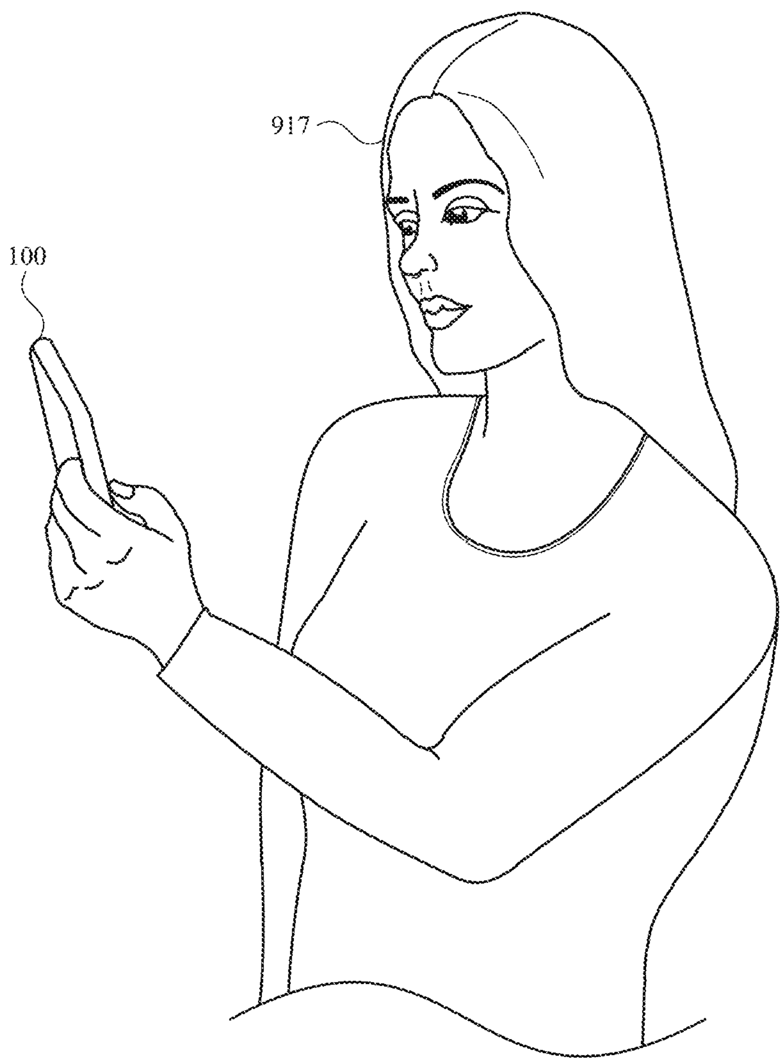

With reference to FIG. 9C, in some examples, during the alignment process, a user positions the electronic device 900 substantially in front of the user's face 917. In some examples, the user holds device 900 at approximately a same height as his or her face, such that the face is in the field of view of the biometric sensor 903.

Figure 9D:
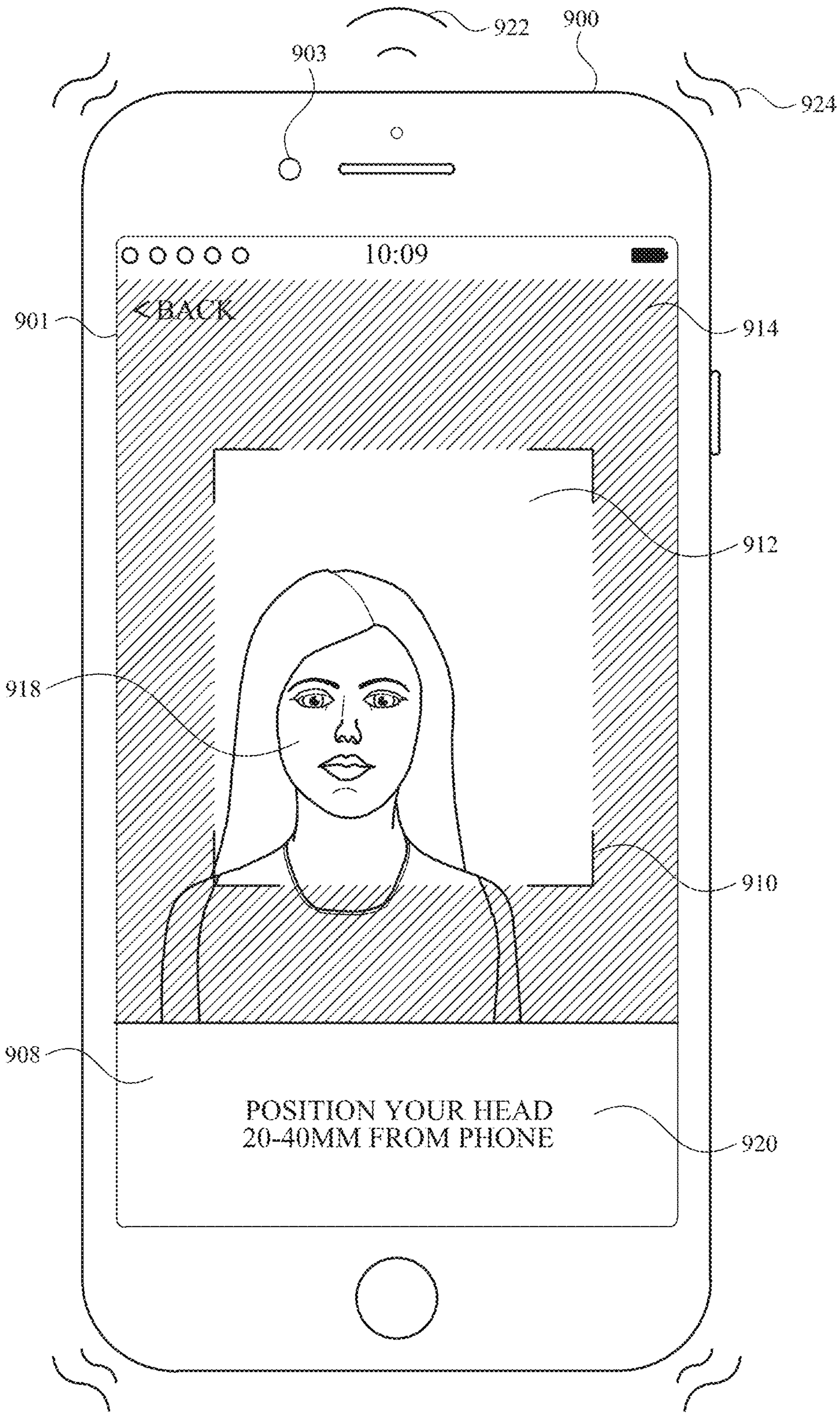

As illustrated in FIG. 9D, once the user has initiated alignment process, the device displays a face alignment interface 908 (recall that the user optionally initiates the enrollment process by activating an affordance 904). Face alignment interface 908 includes a digital viewfinder showing a preview of image data captured by biometric sensor 903. In some examples, the preview of image data is a live preview that continuously updates (e.g., changes over time) as the field of view of these cameras changes (e.g., if device 900 is moved or if the user moves closer/farther away from the cameras). The digital viewfinder includes user facial image 918, as well as positioning element 910 superimposed on the field of view of the cameras. As described above, positioning element 910 partitions inner display portion 912 from surrounding outer display portion 914. To provide further visual separation between inner display portion 912 (where user facial image 918 is to be positioned) and outer display portion 914, device 900 visually obscures (e.g., shades, darkens or blurs) outer display portion 914, as shown in FIG. 9D.

In general, proper enrollment of a user's facial features for authentication requires that the user's face be positioned in a predetermined manner and/or within a predetermined range of distances from the cameras of device 900. In some examples, alignment of a user's face with the cameras of device 900 requires the user to be neither too close nor too far away from the device. Thus, if the electronic device 900 determines that the face of the user is too close or too far, the electronic device displays text prompt 920 in the face alignment interface 908 instructing the user to position their face an acceptable distance (e.g., 20-40 mm) from device 900. In the example of FIG. 9D, device 900 detects that the user's face is too far away from the cameras on the device (e.g., user facial image 918 is within positioning element 910, but does not substantially fill inner display portion 912). In some examples, the electronic device prompts the user to move his or her face closer to the device. In some examples, the device generates one or more outputs, such as audio output 922 (e.g., a series of beeps or other audio output) and tactile output 924 (e.g., a series of vibrations or other tactile output) to notify the user of improper alignment. In some examples, audio output 922 and/or tactile output 924 have a magnitude and repetition rate (e.g., frequency) that changes based on the distance between device 900 and the user's face. For example, the output frequency and/or magnitude optionally increases as the user's face moves closer to the acceptable range of distances (e.g., 20-40 mm) from the device. Conversely, the output's frequency and/or magnitude optionally decrease as the user's face moves further away from the acceptable range of distances. In this case, device 900 continuously changes (e.g., updates) the frequency and/or magnitude of audio output 922 and/or tactile output 924 as it detects changes in distance between the user's face and biometric sensor 903. In some examples, device 900 provides these outputs as long as the user's face is outside the acceptable range of distances from the device. In some examples, audio output 922 and tactile output 924 is accompanied by a corresponding visual output on display 700. These ongoing audio, tactile, and/or visual outputs optionally provides intuitive hints as to how a user is to correctly align his or her face with the cameras, reducing the time required to perform successful facial alignment.

Figure 9E:
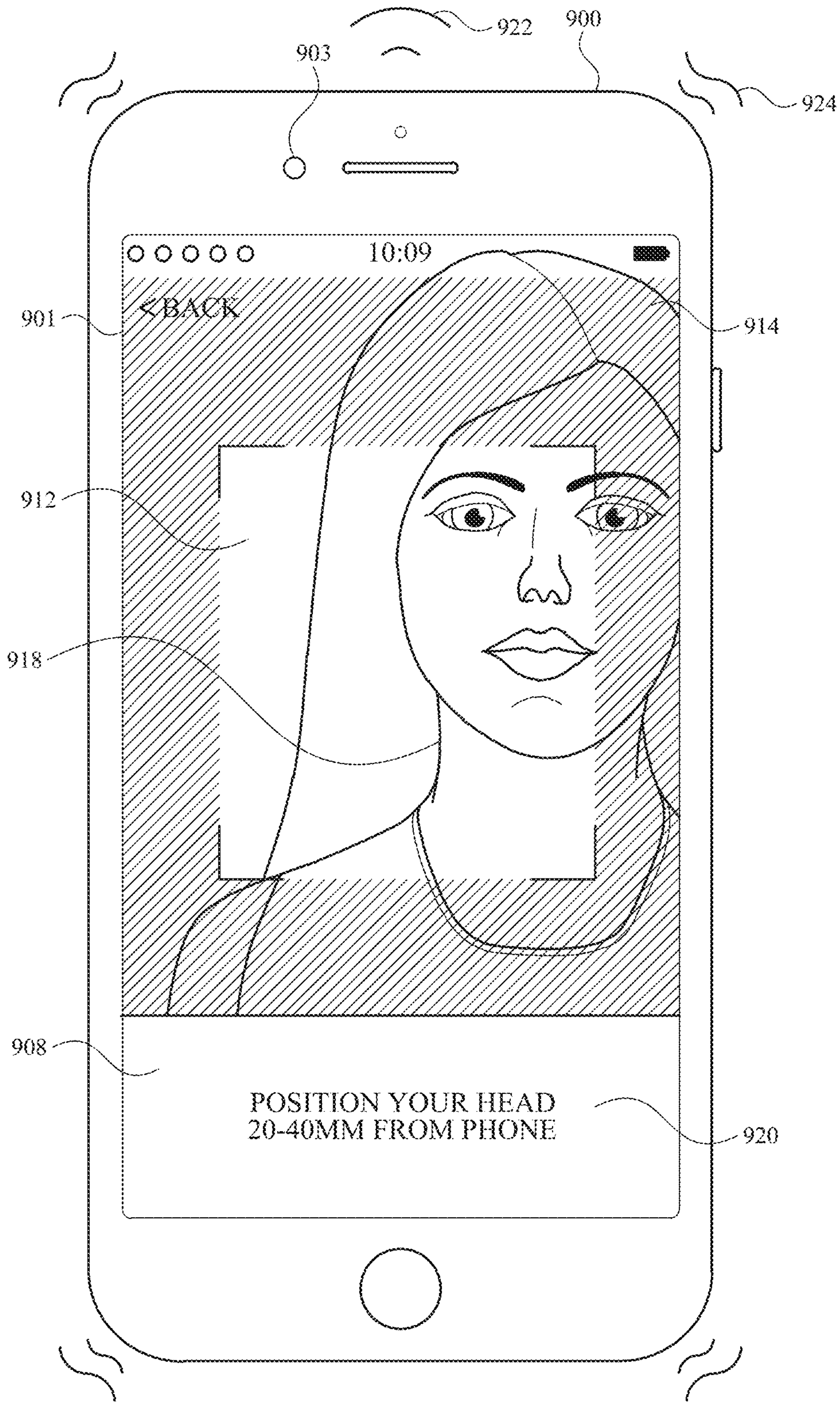

FIG. 9E illustrates face alignment interface 908 in the case where the user's face is positioned too close to device 900 (e.g., a substantial portion of user facial image 918 falls within outer display portion 914). In this case, alignment interface 908 also includes text prompt 920, which instructs the user to position his or her face at an acceptable distance from device 900. In some examples, the electronic device instructs the user to move his or her face closer to the device. As described above in connection with FIG. 9D, device 900 optionally generates an ongoing audio output 922 and/or tactile output 924 in response to detecting that the user's face is too close to the camera(s). In particular, device 900 changes the frequency and/or magnitude of these outputs as it detects changes in distance between the user's face and the cameras.

Figure 9F:
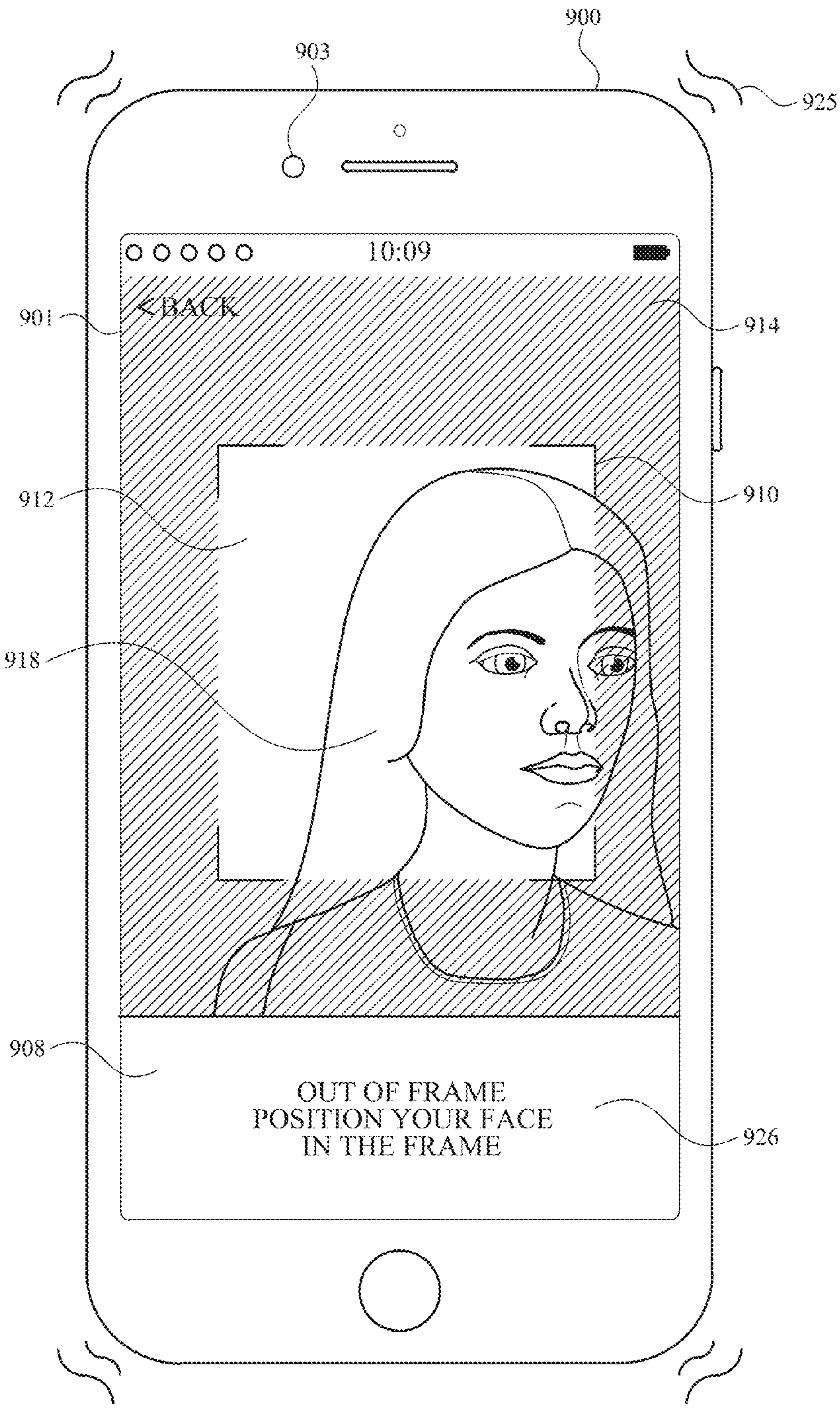

FIG. 9F illustrates face alignment interface 908 in the case that user's face is positioned at an acceptable distance from device 900, but is out of frame (e.g., too far to the right or left). For example, face 918 is, optionally, positioned such that a substantial portion of the face 918 lies outside of positioning element 910 within outer display portion 914. In this case, device 900 optionally displays text prompt 926 on alignment interface 908, instructing the user to position his or her face within positioning element 910 (e.g., such that user image 918 is displayed within inner display area 912).

Figure 9H:
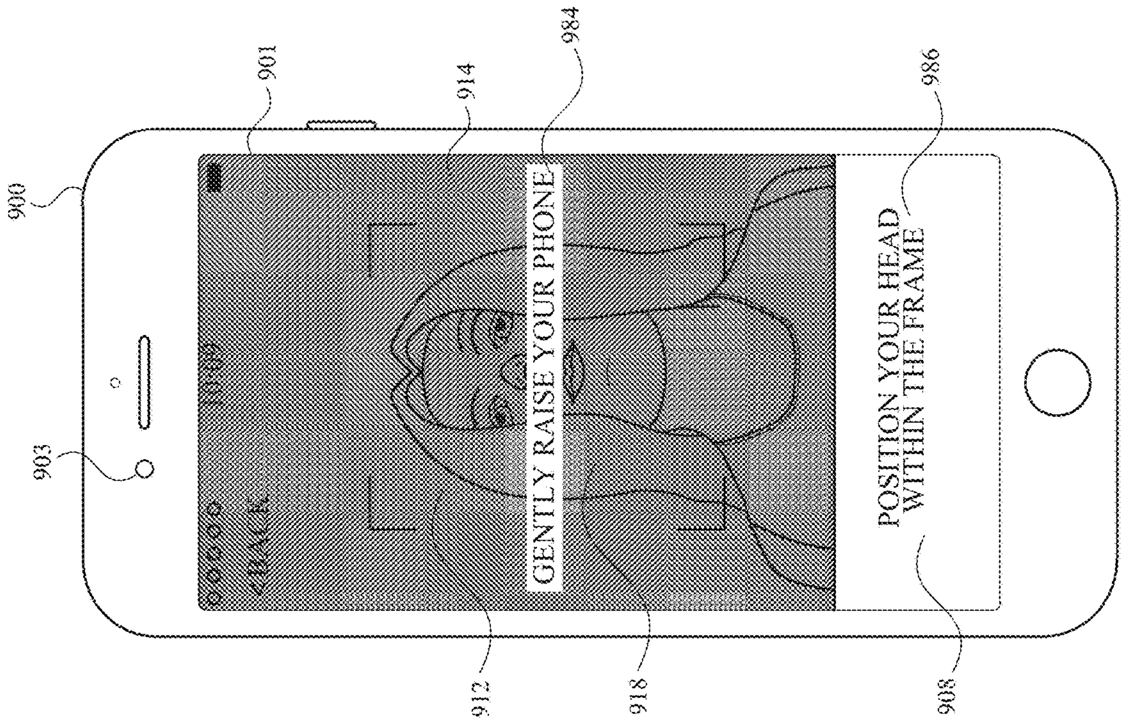
Figure 9G:
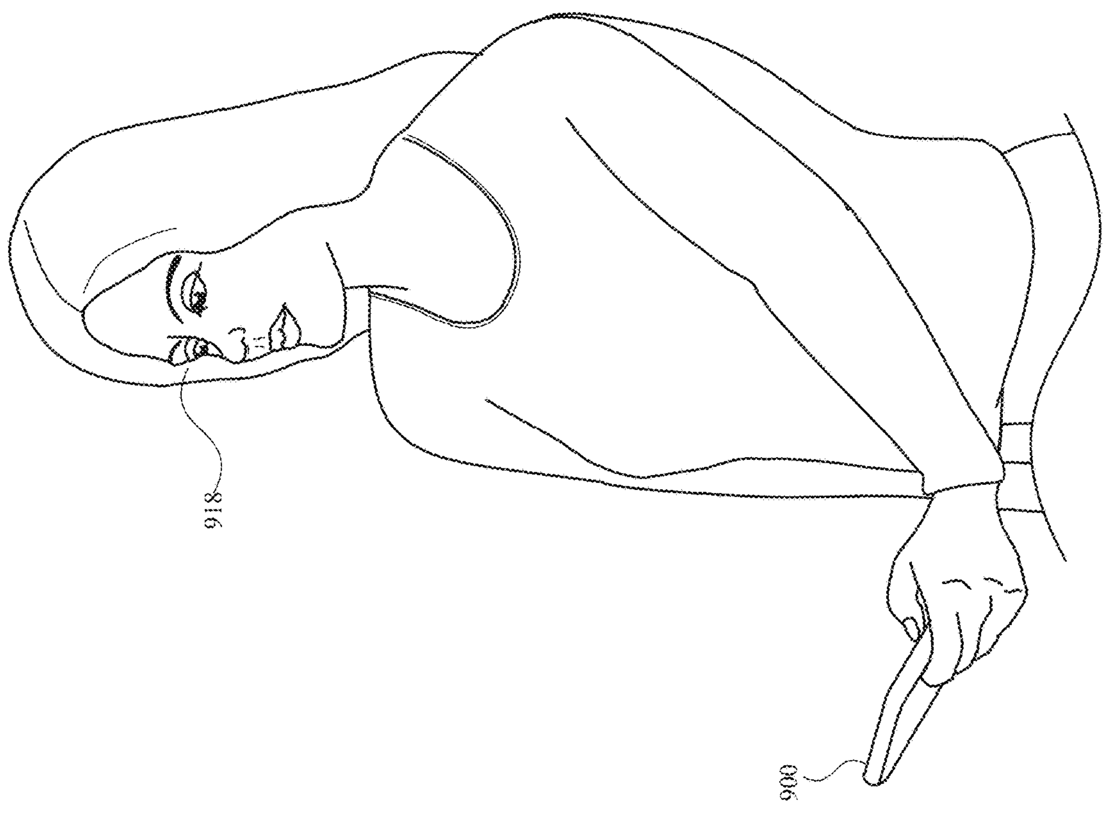
Figure 9J:
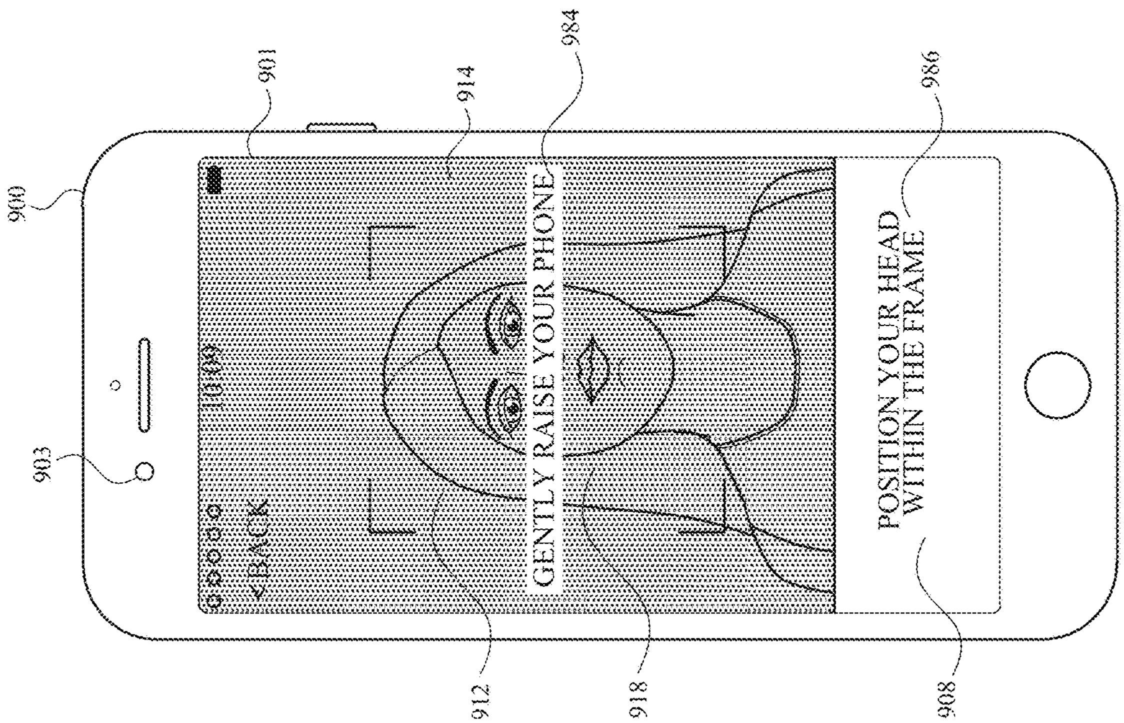
Figure 9I:
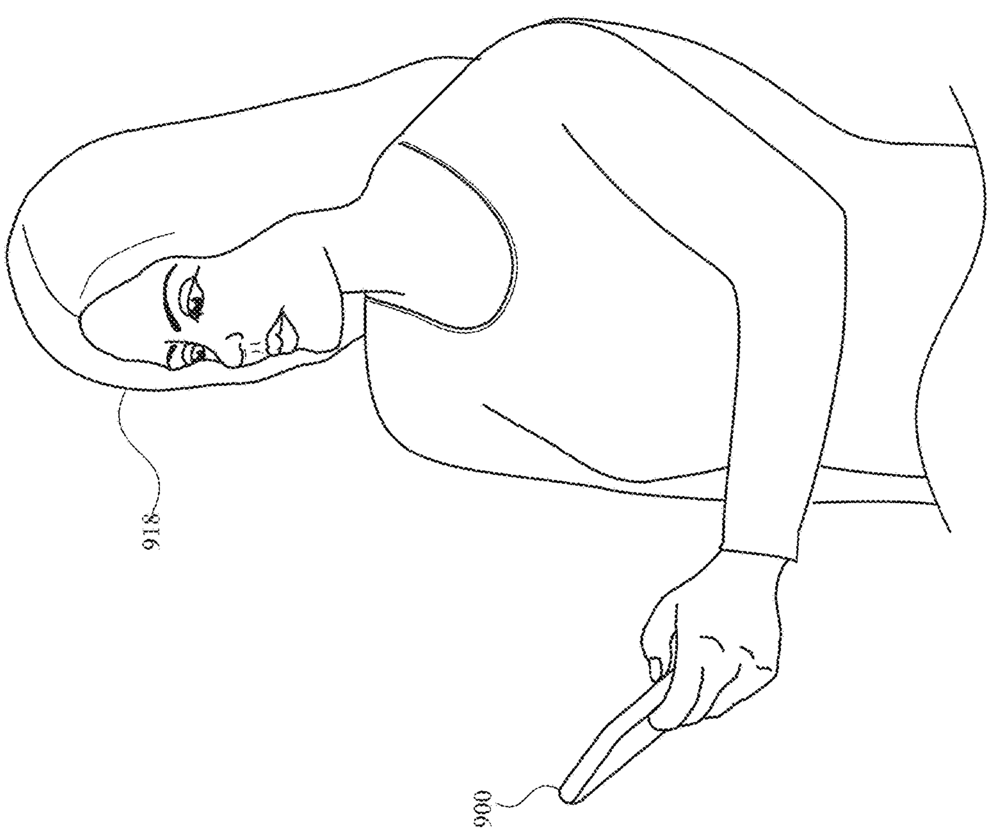
Figure 9L:
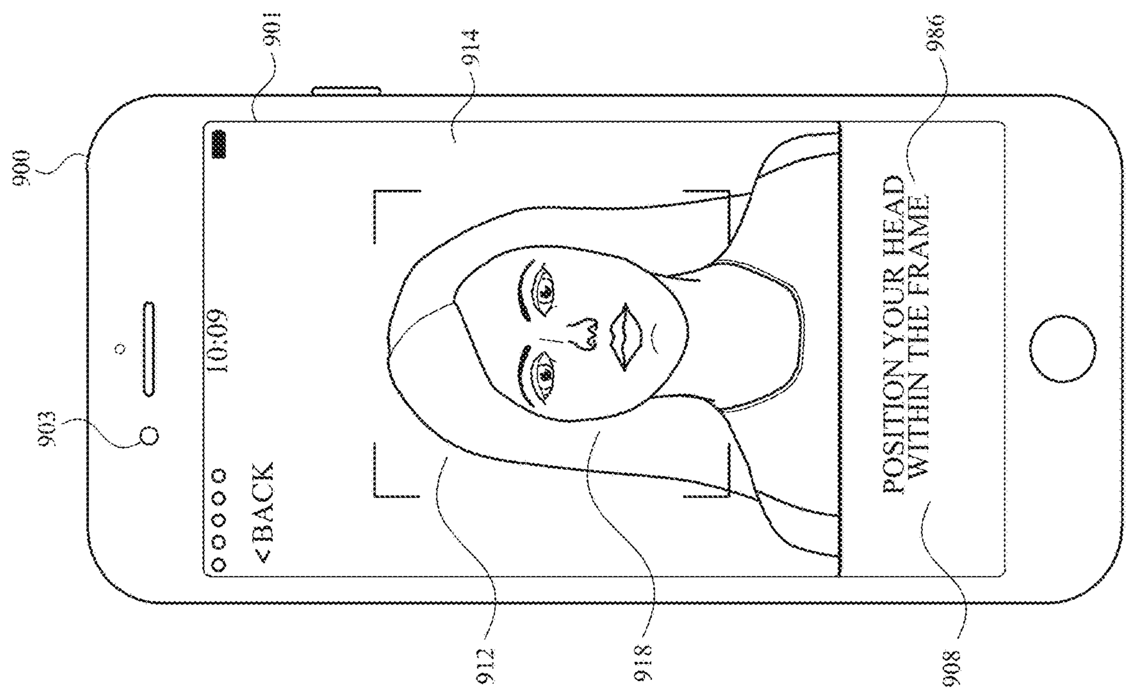
Figure 9K:
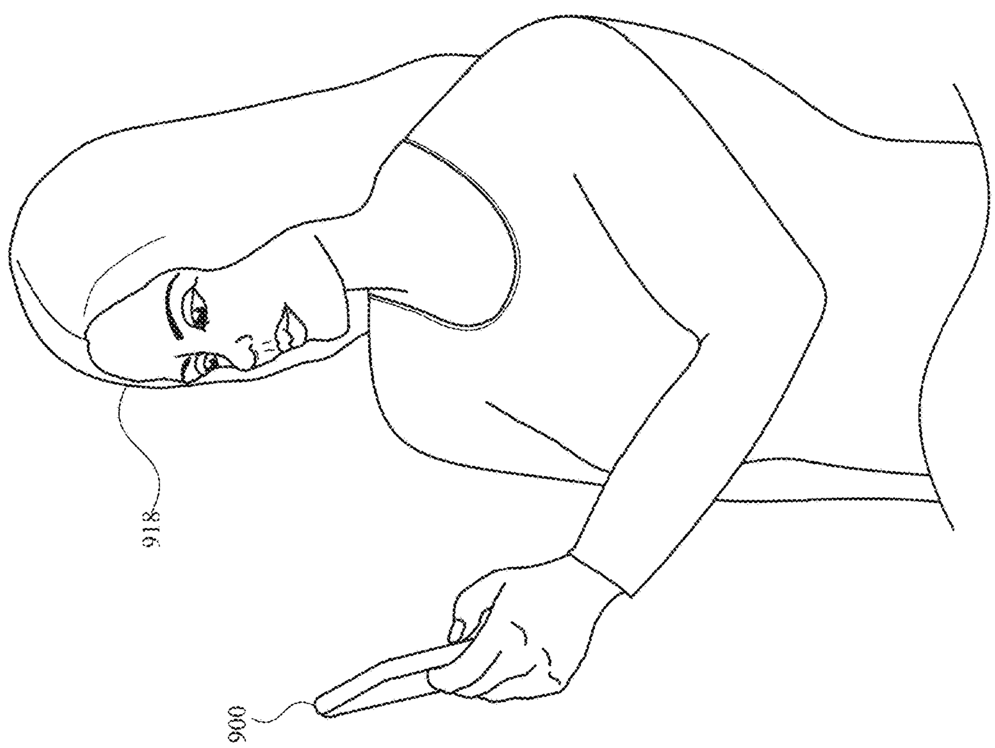
Figure 9M:
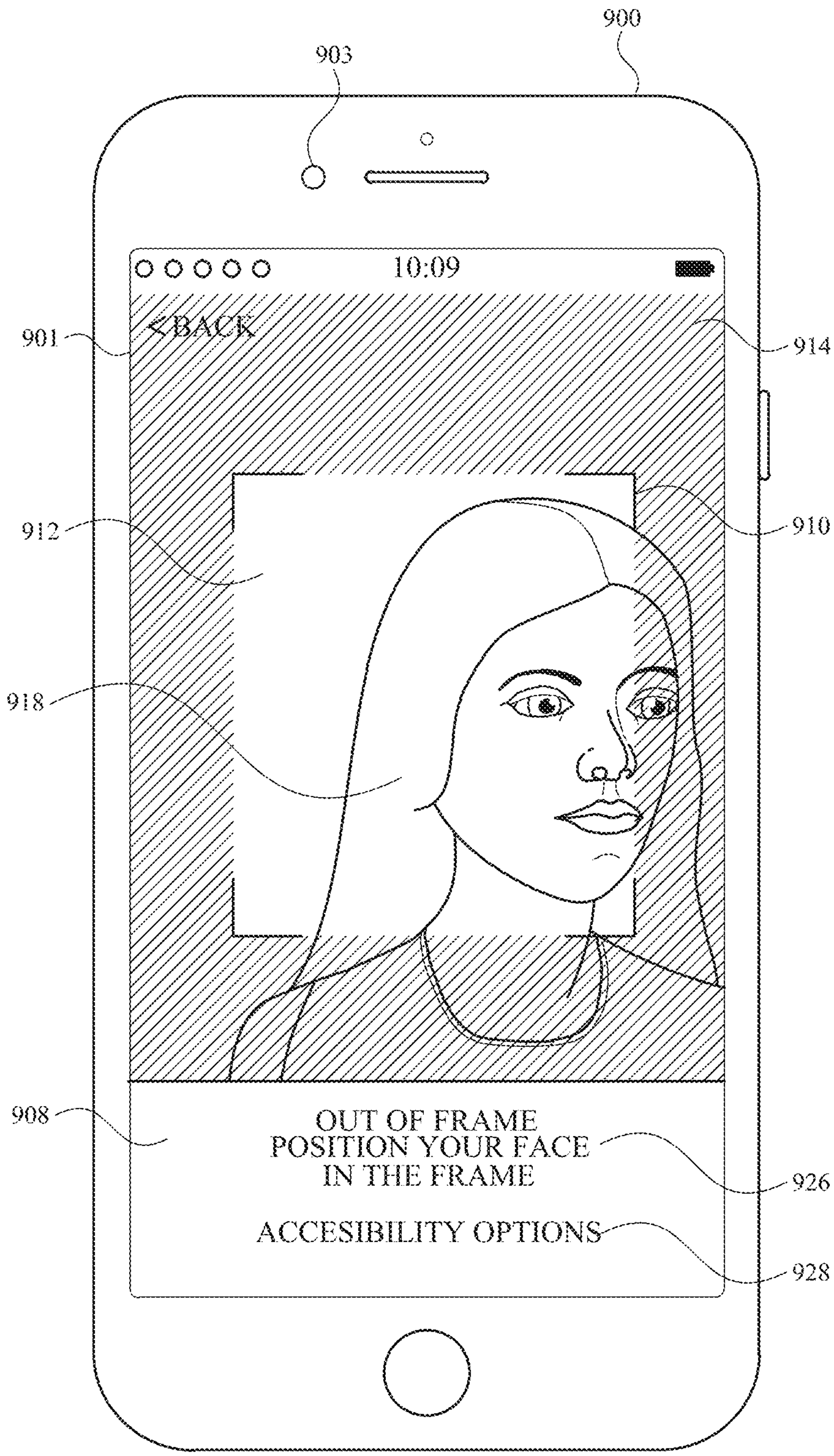

With reference to FIGS. 9G-9L, in some examples, the electronic device 900 displays face alignment interface 908 in response to determining that a user's face is positioned outside a range of predetermined angles relative to the electronic device. As shown in FIG. 9G, the electronic device 900 is positioned at a low angle relative to the electronic device (e.g., the electronic device is aligned with a chin of the user) such that the electronic device cannot properly obtain (e.g., capture biometric data). With reference to FIG. 9H, in response to determining that the electronic device 900 is outside the range of predetermined angles, the electronic device 900 blurs at least a portion of face alignment interface 908, such as the inner display portion 912 and outer display portion 914. In some examples, the electronic device further outputs a prompt 986 instructing the user to position his or her face within positioning element 910 (e.g., such that user image 918 is displayed within inner display area 912 and at the proper angle). In FIGS. 91 and 9K, the user raises the device 900 until the electronic device is within the predetermined range of angles. As the user raises the electronic device, with reference to FIGS. 9J and 9K, the electronic device 900 gradually decreases the blur of displayed elements. In this manner, the electronic device indicates to the user that the angle of the electronic device relative to the user is approaching the acceptable range of angles. In some examples, the electronic device is too high relative to the user such that the electronic device is not within the predetermined range of angles. Similarly to the described example, the electronic device optionally decreases or increases blur of displayed objects as the electronic device is moved relative to the user.

In some examples, if the device detects that an alignment error persists for a predetermined amount of time, device 900 optionally displays accessibility options affordance 928 on face alignment interface 908, as shown in FIG. 9G. For example, device 900 optionally displays accessibility options affordance 928 if it does not detect a user face at an acceptable distance from the device and/or within the positioning element at a predetermined time after starting alignment (e.g., after start button 904 is selected). In some examples, the predetermined amount of time is, optionally, 10 seconds, 15 seconds, 30 seconds, or any other suitable amount of time. Similarly, device 900 optionally displays accessibility options affordance after a certain number of enrollment attempts have failed. As discussed in more detail below, device 900 optionally displays additional options or hints and/or initiate alternative facial enrollment processes in response to detecting selection of accessibility options affordance 928. In some examples, activation of accessibility options affordance 928 enables the user to proceed with biometric enrollment without first correcting the alignment error.

In general, the quality of facial feature enrollment for the face authentication methods described herein at least partially depends on the lighting conditions under which the user's facial data is captured. For example, strong backlighting or direct exposure on the user's face will, in some circumstances, adversely affect the quality of enrollment. Turning now to FIG. 9H, in response to detecting adverse lighting conditions, device 900 optionally displays text prompt 930 on alignment interface 908, which indicates adverse lighting to the user. Text prompt 930 is, optionally, accompanied by an audio, visual and/or tactile output 932. Output 932 is, optionally, the same as output 922 and/or 924 described in connection with the alignment errors discussed above. In some examples, outputs are error-specific; output 932 is, optionally, therefore be a different audio, visual, and/or tactile output than outputs 922 and 924.

In general, the quality of facial feature enrollment also partially depends on the angle at which the user's face is orientated relative to one or more cameras of device 900 (e.g., biometric sensor 903). In particular, one or more optical sensors of device 900 must be able to capture image data of the user's face at a particular angle or within a predetermined range of angles. Even provided that the user's face is within the acceptable range of distances described above, face authentication enrollment can be adversely affected if device 900 is positioned to high above or too far below the user's face. Thus, in some examples, device 900 requires the user's face to be positioned within a predetermined range of angles relative to one or more of its cameras when detecting successful alignment conditions.

In some examples, device 900 blurs the image data displayed in the digital viewfinder of alignment interface 808 in response to detecting that the user's face is outside of this predetermined range of angles relative to biometric sensor 903. In some examples, the amount of blurring optionally depends on the difference between the detected angle of elevation of the user's face relative to the camera and one or more threshold angles that bound the predetermined angle range. For example, device 900 blurs the preview image to a greater extent the higher or lower device 900 is positioned relative to the face of the user. If device 900 detects a change in the angle of elevation bringing its cameras into closer alignment with the user's face, it optionally lessens the amount of blurring as the angle of elevation changes (e.g., in a continuous gradient). In some examples, the preview image is not blurred if the angle of elevation between device 900 and the user's face is actively changing (e.g., the user is moving device 900 relative to his or her face). Blurring is, optionally, delayed until device 900 determines that the angle between the user's face and one or more of its cameras has been outside the predetermined angle range for a set period of time (e.g., 1 second, 2 seconds, 5 seconds, or any suitable time period). In some examples, only a portion of the preview image (e.g., outer display portion 914) is blurred, while the entire preview image is, optionally, blurred in other examples. Blurring the preview image in this manner optionally prompts the user to more quickly position device 900 at a desirable angle relative to his or her face, reducing the amount of time spent during the alignment process. In some examples, device 900 optionally issues generates a tactile and/or output to inform the user that his or her face is positioned at a suitable angle relative to biometric sensor 903.

Figure 9N:
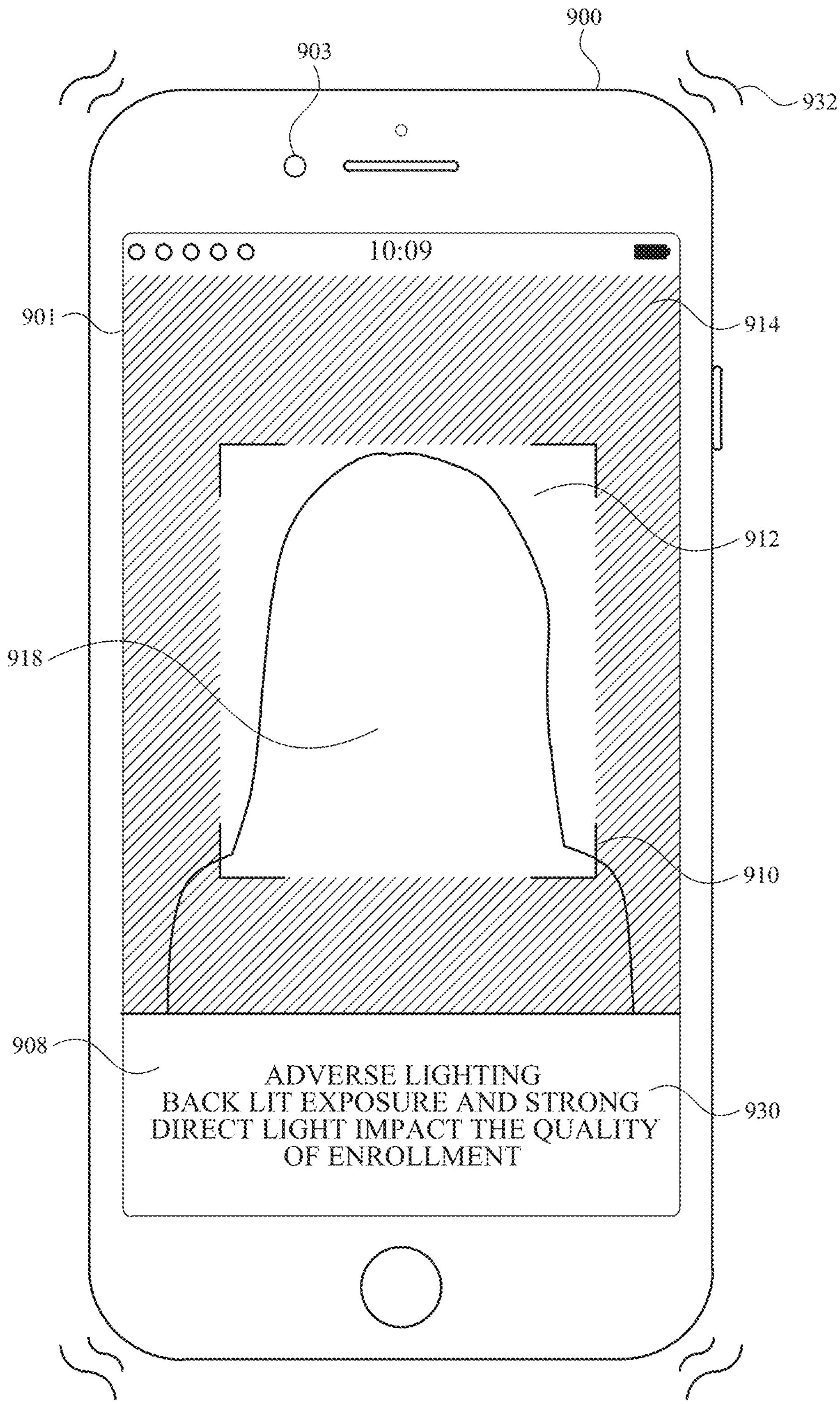

In FIG. 9N, the user's face is properly positioned relative to biometric sensor 903. In this case, face 918 is displayed substantially within alignment element 910 and inner display portion 912. As shown in FIG. 9N, face 918 also occupies a substantial portion of inner display portion 912, indicating that the user's face is within the threshold range of distances from device 900. In response to detecting a face that meets the above-described alignment criteria, device 900 issues audio output 934 and tactile output 936 to indicate successful alignment of the user's face with the cameras. In general, outputs 934 and 936 are different from outputs 922, 924, and 932, which are issued in response to detecting alignment errors. In some examples, device 900 captures and stores one or more images of the user's face upon successful alignment with the cameras.

Figure 9O:
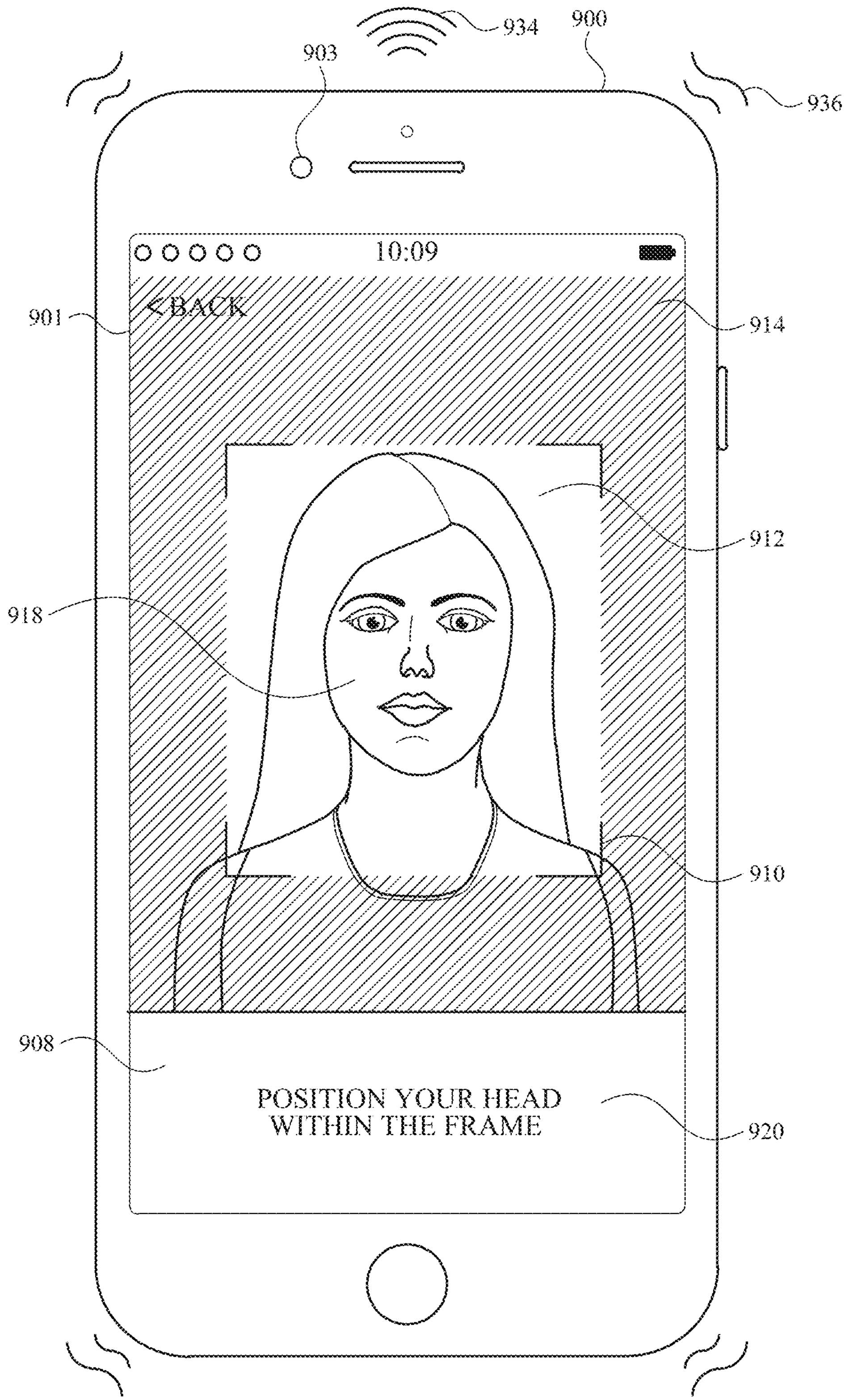
Figure 9P:
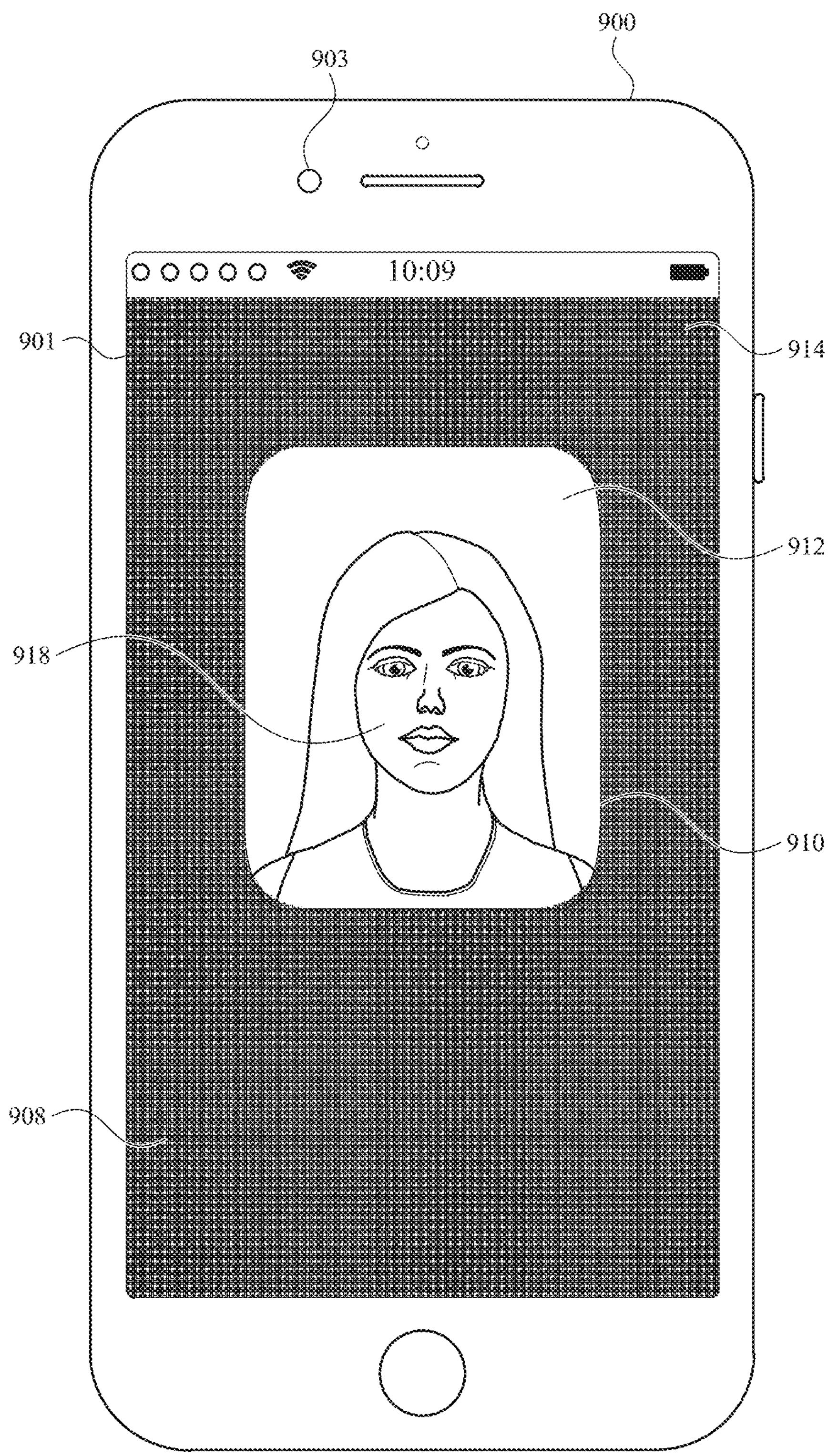

In some examples, after detecting successful alignment, device 900 visually emphasizes inner display portion 912 in which face 918 is displayed. In the example of FIG. 9P, device 900 further obscures the outer display portion 914 by blacking out or further blurring the image in the outer portion of the digital viewfinder preview while continuing to display the part of the digital viewfinder preview in inner display portion 914 (e.g., inside positioning element 910). In some examples, device 900 further visually emphasizes the contents of inner display portion 912 by enlarging or zooming in on the image within inner display portion 912.

Figure 9Q:
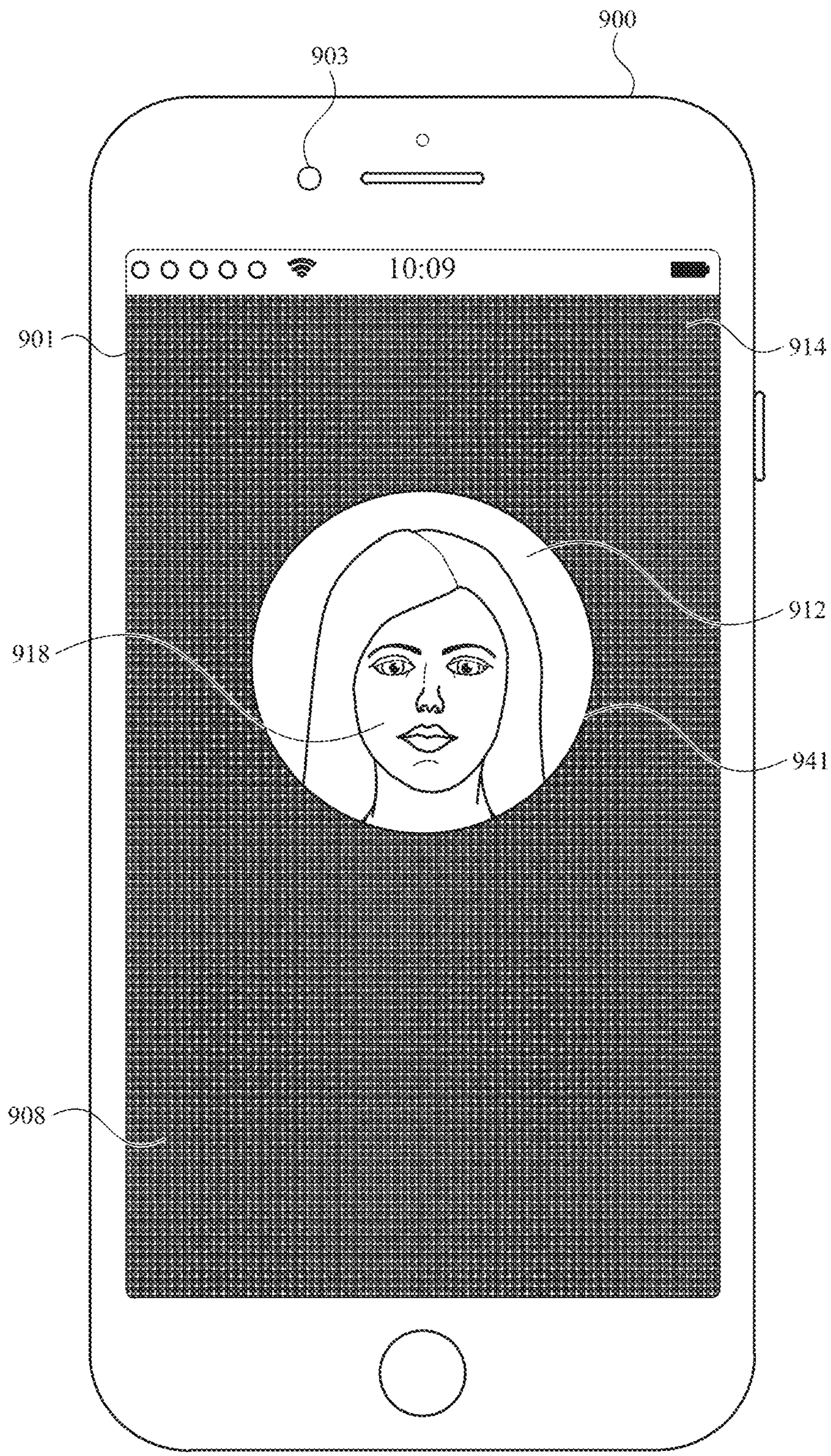

In some examples, the device further emphasizes the inner display portion 912 by changing the appearance of positioning element 910. In particular, device 900 optionally changes the appearance of the alignment element by "rounding" the corners of the alignment element as shown in FIG. 9P, and/or by merging the corners of the alignment element 910 into a circular positioning element 941 surrounding face 918, as shown in FIG. 9Q.

Figure 9R:
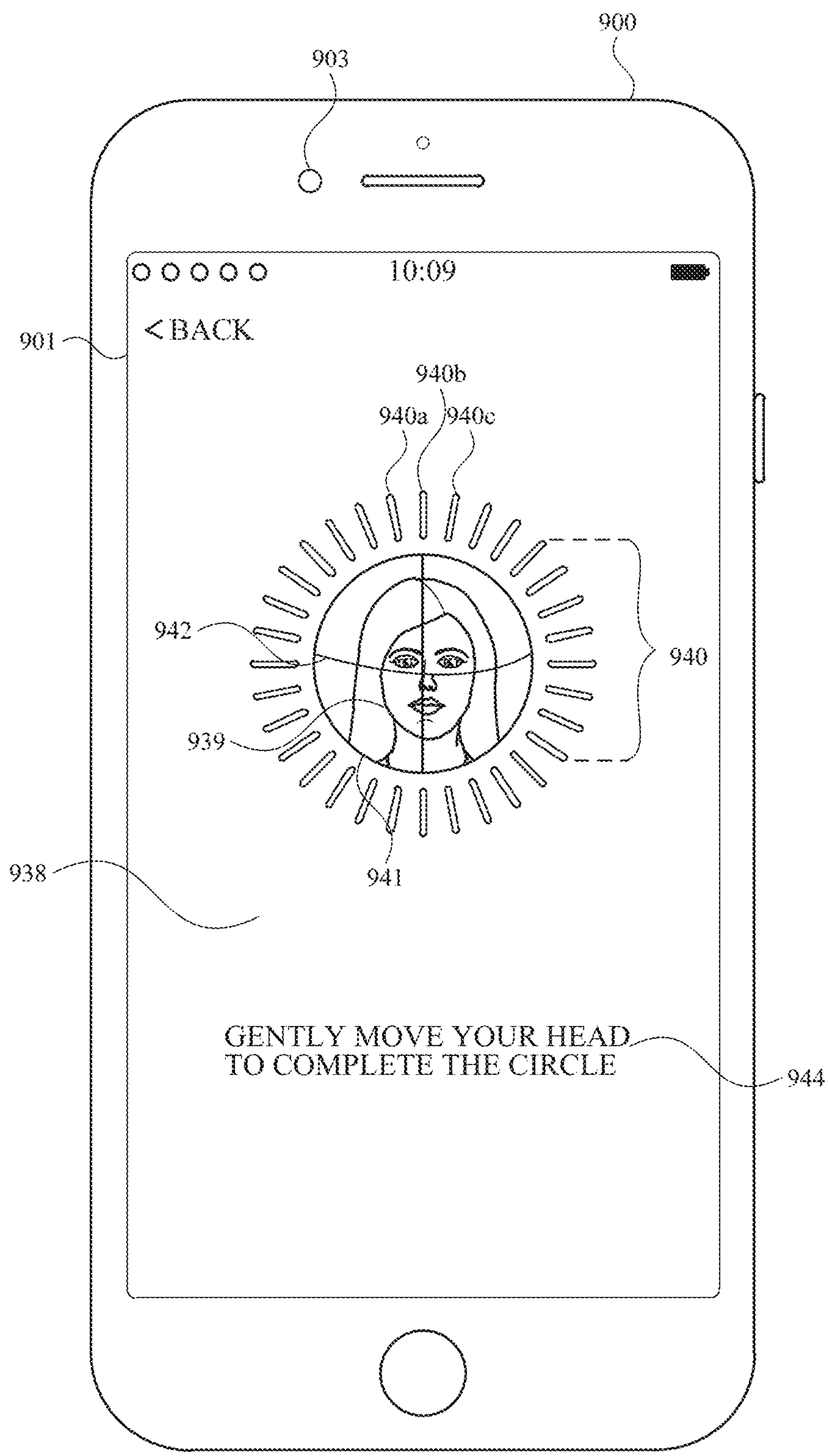

Turning now to the example of FIG. 9R, in response to detecting that the user's face is oriented such that the above-referenced alignment criteria are met, device 900 initiates the face authentication enrollment process by displaying (e.g., replacing display of alignment interface 908 with) face enrollment interface 938. In some examples, face enrollment interface 938 has similar or identical visual characteristics as face authentication enrollment interface 756 described above in connection with FIG. 7S or enrollment interface 1104 described below in connection with FIG. 11A. In the example of FIG. 9R, face enrollment interface 938 includes user facial image 939 displayed within positioning element 941. In the example of FIG. 9R, user facial image 939 is a live preview of image data captured by biometric sensor 903. Face enrollment interface 938 also optionally includes enrollment progress meter 940 that surrounds user facial image 939 and positioning element 941. As described above in connection with FIG. 7S and FIGS. 11A-11H, enrollment progress meter 940 is composed of a set of progress elements (e.g., 940*a*, 940*b*, and 940*c*) that extend radially outward from user facial image 939 and, in some examples, enclose it in a circular pattern. Face enrollment interface 938 optionally includes orientation guide 942. In some examples, the orientation guide includes a set of curved lines (e.g., crosshairs) that appear to extend out of the plane of display 901 in a virtual z-dimension, intersecting over the center of user facial image 939. In some examples, orientation guide provides a sense of the three-dimensional orientation of the user's face even though face image 939 is two-dimensional. In this case, orientation guide 942 assists the user in the face enrollment process by making rotations and/or tilts of the user's head relative to device 900 more visually apparent. Face enrollment interface 938 also includes text prompt 944, which optionally instructs the user to begin tilting their head, for instance, in a circle to perform enrollment.

Figure 9S:
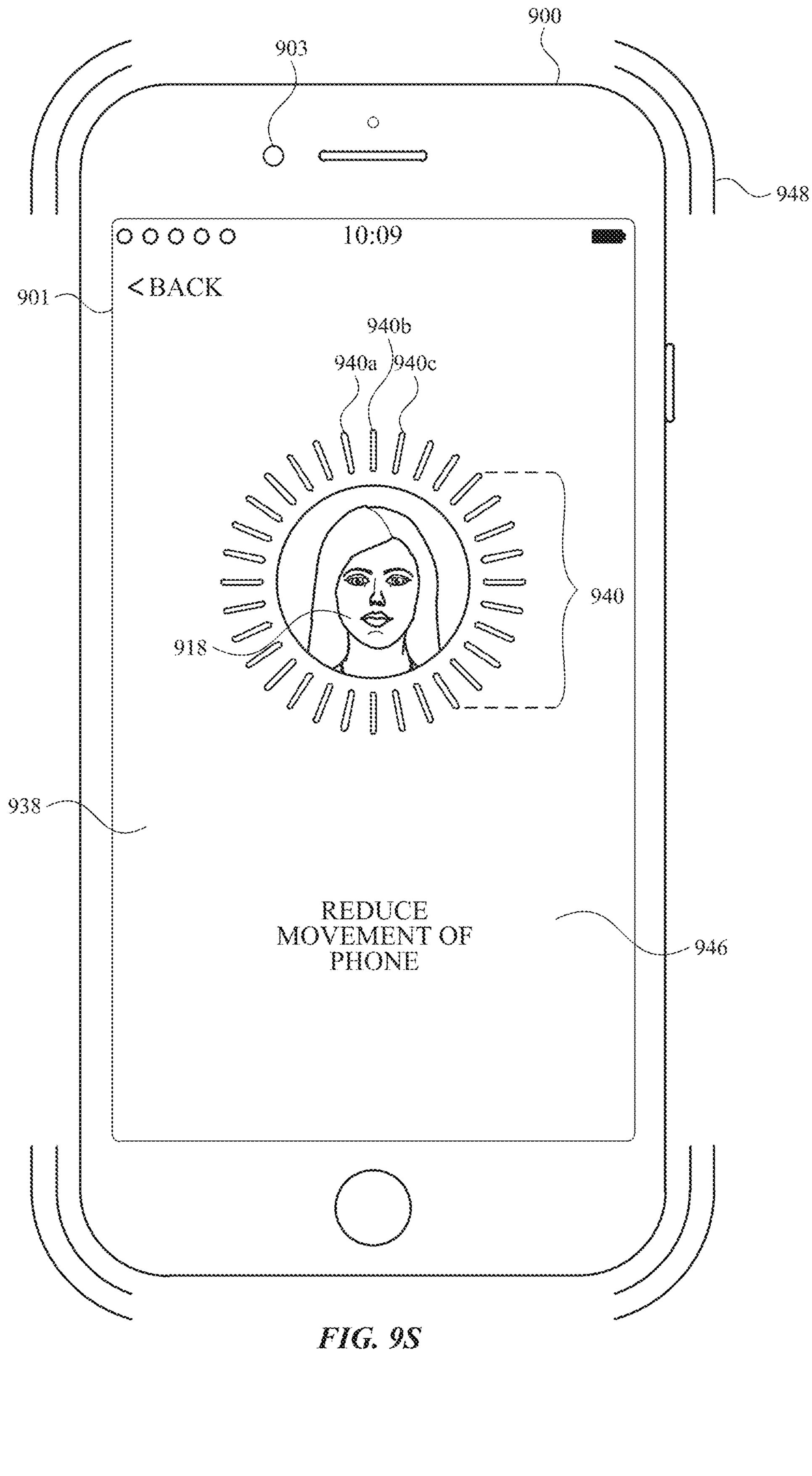

Generally, the quality of enrollment is decreased if device 900 moves too much relative to the user's face once the enrollment process is initiated (e.g., the device should remain still while the user moves slowly rotates/tilts his or her face). In the example of FIG. 9S, device 900 detects excess movement of its one or more cameras with respect to the user's face. This excess movement is, optionally, a significant change in orientation and/or position of the user's face relative to device 900 consistent with movement of the device itself, and that prevents reliable alignment and/or enrollment. In response, device 900 issues visual prompt 946 on enrollment interface 938 instructing the user to reduce movement of the device (e.g., prompting the user to hold the device still during the enrollment process). Device 900 optionally also concurrently generates visual and/or auditory output 948. In some examples, movement of the device itself is measured by accelerometer 168 rather than biometric sensor 903. Movement of the device is optionally also measured by a magnetometer, inertial measurement unit, or the like, of device 900.

Figure 9T:
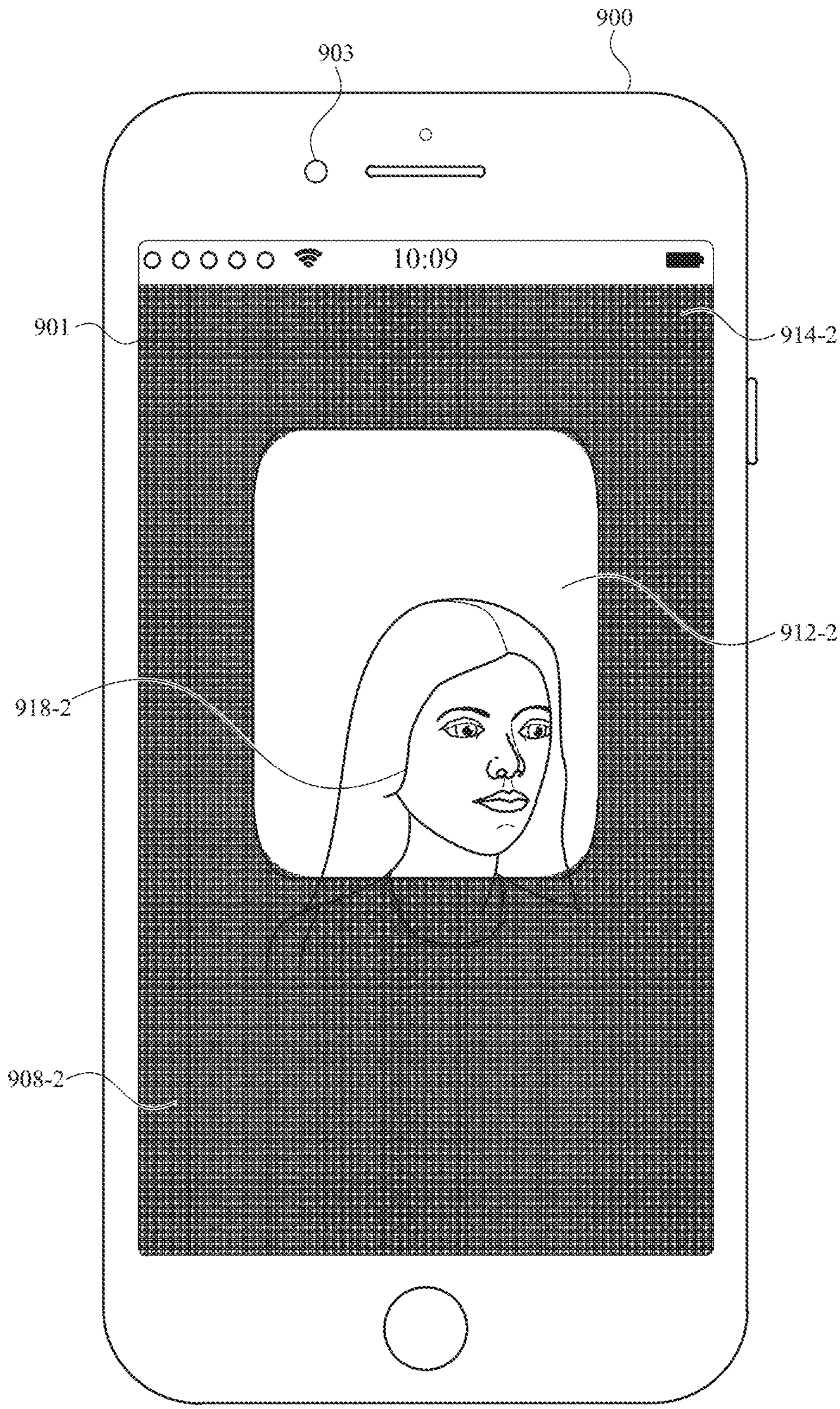
Figure 9U:
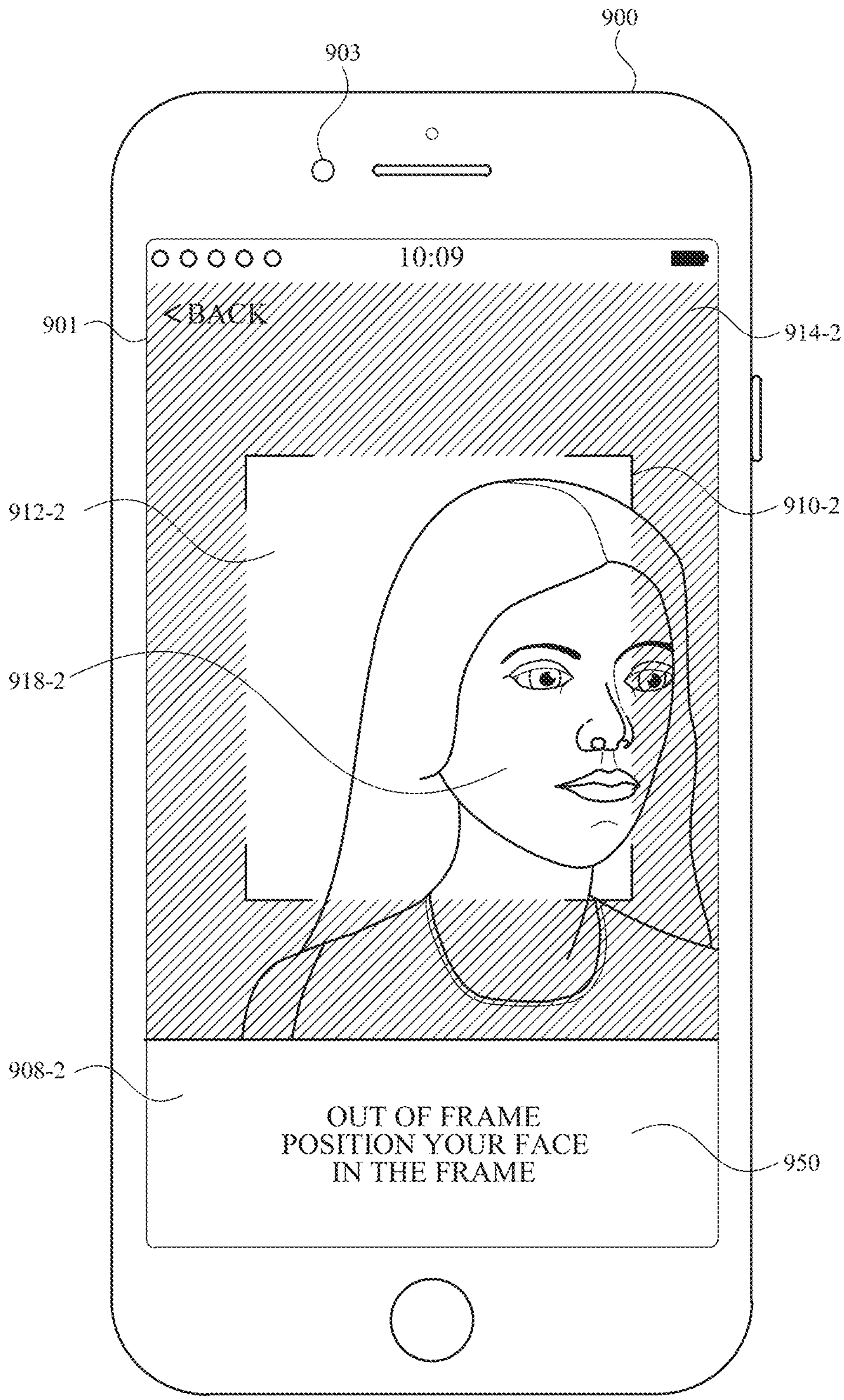

Successful enrollment typically requires that alignment of the user's face relative to the cameras on device 900 be maintained throughout the enrollment process. Thus, in some examples, device 900 optionally exits the face enrollment process if one more alignment errors are detected during enrollment. In some examples, if, during the enrollment process, the device 900 detects one or more alignment errors, the electronic device exits the enrollment process (e.g., ceases to display face enrollment interface 938), and initiates (e.g., transitions to) an alignment process in which, optionally, the device displays alignment interface 908-2. In the examples of FIGS. 9T-9U, alignment interface 908-2 and its components optionally has similar or identical visual characteristics as the initial alignment interface 908 described above with respect to FIGS. 9B-9O. In the example of FIG. 9T-U, device 900 has determined that the face of the user is out of the frame, and as a result, the device 900 displays user facial image 918-2 within inner display portion 912-2, out of position compared to the successful alignment depicted in FIG. 9O. In some examples, the device outputs an indication of the alignment error such as text prompt 950, which indicates that user facial image 918-2 is not properly aligned within positioning element 910. This example is merely illustrative. In some examples, the alignment error is, optionally, a failure to meet any of the other alignment criteria discussed above (e.g., distance from the device, angle of orientation, adverse lighting etc.). In such cases, text prompt 950 instruct the user move the device and/or their face into the acceptable range of distances, or correct the angle of orientation. In other some examples, the alignment error is, optionally, different from the criteria above such that a small change in alignment will not cause the device to exit the face enrollment process. In response to detecting the one or more alignment errors, the device visually de-emphasizes inner display portion 912-2 by revealing the portion of the image preview displayed in outer display portion 914-2 and displaying positioning element 910-2 as shown in FIG. 9U. For example, device 900 lightens or unblurs the preview image in the outer display portion 914-2 to assist the user in re-aligning their face relative to biometric sensor 903. In the example of FIG. 9U, de-emphasizing inner display portion 912-2 reveals that a substantial portion of user facial image 918-2 is positioned outside of the positioning element 910-2 in outer display portion 914-2.

In some examples, device 900 again detects that the user's face is properly aligned with biometric sensor 903. In response, device 900 outputs audio output 934-2 and/or tactile output 936-2 indicating successful alignment. In some examples, audio output 934-2 and tactile output 934-6 have similar characteristics as audio output 934 and tactile output 936, respectively, as described with reference to FIG. 9O. In some examples, device 900 then resumes the enrollment process. For example, device 900 emphasizes inner portion 912-2 and facial image 918-2 in the manner discussed above with respect to inner display portion 912 and facial image 918-2 in FIGS. 9P-9O. In some examples, device 900 resumes the enrollment process at the point in which the electronic device detected the alignment error (e.g., face enrollment interface 938 is displayed a second time with enrollment progress meter 940 advanced to the same state as when the alignment error was detected).

Figure 9V:
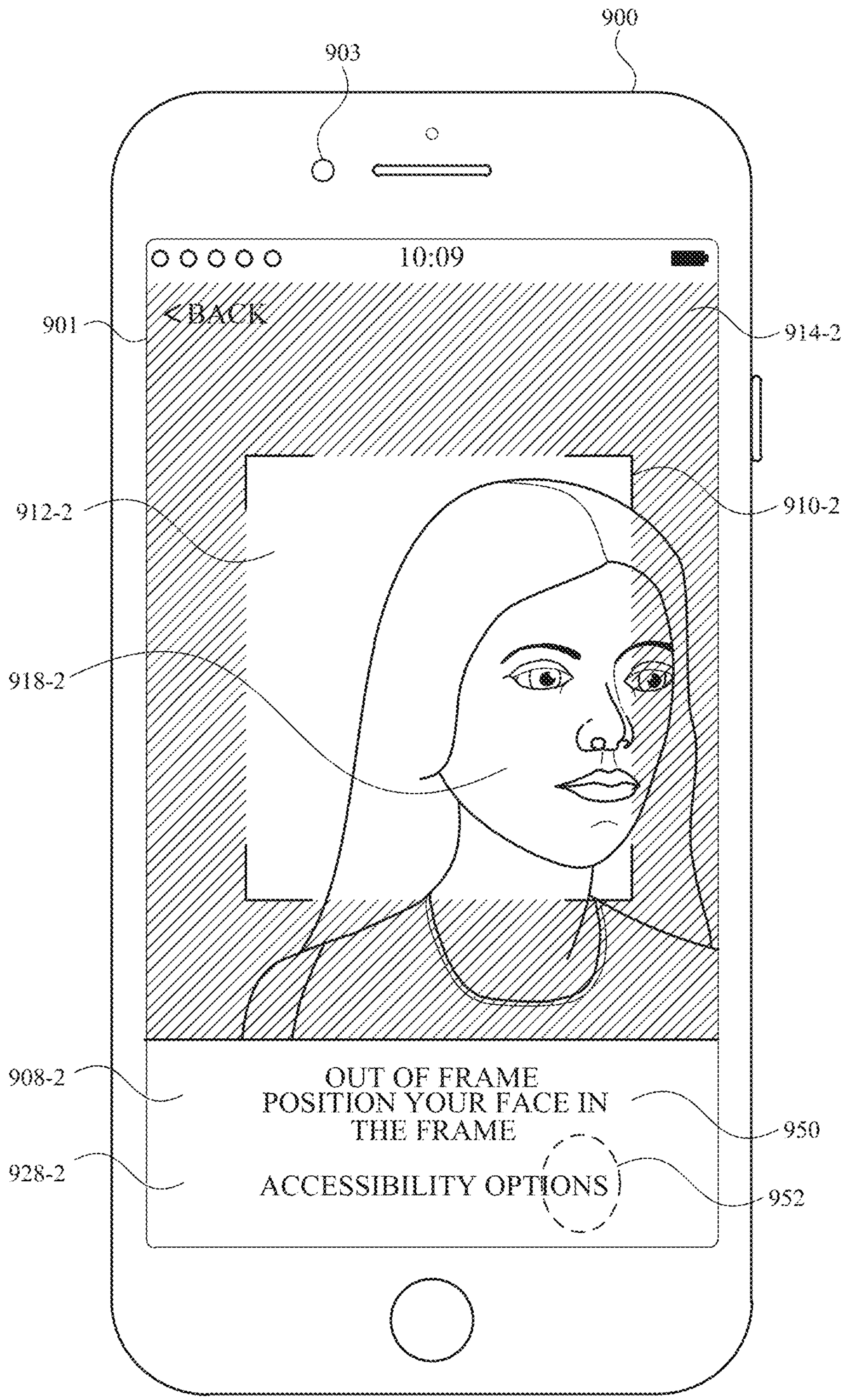

In some examples, if the device does not detect that proper alignment has been established (e.g., reestablished) within a predetermined time period, device 900 displays accessibility options affordance 928-2, as shown in FIG. 9V. In some examples, accessibility options provide an option to proceed with the enrollment process without all alignment conditions met, as described below. In some examples, the accessibility options provide an option to set up biometric (e.g., face) authentication with only partial enrollment (e.g., a scan of only a portion of the user's face).

Figure 9W:
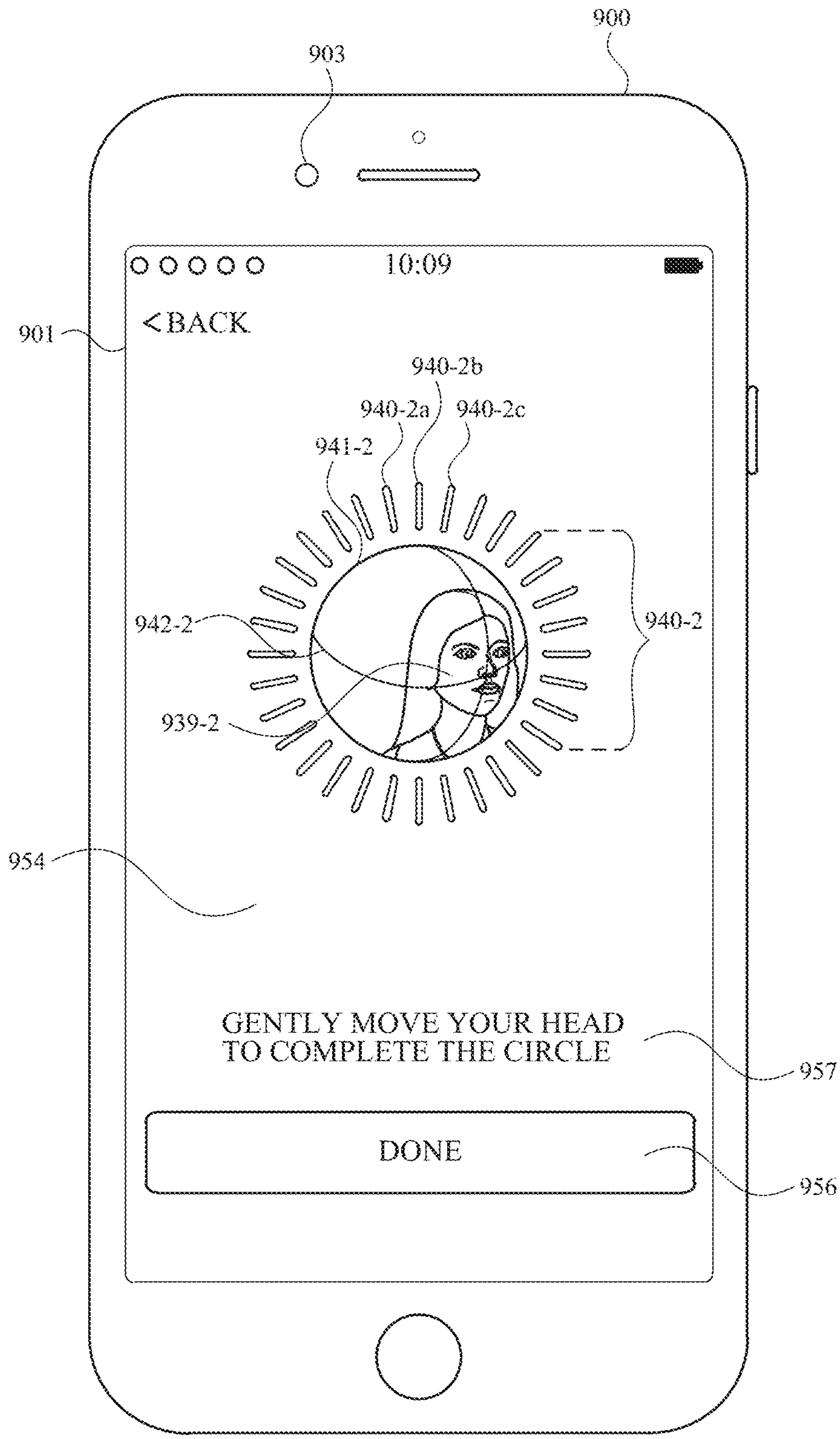

In response to detecting activation (e.g., selection) of accessibility options button 928-2 (e.g., by tap gesture 952), the device displays accessibility enrollment interface 954, illustrated in FIG. 9W. One or more features of accessibility enrollment interface 954 has similar or identical visual characteristics to corresponding features of enrollment interface 938. For example, in FIG. 9W, face enrollment interface 954 includes user facial image 939-2 displayed within positioning element 941-2. In some examples, user facial image 939-2 is a live preview of image data captured by biometric sensor 903-2. Accessibility enrollment interface 954 also optionally includes enrollment progress meter 940-2 that surrounds user facial image 939-2 and positioning element 941-2. As described above in connection with FIG. 7S and FIGS. 11A-11H, enrollment progress meter 940-2 is composed of a set of progress elements (e.g., 940-2*a*, 940-2*b*, and 940-2*c*) that extend radially outward from user facial image 939-2 and, in some examples, enclose it in a circular pattern. Accessibility enrollment interface 954 optionally includes orientation guide 942-2, In some examples, the orientation guide includes a set of curved lines (e.g., crosshairs) that appear to extend out of the plane of display 901 in a virtual z-dimension, intersecting over the center of user facial image 939-2. Like face enrollment interface 938, accessibility interface 954 optionally includes a text prompt (e.g., prompt 956) that provides written instructions for successfully completing the enrollment process. In some examples, accessibility enrollment interface 954 also includes completion affordance 956, activation of which allows the user to exit the enrollment process and proceed to set up face authentication using only a partial scan of their facial features. In some examples, partial scans are, in some circumstances, helpful for a user having a condition that prohibits the user from tilting his or her head in all directions otherwise required for enrollment.

Figure 9X:
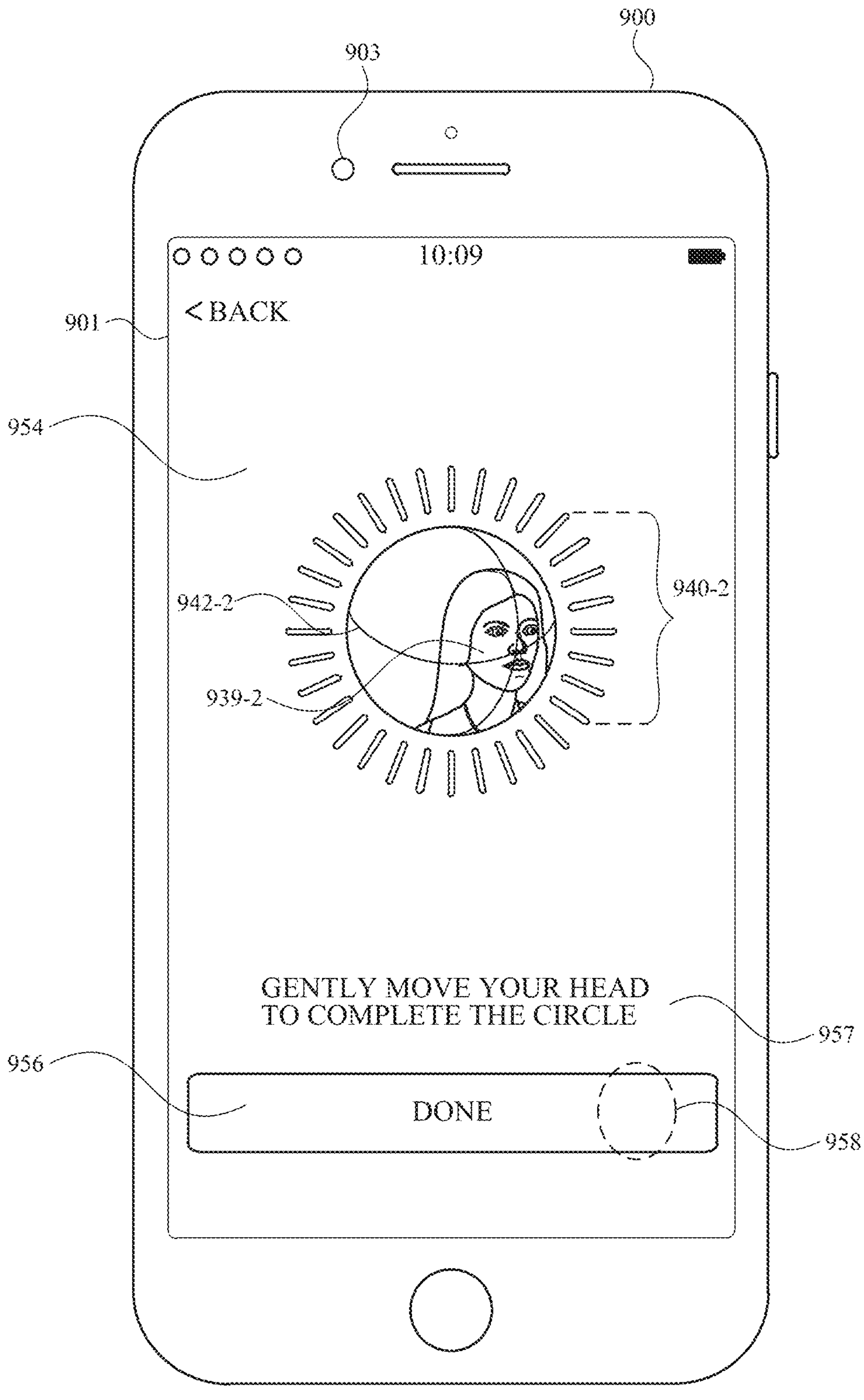
Figure 9Y:
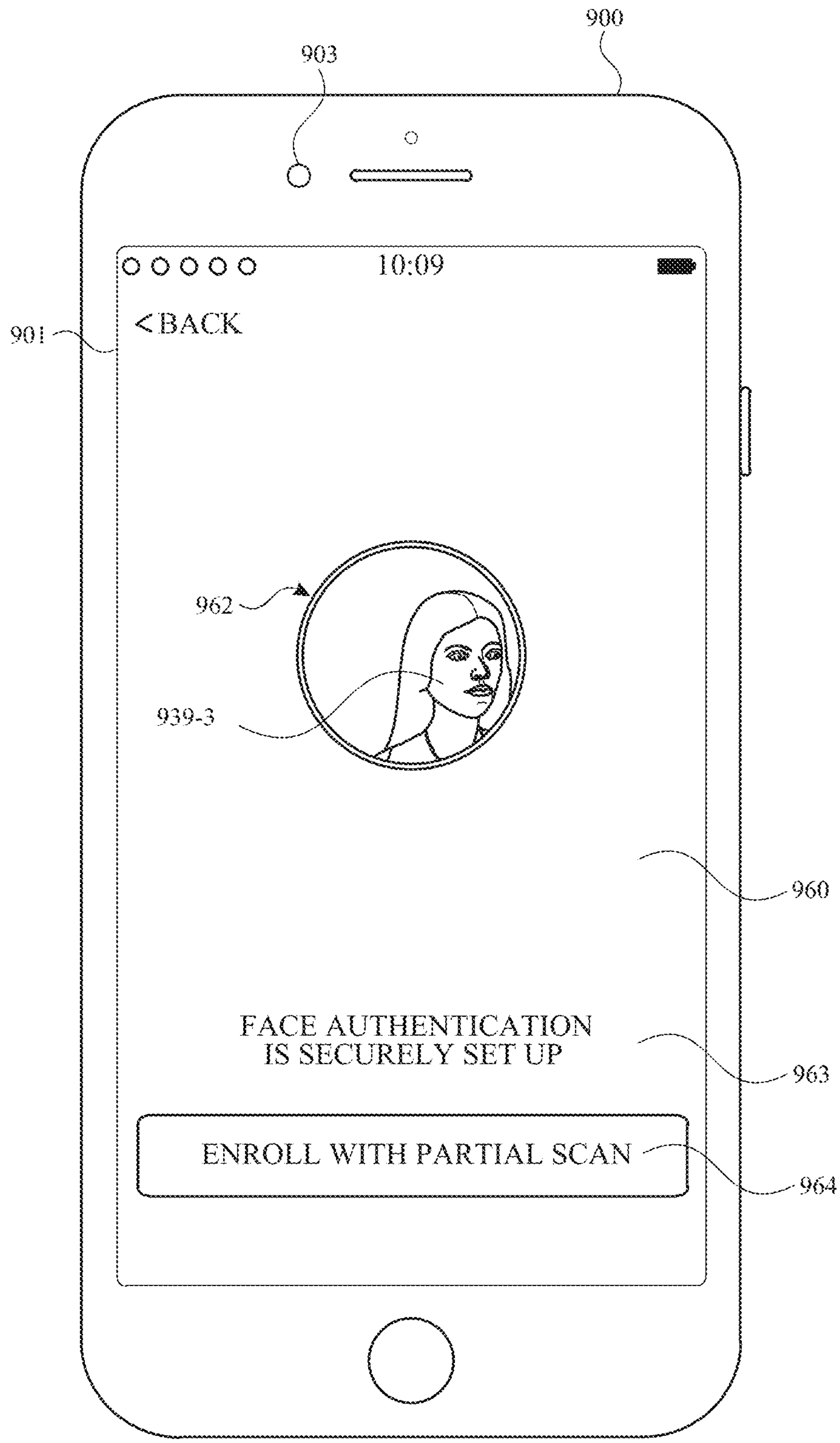

In response to activation (e.g., selection) of completion affordance 956 (e.g., by a user input 958 shown in FIG. 9X), the device displays face enrollment confirmation interface 960, illustrated in FIG. 9Y. Face enrollment confirmation interface includes facial image 939-3, which, in the example of FIG. 9Y, has similar visual characteristics to user facial image 939-2. Facial image 939-3 is, optionally, surrounded by enrollment progress meter 962, which is displayed in the successful authentication state described above in connection with FIGS. 7P and 7Q. Face enrollment confirmation interface also includes partial scan enrollment affordance 964, which allows the user to enroll the gathered facial data for use in device authentication. Face enrollment confirmation interface 960 also includes a back affordance 966, which allows the user to navigate back to accessibility enrollment interface 954.

Figure 9Z:
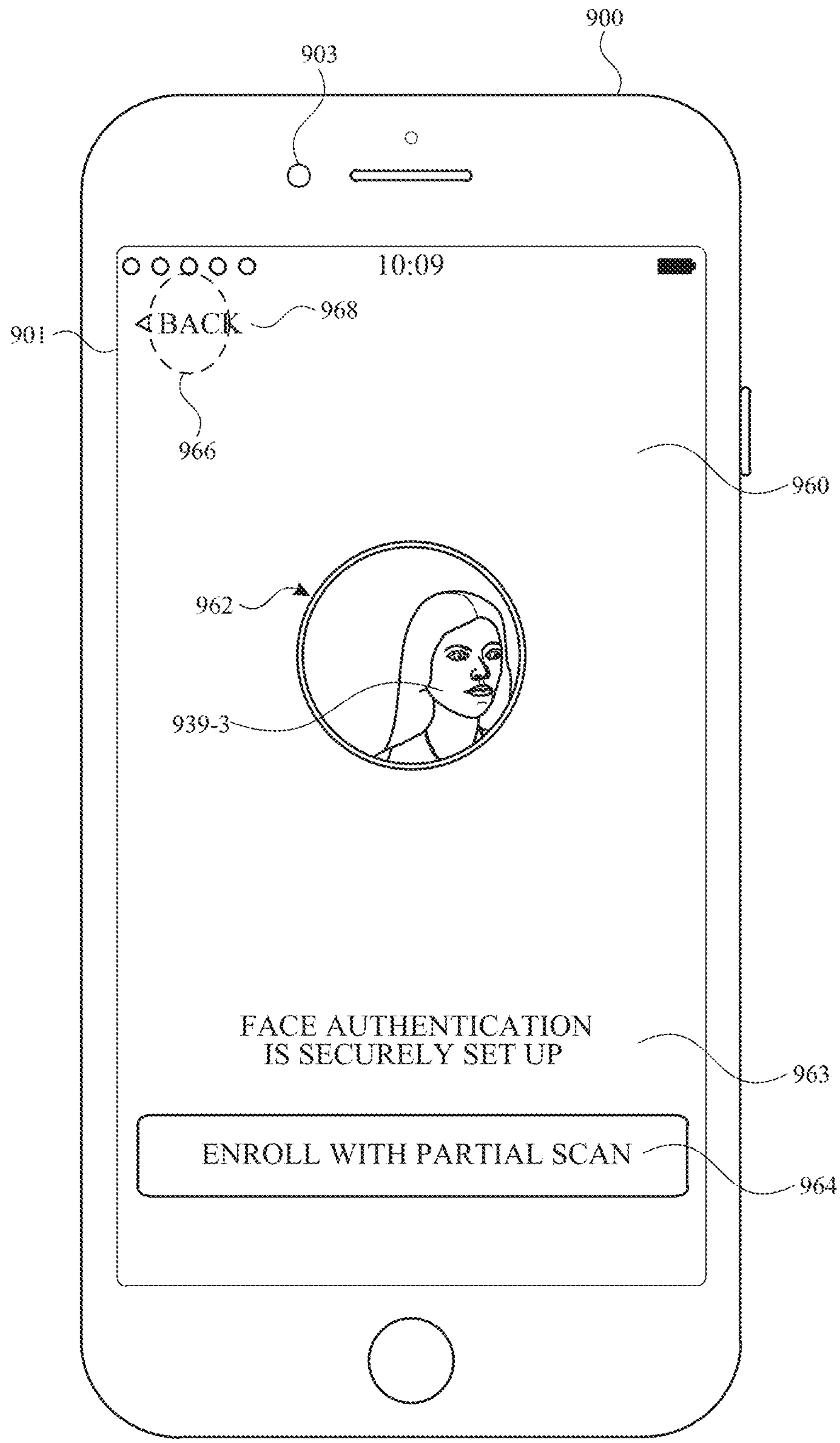
Figure 9A:
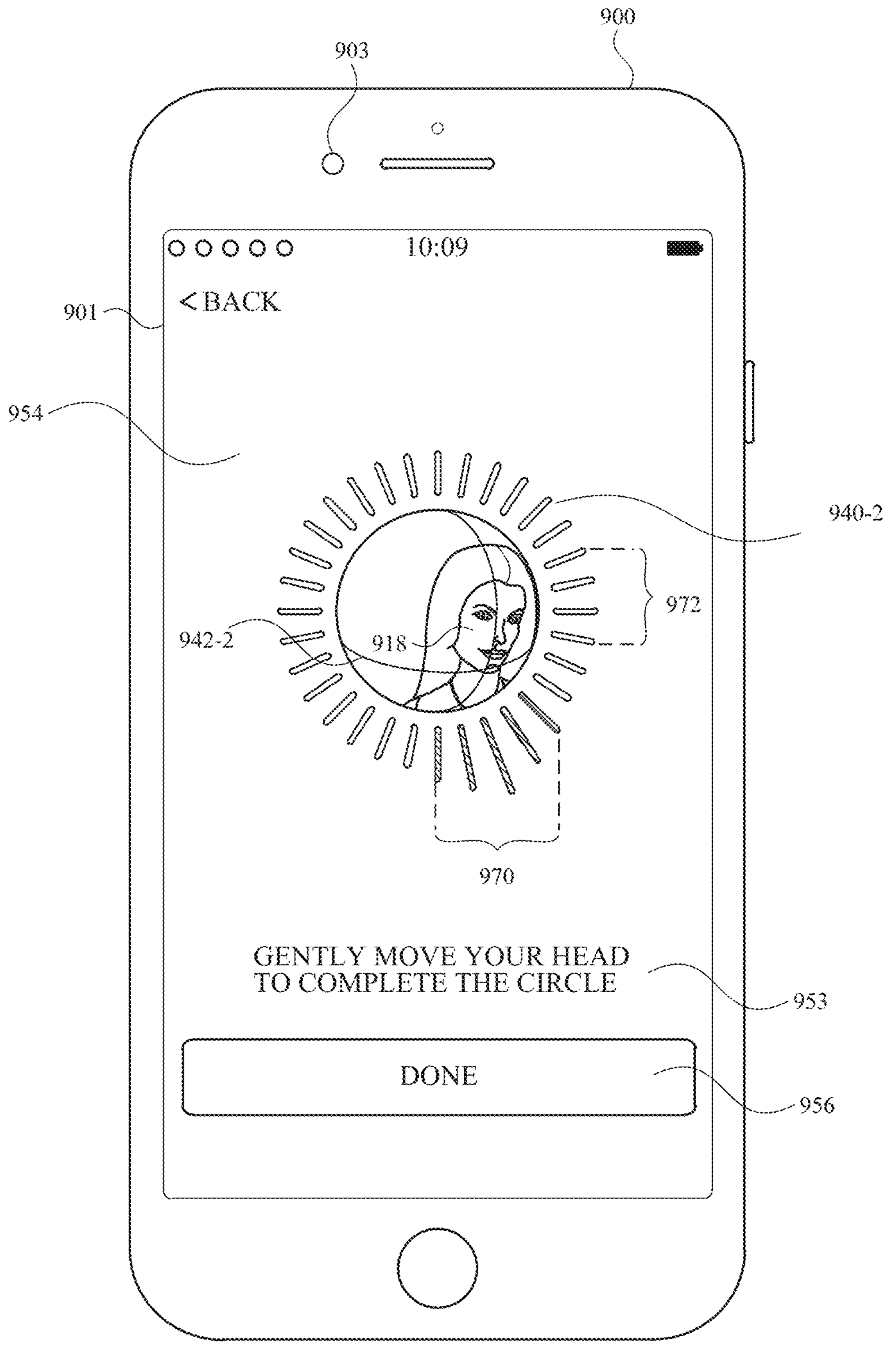
Figure 9A:
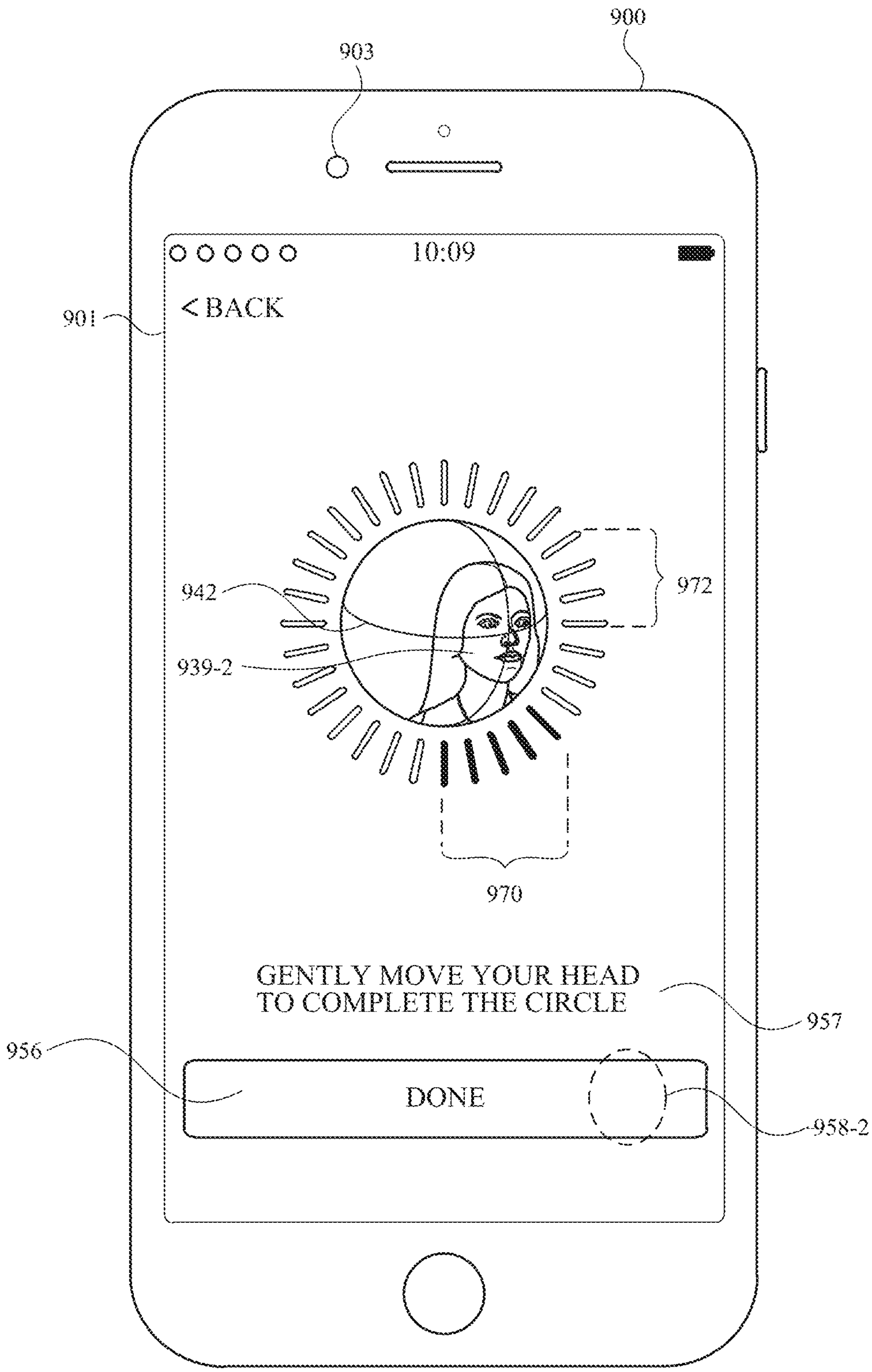
Figure 9A:
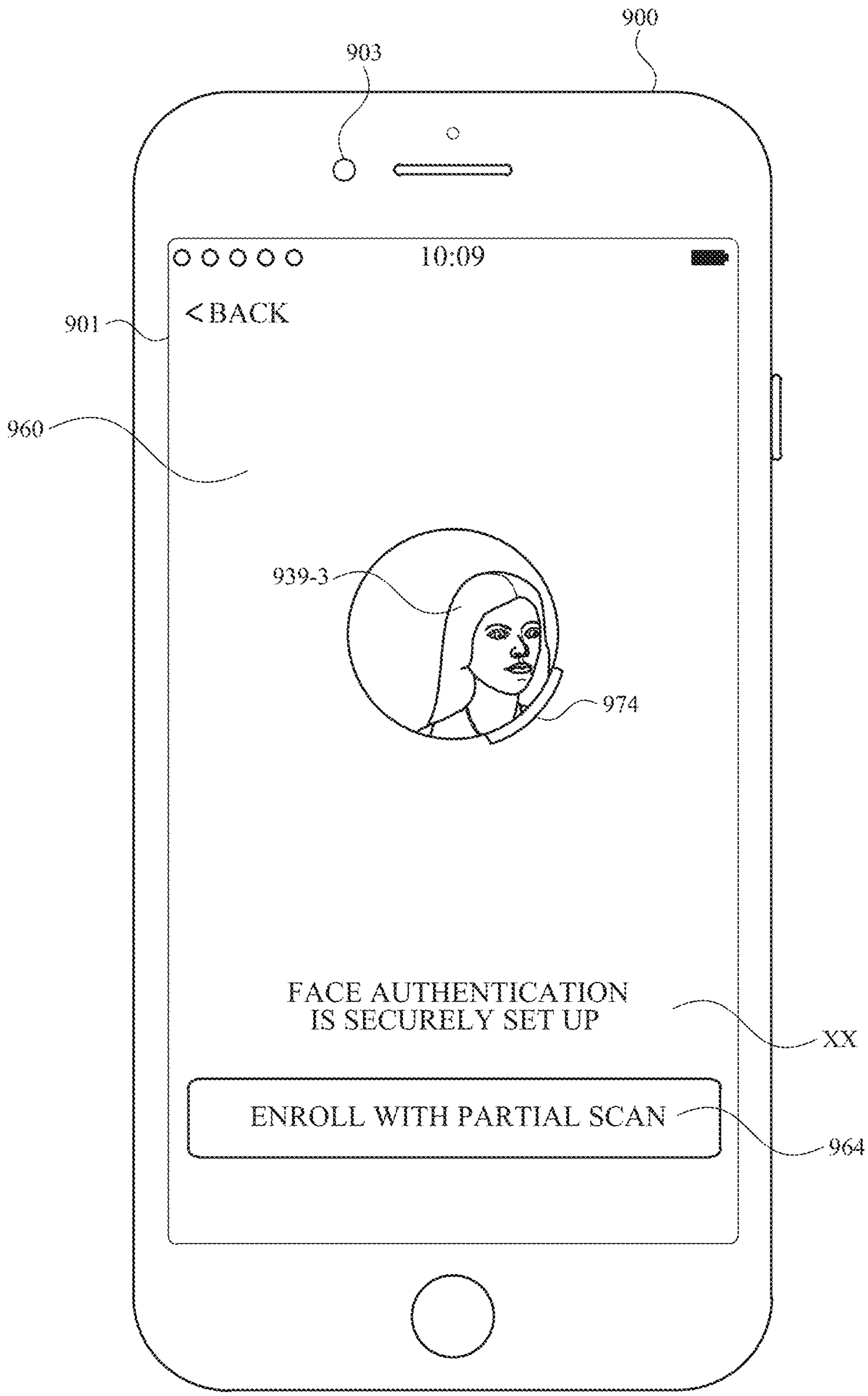
Figure 9A:
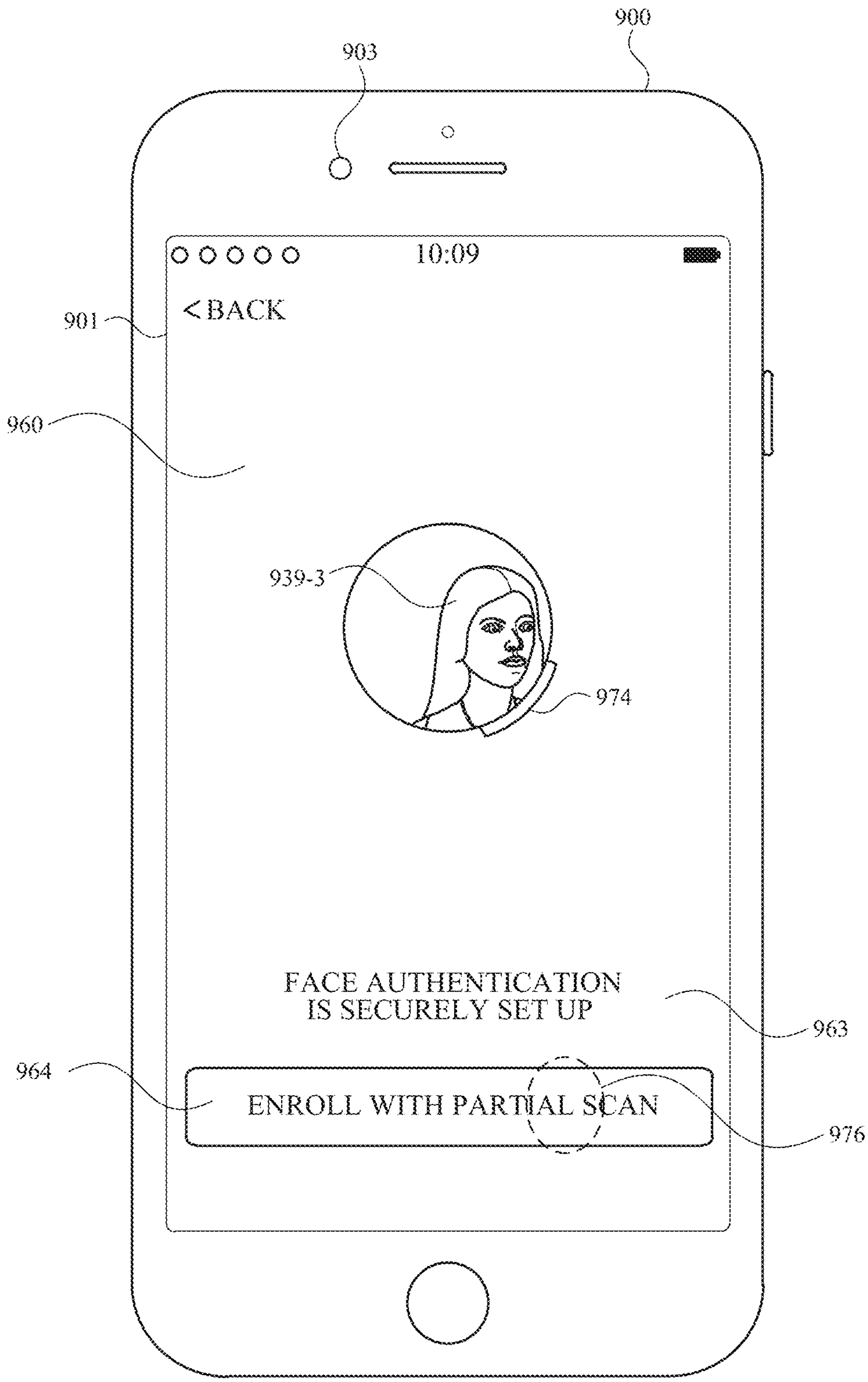
Figure 9A:
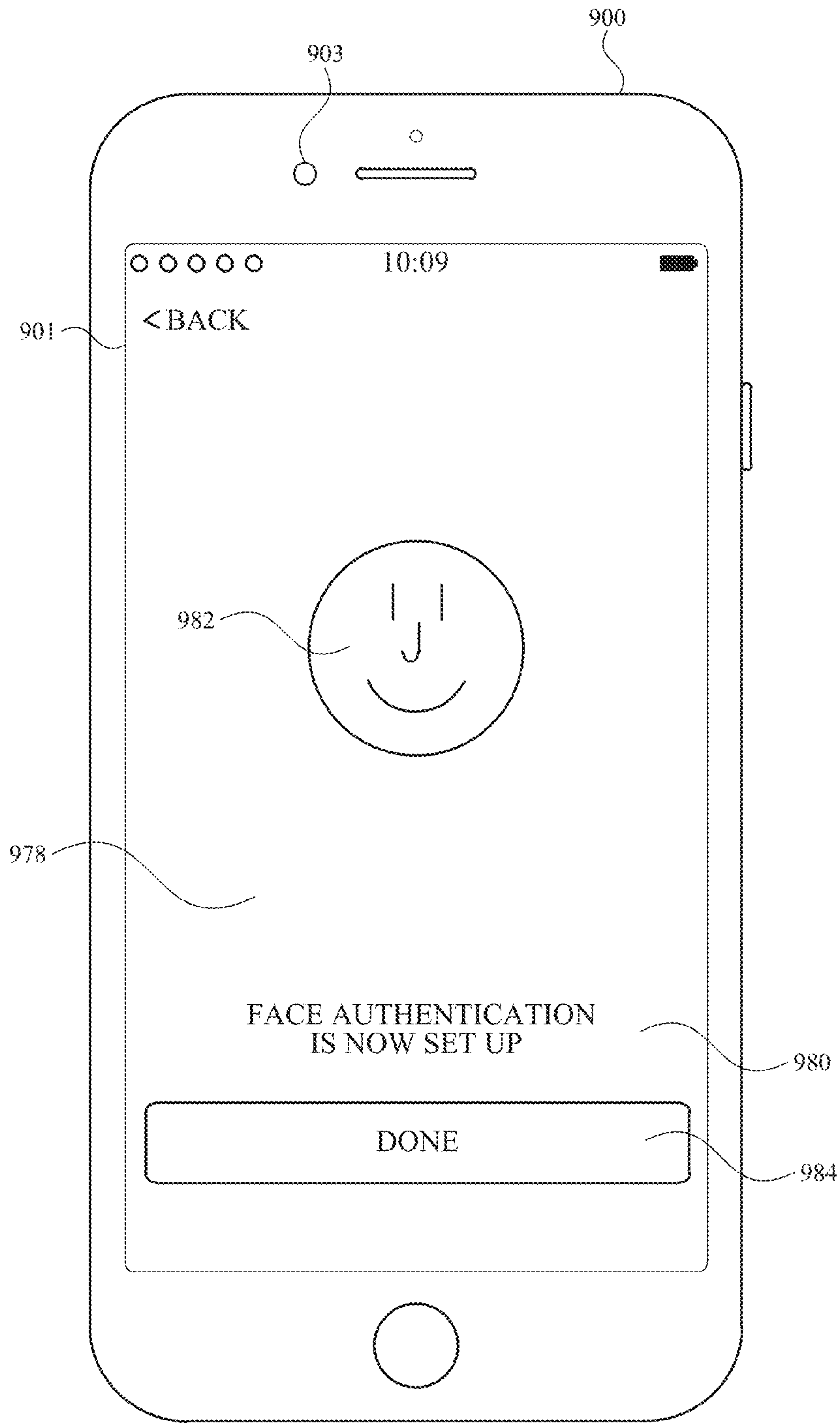
Figure 10A:
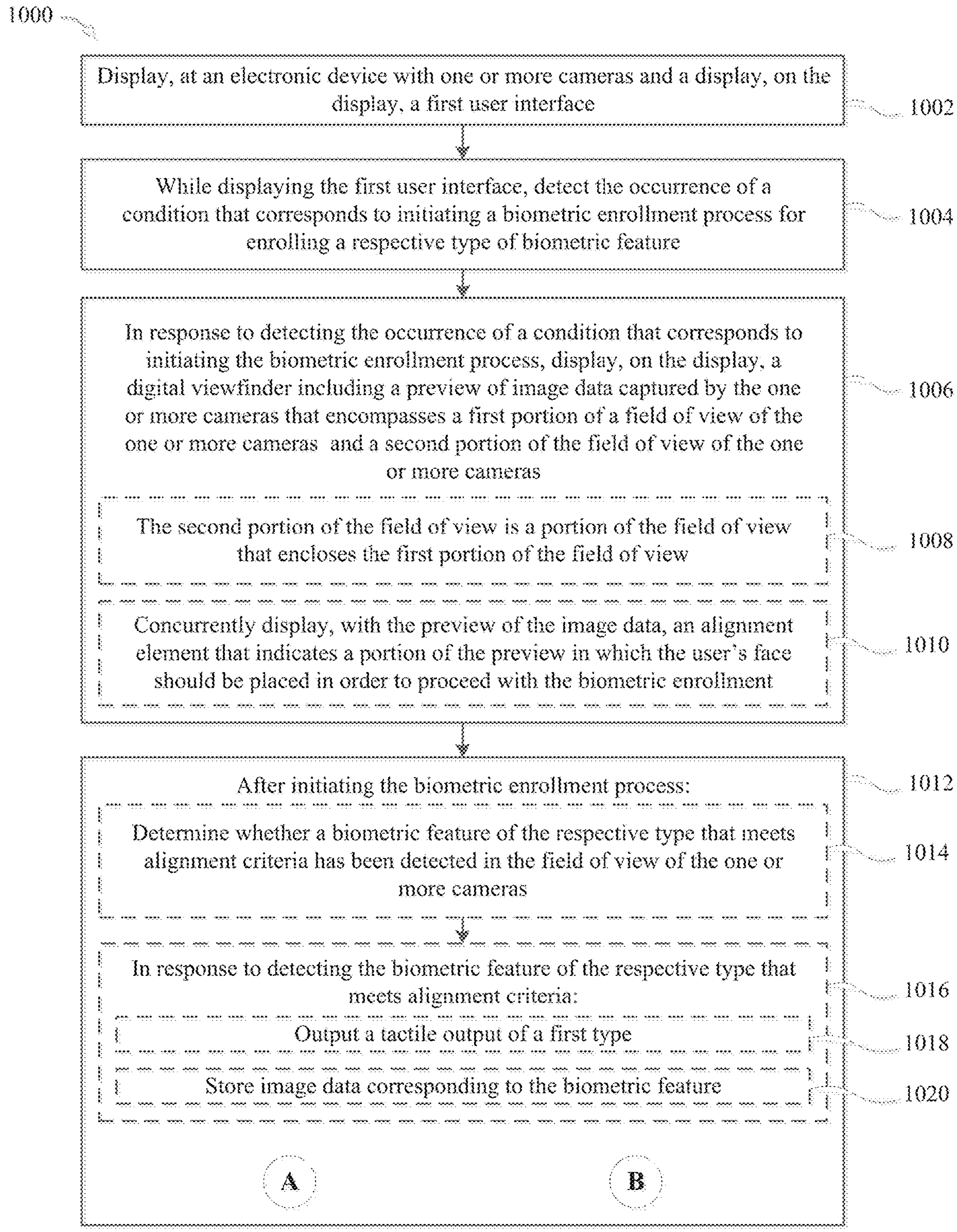
Figure 10B:
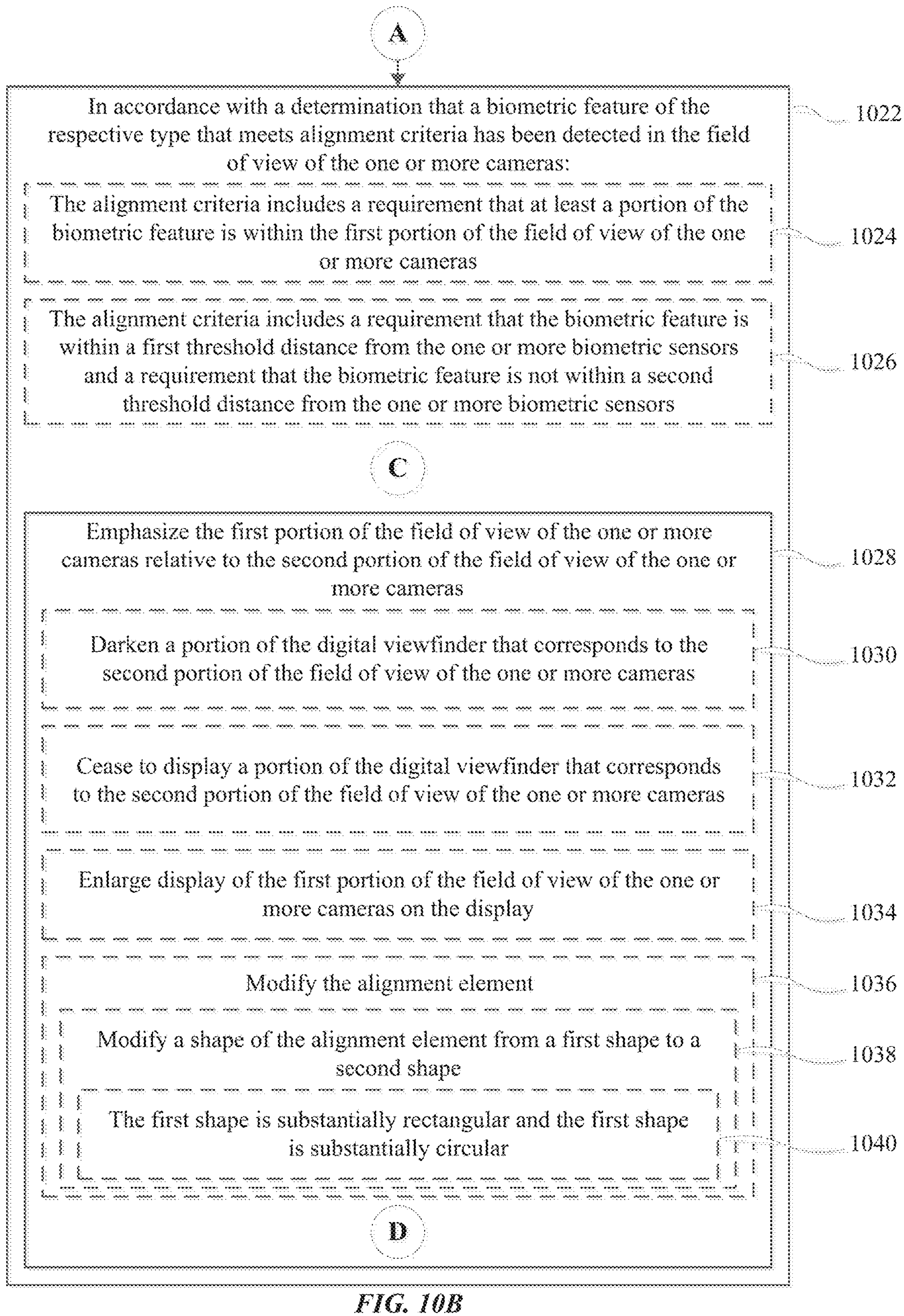
Figure 10C:
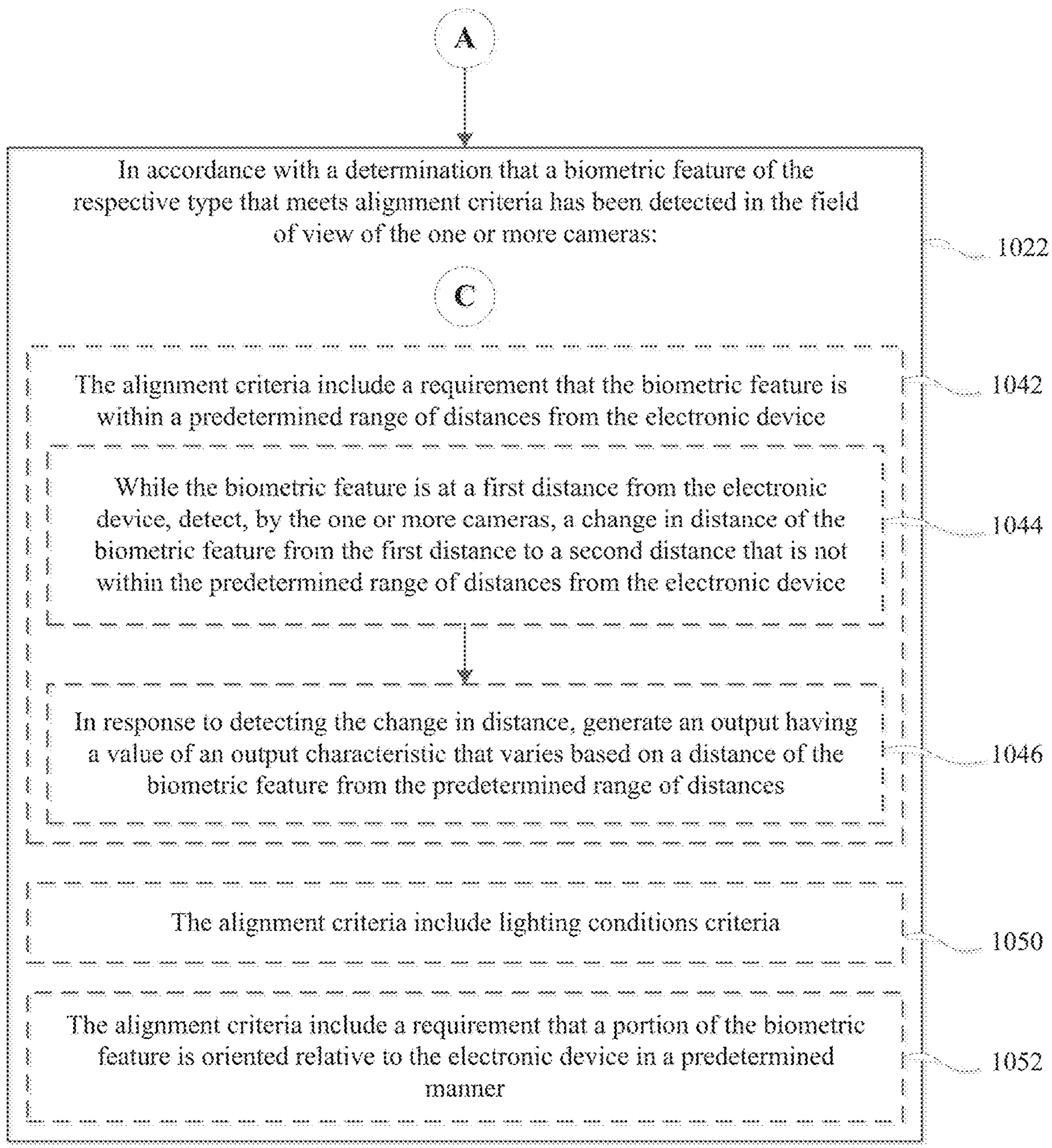
Figure 10E:
Figure 10F:
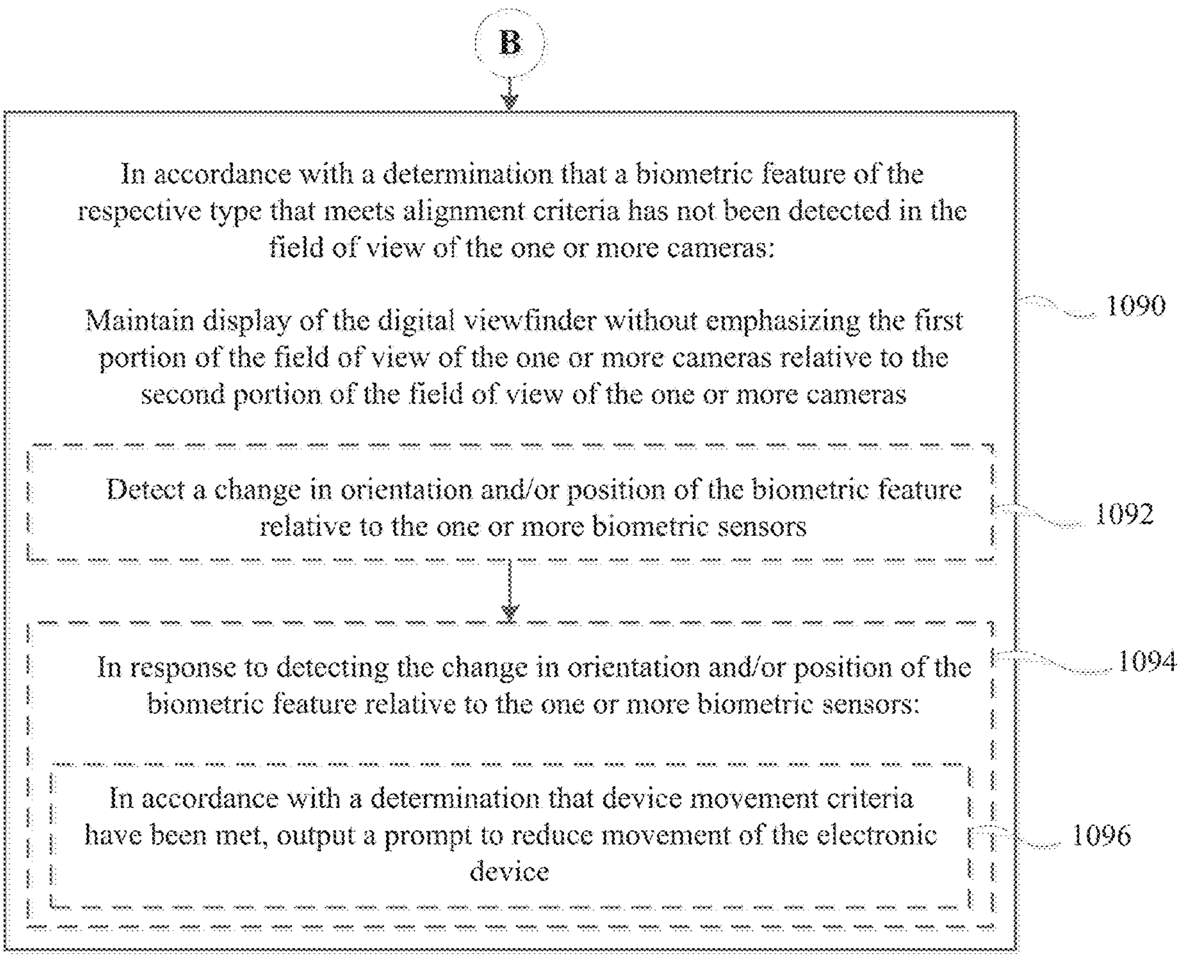

As illustrated in FIG. 9Z, the device detects a user input 968 corresponding to activation (e.g., selection) of back affordance 966. In response to detecting the user input, device 900 displays (e.g., for a second time) accessibility enrollment interface 954. While displaying accessibility enrollment interface 954, device 900 detects movement (e.g., rotation and/or tilting) of the user's face relative to biometric sensor 903. In the case of FIG. 9AA, device 900 detects that the user's face has tilted in a particular direction (e.g., downwards and/or to the right towards meter portion 970). As described below in further detail with respect to FIGS. 11B-11H, device 900 updates user facial image 939-2 based on the detected movement, and updates the position of orientation guide 942-2 to indicate that the user's head has tilted and/or rotated in three-dimensional space. In response to detecting movement of the user's face, device 900 captures image data of a portion of the user's face (e.g., the left side of the face) and concurrently changes the appearance of a corresponding portion (e.g., meter portion 970) of enrollment progress meter 940-2. In some examples, device 900 elongates and or changes color of one or more progress elements in meter portion 970 to indicate that the portion of the user's face is currently being enrolled (as described in more detail with respect to FIGS. 7I-7K and 11B-11H). In some examples, device 900 maintains the display (e.g., does not change the appearance) of meter portion 972, since meter portion 972 corresponds to a facial orientation that has not yet been enrolled.

As illustrated in FIG. 9AB, in some examples, device 900 detects a change in orientation of the user's face relative to its one or more cameras (e.g., the user's face has tilted upwards) and updates user facial image 939-2 and orientation guide 942-2 accordingly. By way of example, because image data at the facial orientation corresponding to meter portion 972 has been successfully enrolled, device 900 transitions the state of the progress elements in meter portion 972 to an "enrolled" state as described in more detail below with respect to FIGS. 11B-I (e.g., by shading or changing the color and/or line width of the progress elements). As shown in FIG. 9AB, device 900 again detects activation (e.g., selection) of done affordance 956 (e.g., by user input 958-2).

In response to detecting activation of completion affordance 956, device 900 returns to displaying face enrollment confirmation interface 960 as shown in FIG. 9AC. Since a portion of the user's face has been successfully enrolled, device 900 displays enrollment success indicator 974, for instance, proximate to the user facial image 939-3. In the example of FIG. 9AC, enrollment success indicator 974 indicates orientations of the user's face that have been successfully enrolled. In some examples, the enrollment success indicator 974 is a circular bar. Accordingly, in some examples, enrollment success indicator 974 indicates (e.g., is located at) positions where enrollment progress meter transitioned to the success state during enrollment.

In some examples, because accessibility enrollment interface 960 allows the user to set up face authentication with only a partial enrollment of their facial features, partial scan enrollment affordance 964 is selectable. As shown in FIG. 9AD, device 900 detects activation (e.g., selection) of partial scan enrollment affordance 964 (e.g., by user input 976). In response to detecting activation of partial scan enrollment affordance 964, device 900 displays enrollment-complete interface 978, illustrated in FIG. 9AE Enrollment completion interface 978 includes text prompt 980, indicating to the user that the enrollment process is complete and face authentication has been securely set-up. Enrollment-complete interface 978 include optionally a generic face graphic 982 at a location that was previous occupied by user facial image 939-3. In some examples, enrollment complete interface 978 also includes a done affordance, activation of which causes the electronic device to exit face authentication set-up.

FIG. 10 is a flow diagram illustrating a method for aligning a biometric feature on the display of an electronic device in accordance with some examples. Method 1000 is performed at a device (e.g., 100, 300, 500, 900) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric features by the one or more biometric sensors. Some operations in method 2000 are, optionally, combined, the orders of some operations are, optionally, changed, and some operations are, optionally, omitted.

As described below, method 1000 provides an intuitive way for aligning a biometric feature on the display of an electronic device. The method reduces the cognitive burden on a user for enrolling a biometric feature on the device, thereby creating a more efficient human-machine interface. For battery-operated computing devices, enabling a user to enroll a biometric feature faster and more efficiently conserves power and increases the time between battery charges.

The device displays (1002), on the display, a first user interface (e.g., 905). For example, the first user interface is, optionally, the enrollment introduction user interface as described above with respect to method 800.

While displaying the first user interface, the device detects (1004) the occurrence of a condition that corresponds to initiating a biometric enrollment process for enrolling a respective type of biometric feature (e.g., 917). For example, the occurrence of a condition is, optionally, an input (e.g., 906 on start affordance 904) that corresponds to a request to "start enrollment."

In response to detecting the occurrence of a condition that corresponds to initiating the biometric enrollment process (e.g., user input selecting initiation of enrollment), the device displays (1006), on the display, a digital viewfinder (e.g., display portions 912 and 914) including a preview of image data (e.g., user facial image 918) captured by the one or more cameras (e.g., 903). In some examples, the preview of image data encompasses a first portion of a field of view of the one or more cameras (e.g., outer portion of field of view 914) and a second portion of the field of view of the one or more cameras (e.g., inner portion of field of view 912). In some examples, the second portion of the field of view (e.g., 914) is (1008) a portion of the field of view that encloses (or partially encloses) the first portion of the field of view (e.g., 912). In some examples, the inner portion of the field of view is, optionally, divided from outer portion by an alignment element (e.g., positioning element 910). In some examples, the preview of image data optionally changes over time as the content in the field of view of the one or more cameras (e.g., 903) changes. Displaying a preview of the image captured by the biometric sensors provides the user with feedback about the position and orientation of his or her biometric features relative to the biometric sensors of the device, enabling the user to properly align his or her biometric features with the sensors more quickly and efficiently. Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device concurrently displays (1010), with the preview of image data, an alignment element (e.g., positioning element 910) that indicates a portion of the preview (e.g., 912) in which the user's face (e.g., 918) should be placed in order to proceed with the biometric enrollment. For example, the alignment element is, optionally, a framing circle or framing brackets that are displayed in a central portion of the preview image (e.g., 912) to prompt the user to move the device or their face into alignment with the central portion of the preview image.

Displaying an alignment element that frames a particular portion of the digital viewfinder provides the user with feedback about the position of his or her biometric features relative to a portion of the biometric sensor's field of view corresponding to proper alignment of the biometric feature. This in turn enables the user to properly position his or her biometric features relative to the sensors more quickly and efficiently. Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently In some examples, after initiating the biometric enrollment process (1012), the device determines (1014) whether a biometric feature of the respective type (e.g., 917) that meets alignment criteria has been detected in the field of view of the one or more cameras (e.g., 903). Determining whether the user's biometric features are properly aligned with the biometric sensors improves the quality of subsequent biometric enrollment (e.g., according to methods 1200 and/or 1400) by ensuring that image data corresponding to particular portions and/or orientations of the biometric feature are captured during enrollment. This in turn improves the ability of the device to match a user's biometric feature with the captured data during biometric authentication at the device. Performing an optimized operation when a set of conditions has been met without requiring further user input user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, in response (1016) to detecting the biometric feature of the respective type (e.g., 917) that meets alignment criteria, the device outputs (1018) a tactile output of a first type (e.g., 934, 936, 934-2, 936-2, e.g., the tactile output is an output corresponding to successful alignment). Issuing a tactile output upon detecting that the biometric feature is properly aligned with the biometric sensors provides the user with feedback indicating successful alignment, which prompts the user to maintain the biometric feature in that alignment throughout a subsequent biometric enrollment process (e.g., methods 1200 and/or 1400). Providing improved tactile feedback to the user enhances the operability of the device and makes the user-device interface more efficient (e.g., by helping the user to provide proper inputs during biometric enrollment and reducing user mistakes when operating/interacting with the device), which, additionally, reduces power usage and improves battery life of the device by enabling the user to use the device more quickly and efficiently.

In some examples, in response (1016) to detecting the biometric feature of the respective type that meets alignment criteria, the device stores (1020) image data corresponding to the biometric feature (e.g., 917). In some examples, on successful alignment, the device captures data associated with the biometric feature. Storing biometric (e.g., image) data in response to detecting successful alignment of the biometric feature allows the device to automatically capture data that be referenced during a subsequent biometric authorization attempt. Performing an optimized operation when a set of conditions has been met without requiring further user input user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the alignment criteria includes (1024) a requirement that at least a portion of the biometric feature (e.g., 917) is within the first portion of the field of view (e.g., inner display portion 912, 912-2) of the one or more cameras. For example, in some examples, the electronic device determines whether the image data includes data corresponding to the biometric feature that satisfies the alignment criteria. In some examples, the alignment criteria include (1050) lighting conditions criteria. In some examples, alignment criteria require that lighting conditions of the electronic device are adequate for capturing image data during biometric feature enrollment, including a requirement that at least a first threshold amount of light is detected and/or that no more than a second threshold amount of light is detected (e.g., by 903).

In some examples, the alignment criteria include (1052) a requirement that a portion of the biometric feature (e.g., a portion of 917) is oriented relative to the electronic device in a predetermined manner. In examples where the biometric feature is a face of a user, the alignment criteria optionally includes a requirement that the user gaze is directed toward at least one of the one or more cameras (e.g., 903) of the electronic device or the display (e.g., 901) of the electronic device. In some examples, the requirement that a portion of the biometric feature (e.g., a portion of user facial image 918) is oriented relative to the electronic device in a predetermined manner is a requirement that the biometric feature (e.g., 917) is positioned within a threshold angle (e.g., angle of elevation) relative to the one or more biometric sensors (e.g., 903). In some examples, the alignment criteria require that the biometric feature (e.g., 917) is positioned relative to the biometric sensors (e.g., 903) in a predetermined manner such that the biometric sensors can capture biometric data corresponding to the biometric feature at a particular angle, or within a range of angles. In some examples, the device blurs the display of the electronic device (e.g., display portions 912 and/or 914), for instance, based on the degree to which the biometric feature (e.g., 917) is outside of a predefined range of angles with respect to the one or more biometric sensors (e.g., 903).

In some examples, the alignment criteria include (1042) a requirement that the biometric feature (e.g., 917) is within a first threshold distance from the one or more biometric sensors (e.g., 903, e.g., the biometric feature is not too far from the biometric sensors) and a requirement that the biometric feature is not within a second threshold distance from the one or more biometric sensors (e.g., the biometric feature is not too close to the biometric sensors) (1026).

In some examples, while the biometric feature (e.g., 917) is at a first distance from the electronic device that is not within the predetermined range of distances from the electronic device, the device detects (1044), by the one or more cameras (e.g., 903), a change in distance of the biometric feature (e.g., 917) from the first distance to a second distance from the electronic device that is not within the predetermined range of distances from the electronic device. In response to detecting the change in distance, the device generates (1046) an output (e.g., an audio, tactile, and/or visual outputs 922, 924) having a value of an output characteristic (e.g., a magnitude or amplitude, or a frequency or repetition rate) that varies based on a distance of the biometric feature from the predetermined range of distances. In some examples, the electronic device issues an ongoing audio output (e.g., 924, e.g., a series of beeps) having a frequency that increases as the distance between the biometric feature (e.g., 917) and the electronic device approaches a target distance (or range of distances) from the electronic device. For example, the rate of beeping optionally increases. Conversely, the frequency of the audio output (e.g., 922) optionally decreases as the distance between the biometric feature and the electronic moves further away from the target distance (or range of distances) from the electronic device. For example, the rate of beeping optionally decreases. In some examples, similar feedback is generated with tactile outputs (e.g., output 924) or visual outputs. Issuing an audio, tactile, and/or visual output that varies based on the distance between the biometric feature and the device provides ongoing feedback to the user about the position of his or her biometric features relative to a range of distances from the biometric sensors corresponding to proper alignment. This in turn reduces the amount of time alignment interfaces are displayed and reduces the number of user inputs that are required during the alignment process. Providing improved audio, tactile and/or visual feedback to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently After initiating the biometric enrollment process, in accordance with a determination that a biometric feature of the respective type (e.g., 917) that meets alignment criteria has been detected in the field of view of the one or more cameras (e.g., 903) (1022), the device emphasizes (1028) the first portion of the field of view (e.g., inner display portion 912 in FIG. 9J) of the one or more cameras relative to the second portion of the field of view (e.g., outer display portion 914 in FIG. 9J) of the one or more cameras (e.g., darken, blur, and/or black out the second portion of the field of view without darkening, blurring, and/or blacking out the first portion of the field of view of the one or more cameras). For example, the alignment criteria include a requirement that a face of user (e.g., 917) is aligned with the camera (e.g., 903) in a predetermined alignment, or an eye of the user is aligned with the camera in a predetermined alignment. Providing a visual effect that emphasizes a portion of the display upon detecting successful alignment of the user's biometric features with the biometric sensors allows the user to quickly recognize that the current position of his or her biometric features is optimal for a subsequent biometric enrollment process (e.g., according to methods 1200 and/or 1400). Providing improved visual feedback when a set of conditions has been met without requiring further user input enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device darkens (1030) a portion of the digital viewfinder that corresponds to the second portion of the field of view (e.g., 914 in FIG. 9J) of the one or more cameras (e.g., 903). Darkening in this manner includes dimming or lowering brightness of the portion of the digital viewfinder that corresponds to the second portion of the field of view.

In some examples, the device ceases to display (1032) the portion of the digital viewfinder that corresponds to the second portion of the field of view (e.g., second display portion 914) of the one or more cameras. For example, ceasing to display the portion of the viewfinder corresponding to the second portion of the field of view includes blacking out the second portion of the field of view and/or replacing the display of the second portion of the field of view with display of other content.

In some examples, the device enlarges (1034) display of the first portion of the field of view (e.g., inner display portion 912) of the one or more cameras on the display. In some examples, enlarging display of the first portion includes enlarging display of some or all of first the portion of the field of view. In some examples, enlarging display of the first portion of the field of view includes zooming in on the first portion of the field of view. In some examples, emphasizing the first portion of the field of view (e.g., 912) of the one or more cameras relative to the second portion of the field of view (e.g., 914) of the one or more cameras includes shrinking or hiding some or all of first portion. In some examples, the device shrinks the first portion prior to enlarging display of first portion and/or shrinks the first portion after enlarging display of the first portion (e.g., to provide a zoom in and zoom out effect).

In some examples, the device modifies (1036) the alignment element (e.g., 910). For example, in some examples, modifying the alignment element includes removing the alignment element. In some examples, modifying the alignment element includes changing the shape and/or color of the alignment element (e.g., from 910 to 910-2 FIGS. 9J-9K). For example, the device modifies (1038) a shape of the alignment element from a first shape to a second shape. In some examples, the first shape (1040) is substantially rectangular and the second shape is substantially circular. Alternatively, the first shape and/or second shape is, optionally, any other shape or portion of a shape. In some examples, a shape is, optionally, a segmented shape, such as a segmented rectangle (e.g., a rectangle that is missing a portion of one or more sides).

In some examples, after emphasizing the first portion of the field of view (e.g., 912) of the one or more cameras relative to the second portion of the field of view (e.g., 914) of the one or more cameras (e.g., 903), the device detects (1054) that the biometric feature of the respective type that meets alignment criteria (e.g., 917) is no longer detected in the field of view of the one or more cameras. In response to detecting that the biometric feature of the respective type that meets alignment criteria is no longer detected in the field of view of the one or more cameras, the device outputting an indication of an alignment error (e.g., 950). For example, for correctable errors, the device identifies the error and prompts the user to correct the error. For uncorrectable errors, the device only identifies the error. Errors are identified by text and a tactile output (e.g., 950, 924, 925). In some examples, errors are identified using auditory outputs, such as those provided for accessibility purposes. In some examples, the criteria for detecting that the biometric feature is no longer detected in the field of view of the one or more cameras is the same as the criteria for determining that the biometric feature meets the alignment criteria. In some examples the alignment criteria are different from the criteria for detecting that the biometric feature is no longer detected in the field of view of the one or more cameras (e.g., once the biometric feature is aligned with the one or more cameras, the biometric feature can be moved slightly out of alignment without the device exiting the biometric enrollment process and outputting an indication of an alignment error). Outputting an indication that the user's biometric feature is no longer aligned with the biometric sensor provides feedback allowing the user to quickly recognize that the position and/or orientation of his or her biometric feature has deviated from previously established alignment. This feedback prompts the user to quickly reposition his or her biometric feature to re-establish proper alignment with the biometric sensor, reducing amount of time that alignment user interfaces are displayed, reducing the number of inputs required at these alignment user interfaces, and improving the quality of biometric feature enrollment. Providing improved audio, tactile and/or visual feedback to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, outputting an indication of an alignment error includes outputting (1056) a tactile output of a second type (e.g., 951). For example, the tactile output is an output corresponding to a loss of successful alignment. In some examples, tactile outputs are error-specific, and, in some examples, auditory output is additionally or alternatively provided.

In some examples, outputting the indication of the alignment error includes (1058) deemphasizing the first portion of the field of view of the one or more cameras (e.g., 912-2) relative to the second portion of the field of view of the one or more cameras (e.g., 914-2). For example, the device, optionally, lightens, unblurs, and/or reveals the second portion of the field of view relative to the first portion of the field of view of the one or more cameras. In some examples, the electronic device lightens and unblurs the second portion of the field of view to deemphasize the first portion relative to the second portion. In some examples, if the biometric feature (e.g., 917) is successfully aligned after receiving the alignment error, the device resumes the biometric enrollment process from where the enrollment process was prior to outputting the indication of the alignment error (e.g., the enrollment progress up to the point when the alignment error was detected, is preserved). In some examples, a progress indicator (e.g., 940) that indicated enrollment progress disappears when the indication of the alignment error is output, but is redisplayed (e.g., 940-2) when the biometric feature is properly aligned with the one or more biometric sensors. In some cases, when the progress indicator is redisplayed it includes an indication of the progress made in enrolling the biometric feature prior to outputting the indication of the alignment error. Providing a visual effect that de-emphasizes a portion of the display upon detecting an alignment error allows the user to quickly recognize that the position and/or orientation of his or her biometric feature has deviated from previously established alignment. This feedback prompts the user to quickly reposition his or her biometric feature to re-establish proper alignment with the biometric sensor, which reducing amount of time that alignment user interfaces are displayed, reduces the number of inputs required at these alignment user interfaces, and improves the quality of subsequent biometric feature enrollment (e.g., according to methods 1200 and/or 1400). Providing improved visual feedback when a set of conditions has been met without requiring further user input enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, in accordance with (1062) a determination that the alignment error is an alignment error of a first type (e.g., the biometric feature is too far from or too close to the electronic device), the device outputs (1064) (e.g., displays) a prompt (e.g., 920) to move the biometric feature to correct the alignment error of the first type. For example, the device prompts the user to move closer to or move further away from the electronic device, respectively.

In some examples, in accordance with a determination (1062) that the alignment error is an alignment error of a second type (e.g., the biometric feature is out of the first portion of the field of view), the device outputs (1064) (e.g., displays) a prompt (e.g., 950) to move the biometric feature to correct the alignment error of the second type. For example, the device prompts the user to move the biometric feature into the first portion of the field of view. In this case, the device forgoes (1068) outputting a prompt (e.g., 926) to move the biometric feature to correct the alignment error of the first type. In some examples, the second portion of the field of view (e.g., 914-2) is modified (e.g., blurred) in response to determining that the alignment error is an alignment error of a second type.

For example, the alignment error of the first type is (1074) that a portion of the biometric feature (e.g., portion of 917 shown in 939, 918-2) is oriented outside of the first portion of the field of view (e.g., 912, 912-2). In this case, the device outputs (1076) a prompt (e.g., 950) to move the portion of the biometric feature into the first portion of the field of view to prompt the user to correct the alignment error of the first type. Providing a prompt with instructions on how to correct the alignment error provides feedback that allows the user to quickly recognize how to reposition his or her biometric features in order to re-establish proper alignment and proceed with the enrollment process. This in turn reduces the amount of time in which the device displays alignment interfaces and reduces the number of user inputs required at these alignment interfaces. Providing improved visual feedback when a set of conditions has been met enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In another example, the alignment error of the first type is (1078) that a distance between a portion of the biometric feature (e.g., 917) and the one or more biometric sensors (e.g., 903) is within a threshold distance (e.g., the biometric feature is too close to the one or more biometric sensors). In this case, the device outputs (1080) a prompt (e.g., 920) to move the biometric feature away from the electronic device to prompt the user to correct the alignment error of the first type.

In another example, the alignment error of the first type is (1082) that a distance between a portion of the biometric feature (e.g., 917) and the one or more biometric sensors (e.g., 903) exceeds a threshold distance (e.g., the biometric feature is too far from the one or more biometric sensors). In this case, the device outputs (1084) a prompt (e.g., 920)

to move the biometric feature closer to the electronic device to prompt the user to correct the alignment error of the first type.

In another example, the alignment error of the first type is that an angle of the biometric feature (e.g., 917) relative to the one or more biometric sensors (e.g., 903) is outside of a predefined range of angles (e.g., angles of elevation) relative to the one or more biometric sensors. For example, the biometric feature is, in some circumstances, too high. In another example, the one or more biometric sensors is, in some circumstances, too low. In this case, the device outputs a prompt to move the biometric feature to adjust the angle (e.g., angle of elevation) of the biometric feature relative to the one or more biometric sensors.

In some examples, in accordance with a determination that the error condition of the first type persists for a threshold time period (1086), the device displays (1088) an accessibility interface (e.g., 908) that enables the user to proceed with the biometric enrollment without correcting the error condition. For example, in some examples, the device enables a user to proceed with biometric enrollment without moving the biometric feature (e.g., 917) relative to the device such that the error condition is corrected or without tilting the biometric feature to capture images of a different side of the biometric feature. In some examples, the device enables a user to proceed with biometric enrollment in this manner if the biometric feature is improperly aligned for a predetermined amount of time and/or in response to a predetermined number of failed requests.

In some examples, after outputting the alignment error, in accordance with a determination that a biometric feature of the respective type (e.g., 917) that meets alignment criteria has been detected in the field of view of the one or more cameras (e.g., 903), the device again emphasizes (1070) the first portion of the field of view (e.g., 912-2) of the one or more cameras relative to the second portion of the field of view (e.g., 914-2) of the one or more cameras. For example, optimally the device darkens, blurs, and/or blacks out the second portion of the field of view of the one or more cameras (e.g., 914-2) without darkening, blurring, and/or blacking out the first portion of the field of view of the one or more cameras (e.g., 912-2).

In some examples, after outputting the alignment error, and in accordance with a determination that a biometric feature of the respective type that meets alignment criteria (e.g., 917) has been detected in the field of view of the one or more cameras (e.g., 903), the device outputs (1072) a tactile output of the first type (e.g., 936). In some examples, however, the device outputs a tactile output of a third type different than the first type and the second type.

In accordance with a determination that a biometric feature of the respective type (e.g., 917) that meets alignment criteria has not been detected in the field of view of the one or more cameras (e.g., a face or eye of a user has not been detected in the predetermined alignment), the device maintains (1090) display of the digital viewfinder without emphasizing the first portion of the field of view (e.g., 912, 912-2) of the one or more cameras relative to the second portion of the field (e.g., 914, 914-2) of view of the one or more cameras (e.g., 903).

In some examples, the device detects (1092) a change in orientation and/or position of the biometric feature (e.g., 917) relative to the one or more biometric sensors (e.g., 903). For example, the device detects, optionally, a change in position, a change in orientation, or both a change in orientation and position.

In some examples, in response to detecting (1094) the change in orientation and/or position of the biometric feature (e.g., 917) relative to the one or more biometric sensors (e.g., 903), and in accordance with a determination that device movement criteria have been met (e.g., the device is physically moving more than the threshold amount in a manner that prevents reliable alignment/enrollment), the device outputs (1096) a prompt (e.g., 946, 948, a visual, tactile or audible alert) to reduce movement of the electronic device. In some examples, the device detects reduced movement of the device and in response to detecting the reduced movement of the device ceases to output the prompt. In some examples, movement of the device is determined based on the one or more biometric sensors (e.g., 903). For example, the change in orientation and/or position of the biometric feature relative to the one or more biometric sensors is consistent with movement of the device around the biometric feature rather than movement of the biometric feature in view of the one or more biometric sensors. In some examples, the movement of the device is determined based on one or more orientation sensors of the device, such as an accelerometer (e.g., 168), a magnetometer, an inertial measurement unit, or the like, that are separate from the one or more biometric sensors.

In some examples, while the biometric feature (e.g., 917) is within a first portion of a field of view (e.g., 912) of the one or more biometric sensors (e.g., 903) and is within a threshold distance of the one or more biometric sensors, and in accordance with a determination that the biometric feature is within of a predefined range of angles (e.g., angles of elevation relative to the one or more biometric sensors), the device displays an enrollment progress indicator (e.g., 940) for enrollment of the biometric feature (e.g., as described in greater detail with reference to method 1200 and FIGS. 11A-11E). Displaying the enrollment progress indicator optionally includes first emphasizing the first portion of the field of view (e.g., 912, 912-2) of the one or more cameras relative to the second portion of the field of view (e.g., 914, 914-2) of the one or more cameras as described above. Displaying the progress indicator during enrollment in this manner encourages the user to look at the display of the electronic device during the enrollment to improve the ability to detect when gaze is directed at the display, and thus whether or not the user is paying attention to the device. Encouraging the user to look at the display of the electronic device enhances the operability of the device and makes the user-device interface more efficient (e.g., by ensuring that the gaze of the user is directed at the display and thereby ensuring that the biometric feature of the user is properly enrolled) which, additionally, reduces power usage and improves battery life of the device by enabling the user to use the device more quickly and efficiently.

In some examples, in accordance with a determination that the biometric feature (e.g., 917) is outside of the predefined range of angles (e.g., angles of elevation relative to the one or more biometric sensors 903), the device obscures (e.g., blurs, darks, or desaturates) at least a portion of the preview of the image data (e.g., display portions 912, 912-2, 914 and/or 914-2). In some examples, the device delays obscuring the portion of the preview of the image data (e.g., for at least a predetermined time period such as 1 second, 2 seconds, or 5 seconds after detecting that the biometric feature is within the first portion of the field of view and within the threshold distance of the one or more biometric sensors) so that the portion of the preview of the image data is not obscured if the user is actively shifting the orientation of the biometric feature relative to the one or more biometric sensors (e.g., 903). In some examples, the obscuring is delayed as long as the angle of the biometric feature is changing. In some examples, the obscuring is delayed until the angle of the biometric feature has been continuously outside of the predefined range of angles for at least the predetermined time period. In some examples, only a portion of the preview is obscured (e.g., 912 or 914, 912-2 or 914-2). In some examples, all of the preview is obscured (e.g., 912 and 914, 912-2 and 914-2). Obscuring the digital viewfinder when the biometric sensors are positioned too high above or too far below the user's biometric feature allows the user to quickly recognize that his or her biometric feature is out of alignment. This in turn prompts the user to change the angle of elevation between the device and his or her biometric feature until proper alignment is established. Providing improved visual feedback when a set of conditions has been met enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, while the portion of the preview of the image data (e.g., 912 or 914) is obscured, the device detects a change in the angle of the biometric feature (e.g., 917) with respect to the one or more biometric sensors (e.g., 903). In response to detecting the change in the angle of the biometric feature with respect to the one or more biometric sensors, and in accordance with a determination that the change in angle moves the biometric feature closer to the predefined range of angles without moving the biometric feature into the predefined range of angles, the device reduces an amount of the obscuring of the portion of the preview of the image data (e.g., 912 or 914, 912-2 or 914-2) while continuing to obscure the portion of the preview of the image data. In some examples, the amount by which the obscuring of the portion of the preview of the image data is reduced depends on an amount of the change in the angle of the biometric feature with respect to the one or more biometric sensors (e.g., the more the biometric feature moves toward the one or more biometric sensors, the greater the reduction in the amount of obscuring). In accordance with a determination that the change in angle moves the biometric feature into the predefined range of angles, the device ceases to obscure the portion of the preview of the image data. In some examples, when the change in angle of the biometric feature moves the biometric feature into the predefined range of angles, the device generates a tactile and/or audio output to inform the user that the angle of the biometric feature is within the predefined range of angles (e.g., 934, 936). Reducing obscuration of the digital viewfinder as the user's biometric feature moves closer to the pre-defined angle range allows the user to quickly recognize a set of positions that correspond to successful alignment of the biometric feature. This in turn prompts the user to change the angle of elevation between the device and his or her biometric feature until proper alignment is established. Providing improved visual feedback when a set of conditions has been met enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, in response to detecting the change in angle of the biometric feature (e.g., 917) with respect to the one or more biometric sensors (e.g., 903), and in accordance with a determination that the change in angle moves the biometric feature further away from the predefined range of angles, the device increases an amount of the obscuring of the portion of the preview of the image data (e.g., 912 or 914, 912-2 or 914-2). In some examples, the amount by which the obscuring of the portion of the preview of the image data is increased depends on an amount of the change in the angle of the biometric feature with respect to the one or more biometric sensors (e.g., the more the biometric feature moves away the one or more biometric sensors, the greater the increase in the amount of obscuring).

In some examples, obscuring includes blurring the preview of the image data, and reducing the amount of the obscuring of the portion of the preview of the image data includes reducing an amount of blurring of the preview of the image data (e.g., by reducing a blur radius or other blur parameter). In some examples, increasing the amount of the obscuring of the portion of the preview of the image data includes increasing a blur radius or other blur parameter.

Note that details of the processes described above with respect to method 1000 (e.g., FIGS. 10A-10F) are also applicable in an analogous manner to the methods described below. For example, method 1000 optionally includes one or more of the characteristics of the various methods described below with reference to methods 800, 1200, 1400, 1600, 1800, 2000, 2200, 2400, and 2700. For example, the enrollment process as described in method 1200 can be applied with respect to the face enrollment interface (e.g., 954). For another example, hints as described in method 1400 can be applied with respect to the enrollment progress meter (e.g., 940). For another example, accessibility features, as described in method 1400, can be applied, in lieu of, or in combination with, the accessibility options (e.g., 928-2). For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 9A-91 are, optionally, implemented by components depicted in FIGS. 1A-1B. For example, displaying operation 1002, detecting operation 1004, displaying operation 1006, emphasizing operation 1028, and maintaining operation 1090 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

Attention is now directed to FIGS. 11A-11L, which illustrate exemplary user interfaces for registering a biometric feature on an electronic device (e.g., device 100, device 300, device 500, device 700 or device 900), in accordance with some examples. The user interfaces in these figures are used to illustrate the processes described below, including the processes in FIG. 12.

FIG. 11A illustrates an electronic device 1100 (e.g., portable multifunction device 100, device 300, device 500, device 700, or device 900). In the exemplary example illustrated in FIGS. 11A-11L, electronic device 1100 is a smartphone. In other examples, electronic device 1100 can be a different type of electronic device, such as a wearable device (e.g., a smartwatch). Electronic device 1100 has a display 1102, one or more input devices (e.g., touchscreen of display 1102, a button, a microphone), and a wireless communication radio. In some examples, the electronic device includes a plurality of cameras. In some examples, the electronic device includes only one camera. In some examples, the electronic device includes one or more biometric sensors (e.g., biometric sensor 1103) which, optionally, include a camera, such as an infrared camera, a thermographic camera, or a combination thereof. In some examples, the one or more biometric sensors 1103 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

As illustrated in FIG. 11A, device 1100 displays a face enrollment user interface 1104 on display 1102. In some examples, face enrollment user interface 1104 is displayed after device 1100 detects successful alignment of the user's face relative its one or more cameras, as described above in connection with FIGS. 9A-9AE Face enrollment interface 1104 includes user facial image 1106. In some examples, user facial image 1106 is an image of the user captured by one or more cameras on device 1100. For example, user facial image 1106 optionally is live preview of the image data captured by the one or more cameras (e.g., a digital viewfinder) that updates continuously as the field of view of the camera and/or the field of view's contents change. In some examples, background content is removed such that only the user's face is visible in facial image 1106. Face enrollment interface also optionally includes orientation guide 1108 that is superimposed (e.g., overlaid) on user facial image 1106. As described above in connection with FIGS. 7I-7K, orientation guide 1108 is, optionally, a set of curved lines that extend into a virtual z-dimension (e.g., along an axis normal to the plane of the display) and intersect over the center of user facial image 100. Thus, the curved lines of orientation guide 1108 appear to bulge outwards relative to the plane of display 1102 to give a sense of the position of the user's head in three-dimensional space.

Face enrollment user interface 1104 also includes enrollment progress meter 1110. Enrollment progress meter 1110 includes a set of display elements (e.g., progress elements 1110*a*, 1110*b*, and 1110*c*) that are arranged around user facial image 1106 and orientation guide 1108. In the example of FIG. 11A, the progress elements are a set of lines that extend radially outward from user facial image 1106 arranged in a circular pattern. In some examples, progress elements 1110*a*, 1110*b*, 1110*c*, etc. indicate an orientation of the user's face needed to enroll corresponding facial features. For example, progress elements in the upper portion of enrollment meter 1110 optionally move, fill in, elongate, and/or change color when the user's head is tilted upwards, which allows the one or more cameras on device 1100 to capture image data of the under-side of the user's face. This process is described in more detail below. In the example of FIG. 9A, device 1100 displays progress elements in enrollment progress meter 1110 in an unenrolled state (e.g., the progress elements are greyed out).

Face enrollment interface 1104 also includes a text prompt 1112, which instructs the user to move (e.g., rotate and/or tilt) their head in a circular motion during the enrollment process. In some examples, text prompt 1112 is optionally accompanied by tactile and/or auditory prompt depending on device settings and/or user selections. In some examples, device 1100 displays text prompt 1112 on enrollment interface 1104 through the facial enrollment process.

Figure 11B:
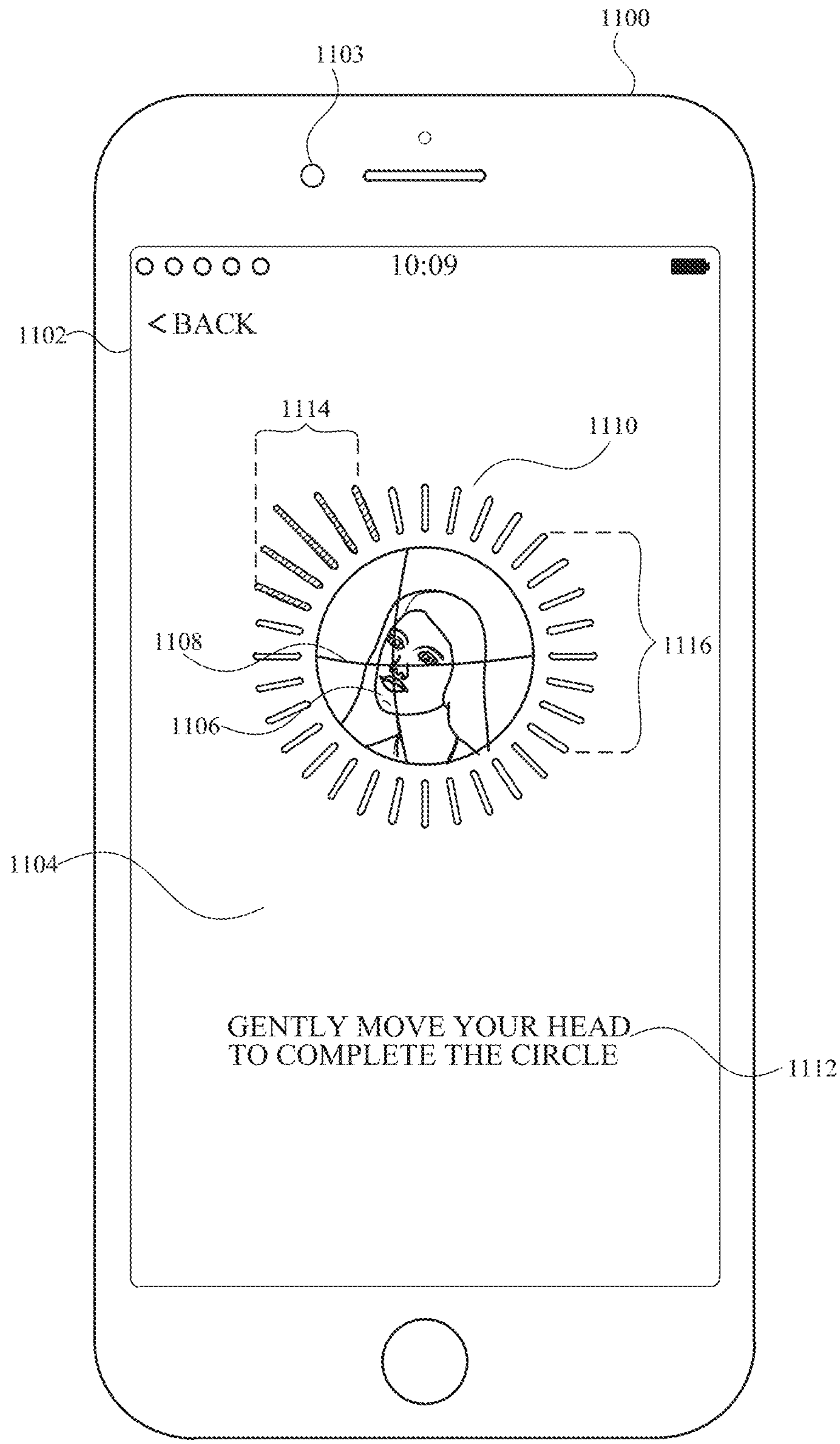

As illustrated in FIG. 11B, device 1100 detects movement of the user's face relative to its one or more cameras. The movement of the user's face is, optionally, a rotating and/or tilting motion relative to the device 1100. In response, device 1100 continually updates (e.g., displays movement of) user facial image 1106 to reflect the change in orientation of the user's face. In some examples, orientation guide 1108 tracks the movement (e.g., moves along with) user facial image 1106 to provide visually emphasize tilting and rotational movements of the user's face in three-dimensions. For example, the center (e.g., intersection) of orientation guide 1108 is, optionally, positioned at a central point on user facial image 1106 and move along with it. In some examples, device 1100 also adjusts the curvature of the lines comprising orientation guide 1108 to give the appearance of three-dimensional rotation (e.g., with respect to an axis normal to display 1100). In some examples, device 1100 emphasizes orientation guide 1108 while it is in motion (e.g., while the orientation of the user's face is changing). For example, device 1100 optionally darkens orientation guide 1108 while it is in motion and/or display a fading trail as it tracks movement of the user's face. In this case, device 1100 optionally reduces this emphasis on orientation guide 1108 relative to user facial image 1106 when the user's face is not moving.

As shown in FIG. 11B, in response to detecting that the user's face is oriented towards progress meter portion 1114 (e.g., in accordance with a determination that the image data captured by biometric sensor 1103 includes an angular view of the user's face), device 1100 updates the display of the progress elements in meter portion 1114 to an "enrolling" state by changing the appearance of the progress elements in meter portion 1114. For example, device 1100 optionally enlarges and/or changes the color of progress elements in meter portion 1114 while user's face is oriented towards meter portion 1114. In some examples, device 1100 elongates the progress ticks and changes their color from grey to blue when updating progress elements to the "enrolling" state. Changing the display of progress elements to the "enrolling" state in this manner indicates that device 1100 is capturing (e.g., enrolling) facial imaging data for the angular view corresponding to the current orientation of the user's face. In the example of FIG. 11B, device 1100 maintains progress elements in meter portion 1116 in an unenrolled state to indicate that the user has not yet oriented their face towards meter portion 1116. In some examples, the display of meter portion 1114 is updated in this manner only if the user's face is sufficiently rotated towards meter portion 1114 (e.g., if the user's face is rotated by at least a threshold amount or angle).

In some examples, the enrollment progress meter is comprised of a set of progress meter portions such as meter portions 1114 and 1116. In some examples, each progress meter portion contains a predetermined number of progress elements associated with each portion (e.g., 3, 5, or 8 progress elements).

Figure 11C:
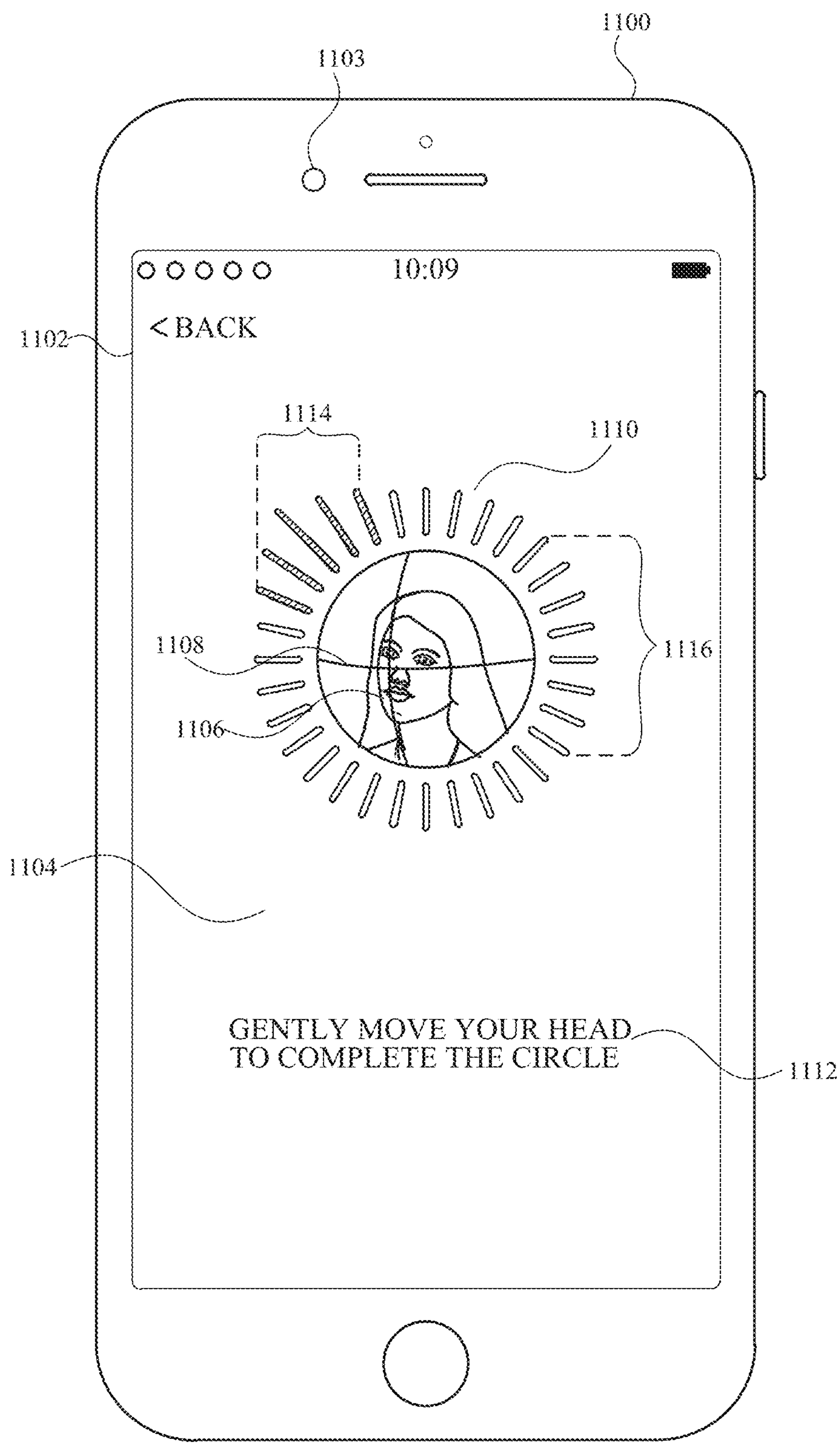

In some examples, as illustrated in FIG. 11C, device 1100 detects a small rotation and/or tilt of the user's face and updates the digital viewfinder containing user facial graphic 1106. For example, the user's face has begun to tilt downwards and rotate to the right. In the example of FIG. 11C, however, the user's face is still oriented towards progress meter portion 1114. As a result, device 1100 continues to display progress elements of meter portion 1114 in an enrolling state, even though the user begins to rotate and/or tilt their head downwards and to the right. In this case, device 1100 also maintains the display of progress elements proximate to meter portion 1114, since the user's head has not been rotated sufficiently to trigger enrollment of the corresponding orientations.

Figure 11D:
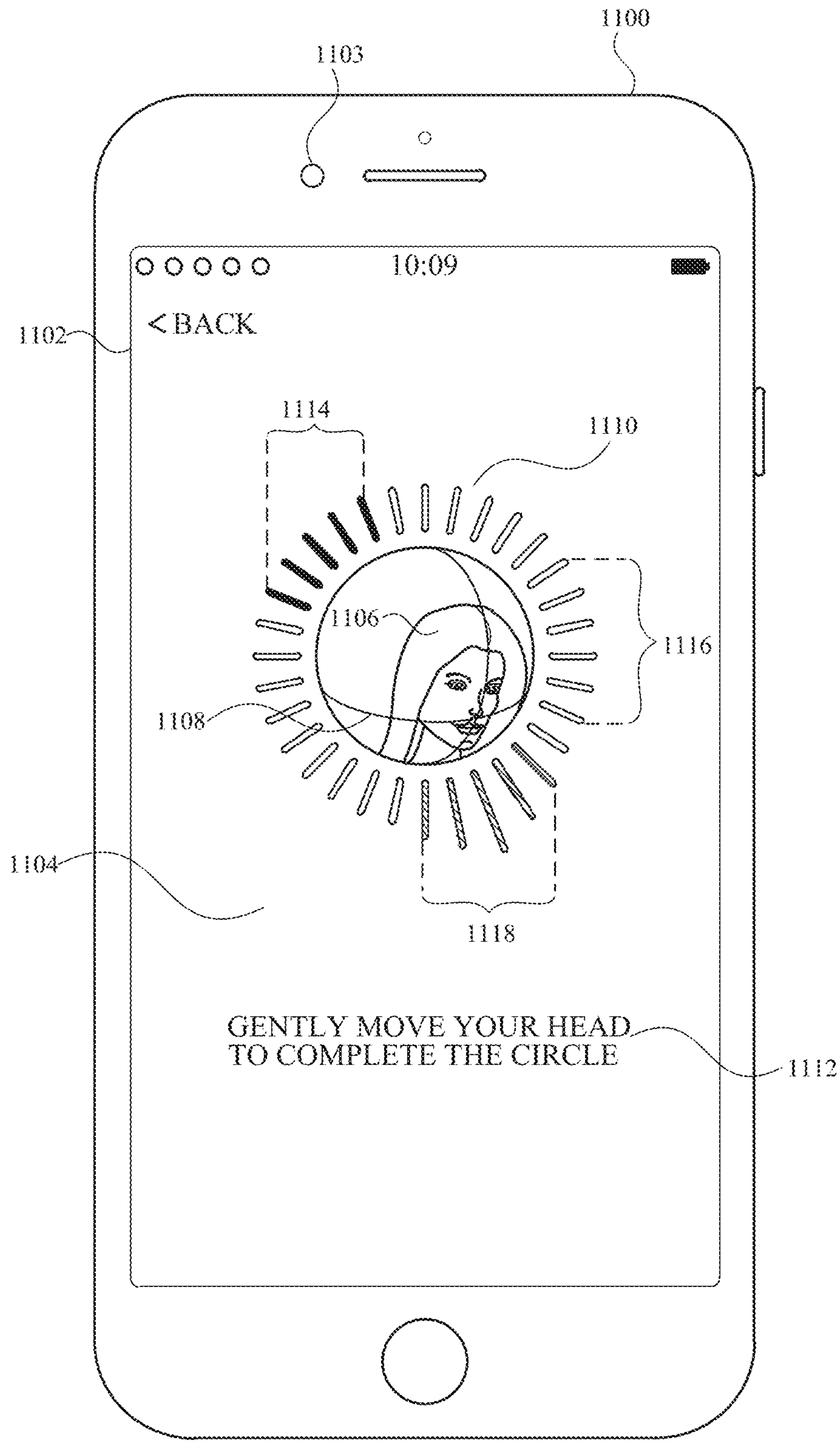

As illustrated in FIG. 11D, device 1100 detects that the user's face has been rotated and/or tilted towards meter portion 1118. In the example of FIG. 11D, the user's face continues the movement illustrated in FIG. 11C, tilting downwards and rotating to the right through its initial position in FIG. 11A, (e.g., the user's face moves so as not to become oriented towards other portions of enrollment meter 1110). In response to detecting the change in facial orientation, device 1100 moves orientation guide 1108, tracking the movement of user facial image 1106 in the digital viewfinder. In accordance with a determination that the user's face has become oriented towards meter portion 1118 (e.g., image data captured by biometric sensor 1103 includes a second angular view of the user's face), device 1100 updates progress elements in meter portion 1118 to the "enrolling" state described above. For example, device 1100 elongates the progress ticks within meter portion 1118 and changes their color. In some examples, device 1100 updates the display of meter portion 1118 only if the corresponding portion of the user's face has not been enrolled previously (e.g., if the progress elements in meter portion 1118 are in the "unenrolled," greyed out state). In some examples, device 1100 updates the display of meter portion 1118 regardless of whether the corresponding portion of the user's face has been previously enrolled (e.g., to provide further indication of the orientation of the user's face relative to biometric sensor 1103).

In the example of FIG. 11D, device 1100 also detects that the user's face is no longer oriented towards progress meter portion 1114 (since the user's face is currently oriented towards meter portion 1118). In response, device 1100 changes the appearance of progress elements in meter portion 1114 a second time to an "enrolled" state. In the example of FIG. 11D, device 1100 updates the display of progress ticks in portion 1114 from the elongated "enrolling" state by shortening the progress ticks and changing their color a second time. For example, progress elements in the "enrolled" state are the same length and/or size of progress elements in the "unenrolled" state, but are displayed in green to indicate that the corresponding portion of the user's face (e.g., the angular view captured in FIG. 11B) has been successfully enrolled as described above in connection with FIG. 11B.

In the example of FIG. 11D, device 1100 maintains progress elements in meter portion 1116 in an unenrolled state to indicate that the user has not yet oriented their face towards meter portion 1116.

FIGS. 11E through 11H illustrate face enrollment interface 1104 as the user rotates and/or tilts their face in a counter-clockwise motion through a series of orientations associated with the right-hand side of enrollment progress meter 1110. Beginning from progress meter portion 1118, device 1100 sequentially changes progress elements in the path of rotation to the "enrolling" state described above based on the user's facial orientation (e.g., in response to detecting that the user's face is oriented towards a corresponding portion of progress meter 1110). Once the user's face has rotated past these progress elements (e.g., in response to detecting that the user's face is no longer oriented towards corresponding portions of progress meter 1110), device 1100 updates the progress elements to the "enrolled" state to indicate successful enrollment of corresponding portions of the user's face. This process is described in more detail below. In some examples, visual characteristics of progress elements in the "enrolling" state is based on the rate at which the user's facial orientation changes. For example, device 1100 modifies the color of progress elements in the "enrolling" state in a first manner if the user's face is rotating a first speed, and modifies the color of these progress elements in a second manner if the user's face is rotating more slowly and/or more quickly.

Figure 11E:
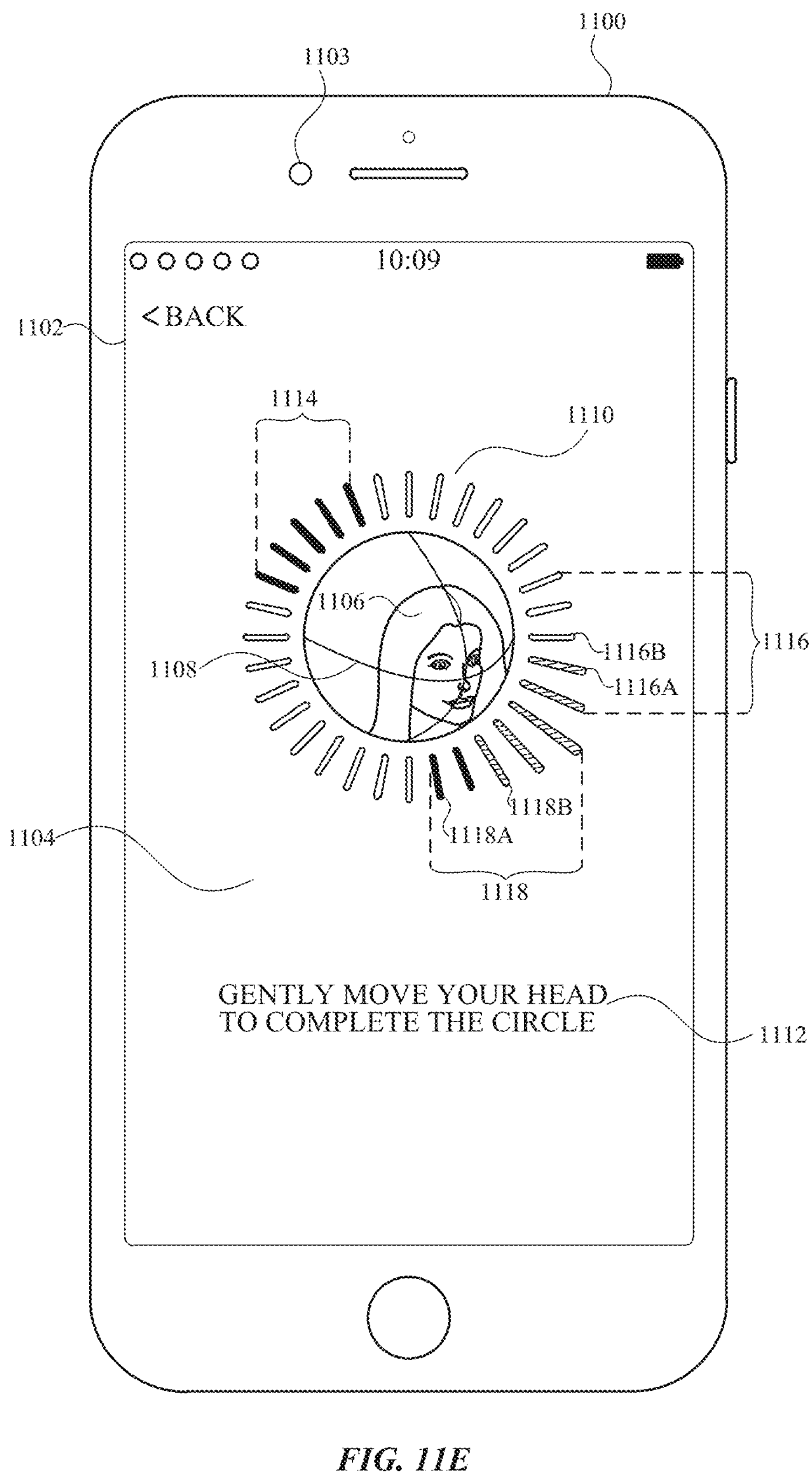

As shown in FIG. 11E, device 1100 detects that the user's face has rotated in a counter-clockwise fashion relative to biometric sensor 1103 (e.g., the user's face rotates up and/or tilts to the left relative to its position in FIG. 11D). As described above, device 1100 continuously updates user facial image 1106 to reflect the change in orientation and moves orientation guide 1108 to track the movement of user facial image 1106 in the digital viewfinder. As the user's face is rotated upwards, device 1100 updates the display of one or more progress elements in meter portion 1116 (e.g., 1116*a*) to the "enrolling state" (e.g., by elongating and/or changing the color of the one or more progress elements as described above). As shown by the position of user facial image 1106 in FIG. 11E, the rotation moves the user's face past (e.g., out of) the orientation corresponding to one or more progress elements in meter portion 1118 (e.g., 1118*a*). In response to detecting the user's face is no longer in this orientation, device 1100 updates the display of the one or more progress elements (including 1118*a*) to the "enrolled" state described above to indicate successful enrollment of these portions. In the example of FIG. 11E, device 1100 maintains one or more elements of progress meter portion 1118 (e.g., 1118*b*) in the "enrolling" state, since the user's face has not yet rotated out of the corresponding orientation. Likewise, device 1100 also continues to display one or more progress elements in meter portion 1116 (e.g., 1116*b*) in the initial "unenrolled" state, since the user's face has not yet been positioned in a corresponding orientation.

Figure 11F:
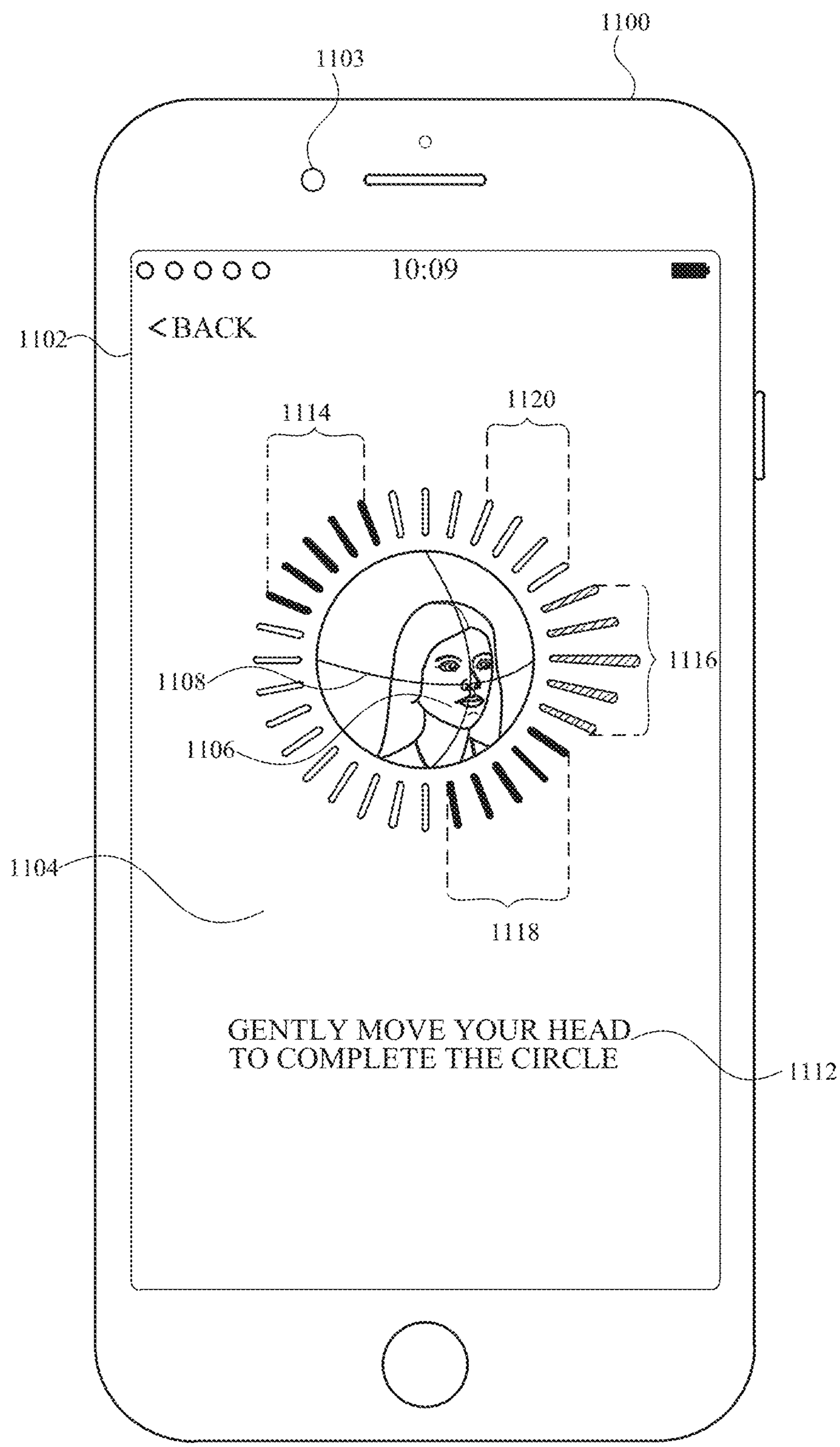

FIG. 11F illustrates face enrollment interface 1104 as counter-clockwise rotation of the user's face continues relative to its position in FIG. 11E. Again, device 1100 continuously updates user facial image 1106 to reflect the change in orientation and moves orientation guide 1108 to track the movement of user facial image 1106 in the digital viewfinder. As shown by the position of user facial image 1106 in FIG. 11F, the rotation moves the user's face into an orientation corresponding to progress meter portion 1116. In response to detecting the user's face in this orientation, device 1100 changes the display of one or more progress elements in meter portion 1116 (e.g., 1116*b*) from the "unenrolled" state to the "enrolling" state (e.g., by elongating and/or changing the color of the one or more progress elements as described above). As shown by position of user facial image 1106 in FIG. 11F, the rotation also moves the user's face past (e.g., out of) the orientation corresponding to the remaining elements of progress meter portion 1118 (e.g., 1118*b*). In response to detecting the user's face is no longer in this orientation, device 1100 updates the display of these progress elements (including 1118*b*) to the "enrolled" state described above, indicating successful enrollment of an angular view of the user's face corresponding to meter portion 1118*b*. In the example of FIG. 11F, device 1100 also continues to display progress elements in meter portion 1120 in the initial "unenrolled" state described above, since the user's face has not yet been positioned in a corresponding orientation.

Figure 11G:
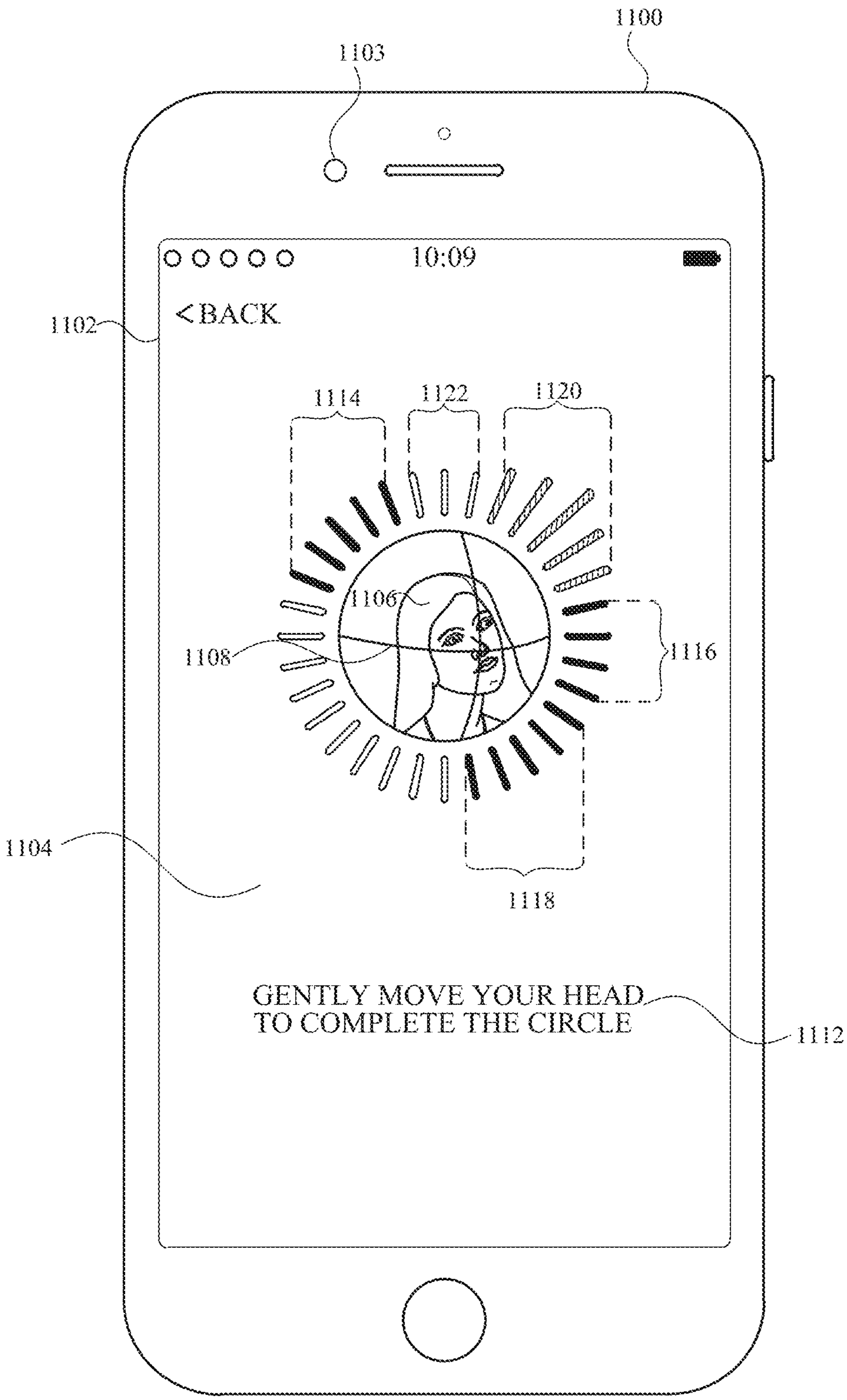

FIG. 11G illustrates face enrollment interface 1104 as counter-clockwise rotation of the user's face continues relative to its position in FIG. 11F. Again, device 1100 continuously updates user facial image 1106 to reflect the change in orientation and moves orientation guide 1108 to track the movement of user facial image 1106 in the digital viewfinder. As shown by the position of user facial image 1106 in FIG. 11G, the rotation moves the user's face into an orientation corresponding to progress meter portion 1120. In response to detecting the user's face in this orientation, device 1100 changes the display of progress elements in meter portion 1120 from the "unenrolled" state to the "enrolling" state (e.g., by elongating and/or changing the color of the one or more progress elements as described above). As shown by position of user facial image 1106 in FIG. 11G, the rotation also moves the user's face past (e.g., out of) the orientation corresponding to progress meter portion 1116. In response to detecting the user's face is no longer in this orientation, device 1100 updates the display of progress elements in meter portion 1116 to the "enrolled" state, indicating successful enrollment of an angular view of the user's face corresponding to meter portion 1116. In the example of FIG. 11G, device 1100 continues to display progress elements in meter portion 1122 in the initial "unenrolled" state, since the user's face has not yet been positioned in a corresponding orientation.

Figure 11H:
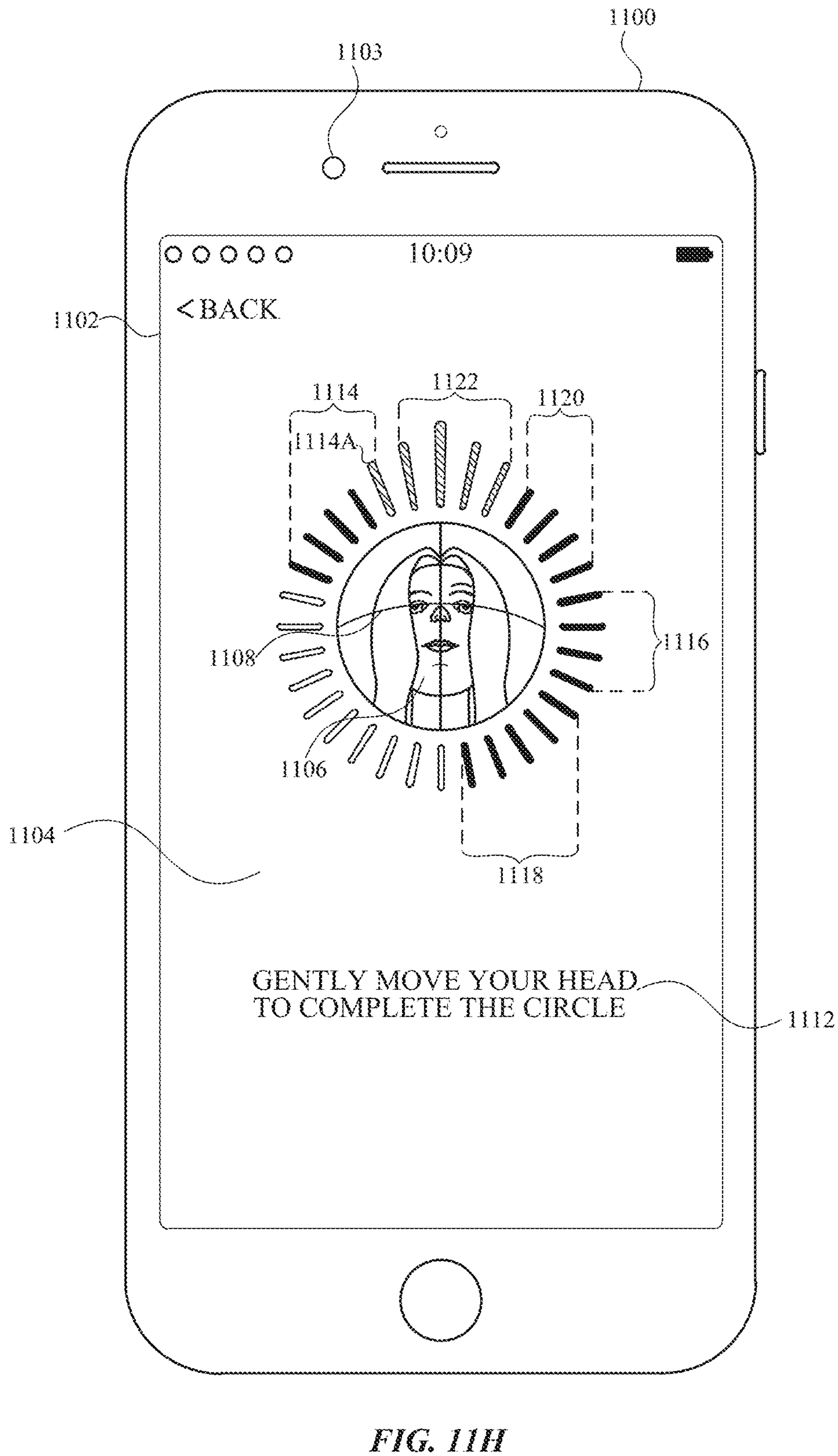

FIG. 11H illustrates face enrollment interface 1104 as counter-clockwise rotation of the user's face continues relative to its position in FIG. 11G. Again, device 1100 continuously updates user facial image 1106 to reflect the change in orientation and moves orientation guide 1108 to track the movement of user facial image 1106 in the digital viewfinder. As shown by the position of user facial image 1106 in FIG. 11H, the rotation moves the user's face into an orientation corresponding to progress meter portion 1122. In response to detecting the user's face in this orientation, device 1100 changes the display of progress elements in meter portion 1122 from the "unenrolled" state to the "enrolling" state (e.g., by elongating and/or changing the color of the one or more progress elements as described above). In some examples, this orientation causes device 1100 to change the display of one or more progress elements in meter portion 1114 from the "enrolled" state shown in FIGS. 11D through 11G to back the "enrolling" state based on the orientation of the user's face, even though the corresponding facial features have already been enrolled (e.g., to provide further indication of the orientation of the user's face relative to biometric sensor 1703). In this case, device 1100 reverts these elements of progress meter portion 1114 back to the "enrolled" state in response to detecting that the user's face is no longer oriented in that direction. As shown by position of user facial image 1106 in FIG. 11H, the rotation also moves the user's face past (e.g., out of) the orientation corresponding to progress meter portion 1120. In response to detecting the user's face is no longer in this orientation, device 1100 updates the display of progress elements in meter portion 1120 to the "enrolled" state, indicating successful enrollment of an angular view of the user's face corresponding to meter portion 1120. In the example of FIG. 11G, device 1100 continues to display the remaining progress elements of enrollment meter 1110 (e.g., progress elements not in meter portions 1114, 1116, 1118, 1120, or 1122) in the initial "unenrolled" state, since the user's face has not yet been positioned in a corresponding orientation.

Enrollment and/or scanning of the user's facial features proceeds in this manner until all elements of enrollment progress meter 1110 have been transitioned to the enrolled state (e.g., until image data of all corresponding angular views of the user's face have been captured by biometric sensor 1103). For example, enrollment proceeds until the user's face returns to the orientation corresponding to meter portion 1118 by way of counter-clockwise rotation.

Displaying and updating the progress indicator during enrollment in this manner encourages the user to look at the display of device 1100 during the enrollment to improve the ability to detect when gaze is directed at the display, and thus whether or not the user is paying attention to the device. Encouraging the user to look at the display of device 1100 enhances the operability of the device and makes the user-device interface more efficient (e.g., by ensuring that the gaze of the user is directed at the display and thereby ensuring that the biometric feature of the user is properly enrolled) which, additionally, reduces power usage and improves battery life of the device by enabling the user to use the device more quickly and efficiently.

It should be appreciated that the examples of FIGS. 11D through 11H are merely illustrative. In particular, the enrollment of the user's facial features can begin at any portion of progress meter 1110 (e.g., meter portion 1114). Similarly, angular views of the user's face corresponding to each meter portion or progress element can be enrolled in any order (e.g., through clockwise rotation).

Figure 11I:
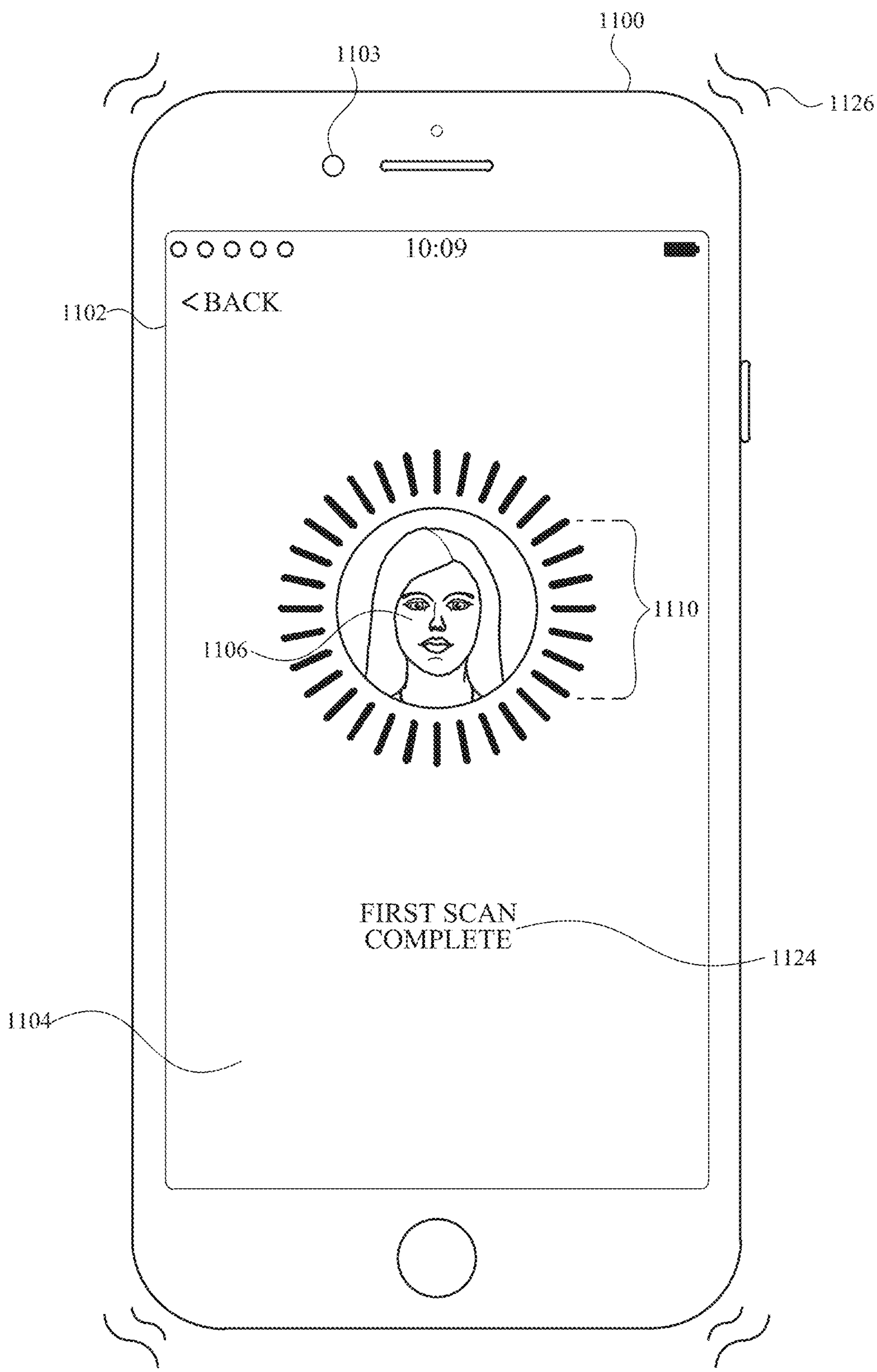

FIG. 11I illustrates face enrollment interface 1104 after image data of all corresponding angular views of the user's face have been captured by biometric sensor 1103. In the example of FIG. 11I, device 1100 has transitioned the display of all progress elements in enrollment meter 1110 to the "enrolled" state (e.g., during the enrollment process described above in connection with FIGS. 11B-11H). For example, device 1100 changes the color of progress element to green to indicate successful enrollment. In the example of FIG. 11I, device 1100 displays text prompt 1124 indicating that a first scan of the user's facial features is complete. In some examples, device 1100 issues audio and/or tactile notification 1126 to provide an additional indication that the first scan is complete. In some examples, the audio and/or tactile output that indicates successful enrollment of the user's facial features is the same as an audio and/or tactile output that is used to indicate successful face authentication at device 1100. In the example of FIG. 11I, device 1100 continues to display user facial image 1106. In some examples, user facial image 1106 is still part of a live preview of the digital viewfinder. In other examples, device 1100 displays a single (e.g., still) user image captured during the enrollment process. In the example of FIG. 11I, device 1100 ceases to display orientation guide 1108 once the scan is complete.

Figure 11J:
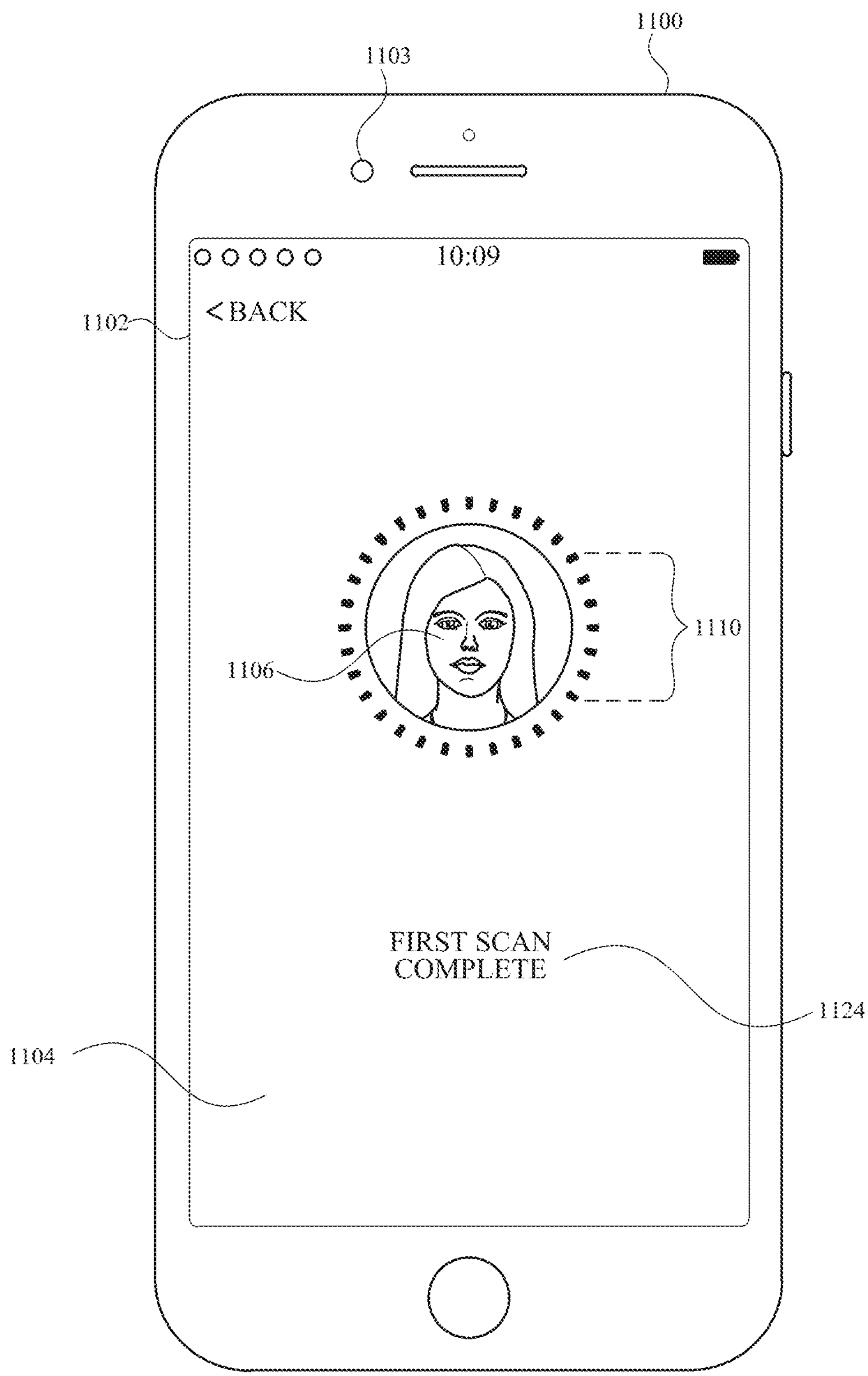
Figure 11K:
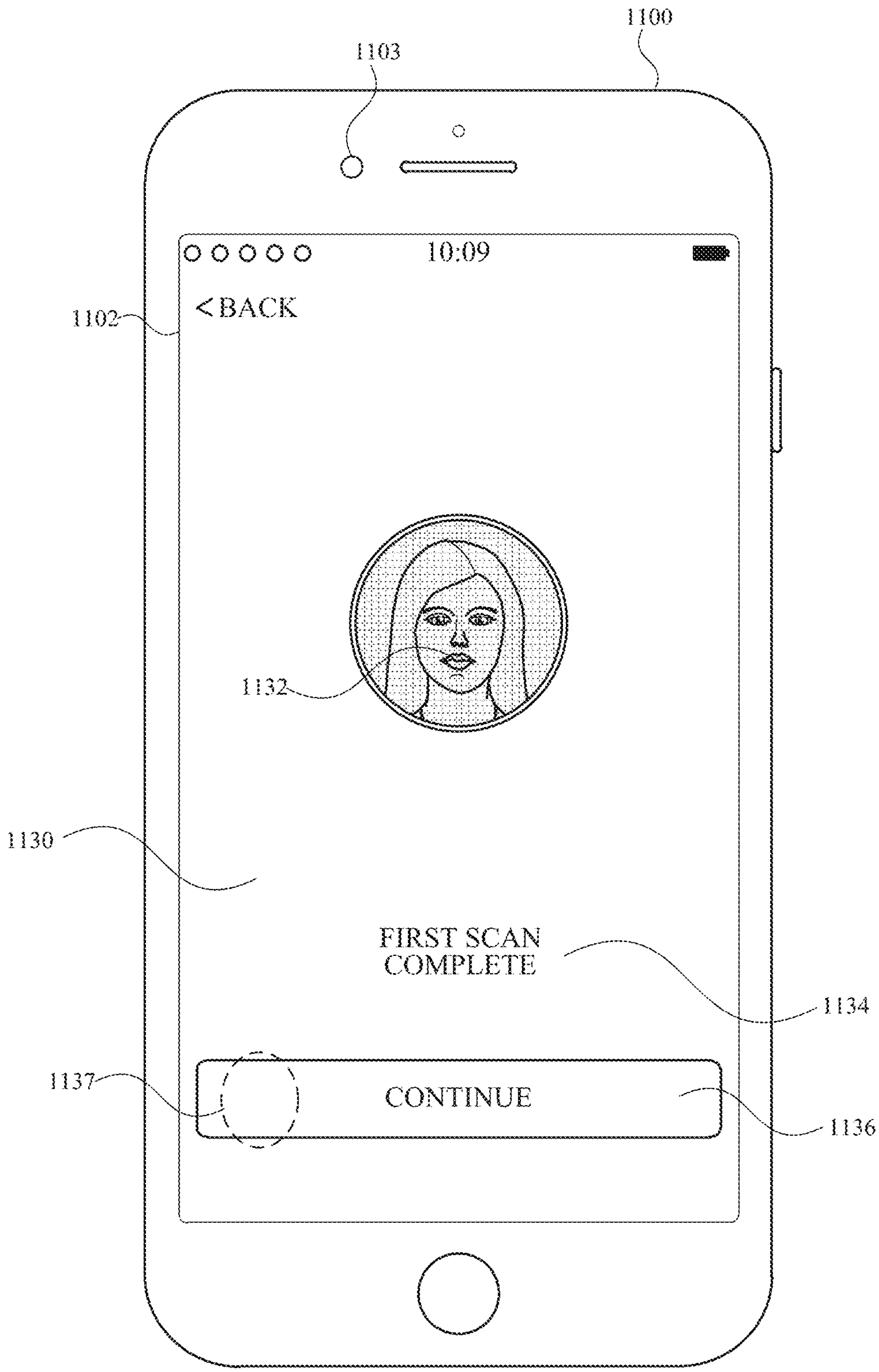

As illustrated in FIGS. 11J-11K, in some examples, device 1100 displays an animation that transitions the display of enrollment progress meter 1110 to success-state meter 1128 shown in FIG. 11K. For example, device 1100 reduces the length of each progress tick mark as illustrated in FIG. 11J and merges the display of the previously discrete progress elements into a continuous circle. In the example of FIG. 11K, after displaying the animation, device 1100 displays scan completion interface 1130. Scan completion interface 1130 includes user facial image 1132 and success-state meter 1128. In the example of FIG. 11K, user facial image 1132 is blurred, faded, darkened or otherwise obscured to indicate that additional image data is no longer being collected as part of the facial scan. In some examples, success-state meter 1128 is a solid, continuous green circle surrounding user facial image 1132 that provides a visual indication that the first scan is complete. To provide a further visual notification, scan completion interface 1130 also includes text prompt 1134 (e.g., a completion message). Scan completion interface 1130 also includes continue affordance 1136. In some examples, while displaying enrollment completion interface 1130, device 1100 detects activation (e.g., selection) of continue affordance 1136 (e.g., by way of user input 1137). In some examples where display is touch-sensitive, user input 1337 is a tap, swipe or other gesture on the display surface substantially on continue affordance 1136. In other examples, activation of continue affordance 1136 is a keyboard input or activation of the affordance with a focus selector (e.g., a mouse cursor).

Figure 11L:
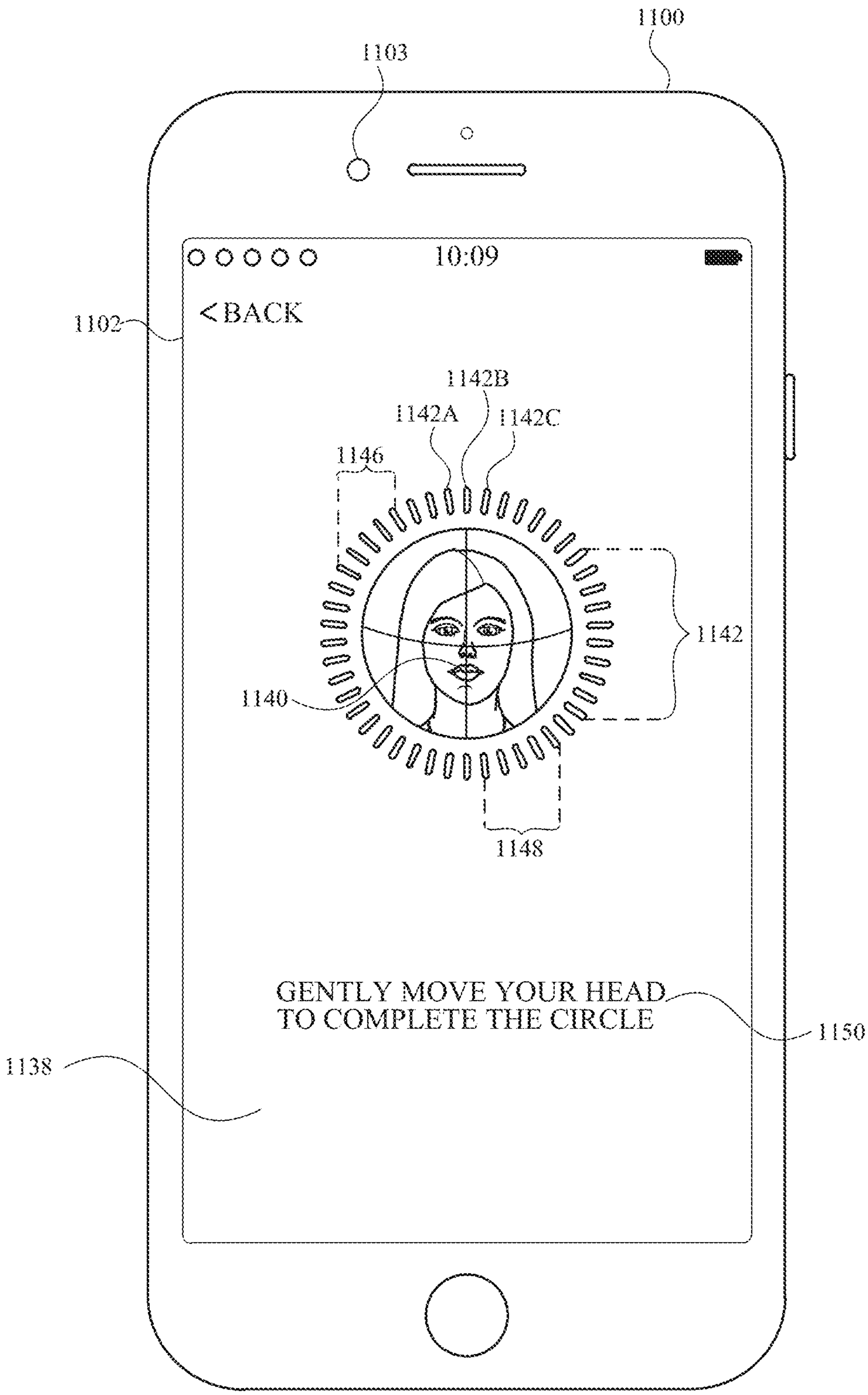

In some examples, after completion of the enrollment process described above with respect to FIGS. 11B-11G, a second iteration of facial enrollment is performed. As shown in FIG. 11L, in response to detecting activation of continue affordance 1136, device 1100 displays second face enrollment interface 1138. In the example of FIG. 11L, second face enrollment indicator includes second user facial image 1140 and second enrollment progress meter 1142. In some examples, second user facial image 1140 is a representation of the field of view of biometric sensor 1103 that has a similar visual treatment to user facial image 1106 (e.g., second user facial image 1140 is a live preview of image data captured by biometric sensor 1103 displayed as a digital viewfinder). In some examples, device 1100 displays a second orientation guide 1144 superimposed (e.g., overlaid on) second user facial image 1140. In the example of FIG. 11L, second orientation guide 1144 has a similar visual treatment to orientation guide 1108 (e.g., second orientation guide 1144 includes a number of curved lines that appear to extend out of the plane of display 1102 into a virtual z dimension). In some examples, second enrollment progress meter 1142 is comprised of a set of progress elements (e.g., 1142*a*, 1142*b*, 1142*c*) that are spaced around second user facial image 1140. In some examples, portions of second enrollment progress meter 1142 (e.g., meter portions 1146 and 1148) optionally correspond to particular orientations or portions of the user's face with respect to biometric sensor 1103. In some examples, some or all of the meter portions optionally include a greater number of progress elements than the respective portions of enrollment progress meter 1110. By way of example, each portion of second progress meter 1142 corresponds to the same facial orientation or angular view of the user's face as the corresponding portions of progress meter 1140 (e.g., meter portion 1146 corresponds to the same facial orientation as meter portion 1114 in FIGS. 11B-11H). In some examples, upon display of second enrollment interface 1138, device 1100 sets the visual state of progress elements in enrollment progress meter 1142 to the "unenrolled" state described above (e.g., enrollment progress from the first enrollment scan is reset). In the example of FIG. 11L, second face enrollment interface also includes text prompt 1150, which instructs the user to move (e.g., rotate and/or tilt) their head in a circular motion during the second enrollment process.

In some examples, as the second iteration of facial enrollment is performed, device 1100 updates the display of second user facial image 1140, second progress meter 1142, and orientation guide 1144 in response to changes in the orientation of the user's face with respect to biometric sensor 1103. For example, the user repeats the same (or similar) motion of his or her face that were performed in the first iteration of enrollment, and device 1100 updates the display of these elements of second user interface 1138 in the manner (or similar manner) described above with respect to FIGS. 11B-11H.

Figure 11M:
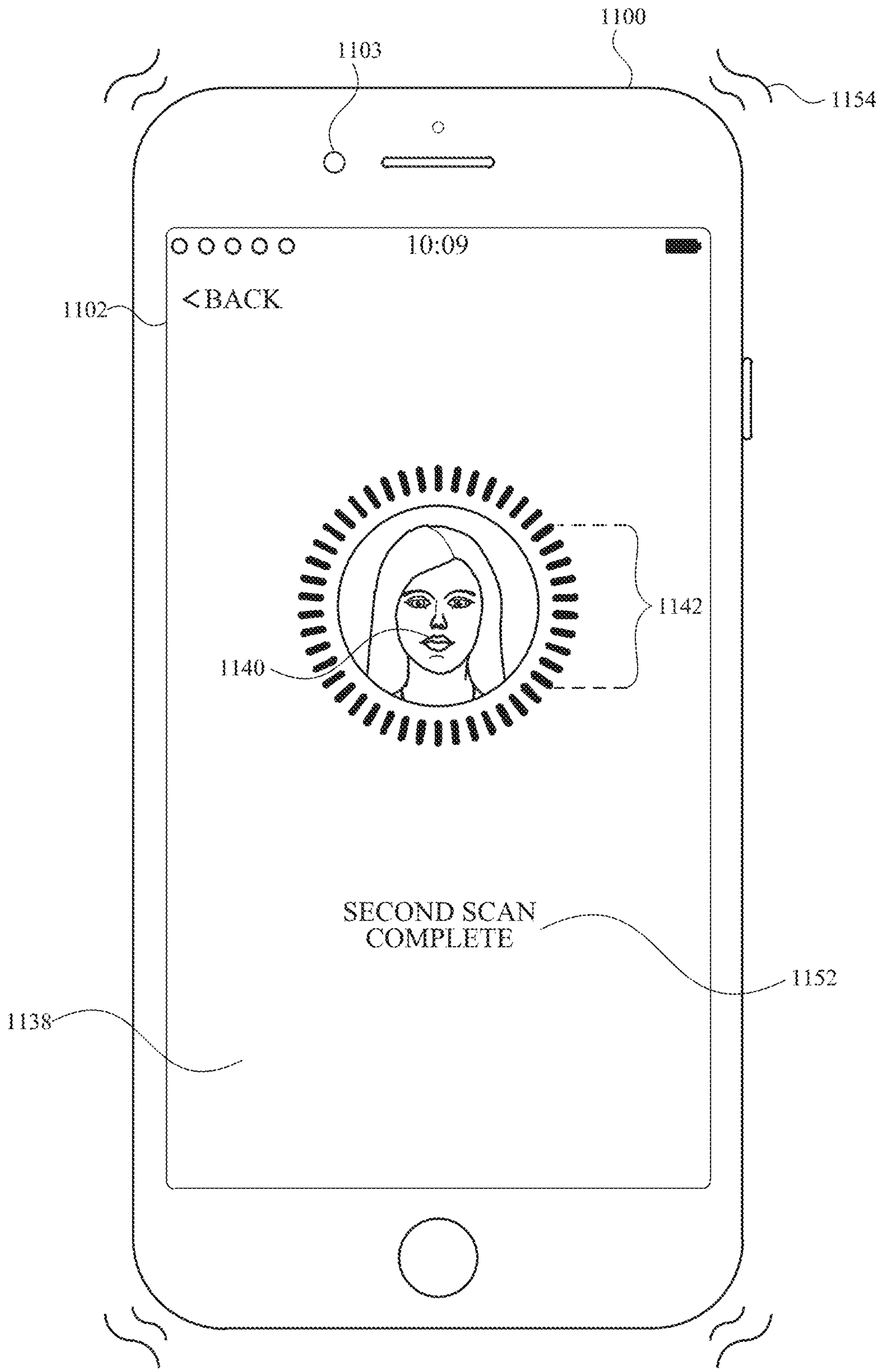

FIG. 11M illustrates second face enrollment interface 1128 after the second iteration of enrollment is complete (e.g., after image data of several angular views of the user's face have been captured by biometric sensor 1103). In the example of FIG. 11M, device 1100 has transitioned the display of all progress elements in second enrollment meter 1142 to the "enrolled" state described above. For example, the color of each progress element has been changed to green to indicate successful enrollment. In the example of FIG. 11M, device 1100 displays text prompt 1152 indicating that the second scan of the user's facial features is complete. In some examples, device 1100 issues audio and/or tactile notification 1154 to provide an additional indication that the second scan is complete. In some examples, audio and/or tactile notification 1154 is the same as tactile notification 1126 that is issued to indicate completion of the first scan. In some examples, the audio and/or tactile output that indicates a successful second scan of the user's facial features is the same as an audio and/or tactile output that is used to indicate successful face authentication at the device. In the example of FIG. 11M, device 1100 continues to display second user facial image 1140. In some examples, second user facial image 1140 is part of a live preview of the digital viewfinder. In other examples, device 1100 displays a single (e.g., still) user image captured during the enrollment process. In the example of FIG. 11M, device 1100 ceases to display second orientation guide 1144 once the scan is complete.

Figure 11N:
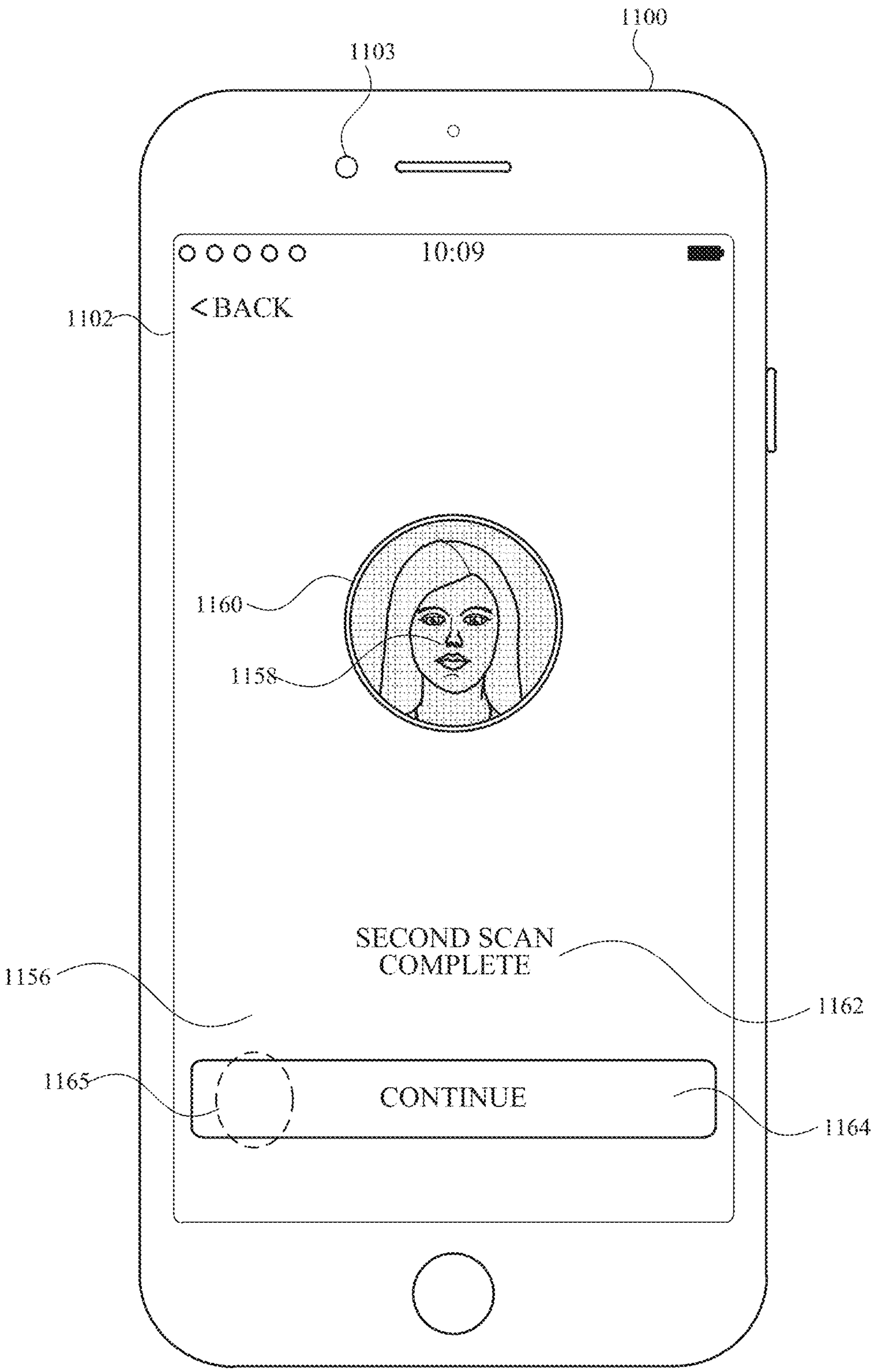

In the example of FIG. 11N, after issuing the notification indicating completion of the second scan, device 1100 displays second scan completion interface 1156. Second scan completion interface 1156 includes user facial image 1158 and second success-state meter 1160. In the example of FIG. 11N, user facial image 1158 is blurred, faded, darkened or otherwise obscured to indicate that additional image data is no longer being collected as part of the second facial scan. In some examples, second success-state meter 1160 is a solid, continuous green circle surrounding user facial image 1158 that provides a visual indication that the first scan is complete (e.g., similar to success-state meter 1128). To provide a further visual notification, second scan completion interface 1156 also includes text prompt 1162 (e.g., a second scan completion message). Second scan completion interface 1156 also includes continue affordance 1164. In some examples, while displaying second scan completion interface 1156, device 1100 detects activation (e.g., selection) of continue affordance 1164 (e.g., by way of user input 1165). In some examples where display 1102 is touch-sensitive, the activation is a tap, swipe or other gesture on the display surface substantially on continue affordance 1164. In other examples, activation of continue affordance 1164 is a keyboard input or activation of the affordance with a focus selector (e.g., a mouse cursor). In the example of FIG. 11N, user facial image 1158 is blurred, faded, darkened or otherwise obscured to indicate that additional image data is no longer being collected during the second facial scan.

In the example of FIG. 11O, in response to detecting activation of continuation affordance 1164, device 1100 displays enrollment completion interface 1166. As shown in FIG. 11O, enrollment completion interface 1166 includes biometric authentication glyph 1168. For example, biometric authentication glyph is, optionally, a line drawing of all or part of a face (e.g., a stylized face graphic). In the example of FIG. 11O, enrollment completion interface 1166 also includes text prompt 1170 indicating that the enrollment process is complete and face authentication at the device is set-up and/or enabled. In some examples, enrollment completion interface 1166 also includes completion affordance 1172, activation of which causes device 1100 to exit face authentication set-up. In some examples, enrollment completion interface 1166 does not include facial image 1158.

FIG. 12A-12B is a flow diagram illustrating a method for registering a biometric feature of the user on an electronic device in accordance with some examples. Method 1200 is performed at a device (e.g., 100, 300, 500, 1100) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric features by the one or more biometric sensors. Some operations in method 2000 are, optionally, combined, the orders of some operations are, optionally, changed, and some operations are, optionally, omitted.

As described below, method 1200 provides an intuitive way to register a biometric feature of the user on an electronic device. The method reduces the cognitive burden on a user for enrolling a biometric feature on the device, thereby creating a more efficient human-machine interface. For battery-operated computing devices, enabling a user to enroll a biometric feature faster and more efficiently conserves power and increases the time between battery charges The device displays (1202), on the display, a biometric enrollment interface (e.g., 1104). Displaying the biometric enrollment interface includes displaying (1204) a representation of a biometric feature (e.g., 1106). For example, the representation of the biometric feature is, optionally, a representation of a face, fingerprint, iris, handprint, or other physical biometric feature that can be used to distinguish one person from another person in a field of view of one or more cameras of the device (e.g., a representation of the head of a user of the device). The representation of the biometric feature has an orientation determined based on an alignment of the biometric feature to one or more biometric sensors of the device (e.g., 1103, based on camera data that includes the user's head positioned in the field of view of one or more of the cameras).

In some examples, the device displays (1206) a digital viewfinder (e.g., live preview of image data containing 1106) including a representation of a field of view of the one or more cameras (e.g., 1103). For example, in some examples, the device displays a live preview of image data captured by the one or more cameras. In some examples, the representation of the field of view of the one or more cameras has background content removed. The background optionally is determined based on depth information captured by the one or more cameras (e.g., removing the background content optionally includes removing any background or simply vignetting). In some examples, the device does not perform any background removal.

Displaying the biometric enrollment interface also includes concurrently displaying (1208) a progress indicator (e.g., 1110) including a first progress-indicator portion (e.g., 1114, 1116, 1118, 1120, or 1122, a first set of objects (e.g., 1110*a*, 1110*b*, and 1110*c*, or 1116*a* and 1116*b*, or 1118*a* and 1118*b*) spaced around the representation of the biometric feature such as a first set of tick marks) at a first position on the display relative to the representation of the biometric feature (e.g., 1106) and a second progress-indicator portion (e.g., 1114, 1116, 1118, 1120, or 1122 a second set of objects (e.g., 1110*a*, 1110*b*, and 1110*c*, or 1116*a* and 1116*b*, or 1118*a* and 1118*b*) spaced around the representation of the biometric feature such as a second set of tick marks) at a second position on the display relative to the representation of the biometric feature (e.g., 1106). The representation of the biometric feature (e.g., 1106) is displayed between the first position and the second position on the display. Displaying the progress indicator during enrollment in this manner encourages the user to look at the display of the electronic device during the enrollment to improve the ability to detect when gaze is directed at the display, and thus whether or not the user is paying attention to the device. Encouraging the user to look at the display of the electronic device enhances the operability of the device and makes the user-device interface more efficient (e.g., by ensuring that the gaze of the user is directed at the display and thereby ensuring that the biometric feature of the user is properly enrolled) which, additionally, reduces power usage and improves battery life of the device by enabling the user to use the device more quickly and efficiently.

In some examples, the progress indicator includes (1210) a plurality of progress-indicator portions (e.g., 1114, 1116, 1118, 1120, 1122, each progress indicator portion includes one or more progress elements (e.g., 1110*a*, 1110*b*, 1110*c*, 1116*a*, 1116*b*, 1118*a*, 1118*b*)). In some examples, the plurality of progress-indicator portions include the first progress-indicator portion (e.g., 1114, 1116, 1118, 1120, or 1122) and the second progress-indicator portion (e.g., 1114, 1116, 1118, 1120, or 1122), and the plurality of progress-indicator portions surrounds at least a portion of the representation of the biometric feature (e.g., 1106). In some examples, one or more of the plurality of progress indicator portions includes (1212) a plurality of respective progress elements (e.g., 1110*a*, 1110*b*, 1110*c*, 1118*a*, 1118*b*). In some examples, the progress indicator optionally includes a set of one or more display elements (e.g., 1110*a*, 1110*b*, 1110*c*, 1116*a*, 1116*b*, 1118*a*, 1118*b*) arranged around the representation of the biometric feature (e.g., 1106). For example, these display elements optionally is a circle of radially extending lines indicating progress of enrollment lines ("ticks") around the user's face. The lines optionally indicate the direction in which respective changes of orientation of the biometric feature are sufficient for enrollment the biometric feature (e.g., point upward to get upper lines to move, even though bottom of biometric feature is being scanned). In some examples, a first set of lines correspond to the first progress-indicator portion (e.g., 1114, 1116, 1118, 1120, or 1122) and a second set of lines correspond to the second progress-indicator portion (e.g., 1114, 1116, 1118, 1120, or 1122). For example, a predetermined number of ticks (e.g., 8) are associated with each portion of the progress indicator.

In some examples, the first progress-indicator portion (e.g., 1114, 1116, 1118, 1120, or 1122) indicates (1214) the enrollment status of a first portion of the biometric feature that is detected by (e.g., visible to) the one or more biometric sensors (e.g., 1103) when the biometric feature (e.g., the user's face) is turned toward the first progress-indicator portion (e.g., 1114, 1116, 1118, 1120, or 1122). For example, the upper right portion of the progress indicator (e.g., 1120) changes in appearance when the user's face turns toward the upper right portion of the device to enroll the lower left portion of the user's face. Likewise, in some examples, the second progress-indicator portion (e.g., 1114, 1116, 1118, 1120, or 1122) indicates the enrollment status of a second portion of the biometric feature, different from the first portion of the biometric feature, that is detected by (e.g., visible to) the one or more biometric sensors (e.g., 1103) when the biometric feature (e.g., the user's face) is turned toward the first progress-indicator portion (e.g., 1114, 1116, 1118, 1120, or 1122). For example, the lower right portion of the progress indicator (e.g., 1118) changes in appearance when the user's face turns toward the lower left portion of the device to enroll the upper right portion of the user's face.

In some examples, displaying (1202) the biometric enrollment interface (e.g., 1104) further includes displaying a prompt (e.g., 1112) to move the biometric feature. In some examples, the displayed prompt optionally is accompanied by a tactile and/or auditory prompt. In some examples, the types of responses are provided are based on settings of the electronic device and/or manually controlled by a user. Providing a prompt with instructions on how to properly move the biometric feature provides feedback to the user that allows them to quickly recognize and execute the required movements, reducing the amount of time required to complete the enrollment process. Providing improved visual prompting regarding proper inputs required for biometric enrollment therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device displays a prompt (e.g., 1108) indicating a direction of movement. In some examples, the prompt is an orientation guide (e.g., 1108) overlaid on biometric enrollment interface (e.g., 1104). In some examples, the prompt is overlaid on the representation of the biometric feature (e.g., 1106). In some examples, the device overlays a three-dimensional object (e.g., 1108) on the representation of the biometric feature (e.g., 1106). For example, the three-dimensional object optionally is an arc that extends into a virtual z-dimension and moves as the user's head is rotated. In some examples, the three-dimensional object (e.g., 1108) includes a plurality of arcs that extend into a virtual z-dimension (e.g., two arcs that cross each other at a point in front of the user's face). In some examples, the three-dimensional object (e.g., 1108) is emphasized when the user is moving (e.g., the three-dimensional object darkens or displays a fading trail as it moves with the movement of the biometric feature), which emphasizes the three-dimensional object when it is in motion and reduces the emphasis on the three-dimensional object relative to the representation of the biometric feature when the biometric feature is not in motion.

While concurrently displaying the representation of the biometric feature (e.g., 1106) and the progress indicator (e.g., 1110), the device detects (1216) a change in the orientation of the biometric feature relative to the one or more biometric sensors (e.g., 1103).

In some examples, in response to detecting the change in the orientation of the biometric feature relative to the one or more biometric sensors (1218), the device rotates the prompt (e.g., 1108) in accordance with the change in the orientation of the biometric feature to the one or more biometric sensors (e.g., 1103). In some examples, rotating the prompt includes rotating the three-dimensional object (e.g., 1108) at least partially into a virtual z-dimension of the display. Rotating the orientation guide overlaid on the representation of the biometric feature provides the user with feedback about the orientation of his or her biometric features relative to the biometric sensors of the device in three-dimensional space, enabling the user to place his or her biometric features more quickly move the biometric feature through the required range of orientations during the enrollment process. Providing improved visual feedback regarding the orientation of the biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, in response to detecting the change in the orientation of the biometric feature to the one or more biometric sensors, the device updates (1220) the representation of the biometric feature (e.g., 1106) in accordance with the change in the orientation of the biometric feature relative to the one or more biometric sensors (e.g., 1103). For example, in some examples, the orientation of the representation of the biometric feature (e.g., 1106) is changed without regard to whether enrollment criteria are met. In some examples, the orientation of the representation of the biometric feature (e.g., 1106) is only changed if the enrollment criteria are met. Updating the orientation of the displayed representation of the biometric feature provides the user with feedback about the orientation of his or her biometric features relative to the biometric sensors of the device, enabling the user to more quickly move the biometric feature through the required range of orientations during the enrollment process. Providing improved visual feedback regarding the orientation of the biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In accordance with a determination that the change in the orientation of the biometric feature meets enrollment criteria for a first portion of the biometric feature that corresponds to the first progress-indicator portion (e.g., 1114, 1116, 1118), the device updates (1222) one or more visual characteristics of the first progress-indicator portion. For example, the determining the change in the orientation of the biometric feature that meets enrollment criteria optionally is based on determining that the image data includes data corresponding to a first angular view of the face of the user from a first perspective angle (e.g., a bottom perspective of the face, such as when the user's face is tilted up). Updating the visual state of a portion of the progress meter corresponding to the current orientation of the biometric feature allows the user to recognize that a portion of the biometric feature is properly oriented for enrollment. This in turn indicates to the user how to change the orientation of the biometric feature to enroll other portions that correspond to other respective parts of the progress meter, reducing the amount of time required to complete the enrollment process. Providing improved visual feedback regarding the enrollment state of a biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the enrollment criteria for the first portion of the biometric feature that corresponds to the first progress-indicator portion (e.g., 1114, 1116, 1118, 1120, or 1122) includes a requirement that the first portion of the biometric feature is oriented relative to the one or more biometric sensors (e.g., 1103) in a predetermined manner (e.g., that the user's face is looking toward the first progress-indicator portion).

In some examples, the enrollment criteria for a first portion of the biometric feature that corresponds to the first progress-indicator portion (e.g., 1114, 1116, 1118, 1120, or 1122) include a requirement that the first portion of the biometric feature has not been enrolled.

In some examples, the enrollment criteria for a first portion of the biometric feature that corresponds to the first progress-indicator portion (e.g., 1114, 1116, 1118, 1120, or 1122) includes (1224) a requirement that the first portion of the biometric feature change in orientation (e.g., rotate) relative to the one or more biometric sensors (e.g., 1103) by at least a threshold amount. In some examples, enrollment of the first portion of the biometric feature requires that the biometric feature move (rotate) sufficiently such that the first portion can be properly captured by the one or more biometric sensors (e.g., 1103).

In some examples, updating one or more visual characteristics of the first progress-indicator portion (e.g., 1114, 1116, 1118, 1120, or 1122) includes updating the one or more visual characteristics of the first progress-indicator portion in a first manner (e.g. color) based on an enrollment state of the first portion of the biometric feature and updating the one or more visual characteristics of the first progress-indicator portion in a second manner (e.g., size or length of progress elements) based on the alignment of the biometric feature to the one or more biometric sensors (e.g., 1103) of the device. For example, the first progress-indicator portion (e.g., 1114, 1116, 1118, 1120, or 1122) changes from black to green when a portion of the biometric feature that corresponds to the first-progress indicator portion has been enrolled and one or more lines (e.g., 1110*a*, 1110*b*, 1110*c*, 1116*a*, 1116*b*, 1118*a*, 1118*b*) corresponding in the first progress-indicator portion are elongated when the portion of the biometric feature that corresponds to the first-progress indicator portion are facing the one or more biometric sensors (e.g., 1103). In some examples, updating the one or more visual characteristics of the first progress-indicator portion (e.g., 1114, 1116, 1118, 1120, or 1122) in a second manner is based on the direction of change in the orientation of the biometric feature relative to the one or more biometric sensors (e.g., 1103). In some examples, updating in the second manner is performed additionally or alternatively based on the rate of change of the orientation of the biometric feature relative to the one or more biometric sensors. Changing a portion of the progress meter corresponding to the current orientation of the biometric feature from a first visual state to a second visual state allows the user to quickly recognize that a portion of the biometric feature is properly oriented for enrollment. This can in turn indicate to the user how to change the orientation of the biometric feature to enroll other portions that correspond to other respective parts of the progress meter, which reduces the amount of time required to complete the enrollment process. Providing improved visual feedback regarding the enrollment state of a biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device updates the one or more visual characteristics of the first progress-indicator portion (e.g., 1114, 1116, 1118, 1120, or 1122) based on a rate of change in the orientation of the biometric feature relative to the one or more biometric sensors (e.g., 1103). In some examples, updating the one or more visual characteristics in this manner includes modifying the color of the first progress-indicator portion based on the rate of change in the orientation of the biometric feature.

In some examples, the first progress indicator portion (e.g., 1114, 1116, 1118, 1120, or 1122) includes a plurality of display elements in a respective order (e.g., 1110*a*, 1110*b*, 1110*c*, 1114*a*, 1116*a*, 1116*b*, 1118*a*, 1118*b*). In accordance with a determination that the change in the orientation of the biometric feature relative to the one or more biometric sensors (e.g., 1103) is a change in a first direction (e.g. a clockwise rotation), the device optionally changes an appearance of the display elements starting from a first end of the respective order (e.g., starting at 1118*a*). For example, the device optionally starts to elongate lines in the first progress-indicator portion starting from a first side of the respective order moving to second side of the respective order (to 1114*a*). In accordance with a determination that the change in the orientation of the biometric feature relative to the one or more biometric sensors is a change in a second direction (e.g. counter-clockwise rotation), the device optionally changes an appearance of the display elements (e.g., 1110*a*, 1110*b*, 1110*c*, 1114*a*, 1116*a*, 1116*b*, 1118*a*, 1118*b*) starting from a second end of the respective order that is different from the first end of the respective order (e.g., starting from 1114*a*). For example, the device optionally elongates lines in the first progress-indicator portion starting from the second side of the respective order moving to the first side of the respective order (e.g., to 1118*a*). In some examples, a similar approach is taken when changing an appearance of the second progress-indicator portion (e.g., 1114, 1116, 1118, 1120, or 1122) or other progress indicator portions.

In some examples, the device updates the one or more visual characteristics of the first progress-indicator (e.g., 1114, 1116, 1118, 1120, or 1122) from a first state (e.g., "unenrolled") to a second state (e.g., "enrolling") that indicates that the first progress-indicator portion meets the enrollment criteria. For example, the device enlarges, grows or changes the color of display elements in a portion of the progress indicator (e.g., 1114) toward which the biometric feature is currently oriented, such as the portion of the progress indicator toward which the user's face is pointed (e.g., orientation of the 1106 in FIG. 11B).

In some examples, after updating one or more visual characteristics of the first progress-indicator portion, the device optionally detects a change in orientation of the biometric feature relative to the one or more biometric sensors so the biometric feature no longer meets enrollment criteria for a first portion of the biometric feature that corresponds to the first progress-indicator portion (e.g., 1114, 1116, 1118, 1120, or 1122). In response to detecting the change in orientation of the biometric feature relative to the one or more biometric sensors, the device optionally updates (1226) the one or more visual characteristics of the first progress-indicator portion from the second state (e.g., "enrolling") to a third state (e.g., "enrolled") that indicates that the first portion of the biometric feature has been enrolled but no longer meets the enrollment criteria. For example, the device optionally changes the appearance of the progress-indication portions (e.g., the color or size) a second time when the user's face moves away from them, and optionally transitions the first portion of the progress indicator (e.g., 1114*a*) from "tilted toward" appearance to enrolled appearance when user orients biometric feature away from the portion of the progress indicator (e.g., orientation of 1106 in FIG. 11D). One visual property of the progress indicator (e.g., color) optionally indicates the enrollment state (e.g., blue for "tilted toward" green for "enrolled" grey for "unenrolled"), while another visual property of the progress indicator (e.g., length of lines) indicates direction of orientation of biometric feature. Progress optionally advances around progress indicator (e.g., 1110) based on direction and speed of change of tilting. For example, progress indicator lines (e.g., 1110*a*, 1110*b*, 1110*c*, 1114*a*, 1116*a*, 1116*b*, 1118*a*, 1118*b*) optionally bulge based on the direction and speed of movement of the biometric feature and/or change color based on direction and speed of movement of biometric feature. Changing a portion of the progress meter corresponding to the current orientation of the biometric feature from a second visual state to a third visual state allows the user to quickly recognize that a portion of the biometric feature has been successfully enrolled. This also indicates to the user that they no longer need to move the biometric feature into that orientation during the enrollment process, which directs the user's attention to enrolling other portions of the biometric feature, reducing the amount of time required to complete the enrollment process. Providing improved visual feedback regarding the enrollment state of a biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In accordance with a determination that the change in the orientation of the biometric feature meets enrollment criteria for a second portion of the biometric feature that corresponds to the second progress-indicator portion (e.g., 1114, 1116, 1118, 1120, or 1122), the device updates (1228) one or more visual characteristics of the second progress-indicator portion. For example, determining the change in the orientation of the biometric feature that meets enrollment criteria optionally are based on determining that the image data includes data from the face of the user corresponding to a second, different angular view of the face of the user from a second, different perspective angle (e.g., a left-side perspective of the face, such as when the user's face is tilted to the right). In some examples, updating the visual characteristics of the second progress-indicator portion (e.g., 1114, 1116, 1118, 1120, or 1122) optionally include some or all of the steps described above in connection with updating the visual characteristics of the first progress-indicator portion. Updating the visual state of a second portion of the progress meter corresponding to the current orientation of the biometric feature allows the user to recognize that a second portion of the biometric feature is properly oriented for enrollment. This in turn indicates to the user how to change the orientation of the biometric feature to enroll other portions that correspond to other respective parts of the progress meter, reducing the amount of time required to complete the enrollment process. Providing improved visual feedback regarding the enrollment state of a biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, in accordance with a determination that enrollment-completion criteria are met (e.g., all portions of the biometric feature have been enrolled, 1110 in FIG. 11E), the device outputs an indication (e.g., 1124, 1126) that enrollment of the biometric feature is complete.

For example, the device optionally updates one or more visual characteristics of the progress indicator (e.g., 1110, e.g., merge a plurality of the progress indicator display elements (e.g., 1110*a*, 1110*b*, 1110*c*, 1114*a*, 1116*a*, 1116*b*, 1118*a*, 1118*b*) into a continuous shape such as a circle). In some examples, prior to detecting a change in the orientation of the biometric feature relative to the one or more biometric sensors, the first progress-indicator portion (e.g., 1114, 1116, 1118, 1120, or 1122) and the second progress-indicator portion (e.g., 1114, 1116, 1118, 1120, or 1122) are visually discrete. In this case, updating one or more visual characteristics of the progress indicator includes visually merging the first progress-indicator portion and the second progress-indicator portion.

In some examples, the device modifies the representation of the biometric feature (e.g., 1106, 1132). In some examples, the representation of the biometric feature is blurred, faded, darkened and/or otherwise obscured to indicate that additional information about the biometric feature is no longer being collected as part of the enrollment process.

In some examples, the device displays a confirmation affordance (e.g., 1136, 1164) and selection of the confirmation of the causes the electronic device to display a completion interface (e.g., 1166). In some examples, the device displays a simulation of a representation of the biometric feature (e.g., 1168). In some examples, the simulation of the representation of the biometric feature is two dimensional. In some examples, the simulation of the representation of the biometric feature is three-dimensional.

In some examples, the device outputs an indication (e.g., 1126, 1154, 1122, 1162, 1170) that an enrollment procedure is complete (e.g., a tactile output). In some examples, the device outputs a tactile output (e.g., 1126, 1154) that indicates successful enrollment of the biometric feature. In some examples, the tactile output that indicates successful enrollment of the biometric feature is the same as a tactile output that is used to indicate successful authentication with the biometric feature.

In some examples, after outputting an indication that enrollment of the biometric feature is complete, the device displays a second biometric enrollment interface (e.g., 1138). In some examples, after completion of first enrollment, a second iteration of enrollment is performed. This second iteration of enrollment is optionally performed in response to a selection of an affordance (e.g., 1136). Performing a second scan of the user's biometric features allows the device to capture additional biometric data corresponding to different orientations or positions of the biometric feature that may not have been recorded during the first iteration of enrollment. Performing a second scan of the user's biometric features therefore allows for more efficient and/or secure biometric authorization at the device, enhancing the operability of the device and making the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In the second biometric enrollment interface, the device displays a second representation of a biometric feature (1140). The second representation of the biometric feature optionally has an orientation determined based on an alignment of the biometric feature to one or more biometric sensors of the device (e.g., 1103). In some examples, the second representation of the biometric feature is a representation of a field of view of the one or more cameras that has a similar visual treatment to the first representation of the biometric feature (e.g., 1106).

In the second biometric enrollment interface, the device concurrently displays a second progress indicator (e.g., 1142) including a third progress-indicator portion (e.g., a first set of objects spaced around the representation of the biometric feature such as 1146) at the first position on the display relative to the representation of the second biometric feature (e.g., 1140) and a fourth progress-indicator portion (e.g., a second set of objects spaced around the representation of the biometric feature such as 1148) at the second position on the display relative to the second representation of the biometric feature (e.g., 1140). The second representation of the biometric feature is displayed between the third position and the fourth position on the display. In some examples, the third progress-indicator portion corresponds to a same portion of the biometric feature as the first progress-indicator portion (e.g., 1114). In some examples, the fourth progress-indicator portion corresponds to a same portion of the biometric feature as the second progress-indicator portion (e.g., 1118).

In some examples, an enrollment state of the first progress-indicator portion (e.g., 1114, 1116, 1118, 1120 or 1122) does not correspond to an enrollment state of the third progress-indicator portion (e.g., 1146 or 1148).

In some examples, the first progress-indicator portion of the progress indicator includes a first number of progress elements (e.g., 1114*a*) and the third progress-indicator portion of the second progress indicator includes a second number of progress elements (e.g., 1142*a*, 1142*b*, 1142*c*) that is different (e.g., greater) than the first number. In some examples, a plurality (or all) of the progress-indicator portions (e.g., 1146, 1148) in the second progress indicator (e.g., 1142) include more progress elements than the corresponding progress-indicator portions (e.g., 1114, 1118) in the first progress indicator (e.g., 1110).

In some examples, while concurrently displaying the second representation of the biometric feature (e.g., 1140) and the second progress indicator (e.g., 1142), the device detects a second change in the orientation of the biometric feature relative to the one or more biometric sensors (e.g., 1103). In response to detecting the second change in the orientation of the biometric feature relative to the one or more biometric sensors, and in accordance with a determination that the change in the orientation of the biometric feature meets enrollment criteria for the first portion of the biometric feature, the device updates one or more visual characteristics of the third progress-indicator portion (e.g., 1146 or 1148). In accordance with a determination that the change in the orientation of the biometric feature meets enrollment criteria for the second portion of the biometric feature, the device updates one or more visual characteristics of the fourth progress-indicator portion (e.g., 1146 or 1148). For example, in order to advance through the second enrollment step of the enrollment process the user repeats the changes in orientation of the biometric feature that were used to enroll the biometric feature in the first enrollment step of the enrollment process in the second enrollment step of the enrollment process. Thus, updating visual characteristics of the third and fourth progress-indicator portions optionally include steps similar to those described above in connection with the first and second progress-indicator portions (e.g., 1114, 1116, 1118, 1120 or 1122).

In some examples, after detecting the second change in the orientation of the biometric feature relative to the one or more biometric sensors (e.g., 1103), and in accordance with a determination that a second set of enrollment-completion criteria are met (e.g., all portions of the biometric feature have been enrolled), the device outputs a second indication (e.g., 1162, 1163) that enrollment of the biometric feature is complete. In some examples, enrollment does not actually take place; rather, the process is emulated visually. In some examples, the second indication is a visual, auditory, and/or tactile output (e.g., 1163) indicating that enrollment of the biometric feature is complete. In some examples, the second indication is the same as the indication provided in accordance with a determination that the first set of enrollment-completion criteria are met (e.g., 1126).

Note that details of the processes described above with respect to method 1200 (e.g., FIGS. 12A-12B) are also applicable in an analogous manner to the methods described herein. For example, method 1200 optionally includes one or more of the characteristics of the various methods described herein with reference to methods 800, 1000, 1400, 1600, 1800, 2000, 2200, 2500, and 2700. For example, the face enrollment confirmation interface as described in method 1000 can be applied with respect to the face enrollment user interface (e.g., 1104). For another example, hints as described in method 1400 can be applied with respect to the face enrollment user interface (e.g., 1104). For another example, transitioning a progress meter as described in method 800 can be applied with respect to the enrollment progress meter (e.g., 1110). For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 12A-12B are, optionally, implemented by components depicted in FIGS. 1A-1B. For example, displaying operation 1202, displaying operation 1208, detecting operation 1216, updating operation 1222, and updating operation 1224 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13R illustrate exemplary user interfaces for registering a biometric feature on an electronic device (e.g., device 100, device 300, device 500, device 700, device 900, or device 1100), in accordance with some examples. The user interfaces in these figures are used to illustrate the processes described below, including the processes in FIG. 14.

FIG. 13A illustrates an electronic device 1300 (e.g., portable multifunction device 100, device 300, device 500, device 700, device 900, or device 1100). In the exemplary example illustrated in FIGS. 13A-13R, electronic device 1300 is a smartphone. In other examples, electronic device 1300 can be a different type of electronic device, such as a wearable device (e.g., a smartwatch). Electronic device 1300 has a display 1302, one or more input devices (e.g., touchscreen of display 1302, a button, a microphone), and a wireless communication radio. In some examples, the electronic device includes a plurality of cameras. In some examples, the electronic device includes only one camera. In some examples, the electronic device includes one or more biometric sensors (e.g., biometric sensor 903) which, optionally, include a camera, such as an infrared camera, a thermographic camera, or a combination thereof. In some examples, the one or more biometric sensors 1303 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

As illustrated in FIG. 13A, device 1300 displays a face enrollment user interface 1304 on display 1302. In some examples, face enrollment user interface 1304 is displayed after device 1300 detects successful alignment of the user's face relative its one or more cameras as described above in connection with FIGS. 9A-9Y. In some examples, face enrollment interface 1304 has similar visual characteristics as face enrollment interface 1104 described above in connection with FIG. 11A. Face enrollment interface 1304 includes user facial image 1306. In some examples, user facial image 1306 is an image of the user captured by one or more cameras on device 1300 (e.g., biometric sensor 1303). For example, user facial image 1306 is, optionally, a live preview of the image data captured by the one or more cameras (e.g., a digital viewfinder) that updates continuously as the field of view of the camera and/or the field of view's contents change. In some examples, background content is removed such that the only the user's face is visible in facial image 1306. Face enrollment interface 1304 also includes orientation guide 1308 that is superimposed (e.g., overlaid) on user facial image 1106. As described above in connection with FIGS. 7I-7K, orientation guide 1308 optionally is a set of curved lines (e.g., crosshairs) that extend into a virtual z-dimension (e.g., along an axis normal to the plane of the display) and intersect over the center of user facial image 1306. Thus, the curved lines of orientation guide 1308 optionally appears to bulge outwards relative to the plane of display 1302 to give a sense of the position of the user's head in three-dimensional space.

Face enrollment user interface 1304 includes enrollment progress meter 1310. Enrollment progress meter 1310 includes a set of display elements (e.g., progress elements 1310*a*, 1310*b*, and 1310*c*) that are arranged around user facial image 1306 and orientation guide 1308. In the example of FIG. 13A, the progress elements are a set of lines that extend radially outward from user facial image 1306 and are arranged in a circular pattern. In some examples, progress elements 1310*a*, 1310*b*, 1310*c*, etc. indicate an orientation of the user's face needed to enroll corresponding facial features. For example, progress elements in the upper portion of enrollment meter 1310 optionally move, fill in, elongate, and/or change color (e.g., in the manner of FIGS. 11B-11H) when the user's head is tilted upwards, which allows the one or more cameras on device 1300 to capture image data of the under-side of the user's face. In the example of FIG. 13A, device 1310 displays progress elements in enrollment progress meter 1310 in an unenrolled state (e.g., the progress elements are greyed out).

In the example of FIG. 13A, face enrollment interface 1304 includes text prompt 1312, which instructs the user to begin moving their face relative to the device in order to advance enrollment progress meter 1310 (e.g., enroll their facial features). In some examples, device 1300 displays text prompt 1312 before any portion of the user's face as been enrolled.

While displaying face enrollment interface 1304, device 1300 detects criteria for displaying enrollment prompts (e.g., hints). In some examples, the enrollment prompt criteria include a requirement that the user's face has moved less than a first threshold amount in a predetermined time period, as determined by biometric sensor 1303.

Figure 13B:
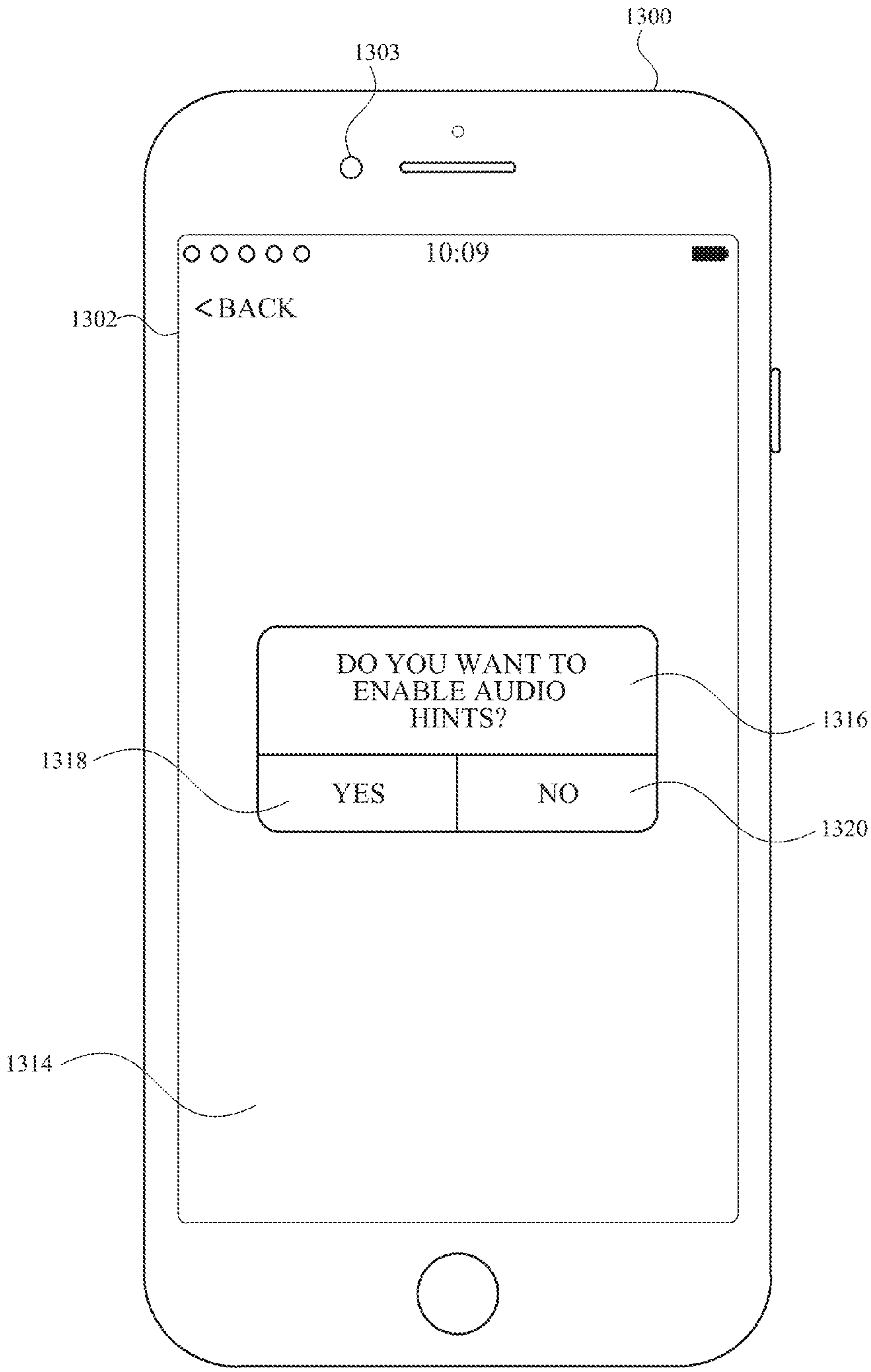
Figure 13C:
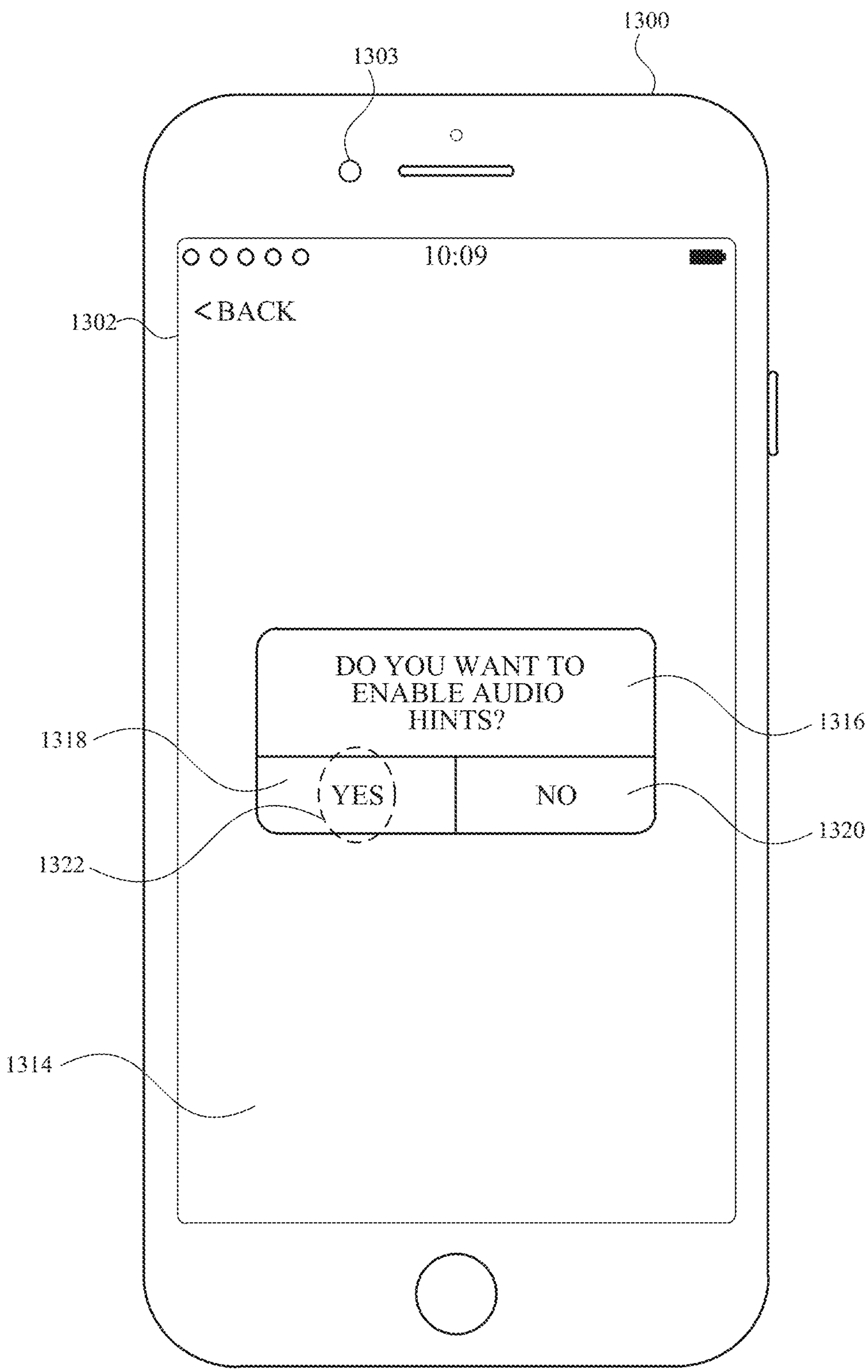

In some examples, in response to detecting that these enrollment hint criteria are met, device 1300 displays audio hint enablement interface 1314 as shown in FIGS. 13B and 13C. In the example of FIG. 13B, hint enablement interface 1314 includes text prompt 1316, informing the user of the option to either enable or disable audio hints. Accordingly, in some examples, hint enablement interface 1314 includes yes affordance 1318 and no affordance 1320. In some examples, in response to activation (e.g., selection) of no affordance 1320, device 1300 displays face enrollment interface 1304 a second time, allowing the user to proceed with enrollment of his or her facial features without the prompts and/or hints described below. In the example of FIG. 13C, however, device 1300 detects activation (e.g., selection) of yes affordance 1310. In some examples, the activation is a user input at contact area 1322 (e.g., a tap or swipe gesture).

Figure 13D:
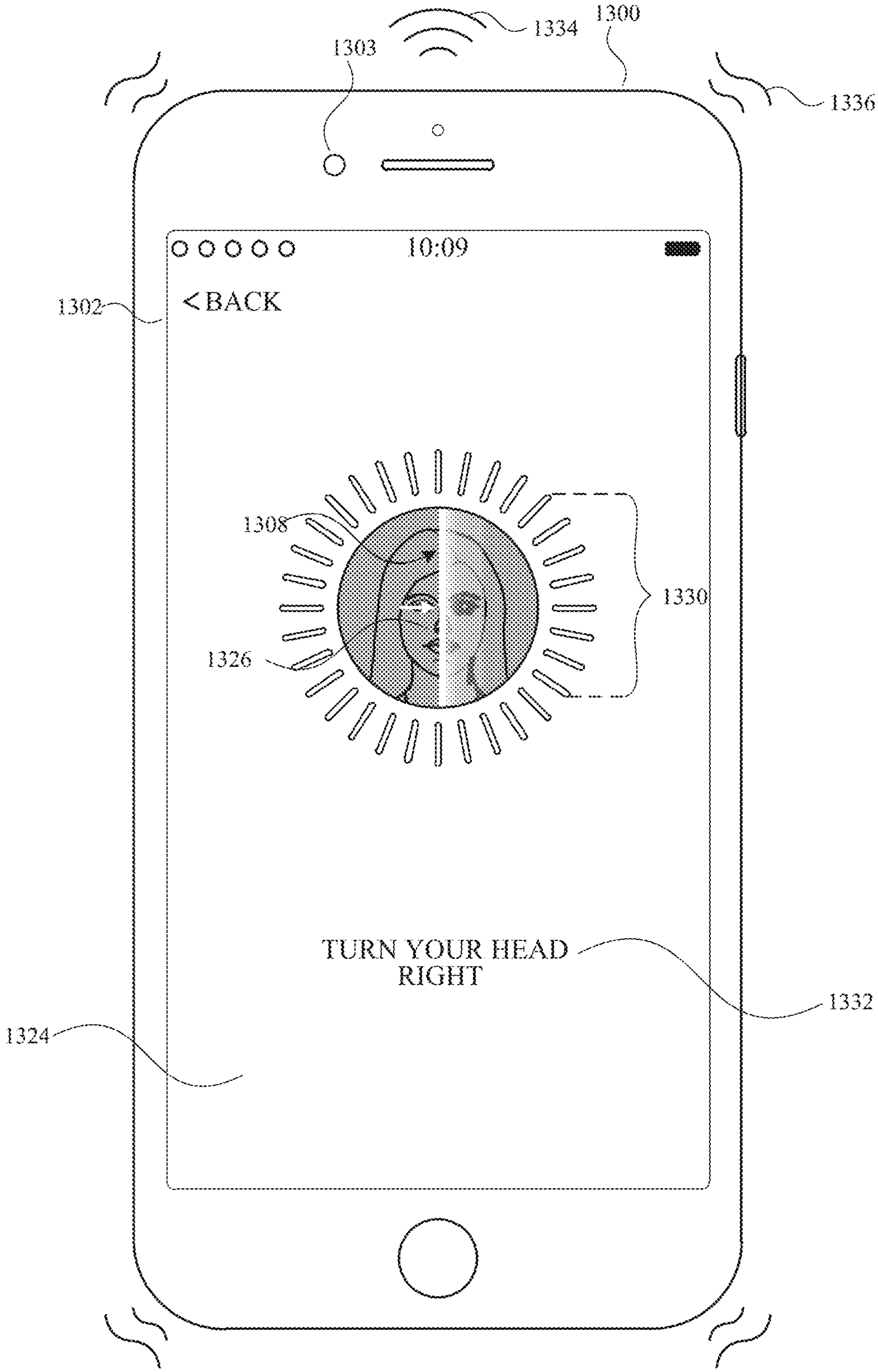

In response to detecting activation of yes affordance 1320, device 1300 displays hint-enabled enrollment interface 1324, for example, as illustrated in the example of FIG. 13D. In some examples, hint-enabled enrollment interface 1324 or one or more of the prompts described below are displayed whether or not the user has enabled audio hints (e.g., in response to detecting that the user's face has not moved sufficiently in a pre-determined period of time). In the example of FIG. 13D, hint-enabled enrollment interface 1324 includes user facial image 1326 that has similar or identical visual characteristics to user facial image 1306. For example, in some examples, user facial image 1326 is an image of the user captured by one or more cameras on device 1300 (e.g., biometric sensor 1303). For example, user facial image 1326 is, optionally, a live preview of the image data captured by biometric sensor 1303 (e.g., a digital viewfinder) that updates continuously as the field of view of the camera and/or the field of view's contents change. In some examples, hint-enabled enrollment interface 1324 includes visual movement prompt 1328 that is, optionally, overlaid (e.g., superimposed) on user facial image 1326. In the example of FIG. 13D, visual movement prompt 1328 includes an arrow element indicating a requested direction in which the user should move (e.g., rotate and/or tilt) his or her face in order to enroll a corresponding portion (e.g., angular view) of the face. In some examples, visual movement prompt 1328 is partially transparent such that the underlying user facial image 1326 is also visible. In the example of FIG. 13D, the arrow element of visual movement prompt 1328 instructs the user to move (e.g., rotate, tilt, or turn) their face to the right (e.g., towards a right portion of enrollment progress meter 1330 in order to enroll an angular view of the left side of the user's face).

In some examples, device 1300 displays text prompt 1332, providing written instructions to user that match visual movement prompt 1328. In the example of FIG. 13D, text prompt 1332 provides written instruction to the user to turn their head to the right (e.g., in the same direction indicated by the arrow element in visual prompt 1328). In some examples, device 1300 also issues audio output 1334 corresponding to visual movement prompt 1328 and/or text prompt 1328. For example, if a screen reader functionality is enabled, audio output 1334 is a verbal description of the requested movement (e.g., an auditory recitation of text prompt 1332). In some examples, audio output 1334 is issued instead of or in addition to visual movement prompt 1328 and/or text prompt 1332. In some examples, device 1300 also issues tactile output 1336 (e.g., a vibration, e.g., instead of or in addition to audio output 1334). In some examples, audio output 1334 and/or tactile output 1336 coincides with movement (e.g., an animation) of visual movement prompt 1328, as described in more detail below.

Figure 13E:
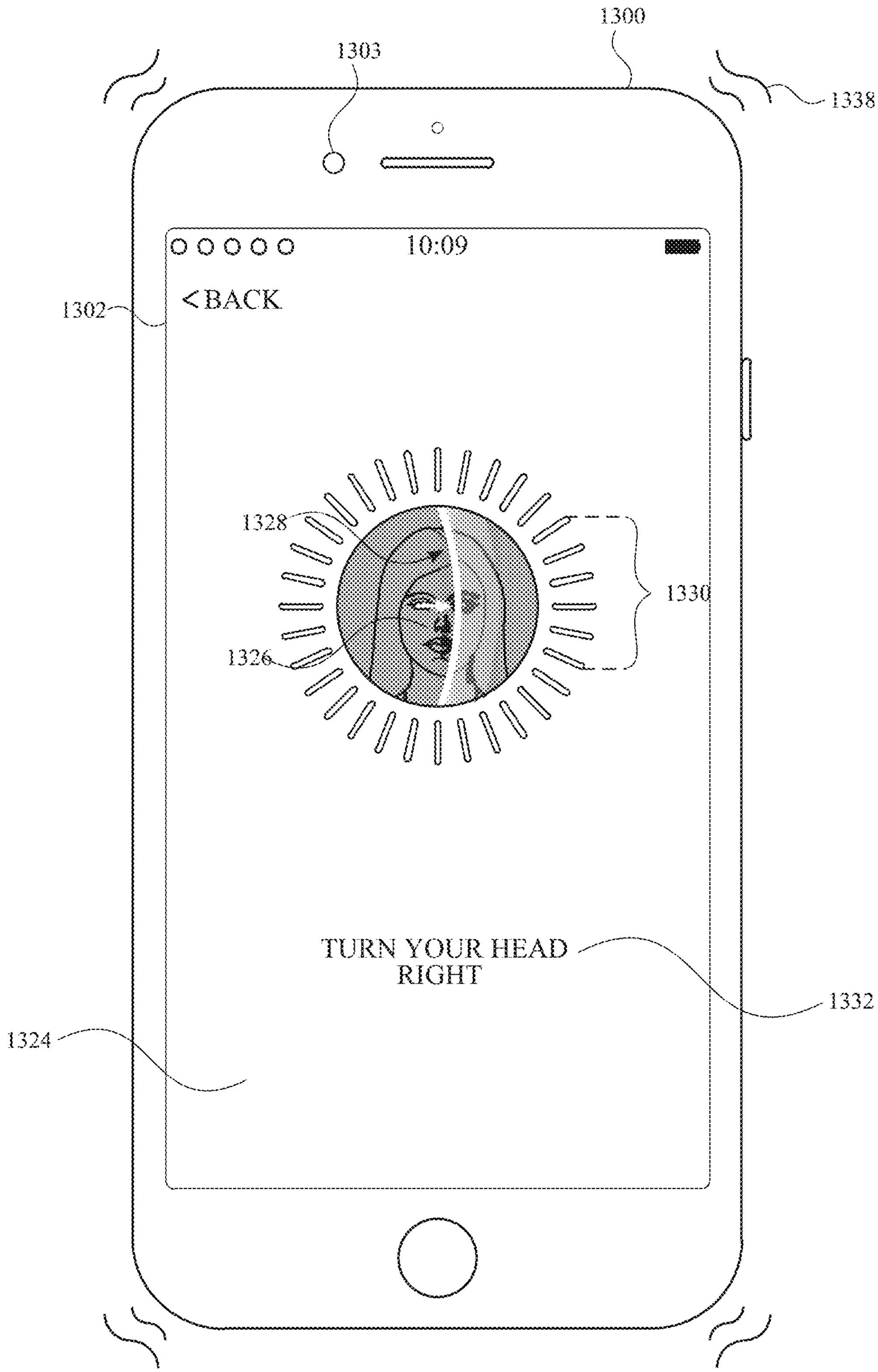

In some examples, device 1300 displays an animation of visual movement prompt 1328 to provide further indication of the requested movement. In the example of FIGS. 13D-13E, device 1300 transitions display of the arrow element of visual prompt 1328 in the requested direction of movement (e.g., to the right). In some examples, visual prompt 1328 also includes one or more lines (e.g., arcs) that extend over a central portion of user facial image 1326. In some examples, these lines appear extend out of the plane of display 1302 into a virtual z-dimension (e.g., normal to the display). In the examples of FIG. 13D-13E, device 1300 rotates the arc in the requested direction of movement (e.g., to the right) to provide visual demonstration the requested movement in three dimensions that accompanies movement of the arrow element. In some examples, while displaying the animation of visual movement prompt 1328, device 1300 continues to display text prompt 1332. In some examples, device 1300 issues audio output 1334 and/or tactile output 1336 while displaying the animation such that the outputs correspond to movement of the arrow and/or arc element of visual prompt 1328.

In some examples, while displaying visual movement prompt 1328 and/or text prompt 1332, device 1300 detects (e.g., for a second time) that the orientation of the user's face with respect to biometric sensor 1303 has not changed for a predetermined amount of time. In response, device 1300 issues a tactile output (e.g., tactile output 1338 shown in FIG. 13E). In some examples, tactile output 1338 is generated as an error to indicate that facial enrollment has stopped (e.g., because the user has not moved his or her face for a predetermined amount of time).

Figure 13F:
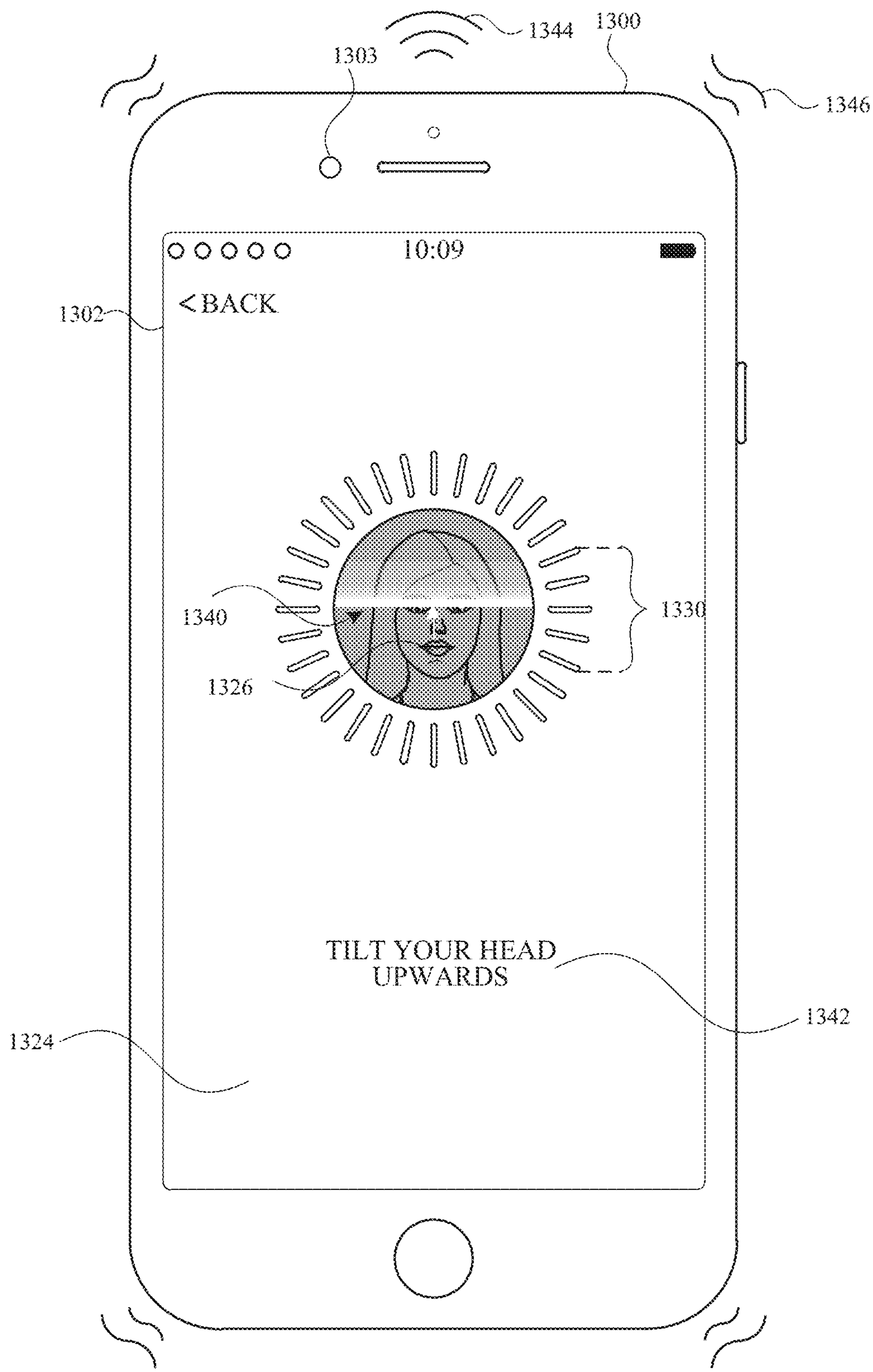

In the example of FIG. 13F, in response to detecting that the orientation of the user's face has not changed for the predetermined amount of time, device 1300 displays a second set of enrollment hints that prompt the user to move his or her face in a different direction. In the example of FIG. 13F, device 1300 displays second visual movement prompt 1340. Second visual movement prompt 1340 has similar visual characteristics to visual movement prompt 1328, but corresponds to a second, different requested direction of movement than visual prompt 1328 (e.g., up instead of right). For example, second visual movement prompt 1340 includes a second arrow element that points in a different direction than the arrow element of visual movement prompt 1328 (e.g., up instead of right). Additionally, in some examples, second visual movement prompt 1340 includes an arc element similar to that of visual prompt 1328, which is used to provide a visual demonstration of the requested second direction of movement as described below with respect to FIGS. 13F and 13G.

In some examples, the second set of enrollment hints includes text prompt 1342 providing written instructions to user that match visual movement prompt 1340. In the example of FIG. 13F, text prompt 1342 provides written instruction to the user to tilt their head to the upwards (e.g., in the second direction indicated by the arrow element of second visual prompt 1340). In the example of FIG. 13F, device 1300 also issues audio output 1344 corresponding to second visual movement prompt 1340 and/or text prompt 1342. For example, if the screen reader functionality is enabled, audio output 1344 is a verbal description of the requested movement (e.g., an auditory recitation of text prompt 1342). In some examples, device 1300 issues tactile output 1346 (e.g., a vibration, e.g., instead of or in addition to audio output 1334).

Figure 13G:
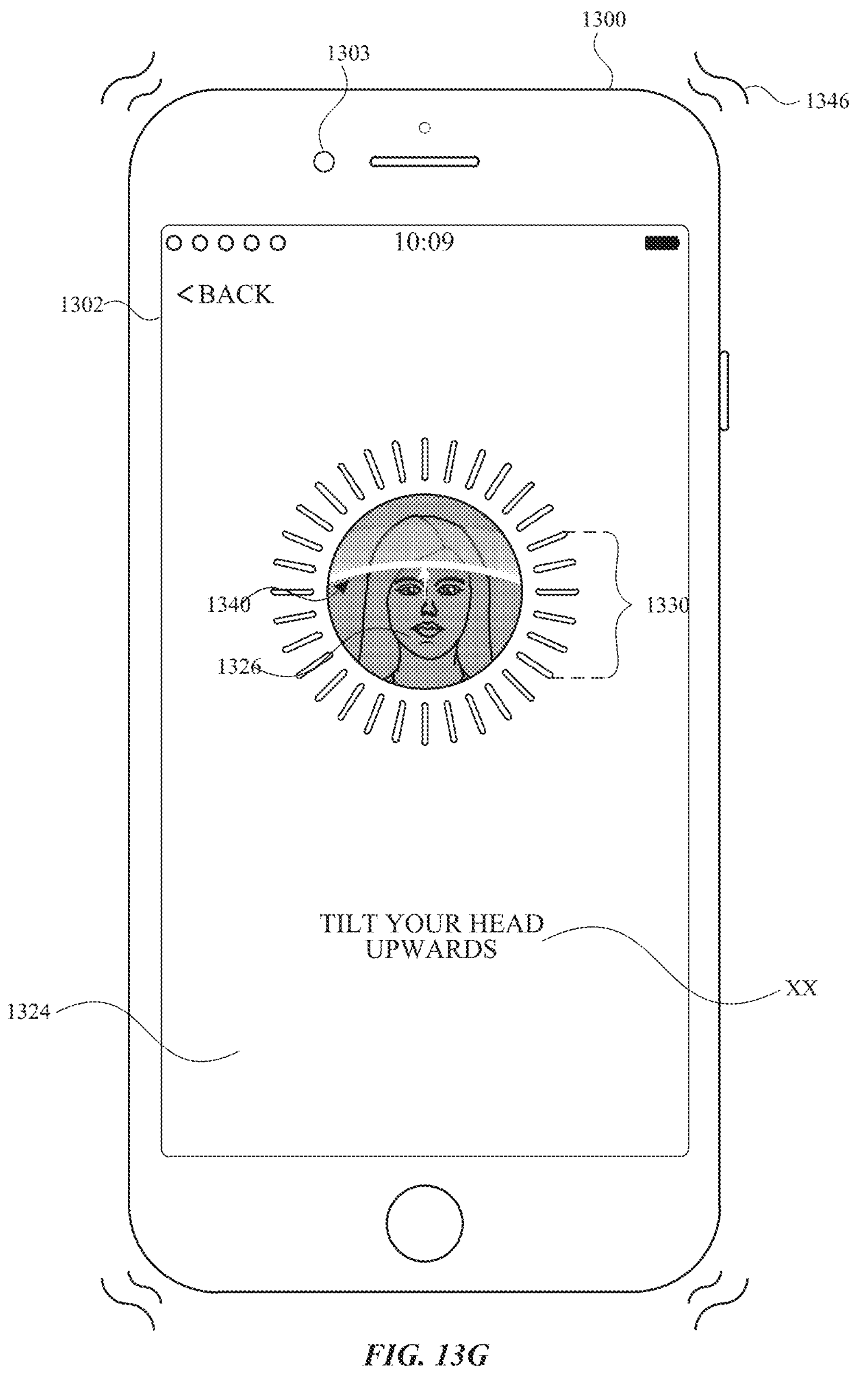

As illustrated in FIGS. 13F-13G, in some examples, device 1300 displays an animation of visual movement prompt 1340 to provide further indication of the second requested direction of movement. In the example of FIGS. 13F-13G, device 1300 transitions display of the arrow element of second visual prompt 1340 in the second requested direction of movement (e.g., upward). In the examples of FIG. 13F-13G, the animation also rotates the arc element of second visual prompt 1340 in the second requested direction of movement (e.g., upwards into the plane of the display) to provide visual demonstration the requested movement in three dimensions that accompanies movement of the arrow element. In some examples, while displaying the animation of visual movement prompt 1340, device 1300 continues to display text prompt 1340. In some examples, device 1300 issues audio output 1344 and/or tactile output 1346 while displaying the animation such that the outputs correspond to movement of the arrow and/or arc element of visual prompt 1340.

Figure 13H:
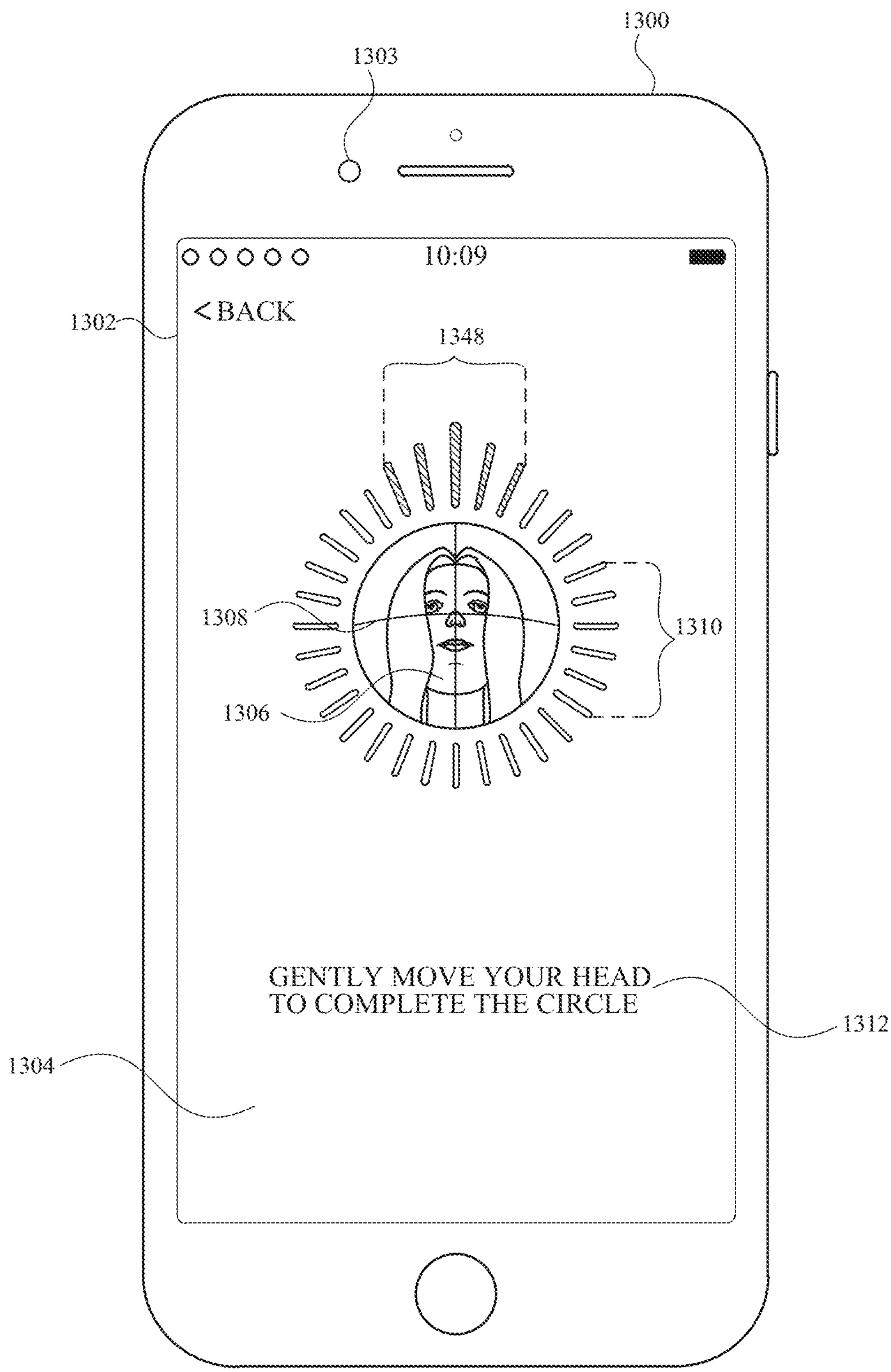

Turning now to FIG. 13H, device 1300 detects a change in orientation of the user's face relative to biometric sensor 1303 (e.g., the user is tilting or has tilted his or her face upwards, the second requested direction of movement). In response to detecting the change in orientation, device displays (e.g., for a second time) face enrollment interface 1304, described above with respect to FIG. 13A. In the example of FIG. 13H, device 1300 has updated (e.g., displayed movement of) user facial image 1306 to reflect the change in orientation of the user's face. In some examples, orientation guide 1308 tracks the movement (e.g., moves along with) user facial image 1306 to visually emphasize tilting and rotational movements of the user's face in three-dimensions. For example, the center (e.g., intersection) of orientation guide 1308 is optionally positioned at a central point on user facial image 1306 and moves along with it. In some examples, device 1300 also adjusts the curvature of the lines comprising orientation guide 1308 to give the appearance of three-dimensional rotation (e.g., upwards into the plane of the display). In some examples, device 1100 emphasizes orientation guide 1108 while it is in motion (e.g., while the orientation of the user's face is changing). For example, device 1300 optionally darkens orientation guide 1308 while it is in motion and/or display a fading trail as it tracks movement of the user's face. In this case, device 1300 optionally reduces this emphasis on orientation guide 1308 relative to user facial image 1306 when the user's face is not moving.

As shown in the example of FIG. 13G, in response to detecting that the user's face is oriented towards progress meter portion 1348 (e.g., a set of one or more progress elements such as 1310*a*, 1310*b*, 1310*c*), device 1300 updates the display of the progress elements in meter portion 1348 to an "enrolling" state by changing the appearance of the progress elements in meter portion 1348. For example, device 1300 optionally enlarges and/or change the color of progress elements in meter portion 1348 while user's face is oriented towards meter portion 1348. In some examples, device 1300 elongates the progress ticks and changes their color from grey to blue when updating progress elements to the "enrolling" state. In some examples, changing the display of progress elements to the "enrolling" state in this manner indicates that device 1300 is capturing (e.g., enrolling) facial imaging data for the angular view corresponding to the current orientation of the user's face. In the example of FIG. 13G, device 1300 maintains progress elements in progress meter 1310 (e.g., progress elements that are not part of meter portion 1348) in an unenrolled state (e.g., greyed out) to indicate that device 1300 has not yet detected the user's face in orientations corresponding to those progress elements. In some examples, the display of meter portion 1348 is updated in this manner only if the user's face is sufficiently rotated towards meter portion 1348 (e.g., if the user's face is rotated by at least a threshold amount or angle).

Figure 13I:
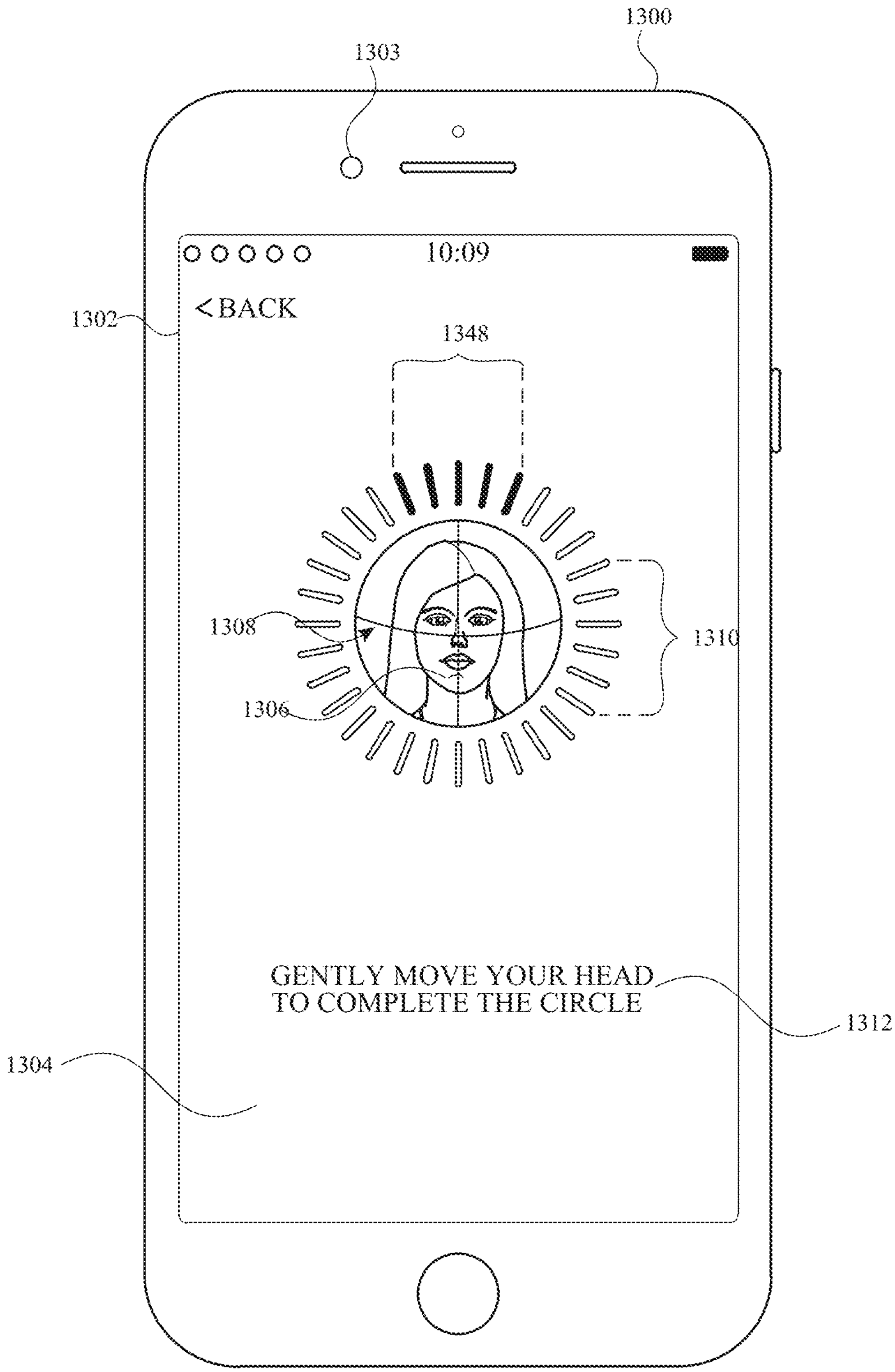
Figure 13J:
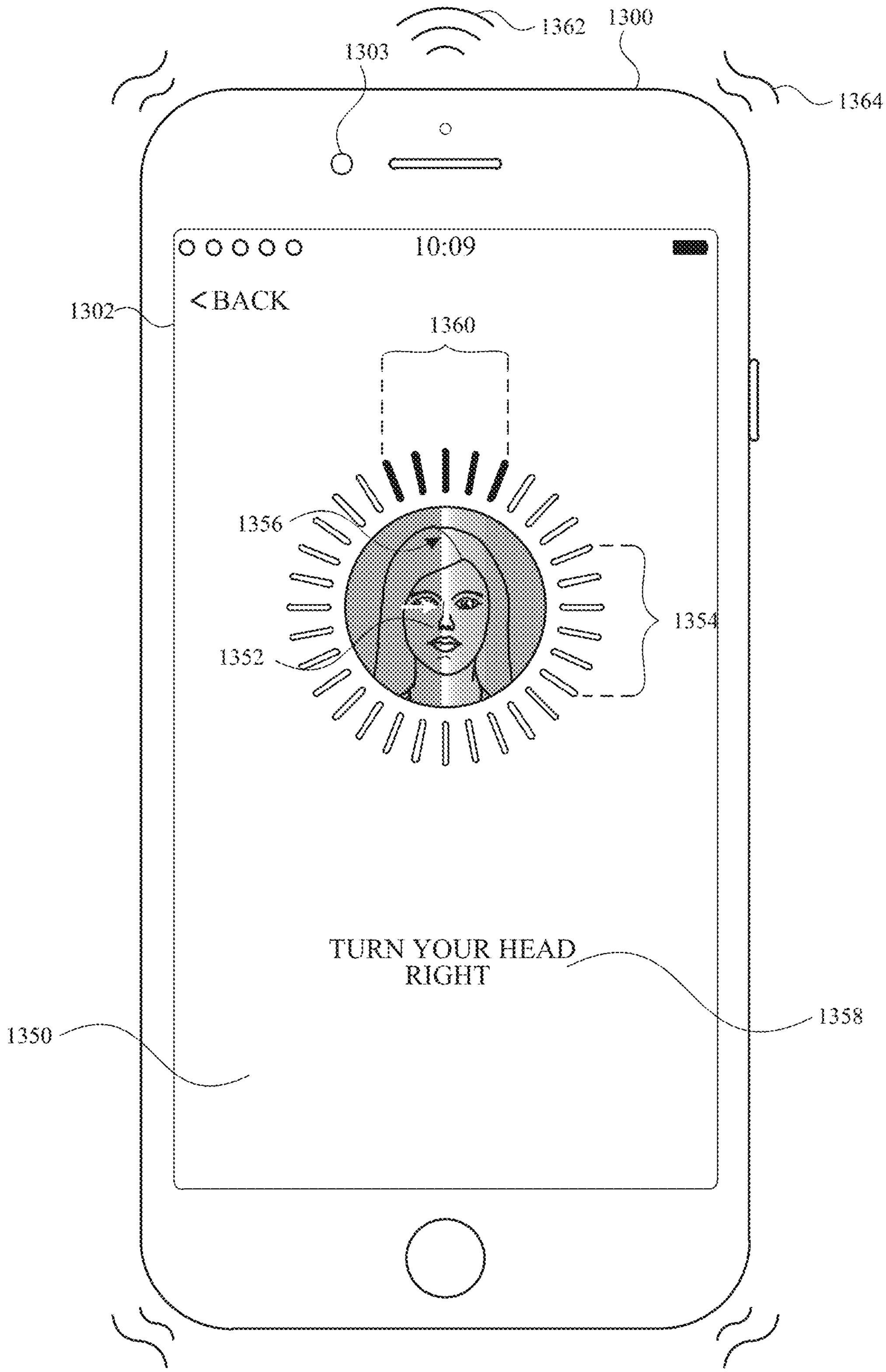

Turning now to the example of FIG. 13I, device 1300 detects that the user's face is no longer in the orientation corresponding to meter portion 1348 (e.g., the user has tilted their head downwards back to a neutral position). In response, device 1300 changes the appearance of progress elements in meter portion 1348 a second time to an "enrolled" state. In the example of FIG. 13I, device 1300 updates the display of progress ticks in portion 1348 from the elongated "enrolling" state by shortening the progress ticks and changing their color a second time. For example, progress elements in the "enrolled" state are the same length and/or size of progress elements in the "unenrolled" state, but are displayed in green to indicate that the corresponding portion of the user's face (e.g., the angular view captured in FIG. 13J) has been successfully enrolled as described above in connection with FIG. 11J. In the example of FIG. 13J, device 1300 maintains other progress elements in enrollment progress meter 1310 in an unenrolled state to indicate that the device has not yet detected the user's face in an orientation corresponding to those progress elements. In response to detecting the change in facial orientation, device 1300 also moves orientation guide 1308 such that it tracks the movement of user facial image 1306 in the digital viewfinder.

Turning now to the example of FIG. 13J, after detecting the change in orientation depicted in FIG. 13I, the device detects (e.g., for a second time) that the orientation of the user's face relative to biometric sensor 1303 has not changed for a predetermined period of time. In response, device 1300 displays hint-enabled enrollment interface 1350. In some examples, hint-enabled enrollment interface 1350 is displayed automatically. In some examples, hint-enabled enrollment interface 1350 is displayed in response to detecting activation (e.g., selection) of an affordance (e.g., similar to yes affordance 1318 on hint-enablement interface 1314). In some examples, hint-enabled enrollment interface 1350 and its components (e.g., user facial representation 1352, enrollment progress meter 1354, visual movement prompt 1356, and text prompt 1358) have the same visual characteristics as described above with respect to hint-enablement interface 1324 in FIG. 13D. In the example of FIG. 13J, however, device 1300 displays progress elements in meter portion 1360 of enrollment progress meter 1354 in the "enrolled" state, since the facial orientation corresponding to the same portion of progress meter 1330 has already been enrolled (e.g., in the manner of FIG. 13H).

Figure 13K:
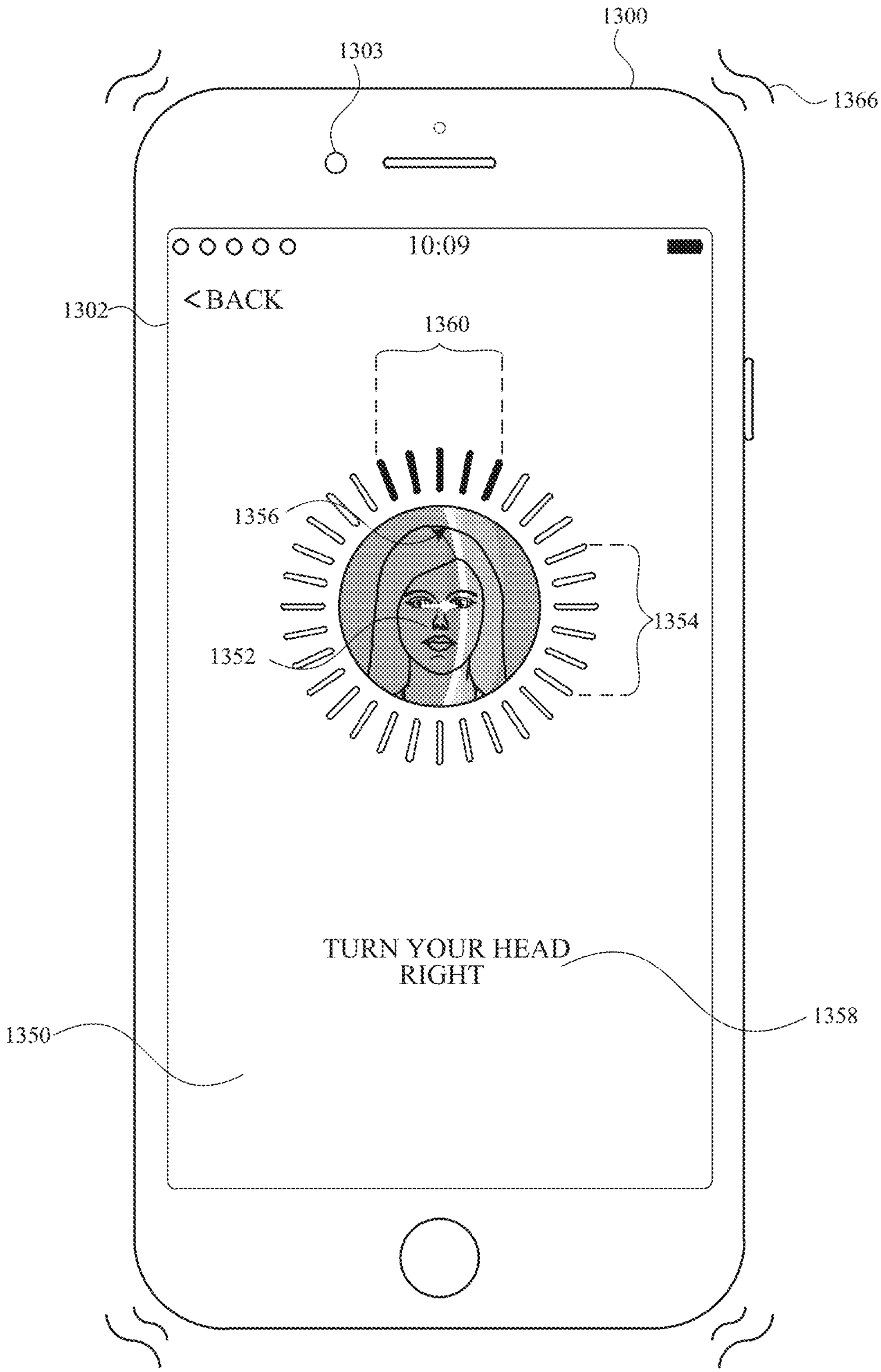

In the example of FIGS. 13J-13K, device 1300 displays an animation of visual movement prompt 1356 that prompts the user to move his or her face into an orientation that has not yet been enrolled. For example, the animation of visual prompt 1356 prompts the user to move his or her face in the first requested direction (e.g., to the right). The animation of visual movement prompt 1356 has similar or identical characteristics to the animation of visual movement prompt 1328 described above with respect to FIGS. 13D-13E. For example, device 1300 transitions display of the arrow element of visual prompt 1356 in a requested direction of movement corresponding to a facial orientation that has not yet been enrolled (e.g., to the right). In the examples of FIG. 13J-13K, the animation also rotates the arc element of visual prompt 1356 in the requested direction of movement (e.g., to the right) to provide visual demonstration the requested movement in three dimensions that accompanies movement of the arrow element. In some examples, while displaying the animation of visual movement prompt 1356, device 1300 continues to display text prompt 1358, which provides a written description of the requested movement. In some examples, device 1300 issues audio output 1362 and/or tactile output 1364 while displaying the animation such that the outputs correspond to movement of the arrow and/or arc element of visual prompt 1340.

Figure 13L:
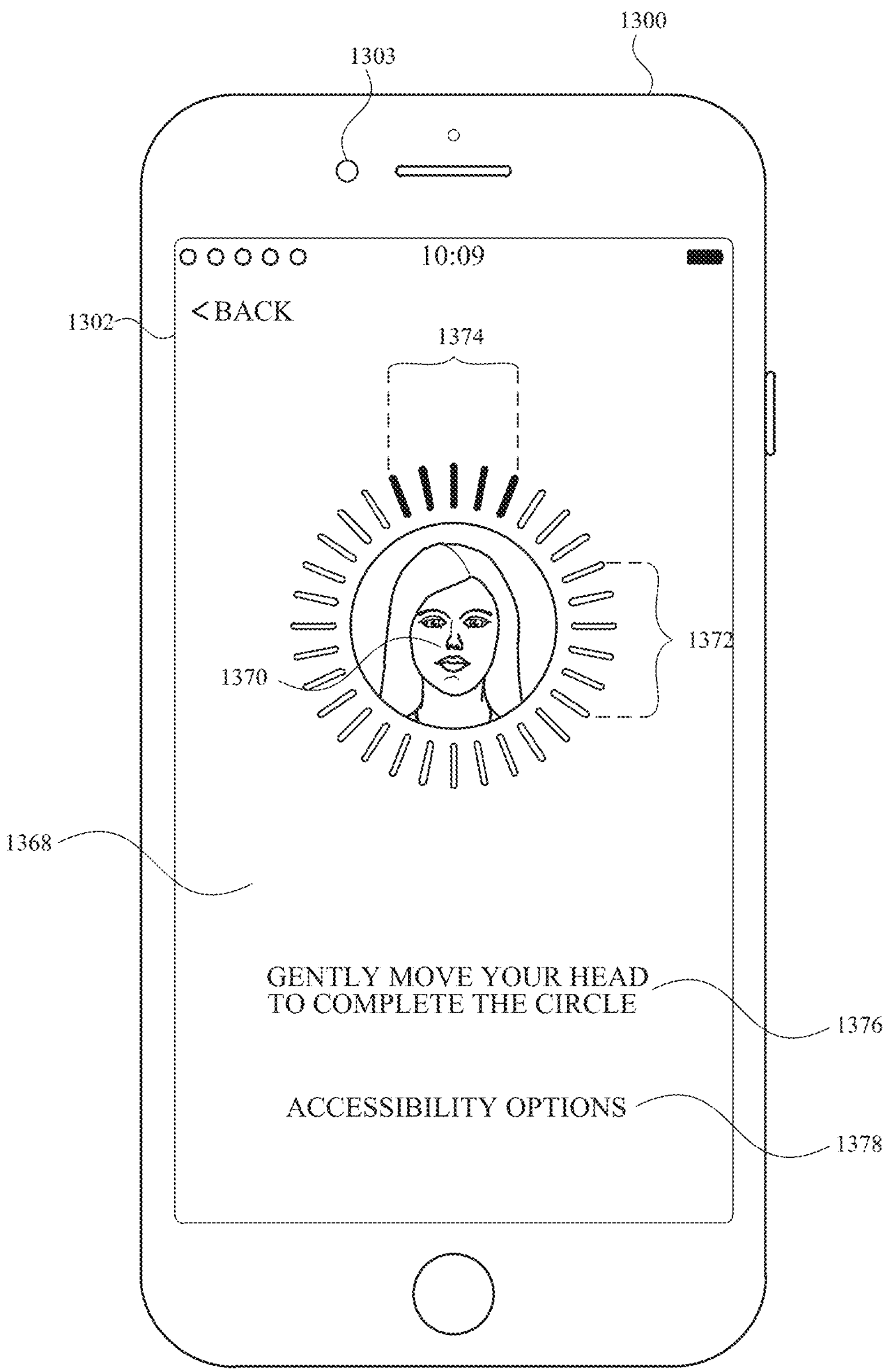

Turning to the example of FIG. 13L, device 1300 has detected (e.g., for a third time) that the orientation of the user's face with respect to biometric sensor 1303 has not changed for a predetermined amount of time. In the example of FIG. 13L, in response to detecting little to no change in the user's facial orientation, device 1300 displays accessibility enrollment interface 1368. In some examples, accessibility enrollment interface includes user facial image 1370, which optionally has similar or identical characteristics to user facial image 1308. In particular, user facial image 1370, optionally, is a live preview of image data captured by biometric sensor 1303. In the example of FIG. 13L, accessibility enrollment interface 1368 includes enrollment progress meter 1372, which is, optionally, displayed surrounding user facial image 1370. In some examples, the display of meter portion 1370 indicates orientations and/or portions of the user's face that have been previously enrolled (e.g., while device 1300 displayed enrollment interface 1304 or hint enabled enrollment interfaces 1324 and/or 1350 during a previous stage of enrollment). For example, device 1300 displays progress elements in portion 1374 of progress meter 1370 (which corresponds to meter portions 1348 and/or 1360). In the example of FIG. 13L, accessibility enrollment interface 1368 also includes accessibility options affordance 1378. In some examples, activation of accessibility options affordance 1378 allows the user to set up biometric (e.g., face) authentication with only a partial scan (e.g., after enrolling only a subset of the face orientations or portions that are be enrolled during a full scan).

Figure 13M:
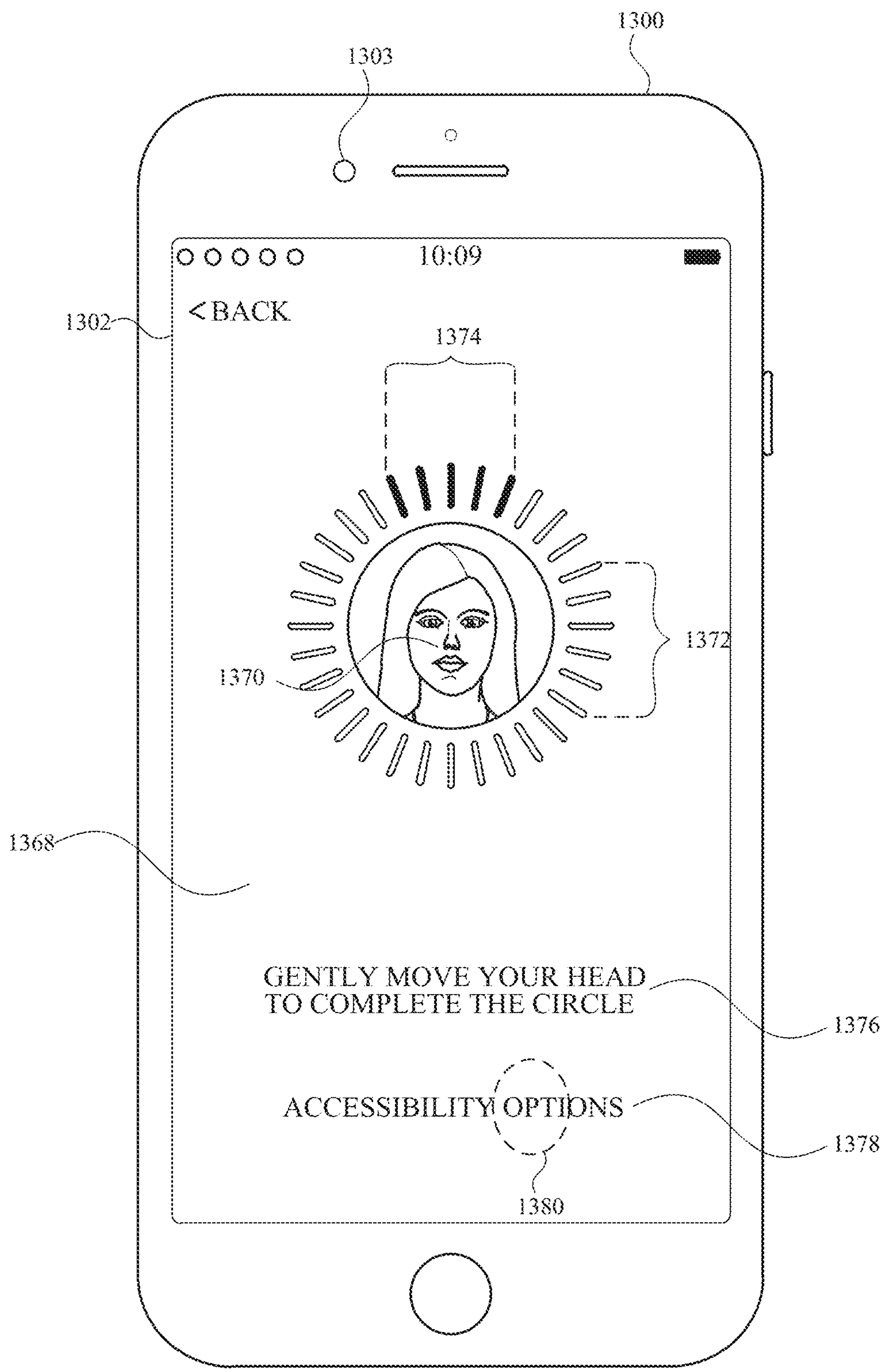
Figure 13N:
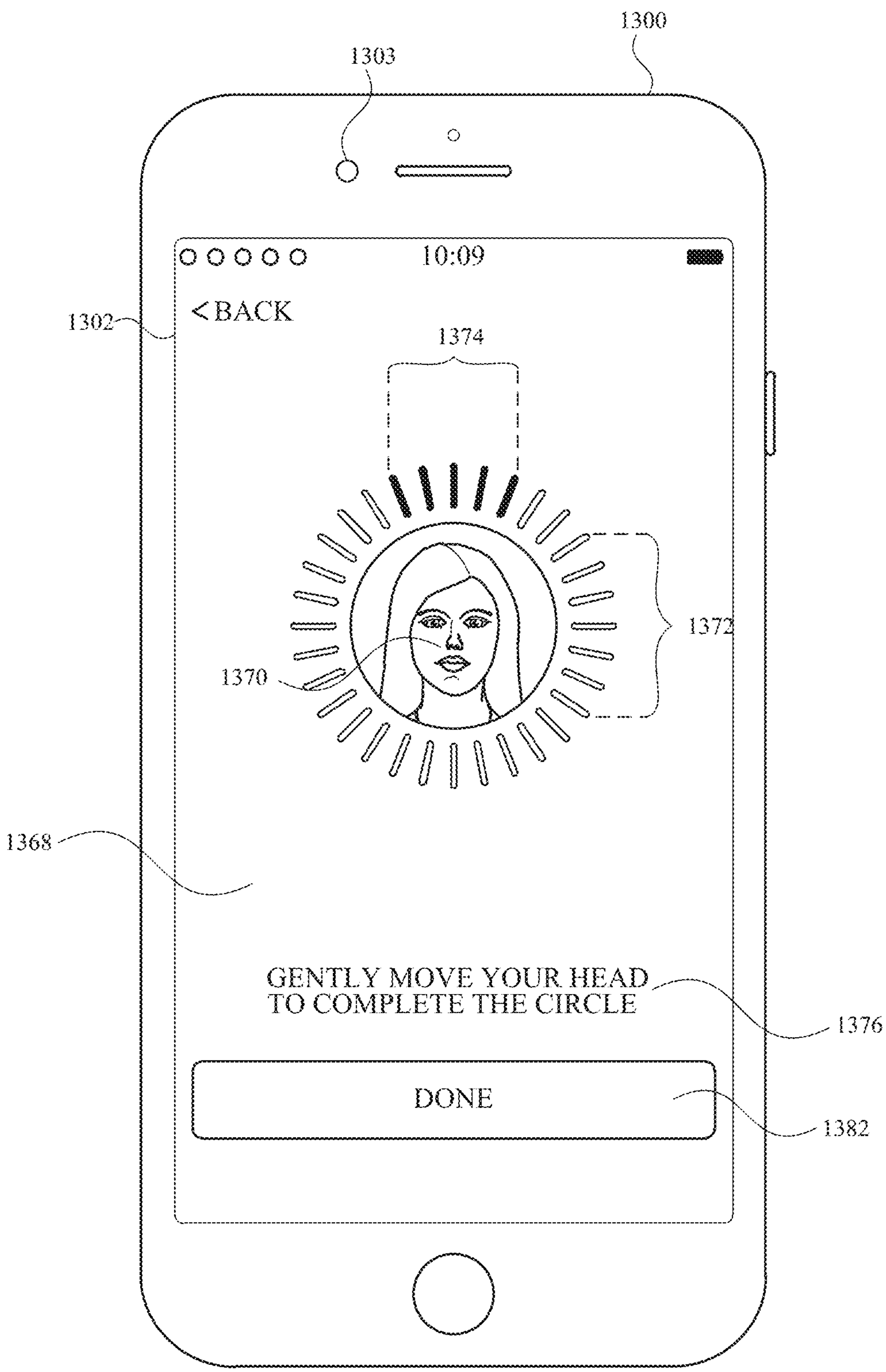

In the example of FIG. 13M, device 1300 detects activation (e.g., selection) of accessibility options affordance 1378 (e.g., by user input 1380). In response to detecting activation of accessibility options affordance 1378, device 1300 displays completion affordance 1382 on accessibility enrollment interface as illustrated in FIG. 13N. In some examples, activation of the completion affordance allows the device to proceed using only a partial scan of their facial features.

Figure 13O:
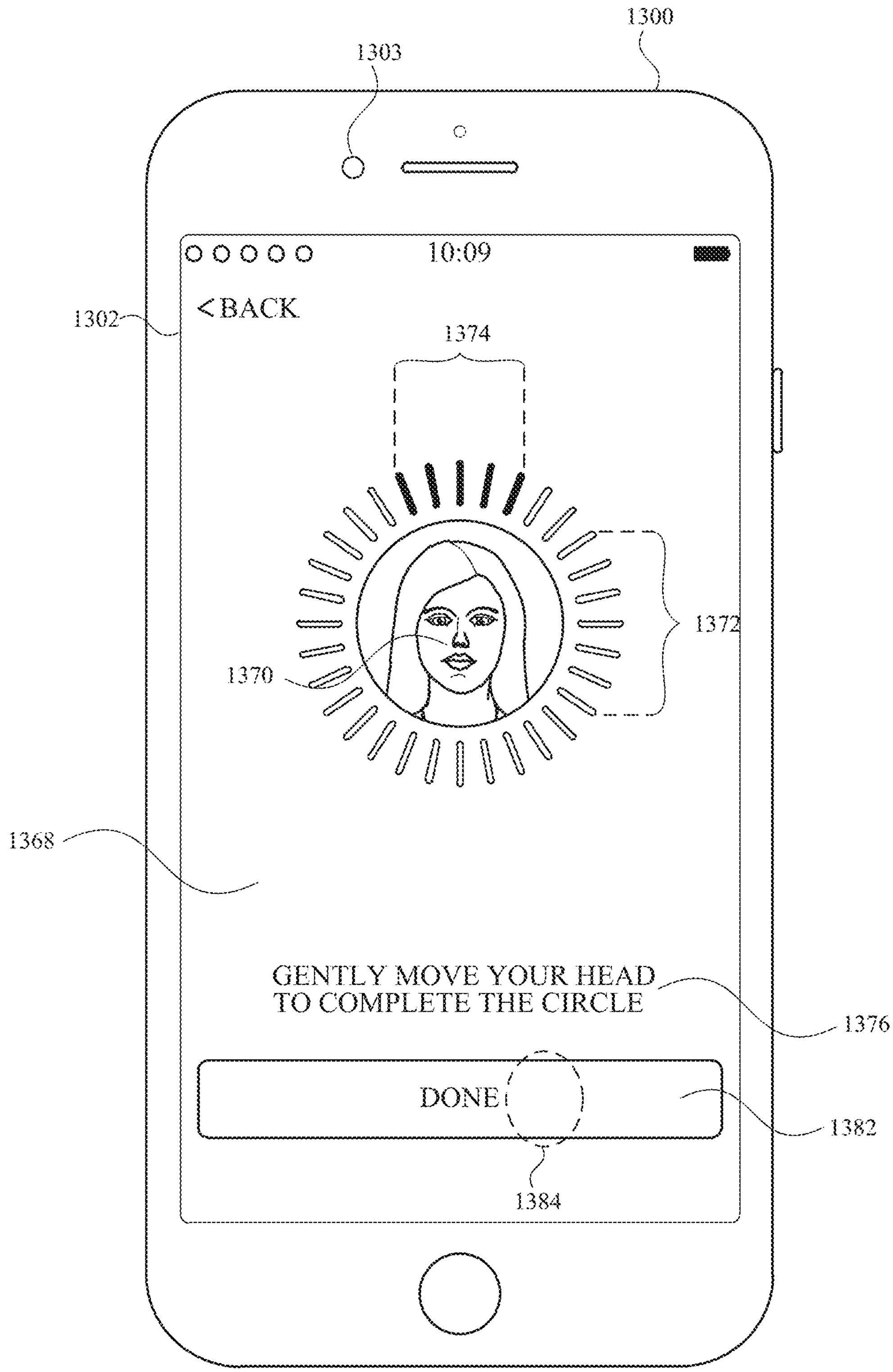
Figure 13P:
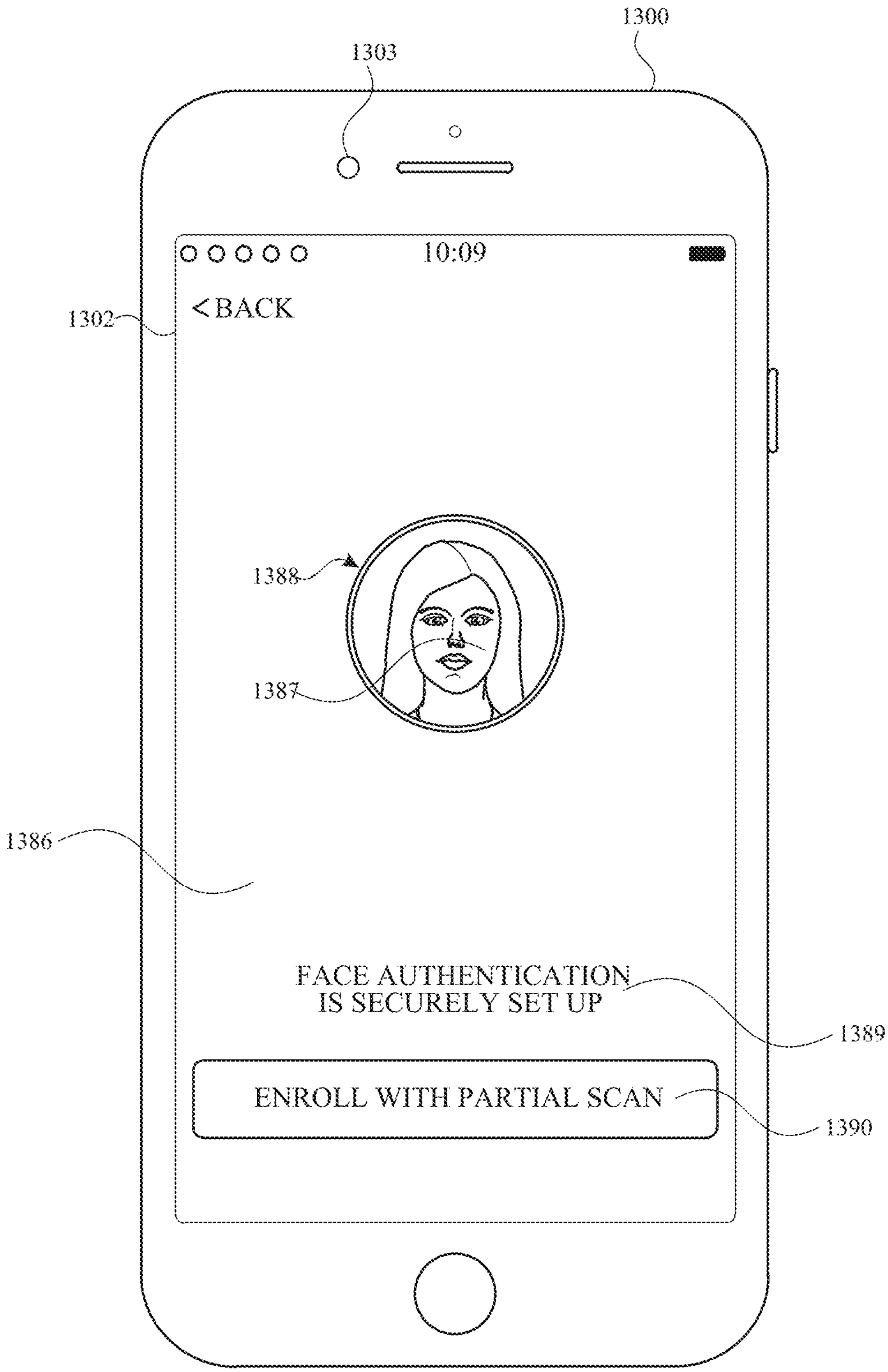

In the example of FIG. 13O, device 1300 detects activation (e.g., selection) of completion affordance 1382 by way of user input 1384. In response to detecting activation of completion affordance, device 1300 displays partial scan acknowledgement interface 1386 as illustrated in FIG. 13P. Partial scan acknowledgement interface includes user facial image 1387, which, optionally, has some or all of the visual characteristics of user facial image 1370. Since a portion of the user's face has been successfully enrolled, device 1300 also displays enrollment success indicator 1388, for example, proximate to and/or surrounding user facial image 1387. In the example of FIG. 13P, partial scan acknowledgement interface 1386 includes text prompt 1389, which provides written indication that image data corresponding to at least a portion of the user's face has been successfully captured and enrolled. In the example of FIG. 13P, device 1300 displays enrollment completion affordance 1390.

Figure 13Q:
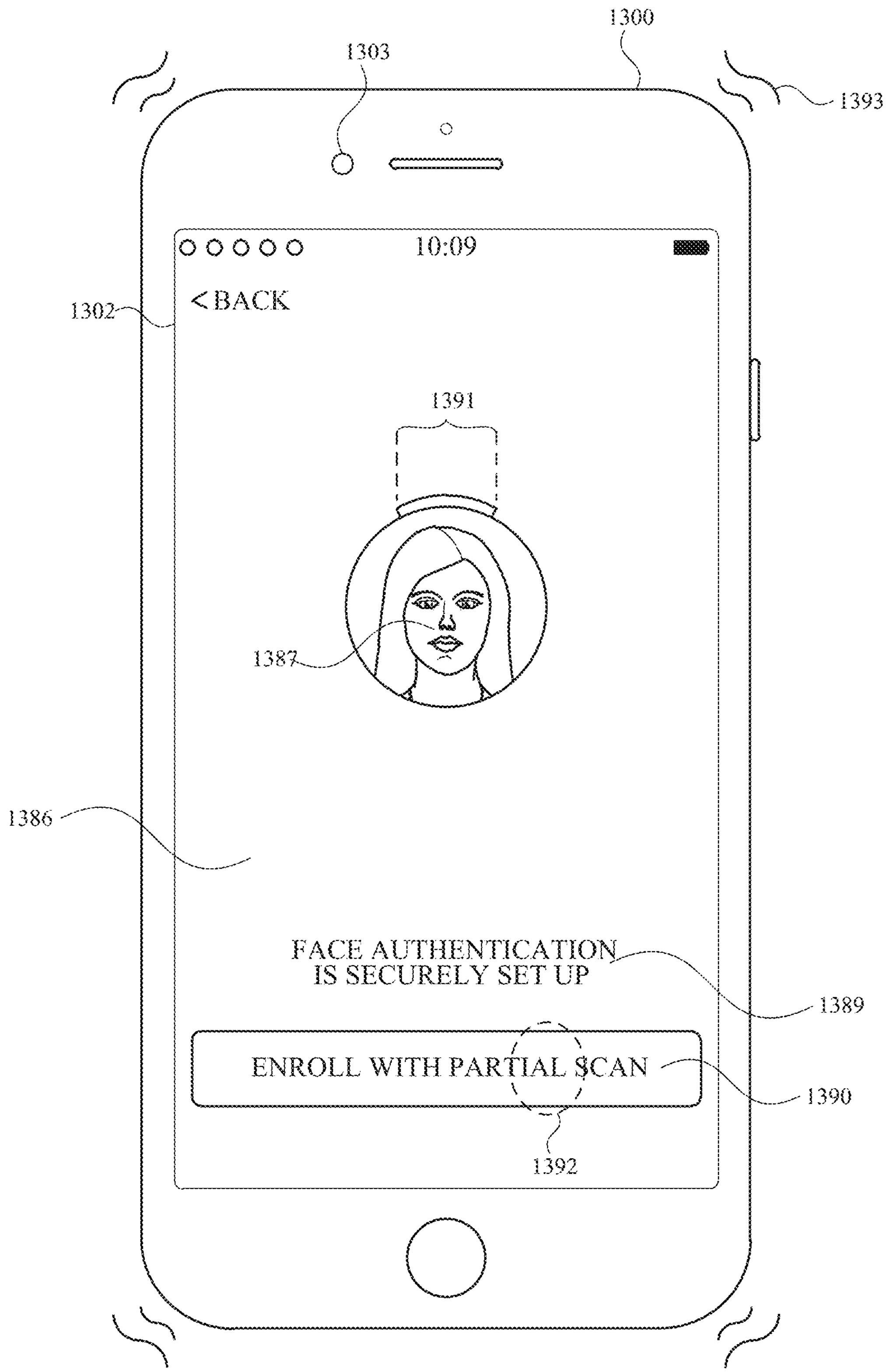

In the example of FIG. 13Q, device 1300 detects activation (e.g., selection) of enrollment completion affordance 1390 by way of user input 1392. In some examples, in response to detecting activation of enrollment completion affordance, device 1300 enrolls image data of one or more angular views (e.g., orientations) of the user's face captured during the enrollment process described above. Optionally, device 1300 issues tactile output 1393 to acknowledge completion of the enrollment process. In some examples, tactile output 1393 is the same tactile output that is issued in response to successful biometric authorization at device 1300. In the example of FIG. 13Q, device 1300 replaces the display of success indicator 1388 with partial enrollment indicator 1391 proximate to facial image 1387, which visually indicates orientations of the user's face that have been successfully enrolled. In some examples, the size (e.g., arc length) and position of partial enrollment indicator 1391 corresponds to portions of the progress meter (e.g., 1310, 1354, 1372) that were transitioned to the "enrolled" state during enrollment. In the example of FIG. 13Q, device 1300 displays partial enrollment indicator 1391 in a similar position as meter portion 1374 to indicate one or more facial orientations corresponding to meter portion 1374 were successfully enrolled.

In the example of FIG. 13R, in response to detecting activation (e.g., selection) of enrollment completion affordance 1390 (e.g., by user input 1392), device 1300 displays enrollment completion interface 1394. As shown in FIG. 13R, enrollment completion interface 1394 includes biometric authentication glyph 1395. For example, biometric authentication glyph 1395 optionally is a line drawing of all or part of a face (e.g., a stylized face graphic). In the example of FIG. 13R, enrollment completion interface 1394 also includes text prompt 1396 indicating that the enrollment process is complete and face authentication at the device is set-up and/or enabled. In some examples, enrollment completion interface 1394 also includes completion affordance 1397, activation of which causes device 1300 to exit face authentication set-up. In some examples, enrollment completion interface 1394 does not include facial image 1387.

FIG. 14 is a flow diagram illustrating a method for providing hints to effectively enroll a biometric feature on an electronic device in accordance with some examples. Method 1400 is performed at a device (e.g., 100, 300, 500, 1300) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric features by the one or more biometric sensors. Some operations in method 2000 are, optionally, combined, the orders of some operations are, optionally, changed, and some operations are, optionally, omitted.

As described below, method 1400 provides an intuitive way to provide hints for effectively enrolling a biometric feature on an electronic device. The method reduces the cognitive burden on a user for enrolling a biometric feature on the device, thereby creating a more efficient human-machine interface. For battery-operated computing devices, enabling a user to enroll a biometric feature faster and more efficiently conserves power and increases the time between battery charges The device displays (1402), on the display, a biometric enrollment user interface (e.g., 1304, 1324) for enrolling a biometric feature (e.g., user face, fingerprint, iris, handprint, or other physical biometric feature that can be used to distinguish one person from another person). Displaying the biometric enrollment user interface includes displaying a representation of the biometric feature (e.g., 1306, 1326, a representation of the head of a user of the device). The appearance of the representation of the biometric feature changes (1404) as the orientation of the biometric feature relative to the one or more biometric sensors (e.g., 1303) changes. For example, the orientation of the biometric feature relative to the one or more biometric sensors optionally is based on the alignment of a face of a user in image data captured by the one or more cameras (e.g., camera data that includes the user's head positioned in the field of view of one or more of the cameras). Displaying a preview of the image captured by the biometric sensors provides the user with feedback about the position and orientation of his or her biometric features relative to the biometric sensors of the device, enabling the user to properly align his or her biometric features with the sensors more quickly and efficiently in order to proper enrollment the biometric features. Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

While displaying the biometric enrollment user interface, the device detects (1406) that enrollment-prompt criteria have been met with respect to one or more portions of the biometric feature.

In some examples, the enrollment-prompt criteria include (1408) a requirement that the biometric feature moves less than a first threshold amount for at least a first threshold time period (as determined by the one or more biometric sensors). Automatically enabling enrollment hints after detecting little to no movement of the user's biometric feature reduces the time required to complete the enrollment process, since a user who is struggling to execute the required movements quickly and automatically receives instructions on how to proceed with the enrollment process. Performing an optimized set of operations when a set of conditions have been met without requiring further user input enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In response to detecting that the enrollment-prompt criteria have been met with respect to one or more portions of the biometric feature, the device outputs (1410) a respective prompt (e.g., 1328, 1332, 1334, 1336, 1340, 1342, 1344, 1346, e.g., a visual, audible, and/or tactile prompt) to move the biometric feature in a respective manner. The respective prompt is selected (1412) based on an enrollment state of one or more portions of the biometric feature (e.g., whether a first portion and/or a second portion of the biometric feature have been enrolled). In particular, in accordance with a determination that the enrollment-prompt criteria have been met with respect to a first portion of the biometric feature that can be enrolled by moving the biometric feature in a first manner, the device outputs (1424) a prompt (e.g., 1328, 1332, 1334, 1336) to move the biometric feature in the first manner. In accordance with a determination that the enrollment-prompt criteria have been met with respect to a second portion of the biometric feature that can be enrolled by moving the biometric feature in a second manner, different from the first manner, outputting the respective prompt includes outputting (1426) a prompt (e.g., 1340, 1342, 1344, 1346) to move the biometric feature in the second manner. Providing visual and/or auditory prompts to move the biometric feature in a particular direction allows the user to quickly and intuitively realize how to position the biometric feature such that a corresponding portion can enrolled. These prompts allow the user the move the biometric feature though the range of orientations required for the enrollment process more quickly and efficiently than they would otherwise. Providing improved visual and/or auditory feedback with instructions on proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, in accordance with a determination that auditory prompt criteria are met (e.g., determining whether screen reader functionality of the device is enabled), the device outputs an auditory prompt (e.g., 1334) to move the biometric feature in the first manner (e.g., instead of or in addition to one or more visual prompts). In some examples, in accordance with a determination that auditory prompt criteria are not met, the device provides the user with an option to enable auditory prompts for the biometric enrollment. For example, the device displays an affordance (e.g., 1318), which when selected by a user, causes auditory prompts to be enabled, or provide an audio prompt (e.g., 1334, 1344) that describes steps for enabling auditory prompts for the biometric enrollment. Providing auditory instructions to move the biometric feature in a particular direction allows the user to quickly and intuitively realize how to position the biometric feature such that a corresponding portion can enrolled. These prompts allow the user the move the biometric feature though the series of orientations required for the enrollment process more quickly and efficiently than they would otherwise. Providing improved auditory feedback with instructions on proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently In some examples, the device outputs the respective prompt (e.g., 1328, 1332, 1334, 1336, 1340, 1342, 1344, 1346, e.g., a visual, audible, and/or tactile prompt) before any portion of the biometric feature has been enrolled. For example, the respective prompt optionally indicates (1422) that the user should start tilting their head to begin the enrollment process.

In some examples, the device outputs the respective prompt (e.g., 1328, 1332, 1334, 1336, 1340, 1342, 1344, 1346, e.g., a visual, audible, and/or tactile prompt) after at least a portion of the biometric feature has been enrolled. For example, the prompt optionally indicates that the user should continue tilting their head to continue the enrollment process. Automatically issuing prompts to move the biometric feature in a second direction after the user has moved the biometric feature in the first direction allows the user to quickly and intuitively understand how to continue moving the biometric feature to proceed with the enrollment process. Assisting the user in understanding how to execute the required movements of the biometric feature in quick succession reduces the amount of time required to complete enrollment of the biometric feature. Thus, performing an optimized set of operations when a set of conditions have been met without requiring further user input enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device outputs a tactile output (e.g., 1336, 1346). In some examples, the tactile output is accompanied by an audible output (e.g., 1334, 1344). In some examples, the tactile output and/or the audio output are generated to coincide with movement of a visual prompt (e.g., 1328, 1340). For example, the tactile outputs optionally correspond to movement of an arrow or arc (e.g., arrow element and arc element in 1328 and/or 1340) in a direction in which the user is being prompted to move the biometric feature.

In some examples, the respective prompt includes a tactile output (e.g., 1338, 1366) that is used to indicate a failed biometric authentication with the device. For example, the tactile output that is generated as an error when biometric enrollment has stopped due to a failure to change the orientation of the biometric feature relative to the one or more biometric sensors is the same as the tactile output that is used to indicate a failed biometric authentication.

In some examples, the device overlays a visual prompt (e.g., 1328, 1340, 1356) on the representation of the biometric feature. For example, the visual prompt optionally is an arrow indicating the respective manner (direction) in which to move the biometric feature (such as up, down, to the left, to the right, at a diagonal angle between those directions). In some examples, the visual prompt is partially transparent. Displaying visual prompt such as an arrow element in the requested direction of movement allows the user to quickly understand how to move the biometric feature such that a portion of the feature corresponding to the requested direction can be properly enrolled. This allows the user execute the requested movement more quickly and efficiently, reducing the amount of time required by the enrollment process. Providing improved visual prompting that illustrates proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device displays (1414) an animation prompt (e.g., animation of 1328, 1340, or 1356 described with respect to FIG. 13D-13E, 13F-13G, or 13J-13K) to move the biometric feature in the respective manner. For example, the device optionally displays an animation prompting movement in a first manner (e.g., animation of 1328 shown in FIGS. 13D-13E) with respect to the first portion of the biometric feature and displays an animation prompting movement in a second manner (e.g., animation of 1340 in FIGS. 13F-13G) with respect to a second portion of the biometric feature. In some examples, displaying the animation prompt includes displaying (1416) an arrow element (e.g., arrow element of 1328, 1340, or 1356) indicating the respective manner in which to move the biometric feature. Displaying an animation that intuitively illustrates the requested direction of movement allows the user to quickly understand how to move the biometric feature such that a portion of the feature corresponding to the requested direction can be properly enrolled. This allows the user execute the requested movement more quickly and efficiently, reducing the amount of time required by the enrollment process. Providing improved visual feedback with intuitive illustrations of proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the device outputs (1420) at least one of a tactile output (e.g., 1336, 1346, 1364) or an auditory output (e.g., 1334, 1344, or 1362) corresponding to the animation. For example, the animation optionally zooms in and out on biometric feature. Alternatively and/or additionally, one or more elements of enrollment user interface (e.g., 1324, 1350) optionally temporarily changes state. In general, the tactile output syncs with the animation. Providing tactile and/or audio outputs that accompany a visual illustration of the requested movement allows the user to quickly understand how to move the biometric feature such that a portion of the feature corresponding to the requested direction can be properly enrolled. This allows the user execute the requested movement more quickly and efficiently, reducing the amount of time required by the enrollment process. Providing improved tactile and/or auditory feedback accompanying an animation therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the first manner of movement includes rotation about an axis parallel to the display (e.g., in the plane of display 1302) and the second manner of movement includes rotation about an axis parallel to the display. In this case, the animation prompt (e.g., animation of 1328, 1340, or 1356 described with respect to FIG. 13D-13E, 13F-13G, or 13J-13K) includes (1418) simulated rotation of a user interface element (e.g., arc element of 1328, 1340, or 1356) about the axis parallel to the display. For example, if the user is being prompted to rotate the biometric feature clockwise about an axis parallel to the display, the animation optionally includes movement of a user interface element clockwise about an axis parallel to the display. Likewise, if the user is being prompted to rotate the biometric feature counter-clockwise about an axis parallel to the display, the animation optionally includes movement of a user interface element counter-clockwise about an axis parallel to the display. Displaying simulated rotation of an orientation element to illustrate the requested movement allows the user to quickly understand how to move the biometric feature such that a portion of the feature corresponding to the requested direction can be properly enrolled. This allows the user execute the requested movement more quickly and efficiently, reducing the amount of time required by the enrollment process. Providing improved visual feedback with intuitive illustrations of proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the biometric enrollment user interface includes an orientation guide (e.g., 1308) that is overlaid on the representation of the biometric feature (e.g., 1306) and tilts in different directions as the representation of the biometric feature tilts in different directions (e.g., as described above with reference to method 1200). In this example, in accordance with a determination that the enrollment-prompt criteria have been met with respect to the first portion of the biometric feature that can be enrolled by moving the biometric feature in the first manner, the animation prompt (e.g., animation of 1328 or 1356 described with respect to FIG. 13D-13E or 13J-13K) includes movement of a portion of the orientation guide (e.g., the vertical component of 1308) in a direction that the orientation guide would move if the biometric feature moved in the first manner. Displaying and/or rotating the orientation guide overlaid on the representation of the biometric feature provides the user with feedback about the orientation of his or her biometric features relative to the biometric sensors of the device in three-dimensional space, enabling the user more quickly move the biometric feature through the required range of orientations during the enrollment process. Providing improved visual feedback regarding the orientation of the biometric feature to the user therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

Likewise, in accordance with a determination that the enrollment-prompt criteria have been met with respect to the second portion of the biometric feature that can be enrolled by moving the biometric feature in the second manner, the animation prompt (e.g., animation of 1340 described with respect to FIGS. 13F-13G) includes movement of a portion of the orientation guide in a direction that the orientation guide would move if the biometric feature moved in the second manner. In some examples, the orientation guide includes a first portion (e.g., the horizontal component of 1308, e.g., a first arc) and a second portion (e.g., the horizontal component of 1308, e.g., second arc that crosses the first arc) and the animation prompt (e.g., animation of 1340 shown in FIGS. 13F-13G) includes moving the first portion of the orientation guide without moving the second portion, or moving the second portion without moving the first portion. In some examples if the first portion of the orientation guide is moving, then the second portion ceases to be displayed. Similarly, if the second portion is moving then the first portion ceases to be displayed. In some examples, if enrollment is needed for a portion of the biometric feature that is not visible when the feature is tilted up, down, to the left, or to the right, the animation moves in a diagonal direction to prompt the user to tilt the biometric feature in the diagonal direction.

In some examples, after outputting a respective prompt (e.g., 1328, 1332, 1334, 1336, 1340, 1342, 1344, 1346) to move the biometric feature in a respective manner, and in response to detecting the movement of the biometric feature, the device enrolls the respective portion of the biometric feature. Optionally, the device updates a progress indicator (e.g., 1310, 1330) as described in method 1200. While enrolling the respective portion of the biometric feature, the device optionally ceases to provide the prompts. Updating the progress indicator during enrollment in this manner encourages the user to look at the display of the electronic device during the enrollment to improve the ability to detect when gaze is directed at the display, and thus whether or not the user is paying attention to the device. Encouraging the user to look at the display of the electronic device enhances the operability of the device and makes the user-device interface more efficient (e.g., by ensuring that the gaze of the user is directed at the display and thereby ensuring that the biometric feature of the user is properly enrolled) which, additionally, reduces power usage and improves battery life of the device by enabling the user to use the device more quickly and efficiently.

In some examples, after enrolling the respective portion of the biometric feature, the device determines that enrollment-prompt criteria have been met with respect to one or more portions of the biometric feature. In response to determining that enrollment-prompt criteria have been met with respect to one or more portions of the biometric feature, (e.g., the user stops responding during enrollment for a threshold period of time), the device outputs another respective prompt (e.g., 1356, 1358, 1362, 1364) to move the biometric feature in a respective manner determined based on the one or more portions of the biometric feature for which the enrollment-prompt criteria have been met. For example, the device starts prompting the user to change the orientation of the biometric feature with respect to the one or more biometric sensors to enroll the portions of the biometric feature that have not yet been enrolled. In some examples the prompts have similar characteristics to the other prompts described above. In some examples, the prompts progress in a similar manner as the prompts described above. In some examples, a first prompt (e.g., 1356, 1358, 1362, 1364), is provided in a first direction after the first time period with little or no movement of the biometric feature relative to the one or more biometric sensors, and a second prompt is provided in a second direction after the second time period (longer than the first time period) with little or no movement of the biometric feature relative to the one or more biometric sensors, and an option (e.g., 1382, 1390) to complete the biometric enrollment without enrolling all portions of the biometric feature is provided after the third time period (longer than the first time period) with little or no movement of the biometric feature relative to the biometric sensors. Automatically providing prompts to move the biometric feature in a different direction after detecting little to no movement of the biometric feature assists a user who is struggling or unable to execute the movement in the first direction by quickly and automatically providing instructions on how to proceed with the enrollment process. Performing an optimized set of operations when a set of conditions have been met without requiring further user input enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, after outputting a respective prompt (e.g., (e.g., 1328, 1332, 1334, 1336, 1340, 1342, 1344, 1346, 1356, 1358, 1362, 1364) to move the biometric feature in a respective manner, in accordance with a determination that accessibility prompt criteria have been met, the device displays (1428) an option (e.g., 1378) to proceed with the enrollment without further changes in the orientation of the biometric feature relative to the one or more biometric sensors (e.g., 1303). The accessibility prompt criteria include (1430) a requirement that the orientation of the biometric feature relative to the one or more biometric sensors has changed less than a predetermined amount for a respective period of time. For example, the biometric feature of the user has not been detected as moving for a threshold period of time after providing the second prompt (e.g., 1340, 1342, 1344, 1346). In this case, an accessibility affordance (e.g., 1378) is displayed, and user optionally selects (e.g., 1380) the accessibility affordance. In other words, the user can approve use of biometric feature authentication for a view of the biometric feature from a range of orientations that is less than the available range of orientations. In some examples, the respective period of time is greater than the second period of time. For example, after a delay with little or not movement of the biometric feature relative to the one or more biometric sensors (e.g., 1303), the device first prompts (e.g., with 1328, 1332, 1334, 1336) movement of the biometric feature in a first direction; then after a delay with little or no movement, the device prompts (e.g., with 1340, 1342, 1344, 1346) movement of the biometric feature in a second direction; then after an additional delay with little or no movement, the device provides an option (e.g., 1378) to proceed with enrollment without additional movement of the biometric feature relative to the one or more biometric sensors. In some examples, the accessibility prompt (e.g., 1378) is displayed after enough of the biometric feature has been captured to ensure secure authentication with at least a portion of the biometric feature (e.g., as soon as one angle of the face has been captured and enrolled a user with limited mobility can select the accessibility option to enroll the biometric feature using just the enrolled angles).

In some examples, the device detects (1432) selection of the option to proceed with the enrollment without further changes in the orientation of the biometric feature relative to the one or more biometric sensors. For example, in some examples, the device receives a user input (e.g., 1382) indicating a selection of an affordance (e.g., 1380) of the accessibility interface (e.g., 1368) for confirming enrollment of the biometric data. In response to detecting selection of the option to proceed with the enrollment without further changes in the orientation of the biometric feature relative to the one or more biometric sensors (1434), the device forgoes (1436) (e.g., skips) one or more steps in the biometric enrollment. For example, the device skips display of a second biometric enrollment user interface (e.g., second enrollment interface 1138 in FIG. 11H) that would be displayed in a standard enrollment process where the biometric feature changes orientation as prompted by the device (e.g., there is no second enrollment flow if the user enrolls via the accessibility interface, as described with respect to method of 1200).

In some examples, in response to selection of the option to proceed with the enrollment without further changes in the orientation of the biometric feature relative to the one or more biometric sensors (1434), the device displays (1438) an indication that enrollment of the biometric feature is complete that includes information about which portions of the biometric feature have been enrolled (e.g., 1391 and 1389). In some examples, the device displays an affordance (e.g., 1390), which when selected, confirms partial enrollment of the biometric feature.

In some examples, in response to detecting selection of the option to proceed with the enrollment without further changes in the orientation of the biometric feature relative to the one or more biometric sensors, the device outputs a tactile output (e.g., 1393) that is used to indicate successful biometric authentication with the biometric feature once the biometric feature has been enrolled. For example, the tactile output that is generated when biometric enrollment is complete is optionally the same tactile output that is used to indicate successful authentication with the biometric feature.

Note that details of the processes described above with respect to method 1400 (e.g., FIGS. 14A-14B) are also applicable in an analogous manner to the methods described herein. For example, method 1400 optionally includes one or more of the characteristics of the various methods described herein with reference to methods 800, 1000, 1200, 1600, 1800, 2000, 2200, 2500, and 2700. For example, the accessibility interface described in method 1000 can be applied with respect to the accessibility enrollment interface (e.g., 1368). For another example, the orientation guide as described in method 1200 can be applied with respect to the orientation guide (e.g., 1308). For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 14A-14B are, optionally, implemented by components depicted in FIGS. 1A-1B. For example, displaying operation 1402, detecting operation 1406, outputting operation 1408, outputting operation 1412, and outputting operation 1414, are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15T illustrate exemplary user interfaces for biometric authentication, in accordance with some examples. As described in greater detail below, the exemplary example of the user interfaces illustrated in FIGS. 15A-15T are used to illustrate the processes described below, including the processes in FIGS. 16A-16E.

FIG. 15A illustrates an electronic device 1500 (e.g., portable multifunction device 100, device 300, or device 500). In the exemplary example illustrated in FIGS. 15A-15T, electronic device 1500 is a smartphone. In other examples, electronic device 1500 can be a different type of electronic device, such as a wearable device (e.g., a smartwatch). Electronic device 1500 has a display 1502, one or more input devices (e.g., touchscreen of display 1502, a button 1504, a microphone (not shown)), and a wireless communication radio. In some examples, the electronic device includes a plurality of cameras. In some examples, the electronic device includes only one camera. In some examples, the electronic device includes one or more biometric sensors (e.g., biometric sensor 1503) which, optionally, include a camera, such as an infrared camera, a thermographic camera, or a combination thereof. In some examples, the one or more biometric sensors 1503 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In FIG. 15A, the electronic device 1500 displays, on display 1502, an application interface 1506 including a log-in affordance 1508. In the example of FIG. 15A, the application is a browser displaying, in the interface of the browser, a website (e.g., onlinestore.com). In FIG. 15B, while displaying the application interface 1506, the electronic device 1500 detects activation of the log-in affordance 1508. As shown, the activation is a tap gesture 1510 on log-in affordance 1508.

Figure 15C:
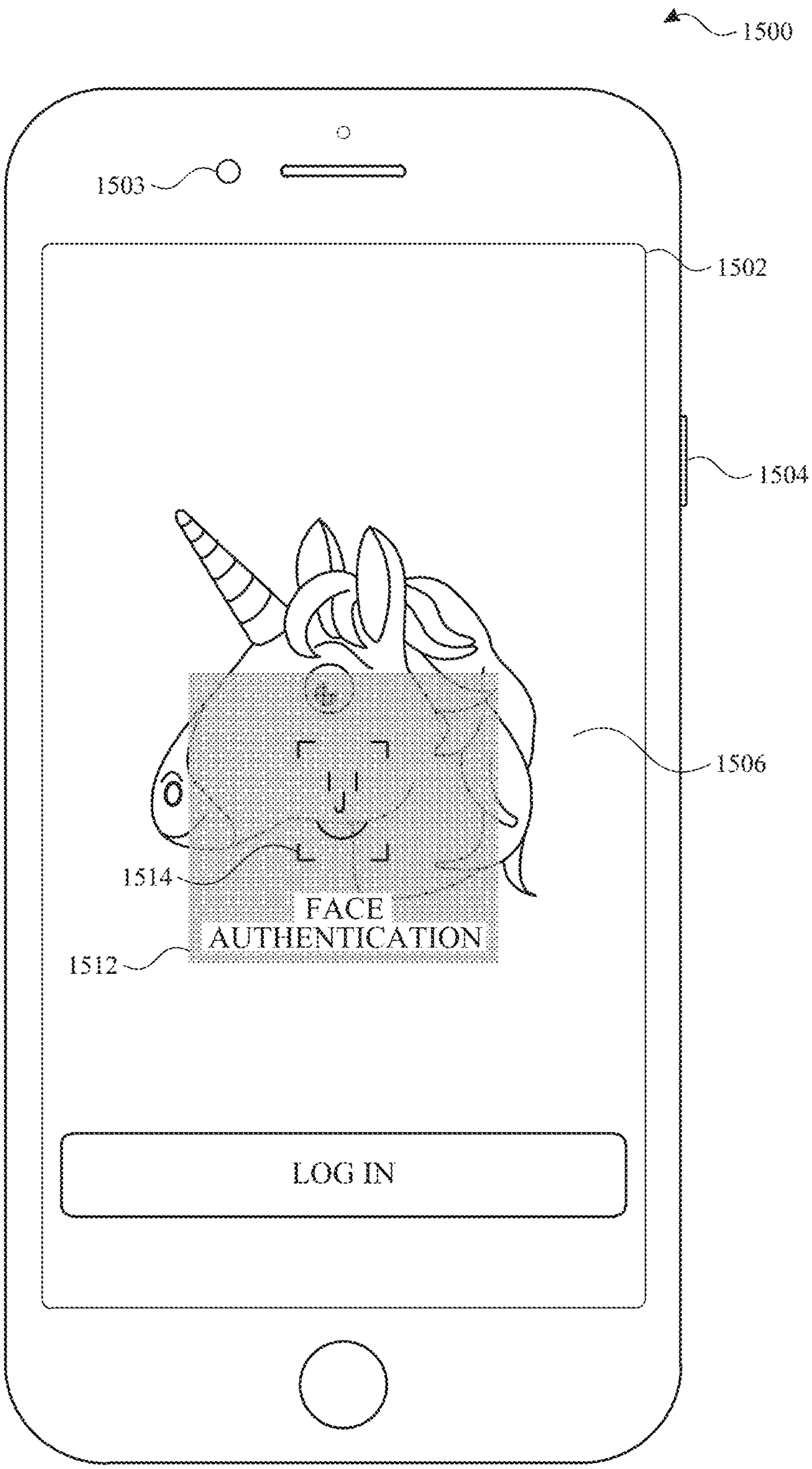

In FIG. 15C, in response to detecting the activation of the log-in affordance 1508, the electronic device 1500 initiates biometric authentication. In some examples, initiating biometric authentication includes obtaining (e.g., capturing with the one or more biometric sensors) data corresponding to at least a portion of the biometric feature of a user (e.g., a user's face). In FIG. 15C, initiating biometric authentication further includes displaying a biometric authentication interface 1512 having a biometric authentication glyph 1514. In the example of FIG. 15C, the biometric authentication glyph 1514 is a simulation of a representation of the biometric feature (e.g., a face). As seen in 15C, the biometric authentication interface 1512 is overlaid on at least a portion of the application interface 1506. In some examples, the biometric authentication interface is an operating system level interface (e.g., an interface generated by an operating system of the device), and the application interface 1506 is an application-level interface (e.g., a user interface generated by a third-party application that is separate from the operating system of the device).

While in some examples, the electronic device 1500 initiates biometric authentication in response to activation of a log-in affordance of an application, in other examples, the electronic device 1500 initiates (e.g., automatically begins) biometric authentication in response to loading the application and/or the application interface 1506. The application interface is displayed, for instance, in response to loading the application (e.g., by selecting an icon associated with the application on a home screen of the electronic device 1500).

Figure 15D:
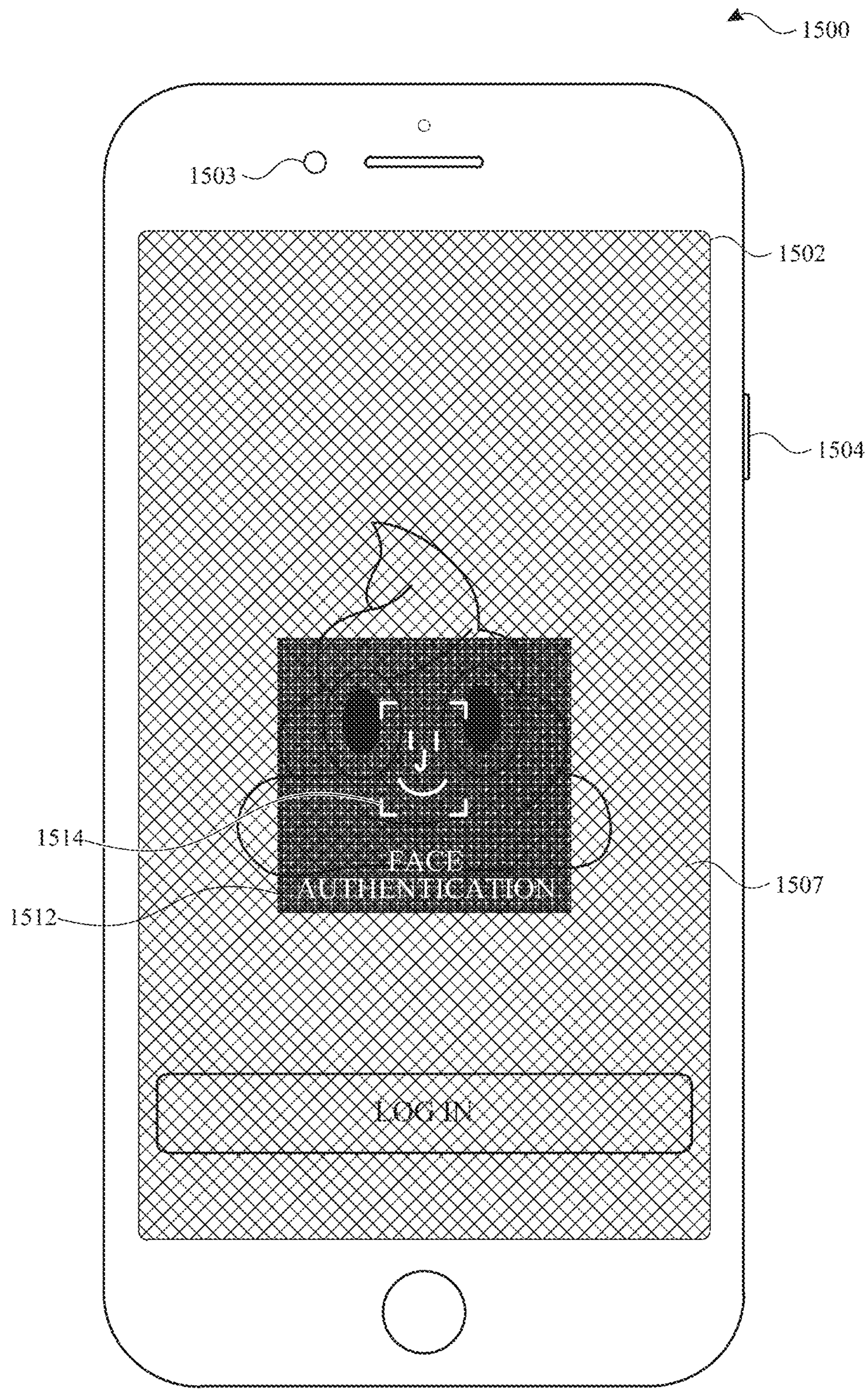

In some examples, including the example of FIG. 15C, the biometric authentication interface is partially translucent. In some examples, display (e.g., a visual characteristic) of the biometric authentication interface 1512 is based on the application interface 1506. By way of example, one or more colors of the biometric authentication interface 1512 are based on one or more colors of the application interface 1506. With reference to FIG. 15C, the electronic device 1500 displays an application interface 1506 having a first color scheme, and the biometric authentication interface 1512 is displayed based on the first color scheme (e.g., is displayed using colors that contrast with the first color scheme). With reference to FIG. 15D, the electronic device 1500 displays an application interface 1507 having a second color scheme different than the first color scheme, and the biometric authentication interface 1512 is displayed based on the color scheme. Displaying the biometric authentication interface 1512 in this manner allows for the biometric authentication interface 1512 to be easily recognized and viewed by a user when overlaid on an application interface.

In response to initiating biometric authentication, the electronic device 1500 captures and processes (e.g., analyzes) the biometric data to determine, based on the biometric data, whether the biometric feature (or a portion thereof) satisfies biometric authentication criteria (e.g., determine whether the biometric data matches, within a threshold, a biometric template). In some examples, in response to obtaining the biometric data, the electronic device 1500 displays a biometric authentication animation that, for instance, includes changing the size of a biometric authentication glyph. In some examples, while the electronic device processes the biometric data, the electronic device displays (e.g., replaces display of the biometric authentication glyph 1514 with) one or more biometric authentication glyphs and/or biometric authentication animations to indicate that the biometric data is being processed.

Figure 15E:
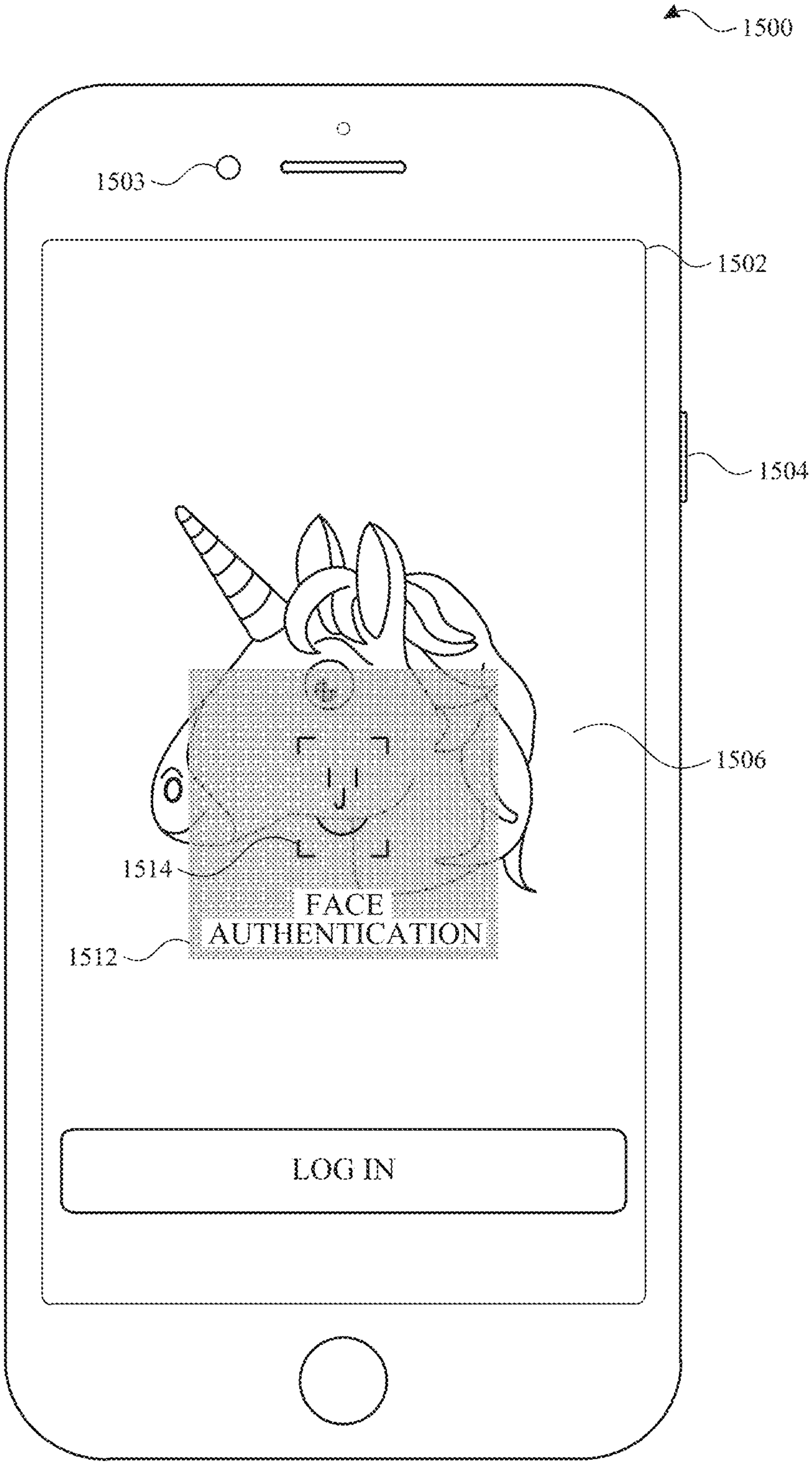
Figure 15F:
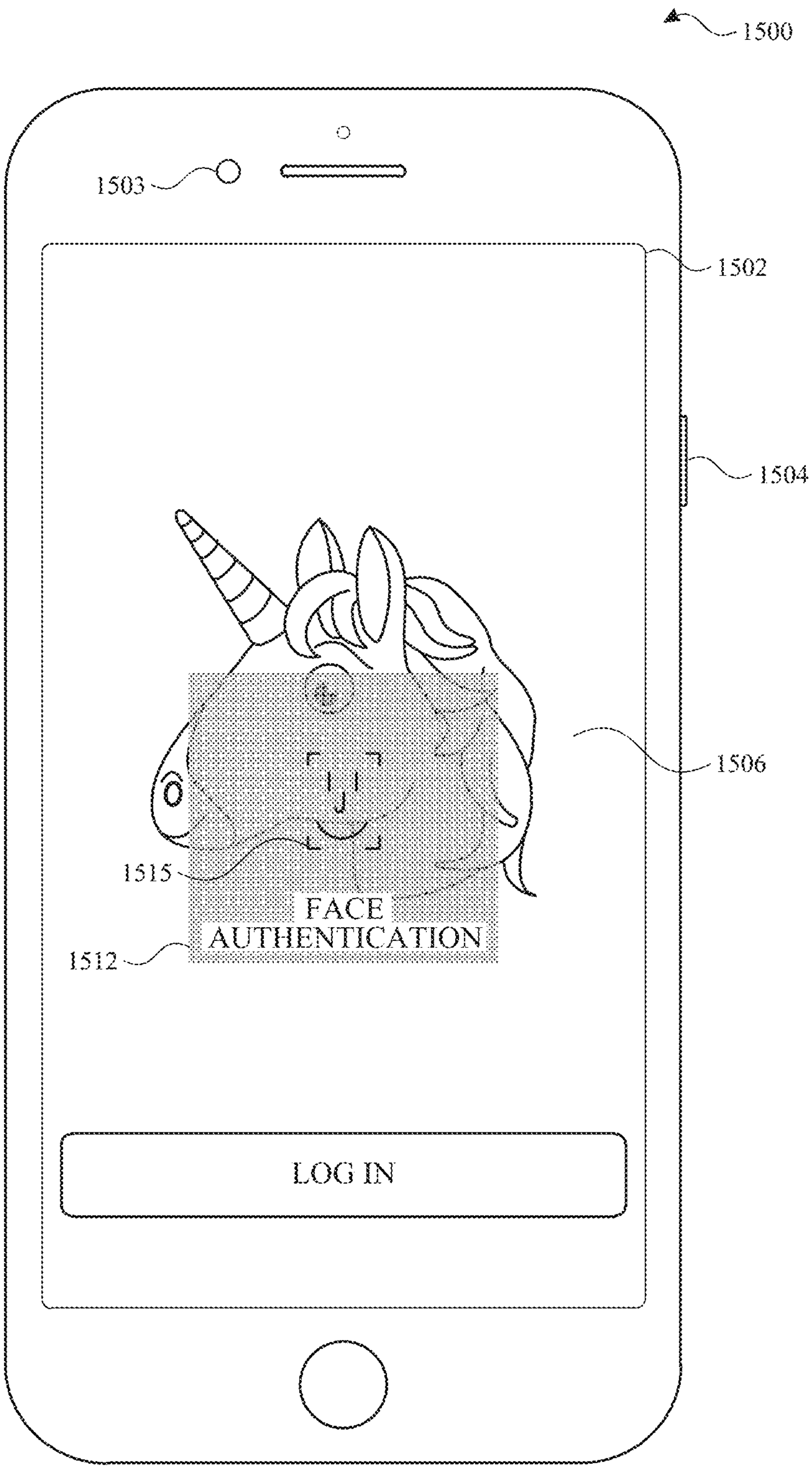
Figure 15G:
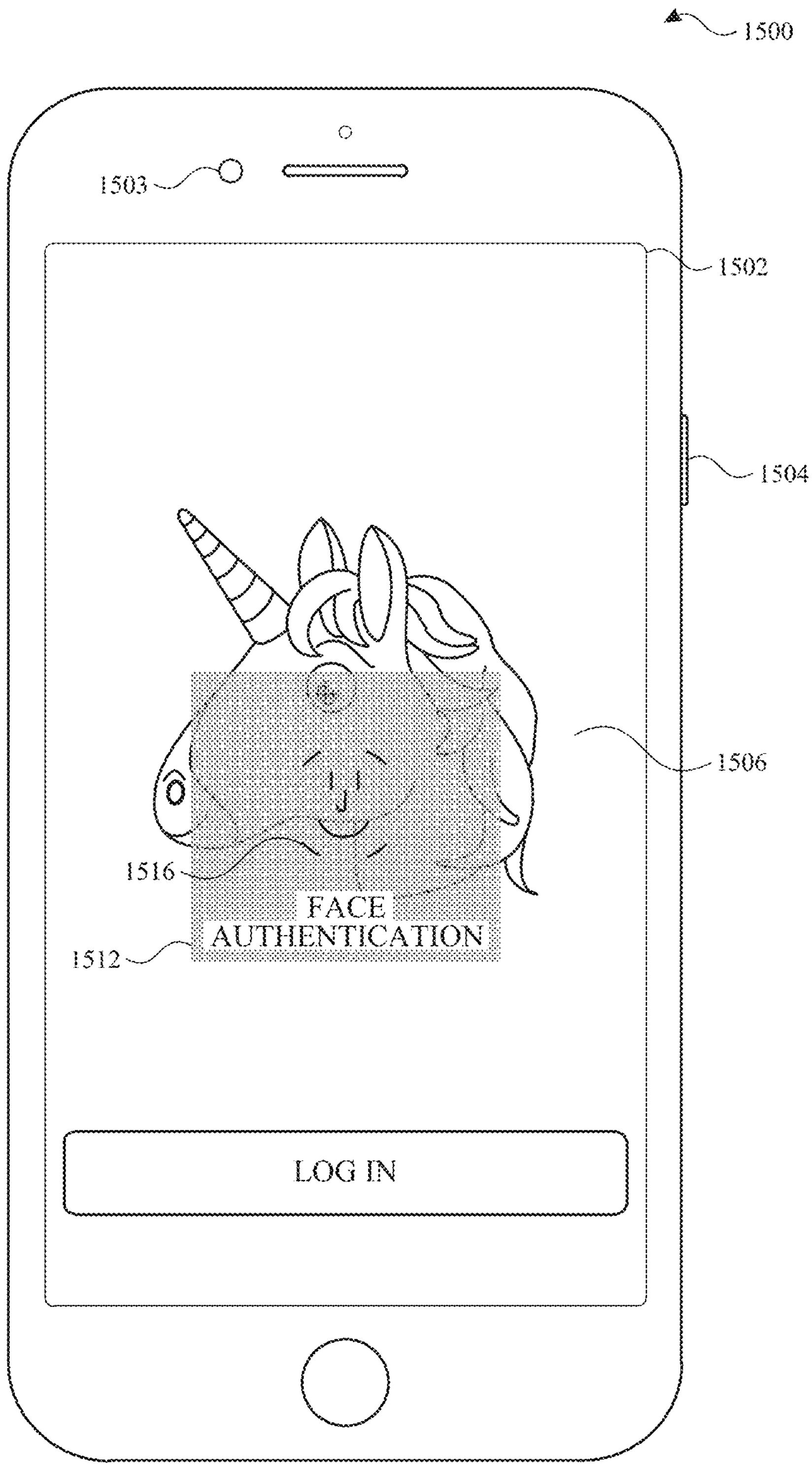
Figure 15H:
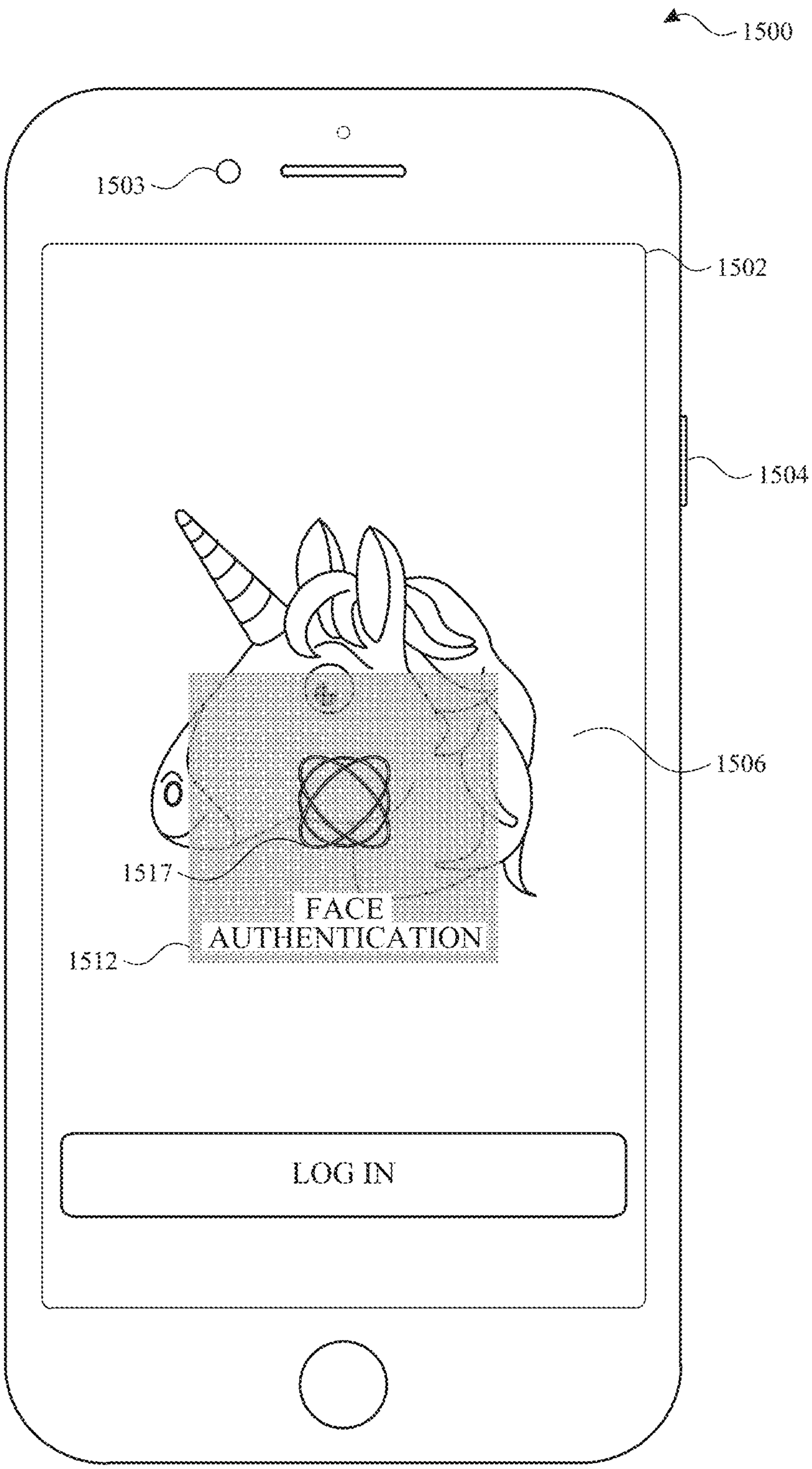

By way of example, in FIG. 15E, the electronic device displays the biometric authentication glyph 1514 in response to initiation of biometric authentication. With reference to FIGS. 15F-G, once the electronic device 1500 has obtained biometric data (e.g., obtained sufficient biometric data), the electronic device 1500 displays a biometric authentication animation including the biometric authentication glyphs 1515 (FIG. 15F) and 1516 (FIG. 15G), which serve as a portion of animation in which the biometric authentication glyph 1514 is replaced by (e.g., transitioned to) the biometric authentication glyph 1517 (FIG. 15H). With reference to FIG. 15H, the electronic device 1500 displays the biometric authentication glyph 1517 to indicate that the biometric data is being processed. In some examples, the biometric authentication glyph 1517 includes a plurality of rings, which rotate spherically, for instance, while displayed.

Figure 15I:
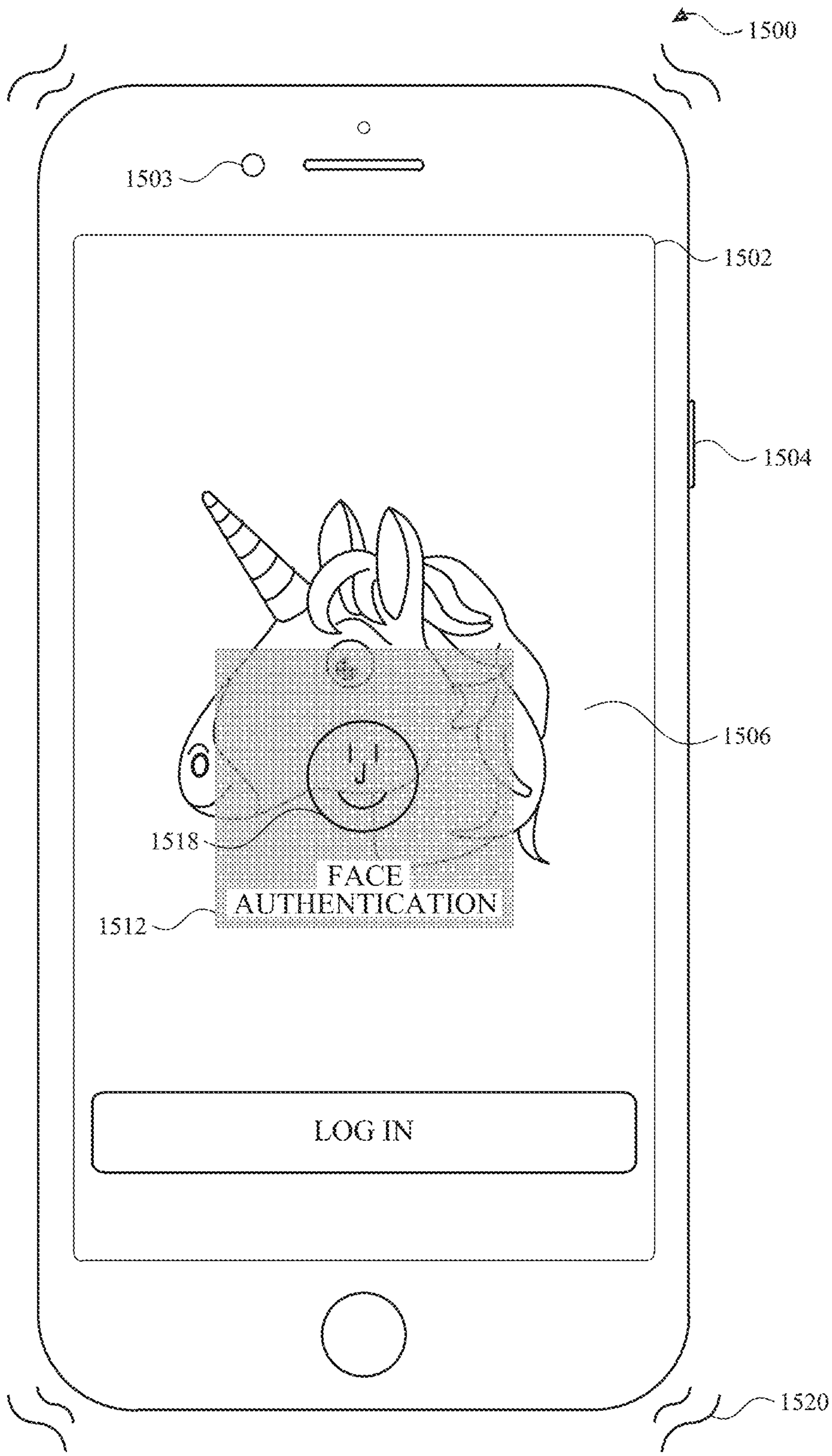

In FIG. 15I, the electronic device 1500 determines that the biometric feature satisfies the biometric authentication criteria. In response, the electronic device displays (e.g., replaces display of the biometric authentication glyph 1517 with) a biometric authentication glyph 1518 in the biometric authentication interface 1512, indicating that the biometric authentication was successful. Additionally or alternatively, the electronic device outputs a tactile output 1520 indicating the biometric authentication was successful. After indicating the biometric authentication is successful, the electronic device 1500 provides authentication information to the application indicating that the biometric feature satisfies the biometric authentication criteria and that as a result the biometric authentication was successful.

Figure 15J:
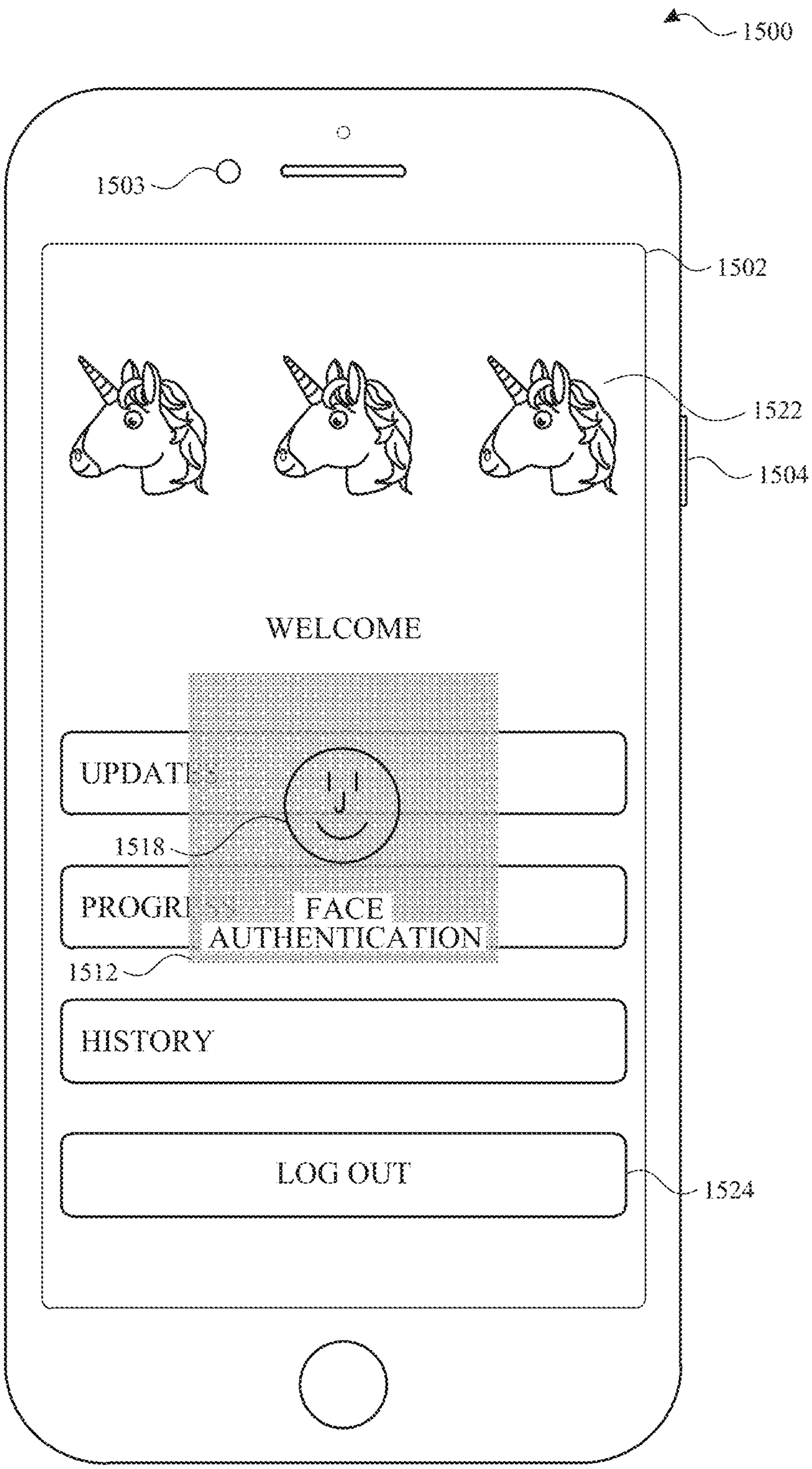
Figure 15K:
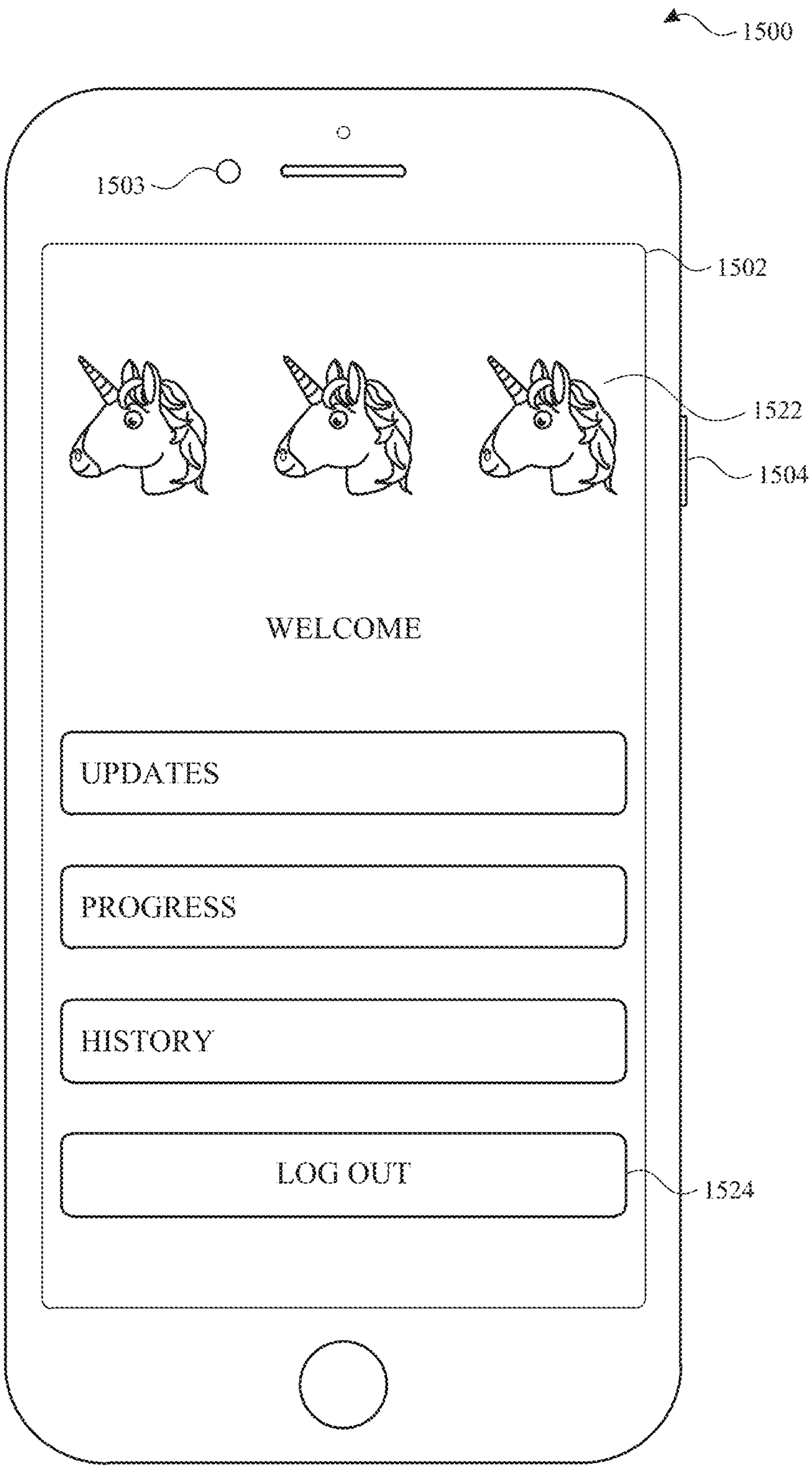

As shown in FIG. 15J, in response to the electronic device 1500 providing the authentication information indicating that the biometric feature satisfies the biometric authentication criteria, the application displays (e.g., replaces display of the application interface 1506 with) a main interface 1522. With reference to FIG. 15K, after a predetermined amount of time, the electronic device 1500 ceases display of the biometric authentication interface. Thereafter, the user optionally uses the application as if the user had authenticated with the application directly (e.g., using a username and password for an account associated with the application). In some examples, the electronic device 1500 ceases displaying the biometric authentication interface 1512 a predetermined amount of time after biometric authentication has completed. In other examples, the electronic device 1500 ceases displaying the biometric authentication interface 1512 a predetermined amount of time after the application has performed an operation, such as displaying an interface (e.g., main interface 1522).

Figure 15L:
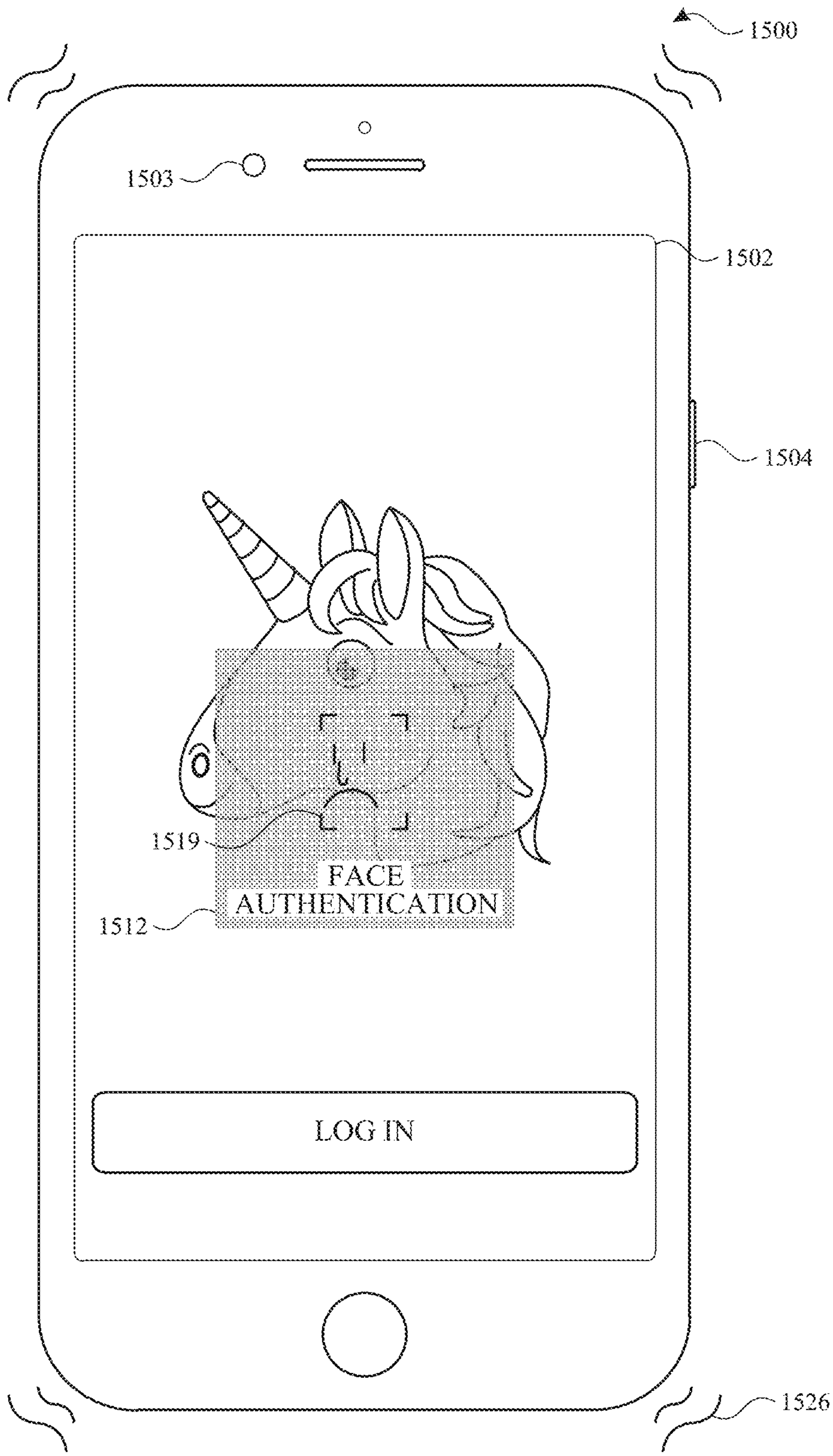
Figure 15M:
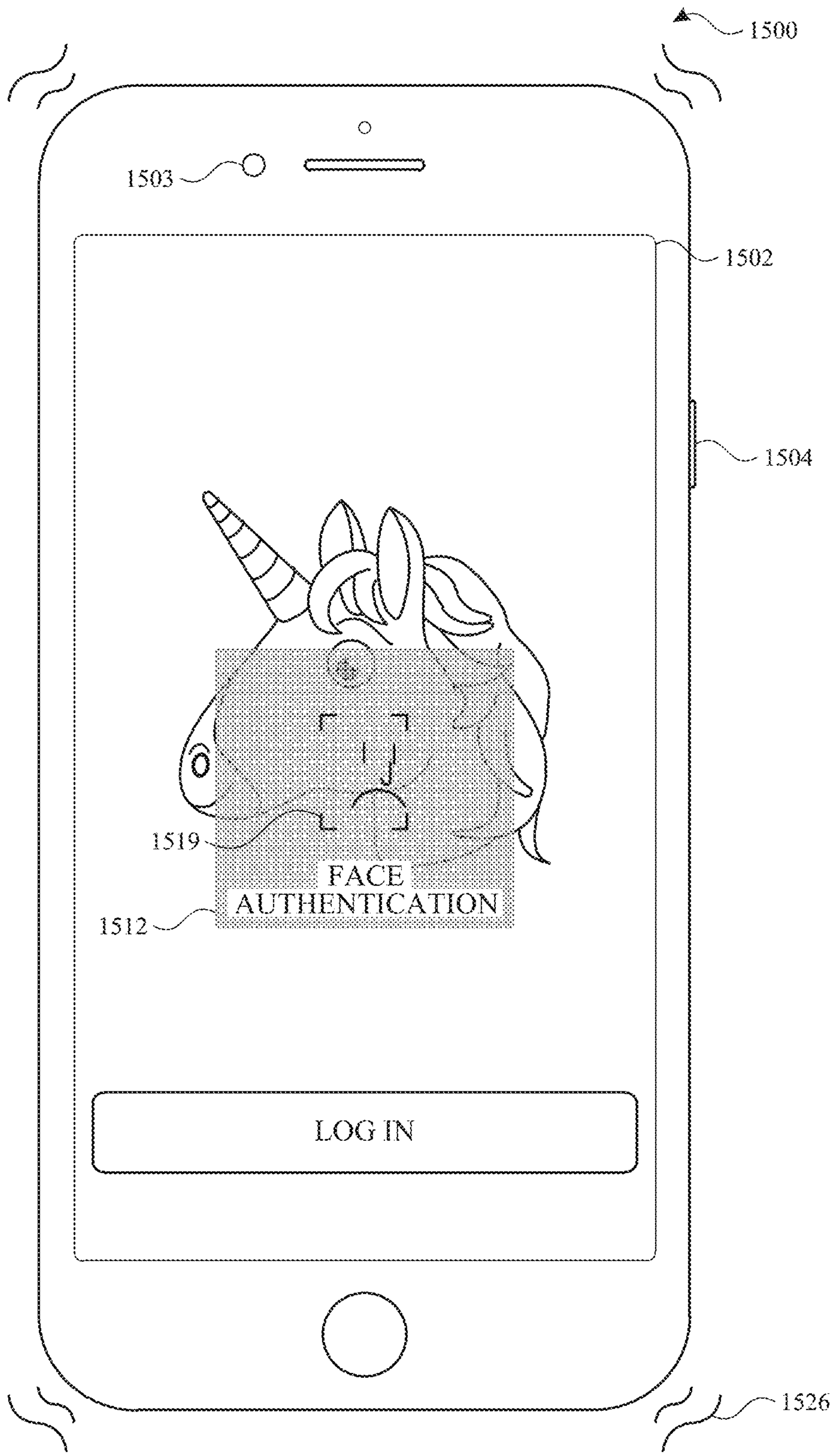

Alternatively, in FIG. 15L, the electronic device 1500 determines (e.g., after displaying the biometric authentication glyph 1517 of FIG. 15G) that the biometric feature does not satisfy the biometric authentication criteria. In response, the electronic device displays (e.g., replaces display of the biometric authentication glyph 1517 with) a biometric authentication glyph, such as the biometric authentication glyph 1519, in the biometric authentication interface 1512 to indicate that the biometric authentication was unsuccessful (e.g., failed). In some examples, the biometric authentication glyph 1519 is associated with a biometric authentication failure animation. With reference to FIGS. 15L-M, in some examples, in response to unsuccessful biometric authentication, the electronic device 1500 displays a biometric authentication failure animation in which the biometric authentication glyph 1519 moves (e.g., rotates) side-to-side to simulate a "head shake" effect and indicate that the biometric authentication was unsuccessful. Optionally, the electronic device 1500 outputs a tactile output 1526 indicating the biometric authentication was unsuccessful. In some examples, the tactile output 1526 is the same as the tactile output 1520. In some examples, the tactile output 1526 is different than the tactile output 1520. In some examples, the tactile output 1526 is synchronized with the biometric authentication failure animation.

Figure 15N:
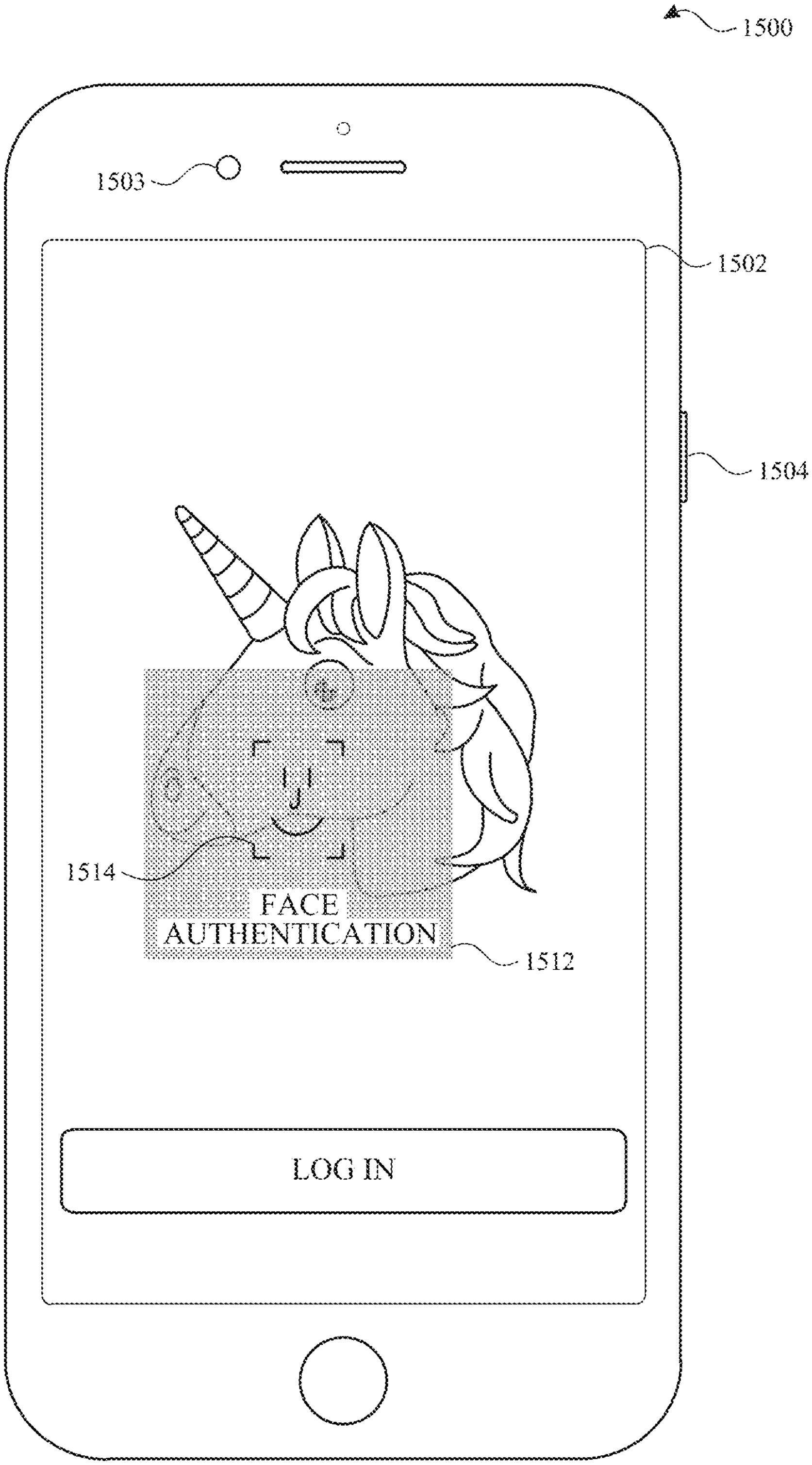
Figure 15O:
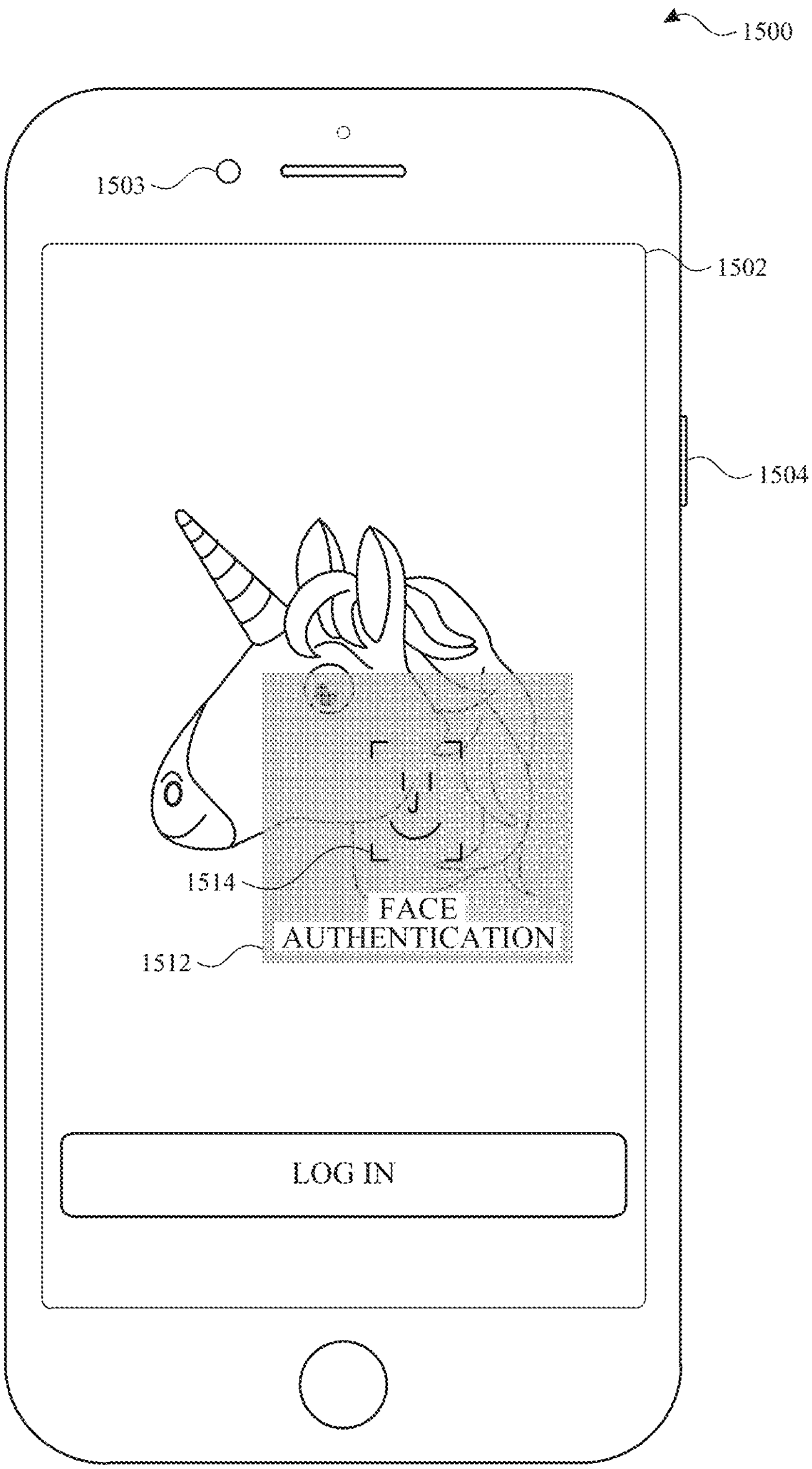

FIGS. 15N-O illustrate an alternative biometric failure animation in which, in response to unsuccessful biometric authentication (as determined with respect to FIG. 15E), the electronic device 1500 displays (e.g., replaces display of the biometric authentication glyph 1517 (FIG. 15H) with) the biometric authentication glyph 1514 in the biometric authentication interface 1512. In some examples, during display of the biometric authentication failure animation, the electronic device moves the biometric authentication interface 1512 on the display 1502. In some examples, the electronic device 1500 moves the biometric authentication interface 1512 side-to-side to simulate a "shake" effect and indicate that the biometric authentication was unsuccessful. In some examples, the electronic device moves only the biometric authentication glyph 1514, and does not move the biometric authentication interface 1512. In other examples, additional or alternative glyphs are used in the biometric authentication failure animation.

Figure 15P:
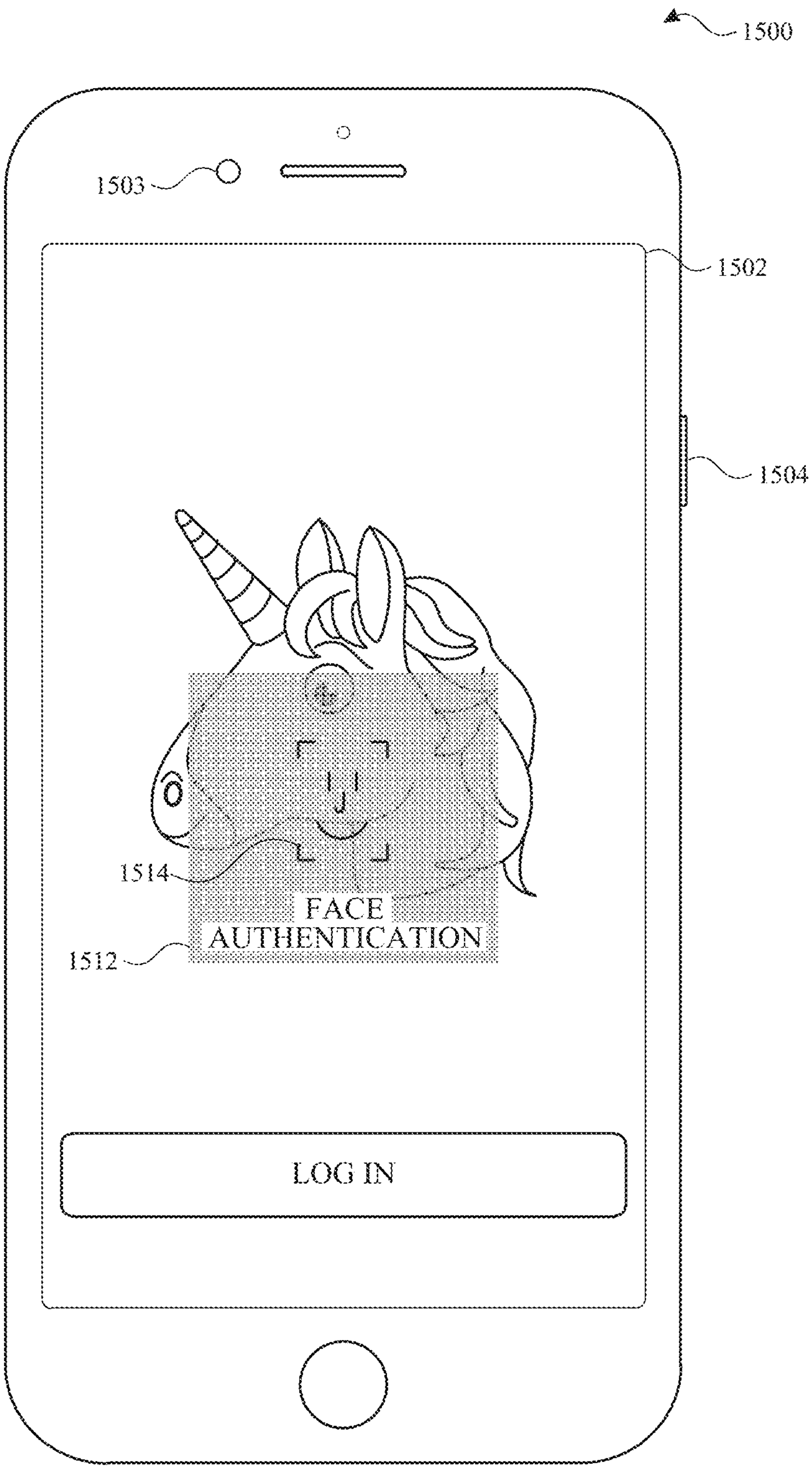

As illustrated in FIG. 15P, in some examples, after displaying one or more biometric authentication failure animations, the electronic device displays the biometric authentication interface 1512 having the biometric authentication glyph 1514. In this manner, the electronic device once again displays the initial biometric authentication glyph 1514, signifying that the electronic device 1500 is enabled to perform an additional biometric authentication. In some examples, the electronic device performs an additional iteration of biometric authentication, as described with respect to at least FIGS. 15E-N.

Figure 15Q:
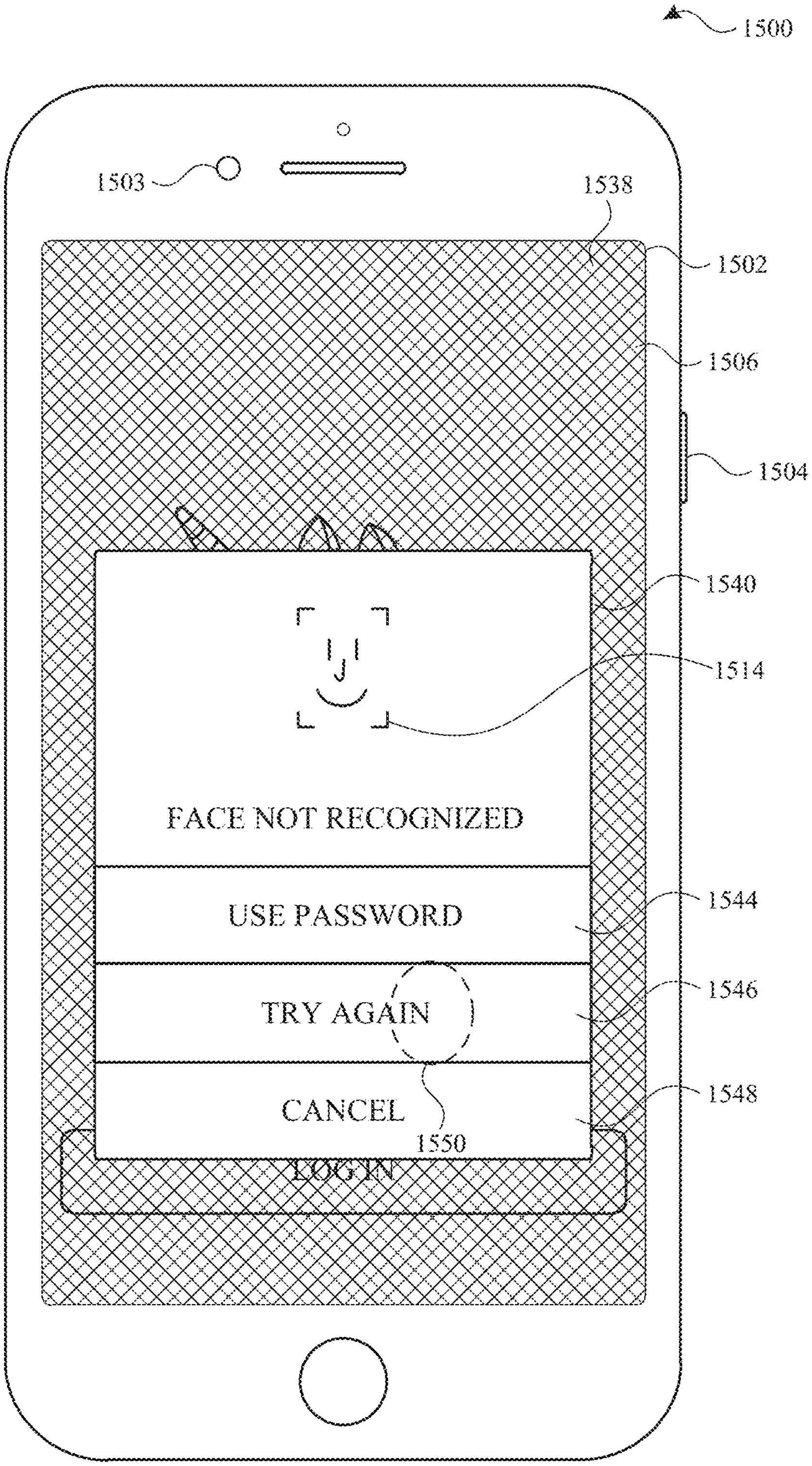

With reference to FIG. 15Q, in some examples, in response to unsuccessful biometric authentication, the electronic device 1500 displays (e.g., replaces display of the biometric authentication interface 1512 with) a failure interface 1540. In some examples, displaying the failure interface 1540 includes maintaining display of the biometric authentication interface 1512. In some examples, the failure interface 1540 includes the biometric authentication glyph 1514, an alternative authentication affordance 1544, a retry affordance 1546, and a cancellation affordance 1548. In some examples, activation of the cancellation affordance 1548 causes the electronic device 1500 to cease display of the failure interface 1540.

Figure 15R:
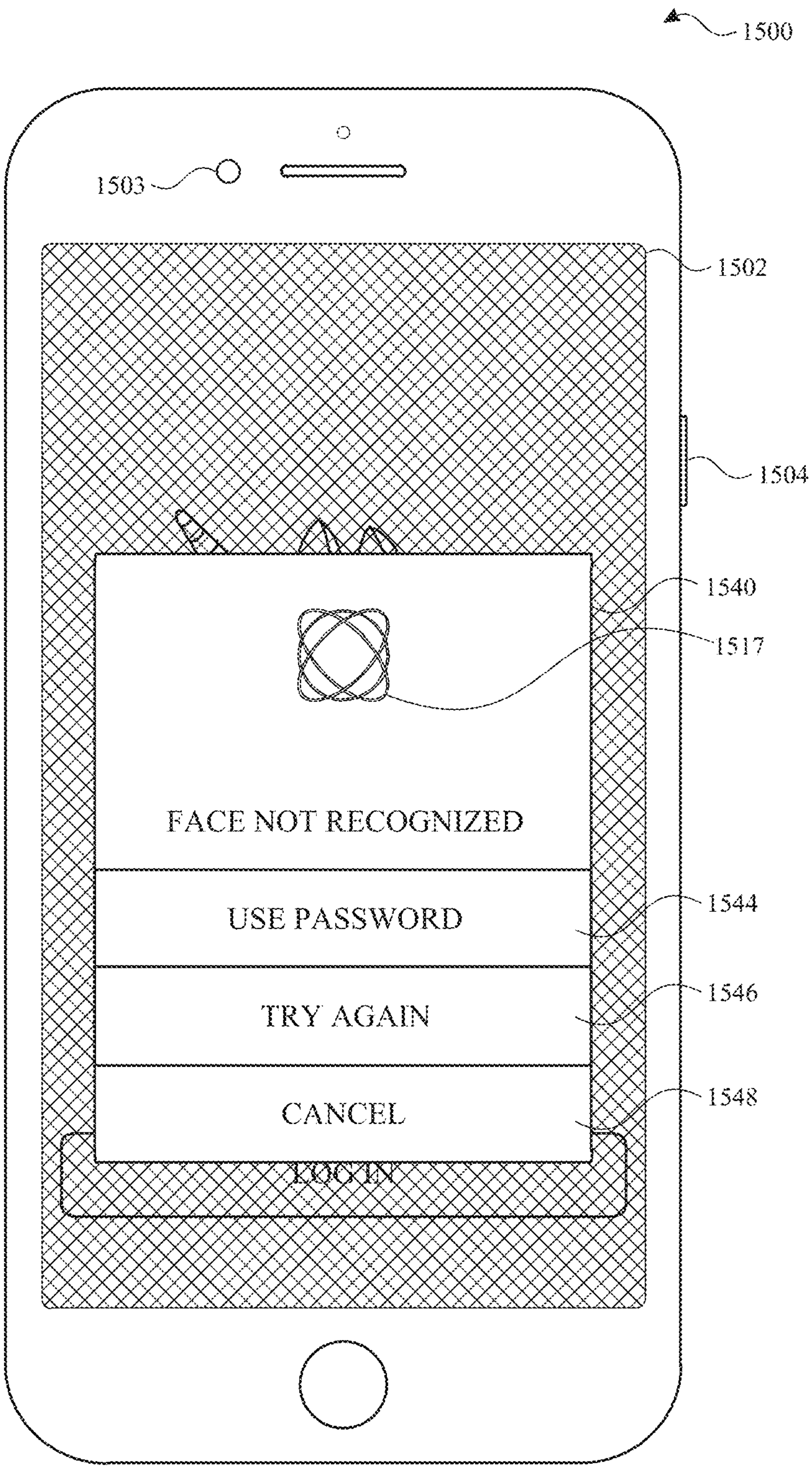
Figure 15S:
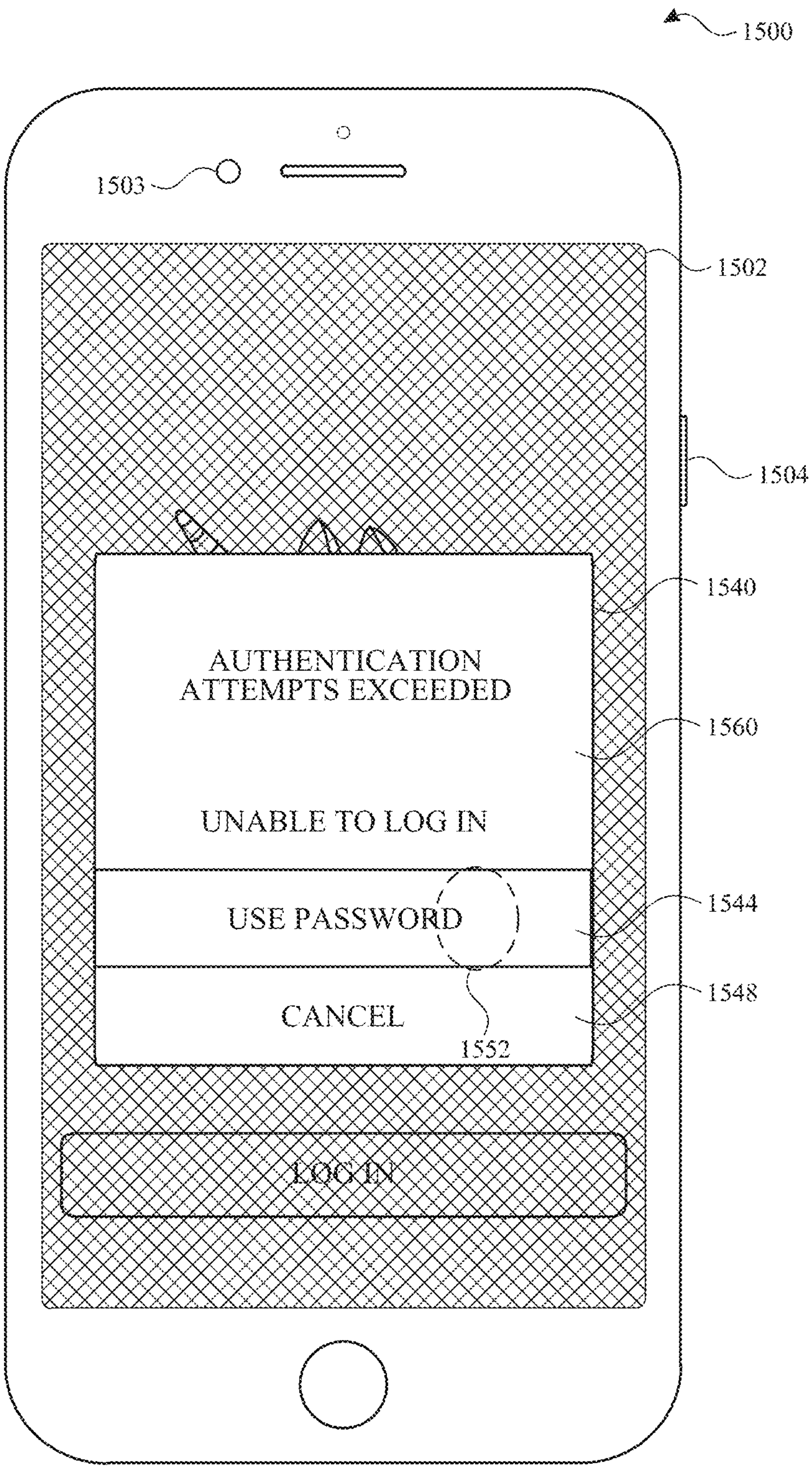
Figure 15T:
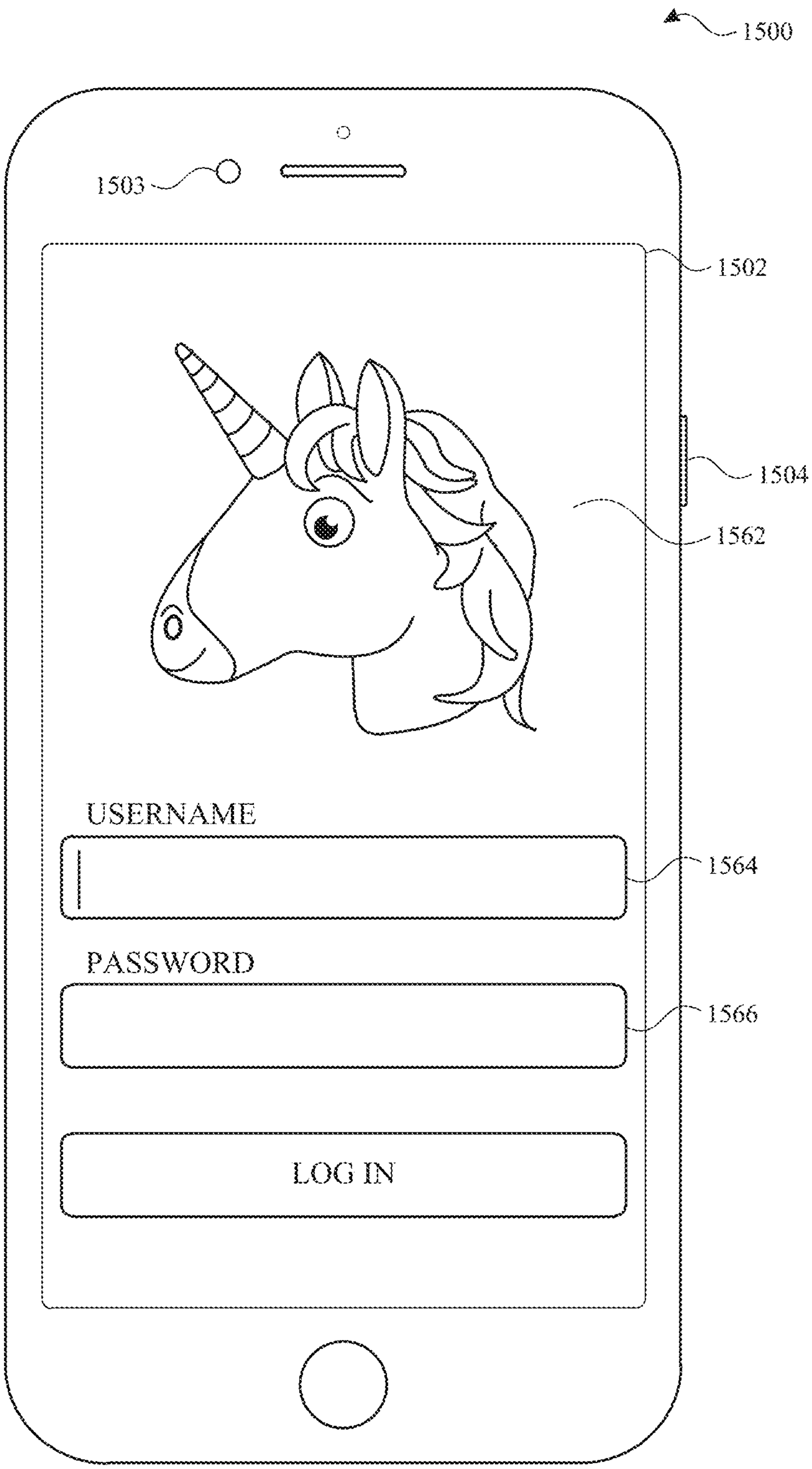
Figure 16A:
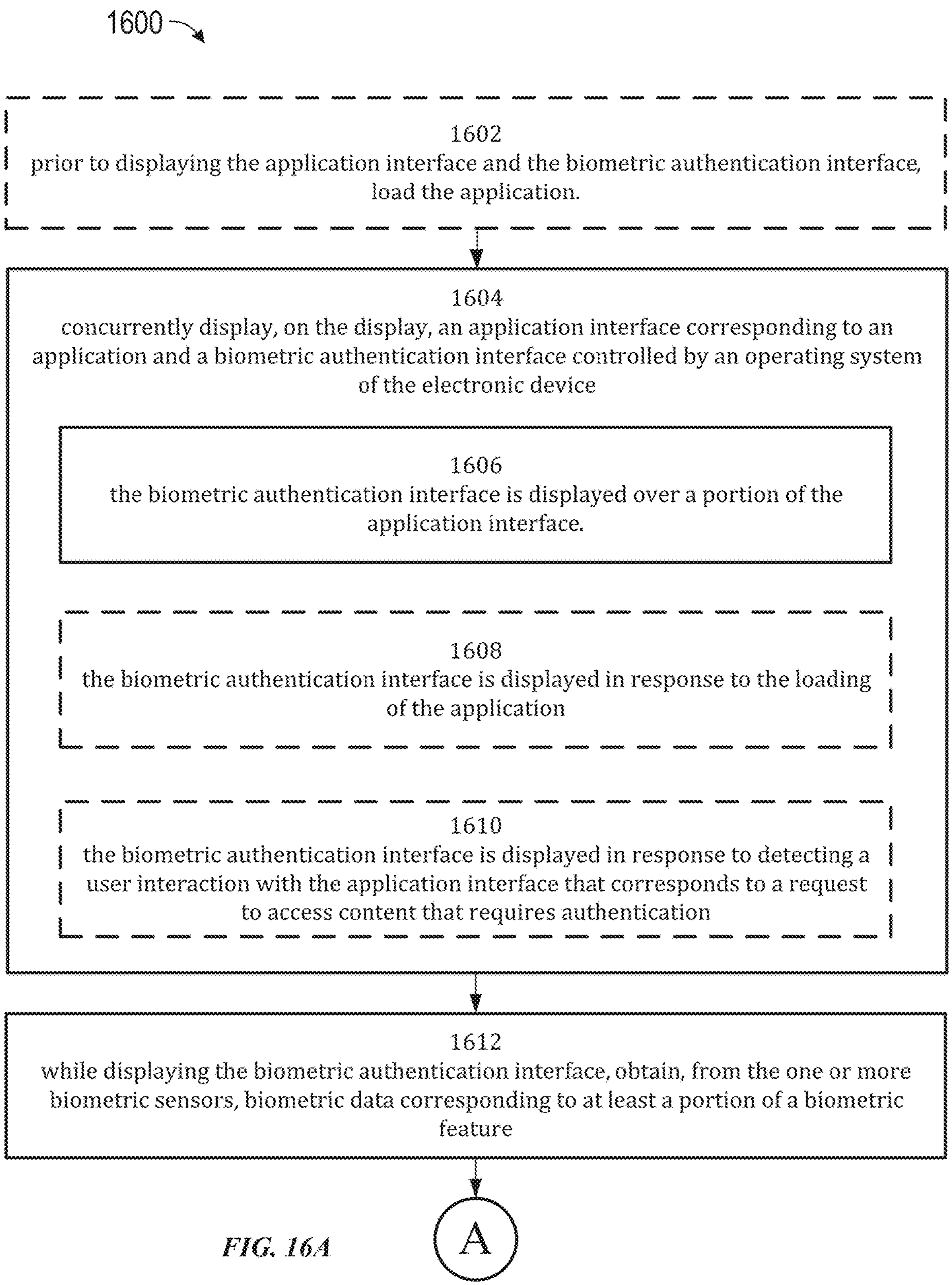
Figure 16B:
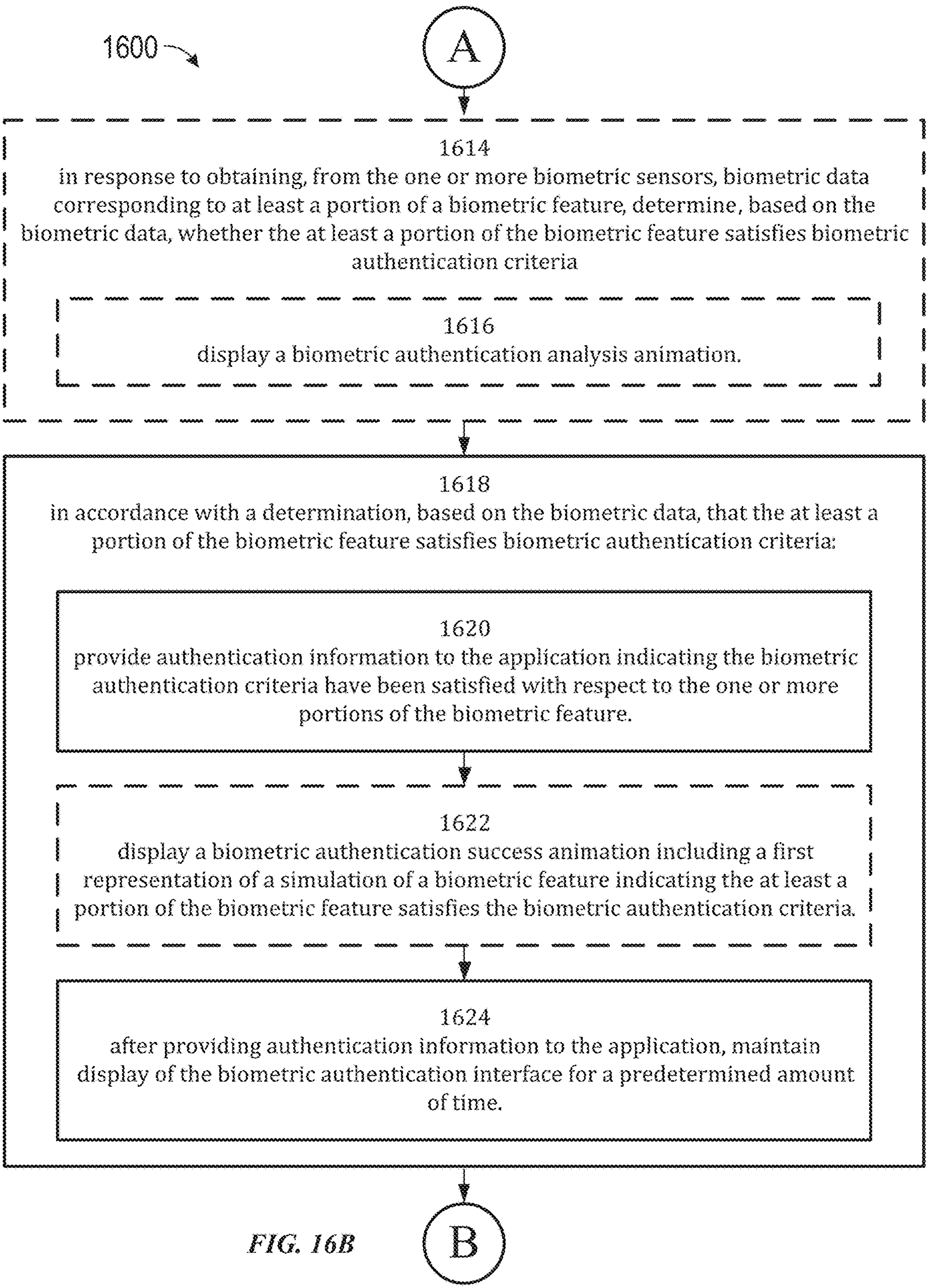
Figure 16E:
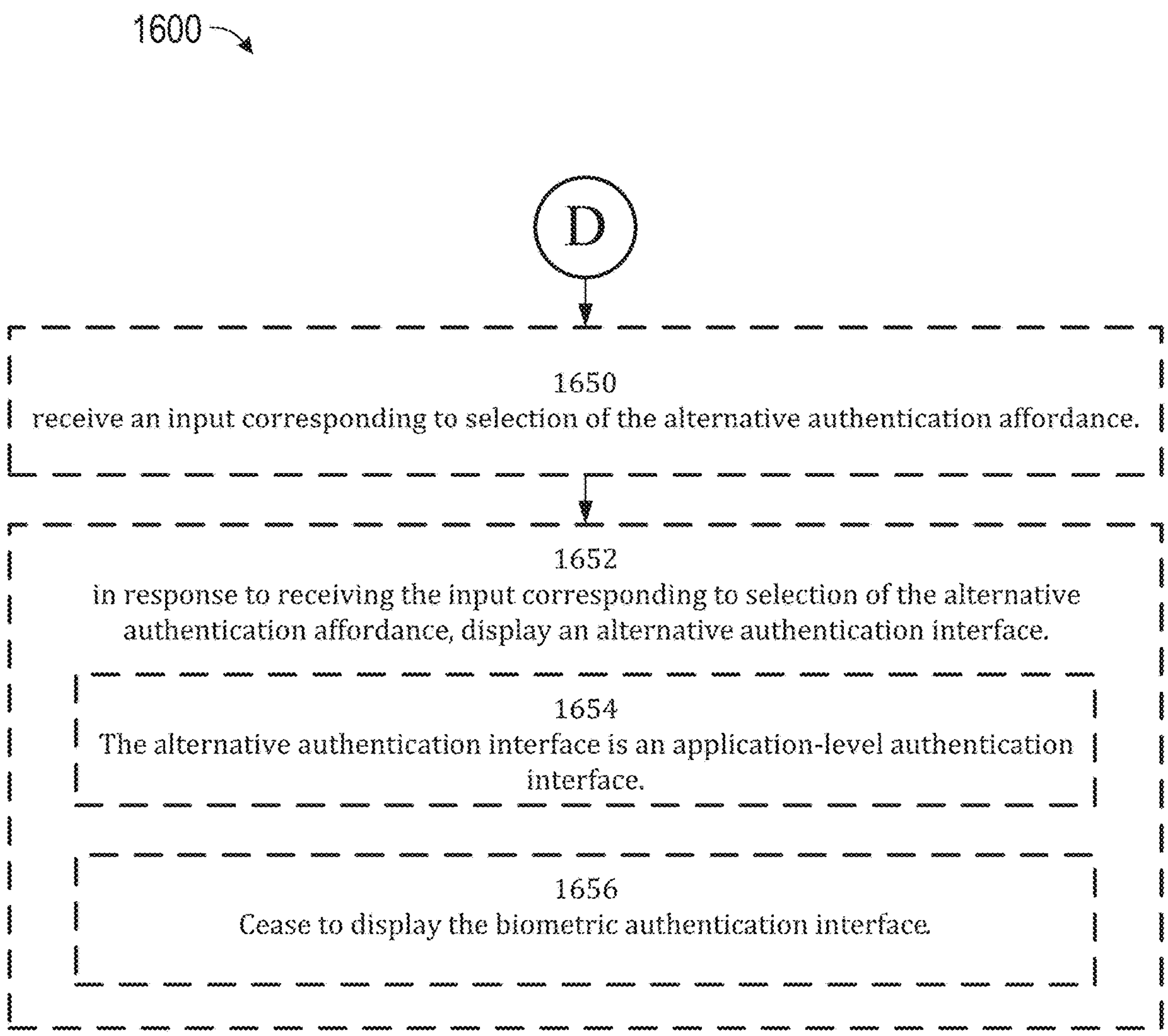

With reference to FIG. 15R, in some examples, in response to an activation of the retry affordance 1546, such as the tap gesture 1550, the electronic device 1500 performs another iteration of biometric authentication. In some examples, the electronic device 1500 displays one or more biometric authentication glyphs (e.g., 1515-1517) and/or biometric authentication animations in the failure interface 1540 to indicate progress and/or a result of the biometric authentication. With reference to FIG. 15S, in some examples, the electronic device performs the biometric authentication only if a threshold number (e.g., 5) of failed biometric authentication attempts have not been made. In some examples, if the threshold number of failed biometric authentication attempts has been reached, the electronic device 1500 displays (e.g., replaces display of the biometric authentication glyph 1514 with) an indication 1560, that the threshold number has been reached and that biometric authentication is not available as a result.

In some examples, in response to an activation of the alternative authentication affordance 1544, such as the tap gesture 1552, the electronic device 1500 displays (e.g., replaces display of the failure interface 1540 with) an alternative authentication interface 1562, with which the user authenticates using an alternative form of authentication than that associated with the biometric feature (e.g., fingerprint authentication, password authentication). As illustrated in FIG. 15T, a user optionally authenticates by entering appropriate credentials in the username field 1564 and password field 1566, respectively. In some examples, the failure interface 1540 is an operating system level interface such that the user authenticates with the operating system of the electronic device 1500, and the alternative authentication interface 1562 is an application-level interface such that the user authenticates with the application.

FIGS. 16A-16E are a flow diagram illustrating a method for managing peer-to-peer transfers using an electronic device in accordance with some examples. Method 1600 is performed at a device (e.g., 100, 300, 500, 1500) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric feature by the one or more biometric sensors. Some operations in method 2000 are, optionally, combined, the orders of some operations are, optionally, changed, and some operations are, optionally, omitted.

As described below, method 1600 provides an intuitive way for managing authentication of biometric features. The method reduces the cognitive burden on a user for managing authentication of biometric features, thereby creating a more efficient human-machine interface and intuitive user experience. For battery-operated computing devices, enabling a user to manage authentication of biometric features faster and more efficiently conserves power and increases the time between battery charges.

Prior to displaying an application interface (e.g., 1506) and a biometric authentication interface (e.g., 1512), the electronic device (e.g., 100, 300, 500, 1500) loads (1602) an application (e.g., A browser application as discussed with respect to FIG. 15A). In some examples, the application interface (e.g., 1506) is an interface of a third-party application not initially installed on the electronic device (e.g., 100, 300, 500, 1500) and/or not provided by the manufacturer of the device or the manufacturer of an operating system of the electronic device (e.g., 100, 300, 500, 1500). In some examples, the biometric authentication interface (e.g., 1512) is an operating system generated asset that is not subject to the control of the application corresponding to (e.g., generating) the application interface (e.g., 1506).

The electronic device (e.g., 100, 300, 500, 1500) concurrently displays (1604), on the display (e.g., 1502), the application interface (e.g., 1506) corresponding to the application and the biometric authentication interface (e.g., 1512) controlled by an operating system of the electronic device (e.g., 100, 300, 500, 1500). Concurrently displaying the application interface and the biometric authentication interface allows the user to quickly recognize that the biometric authentication being requested is relevant to the application corresponding to the application interface, and further provides the user with more control of the device by helping the user avoid unintentionally executing an operation using the application and simultaneously allowing the user to recognize that authentication is required before the operation will be performed. Providing additional control of the device in this manner without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some examples, the biometric authentication interface (e.g., 1512) is displayed (1606) over a portion of the application interface (e.g., 1506). In some examples, the biometric authentication interface (e.g., 1512) is not displayed over the entirety of the application interface (e.g., 1506) and at least a portion of the application interface (e.g., 1506) remains displayed without being overlaid. In some examples, the biometric authentication interface (e.g., 1512) is at least partially translucent. In some examples, the biometric authentication interface (e.g., 1512) is at least partially translucent (or transparent) such that the application interface (e.g., 1506) is at least partially visible through the biometric authentication interface (e.g., 1512). In some examples, the biometric authentication interface (e.g., 1512) blurs the underlying content, so that the appearance of the biometric authentication interface (e.g., 1512) is based on a portion of blurred content under the biometric authentication interface (e.g., 1512). In some examples, the biometric authentication interface (e.g., 1512) is displayed in response to the loading of the application (1608). In some examples, the biometric authentication interface (e.g., 1512) is displayed in response to the user loading (e.g., initiating or resuming execution of) an application on the electronic device (e.g., 100, 300, 500, 1500). In some examples, the biometric authentication interface (e.g., 1512) is loaded after the application is displayed. In some examples, the biometric authentication interface (e.g., 1512) and application interface (e.g., 1506) are displayed simultaneously. In some examples, the biometric authentication interface (e.g., 1512) is displayed in response to detecting a user interaction with the application interface (e.g., 1506) that corresponds to a request to access content that requires authentication (1610). In some examples, the request for authentication is a selection of an authentication affordance (e.g., 1508) or the performance of a gesture. In some examples, the application interface (e.g., 1506) includes the authentication affordance (1506) (e.g., log-in affordance).

While displaying the biometric authentication interface (e.g., 1512), prior to obtaining the biometric data corresponding to at least a portion of the biometric feature, the electronic device (e.g., 100, 300, 500, 1500) prepares to use the one or more biometric sensors (e.g., 1503). In some examples, in response to display of the log-in affordance (e.g., 1508), the electronic device (e.g., 100, 300, 500, 1500) prepares to use (e.g., readies) the one or more biometric sensors. In some examples, preparing to use the one or more biometric sensors (e.g., 1503) includes transitioning the sensors (e.g., 1503) from a low-power state (e.g., an unpowered state or a sleep state) to a low-latency state (e.g., a partial power state or a full power state, a pre-warmed state). In this manner, the electronic device (e.g., 100, 300, 500, 1500) optionally reduces the amount of time required to perform biometric authentication when displaying the biometric authentication interface (e.g., 1512). In some examples, when the one or more biometric sensors (e.g., 1503) are in the low-power state it takes a first amount of time to attempt biometric authentication using the one or more biometric sensors, and when the one or more biometric sensors (e.g., 1503) are in the low-latency state it takes a second amount of time, less than the first amount of time, to attempt biometric authentication using the one or more biometric sensors (e.g., 1503). While displaying the biometric authentication interface (e.g., 1512), the electronic device (e.g., 100, 300, 500, 1500) obtains (1612), from the one or more biometric sensors (e.g., 1503), the biometric data corresponding to at least a portion of a biometric feature. In some examples, the biometric feature is a face and the biometric data is data corresponding to a portion of the face.

In response to obtaining, from the one or more biometric sensors, biometric data corresponding to at least a portion of a biometric feature, the electronic device (e.g., 100, 300, 500, 1500) determines (1614), based on the biometric data, whether the at least a portion of the biometric feature satisfies biometric authentication criteria. Determining, based on the obtained biometric data, whether the at least a portion of the biometric feature satisfies biometric authentication criteria enables a quick and efficient authentication process that allows the user to easily provide and proceed with an authentication operation with minimal input. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 100, 300, 500, 1500) determines whether a face or a fingerprint of the user matches stored information about face(s) and/or fingerprint(s) that are authorized for use in biometric authentication at the device (e.g., 100, 300, 500, 1500). In some examples, determining, based on the biometric data, whether the at least a portion of the biometric feature satisfies biometric authentication criteria includes displaying (1616) a biometric authentication analysis animation. In some examples, the biometric authentication animation includes displaying a sequence of interface objects (e.g., 1514, 1515, 1516, 1517, 1518, 1519) (e.g., glyphs). A first interface object (e.g., 1514) indicates that biometric authentication has been initiated, a second interface object (e.g., 1517) indicates that the device (e.g., 100, 300, 500, 1500) is processing the biometric data, and a third interface object (e.g., 1518, 1519) indicates whether the biometric authentication succeeded or failed. In some examples, the first interface object (e.g., 1514) is substantially square in shape and the second interface object (e.g., 1517) is substantially circular in shape. In some examples, displaying a biometric authentication analysis animation includes rotating one or more rings around an interface object (e.g., 1517) (e.g., biometric authentication glyph) of the biometric authentication animation. In some examples, the one or more rings are rotated while the device (e.g., 100, 300, 500, 1500) is processing the biometric data to determine if the biometric data satisfies the biometric authentication criteria. Rotation of the rings optionally simulates rotation of rings around a sphere. In some examples, once the device (e.g., 100, 300, 500, 1500) has finished processing the biometric data, the one or more rings are overlaid with one another to demonstrate that the processing has completed. In some examples, displaying a biometric authentication analysis animation includes changing an appearance of an animated object (e.g., 1514, 1515, 1516, 1517, 1518, 1519) on a platter (e.g., 1512) that has an appearance based on underlying content (e.g., 1506, 1507, 1522). In some examples, as the appearance of the animated object changes, the appearance of the platter changes. In some examples, when the animated object gets darker, the platter gets darker, when the animated object gets lighter, the platter gets lighter. In some examples, the appearance of the platter changes as appearance of the animated object (e.g., 1514, 1515, 1516, 1517, 1518, 1519) changes, even when the underlying content (e.g., 1506, 1507, 1522) on which appearance of the platter (e.g., 1512) is based does not change. In some examples, one or more colors of the biometric authentication analysis animation are based on one or more colors of the application interface (e.g., 1506). In some examples, the colors of the animation are selected based on one or more colors of the application interface (e.g., 1506, 1507, 1522) or another interface associated with the application. Colors optionally are derived, for instance, based on colors used for controls and/or icons of the application. In this manner, the animation are, optionally, visually coordinated with the application interface (e.g., 1506, 1507,1522), providing a more robust user experience. In some examples, prior to displaying the biometric authentication analysis animation, the electronic device (e.g., 100, 300, 500, 1500) determines one or more colors of the animation based on an analysis of the color scheme of the application interface (e.g., 1506) or data corresponding to the application interface (e.g., 1506). In some examples, further in response to obtaining, from the one or more biometric sensors (e.g., 1503), biometric data corresponding to at least a portion of a biometric feature, the electronic device (e.g., 100, 300, 500, 1500) changes a size of an interface object (e.g., 1514) (e.g., a biometric authentication glyph) of the biometric authentication interface (e.g., 1512) from a first size to a second size and changes the size of the interface object (e.g., 1514) from the second size to the first size. In some examples, once the biometric data has been captured by the one or more biometric sensors (e.g., 1503), the interface object (e.g., 1514) (e.g., biometric authentication glyph) is increased from an initial size and subsequently returned to the initial size to create a "bounce" effect.

In accordance with a determination, based on the biometric data, that the at least a portion of the biometric feature satisfies biometric authentication criteria (1636), the electronic device (e.g., 100, 300, 500, 1500) provides (1620) authentication information to the application indicating the biometric authentication criteria have been satisfied with respect to the one or more portions of the biometric feature. Providing authentication information to the application in accordance with the determination that the at least a portion of the biometric feature satisfies biometric authentication criteria enhances the security of the device and reduces the number of fraudulent transfers that can occur. Enhancing device security and reducing the number of fraudulent transfers enhances the operability of the device and makes the user-device interface more secure (e.g., by reducing fraud when operating/interacting with the device).

In some examples, the authentication information is provided to the application generating the application interface (e.g., 1506) by the operating system. In some examples, further in accordance with a determination, based on the biometric data, that the at least a portion of the biometric feature satisfies biometric authentication criteria, after providing authentication information to the application, the electronic device (e.g., 100, 300, 500, 1500) maintains (1624) display of the biometric authentication interface (e.g., 1512) for a predetermined amount of time. In some examples, further in accordance with a determination, based on the biometric data, that the at least a portion of the biometric feature satisfies biometric authentication criteria, the electronic device (e.g., 100, 300, 500, 1500) displays (1622) a biometric authentication success animation including a first representation of a simulation of a biometric feature (e.g., 1518) indicating the at least a portion of the biometric feature satisfies the biometric authentication criteria.

In some examples, in response to successful biometric authentication, the device (e.g., 100, 300, 500, 1500) displays an animation including a interface object (e.g., 1518) indicating that the biometric authentication was successful. In some examples, further in accordance with a determination, based on the biometric data, that the at least a portion of the biometric feature satisfies biometric authentication criteria, the electronic device (e.g., 100, 300, 500, 1500) provides a success tactile output (e.g., 1520) indicating that the at least a portion of the biometric feature satisfies the biometric authentication criteria. Displaying an animation indicating that the biometric authentication was successful provides the user with visual feedback of the operation being performed and enables the user to quickly recognize that the operation was successful. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

After maintaining display of the biometric authentication interface (e.g., 1512) for a predetermined amount of time, the electronic device (e.g., 100, 300, 500, 1500) ceases (1626) to display the biometric authentication interface (e.g., 1512). In some examples, the application receives an indication of authentication prior to the device (e.g., 100, 300, 500, 1500) ceasing to display the biometric authentication interface (e.g., 1512); this allows the application to provide (e.g., display) an interface of the application (e.g., 1522), such as a "main application" interface or post log-in interface, prior to transition from the biometric authentication interface (e.g., 1512). In some examples, the biometric authentication interface (e.g., 1512) ceases to be displayed a predetermined amount of time after authentication. In some examples, the biometric authentication interface (e.g., 1512) ceases to be displayed a predetermined amount of time after the application has performed an operation in accordance with the biometric authentication (e.g., displaying an unlocked user interface (e.g., 1522)).

In accordance with a determination, based on the biometric data, that the at least a portion of the biometric feature does not satisfy the biometric authentication criteria (1628), the electronic device (e.g., 100, 300, 500, 1500) displays (1630) a biometric authentication failure animation including a second representation of a simulation of a biometric feature (e.g., 1519) indicating the at least a portion of the biometric feature does not satisfy biometric authentication criteria. Displaying a biometric authentication failure animation in accordance with a determination that the at least a portion of the biometric feature does not satisfy the biometric authentication criteria provides the user with visual feedback of a failure or an error in the operation being performed and enables the user to quickly recognize that the operation was unsuccessful. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, in response to unsuccessful biometric authentication, the device (e.g., 100, 300, 500, 1500) displays an animation including an interface object (e.g., 1519) indicating that the biometric authentication was unsuccessful. Displaying an animation including an interface object indicating that the biometric authentication was unsuccessful in response to unsuccessful biometric authentication provides the user with visual feedback of a failure or an error in the operation being performed and enables the user to quickly recognize that the operation was unsuccessful. Providing improved visual feedback to the user enhances the operability of the device and makes the user-device interface more efficient (e.g., by helping the user to achieve an intended result by providing feedback indicative of an input that will cause the device to generate the intended result and reducing user mistakes when operating/interacting with the device) which, additionally, reduces power usage and improves battery life of the device by enabling the user to use the device more quickly and efficiently.

In some examples, during the animation, the interface object (e.g., 1519) moves (e.g., tilts and/or shifts) in a predetermined manner (e.g., side to side) to indicate the failure. In some examples, the device (e.g., 100, 300, 500, 1500) generates a tactile output (e.g., 1526) or a sequence of tactile outputs that correspond to the biometric authentication failure animation (e.g., tactile outputs are generated as the simulation of the biometric feature moves back and forth). Outputting a tactile output or a sequence of tactile outputs that correspond to the biometric authentication failure animation further alerts that user that the authentication was unsuccessful and enables the user to quickly identify that authentication is still needed to proceed with the operation. Providing improved tactile feedback to the user enhances the operability of the device and makes the user-device interface more efficient which, additionally, reduces power usage and improves battery life of the device by enabling the user to use the device more quickly and efficiently.

In some examples, the second representation of the simulation of the biometric feature (e.g., 1519) is a three-dimensional object. Displaying a three-dimensional object as the second representation of the simulation of the biometric provides the user with an easily recognizable visual feedback about a state of the operation (e.g., whether the transfer was successful or unsuccessful) and, because the object is three-dimensional, further enables the user to more easily perceive the object. Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently.

In some examples, the second representation (e.g., 1519) is a three-dimensional face performing a head shake. In some examples, displaying the biometric authentication failure animation includes alternating rotation of the second representation (e.g., 1519) between rotation in a first direction about an axis parallel to the display and rotation in a second direction about the axis parallel to the display (e.g., 1502). In some examples, displaying the biometric authentication failure animation includes emphasizing a boundary of the biometric authentication interface (e.g., 1512) relative to the application interface (e.g., 1506). In some examples, the biometric authentication interface (e.g., 1512), or the boundary thereof, shrinks and/or retracts to create a visual "bounce" effect. In some examples, further in accordance with a determination, based on the biometric data, that the at least a portion of the biometric feature does not satisfy the biometric authentication criteria, the electronic device (e.g., 100, 300, 500, 1500) provides a failure tactile output (e.g., 1526) different than the success tactile output (e.g., 1520). In some examples, further in accordance with a determination, based on the biometric data, that the at least a portion of the biometric feature does not satisfy the biometric authentication criteria, the electronic device (e.g., 100, 300, 500, 1500) displays (1632) a failure interface (e.g., 1540). In some examples, the failure interface (e.g., 1540) includes a visual indication that biometric authentication has failed. In some examples, when the biometric authentication fails, the application interface (e.g., 1506) does not change (e.g., the application remains on a log-in (e.g., 1506) or authentication user interface). In some examples, when the biometric authentication fails, the application user interface (e.g., 1506) changes to indicate the failure of the biometric authentication. In some examples, the failure interface (e.g., 1540) includes a retry affordance (e.g., 1546) (1634). In some examples, the failure interface (e.g., 1540) includes a cancellation affordance (e.g., 1548) (1636). In some examples, the failure interface (e.g., 1540) includes an alternative authentication affordance (e.g., 1544) (1638).

The electronic device (e.g., 100, 300, 500, 1500) receives (1640) an input (e.g., 1550) corresponding to a selection of the retry affordance (e.g., 1546). In response to receiving an input (e.g., 1550) corresponding to a selection of the retry affordance (e.g., 1546), the electronic device (e.g., 100, 300, 500, 1500) obtains (1642), from the one or more biometric sensors (e.g., 1503), second biometric data corresponding to at least a portion of a second biometric feature. In some examples, the second biometric feature (e.g. a face) is the same biometric feature as the biometric feature from which the initial biometric data was obtained. In some examples in which the second biometric feature is the same biometric feature, the portion of the second biometric feature is a different portion of the same biometric feature from which the initial biometric data was obtained. In some examples, the portion is the same portion of the same biometric feature. In some examples, the second biometric feature is a different biometric feature than the initial biometric feature.

After obtaining the second biometric data that corresponds to at least a portion of the second biometric feature, in accordance with a determination, based on the second biometric data, that the at least a portion of the second biometric feature satisfies second biometric authentication criteria, the electronic device (e.g., 100, 300, 500, 1500) provides (1646) second authentication information to the application indicating the second biometric authentication criteria have been satisfied with respect to the one or more portions of the second biometric feature. In some examples, the second biometric authentication criteria are the same as the initial biometric authentication criteria. In some examples, the second biometric authentication criteria are different from the initial biometric authentication criteria. In some examples, the second authentication information is the same as the authentication information. In some examples, the second authentication information is different from the authentication information. In some examples, the authentication information is provided to the application generating the application interface (e.g., 1506) by the operating system.

The electronic device (e.g., 100, 300, 500, 1500) receives (1646) an input corresponding to selection of the cancellation affordance. In response to receiving the input corresponding to selection of the cancellation affordance, the electronic device (e.g., 100, 300, 500, 1500) ceases (1648) to display the biometric authentication interface (e.g., 1512). In some examples, selection of the cancellation affordance dismisses the failure interface (e.g., 1540), while maintaining the application interface (e.g., 1506). In some examples, selection of the cancellation affordance also causes the electronic device (e.g., 100, 300, 500, 1500) to provide information to the application indicating that the first and/or second biometric authentication criteria have not been met.

The electronic device (e.g., 100, 300, 500, 1500) receives (1650) an input (e.g., 1548) corresponding to selection of the alternative authentication affordance (e.g., 1544). Providing an alternative authentication affordance (e.g., to provide an alternative method for providing the authentication, in addition to or alternatively to the biometric authentication) allows the user to easily provide authentication for an operation using a different authentication method if the current authentication method is or continues to be unsuccessful. Providing additional control options (e.g., for providing authentication) in this manner without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the input (e.g., 1548) corresponding to selection of the alternative authentication affordance (e.g., 1544), the electronic device (e.g., 100, 300, 500, 1500) displays (1652) an alternative authentication interface (e.g., 1562). In some examples, the alternative authentication interface (e.g., 1562) is a non-biometric authentication interface (e.g., 1512). In some examples, the alternative authentication interface (e.g., 1562) allows a user to authenticate using a password and/or passcode. In some examples, the application determines which forms of authentication are accepted by the alternative authentication interface (e.g., 1562). In some examples, one or more preferences of the application determine which forms of authentication are accepted by the application. In some examples, the alternative authentication affordance (e.g., 1562) is included in the failure interface (e.g., 1540) in response to more than a predefined number of consecutive failures of biometric authentication (e.g., two failed authentication attempts, three failed authentication attempts, four failed authentication attempts, etc.). In some examples, the alternative authentication interface (e.g., 1562) is an application-level authentication interface (1654). In some examples, in response to receiving the input corresponding to selection of the alternative authentication affordance (e.g., 1544), the electronic device (e.g., 100, 300, 500, 1500) ceases (1656) to display the biometric authentication interface (e.g., 1512). In some examples, selection of the alternative authentication affordance (e.g., 1544) causes the device (e.g., 100, 300, 500, 1500) to cease displaying the alternative authentication affordance (e.g., 1544) and transition to an alternative authentication interface (e.g., 1562) operating at the application level. Accordingly, a user optionally authenticates with the application using credentials associated with the application (e.g., a user optionally logs in using a user name and password for the application). In some examples, the application-level alternative authentication interface (e.g., 1562) optionally includes an affordance to reinitiate biometric authentication. This, in turn, would case the electronic device (e.g., 100, 300, 500, 1500) to redisplay the biometric authentication interface (e.g., 1512) and authenticate at the system or operating system level.

Note that details of the processes described above with respect to method 1600 (e.g., FIGS. 16A-16E) are also applicable in an analogous manner to other methods described. For example, method 1600 optionally includes one or more of the characteristics of the various methods described herein with reference to methods 800, 1000, 1200, 1400, 1800, 2000, 2200, 2500, and 2700. For example, the enrolled biometric data described in method 1200 can be used to perform biometric authentication, such as the biometric authentication described with reference to FIGS. 15E-I. For another example, the biometric authentication interface as described in method 1800 can be used to implement the biometric authentication interface (e.g., 1512). For brevity, these details are not repeated below.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 16A-16E are, optionally, implemented by components depicted in FIGS. 1A-1B. For example, providing operation 1620 and maintaining operation 1624 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 17A-17AJ illustrate exemplary user interfaces for biometric authentication, in accordance with some examples. As described in greater detail below, the exemplary example of the user interfaces illustrated in FIGS. 17A-17AJ are used to illustrate the processes described below, including the processes in FIGS. 18A-18D.

FIG. 17A illustrates an electronic device 1700 (e.g., portable multifunction device 100, device 300, or device 500). In the exemplary example illustrated in FIGS. 17A-17AJ, electronic device 1700 is a smartphone. In other examples, electronic device 1700 can be a different type of electronic device, such as a wearable device (e.g., a smartwatch). Electronic device 1700 has a display 1702, one or more input devices (e.g., touchscreen of display 1702, a button 1704, a mic), and a wireless communication radio. In some examples, the electronic device includes a plurality of cameras. In some examples, the electronic device includes only one camera. In some examples, the electronic device includes one or more biometric sensors (e.g., biometric sensor 1703) which, optionally, include a camera, such as an infrared camera, a thermographic camera, or a combination thereof. In some examples, the one or more biometric sensors 1703 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In FIG. 17A, the electronic device 1700 displays, on display 1702, a landing page interface of an application including a log-in affordance 1706. As seen in FIG. 17A, the application is a browser or mobile application, and the interface corresponds to a website (onlinestore.com). While displaying the landing page interface, the electronic device 1700 detects activation of the log-in affordance 1706. As shown in FIG. 17A, the activation is a tap gesture 1708 on log-in affordance 1706.

Figure 17B:
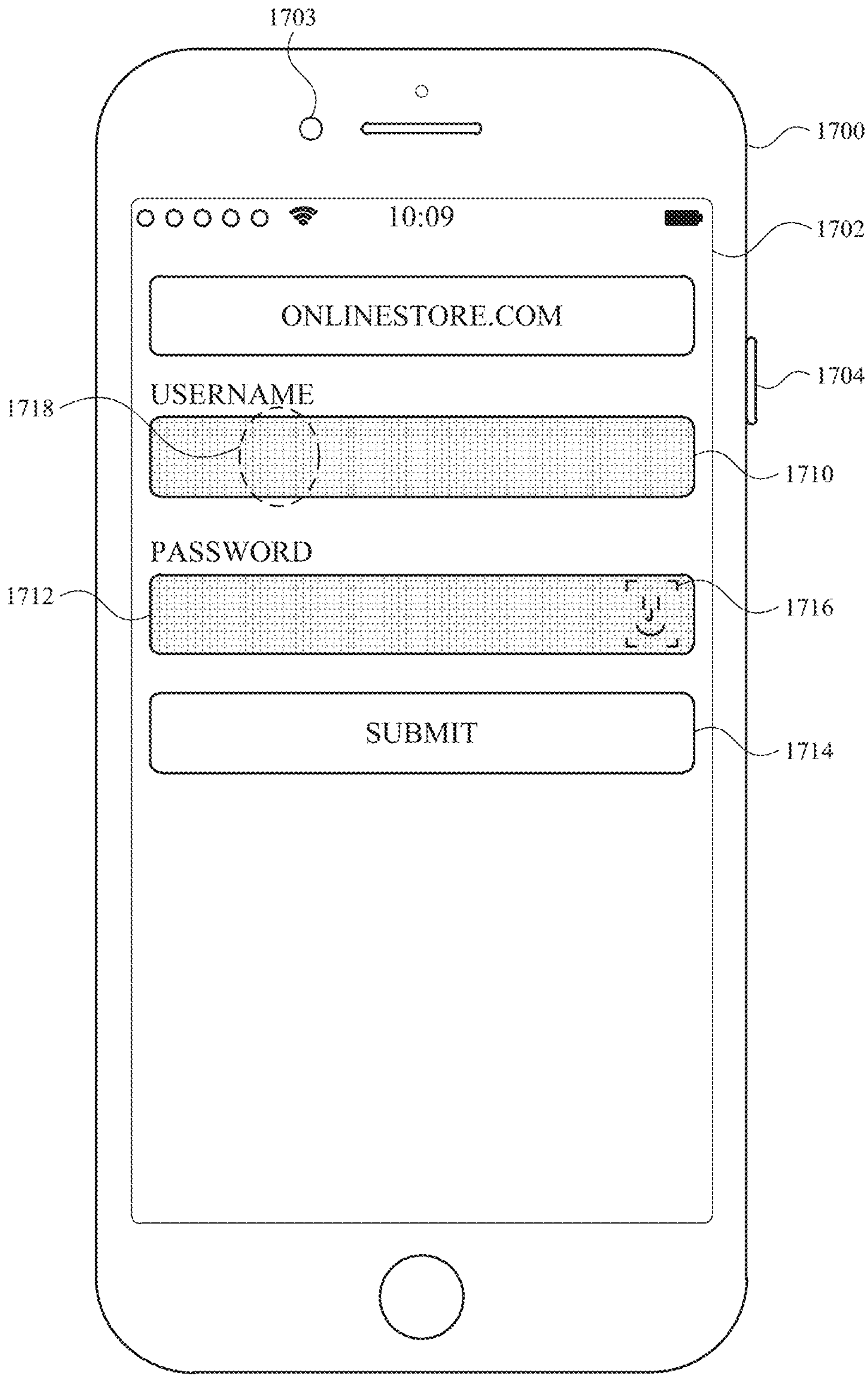

In FIG. 17B, in response to detecting tap gesture 1708 on log-in affordance 1706, the electronic device 1700 displays (e.g., replaces display of the landing page interface with) an application interface of the application including an unsecured data fillable field 1710 (labelled "username"), a secured data fillable field 1712 (labelled "password"), and a submit affordance 1714. The electronic device further displays a biometric authentication glyph (e.g., icon) in the secured data fillable field 1712. As will be described in further detail, the biometric authentication glyph indicates that the secured data fillable field 1712 is associated with secured data and/or that biometric authentication is required to autofill the secured data fillable field 1712.

While displaying the application interface, the electronic device 1700 detects a request to autofill the unsecured data fillable field 1710. For example, as shown in FIG. 17B, the request to autofill the unsecured data fillable field 1710 is a tap gesture 1718 indicating a selection of the unsecured data fillable field 1710.

Figure 17C:
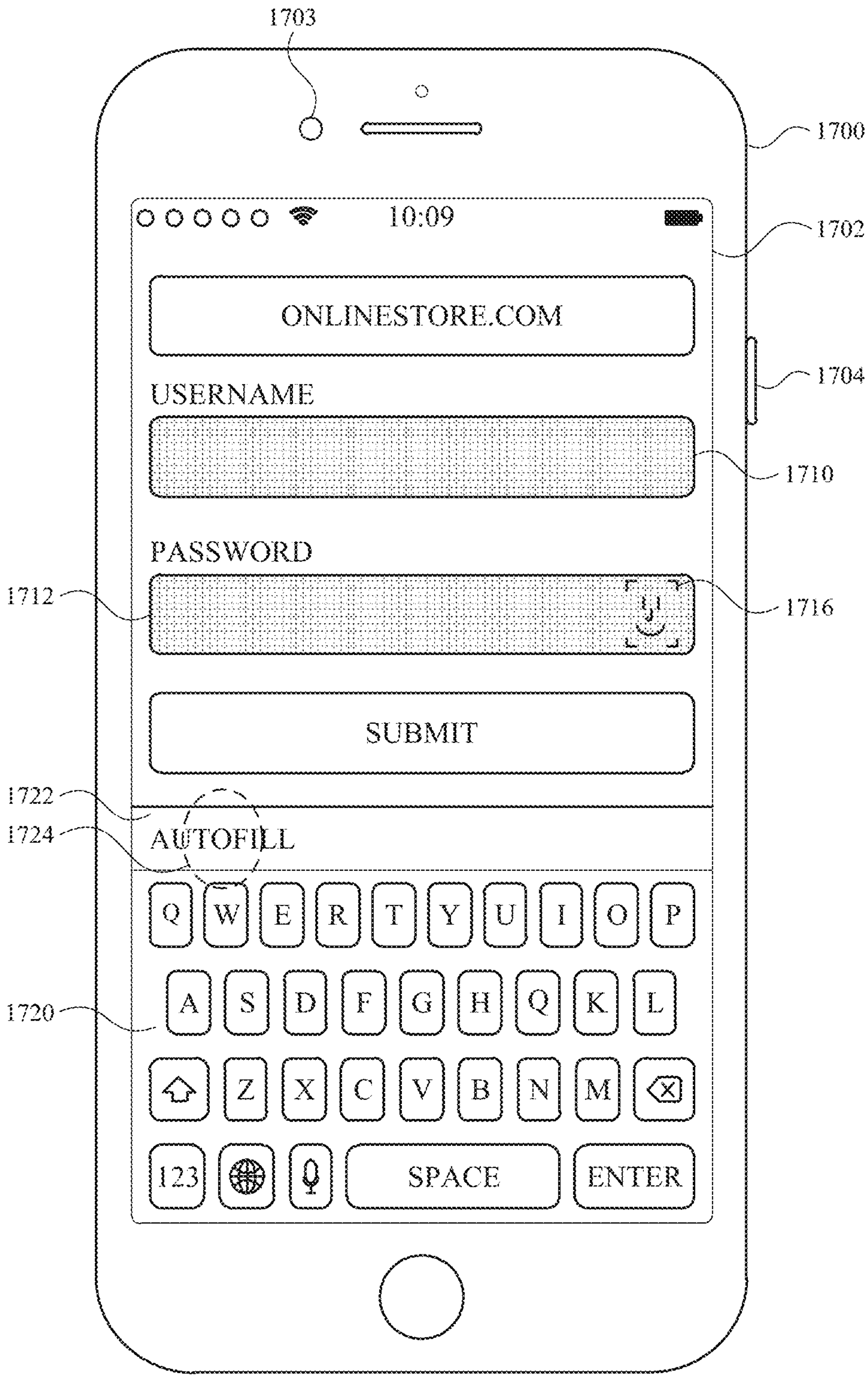

In FIG. 17C, in response to detecting the request to autofill the unsecured data fillable field 1710, the electronic device 1700 displays (e.g., overlays on the application interface) an input interface 1720 including a keyboard, such as a software keyboard, and/or keypad and an autofill affordance 1722. While displaying the input interface 1720, the electronic device 1700 detects activation of the autofill affordance 1722. For example, as shown in FIG. 17A, the activation is a tap gesture 1724 on autofill affordance 1722.

Figure 17D:
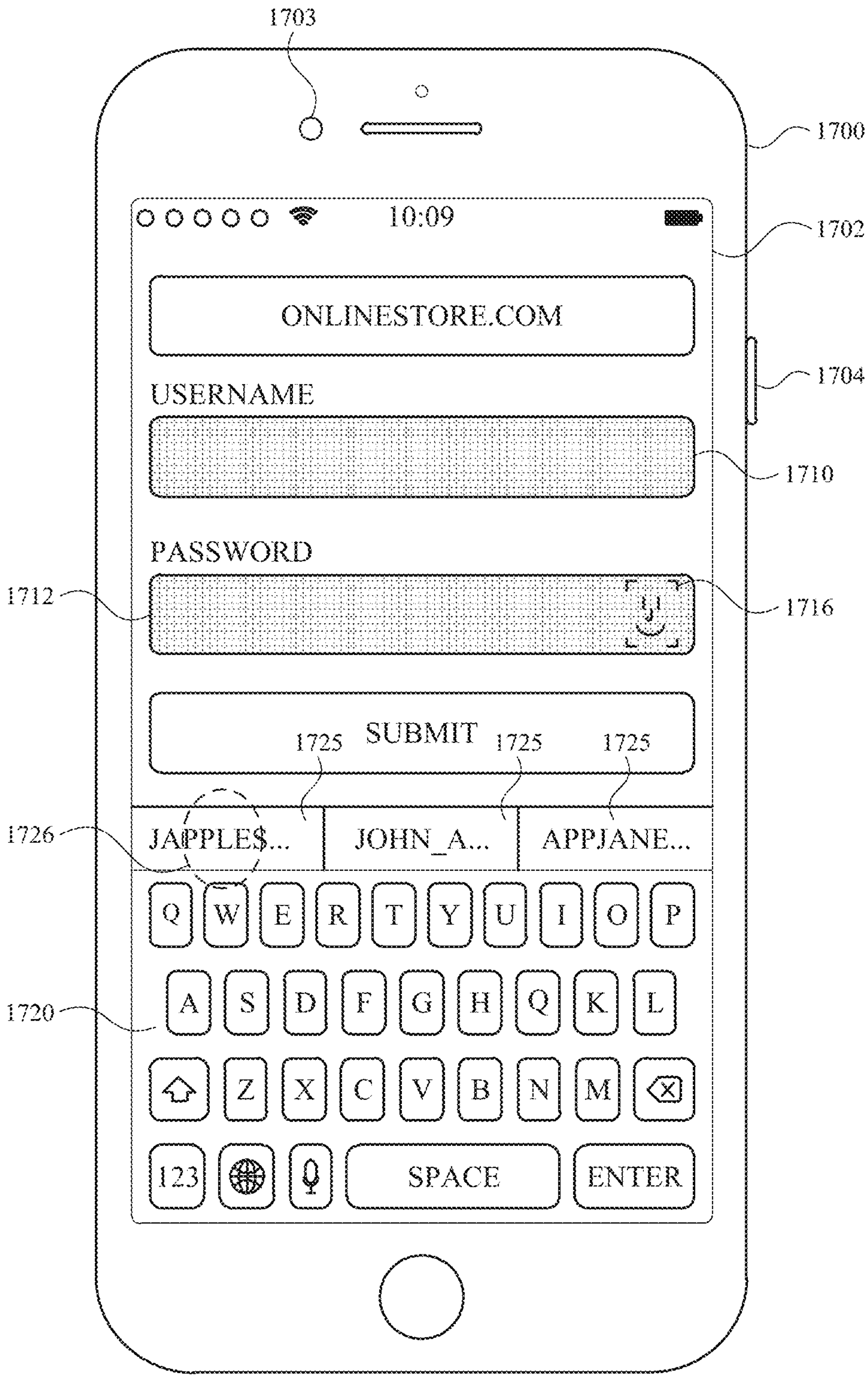

In FIG. 17D, in response to detecting tap gesture 1724, the electronic device displays (e.g., replacing the autofill affordance 1722 and/or one or more other affordances of the input interface 1720) a plurality of candidate input affordances 1725 for autofilling the unsecured data fillable field 1710. In the illustrated example, the fillable field 1710 is associated with a user name. Accordingly, in some examples, each of the candidate inputs affordances 1725 serves as a reference to a respective candidate user name.

Figure 17E:
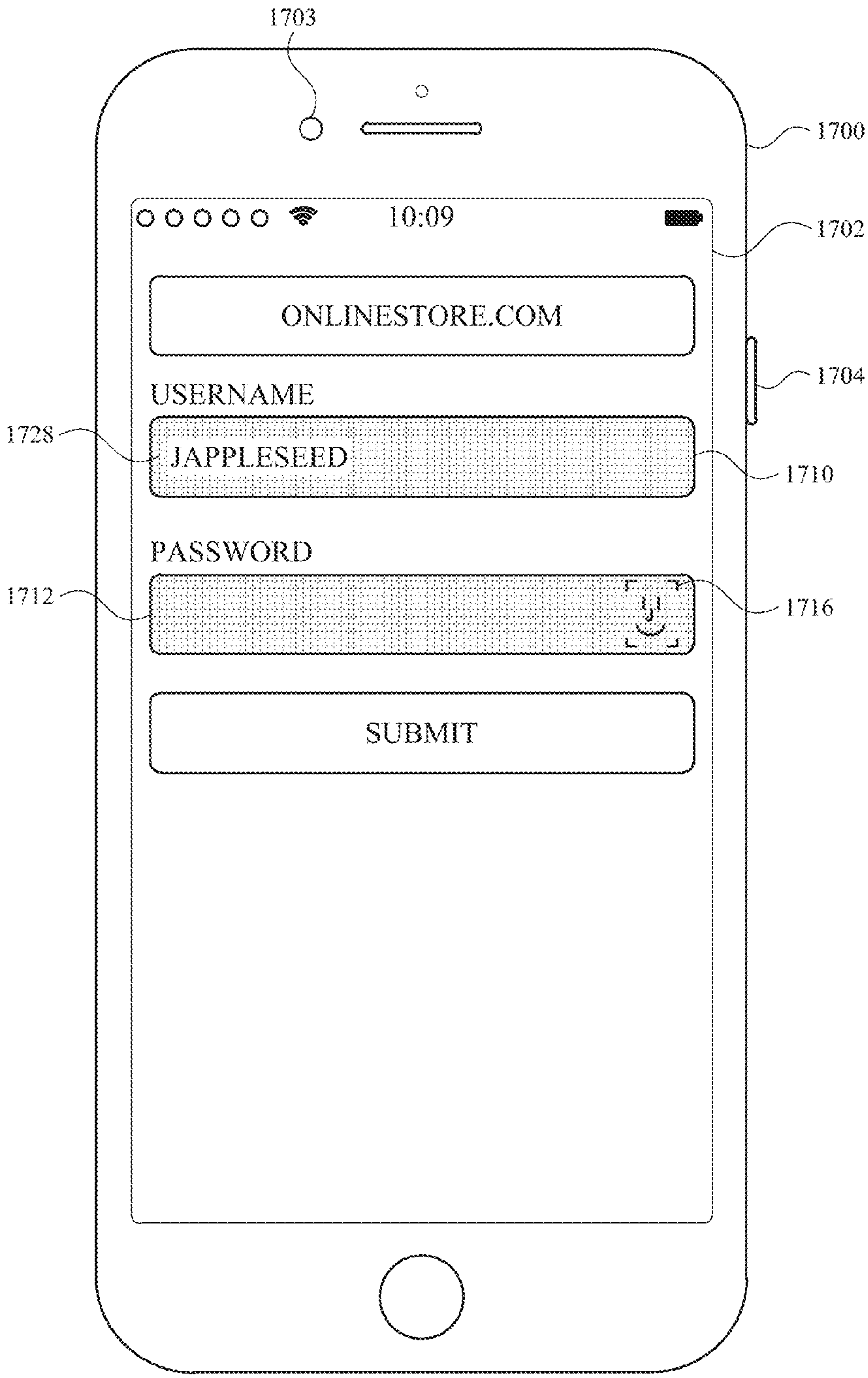

While displaying the candidate input affordances 1725 of the input interface 1720, the electronic device detects activation of a candidate input affordance 1725. For example, as shown in FIG. 17D, the activation is a tap gesture 1726 on a candidate input affordance 1725. In FIG. 17E, in response to detecting tap gesture 1726, the electronic device 1700 autofills the unsecured data fillable field with a candidate input 1728 corresponding to the activated candidate input affordance 1725.

As described, in response to detecting tap gesture 1724, the electronic device provides (e.g., displays) candidate input affordances corresponding to respective candidate inputs. In some examples, in response to detecting tap gesture 1724, the electronic device determines whether multiple candidate inputs are available. If so, the electronic device 1700 provides the candidate input affordances as described. Any number of candidate input affordances optionally are provided in this manner. If not (e.g., only a single candidate input is available), the electronic device, optionally, autofills the unsecured data fillable field 1710 without providing the candidate inputs.

Figure 17F:
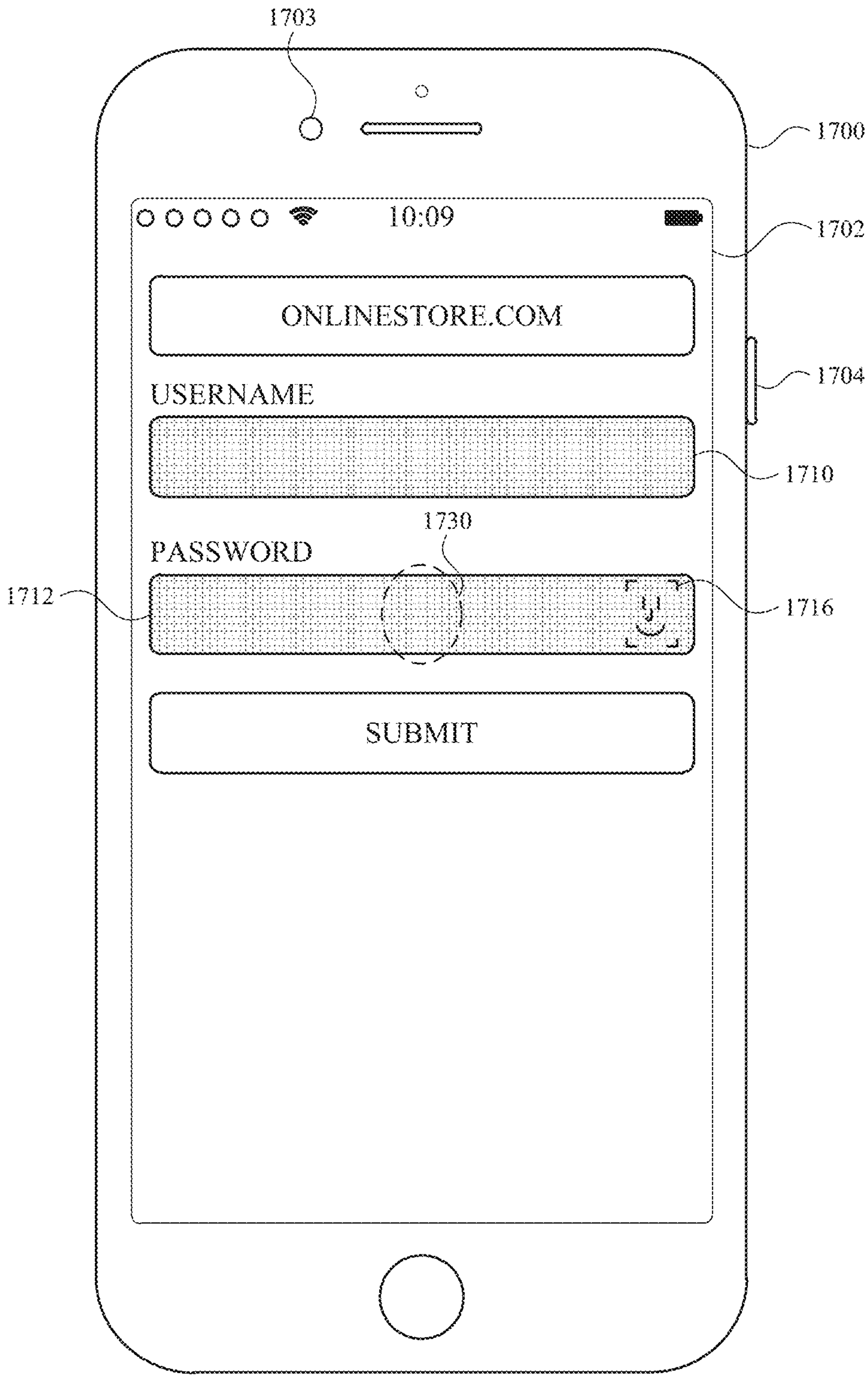

With reference to FIG. 17F, while displaying the application interface, the electronic device 1700 detects a request to autofill the secured data fillable field 1712. For example, the request to autofill the secured data fillable field 1712 is a tap gesture 1730 indicating a selection of the secured data fillable field 1712.

Figure 17G:
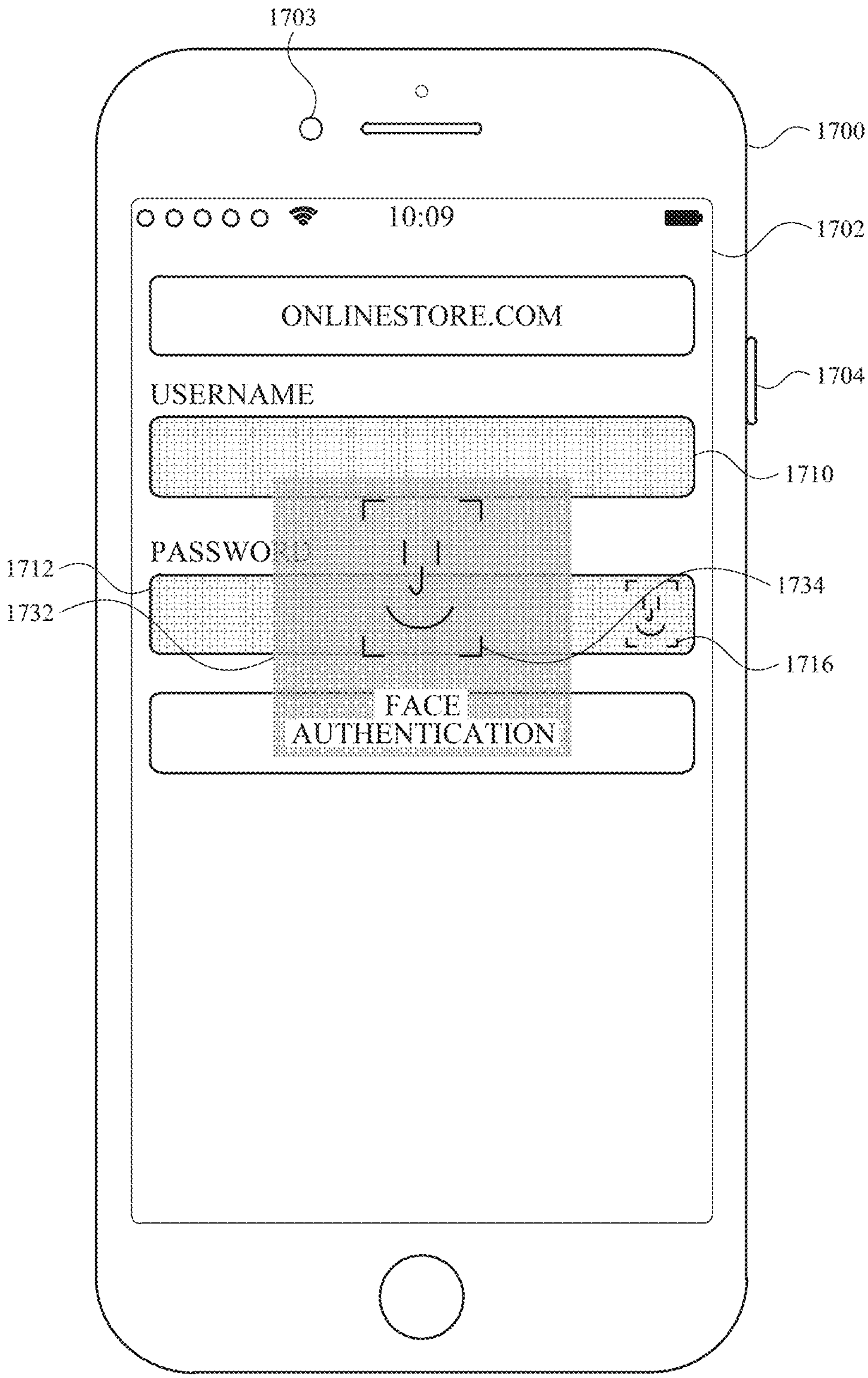

In FIG. 17G, in response to detecting the request to autofill the secured data fillable field 1712, the electronic device 1700 initiates biometric authentication. In some examples, initiating biometric authentication includes obtaining (e.g., capturing with the one or more biometric sensors) data corresponding to a biometric feature of a user. In some examples, initiating biometric authentication further includes displaying a biometric authentication interface 1732 having a biometric authentication glyph 1734. The biometric authentication glyph 1734 is a simulation of a representation of the biometric feature in some examples. The biometric authentication interface 1732 is overlaid on at least a portion of the application interface in some examples.

Figure 17H:
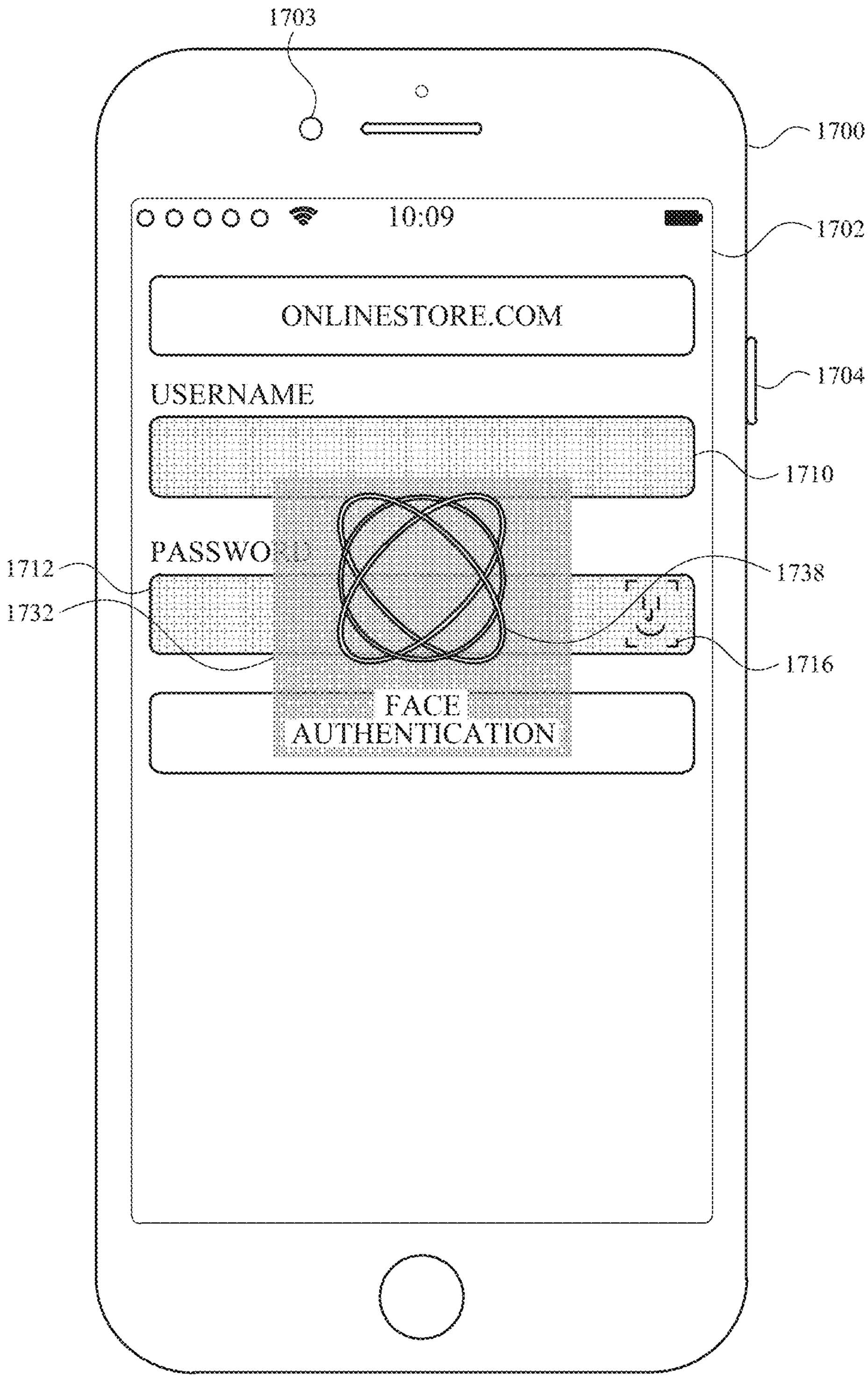

With reference to FIG. 17H, in response to obtaining data, the electronic device processes the biometric data, for instance to determine, based on the biometric data, whether the biometric feature satisfies biometric authentication criteria (e.g., determine whether the biometric data matches, within a threshold, a biometric template). While the electronic device processes the biometric data, the electronic device, optionally, displays (e.g., replaces display of the biometric authentication glyph 1734 with) a biometric authentication glyph 1738 in the biometric authentication interface 1732 indicating that the biometric data is being processed.

Figure 17I:
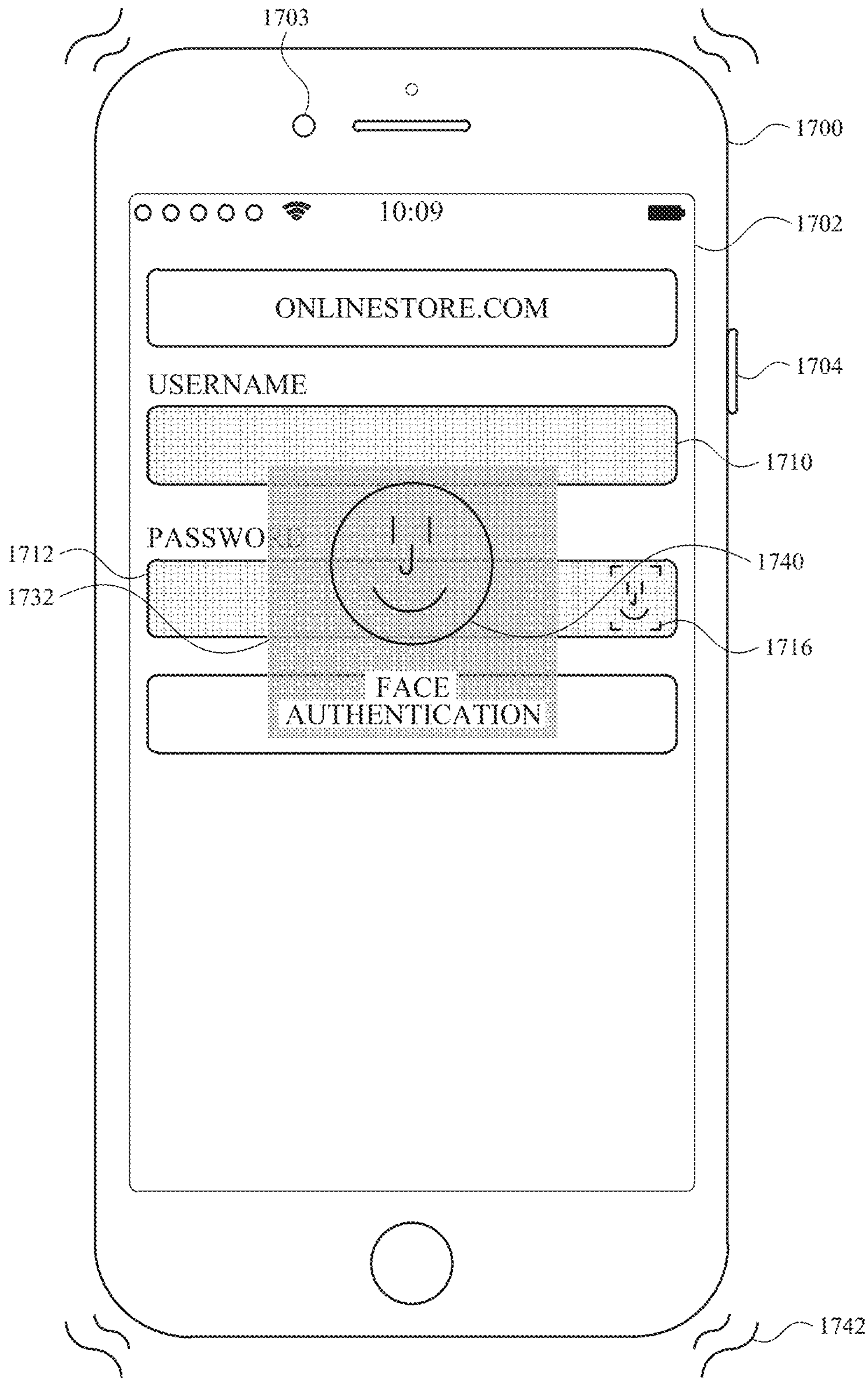
Figure 17J:
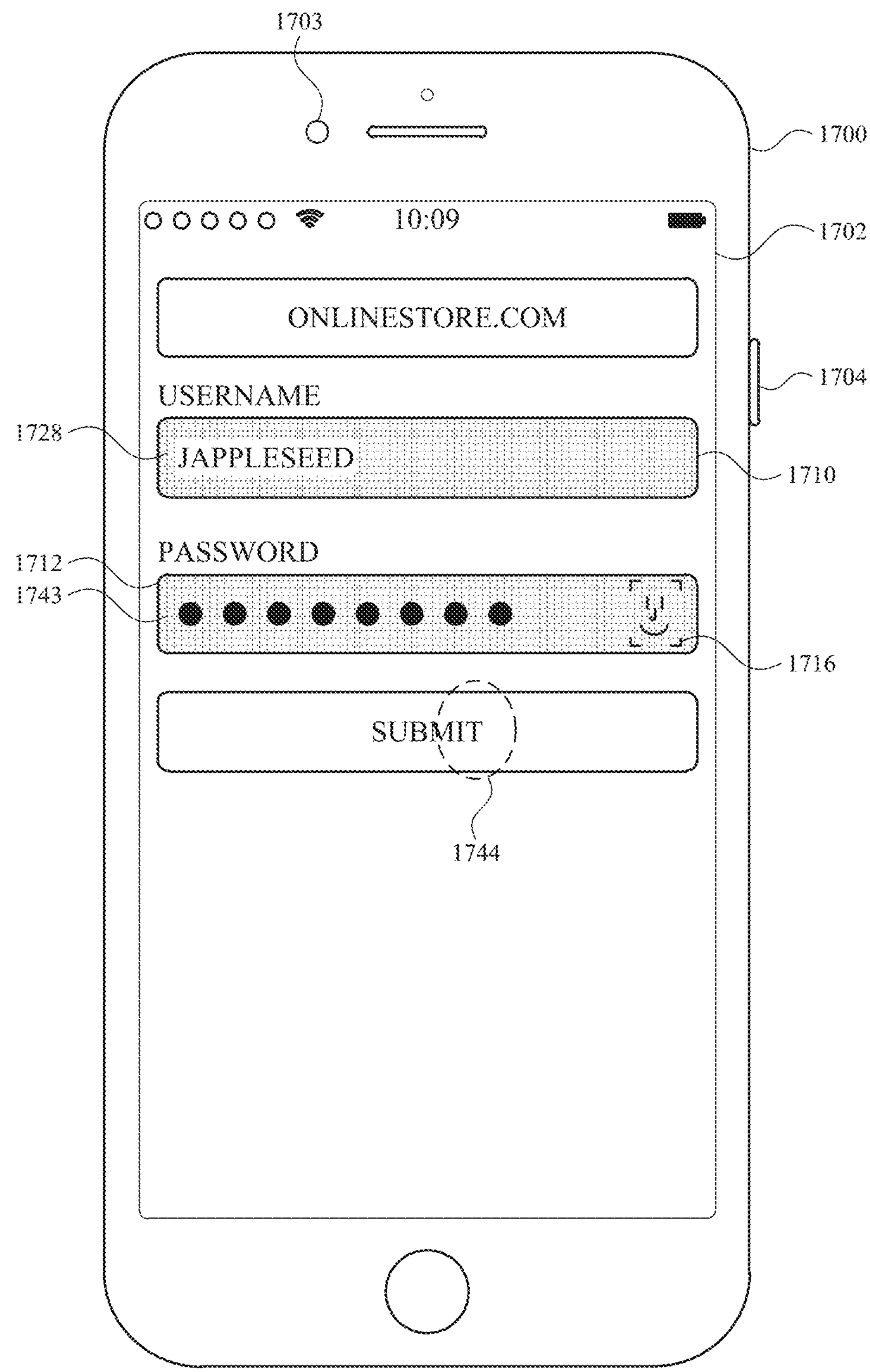

In FIG. 17I, the electronic device 1700 determines that the biometric feature satisfies the biometric authentication criteria. In response, the electronic device displays (e.g., replaces display of the biometric authentication glyph 1738 with) a biometric authentication glyph 1740 in the biometric authentication interface 1732 indicating that the biometric authentication was successful. Additionally or alternatively, the electronic device outputs a tactile output 1742 indicating the biometric authentication was successful. After indicating the biometric authentication is successful, the electronic device, as shown in FIG. 17J, autofills the secured data fillable field with an appropriate password 1743. In some examples, the electronic device further autofills a second fillable field, such as the unsecured fillable field 1710 (e.g., with user name 1728), in response to the successful biometric authentication. It will be appreciated that any number and/or type of fillable fields optionally are autofilled in response to successful biometric authentication.

While displaying the application interface with the autofilled fillable fields 1710, 1720, the electronic device detects activation of a submission affordance 1714. By way of example, as shown in FIG. 17J, the activation is a tap gesture 1744 on the submission affordance 1714. In response, the user optionally is authenticated with the application and the electronic device optionally shows a home interface, such as the home interface 1782 of FIG. 17S, referenced further below.

Figure 17K:
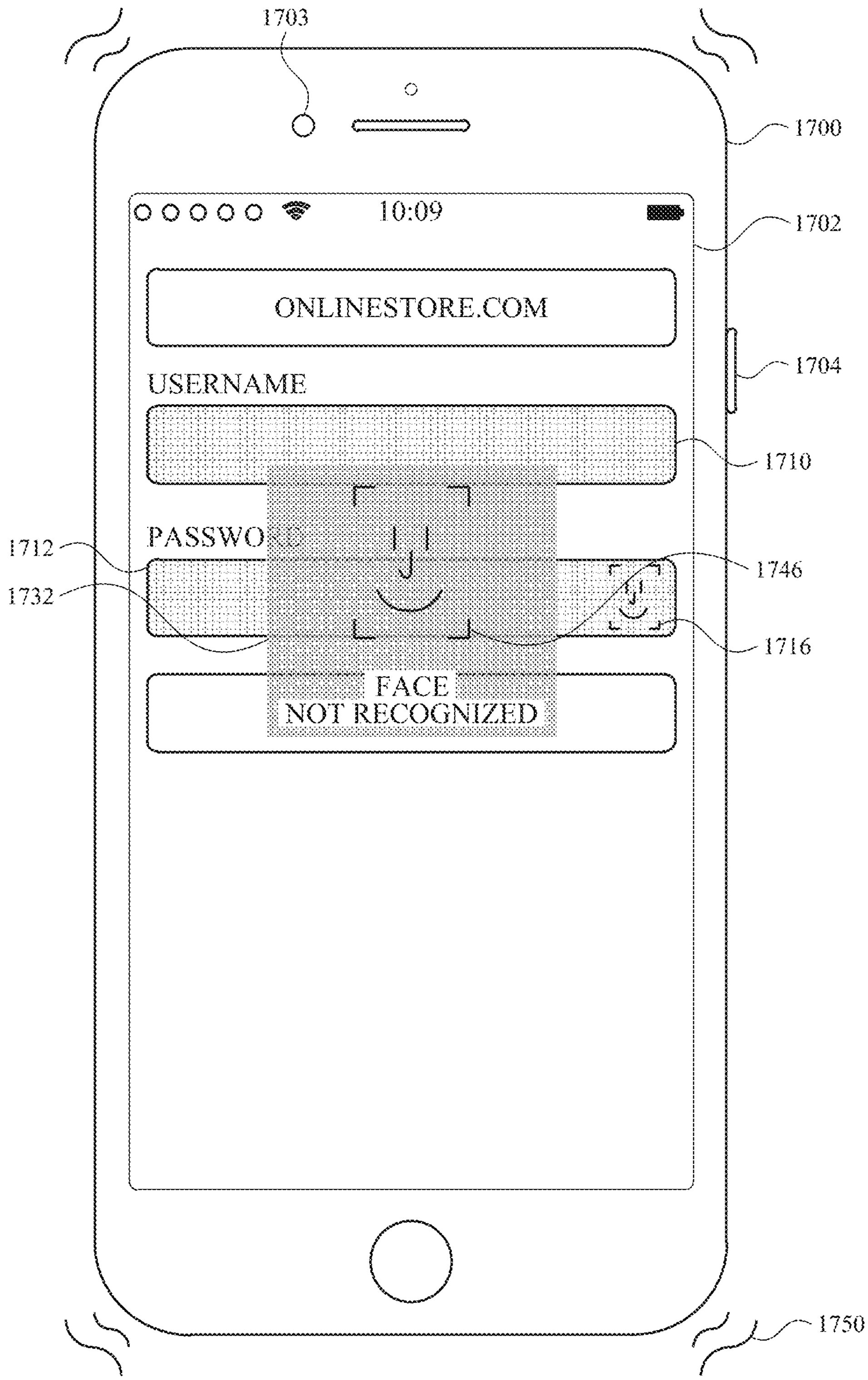
Figure 17L:
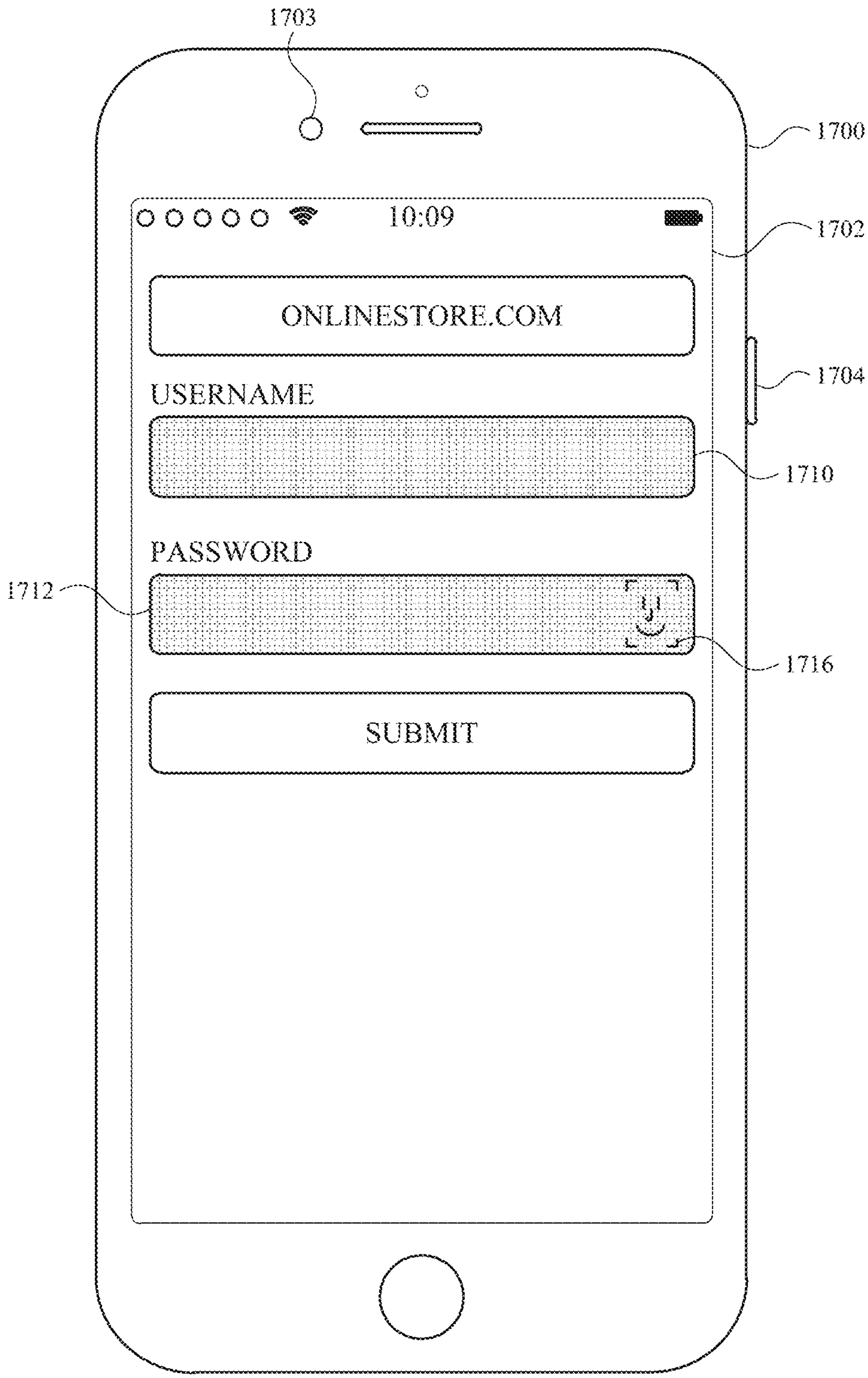

Alternatively, in FIG. 17K, the electronic device 1700 determines that the biometric feature does not satisfy the biometric authentication criteria. In response, the electronic device displays (e.g., replaces display of the biometric authentication glyph 1738 with) a biometric authentication glyph 1746 in the biometric authentication interface 1732 indicating that the biometric authentication was unsuccessful (e.g., failed). Optionally, the electronic device outputs a tactile output 1750 indicating the biometric authentication was unsuccessful. In some examples, the tactile output 1750 is the same as the tactile output 1742. In some examples, the tactile output 1750 is different than the tactile output 1742. After having indicated that the biometric authentication was unsuccessful, the electronic device ceases display of the biometric authentication interface, as illustrated in FIG. 17L.

In some examples, the biometric authentication interface 1732 includes an animation and/or one or more of the biometric authentication glyphs of the biometric authentication interface 1732 are animated. By way of example, the biometric authentication glyph 1738 includes rings having a spherical rotation and/or the biometric authentication glyph 1746 moves side to side to simulate a "shake" movement.

Figure 17M:
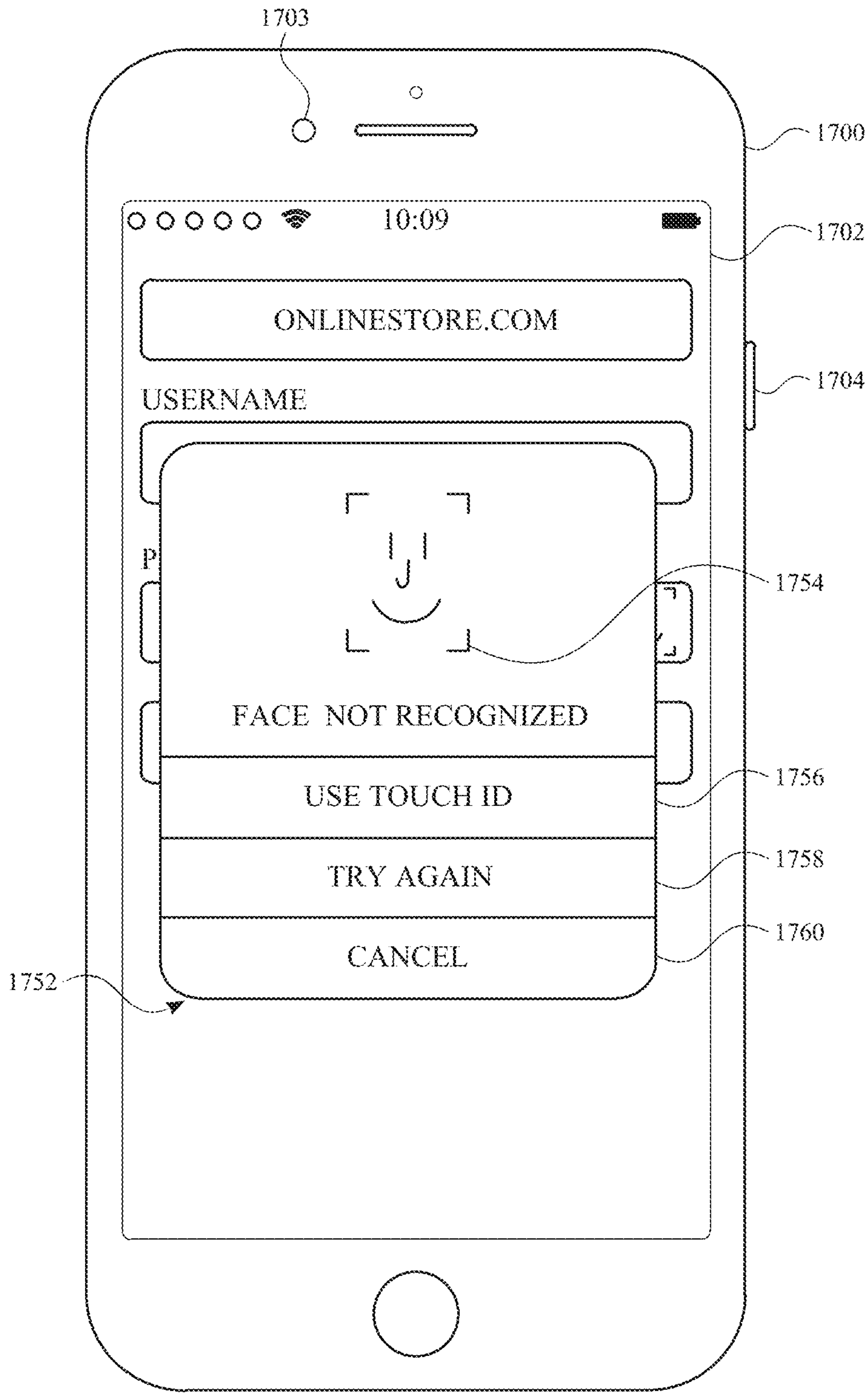

With reference to FIG. 17M, in some examples, further in response to unsuccessful biometric authentication, the electronic device 1700 displays a failure interface, such as the failure interface 1752. The failure interface includes a biometric authentication glyph 1754, an alternative authentication affordance 1756, a retry affordance 1758, and a cancel affordance 1760. In some examples, activation of the retry affordance 1758 causes the electronic device to reinitiate biometric authentication, as described above. In some examples, the electronic device performs the biometric authentication only if a threshold number of failed biometric authentication attempts have not been made. In some examples, activation of the cancel affordance causes the electronic device 1700 to cease display of the failure interface 1752.

Figure 17N:
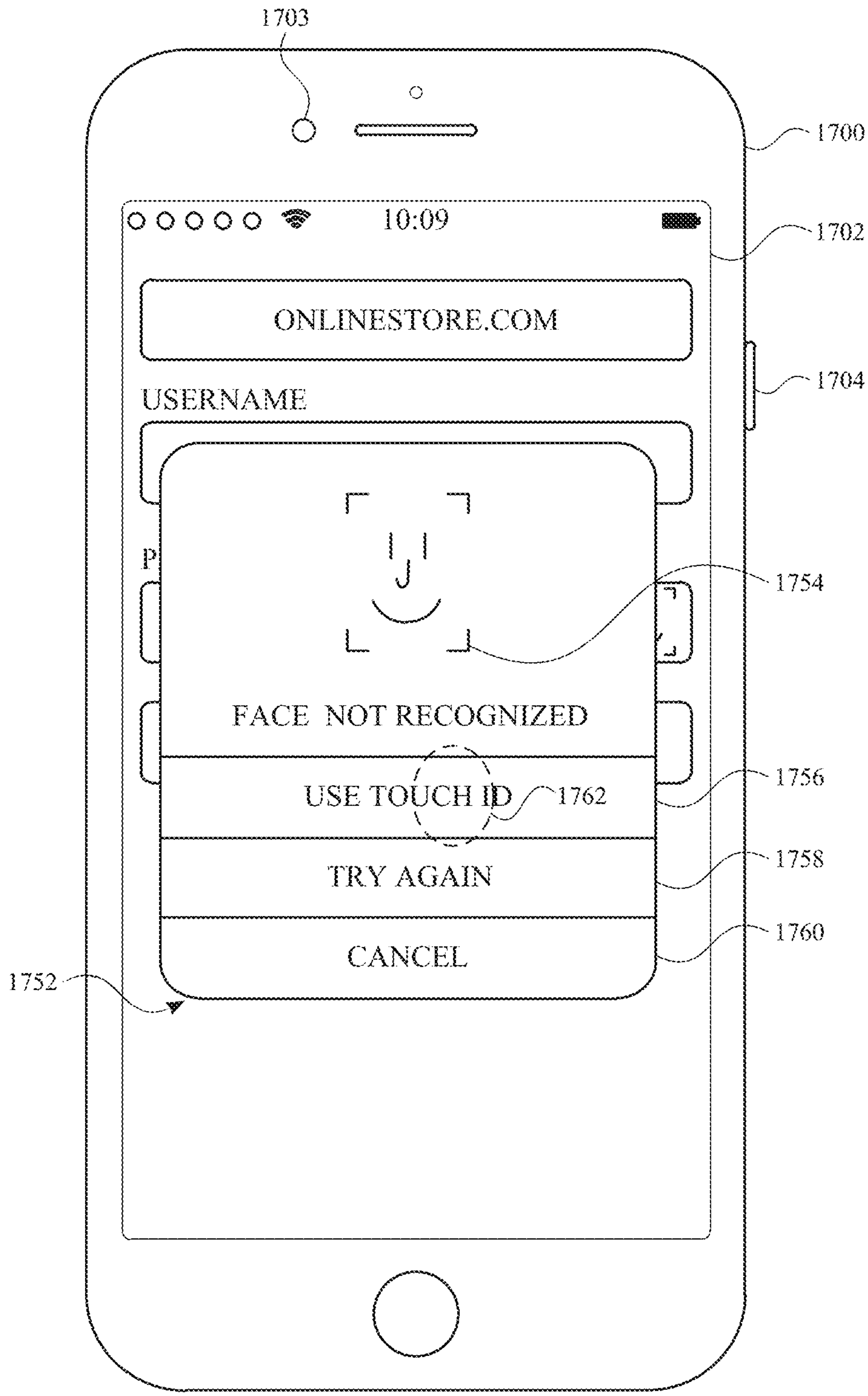
Figure 17O:
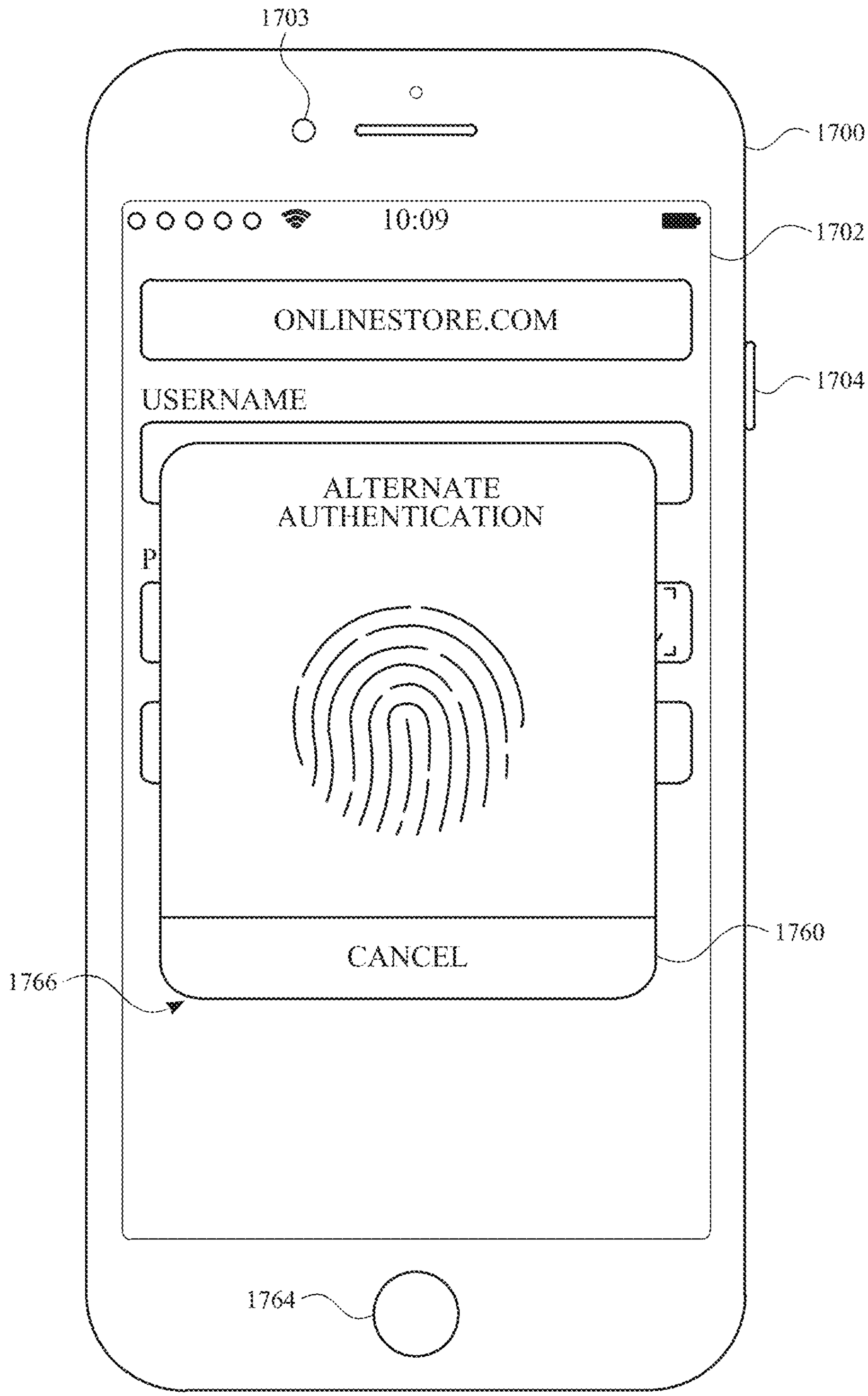

With reference to FIG. 17N, in response to an activation of the alternative authentication affordance 1756, such as the tap gesture 1762, the electronic device 1700 displays (e.g., replaces display of the failure interface 1752 with) an alternative authentication interface 1766 (FIG. 17O), with which the user authenticates using an alternative form of authentication than that associated with the biometric feature (e.g., fingerprint authentication, password authentication, passcode authentication, pattern authentication where pattern authentication includes selection of a plurality of items in a predefined pattern or movement of a contact or other input in a predefined pattern). As shown in FIG. 17O, the user optionally touches a fingerprint sensor 1764 of the electronic device with a finger to authenticate.

Figure 17P:
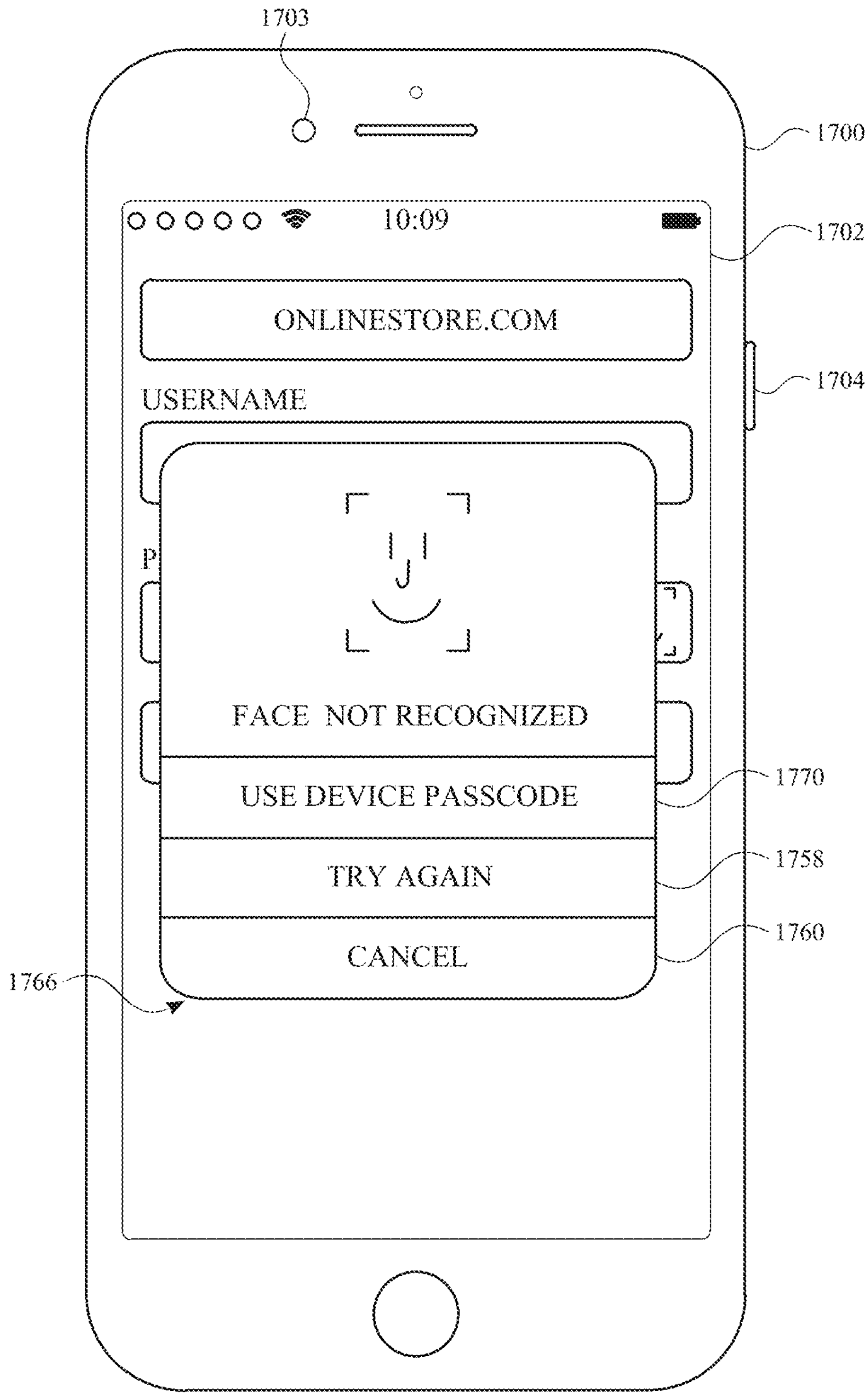
Figure 17Q:
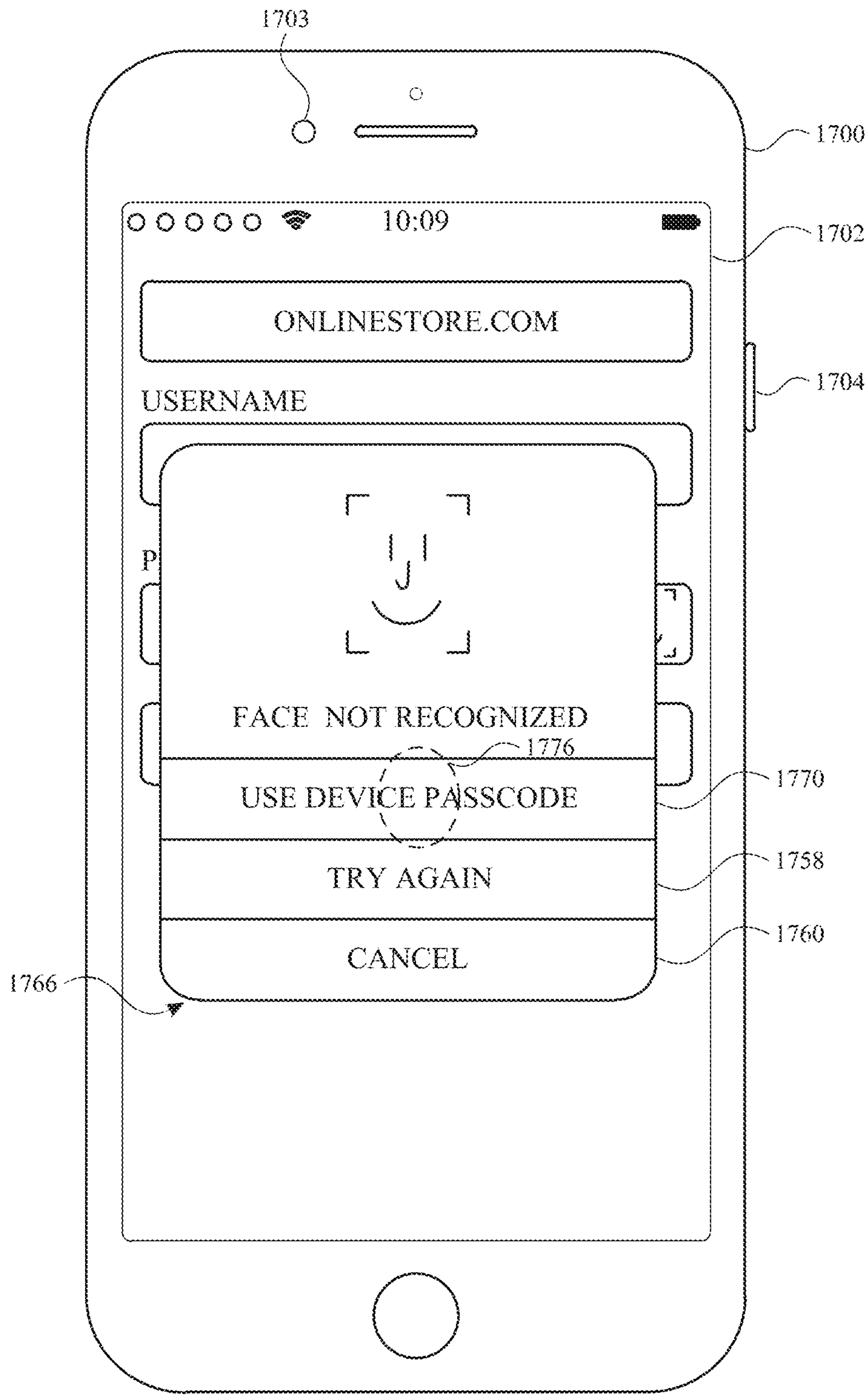

FIG. 17P illustrates another exemplary failure interface 1766 including an alternative authentication affordance 1770. With reference to FIG. 17Q, while displaying the failure interface 1766, the electronic device 1766 detects activation of the alternative authentication affordance 1770. By way of example, the activation is a tap gesture 1776 on log-in affordance 1770. In response to detecting tap gesture 1776, the electronic device 1700 displays an alternative authentication interface 1778. In some examples, the alternative authentication interface 1778 is a password (or passcode) interface by which a user can provide a password (or passcode) to authenticate.

Figure 17R:
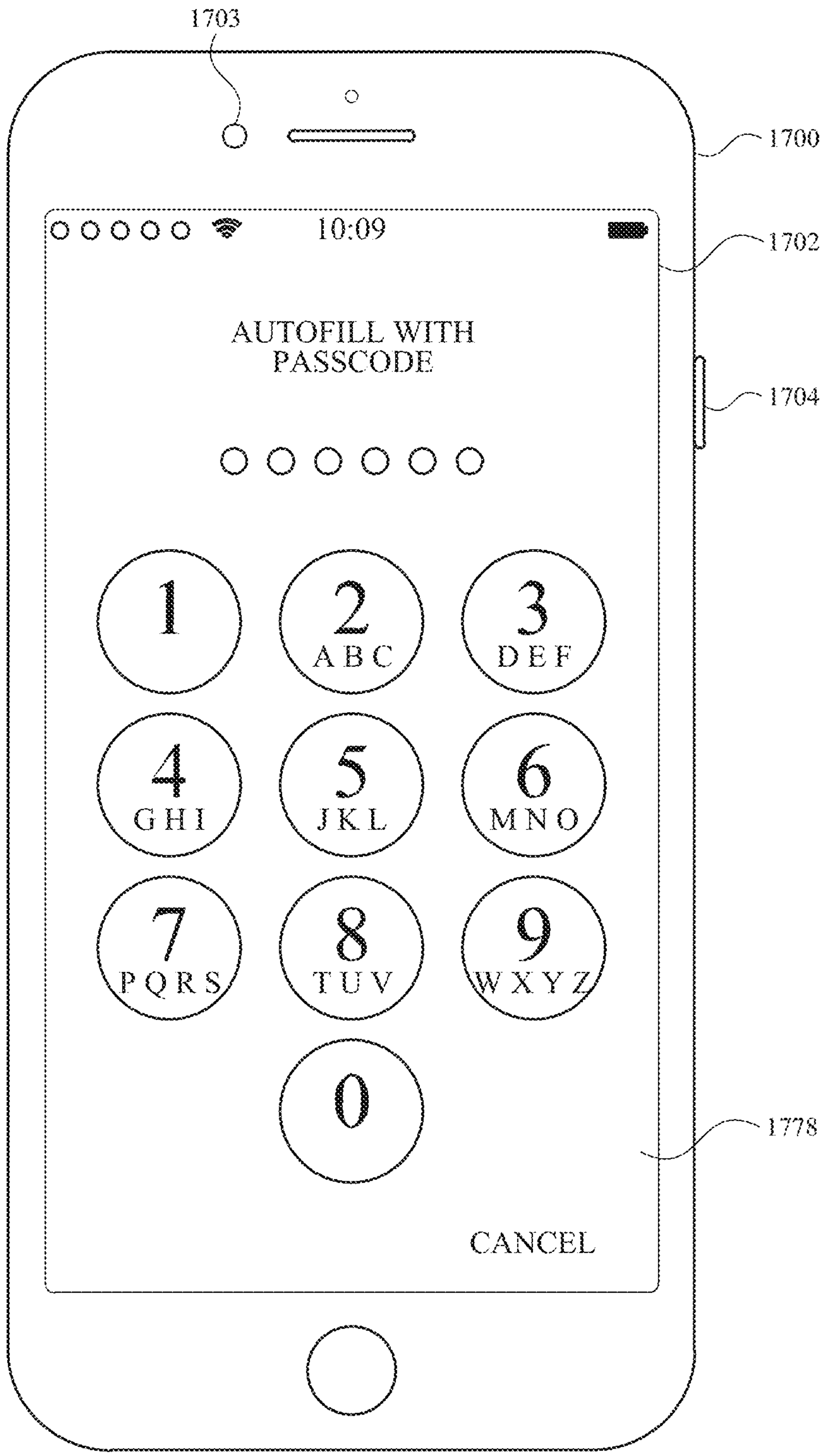
Figure 17S:
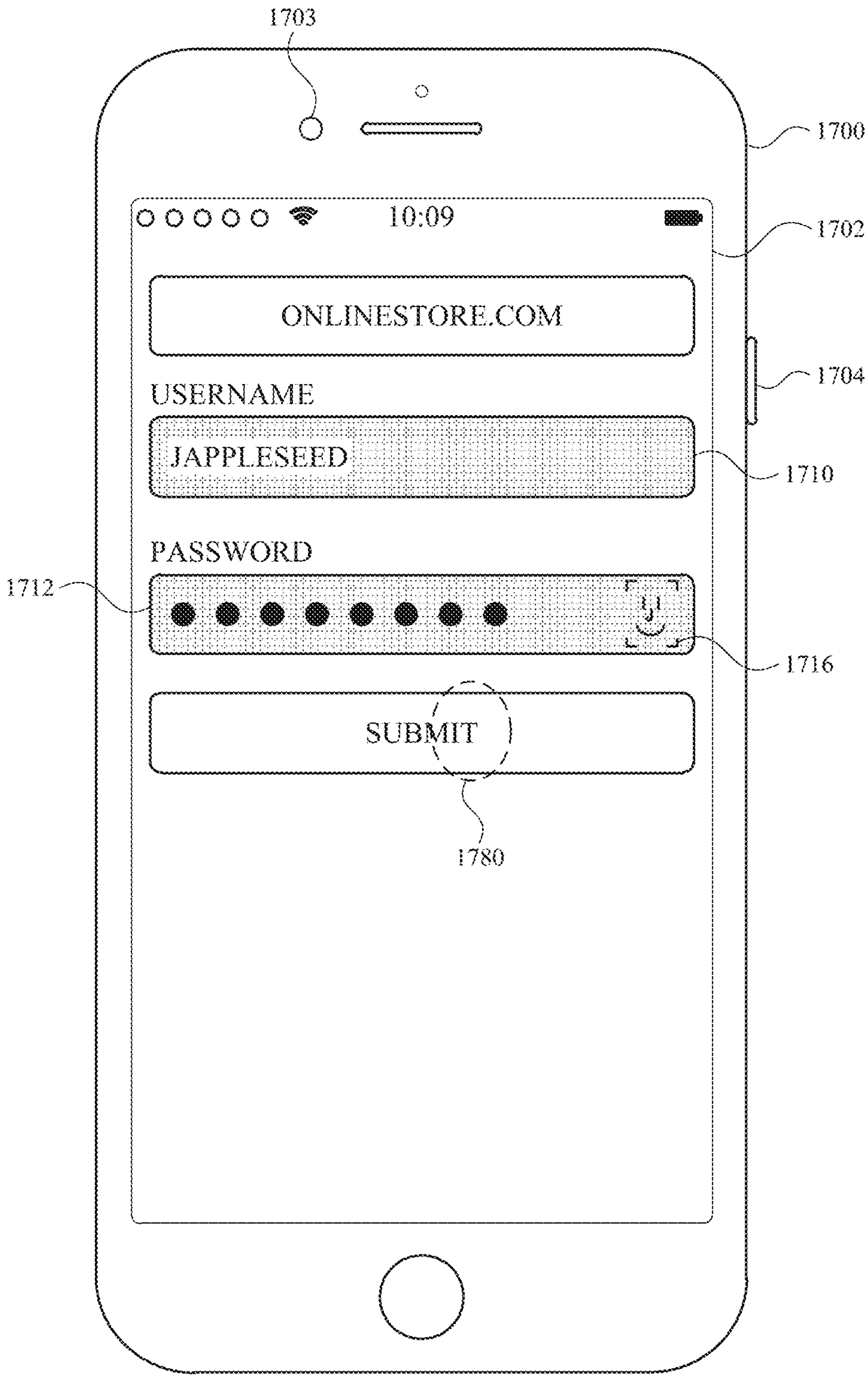

In FIG. 17R, in response to authentication (e.g., alternative authentication), the secured data fillable field is autofilled with the password 1743, and optionally, the unsecured data fillable field is autofilled with user name 1728. In this manner, a user can, optionally, leverage autofill functionality despite unsuccessful biometric authentication. While displaying the application interface with autofilled fillable fields 1710, 1720, the electronic device detects activation of a submission affordance 1714. By way of example, the activation is a tap gesture 1780 on the submission affordance 1714. In response, the user optionally is authenticated with the application and the electronic device optionally shows a home interface, such as the home interface 1782 of FIG. 17S.

Figure 17T:
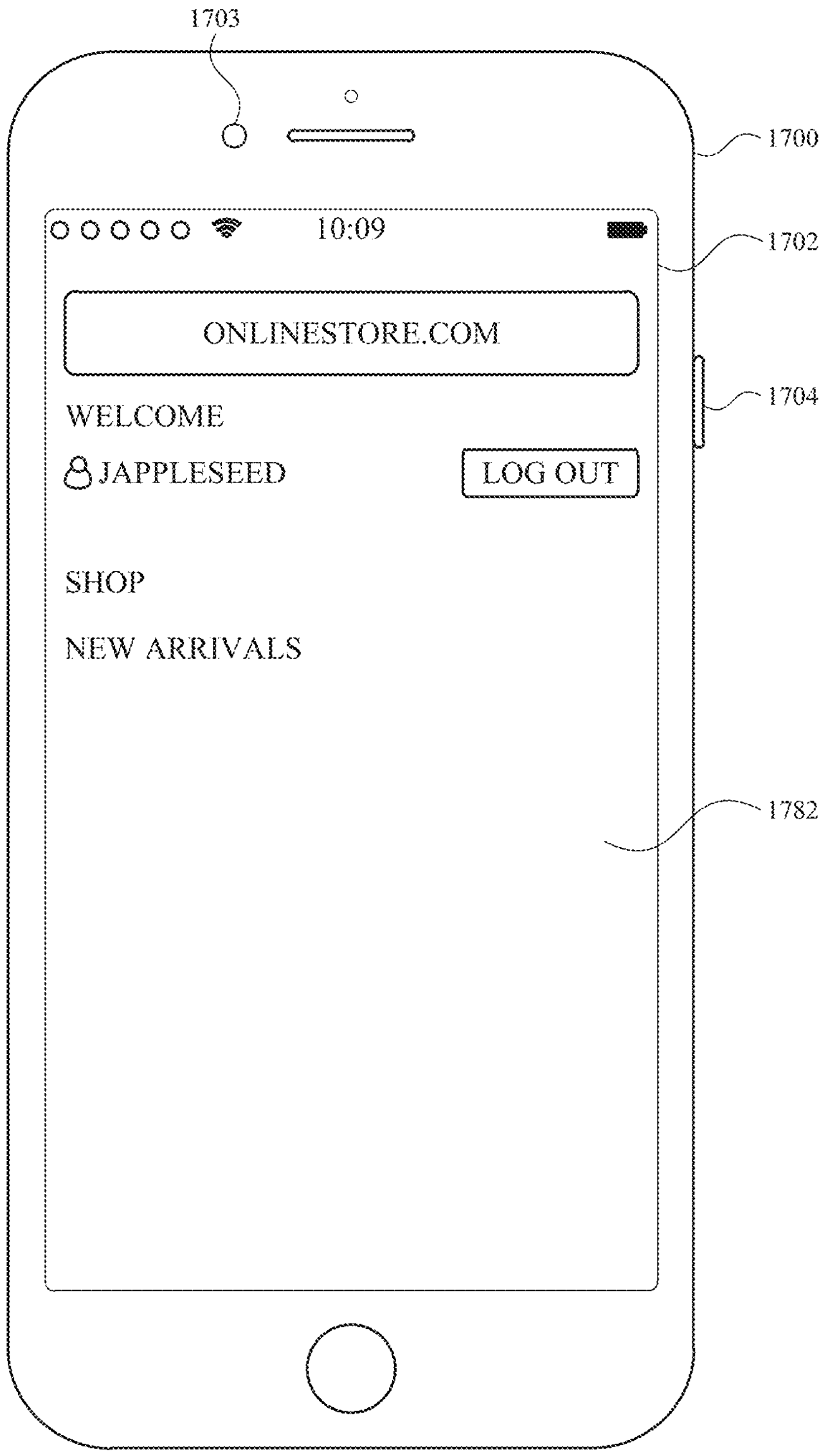

In FIG. 17T, the electronic device 1700 displays, on display 1702, an application interface 1784 including a secured data fillable field 1786. In response to a request to autofill the secured data fillable field 1786 (e.g., selection of the secured data fillable field 1786), the electronic device 1700 displays an input interface 1788 including an autofill affordance 1790, as illustrated.

Figure 17U:
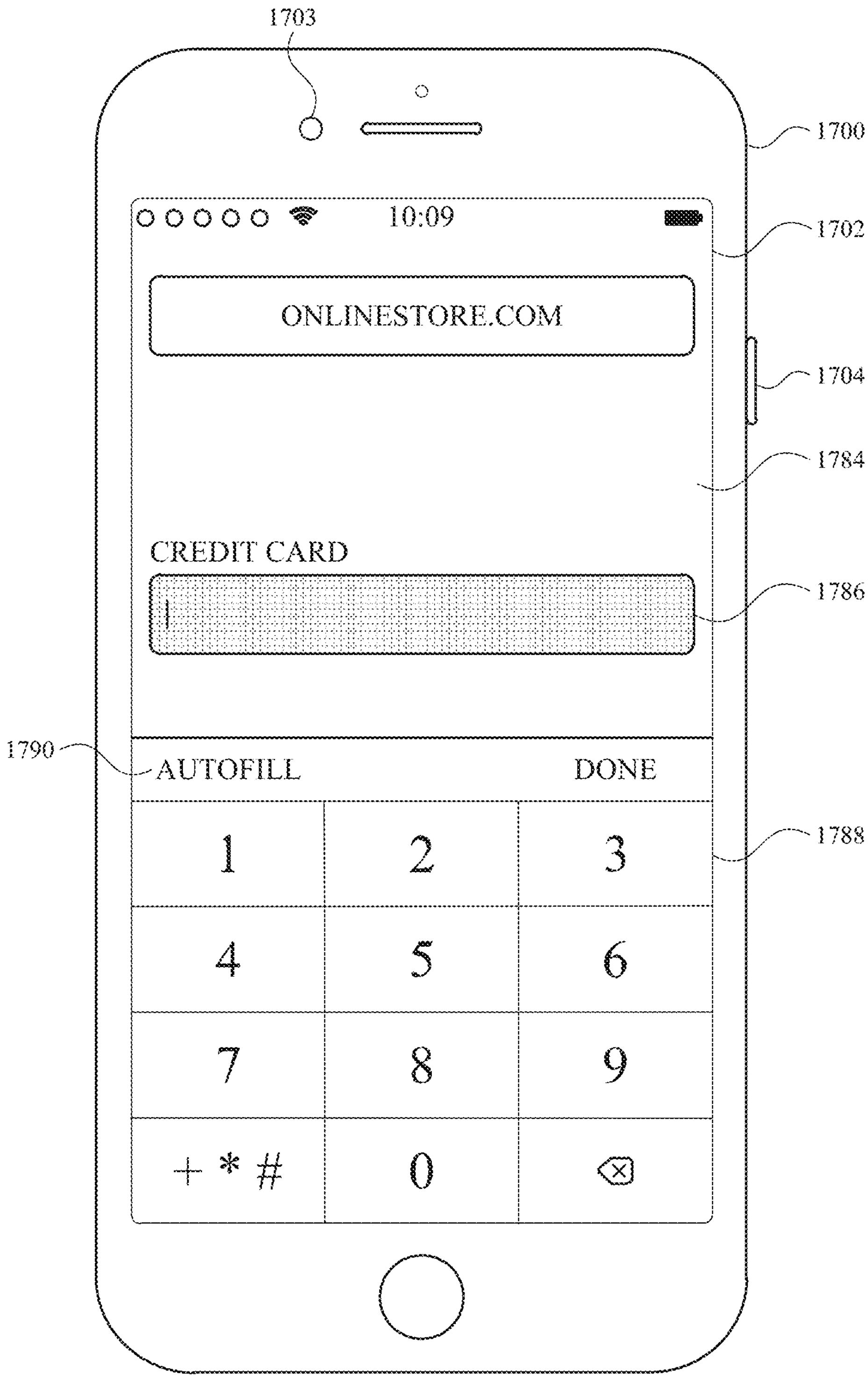

While displaying the autofill affordance 1790 of the input interface 1788, the electronic device 1700 detects activation of the autofill affordance 1790. For example, as shown in FIG. 17U, the activation is a tap gesture 1792 on the autofill affordance 1792.

Figure 17V:
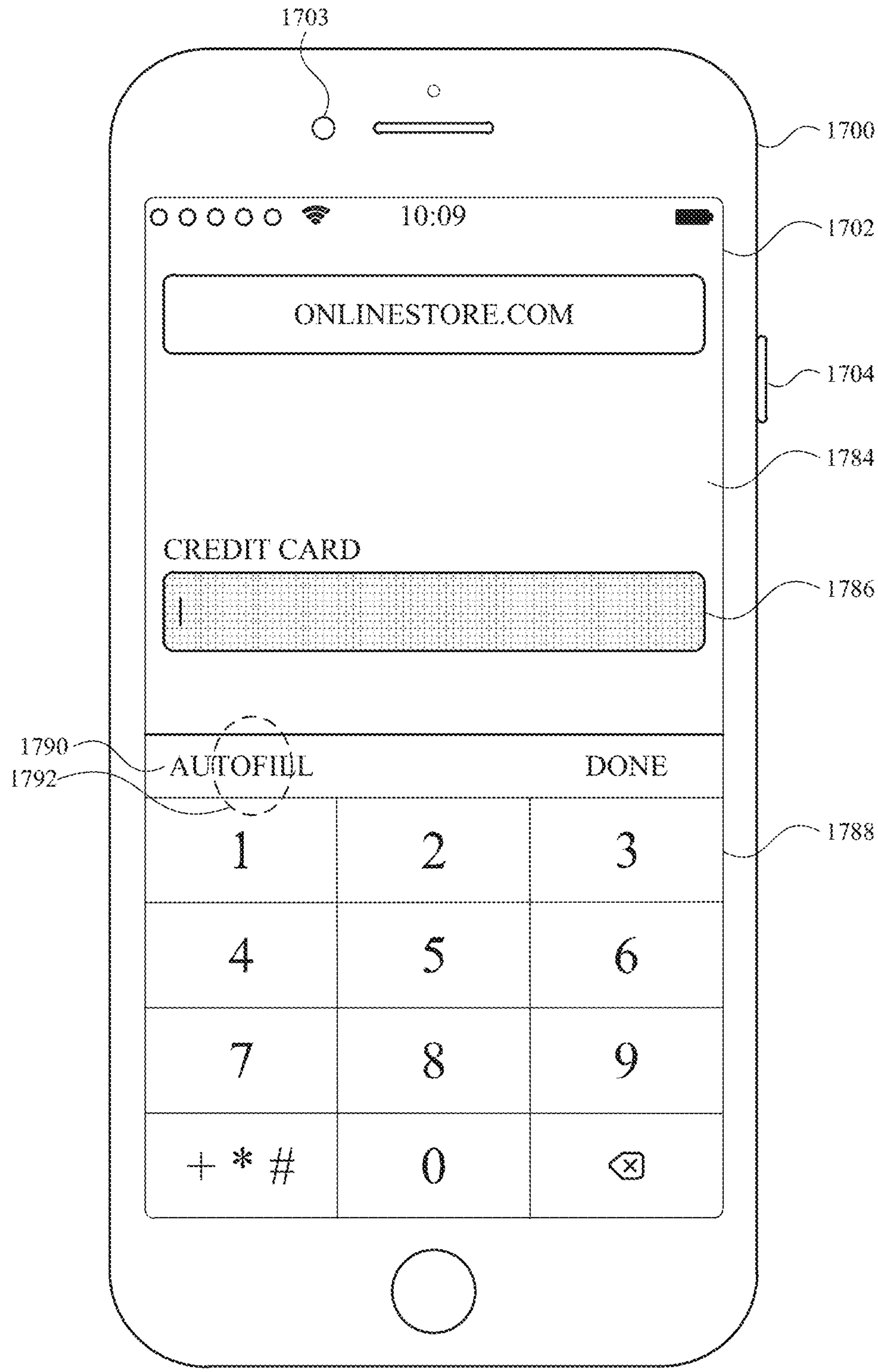
Figure 17W:
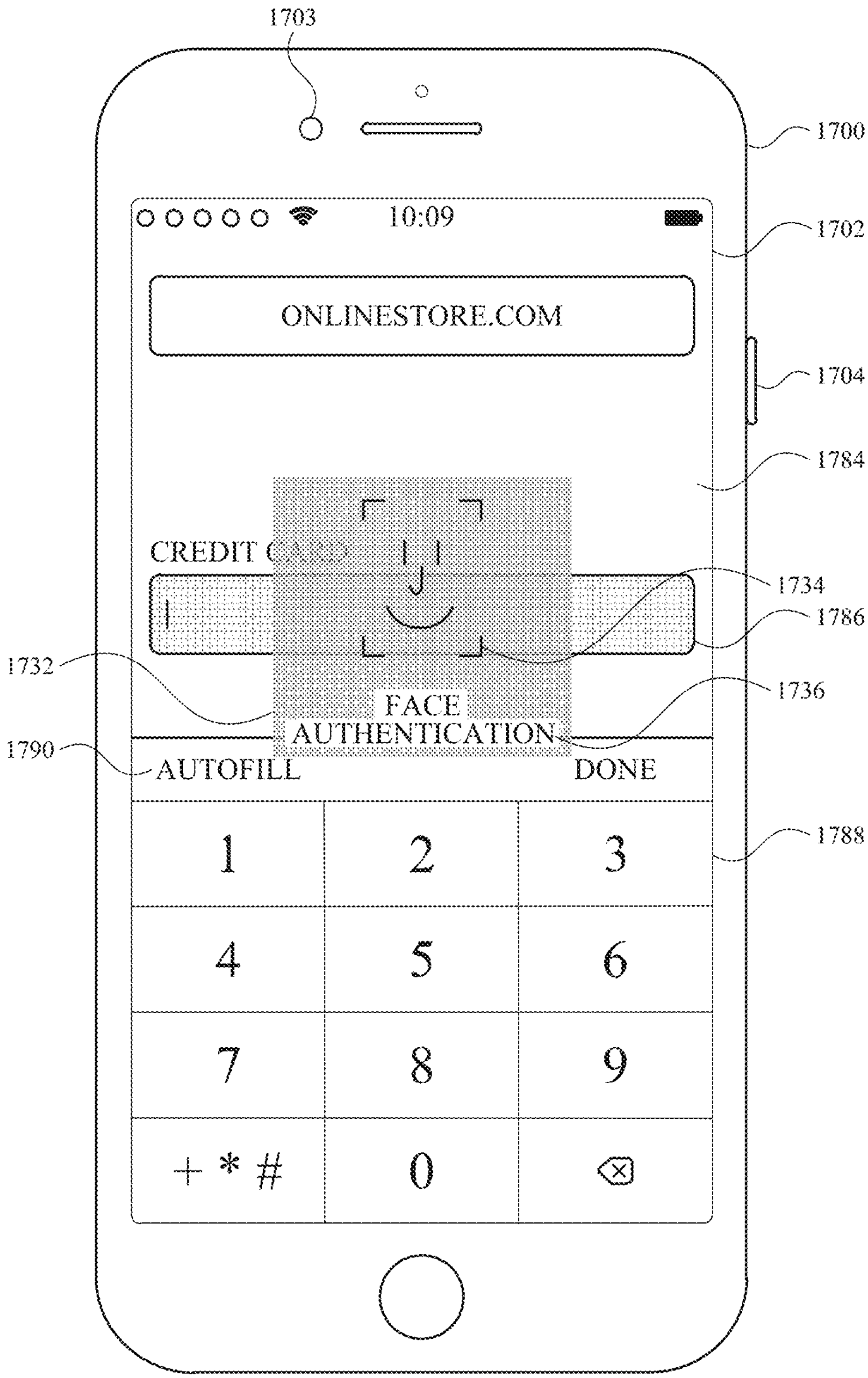
Figure 17X:
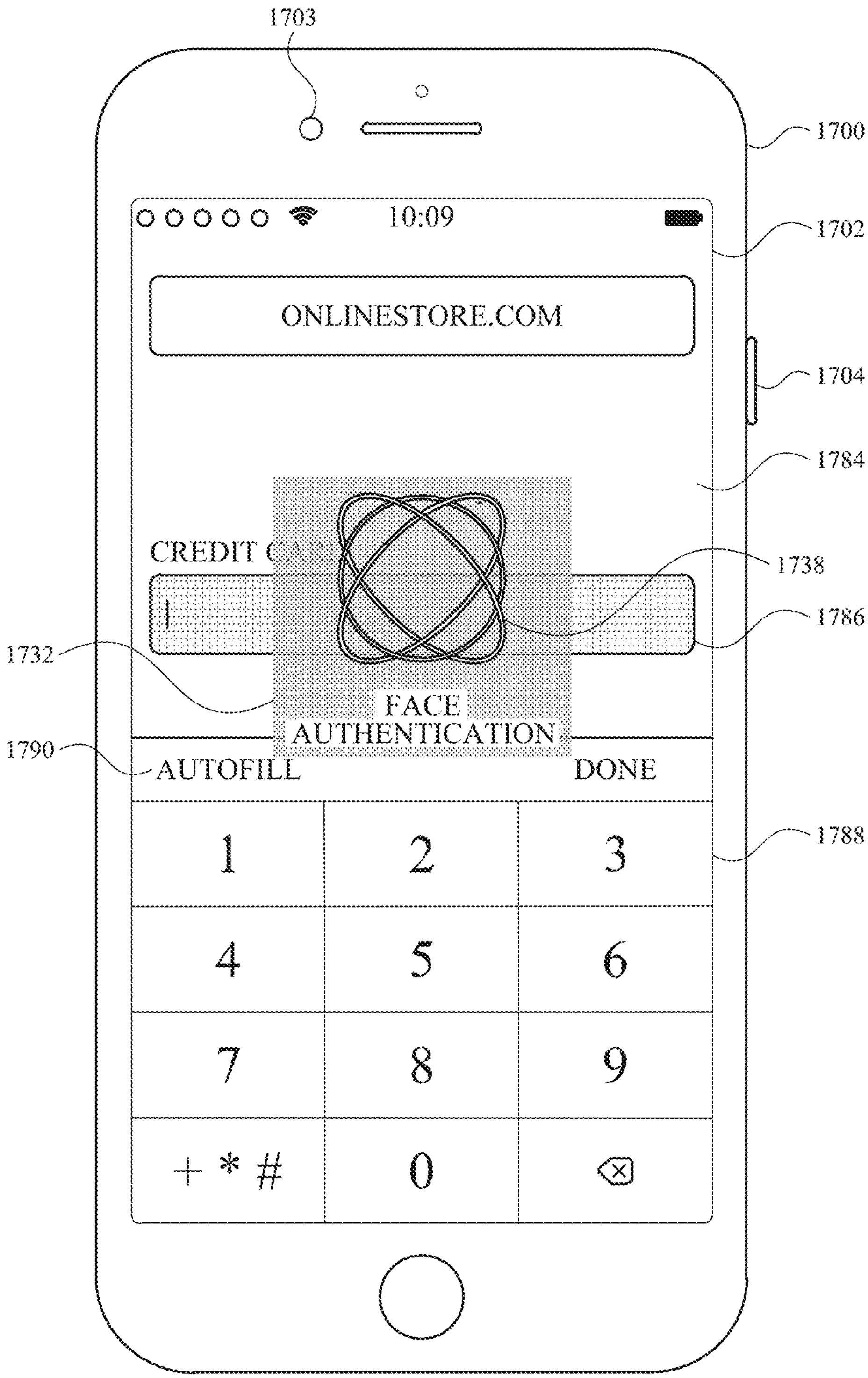
Figure 17Y:
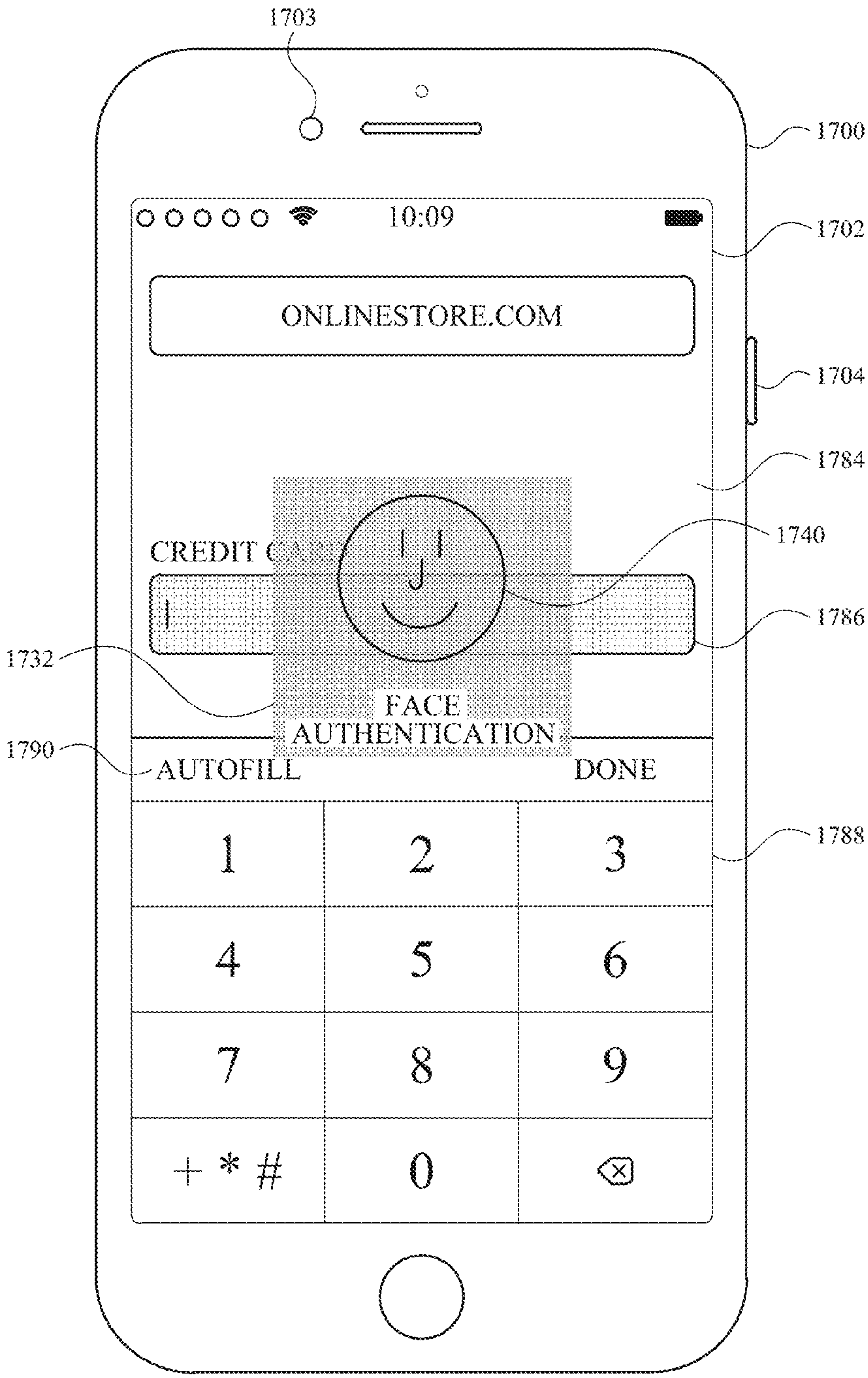

With reference to FIGS. 17V-X, in response to detecting tap gesture 1792, the electronic device 1700 initiates biometric authentication to determine whether at least a portion of the biometric feature, as determined based on biometric data corresponding to the biometric feature, satisfies the biometric authentication criteria, described at least with reference to FIGS. 17G-I.

Figure 17Z:
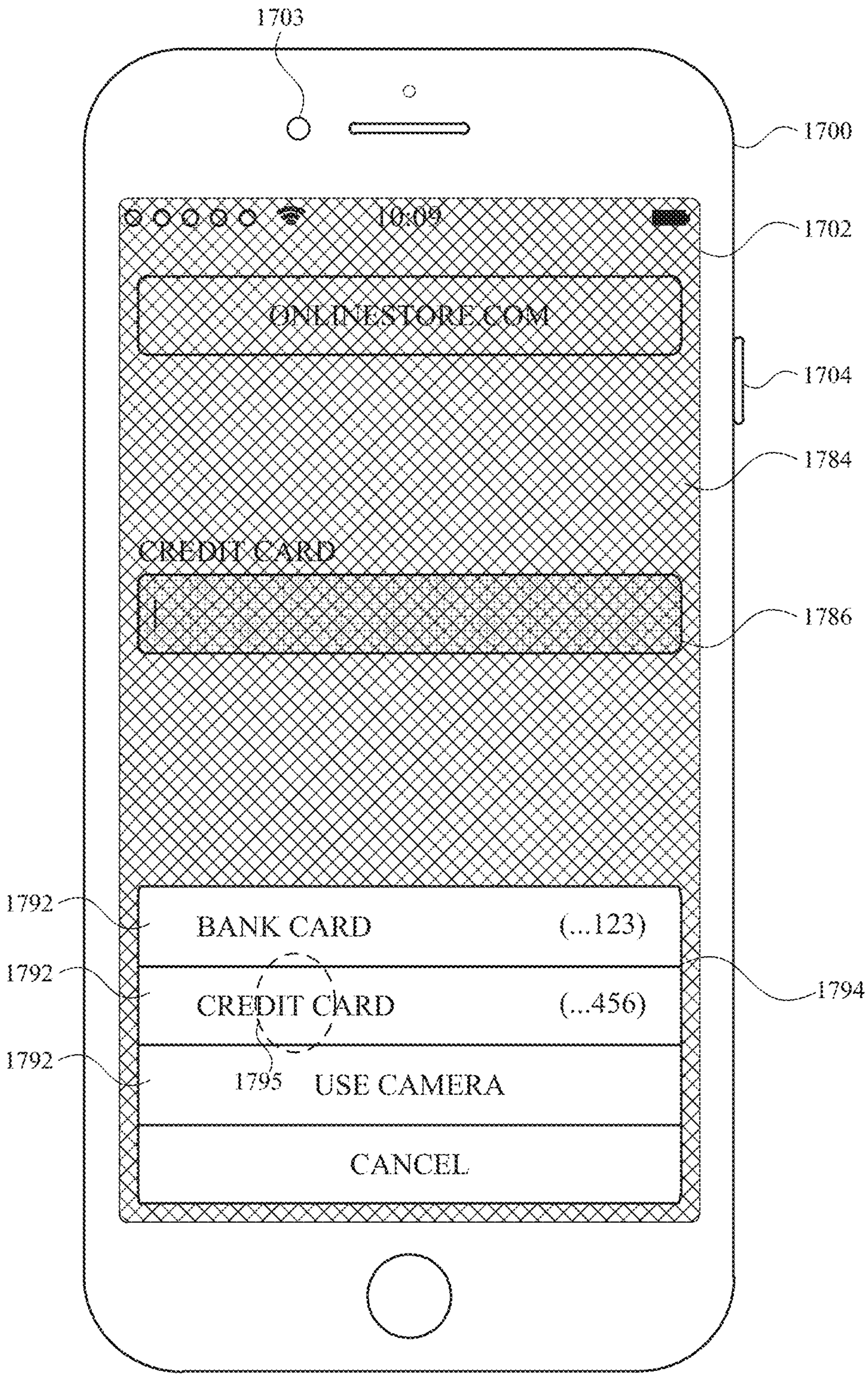
Figure 17A:
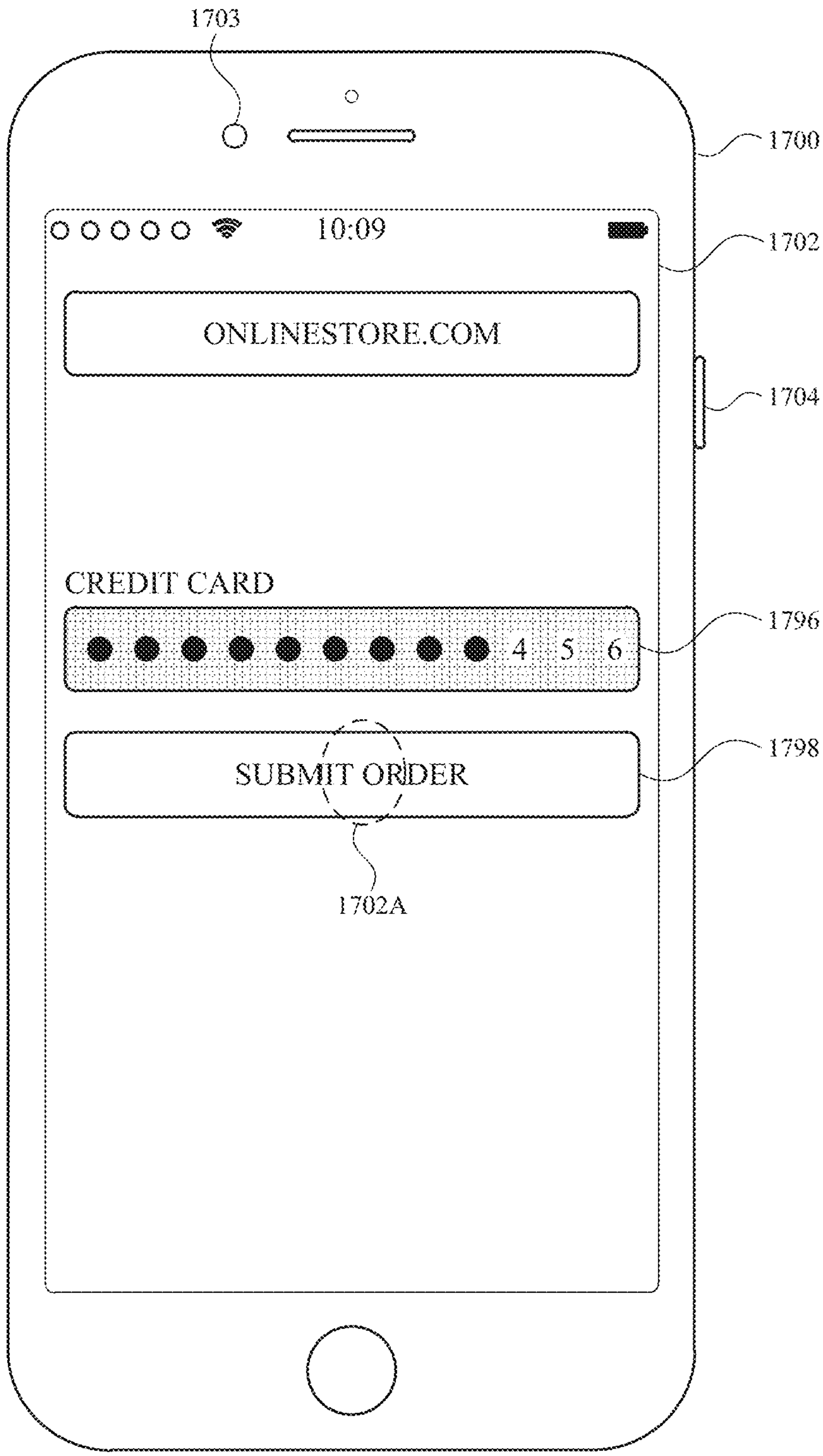
Figure 17A:
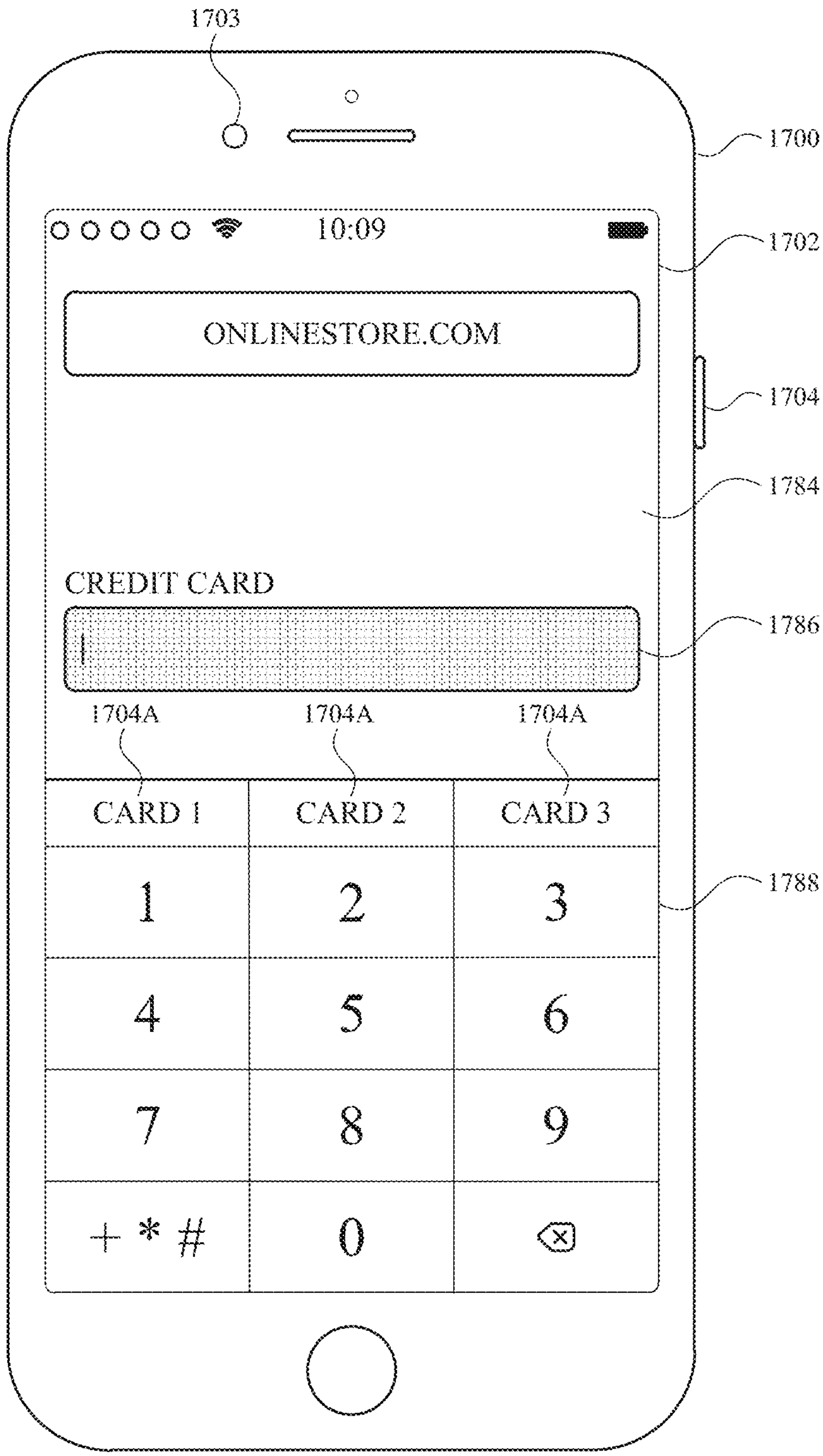
Figure 17A:
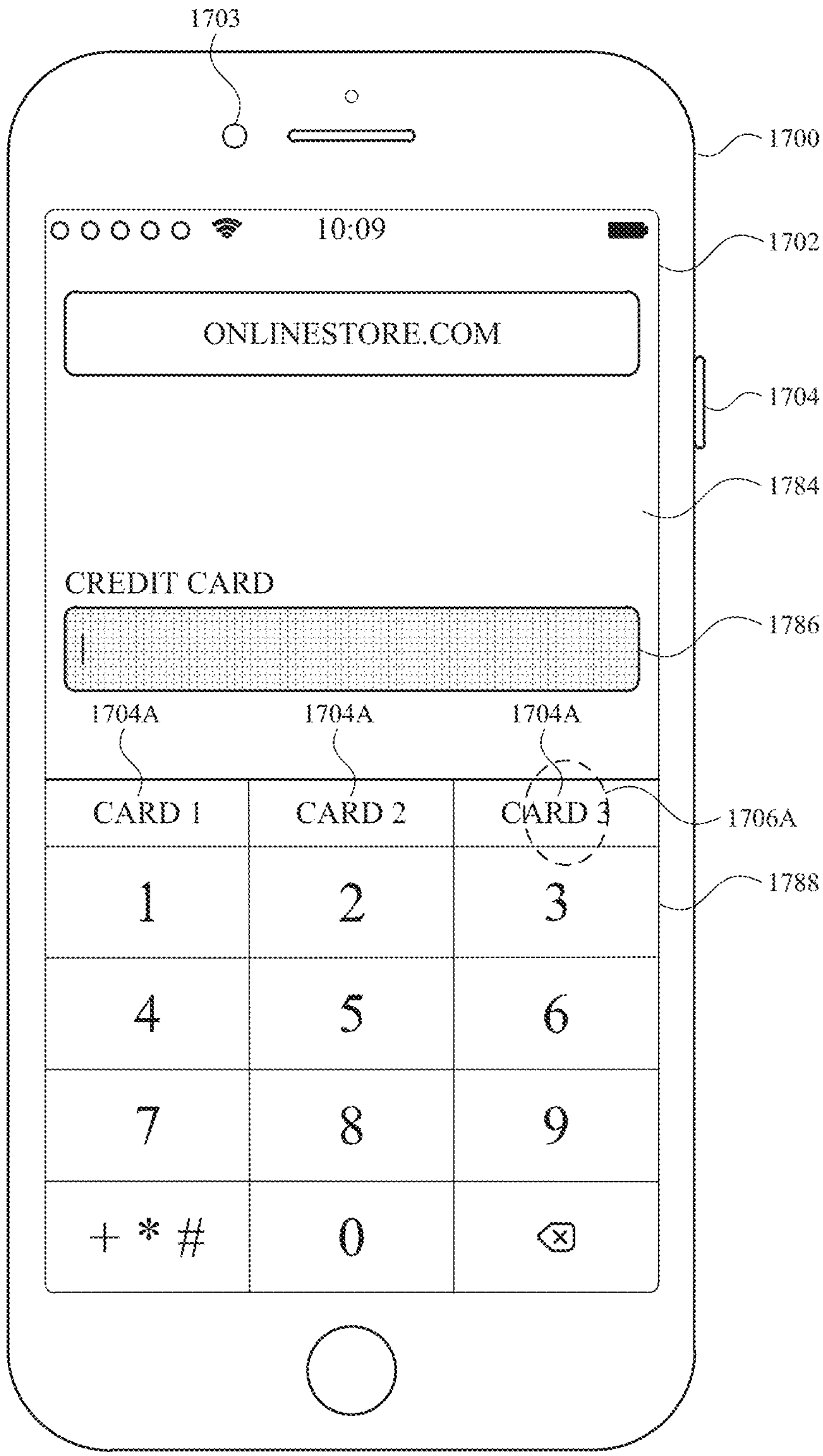
Figure 17A:
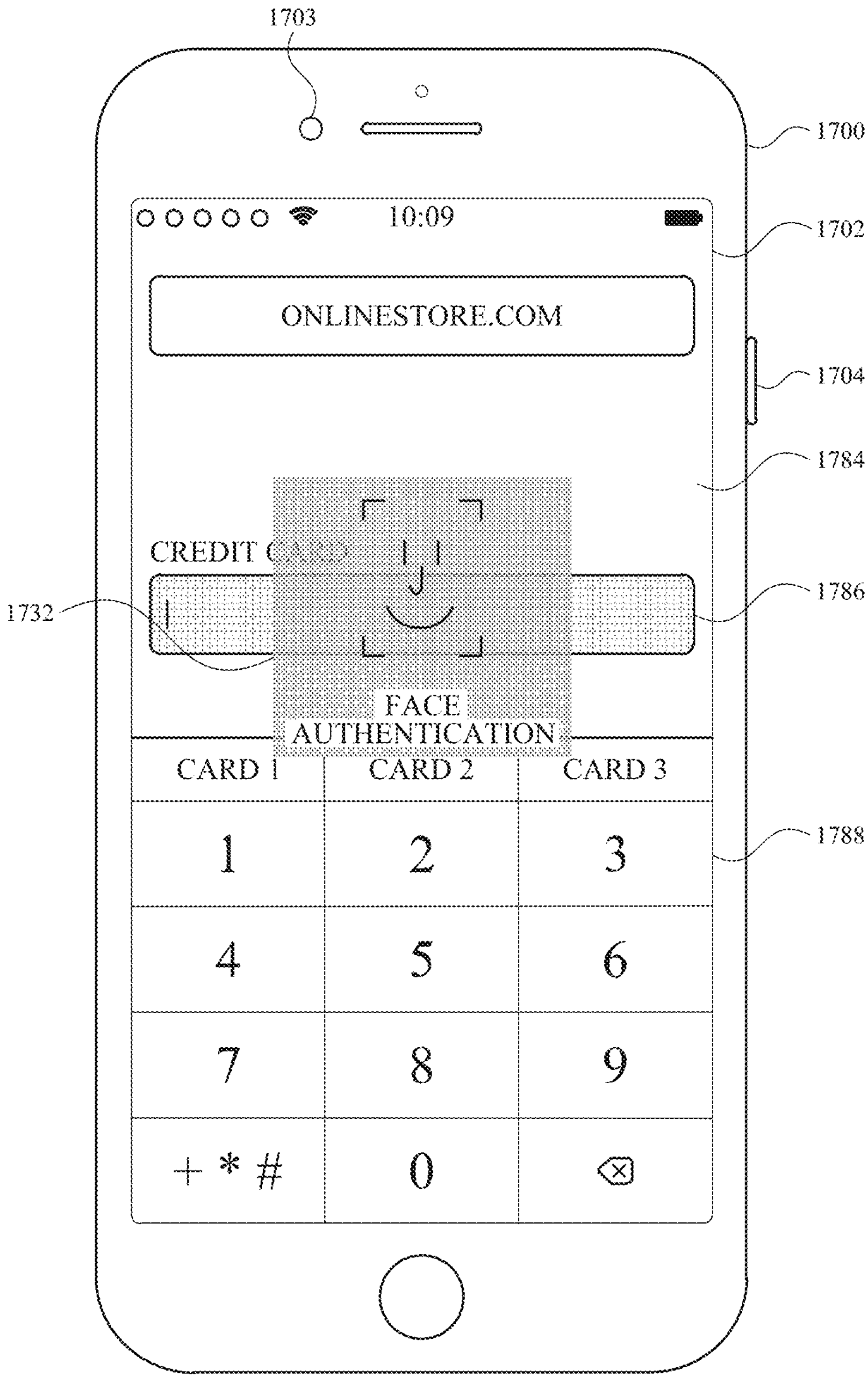
Figure 17A:
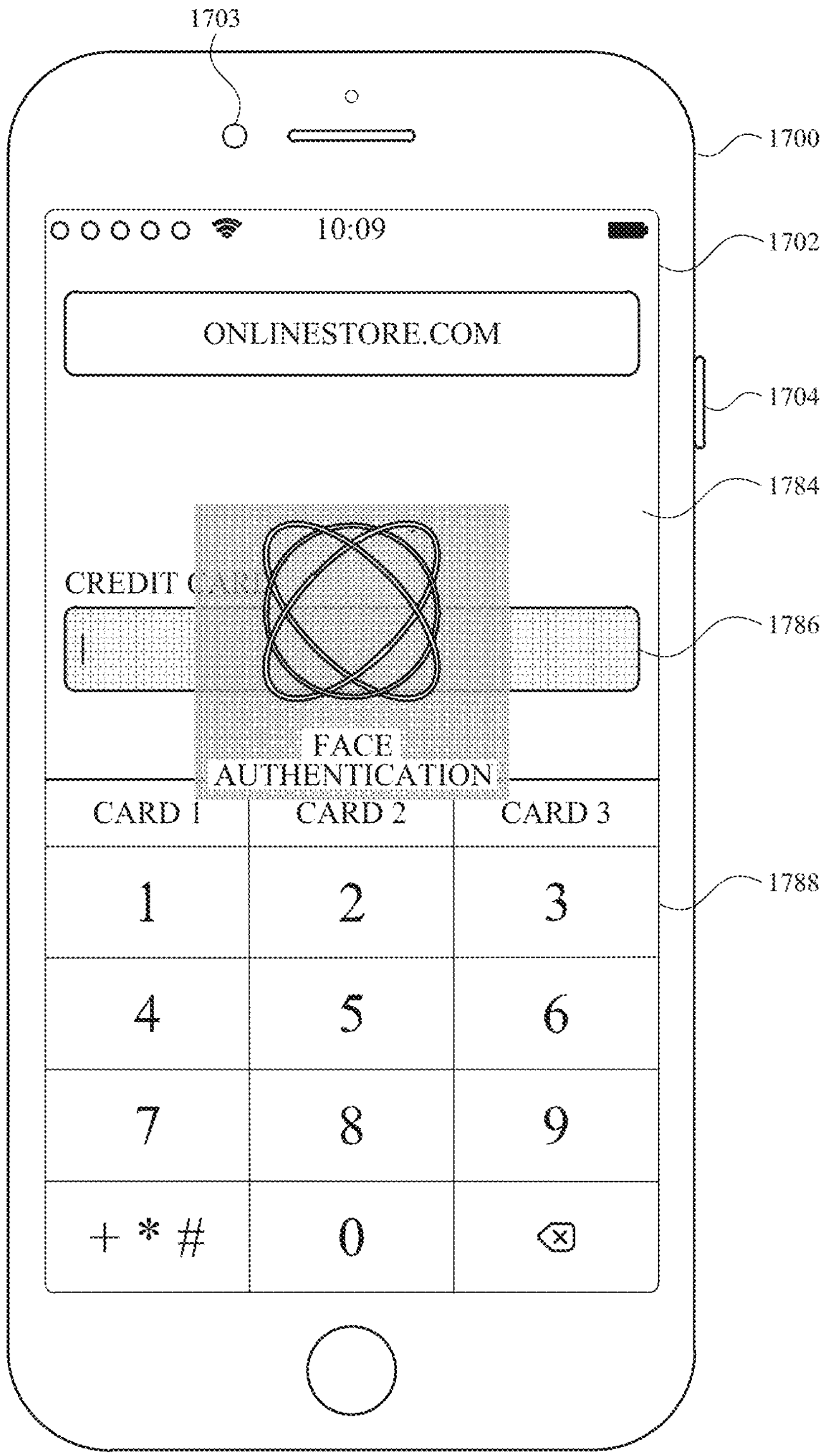
Figure 17A:
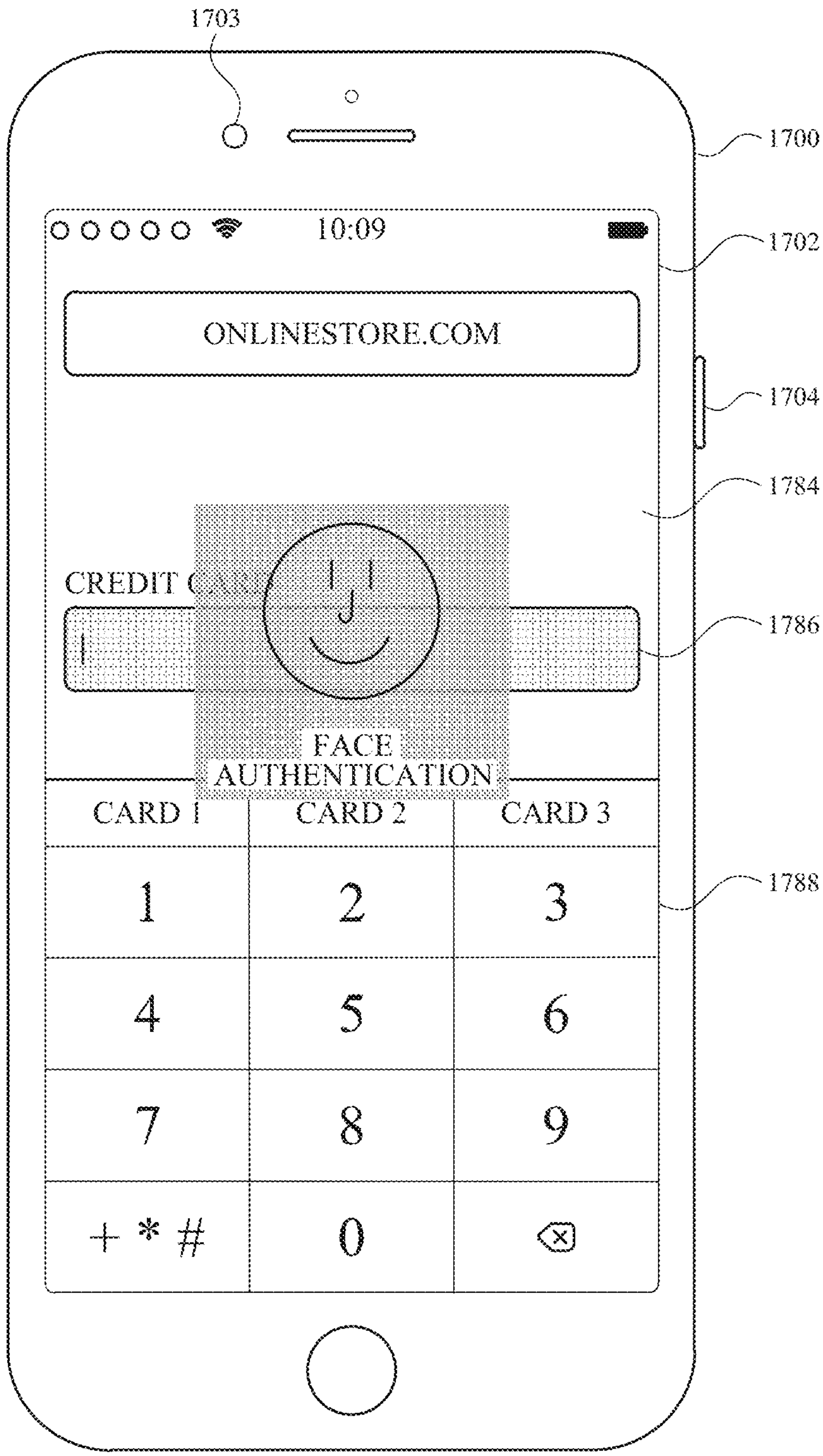
Figure 17A:
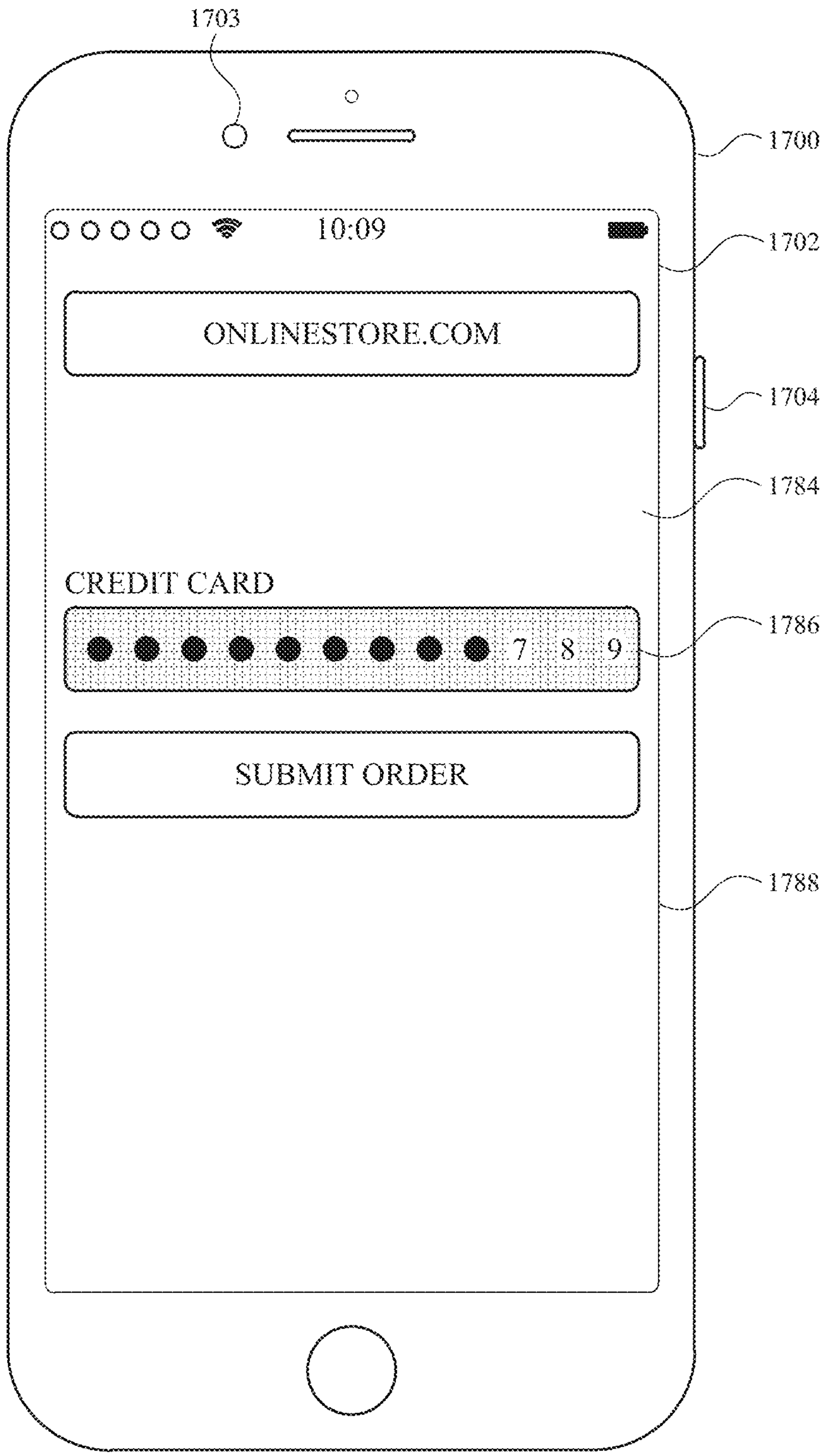
Figure 17A:
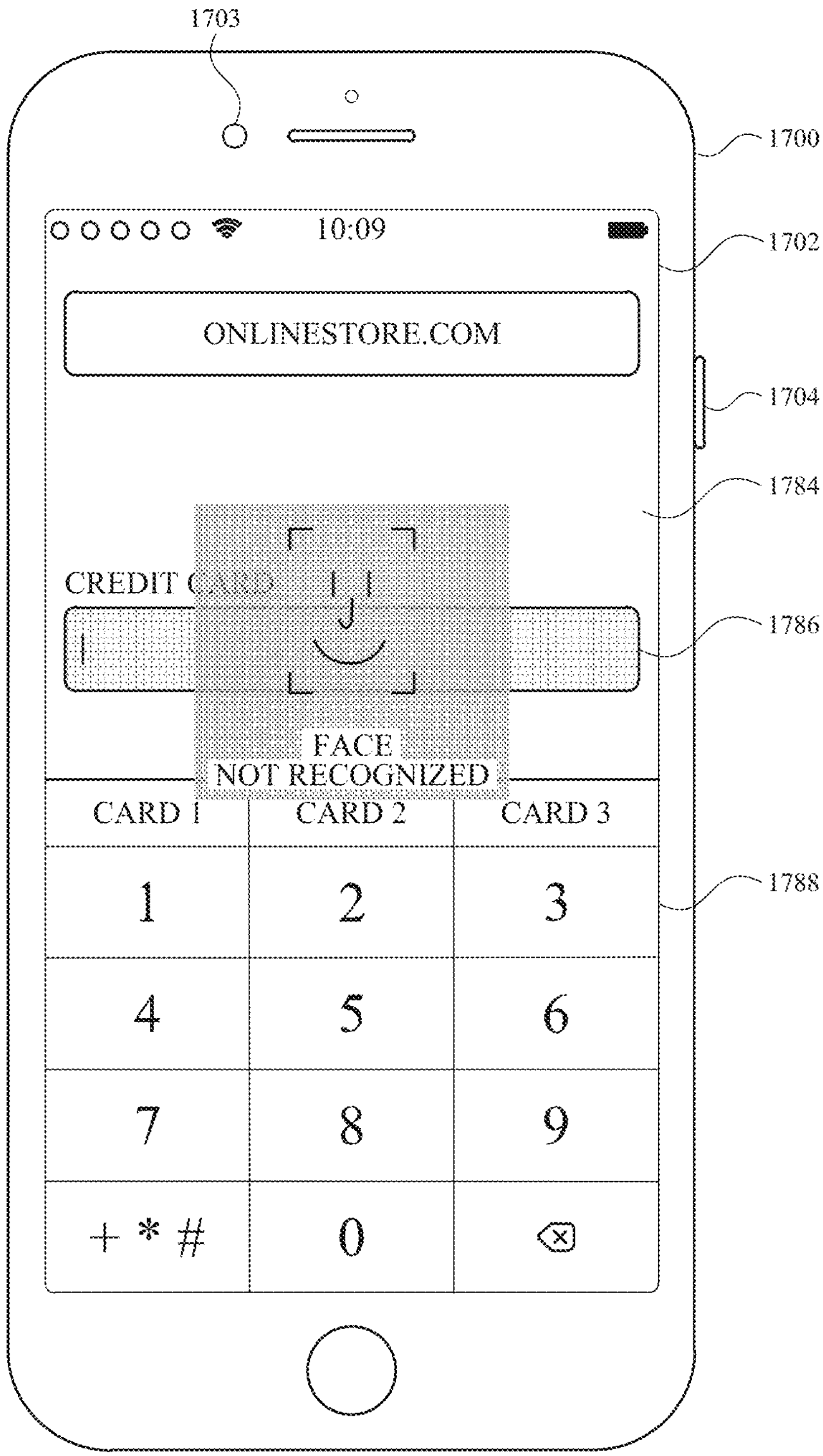
Figure 17A:
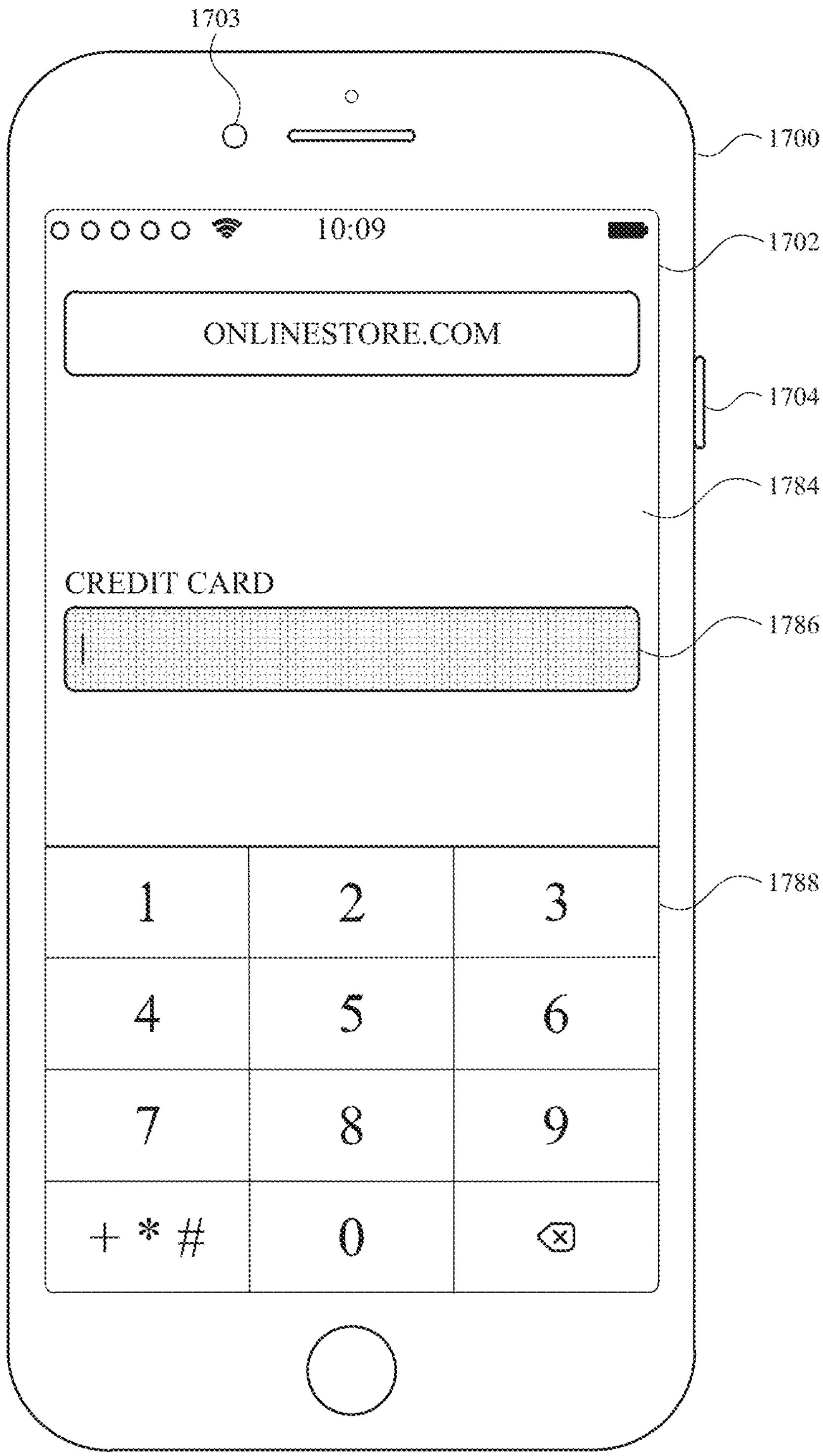

In FIG. 17Z, in response to successful biometric authentication, the electronic device 1700 displays (e.g., replaces display of the biometric authentication interface 1732 with) a candidate selection interface 1794 including a plurality of candidate input affordances 1792 for autofilling the secured data fillable field 1786. In some examples, the candidate selection interface 1794 is displayed without a keyboard. In the illustrated example, the fillable field 1786 is associated with credit cards (e.g., fillable field 1786 is flagged as associated with financial transactions). Accordingly, in some examples, each of the candidate inputs affordances 1792 serves as a reference to a respective credit card (e.g., credit card number and/or one or more other respective candidate values associated with the credit card).

While displaying the candidate input affordances 1792, the electronic device 1700 detects activation of a candidate input affordance 1792. For example, as shown in FIG. 17Z, the activation is a tap gesture 1795 on a candidate input affordance 1792. In FIG. 17Z, in response to detecting tap gesture 1795, the electronic device 1700 autofills the secured data fillable field with the candidate input 1796 corresponding to the activated candidate input affordance 1792.

While displaying the application interface 1784 with autofilled fillable field 1786, the electronic device detects activation of a submission affordance 1798. By way of example, the activation is a tap gesture 1702A on the submission affordance 1798. In response, the autofilled credit card optionally is submitted using the application, for instance, for authentication or payment purposes.

While description is made herein with respect to performing biometric authentication prior to providing candidate input affordances when autofilling secured data fillable fields, it will be appreciated that, in some examples, candidate input affordances are provided prior to biometric authentication. With reference to FIG. 17AA, for instance, in response to a request to autofill the secured data fillable field 1786, the electronic device 1700 displays an input interface including a plurality of candidate input affordances 1704A. Each of the candidate inputs 1704A is a reference to (e.g., representation of) a candidate input value in some examples.

As illustrated in FIG. 17AB, while displaying the input interface including a plurality of candidate input affordances 1704A, the electronic device detects activation of a candidate input affordance 1704A. By way of example, the activation is a tap gesture 1706A on a candidate input affordance 1704A. With reference to FIGS. 17AC-AE, in response, the electronic device performs biometric authentication, as described. In FIG. 17AF, the electronic device 1700 has determined that the biometric authentication is successful, and autofills the secured data Tillable field 1786 with the selected candidate input corresponding to the selected candidate input affordance 1704A.

In FIG. 17AG, the electronic device instead determines that the biometric authentication was unsuccessful. In response, the electronic device 1700 ceases display of the biometric authentication interface, as illustrated in FIG. 17AH.

As mentioned above, the exemplary example of the user interfaces illustrated in FIGS. 17A-17AH described above relate to the exemplary example of the user interfaces illustrated in FIGS. 18A-18AH described below. Therefore, it is to be understood that the processes described above with respect to the exemplary user interfaces illustrated in FIGS. 17A-17AF and the processes described below with respect to the exemplary user interfaces illustrated in FIGS. 18A-18AH are largely analogous processes that similarly involve initiating and managing transfers using an electronic device (e.g., 100, 300, 500, 700)

FIGS. 18A-18D are a flow diagram illustrating a method for performing biometric authentication using an electronic device in accordance with some examples. Method 1800 is performed at a device (e.g., 100, 300, 500, 1700) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric feature by the one or more biometric sensors. Some operations in method 1800 are, optionally, combined, the orders of some operations are, optionally, changed, and some operations are, optionally, omitted.

As described below, method 1800 provides an intuitive way for performing authentication of biometric features. The method reduces the cognitive burden on a user for performing authentication of biometric features, thereby creating a more efficient human-machine interface and intuitive user experience. For battery-operated computing devices, enabling a user to manage authentication of biometric features faster and more efficiently conserves power and increases the time between battery charges.

In some examples, the electronic device (e.g., 100, 300, 500, 1700) detects (1802) a selection of the fillable field (e.g., 1710, 1712, 1786). In some examples, in response to detecting the selection of the fillable field (e.g., 1710, 1712, 1786), the electronic device (e.g., 100, 300, 500, 1700) displays (1804) an input interface (e.g., 1720, 1788) including a plurality of user interface objects (e.g., 1725, 1793, 1704A) that correspond to candidate inputs for the fillable field (e.g., 1710, 1712, 1786).

In some examples, prior to receiving the request (e.g., 1718, 1724, 1726, 1730, 1792, 1795, 1706A) to autofill the at one fillable field (e.g., 1710, 1712, 1786), the electronic device (e.g., 100, 300, 500, 1700) receives a selection (e.g., 1718, 1730) of the fillable field (e.g., 1710, 1712, 1786). In some examples, the selection (e.g., 1718, 1730) of the fillable field (e.g., 1710, 1712, 1786) is a user selection of the fillable field (e.g., 1710, 1712, 1786) displayed in the application interface using an input device, such as a mouse or a button. In some examples, in response to the selection of the fillable field (e.g., 1710, 1712, 1786), the electronic device (e.g., 100, 300, 500, 1700) displays (1806) the autofill affordance (e.g., 1722, 1790). In some examples, the autofill affordance (e.g., 1722, 1790) is displayed in combination with a keyboard (or keypad)).

In some examples, the electronic device (e.g., 100, 300, 500, 1700) displays (1808), on the display, an application interface including a fillable field (e.g., 1710, 1712, 1786). Displaying an application interface including a fillable field provides the user with visual feedback indicating that an input can be made to a particular region of the application interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, displaying, on the display (e.g., 1702), an application interface including a fillable field (e.g., 1710, 1712, 1786) includes, in accordance with the fillable field (e.g., 1712, 1786) being associated with data of the second type, displaying (1810) the fillable field (e.g., 1712, 1786) with a first visual treatment. Displaying the fillable field with a particular visual treatment (e.g., the first visual treatment) in accordance with the fillable field being associated with data of a particular type (e.g., the second type) provides visual feedback that allows the user quickly and easily recognize that the fillable field is associated with a particular data type. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, data of the second type includes data for which authentication is required in order to be autofilled, such as payment information, a password, and/or a username. In some examples, the first visual treatment is a visual effect, such as a specific color scheme, highlighting, or animation. In some examples, the first visual treatment includes a first color scheme, such as a pattern of one or more colors. In some examples, the first visual treatment includes a biometric authentication interface object (e.g., 1716) associated with (e.g., within or adjacent to) the fillable field (e.g., 1712, 1786).

In some examples, the electronic device (e.g., 100, 300, 500, 1700) displays a biometric authentication glyph (e.g., 1716) or icon in or near fields (e.g., 1712, 1786) that are associated with biometric authentication that is not displayed in or near fields (e.g., 1710) that are not associated with biometric authentication. Displaying the biometric authentication glyph or icon in or near fields that are associated with biometric authentication and not displaying the biometric glyph or icon in or near fields that are not associated with biometric authentication provides easily recognizable visual feedback about the which fields relate to or require biometric authentication and which fields do not relate to or require biometric authentication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, displaying on the display, an application interface including a fillable field includes, in accordance with the fillable field (e.g., 1710) being associated with data of the first type, displaying (1812) the fillable field (e.g., 1710) with a second visual treatment, different than the first visual treatment. In some examples, data of the first type includes data for which authentication is not required in order to be autofilled, such as contact information including a name, address, phone number, zip code, etc. In some examples, the second visual treatment is the absence of the first visual treatment. In some examples, the electronic device (e.g., 100, 300, 500, 1700) highlights the fillable field (e.g., 1712, 1786) with a different color, a biometric authentication glyph (e.g., 1716), and/or text indicating the fillable field (e.g., 1712, 1786) are, optionally, autofilled responsive to successful biometric authentication. In some examples, the second visual treatment includes a second color scheme, different than the first color scheme. Accordingly, in some examples, the electronic device (e.g., 100, 300, 500, 1700) displays fields (e.g., 1712, 1786) that are associated with biometric authentication using a different color from fields (e.g., 1710) that are not associated with biometric authentication.

In some examples, displaying, on the display, an application interface including a fillable field (e.g., 1710, 1712, 1786) includes displaying (1814) a webpage including the fillable field (e.g., 1710, 1712, 1786). In some examples, the application interface further includes a submission affordance (e.g., 1714, 1798) associated with the fillable field (e.g., 1710, 1712, 1786)).

In some examples, while displaying the application interface, the electronic device (e.g., 100, 300, 500, 1700) receives (1816) a request (e.g., 1718, 1724, 1726, 1730, 1792, 1795, 1706A) to autofill the fillable field (e.g., 1710, 1712, 1786) of the application interface. In some examples the request is a selection (e.g., 1724, 1792) of an autofill affordance (e.g., 1722, 1790), a selection (e.g., 1718, 1730) of a field, a selection (e.g., 1726, 1795, 1706A) of a candidate text entry, loading a webpage, or any combination thereof. In some examples, receiving the request to autofill the at least one fillable field (e.g., 1710, 1712, 1786) of the application interface includes receiving (1818) a selection of an autofill affordance (e.g., 1722, 1790) that is displayed on the display (e.g., 1702) of the electronic device (e.g., 100, 300, 500, 1700). In some examples, in response to selection (e.g., 1710, 1712, 1786) of the field (e.g., 1710, 1712, 1786), the electronic device (e.g., 100, 300, 500, 1700) displays a keyboard (or keypad) including an affordance (e.g., 1722, 1790) to autofill the fillable field (e.g., 1710, 1712, 1786). In response to selection of the affordance, the electronic device (e.g., 100, 300, 500, 1700) initiates biometric authentication. In some examples, receiving the request to autofill the at least one fillable field (e.g., 1710, 1712, 1786) of the application interface includes receiving (1820) a selection (e.g., 1718, 1730) of the fillable field (e.g., 1710, 1712, 1786).

In some examples, in response to selection of the fillable field (e.g., 1710, 1712, 1786), the electronic device (e.g., 100, 300, 500, 1700) initiates biometric authentication without displaying an input interface (e.g., 1720,1788). Initiating biometric authentication without displaying an input interface in response to selection of the fillable field enables the user to quickly and efficiently initiate biometric authentication with minimal input. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the input interface (e.g., 1720, 1788) is displayed in response to selection of fields of a first type (e.g., 1786) (e.g., credit card field) and is not displayed in response to selection of fields of a second type (e.g., 1712) (e.g., password field). In some examples, receiving the request to autofill the at least one fillable field (e.g., 1710, 1712, 1786) of the application interface includes receiving (1822) a selection (e.g., 1726, 1795, 1706A) of a reference (e.g., 1725, 1793, 1704A) corresponding to a candidate input associated with data of the second type. In some examples, the electronic device (e.g., 100, 300, 500, 1700) provides one or more references (e.g., 1725, 1793, 1704A) corresponding to one or more candidate inputs that can be used (e.g., upon selection) to autofill the fillable field (e.g., 1710, 1712, 1786). In some examples, a reference is, for instance, a reference to a credit card (e.g., "CC1") or a reference to a password ("Facebook password"). In some examples, a reference is the candidate itself (e.g., an email address such as "test@test.com")). In some examples, the selection (e.g., 1726, 1795, 1706A) of the reference (e.g., 1725, 1793, 1704A) to the candidate input is a selection of an affordance of a software keyboard. In some examples, the keyboard is a keypad. In some examples, receiving the request to autofill the at least one fillable field of the application interface includes a selection (1824) of the fillable field of the webpage. In some examples, receiving the request to autofill the fillable field of the application interface includes receiving (1826) a selection (e.g., 1726, 1795, 1706A) of a user interface object (e.g., 1725, 1793, 1704A) that corresponds to a respective candidate input of the plurality of candidate inputs. In some examples, in response to selection of the fillable field, the electronic device (e.g., 100, 300, 500, 1700) provides candidate inputs (e.g., 1725, 1793, 1704A) for selection by the user. Thereafter, the electronic device (e.g., 100, 300, 500, 1700) proceeds with biometric authentication. In some examples, the electronic device (e.g., 100, 300, 500, 1700) identifies all fillable fields (e.g., 1710, 1712, 1786) when the application interface is loaded and/or determines candidate inputs for one or more of the fields (e.g., 1710, 1712, 1786). In some examples, autofilling in this manner reduces the number of inputs required to autofill a fillable field (e.g., 1710, 1712, 1786). In some examples, the request to autofill the fillable field (e.g., 1710, 1712, 1786) is based on detection of loading a webpage that includes the fillable field (e.g., 1710, 1712, 1786).

In some examples, in response to receiving the request to autofill the fillable field (e.g., 1710, 1712, 1786) of the application interface (1828), in accordance with a determination that the fillable field (e.g., 1710, 1712, 1786) of the application interface is associated with data of a first type, the electronic device (e.g., 100, 300, 500, 1700) autofills (1830) the fillable field (e.g., 1710, 1712, 1786) with data of the first type. Autofilling the fillable field with data of a particular type (e.g., data of the first type) in accordance with a determination that the fillable field of the application interface is associated with the data of the particular type (e.g., data of the first type) allows the user to bypass having to manually input the data in the fillable field of the application interface. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, data of the first type includes data that is unsecured or not secured (e.g., not biometrically secured). In some examples, the unsecured data is a user's given name, nickname, publically-available phone number, or preference associated with the specific field (e.g., a shoe size for a shoe size field). In some examples, autofilling the fillable field (e.g., 1710, 1712, 1786) includes populating the field, in response to the request (e.g., 1718, 1724, 1726, 1730, 1792, 1795, 1706A), with data stored by the electronic device (e.g., 100, 300, 500, 1700) or accessible to the electronic device (e.g., 100, 300, 500, 1700) without requiring further authentication (e.g., further biometric authentication).

In some examples, further in response to the request to autofill fillable field (e.g., 1710, 1712, 1786) of the application interface, in accordance with a determination that the fillable field (e.g., 1710, 1712, 1786) of the application is associated with data of a second type (1832), while obtaining (e.g., during at least a portion of the obtaining process), from the one or more biometric sensors (e.g., 1703), data corresponding to the biometric feature, the electronic device (e.g., 100, 300, 500, 1700) displays (1834) a biometric authentication interface (e.g., 1732). Displaying the biometric authentication interface in accordance with the determination that the fillable field of the application is associated with data of a particular type (e.g., data of the second type) enhances device security by requiring a security verification measure if the data is of a particular type (e.g., of the second type). Improving security measures of the device enhances the operability of the device by preventing unauthorized access to content and operations and, additionally, reduces power usage and improves battery life of the device by enabling the user to use the device more efficiently.

In some examples, data of the second type is secured data (e.g., biometrically secured data). In some examples, secured data includes pass word information, credit card information, non-public user information such as an unlisted telephone number, or medical information. In some examples, the electronic device (e.g., 100, 300, 500, 1700) displays a biometric authentication interface (e.g., 1732) while performing biometric authentication. In some examples, the biometric authentication interface is displayed over at least a portion of the application interface. In some examples, displaying the biometric authentication interface includes displaying a biometric authentication animation. In some examples, the biometric authentication animation includes an initial animation (e.g., display of first biometric authentication glyph (e.g., 1734)), a processing animation (e.g., rotating rings indicating that biometric data is being processed), and either a success animation or a failure animation. In some examples, the failure animation is the same as the initial animation. This feature is described in greater detail above with reference to FIGS. 15A-15T). In some examples, the biometric authentication interface includes a representation of a simulation of the biometric feature (e.g., 1734, 1738, 1740, 1746) (1836). In some examples, the biometric authentication interface includes a representation of a simulation of the biometric feature (e.g., 1734, 1738, 1740, 1746) indicative of the state of the biometric authentication sequence. In some examples, the biometric feature is a face and the representation (e.g., 1734, 1738, 1740, 1746) is a simulation of a face.

In some examples, further in response to the request to autofill the fillable field and in accordance with a determination that the fillable field of the application is associated with data of a second type, the electronic device (e.g., 100, 300, 500, 1700) determines whether multiple candidate inputs (e.g., associated with data of the second type) are stored on the electronic device (e.g., 100, 300, 500, 1700). Further, in some examples, in accordance with a determination that multiple candidate inputs associated with data of the second type (e.g., 1793, 1704A) are stored on the electronic device (e.g., 100, 300, 500, 1700), the electronic device (e.g., 100, 300, 500, 1700) displays the multiple candidates. Further, in some examples, the electronic device (e.g., 100, 300, 500, 1700) receives a selection of a candidate input of the displayed multiple candidate inputs. Further, in some examples, in response to receiving the selection (e.g., 1704A) of the candidate input, the electronic device (e.g., 100, 300, 500, 1700) obtains, from the one or more biometric sensors (e.g., 1703), the data corresponding to at least a portion of a biometric feature. In some examples, autofilling the fillable field (e.g., 1712, 1786) with data of the second type includes autofilling the fillable field (e.g., 1712, 1786) with the selected candidate input (e.g., 1704A). In some examples, the electronic device (e.g., 100, 300, 500, 1700) determines whether multiple candidate inputs are stored on the electronic device (e.g., 100, 300, 500, 1700) prior to performing biometric authentication. In some examples, once a user has selected a candidate input (e.g., 1704A), the electronic device (e.g., 100, 300, 500, 1700) performs the biometric authentication.

In some examples, further in response to the request to autofill the fillable field (e.g., 1710, 1712, 1786) and in accordance with a determination that the at least a portion of a biometric feature, determined based on the data obtained from the one or more biometric sensors that corresponds to the biometric feature, satisfies biometric authentication criteria (1838), the electronic device (e.g., 100, 300, 500, 1700) autofills (1840) the fillable field (e.g., 1710, 1712, 1786) with data of the second type. Autofilling the fillable field with data of a particular type (e.g., of the second type) in accordance with the determination that the at least a portion of the biometric feature satisfies the biometric authentication criteria allows the user to bypass having to manually input the data in the fillable field. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, if biometric authentication is successful, the electronic device (e.g., 100, 300, 500, 1700) autofills the fillable field (e.g., 1712, 1786) with the information in response to the request. Autofilling the fillable field allows the user to bypass having to manually input the data in the fillable field. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, in response to receiving the request (e.g., 1718, 1724, 1726, 1730, 1795, 1706A) to autofill the fillable field (e.g., 1712, 1786) of the application interface the electronic device (e.g., 100, 300, 500, 1700) obtains, from the one or more biometric sensors, data corresponding to at least a portion of a biometric feature. In some examples, the data obtained from the one or more biometric sensors is obtained prior to receiving the request to autofill the fillable field of the application interface. In some examples, the data obtained from the one or more biometric sensors is obtained in response to receiving the request to autofill the fillable field (e.g., 1712, 1786) of the application interface. In some examples, the data obtained from the one or more biometric sensors (e.g., 1703) is obtained in accordance with a determination that the fillable field (e.g., 1712, 1786) of the application is associated with data of a second type. In some examples, the electronic device (e.g., 100, 300, 500, 1700) autofills the fillable field (e.g., 1712, 1786) without displaying, in response to the request to autofill the fillable field, an input interface (e.g., 1720) (e.g., keyboard or keypad). In some examples, the one or more biometric sensors (e.g., 1703) includes a camera (e.g., an IR camera or thermographic camera). In some examples, the data obtained from the one or more biometric sensors (e.g., 1703) that corresponds to the biometric feature includes biometric data obtained using the camera. In some examples, the biometric feature is a face. In some examples, the data obtained from the one or more biometric sensors (e.g., 1703) that corresponds to the biometric feature includes biometric data associated with a portion of the face, and the biometric authentication criteria includes a requirement that the biometric data associated with the face match biometric data associated with an authorized face in order for the biometric authentication criteria to be met.

In some examples, in accordance with a determination that the electronic device (e.g., 100, 300, 500, 1700) has access to a single candidate value of the second type for filling in the fillable field (e.g., 1712, 1786), the electronic device (e.g., 100, 300, 500, 1700) autofills the fillable field (e.g., 1712, 1786) with the data of the second type. In some examples, in accordance with a determination that the electronic device (e.g., 100, 300, 500, 1700) has access to multiple candidate values of the second type for autofilling in the fillable field (e.g., 1712, 1786), the electronic device (e.g., 100, 300, 500, 1700) displays representations of a plurality of the multiple candidate values. In some examples, candidate values are directly stored on the device and/or otherwise accessible to the electronic device (e.g., 100, 300, 500, 1700) from another electronic device (e.g., 100, 300, 500, 1700) connected to the electronic device (e.g., 100, 300, 500, 1700). In some examples, while displaying the representations (e.g., 1725, 1793, 1704A) of the plurality of the multiple candidate values, the electronic device (e.g., 100, 300, 500, 1700) receives a selection (e.g., 1726, 1795, 1706A) of a representation (e.g., 1725, 1793, 1704A) of a respective candidate value of the multiple candidate values and, in some examples, autofills the fillable field (e.g., 1712, 1786) with the respective candidate value. In some examples, the electronic device (e.g., 100, 300, 500, 1700) determines whether the electronic device (e.g., 100, 300, 500, 1700) has access to multiple instances of data of the second type. In some examples, in response to successful biometric authentication, the electronic device (e.g., 100, 300, 500, 1700) determines whether multiple candidate inputs, for instance, of biometrically secured data (e.g., candidate credit cards), are stored on the device. If so, the electronic device (e.g., 100, 300, 500, 1700) presents (e.g., displays) each of the candidates (e.g., 1725, 1793, 1704A) to the user. In response to a user selection (e.g., 1726, 1795, 1706A) of one of the candidates (e.g., 1725, 1793, 1704A), the electronic device (e.g., 100, 300, 500, 1700) autofills the field (e.g., 1712, 1786) using the selected candidate.

In some examples, in accordance with the determination, based on the data obtained from the one or more biometric sensors, that the at least a portion of the biometric feature does not satisfy the biometric authentication criteria, the electronic device (e.g., 100, 300, 500, 1700) forgoes (1842) autofilling the fillable field (e.g., 1712, 1786) with data of the second type. Forgoing to autofill the field using the selected candidate in accordance with the determination that the at least a portion of the biometric feature does not satisfy the biometric authentication criteria provides visual feedback by allowing to user to recognize that the authentication was unsuccessful and further provides enhanced device security by forgoing autofilling the fillable field without successful authentication. Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. Furthermore, improving security measures of the device enhances the operability of the device by preventing unauthorized access to content and operations and, additionally, reduces power usage and improves battery life of the device by enabling the user to use the device more efficiently.

In some examples, in accordance with the determination, based on the data obtained from the one or more biometric sensors, that the at least a portion of the biometric feature does not satisfy the biometric authentication criteria, the electronic device (e.g., 100, 300, 500, 1700) displays (1844) an indication that the at least a portion of the biometric feature does not satisfy the biometric authentication criteria. Displaying the indication that the at least a portion of the biometric feature did not satisfy the biometric authentication criteria provides visual feedback by allowing to user to quickly recognize that the authentication was unsuccessful. Providing improved visual feedback to the user enhances the operability of the device and makes the user-device interface more efficient (e.g., by helping the user to provide proper inputs and reducing user mistakes when operating/interacting with the device, by enhancing legibility of user interface elements to the user while the device is at natural viewing angles) which, additionally, reduces power usage and improves battery life of the device by enabling the user to use the device more quickly and efficiently. In some examples, in response to a failed biometric authentication, the electronic device (e.g., 100, 300, 500, 1700) provides an indication of the failure. In some examples, the electronic device (e.g., 100, 300, 500, 1700) displays a message indicating "Biometric Feature Not Recognized" or indicating "Biometric Authentication Inactive," if a threshold number of biometric attempts has been reached. In some examples, after failure, the electronic device (e.g., 100, 300, 500, 1700) removes any biometric authentication interface displayed over the application interface and/or displays a biometric authentication retry affordance (e.g., 1758) (e.g., in the fillable field (e.g., 1712)), selection of which retries biometric authentication. In some examples, in response to determining that the at least a portion of the biometric feature does not satisfy the biometric authentication criteria, the device displays a keypad or keyboard for entering data (e.g., a user name, password, passcode, contact information, credit card information, etc.) into the fillable field (e.g., 1712, 1786).

In some examples, in accordance with the determination, based on the data obtained from the one or more biometric sensors, that the at least a portion of the biometric feature does not satisfy the biometric authentication criteria, the electronic device (e.g., 100, 300, 500, 1700) ceases to display the biometric authentication interface. In some examples, after failed biometric authentication, the electronic device (e.g., 100, 300, 500, 1700) ceases to display the biometric authentication. As a result, the electronic device (e.g., 100, 300, 500, 1700) resumes display of the application interface, such as a log-in interface (e.g., 1714) of the application.

In some examples, in accordance with the determination, based on the data obtained from the one or more biometric sensors, that the at least a portion of the biometric feature does not satisfy the biometric authentication criteria, the electronic device (e.g., 100, 300, 500, 1700) displays an input interface (e.g., 1720). In some examples, the input interface (e.g., 1720) includes a keypad or keyboard that includes character entry keys for entering a password or passcode.

In some examples, in accordance with a determination that biometric authentication is not available, the electronic device (e.g., 100, 300, 500, 1700) prompts the user for an alternative form of authentication. Prompting the user for the alternative form of authentication in accordance with the determination that biometric authentication is not available allows the user to easily provide authentication for an operation using a different authentication method. Providing additional control options (e.g., for providing authentication) in this manner without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, biometric authentication fails because a threshold number of failed biometric authentication attempts has been reached since the last successful authentication with the device, or because the biometric sensor cannot be used due to heat, cold, lighting (e.g., there is not enough light or too much light for the device to detect the characteristics of the biometric feature), or other environmental conditions. In some examples, after prompting the user for an alternative form of authentication (e.g., a passcode, password or different form of biometric authentication such as a fingerprint), the electronic device (e.g., 100, 300, 500, 1700) receives an alternative form of authentication. In some examples, further after prompting the user for an alternative form of authentication, in response to receiving the alternative form of authentication, in accordance with a determination that the alternative form of authentication is consistent with authorized authentication information (e.g., a previously stored fingerprint, password, or passcode), the electronic device (e.g., 100, 300, 500, 1700) autofills the fillable field (e.g., 1712, 1786). In some examples, further after prompting the user for an alternative form of authentication and further in response to receiving the alternative form of authentication, in accordance with a determination that the alternative form of authentication is not consistent with authorized authentication information, the electronic device (e.g., 100, 300, 500, 1700) forgoes autofilling the fillable field (e.g., 1712, 1786).

In some examples, after responding to the request to autofill the fillable field of the application interface, the electronic device (e.g., 100, 300, 500, 1700) receives a subsequent request to load the webpage. In some examples, further after responding to the request to autofill the fillable field (e.g., 1710, 1712, 1786) of the application interface, in response to the subsequent request to load the webpage, in accordance with a determination that the subsequent request to load the webpage meets authentication retry criteria, the electronic device (e.g., 100, 300, 500, 1700) attempts biometric authentication to autofill the fillable field (e.g., 1710, 1712, 1786) in the application interface. In some examples, further after responding to the request to autofill the fillable field (e.g., 1710, 1712, 1786) of the application interface and further in response to the subsequent request to load the webpage, in accordance with a determination that the subsequent request to load the webpage does not meet the authentication retry criteria, the electronic device (e.g., 100, 300, 500, 1700) forgoes attempting biometric authentication to autofill the fillable field (e.g., 1710, 1712, 1786) in the application interface. In some examples, loading a webpage conditionally triggers the autofilling based on predetermined criteria. For example, loading a webpage is treated as a request to autofill the fillable fields in the webpage the first time that a webpage is loaded, but not the second time that the webpage is loaded when the webpage is loaded for the second time within a predetermined amount of time (e.g., within 5 minutes, 1 hour, or 1 day). In some examples, the authentication retry criteria include at least one of a requirement that the webpage has not been loaded within a predetermined amount of time or a requirement that the webpage has not been loaded during the same session. In some examples, the requirement is that the loading is a first instance of loading within a predetermined time and/or that the loading is a first instance of loading within a session.

In some examples, after autofilling the fillable field (e.g., 1710, 1712, 1786) with the data of the first type or the data of the second type, the electronic device (e.g., 100, 300, 500, 1700) receives a selection of the submission affordance (e.g., 1714, 1798). In some examples, in response to receiving the selection of the submission affordance, the electronic device (e.g., 100, 300, 500, 1700) ceases to display the application interface. In some examples, further in response to receiving the selection of the submission affordance, the electronic device (e.g., 100, 300, 500, 1700) displays a second interface (e.g., 1782) generated by the application. In some examples, displaying the second interface includes replacing a log in user Interface of the application with a user interface of the application (e.g., 1782) that includes protected information.

Note that details of the processes described above with respect to method 1200 (e.g., FIGS. 18A-18D are also applicable in an analogous manner to the methods described herein. For example, method 1800 optionally includes one or more of the characteristics of the various methods described herein with reference to methods 800, 1000, 1200, 1400, 1600, 2000, 2200, 2500, and 2700. For example, the enrolled biometric data described in method 1200 can be used to perform biometric authentication as described with respect to FIGS. 17G-K. For another example, one or more interstitial interfaces as described in methods 2000 and 2700 optionally are displayed in response to receipt of an input prior to completion of a biometric authentication process. For brevity, these details are not repeated herein.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 18A-18D are, optionally, implemented by components depicted in FIGS. 1A-1B. For example, displaying operation 1808, receiving operation 1816, and autofilling operation 1830, are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 19A-19AB illustrate exemplary user interfaces for biometric authentication, in accordance with some examples. As described in greater detail below, the exemplary example of the user interfaces illustrated in FIGS. 19A-19AB are used to illustrate the processes described below, including the processes in FIGS. 20A-20F.

FIG. 19A illustrates an electronic device 1900 (e.g., portable multifunction device 100, device 300, or device 500). In the exemplary example illustrated in FIGS. 19A-19AB, electronic device 1900 is a smartphone. In other examples, electronic device 1900 can be a different type of electronic device, such as a wearable device (e.g., a smartwatch). Electronic device 1900 has a display 1902, one or more input devices (e.g., touchscreen of display 1902, a button 1904, a mic (not displayed)), and a wireless communication radio. In some examples, the electronic device includes a plurality of cameras. In some examples, the electronic device includes only one camera. In some examples, the electronic device includes one or more biometric sensors (e.g., biometric sensor 1903) which, optionally, include a camera, such as an infrared camera, a thermographic camera, or a combination thereof. In some examples, the one or more biometric sensors 1903 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

Figure 19B:
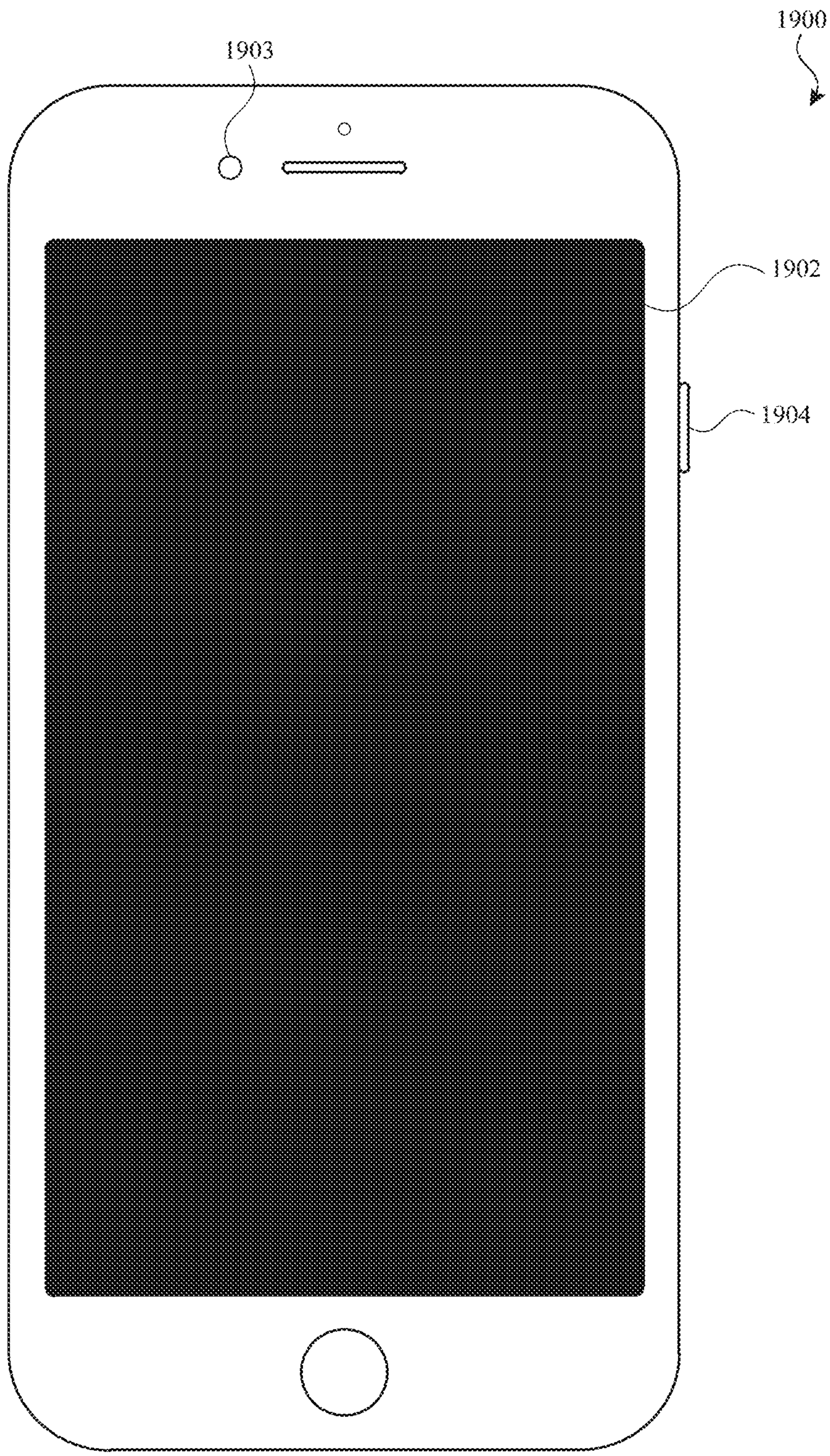
Figure 19C:
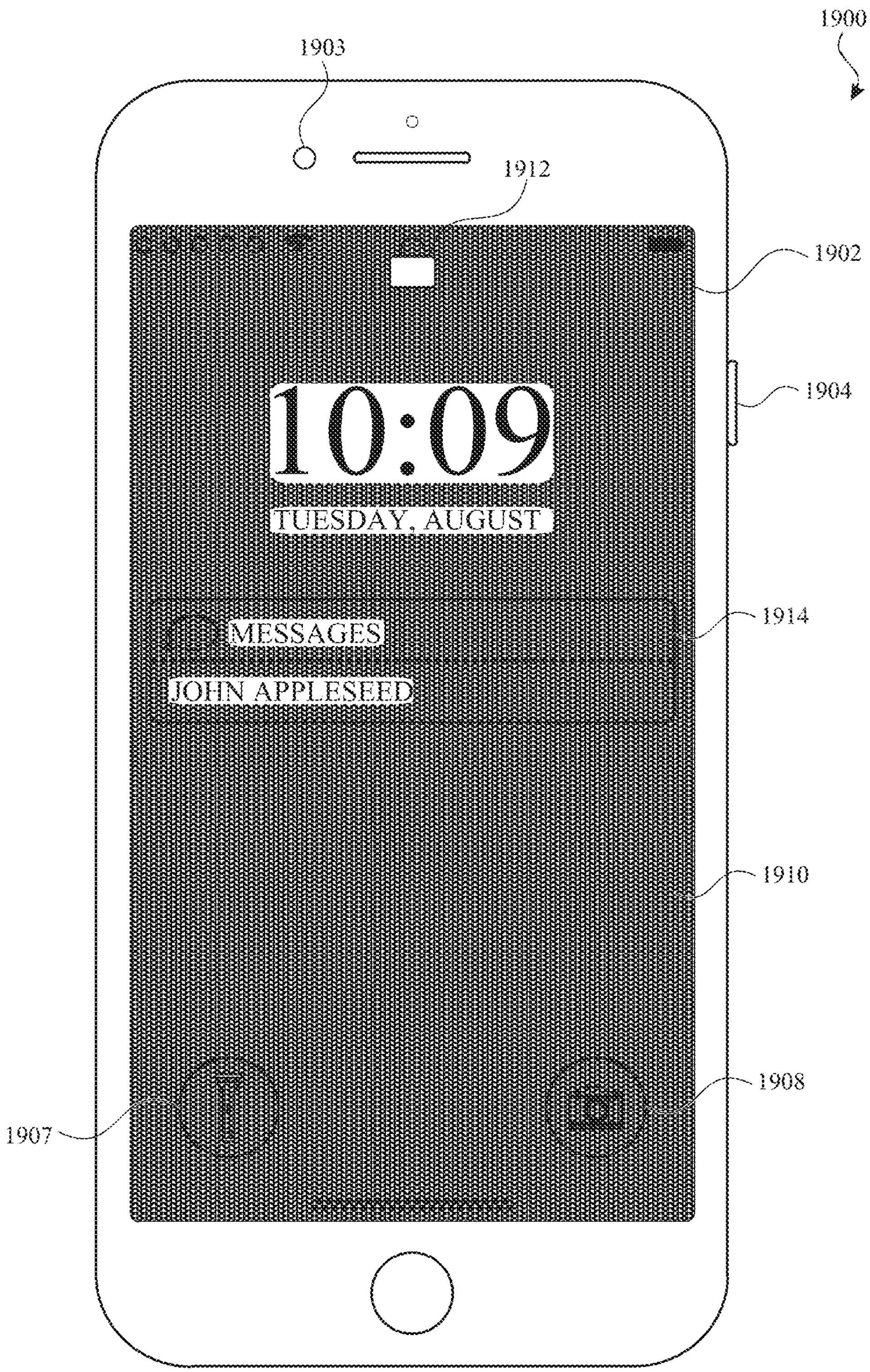
Figure 19D:
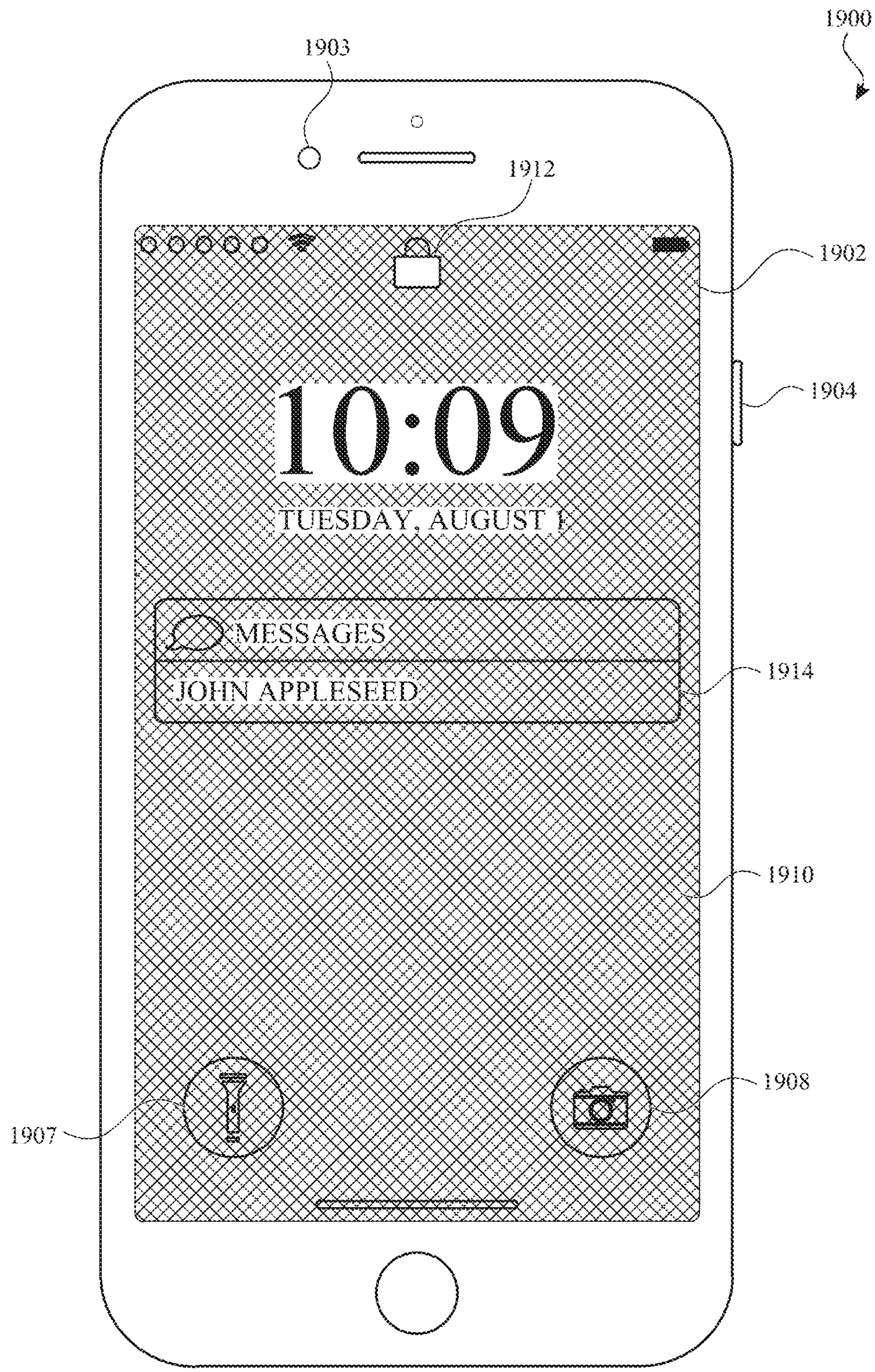

In FIG. 19A, the electronic device wakes from a low power (e.g., display-off) state. As illustrated, in some examples, the electronic device 1900 wakes in response to a lift gesture 1906 performed by a user. With reference to FIGS. 19B-D, in response to the lift gesture 1906, the electronic device 1900 transitions from the low power state to a moderate power state (e.g., display-dimmed). For example, in FIG. 19B, the display 1902 of the electronic device 1900 is disabled, and in response to the lift gesture 1906, the electronic device 1900 gradually increases brightness of the display 1902 over a predetermined period of time as shown in FIGS. 19C-D. In some examples, the brightness of the display 1902 is increased according to a function, such as a linear function. In some examples, when biometric authentication (e.g., facial recognition authentication) is enabled, the device immediately locks when a hardware button (e.g., the Sleep/Wake button) is pressed and, in some examples, the device locks every time it transitions to sleep mode.

With reference to FIGS. 19C-D, in some examples, while transitioning to and/or operating in a moderate power state (e.g., a state in which the display is on, but not at full operational brightness), the electronic device displays a locked interface 1910. The locked interface includes for instance, a locked state indicator 1912, and optionally, one or more notifications 1914. As shown, the notification 1914 is a message notification associated with a messaging application indicating that the electronic device has received a new message from a contact stored on the electronic device ("John Appleseed"). In some examples, the moderate power state is a locked state. Accordingly, while operating in the moderate power state, the electronic device 1900 operates in a secured manner. By way of example, while operating in the moderate power state, the electronic device does not display contents of the message associated with the notification 1914. In some examples, the locked state further corresponds to restrictions on access to other data (including other applications) and/or limitations on permissible inputs.

In some examples, the electronic device 1900 further displays a flashlight affordance 1907 and a camera affordance 1908. In some examples, activation of the flashlight affordance 1907 causes the electronic device to load a flashlight application. In some examples, activation of the camera affordance 1908 causes the electronic device 1900 to load a camera application.

In some examples, after (e.g., in response to) transitioning to the moderate power state, the electronic device 1900 initiates biometric authentication (e.g., facial recognition authentication). In some examples, initiating biometric authentication includes obtaining (e.g., capturing with the one or more biometric sensors) data corresponding to at least a portion of the biometric feature of a user. In some examples, when a face (of the user) is detected, the biometric authentication confirms (the user's) attention and intent to unlock by detecting that the user's eyes are open and directed at the device.

Figure 19E:
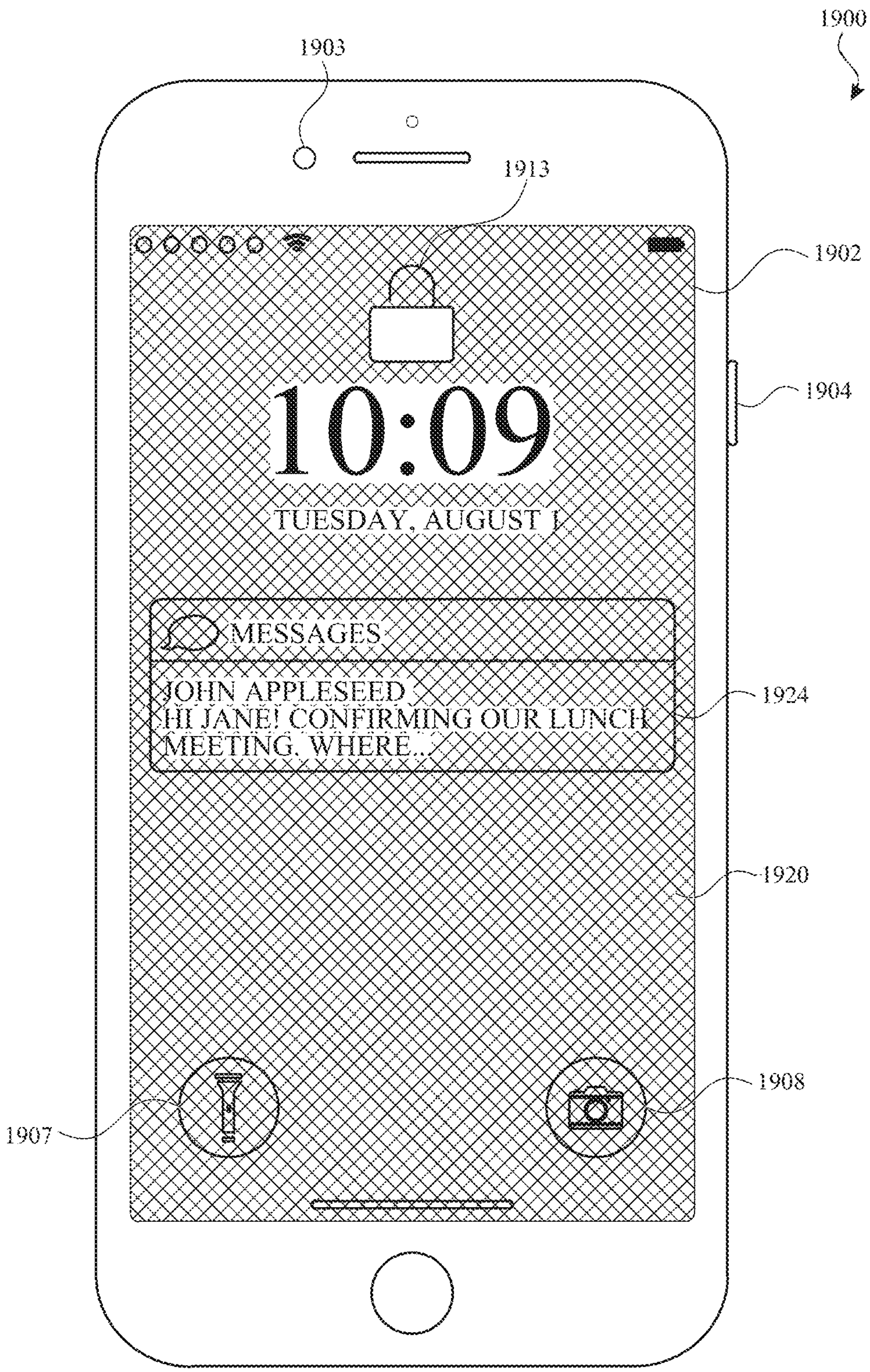
Figure 19F:
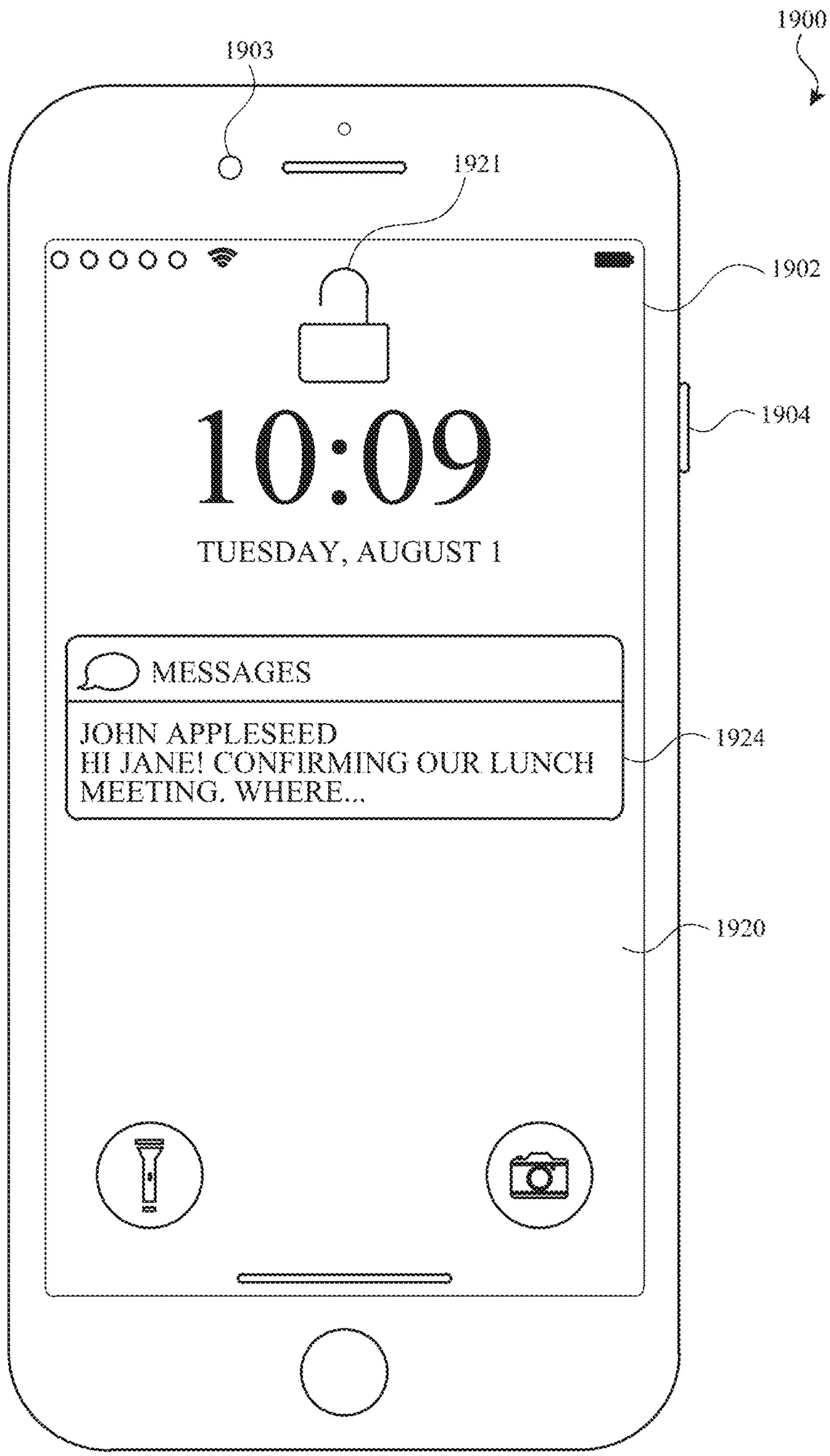
Figure 19G:
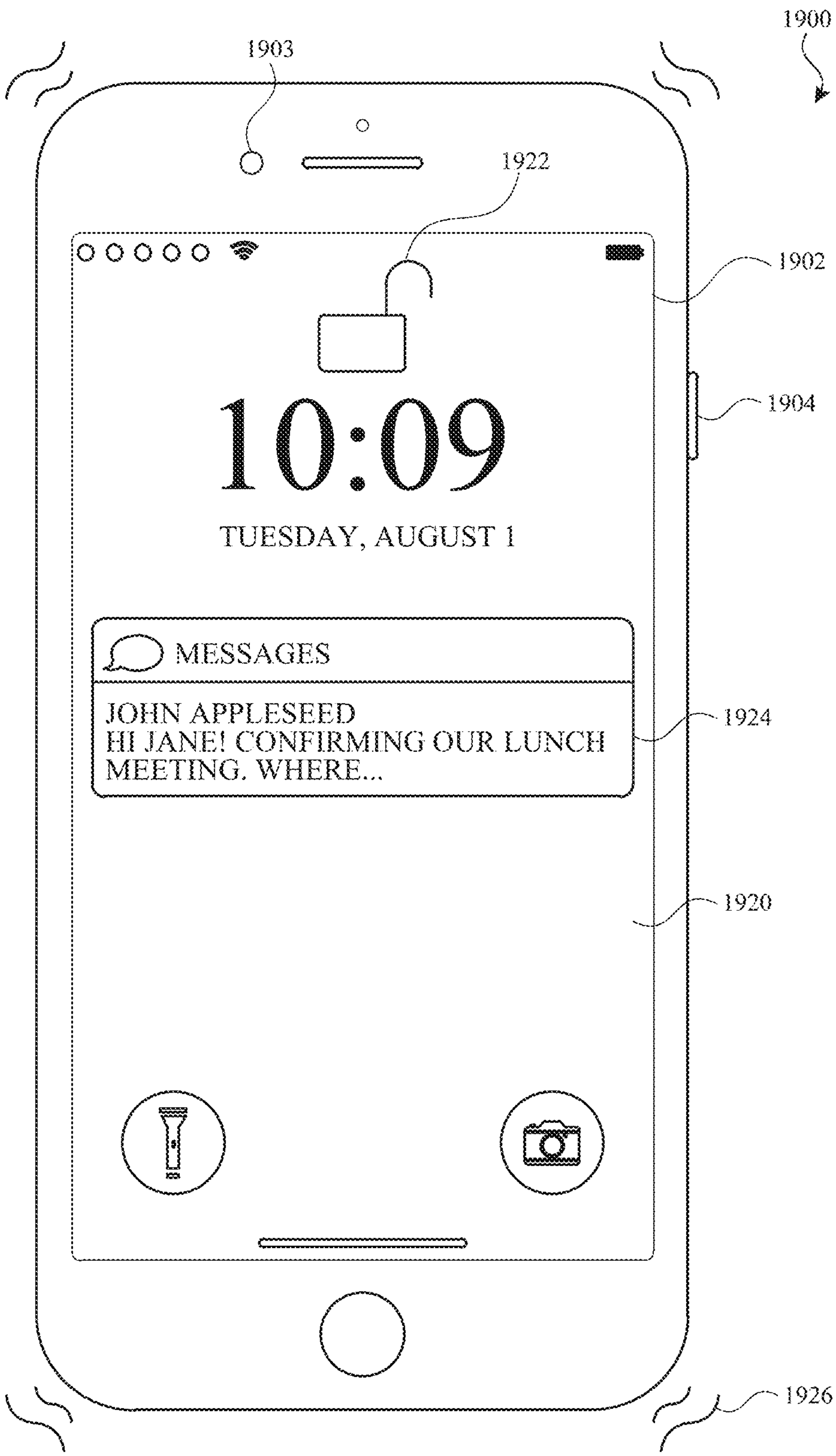
Figure 19H:
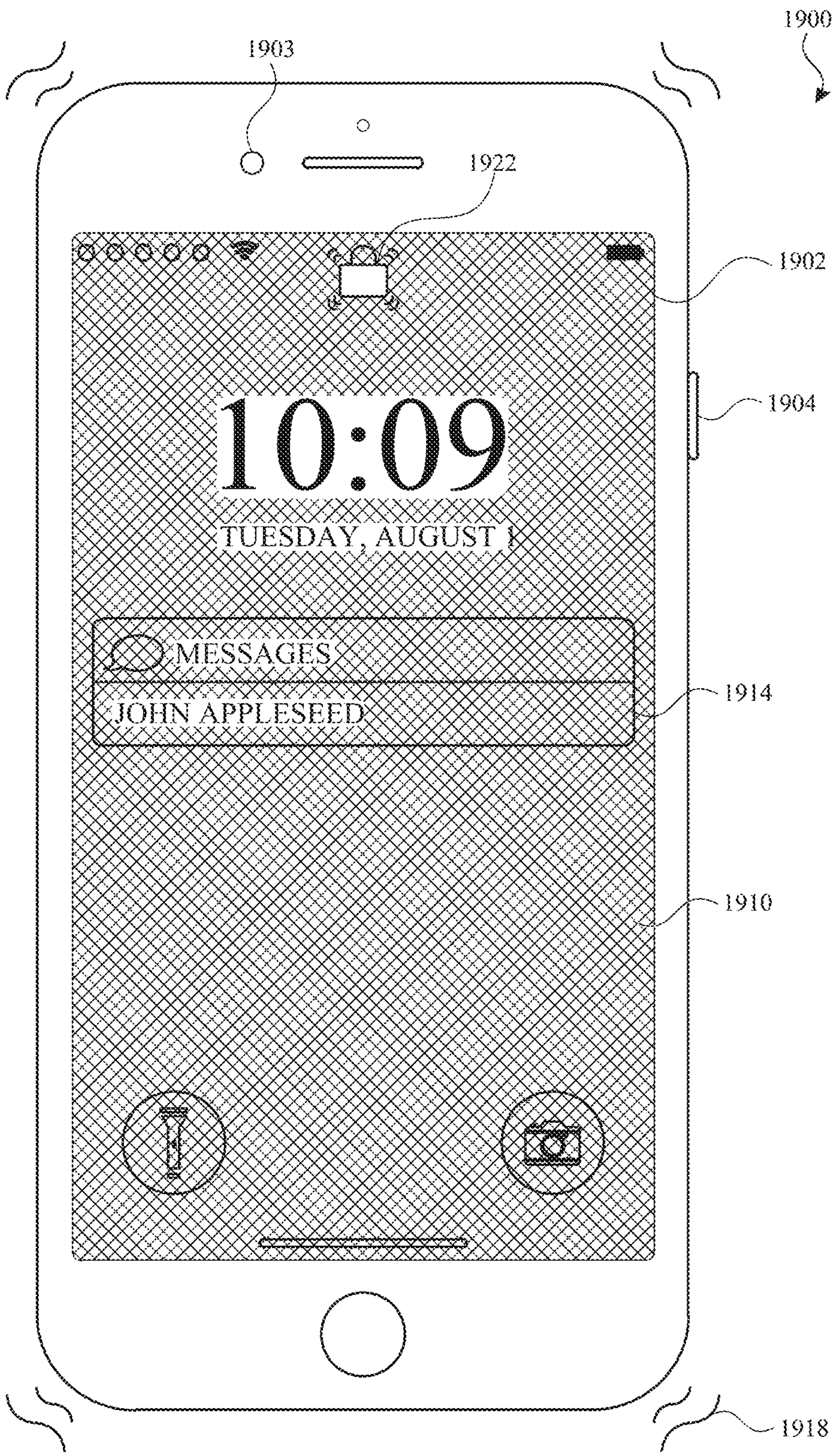

With reference to FIGS. 19E-G, if the electronic device 1900 determines that the biometric authentication is successful, the electronic device transitions from the moderate power state to a high-power state (e.g., display not dimmed). For example, in FIG. 19D, the display the electronic device 1900 is in the moderate power state, and in response to successful biometric authentication, the electronic device 1900 gradually increases brightness of the display 1902 over a predetermined period of time, as shown in FIGS. 19E-G. In some examples, the brightness of the display 1902 is increased according to a function, such as a linear function.

In some examples, while transitioning from the moderate power state to the high-power state, the electronic device 1900 displays an unlocked interface 1920. In some examples, while displaying the unlocked interface 1920, the electronic device displays an animation indicating that the electronic device is transitioning to the high-power state. As illustrated in FIGS. 19E-G, while transitioning, the electronic device displays an animation in which the locked state 1912 indicator transitions into an unlocked state indicator 1922 (FIG. 19G). In some examples, displaying the animation includes displacing and/or increasing the size of the locked state indicator 1912 to display the unlocked state indicator 1913 (FIG. 19E), and raising and rotating a latch of the unlocked state indicator to display the unlocked state indicators 1921 (FIG. 19F) and 1922 (FIG. 19G), respectively. In some examples, a degree of blurring of one or more objects of the locked state interface 1910 and/or the unlocked state interface 1920 is changed during the animation. In some examples, the electronic device 1900 further outputs a tactile output 1926 while, or in response, to transitioning to the high-power state (FIG. 19G).

In some examples, the high-power state is an unlocked state. Accordingly, while operating in the high-power state, the electronic device 1900 operates in an unsecured manner (e.g., secured data is accessible to the authenticated user). By way of example, as illustrated in FIG. 19G, while operating in the high-power state, the electronic device displays contents of the message associated with the notification 1914.

In some examples, to improve unlock performance and keep pace with the natural changes of the user's face and look, the biometric authentication (e.g., facial recognition authentication) augments its stored mathematical representation over time. In some examples, upon a successful unlock, the biometric authentication optionally uses the newly calculated mathematical representation—if its quality is sufficient—for a finite number of additional unlocks before that data is discarded. In some examples, if the biometric authentication fails to recognize the user, but the match quality is higher than a certain threshold and the user immediately (e.g., within a predefined threshold amount of time) follows the failure by entering an alternative authentication (e.g., passcode, password, pattern, fingerprint), the device takes another capture of biometric data (e.g., via one or more cameras or other biometric sensors capturing facial recognition data) and augments its enrolled biometric authentication (e.g., facial recognition authentication) data with the newly calculated mathematical representation. In some examples, this new biometric authentication (e.g., facial recognition authentication) data is, optionally, discarded after a finite number of unlocks and if the user stop matching against it. These augmentation processes allow biometric authentication (e.g., facial recognition authentication) to keep up with dramatic changes in the user's facial hair or makeup use, while minimizing false acceptance.

With reference to FIGS. 19E-G, if the electronic device 1900 determines that the biometric authentication was unsuccessful, the electronic device 1900 does not transition to the high-power state, and in some examples remains in the moderate power state. In some examples, while the electronic device 1900 remains in the moderate power state, the electronic device 1900 remains in a locked state. To indicate that the biometric authentication failed, the electronic device 1900 simulates a shake of the locked state indicator 1912, for instance, by alternating a position of the locked state indicator 1912 between two positions on the locked state interface 1910. In some examples, the electronic device 1900 further outputs a tactile output 1918 to indicate that the biometric authentication was unsuccessful.

Figure 19I:
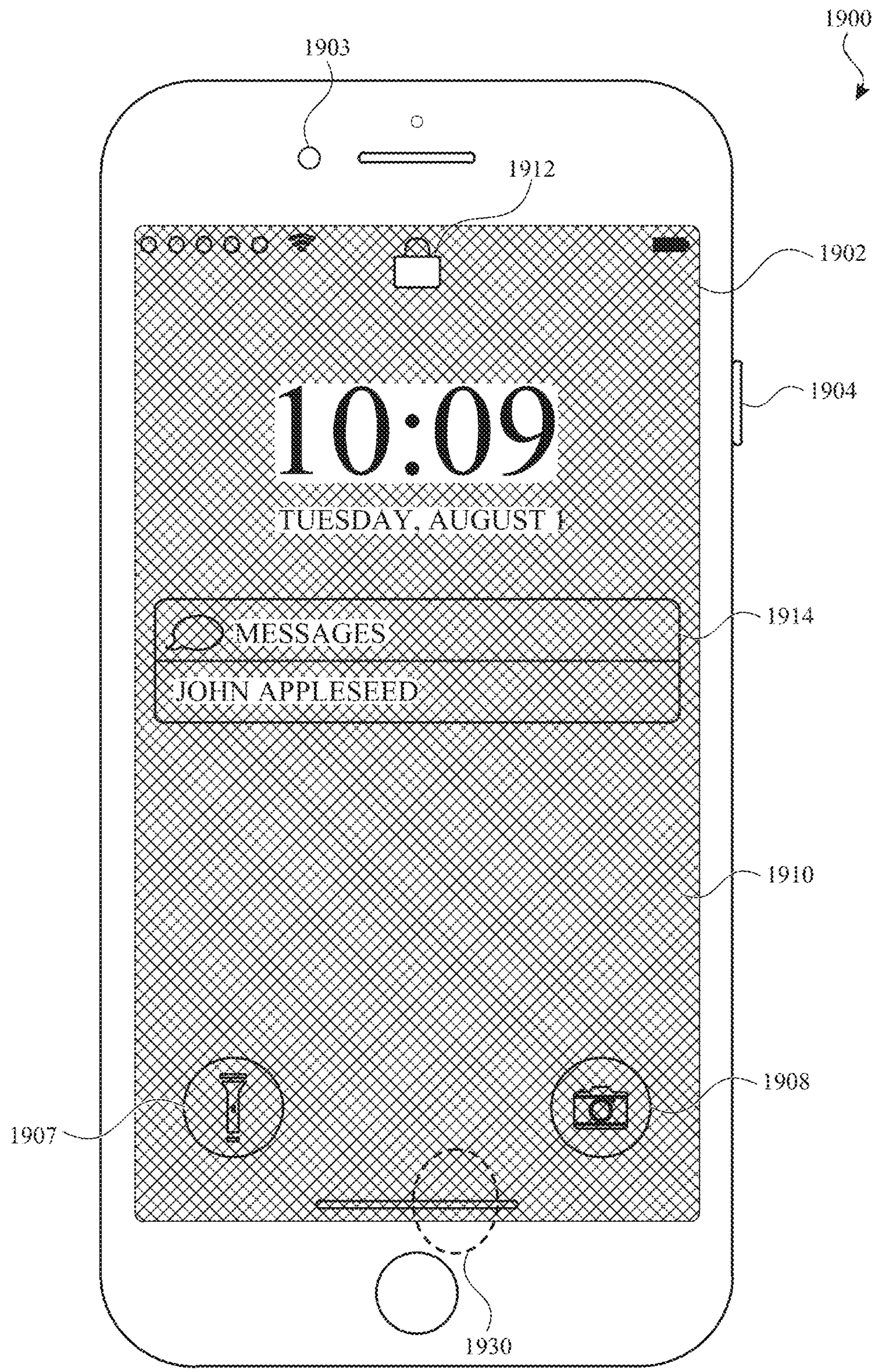
Figure 19J:
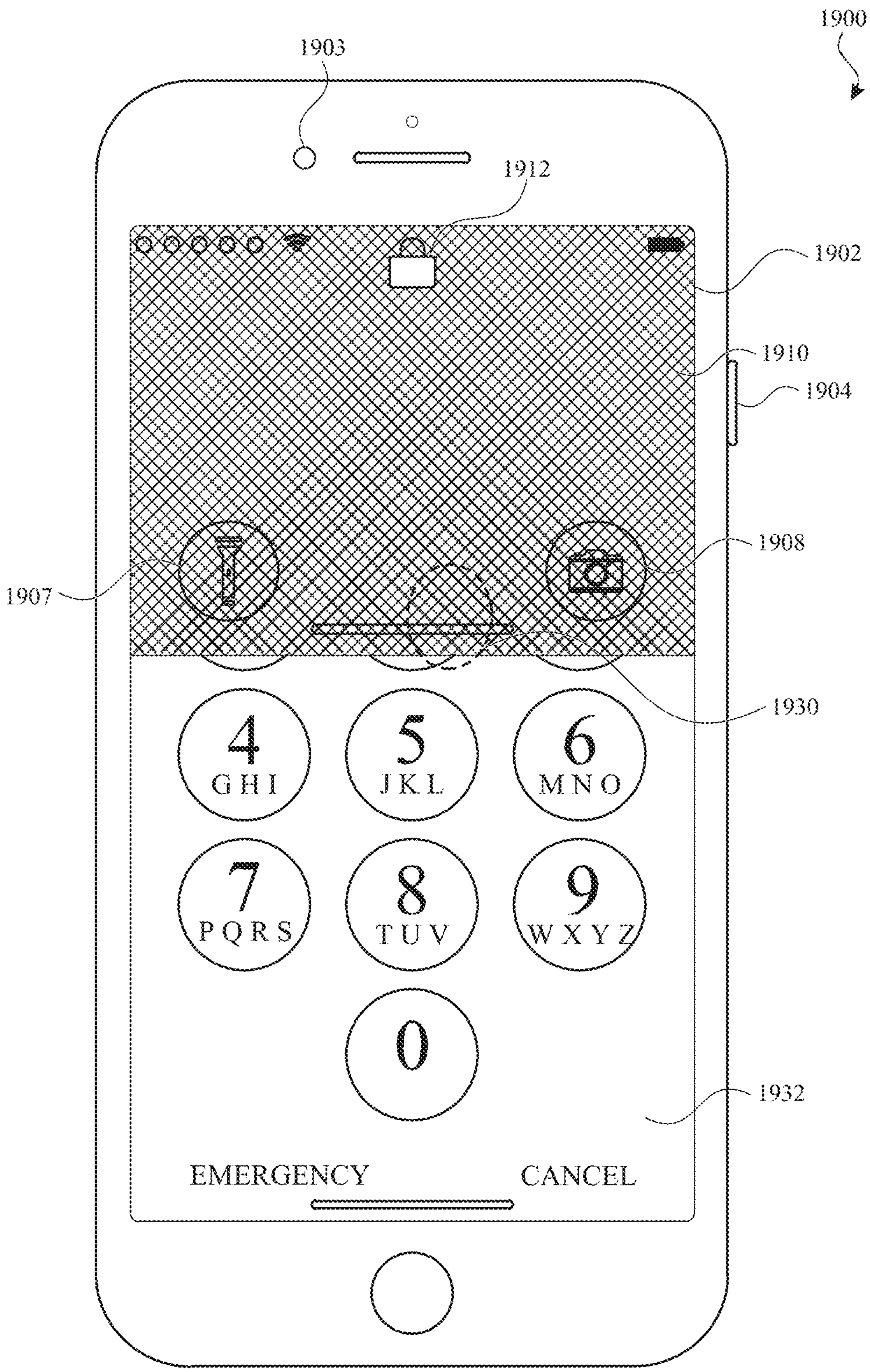
Figure 19K:
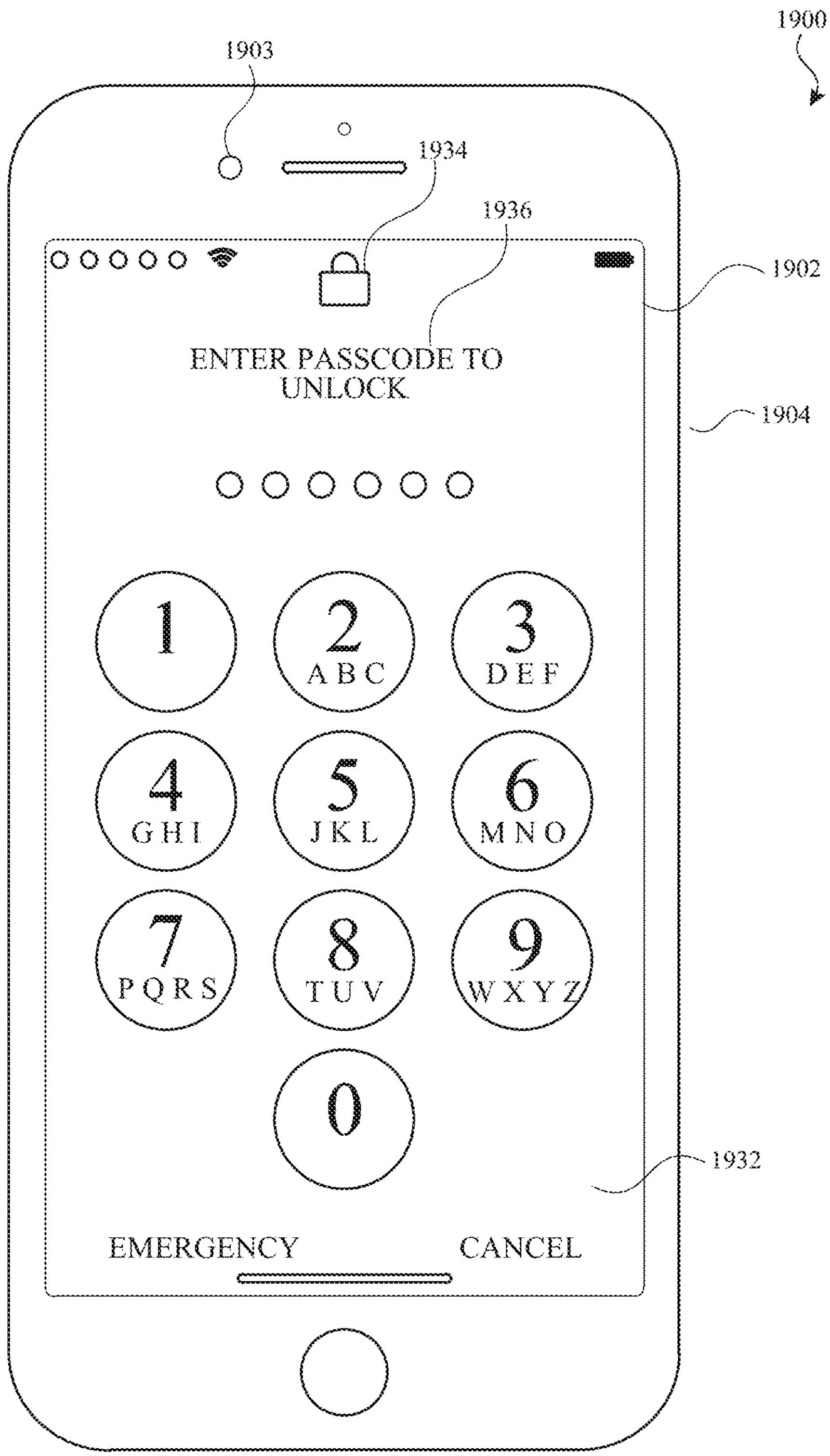

As described, while in the moderate power state, the electronic device 1900 is in a locked state, and as a result, secured data on the electronic device is not accessible while the electronic device is in the moderate power state. By way of example, in FIG. 19I, the electronic device detects a user input 1930 near an edge of the display 1902. As illustrated in FIGS. 19I-K, the user input 1930 is a swipe gesture that, in some examples, is a request to access a home screen interface of the electronic device 1900. However, because the electronic device 1900 is in the moderate power and locked state, in response to the swipe gesture, the electronic device 1900 slides the locked state interface 1910 in an upward direction to display (e.g., reveal) an alternative authentication interface 1932, with which the user authenticates using an alternative form of authentication than that associated with the biometric feature (e.g., password authentication). The alternative authentication interface 1932 includes a locked state indicator 1934 and a prompt 1936 indicating to the user that entering a valid passcode results in the electronic device 1900 being unlocked (and optionally, transitioned to the high-power state).

In some examples, the alternative form of authentication (e.g., passcode, password, or pattern) is required to unlock the device in certain circumstances. In some examples, the alternative form of authentication is required if the device has just been turned on or restarted. In some examples, the alternative form of authentication is required if the device has not been unlocked for more than a predetermined amount of time (e.g., 48 hours). In some examples, the alternative form of authentication is required if the alternative form of authentication has not been used to unlock the device in a predetermined amount of time (e.g., 156 hours). In some examples, the alternative form of authentication is required if the alternative form of authentication has not been used to unlock the device for a predetermined amount of time (e.g., six and a half days) and biometric authentication (e.g., facial recognition authentication) has not been used to unlock the device in a past predetermined amount of time (e.g., the last 4 hours). In some examples, the alternative form of authentication is required if the device has received a remote lock command. In some examples, the alternative form of authentication is required after five unsuccessful attempts to match a face (via facial recognition authentication) on the device. In some examples, the alternative form of authentication is required after initiating power off/Emergency SOS, and then canceling the power off/Emergency SOS, on the device.

Figure 19L:
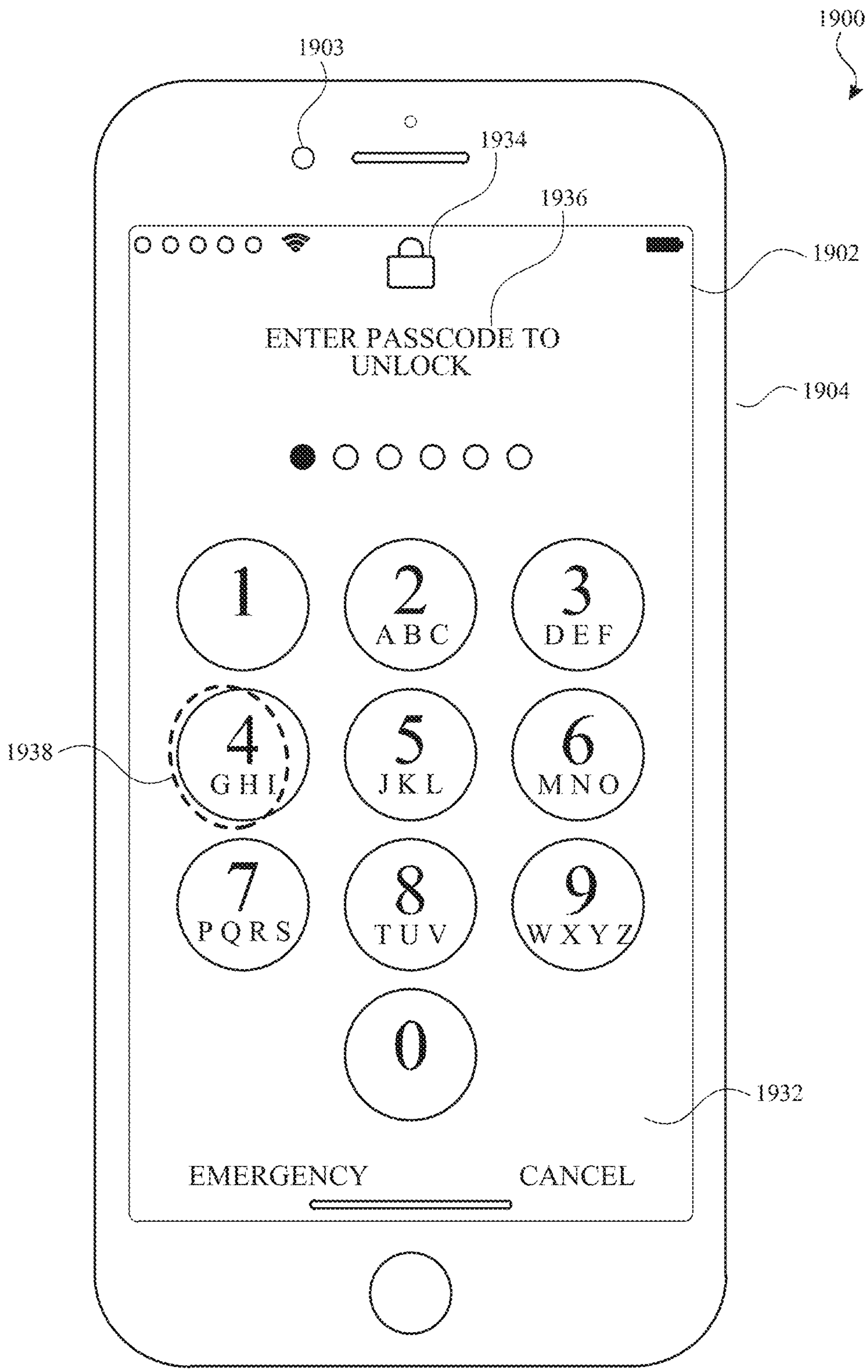
Figure 19M:
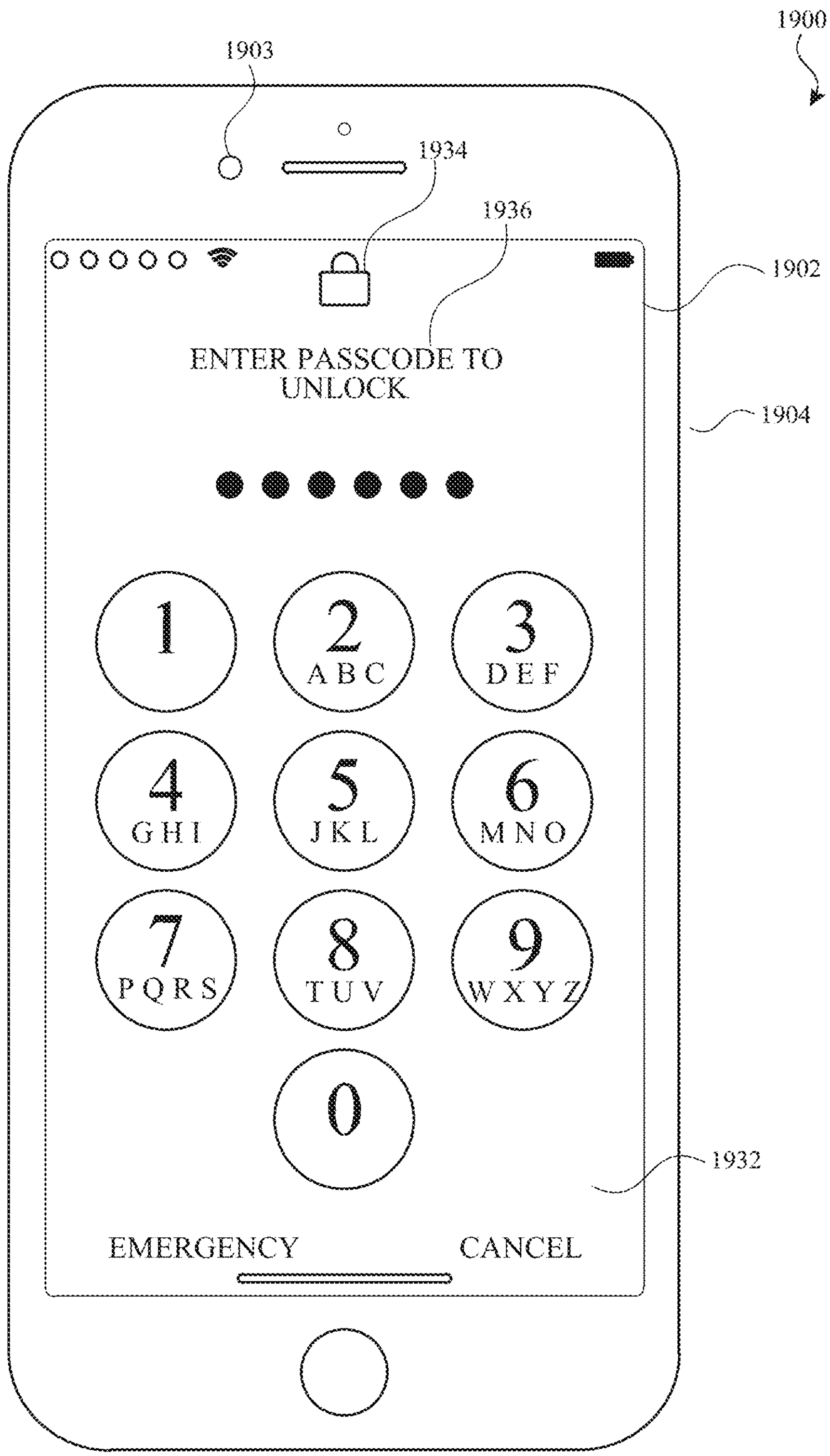
Figure 19N:
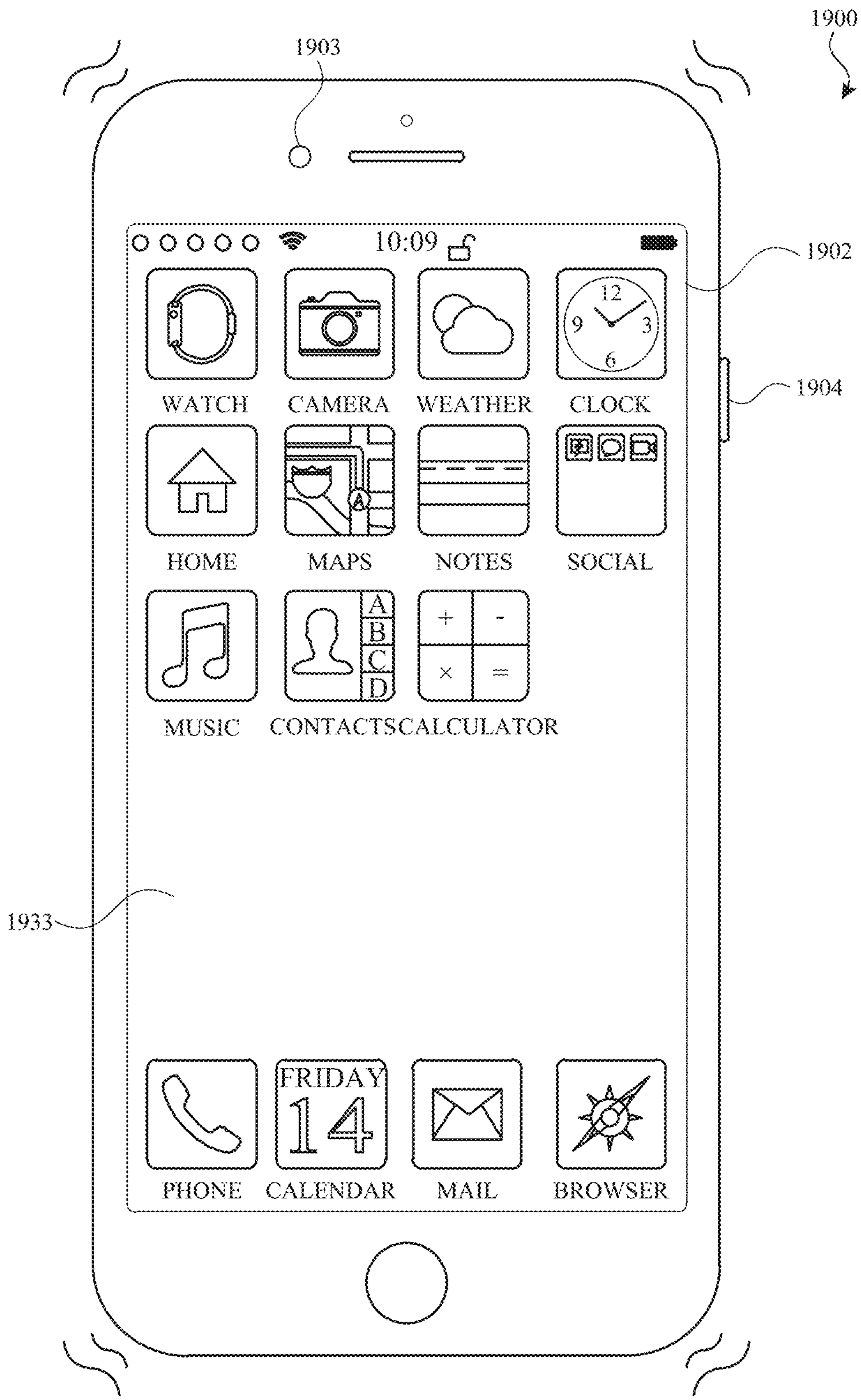

With reference to FIGS. 19L-19M, a valid passcode (or password) is received by the electronic device 1900, at least in part, in response to the tap gesture 1938 (FIG. 19L), and optionally, one or more other inputs indicating additional alphanumeric digits of the valid passcode. As shown in FIG. 19N, once a valid passcode has been received, the electronic device is unlocked and displays (e.g., replaces display of the alternative authentication interface with) the home screen interface 1933.

Figure 19O:
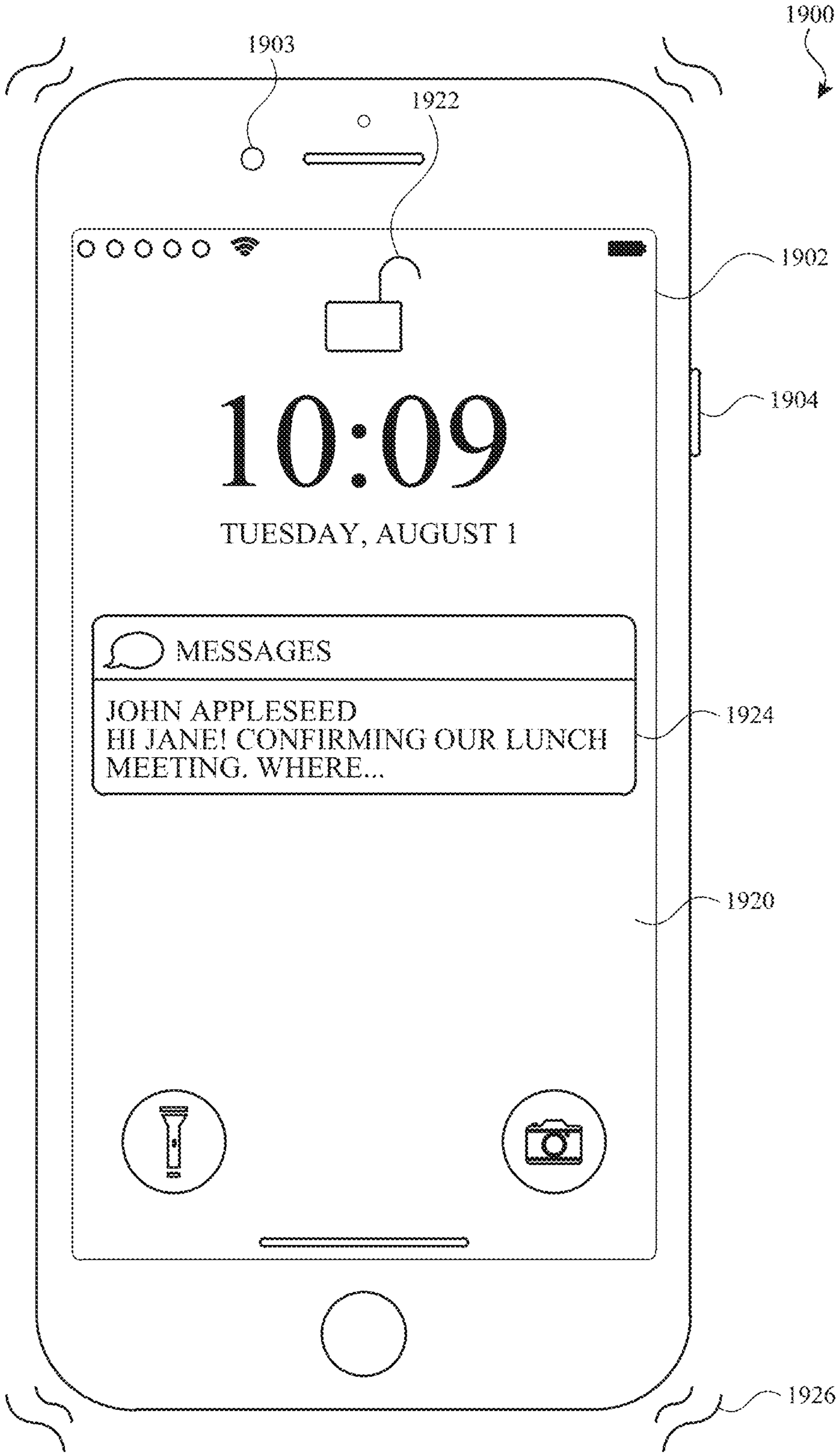
Figure 19P:
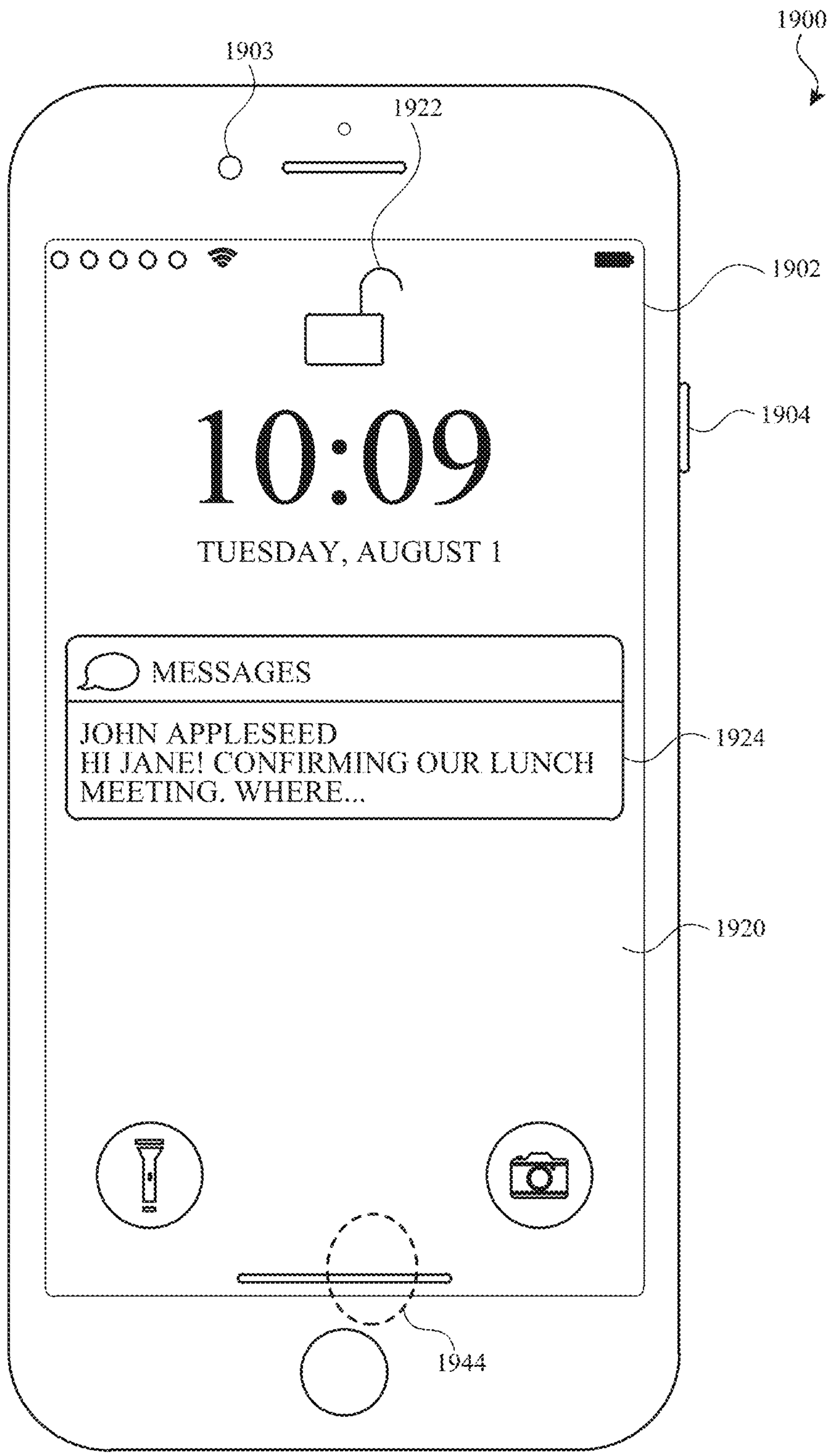
Figure 19Q:
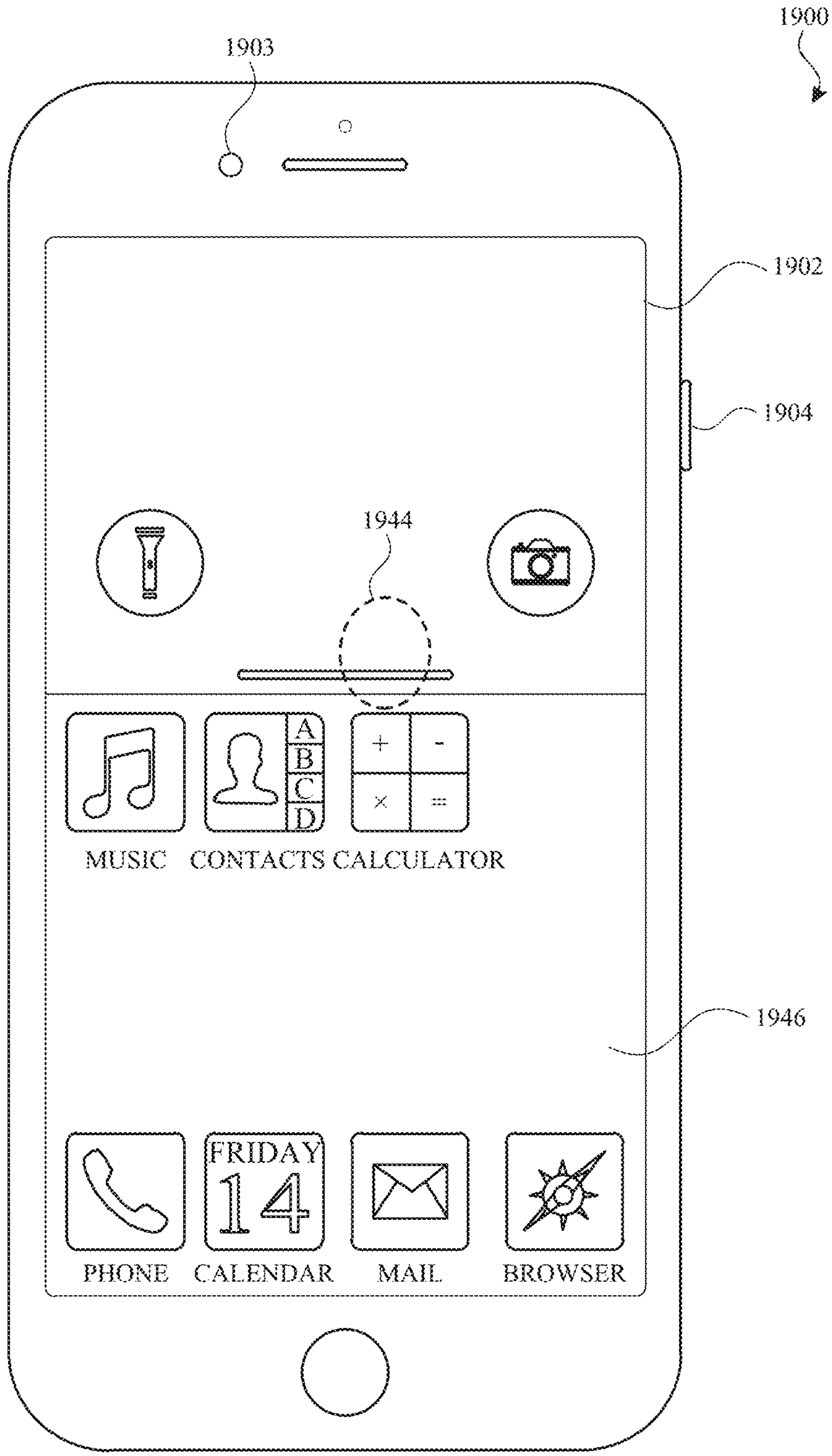
Figure 19R:
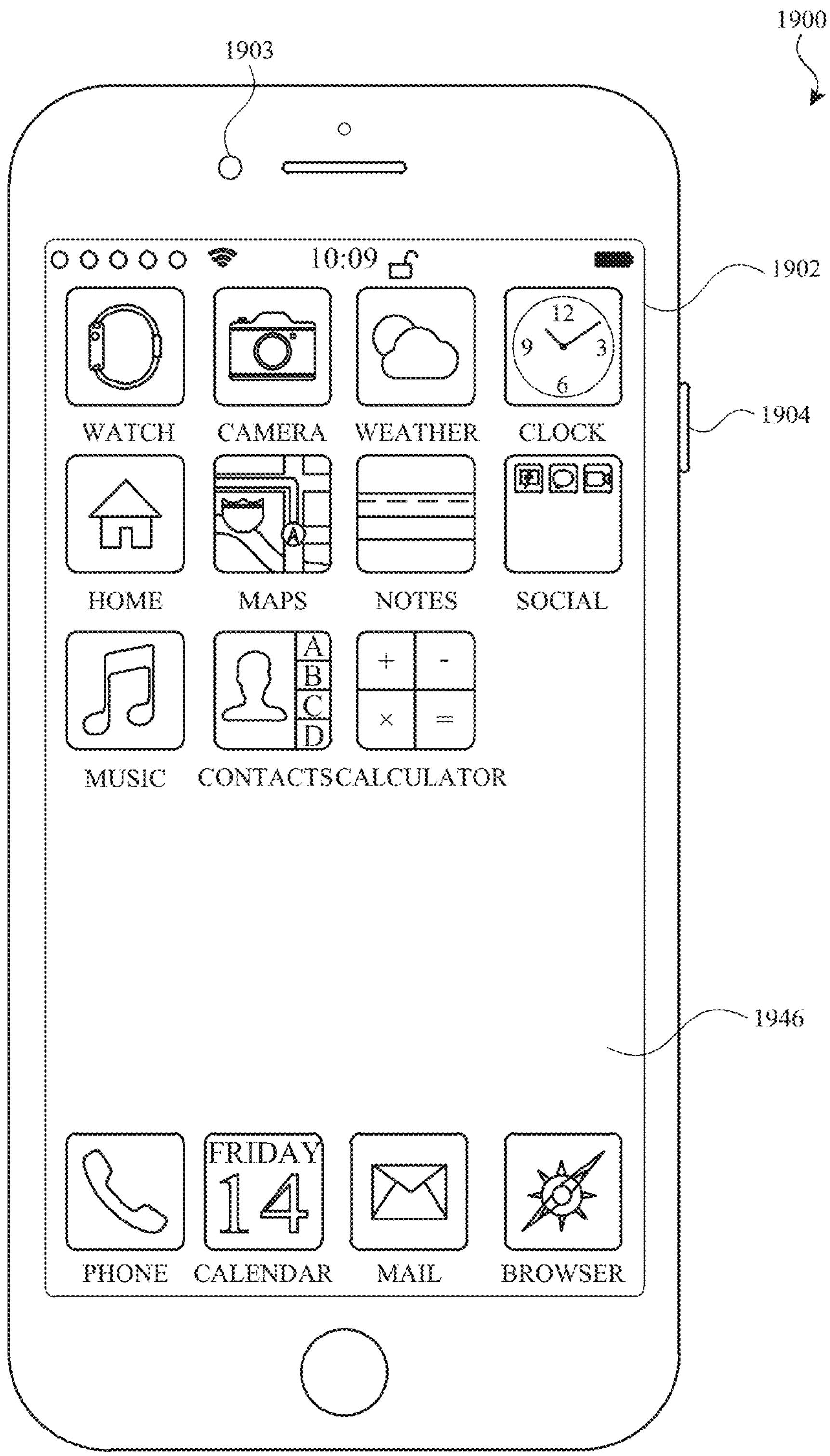

In FIGS. 19O-R, the device is operating in the high power (e.g., unlocked) state, and receives an input that is a request to access secured data on the electronic device 1900. By way of example, as shown in FIG. 19O, the electronic device 1900 is operating in the high-power state, and as illustrated in FIG. 19P receives a swipe gesture 1944 that is a request to access a home screen interface of the electronic device 1900. As further illustrated in FIGS. 19P-R, in response to the swipe gesture 1944, the electronic device 1900 slides the unlocked state interface 1920 in an upward direction to display (e.g., reveal) a home screen interface 1946.

Figure 19S:
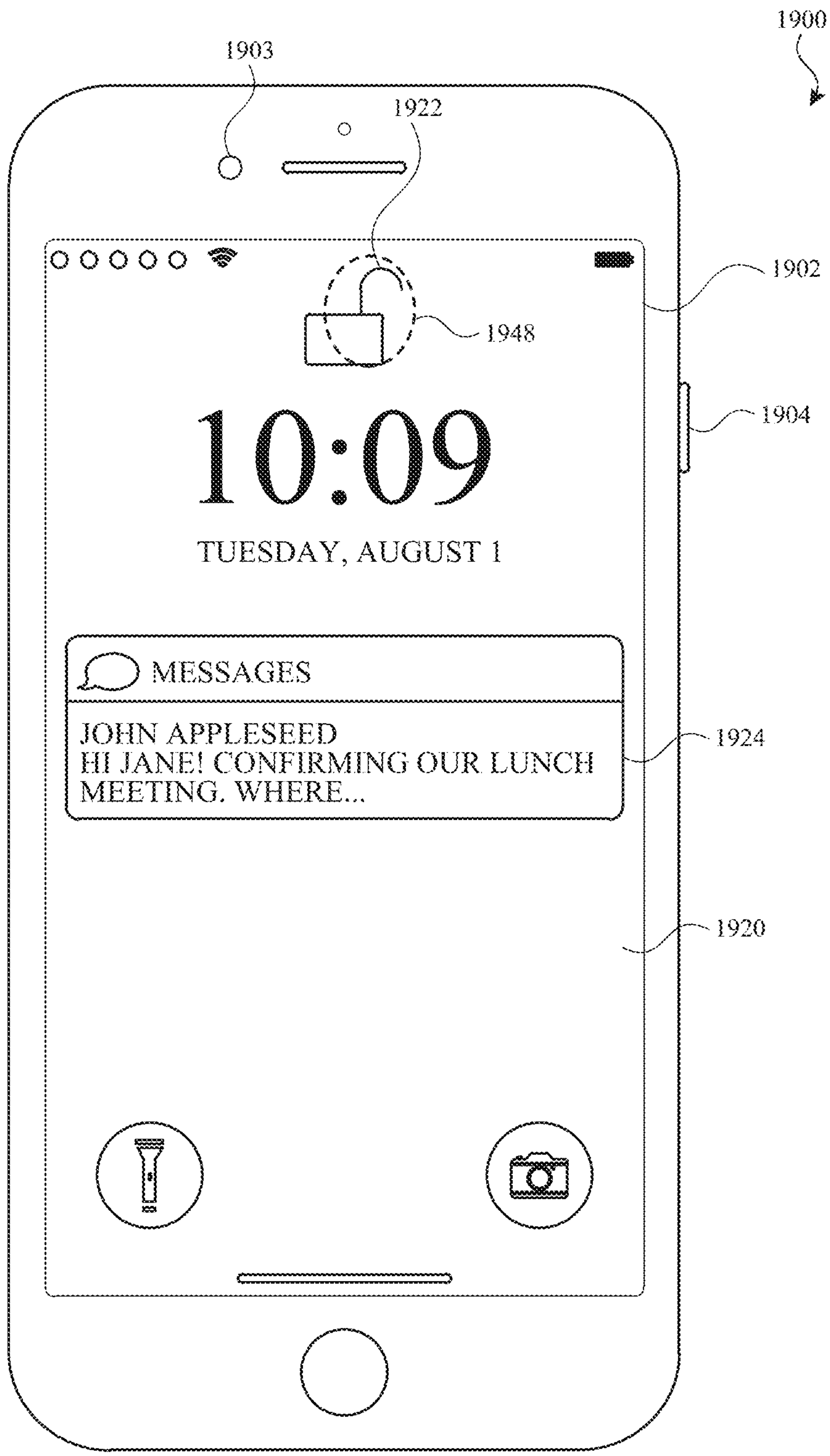
Figure 19T:
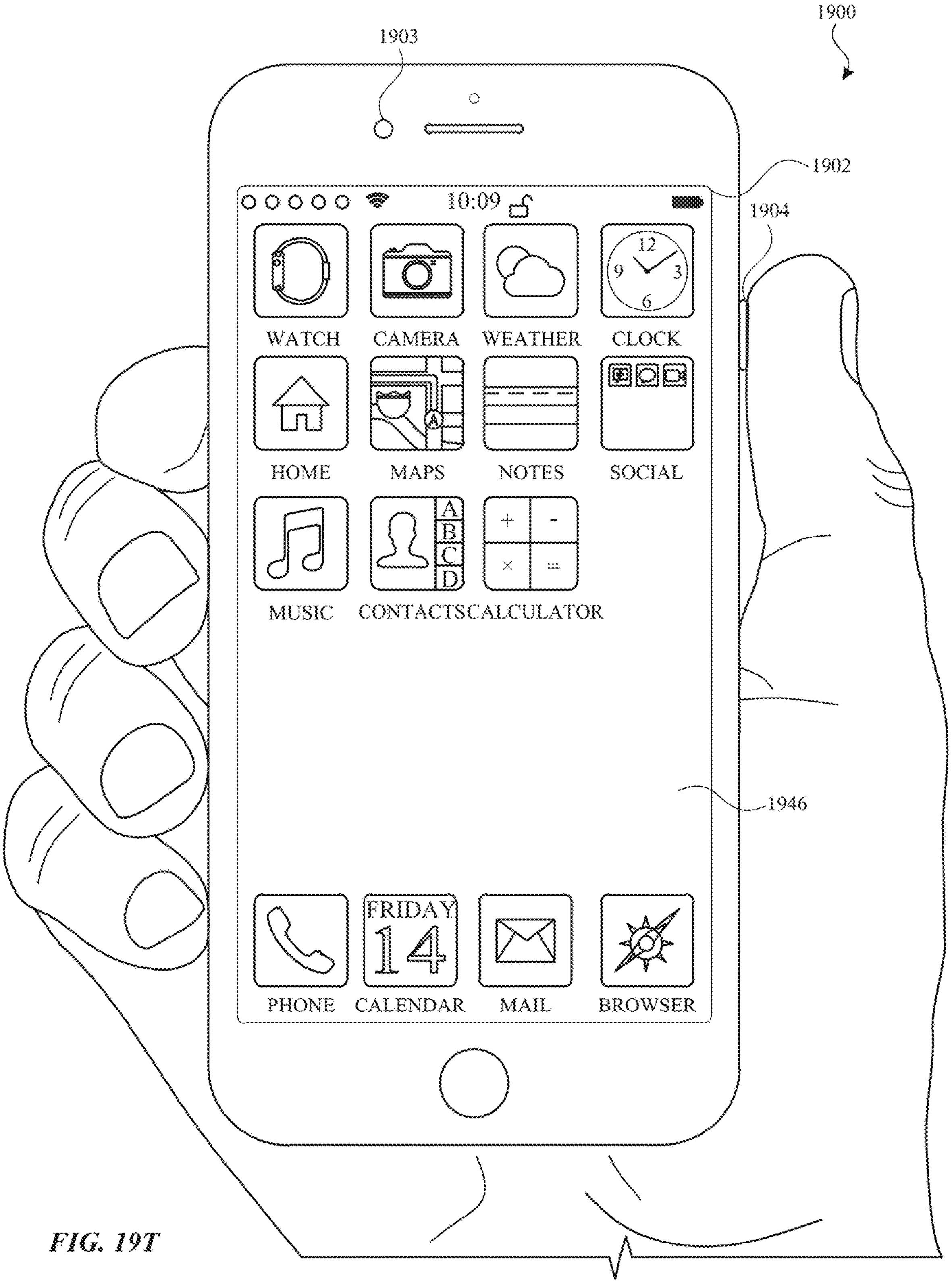
Figure 19U:
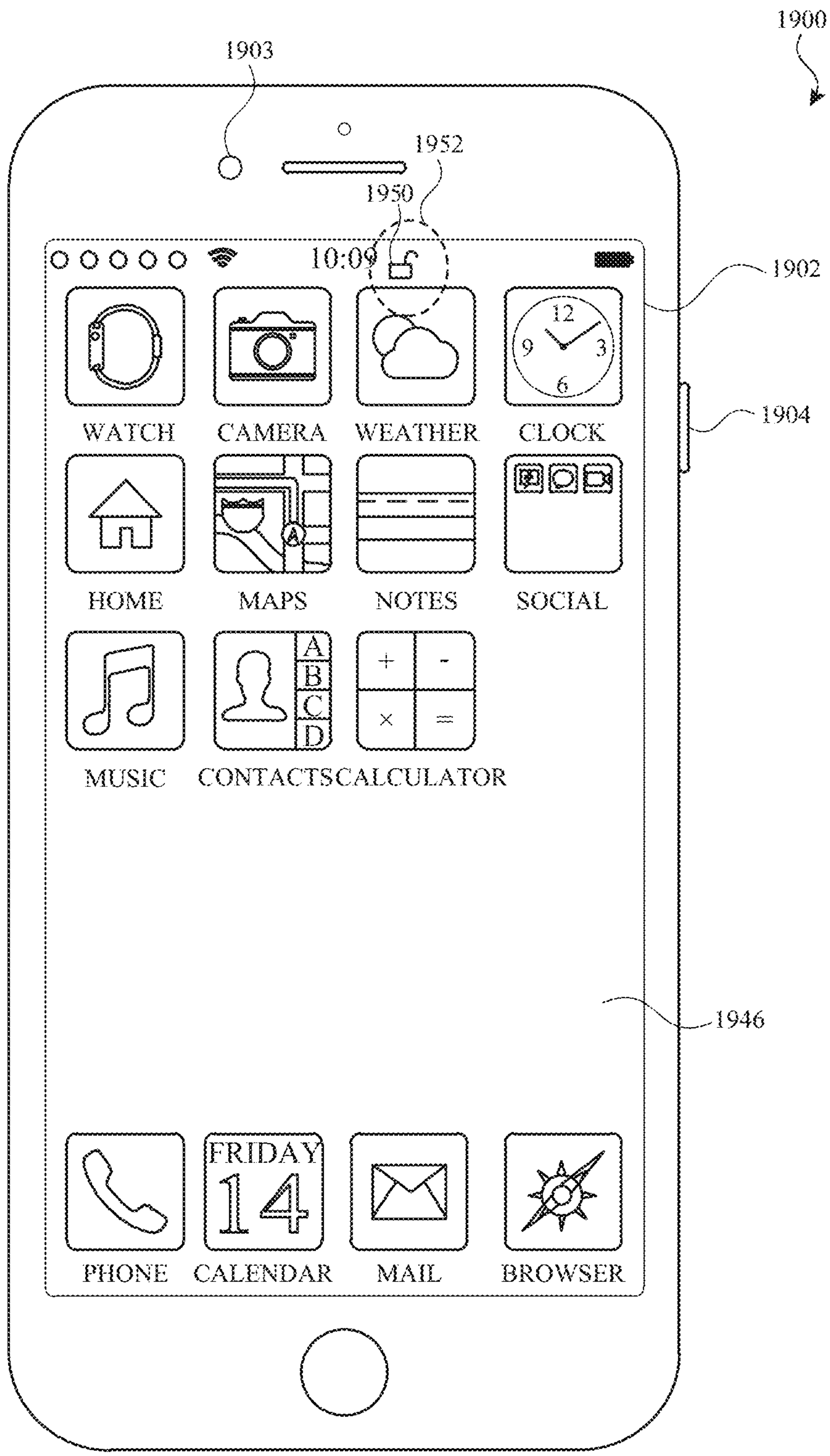
Figure 19V:
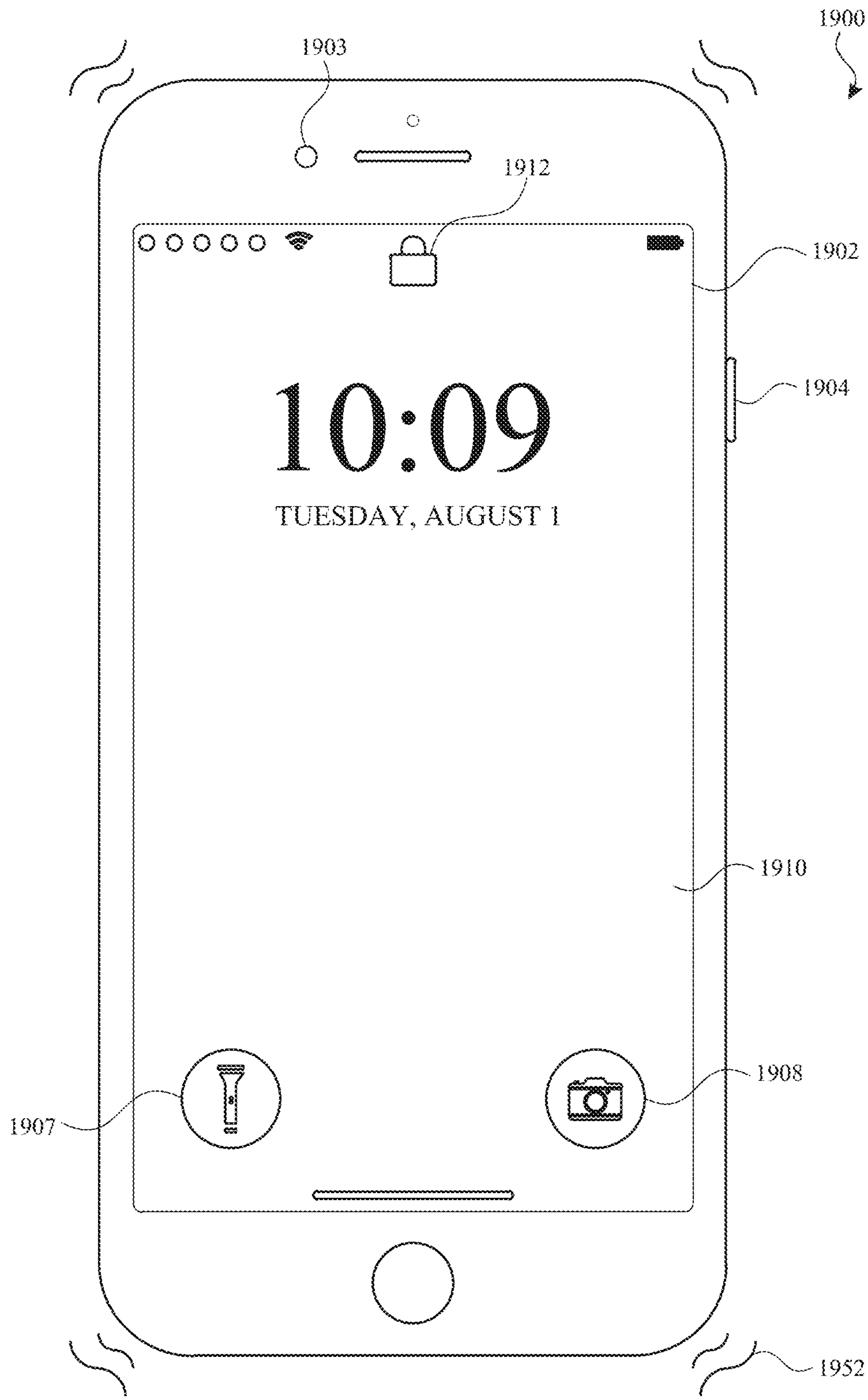

FIGS. 19S-U illustrate various ways in which the electronic device is transitioned from the high power (e.g., unlocked state) to a locked state, such as the moderate power state or the low power state. In FIG. 19S, while displaying the unlocked state interface 1920 (as described at least with respect to FIG. 19G), the electronic device 1900 receives activation of the unlocked state indicator 1922. Activation of the unlocked screen indicator 1922 is a tap gesture 1948 in some examples. As shown in FIG. 19V, in response to the activation of the unlocked state indicator 1922, the electronic device transitions to the moderate power state and, optionally, displays the locked state indicator 1912 and/or provides a tactile output 1952. In some examples, while transitioning to the moderate power state, the electronic device displays an animation indicating that the electronic device 1900 is transitioning to the moderate power state (or the low power state).

In FIG. 19T, while displaying the home screen interface 1946, and while in a high power, unlocked state, the electronic device 1900 receives activation of the button 1904. Activation of the button 1904, in some examples, is a press and/or depress of the button 1904. In response to the activation of the button 1904, the electronic device transitions to the low power state (as described at least with reference to FIG. 19B). In FIG. 19U, while displaying the home screen interface 1946, the electronic device 1900 receives activation of an unlocked screen indicator 1950 of the home screen interface 1946. Activation of the unlocked screen indicator 1922 is a tap gesture 1950 in some examples. In response to the activation of the unlocked state indicator 1922, the electronic device transitions to the moderate power state and, optionally, displays the locked state indicator 1910 (FIG. 19V).

Figure 19W:
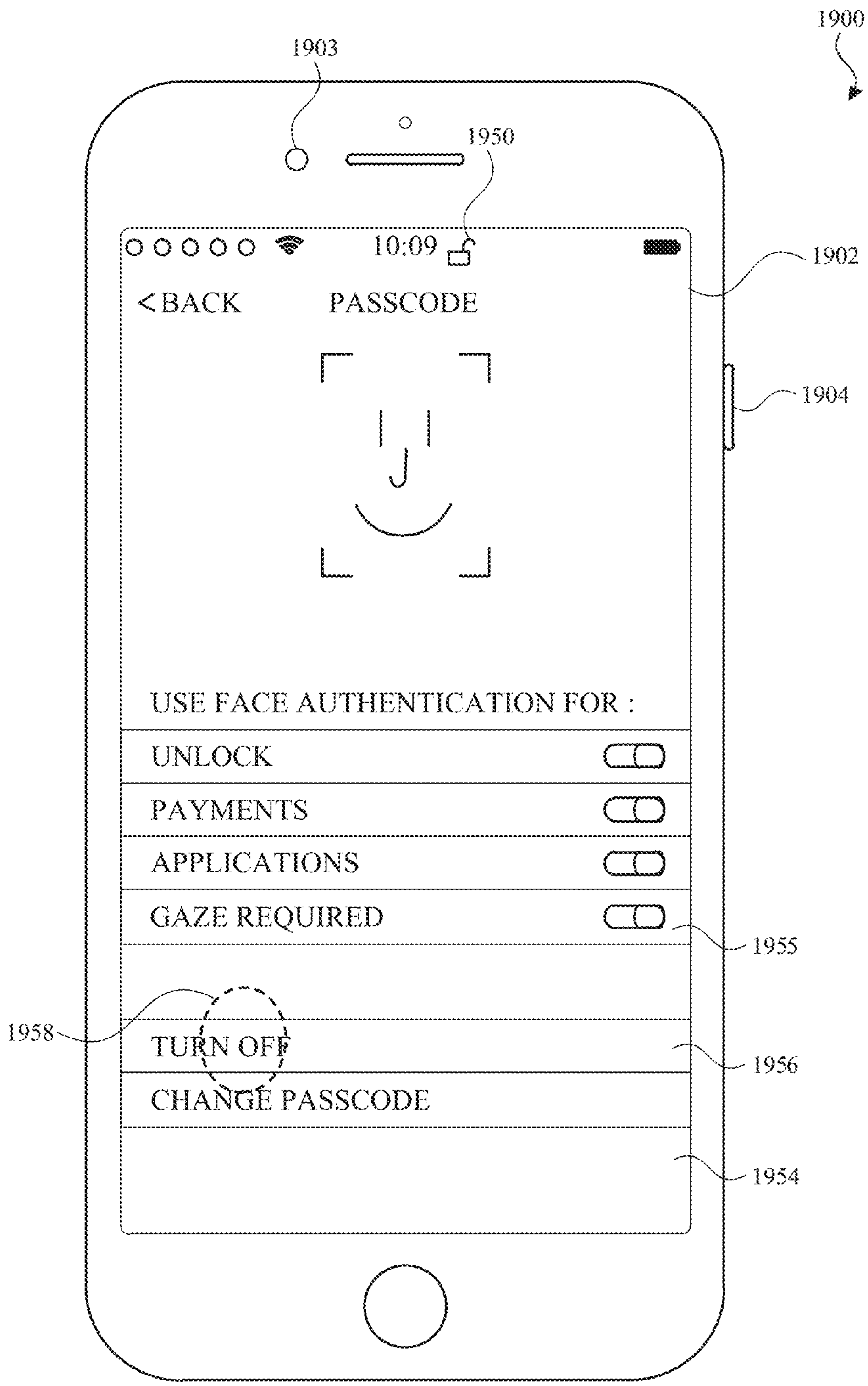

In FIG. 19W, the electronic device 1900 displays a device settings interface 1954. The device settings interface includes a gaze enablement setting 1955, which, when enabled, requires the user to be looking at the device for successful biometric authentication. When the setting is disabled, biometric authentication can be successful even if the authorized user is not looking at the device. The device settings interface 1954 further includes a biometric authentication enablement setting 1956, which, when enabled, enables biometric authentication on the electronic device 1900. When the biometric authentication enablement setting 1956 is disabled, biometric authentication is not available on the electronic device 1900.

Figure 19X:
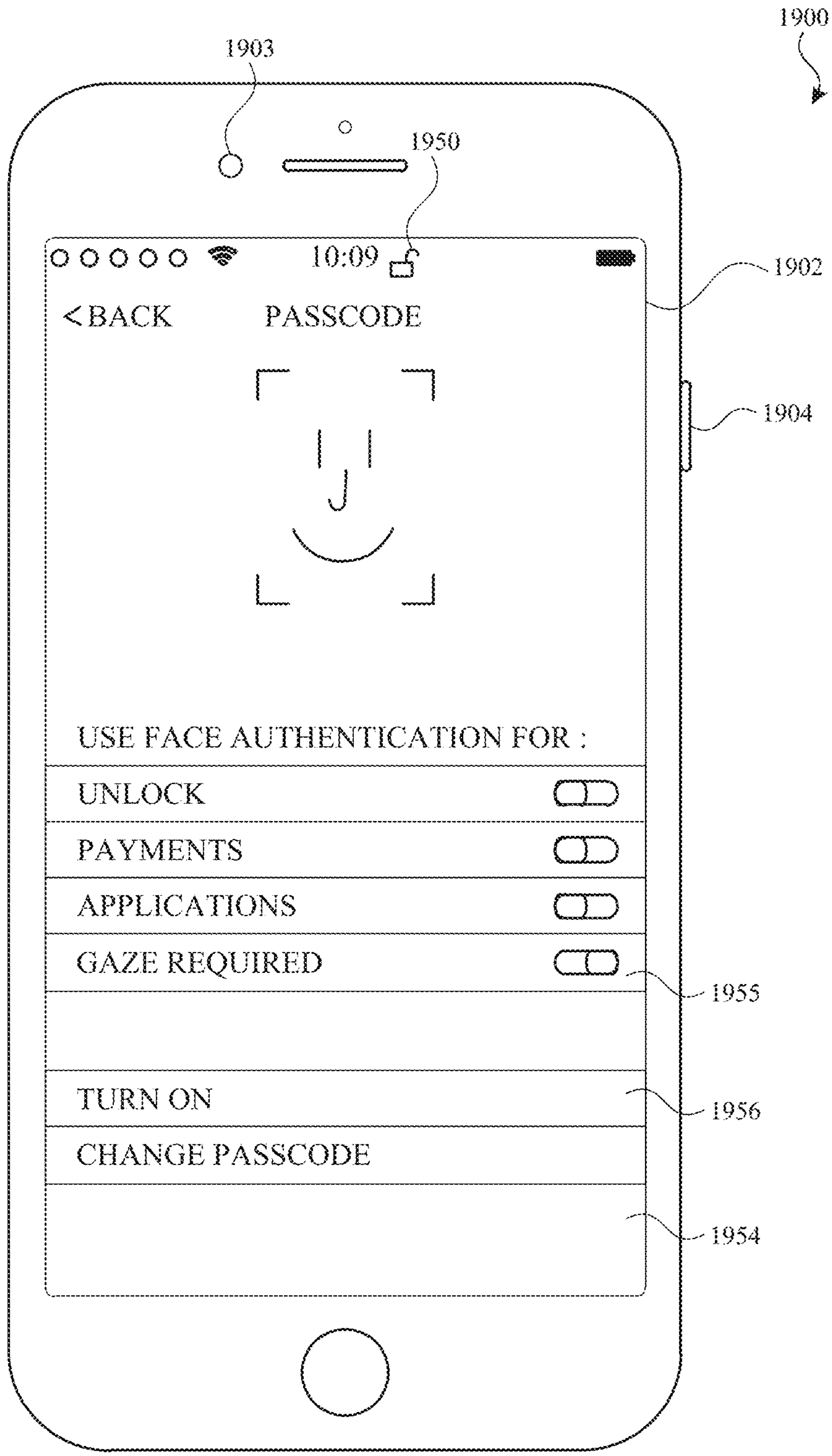
Figure 19Y:
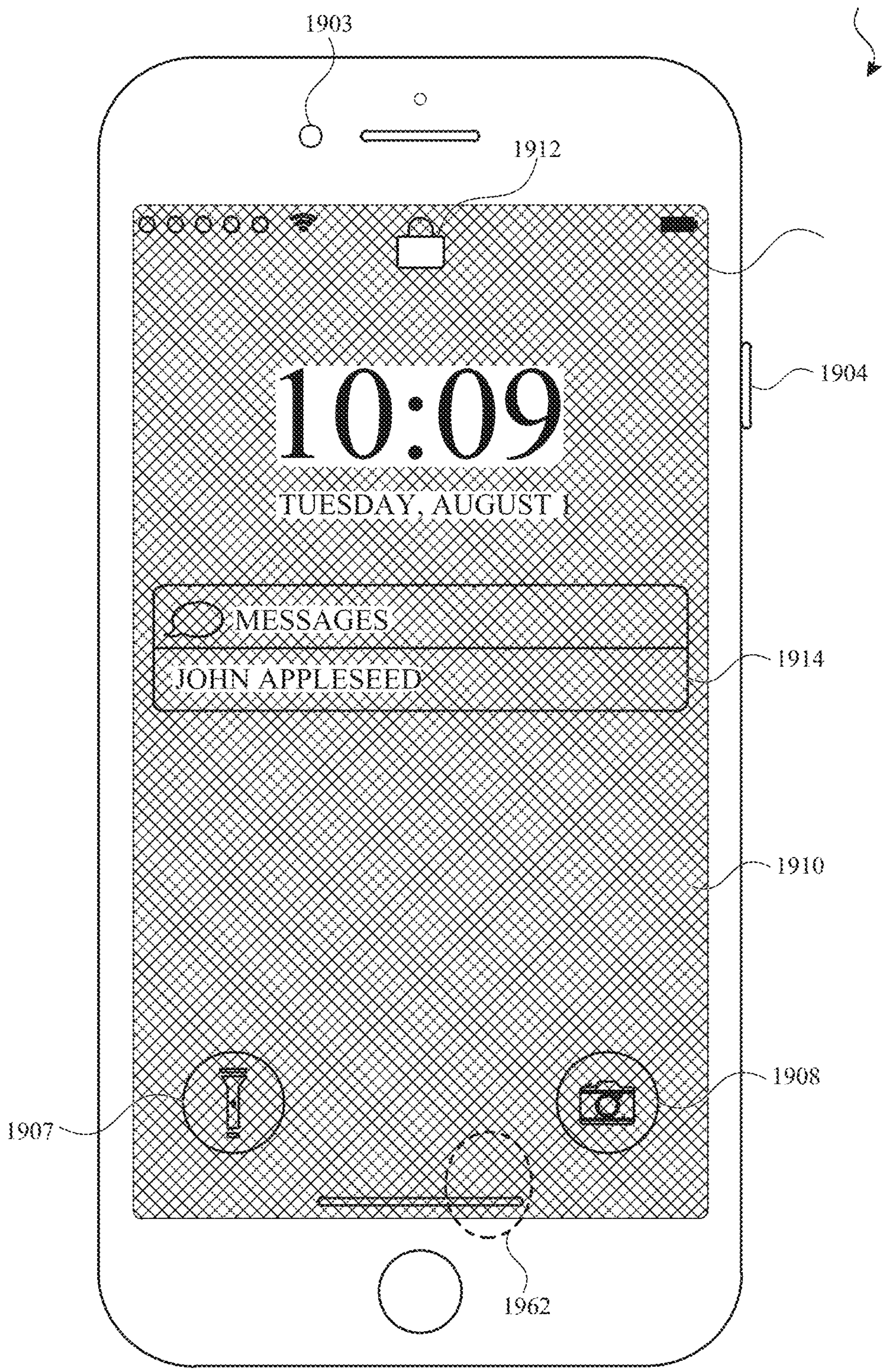
Figure 19Z:
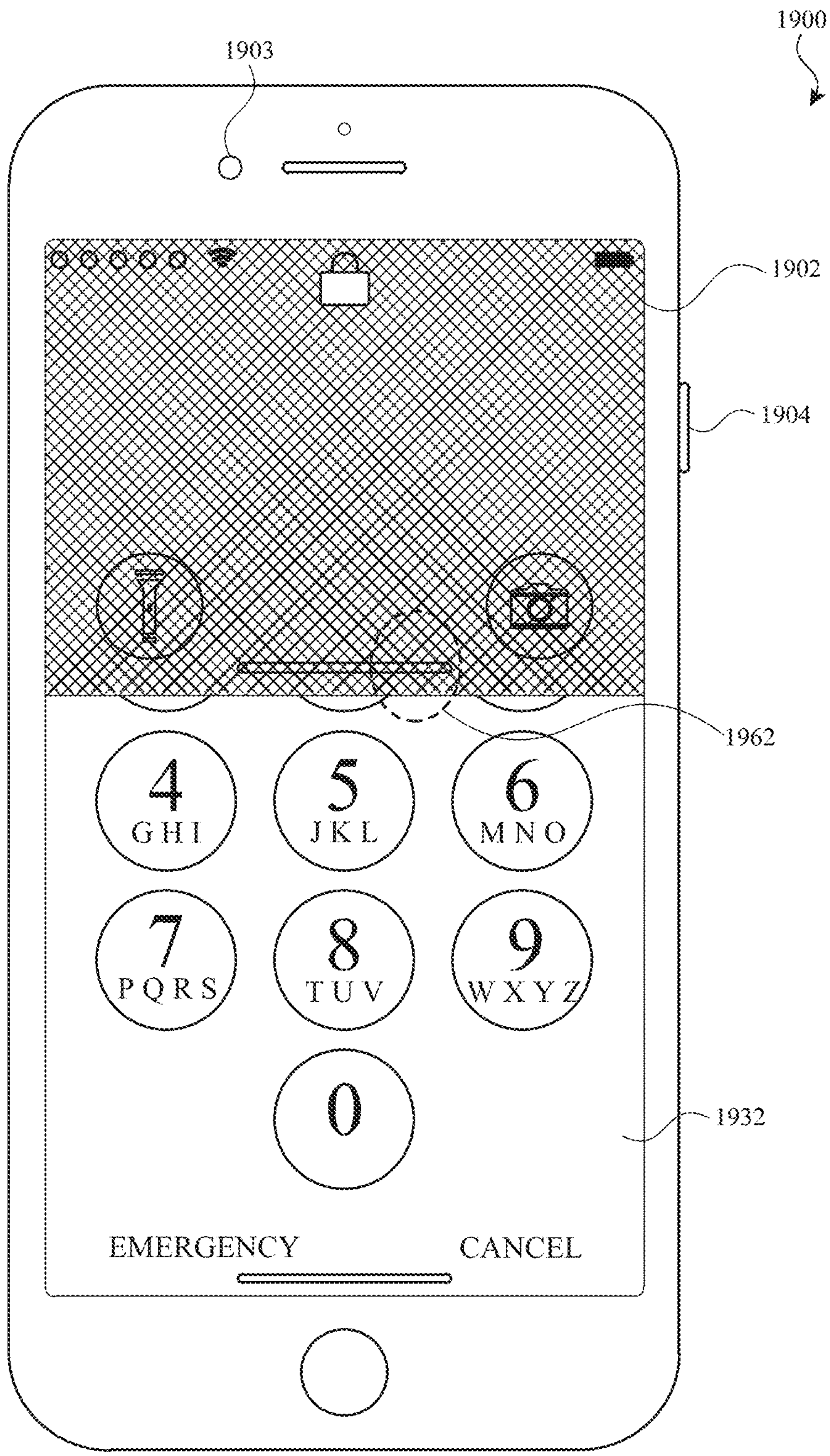
Figure 19A:
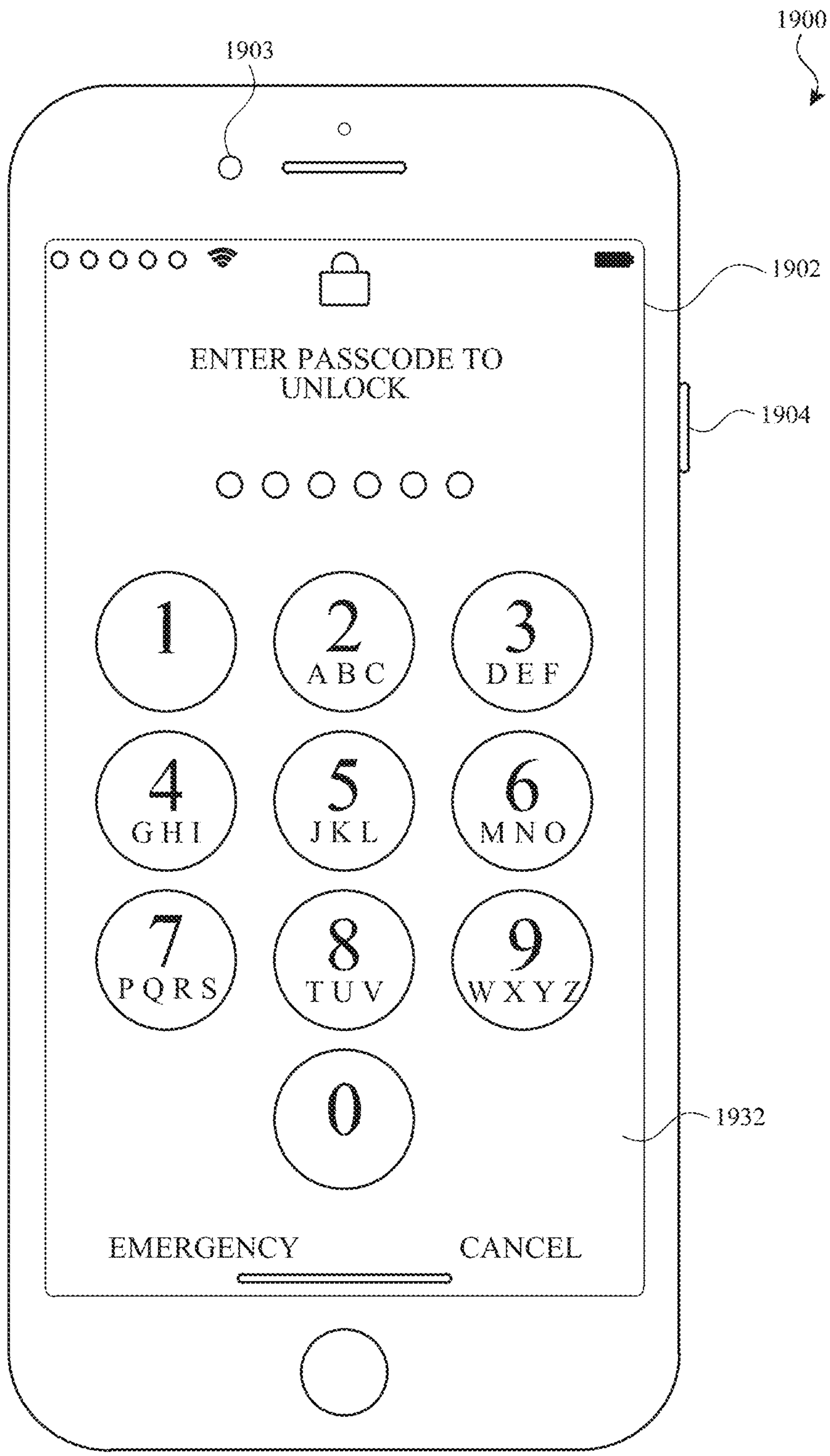
Figure 19A:
Figure 20A:
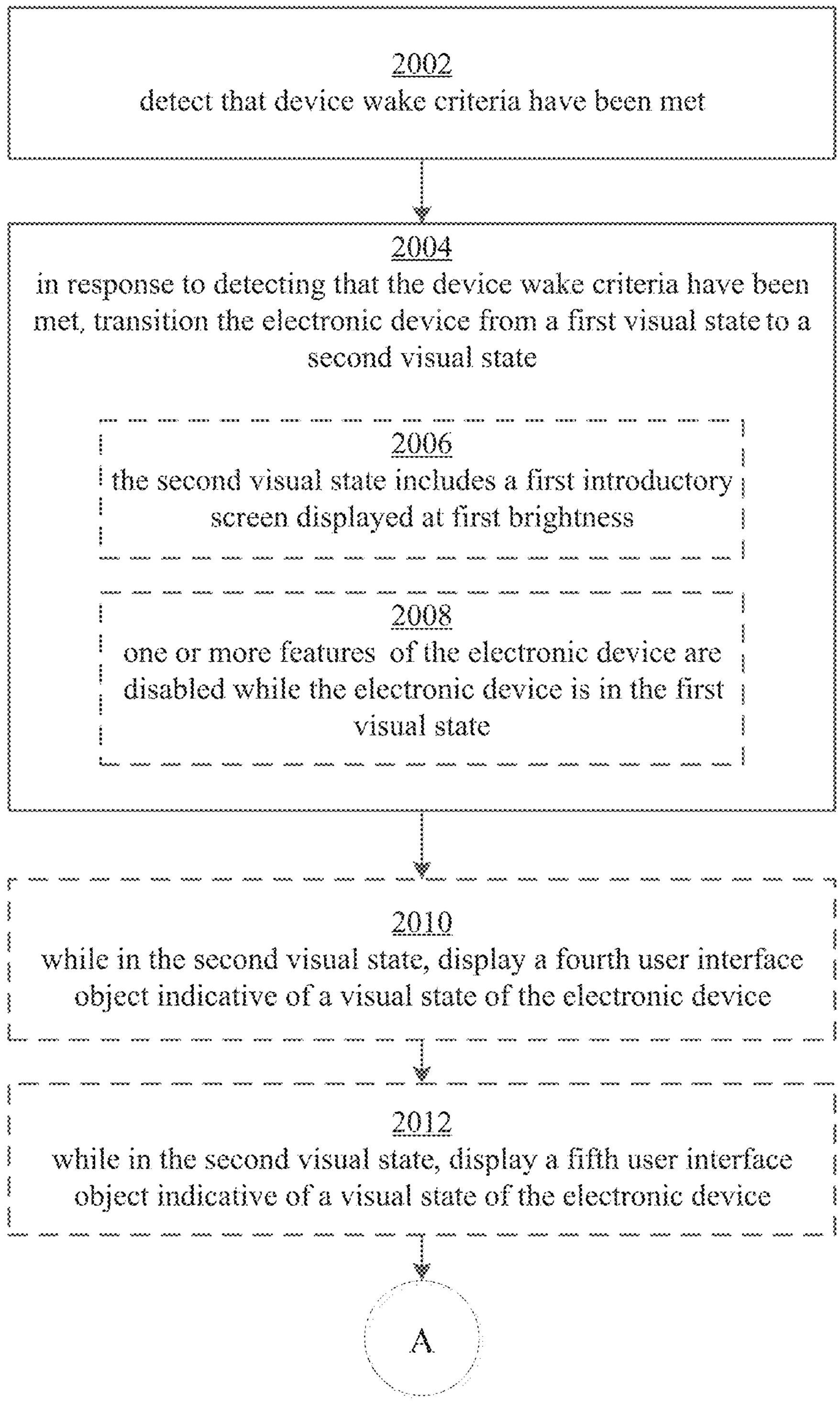
Figure 20B:
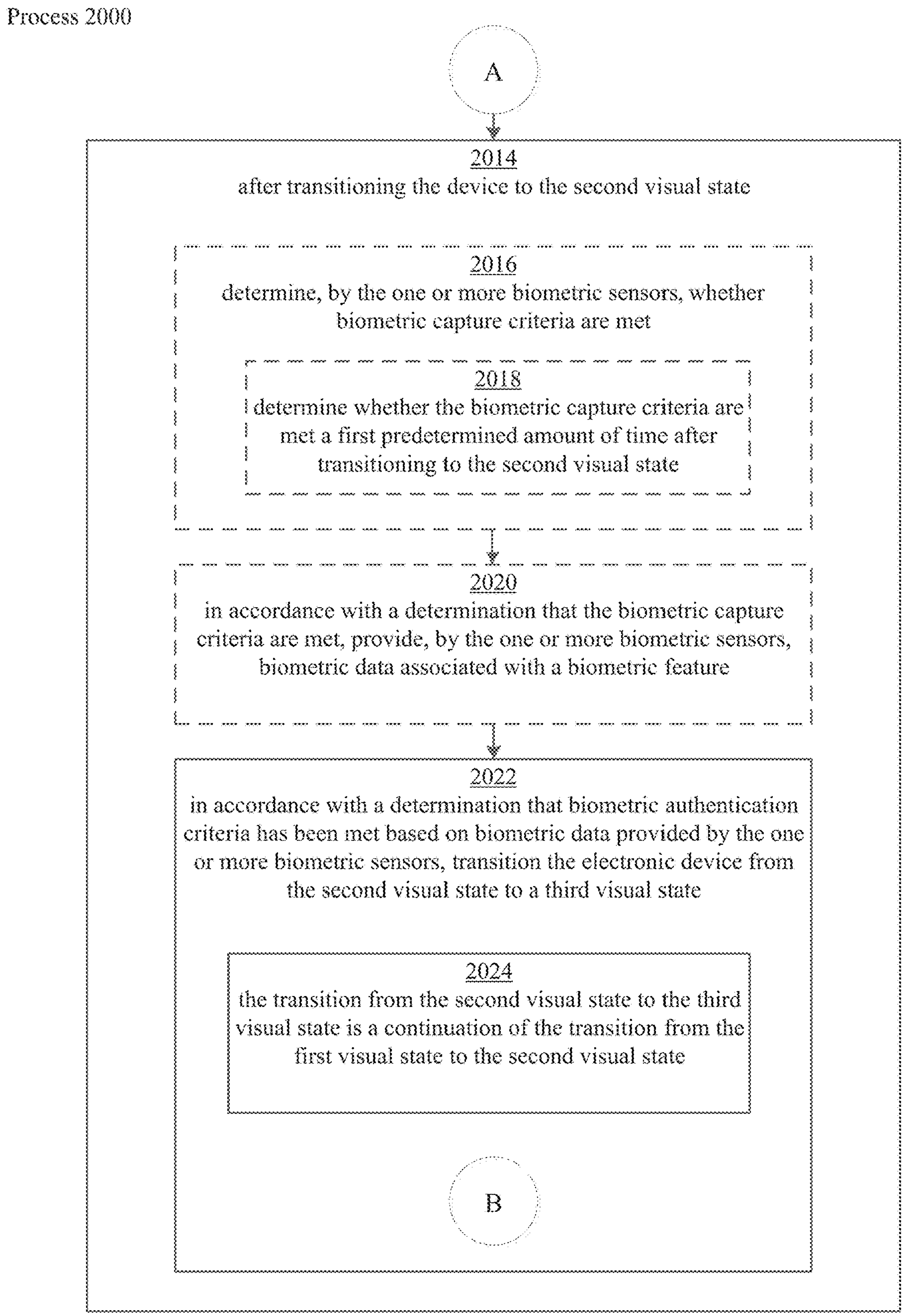
Figure 20D:
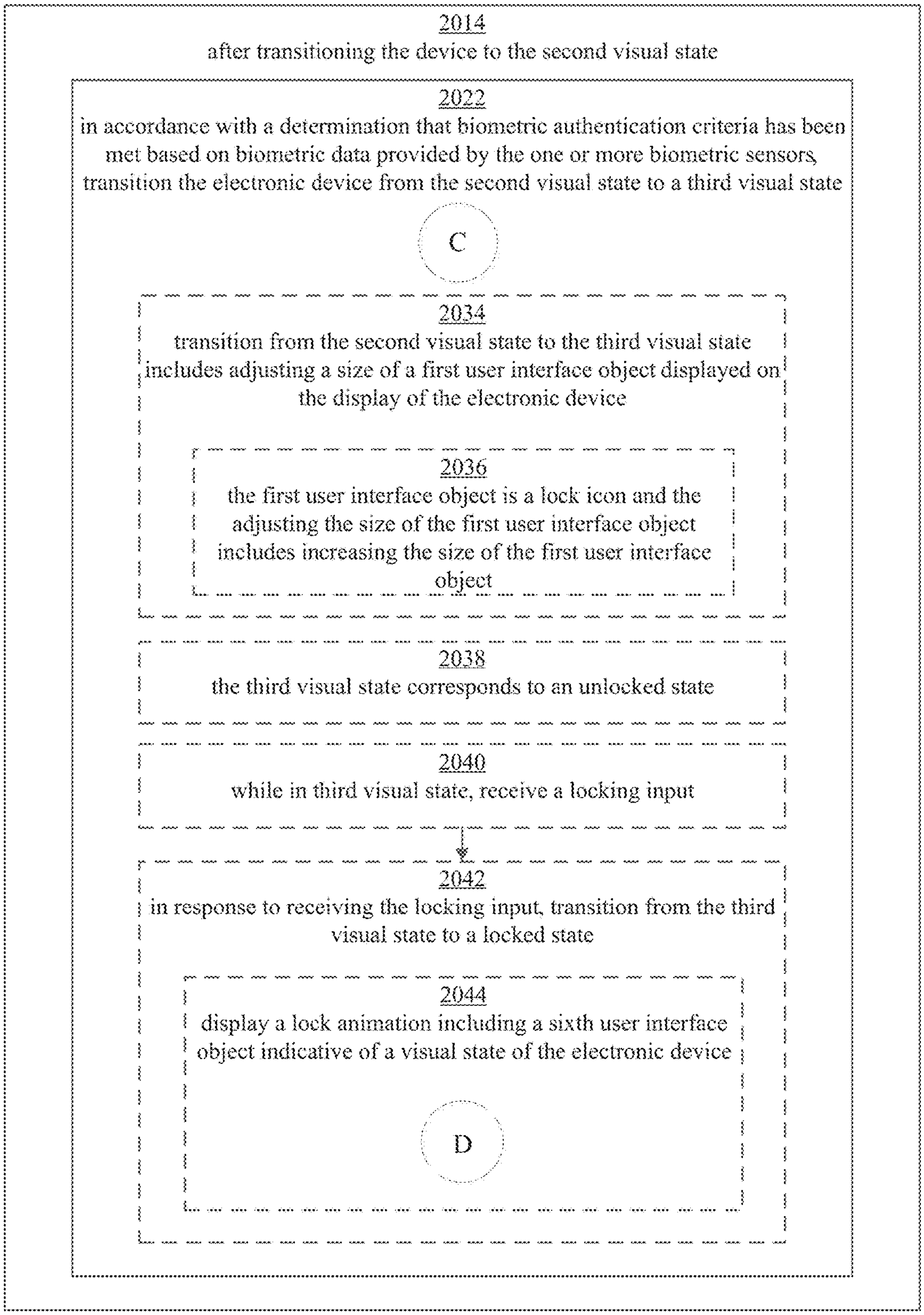
Figure 20F:
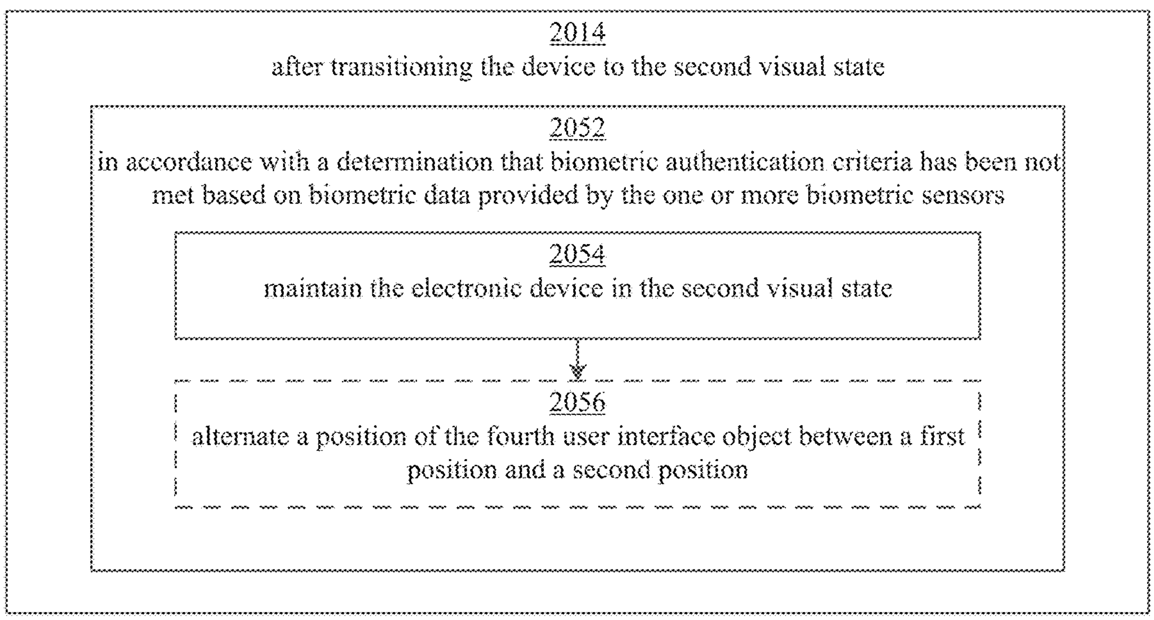

For example, in FIG. 19W, the electronic device 1900 receives activation of the biometric authentication enablement setting 1956. The activation of the biometric authentication enablement setting 1956 is a tap gesture 1958 in some examples. Because the biometric authentication enablement setting 1956 is enabled as shown in FIG. 19W, the biometric authentication enablement setting 1956 is disabled in response to the tap gesture 1958, as shown in FIG. 19X. In some examples, as a result, any request to access secured data on the electronic device 1900 requires a user authenticate using an alternative form of authentication. As an example, with reference to FIGS. 19Y-Z, the electronic device 1900 detects a user input 1930 near an edge of the display 1902. As illustrated in FIGS. 19I-K, the user input 1930 is a swipe gesture that, in some examples, is a request to access a home screen interface of the electronic device 1900. With reference to FIG. 19AA, Because biometric authentication enablement setting 1956 is disabled, the electronic device 1900, in response to the swipe gesture 1930, slides the locked state interface 1910 in an upward direction to display (e.g., reveal) an alternative authentication interface 1932, with which the user can provide a passcode to unlock the electronic device 1900.

In some examples, one or more elements displayed by the electronic device 1900 are based on context. As illustrated in FIG. 19AB, for example, a locked state indicator displayed by the electronic device is, in some instances, based on location and/or type of the electronic device 1900.

FIGS. 20A-20F are a flow diagram illustrating a method for performing biometric authentication using an electronic device in accordance with some examples. Method 2000 is performed at a device (e.g., 100, 300, 500, 1900) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric feature by the one or more biometric sensors. Some operations in method 2000 are, optionally, combined, the orders of some operations are, optionally, changed, and some operations are, optionally, omitted.

As described below, method 2000 provides an intuitive way for performing authentication of biometric features. The method reduces the cognitive burden on a user for performing authentication of biometric features, thereby creating a more efficient human-machine interface and intuitive user experience. For battery-operated computing devices, enabling a user to manage authentication of biometric features faster and more efficiently conserves power and increases the time between battery charges.

In some examples, prior to detecting that device wake criteria have been met, the electronic device performs a biometric enrollment process. In some examples, during the biometric enrollment, the device required that a face being enrolled include facial characteristics indicative of the face looking at the electronic device during enrollment of the face in order to proceed with the biometric enrollment of the face. In some examples, the device outputs tactile, audio, and/or visual warnings during enrollment if the face is not looking at the electronic device during the enrollment.

In some examples, the electronic device (e.g., 100, 300, 500, 1900) detects (2002) that device wake criteria have been met. In some examples, in response to detecting that the device wake criteria have been met, the electronic device transitions (2004) the electronic device from a first visual state (e.g., low power state) to a second visual state (e.g., moderate power state). Transitioning from the first visual state (e.g., low power state) to the second visual state (e.g., moderate power state) in response to detecting that the device wake criteria have been met allows the user to bypass providing one or more inputs to transition the device from the first state to the second state by manually providing one or more inputs. Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the wake criteria is met when the electronic device is lifted, on press of a button (e.g., 1904), and/or on display of a notification (e.g., 1914). In some examples, the first visual state is a display-off state, or a state in which the display of the electronic device is at 10% of maximum brightness state. In some examples, the second visual state is a display brightness state higher than the first visual state (e.g., 10% if the display was off in the first state; 20% if the display was at 10% in the first state). In some examples, the second visual state includes a first introductory screen (e.g., 1910) displayed at first brightness (2006). In some examples, while in the second visual state, the electronic device displays (2010) a fourth user interface object (e.g., 1912) indicative of a visual state of the electronic device. In some examples, while in the second visual state, the electronic device displays (2012) a fifth user interface object (e.g., 1912) indicative of a visual state of the electronic device. In some examples, one or more features (e.g., display (e.g., 1902), the one or more biometric sensors (e.g., 1903), microphone, access to sensitive data such as the contents of messages and applications, the ability to perform destructive actions such as deleting photos or communications, and the ability to perform communication operation such as sending a new message and sharing content stored on the device) of the electronic device are disabled (e.g., powered off or operating with reduced functionality) while the electronic device is in the first visual state (2008) (e.g., while the device is in the locked state). In some examples, transitioning to the second visual state includes enabling the one or more disabled functions of the electronic device. In some examples, transitioning to the second visual state includes the device into a state in which the one or more disabled components of the electronic device are enabled. In some examples, enabling one or more disabled functions includes enabling the display (e.g., 1902), the one or more biometric sensors (e.g., 1903), and/or the microphone of the electronic device.

In some examples, after transitioning the device to the second visual state (2014), when determining whether biometric authentication criteria have been met, in accordance with a determination that a selectable option (e.g., 1955) of the electronic device is enabled, the electronic device uses a first set of criteria as the biometric authentication criteria. When determining whether biometric authentication criteria have been met, using a first set of criteria as the biometric authentication criteria in accordance with the determination that a selectable option (e.g., 1955) of the device is enabled allows the user easily provide authentication information to the device with minimal input. Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first set of criteria include a requirement that a face of a user was looking at the display of the electronic device (e.g., when determining whether to unlock the device and/or transition from the second visual state to the third visual state). In some examples, further after transitioning the device to the second visual state, when determining whether biometric authentication criteria have been met, in accordance with a determination that the selectable option of the electronic device is not enabled, the electronic device uses a second set of criteria as the biometric authentication criteria. In some examples, the second set of criteria do not include a requirement that the face of the user was looking at the display of the electronic device (e.g., when determining whether to unlock the device and/or transition from the second visual state to the third visual state). In some circumstances, a user enables, for instance using an accessibility option, a gaze detection requirement (e.g., 1955) in which the user is required, by the device, to look at the device during biometric authentication in order for the user's face to be recognized by the device.

In some examples, after transitioning to the second state, the electronic device determines (2016), by the one or more biometric sensors, whether biometric capture criteria are met. In some examples, the electronic device determines whether a biometric feature is present, for instance, in a field of view of the one or more biometric sensors. In some examples, determining whether biometric capture criteria are met includes determining (2018) whether the biometric capture criteria are met a first predetermined amount of time after transitioning to the second visual state. In some examples, the electronic device detects the biometric feature immediately after transitioning to the second state. In some examples, the electronic device detects the biometric feature a period of time after transitioning to the second state. In some examples, in accordance with a determination that the biometric capture criteria are met, the electronic device provides (2020), by the one or more biometric sensors, biometric data associated with a biometric feature. In some examples, once the electronic device has transitioned to the second visual state (recall that the one or more biometric sensors are enabled prior to, or during, this transition), the electronic device uses the enabled one or more biometric sensors to capture the biometric data.

In some examples, in accordance with a determination that biometric authentication criteria has been met based on biometric data provided by the one or more biometric sensors (e.g., a biometric feature, such as a face, is authenticated by the device), the electronic device transitions (2022) the electronic device from the second visual state to a third visual state (e.g., high-power state). Transitioning the device form a second visual state (e.g., a moderate power state) to a third visual state (e.g., high-power state) in accordance with the determination that biometric authentication criteria has been met based on the biometric data provided by the one or more biometric sensors allows the user to bypass providing one or more inputs to transition the device from the second state to the third state by manually providing one or more inputs. Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some examples, while the electronic device is in the third visual state, the display of the electronic device is on at a second, relatively high brightness. In some examples, the transition from the second visual state to the third visual state is a continuation of the transition from the first visual state to the second visual state (2024). In some examples, during the transitions from the first visual state to the second visual state, and from the second visual state to the third visual state, the display continues to brighten from off, to a low brightness, and finally, in response to authentication, to a high brightness. In some examples, the transition to the second visual state transitions to a particular brightness and the transition from the second visual state to the third visual state transitions starting from the particular brightness. In some examples, each increase is made according to a same function. In some examples, the transition to the second visual state includes enlarging at least a respective user interface element (e.g., 1912) displayed in the first visual state and the transition to the third visual state includes further enlarging the respective user interface element (e.g., 1912, 1913, 1921). In some examples, the second visual state indicates that the device is in a locked state and the third visual state indicates that the device is in an unlocked state.

In some examples, further in accordance with a determination that biometric authentication criteria has been met based on biometric data provided by the one or more biometric sensors, the electronic device displays (2026) an unlock animation including the fifth user interface object (e.g., 1912). Displaying the unlock animation including an user interface object (e.g., the fifth user interface object 1912) in accordance with the determination that the biometric authentication criteria has been met based on the biometric data provided by the one or more biometric sensors provides visual feedback by allowing the user to quickly recognize that the authentication was successful and thus that the device has been unlocked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the fifth user interface objection is a lock. In some examples, the unlock animation is based on context of the electronic device, such as location or type. In some examples, the fifth user interface object (e.g., 1912, 1922) has a first (e.g., locked) state when the electronic device is in the second visual state and has a second (e.g., unlocked) state when the electronic device is in the third visual state (2028). In some examples, the visual state element transitions from the first state to the second state during the unlock animation (animation including 1912, 1913, 1921, 1922) (2030). In some examples, to demonstrate that biometric authentication has succeeded, the electronic device displays an animation (animation including 1912, 1913, 1921, 1922) in which a lock unlocks.

In some examples, the third visual state includes a second introductory screen at a second brightness, higher than the first brightness (2032). In some examples, the first introductory screen (e.g., 1910) and the second introductory screen (e.g., 1920) are a same screen, except for the degree of brightness of each screen.

In some examples, transitioning from the second visual state to the third visual state includes adjusting (2034) (e.g., increasing) a size of a first user interface object (e.g., 1912) displayed on the display of the electronic device. In some examples, the electronic device adjusts size of all displayed user interface objects. In some examples, the electronic device adjusts size of less than all displayed user interface elements. In some examples, the first user interface object (e.g., 1912) is a lock icon and the adjusting the size of the first user interface object includes increasing (2036) the size of the first user interface object. In some examples, transitioning from the second visual state to the third visual state includes changing a degree of blurring of a second user interface object displayed on the display of the electronic device. In some examples, one or more blur parameters, such as a blur radius and/or a blur magnitude, of one or more displayed user interface objects (e.g., wallpaper) are increased and/or decreased. In some examples, blur parameters of all user interface objects are changed. In some examples, blur parameters for less than all user interface objects are changed. In some examples, the first user interface object and the second user interface object are a same element. In some examples, transitioning from the second visual state to the third visual state includes translating a position (e.g., shifting a position; shifting a position without rotating) of a third user interface object displayed on the display of the electronic device from a first position to a second position. In some examples, the lock icon is moved closer to an edge of the display of the electronic devices prior, or during, to the unlocking animation). In some examples, transitioning the device from the second state to the third visual state includes outputting a tactile output (e.g., 1926). In some examples, the electronic device outputs a tactile output indicating the biometric authentication criteria has been met while displaying the unlock animation.

In some examples, the third visual state corresponds to an unlocked state (2038). In some examples, while in third visual state (e.g., while the device is unlocked), the electronic device receives (2040) a locking input (e.g., 1948, press of the button 1904, 1952). In some examples, the locking input is a press of button (e.g., 1904), such as hardware button, or is a selection of affordance (e.g., 1922, 1950) indicating an intent to lock the electronic device. Further, while in the third visual state, in response to receiving the locking input, the electronic device transitions (2042) from the third visual state to a locked state. In some examples, the device is locked in response to one or more particular inputs.

In some examples, while in the locked state, the device is prevented from performing one or more operations that are available in the unlocked state (e.g., displaying a home screen, displaying content of notifications, launching applications, sending communications). Preventing the device from performing one or more operations that are available in the unlocked state while in the locked state enhances device security by prohibiting certain functions or operations to be performed on the device when the device is in the locked state as opposed to in the unlocked state. Improving security measures of the device enhances the operability of the device by preventing unauthorized access to content and operations and, additionally, reduces power usage and improves battery life of the device by enabling the user to use the device more efficiently.

In some examples, the electronic device displays (2044) a lock animation including a sixth user interface object (e.g., 1912, 1922) indicative of a visual state of the electronic device. Displaying the lock animation including a particular user interface object (e.g., the sixth user interface object, 1912, 1922) provides visual feedback by allowing the user to quickly recognize that the device is in a locked state. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the sixth user interface object is a lock. In some examples, the sixth user interface object has a first appearance (e.g., an open lock) when the electronic device is in the third visual state and has a second appearance (e.g., a closed lock) when the electronic device is in the locked state (2046). In some examples, the sixth user interface object transitions from the first appearance to the second appearance during the lock animation (2048). In some examples, to demonstrate that the electronic device has been locked, the electronic device displays an animation in which a lock locks. In some examples, transitioning the device from the third visual state to a locked state includes outputting (2050) a tactile output (e.g., 1952). In some examples, the tactile output includes a single tap. In some examples, the tactile output includes multiple taps. In some examples, the tactile output is timed to synchronize with an animation of the sixth user interface object moving back and forth (e.g., the lock shaking back and forth). In some examples, displaying the lock animation includes displaying a current time. In some examples, the electronic device displays a time when transitioning to a locked state).

In some examples, the biometric authentication criteria include a requirement that a user was looking at the display of the electronic device with a face that is consistent with one or more authorized faces. Including the requirement that the user was looking at the display of the device with a face that is consistent with one or more authorized faces for the biometric authentication criteria enhances device security by allowing the authentication to be successful only by (the faces of) authorized users of the device. Improving security measures of the device enhances the operability of the device by preventing unauthorized access to content and operations and, additionally, reduces power usage and improves battery life of the device by enabling the user to use the device more efficiently. In some examples, unlocking the electronic device requires that the user is looking at the electronic device.

In some examples, in accordance with a determination that biometric authentication criteria have not been met based on biometric data provided by the one or more biometric sensors (2052), the electronic device maintains (2054) the electronic device in the second visual state. Maintaining the device in the second visual state in accordance with the determination that the biometric authentication criteria have not been met based on the biometric data provided by the one or more biometric sensors enhances device security by prohibiting the device from transitioning to a state that requires authentication without satisfying the proper authentication criteria. Improving security measures of the device enhances the operability of the device by preventing unauthorized access to content and operations and, additionally, reduces power usage and improves battery life of the device by enabling the user to use the device more efficiently.

In some examples, if the biometric feature is not authenticated, the display of the device is not further brightened as it is in response to authentication of the biometric feature. In some examples, when the biometric authentication criteria have not been met before the device receives an explicit request (e.g., 1930) to unlock the device (e.g., a swipe gesture from a lower portion of the device, a press of a home button, or other input that indicates that the user would like to view and/or interact with content that is not available when the device in the locked state), the device displays an unlock interface (e.g., 1932) while attempting to authenticate the user via one or more forms of authentication such as biometric authentication, passcode authentication, password authentication, pattern authentication, or the like. Examples of authenticating a user in response to a request to unlock the device via different forms of authentication are described in greater detail with reference to FIGS. 26A-26AS. In some examples, further in accordance with a determination that biometric authentication criteria has not been met based on biometric data provided by the one or more biometric sensors, the electronic device alternates (2056) a position of the fourth user interface object (e.g., 1912) between a first position and a second position. In some examples, to demonstrate that biometric authentication has failed, the electronic device shakes a lock icon displayed in the introductory interface. In some examples, a tactile output (e.g., 1918) is provided in combination with the shaking lock icon. In some examples, no tactile output is provided.

In some examples, while the device is in an unlocked state, the electronic device detects that a locking condition has been met. In some examples, in response to detecting that the locking condition has been met, in accordance with a determination that the locking condition is an explicit lock input (e.g., 1922, press of button 1904, 1952) (e.g., pressing a power button, tapping on a lock icon, etc.), the electronic device transitions the device from the unlocked state to a locked state and outputs a respective lock indication (e.g., 1912). In some examples, the respective lock indication includes a visual, audio, and/or tactile output that indicates that the device has transitioned from the unlocked state to the locked state. In some examples, further in response to detecting that the locking condition has been met, in accordance with a determination that the locking condition is an implicit lock condition (e.g., a covering of a proximity sensor, a long time period without receiving an input, etc.), the electronic device transitions the device from the unlocked state to the locked state without outputting the respective lock indication.

In some examples, after detecting that the device wake criteria have been met, the electronic device detects a request to display a biometric authentication setting interface. In some examples, the request to display a biometric authentication setting interface includes a swipe from an edge of the display to display a control panel user interface that includes a plurality of controls including a control associated with enabling or disabling biometric authentication, a long press of one or more hardware buttons that causes the device to display a setting user interface that includes one or more controls including a control associated with enabling or disabling biometric authentication, or navigation through one or more menus in a settings app to a set of controls associated with biometric authentication including one or more controls including a control associated with enabling or disabling biometric authentication. In some examples, in response to the request to display the biometric authentication setting interface, the electronic device displays a biometric authentication setting interface (e.g., 1954). In some examples, while displaying the biometric authentication setting interface, the electronic device receives a first user input (e.g., 1958) corresponding to a request to disable biometric authentication. In some examples, in response to receiving the first user input, the electronic device disables biometric authentication. In some examples, while biometric authentication is disabled and while the device is in a locked state, the electronic device receives a request to unlock the device. In some examples, in response to receiving the request to unlock the device, the electronic device outputs a prompt (e.g., "enter passcode to unlock" as shown in FIG. 19AA) for authentication with a different form of authentication from the biometric authentication. In some examples, the different form of authentication is a passcode, a password, fingerprint, etc.

In some examples, in accordance with a determination that the biometric capture criteria are not met a first predetermined amount of time after transitioning to the second visual state, the electronic device determines whether the biometric capture criteria are met a second predetermined amount of time after the first predetermined amount of time has elapsed. In some examples, delays between attempts to detect a biometric feature becomes increasingly longer. In some examples, once a biometric authentication attempts threshold has been reached, biometric authentication is disabled.

Note that details of the processes described above with respect to method 1200 (e.g., FIGS. 20A-20F) are also applicable in an analogous manner to the methods described herein. For example, method 2000 optionally includes one or more of the characteristics of the various methods described herein with reference to methods 800, 1000, 1200, 1400, 1600, 1800, 2200, 2500, and 2700. For example, the enrolled biometric data described in method 1200 can be used to perform biometric authentication as described with respect to FIGS. 19A-H. For another example, one or more interstitial interfaces described in methods 2700 optionally are displayed response to receipt of an input prior to completion of a biometric authentication process. For brevity, these details are not repeated herein.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 20A-20F are, optionally, implemented by components depicted in FIGS. 1A-1B. For example, detecting operation 2002, transitioning operation 2004, and transitioning operation 2022, are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 21A-21AQ illustrate exemplary user interfaces for biometric authentication, in accordance with some examples. As described in greater detail below, the exemplary example of the user interfaces illustrated in FIGS. 21A-21AQ are used to illustrate the processes described below, including the processes in FIGS. 22A-22F.

FIG. 21A illustrates an electronic device 2100 (e.g., portable multifunction device 100, device 300, or device 500). In the exemplary example illustrated in FIGS. 21A-21AQ, electronic device 2100 is a smartphone. In other examples, electronic device 1500 can be a different type of electronic device, such as a wearable device (e.g., a smartwatch). Electronic device 2100 has a display 2102, one or more input devices (e.g., touchscreen of display 2102, a button 2104, a mic), and a wireless communication radio. In some examples, the electronic device includes a plurality of cameras. In some examples, the electronic device includes only one camera. In some examples, the electronic device includes one or more biometric sensors (e.g., biometric sensor 2103) which, optionally, include a camera, such as an infrared camera, a thermographic camera, or a combination thereof. In some examples, the one or more biometric sensors 2103 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

Figure 21B:
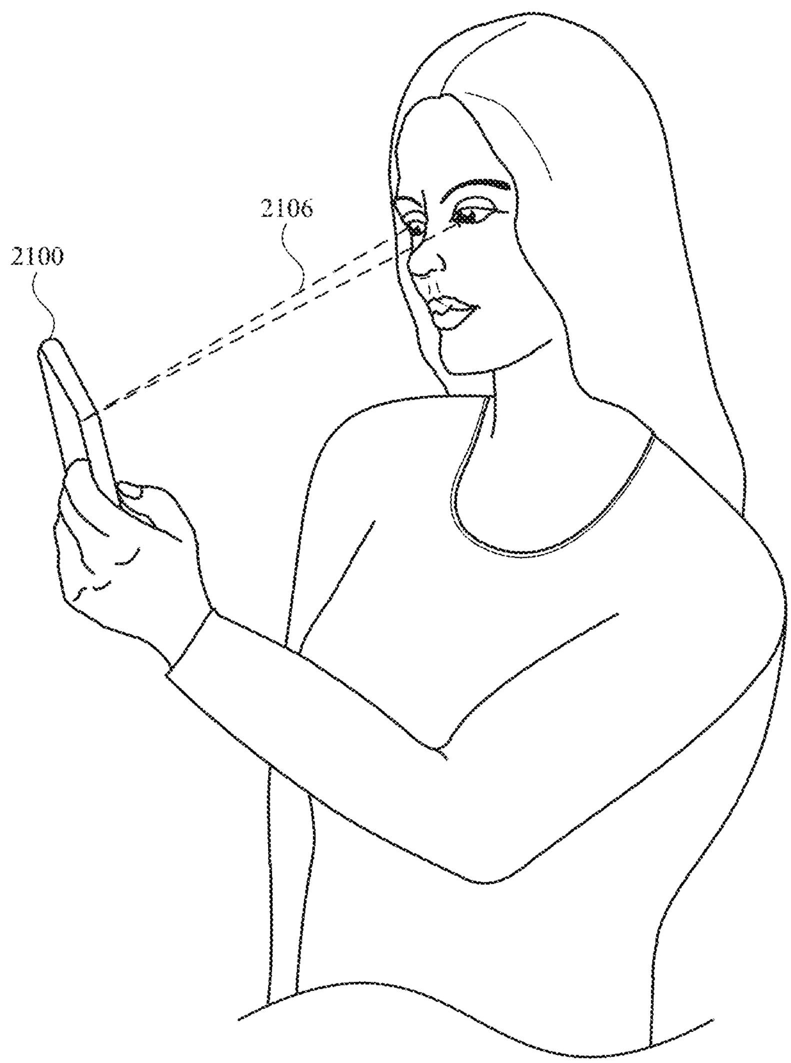
Figure 21C:
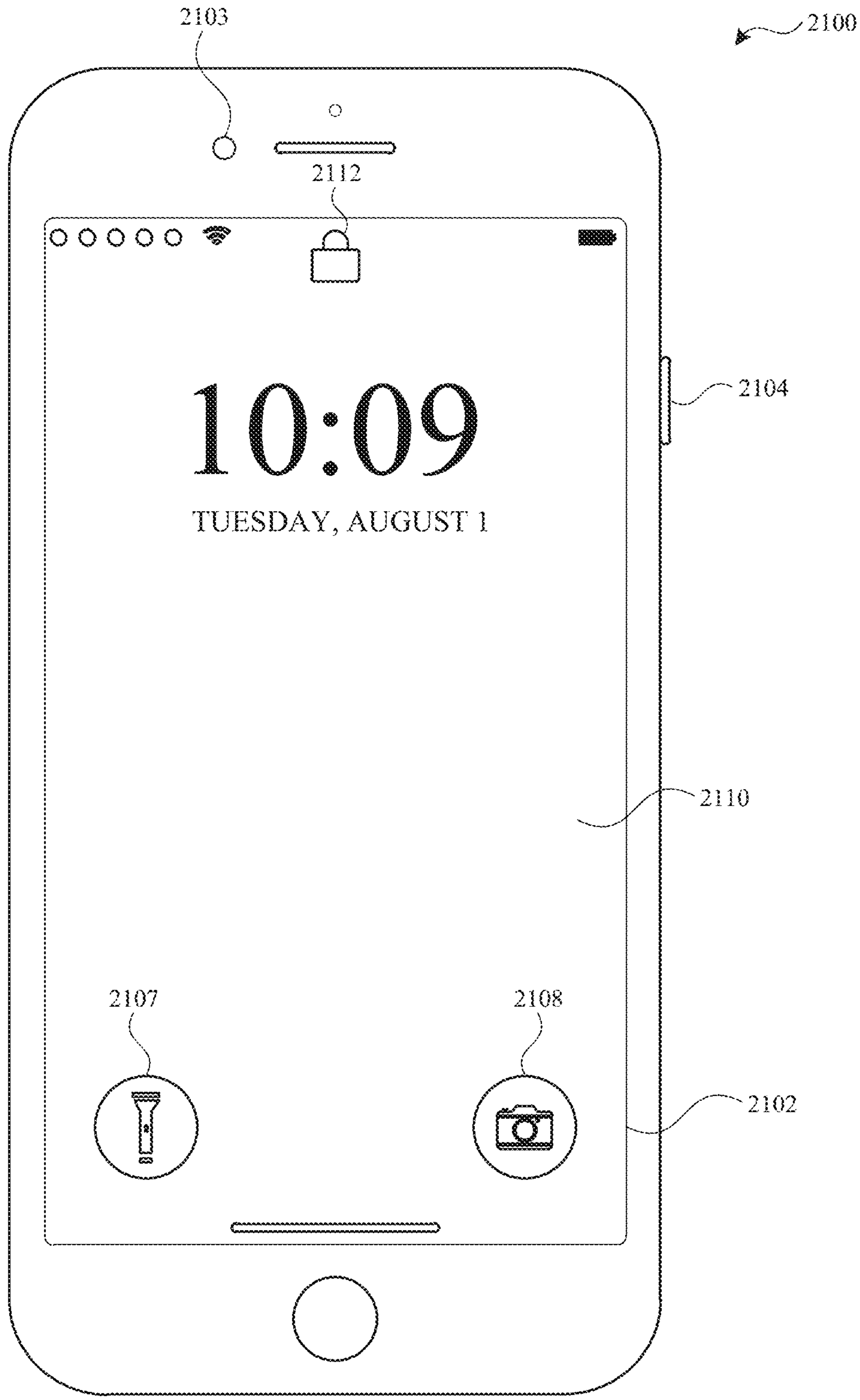

In FIGS. 21A-C, the electronic device 2100 performs a biometric authentication with a user of the electronic device 2100. With reference to FIG. 21A, the electronic device 2100 is in a locked state. As illustrated, in some examples, while in the locked state, the display 2102 of the electronic device 2100 is disabled. In other examples, while in the locked state, the display 2102 of the electronic device 2100 is enabled, and the electronic device 2100 displays a locked state interface (e.g., locked state interface 2110 of FIG. 21C) indicating that the electronic device 2100 is in the locked state. While the device 2100 is in the locked state, the electronic device initiates biometric authentication. In FIG. 21B, the electronic device 2100 initiates biometric authentication in response to detecting a wake condition (e.g., the user moving the device in a predetermined manner). It will be appreciated that the electronic device initiates biometric authentication in response to any number of wake conditions, including but not limited to, movement (e.g., lifting) of the device, press of a button of the device, or touch of the display 2102.

In some examples, initiating biometric authentication includes obtaining (e.g., capturing with the one or more biometric sensors 2103) data corresponding to at least a portion of the biometric feature of a user. In response to initiating biometric authentication, the electronic device 1500 obtains (e.g., captures) and processes (e.g., analyzes) the biometric data, for instance to determine, based on the biometric data, whether the biometric feature (or a portion thereof) satisfies biometric authentication criteria (e.g., determine whether the biometric data matches, within a threshold, a biometric template). In some examples, biometric authentication requires that a user is looking at the device during biometric authentication. Accordingly, as illustrated in FIG. 21B, the gaze 2106 of a user is directed at the electronic device when the user lifts the device 2100.

In FIG. 21C, the electronic device 2100, in response to the wake condition, displays a locked state interface 2110 including a locked state indicator 2112. In some examples, while displaying the locked state interface 2110, the electronic device 2100 further displays a flashlight affordance 2107 and a camera affordance 2108. In some examples, activation of the flashlight affordance 2107 causes the electronic device to load a flashlight application. In some examples, activation of the camera affordance 2108 causes the electronic device 2100 to load a camera application.

Figure 21D:
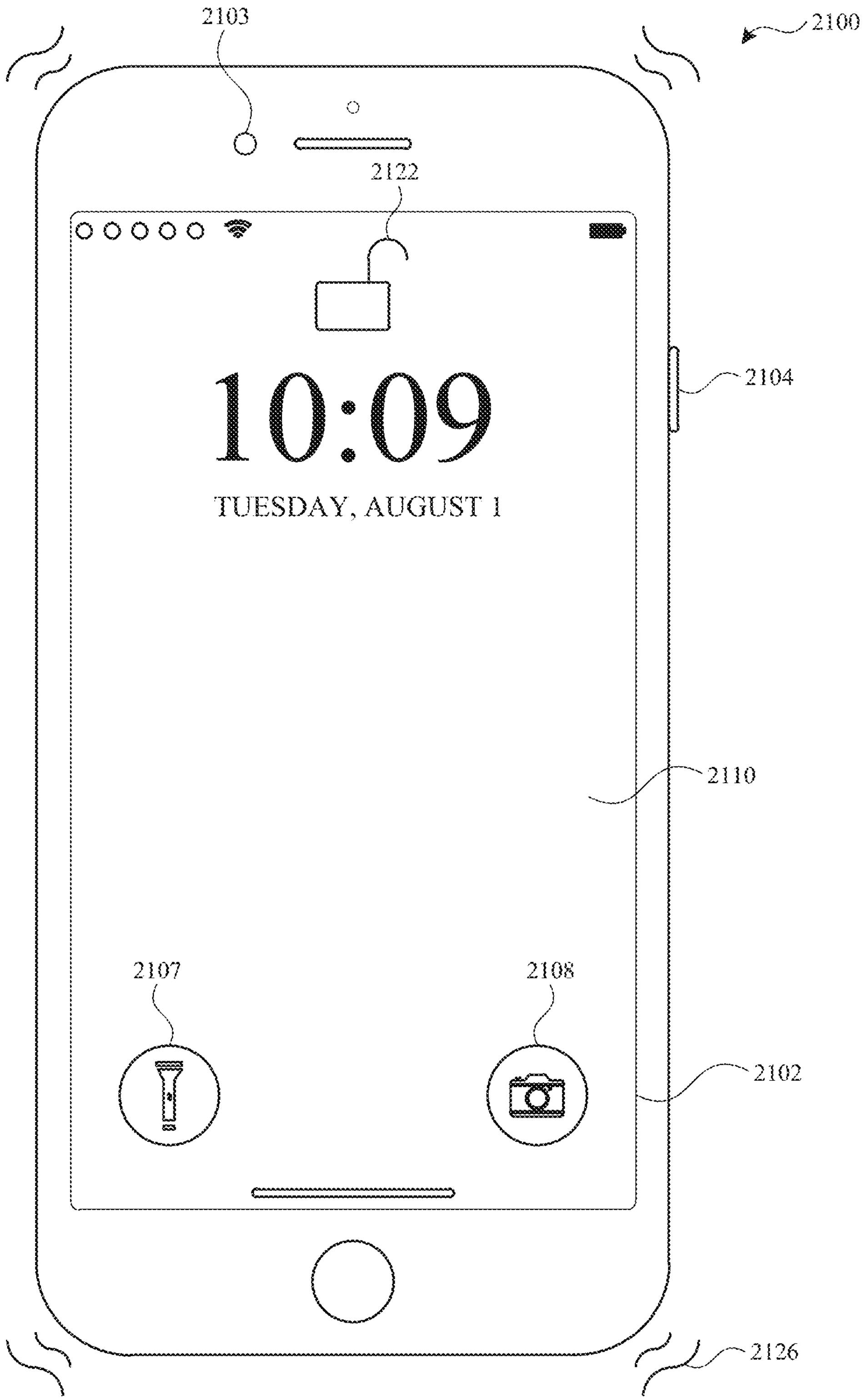

In FIG. 21D, the electronic device 2100 determines that the biometric authentication was successful, and in response, displays an unlocked state interface 2120. In some examples, display of the unlocked state interface 2120 includes display of an unlocking animation, as described with reference to FIGS. 19D-G. While displaying the unlocked state interface 2120, the electronic device 2100 further displays (e.g., maintains display of) the flashlight affordance 2107 and the camera affordance 2108. In some examples, the electronic device 2100 outputs a tactile output 2126 in response to determining that the biometric authentication is successful.

Figure 21E:
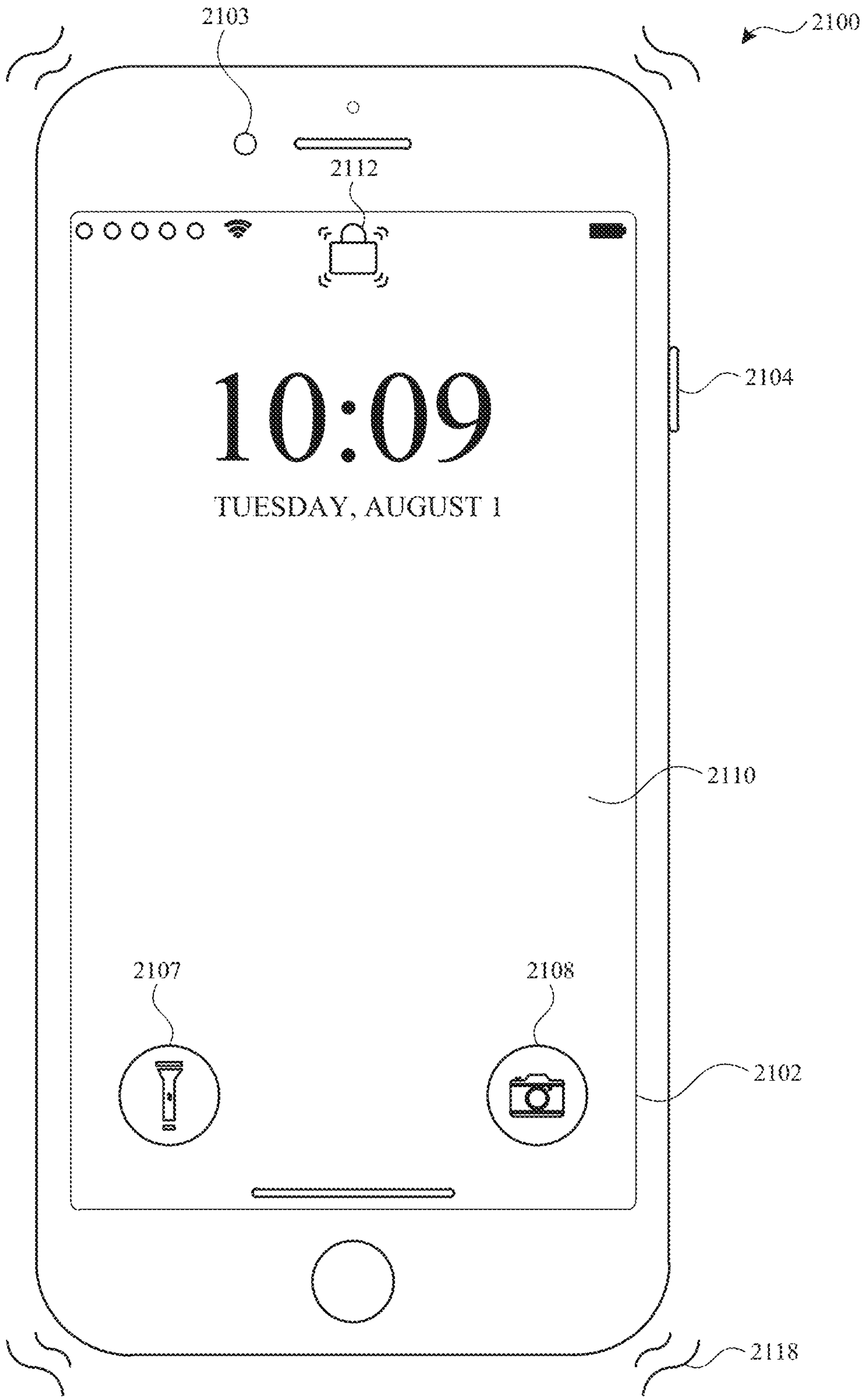

In FIG. 21E, the electronic device 2100 determines that the biometric authentication was not successful. In response, the electronic device 2100 maintains display of the locked state interface 2110. In some examples, the electronic device displays a shake animation in which the locked state indicator 2112 is moved side-to-side to simulate a "shake" effect to indicate that the biometric authentication was unsuccessful. The electronic device 2100 further outputs a tactile output 2118 to indicate that the biometric authentication was unsuccessful.

Figure 21F:
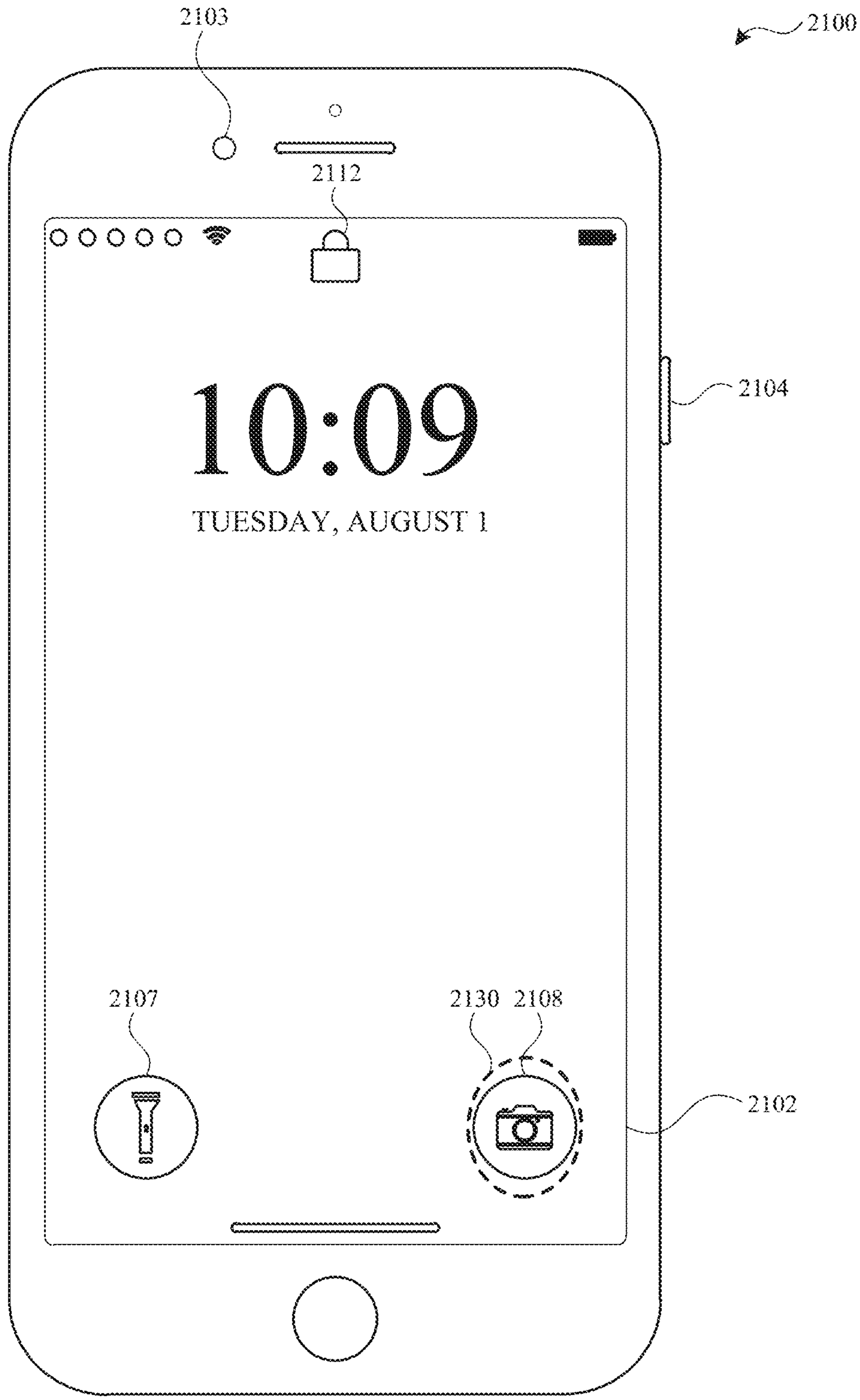
Figure 21G:
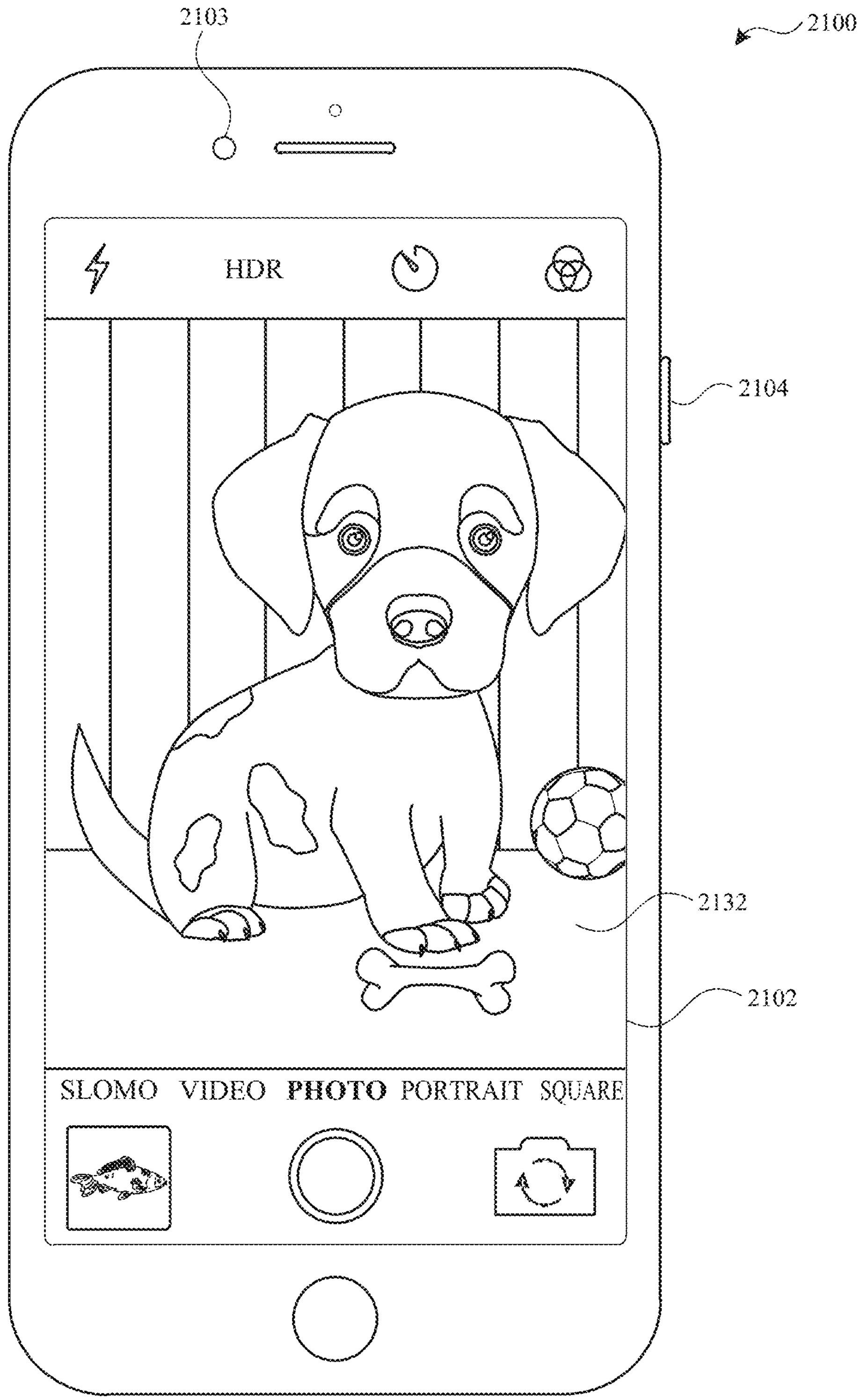

In some examples, one or more operations accessible during display of the locked state interface 2110 do not require authentication, and accordingly the one or more operations can be performed while the electronic device is in the locked state. By way of example, loading the flashlight application in response to activation of the flashlight affordance 2107 does not require authentication. As another example, with reference to FIG. 21F, in some examples, the electronic device 2100 detects an activation of the camera affordance 2108 while in the locked state. As shown, the activation of the camera affordance 2108 is a tap gesture 2130 on the camera affordance 2108. In FIG. 21G, in response to detecting the activation of the camera affordance 2108, the electronic device 2100 displays (e.g., replaces display of the locked state interface 2110), on the display 2102, a camera application interface 2132 associated with a camera application.

Figure 21H:
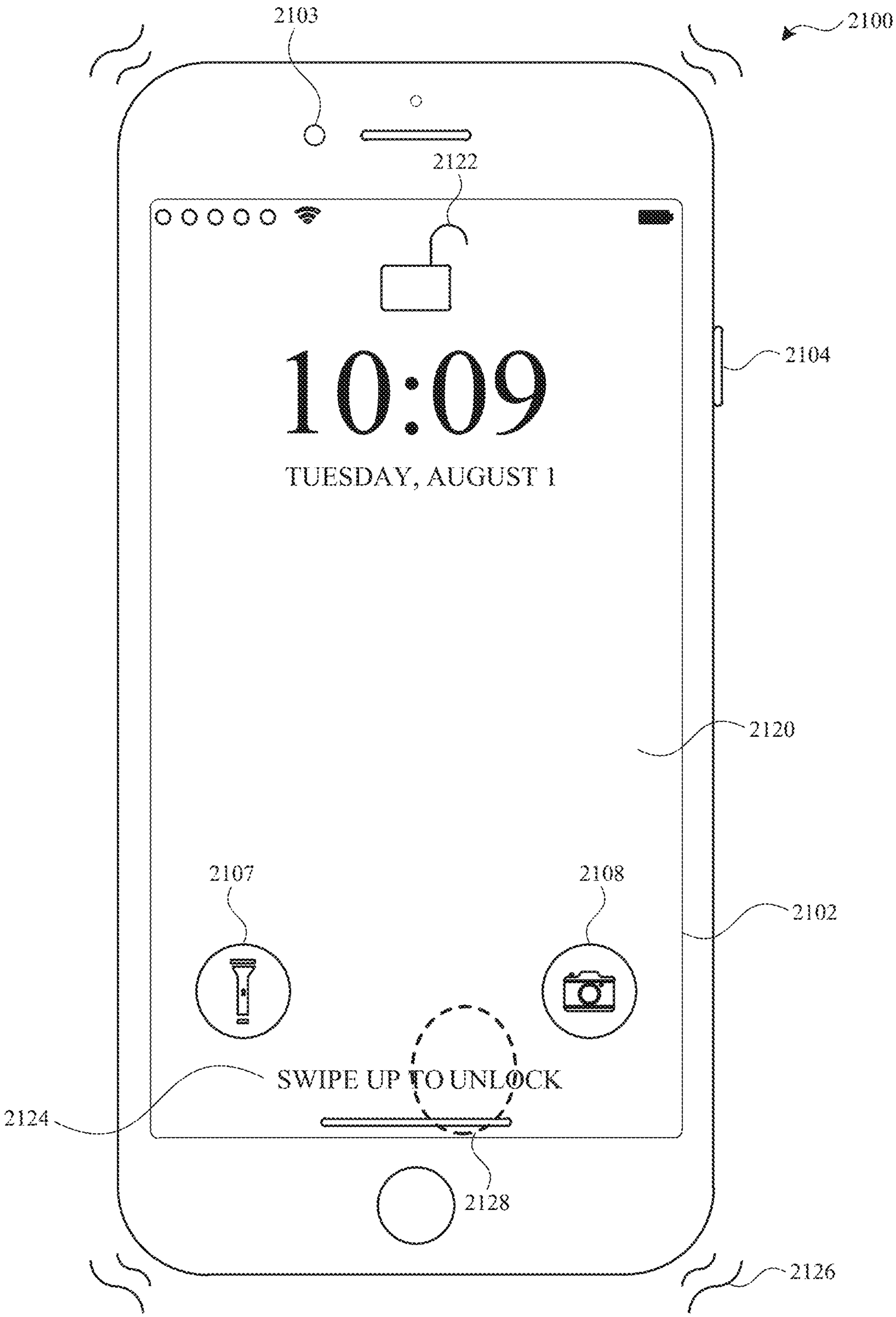
Figure 21I:
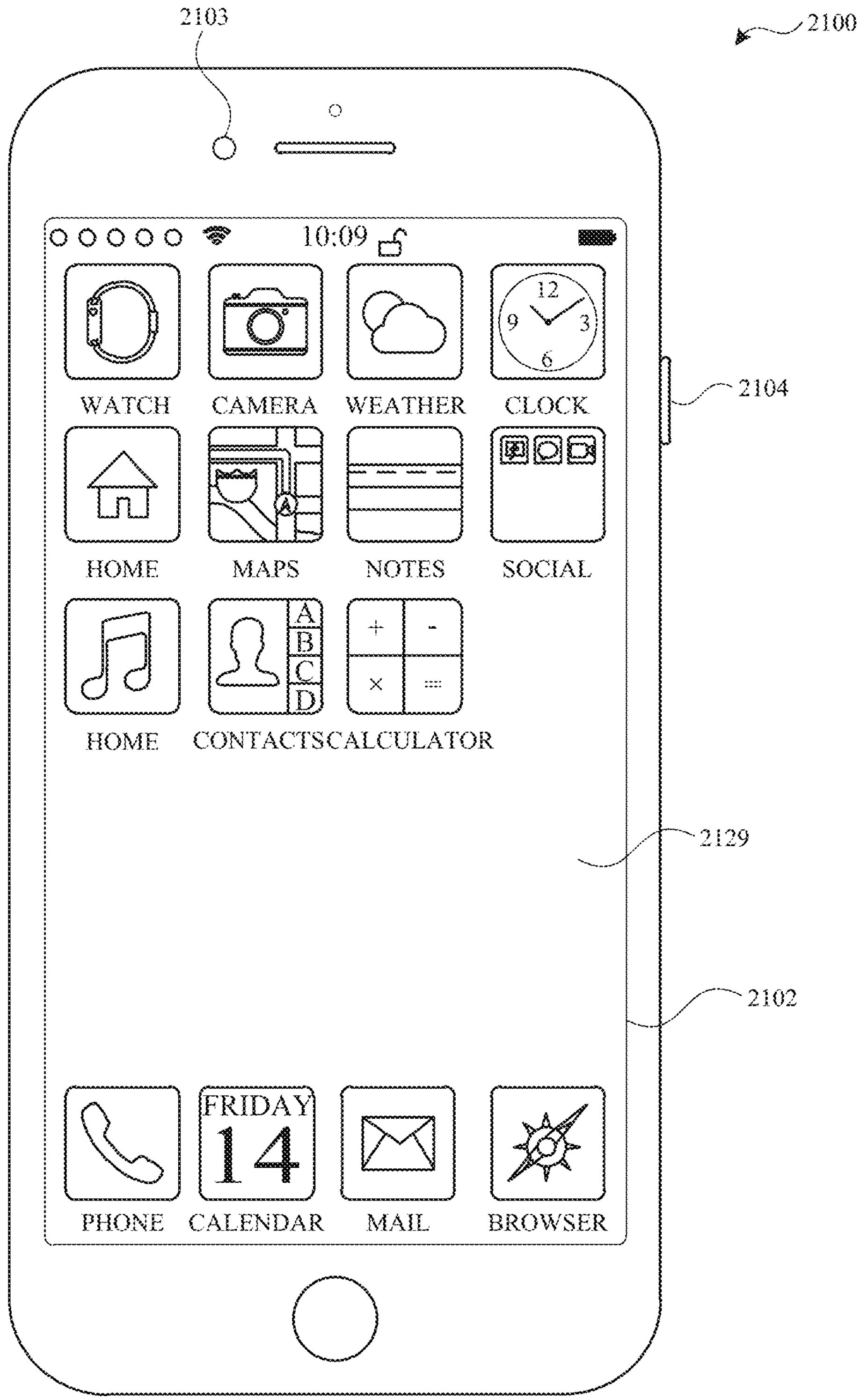

With reference to FIG. 21H, in some examples, while displaying the unlocked state interface 2120, the electronic device 2100 displays a prompt 2124 indicating that the device is unlocked and/or that providing an input of predetermined type (e.g., swipe gesture) will allow a user to access secured content, such as a home screen interface (e.g., home screen interface 2129 of FIG. 21I). For example, as illustrated, the electronic device 2100 detects a user input 2128, for instance, near an edge of the display 2102. The user input 2128 is a swipe gesture that, in some examples, is a request to access a home screen interface of the electronic device 2100, and in response to the swipe input 2128, the electronic device displays (e.g., replaces display of the unlocked interface 2120 with) the home screen interface 2129 of FIG. 21I. In some examples, displaying the home screen interface 2129 includes sliding the unlocked state interface 2120 in an upward direction to display (e.g., reveal) the home screen interface 2129, as analogously described with reference to FIGS. 19P-R.

Figure 21J:
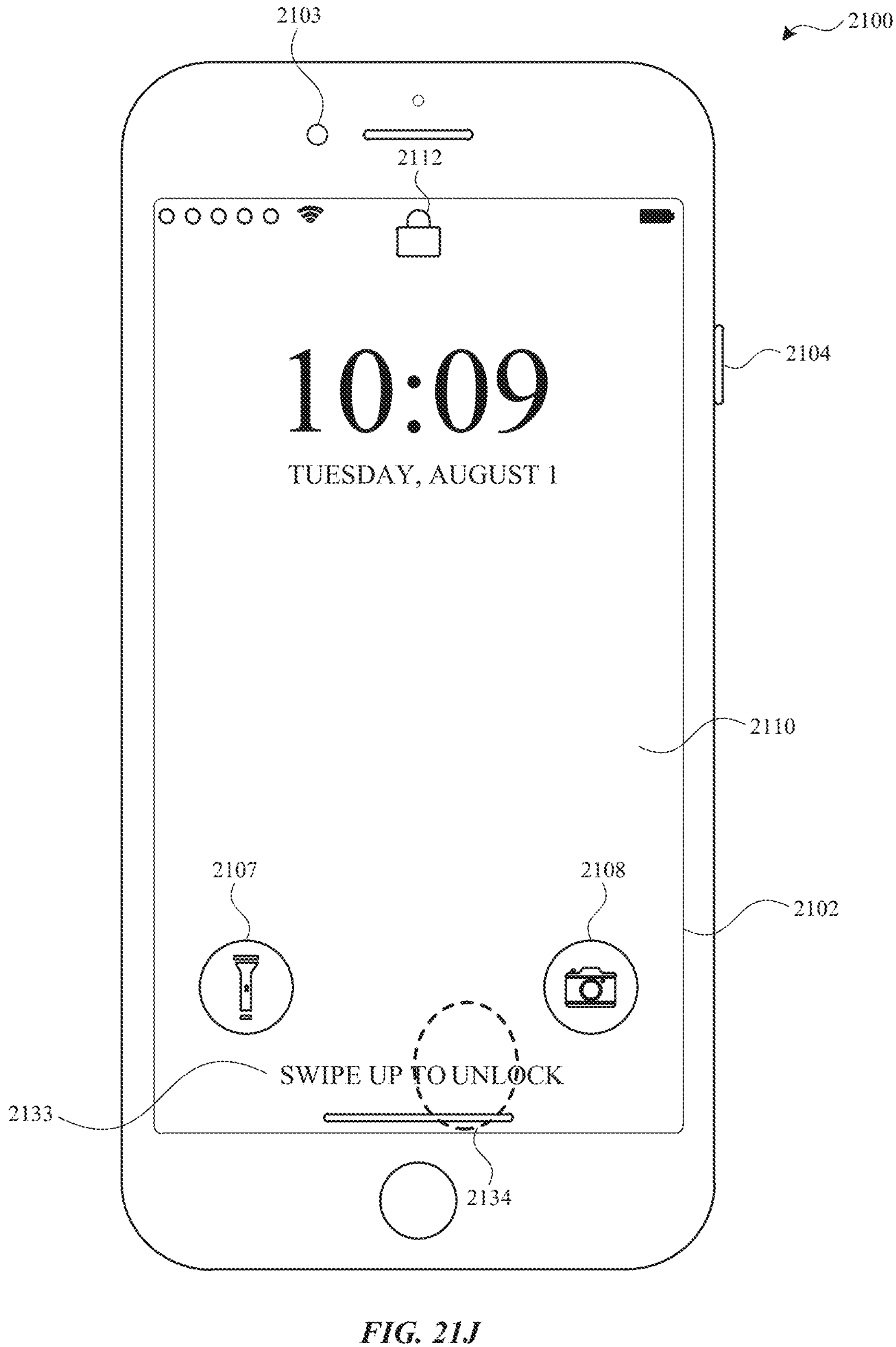

In FIG. 21J, the electronic device is in a locked state, for instance, in response to a failed biometric authentication (as described with reference to FIGS. 21A-C and 21E) and displays the locked state interface 2110 while in the locked state. While displaying the locked state interface 2110, the electronic device 2100 displays a prompt 2133 indicating that the device is locked and/or that providing an input of predetermined type (e.g., swipe gesture) will allow a user to authenticate with (and unlock) the electronic device 2100. For example, as illustrated, the electronic device 2100 detects a user input 2134, for instance, near an edge of the display 2102. The user input 2134 is a swipe gesture that, in some examples, is a request to access a home screen interface of the electronic device 2100. Because the device is in the locked state (e.g., the user is not authenticated with the electronic device 2100), the electronic device displays (e.g., replaces display of the locked interface 2120 with) an alternative authentication interface 2140 in response to the swipe input 2128, shown in FIG. 21K. In some examples, the alternative authentication interface 2140 includes a locked state indicator 2142 indicating that the electronic device 2100 is in the locked state.

Figure 21K:
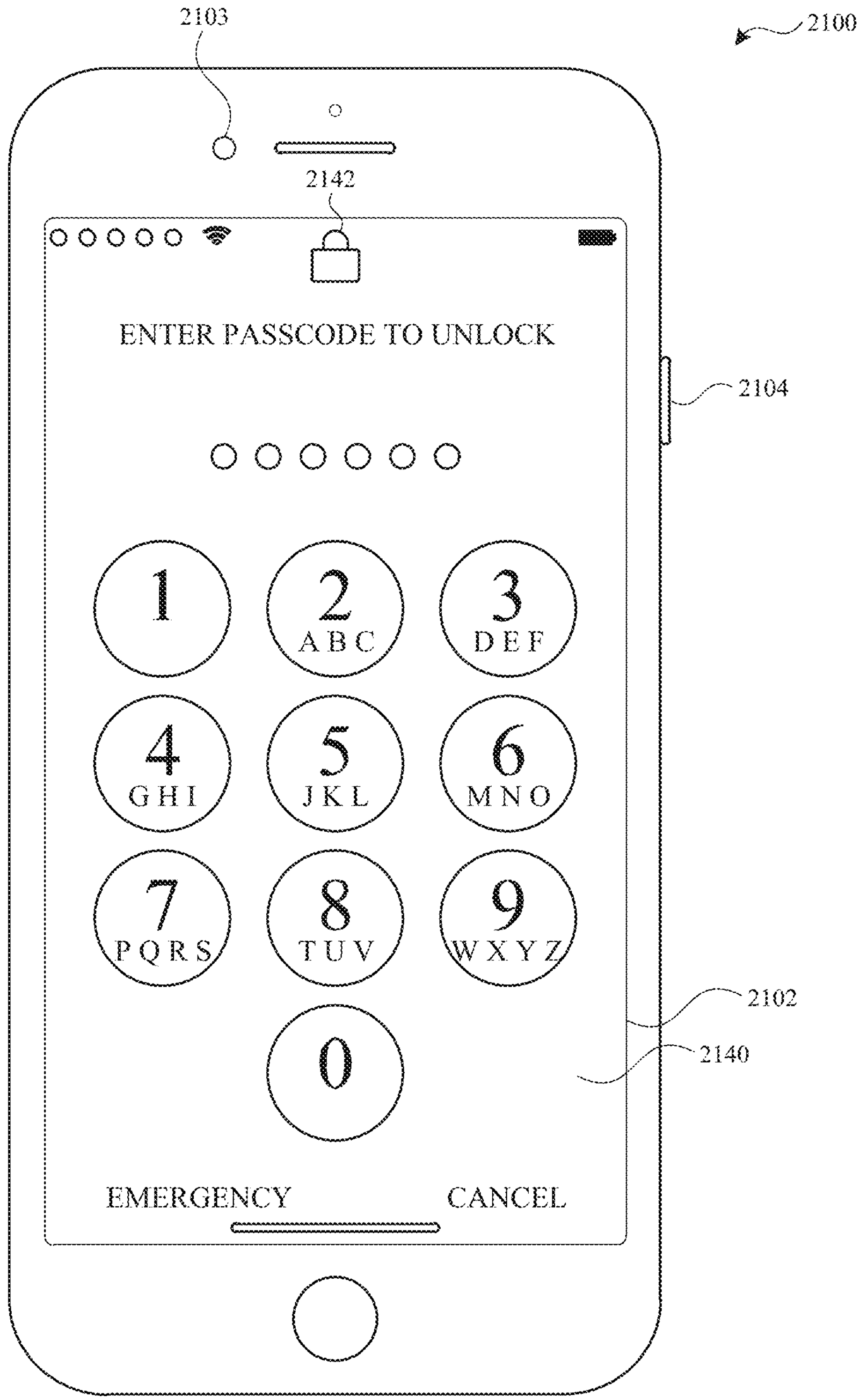
Figure 21L:
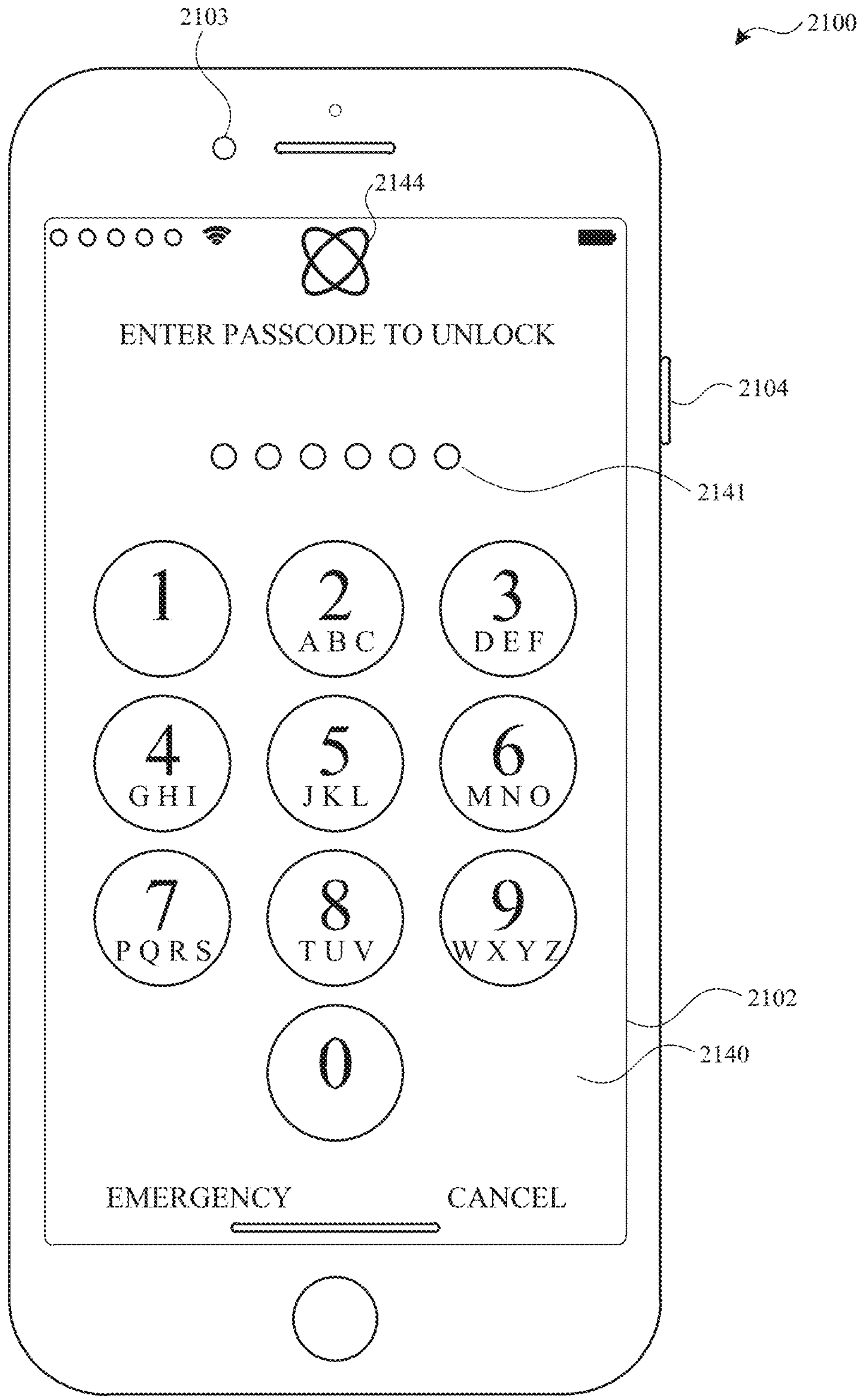
Figure 21M:
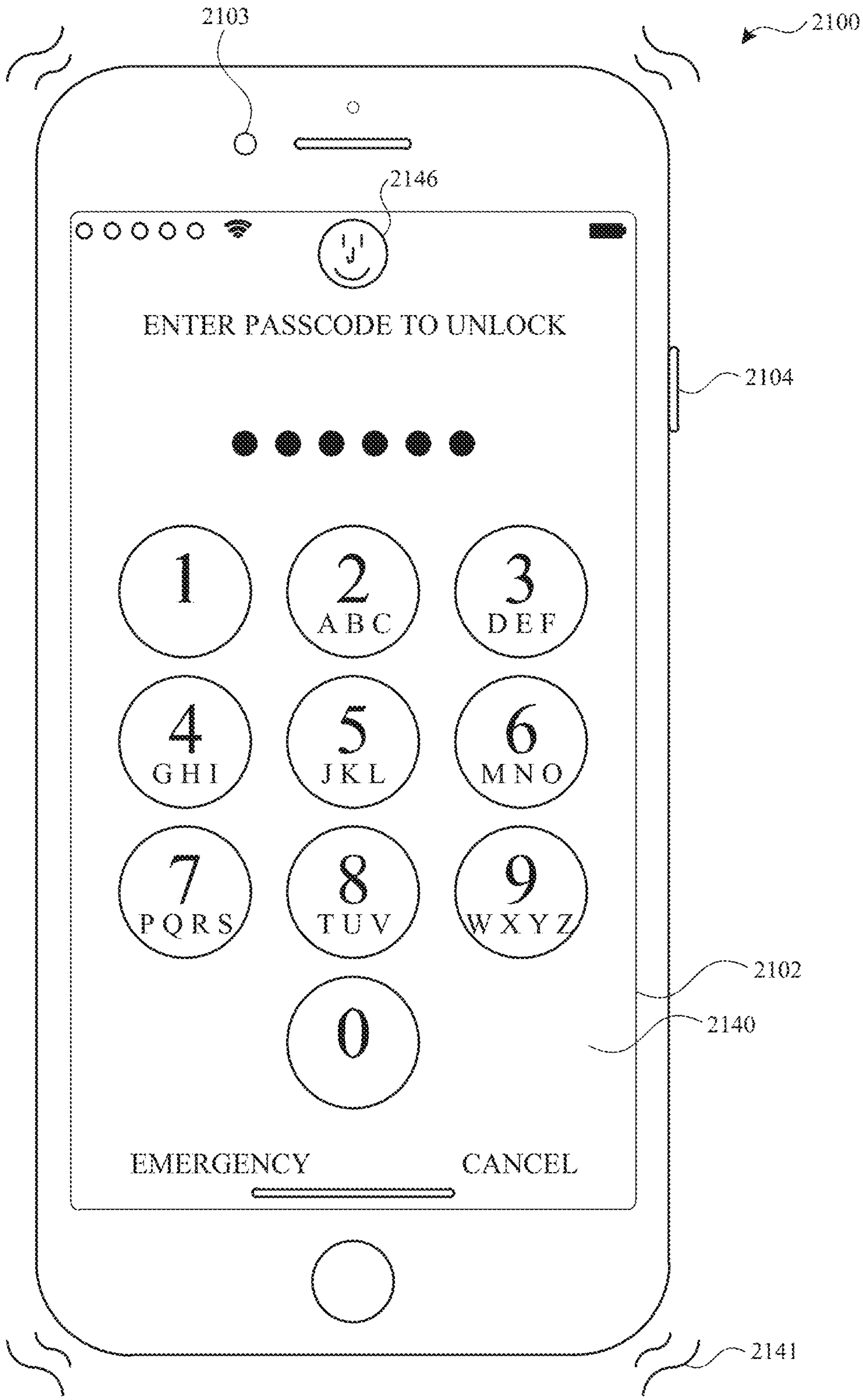

In FIGS. 21K-M, the electronic device 2100 performs biometric authentication while displaying the alternative authentication interface 2140. In particular, while displaying the displaying the alternative authentication interface 2140, the electronic device 2100 detects and/or obtains biometric data of a face. The electronic device 2100 then processes the biometric data to determine if the biometric data satisfies biometric authentication criteria. As shown in FIG. 21L, the electronic device 2100 displays (e.g., replaces display of the locked state indicator 2142 with) a biometric authentication processing glyph 2144 to indicate that the electronic device is processing biometric data. In FIG. 21M, the electronic device 2100 determines that biometric authentication performed during display of the alternative authentication interface 2140 is successful. As a result, the electronic device 2100 displays (e.g., replaces display of the biometric authentication processing glyph 2144 with) a biometric authentication success glyph 2146 to indicate that the biometric authentication was successful. In some examples, the electronic device 2100 further completes progress of a passcode progress indicator, and optionally, provides a tactile output 2141 to indicate the successful biometric authentication.

Figure 21N:
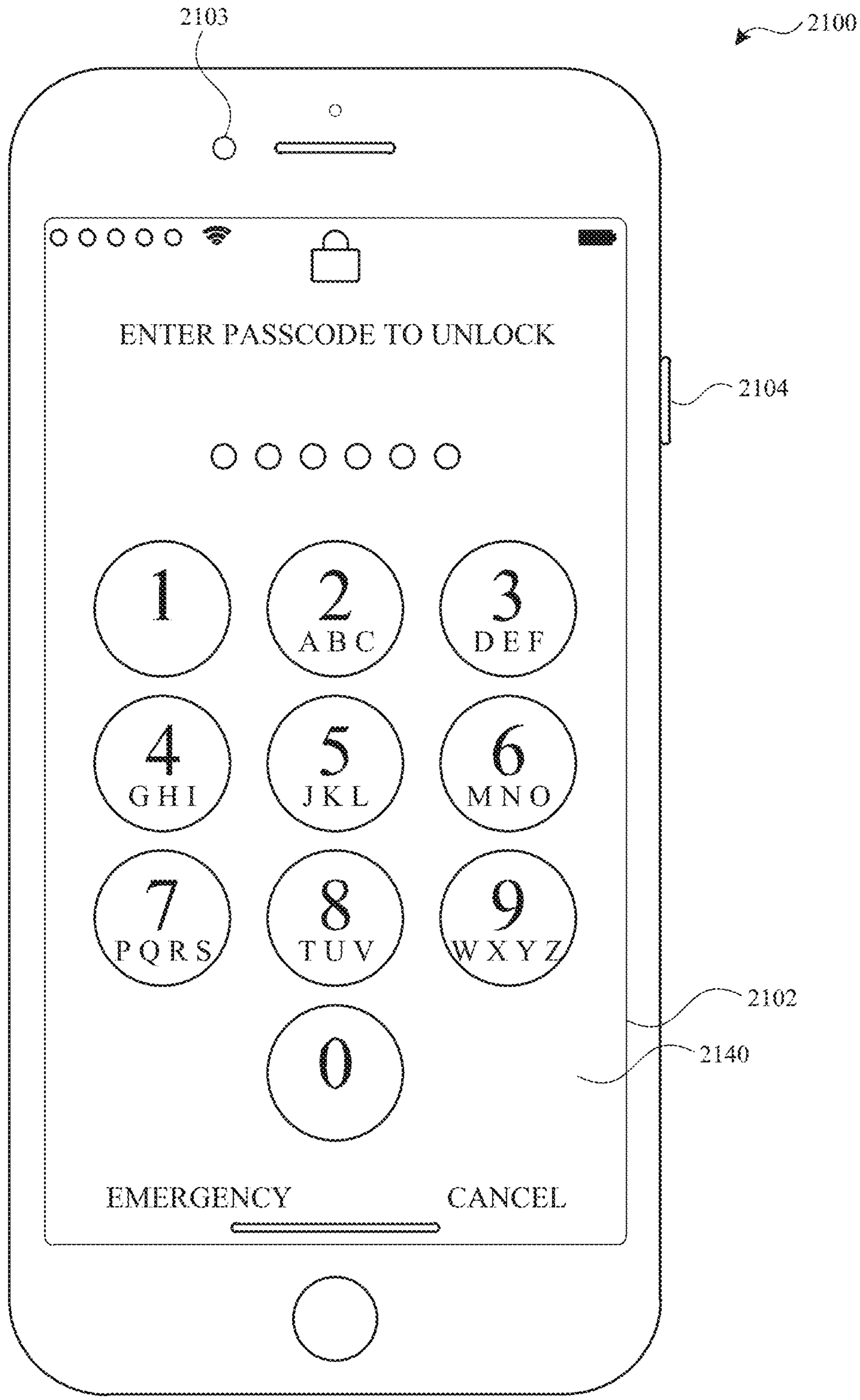
Figure 21O:
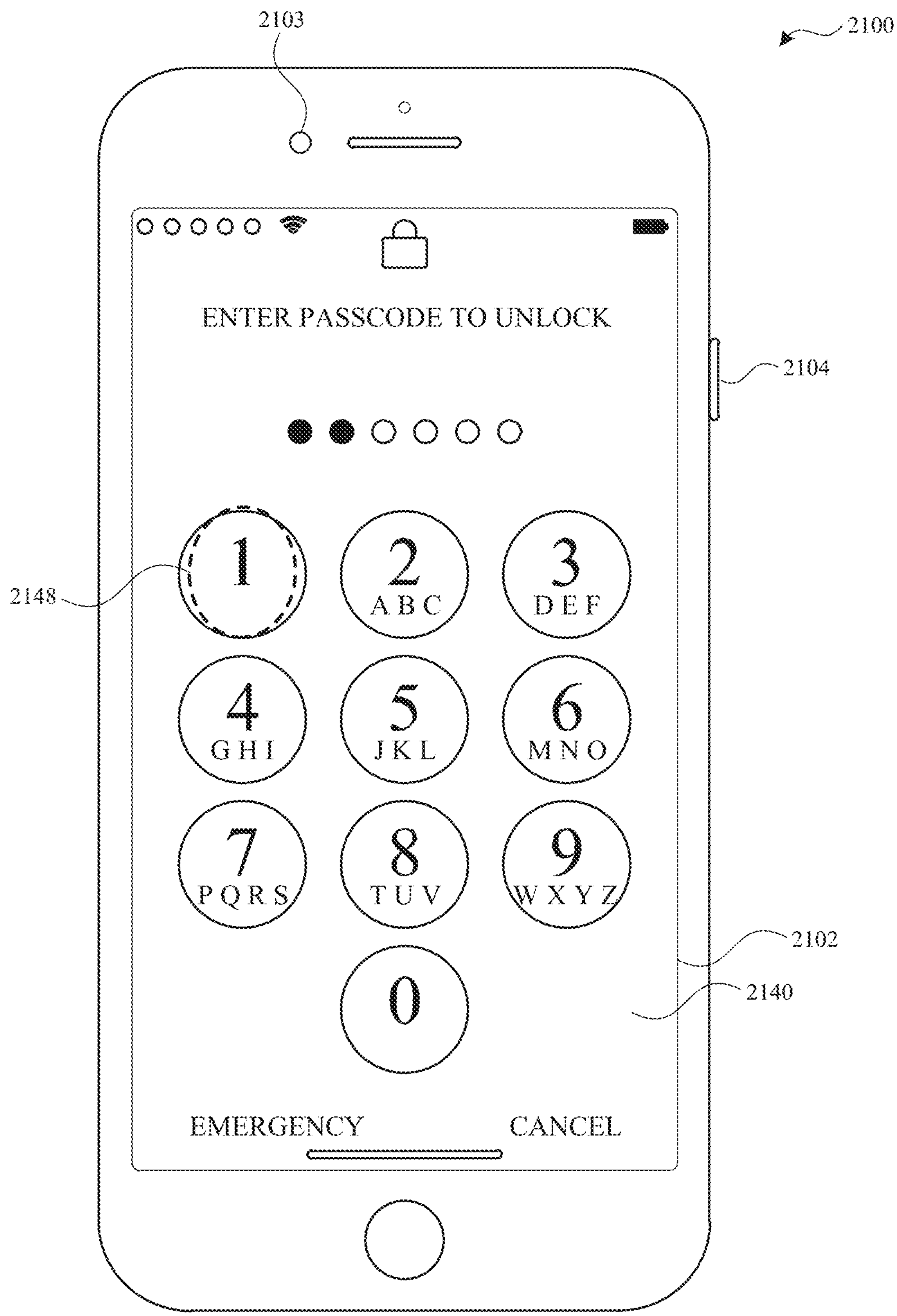
Figure 21P:
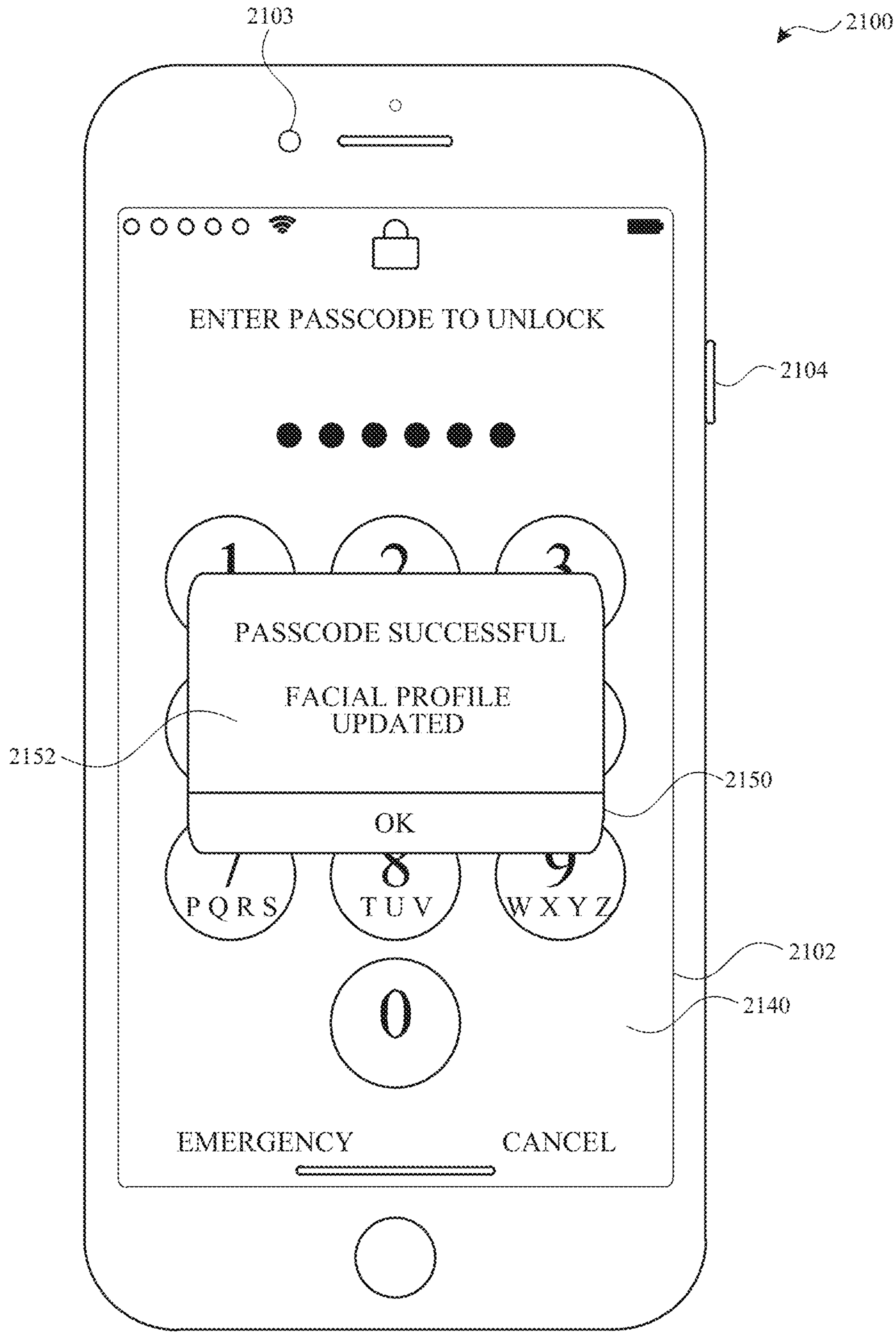

Alternatively, with reference to FIGS. 21N-P, a user inputs a passcode during display of the alternative authentication interface 2140 to authenticate with the electronic device 2100. As shown in FIG. 21, the electronic device 2100 displays the alternative authentication interface 2140, and as shown in FIG. 21O, receives a passcode, at least in part, in response to the tap gesture 2148 and, optionally, one or more other inputs indicating additional alphanumeric digits of the passcode. In FIG. 21P, the electronic device 2100 determines that the passcode is valid and in response displays a notification 2150 indicating that the passcode was valid and that the user is authenticated with the electronic device 2100.

In some examples, in response to entry of a valid passcode, the electronic device 2100 selectively stores and/or updates biometric data. For instance, in response to entry of a valid passcode, the electronic device 2100 obtains biometric data (e.g., facial biometric data), and compares the biometric data to biometric data stored in the electronic device. If, in some examples, the obtained biometric data is sufficiently similar to the stored biometric data, the electronic device stores the obtained biometric data and/or updates the previously stored biometric data to improve biometric authentication. In FIG. 21P, the electronic device determines that the biometric data, obtained in response to entry of the valid passcode, is sufficiently similar to stored biometric data. In response, the electronic device stores the obtained biometric data and/or updates stored biometric data, and displays an indication 2152 that the biometric data has been updated. In this manner, the electronic device 2100 provides an adaptive biometric authentication.

Figure 21Q:
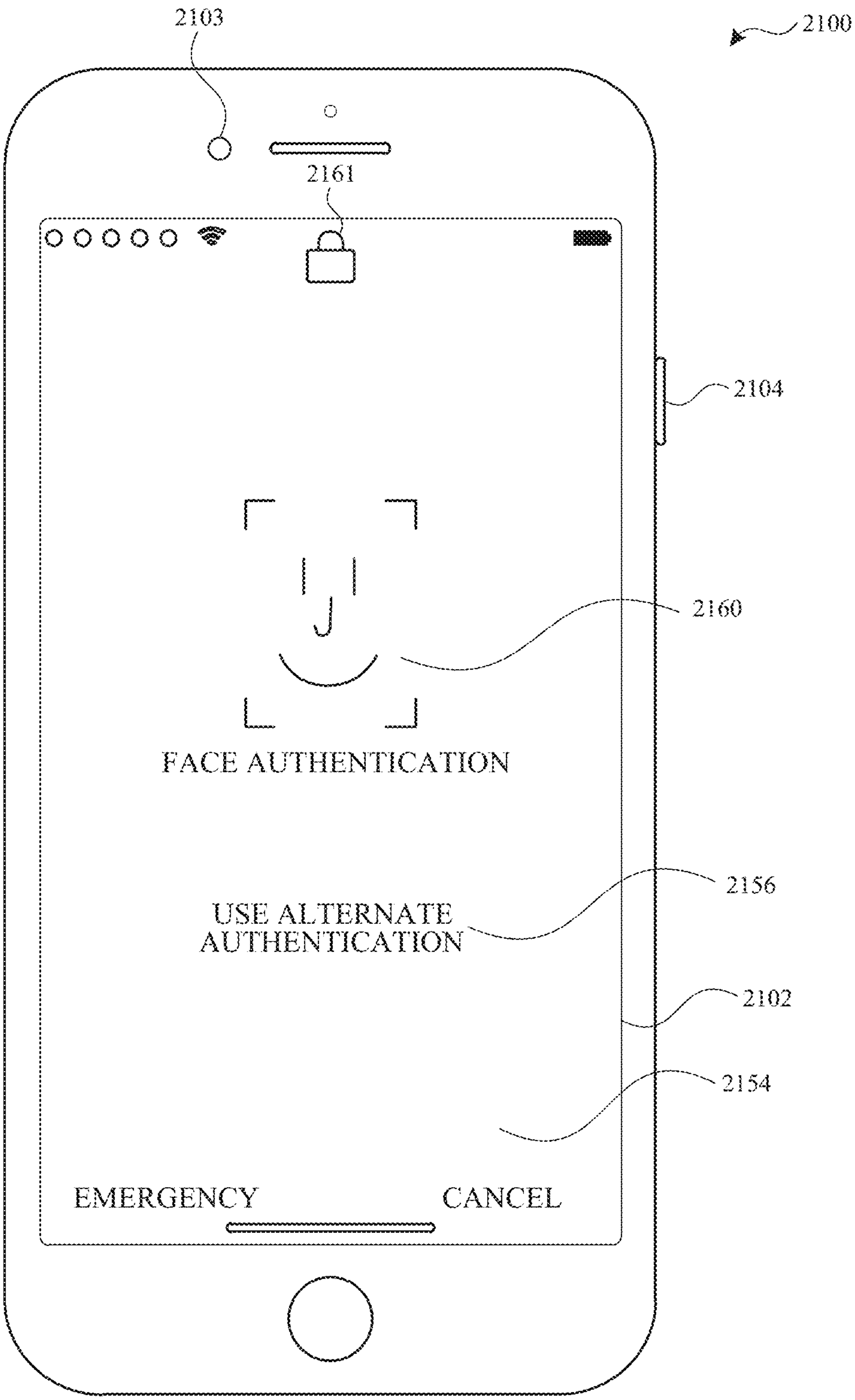
Figure 21R:
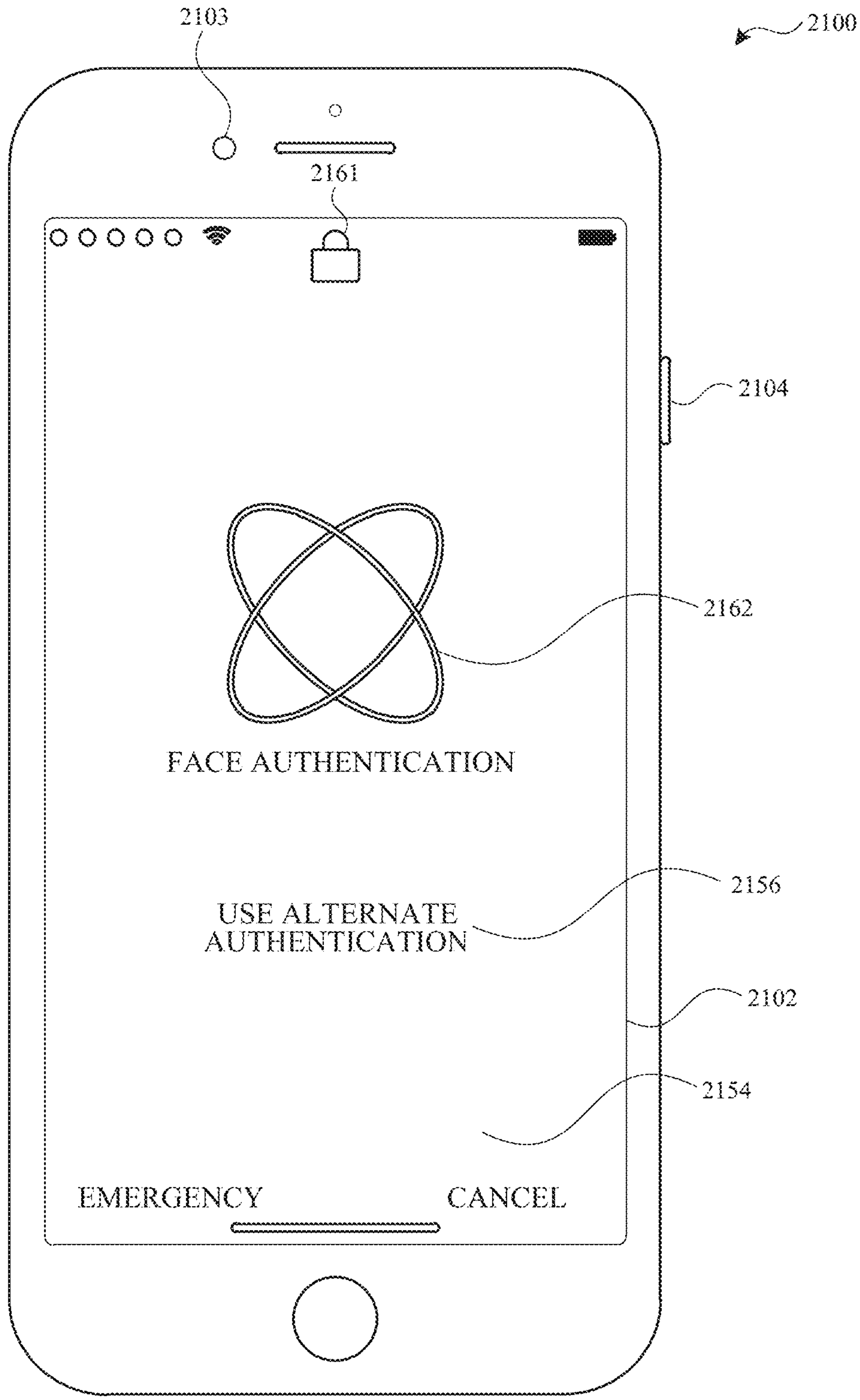

As described with reference to FIGS. 21A-C, in some examples, the electronic device 2100 performs biometric authentication in response to a wake condition. In some examples, the electronic device receives a request to access secure content (e.g., content requiring authentication for access), such as a swipe gesture requesting access to a home screen, before biometric authentication has completed. Accordingly, with reference to FIGS. Q-S, in response to receiving a request to access secure content, the electronic device 2100 displays interstitial interfaces to indicate that the electronic device has not yet completed biometric authentication. In FIG. 21Q, the electronic device displays an interstitial interface 2154 including an alternative authentication affordance 2156 and a biometric authentication glyph 2160 indicating initiation of biometric authentication. Activation of the alternative authentication affordance 2156 causes the electronic device to display (e.g., replace display of the interstitial interface 2154 with) an alternative authentication interface (e.g., alternative authentication interface 2140 of FIG. 21K) The biometric authentication glyph 2160 is a simulation of a representation of the biometric feature in some examples.

Once the electronic device 2100 has obtained biometric data in response to initiating biometric authentication, the electronic device processes the biometric data, as described. In some examples, while the electronic device processes the biometric data, the electronic device displays (e.g., replaces display of the biometric authentication glyph 2160 with) biometric authentication glyph 2162 to indicate that the biometric data is being processed. In some examples, the biometric authentication glyph 2162 includes a plurality of rings, which rotate spherically, for instance, while displayed.

Figure 21S:
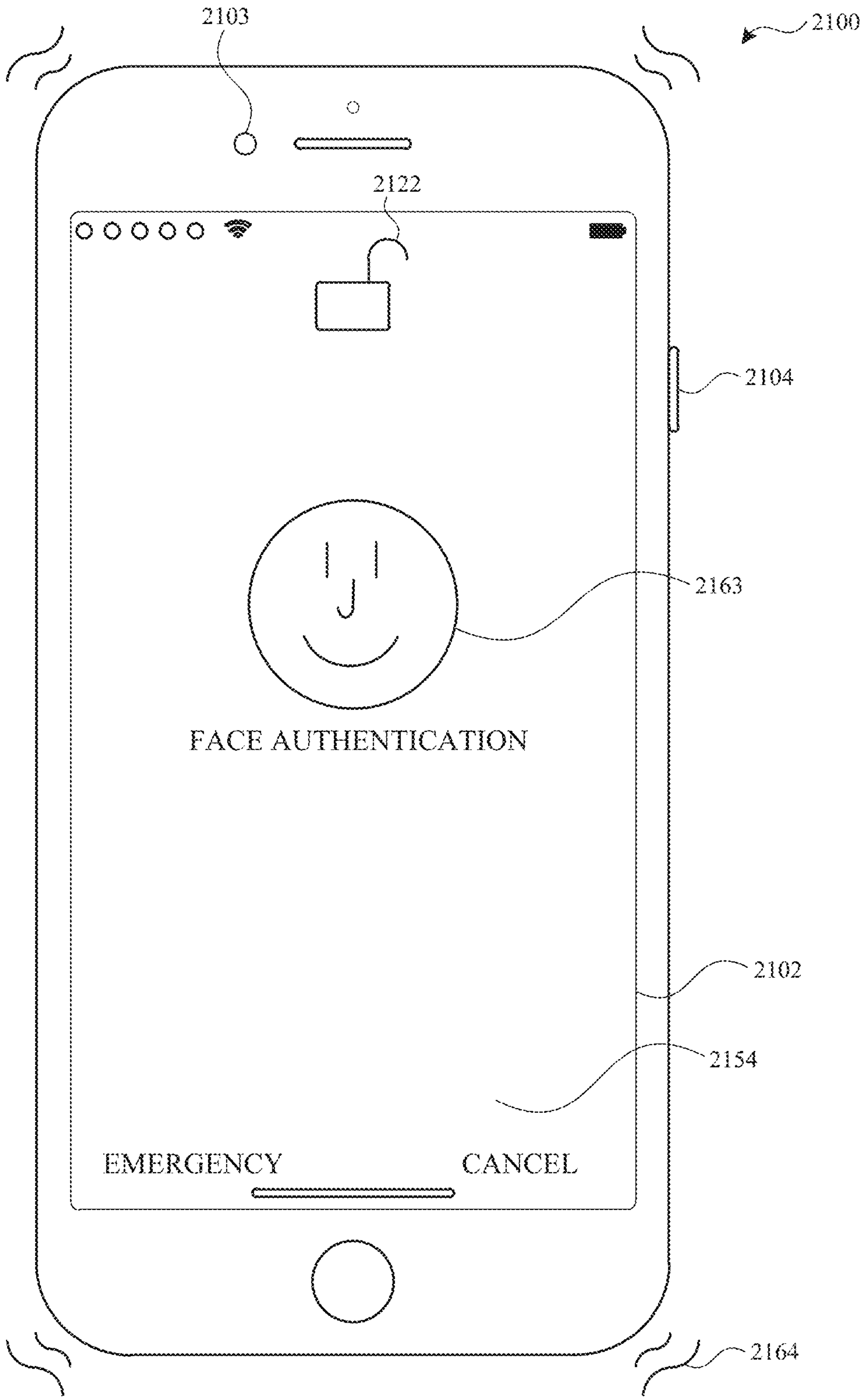

In FIG. 21S, the electronic device 2100 determines that the biometric data satisfies the biometric authentication criteria. In response, the electronic device 2100 displays (e.g., replaces display of the biometric authentication glyph 2162 with) a biometric authentication glyph 2163 in the interstitial interface 2154, indicating that the biometric authentication was successful. In some examples, the electronic device ceases display of the alternative authentication affordance 2156. Additionally or alternatively, the electronic device displays (e.g., replaces display of locked state indicator 2161 with) an unlocked state indicator 2122 and/or outputs a tactile output 2164, indicating the biometric authentication was successful.

As described, in some instances, the electronic device receives a request to access secure before biometric authentication has completed. In some examples, the electronic device receives the request after the electronic device has begun to process biometric data, but prior to completing biometric authentication. In such instances, the electronic device optionally displays the interstitial interface 2154 having the biometric authentication glyph 2162, and omit first displaying the biometric authentication glyph 2160.

Figure 21T:
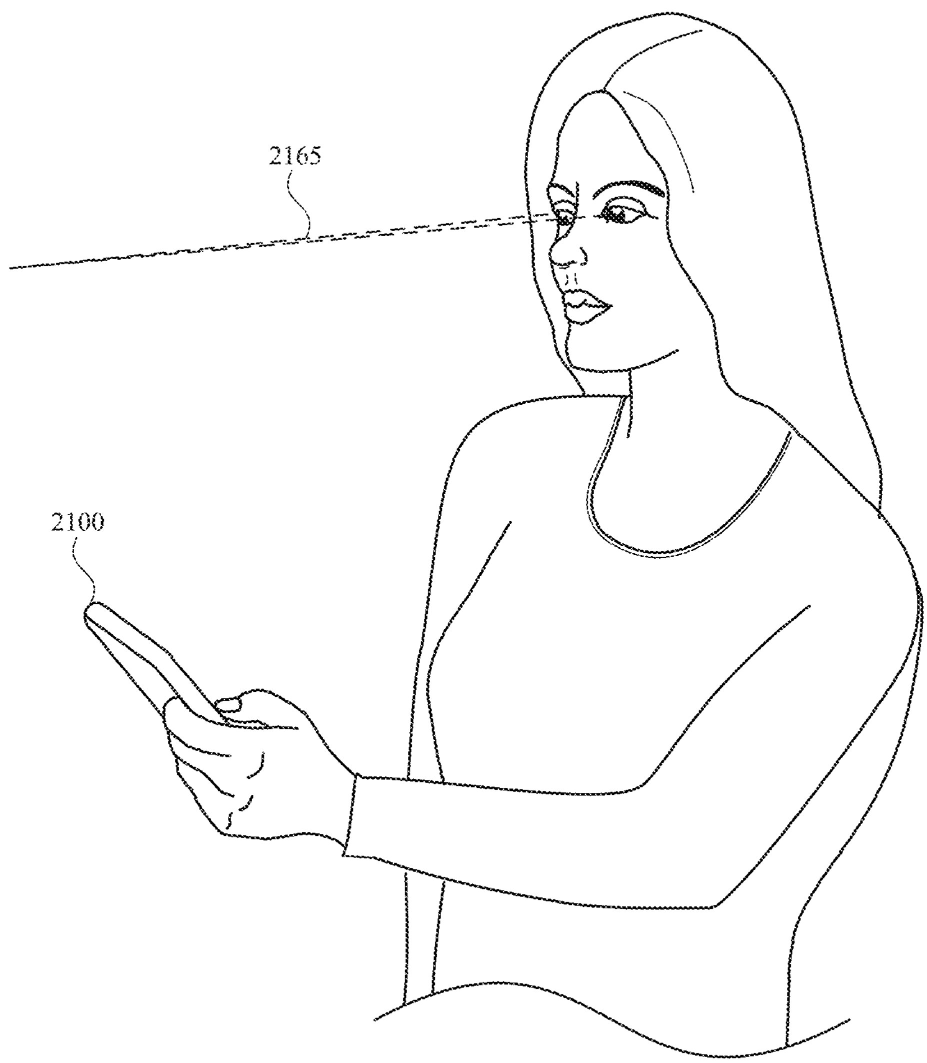
Figure 21U:
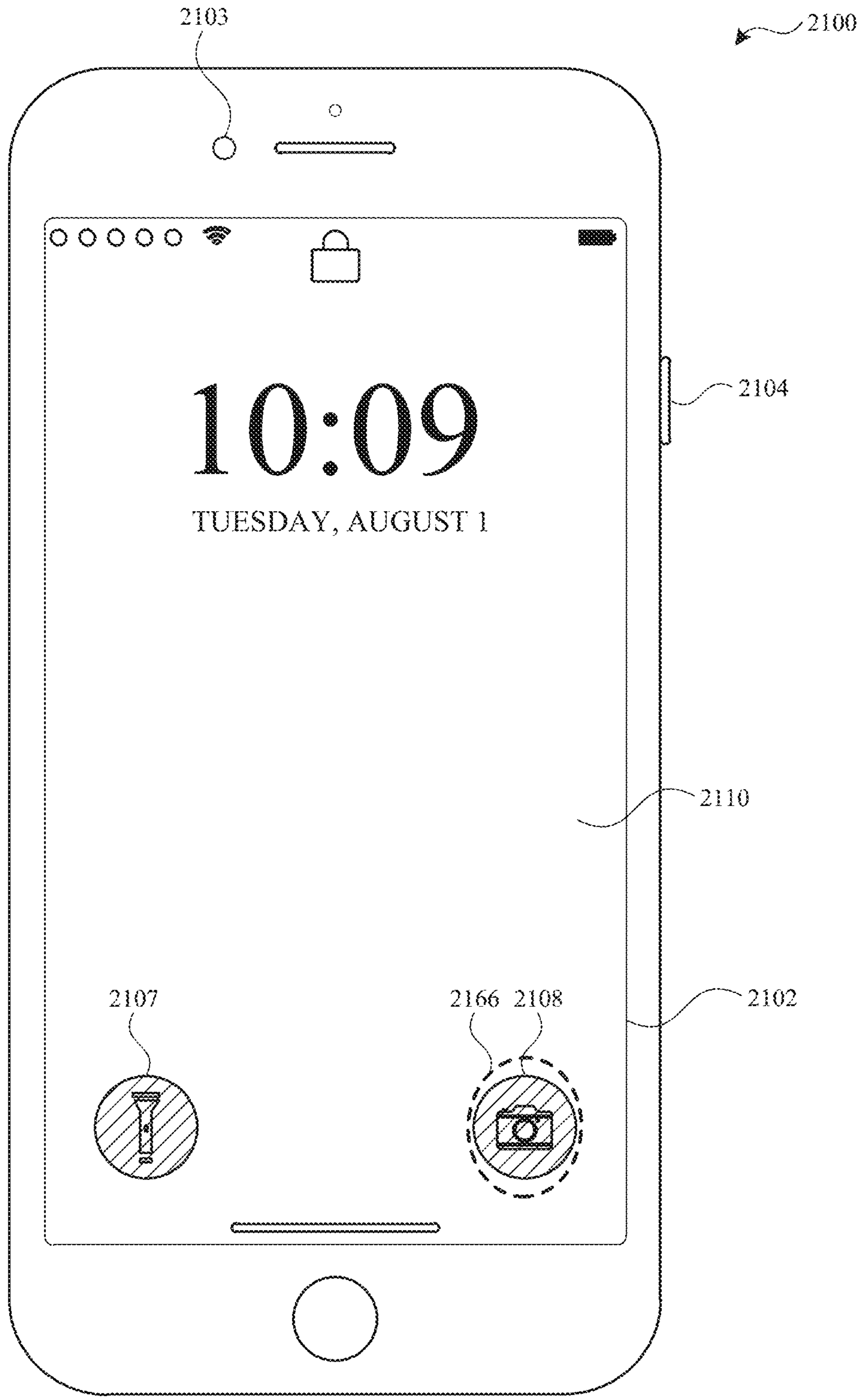

In some examples, one or more functions of the electronic device are selectively enabled based on whether a user is looking at the electronic device 2100. With reference to FIGS. 21T-Y, in some examples, some functions are disabled with the user is not looking at the electronic device 2100 and enabled when the user is looking at the electronic device 2100. In FIG. 21T, a gaze 2165 of a user is not directed at the electronic device 2100. In response to determining that the gaze 2165 is not directed at the electronic device 2100, the electronic device 2100 disables respective functions associated with the flashlight affordance 2107 and the camera affordance 2108, as shown in FIG. 21U. While the functions associated with the flashlight affordance 2107 and the camera affordance 2108 are disabled (e.g., while the user is not looking at the device 2100), the electronic device receives an activation of the camera affordance 2108. As shown, the activation is a tap gesture 2166 on camera affordance 2108. Because the function associated with the affordance is disabled, the electronic device forgoes responding to the tap gesture 2166 (e.g., forgoes loading a camera application).

Figure 21V:
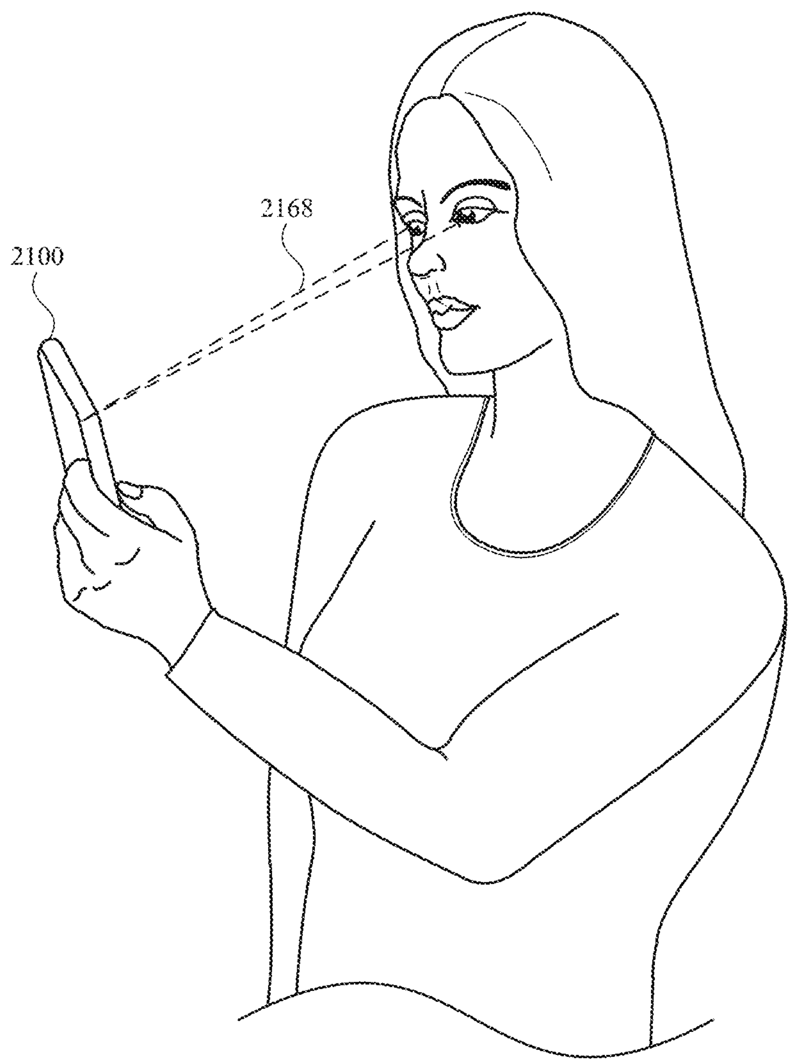
Figure 21W:
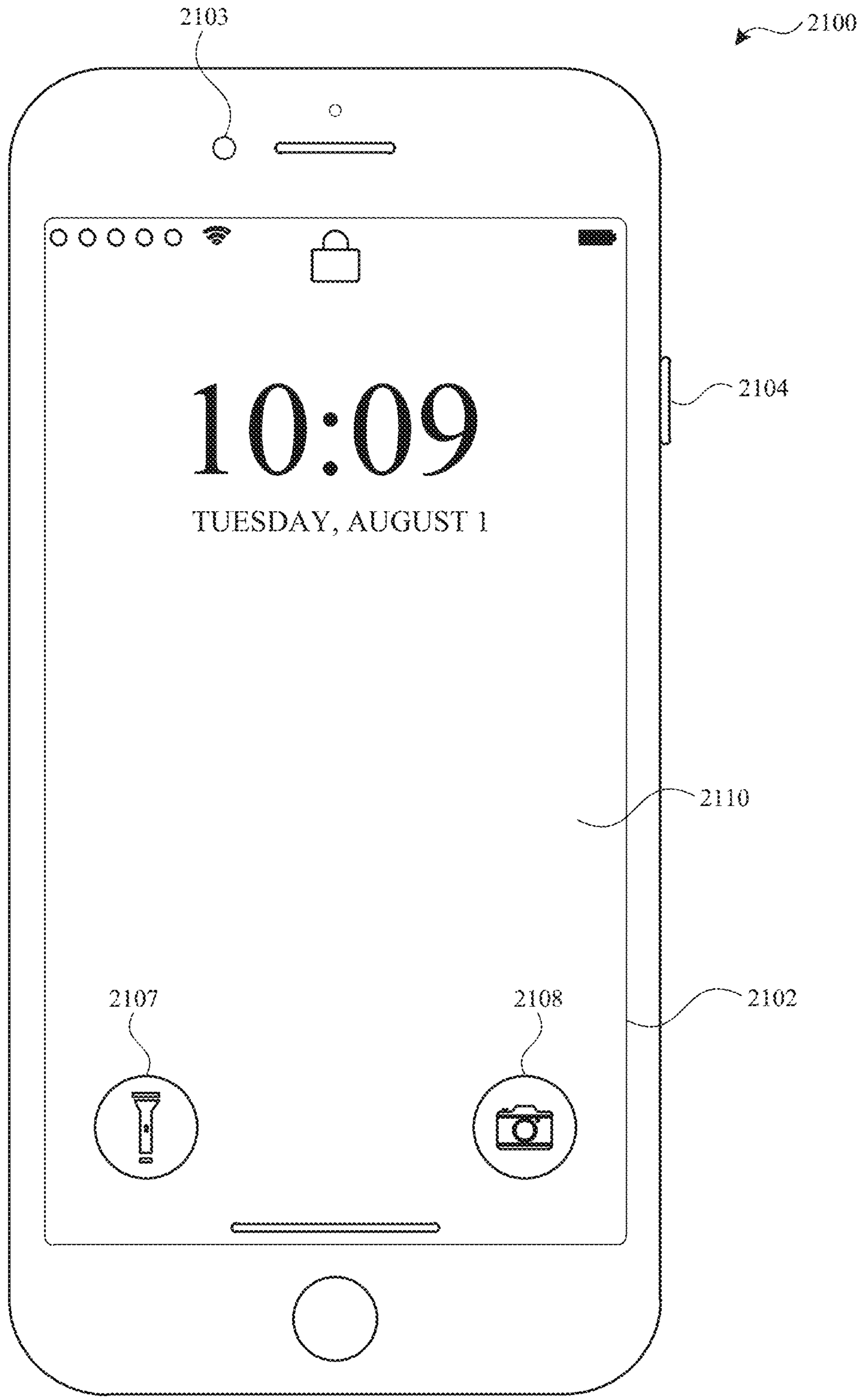
Figure 21X:
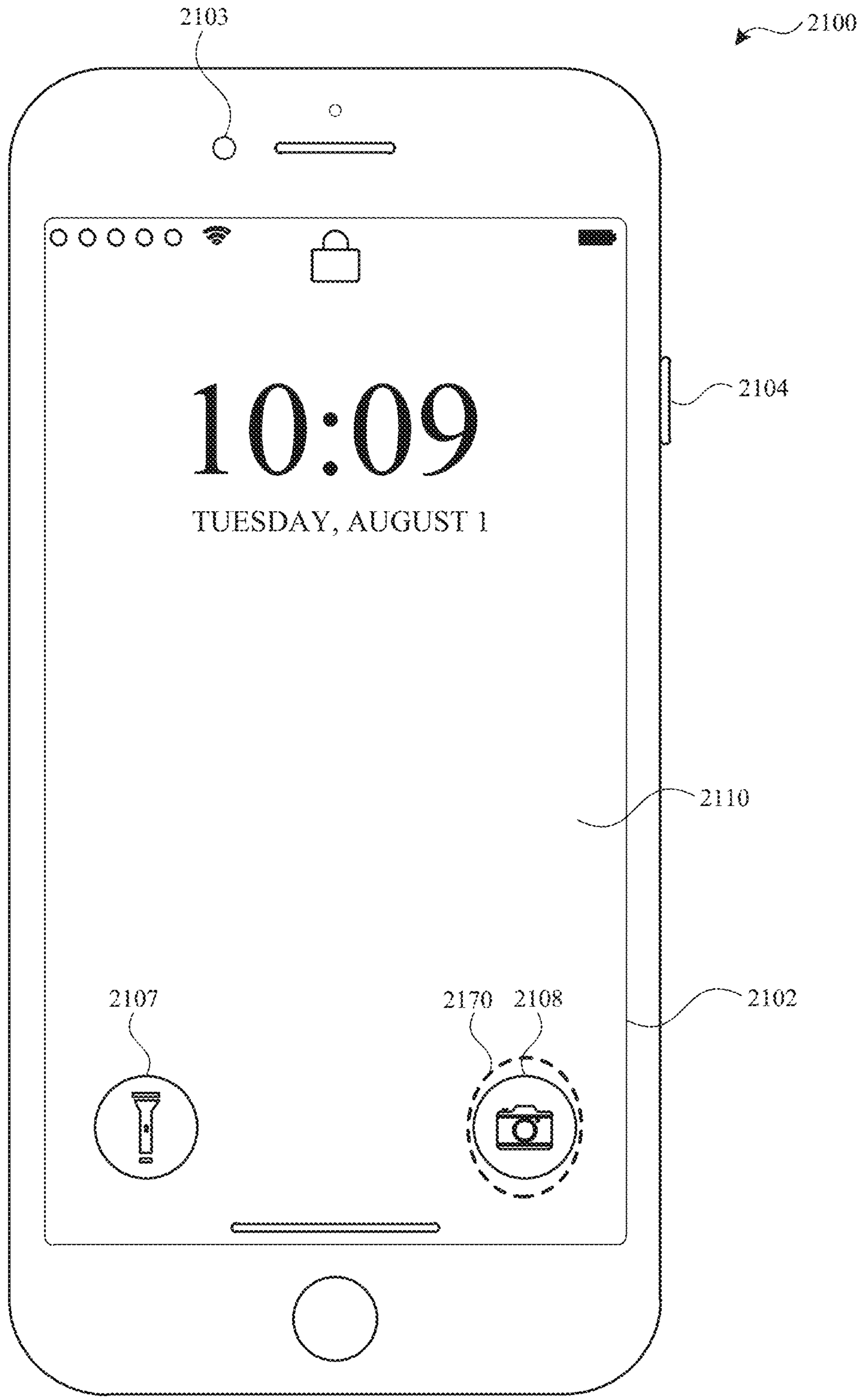
Figure 21Y:
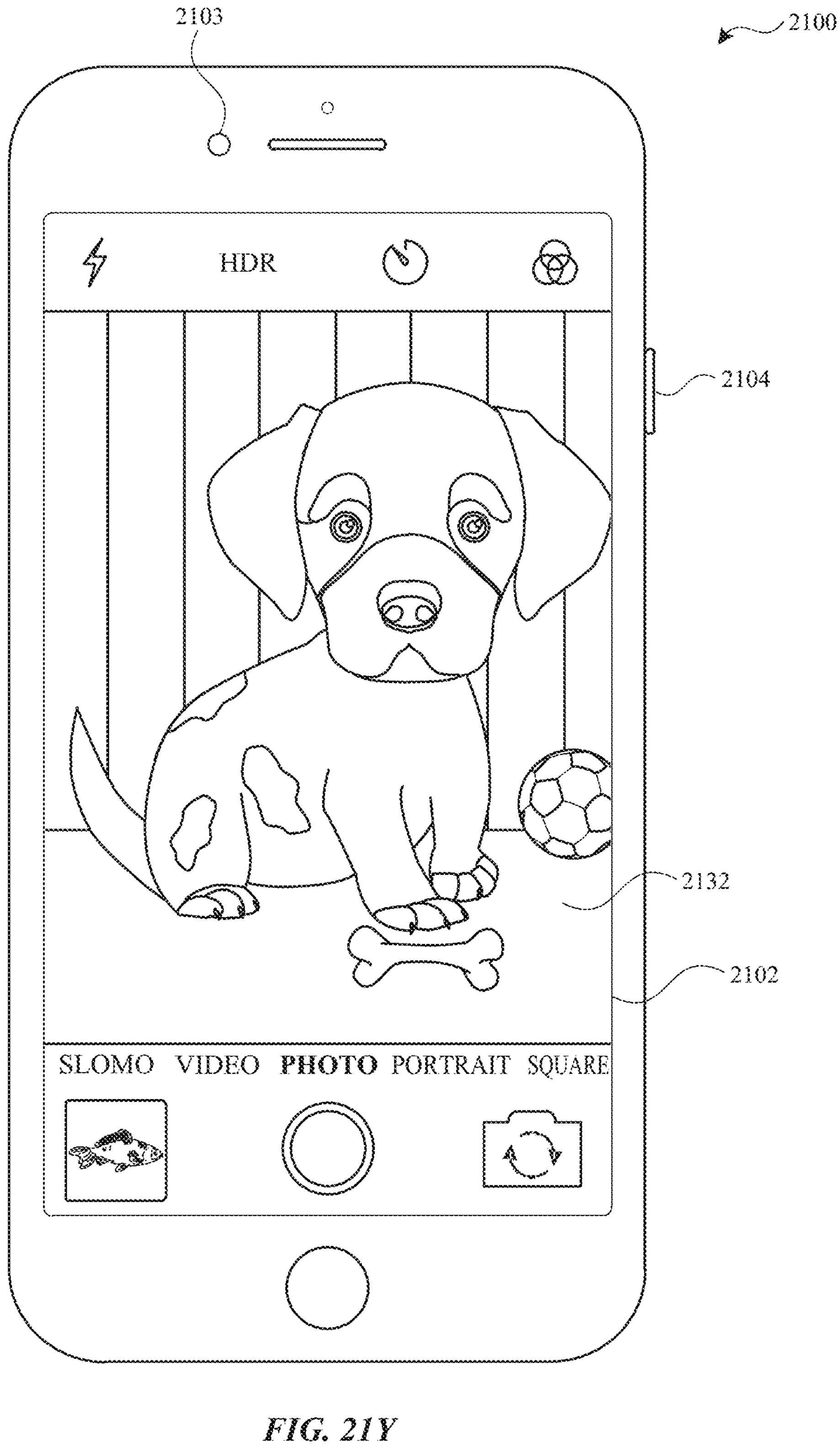

In FIG. 21V, a gaze 2168 of the user is directed at the electronic device. In response to determining that the gaze 2168 is directed at the electronic device 2100, the electronic device 2100 enables respective functions associated with the flashlight affordance 2107 and the camera affordance 2108, as shown in FIG. 21W. In FIG. 21X, the electronic device 2100 detects an activation of the camera affordance 2108. As shown, the activation is a tap gesture 2170 on camera affordance 2108. In response to the activation of the camera affordance 2108, the electronic device displays (e.g., replaces display of the locked state interface 2110), on the display 2102, a camera application interface 2132 associated with a camera application (FIG. 21Y).

Figure 21Z:
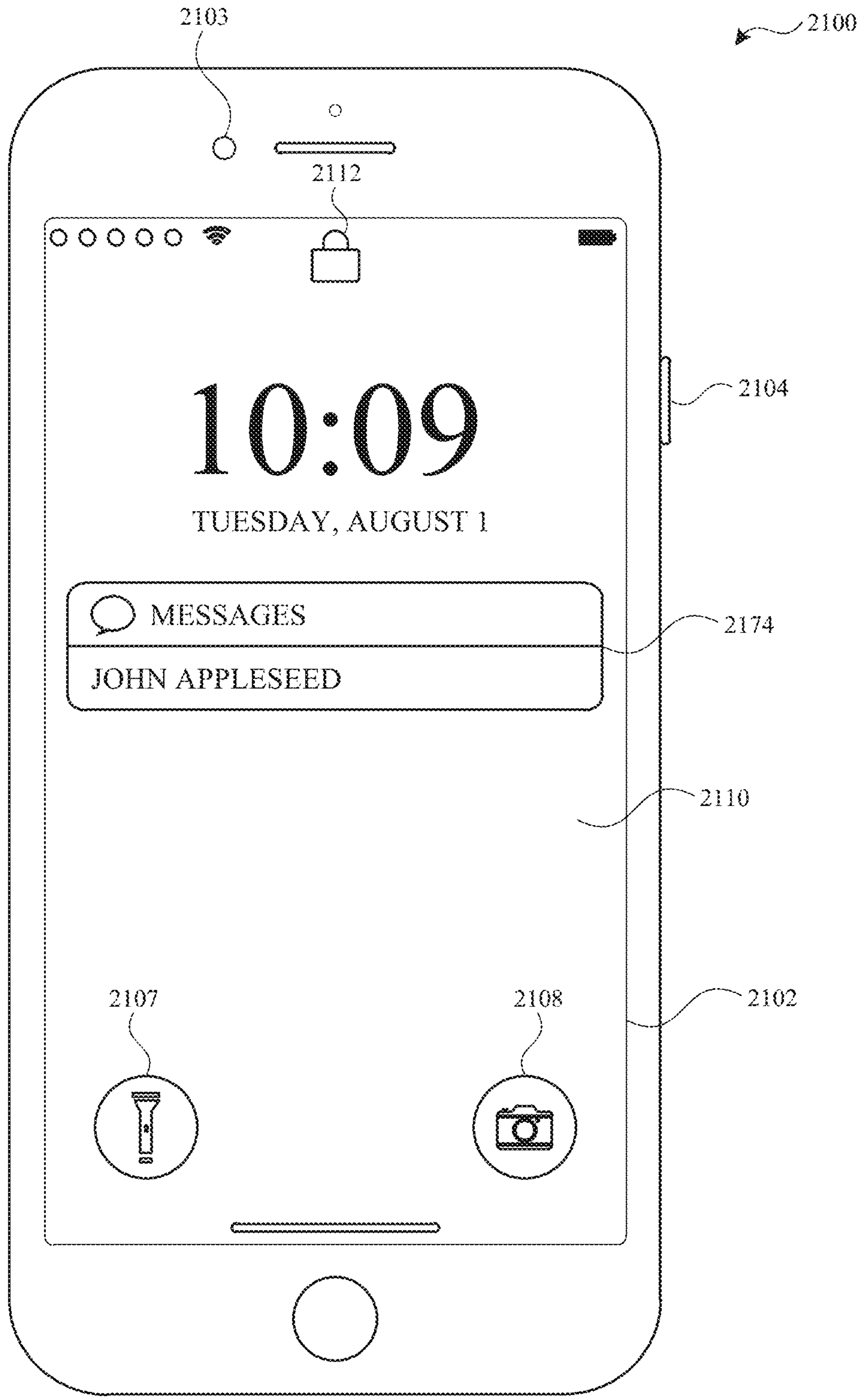
Figure 21A:
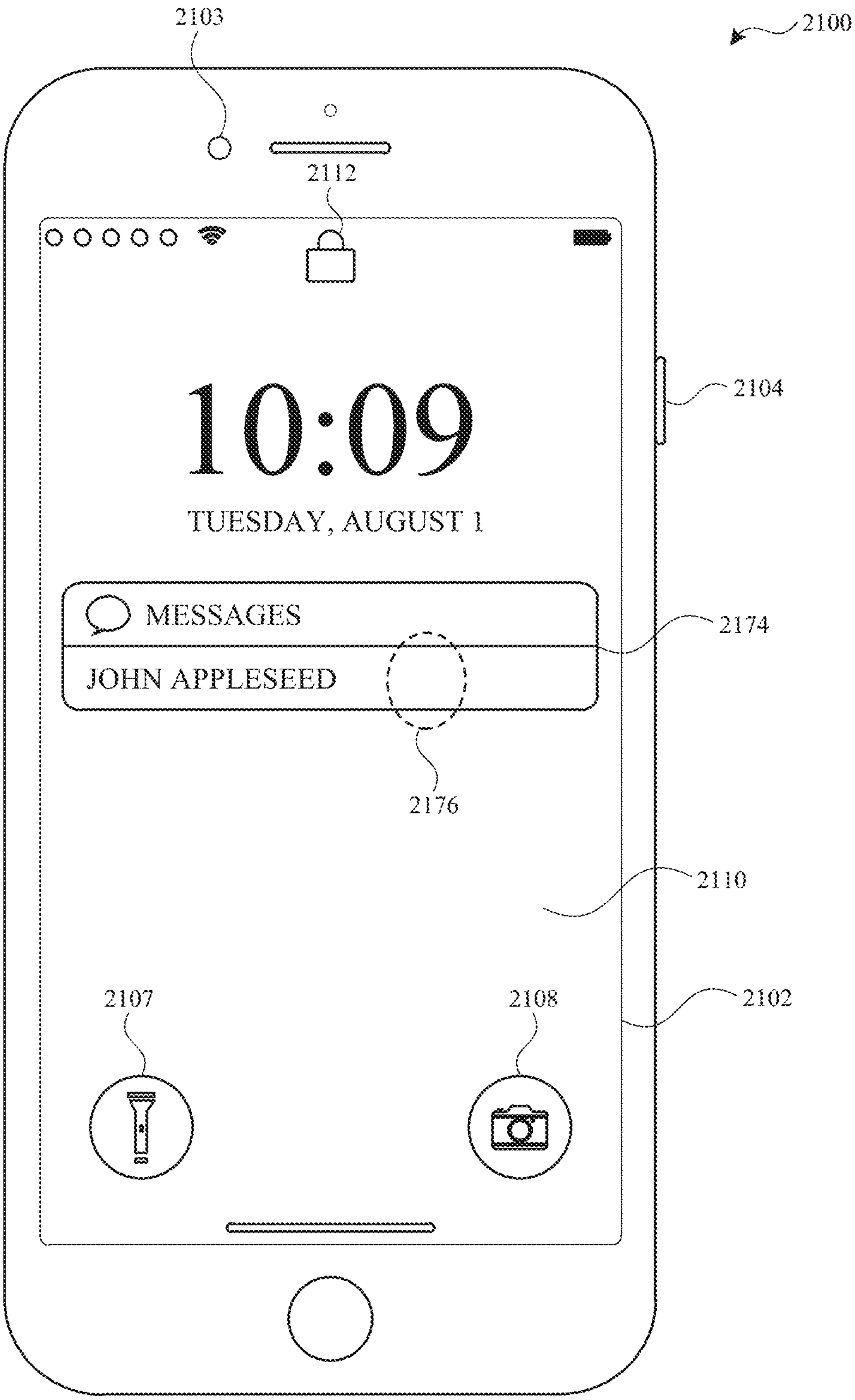
Figure 21A:
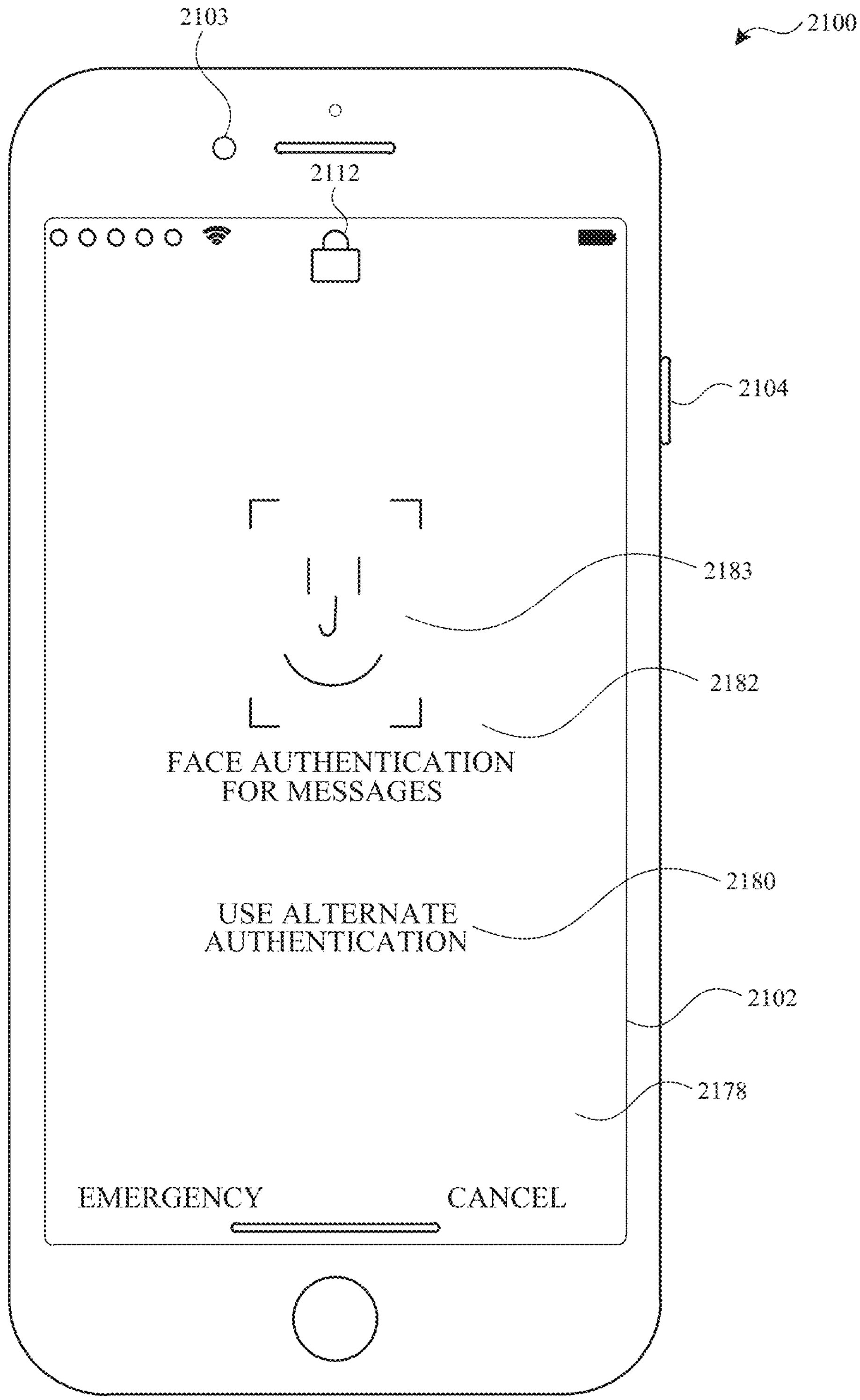
Figure 21A:
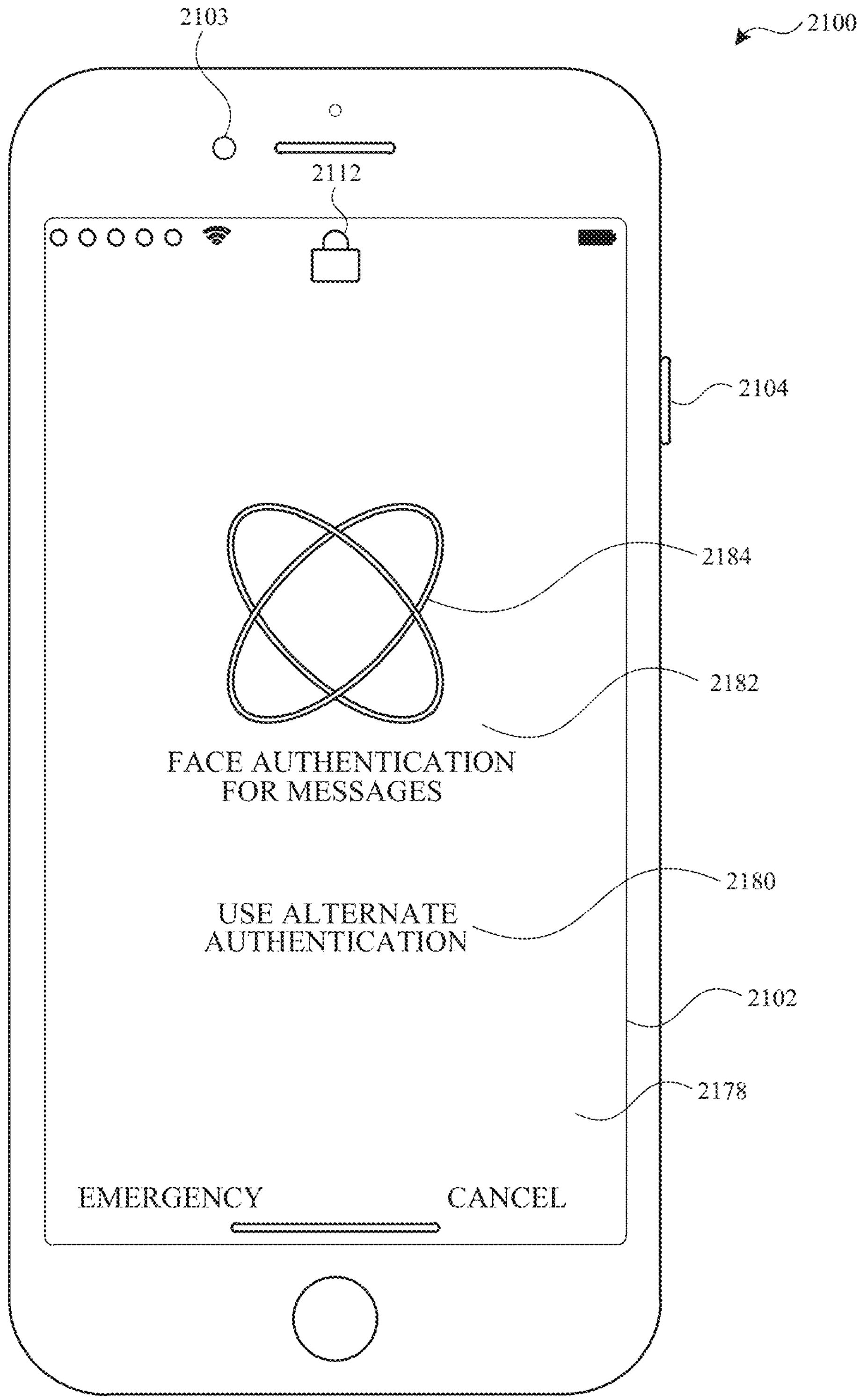
Figure 21A:
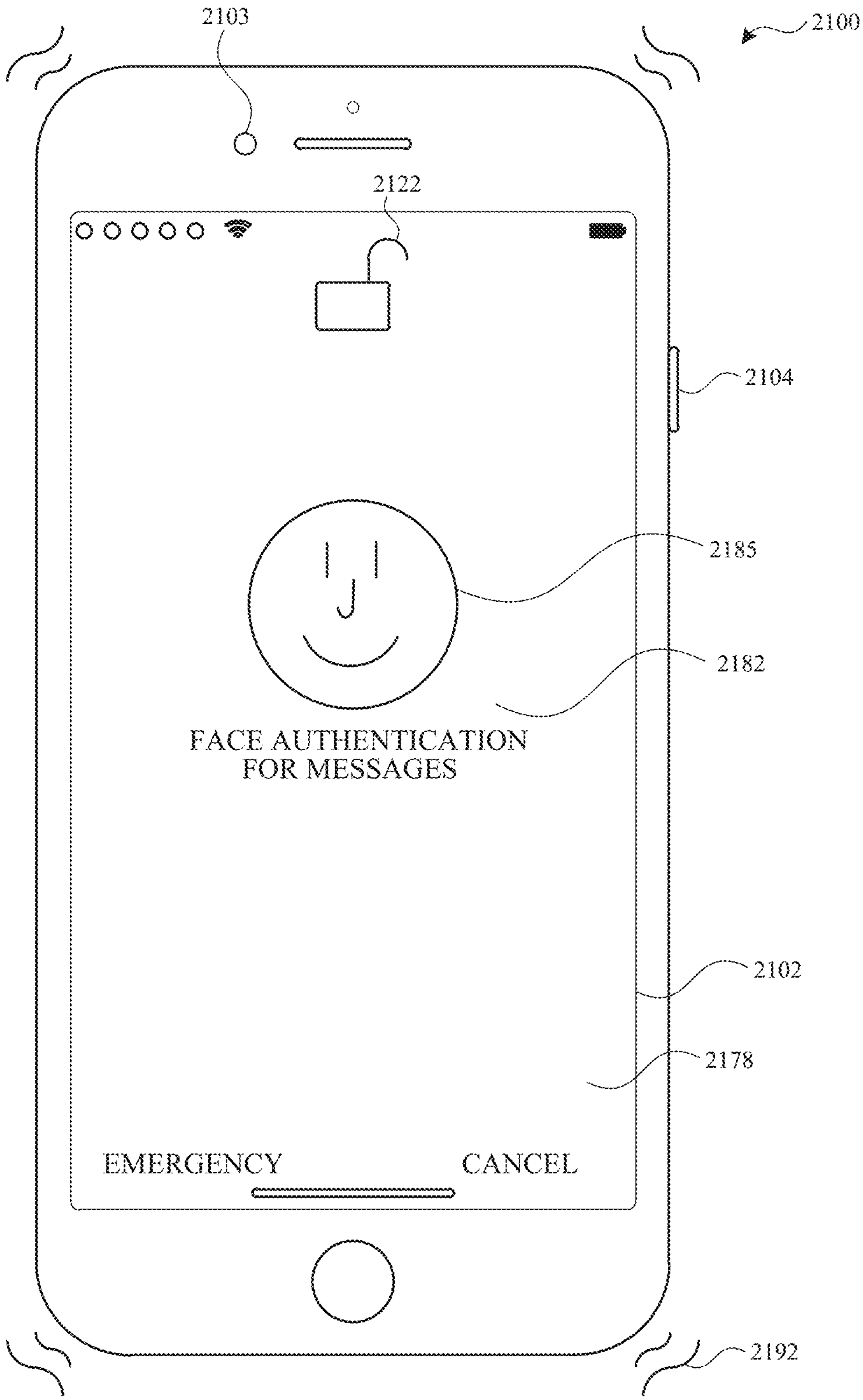
Figure 21A:
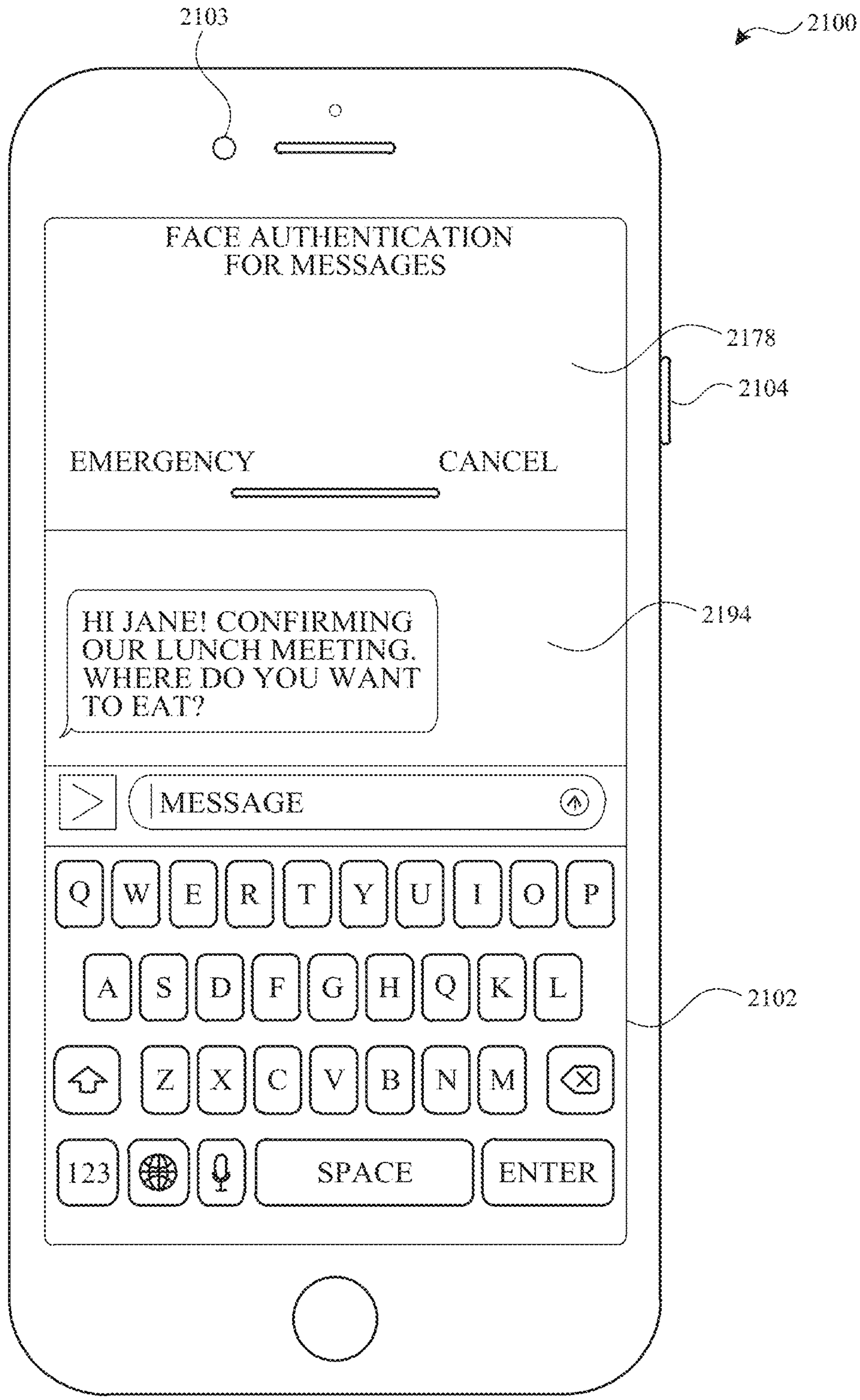
Figure 21A:
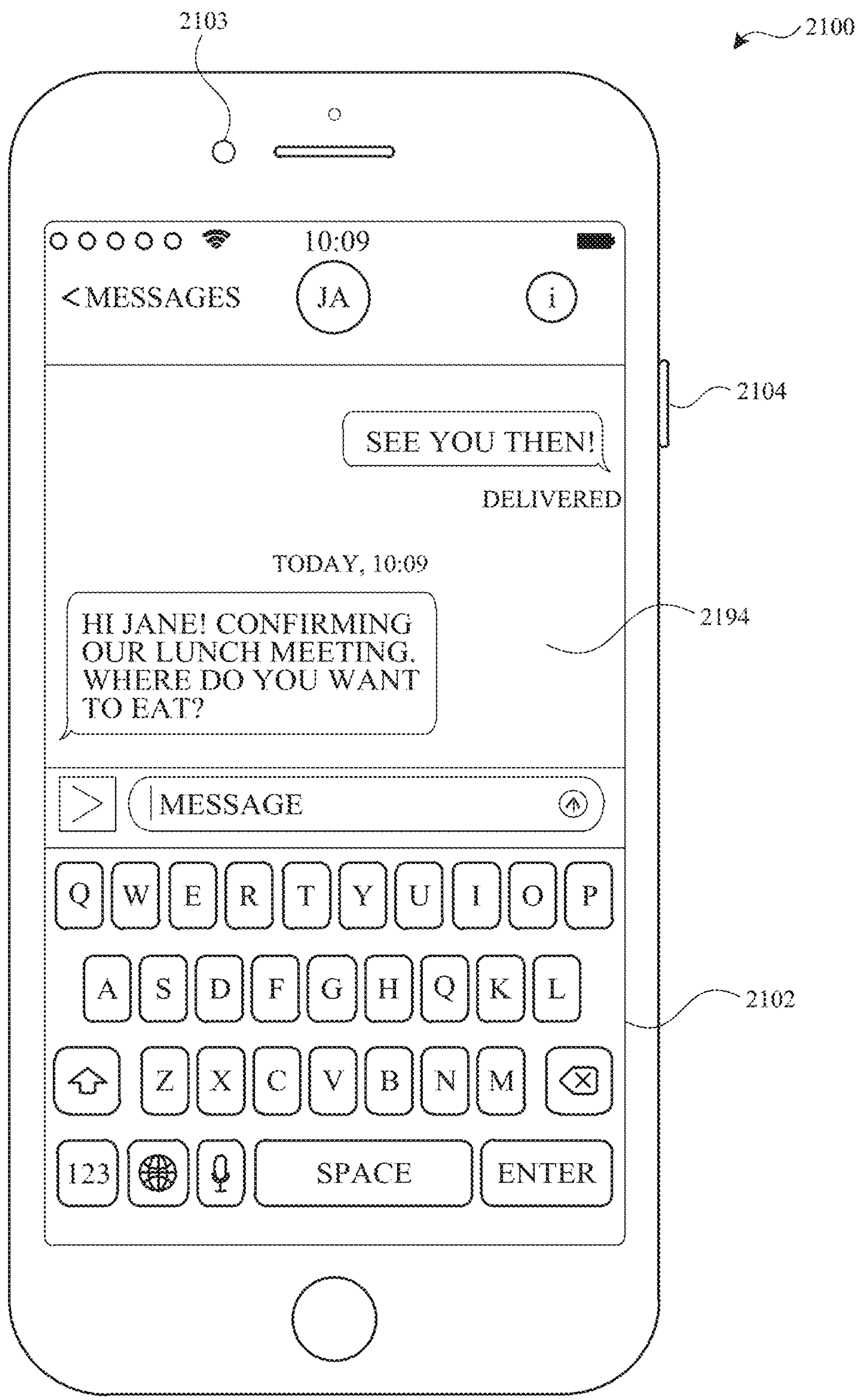
Figure 21A:
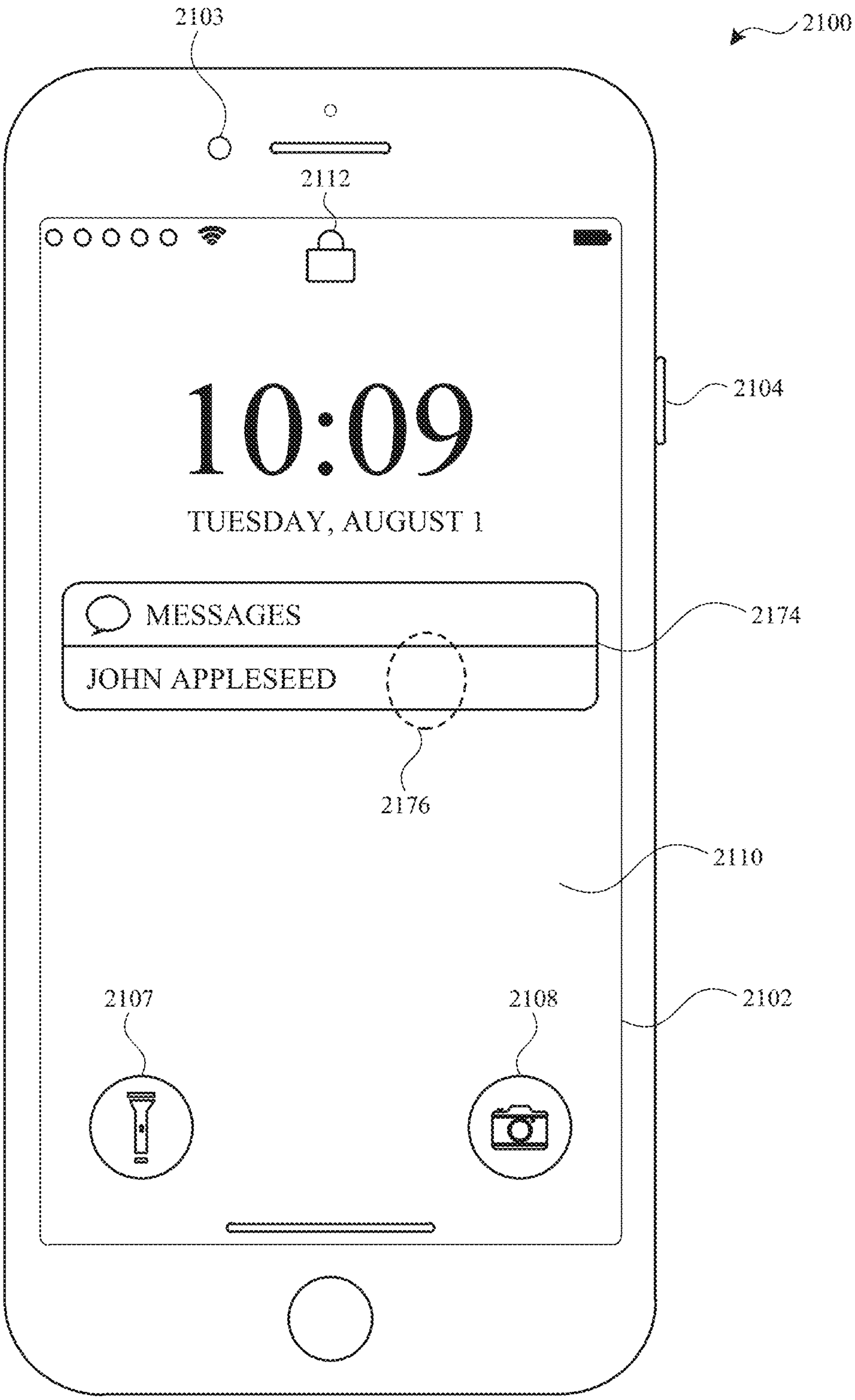
Figure 21A:
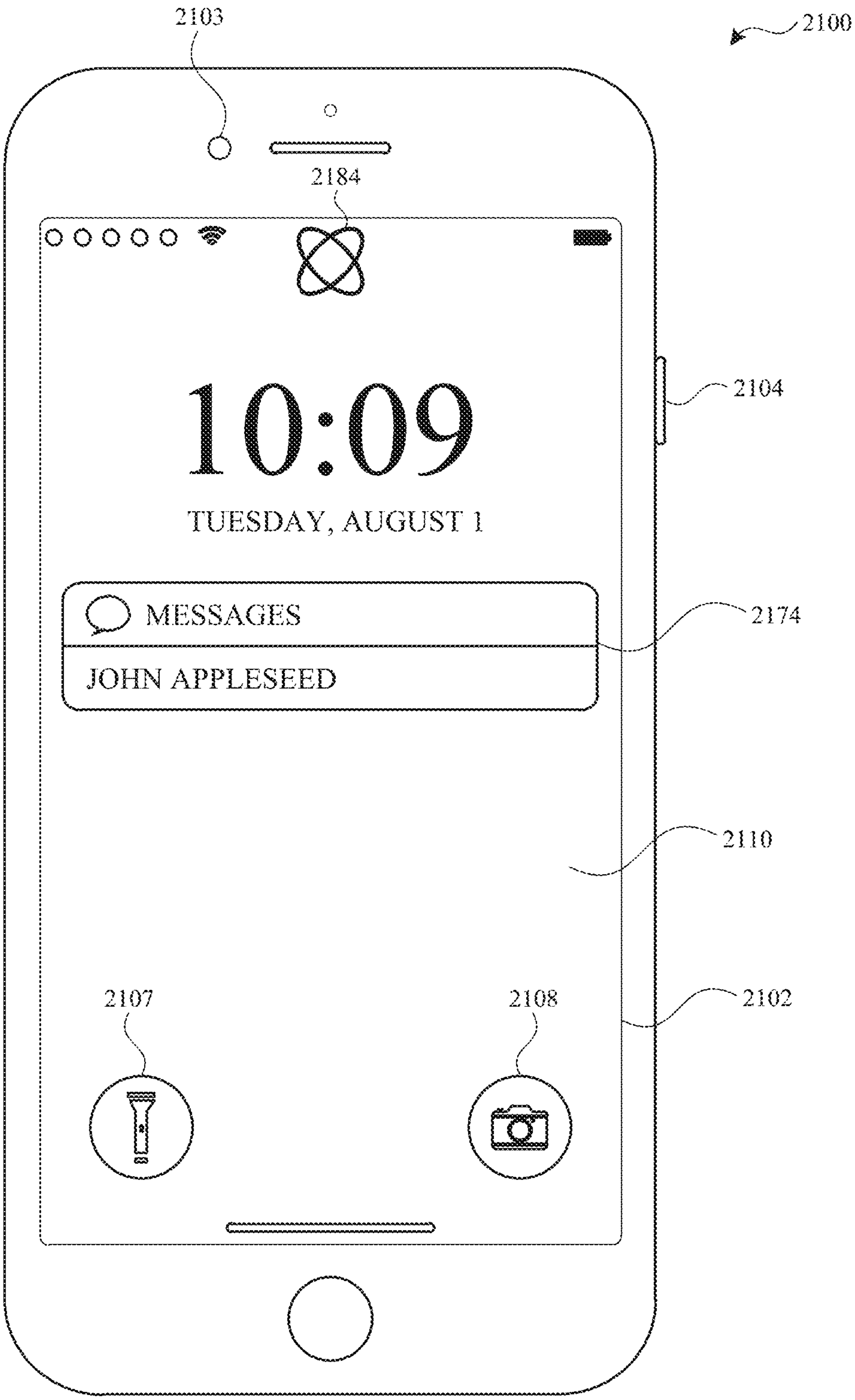
Figure 21A:
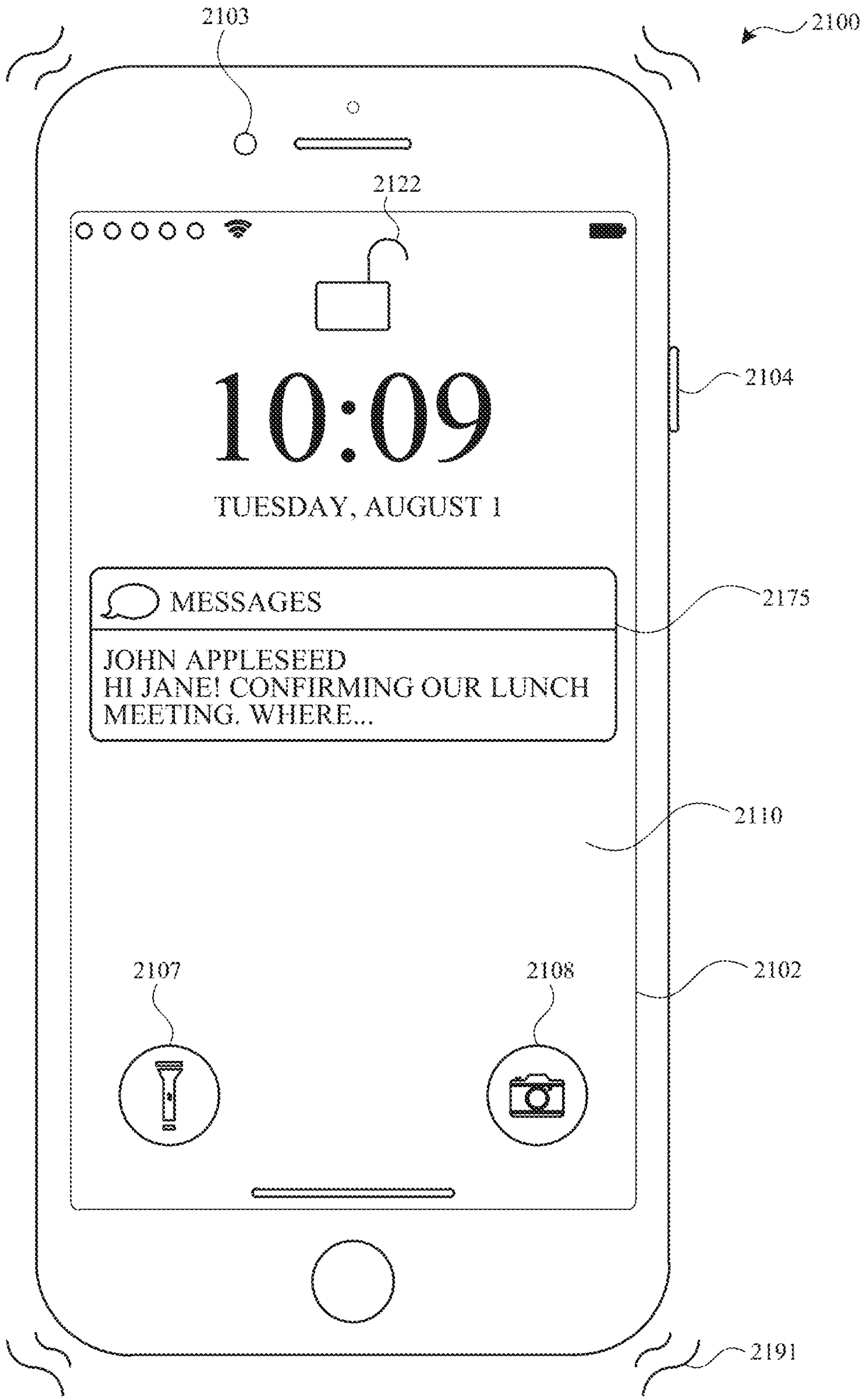
Figure 21A:
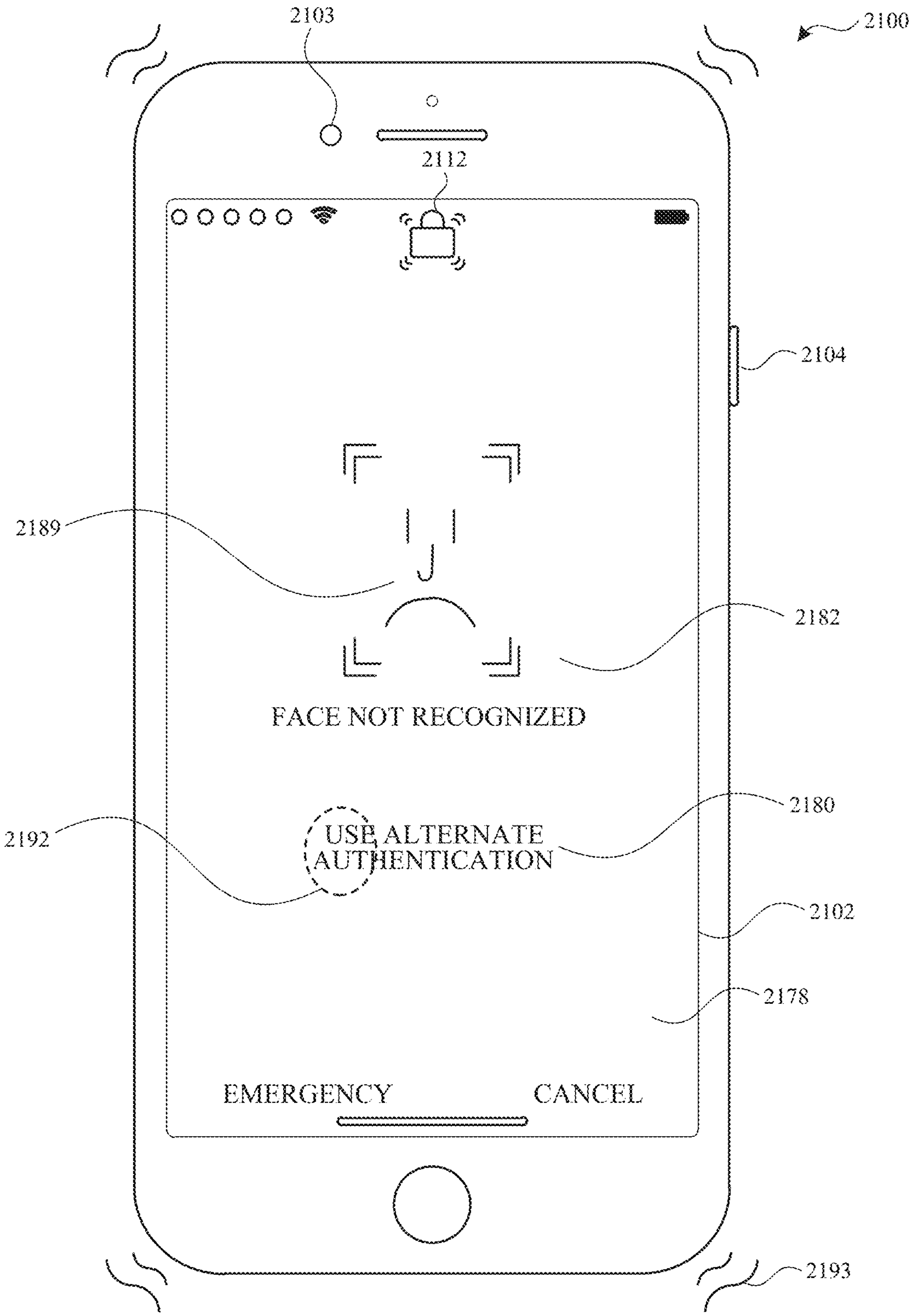
Figure 21A:
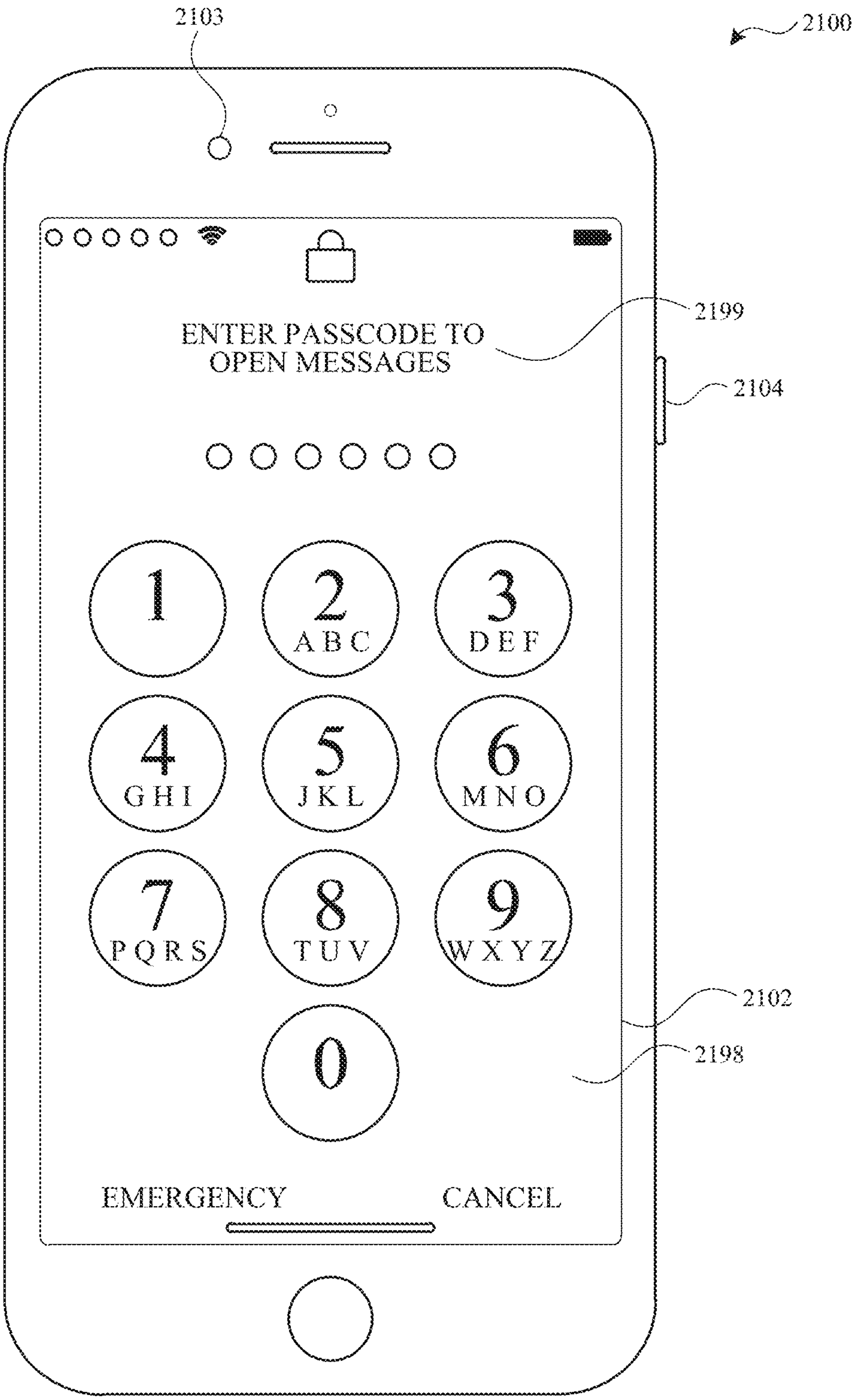
Figure 21A:
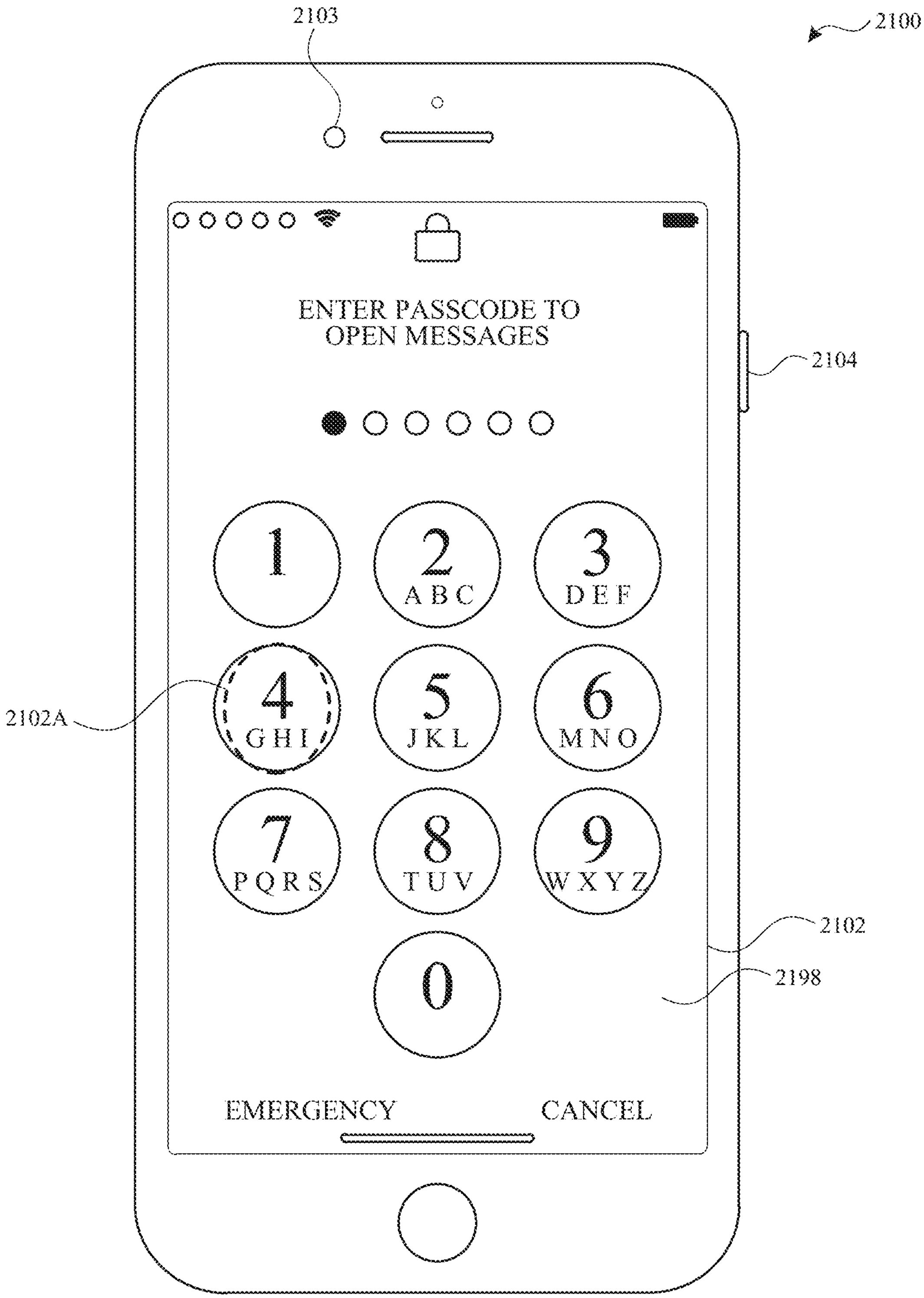
Figure 21A:
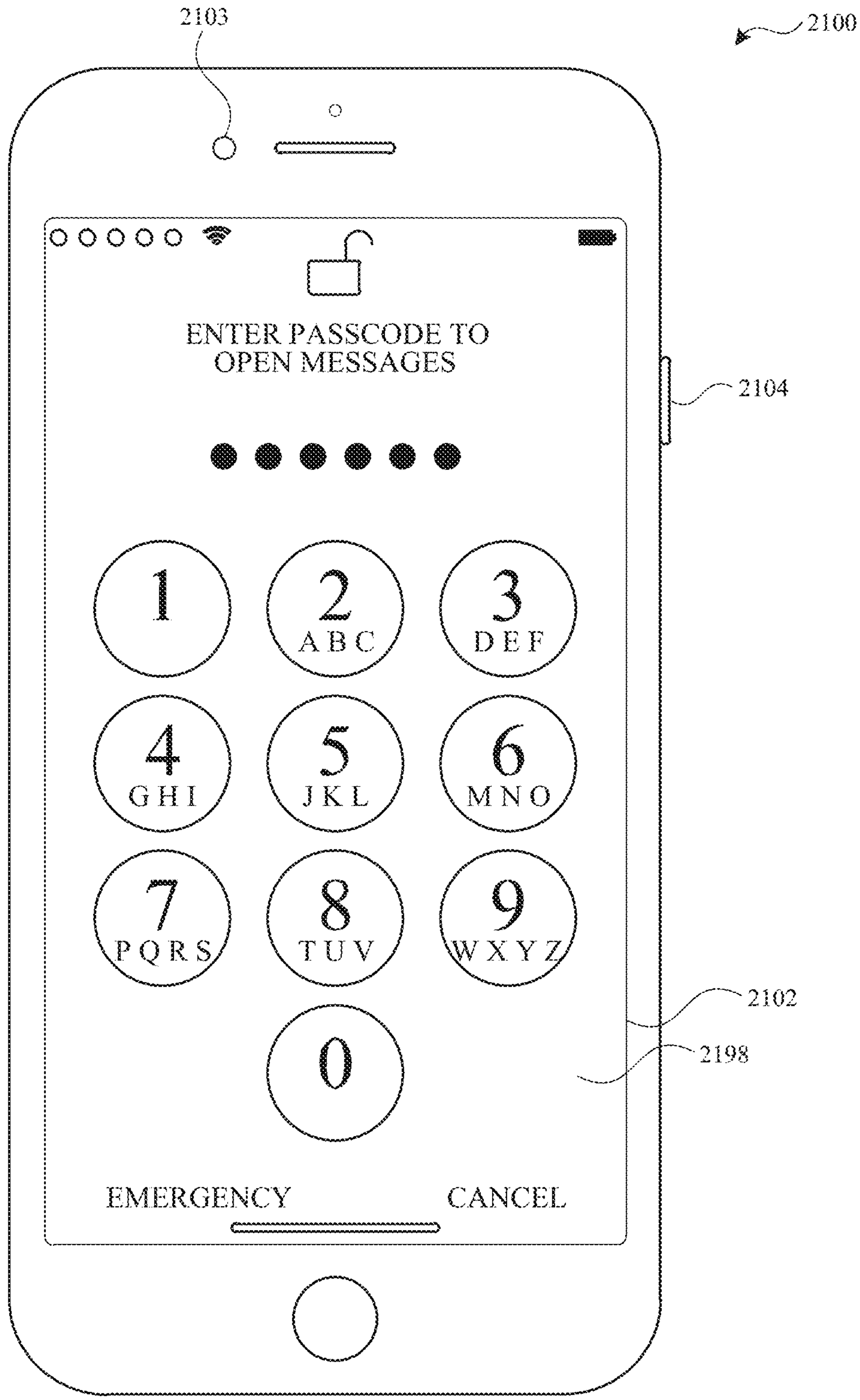
Figure 21A:
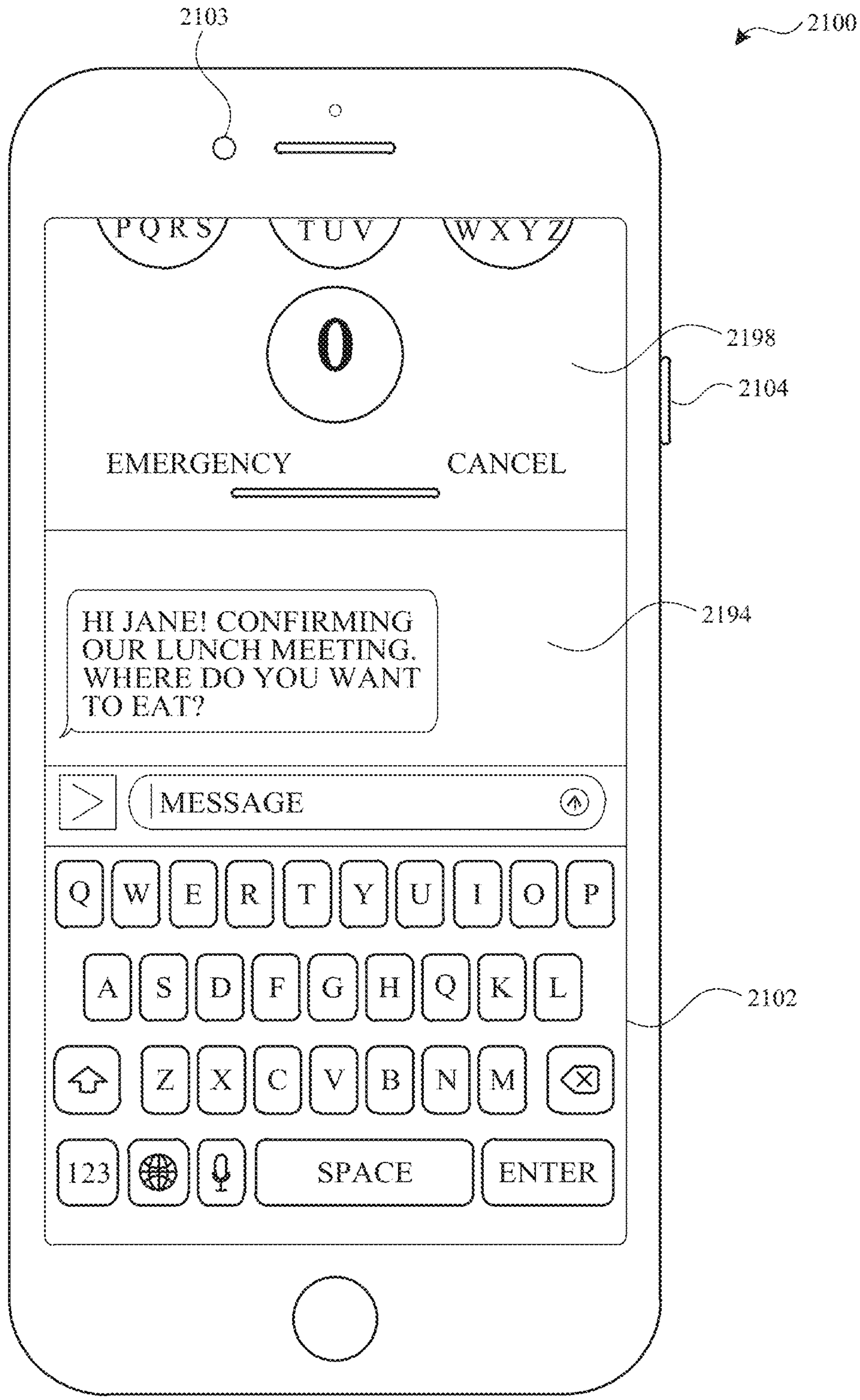
Figure 21A:
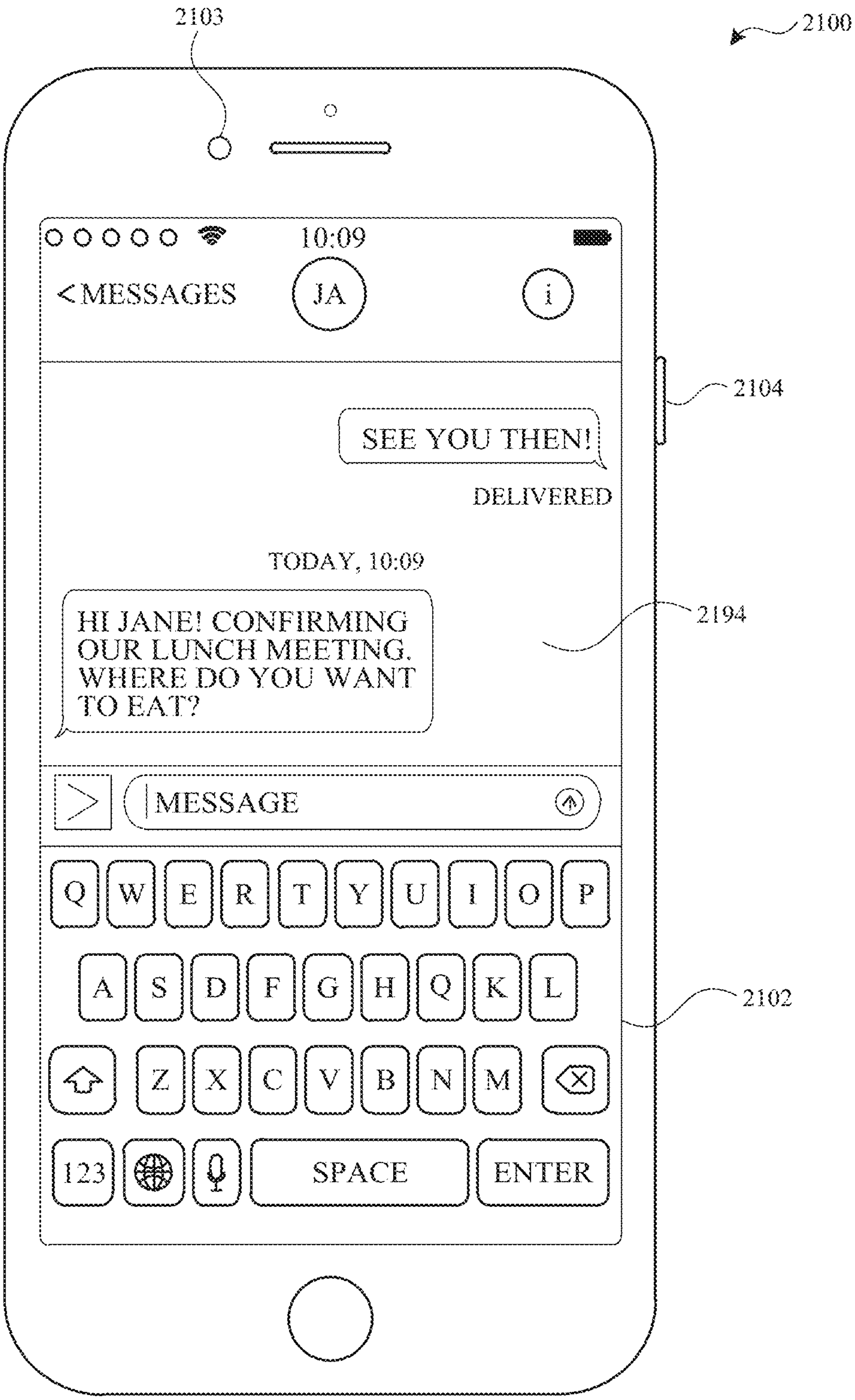
Figure 21A:
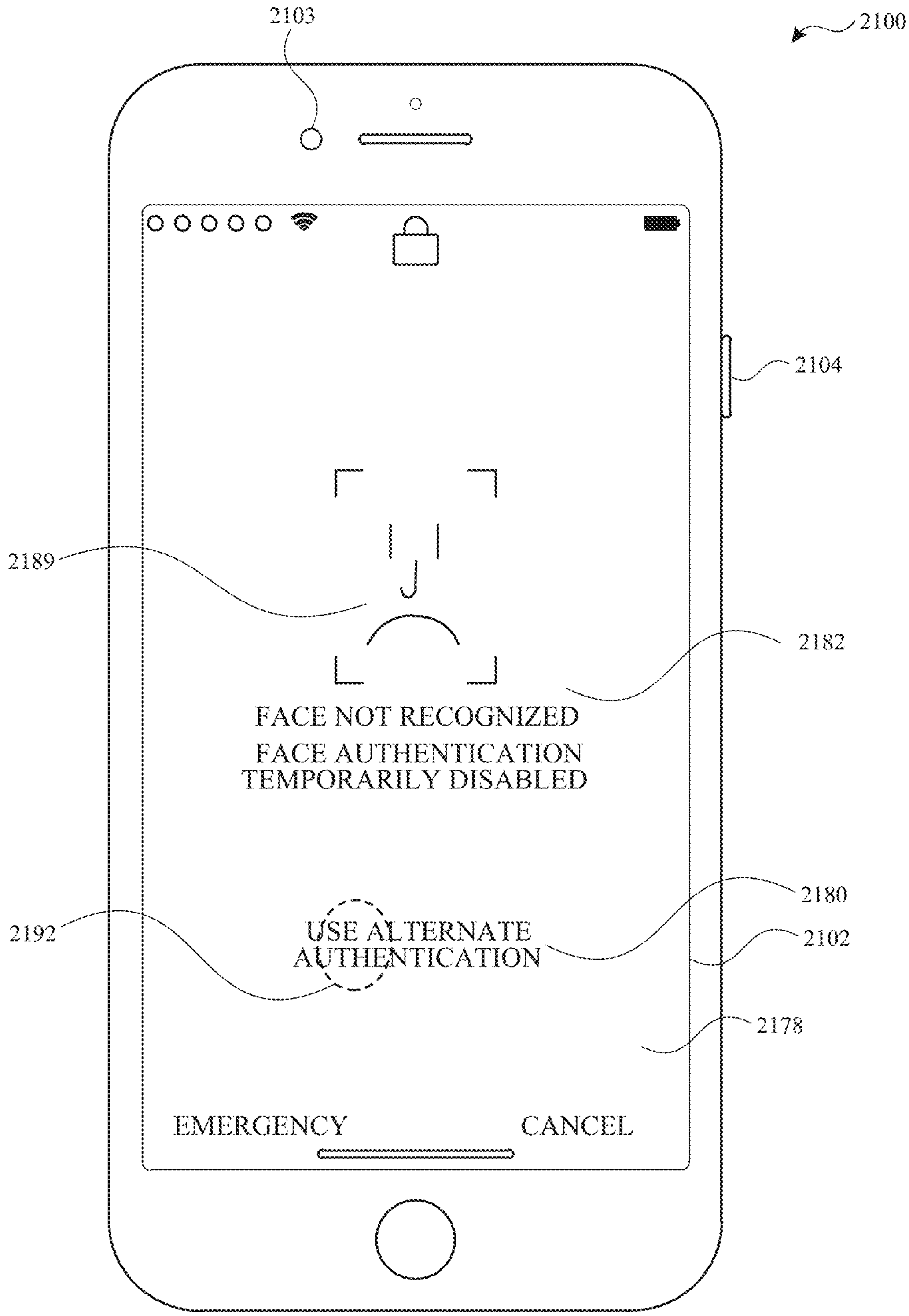
Figure 21A:
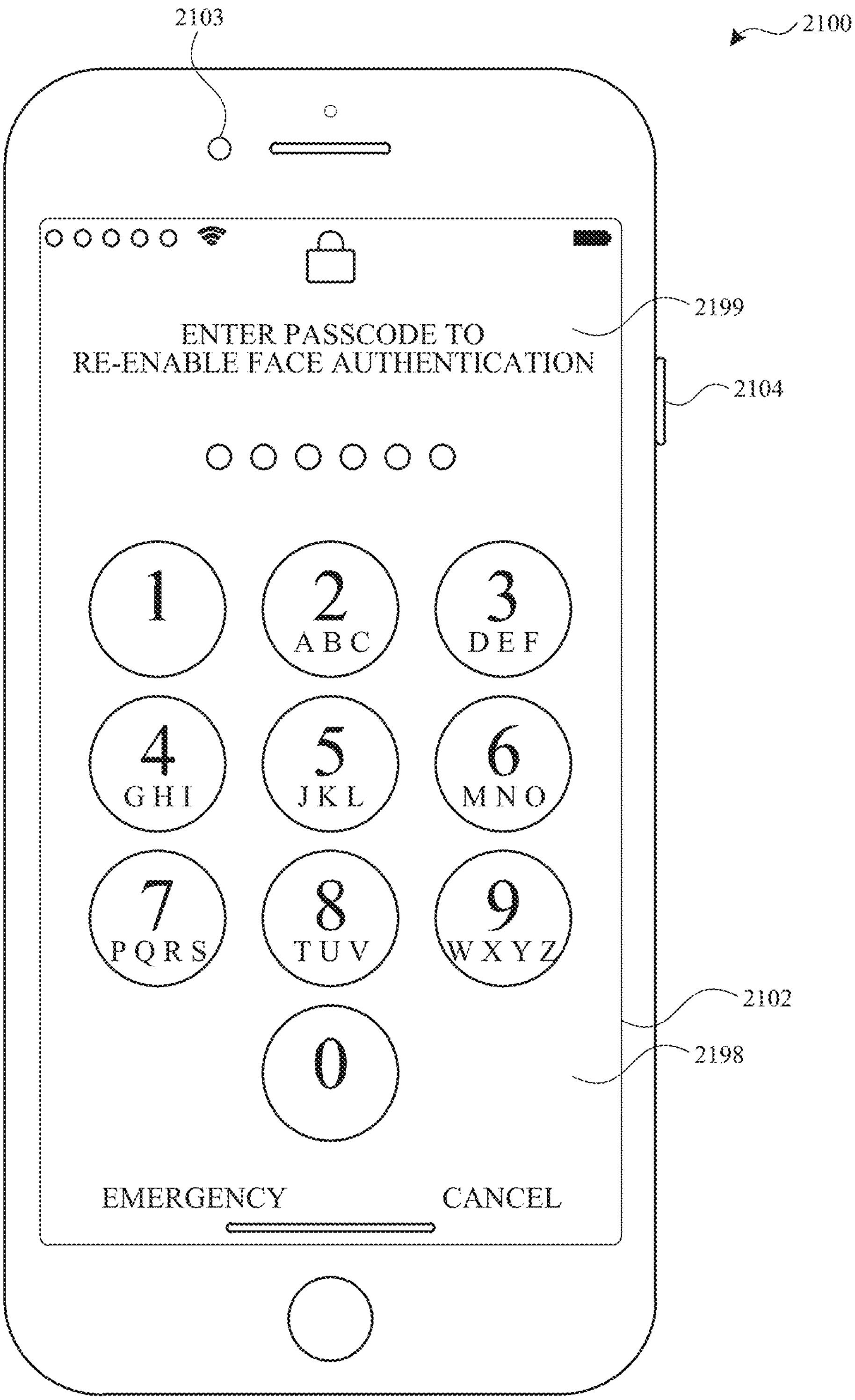
Figure 22A:
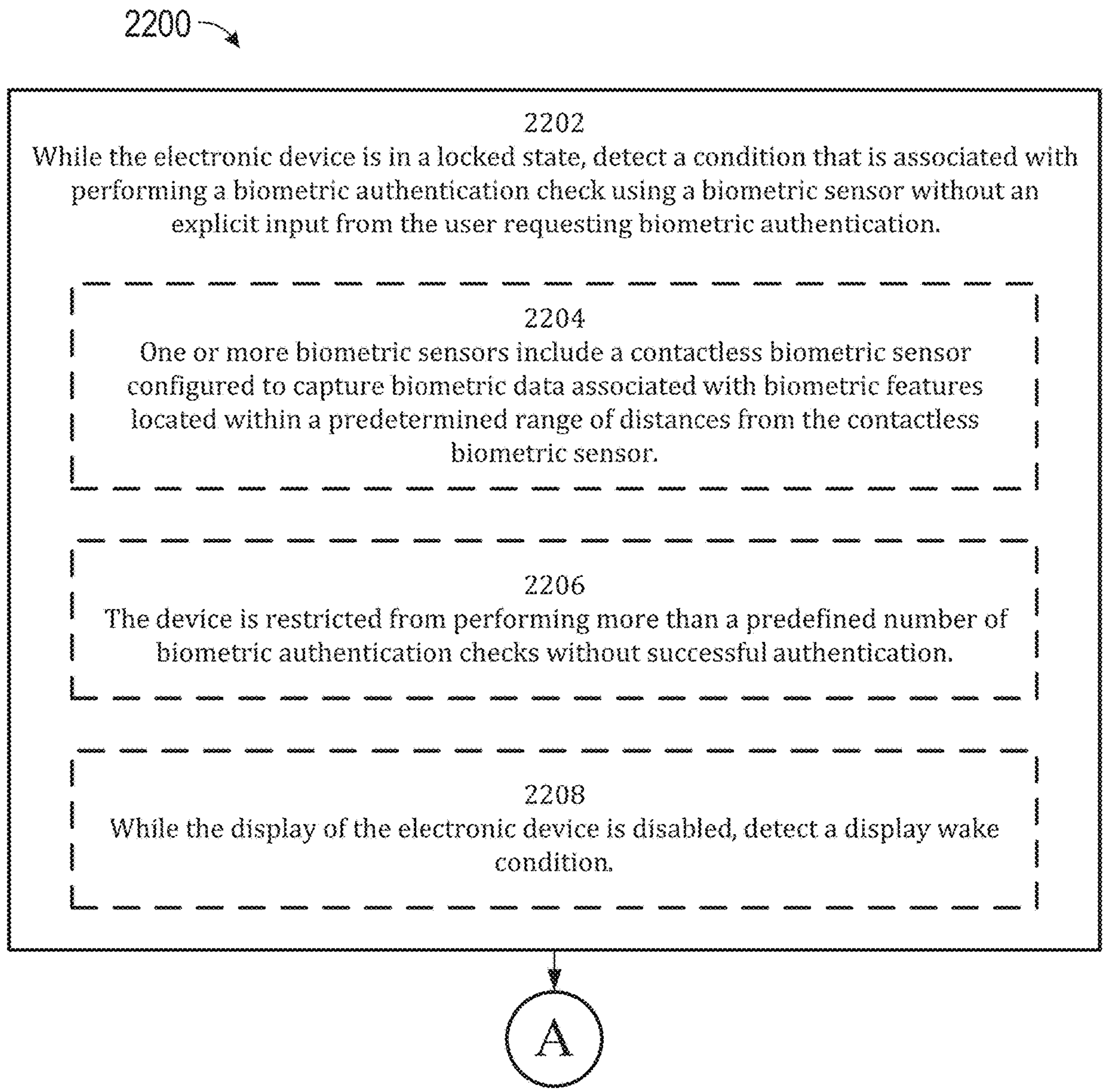
Figure 22B:
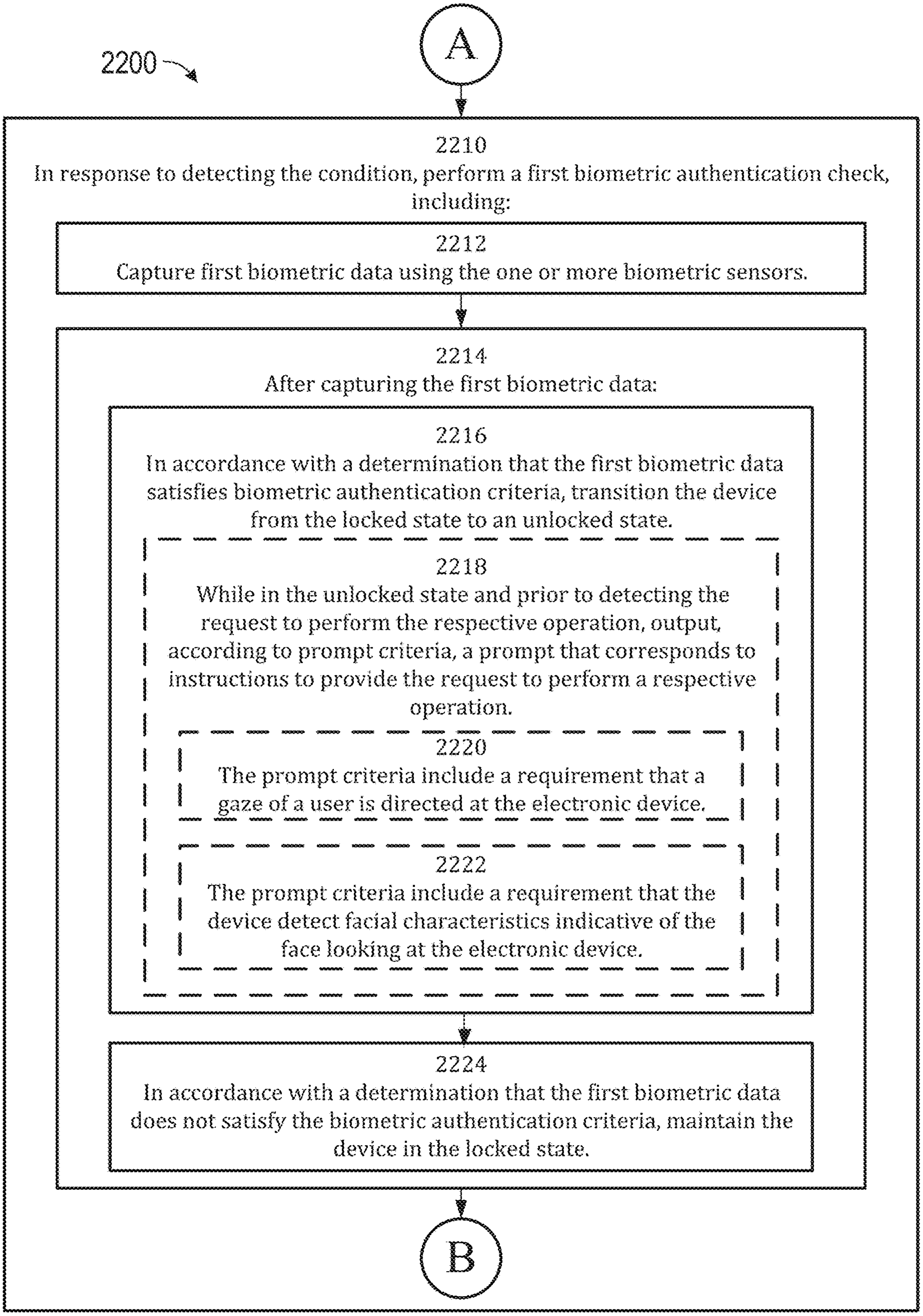
Figure 22C:
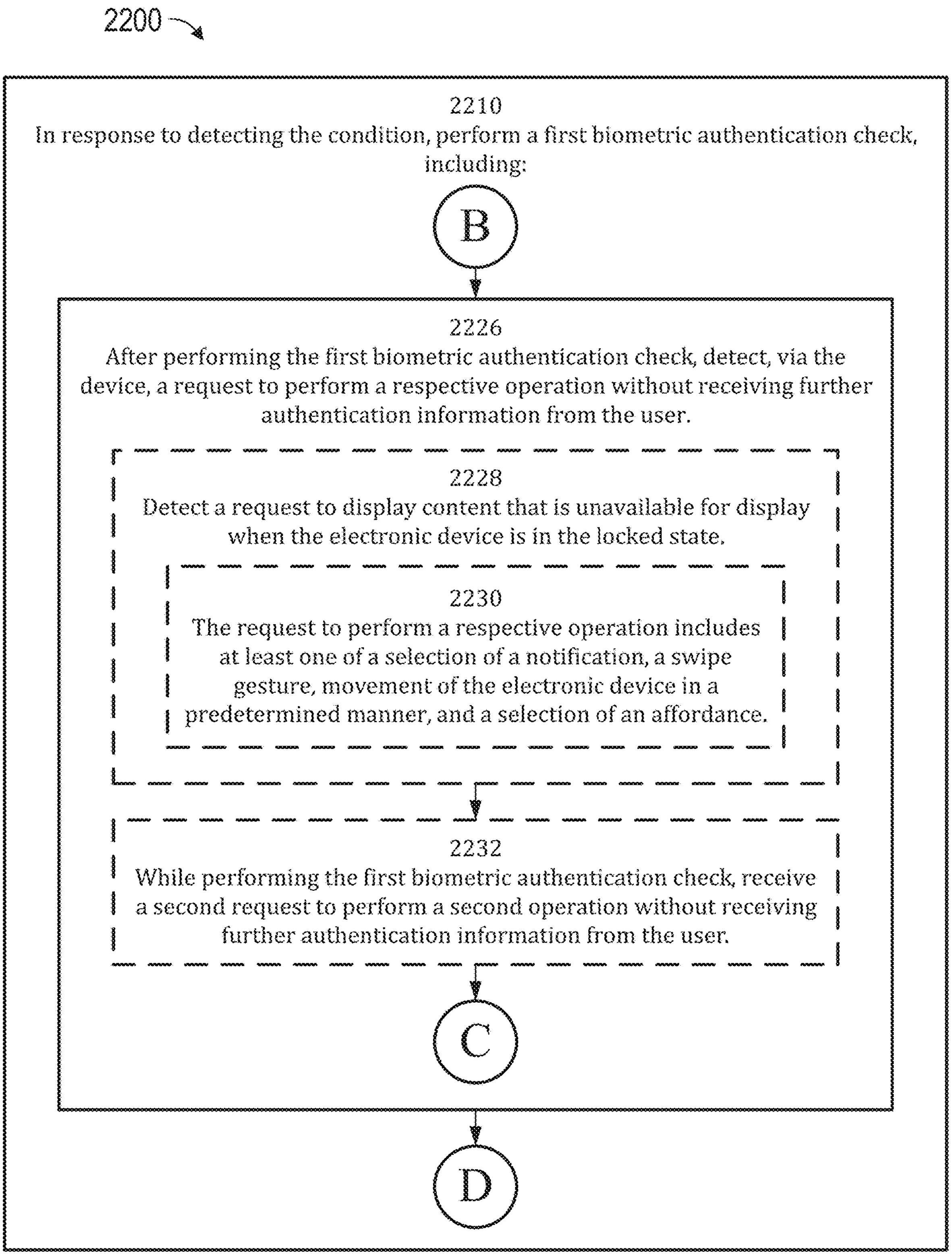
Figure 22E:
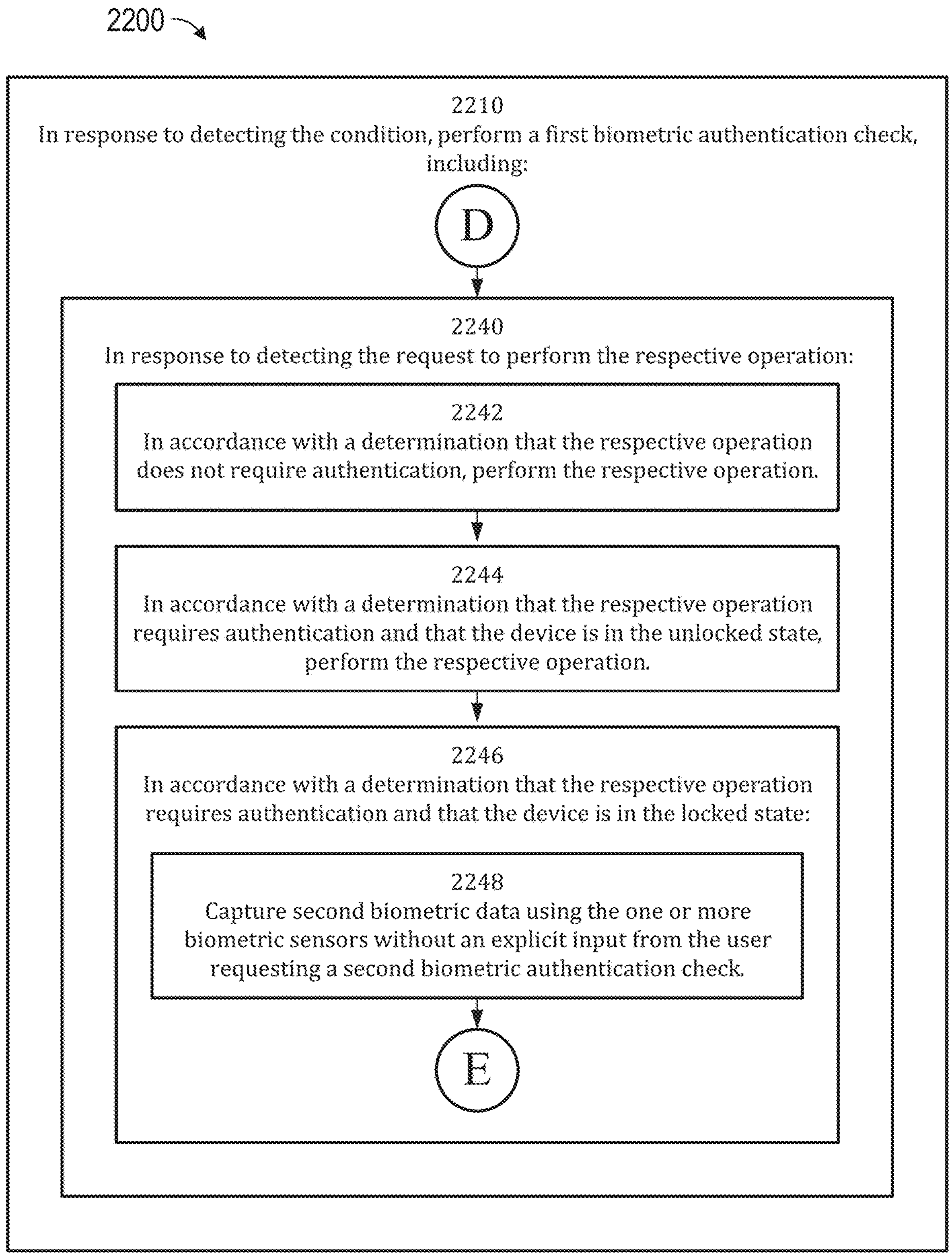
Figure 22F:
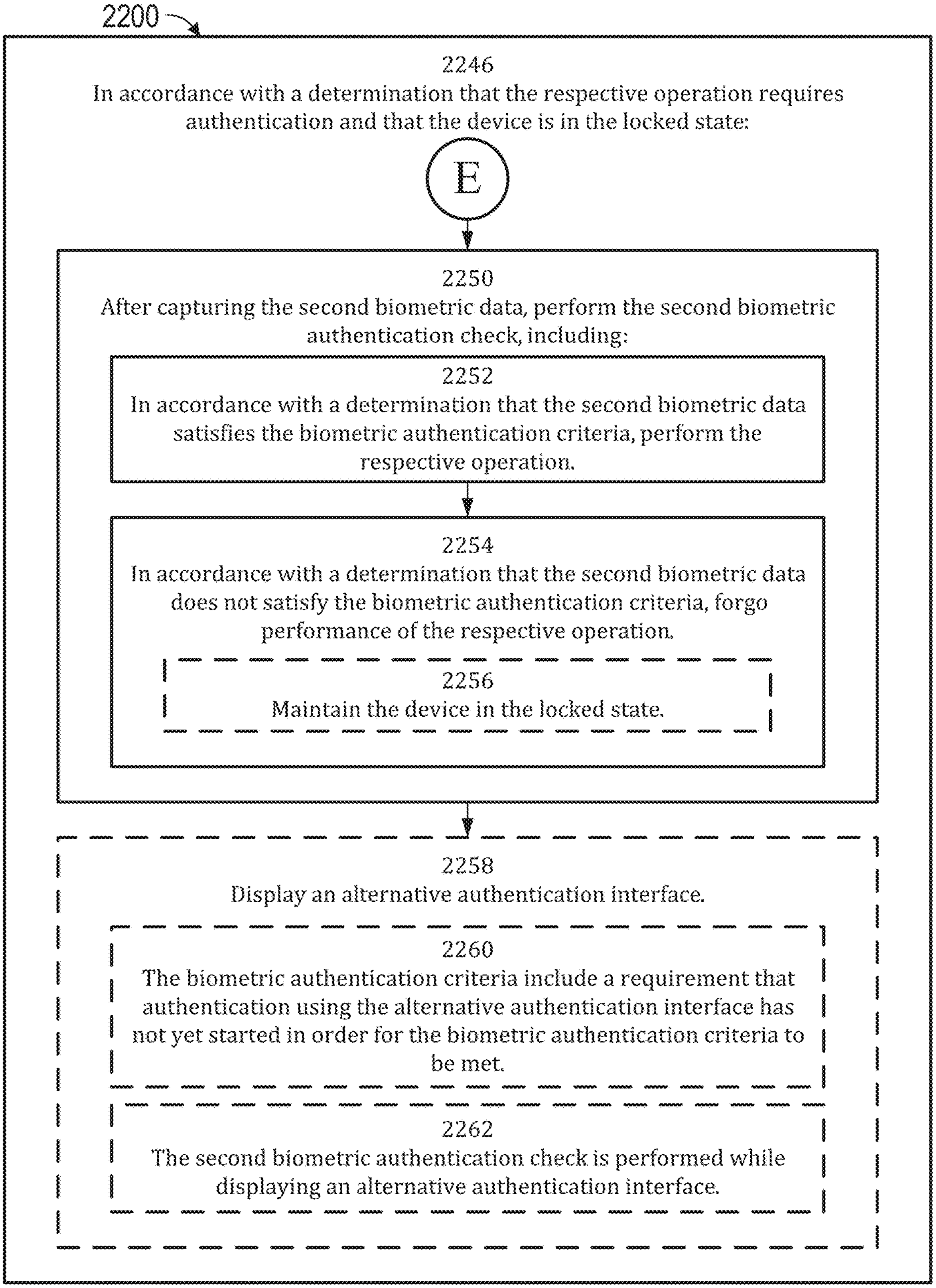

With reference to FIG. 21Z, in some examples, the electronic device 2100, while in a locked state, displays the locked state interface 2110 including a notification affordance 2174. As described, in response to a wake condition, the electronic device initiates a biometric authentication. While displaying the locked state interface 2110 and prior to completing the biometric authentication, the electronic device 2100 receives a request to access secured content. By way of example, in FIG. 21AA, the electronic device 2100 detects an activation of the notification affordance 2174. As shown, the activation of the notification affordance 2174 is a tap gesture 2176.

With reference to FIG. 21AB, in response to the activation of the notification affordance 2174, the electronic device 2100 displays (e.g., replaces display of the locked state interface 2110 with) an interstitial biometric authentication interface 2178 having a biometric authentication progress indicator 2182 and an alternative authentication affordance 2180. In some examples, the biometric authentication progress indicator 2182 includes a biometric authentication glyph, such as the biometric authentication glyph 2183, that indicates progress of biometric authentication. In some examples, the biometric authentication progress indicator further identifies the secured content associated with the request to access the secured content (e.g., "messages"). Activation of the alternative authentication affordance 2180 causes the electronic device to display an alternative authentication interface, examples of which are described further below.

While displaying the interstitial biometric authentication interface 2178, the electronic device 2100 continues to perform biometric authentication initiated in response to the wake condition. In some examples, initiating biometric authentication includes obtaining (e.g., capturing with the one or more biometric sensors) data corresponding to a biometric feature of a user. With reference to FIG. 21AC, in response to obtaining data, the electronic device processes the biometric data, for instance to determine, based on the biometric data, whether the biometric feature satisfies biometric authentication criteria (e.g., determine whether the biometric data matches, within a threshold, a biometric template). While the electronic device 2100 processes the biometric data, the electronic device 2100, optionally displays (e.g., replaces display of the biometric authentication glyph 2183 with) a biometric authentication glyph 2184 in the interstitial biometric authentication interface 2178, indicating that the biometric data is being processed.

In FIG. 21AD, the electronic device 2100 determines that the biometric feature satisfies the biometric authentication criteria. In response, the electronic device displays (e.g., replaces display of the biometric authentication glyph 2184 with) a biometric authentication glyph 2185 in the interstitial biometric authentication interface 2178 indicating that the biometric authentication was successful. Additionally or alternatively, the electronic device displays (e.g., replaces display of locked state indicator 2112 with) an unlocked state indicator 2122 and/or outputs a tactile output 2164, indicating the biometric authentication was successful.

As shown in FIGS. AE-AF, in response to determining that the biometric authentication is successful, the electronic device 2100 displays (e.g., replaces display of the interstitial biometric authentication interface 2178 with) a messaging application interface 2194. In some examples, displaying the messaging application interface 2194 includes sliding the biometric authentication interface 2178 in an upward direction to display (e.g., reveal) the messaging application interface 2194, as analogously described with reference to FIGS. 19P-R.

FIGS. AG-AI describe the display of an alternative manner in which biometric authentication progress is displayed. As described with reference to FIG. 21AA (and as shown in FIG. 21AG), the electronic device 2100 receives, while displaying a locked state interface 2110, a request to access secured content prior to completing biometric authentication. The request is an activation 2176 of a notification affordance 2174 in some examples. In response to the activation 2176 of the notification affordance 2174, the electronic device maintains display of the locked state interface 2110. Additionally, as shown in FIG. 21AH, the electronic device 2100 displays (e.g., replaces display of the locked state indicator 2110) with a biometric authentication glyph 2184 to indicate that biometric data is being processed. In FIG. 21AI, the electronic device determines that the biometric authentication is successful and in response, displays (e.g., replaces display of the biometric authentication glyph 2184 with) the unlocked state indicator 2122. Optionally, the electronic device 2100 further outputs a tactile output 2193 indicating that the biometric authentication is successful. In some examples, because the electronic device transitions to an unlocked state in response to determining that the biometric authentication is successful, the electronic device 2100 displays (e.g., replaces display of the notification affordance 2174 with) the notification affordance 2175. In some examples, the notification affordance 2174 identifies secured content (e.g., "John Appleseed . . . meeting where . . . ").

In FIG. 21AJ, in response to processing the biometric data (as described with reference to FIG. AC), the electronic device determines that the biometric authentication is unsuccessful. In response, the electronic device 2100 displays (e.g., replaces display of the biometric authentication glyph 2184 with) a biometric authentication glyph 2189 in the biometric authentication interface 2178 indicating that the biometric authentication was unsuccessful. Additionally or alternatively, the electronic device alternates a position of the locked state indicator 2112 to simulate a "shake effect" to indicate that the biometric authentication was unsuccessful and/or outputs a tactile output 2193, indicating the biometric authentication was unsuccessful.

While displaying the interstitial biometric authentication interface 2178, the electronic device detects an activation of the alternative authentication affordance 2180. The activation of the alternative authentication affordance 2108 is a tap gesture 2192 in some examples. With reference to FIG. 21AK, in response to activation of the alternative authentication affordance 2180, the electronic device displays an alternative authentication affordance 2198. In some examples, the alternative authentication affordance 2198 includes an indicator 2199 that identifies the secured content associated with the request to access the secured content (e.g., "messages").

With reference to FIGS. 21AL-AM, a valid passcode (or password) is received by the electronic device 2100, at least in part, in response to the tap gesture 2102A (FIG. 21L), and optionally, one or more other inputs indicating additional alphanumeric digits of the valid passcode. As shown in FIGS. 21N-21O, once a valid passcode has been received, the electronic device is unlocked and displays (e.g., replaces display of the alternative authentication interface 2198 with) the messaging application interface 2194. In some examples, displaying the messaging application interface 2194 includes sliding the alternative authentication interface 2198 in an upward direction to display (e.g., reveal) the messaging application interface 2194, as analogously described with reference to FIGS. 19P-R.

In some examples, in response to determining that biometric authentication was not successful, the electronic device further determines that a threshold number of biometric authentication attempts has been reached. Accordingly, as shown in FIG. 21AP, the electronic device 2100, using the biometric authentication progress indicator 2182, indicates that the threshold has been reached ("Face authentication temporarily disabled"). As described in FIG. AK, while displaying the interstitial biometric authentication interface 2178, the electronic device detects an activation of the alternative authentication affordance 2180, and in response to activation of the alternative authentication affordance 2180, displays the alternative authentication affordance 2198. If, as shown in FIG. 21AQ, the electronic device determines that the threshold number of biometric authentication attempts has been reached, the indicator 2199 that identifies that biometric authentication is re-enabled in response to entry of a valid passcode ("Enter passcode to re-enable Face Authentication").

FIGS. 22A-22F are a flow diagram illustrating a method for performing biometric authentication using an electronic device in accordance with some examples. Method 2200 is performed at a device (e.g., 100, 300, 500, 2100) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light, a structured light projector, or a combination thereof. The light-emitting device is, optionally, used to illuminate the biometric feature (e.g., the face) during capture of biometric data of the biometric feature by the one or more biometric sensors. Some operations in method 2200 are, optionally, combined, the orders of some operations are, optionally, changed, and some operations are, optionally, omitted.

As described below, method 2200 provides an intuitive way for performing authentication of biometric features. The method reduces the cognitive burden on a user for performing authentication of biometric features, thereby creating a more efficient human-machine interface and intuitive user experience. For battery-operated computing devices, enabling a user to manage authentication of biometric features faster and more efficiently conserves power and increases the time between battery charges.

In some examples, while the device is in a locked state, the electronic device (e.g., 2100) receives (2202) a request to perform an operation that does not require authentication. In some examples, in response to the request to perform the operation that does not require authentication, the electronic device performs an operation without waiting for authentication. Performing an operation that does not require authentication without waiting for authentication allows the user to more quickly access the operation without having to provide additional input (e.g., an input instructing the device to proceed). Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the request to perform the operation that does not require authentication includes a request (e.g., 2130) to enable a camera of the electronic device and/or accessing a camera function of the device, such as displaying a camera user interface (e.g., 2132) for capturing images and/or videos with the device. In some examples, the operation that does not require authentication includes displaying an application user interface that includes one or more restricted features (e.g., sharing captured photos or video, viewing photos or video that were captured during a previous use of the camera application while the device was unlocked) that are restricted without successful authentication, and the device attempts biometric authentication while displaying the application user interface. Displaying an application user interface that includes one or more restricted features that are restricted without successful authentication provides visual feedback by allowing the user to quickly view which features are currently restricted on the application without proper authentication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. If the biometric authentication is successful while displaying the application user interface, the restricted features are enabled and if the biometric authentication is unsuccessful, the restricted features remain disabled (e.g., the user is prevented from sharing captured photos or video, viewing photos or video that were captured during a previous use of the camera application while the device was unlocked and is, optionally, prompted to provide authentication in response to an attempt to use any of the restricted features).

In some examples, while the electronic device is in a locked state, the electronic device displays, on the touch-sensitive display (e.g., 2102), one or more affordances (e.g., 2107, 2108) for performing operations for which authentication is not required (e.g., a flashlight affordance for enabling a flashlight mode of operation in which a light on the device is turned on and/or camera affordance for accessing a camera function of the device such as displaying a camera user interface for capturing images and/or videos with the device).

In some examples, while displaying the one or more affordances for performing operations for which authentication is not required, the electronic device detects activation (e.g., 2130) of a respective affordance (e.g., 2107, 2108) of the one or more affordances for performing operations for which authentication is not required. In some examples, in response to detecting activation of a respective affordance of the one or more affordances for performing operations for which authentication is not required, in accordance with a determination that a face was looking at the display of the electronic device (e.g., a determination that a face with facial characteristics indicative of the face looking at the electronic device is in view of one or more cameras or one or more biometric sensors of the device) when the activation of the respective affordance was detected, the electronic device performs an operation associated with the respective affordance. Performing an operation associated with a respective affordance in accordance with a determination that a face (e.g., of the user) was looking at the display of the device reduces power usage and improves battery life of the device performing an operation when the device detects that the user is looking at the device (e.g., and not performing the operation if the user is not looking at the device, which optionally indicates that the affordance was unintentionally selected).

In some examples, if the flashlight affordance (e.g., 2107) is activated while a face is looking at the display of the electronic device, the electronic device enables a flashlight mode of operation in which a light on the device is turned on and/or if the camera affordance (e.g., 2108) is activated while a face is looking at the display of the electronic device, the electronic device accesses a camera function of the device such as displaying a camera user interface for capturing images and/or videos with the device. In some examples, in accordance with a determination that a face was not looking at the display of the electronic device (e.g., a determination that a face was not detected or a face was detected but with facial characteristics indicative of the face looking away from the electronic device is in view of one or more cameras or one or more biometric sensors of the device) when the activation of the respective affordance was detected, the electronic device forgoes performance of the operation associated with the respective affordance. In some examples, if the flashlight affordance is activated while a face is not looking at the display of the electronic device, the electronic device forgoes enabling a flashlight mode of operation in which a light on the device is turned on and/or if the camera affordance is activated while a face is not looking at the display of the electronic device, the electronic device forgoes accessing a camera function of the device such as displaying a camera user interface for capturing images and/or videos with the device).

In some examples, while the electronic device is in a locked state, the electronic device detects a condition (e.g., user raises device 2100 to a position shown in FIG. 21B) that is associated with performing a biometric authentication check using a biometric sensor without an explicit input from the user requesting biometric authentication. In some examples, the condition that is associated with performing a biometric authentication check using a biometric sensor without an explicit input from the user requesting biometric authentication includes raising the device and/or pressing a display wake button (e.g., 2104).

In some examples, one or more biometric sensors include a contactless biometric sensor (e.g., 2103) (e.g., a facial recognition sensor) configured to capture biometric data associated with biometric features located within a predetermined range of distances from the contactless biometric sensor (e.g., 2103) (2204). In some examples, the biometric sensor includes a camera. In some examples, the biometric sensor includes a light projector (e.g., an IR flood or a structured light projector).

In some examples, the device is restricted from performing more than a predefined number of biometric authentication checks without successful authentication (2206). Restricting the device from performing more than a predefined number of biometric authentication checks without successful authentication enhances device security by limiting fraudulent authentication attempts on the device. Improving security measures of the device enhances the operability of the device by preventing unauthorized access to content and operations and, additionally, reduces power usage and improves battery life of the device by enabling the user to use the device more efficiently.

In some examples, successful authentication includes successful authentication by way of biometric authentication or any other form of authentication, such as with a passcode, a password, or a pattern. In some examples, the device performs fewer than the predefined number of biometric authentication checks in response to detecting the condition, so as to reserve at least one biometric authentication check for use in response detecting the request to perform the respective operation. In some examples, the electronic device tracks a number of failed authentication attempts, such as a number of failed sequential failed attempts without an intervening success authentication (e.g., a biometric authentication or other authentication, such as password authentication). In some such examples, if a maximum number of failed attempts has been reached, the device does not perform biometric authentication until successful non-biometric authentication is received. In some examples, a request to perform an operation that requires authentication after the maximum number of failed biometric authentication checks has been reached triggers display of an alternative authentication user interface (e.g., a password, passcode, pattern or other authentication interface).

In some examples, while the display (e.g., 2102) of the electronic device is disabled, the electronic device detects (2208) a display wake condition. In some examples, a display wake condition includes movement of the device in a predefined manner, such as movement of the device by more than a threshold amount, movement of the device into an orientation that is associated with waking the device, activation of a display wake button, or a gesture, such as a tap, on a touch-sensitive surface.

In some examples, in response to detecting the condition, the electronic device performs (2210) a first biometric authentication check. Performing a biometric authentication check in response to detecting a condition (e.g., a wake condition) allows the user to provide authentication information to the device with minimal input and quickly and efficiently in response to the wake condition being detected. Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, performing a first biometric authentication check includes capturing (2212) first biometric data using the one or more biometric sensors. In some examples, the electronic device initiates a first biometric authentication procedure that includes capturing first biometric data using the one or more biometric sensors. In some examples, performing a first biometric authentication check includes, after capturing the first biometric data (2214) (e.g., in response to capturing the first biometric data or in response to a request to unlock with the device.), in accordance with a determination that the first biometric data satisfies biometric authentication criteria, transitioning (2216) the device from the locked state to an unlocked state. Transitioning the device from the locked state to an unlocked state in accordance with a determination that the first biometric data satisfies biometric authentication criteria enhances device security by unlocking the device if the authentication process is successful (but, in some examples, prohibiting the device from being unlocked if the authentication is unsuccessful). Improving security measures of the device enhances the operability of the device by preventing unauthorized access to content and operations and, additionally, reduces power usage and improves battery life of the device by enabling the user to use the device more efficiently.

In some examples, the electronic device determines whether the first biometric data satisfy the biometric authentication criteria. In some examples, the biometric authentication criteria includes a criterion that is satisfied when the first biometric data matches biometric data (e.g., facial feature data, fingerprint data, iris data) corresponding to an authorized user. In some examples, while in the unlocked state and prior to detecting the request to perform the respective operation, the electronic device outputs (2218), according to prompt criteria, a prompt (e.g., a visual, audio, or tactile output) that corresponds to instructions to provide the request to perform a respective operation. In some examples, the device is in the unlocked state after detecting the face of an authorized user. In some examples, the electronic device displays instructions (e.g., 2124) to "swipe up" to access a home screen (e.g., 2129). In some examples, the prompt criteria include a requirement that a gaze (e.g., 2168) of a user is directed at the electronic device (2220). In some examples, the prompt criteria include a requirement that the device detect facial characteristics indicative of the face looking at the electronic device (2222) (e.g., detection that the gaze of the user is directed at the electronic device) for at least a predetermined amount of time.

In some examples, in accordance with a determination that the first biometric data does not satisfy the biometric authentication criteria, the electronic device maintains (2224) the device in the locked state. Maintaining the device in the locked state in accordance with the determination that the first biometric data does not satisfy the biometric authentication criteria enhances device security by preventing fraudulent and/or unauthorized access to the device. Improving security measures of the device enhances the operability of the device by preventing unauthorized access to content and operations and, additionally, reduces power usage and improves battery life of the device by enabling the user to use the device more efficiently. In some examples, if biometric data corresponding to a biometric feature does not match a biometric authentication template, the device remains locked in response to the failed authentication.

In some examples, after performing the first biometric authentication check, the electronic device detects (2226), via the device, a request (e.g., 2134, 2176) to perform a respective operation without receiving further authentication information from the user. In some examples, detecting, via the device, a request to perform a respective operation without receiving further authentication information from the user includes detecting (2228) a request to display content that is unavailable for display when the electronic device is in the locked state. In some examples, the user input is an input that requires access to secured data, such as the home screen or an application presenting secured data. In some examples, the request to perform the respective operation includes a swipe gesture on the device, a swipe gesture (e.g., 2134) from an edge of the device, or a press of a home button. In some examples, the request to perform a respective operation includes at least one of: a selection of a notification (e.g., 2176) (e.g., the request to perform a respective operation is a request to display additional information associated with the notification, such as a long look or an application corresponding to the notification); a swipe gesture (e.g., the request to perform a respective operation is an upward swipe on the display of the electronic device; in some examples, the request to perform a respective operation is an upward swipe starting from an edge of the display of the electronic device. In some examples, the swipe is, in particular, a request to display a home screen of the electronic device); movement of the electronic device in a predetermined manner (e.g., the request to perform a respective operation includes lifting the electronic device); and a selection of an affordance (2230) (e.g., the request to perform a respective operation includes selection of an affordance displayed by the electronic device, including a "lock" affordance displayed when the electronic device is in the locked state).

In some examples, while performing the first biometric authentication check, the electronic device receives (2232) a second request (e.g., 2134) to perform a second operation without receiving further authentication information from the user. In some examples, the second request is a swipe gesture, selection of notification, or the like. In some examples, in response to receiving the second request to perform the second operation (2234), in accordance with a determination that the second request to perform the second operation was received after determining that the first biometric data does not satisfy the biometric authentication criteria, the electronic device displays (2236) a second alternative authentication interface (e.g., 2140). In some examples, the second alternative authentication interface is a passcode, password, pattern, or fingerprint authentication user interface, and is displayed without performing the second operation if the biometric authentication has failed at least once. In some examples, in accordance with a determination that the second request to perform the second operation was received prior to evaluating the first biometric data (e.g., prior to determining whether the first biometric data satisfies the biometric authentication criteria), the electronic device displays (2238) a biometric authentication indicator (e.g., 2156, 2162) that includes an indication that biometric authentication is being attempted without displaying the second alternative authentication interface. In some examples, the second alternative authentication interface is a passcode, password, pattern, or fingerprint authentication user interface, and is not displayed and the second operation is not performed if the device has not had time to complete the first biometric authentication attempt. In some examples, if the user swipes up while the electronic device is performing the first iteration of biometric authentication, the electronic device displays an interstitial interface (e.g., 2154) in which the processing status of the biometric authentication is indicated. In some examples, in response to receiving the second request to perform the second operation in accordance with a determination that the second request to perform the second operation was received after determining that the first biometric data satisfies the biometric authentication criteria, the electronic device performs the second operation without displaying the alternative authentication interface (e.g., a passcode, password, pattern, or fingerprint authentication user interface is displayed if the biometric authentication has failed at least once). In some examples, the biometric authentication indicator that is displayed in response to receiving the second request to perform the second operation in accordance with a determination that the second request to perform the second operation was received prior to evaluating the first biometric data includes an indication of an application associated with the notification (e.g., 2182). In some examples, if the user selects a notification while the device is performing the first biometric authentication check, the device indicates the application associated with the notification. By way of example, if the user selects on a message notification, the device displays an indication directed to the messaging application such as "Biometric Authentication for Messages" or "Face ID for Messages".

In some examples, in response to detecting the request to perform the respective operation (2240), in accordance with a determination that the respective operation does not require authentication, the electronic device performs the respective operation (2242). Performing a respective operation without successful authentication in accordance with the determination that the respective operation does not require authentication allows the user to more quickly access the operation without having to provide additional input (e.g., an input instructing the device to proceed). Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, if an operation does not require authentication, the electronic device performs the operation without regard to whether the device is in a locked state or an unlocked state. In some examples, the device does not check for authentication if the respective operation does not require authentication, such as use of the camera or to place an emergency call.

In some examples, in accordance with a determination that the respective operation requires authentication and that the device is in the unlocked state, the electronic device performs the respective operation (2244). Performing a respective operation in accordance with a determination that the respective operation requires authentication, if the device is in the unlocked state, allows the user to more quickly access the operation without having to provide additional input (e.g., an input instructing the device to proceed). Performing an operation (automatically) when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in accordance with a determination that the respective operation requires authentication and that the device is in the locked state (2246), the electronic device captures second biometric data using the one or more biometric sensors without an explicit input from the user requesting a second biometric authentication check (2248). Capturing second biometric data without an explicit input from the user requesting the second biometric authentication check in accordance with the determination that the respective operation requires authentication and that the device is in the locked state enhances device security by requiring successful authentication and thus preventing fraudulent and/or unauthorized access to the device while the device is in a locked state. Improving security measures of the device enhances the operability of the device by preventing unauthorized access to content and operations and, additionally, reduces power usage and improves battery life of the device by enabling the user to use the device more efficiently.

In some examples, after capturing the second biometric data, the electronic device performs (2250) the second biometric authentication check. In some examples, the first biometric data and the second biometric data are compared to a same set of biometric criteria. In some examples, the first and second biometric data are compared to respective sets of biometric criteria. In some examples, performing the second biometric authentication check includes, in accordance with a determination that the second biometric data satisfies the biometric authentication criteria, performing (2252) the respective operation. In some examples, the electronic device, optionally, further transitions the device from the locked state to an unlocked state). In some examples, performing the second biometric authentication check includes in accordance with a determination that the second biometric data does not satisfy the biometric authentication criteria, forgoing (2254) performance of the respective operation (and, optionally, maintaining the device in the locked state). In some examples, forgoing performance of the respective operation includes maintaining (2256) the device in the locked state. In some examples, forgoing performance of the respective operation includes displaying (2258) an alternative authentication user interface (e.g., 2140, 2198). In some examples, the alternative authentication interface is a passcode, password, pattern or fingerprint authentication user interface. In some examples, while displaying the alternative authentication user interface, the electronic device detects an alternative authentication attempt (e.g., entry of passcode including tap gesture 2102A) that corresponds to the alternative authentication user interface. In some examples, the alternative authentication attempt that corresponds to the alternative authentication user interface is an input passcode, input password, input pattern, or fingerprint detected on the fingerprint sensor. In some examples, in response to detecting the alternative authentication attempt that corresponds to the alternative authentication user interface, in accordance with a determination that the authentication attempt is successful (e.g., the provided authentication information is consistent with stored authentication information such as a stored passcode, stored password, stored pattern or stored fingerprint information) and that biometric data corresponding to the alternative authentication attempt (e.g., the second biometric data or biometric data captured while or shortly after the authentication attempt was in progress such as when a last character of a passcode or a password submit button is selected) meets first similarity criteria to stored biometric data that corresponds to an authorized user of the device, the electronic device performs the respective operation. In some examples, the electronic device stores additional information based on the biometric data corresponding to the alternative authentication attempt as biometric data that can be used in future biometric authentication attempts to identify the authorized user of the device. In some examples, the electronic device learns about changes to the user's face for use in authenticating the user in future authentication attempts). In some examples, further in response to detecting the alternative authentication attempt that corresponds to the alternative authentication user interface, in accordance with a determination that the authentication attempt is successful and that biometric data corresponding to the alternative authentication attempt meets first similarity criteria to stored biometric data that corresponds to an authorized user of the device, the electronic device outputs an output (e.g., visual, audio, and/or tactile output) indicating that information used in future biometric authentication attempts to identify the authorized user of the device (e.g., a biometric template) has been modified. In some examples, the electronic device displays an indication that biometric data has been updated to better recognize the user's face.

In some examples, in accordance with a determination that the authentication attempt is successful (e.g., the provided authentication information is consistent with stored authentication information such as a stored passcode, stored password, stored pattern or stored fingerprint information) and that biometric data corresponding to the alternative authentication attempt (e.g., the second biometric data or biometric data captured while or shortly after the authentication attempt was in progress such as when a last character of a passcode or a password submit button is selected) does not meet the first similarity criteria to stored biometric data that corresponds to an authorized user of the device, the electronic device performs the respective operation. Performing the respective operation in accordance with the determination that the authentication attempt is successful and that the biometric data corresponding to the alternative authentication attempt does not meet the first similarity criteria to stored biometric data provides the user with an alternative method to access operations (e.g., locked operations) of the device that require successful authentication when the biometric data does not correspond to stored biometric data. Providing additional control options with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device does not store additional information based on the biometric data corresponding to the alternative authentication attempt as biometric data that can be used in future biometric authentication attempts to identify the authorized user of the device. In some examples, in response to detecting the alternative authentication attempt that corresponds to the alternative authentication user interface, in accordance with a determination that the authentication attempt is not successful (e.g., the provided authentication information is not consistent with stored authentication consistent with stored authentication information such as a stored passcode, stored password, stored pattern or stored fingerprint information), the electronic device forgoes performing the respective operation and does not store additional information based on the biometric data corresponding to the alternative authentication attempt as biometric data that can be used in future biometric authentication attempts to identify the authorized user of the device.

In some examples, in response to detecting the request to perform the respective operation and in accordance with a determination that the respective operation requires authentication and that the device is in the locked state, the electronic device displays an alternative authentication interface. Providing an alternative authentication interface (e.g., to provide an alternative method for providing the authentication, in addition to or alternatively to the biometric authentication) allows the user to easily provide authentication for an operation using a different authentication method if the current authentication method is or continues to be unsuccessful. Providing additional control options (e.g., for providing authentication) in this manner without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device displays an alternative authentication interface (e.g., 2140, 2198), such as a password or passcode interface, in response to the user requesting access to secured data after the failure of the first iteration of biometric authentication. Displaying the authentication interface, such as the password or passcode interface, in response to the user requesting access to secured data after the failure of the first iteration of biometric authentication provides the user with a quick alternative method to access operations (e.g., locked operations) of the device that require successful authentication when the biometric data is unsuccessful. Providing additional control options with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the alternative authentication interface is displayed after an additional time delay and/or after an additional biometric authentication attempt has failed (e.g., as described in greater detail with reference to FIGS. 26A-26AS. In some examples, the biometric authentication criteria include a requirement that authentication using the alternative authentication interface has not yet started in order for the biometric authentication criteria to be met (2260). In some examples, (e.g., in response to) at least partially attempting biometric authentication while displaying the alternative authentication user interface: in accordance with a determination that biometric authentication was successful and authentication using the alternative authentication interface has not started, the electronic device performs the respective operation; and in accordance with a determination that authentication using the alternative authentication interface has started (e.g., a determination that at least a partial credential has been received using the alternative authentication interface, such as a partial passcode, pattern, or password), the electronic device forgoes performing the respective operation based on the biometric authentication. In some examples, the electronic device waits to perform the second biometric authentication until the user has finished providing the passcode). In some examples, the device delays displaying the alternative authentication user interface until after the second biometric authentication check has failed (e.g., as described in greater detail with reference to FIGS. 26A-26AS) and the device performs a third biometric authentication check after the alternative authentication user interface has been displayed.

In some examples, the second biometric authentication check is performed while displaying an alternative authentication interface (e.g., 2140) (2262). Performing the second biometric authentication check while displaying the alternative authentication interface enhances the operability of the device by, in some examples, completing the second biometric authentication check prior to the completion of the user providing manual alternative authentication input, thereby making the user-device interface more efficient.

In some examples, the alternative authentication interface is a passcode, password, pattern or fingerprint authentication user interface. In some examples, performing the at least a portion of second biometric authentication check includes performing at least a portion of the second biometric authentication check while displaying an alternative authentication interface. In some examples, biometric authentication is performed during passcode entry. In some examples, a biometric authentication UI is displayed on the passcode entry interface (e.g., biometric progress indicators 2142, 2144, and 2146).

In some examples, while displaying the alternative authentication user interface (e.g., a passcode, password, pattern, or fingerprint authentication user interface), the electronic device determines that the biometric authentication criteria have been met. In some examples, in response to determining that the biometric authentication criteria have been met, the electronic device performs the respective operation. Performing the respective operation in response to determining that the biometric authentication criteria have been met while displaying the alternative authentication user interface enhances the operability of the device by, in some examples, completing the second biometric authentication check prior to the completion of the user providing manual alternative authentication input, thereby making the user-device interface more efficient. In some examples, the biometric authentication criteria includes a requirement that the user has not entered at least a portion of a credential using the alternative authentication interface. In some examples, the biometric authentication criteria includes a requirement that the user has not entered at least a portion of a credential using the alternative authentication interface. In some examples, the respective operation is not performed if there is a successful biometric authentication if the user has already started entering an alternative form of authentication, such as a passcode, password, pattern, or fingerprint.

In some examples, in response to detecting the request to perform the respective operation and in accordance with a determination that the respective operation requires authentication and that the device is in the locked state, the electronic device displays an authentication indication for the biometric authentication (e.g., a progress indicator or another indication that the biometric authentication is being attempted) without displaying an option to proceed with an alternative form of authentication. In some examples, the electronic device displays an authentication indication for the biometric authentication without displaying an alternative authentication interface and/or without displaying a selectable option to display an alternative authentication interface. In some examples, while attempting the biometric authentication in response to the request to perform the respective operation, the device forgoes providing options for alternative forms of authentication in order to indicate to the user that the biometric authentication has not yet failed (e.g., as described in greater detail with reference to FIGS. 26A-AS.

In some examples, while the device is in an unlocked state, the electronic device receives a request to store additional information for use in biometric authentication (e.g., in a biometric enrollment user interface in a device settings user interface or a system preferences user interface). In some examples, in response to the request to store additional information for use in biometric authentication, the electronic device captures third biometric data. In some examples, further in response to the request to store additional information for use in biometric authentication, in accordance with a determination that the third biometric data meets second similarity criteria to stored biometric data that corresponds to an authorized user of the device, the electronic device stores additional information based on the third biometric data that can be used in future biometric authentication attempts to identify the authorized user of the device. Storing the additional information based on the third biometric data that can be used in future biometric authentication attempts to identify the authorized user of the device while the device is in an unlocked state (e.g., and prohibiting such an operation while the device is in a locked state) enhances device security prevent fraudulent and/or unauthorized attempts to stored biometric authentication data on the device and thus gain future access to the device. Improving security measures of the device enhances the operability of the device by preventing unauthorized access to content and operations and, additionally, reduces power usage and improves battery life of the device by enabling the user to use the device more efficiently.

In some examples, the electronic device learns about changes to the user's face for use in authenticating the user in future authentication attempts. In some examples, the second similarity criteria requires less similarity between the third biometric data and the stored biometric data than is required by the first similarity criteria. In some examples, while the device is in an unlocked state and in a biometric data enrollment user interface, the device is configured to accept additional biometric data that corresponds to a biometric feature that is more different from currently enrolled biometric features than when the device is learning about biometric features detected when alternative authentication is successfully provided after biometric authentication has failed. In some examples, in accordance with a determination that the third biometric data does not meet the second similarity criteria to stored biometric data that corresponds to an authorized user of the device, the electronic device stores additional information based on the third biometric data that can be used in future biometric authentication attempts to identify the authorized user of the device. In some examples, the electronic device learns about changes to the user's face for use in authenticating the user in future authentication attempts).

Note that details of the processes described above with respect to method 1200 (e.g., FIGS. 22A-22F) are also applicable in an analogous manner to the methods described herein. For example, method 2200 optionally includes one or more of the characteristics of the various methods described herein with reference to methods 800, 1000, 1200, 1400, 1600, 1800, 2000, 2500, and 2700. For example, the enrolled biometric data described in method 1200 can be used to perform biometric authentication as described with respect to FIGS. 21C-E. For another example, one or more interstitial interfaces as described in methods 2000 and 2700 optionally are displayed in response to receipt of an input prior to completion of a biometric authentication process. For brevity, these details are not repeated herein.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 22A-22F are, optionally, implemented by components depicted in FIGS. 1A-1B. For example, detecting operation 2202, performing operation 2210, capturing operation 2212, transitioning operation 2216, maintaining operation 2224, detecting operation 2226, performing operation 2250, and forgoing operation 2254 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 23A-23Q illustrate exemplary user interfaces for managing biometric authentication, in accordance with some examples. As described in greater detail below, the exemplary example of the user interfaces illustrated in FIGS. 23A-23Q relate to the exemplary example of the user interfaces illustrated in FIGS. 24A-24BC, which in turn are used to illustrate the processes described below, including the processes in FIGS. 25A-25C.

FIG. 23A illustrates an electronic device 2300 (e.g., portable multifunction device 100, device 300, or device 500). In the exemplary example illustrated in FIGS. 23A-23Q, electronic device 2300 is a smartphone. In other examples, electronic device 2300 can be a different type of electronic device, such as a wearable device (e.g., a smartwatch). Electronic device 2300 has a display 2302, one or more input devices (e.g., touchscreen of display 2302, a button 2304, a mic (not displayed)), and a wireless communication radio. In some examples, the electronic device includes a plurality of cameras. In some examples, the electronic device includes only one camera. In some examples, the electronic device includes one or more biometric sensors (e.g., biometric sensor 2303) which, optionally, include a camera, such as an infrared camera, a thermographic camera, or a combination thereof. In some examples, the one or more biometric sensors 2303 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In FIG. 23A, electronic device 2300 displays, on display 2302, a photo gallery user interface 2310. In some examples, photo gallery user interface 2310 slides into the display from an edge of the display (e.g., slides up from the bottom edge of the display) to replace display of a previous interface, application, and/or virtual keyboard. In some examples, photo gallery user interface 2310 slides up in response to a request to open a photo gallery application. In some examples, photo gallery user interface 2310 slides up in response to a request to transfer photos to a participant of a conversation in a messaging application.

In some examples, as shown in FIG. 23A, photo gallery user interface 2310 includes a plurality of selectable preview images corresponding to photos stored on electronic device 2300 (or accessible by the device via a remote server). In some examples, as also shown in FIG. 23A, the plurality of selectable preview images are organized based on time (e.g., a date during which a photo was taken) and/or based on location (e.g., of where a photo was taken). For example, the plurality of selectable preview images 2312A-2312F shown under header 2312 correspond to photos taken on April 30 at Cupertino, Calif. and the plurality of selectable preview images 2314A-2314C shown under header 2314 corresponds to photos taken yesterday at San Francisco, Calif.

In some examples, upon launching the photo gallery application, electronic device 2300 displays selectable preview images of photo gallery user interface 2310 that can be selected (to be transferred). For instance, the plurality of selectable preview images include selectable preview images 2314-2314C. As shown in FIG. 23A, plurality of selectable preview images 2314A-2314C can be selected by a user to be transferred to a participant via one or more applications, such as a messaging application or email application.

Figure 23B:
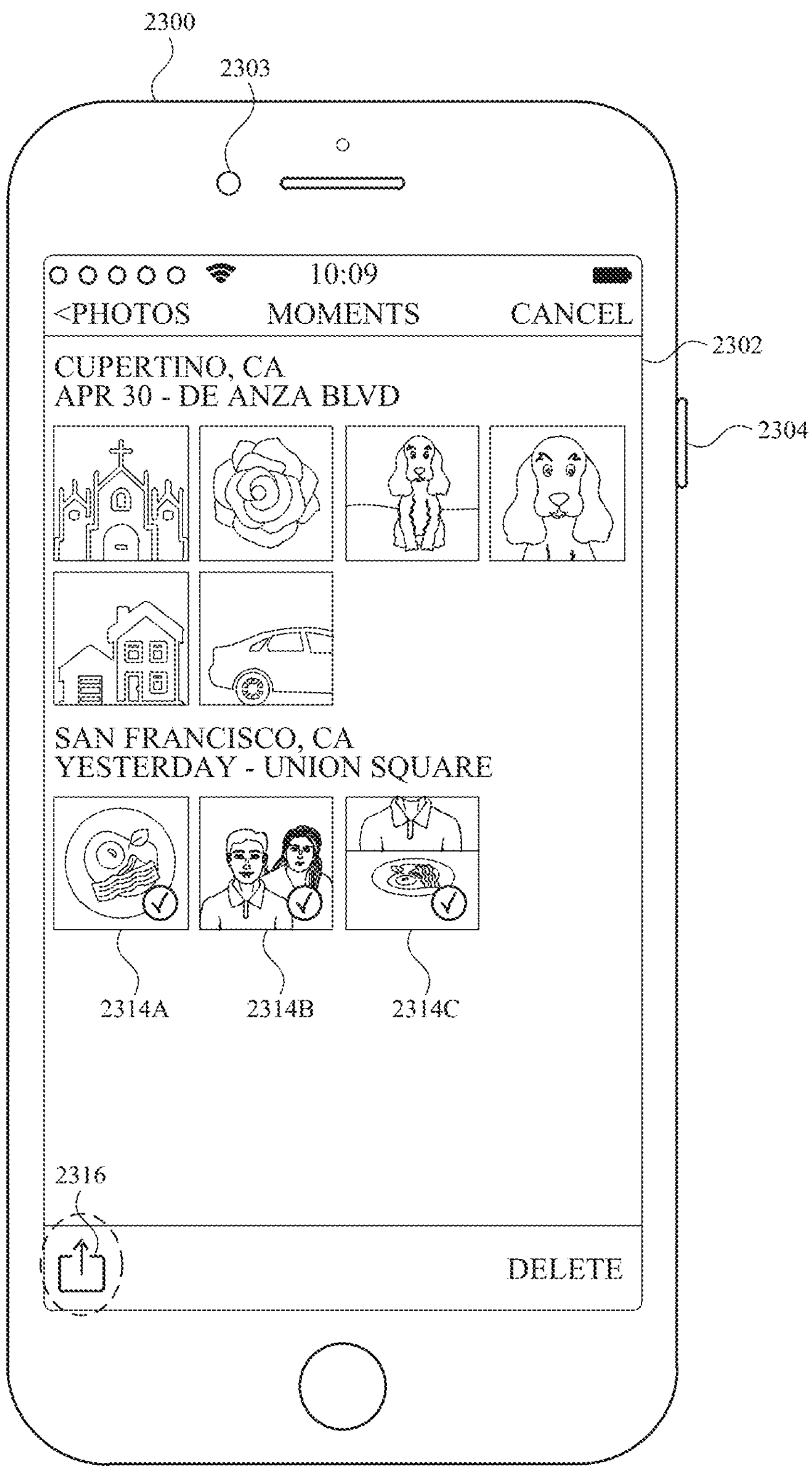

In FIG. 23B, while displaying photo gallery user interface 2310 with selectable preview images 2314A-2314C (corresponding to photos selected to be transferred), electronic device 2300 detects user activation 2301 of a transfer affordance 2316 (e.g., a button) for initiating transfer of the photos corresponding to selectable preview images 2314A-2314B. For example, user activation 2301 is a tap gesture on transfer affordance 2316.

Figure 23C:
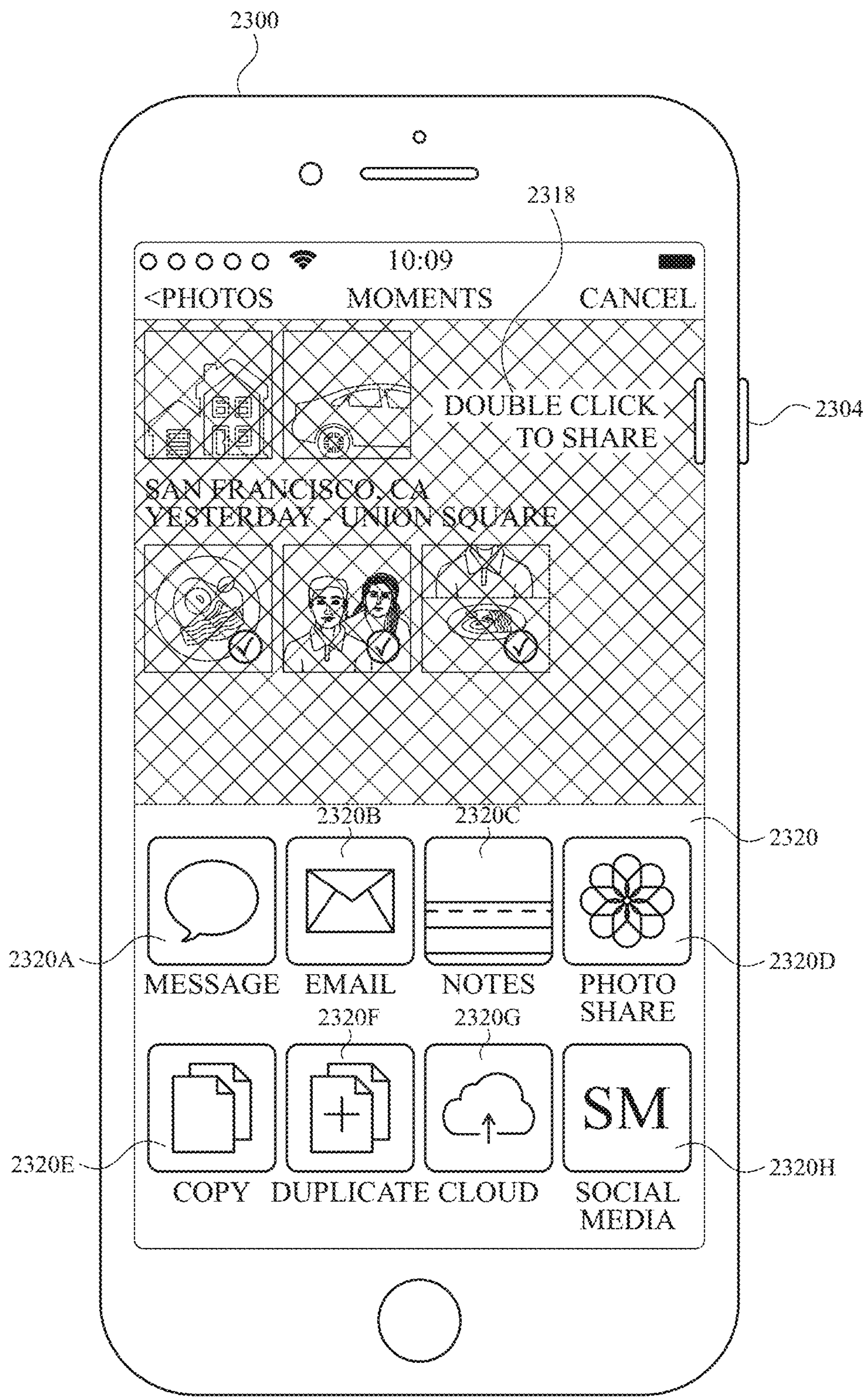

In FIG. 23C, in response to detecting the activation of transfer affordance 2316, electronic device 2300 provides a prompt 2318. As illustrated in FIG. 23C, in some examples, prompt 2318 instructs the user to provide one or more activations of button 2304, such as a double press of button 2304. In some examples, prompt 2318 is emphasized relative to one or more other displayed objects. Emphasizing the prompt in this manner includes, for instance, darkening, blurring, and/or otherwise obfuscating one or more portions of photo gallery user gallery 2310.

As also illustrated in FIG. 23C, further in response to detecting the activation of transfer affordance 2316, electronic device 2300 displays an application selection interface 2320 including a plurality of application affordances 2320A-2320H. In some examples, each of application affordances 2320A-2320H corresponds to an application that can be used for transferring images (to a different device other than electronic device 2300), such as images corresponding to selectable preview images 2314A-2314C.

In some examples, button 2304 has a fixed position relative to display 2302 and/or one or more other components of electronic device 2300. In some examples, prompt 2318 is also displayed in a fixed position relative to display 2302 and/or one or more other components of the electronic device. In this manner, prompt 2318 is displayed at a predetermined position relative to button 2304.

Figure 23D:
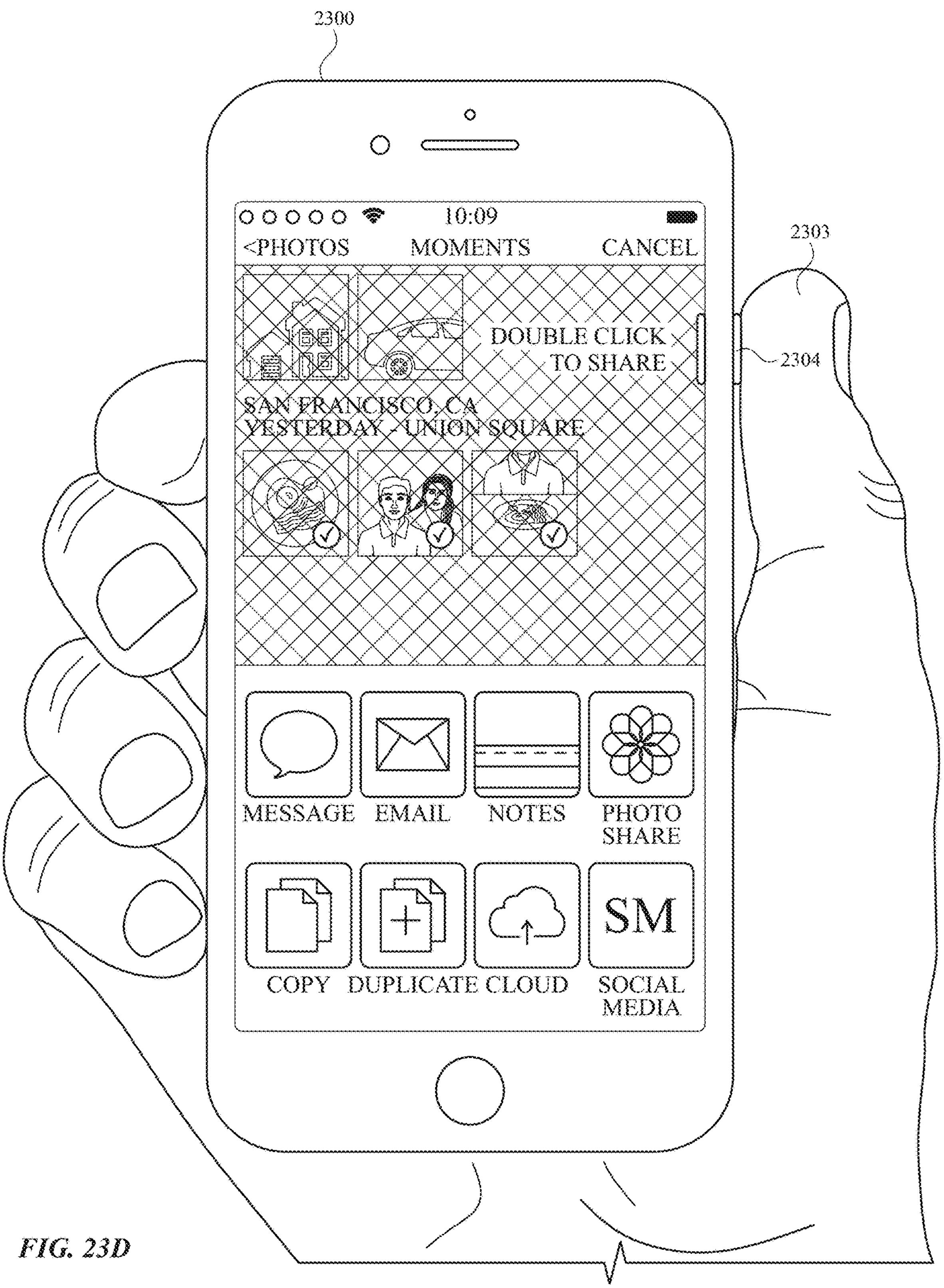

In FIG. 23D, while displaying prompt 2318 (which is optionally overlaid over the photo gallery user interface), electronic device 2300 detects user activation 2306 of button 2304. In some examples, as shown in FIG. 23D, the user activation is a double press of button 2304. In some examples, the double press of button 2304 includes a first press of the button and a second press of the button occurring within a predetermined amount of time (e.g., 1 second).

Figure 23E:
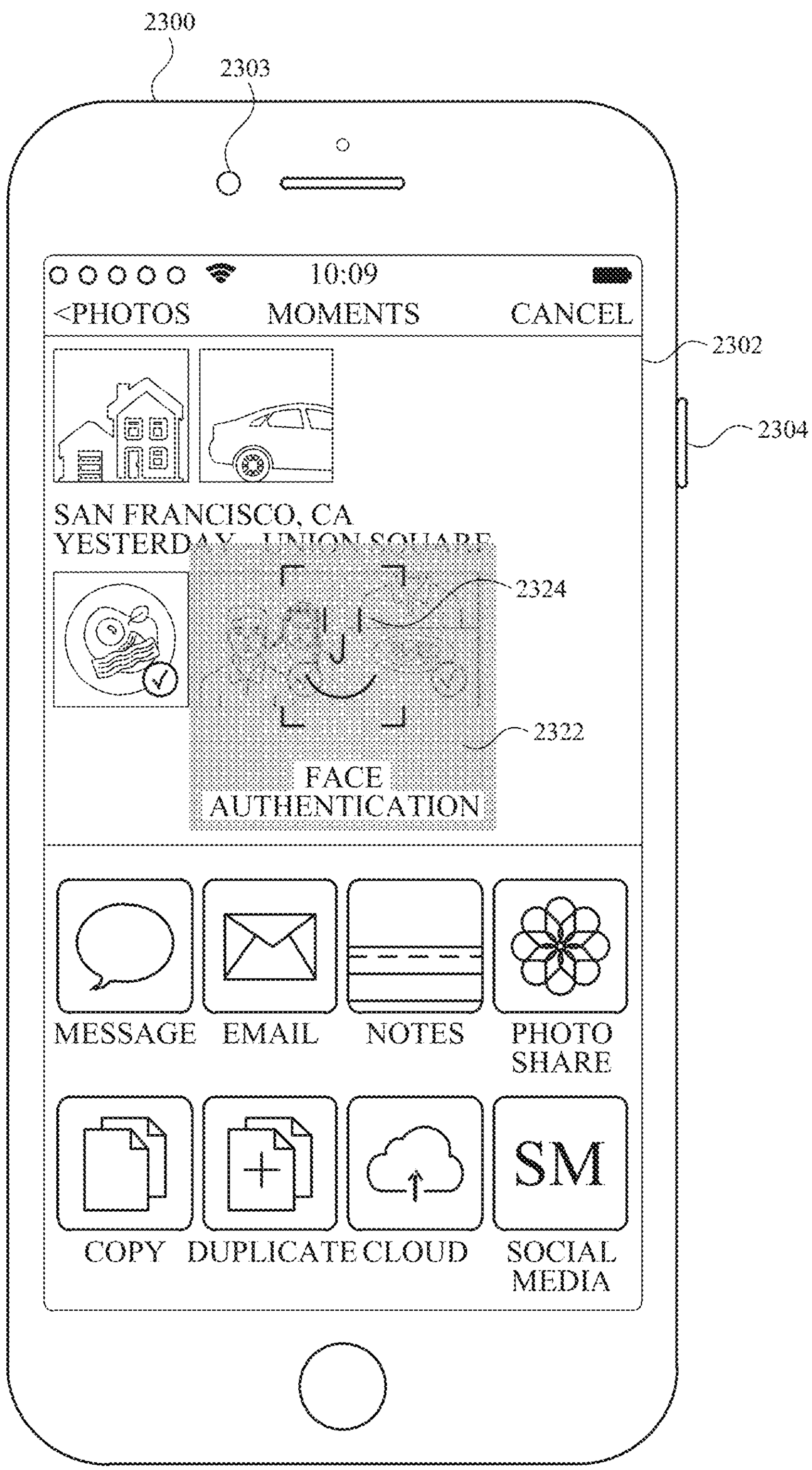

In response to detecting the one or more activations of button 2304, electronic device 2300 initiates biometric authentication (e.g., facial recognition authentication) for a biometric feature (e.g., face) of the user. As illustrated in FIG. 23E, in some examples, upon initiation of biometric authentication, a biometric authentication interface 2322 is provided (e.g., is displayed on display 2302). In some examples, the biometric authentication interface is overlaid over an application interface, such as photo gallery user interface 2310, during the biometric authentication. In some examples, the biometric authentication includes a simulation of a representation of the biometric feature, such as a glyph 2324. Further in response to the one or more activations of button 2304, one or more biometric sensors 2303 of electronic device 2300, such as one or more cameras or a facial recognition sensor (e.g., included among one or more biometric sensors 2303), are activated.

In some examples, once the one or more biometric sensors 2303 are activated, electronic device 2300 obtains (e.g., captures) biometric data corresponding to the biometric feature associated with the user. In some examples, the biometric feature captures the biometric data using the one or more biometric sensors 2303 (and/or biometric sensors of one or more cameras) of the electronic device. Optionally, a light-emitting device, such as an IR flood light or a structured light projector is used to assist in illuminating the biometric feature. In other examples, the electronic device receives the biometric data from another device.

In some examples, once electronic device 2300 has obtained the biometric data, the electronic device processes (e.g., analyzes) the biometric data to determine whether the biometric authentication is successful. In some examples, this determination includes determining whether the biometric data matches a biometric template associated with the user. The biometric template is, optionally, stored on electronic device 2300.

Figure 23F:
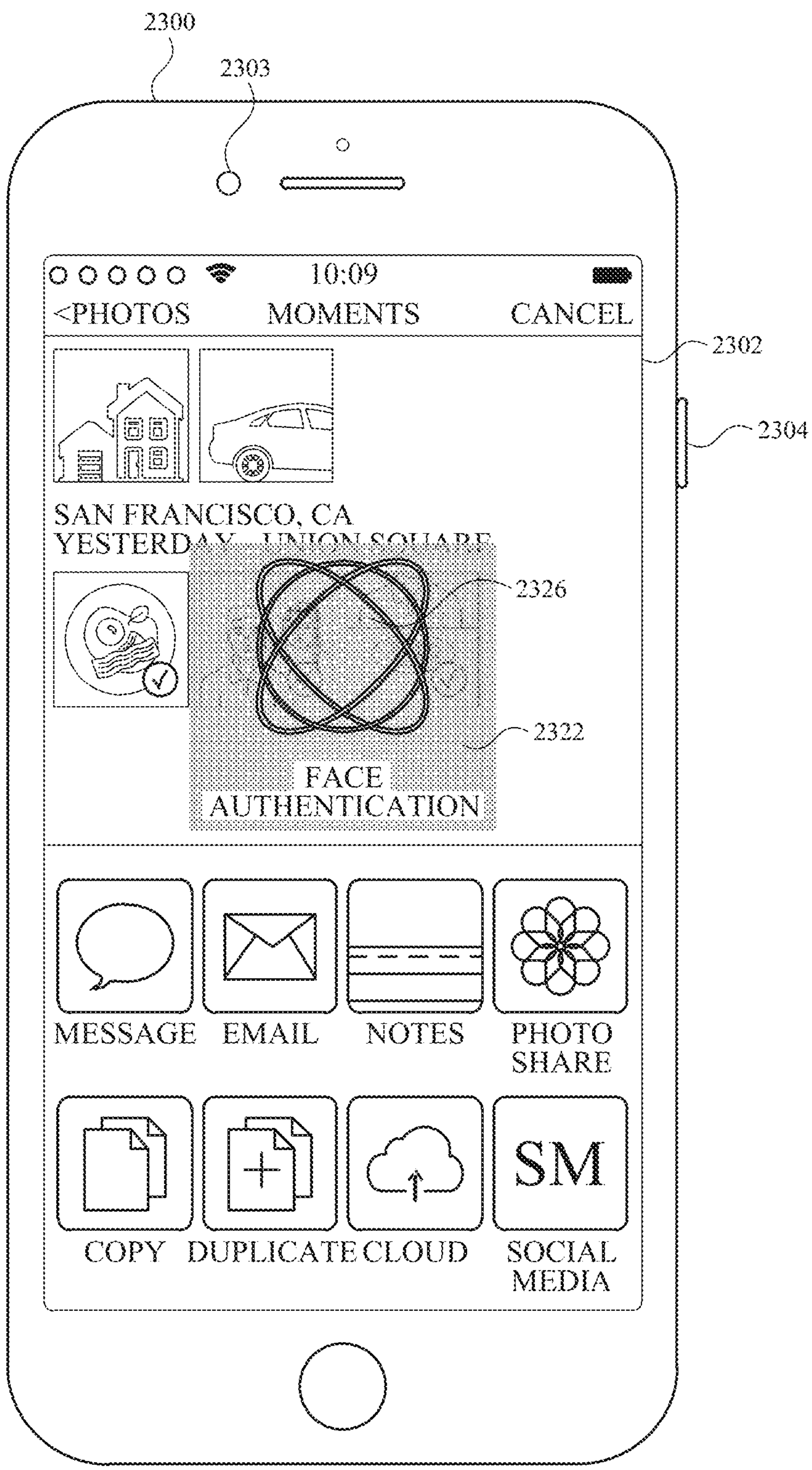

In some examples, as illustrated in FIG. 23F, while processing the biometric data, the biometric authentication interface 2322 indicates that the biometric data is being processed by the electronic device, for instance, by displaying one or more rotating rings 2326 using the biometric authentication interface, as described with reference to FIGS. 17A-AI. In some examples, one or more rotating rings 2326 replaces glyph 2324 within the biometric authentication interface.

Figure 23G:
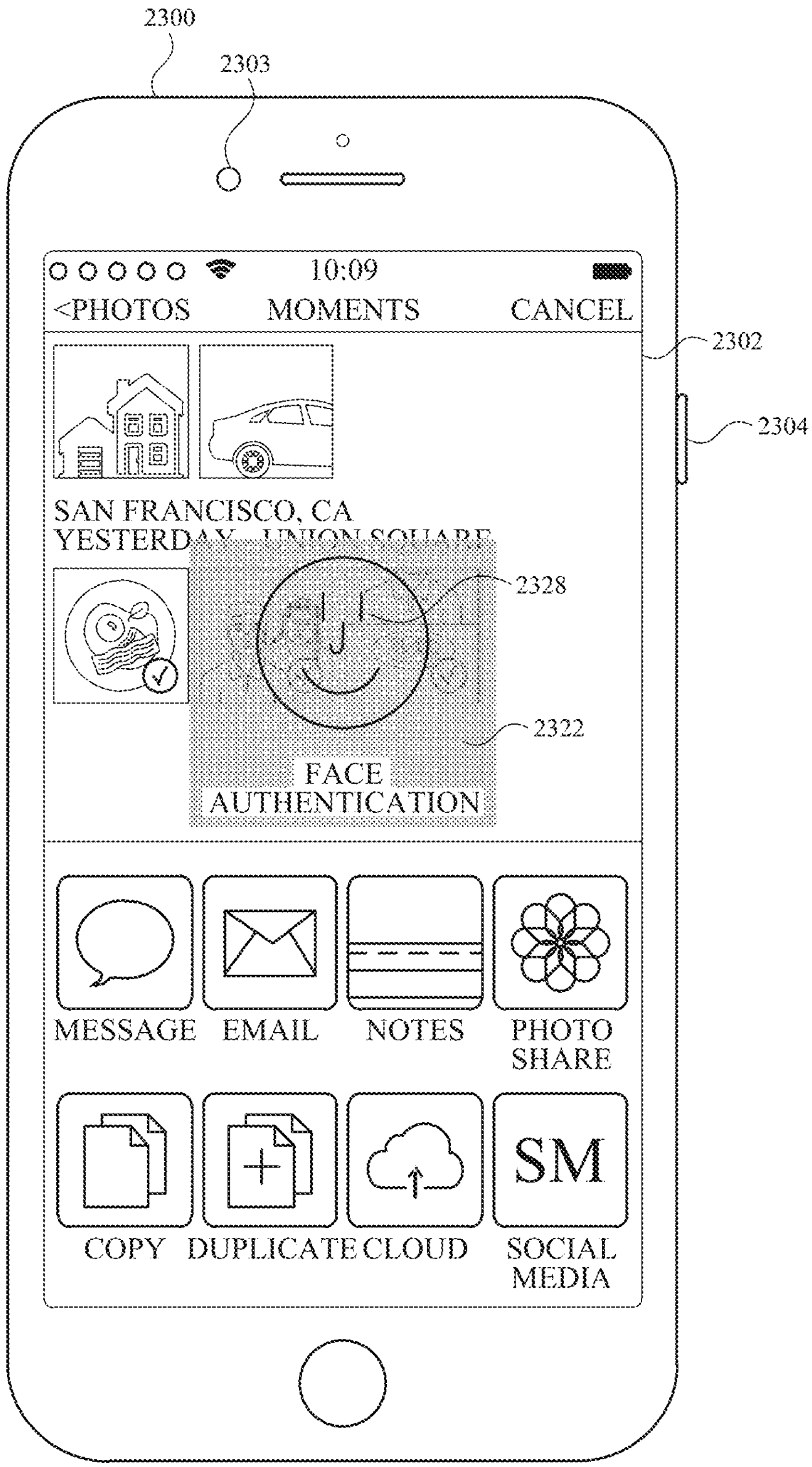

If electronic device 2300 determines that biometric authentication is successful (e.g., the biometric data matches a biometric template associated with the user), the electronic device transitions from a state in which a function (e.g., image transfer) is disabled to a state in which the function is enabled. By way of example, successful biometric authentication enables the electronic device to transfer (e.g., share) images, such as images corresponding to selectable preview images 2314A-2314C. In some examples, the electronic device further indicates that the biometric authentication was successful, for instance, by displaying a simulation of a representation of the biometric feature in the biometric authentication interface. As shown in FIG. 23G, in some examples, biometric authentication interface 2322 includes a glyph 2328 indicating (to the user) that the biometric authentication was successful. In some examples, glyph 2328 replaces one or more rotating rings 2326 within biometric authentication interface 2322.

Figure 23H:
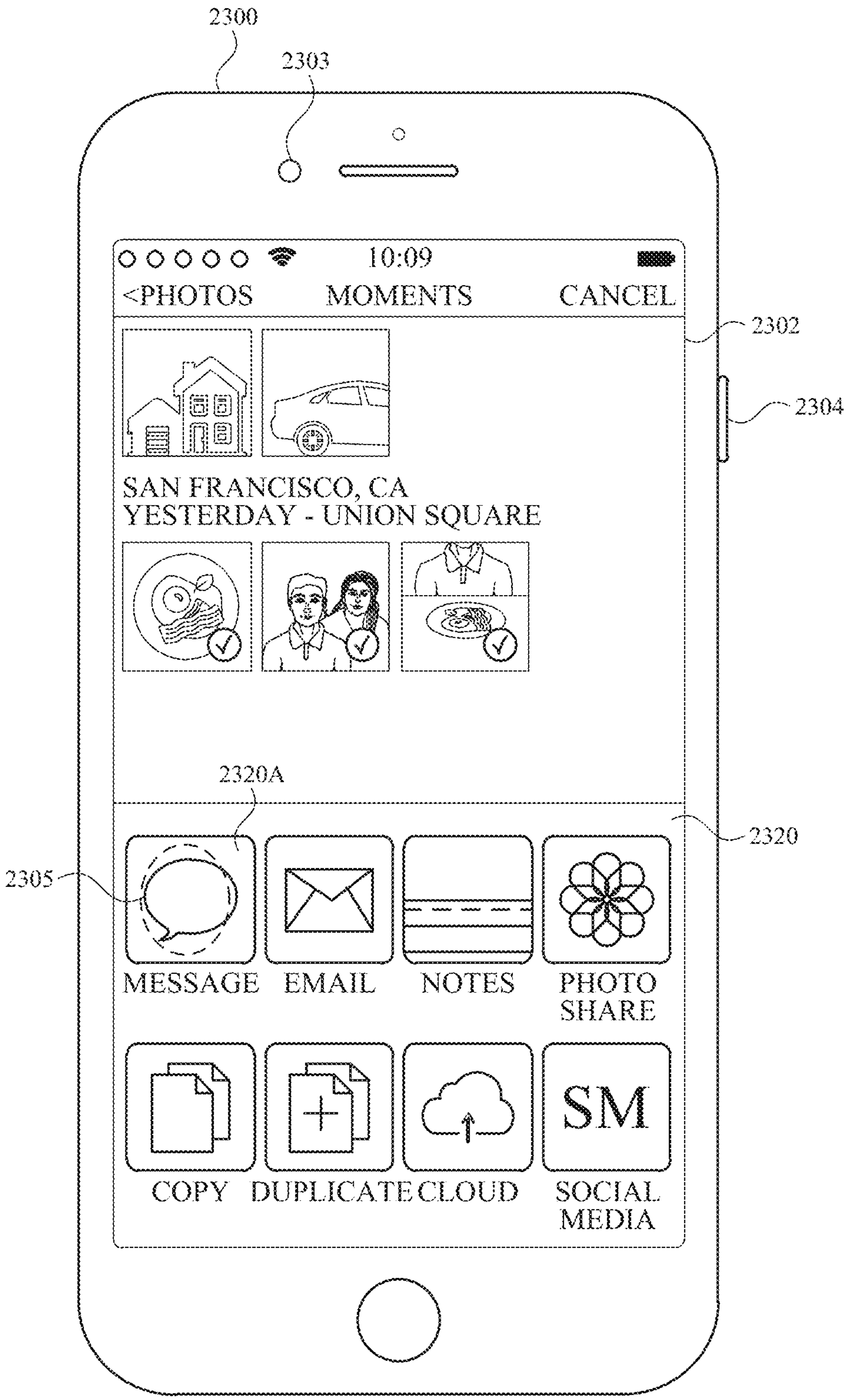
Figure 23I:
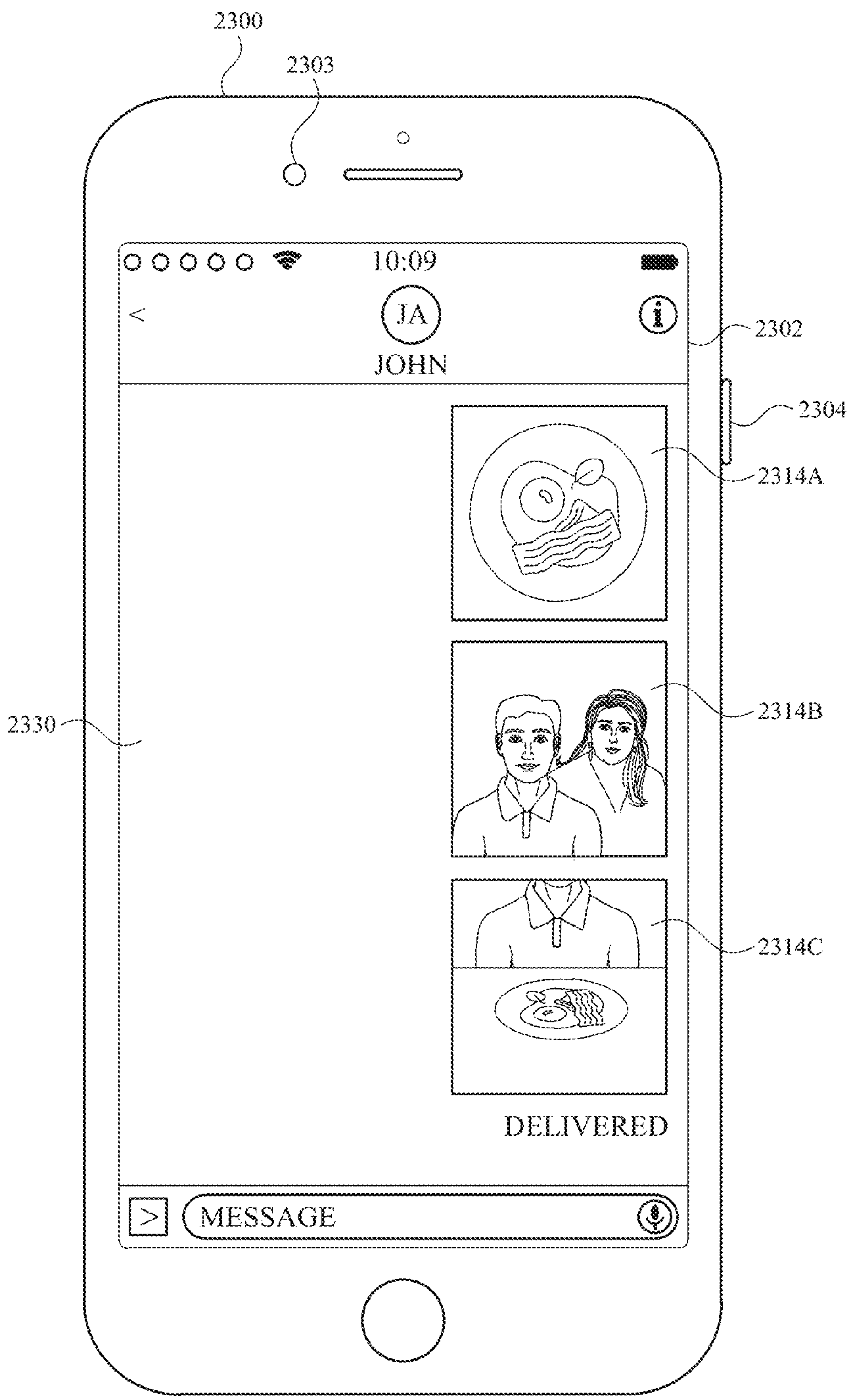

With reference to FIG. 23H, after the image transfer has been enabled on electronic device 2300 in response to successful biometric authentication, and while displaying application selection interface 2320, the electronic device detects user activation 2305 of an application affordance (to launch the corresponding application). For example, the activated affordance is application affordance 2320A. The activation of application affordance 2320A launches an application 2330 (e.g., a messaging application) corresponding to application affordance 2320A and/or causes the electronic device to transfer images corresponding to selectable preview images 2314A-2314C using application 2330 (e.g., simultaneously with the launching of the application), as shown in FIG. 23I.

Figure 23J:
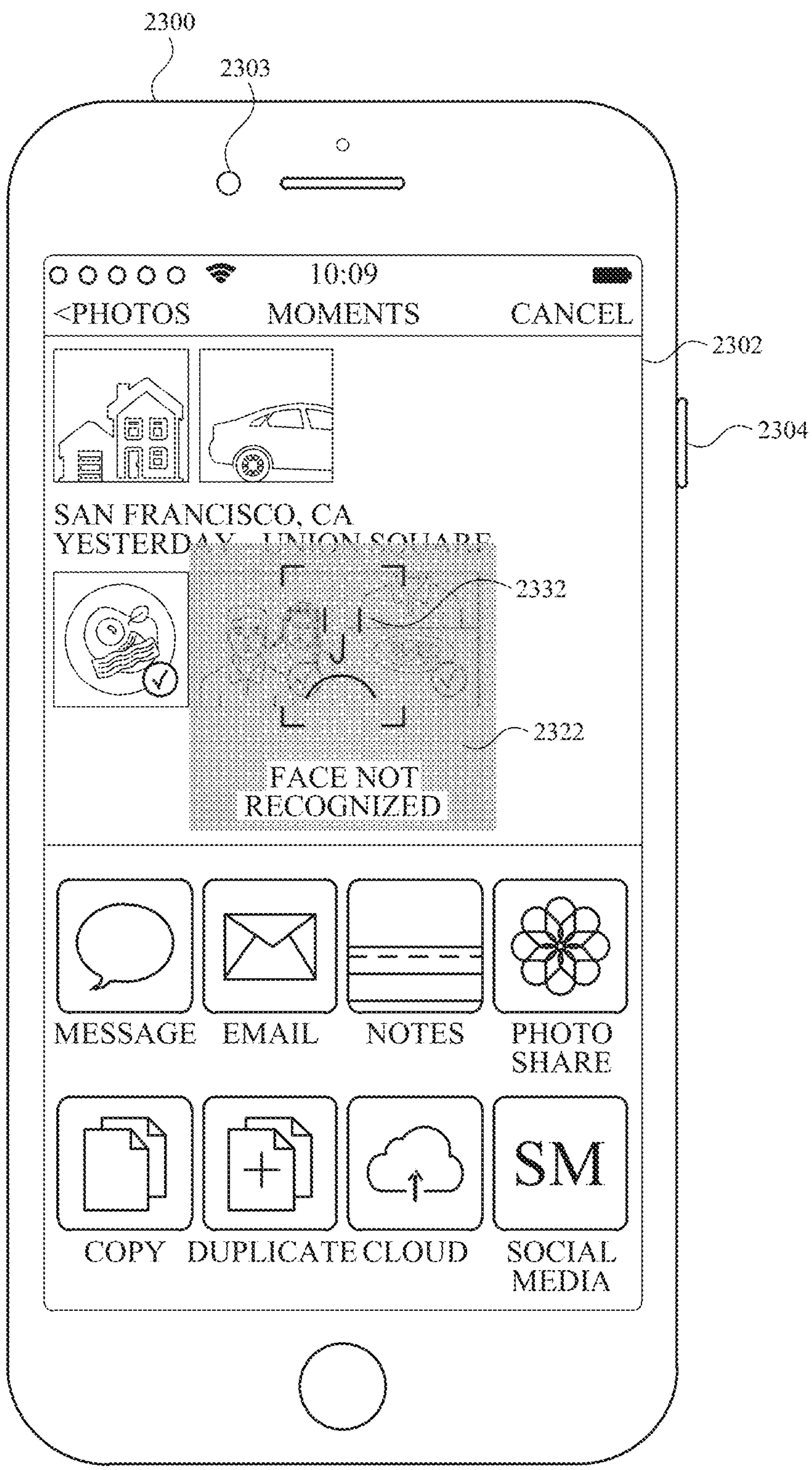

If electronic device 2300 determines that biometric authentication is unsuccessful (e.g., the biometric data does not match a biometric template associated with the user), the electronic device does not transition between states (e.g., from a state in which a function, such as authorizing the transfer of images, is disabled to a state in which the function is enabled) but maintains a same state. In some examples, the electronic device further indicates (to the user) that the biometric authentication was unsuccessful, for instance, by displaying a simulation of a representation of the biometric feature in the biometric authentication interface. As shown in FIG. 23J, in some examples, biometric authentication interface 2322 includes a glyph 2332 indicating that the biometric authentication was unsuccessful. Glyph 2332 indicates, for instance, that the biometric feature was not recognized by the electronic device.

Figure 23K:
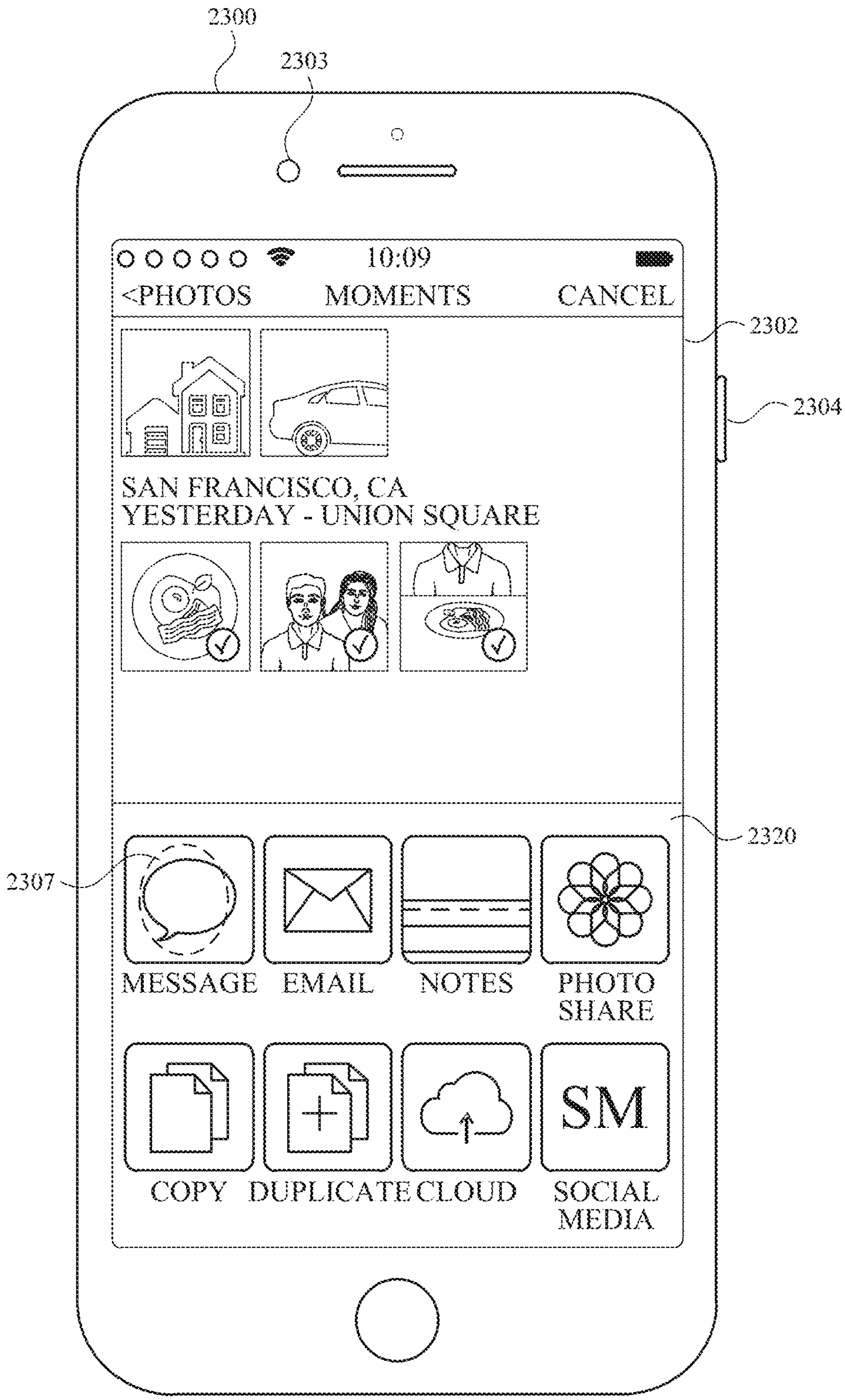
Figure 23L:
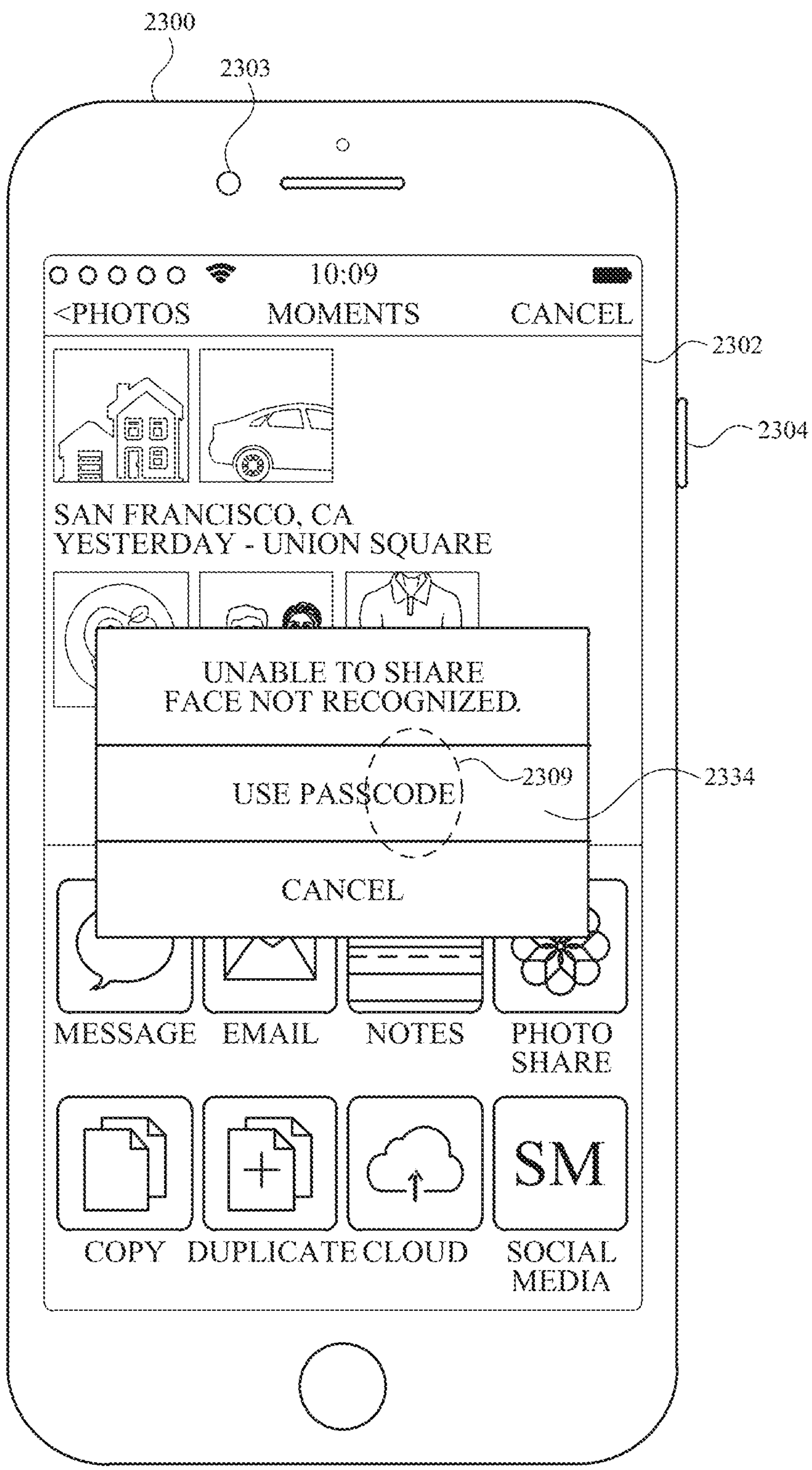
Figure 23M:
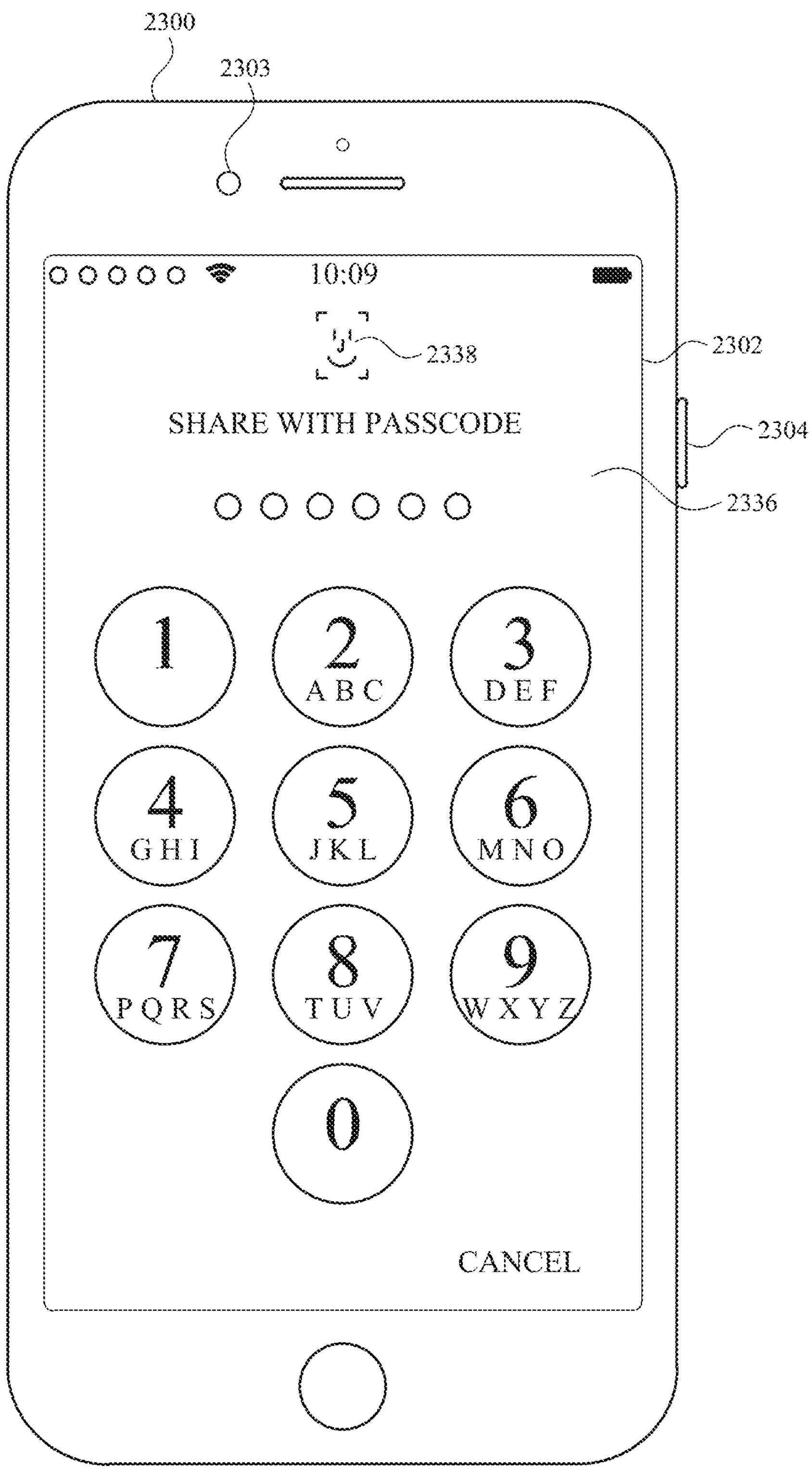

In FIG. 23K, after the image transfer has not been enabled on electronic device 2300 in response to the unsuccessful biometric authentication, and while displaying application selection interface 2320, the electronic device detects user activation 2307 of application affordance 2320A. In some examples, as shown in FIG. 23L, in response to detecting the activation of application affordance 2320A of application selection user interface 2320, electronic device 2300 displays an alternative authentication affordance 2334 (e.g., a password affordance, a passcode affordance). In some examples, while displaying alternative authentication affordance 2334, the electronic device detects user activation 2309 of alternative authentication affordance 2334. The activation of the alternative authentication affordance causes display of an alternative authentication interface 2336 (e.g., a password interface, a passcode interface), as shown in FIG. 23M.

Figure 23N:
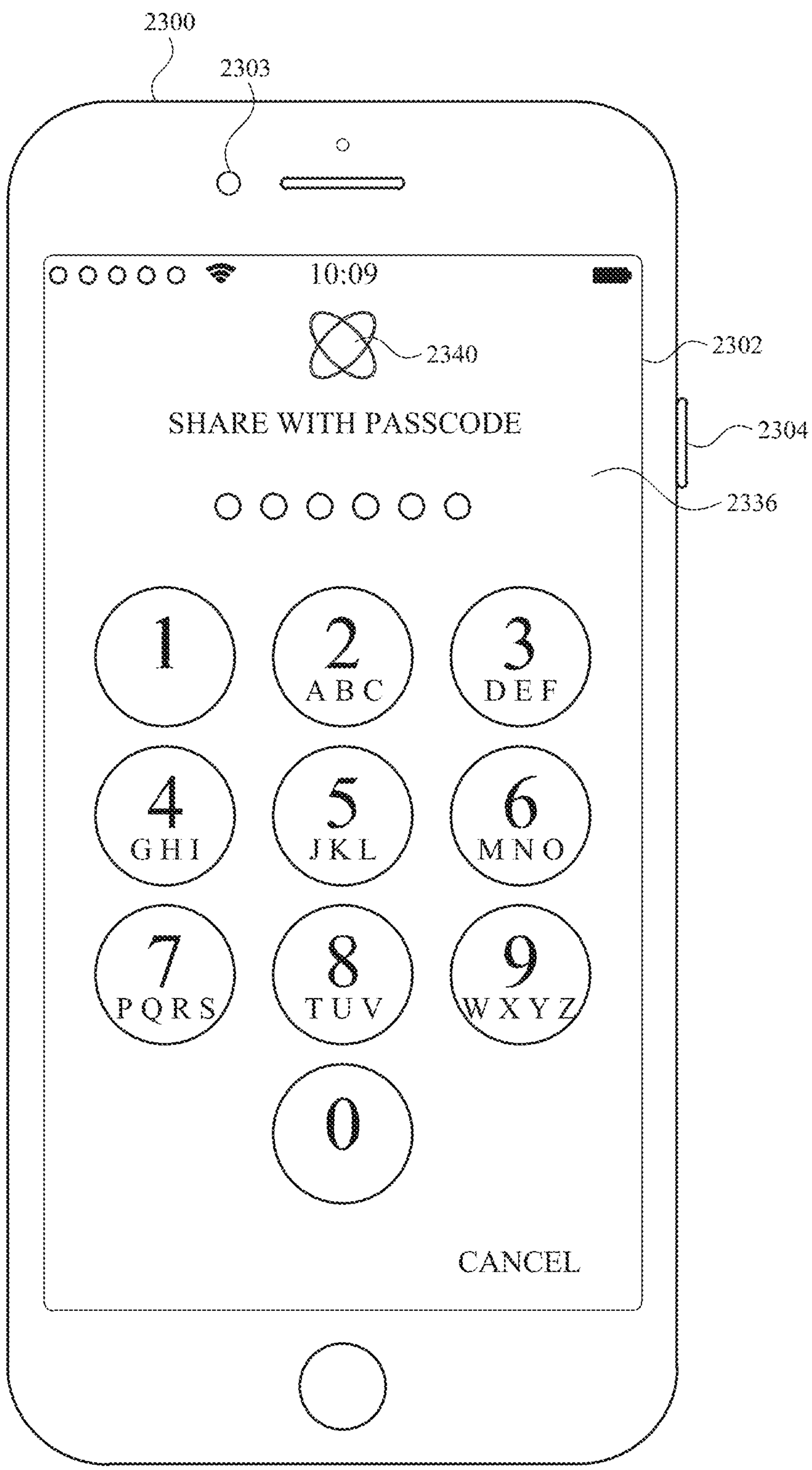

In some examples, electronic device 2300 performs biometric authentication during display of alternative authentication interface 2336. In some examples, the electronic device obtains and processes biometric data to determine whether the obtained biometric data matches a biometric template associated with the user. As such, in some examples, alternative authentication interface 2336 includes a simulation of a representation of the biometric feature, such as a glyph 2338 (e.g., corresponding to glyph 2324), as shown in FIG. 23M. In some examples, alternative authentication interface 2336 indicates that the biometric data is being processed by the electronic device, for instance, by displaying one or more rotating rings 2340 (e.g., corresponding to one or more rotating rings 2326), as shown in FIG. 23N, and as described with reference to FIGS. 17A-AI. In some examples, one or more rotating rings 2340 replaces glyph 2338 within the alternative authentication interface.

Figure 23O:
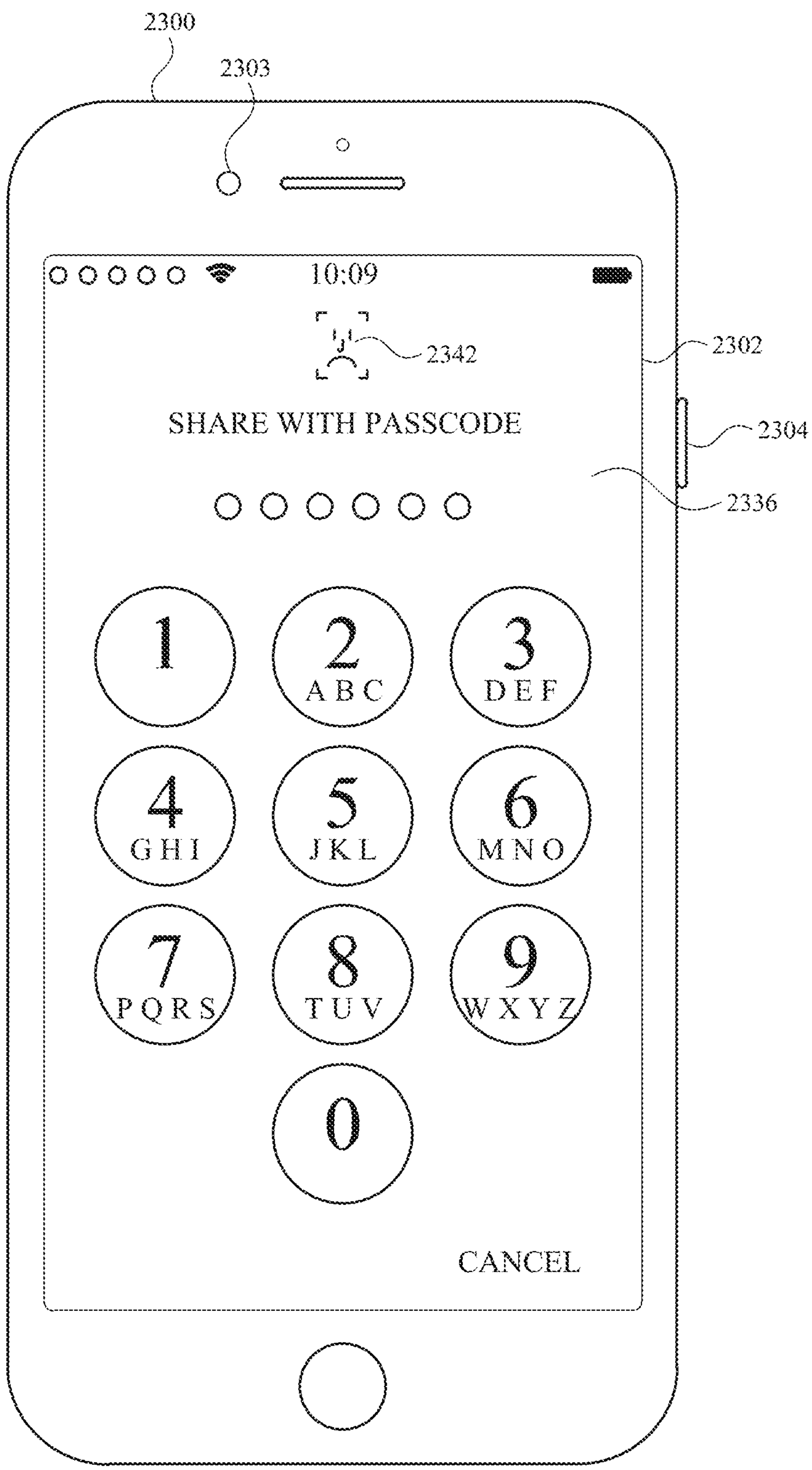

If electronic device 2300 determines that biometric authentication is unsuccessful (e.g., the biometric data does not match a biometric template associated with the user), the electronic device remains in a state in which a function (e.g., the image transfer) is disabled. In some examples, the electronic device further indicates that the biometric authentication was unsuccessful, for instance, by displaying a simulation of a representation of the biometric feature in alternative authentication interface 2336. As shown in FIG. 23O, in some examples, alternative authentication interface 2336 includes a glyph 2342 (e.g., corresponding to glyph 2328) indicating (to the user) that the biometric authentication was unsuccessful. In some examples, glyph 2342 replaces one or more rotating rings 2340 within the alternative authentication interface.

Figure 23P:
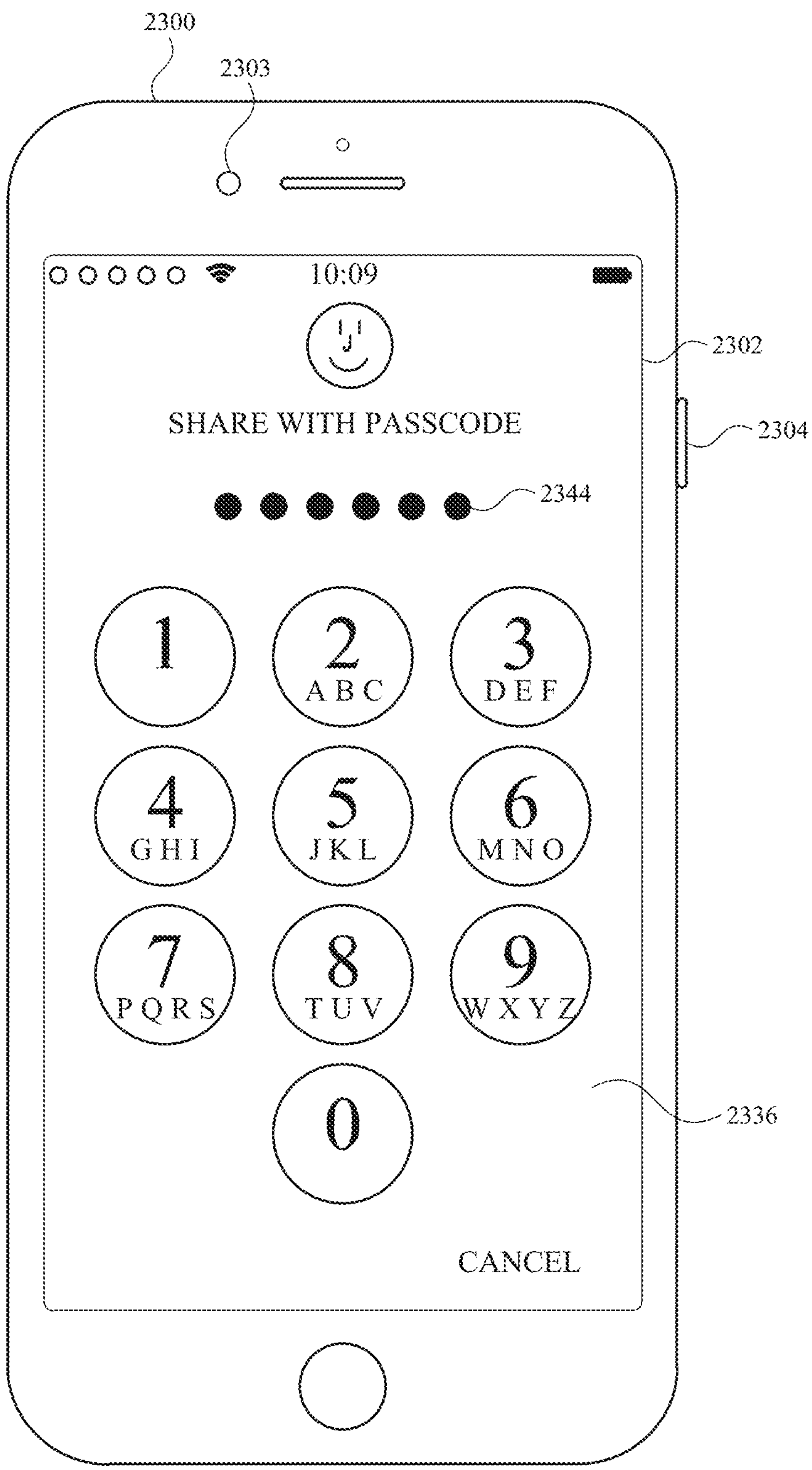

In some examples, in addition to, or instead of, biometric authentication, electronic device 2300 performs passcode authentication during display of alternative authentication interface 2336. Accordingly, the electronic device receives and processes passcode data to determine whether the received passcode data matches an enrolled passcode associated with the user. As such, in some examples, alternative authentication interface 2336 includes an indication of the received passcode input, such as passcode indication 2344, as shown in FIG. 23P.

As discussed above, if electronic device 2300 determines that biometric authentication and/or passcode authentication is successful, the electronic device transitions from a state in which a function (e.g., image transfer) is disabled to a state in which the function is enabled. For example, as shown in FIG. 23Q, successful biometric and/or passcode authentication enables the electronic device to transfer (e.g., share) images, such as images corresponding to selectable preview images 2314A-2314C, via application 2330 (e.g., a messaging application).

As mentioned above, the exemplary example of the user interfaces illustrated in FIGS. 23A-23Q described above relate to the exemplary example of the user interfaces illustrated in FIGS. 24A-24BC described below. Therefore, it is to be understood that the processes described above with respect to the exemplary user interfaces illustrated in FIGS. 23A-23Q and the processes described below with respect to the exemplary user interfaces illustrated in FIGS. 24A-24BC are largely analogous processes that similarly involve initiating and managing biometric authentication using an electronic device (e.g., 100, 300, 500, 2300, or 2400).

FIGS. 24A-24BC illustrate exemplary user interfaces for managing biometric authentication, in accordance with some examples. The user interfaces in these figures are used to illustrate the processes described below, including the processes in FIGS. 25A-25C.

FIG. 24A illustrates an electronic device 2400 (e.g., portable multifunction device 100, device 300, or device 500). In the exemplary example illustrated in FIGS. 24A-24BC, electronic device 2400 is a smartphone. In other examples, electronic device 2400 can be a different type of electronic device, such as a wearable device (e.g., a smartwatch). Electronic device 2400 has a display 2402, one or more input devices (e.g., touchscreen of display 2402, a button 2404, a mic (not displayed)), and a wireless communication radio. In some examples, the electronic device includes a plurality of cameras. In some examples, the electronic device includes only one camera. In some examples, the electronic device includes one or more biometric sensors (e.g., biometric sensor 2403) which, optionally, include a camera, such as an infrared camera, a thermographic camera, or a combination thereof. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In FIG. 24A, electronic device 2400 displays, on display 2402, a tutorial user interface 2410. In some examples, tutorial user interface 2410 slides into the display from an edge of the display (e.g., slides up from the bottom edge of the display) to replace display of a previous interface, application, and/or virtual keyboard. In some examples, tutorial user interface 2410 slides up in response to a request to proceed with a payment transaction (e.g., with a different device, such as a transaction terminal).

In some examples, as shown in FIG. 24A, tutorial user interface 2410 includes a text indication 2410A indicating to the user that an input (e.g., a double press of button 2404) can be performed to proceed with the payment transaction. In some examples, as also shown in FIG. 24A, tutorial user interface 2410 includes a graphical indication 2410B, corresponding to text indication 2410A, indicating (to the user) that an input (e.g., a double press of button 2404) can be performed to proceed with the payment transaction.

In some examples, in response to detecting user activation of an affordance (e.g., a “continue” affordance) on tutorial user interface 2410, electronic device 2400 displays, on display 2402, a pay user interface 2412 that includes a representation of a payment account 2414 currently selected for use in a payment transaction overlaid by a prompt 2416 instructing that the user provide one or more activations of button 2404 (e.g., a double press of button 2404), as shown in FIG. 24B. In some examples, prompt 2416 is emphasized relative to one or more other displayed objects (on pay user interface 2412). Emphasizing the prompt in this manner includes, for instance, darkening, blurring, and/or otherwise obfuscating one or more portions of pay user interface 2412.

Figure 24C:
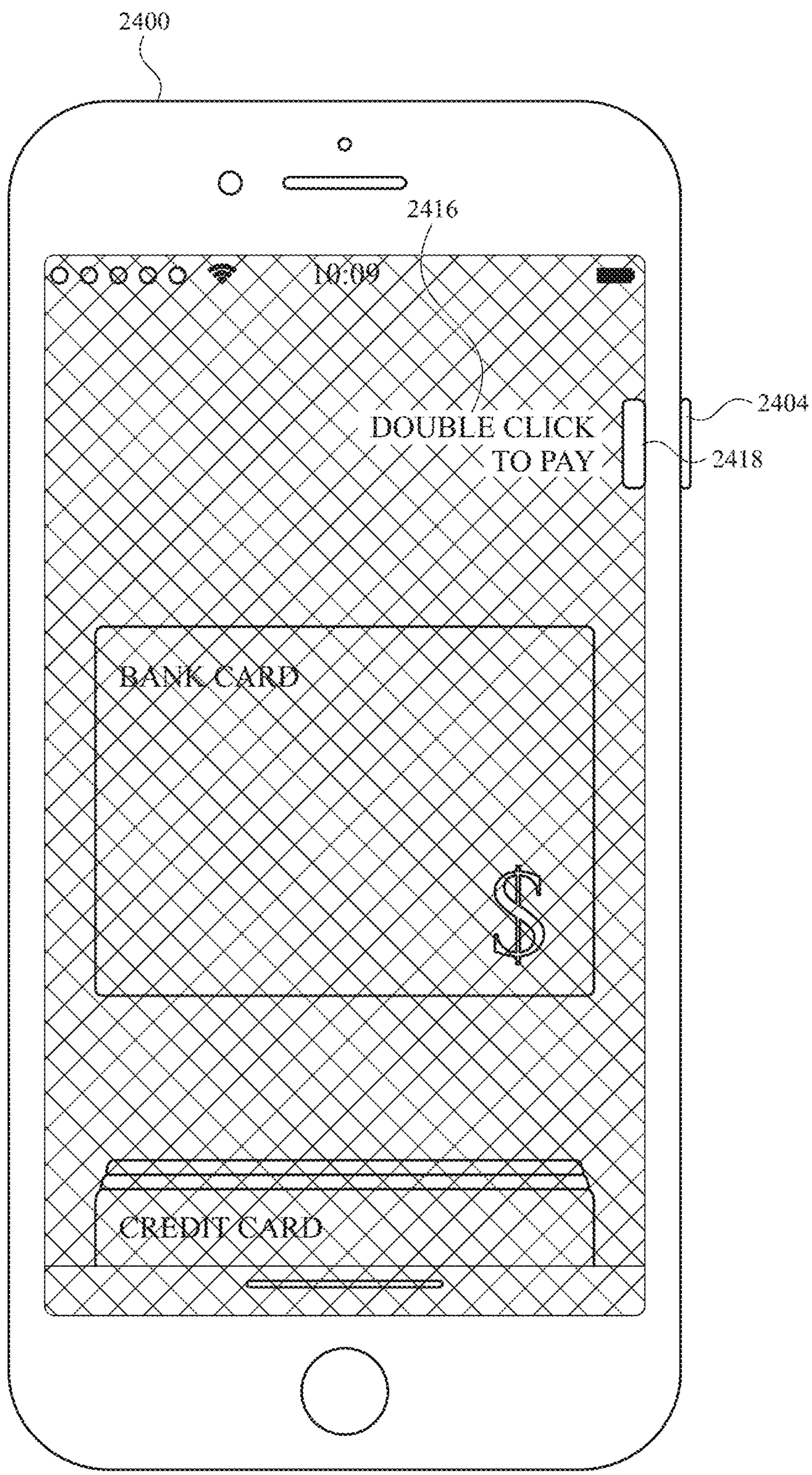

In some examples, the location of button 2404, which is requested by prompt 2416 to be activated (e.g., to proceed with a payment transaction), is emphasized by a dynamic indication 2418. For example, as shown by the transition from FIG. 24B to FIG. 24C, dynamic indication 2418 emphasizes the location of button 2404 on the device by continuously changing in size (e.g., continuously alternating between becoming wider and becoming narrower, or otherwise continuously changing in size) adjacent to the location of button 2404 on the display, thereby allowing the user to more easily locate the button corresponding to the request of prompt 2416.

Figure 24D:
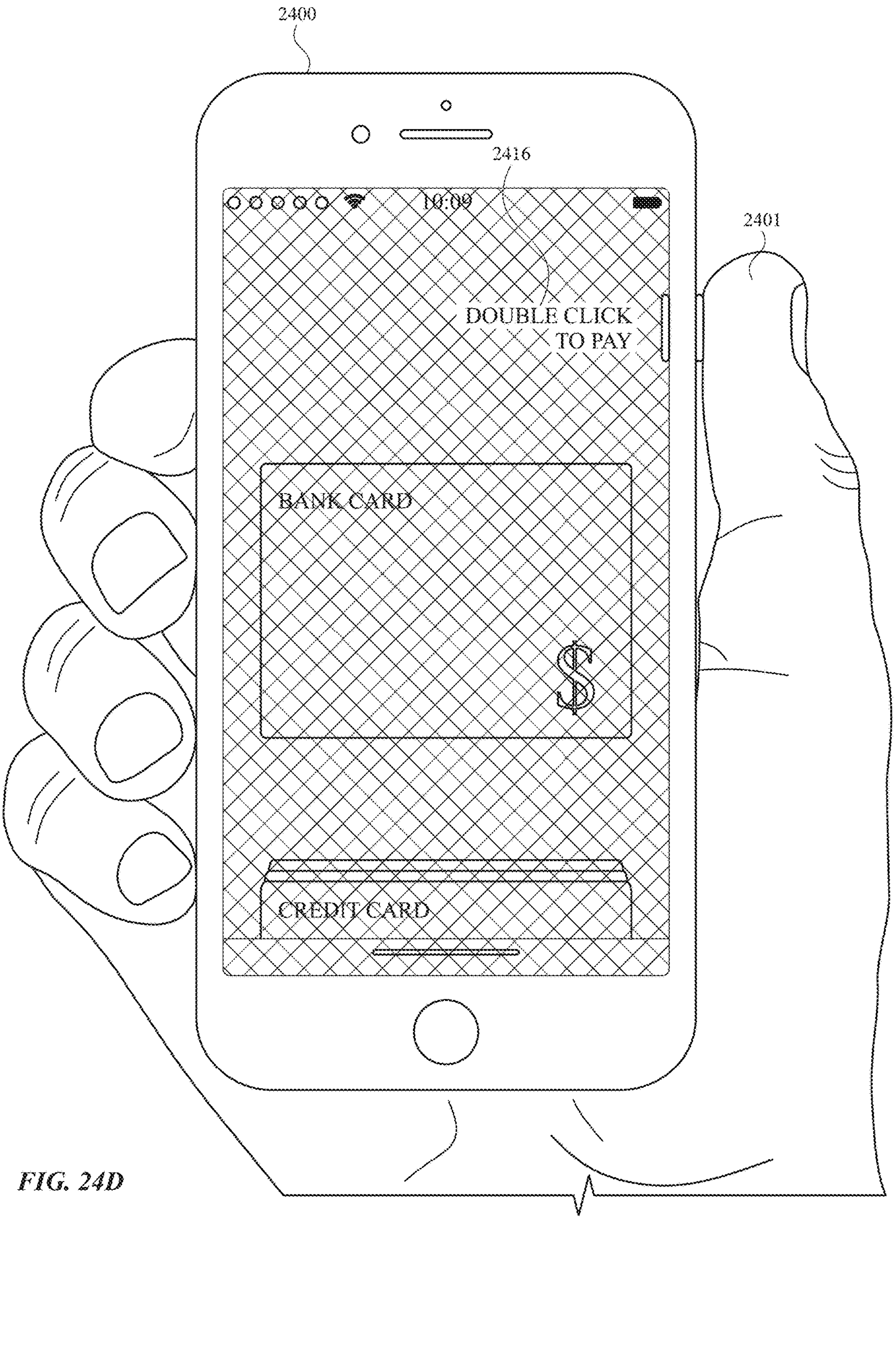

In FIG. 24D, while displaying prompt 2416, electronic device 2400 detects activation 2401 of button 2404. In some examples, as shown in FIG. 24D, the activation is a double press of button 2404. In some examples, the double press of button 2404 includes a first press of the button and a second press of the button occurring within a predetermined amount of time (e.g., 1 second).

Figure 24E:
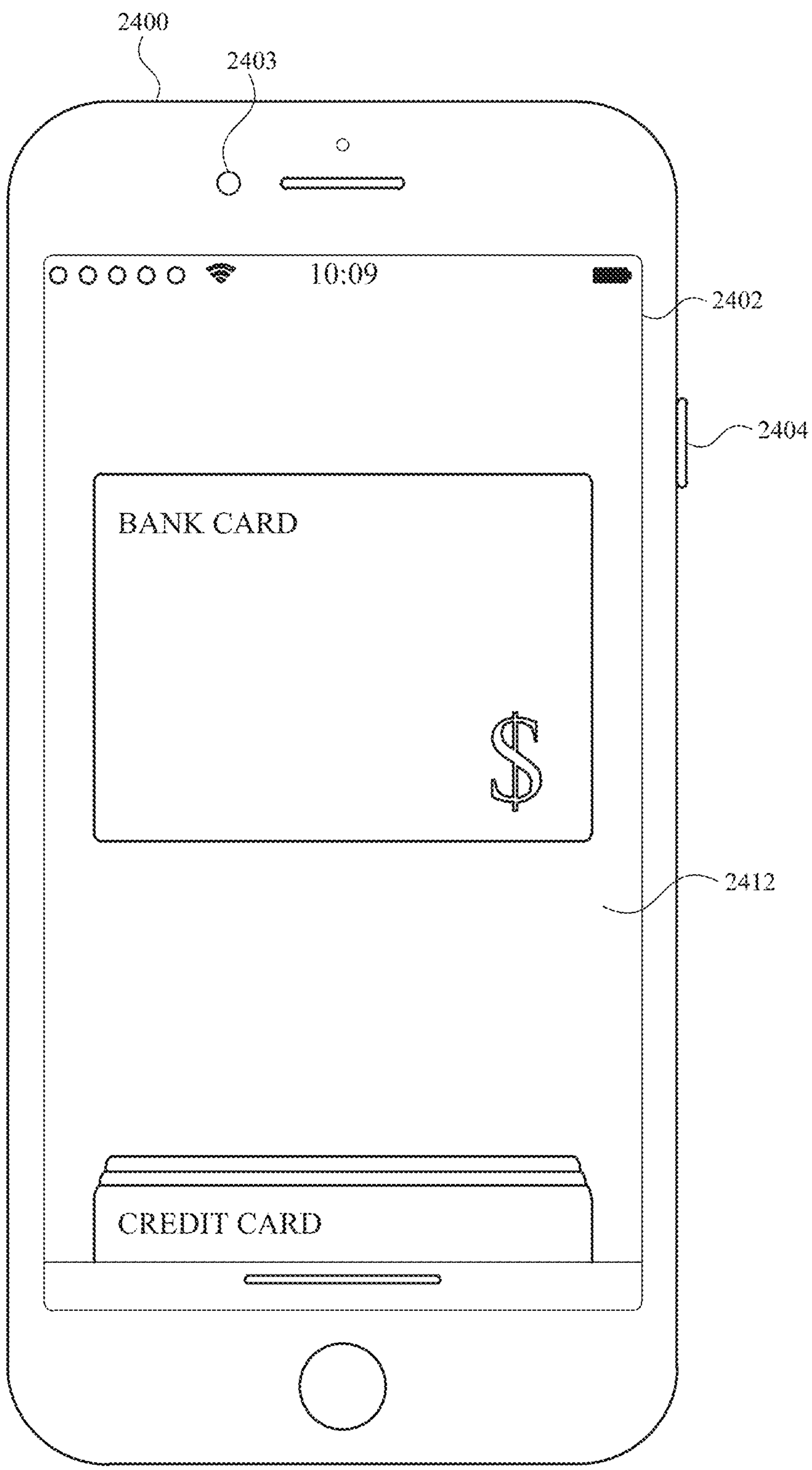
Figure 24F:
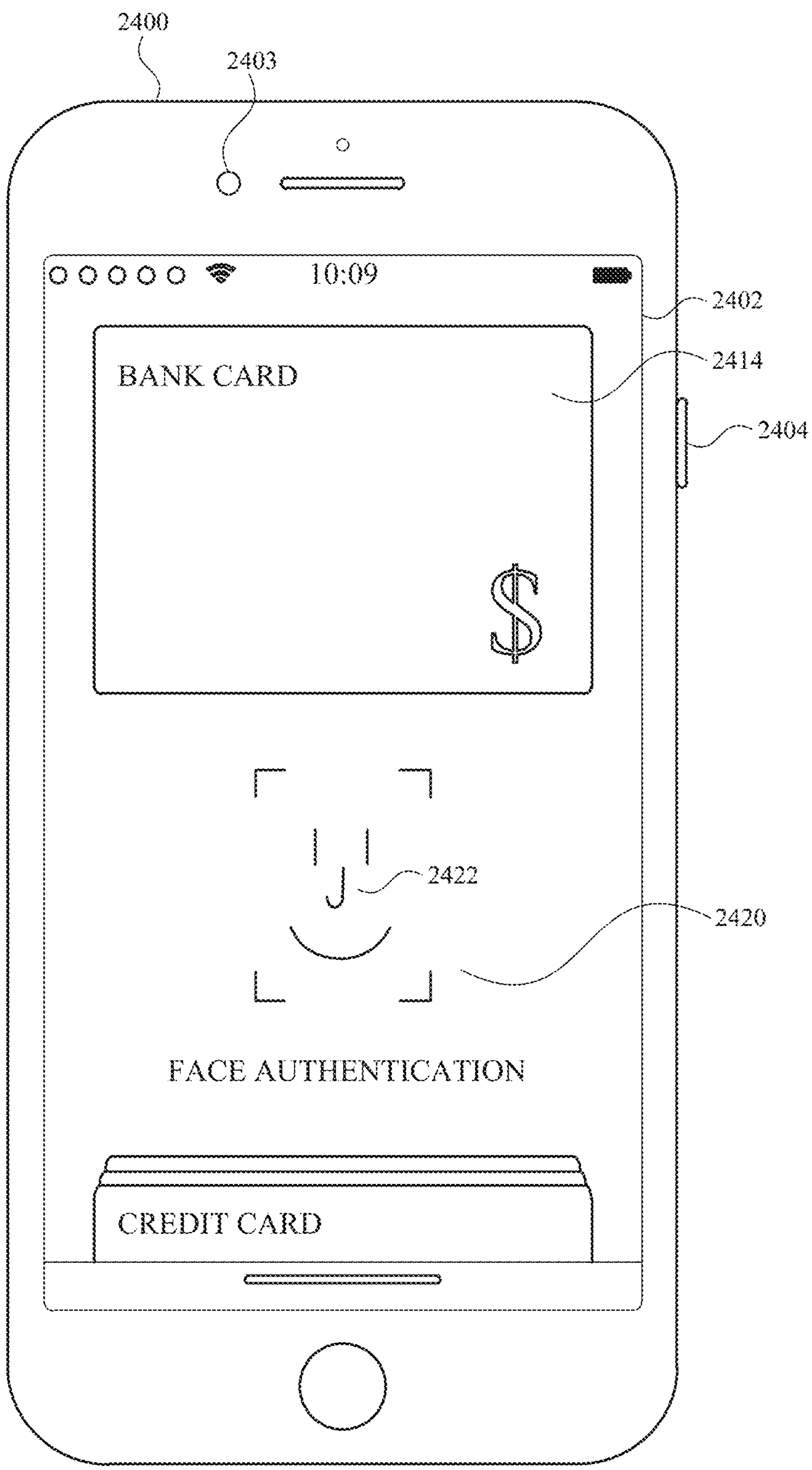

In response to the one or more activations of button 2404, electronic device 2400 removes display of prompt 2416 (and any corresponding emphasis of the prompt) and dynamic indication 2418 overlaid on pay user interface 2412, as shown in FIG. 24E, and initiates biometric authentication (e.g., facial recognition) for a biometric feature (e.g., face) of the user, as shown in FIG. 24F. In some examples, a biometric feature is at least part of a face (e.g., the user's face), and biometric authentication involves facial recognition of at least a portion of the (user's) face.

As illustrated in FIG. 24F, in some examples, upon initiation of the biometric authentication, a biometric authentication interface 2420 is provided. In some examples, the biometric authentication interface is overlaid over pay user interface 2412 during the biometric authentication. In some examples, the biometric authentication includes a simulation of a representation of the biometric feature, such as a glyph 2422. Further in response to the one or more activations of button 2404, one or more biometric sensors of electronic device 2400, such as one or more cameras or a facial recognition sensor (e.g., included among one or more biometric sensors 2403), are activated. In some examples, the electronic device displays biometric authentication interface 2420 at a center region of the display and displays (e.g., by displacing or moving up) representation of the payment account 2414 to a top portion of the display.

In some examples, once the one or more biometric sensors are activated, electronic device 2400 obtains (e.g., captures)

biometric data corresponding to the biometric feature associated with the user. In some examples, the biometric feature captures the biometric data using one or more biometric sensors 2403 (and/or biometric sensors of the one or more cameras) of the electronic device. Optionally, a light-emitting device, such as an IR flood light or a structured light projector is used to assist in illuminating the biometric feature. In other examples, the electronic device receives the biometric data from another device.

In some examples, once electronic device 2400 has obtained the biometric data, the electronic device processes (e.g., analyzes) the biometric data to determine whether the biometric authentication is successful. In some examples, this determination includes determining whether the biometric data matches a biometric template associated with the user. The biometric template is, optionally, stored on electronic device 2400.

Figure 24G:
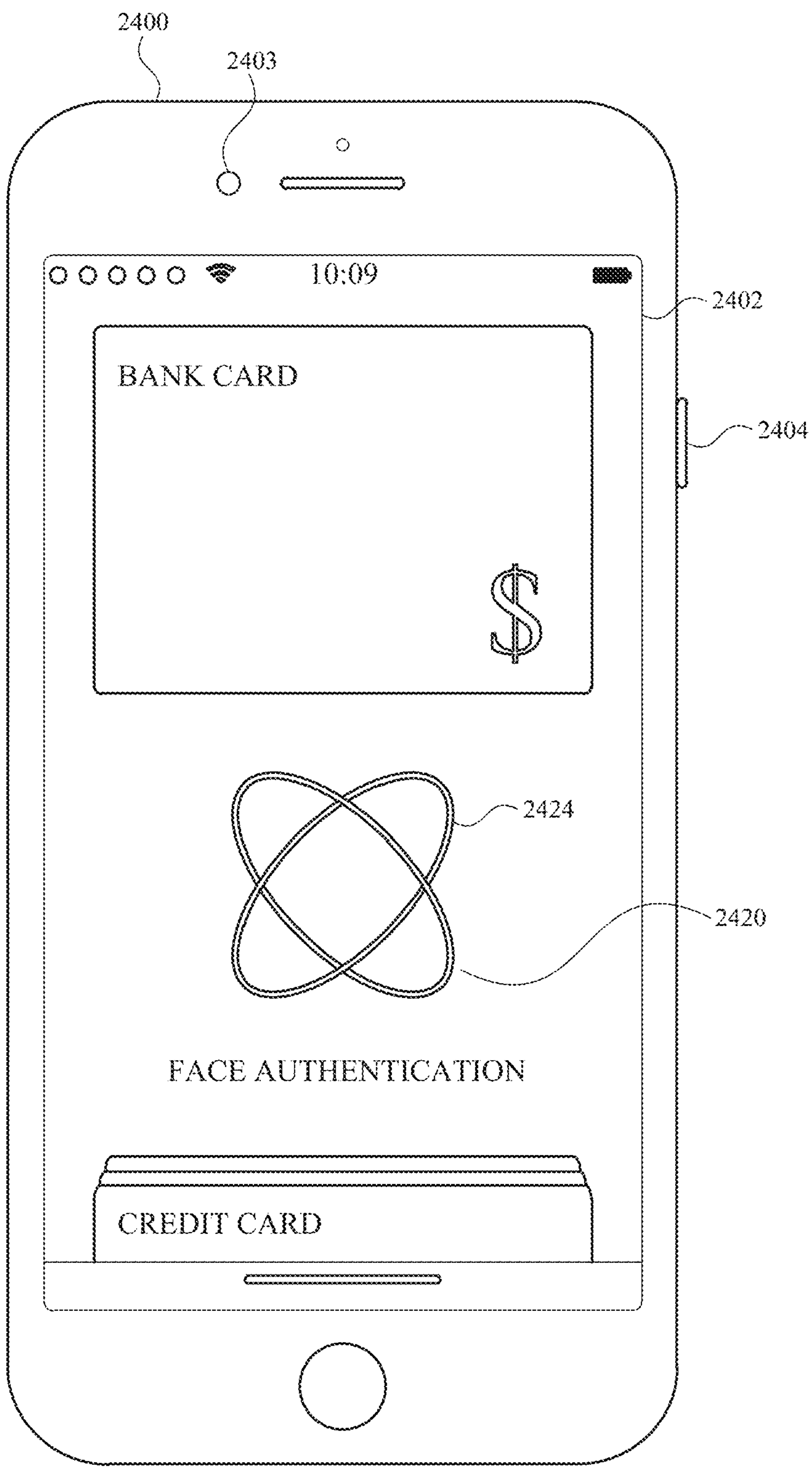

In some examples, as illustrated in FIG. 24G, biometric authentication interface 2420 indicates that the biometric data is being processed by the electronic device, for instance, by displaying one or more rotating rings 2424 using the biometric authentication interface. In some examples, one or more rotating rings 2424 replaces glyph 2422 within the biometric authentication interface.

If electronic device 2400 determines that the biometric authentication is successful (e.g., the biometric data matches a biometric template associated with the user), the electronic device transitions from a first state in which a function (e.g., authorization for transmitting payment credentials) is disabled to a second state in which the function is enabled. In some examples, the first state is a state in which a secure element of the device is disabled from releasing secure data (e.g., payment credentials of a payment account provisioned on the device) and the second state is a state in which a secure element is enabled to release the secure data.

Figure 24H:
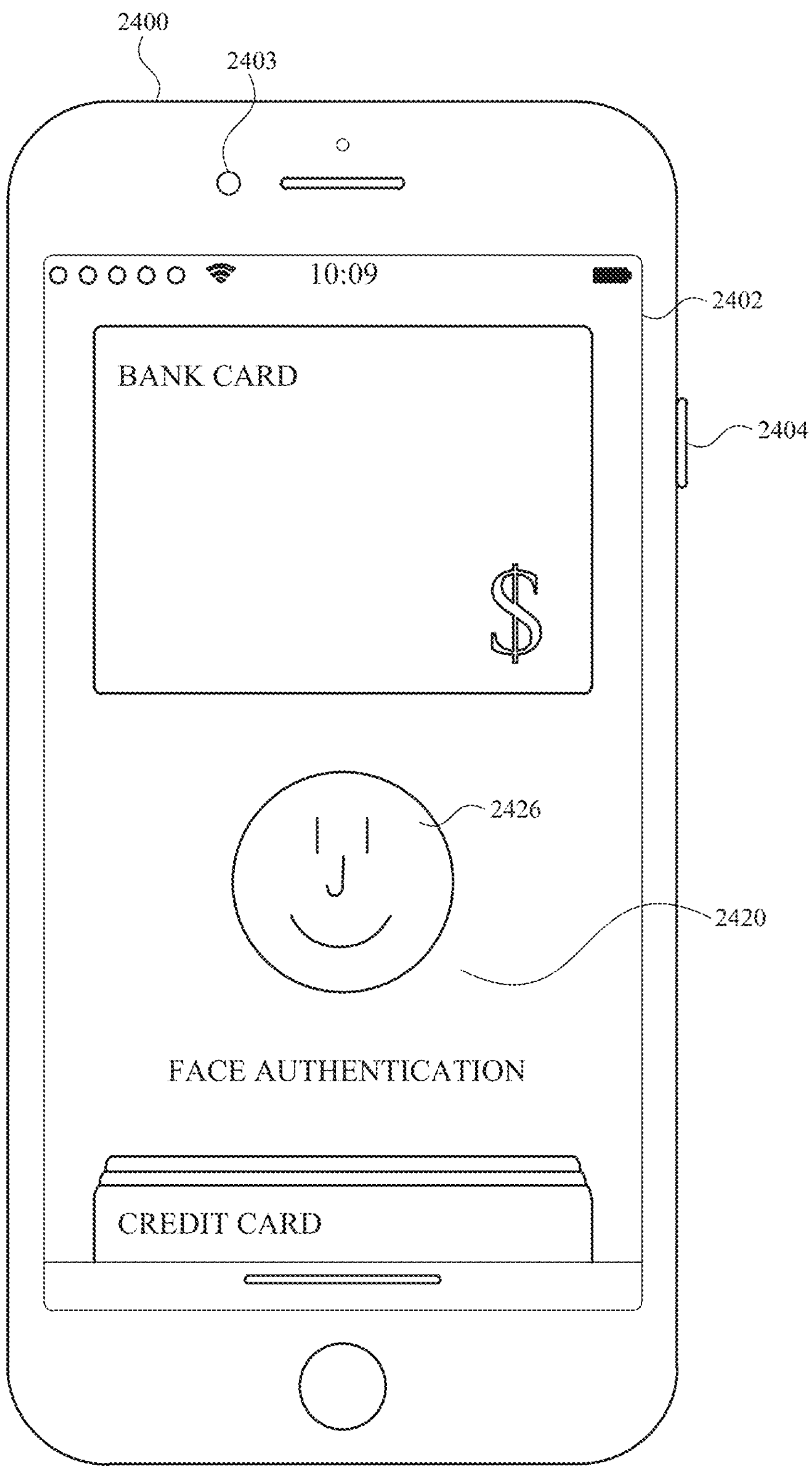

In some examples, successful biometric authentication authorizes the electronic device to transfer account credentials in connection with a payment transaction. In some examples, the electronic device further indicates (to the user) that the biometric authentication was successful, for instance, by displaying a simulation of a representation of the biometric feature in the biometric authentication interface. As shown in FIG. 24H, in some examples, biometric authentication interface 2420 includes a glyph 2426 indicating (to the user) that the biometric authentication was successful. In some examples, glyph 2426 replaces one or more rotating rings 2424 within the biometric authentication interface.

Figure 24I:
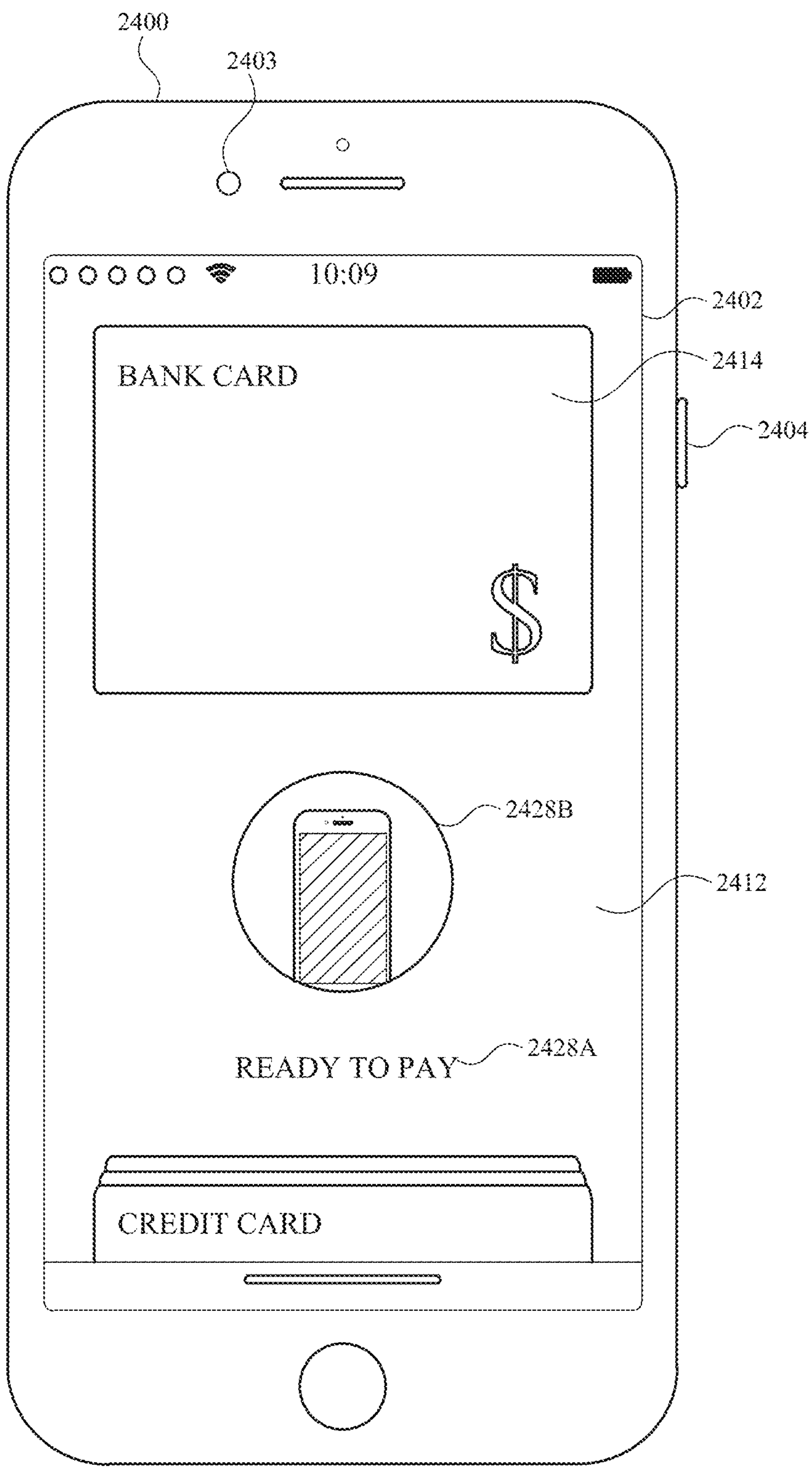

In FIG. 24I, subsequent to electronic device 2400 determining that the biometric authentication was successful, the electronic device indicates (to the user) that authorization has been provided to proceed with a payment transaction using the currently-selected payment account (e.g., payment account 2414), and thus that the payment transaction can be initiated. In some examples, electronic device 2400 displays a text indication 2428A and/or a graphical indication 2428B to indicate that the payment transaction can be initiated. In some examples, text indication 2428A and/or graphical indication 2428B replaces biometric authentication interface 2420 on pay user interface 2412, as shown in FIG. 24I. In some examples, graphical indication 2428B replaces glyph 2426 within pay user interface 2412.

Figure 24J:
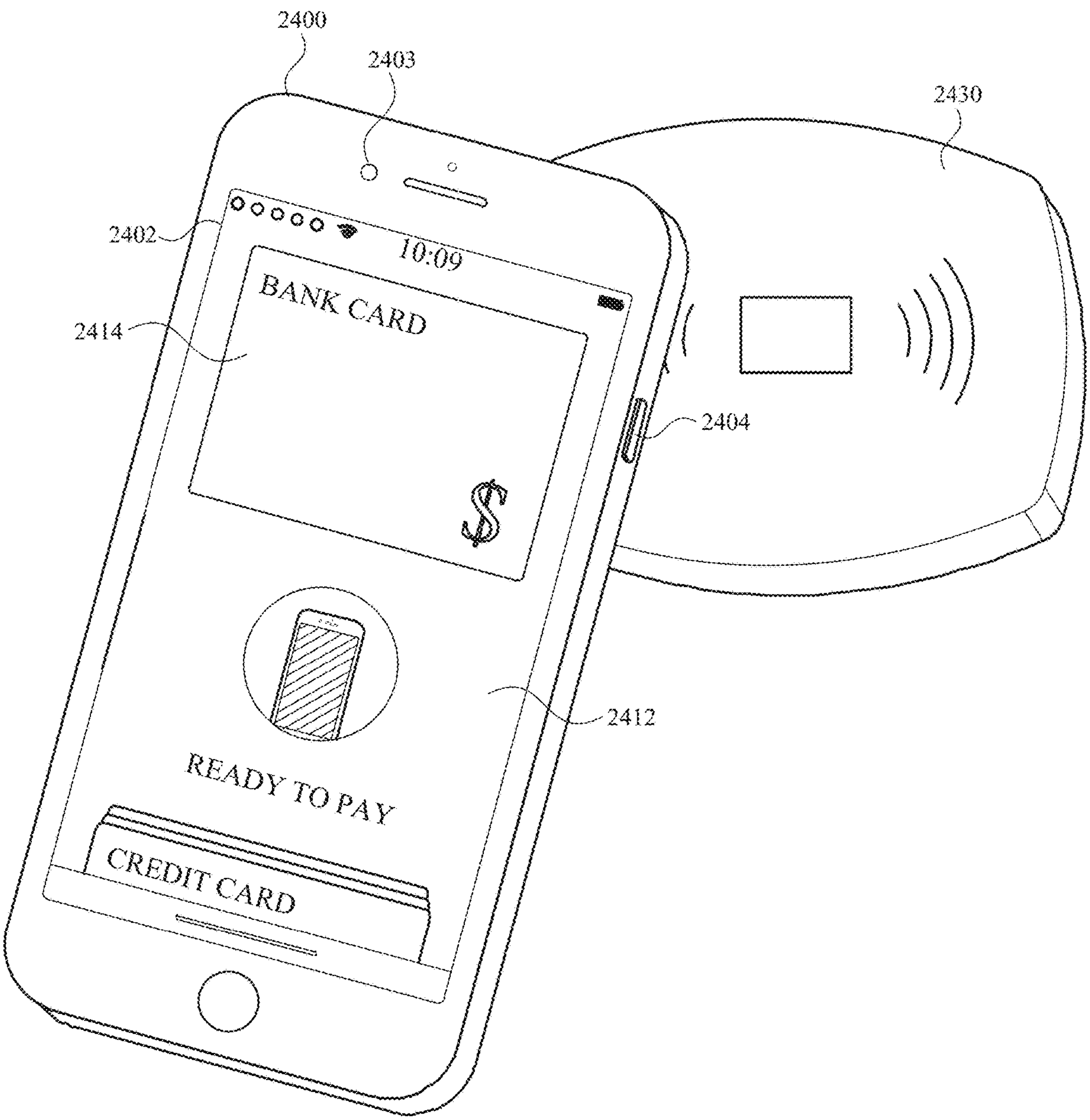

In FIG. 24J, while displaying pay user interface 2412 with payment account 2414 selected and authorized for use in a payment transaction, electronic device 2400 detects (e.g., via a wireless transmission radio of the device), a second device 2430 (e.g., a transaction terminal) different from the electronic device. In response to detecting the second device (e.g., a transaction terminal), electronic device 2400 transmits (e.g., via a wireless transmission radio of the device) payment credentials associated with payment account 2414 to the second device to complete the payment transaction.

Figure 24K:
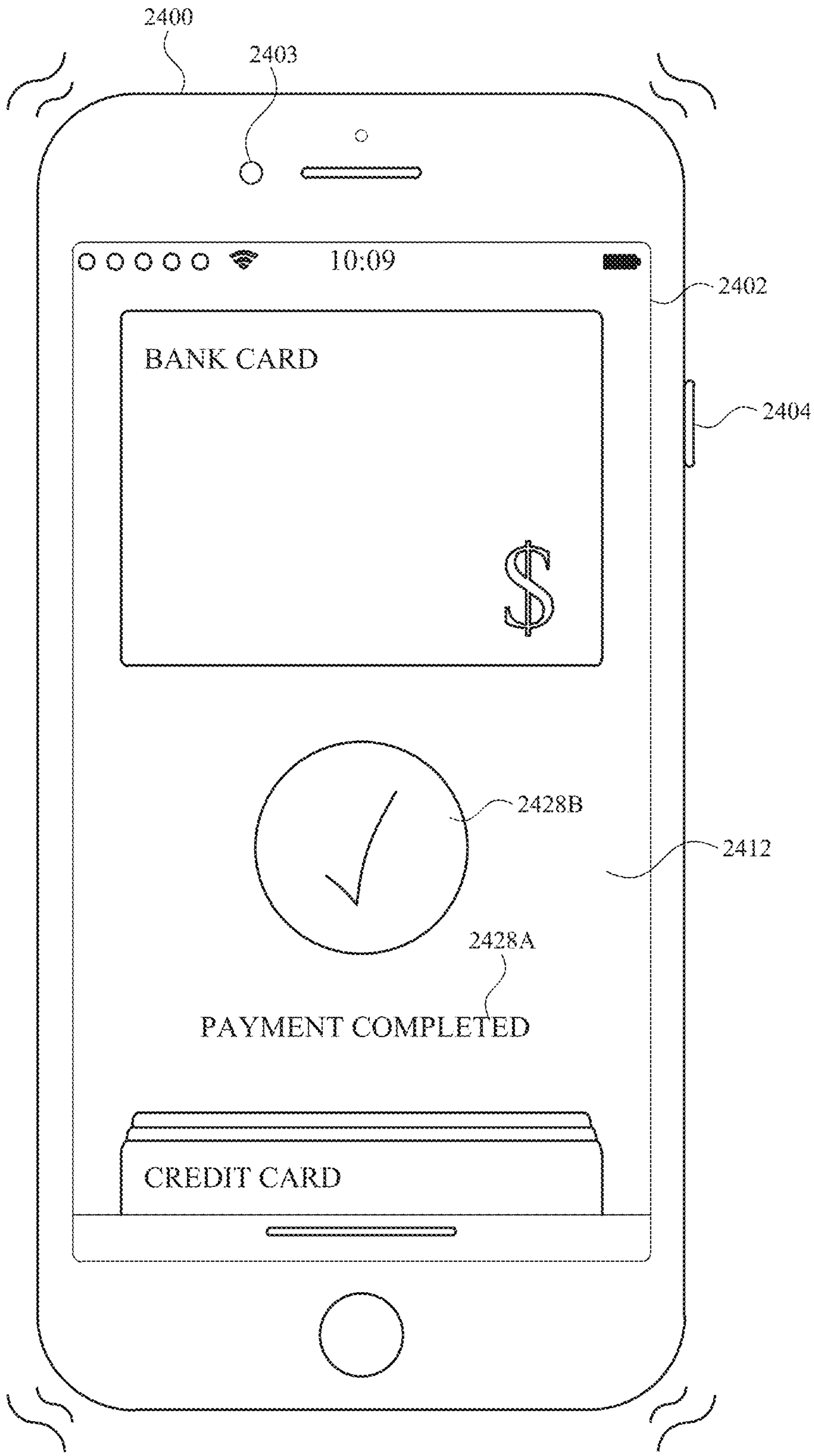

In some examples, after successfully transmitting the payment credentials to second device 2430, electronic device 2400 updates text indication 2428A (e.g., to "Payment Completed") and/or graphical indication 2428B (e.g., to a check mark) within pay user interface 2412 to indicate (to the user) that the payment transaction has been successfully completed, as shown in FIG. 24K.

Figure 24L:
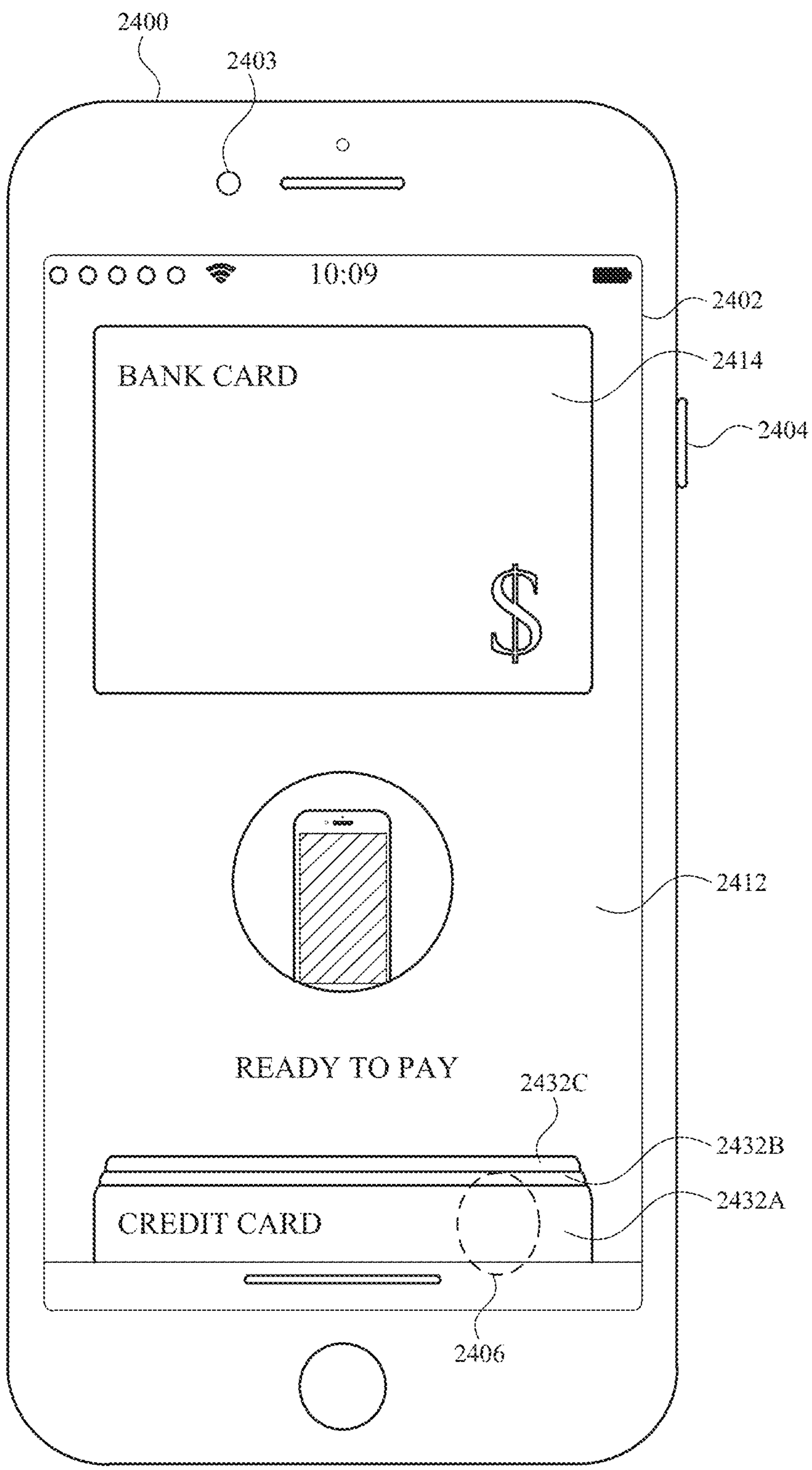

In some examples, prior to proceeding with the payment transaction with a second device (e.g., a transaction terminal) using payment account 2414, a different payment account can be selected for use in the transaction. In some examples, as shown in FIG. 24L, electronic device 2400 displays within pay user interface 2412 (e.g., at a bottom region of the interface), one or more representations of payment accounts (e.g., payment accounts 2432A-2432C) different from currently-selected payment account 2414. In some examples, as shown in FIG. 24L, electronic device 2400 receives user selection 2406 (e.g., a tap gesture) of a different payment account (e.g., payment account 2432A) of the one or more payment accounts different from payment account 2414.

In some examples, if the second device is a transaction terminal at a store, in order to authorize an in-store payment using biometric authentication (e.g., facial recognition authentication), the user must first confirm intent to pay by activating a hardware button (e.g., button 2404, by double-clicking the Sleep/Wake button). In some examples, the user then authenticates using biometric authentication (e.g., facial recognition authentication) before placing the device near the second device (e.g., the transaction terminal). In some examples, if the user would like to select a different payment method after biometric authentication (e.g., facial recognition authentication), the device prompts the user to re-authenticate with the biometric authentication, but does not require that the user activate the hardware button (e.g., button 2404) (e.g., double-click the Sleep/Wake button again).

Figure 24M:
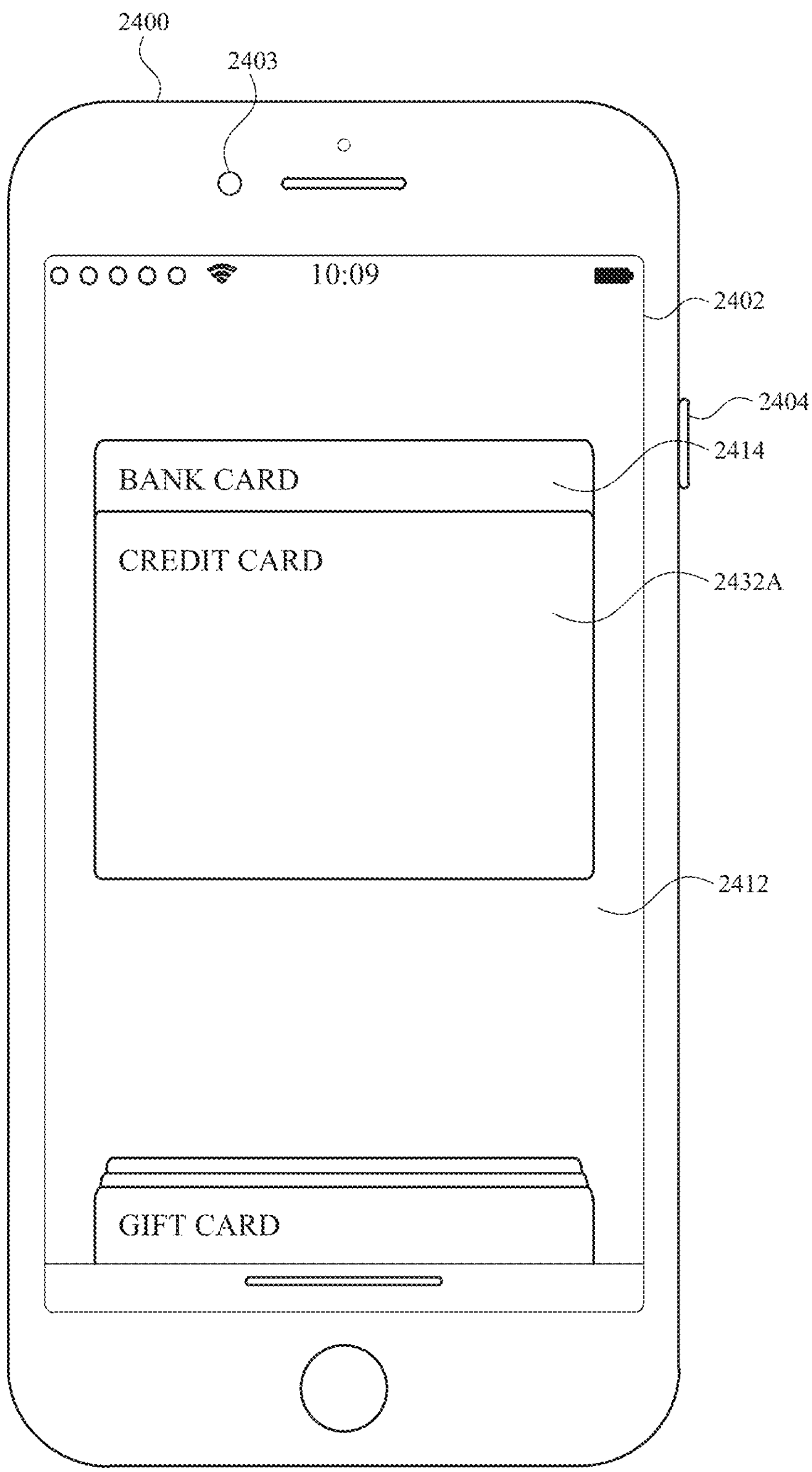
Figure 24N:
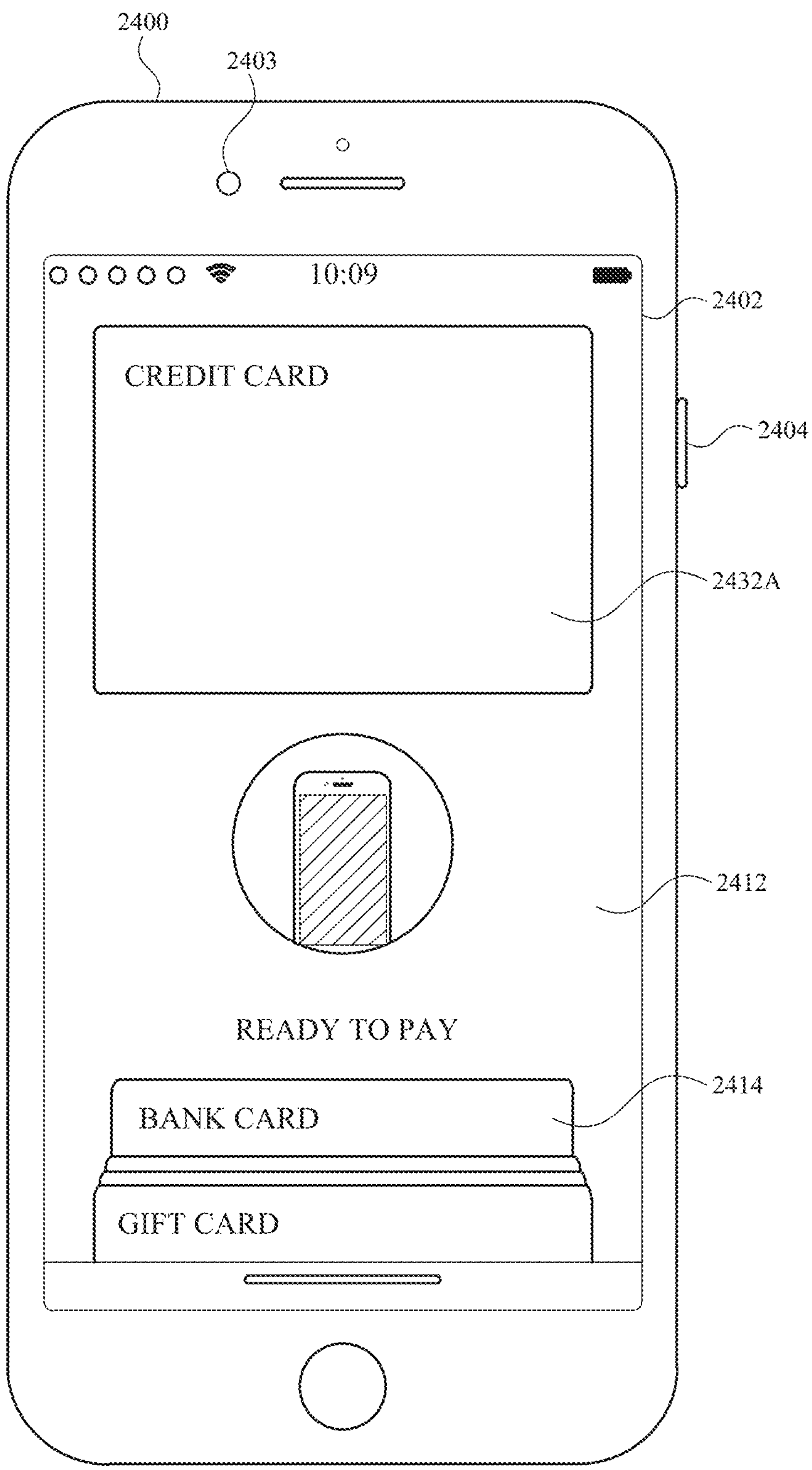

In some examples, upon user selection 2406 of payment account 2432A, the representation of payment account 2432A slides up within pay user interface 2412 and the representation of payment account 2414 slides down within pay user interface 2412, as shown in FIG. 24M. In some examples, the representation of payment account 2432A slides up within pay user interface 2412 to the location previously occupied by the representation of payment account 2414 (thereby indicating to the user that payment account 2432A is now selected for use in the payment transaction) and the representation of payment account 2414 slides down within pay user interface 2412 to join the one or more representations of payment accounts different from the currently-selected payment account, as shown in FIG. 24N. Once the currently-selected payment account has been switched from payment account 2414 to payment account 2432A, the device can proceed with the payment transaction (e.g., as described with reference to FIG. 24J) using payment account 2432A to complete the transaction.

Figure 24O:
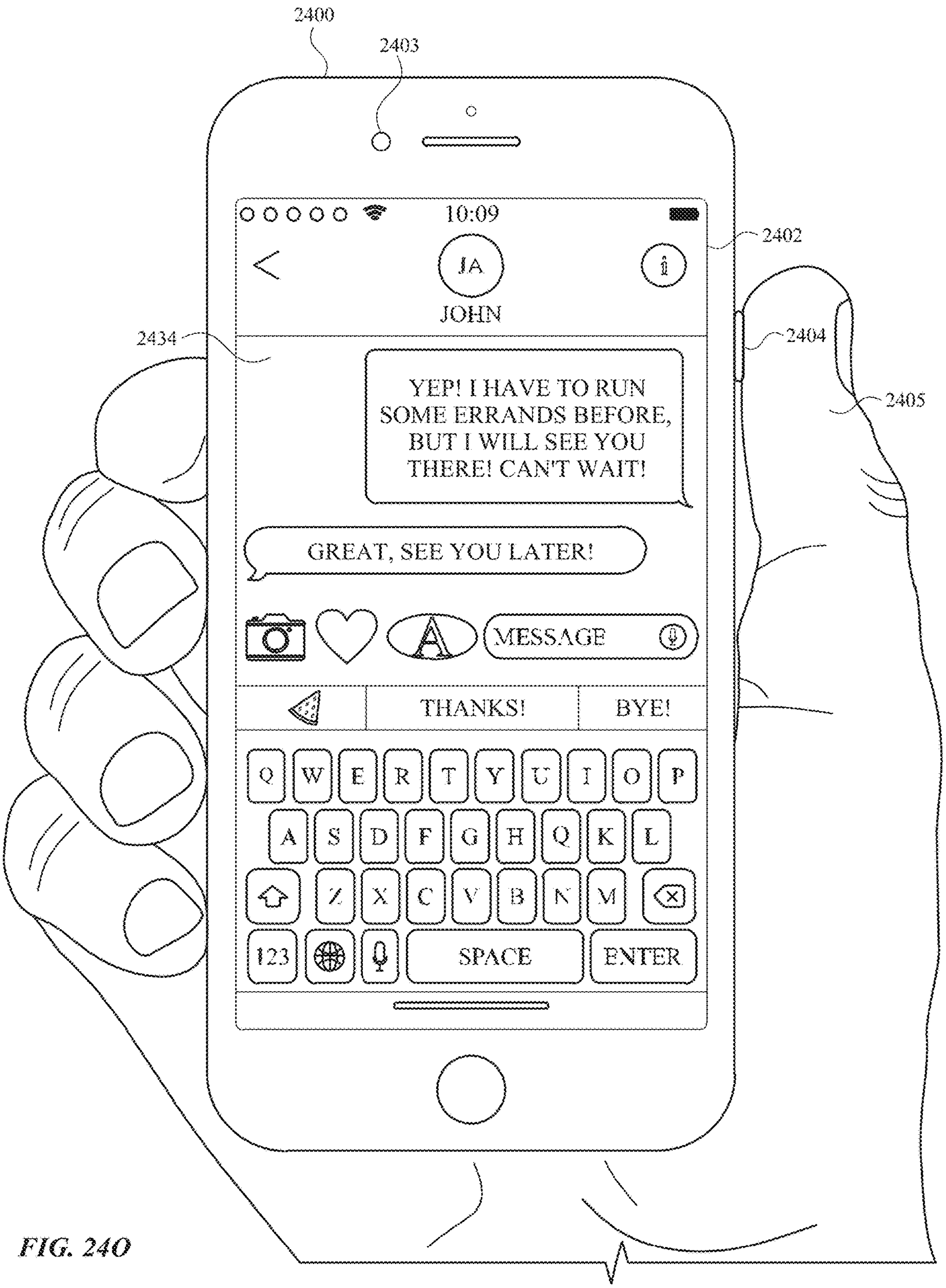

In some examples, the technique described with reference to FIGS. 24B-24N can be initiated (e.g., as is initiated by activation 2401 in accordance with prompt 2416) while electronic device 2400 is displaying, on display 2402, an application 2434 (e.g., a messaging application) different from instruction user interface 2410, as shown in FIG. 24O.

For example, FIG. 24O illustrates electronic device 2400 displaying, on display 2402, an application 2434 (e.g., a messaging application). While displaying application 2434, electronic device 2400 receives a user activation (e.g., double press 2405) of button 2404. In response to receiving the user activation, the electronic device proceeds with the technique described with reference to FIGS. 24B-24N to obtain biometric authentication for proceeding with a payment transaction (e.g., with a second device different from the electronic device).

Figure 24P:
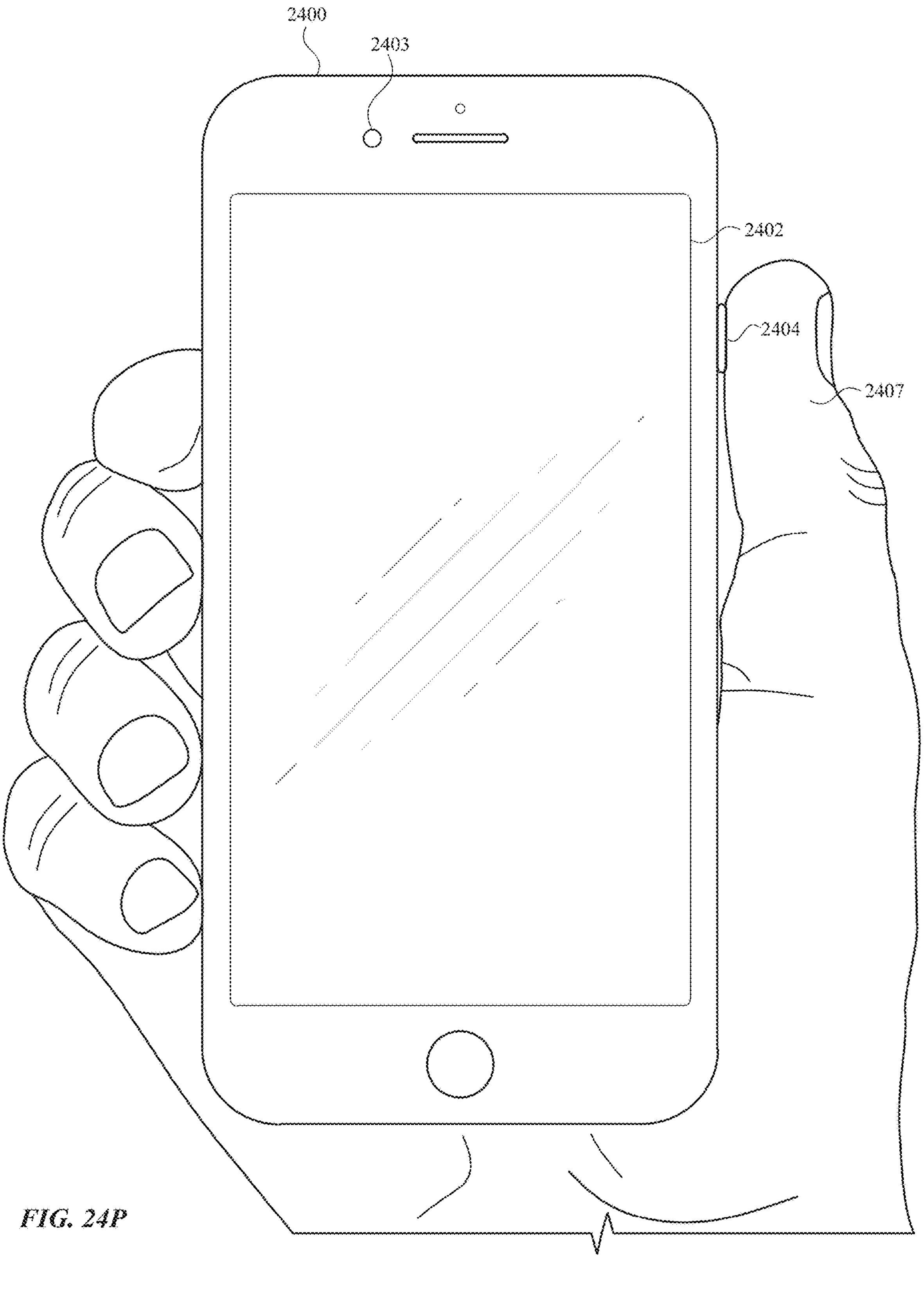

In some examples, the technique described with reference to FIGS. 24B-24N can be initiated (e.g., as is initiated by activation 2401 in accordance with prompt 2416 or by activation 2405 while application 2434 is displayed) while display 2402 of electronic device 2400 is in an off state, as shown in FIG. 24P. While display 2402 is in an off state, electronic device 2400 receives a user activation (e.g., double press 2407) of button 2404. In response to receiving the user activation, the electronic device proceeds with the technique described with reference to FIGS. 24B-24N to obtain biometric authentication for proceeding with a payment transaction (e.g., with a second device different from the electronic device).

Figure 24Q:
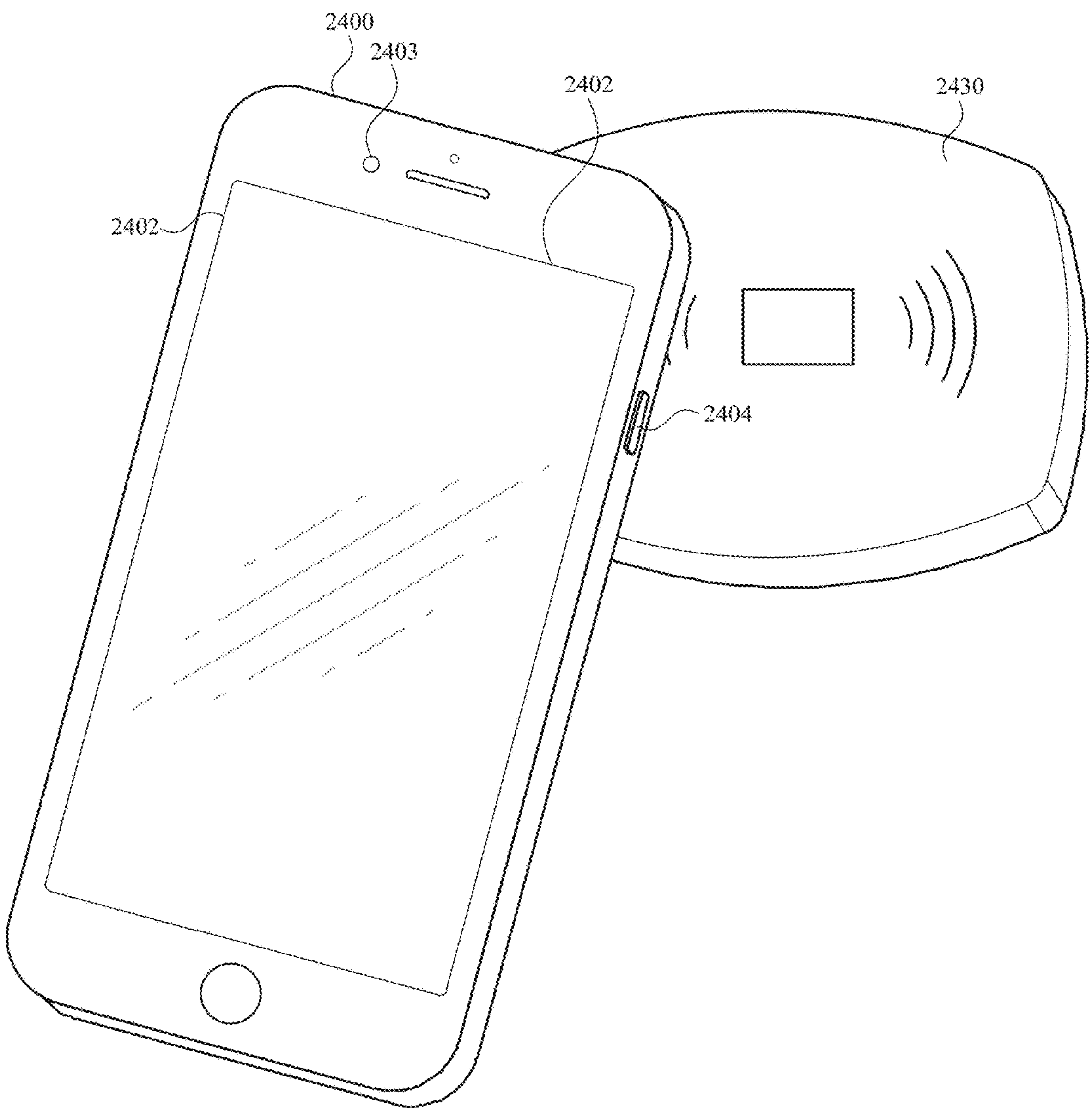

FIG. 24Q illustrates electronic device 2400 with display 2402 in an off state. While display 2402 is in the off state, the electronic device detects (e.g., via a wireless communication radio of the device) second device 2430 (e.g., a transaction terminal). In some examples, in response to detecting second device 2430 while display 2402 is in the off state, electronic device 2400 displays, on display 2402, pay user interface 2412 and prompt 2416 (e.g., as illustrated in FIG. 24B) for proceeding with a payment transaction.

Figure 24R:
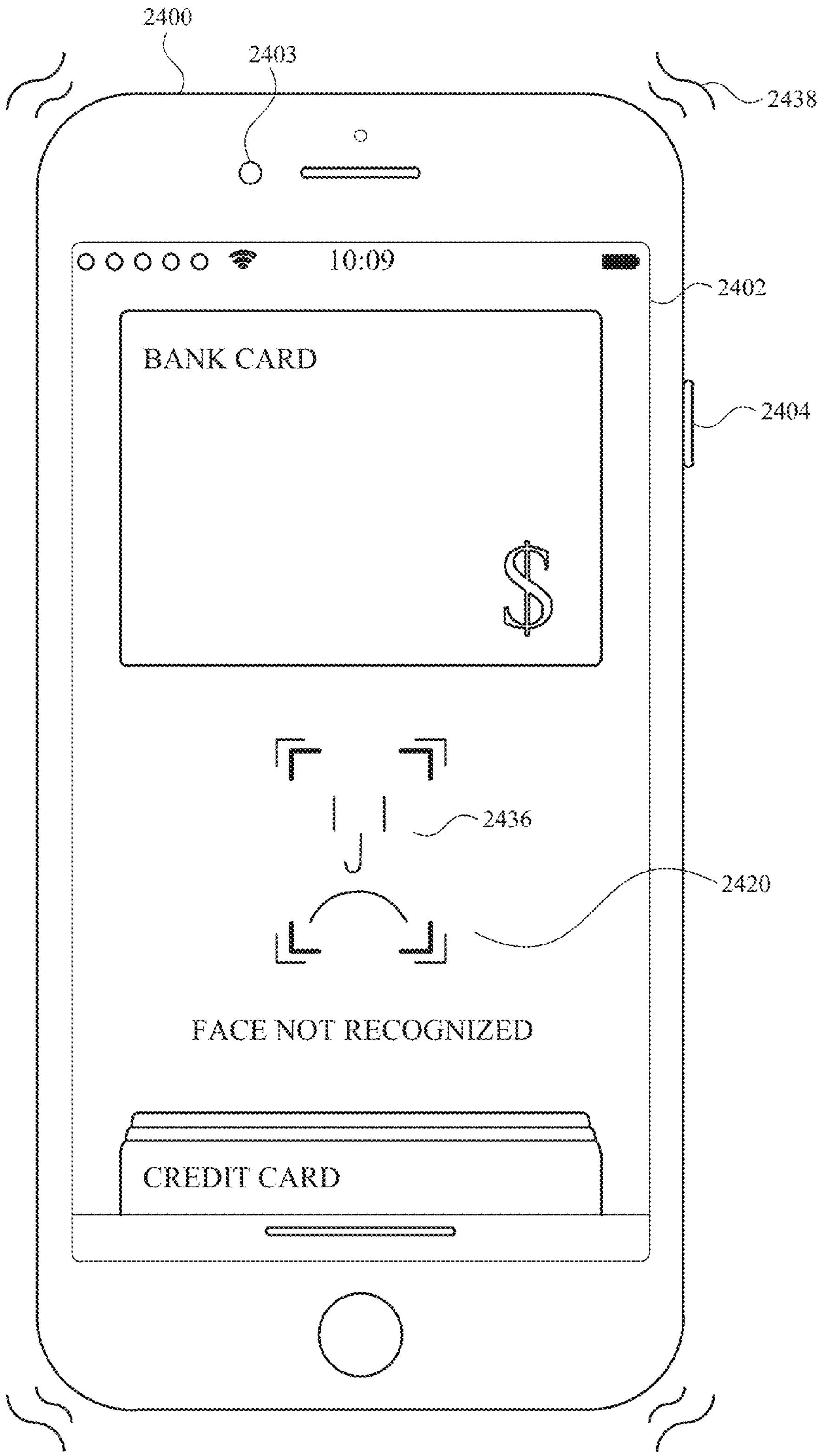

If electronic device 2400 determines that the biometric authentication is unsuccessful (e.g., the biometric data does not match a biometric template associated with the user), the device does not transition from the first state to the second state, and in some examples, the electronic device remains in the first state (e.g., authorization for proceeding with a payment transaction remains disabled). In some examples, the electronic device further indicates that the biometric authentication was unsuccessful, for instance, by displaying a simulation of a representation of the biometric feature in biometric authentication interface 2420. As shown in FIG. 24R, in some examples, biometric authentication interface 2420 includes a glyph 2436 indicating that the biometric authentication was unsuccessful. Glyph 2436 indicates, for instance, that the biometric feature was not recognized by the electronic device. In some examples, in addition to glyph 2436 within biometric authentication interface 2420, electronic device 2400 generates a tactile output 2438 (e.g., a haptic feedback) that further indicates (to the user) that the biometric authentication was unsuccessful.

Figure 24S:
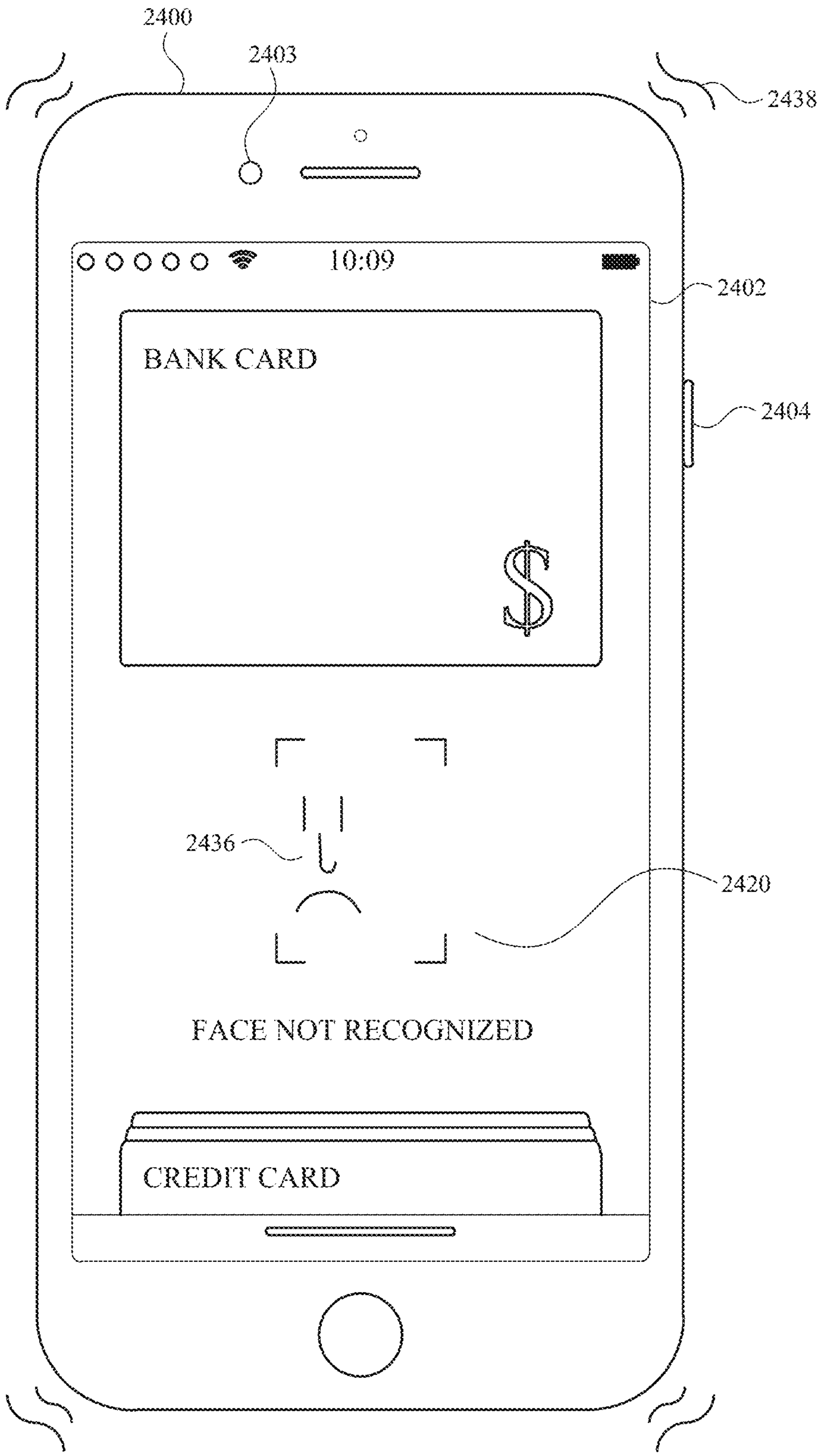
Figure 24T:
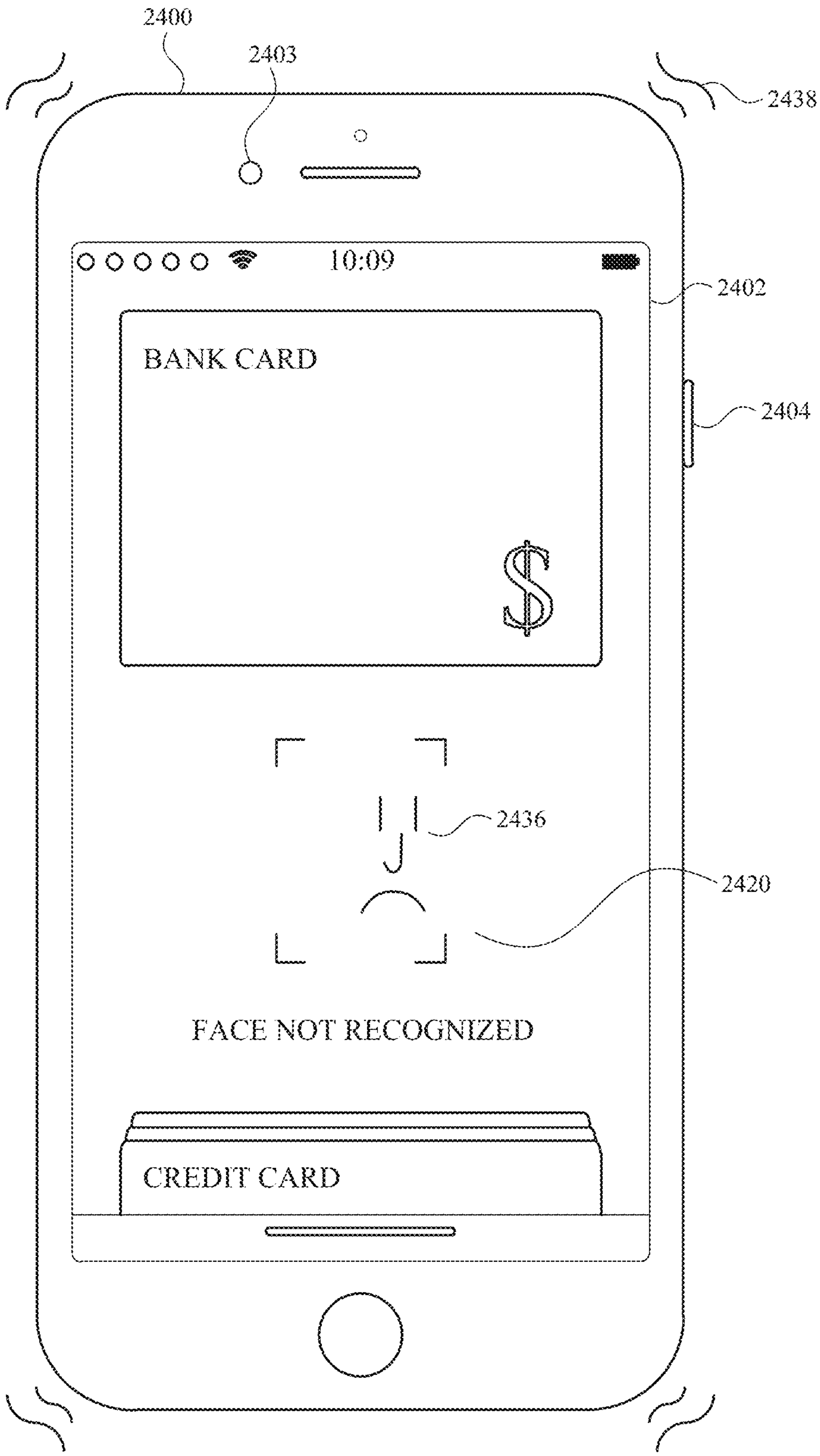

In some examples, glyph 2436 further moves (e.g., horizontally or vertically) within a region of biometric authentication interface 2420 to further indicate (to the user) that the biometric authentication was unsuccessful. For example, as shown in the transition from FIG. 24R to FIG. 24S to FIG. 24T, glyph 2436 slides back and forth in a horizontal direction (e.g., repeating a left-to-right continuous sliding movement) for a predetermined period of time (e.g., 3 seconds). In some examples, the device continues to generate tactile output 2438 (e.g., a haptic feedback) during the duration of the movement of glyph 2436 within biometric authentication interface 2420. In some examples, the tactile output 2438 is synchronized with movement of the glyph 2436.

Figure 24U:
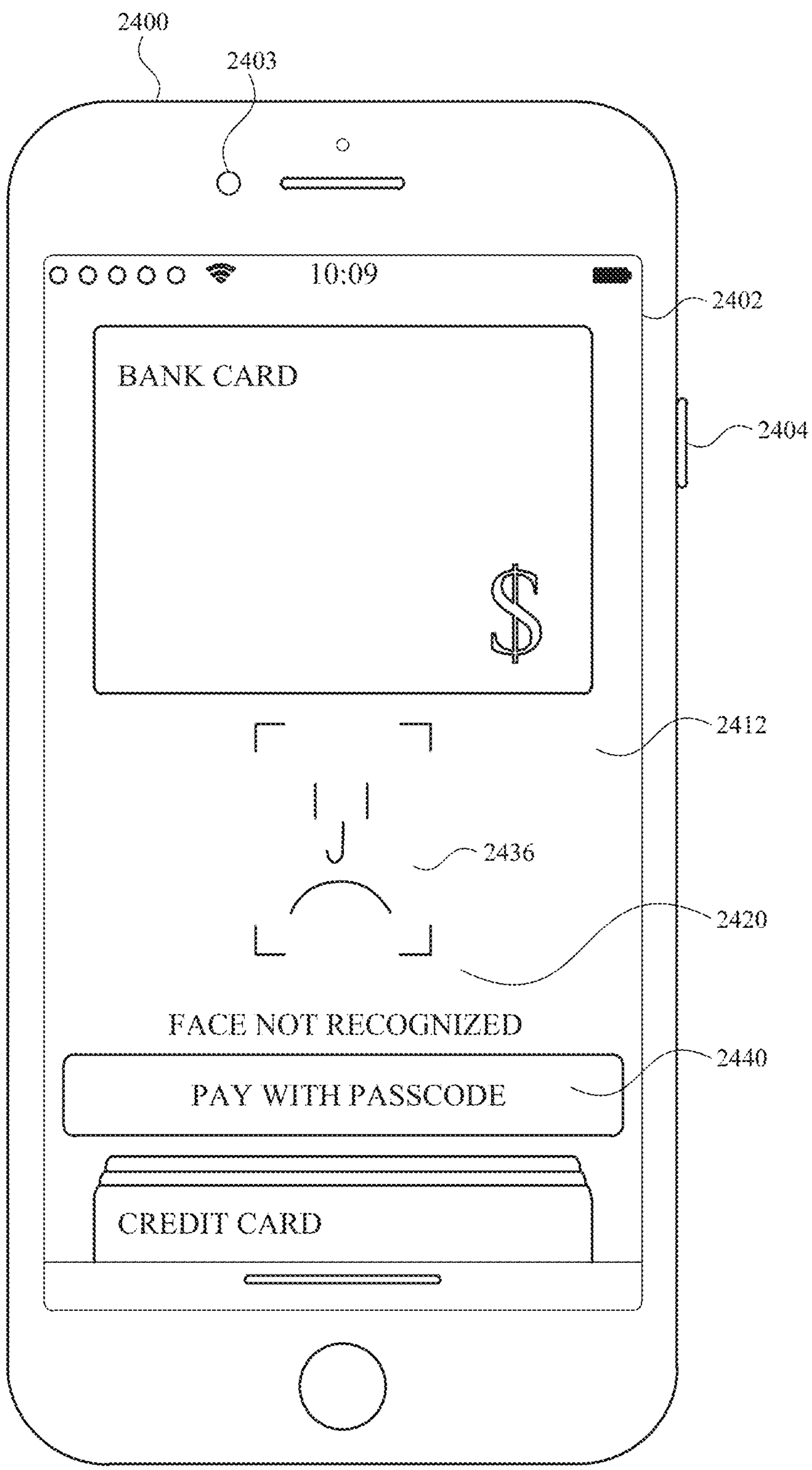
Figure 24V:
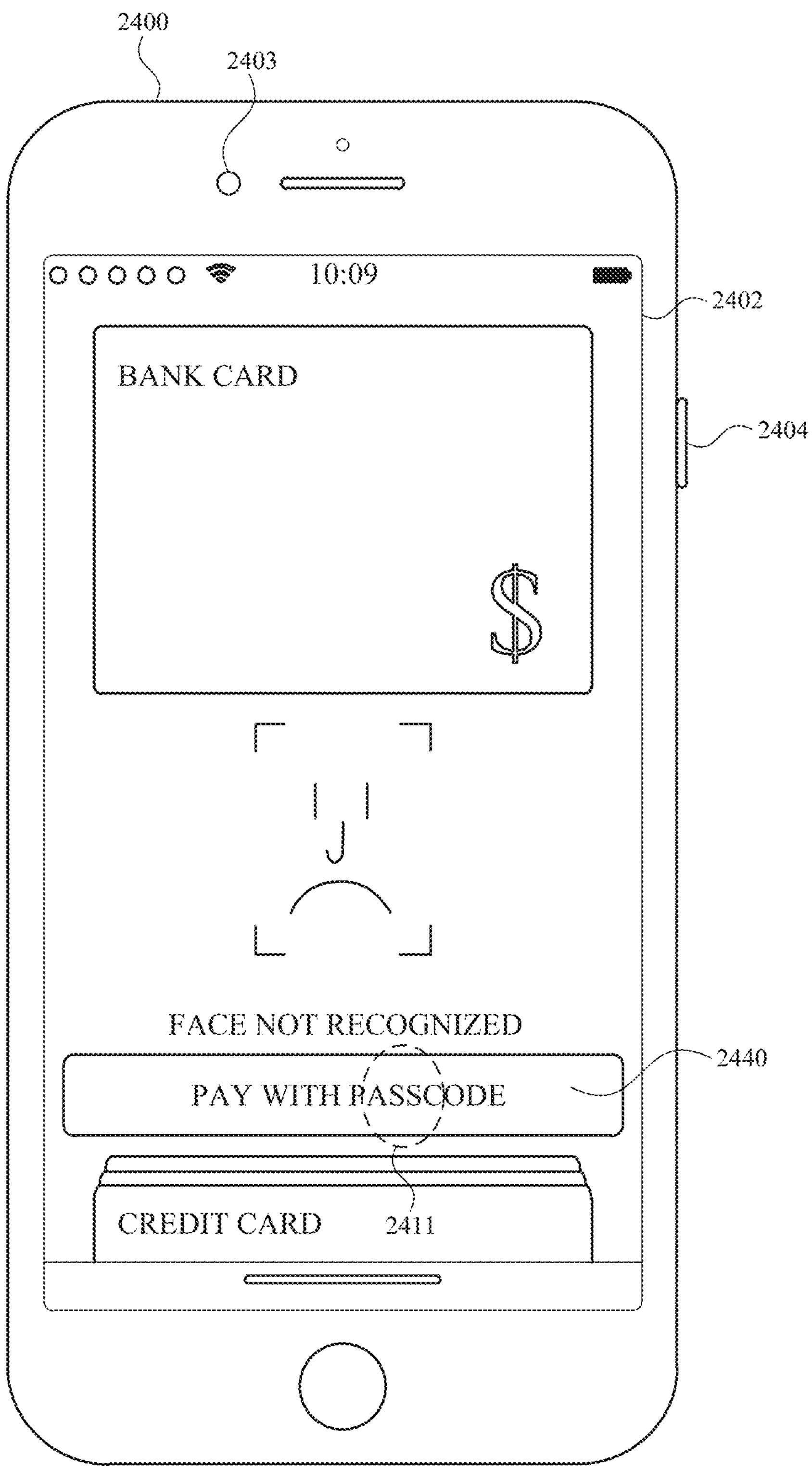

In some examples, as shown in FIG. 24U, while displaying glyph 2436 within biometric authentication interface 2420 indicating to the user that the biometric authentication was unsuccessful, electronic device 2400 displays within pay user interface 2412 (e.g., below biometric authentication interface 2420) an alternative authentication affordance 2440 for providing alternative (e.g., passcode, password) authentication (e.g., in addition to or instead of biometric authentication) to proceed with the payment transaction. In some examples, while displaying alternative authentication affordance 2440 for providing alternative authentication, the electronic device detects user selection 2411 (e.g., a tap gesture) of the affordance, as shown in FIG. 24V.

Figure 24W:
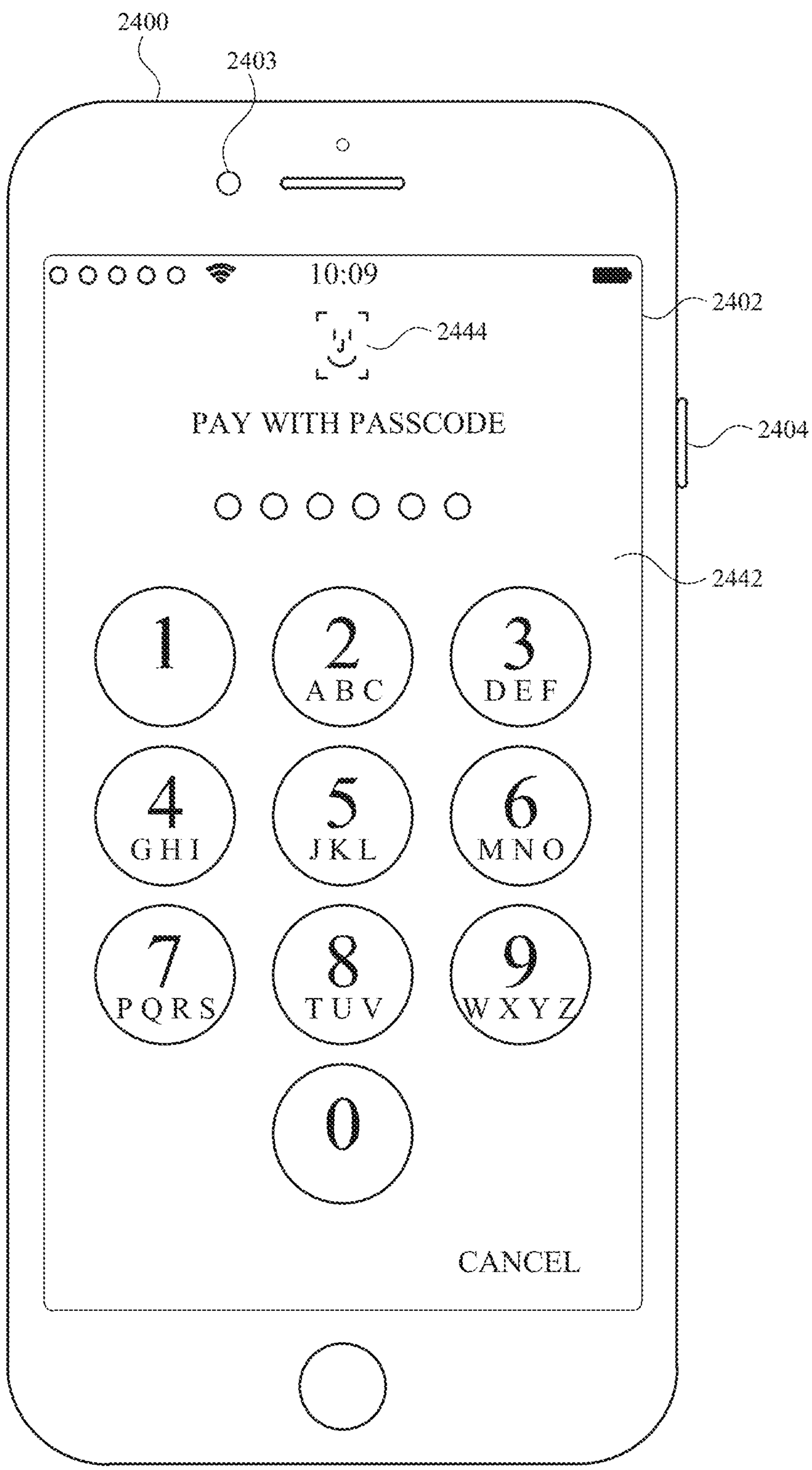
Figure 24X:
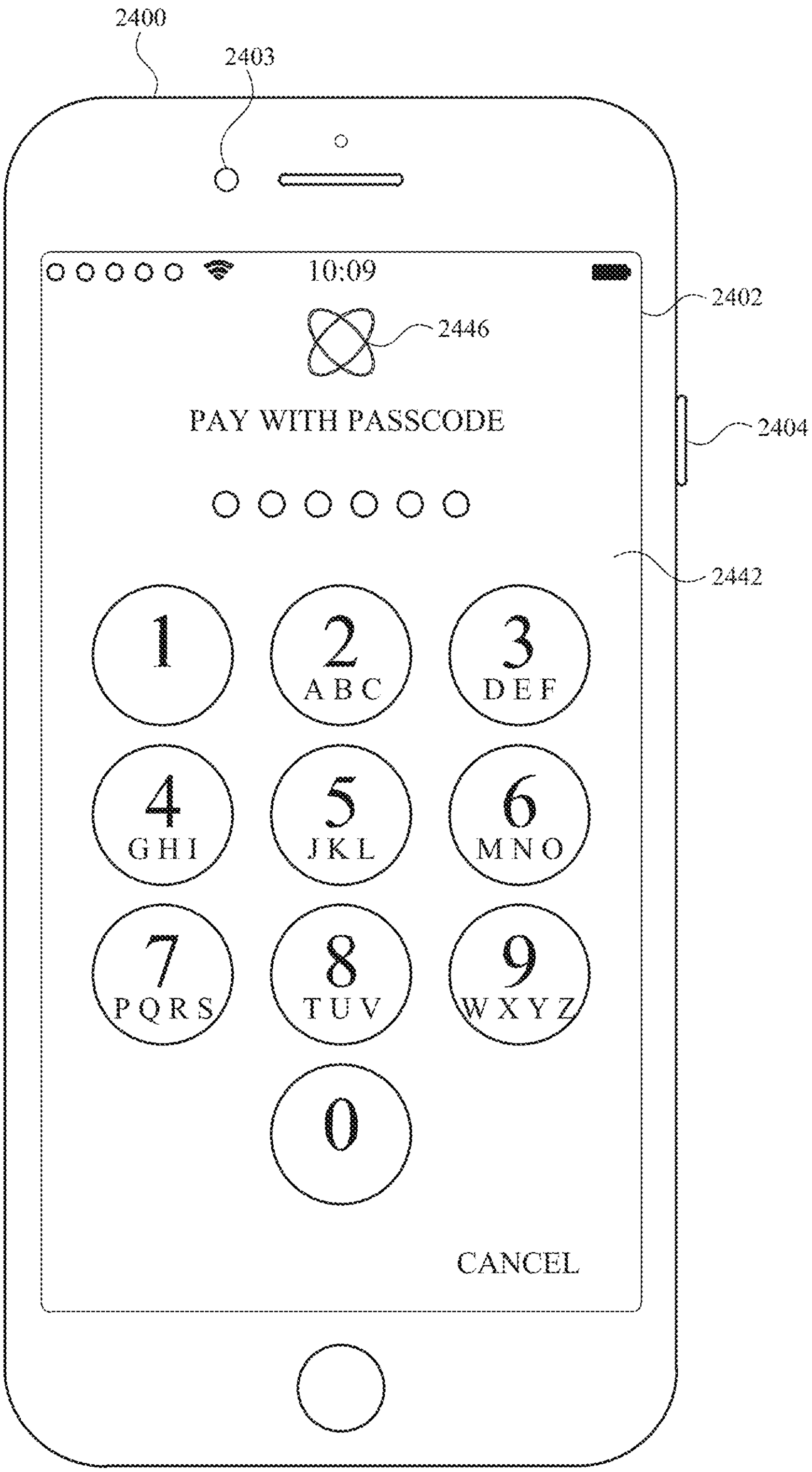
Figure 24Y:
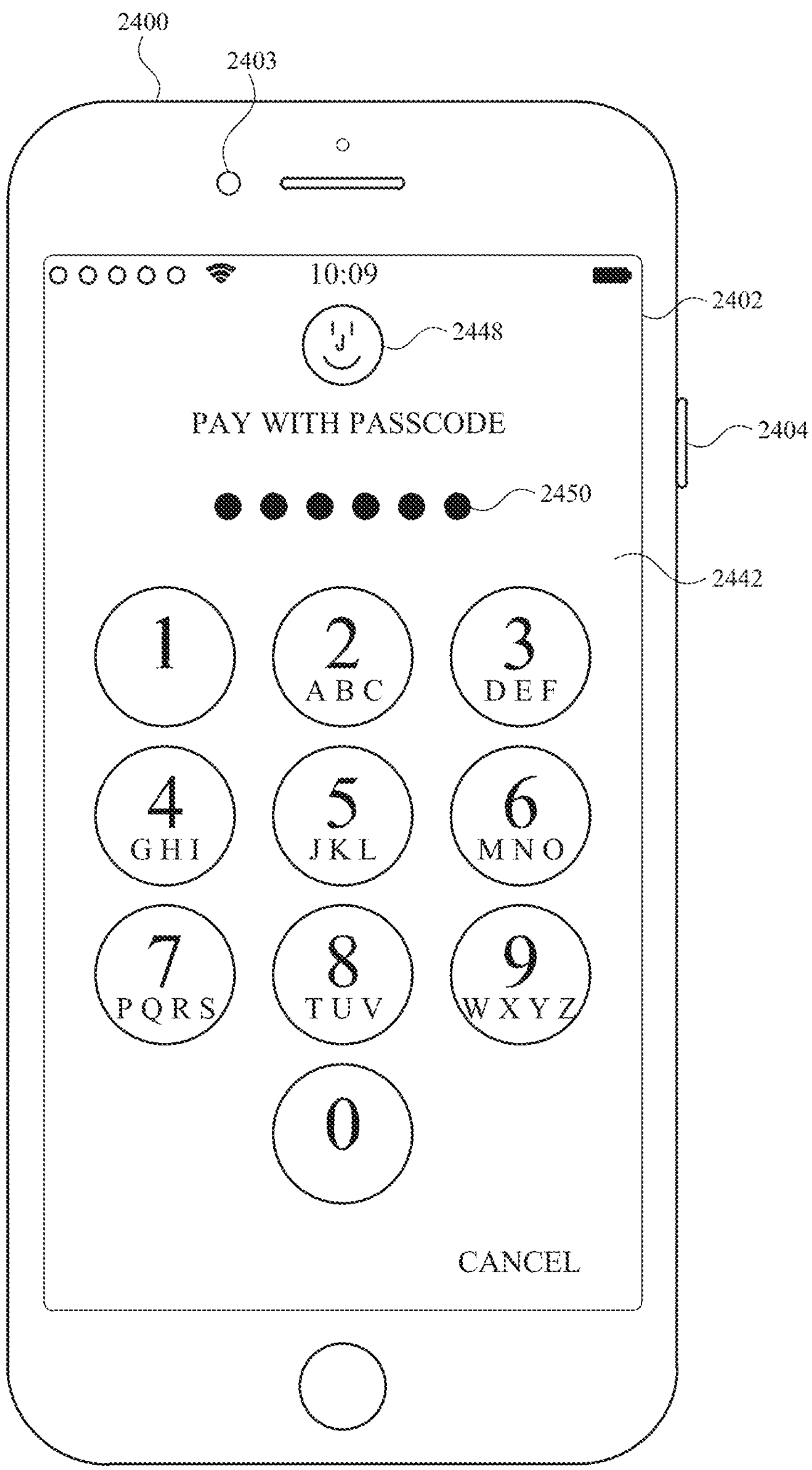

As shown in FIG. 24W, in response to detecting the user selection of affordance 2440, electronic device 2400 displays, on display 2402, an alternative authentication interface 2442. In some examples, electronic device 2400 performs biometric authentication during display of alternative authentication interface 2442. In some examples, the electronic device obtains and processes biometric data to determine whether the obtained biometric data matches a biometric template associated with the user. As such, in some examples, alternative authentication interface 2442 includes a simulation of a representation of the biometric feature, such as a glyph 2444 (e.g., corresponding to glyph 2422), as shown in FIG. 24W. In some examples, alternative authentication interface 2442 indicates that the biometric data is being processed by the electronic device, for instance, by displaying one or more rotating rings 2446 (e.g., corresponding to one or more rotating rings 2424), as shown in FIG. 24X. In some examples, one or more rotating rings 2446 replaces glyph 2444 within the alternative authentication interface.

If electronic device 2400 determines that the biometric authentication is successful (e.g., the biometric data matches a biometric template associated with the user), the device transitions from a first state in which a function (e.g., authorization for transmitting payment credentials) is disabled to a second state in which the function is enabled. In some examples, successful biometric authentication enables the electronic device to transfer payment credentials (e.g., associated with payment account 2414) to, for example, a transaction terminal. In some examples, the electronic device further indicates that the biometric authentication was successful, for instance, by displaying a simulation of a representation of the biometric feature in alternative authentication interface 2442. As shown in FIG. 23Y, in some examples, alternative authentication interface 2442 includes a glyph 2448 (e.g., corresponding to glyph 2426) indicating (to the user) that the biometric authentication was successful. In some examples, glyph 2448 replaces one or more rotating rings 2446 within the alternative authentication interface.

In some examples, in addition or instead of biometric authentication, electronic device 2400 performs passcode authentication during display of alternative authentication interface 2442. Accordingly, the electronic device receives and processes passcode data to determine whether the received passcode data matches an enrolled passcode associated with the user. As such, in some examples, alternative authentication interface 2442 includes an indication of the received passcode input, such as passcode indication 2450, as shown in FIG. 23Y.

Figure 24Z:
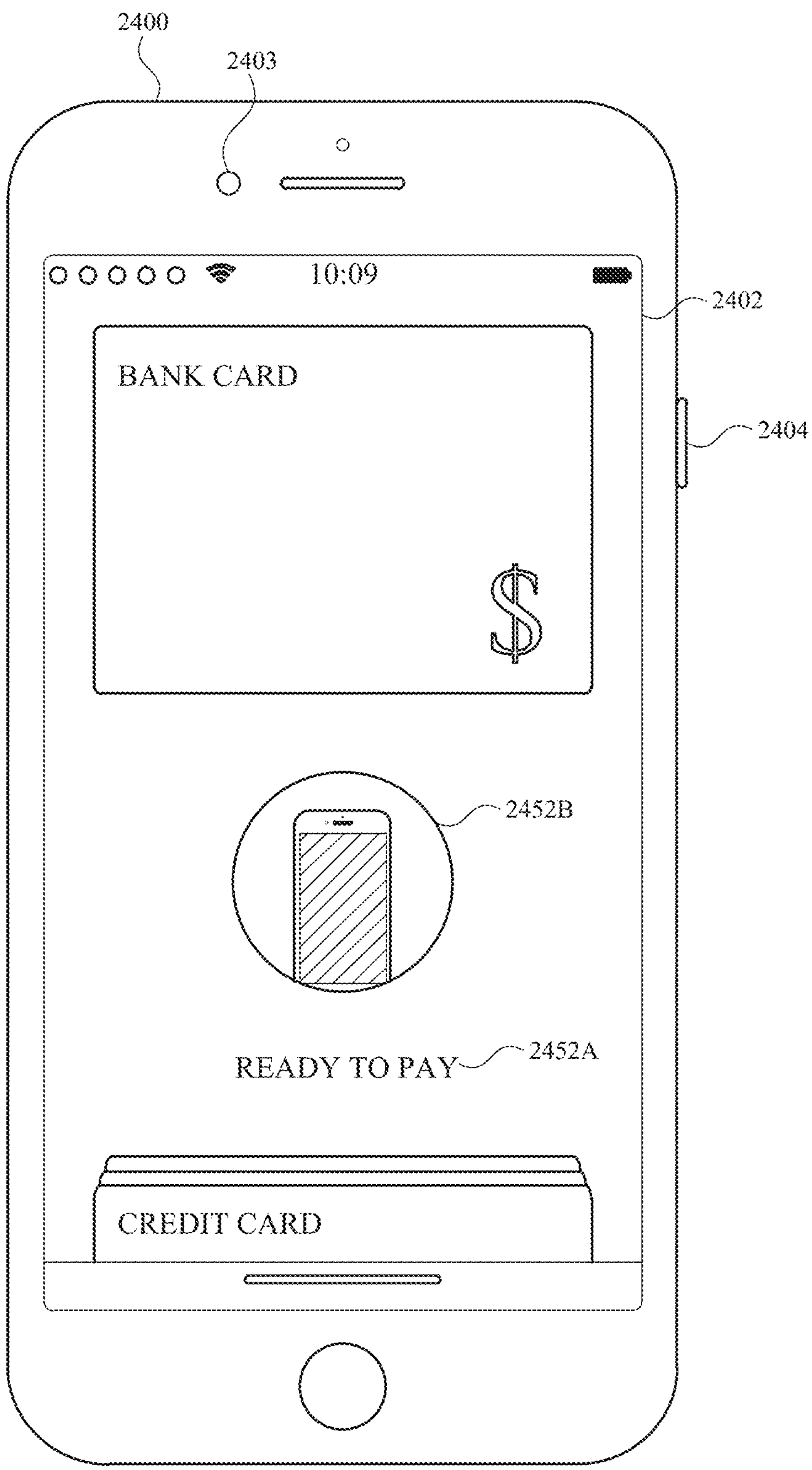
Figure 24A:
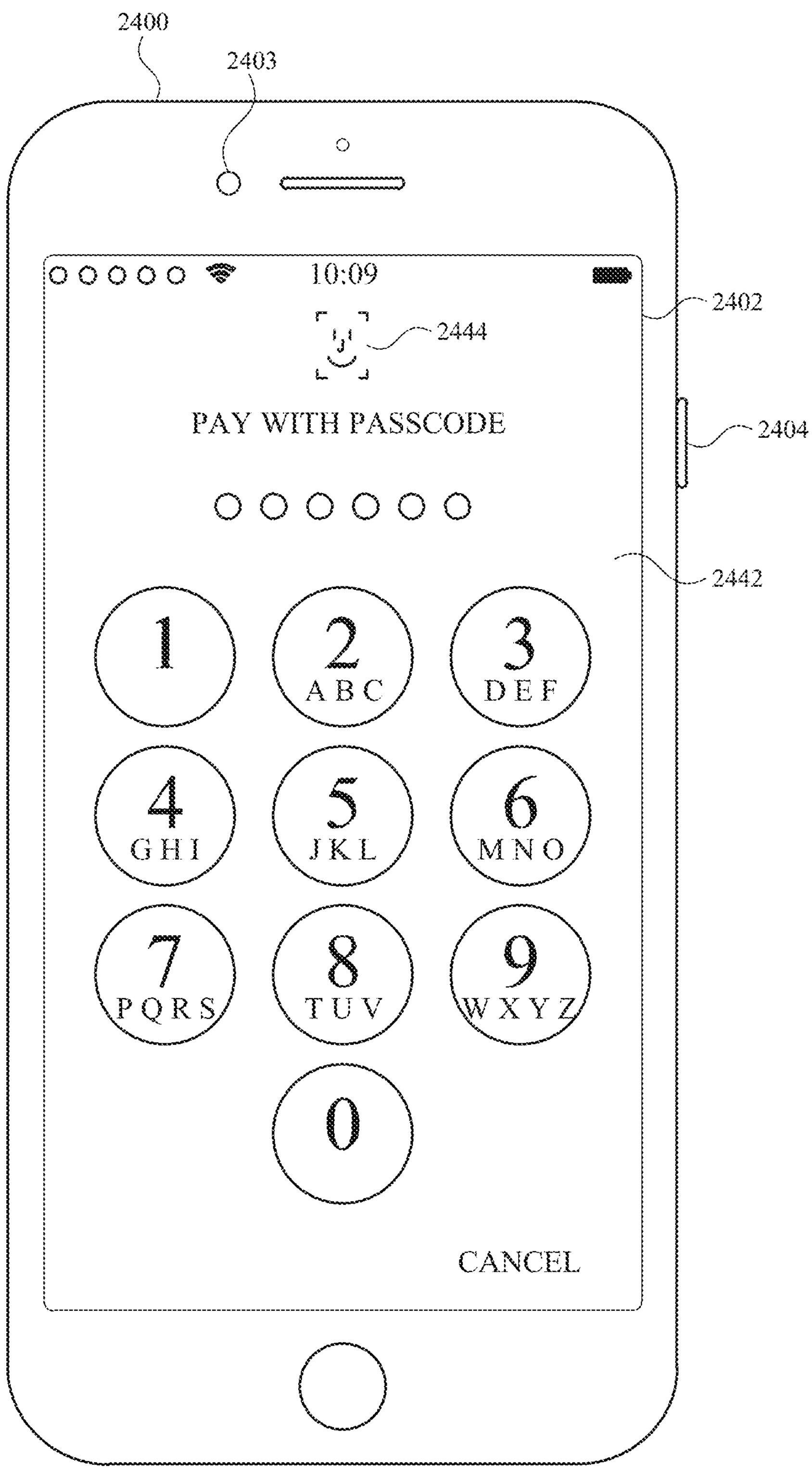
Figure 24A:
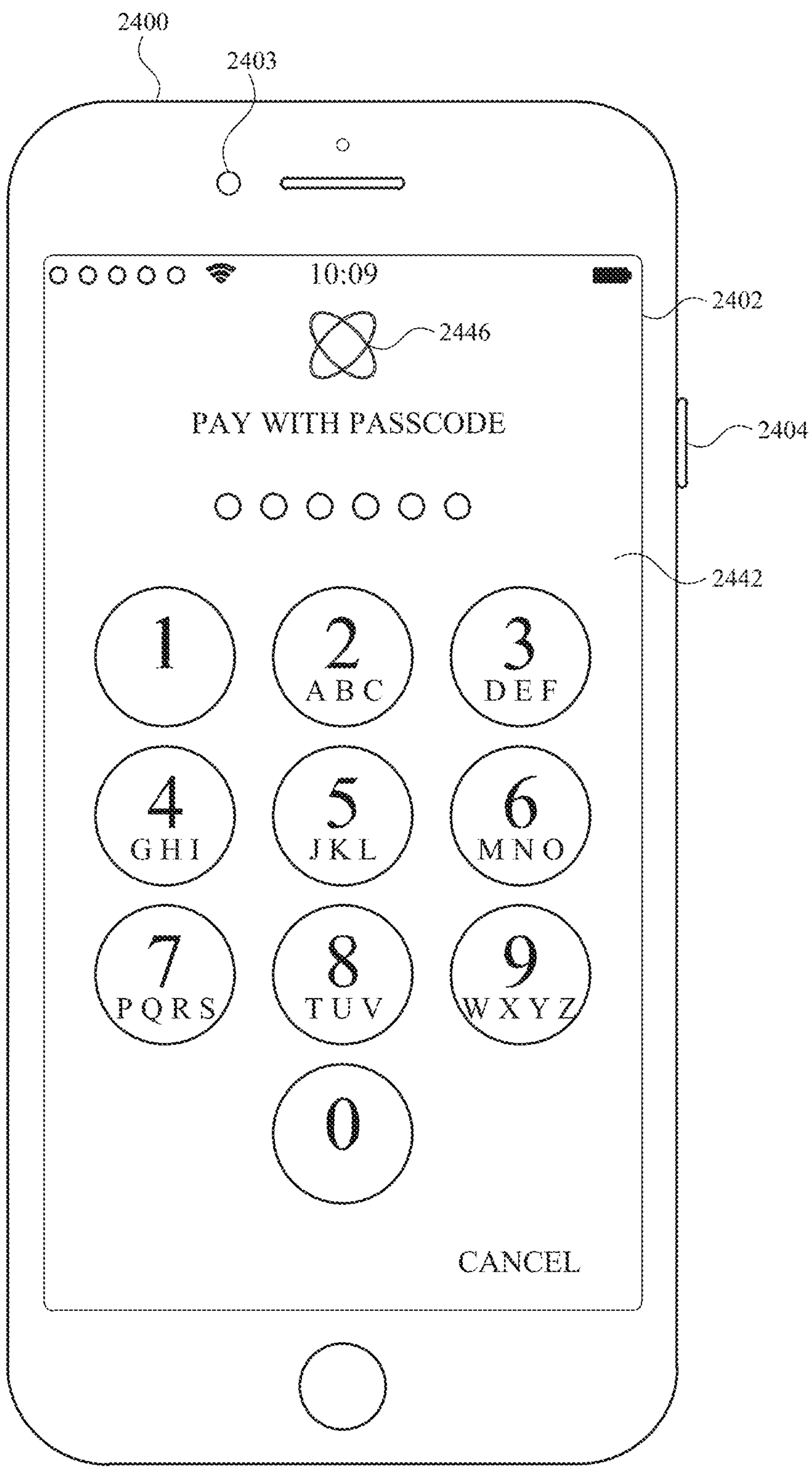
Figure 24A:
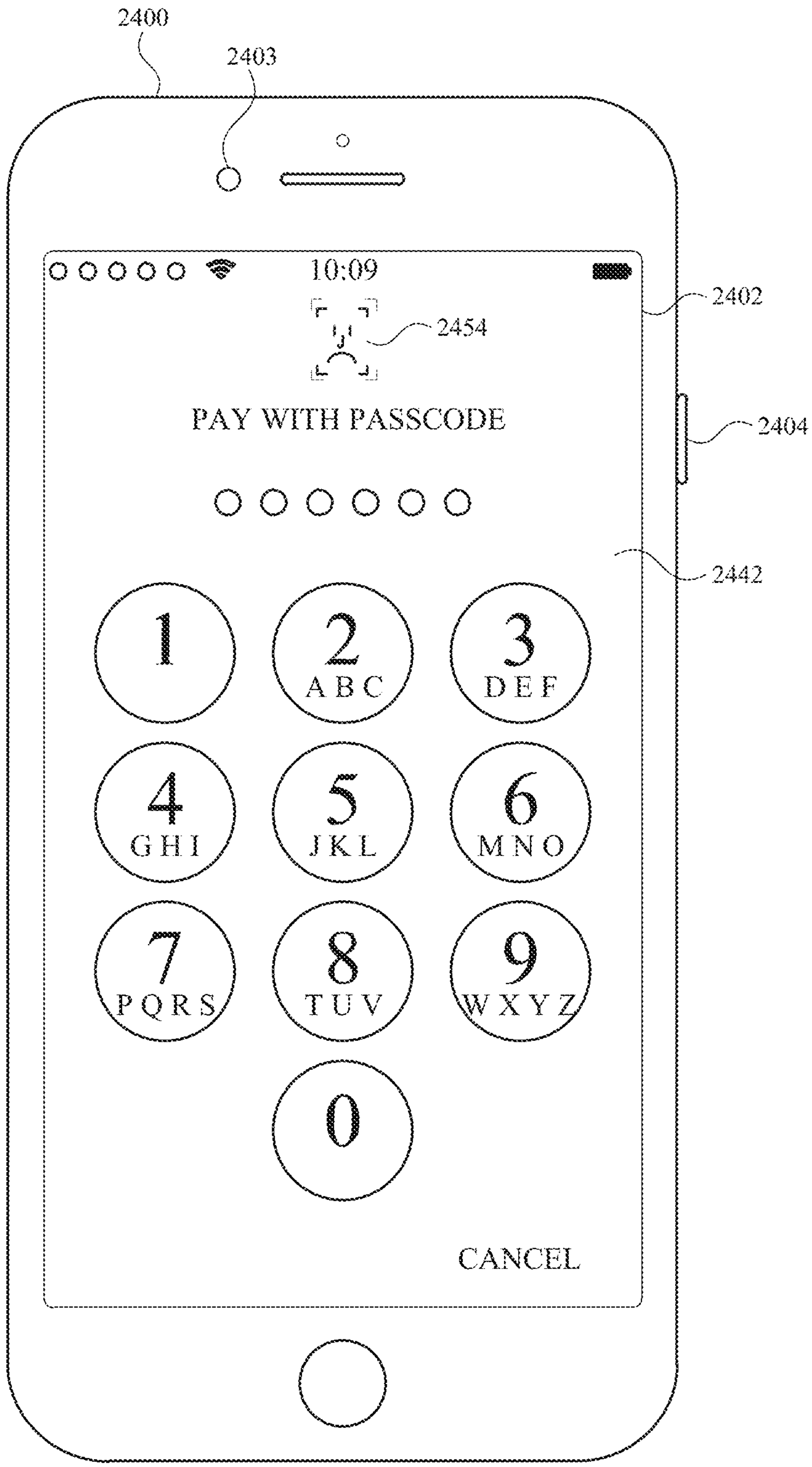
Figure 24A:
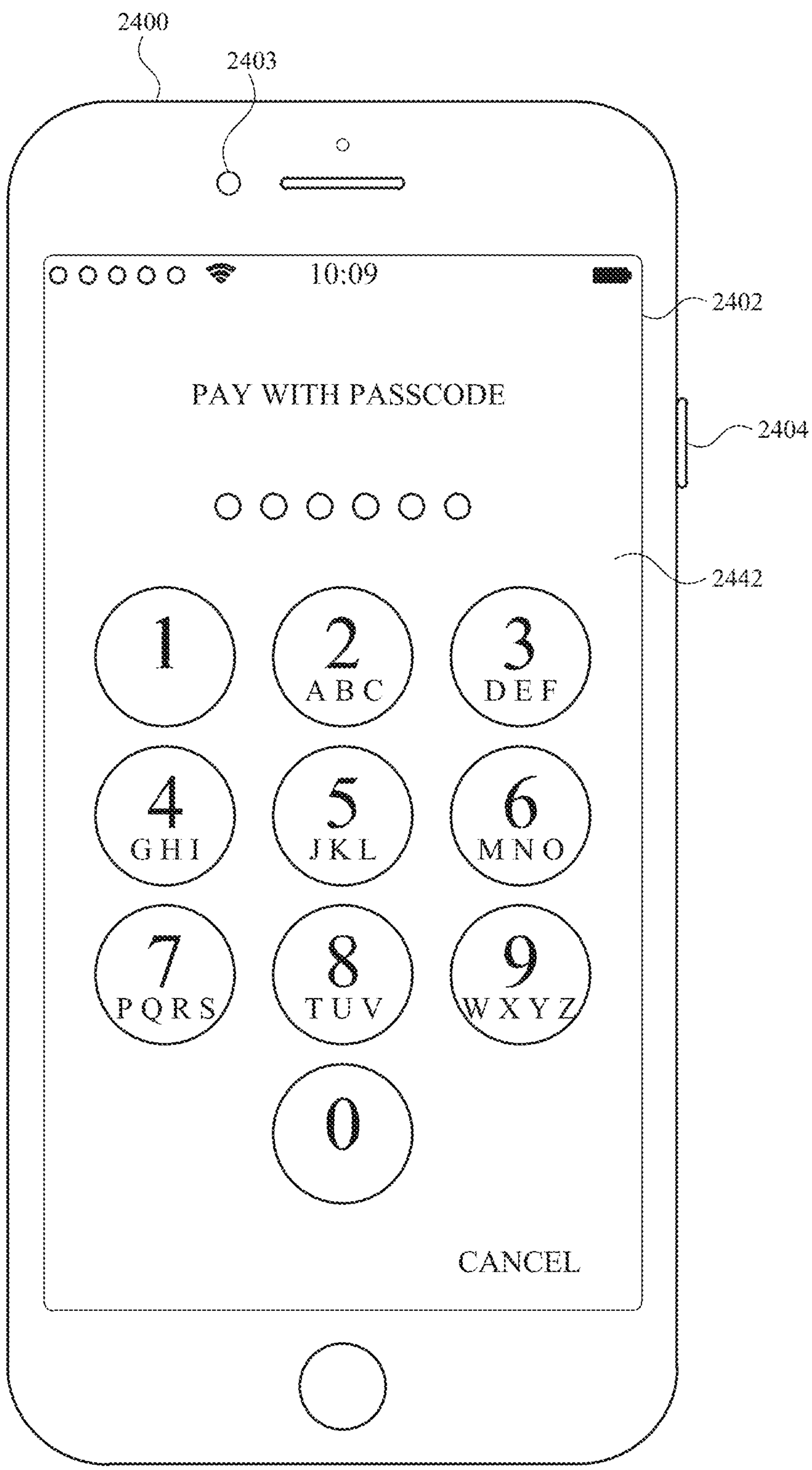
Figure 24A:
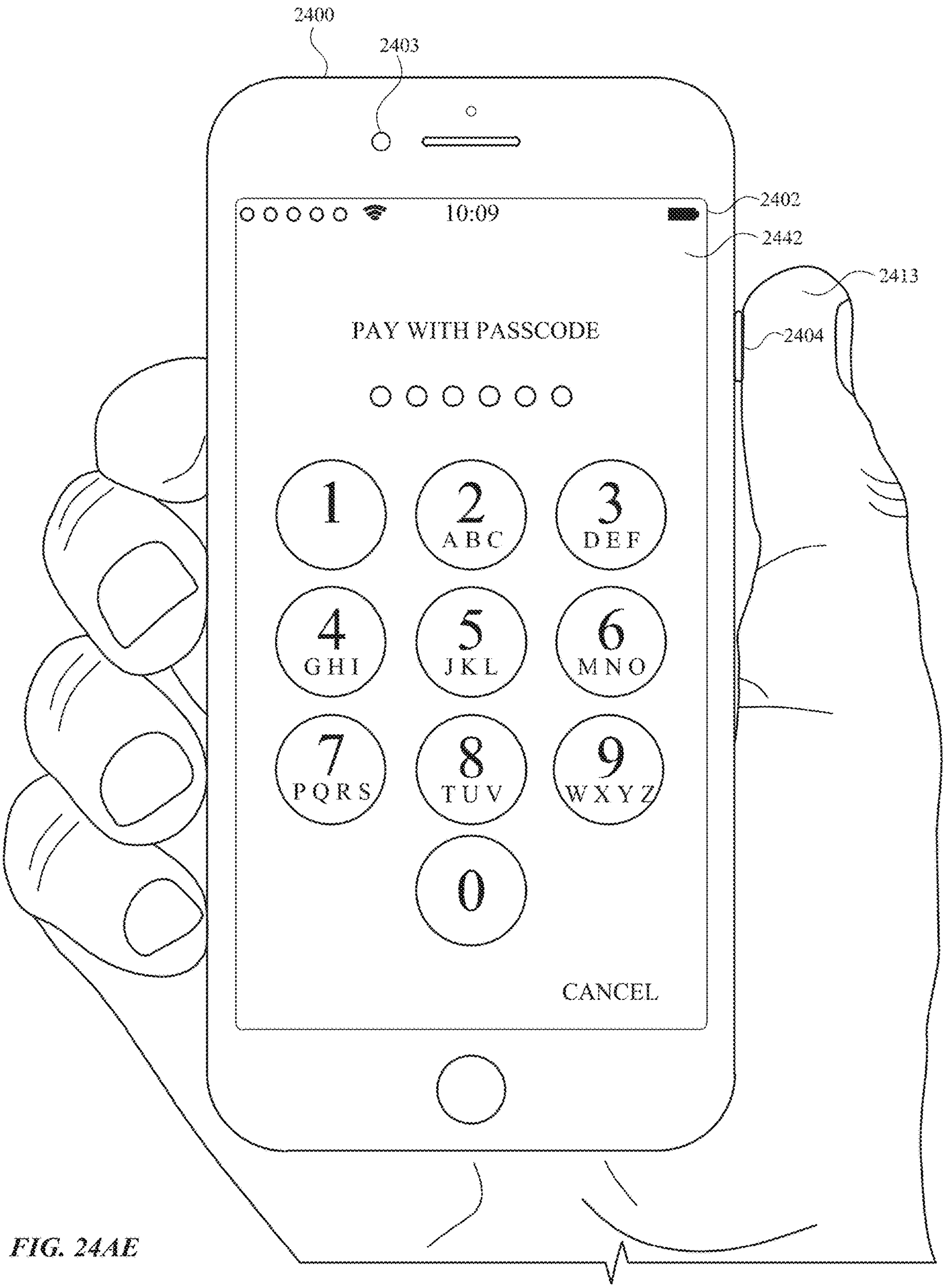
Figure 24A:
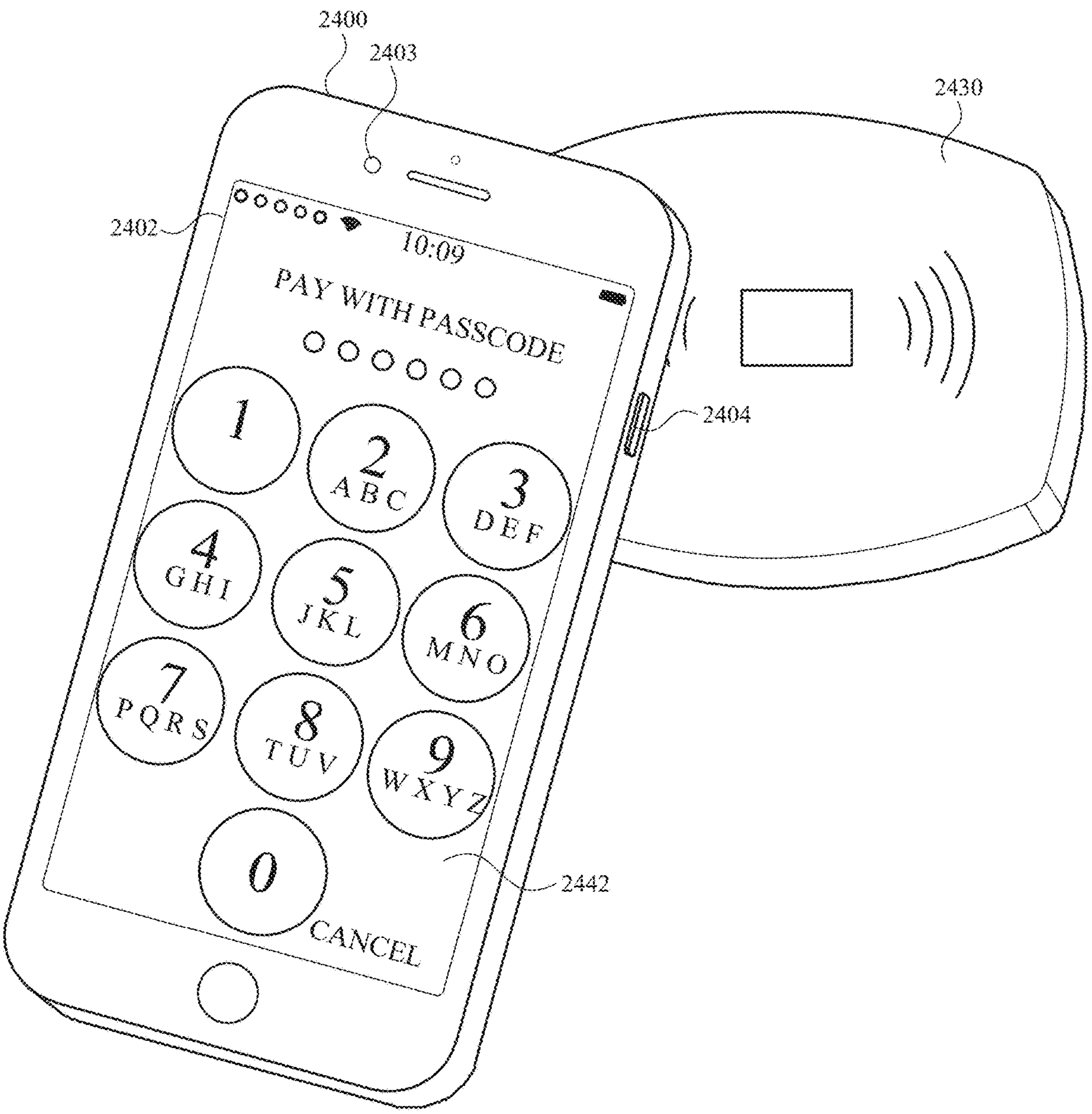
Figure 24A:
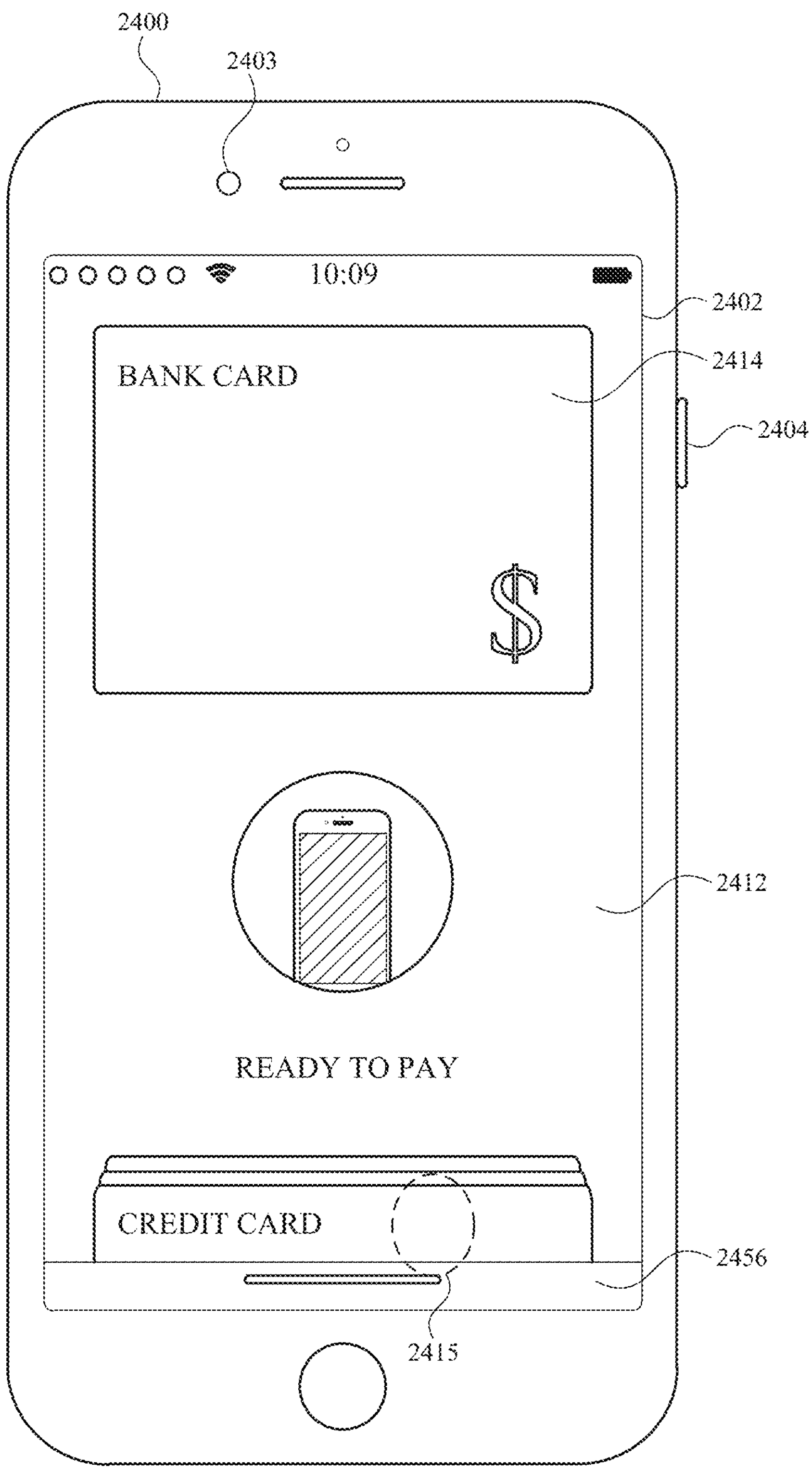
Figure 24A:
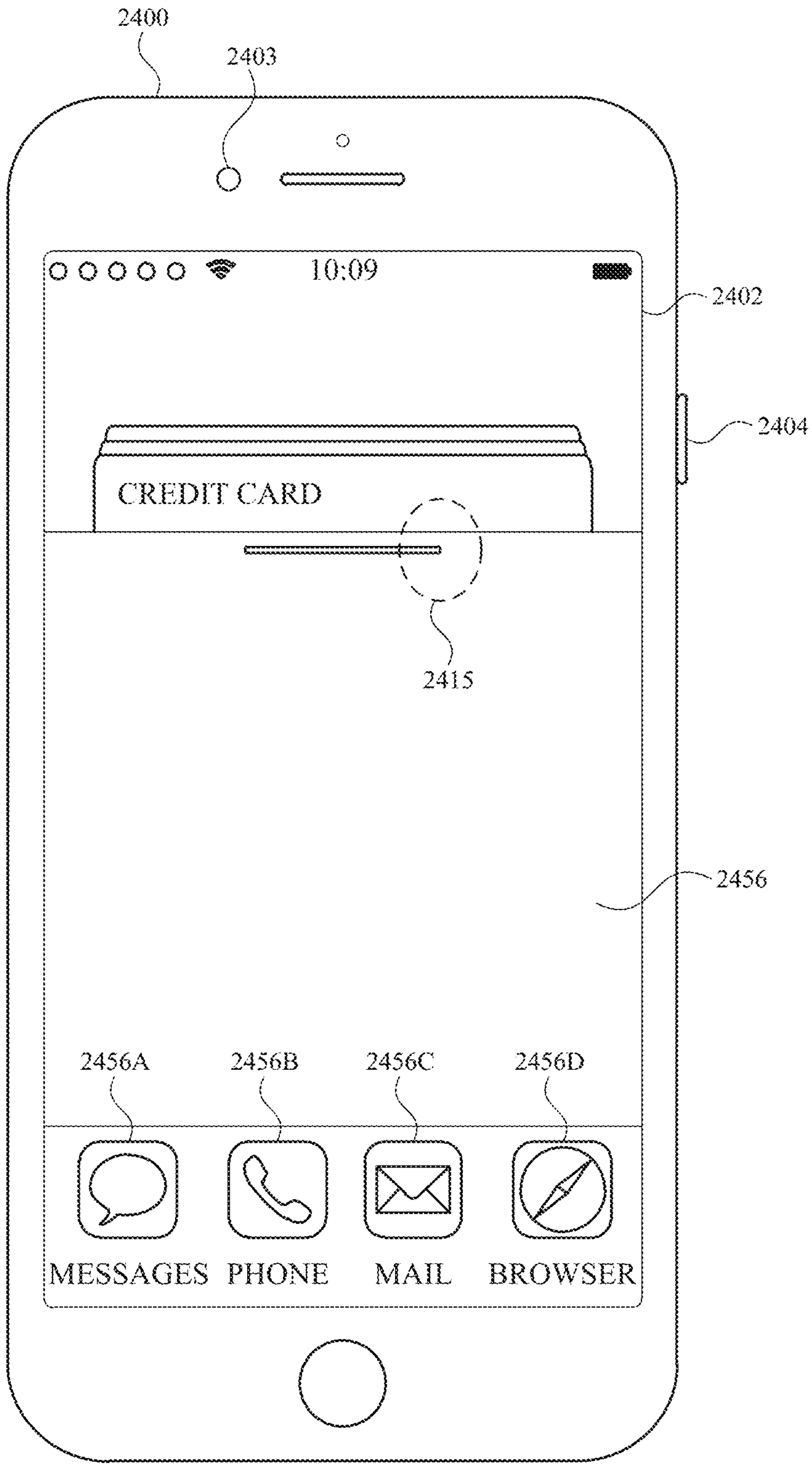
Figure 24A:
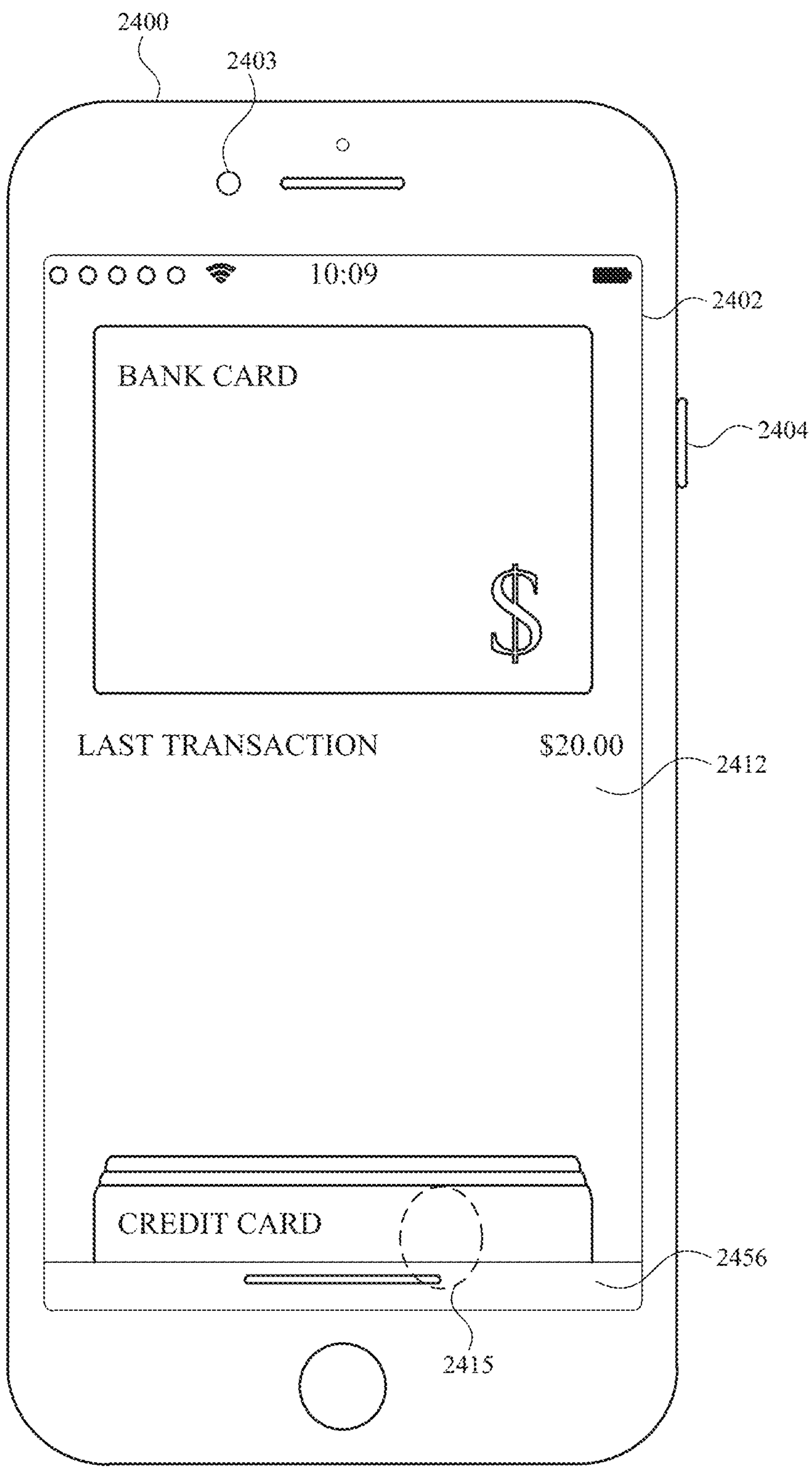
Figure 24A:
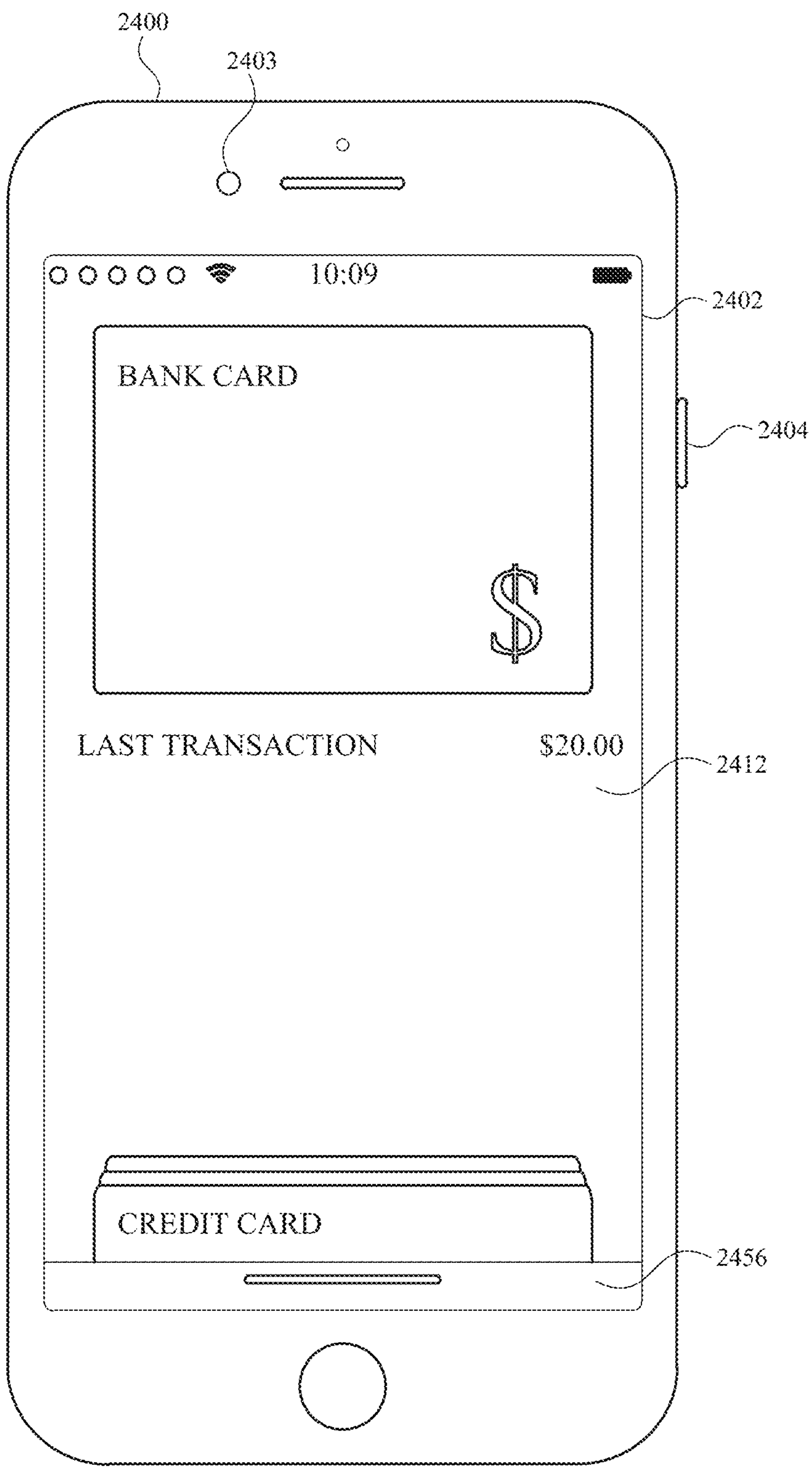
Figure 24A:
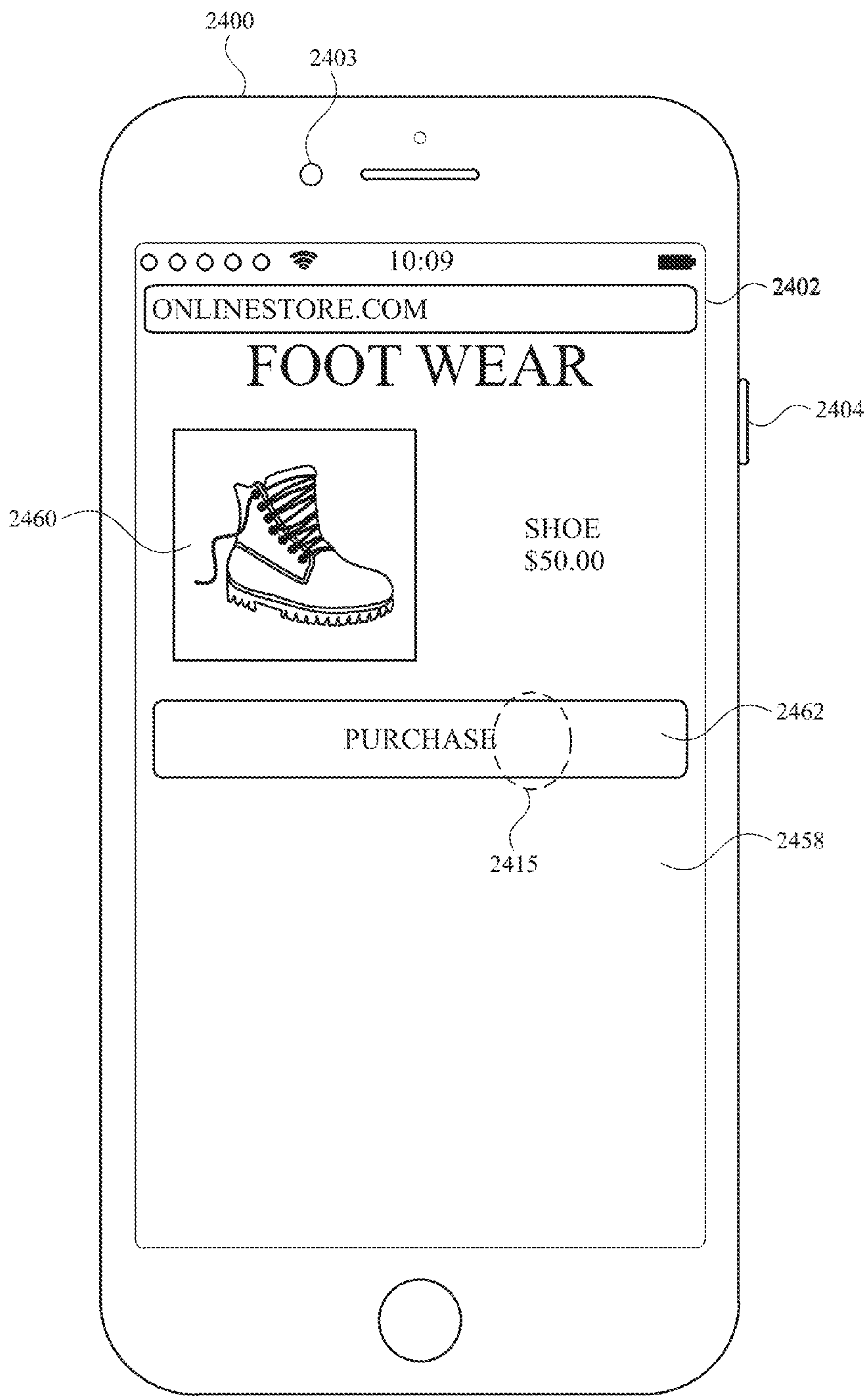
Figure 24A:
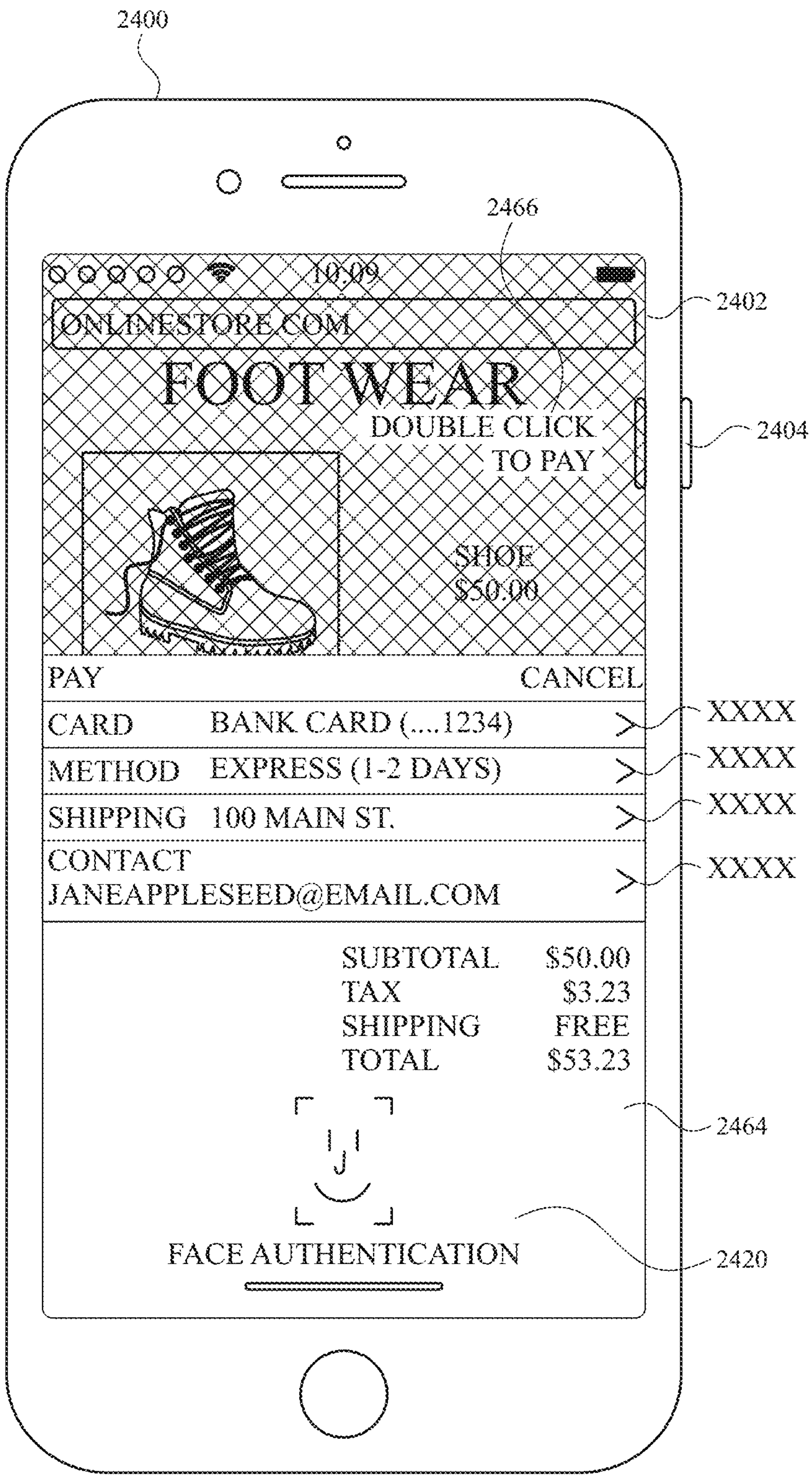
Figure 24A:
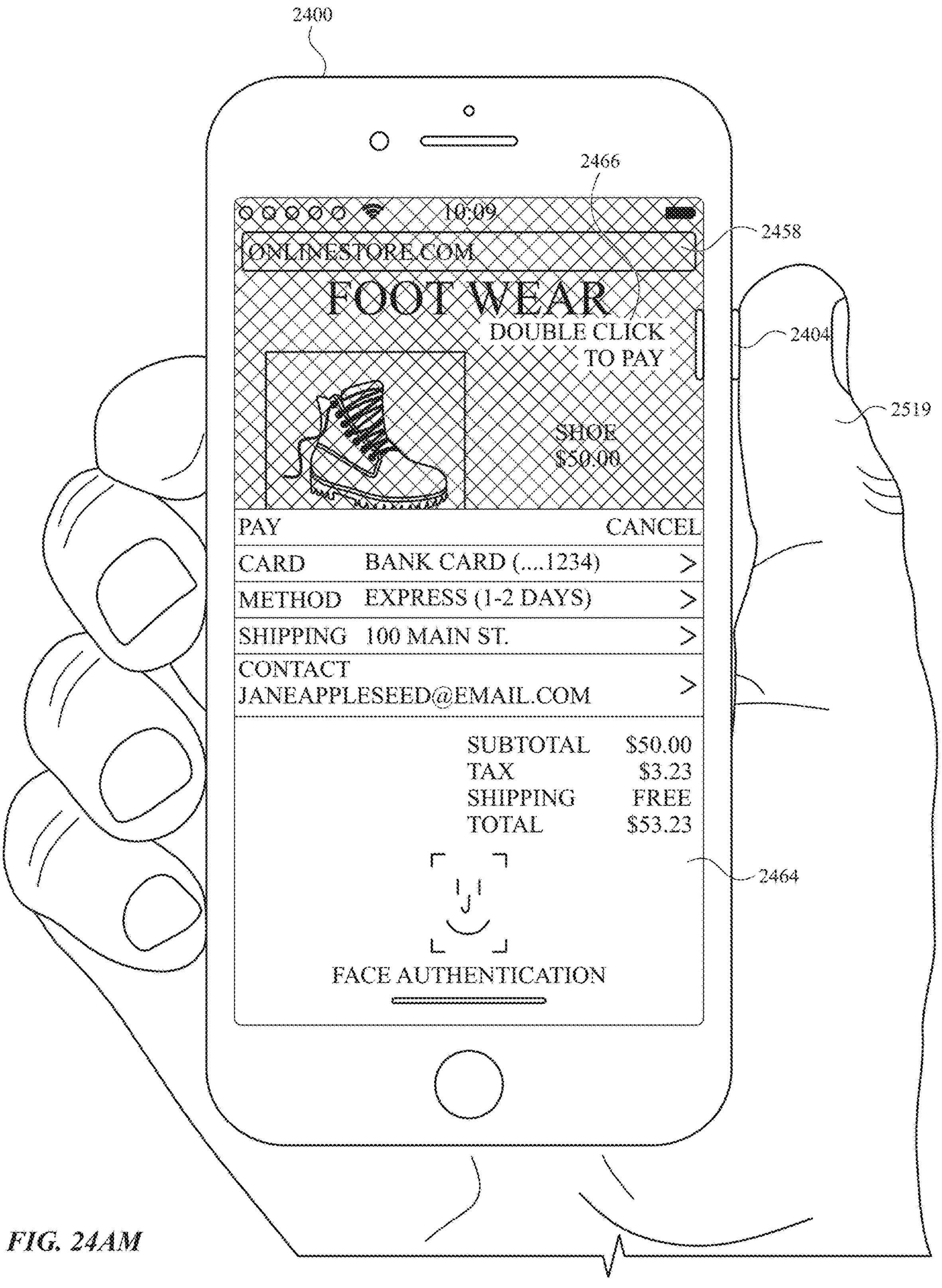
Figure 24A:
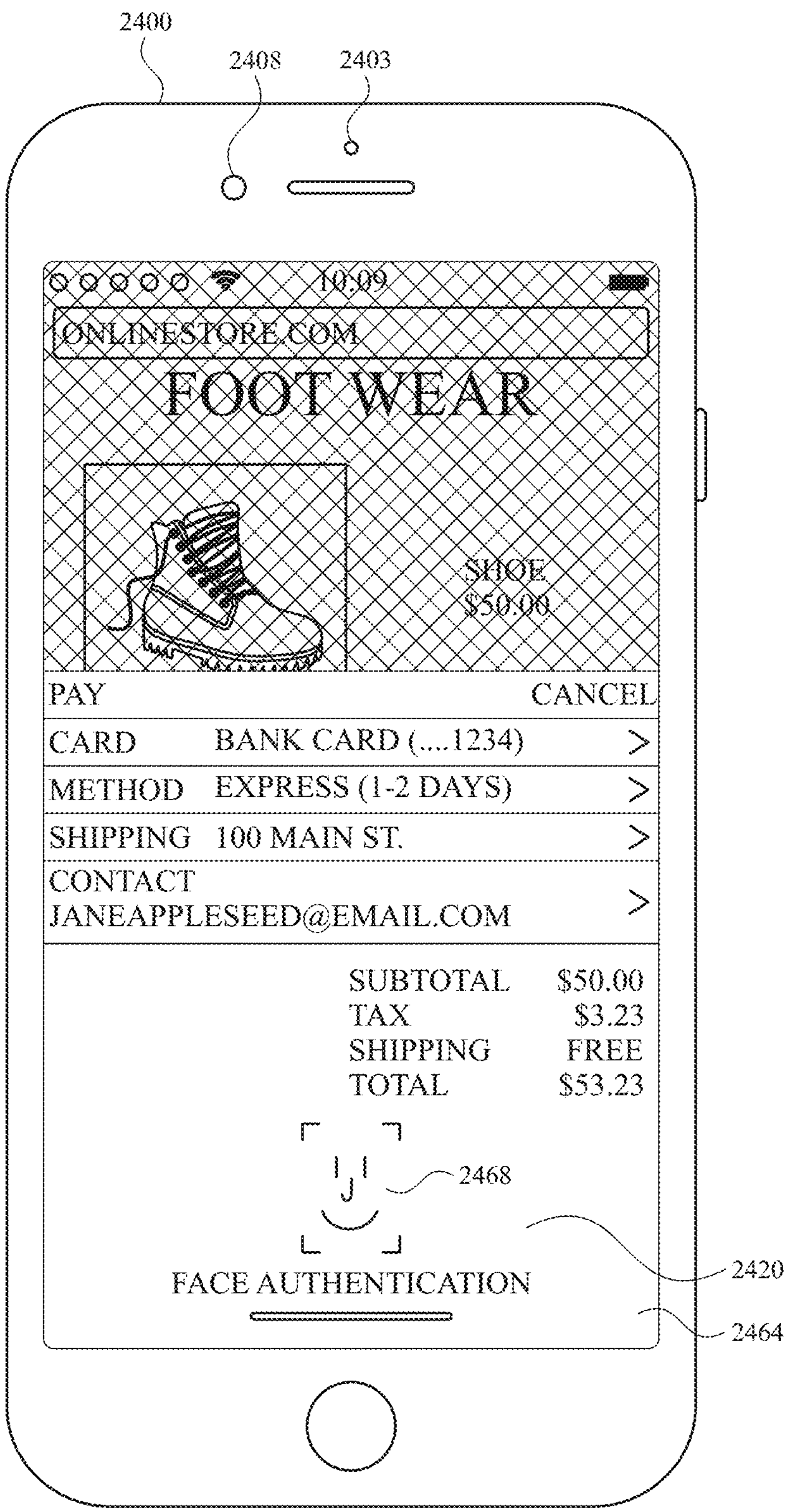
Figure 24A:
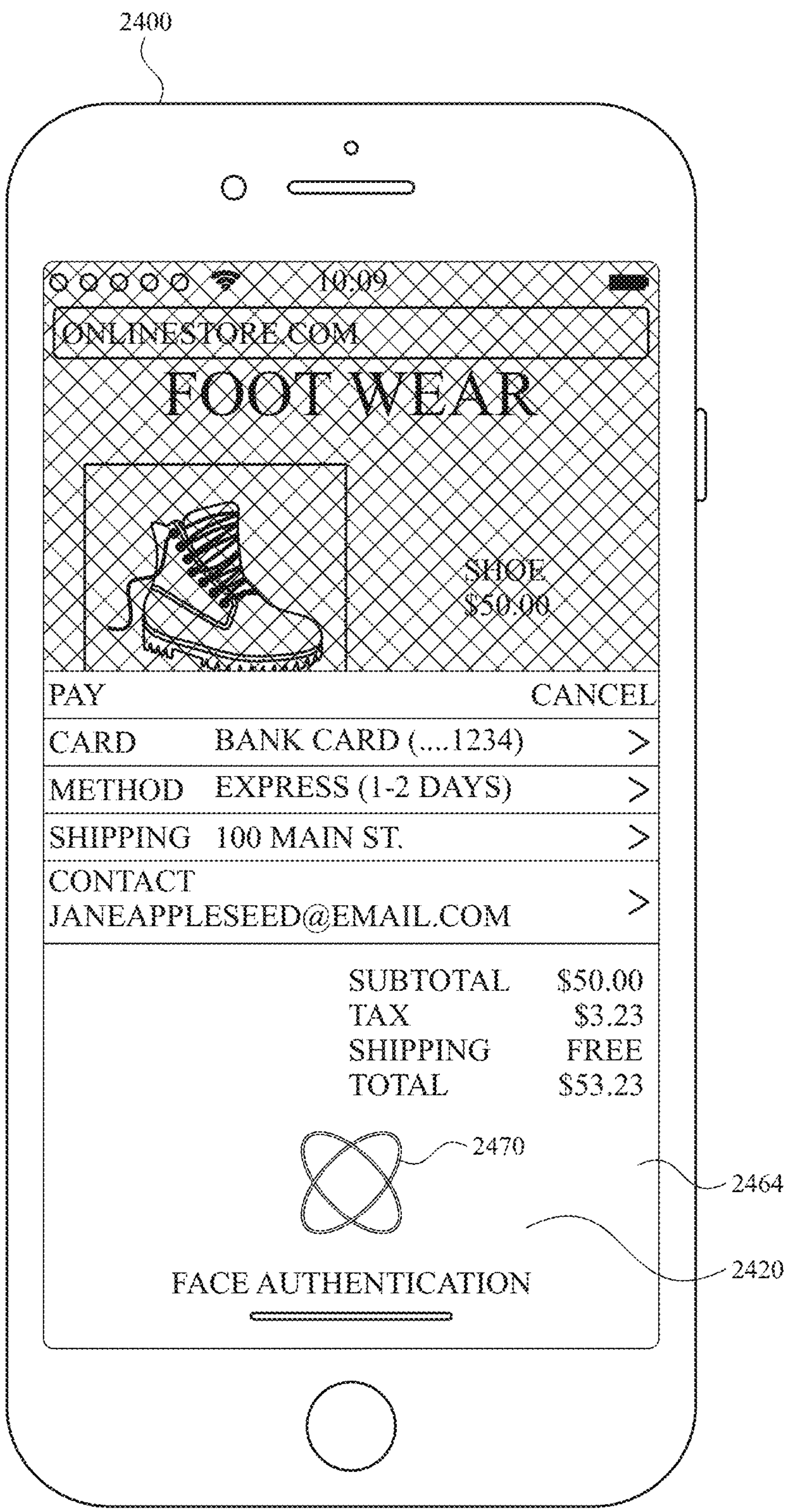
Figure 24A:
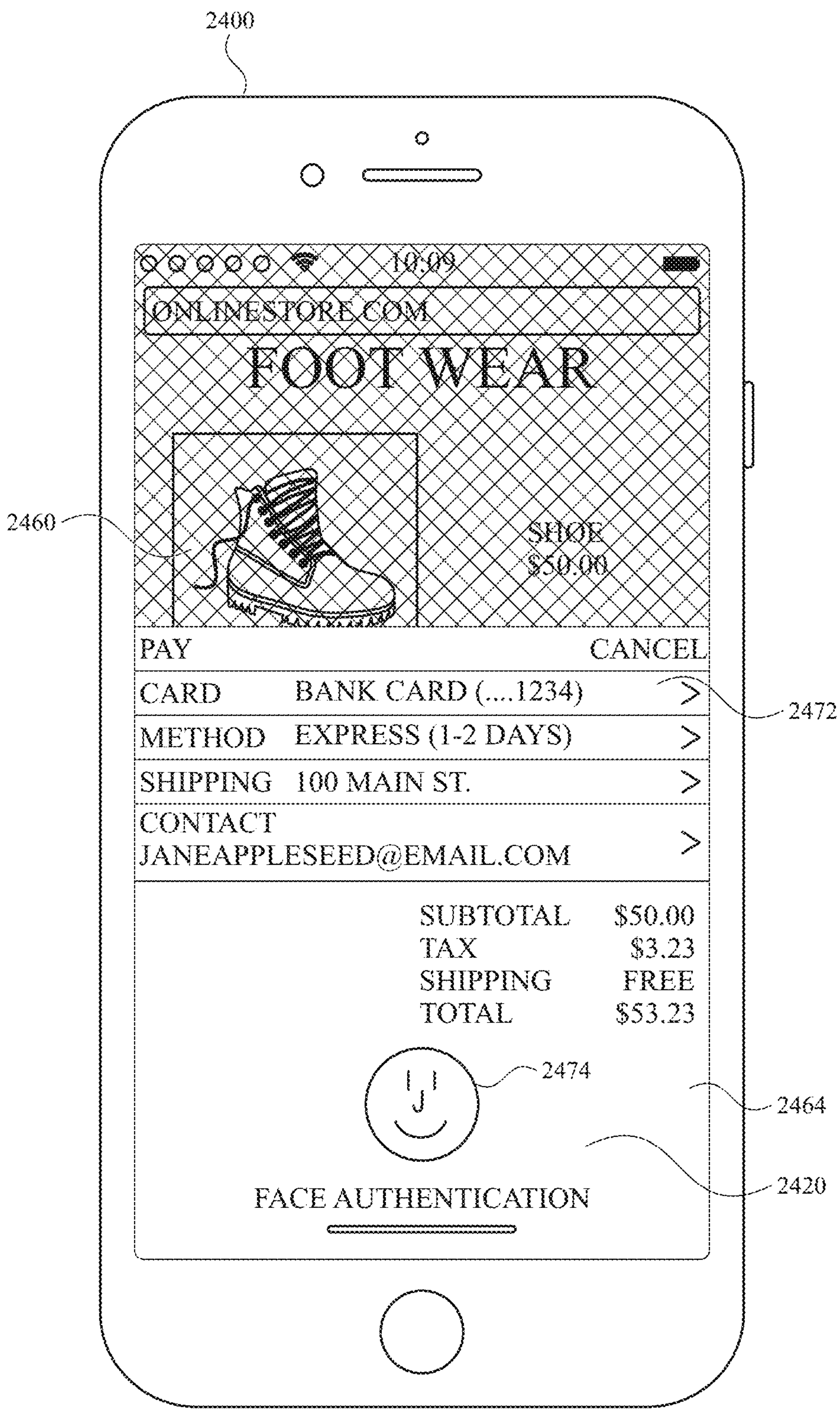
Figure 24A:
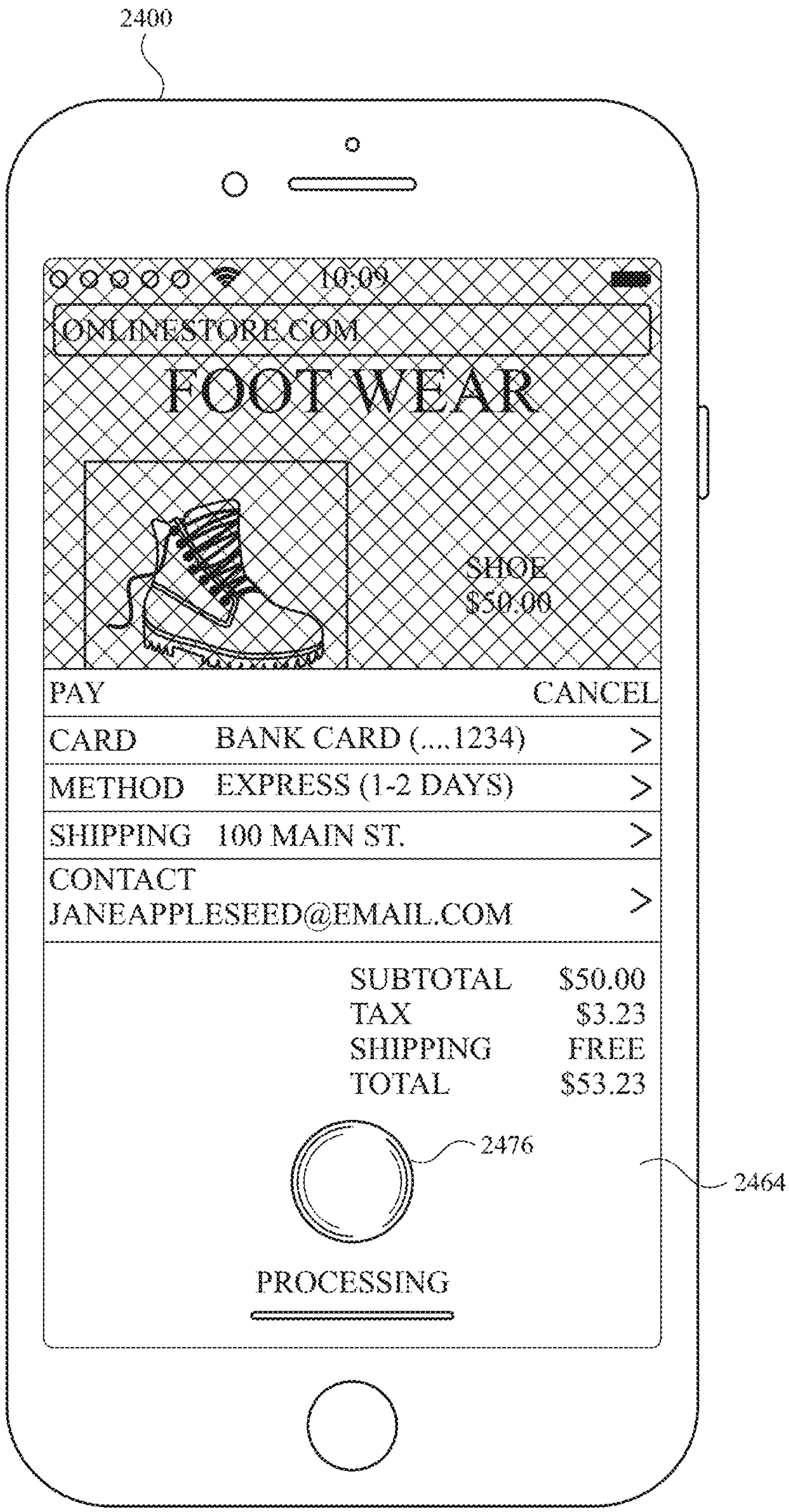
Figure 24A:
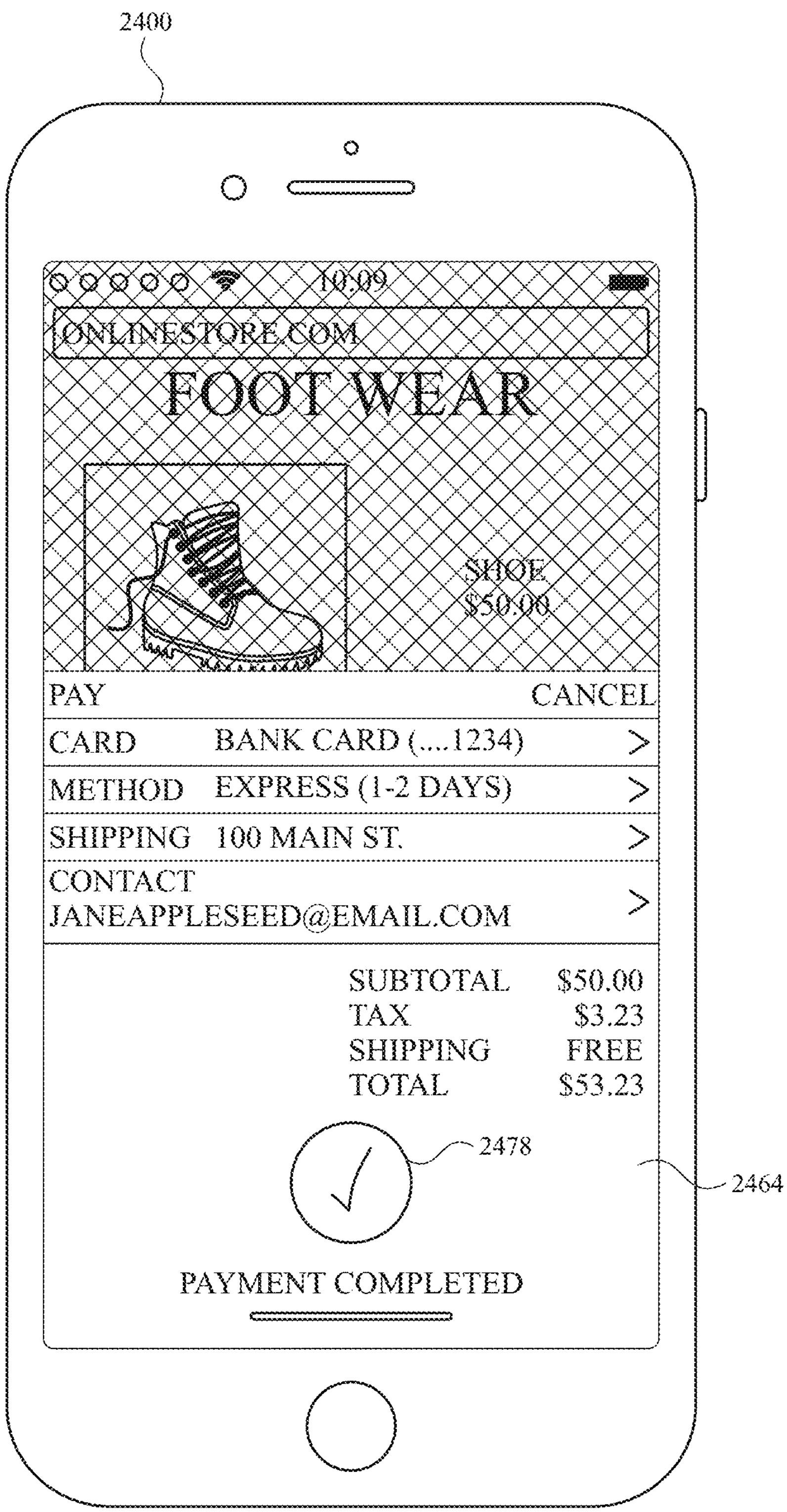
Figure 24A:
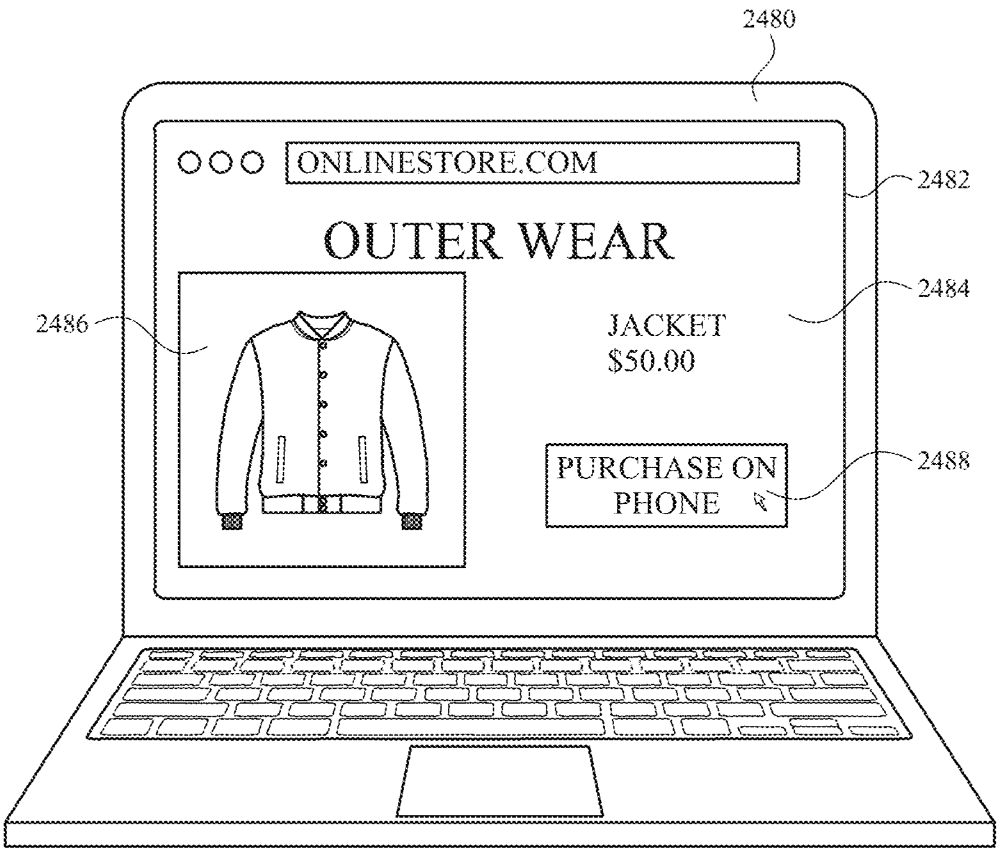
Figure 24A:
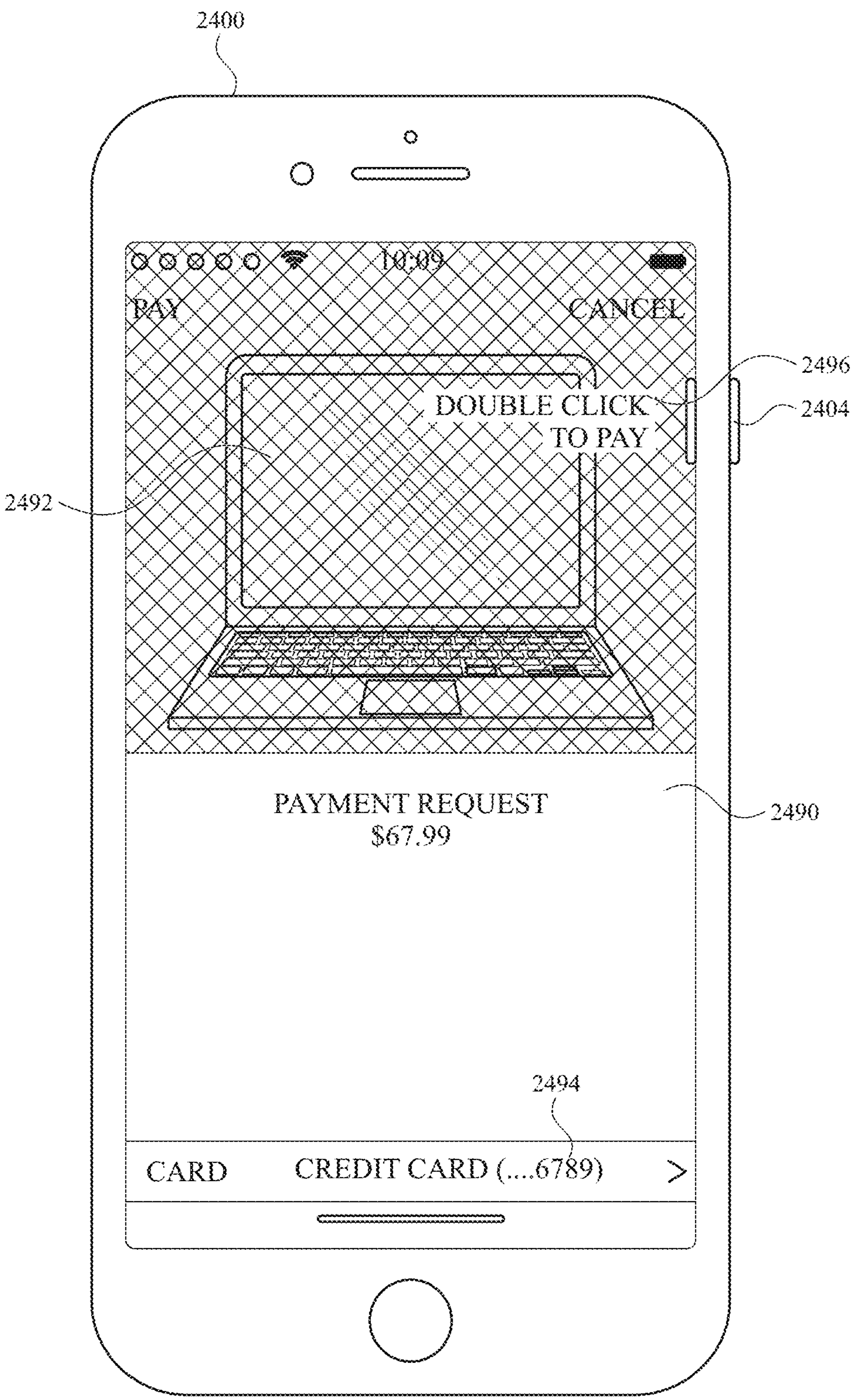
Figure 24A:
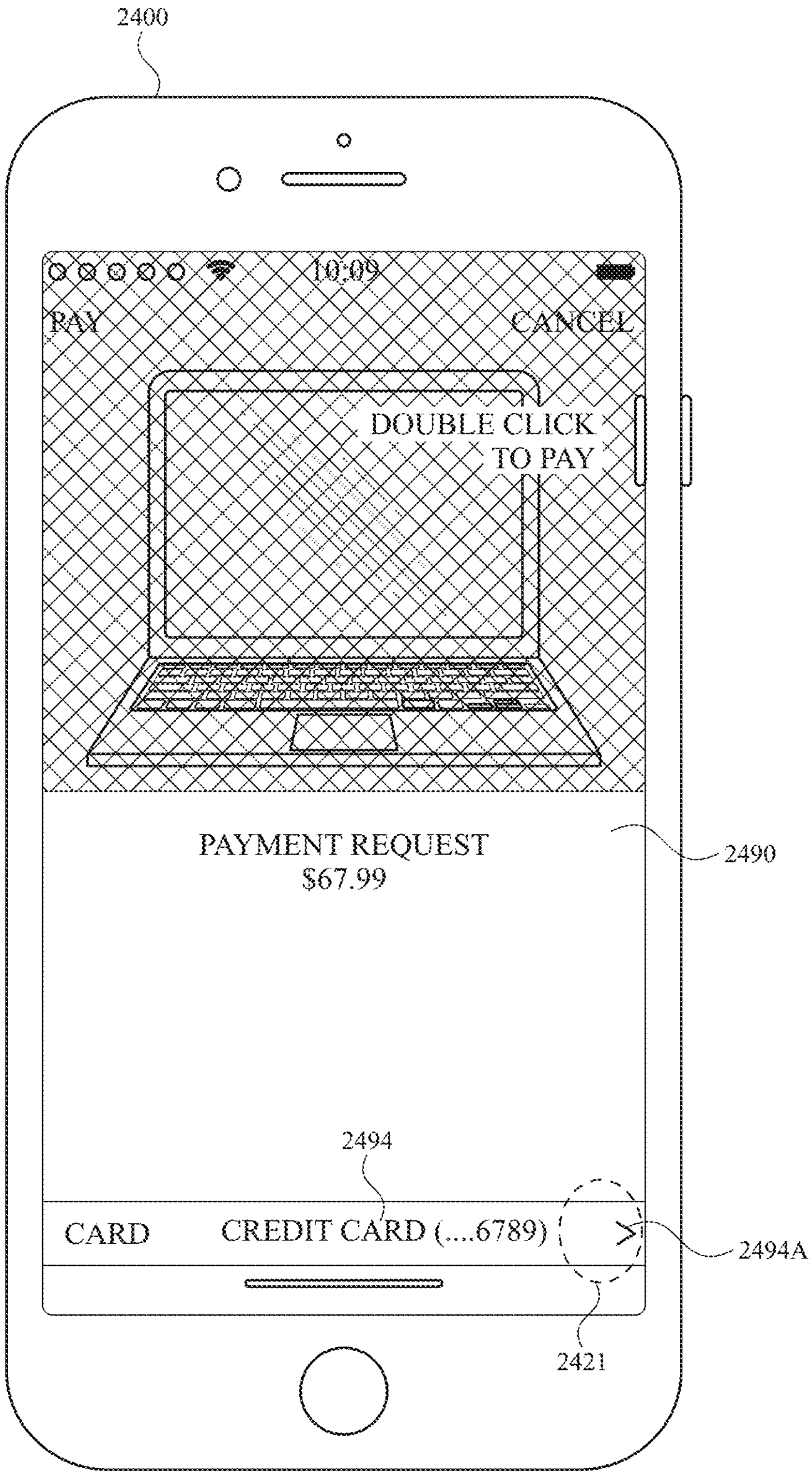
Figure 24A:
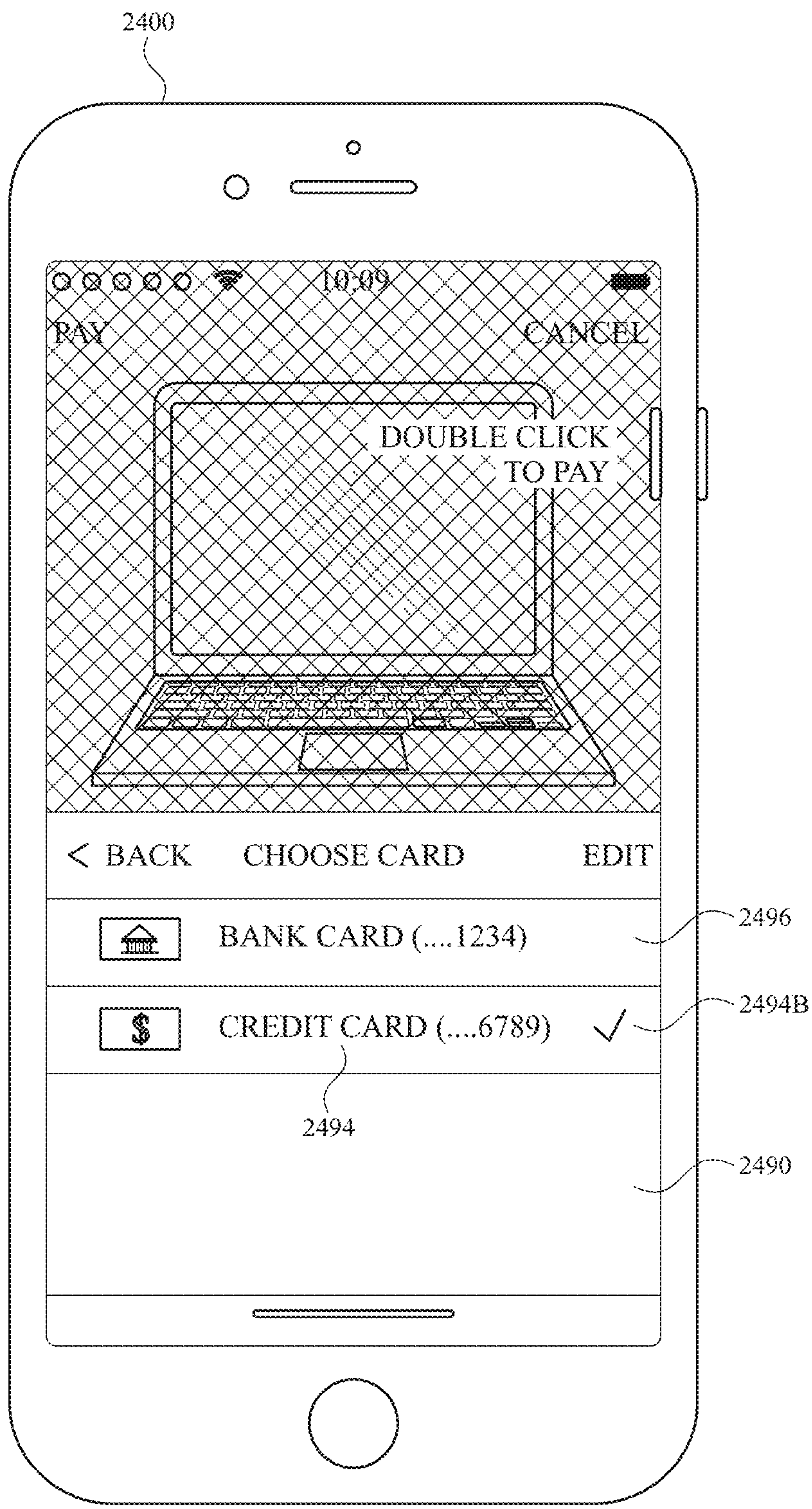
Figure 24A:
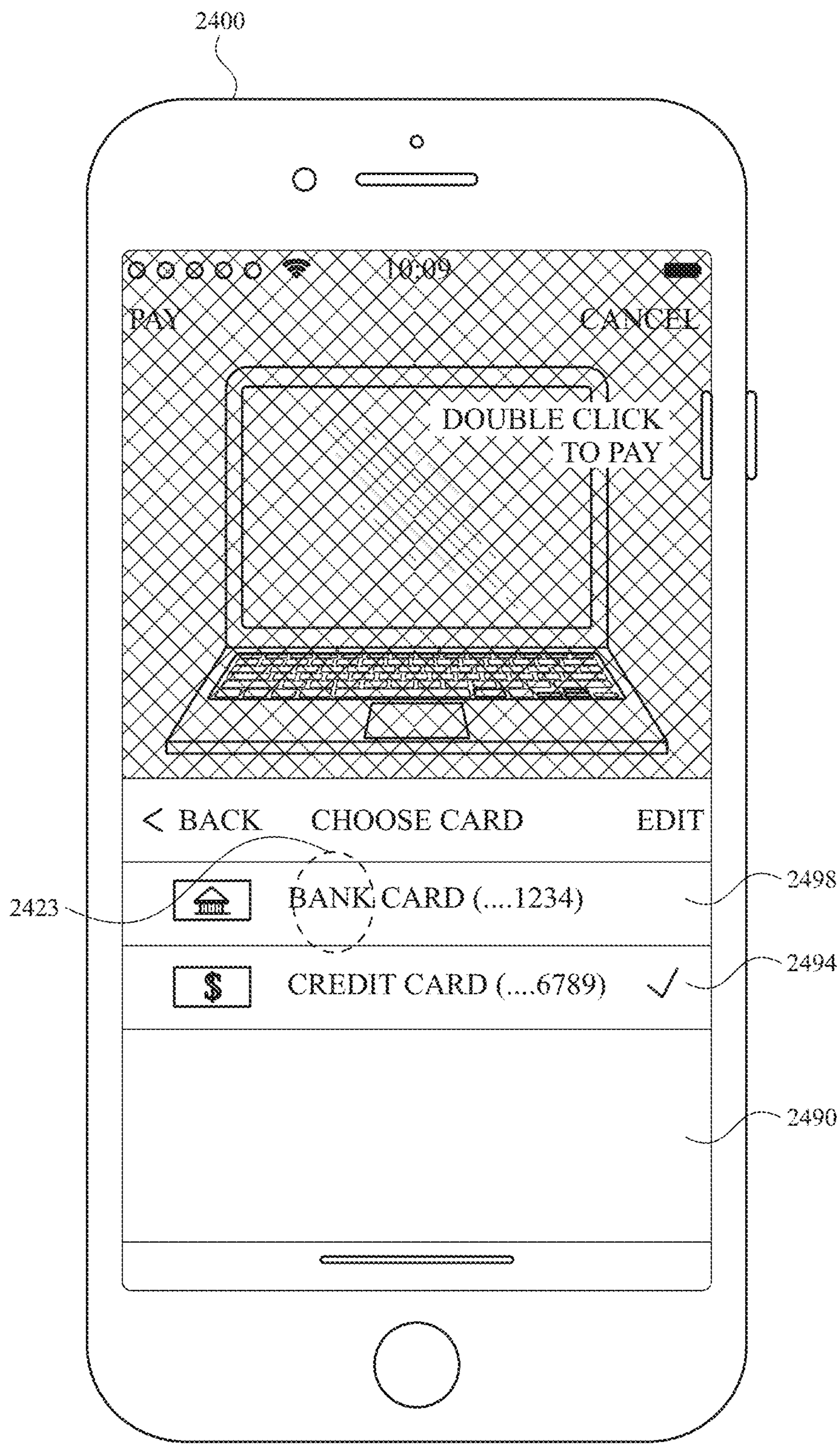
Figure 24A:
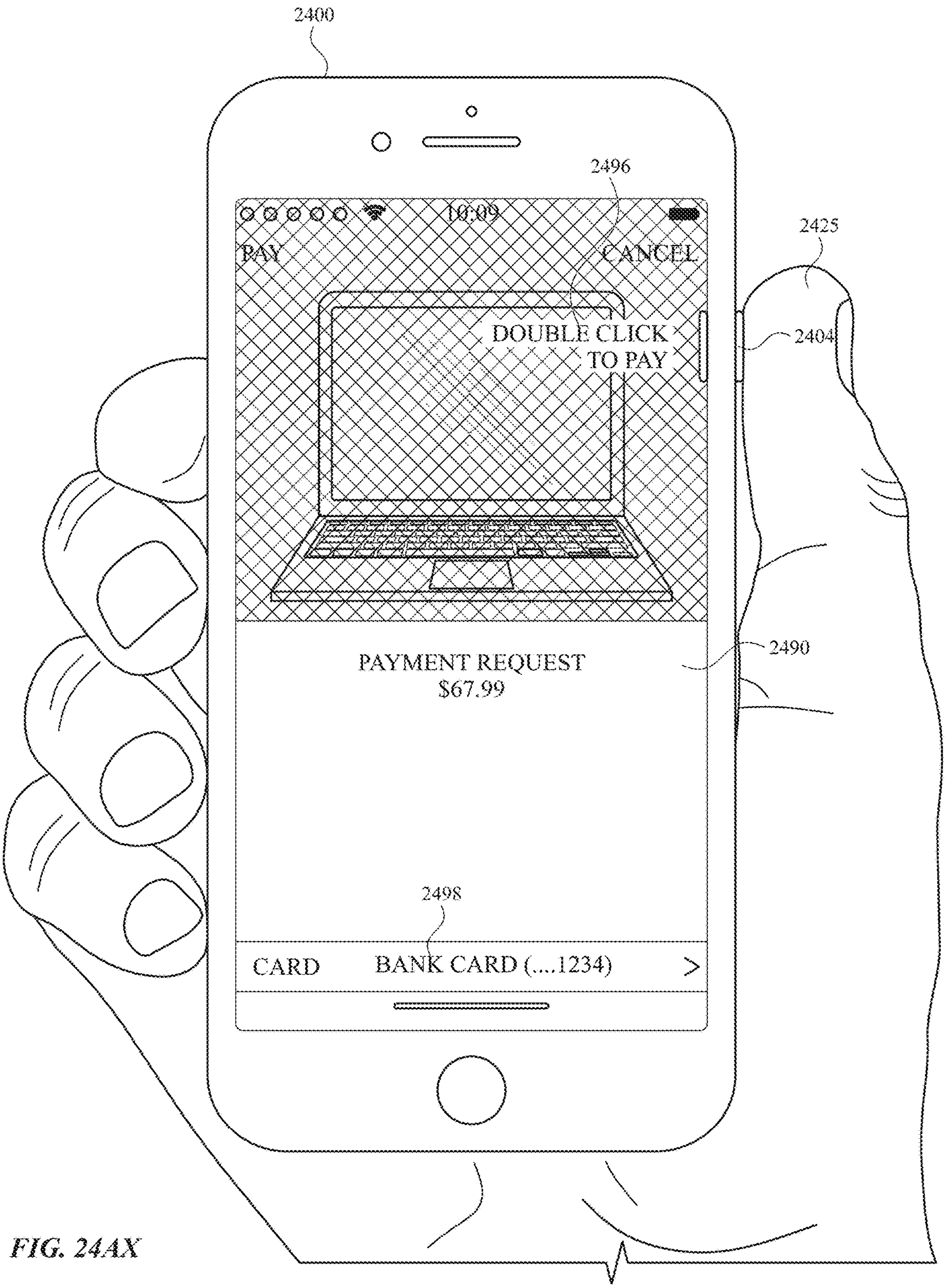
Figure 24A:
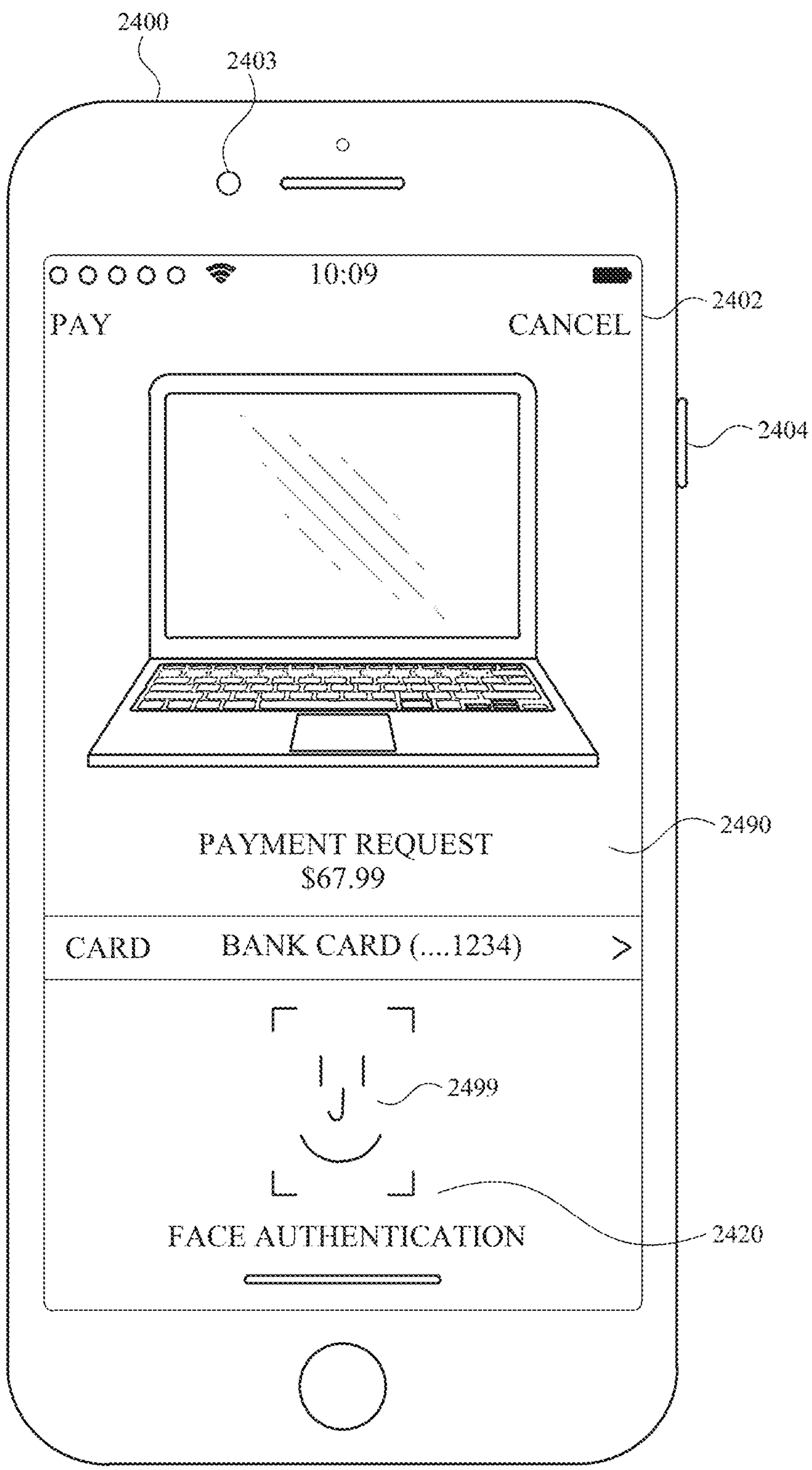
Figure 24A:
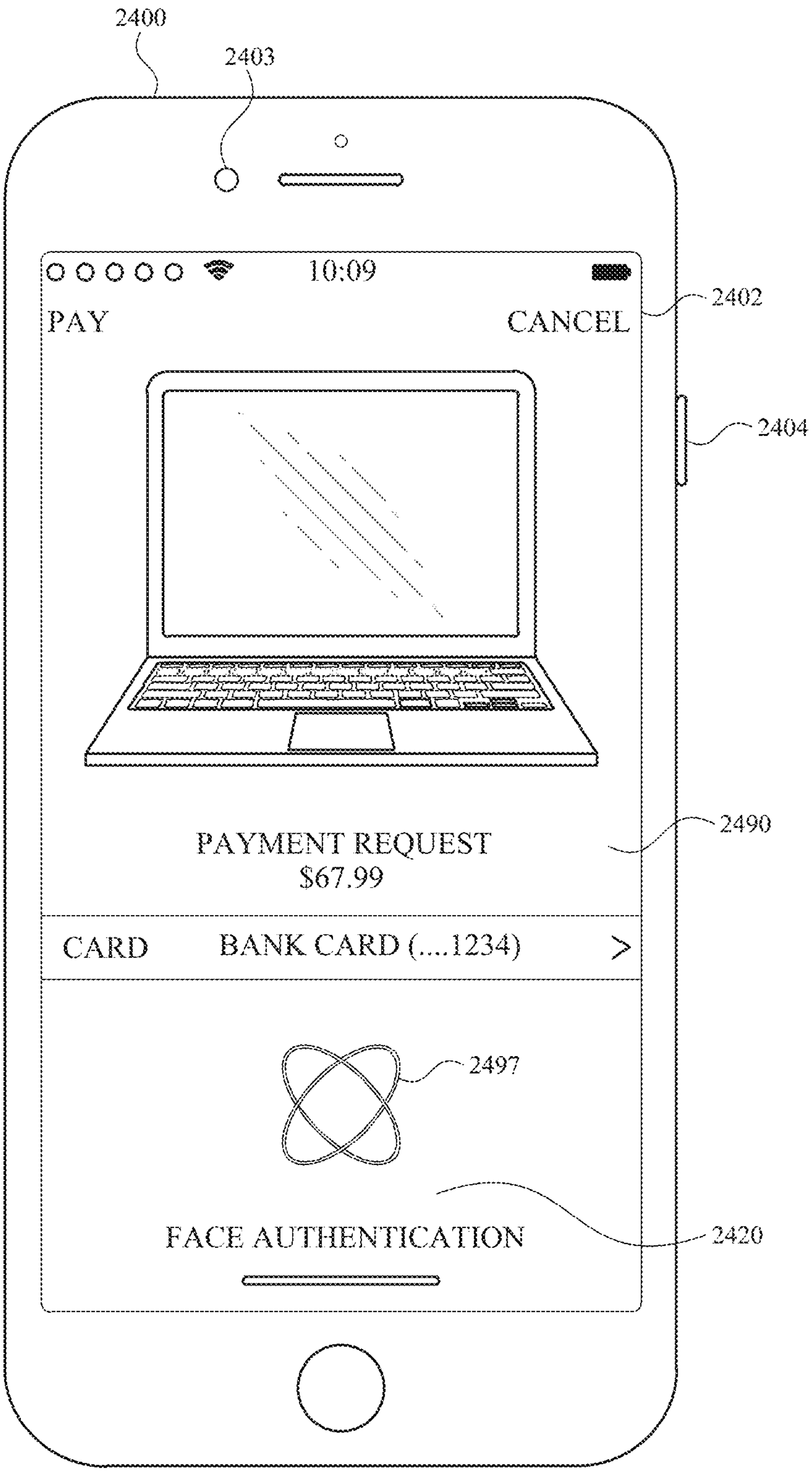
Figure 24B:
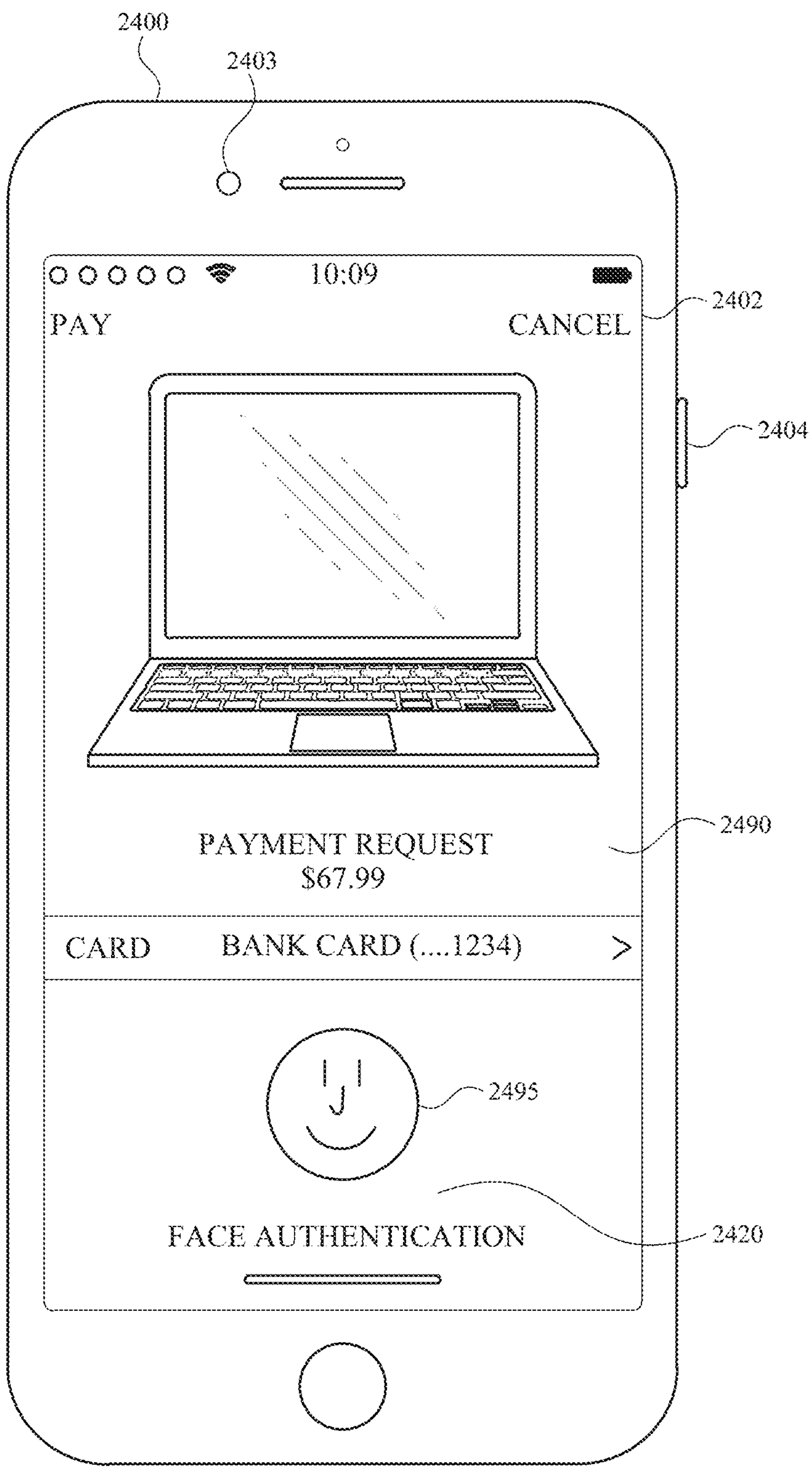
Figure 24B:
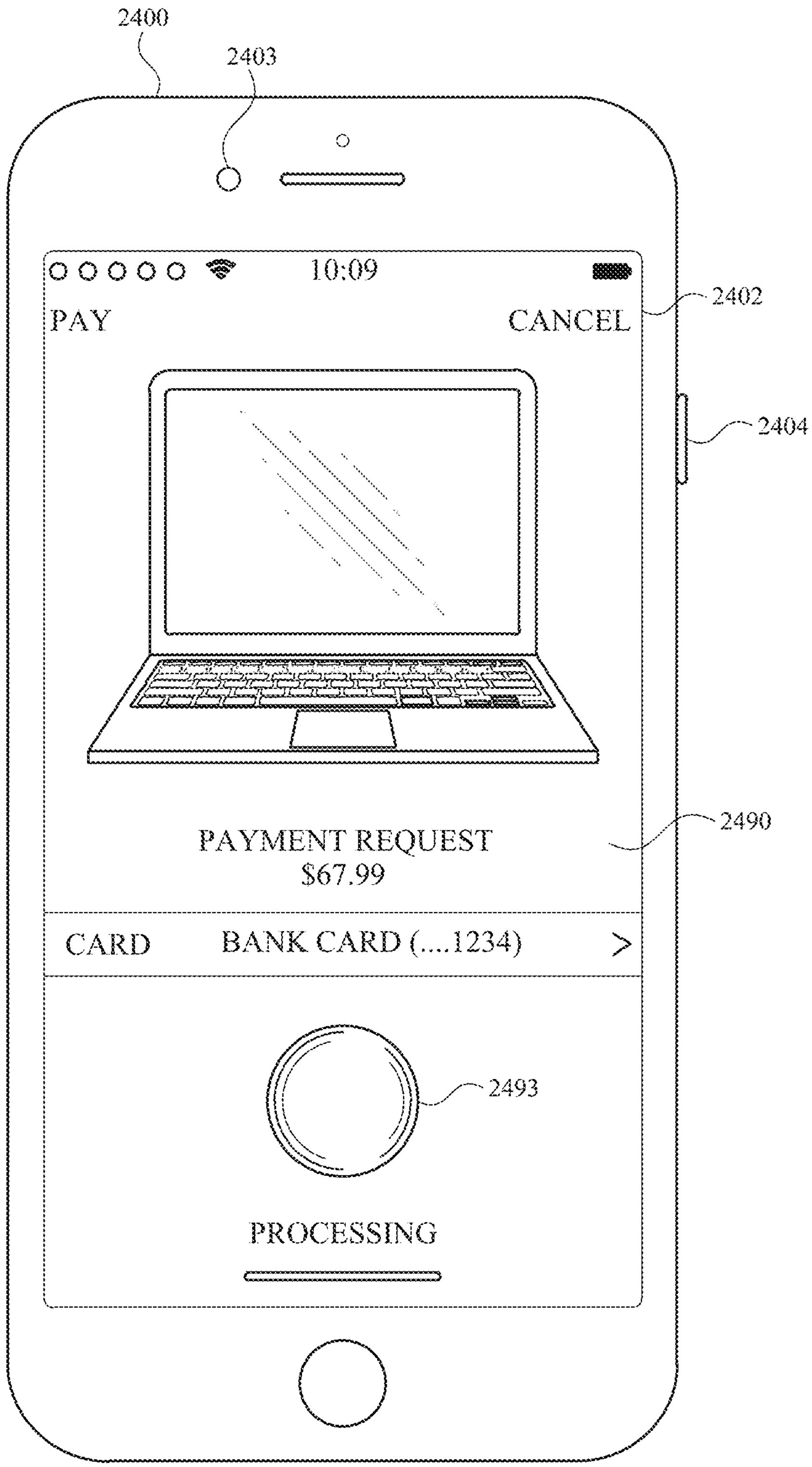
Figure 24B:
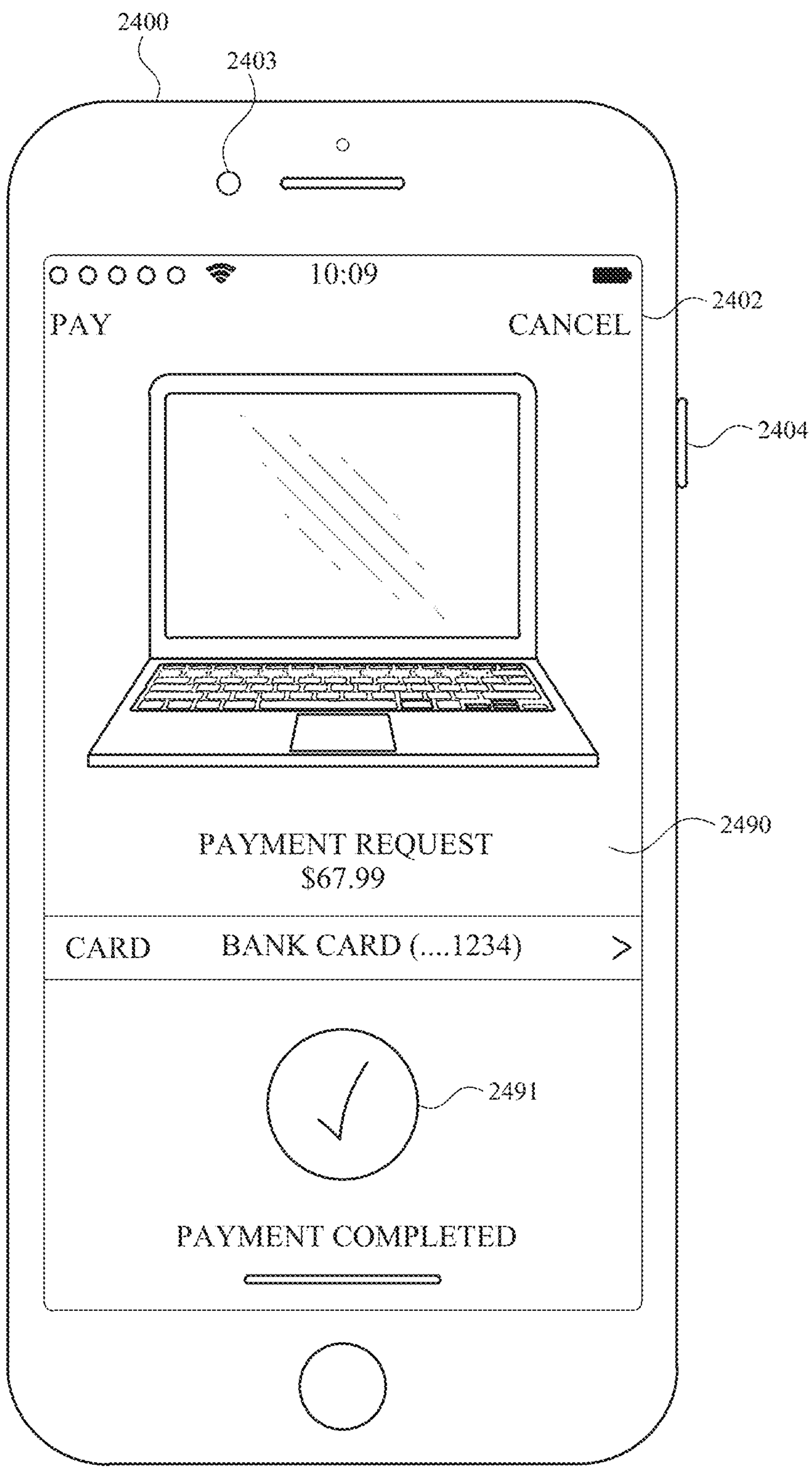

In FIG. 24Z, subsequent to electronic device 2400 determining that biometric authentication (and/or an alternative authentication, such as passcode authentication) was successful, the electronic device indicates (to the user) that authorization has been provided to proceed with a payment transaction using the currently-selected payment account (e.g., payment account 2414), and thus that the payment transaction can be initiated (e.g., with a transaction terminal). In some examples, electronic device 2400 displays a text indication 2452A (e.g., corresponding to text indication 2428A) and/or a graphical indication 2452B (e.g., corresponding to graphical indication 2428B) to indicate that the payment transaction can be initiated.

FIG. 24AA illustrates electronic device 2400 displaying, on display, alternative authentication interface 2442 similar to that of FIG. 24W. As in FIG. 24W, electronic device 2400 performs biometric authentication during display of alternative authentication interface 2442. Accordingly, the electronic device obtains and processes biometric data to determine whether the obtained biometric data matches a biometric template associated with the user. As such, alternative authentication interface 2442 includes glyph 2444 indicating to the user that biometric data has been (or is being) obtained. In FIG. 24AB, as in FIG. 24X, alternative authentication interface 2442 indicates that the biometric data is being processed by the electronic device, for instance, by displaying one or more rotating rings 2446.

If electronic device 2400 determines that the biometric authentication is unsuccessful (e.g., the biometric data does not match a biometric template associated with the user), the electronic device forgoes transitioning from a first state in which a function (e.g., authorization for transmitting payment credentials) is disabled to a second state in which the function is enabled (thereby disallowing the device from proceeding with the payment transaction). In some examples, electronic device 2400 further indicates (to the user) that the biometric authentication was unsuccessful, for instance, by displaying a simulation of a representation of the biometric feature in alternative authentication interface 2442. As shown in FIG. 23AC, in some examples, alternative authentication interface 2442 includes a glyph 2454 (e.g., corresponding to glyph 2436) indicating (to the user) that the biometric authentication was unsuccessful.

FIG. 24AD illustrates electronic device 2400 displaying, on the display 2402, alternative authentication interface 2442 after the unsuccessful biometric authentication. The electronic device displays with an indication (e.g., via glyph 2454) that the biometric authentication was unsuccessful. In some examples, as shown in FIG. 24AE, following an unsuccessful biometric authentication, electronic device 2400 receives one or more activations of button 2404 (e.g., a double press of button 2404) to re-start the biometric authentication process (e.g., as described with reference to FIGS. 24B-24J) while displaying alternative authentication interface 2442. Thus, upon failing a biometric authentication and/or alternative authentication process, a user can re-attempt the process via one or more activations of button 2404. In some examples, if the biometric authentication process is unsuccessfully attempted for a predetermined consecutive number of attempts or is unsuccessfully attempted for a predetermined consecutive number of attempts within a predetermined period of time, one or more activations of button 2404 (e.g., a double press of button 2404) no longer enables the re-start of the biometric authentication process (e.g., as described with reference to FIGS. 24B-24J).

In FIG. 24AF, electronic device 2400 detects (e.g., via a wireless communication radio of the device), while displaying alternative authentication interface 2442, second device 2430 (e.g., a transaction terminal). In some examples, in response to detecting second device 2430, the electronic device while displaying the alternative authentication interface, electronic device 2400 displays the pay user interface and a prompt (e.g., corresponding to prompt 2416 as illustrated in FIG. 24B) for proceeding with a payment transaction.

FIG. 24AG illustrates electronic device 2400 displaying, on display 2402, pay user interface 2412 and authorized to initiate a transaction (e.g., after successfully being provided with biometric and/or alternative, such a passcode, authentication) using the currently-selected payment account (e.g., payment account 2414). In some examples, pay user interface 2412 includes a menu tab 2456 (e.g., at a bottom region of the interface, next to the bottom edge of the display), as shown in FIG. 24AG. In some examples, electronic device detects a sliding gesture 2415 (e.g., in an upwards direction) of menu tab 2456. For example, sliding gesture 2415 corresponds to a touch-and-slide (in the upwards direction) gesture of menu tab 2456.

In some examples, sliding gesture 2415 on menu tab 2456 expands the menu tab (e.g., over pay user interface 2412), as shown in FIG. 0.24AH. Once expanded, menu tab 2456 includes one or more application affordances (e.g., application affordances 2456A-2456D) corresponding to applications installed on the device and accessible from the menu tab. For example, menu tab 2456 includes a first application affordance 2456A corresponding to a messaging application, a second application affordance 2456B corresponding to a voice call application, a third application affordance 2456C corresponding to an email application, and a fourth application affordance 2456D corresponding to a browsing application. In some examples, only first party applications (controlled only by the operating system of the device) can be included within menu tab 2456.

FIG. 24AI illustrates electronic device 2400 detecting sliding gesture 2415 while the gesture is sliding in a downwards direction on the display (and thus shrinking the expanded menu bar). As a result of the sliding gesture 2415 of menu bar 2456 in a downwards direction, the menu bar shrinks (or collapses back into) its original size and location (e.g., at the bottom of pay user interface 2412), as shown in FIG. 24AJ. Once the menu bar has been fully collapsed, the pay user interface is again fully visible on the display.

FIG. 24AK illustrates electronic device 2400 displaying, on display 2402, a webpage 2458 of a browsing application. For example, webpage 2458 is a checkout page of an item 2460 that the user wishes to purchase and includes a purchase affordance 2462 for proceeding with purchasing the item. In some examples, as shown in FIG. 24AK, the electronic device detects user activation 2417 of purchase affordance 2462.

In some examples, upon detecting user activation of purchase affordance 2462, electronic device 2400 displays, on display 2402, a pay sheet interface 2464, as shown in FIG. 24AL. In some examples, pay sheet interface 2464 (partially) overlays the browsing application and includes biometric authentication interface 2420. In some examples, as also shown in FIG. 24AL, in addition to the pay sheet interface, the device further displays a prompt 2466 (e.g., corresponding to prompt 2416) indicating (to the user) to provide one or more activations (e.g., a double press of button 2404) to proceed with providing authorization for the purchase.

In some examples, pay sheet interface 2464 includes one or more details (e.g., payment account, shipping method, billing address, shipping address, contact information) related to the proposed transaction, as shown in FIG. 24AL. In some examples, the one or more details include a selected payment account. In some examples, the user can change the selected payment account to a different payment account by selecting (a region within or an icon within) a detail region 2464A corresponding to the selected payment account. In some examples, the one or more details include a selected shipping method. In some examples, the user can change the selected shipping method to a different shipping method by selecting (a region within or an icon within) a detail region 2464B corresponding to the selected shipping method. In some examples, the one or more details include a selected address (e.g., billing address, shipping address). In some examples, the user can change the selected address to a different address by selecting (a region within or an icon within) a detail region 2464C corresponding to the selected address. In some examples, the one or more details include a selected contact information (e.g., email, phone number). In some examples, the user can change the selected contact information to a different contact information by selecting (a region within or an icon within) a detail region 2464D corresponding to the selected contact information.

In FIG. 24AM, subsequent to displaying pay sheet interface 2464 and prompt 2466 over webpage 2458 of the browsing application, electronic device 2400 detects an input (e.g., double press of button 2404) corresponding to the request of prompt 2466. In some examples, upon receiving the input (e.g., double press of button 2404) corresponding to the request of prompt 2466, a glyph 2468 (e.g., corresponding to glyph 2422) is provided within biometric authentication interface 2420 displayed within pay sheet interface 2464. Further in response to the input, one or more biometric sensors of electronic device 2400, such as the one or more cameras or a facial recognition sensor (e.g., include among one or more biometric sensors 2403), are activated.

In some examples, once the one or more biometric sensors are activated, electronic device 2400 obtains (e.g., captures) biometric data corresponding to the biometric feature associated with the user. In some examples, the biometric feature captures the biometric data using one or more biometric sensors 2403 (and/or of the one or more cameras) of the electronic device. Optionally, a light-emitting device, such as an IR flood light or a structured light projector is used to assist in illuminating the biometric feature. In other examples, the electronic device receives the biometric data from another device.

In some examples, once electronic device 2400 has obtained the biometric data, the electronic device processes (e.g., analyzes) the biometric data to determine whether the biometric authentication is successful. In some examples, this determination includes determining whether the biometric data matches a biometric template associated with the user. The biometric template is, optionally, stored on electronic device 2400.

In some examples, as illustrated in FIG. 24AO, biometric authentication interface 2420 within pay sheet interface 2464 indicates that the biometric data is being processed by the electronic device, for instance, by displaying one or more rotating rings 2470 (e.g., corresponding to one or more rotating rings 2424) using the biometric authentication interface. In some examples, one or more rotating rings 2470 replaces glyph 2468 within the biometric authentication interface.

If electronic device 2400 determines that biometric authentication is successful (e.g., the biometric data matches a biometric template associated with the user), the electronic device transitions from a first state in which a function (e.g., authorizing transmission of payment credentials for use in a payment transaction) is disabled to a second state in which the function is enabled. As such, if the biometric authentication is successful, the device is in a state where payment credentials (e.g., associated with payment account 2472) are authorized to be transmitted (e.g., to a transaction terminal, to an external server) for use in a payment transaction (e.g., to make a purchase of item 2460. In some examples, the electronic device further indicates that the biometric authentication was successful, for instance, by displaying a glyph 2474 (e.g., corresponding to glyph 2426) indicating (to the user) that the biometric authentication was successful, as shown in FIG. 24AP. In some examples, glyph 2474 replaces one or more rotating rings 2470 within the biometric authentication interface.

In some examples, in response to the determination that the biometric authentication was successful, electronic device 2400 processes the payment transaction (e.g., transmits payment credentials to an external device, such as an external server and receives a response from the external device indicating that the credentials were successfully received). In some examples, as shown in FIG. 24AQ, electronic device 2400 also displays a processing indication 2476 (e.g., with a similar or identical pattern to one or more rings 2470) within pay sheet interface 2464 indicating (to the user) that the payment transaction is being processed. In some examples, once the processing of the transaction is completed, electronic device 2400 replaces processing indication 2476 with a completed indication 2467 (e.g., which includes a checkmark to indicate completion), as shown in FIG. 24AR, thereby indicating (to the user) that the payment transaction has been successfully completed (and that item 2460 has been successfully purchased.

In some examples, to make a payment within an application or on the web (e.g., webpage 2458), the electronic device requires that the user confirm the intent to pay by activating a hardware button (e.g., button 2404) (e.g., double-clicking the Sleep/Wake button), then authenticate using biometric authentication (e.g., facial recognition authentication) to authorize the payment. In some examples, if the payment transaction is not completed within a predetermined time threshold (e.g., 30 seconds) of activating the hardware button (e.g., 2404) (e.g., double-clicking the Sleep/Wake button), the device requires that the user reconfirm intent to pay by activating the hardware button (e.g., button 2404) (e.g., double-clicking the Sleep/Wake button) again.

FIG. 24AS illustrates electronic device 2480 (e.g., a laptop computer) displaying, on display 2482, a webpage 2484 (e.g., similar to webpage 2458) of a browsing application. For example, webpage 2484 is a checkout page of an item 2486 that the user wishes to purchase. In some examples, webpage 2484 of the browsing application includes a purchase affordance 2488 for providing authorization to proceed with purchasing the item using a device different from electronic device 2480 (e.g., using electronic device 2400).

In some examples, user activation of purchase affordance 2488 on electronic device 2480 causes electronic device 2400 to display a remote pay user interface 2490, as shown in FIG. 24AT. In some examples, remote pay user interface 2490 includes a (graphical) indication 2492 of the device (e.g., electronic device 2480) that is requesting the remote authentication for proceeding with a payment transaction, an indication 2494 of the payment account currently selected for user in the payment transaction, and a prompt 2496 (e.g., corresponding to prompt 2416) requesting that the user provide one or more activations of button 2404 (e.g., a double press) to proceed with providing authentication (e.g., biometric authentication) for the payment transaction. In some examples, as also shown in FIG. 24AT, prompt 2496 is emphasized relative to one or more other displayed objects (e.g., relative to indication 2492 of electronic device 2480). Emphasizing the prompt in this manner includes, for instance, darkening, blurring, and/or otherwise obfuscating one or more portions of remote pay user interface 2490.

In some examples, indication 2494 of the payment account currently selected for use in the payment transaction includes an affordance 2494A. In some examples, as shown in FIG. 24AU, electronic device 2400 detects user activation 2421 (e.g., a tap gesture) of affordance 2494A. In some examples, in response to detecting the user selection of affordance 2494A, electronic device 2400 displays, within remote pay user interface 2490, representations of one or more payment accounts (e.g., payment account 2494, payment account 2498) provisioned on the device (and thus available for use in a payment transaction), as shown in FIG. 24AV. In some examples, as also shown in FIG. 24AV, the representation of the currently-selected payment account also includes an indication 2494B (e.g., a checkmark) indicating (to the user) that it corresponds to the currently selected account.

In FIG. 24AW, while displaying within remote pay user interface 2490 the representations of payment accounts (e.g., payment account 2494, payment account 2498) provisioned on the electronic device, electronic device 2400 detects user selection 2423 of a payment account (e.g., payment account 2498) that is different from the currently-selected payment account (e.g., payment account 2494). In response to detecting user selection 2423 of payment account 2498, electronic device 2400 removes the representations of available payment accounts from remote pay user interface 2490 and displays payment account 2498 (instead of payment account 2494) as the payment account currently selected for use in a payment transaction, as shown in FIG. 24AX.

As also shown in FIG. 24AX, after replacing payment account 2494 with payment account 2498, electronic device 2400 detects one or more activations 2425 (e.g., a double press) of button 2404 that corresponds to the request of prompt 2496. In FIG. 24AY, in response to detecting one or more activations 2425 of button 2404, electronic device 2400 displays, within remote pay user interface 2490, biometric authentication interface 2420. In some examples, the electronic device further displays a glyph 2499 (e.g., corresponding to glyph 2422) within biometric authentication interface 2420 displayed within remote pay user interface 2490. Further in response to the input, one or more biometric sensors of electronic device 2400, such as the one or more cameras or a facial recognition sensor (e.g., include among one or more biometric sensors 2403), are activated.

In some examples, once the one or more biometric sensors are activated, electronic device 2400 obtains (e.g., captures) biometric data corresponding to the biometric feature associated with the user. In some examples, the biometric feature captures the biometric data using one or more biometric sensors 2403 (and/or of the one or more cameras) of the electronic device. Optionally, a light-emitting device, such as an IR flood light or a structured light projector is used to assist in illuminating the biometric feature. In other examples, the electronic device receives the biometric data from another device.

In some examples, once electronic device 2400 has obtained the biometric data, the electronic device processes (e.g., analyzes) the biometric data to determine whether the biometric authentication is successful. In some examples, this determination includes determining whether the biometric data matches a biometric template associated with the user. The biometric template is, optionally, stored on electronic device 2400.

In some examples, as illustrated in FIG. 24AZ, biometric authentication interface 2420 within remote pay user interface 2490 indicates that the biometric data is being processed by the electronic device, for instance, by displaying one or more rotating rings 2497 (e.g., corresponding to one or more rotating rings 2424) using the biometric authentication interface. In some examples, one or more rotating rings 2497 replaces glyph 2499 within the biometric authentication interface.

If electronic device 2400 determines that biometric authentication is successful (e.g., the biometric data matches a biometric template associated with the user), the electronic device transitions from a first state in which a function (e.g., authorizing transmission of payment credentials for use in a payment transaction) is disabled to a second state in which the function is enabled. As such, if the biometric authentication is successful, the device is in a state where payment credentials (e.g., associated with payment account 2498) are authorized to be transmitted (e.g., to a transaction terminal, to an external server) for use in a payment transaction (e.g., to make a purchase of item 2486. In some examples, the electronic device further indicates that the biometric authentication was successful, for instance, by displaying a glyph 2495 (e.g., corresponding to glyph 2426) indicating (to the user) that the biometric authentication was successful, as shown in FIG. 24BA. In some examples, glyph 2495 replaces one or more rotating rings 2497 within biometric authentication interface 2420 of remote pay user interface 2490.

In some examples, in response to the determination that the biometric authentication was successful, electronic device 2400 processes the payment transaction (e.g., transmits payment credentials to an external device, such as an external server and receives a response from the external device indicating that the credentials were successfully received). In some examples, as shown in FIG. 24BB, electronic device 2400 also displays a processing indication 2493 (e.g., with a similar or identical pattern to one or more rings 2497) within remote pay user interface 2490 indicating (to the user) that the payment transaction is being processed. In some examples, once the processing of the transaction is completed, electronic device 2400 replaces processing indication 2493 with a completed indication 2491 (e.g., which includes a checkmark to indicate completion), as shown in FIG. 24BC, thereby indicating (to the user) that the payment transaction has been successfully completed (and that item 2486 has been successfully purchased.

FIGS. 25A-25C are a flow diagram illustrating a method for performing biometric authentication using an electronic device in accordance with some examples. Method 2500 is performed at a device (e.g., 100, 300, 500, 1900) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as an infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric feature by the one or more biometric sensors. Some operations in method 2000 are, optionally, combined, the orders of some operations are, optionally, changed, and some operations are, optionally, omitted.

As described below, method 2500 provides an intuitive way for managing biometric authentication. The method reduces the cognitive burden on a user for managing biometric authentication, thereby creating a more efficient human-machine interface. For battery-operated computing devices, enabling a user to manage biometric authentication faster and more efficiently conserves power and increases the time between battery charges.

In some examples, the electronic device (e.g., 2300, 2400) receives (2502), from a second device, a request to proceed with an action, where the request includes information associated with one or more options selected at the second device. In some examples, the electronic device receives a request to proceed with a transaction and further receives information from the second device regarding details of the transaction. In some examples, the action involves a transaction. In some examples, before receiving a user input corresponding to a request to participate in the transaction, the electronic device receives, from the second device, input corresponding to a transaction, where the input includes one or more details of the transaction, and displays one or more transaction details associated with the transaction along with a request for authorization to proceed with the transaction.

The electronic device (e.g., 2300, 2400), while the electronic device is in a first state in which a respective function of the device is disabled, detects (2508) one or more activations of the button (e.g., 2304, 2404) (e.g., double press of a button such as a hardware button or mechanical button, double press of button 2304 or button 2404). In some examples, the respective function is associated with a financial transaction, such as a payment for a good or service. In some examples, in instances in which the function is disabled, the device cannot participate in the transaction.

In some examples, the respective function of the electronic device (e.g., 2300, 2400) is participation in a transaction (2510). In some examples, participation in the transaction includes transmission of secured data from the electronic device. In some examples, the secured data is financial data. In some examples, the transaction additionally or alternatively includes the transmission of unsecured data. In some examples, information enabling the device to participate in the transaction is securely stored in a secure element (e.g., a physically and/or logically segregated memory that stores credentials in such a way that they are prevented from being maliciously accessed). In some examples, the electronic device is not enabled to participate in the transaction (e.g., a financial transaction, such as a payment for a good or service) when in the first state. In some examples, when the device is in the first state, the information enabling the device to participate in the transaction is not accessible at the device outside of the secure element (e.g., payment credentials are not available for use in a wireless payment transaction).

In some examples, the respective function of the electronic device (e.g., 2300, 2400) is a function to provide information associated with an action via a short range communication radio of the electronic device (2512). In some examples, the electronic device is in the first state while in an inactive state in which the display (e.g., 2302, 2402), biometric sensor(s) (e.g., 2303, 2403), and/or one or more other components of the device is inactive. In some examples, because the respective function of the device is a function to provide information (e.g., payment information) associated with an action (e.g., a transaction) via a short range communication radio (e.g., NFC transmitter) of the device, the electronic device is not configured to participate in transactions when in the first state. For example, the device does not respond to requests for payment information with the payment information until authorization to provide the payment information is provided by the user, such as a double click of a hardware button (e.g., 2304, 2404) received in conjunction with biometric or passcode/password authentication.

In some examples, the one or more activations of the button (e.g., 2304, 2404) occur at least partly while a display of the electronic device (e.g., 2300, 2400) is off or displaying a user interface that is not related to payment (2514) (e.g., a lock screen user interface, a cover sheet user interface that includes a plurality of recent notifications, a home screen user interface that includes application icons for a plurality of different applications and optionally one or more widgets, or an application user interface for an application that is not a payment application such as an email application, a phone application, a messages application, or a camera application).

In some examples, while the display of the electronic device (e.g., 2300, 2400) is off or displaying a user interface that is not related to payment, the electronic device is not configured to transmit payment information to a payment terminal (e.g., 2430), in response to a request for payment information (e.g., to protect the payment information from being inadvertently provided in situations where the user does not intend to provide the payment information). In some examples, in at least some circumstances when the display of the device is off or displaying a user interface that is not related to payment, the electronic device listens for requests for payment information and responds to at least some requests for payment information by displaying a payment user interface (e.g., a virtual wallet) that informs the user that payment information has been requested and prompts the user to provide authorization to provide the payment information.

In some examples, the one or more activations of the (hardware) button include a double press of the button (2516) (e.g., a first and second press of the button within a predetermined period of time). In some examples, the hardware button (e.g., 2304, 2404) is located on a side of the electronic device (e.g., 2300, 2400). In some examples, the hardware button is a mechanical button. In some examples, the activation of the button without a second activation of the button within the predetermined time period performs a different function (e.g., turning on or off a display of the device). In some examples, a different activation of the button (e.g., a long press of the button for a different time period) causes a different function (e.g., entering a user interface for powering off the device or invoking a virtual assistant) to occur.

In some examples, the one or more activations of the (hardware) button (e.g., 2304, 2404) are detected while a first application is active on the electronic device (2518). In some examples, detecting the one or more activations of the button occurs while displaying the tutorial interface (e.g., 2410) (2520). In some examples, the electronic device (e.g., 2300, 2400) does not display the tutorial interface, but rather displays the biometric authentication interface (e.g., 2322, 2420) and performs biometric authentication. Performing biometric authentication (e.g., as opposed to a different type of authentication, such as password authentication) allows the user to more quickly and easily (e.g., with no inputs and within a shorter period of time) provide authentication for performing a particular operation (e.g., a transaction) using the device. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the button (e.g., 2304, 2404) has a fixed location relative to a display of the electronic device (e.g., 2300, 2400) (e.g., the button is not purely a software button). In some examples, the button is a hardware button, such as a mechanical button or a solid state button. In some examples, the button is a switch or any other type of toggle. In some examples, the button has a fixed position relative to the electronic device, and in particular, relative to the display of the electronic device such that the electronic device can display prompts based on a position of the button.

In some examples, the button (e.g., 2304, 2404) is a mechanical button (e.g., a hardware button, such as a push button). In some examples, the button is not a software button, such as a button on a touchscreen of the electronic device (e.g., 2300, 2400). In some examples, the button is a solid-state button. In some examples, the button is a solid-state button that operates according to capacitive and/or resistive touch, and/or is responsive to changes in the intensity of input without having a mechanical switch that is depressed to activate the button and instead monitors whether an intensity of the input is above an intensity threshold that corresponds to activation of the solid-state button.

In some examples, prior to detecting (2508) the one or more activations of the button (e.g., 2304, 2404), the electronic device (e.g., 2300, 2400) outputs (2504) (e.g., by displaying on the display) a prompt (e.g., 2318, 2416) requesting that one or more activations of the button be provided. In some examples, the electronic device prompts the user by displaying "Double Click for Pay". In some examples, the prompt is displayed on the display (e.g., 2302, 2404) of the electronic device. In some examples, the prompt is displayed adjacent to the button. In some examples, the prompt is an auditory and/or tactile prompt. In some examples, the prompt is displayed when the device is displaying a transaction user interface but without receiving any indication that a transaction terminal is nearby and is requesting transaction credentials (e.g., the prompt to provide the one or more activations of the button are displayed before the device as been placed in an NFC field of an NFC reader that is requesting payment information). In some examples, prior to outputting the prompt, the electronic device displays a tutorial interface including an affordance.

In some examples, outputting the prompt (e.g., 2318, 2416) occurs in response to selection of the affordance. In some examples, the tutorial interface (e.g., 2410) is displayed the first time a user attempts to implement the respective function without providing the one more activations of the button). In some examples, the tutorial interface includes an animation at a location that is based on a location of the button (e.g., 2304, 2404) on the device (e.g., the animation includes movement of a user interface object in a direction in which the button can be pushed at a location adjacent to or proximate to the button on the device).

In some examples, outputting the prompt (e.g., 2318, 2416) to a user to provide the one or more activations of the button includes emphasizing the prompt relative to one or more elements displayed on the display of the electronic device (e.g., 2300, 2400) (2506). In some examples, emphasizing the prompt includes blurring, dimming, and/or ceasing to display at least a portion of the display of the electronic device. In some examples, emphasizing the prompt includes brightening the prompt, flashing the prompt, or otherwise drawing attention to the prompt. In some examples, emphasizing the prompt relative to the one or more elements displayed on the display of the electronic device includes blurring the one or more elements. In some examples, all elements displayed on the display (e.g., 2302, 2402) (except for the prompt) are blurred. In some examples, only elements adjacent to the prompt are blurred. In some examples, emphasizing the prompt relative to the one or more elements displayed on the display of the electronic device includes dimming display of the one or more elements. In some examples, all elements displayed on the display (except for the prompt) are dimmed. In some examples, only elements adjacent to the prompt are dimmed. Dimming in this manner optionally includes decreasing brightness and/or darkening displayed colors.

In some examples, outputting the prompt (e.g., 2318, 2416) occurs in response to detecting an external signal of a predetermined type. In some examples, the electronic device (e.g., 2300, 2400) detects a signal, such as an NFC field from an NFC reader such as a payment terminal (e.g., 2430), and prompts the user to provide input to initiate a biometric authentication process to authorize the device to make payment credentials available for transmission to the NFC reader.

In some examples, outputting the prompt (e.g., 2318, 2416) includes displaying an educational interface including a prompting element adjacent to the button. In some examples, the electronic device (e.g., 2300, 2400) prompts the user to provide the one or more activations of the button (e.g., 2304, 2404) by way of an interface in which the prompt is displayed near the location of the button and/or indicates a location of the button. In some examples, the educational interface is displayed in instances in which the user has attempted to implement the respective function of the electronic device, but has not provided the one or more activations required to initiate biometric authentication such that the electronic device is enabled to implement the respective function.

In some examples, the electronic device (e.g., 2300, 2400) displays, on the display, the prompt to provide the one or more activations of the button (e.g., 2304, 2404) at a first position in the biometric authentication interface (e.g., 2322, 2420). Outputting a prompt requesting that one or more activations of the button be provided provides the user with feedback about the current state of the device and provides visual feedback to the user indicating what steps the user must take in order to proceed with a particular function using the device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 2300, 2400) detects activation (e.g., selection) of an affordance of a first application (e.g., activation of an affordance of an application requesting a transaction for a good or service). In some examples, the first application is a communication application. In some examples, the device displays details of a transaction and one or more of the affordance for initiating the transaction and prompt for triggering biometric authentication. In some examples, the details of the transaction optionally are modified prior to activation of the affordance or prior to detection of a biometric feature after biometric authentication has been triggered by way of user input (e.g., a double press).

In some examples, in response to detecting (2522) the activation of the affordance of the first application, the electronic device (e.g., 2300, 2400) provides (e.g., transfers) information associated with an action from the first application to a second application. In some examples, the action from the first application to the second application involves a transaction. In some examples, before receiving a user input corresponding to a request to participate in the transaction, the electronic device detects activation of an affordance of a first application, in response to detecting the activation of the affordance of the first application, provides information about a transaction from the first application to a second application, and proceeds with the transaction using the second application.

In some examples, the electronic device also concurrently displays, on the display (e.g., 2302, 2402), at least a portion of the information associated with the action at a first location (e.g., in a payment user interface region that is separate from the first application and includes transaction information that is not shared with the first application such as a credit card number, billing address) and a second prompt to provide the one or more activations of the button at a second location, where the second location is closer to the button than the first location.

In some examples, prior to receiving the activation of the button (e.g., 2304, 2404), details of a transaction are confined to a particular portion of the display such that the prompt to provide the activation of the button can be displayed proximate to the button. Confining the details of the transaction to a particular portion of the display such that the prompt can be displayed proximate to the relevant button provides the user with visual feedback allowing the user to more quickly and easily follow the request of the prompt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the details are restricted to a particular height of the display. In some examples, if there is more information than can be displayed in the available region below the second prompt, the information associated with the action is displayed in a scrollable region that scrolls in response to user inputs to display additional information that was hidden (e.g., off of the screen) before the scrollable region scrolled. In some examples, providing information about the transaction from the first application to the second application includes providing information that can be displayed in the available region and the additional information that was hidden.

In some examples, after displaying the prompt (e.g., 2318, 2416), the electronic device (e.g., 2300, 2400) moves the representation of the user credential from a second position on the display (e.g., 2302, 2402) to the first position on the display. In some examples, the representation of the user credential is moved such that the user credential covers the prompt to press (e.g., a double click) the button (e.g., 2304, 2404) and/or reveals a biometric authentication glyph (e.g., 2324, 2422). In some examples, moving the representation of the user credential from a second position to the first position includes displaying the biometric authentication glyph at a portion of the display that was occupied by the user credential when the user credential was displayed at the second position.

In response to detecting (2522) the one or more activations of the button, the electronic device (e.g., 2300, 2400) captures (2524) with the one or more biometric sensors (e.g., 2303, 2403) that are separate from the button (e.g., 2304, 2404), biometric data. In some examples, in response to a double press of the hardware button, the device receives biometric data, such as data for a face of the user. In some examples, the one or more biometric sensors include a facial recognition sensor and the biometric data corresponds to at least a portion of a face.

In some examples, capturing biometric data includes capturing the biometric data using the camera. In some examples, the biometric data is captured using a camera and/or a facial recognition sensor (e.g., 2303, 2403). In some examples, the camera is used to ensure that a user is looking at the device and the facial recognition sensor is used to authenticate a face of the user.

In some examples, capturing, with the one or more biometric sensors, biometric data includes activating the one or more biometric sensors (e.g., 2303, 2403) for a second predetermined period of time. For example, in response to the press of the button (e.g., 2304, 2404), the electronic device (e.g., 2300, 2400) activates one or more biometric sensors (e.g., 2303, 2403) (e.g., transitions the biometric sensors from an inactive state to an active state), such as a facial recognition sensor or a camera, and uses the activated one or more biometric sensors to capture the biometric data. In some examples, the activated one or more biometric sensors are activated for a period of time, and if biometric data is not captured during the period of time, the biometric authentication process fails. In some examples, the second predetermined period of time begins when the one or more activations of the button is detected. In some examples, the period of time is initiated when the button is pressed. In some examples, capturing biometric data in this manner includes illuminating the biometric feature and capturing data corresponding to the illumination. In some examples, the biometric feature is illuminated using an IR flood light or a structured light projector.

In some examples, in response to detecting (2522) the one or more activations of the button, the electronic device (e.g., 2300, 2400) also displays (2526) a biometric authentication interface (e.g., 2322, 2420) including a representation of a user credential that is restricted from being used without proper biometric authentication. In some examples, the biometric authentication interface includes an authentication glyph (e.g., 2324, 2422) and/or one or more representations of user credentials (e.g., an image representing data that will be used by function of the electronic device, such as an image of a credit card, image of a bank account, image of business card). Providing an authentication glyph provides the user with easily visible and recognizable visual feedback about the current state or progress of the authentication process. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, the function uses the represented data to perform a transaction. In some examples, the biometric authentication is performed for a particular credential and the credential is highlighted relative to the other credentials. In some examples, the biometric authentication interface (e.g., 2322, 2420) includes an animation (e.g., card carousel).

In accordance with a determination that the biometric data satisfies biometric authentication criteria (e.g., the biometric criteria matches a biometric template stored on the device), the electronic device (e.g., 2300, 2400) transitions (2528) to a second state in which the respective function of the device is enabled. In some examples, in instances in which the device is enabled, the device can participate in the transaction. In some examples, the electronic device determines whether the biometric data satisfies the biometric authentication criteria. Limiting the device's ability to participate in the transaction to instances in which the device is enabled (to participate in the transaction) provides the user with more control of the device by helping the user to avoid unintentionally executing the transaction and simultaneously providing for enhanced device security. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 2300, 2400) is enabled to participate in the transaction when in the second state. In some examples, when the device is in the second state the information enabling the device to participate in the transaction is temporarily made accessible at the device outside of the secure element by the secure element (e.g., payment credentials are available for use in a wireless payment transaction).

In some examples, after transitioning to the second state, the electronic device (e.g., 2300, 2400) maintains (2530) the device in the second state for a first predetermined period of time (e.g., 60 seconds). In some examples, the function of the electronic device is enabled even on a change in user credentials (e.g., as a result of a card switch). In some examples, the first predetermined period of time begins when the one or more activations of the button is detected (e.g., when the button is pressed). In some examples, after transitioning to the second state, the electronic device, after the first predetermined period of time has elapsed, transitions (2532) from the second state to the first state. In some examples, after transitioning to the second state, the electronic device performs (2534), using the respective function of the electronic device, the action based on the information (e.g., transmitting credentials to a remote server for processing a transaction). In some examples, the electronic device proceeds with the transaction, using credentials provided in the request. In some examples, the credentials are provided to a remote server for processing the transaction. In some examples, the electronic device causes display, at the other device, of an indication indicating whether the authentication was successful. In some examples, the electronic device causes display, at the another device (e.g., the other device or the second device), of an indication indicating whether the transaction was successful. In some examples, the prompt is outputted while details of the transaction are displayed.

In some examples, while the device is in the second state, the electronic device (e.g., 2300, 2400) detects (2536) a user input corresponding to a request to exit the first application. In some examples, in response to detecting the user input corresponding to a request to exit the first application, the electronic device exits (2538) the first application and transitions to the first state. In some examples, when the device is enabled to participate in the transaction, exiting the application in which the input that was received that caused the device to be enabled to participate in the transaction causes the device to cease to be enabled to participate in the transaction. In some examples, when the device has been authorized to provide payment credentials for a payment transaction in a wallet application and the device switches from the wallet application to a different application the device disables the ability to provide the payment credentials until providing payment credentials is reauthorized by the user (e.g., with biometric authentication). Thus, unintended transmission of payment information by disabling transmission of payment information when the device is not displaying a user interface that indicates that the device is configures to provide payment credentials is avoided.

In accordance with a determination that the biometric data does not satisfy the biometric authentication criteria (e.g., the biometric data does not match a biometric template stored on the device), the electronic device (e.g., 2300, 2400) maintains (2540) the first state and displays (2540), on the display, an indication that biometric authentication has failed. Maintaining the first state (e.g., a state in which the device is not authorized to proceed with a transaction) when the authentication has failed provides the user with enhanced control and security of the device. Providing additional control and enhanced security of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 2300, 2400) also displays (2542) an alternative authentication affordance (e.g., 2334, 2440). In some examples, the alternative authentication affordance is an affordance, which when selected, causes the electronic device to display an interface (e.g., 2336, 2442) in which a user can provide an alternative form of authentication (e.g., a non-biometric form of authentication), such as a password, passcode, or pattern input. In some examples, successful authentication, via alternative authentication, causes the electronic device to transition to the second state. In some examples, a first failure causes display of a "try again" affordance and a second failure causes display of an alternative authentication affordance (e.g., 2336, 2442) such as a "passcode" affordance. In some examples, the electronic device receives a user input, such as a double press of the button. In some examples, if the threshold number of biometric authentication attempts has been reached, the electronic device displays an affordance to enter a passcode (or password) and optionally, an indication that biometric authentication is not available and/or the threshold number has been reached (e.g., "Passcode required to enable FaceID").

In some examples, after determining that the biometric data does not satisfy the biometric authentication criteria (e.g., while displaying the alternative authentication interface or the alternative authentication affordance), the electronic device (e.g., 2300, 2400) detects (2544) selection of the alternative authentication affordance (e.g., 2334, 2440). In some examples, in response to detecting selection of the alternative authentication affordance, the electronic device (e.g., 2300, 2400) displays (2546), on the display, an alternative authentication interface (e.g., 2336, 2442), such as a password or passcode interface, in response to selection of the affordance.

In some examples, the electronic device (e.g., 2300, 2400) also captures (2548), with the one or more biometric sensors (e.g., 2303, 2403), second biometric data. In some examples, in accordance with a determination that the second biometric data satisfies the biometric authentication criteria, the electronic device transitions (2550) to the second state. In some examples, in response to selection of the affordance, the electronic device performs a second iteration of biometric authentication.

In some examples, the biometric authentication is performed during display of, or transition to, the alternative authentication interface (e.g., 2336, 2442). In some examples, the alternative authentication interface includes display of the biometric authentication glyph sequence such that the user is informed that biometric authentication is taking place. In some examples, successful biometric authentication bypasses the need for alternative authentication. As a result, the electronic device (e.g., 2300, 2400) ceases display of the alternative authentication interface (e.g., 2336, 2442) and proceeds as if the user had successfully authenticated on the first try.

In some examples, in accordance with a determination that the second biometric data does not satisfy the biometric authentication criteria, the electronic device (e.g., 2300, 2400) maintains (2552) the first state and displays the alternative authentication interface (e.g., 2336, 2442) on the display (e.g., 2302, 2402). In some examples, on failure, display of the alternative authentication interface is maintained such that the user optionally provides the alternative authentication. Maintaining display of the alternative authentication interface (upon failure) such that the user can provide the alternative authentication provides the user with more control of the device by providing the user with a plurality of different ways to provide authentication (for a particular operation to be performed by the device. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 2300, 2400) detects (2554) a respective user input that corresponds to a request to retry biometric authentication. In some examples, the electronic device detects a user input, such as a button press or movement of the electronic device (e.g., raise and/or lower of the device) or selection of the alternative authentication affordance (e.g., 2334, 2440). In some examples, the user input that corresponds to the request to retry biometric authentication includes one or more activations of the button. In some examples, the user input includes the one or activations of the button used to initiate the first iteration of biometric authentication. In some examples, the user input that corresponds to the request to retry biometric authentication includes movement of the electronic device. In some examples, the user input of the predetermined type is an input that is different from activation of the button. In some examples, the user input of the predetermined type is a raising and/or lowering of the electronic device (e.g., the electronic device is lowered near another electronic device, such as an NFC-compatible device, and raised back to an eye level of the user.

In some examples, in response to detecting the user input that corresponds to the request to retry biometric authentication, the electronic device (e.g., 2300, 2400) captures (2556), with the one or more biometric sensors, third biometric data. In some examples, in response to the user input, the device performs an additional iteration of biometric authentication. In some examples, in accordance with a determination that the third biometric data satisfies the biometric authentication criteria, the electronic device transitions (2558) to the second state in which the respective function of the device is enabled. In some examples, in accordance with a determination that the third biometric data does not satisfy the biometric authentication criteria, the electronic device maintains (2560) the first state (and, optionally, displays, on the display, an indication that biometric authentication has failed).

In some examples, the electronic device (e.g., 2300, 2400) detects another one or more activations of the button (e.g., 2304, 2404). In some examples, in accordance with a determination that biometric capture criteria is met, the electronic device captures, with the one or more biometric sensors (e.g., 2303, 2403) that are separate from the button (e.g., 2304, 2404), second biometric data. In some examples, in accordance with a determination that biometric capture criteria is not met, the electronic device forgoes capturing second biometric data. In some examples, the number of biometric authentication attempts is limited to a predetermined number (e.g., 5). In some examples, this number is reset in response to successful authentication. In some examples, this number is reset after a set amount of time.

Note that details of the processes described above with respect to method 1200 (e.g., FIGS. 25A-25C are also applicable in an analogous manner to the methods described herein. For example, method 2500 optionally includes one or more of the characteristics of the various methods described herein with reference to methods 800, 1000, 1200, 1400, 1600, 1800, 2000, 2200, and 2700. For example, the enrolled biometric data described in method 1200 can be used to perform biometric authentication as described with respect to FIGS. 24F-G For another example, one or more interstitial interfaces as described in methods 2000 and 2700 optionally are displayed in response to receipt of an input prior to completion of a biometric authentication process. For brevity, these details are not repeated herein.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 25A-25C are, optionally, implemented by components depicted in FIGS. 1A-1B. For example, detecting operation 2508, transitioning operation 2528, and maintaining operation 2540, are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 26A-26AS illustrate exemplary user interfaces for biometric authentication, in accordance with some examples. As described in greater detail below, the exemplary example of the user interfaces illustrated in FIGS. 26A-26AS are used to illustrate the processes described below, including the processes in FIGS. 27A-27E.

FIG. 26A illustrates an electronic device 2600 (e.g., portable multifunction device 100, device 300, or device 500). In the exemplary example illustrated in FIGS. 26A-26AS, electronic device 1900 is a smartphone. In other examples, electronic device 1500 can be a different type of electronic device, such as a wearable device (e.g., a smartwatch). Electronic device 1900 has a display 2602, one or more input devices (e.g., touchscreen of display 2602, a button 2604, a mic (not displayed)), and a wireless communication radio. In some examples, the electronic device includes a plurality of cameras. In some examples, the electronic device includes only one camera. In some examples, the electronic device includes one or more biometric sensors (e.g., biometric sensor 2603) which, optionally, include a camera, such as an infrared camera, a thermographic camera, or a combination thereof. In some examples, the one or more biometric sensors 2603 are the one or more biometric sensors 703. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In FIG. 26A, the electronic device, while in an unlocked state, displays an unlocked interface 2606. The unlocked interface 2606 includes a notification affordance 2608 and an unlocked state indicator 2610. In some examples, because the electronic device 2600 is in an unlocked state, the notification affordance 2608 includes an indication of secured content associated with the notification affordance 2608. For example, as shown, the notification affordance is associated with a messaging application and includes at least a portion of a message received by the electronic device.

Figure 26B:
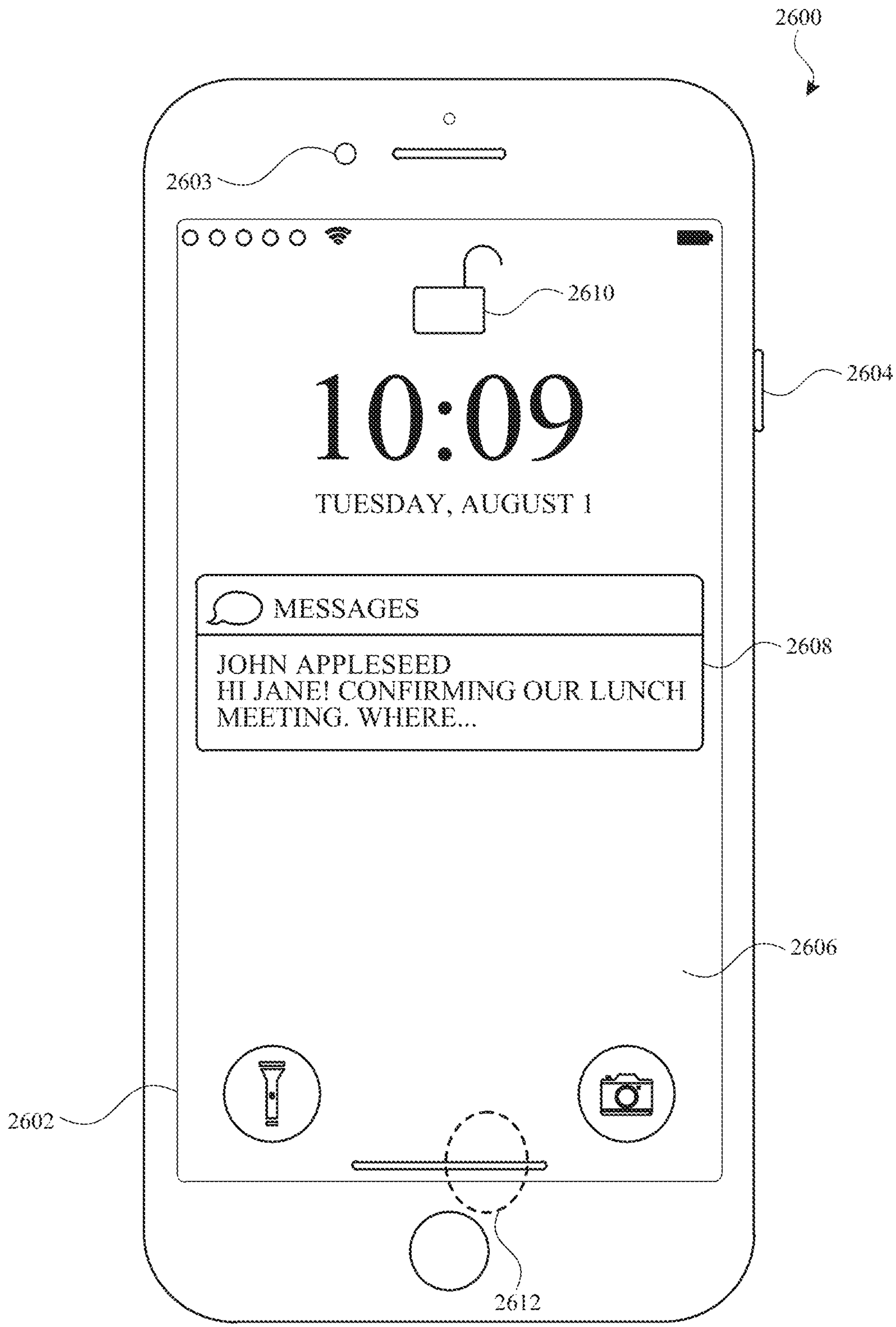
Figure 26C:
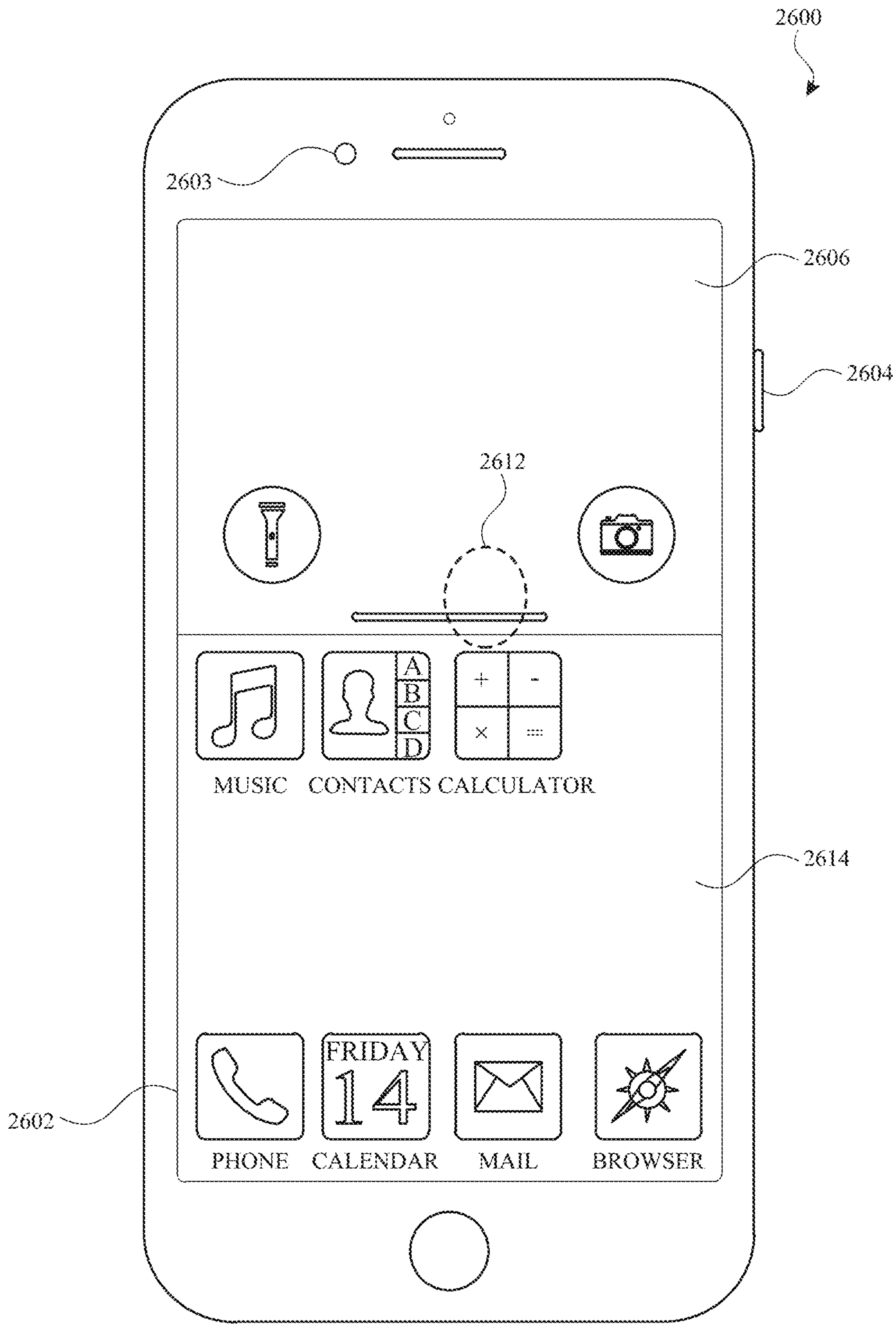
Figure 26D:
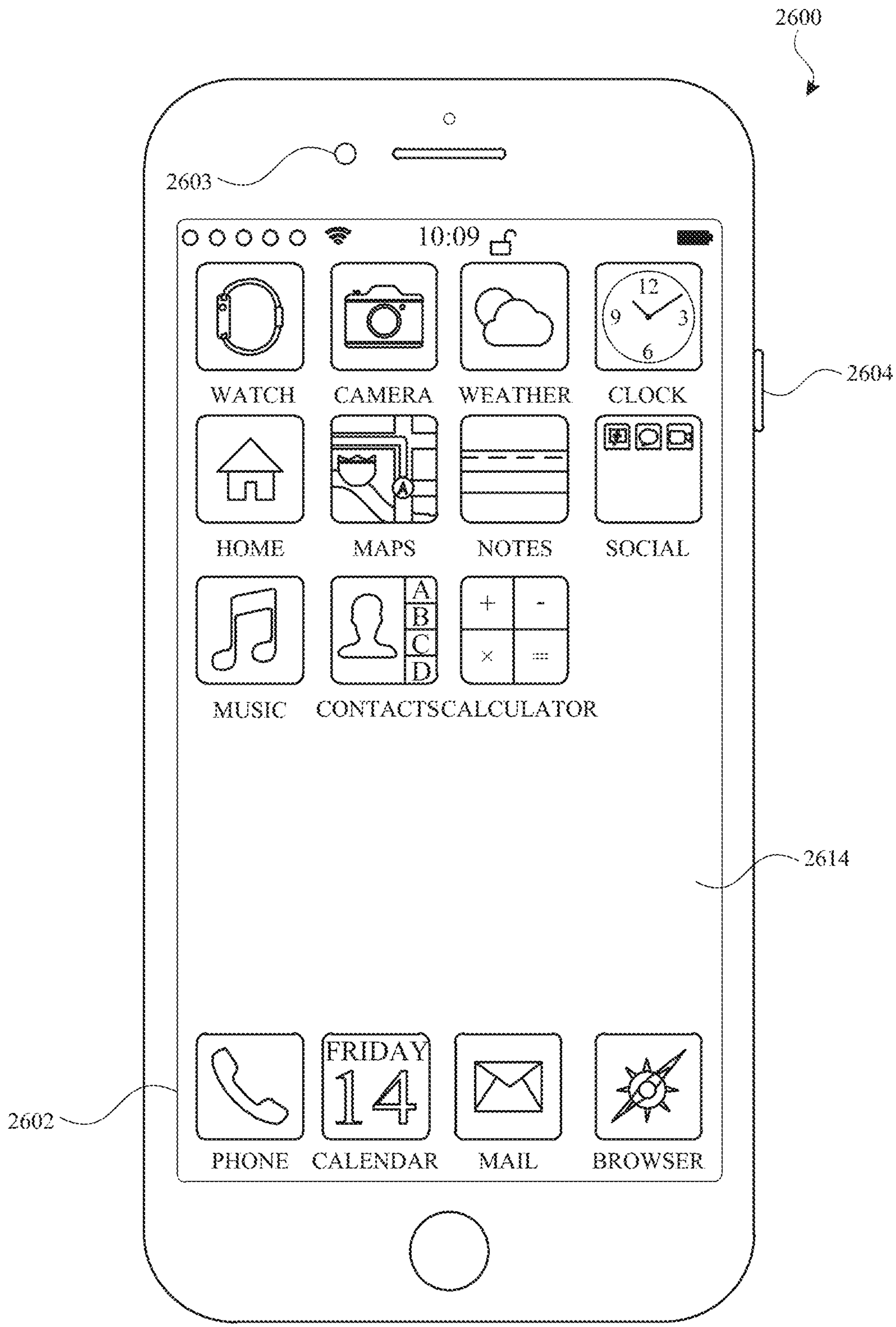

With reference to FIGS. 26B-D, while displaying the unlocked interface 2606, the electronic device 2100 detects a user input 2612 (FIG. 26B), for instance, near an edge of the display 2602. The user input 2612 is a swipe gesture that, in some examples, is a request to access a home screen interface of the electronic device 2600, and in response to the swipe input 2612, the electronic device displays (e.g., replaces display of the unlocked interface 2606 with) the home screen interface 2614 of FIG. 26D. In some examples, displaying the home screen interface 2129 includes sliding the unlocked interface 2606 in an upward direction to display (e.g., reveal) the home screen interface 2614, as analogously described with reference to FIGS. 19P-R.

Figure 26E:
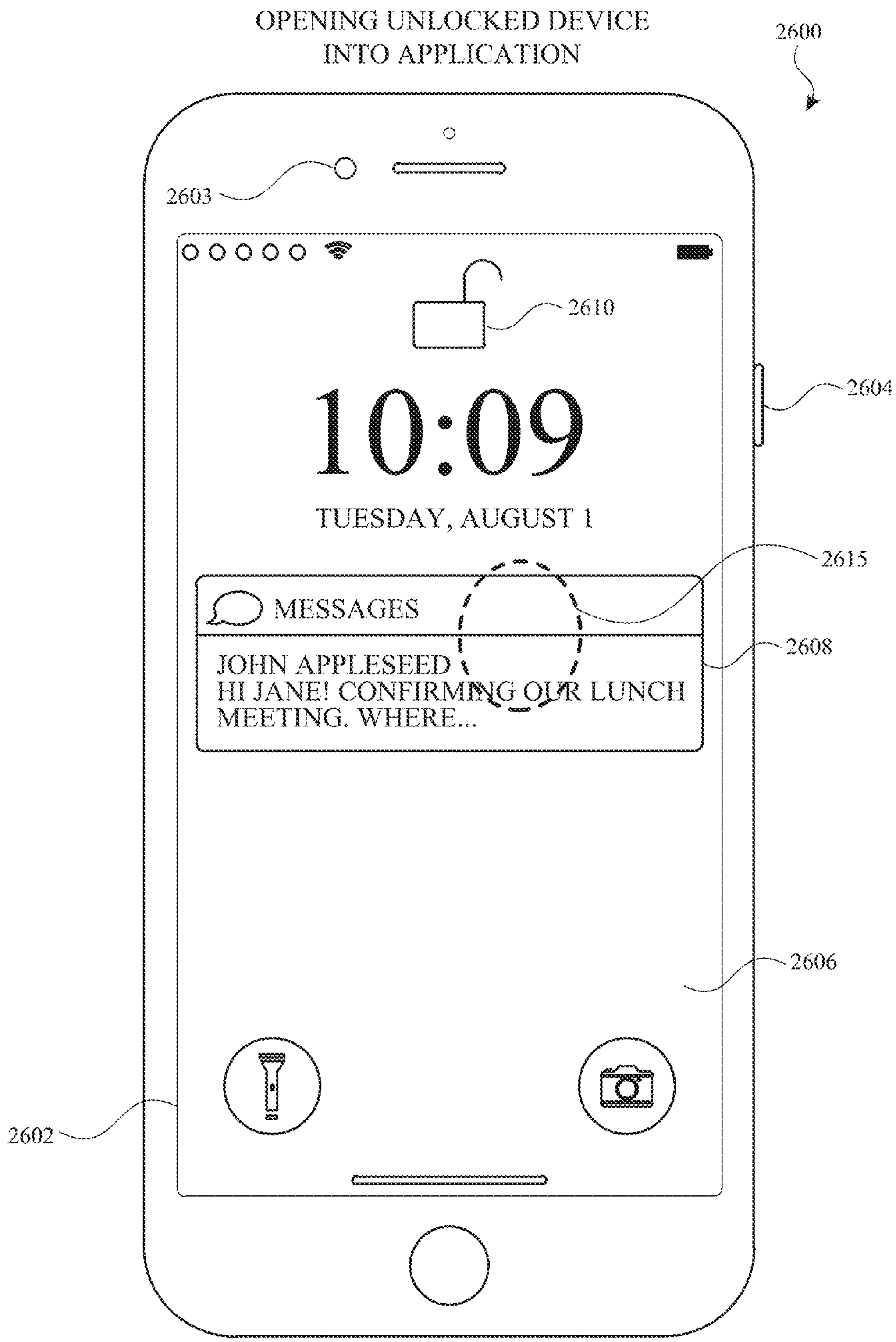
Figure 26F:
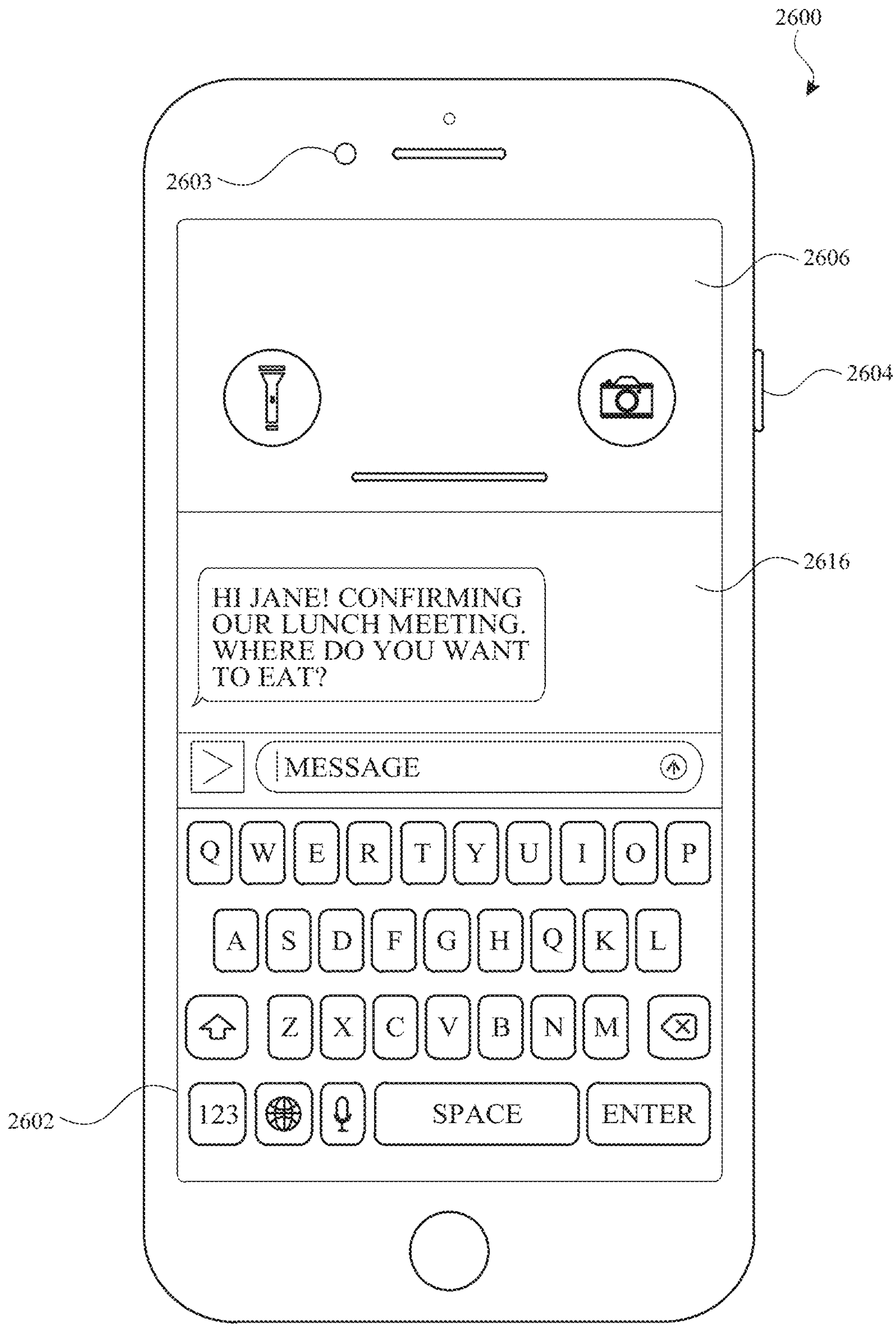

In FIG. 26E, the electronic device, while in an unlocked state, displays an unlocked interface 2606. The unlocked interface 2606 includes a notification affordance 2608 and an unlocked state indicator 2610. In some examples, because the electronic device 2600 is in an unlocked state, the notification affordance 2608 includes an indication of secured content associated with the notification affordance 2608. For example, as shown, the notification affordance is associated with a messaging application and includes at least a portion of a message received by the electronic device.

Figure 26G:
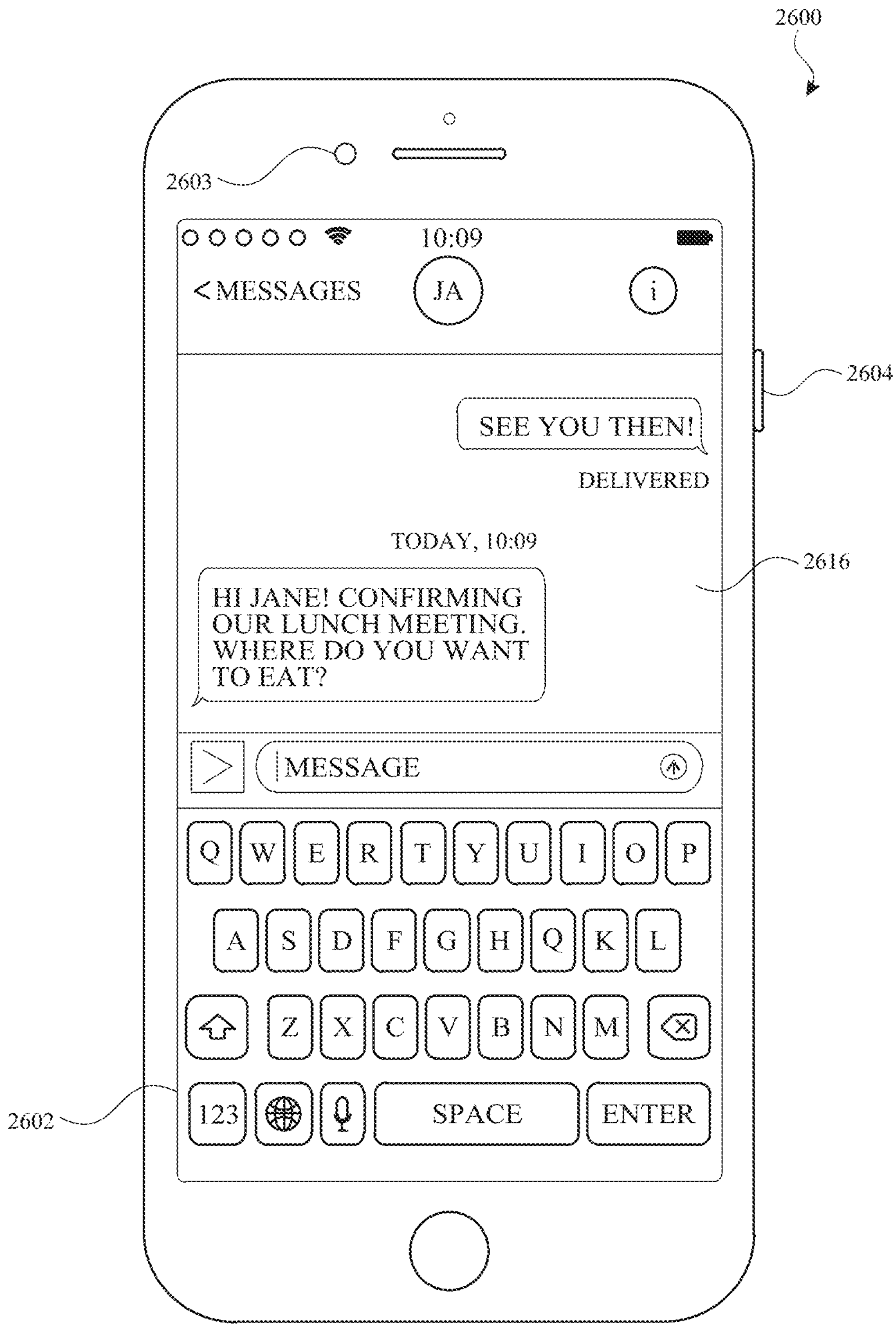

While displaying the unlocked interface 2606, the electronic device detects an activation of the notification affordance 2608. The activation of the notification affordance 2608 is a tap gesture 2615 in some examples. In response to activation of the notification affordance 2608, the electronic device displays (e.g., replaces display of the unlocked interface 2606 with) the messaging application interface 2616 of FIG. 26G. With reference to FIGS. 21F-G, in some examples, displaying the messaging application interface 2616 includes sliding the unlocked interface 2606 in an upward direction to display (e.g., reveal) the messaging application interface 2616, as analogously described with reference to FIGS. 19P-R.

Figure 26H:
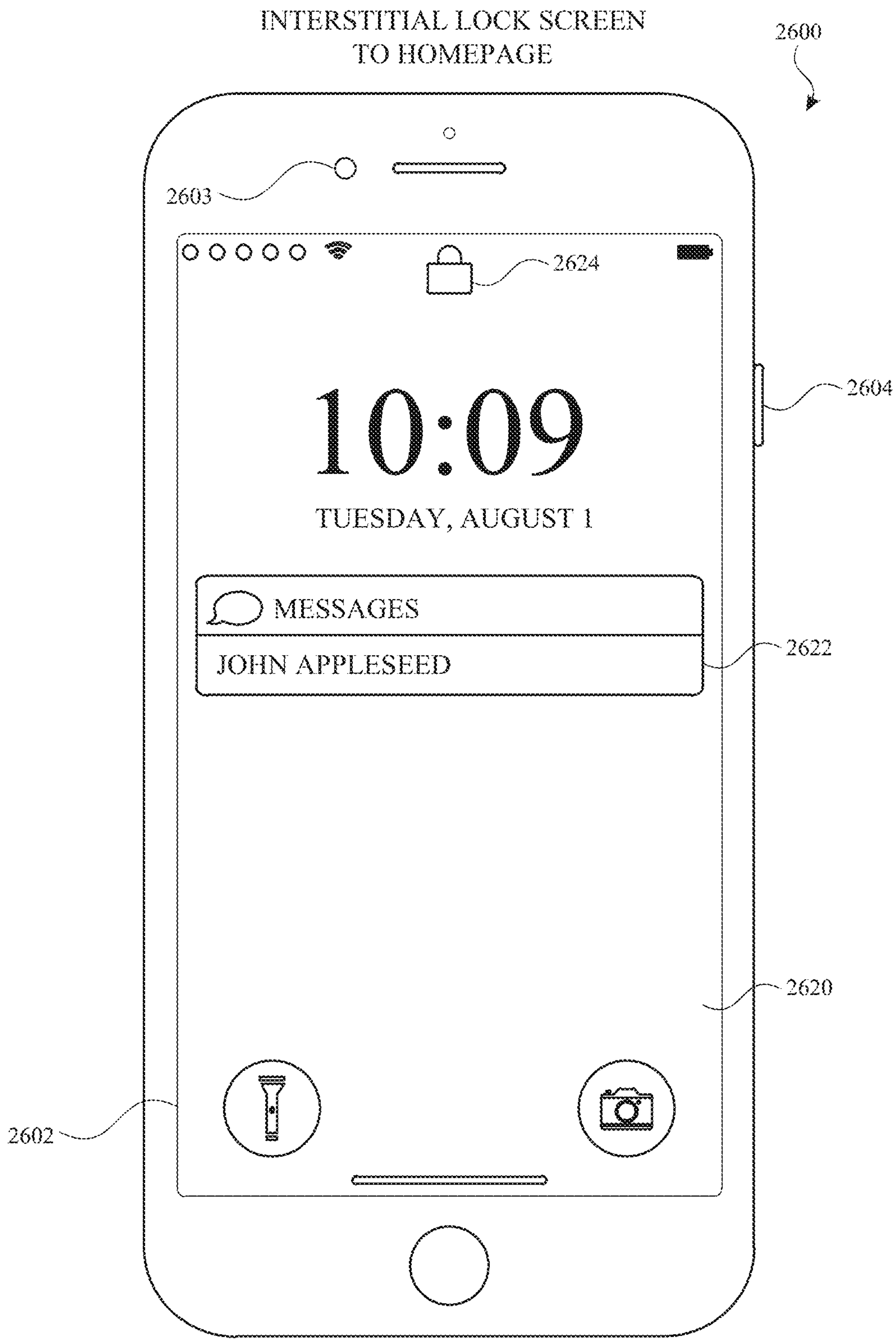

In FIG. 26H, the electronic device, while in a locked state, displays a locked interface 2620. The locked interface 2620 includes a notification affordance 2622 and a locked state indicator 2624. In some examples, because the electronic device 2600 is in a locked state, the notification affordance 2622 does not include an indication of secured content associated with the notification affordance 2622.

Figure 26I:
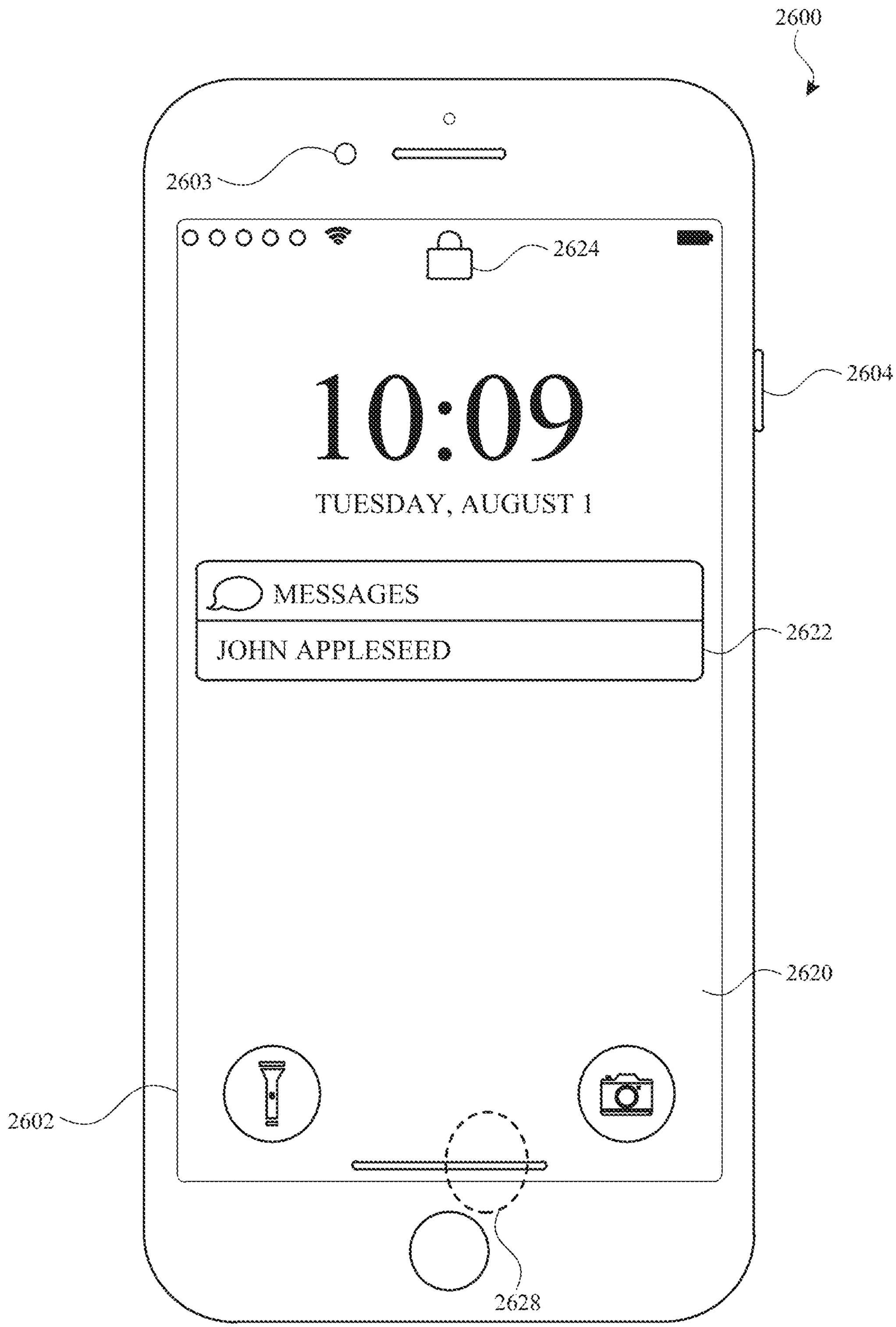
Figure 26J:
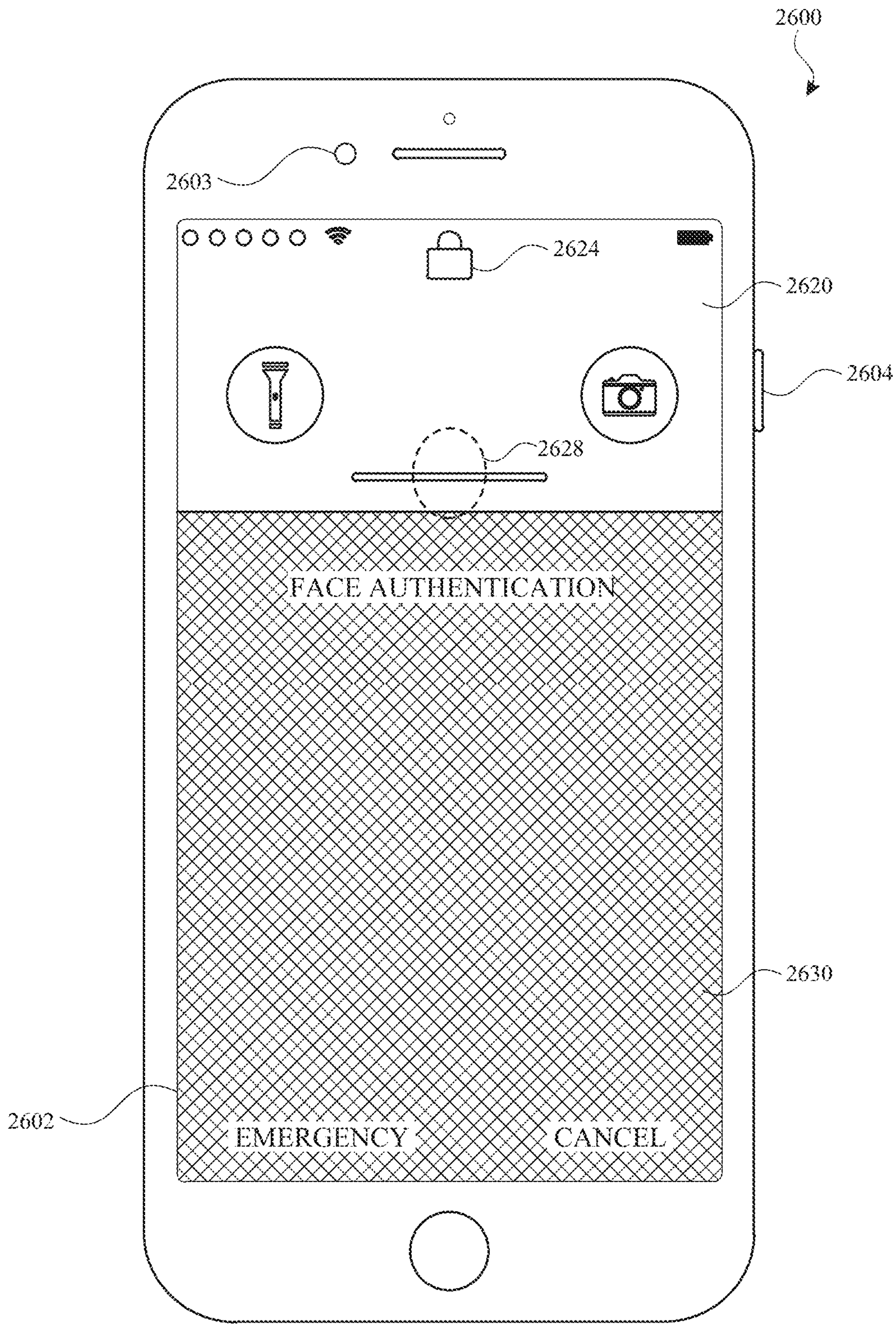
Figure 26K:
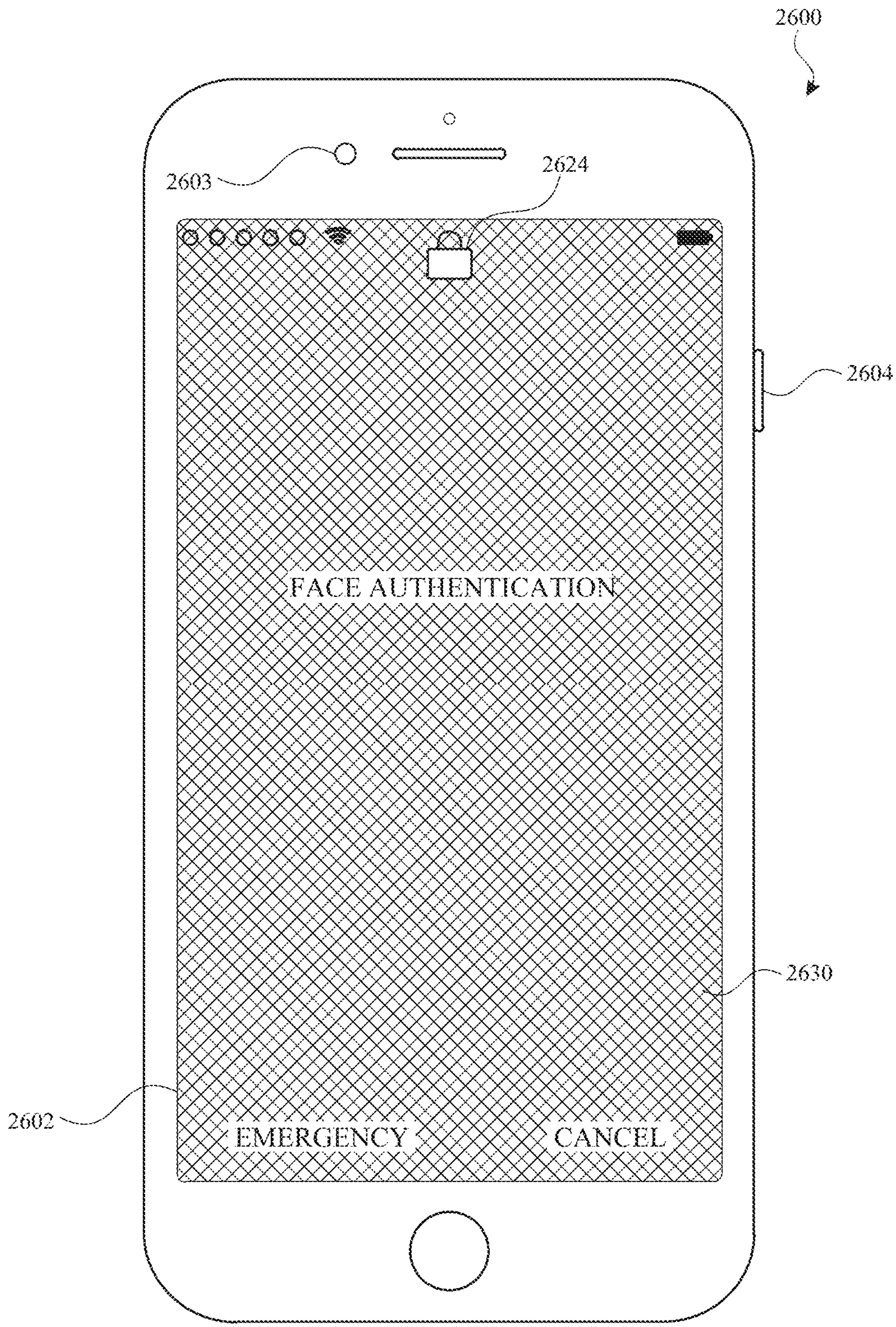

With reference to FIGS. 26I-K, while displaying the locked interface 2620, the electronic device 2600 detects a user input 2628 (FIG. 26I), for instance, near an edge of the display 2602. The user input 2628 is a swipe gesture that, in some examples, is a request to access a home screen interface of the electronic device 2600. In some examples, the electronic device 2600 receives the user input 2628 prior to completing an initial biometric authentication (e.g., biometric authentication performed in response to a wake condition, as described with reference to FIGS. 21A-C). Accordingly, in response to the swipe input 2628, the electronic device displays (e.g., replaces display of the locked interface 2620 with) the interstitial interface 2630 of FIG. 26K to indicate that the electronic device has not yet completed biometric authentication. In some examples, displaying the interstitial interface 2630 includes sliding the locked interface 2620 in an upward direction to display (e.g., reveal) the interstitial interface 2630, as analogously described with reference to FIGS. 19P-R. The interstitial interface 2630 includes a locked state indicator 2624 in some examples.

Alternatively, in some examples, the electronic device determines that a threshold number (e.g., 5) of biometric authentication attempts has been reached. Thereafter, in response to the user input 2628, the electronic device 2600 displays the interstitial interface 2632. The interstitial interface includes a biometric authentication enablement indicator indicating that biometric authentication is disabled (e.g., because the number of attempts has been reached). The interstitial interface 2632 further includes alternative authentication affordances 2636 and 2638. Activation of the alternative authentication affordance 2636 causes the electronic device to display a first alternative authentication interface, such as a fingerprint authentication interface, and activation of the alternative authentication affordance 2638 causes the electronic device to display a second alternative authentication interface, such as a passcode authentication interface.

Figure 26L:
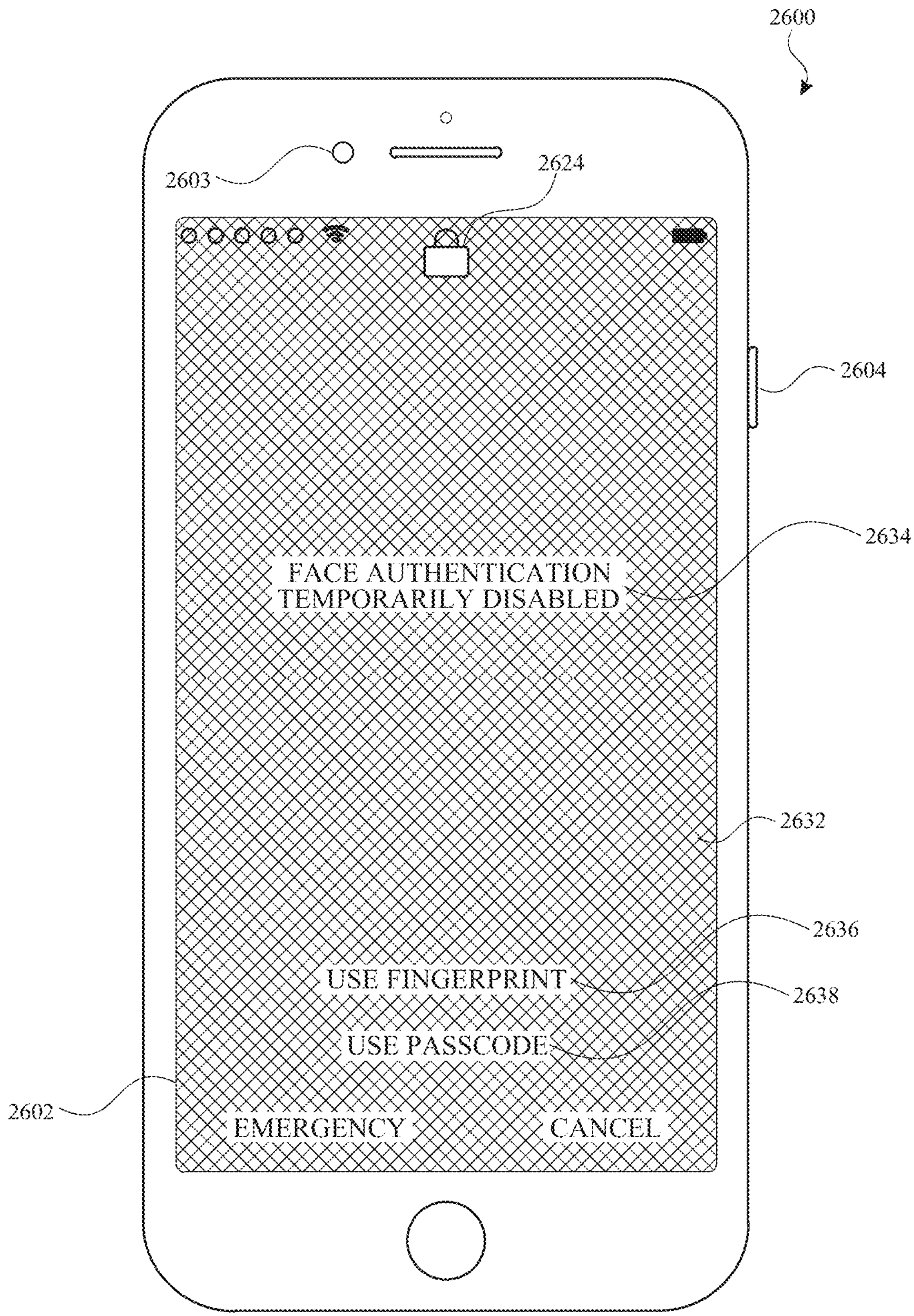
Figure 26M:
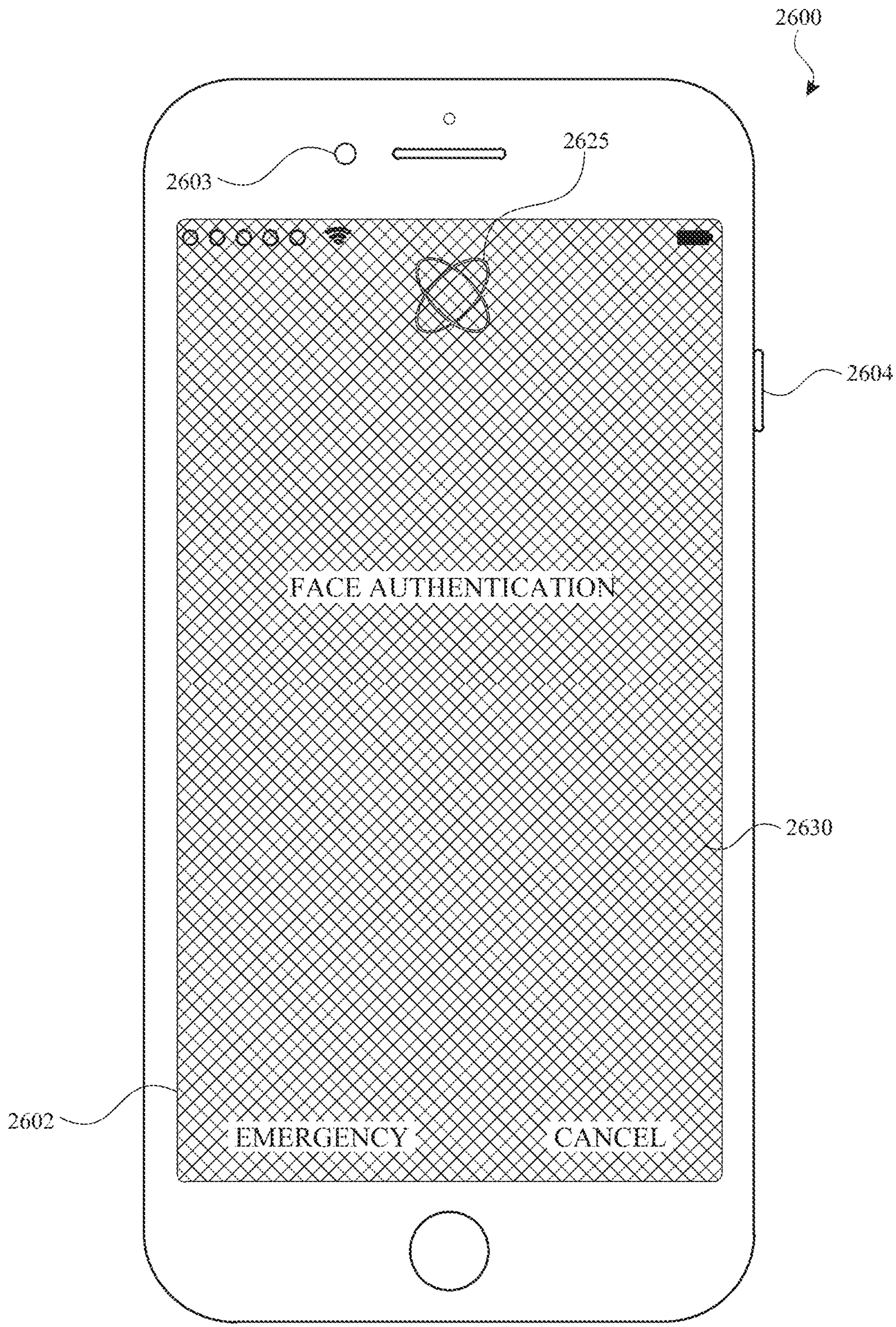

In some examples, while displaying the interstitial interface 2630, the electronic device detects biometric data (e.g., facial biometric data) and, in response, performs biometric authentication. With reference to FIG. 26M, the electronic device 2600 displays the biometric progress indicator 2625 to indicate that the biometric data is being processed.

Figure 26N:
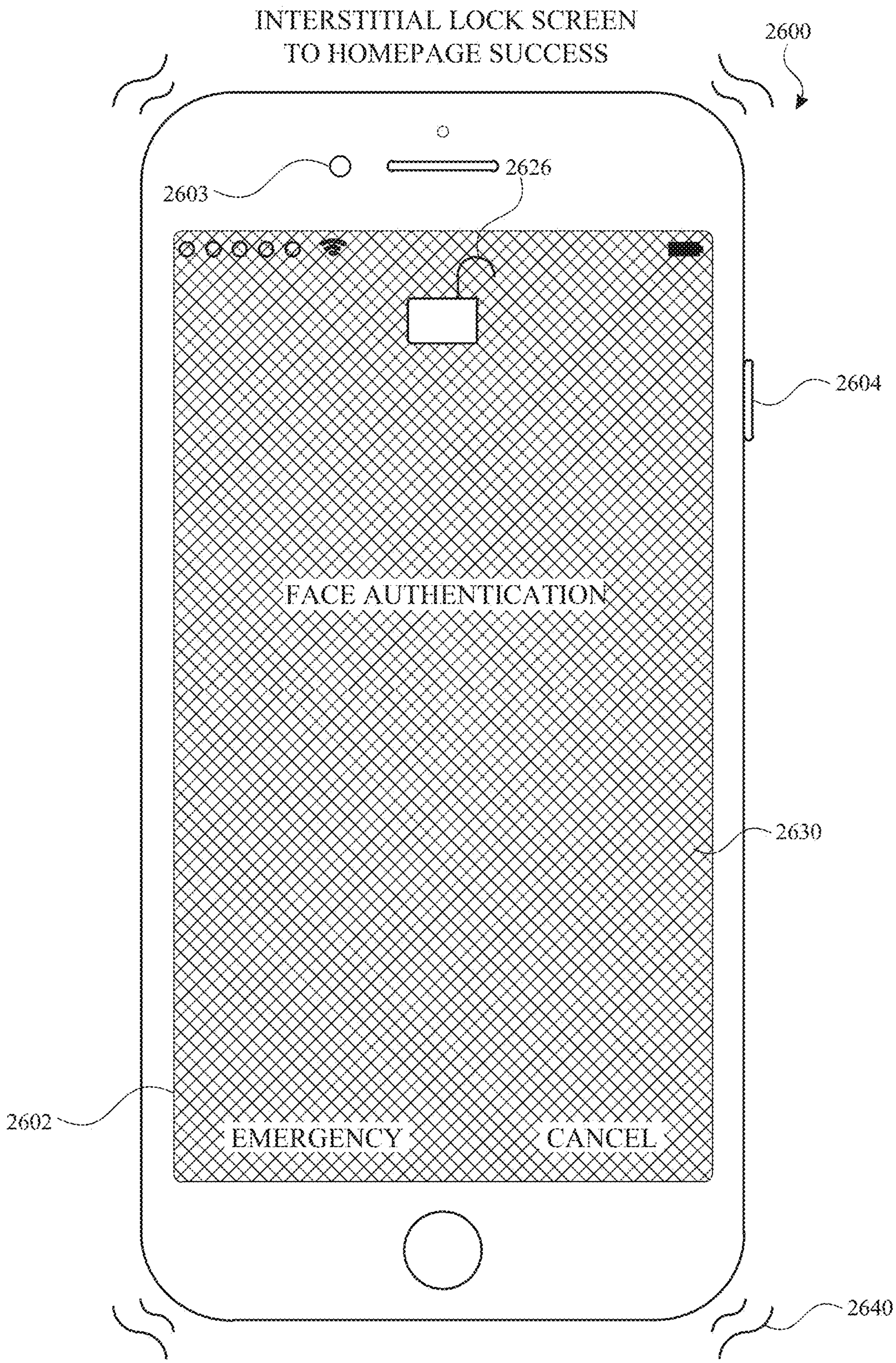
Figure 26O:
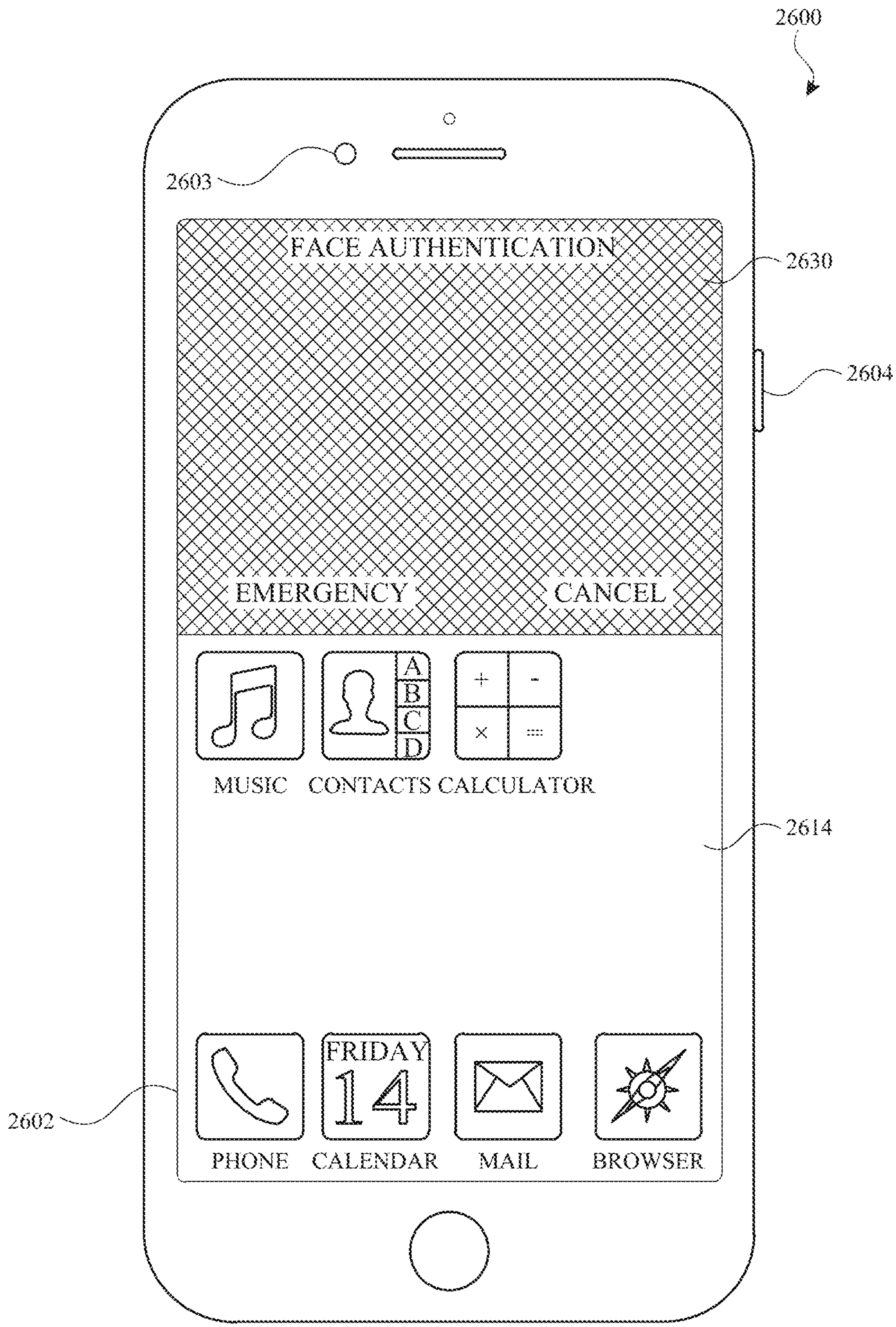
Figure 26P:
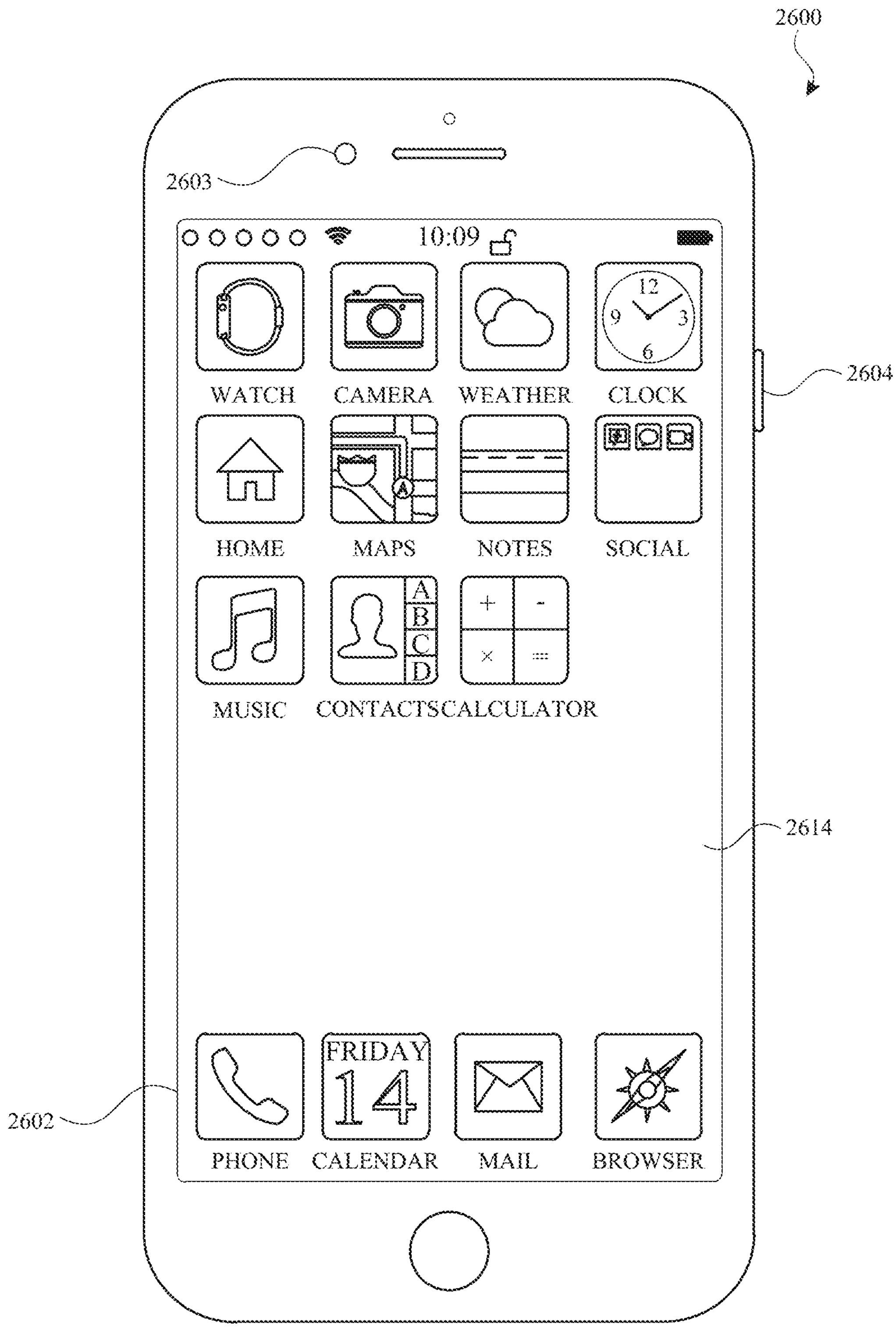

In FIG. 26N, the electronic device 2600 determines that the biometric authentication is successful. In response, the electronic device 2600 displays the unlocked state indicator 2626 and, optionally, outputs a tactile output 2640. After indicating that the biometric authentication was successful (e.g., after a predetermined amount of time), the electronic device displays (e.g., replaces display of the interstitial interface 2630 with) the home screen interface 2614 of FIG. 26P. With reference to FIGS. 21O-P, in some examples, displaying the home screen interface 2614 includes sliding the home screen interface 2614, as analogously described with reference to FIGS. 19P-R.

Figure 26Q:
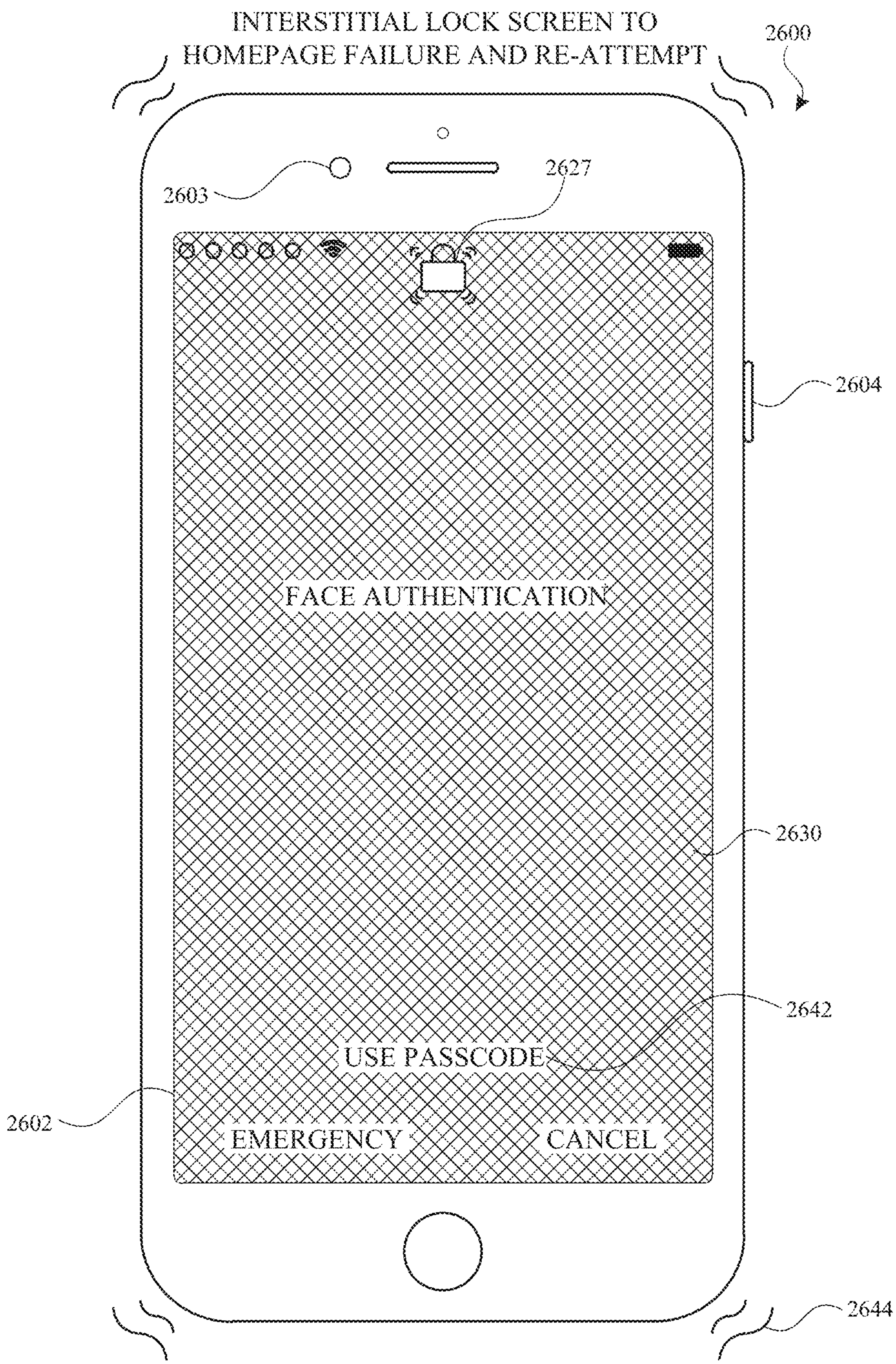

Alternatively, in FIG. 26Q, the electronic device 2600 determines that the biometric authentication was not successful. In response, the electronic device 2600 alternates a position of the locked state indicator 2627 to simulate a "shake" effect. The electronic device 2600 further outputs a tactile output 2644 to indicate the biometric authentication was unsuccessful. In some examples, the tactile output 2644 is the same as the tactile output 2640. In some examples, the tactile output 2644 is different than the tactile output 2640. In some examples, in response to determining the biometric authentication was unsuccessful, the electronic device displays an alternative authentication affordance 2642.

Figure 26R:
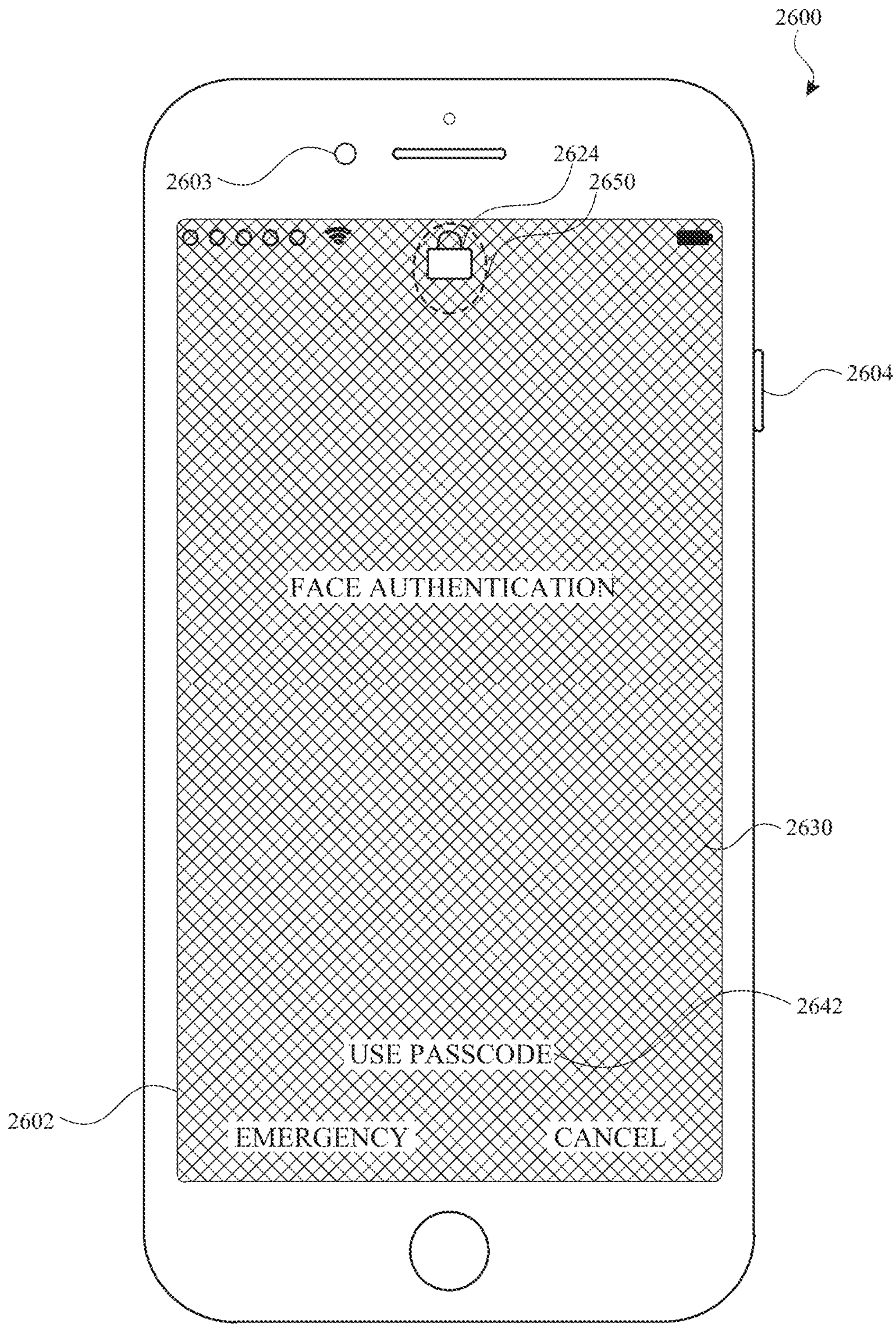
Figure 26S:
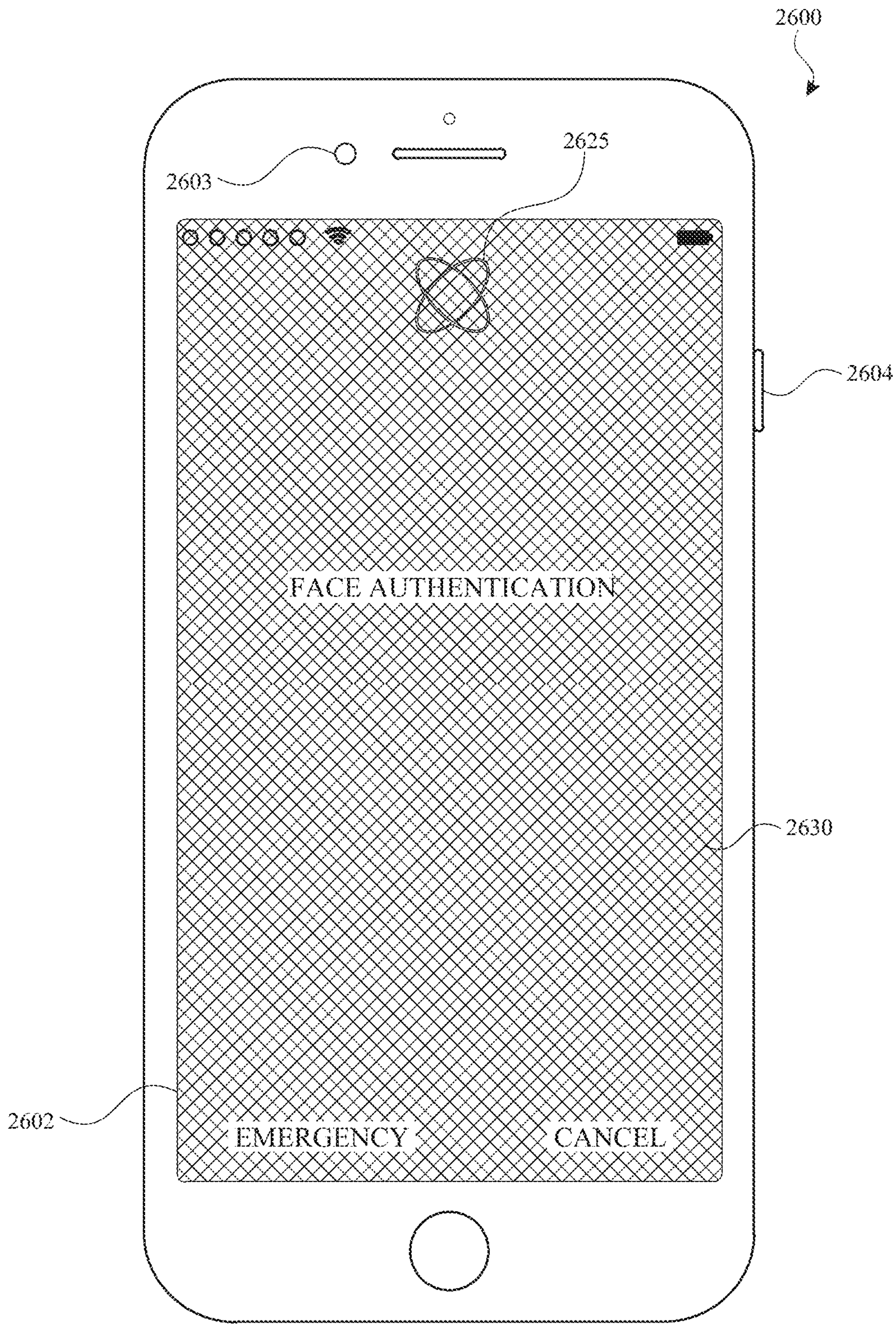

With reference to FIG. 26R, the electronic device receives an activation of the locked state indicator 2624. In some examples, activation of the locked state indicator is a tap gesture 2650 on the locked state indicator 2624. In response, as shown in FIG. 26S, the electronic device 2600 initiates biometric authentication. In some examples, initiating biometric authentication includes obtaining (e.g., capturing with the one or more biometric sensors 2603) data corresponding to at least a portion of the biometric feature and processing the biometric data to determine whether the biometric feature (or a portion thereof) satisfies biometric authentication criteria (e.g., determine whether the biometric data matches, within a threshold, a biometric template). While processing the biometric data, the electronic device displays (e.g., replaces display of the locked state indicator 2624 with) biometric progress indicator 2625, indicating that the electronic device 2600 is processing biometric data. If the electronic device 2600 determines that biometric authentication is successful, the electronic device indicates the success, as described with respect to FIGS. 26N-P.

Figure 26T:
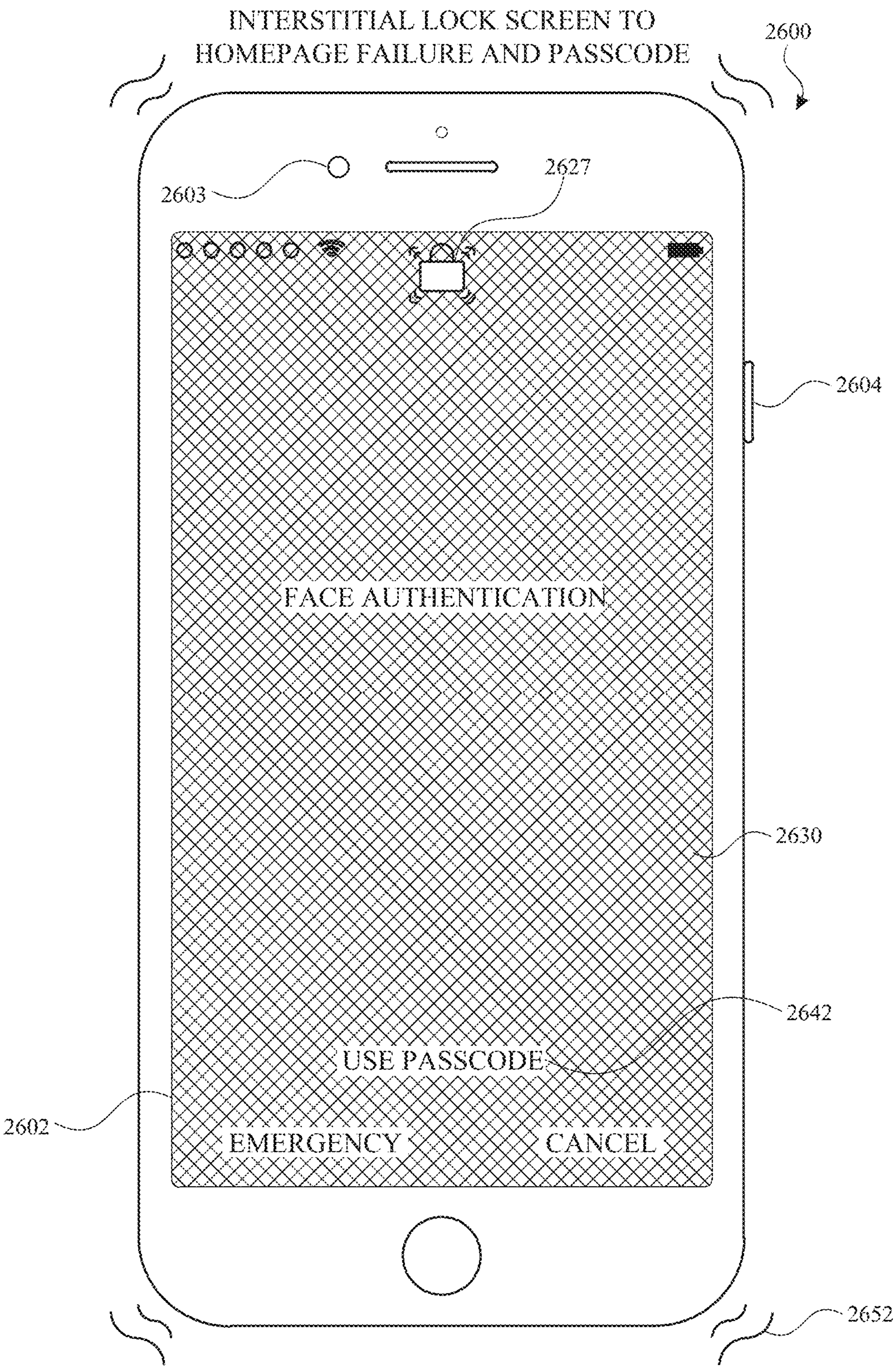

In FIG. 26T, the electronic device 2600 determines that biometric authentication (e.g., as described with reference to FIG. 26S) was unsuccessful, and in response, alternates a position of the locked state indicator to simulate a "shake" effect, outputs a tactile output 2652, and displays an alternative authentication affordance 2642.

Figure 26U:
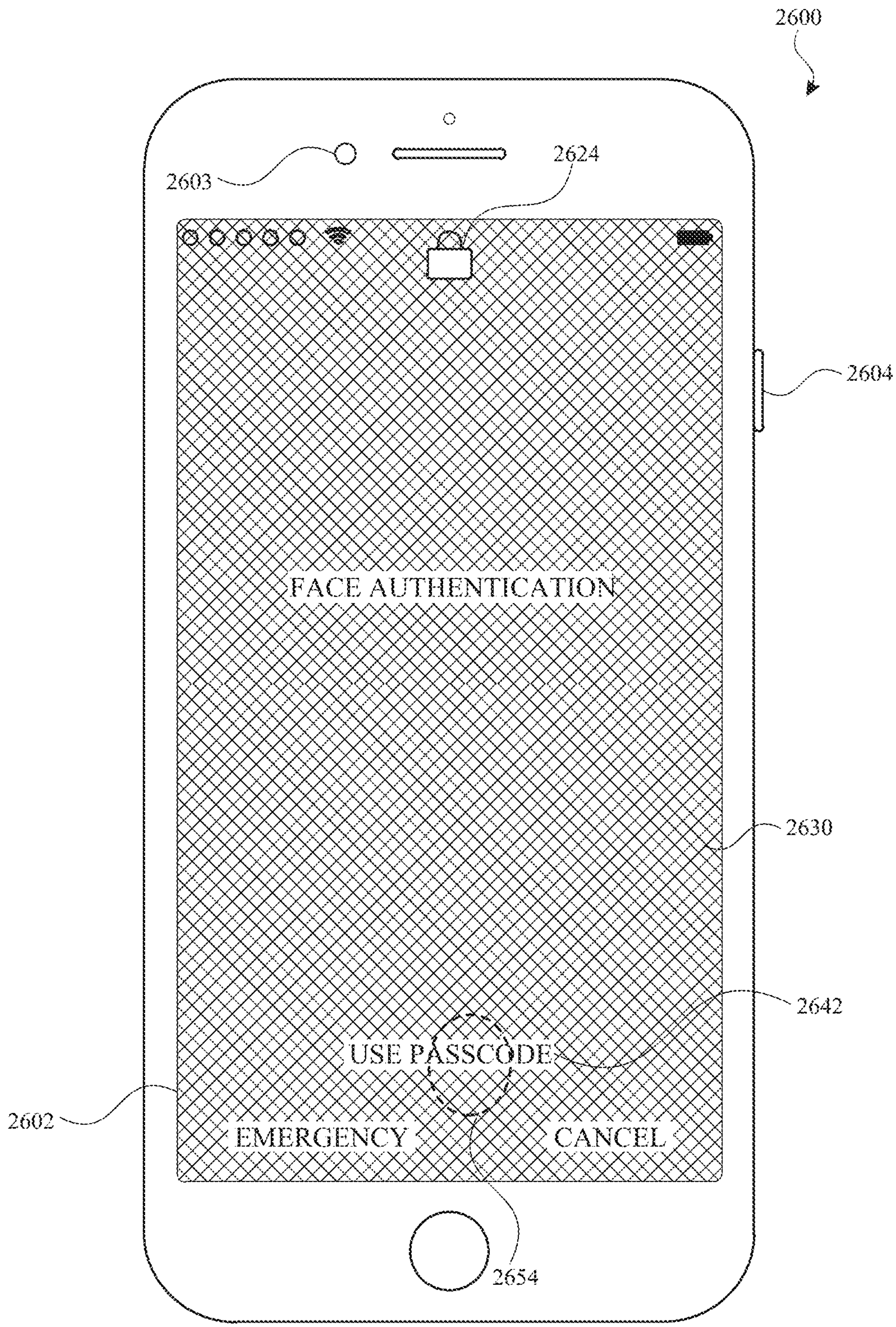
Figure 26V:
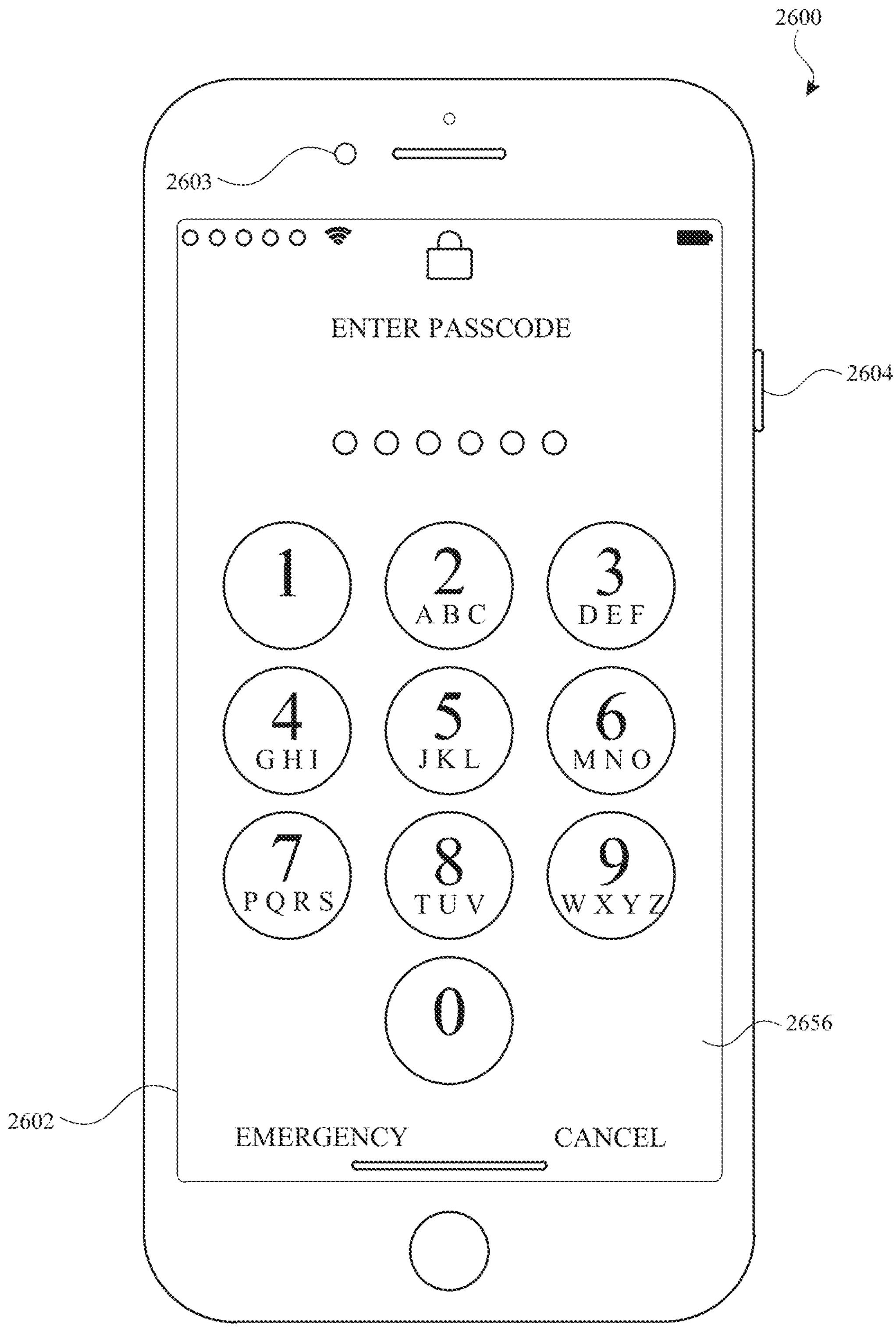

In FIG. 26U, the electronic device detects an activation of the alternative authentication affordance 2642. In some examples, the activation of the alternative authentication affordance is a tap gesture 2654 on the alternative authentication affordance 2642. With reference to FIG. 26V, in response to activation of the alternative authentication affordance 2642, the electronic device displays (e.g., replaces display of the interstitial interface 2630 with) alternative authentication interface 2656, with which a user authenticates with the electronic device upon entry of a valid passcode (or password).

Figure 26W:
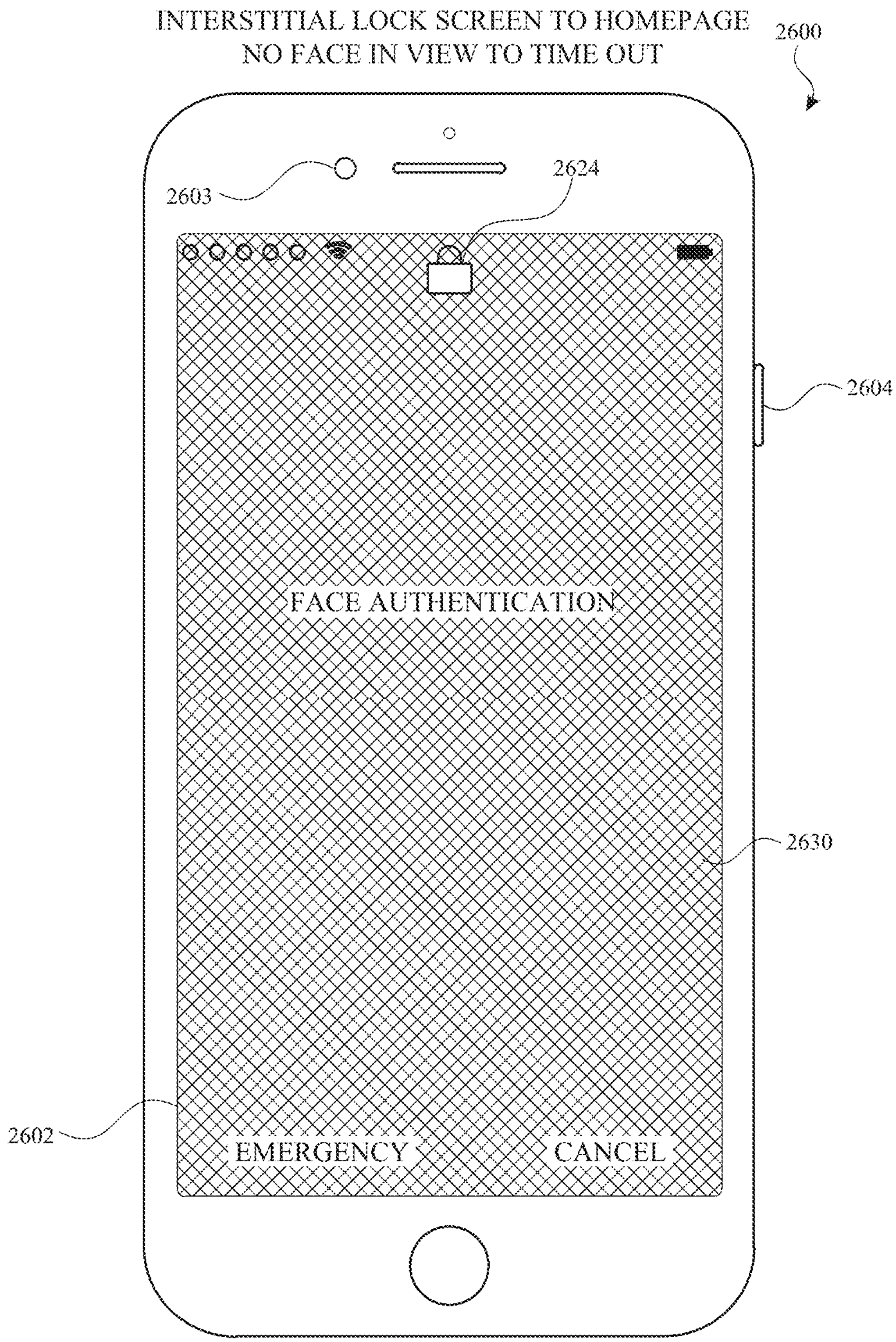
Figure 26X:
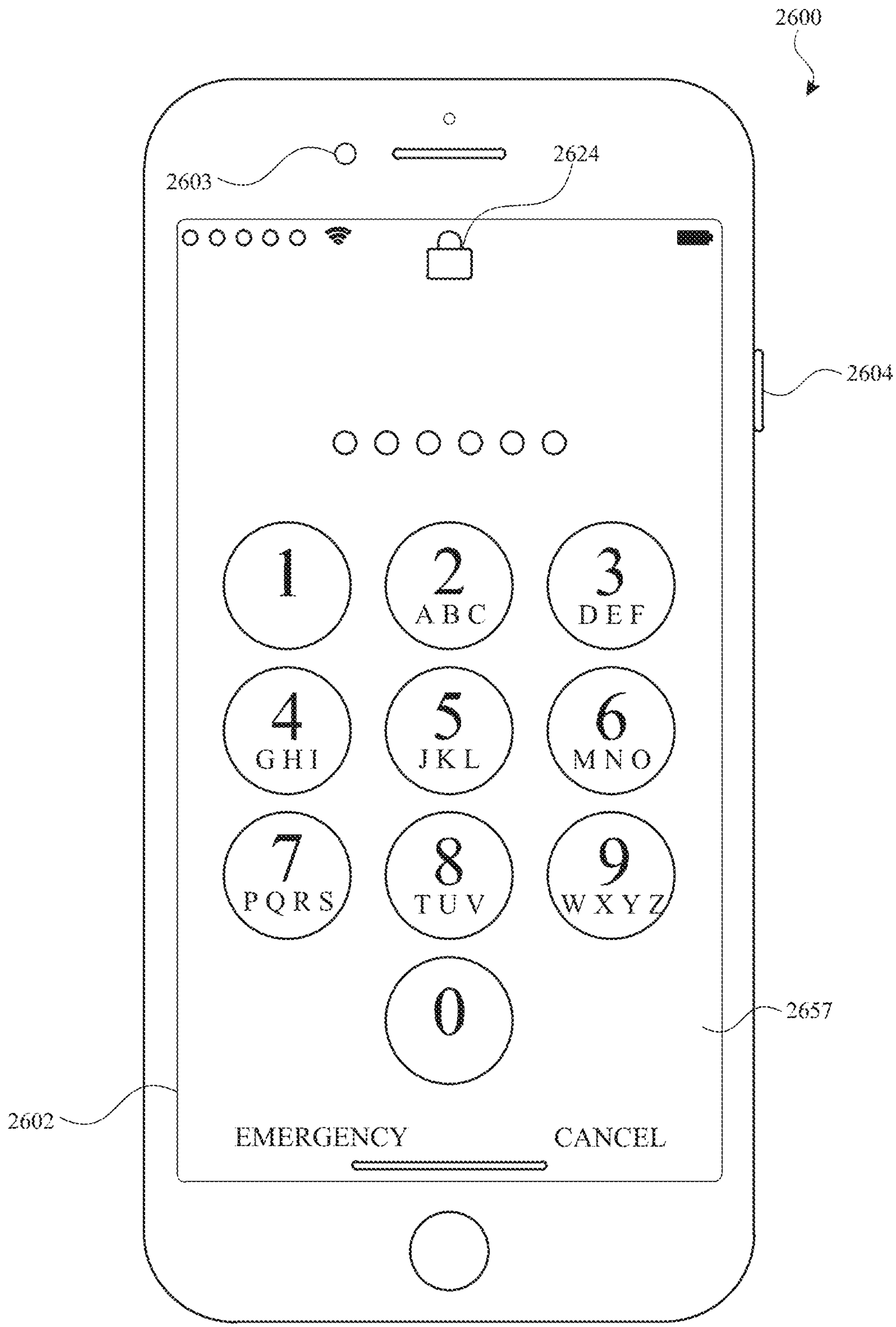
Figure 26Y:
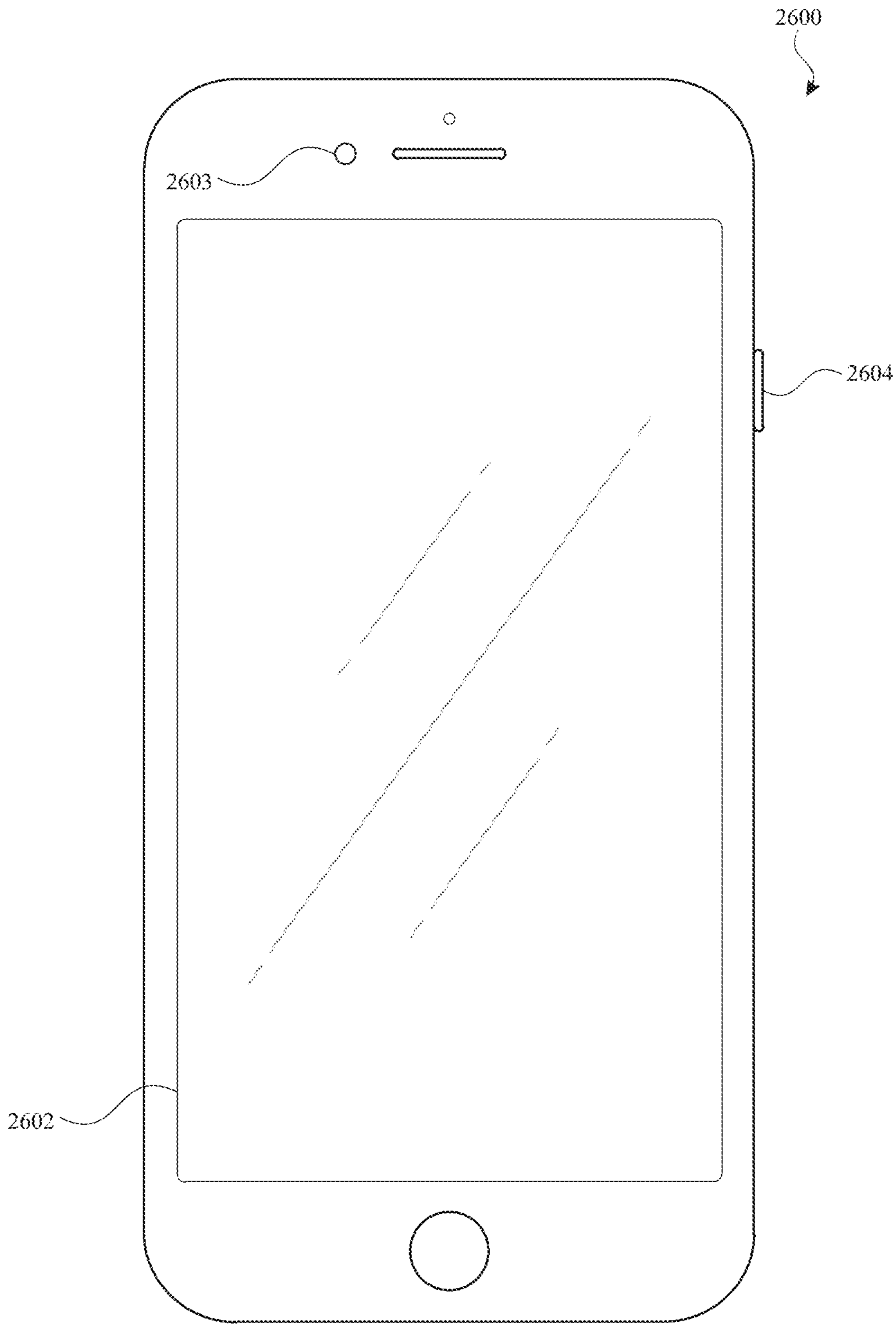

With reference to FIGS. 26W-Y, in some examples, the electronic device fails to detect a biometric feature for a predetermined amount of time, the electronic device displays one or more interfaces and/or enters a low power state. In FIG. 26W, the electronic device displays interstitial interface 2630 (recall that the electronic device displays interstitial interface 2630 in response to a request for secured content received prior to completion of biometric authentication). If, for a predetermined amount of time, the electronic device 2600 does not detect a biometric feature, the electronic device displays (e.g., replaces display of the interstitial interface 2630 with) alternative authentication interface 2657. In some examples, the alternative authentication interface 2657 includes an indicator instructing the user to provide alternative authentication, such as a passcode. In other examples, as shown in FIG. 26X, the alternative authentication interface 2657 does not include an indicator instructing the user to provide the alternative authentication.

If during display of the alternative authentication interface 2657, a biometric feature is not detected for a predetermined amount of time, and no alternative authentication is provided, the electronic device 2600 transitions to a low-power state (e.g., display-disabled state), as shown in FIG. 26Y.

Figure 26Z:
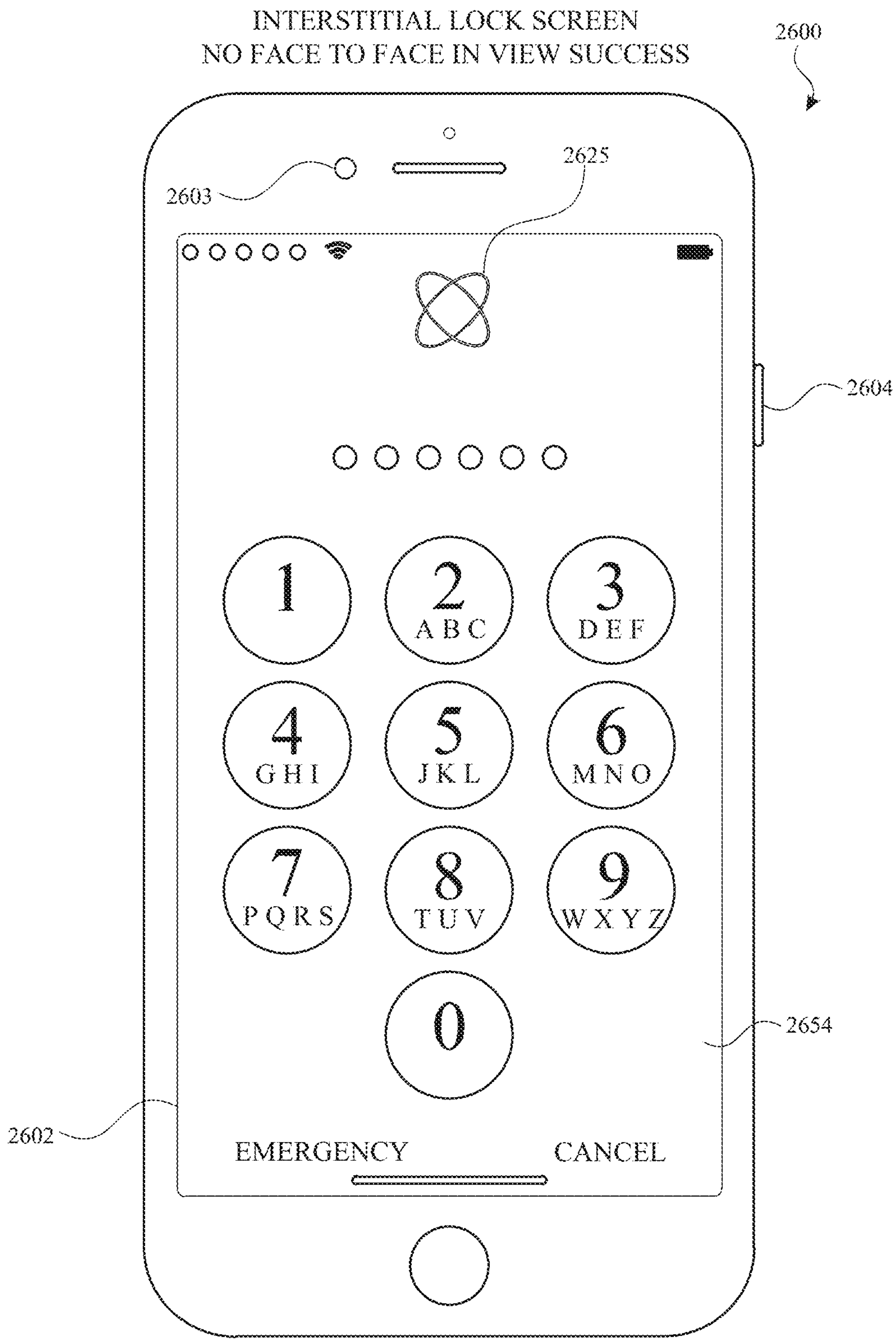
Figure 26A:
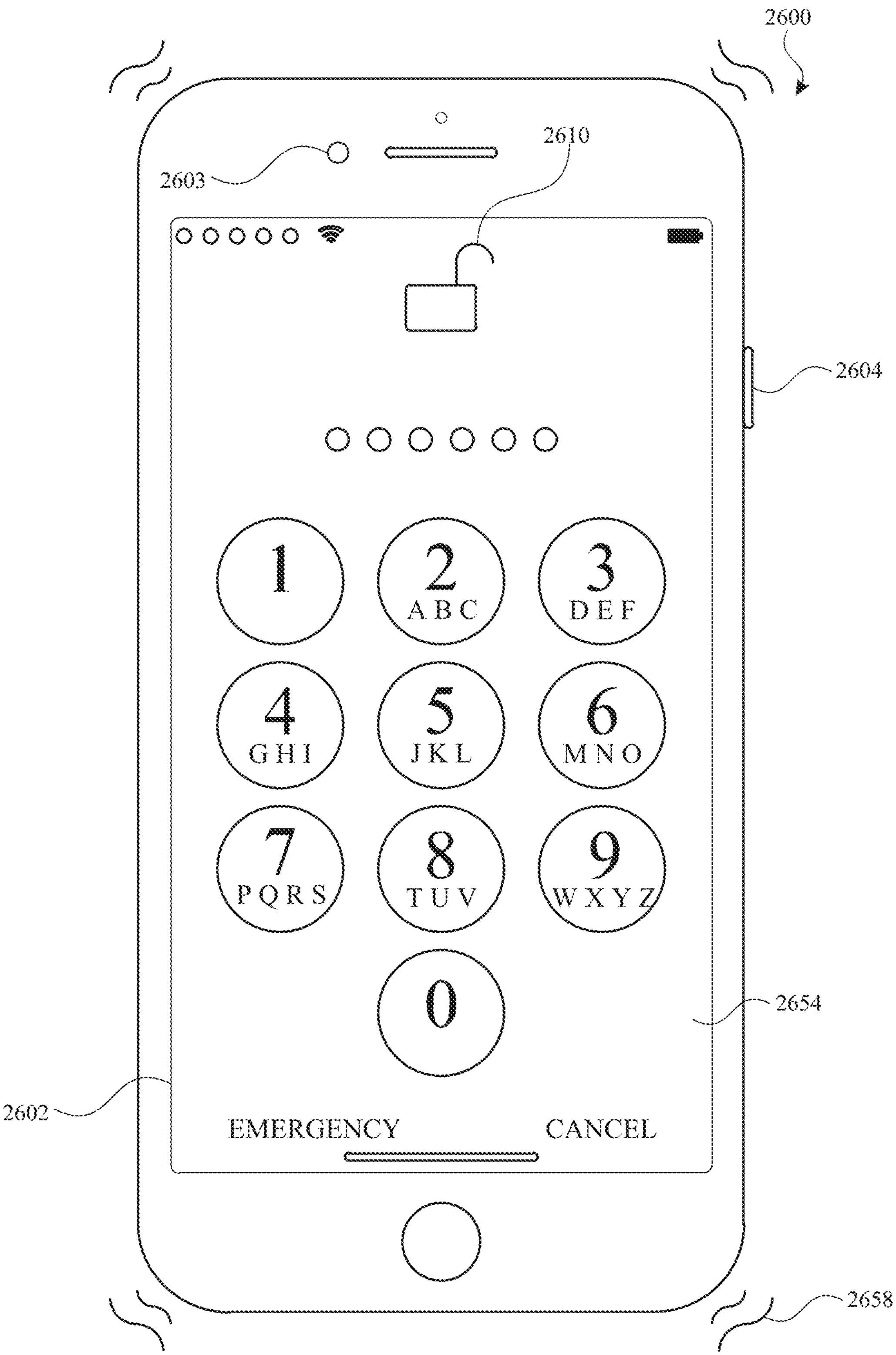
Figure 26A:
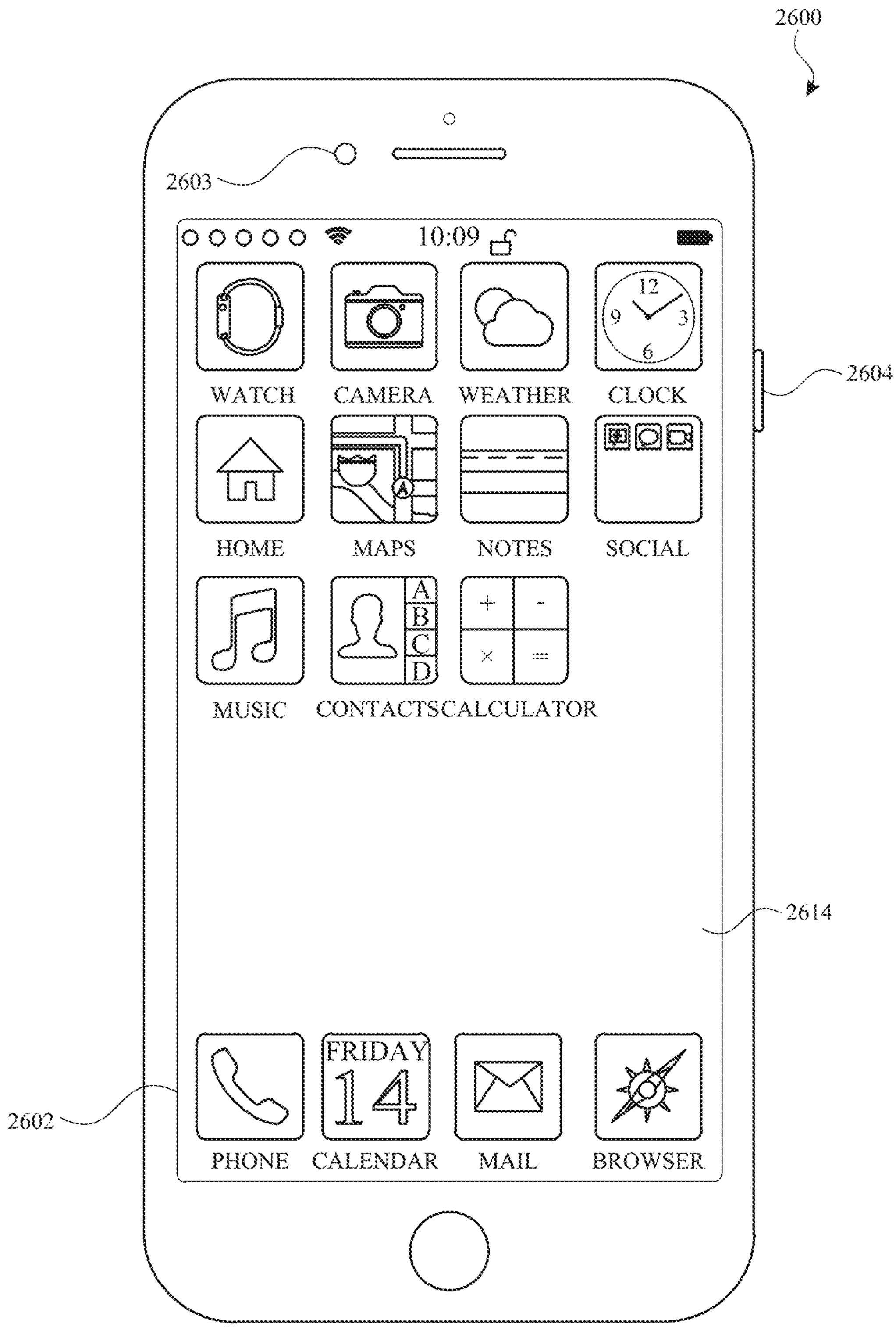
Figure 26A:
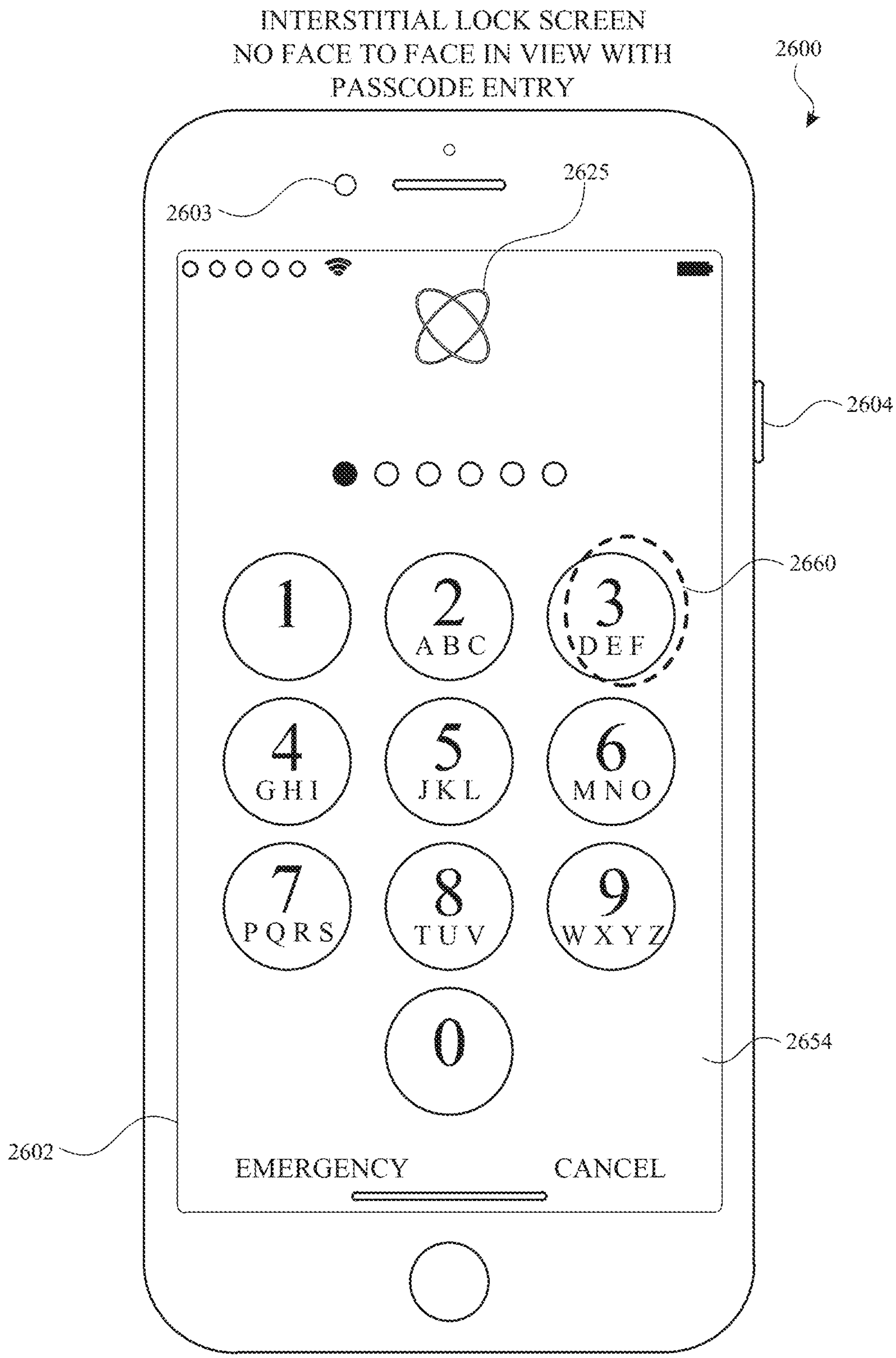
Figure 26A:
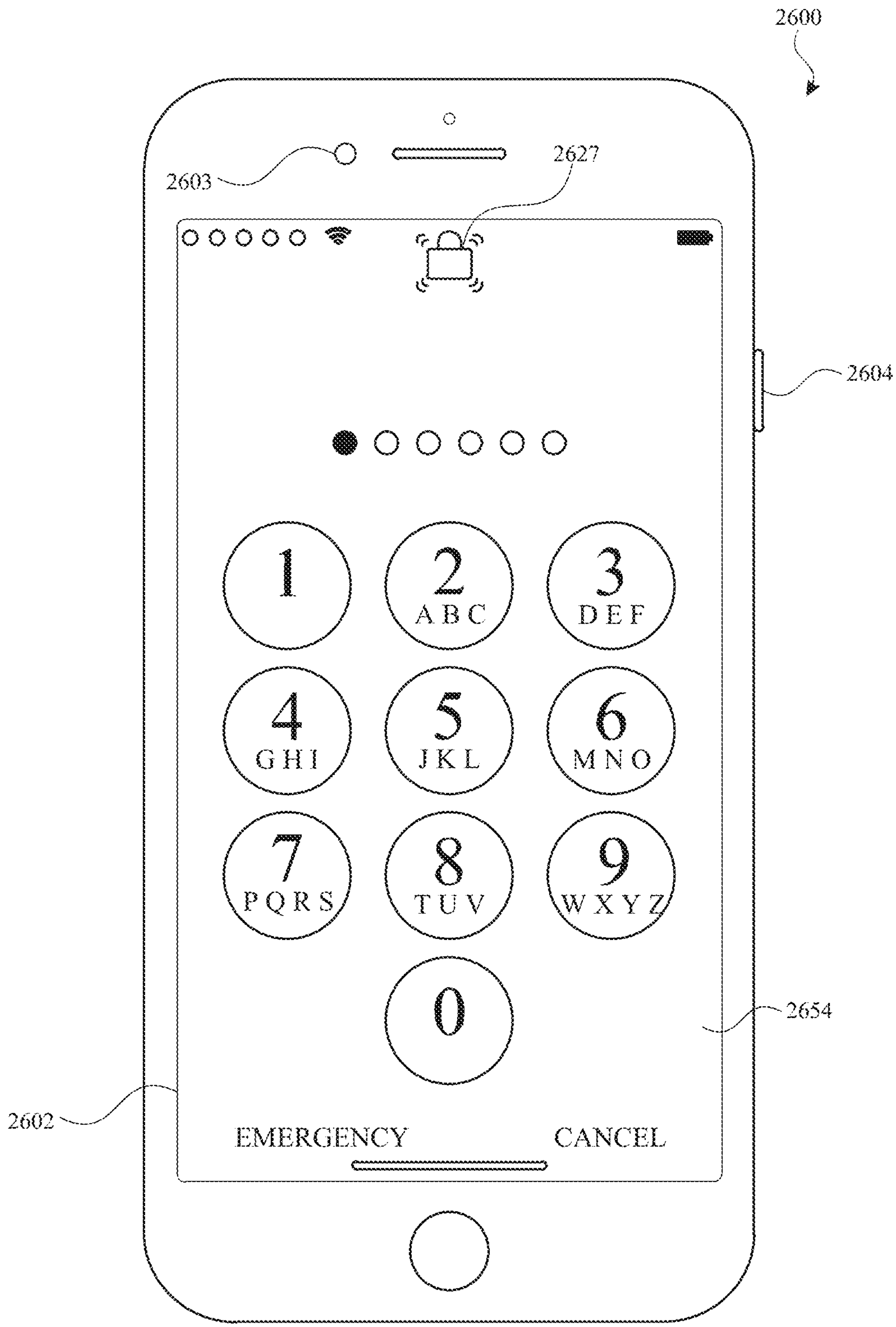
Figure 26A:
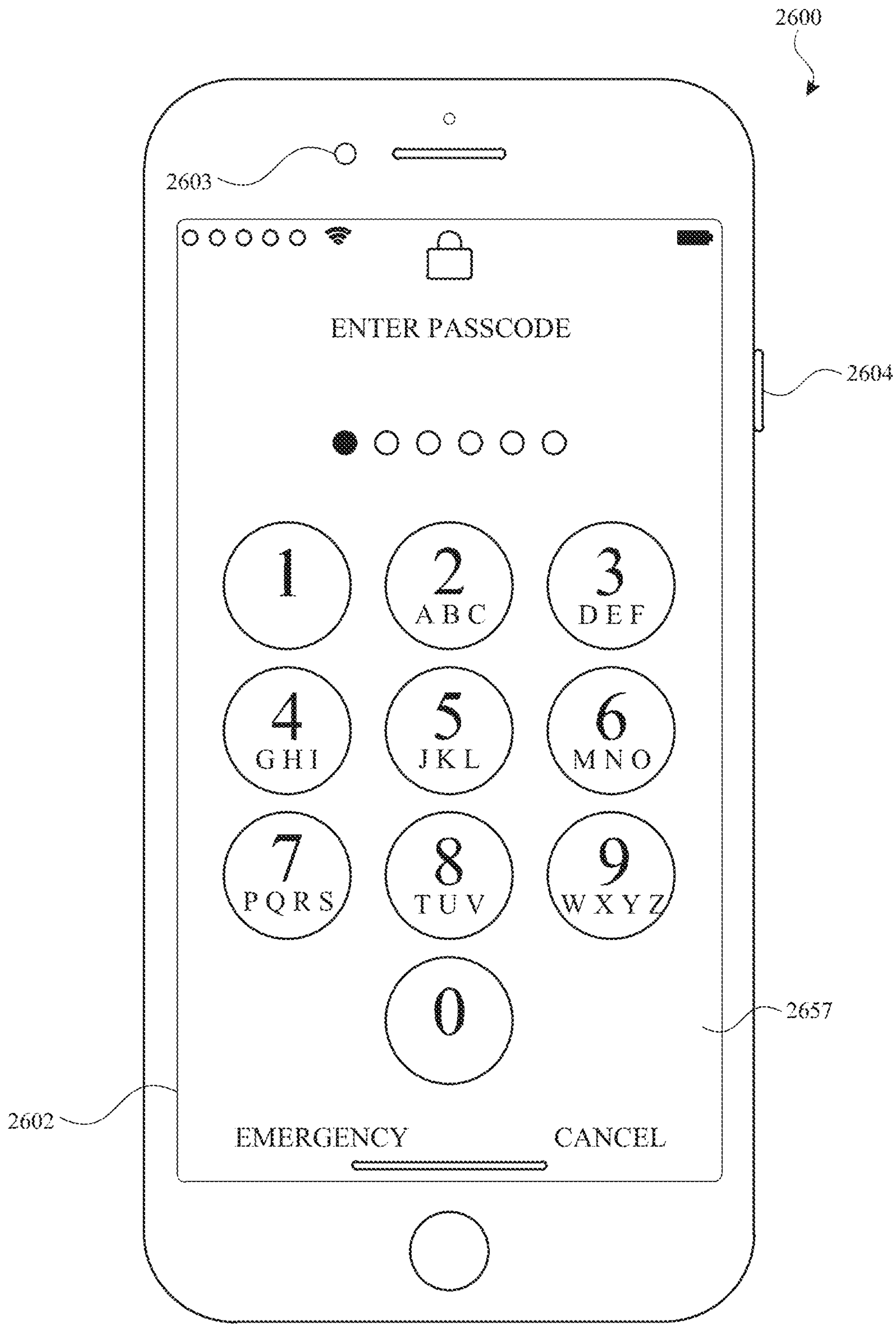
Figure 26A:
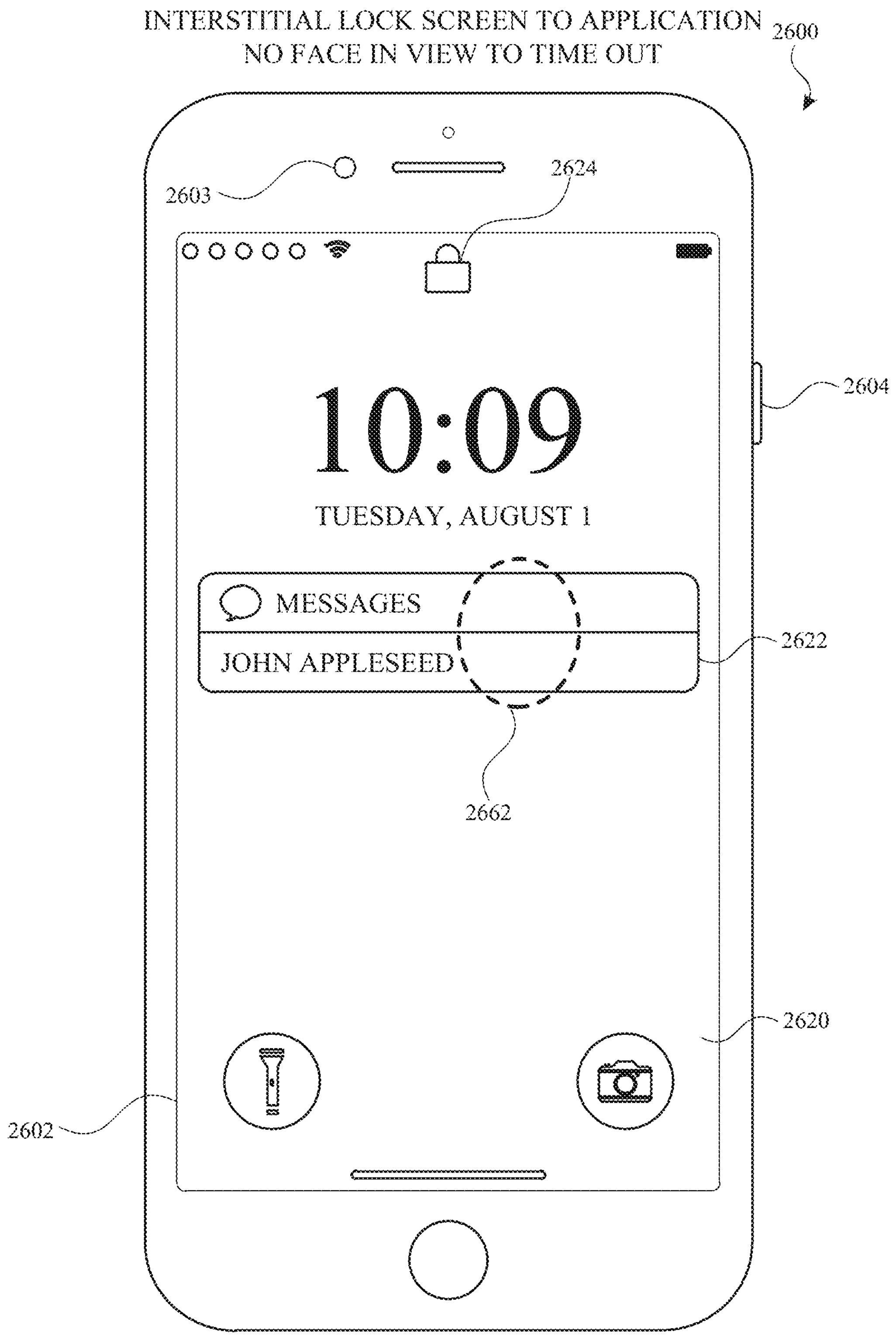
Figure 26A:
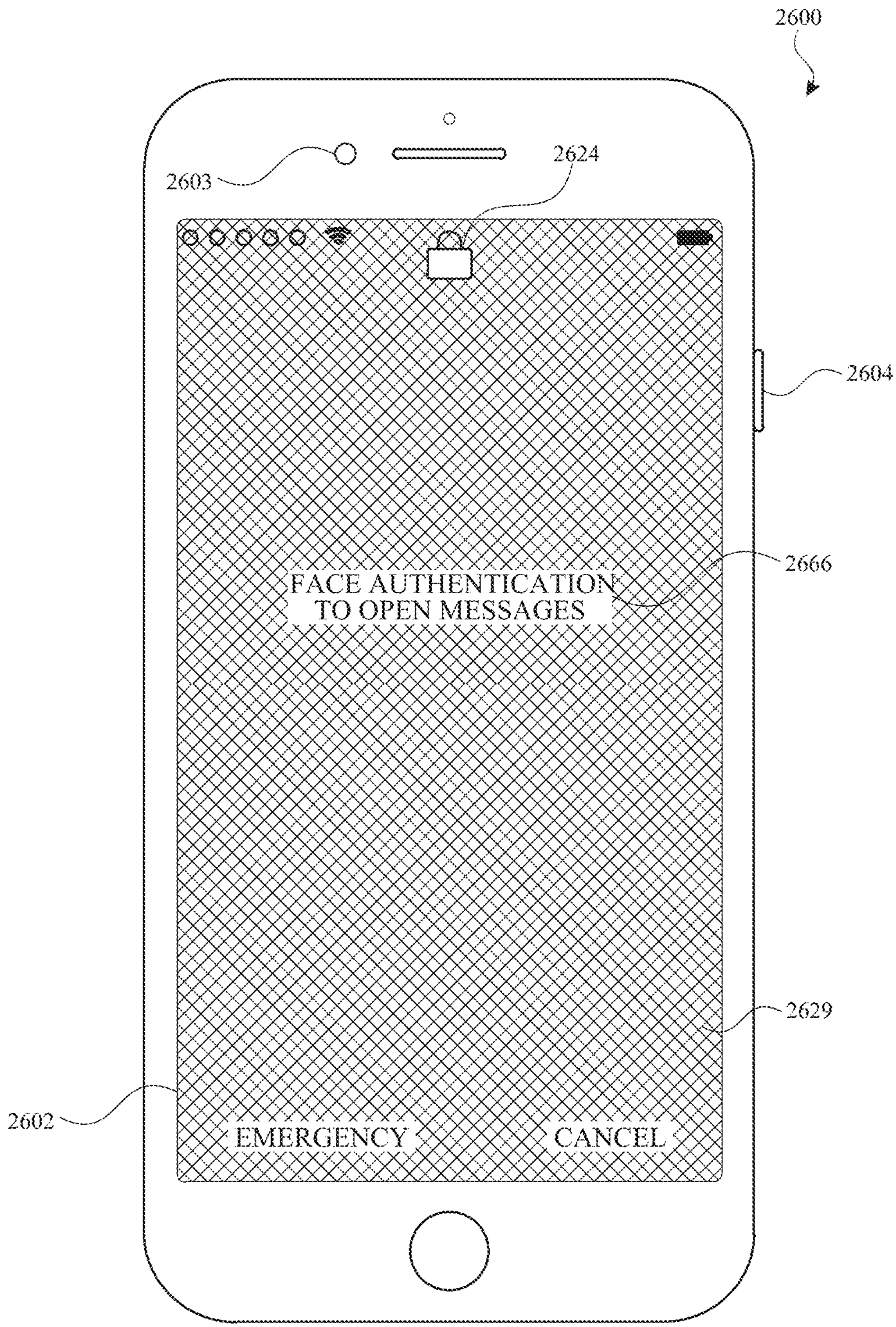
Figure 26A:
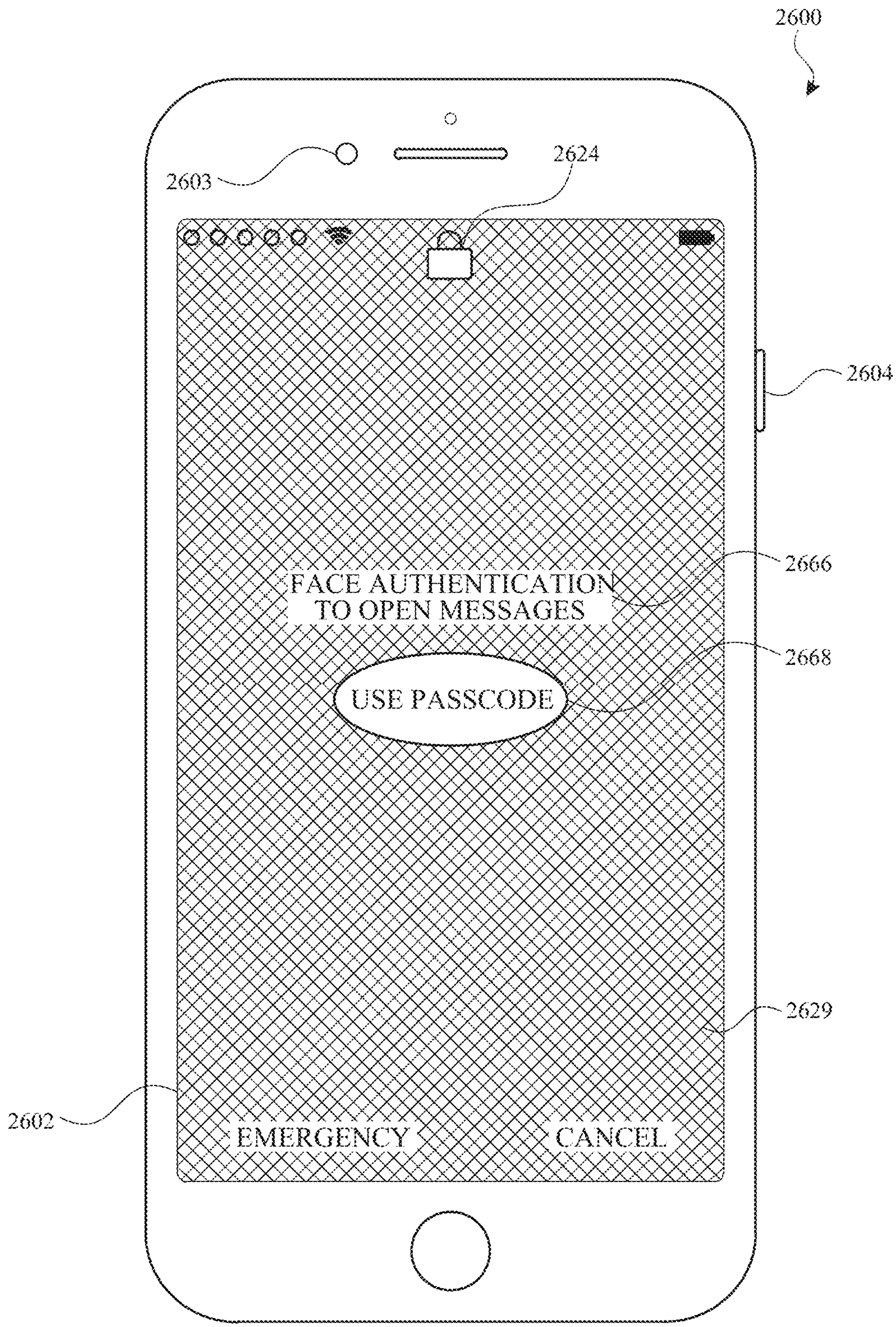
Figure 26A:
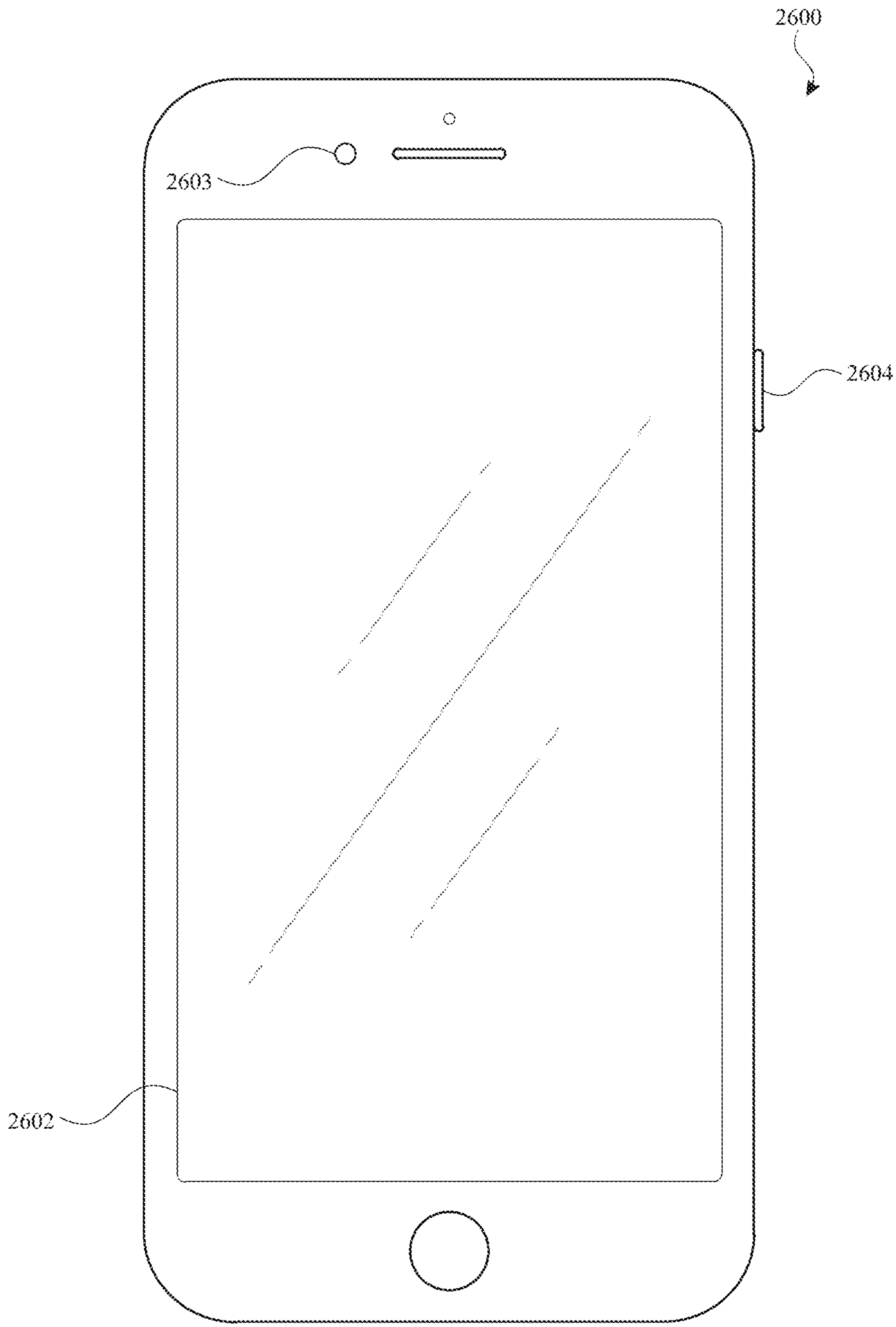
Figure 26A:
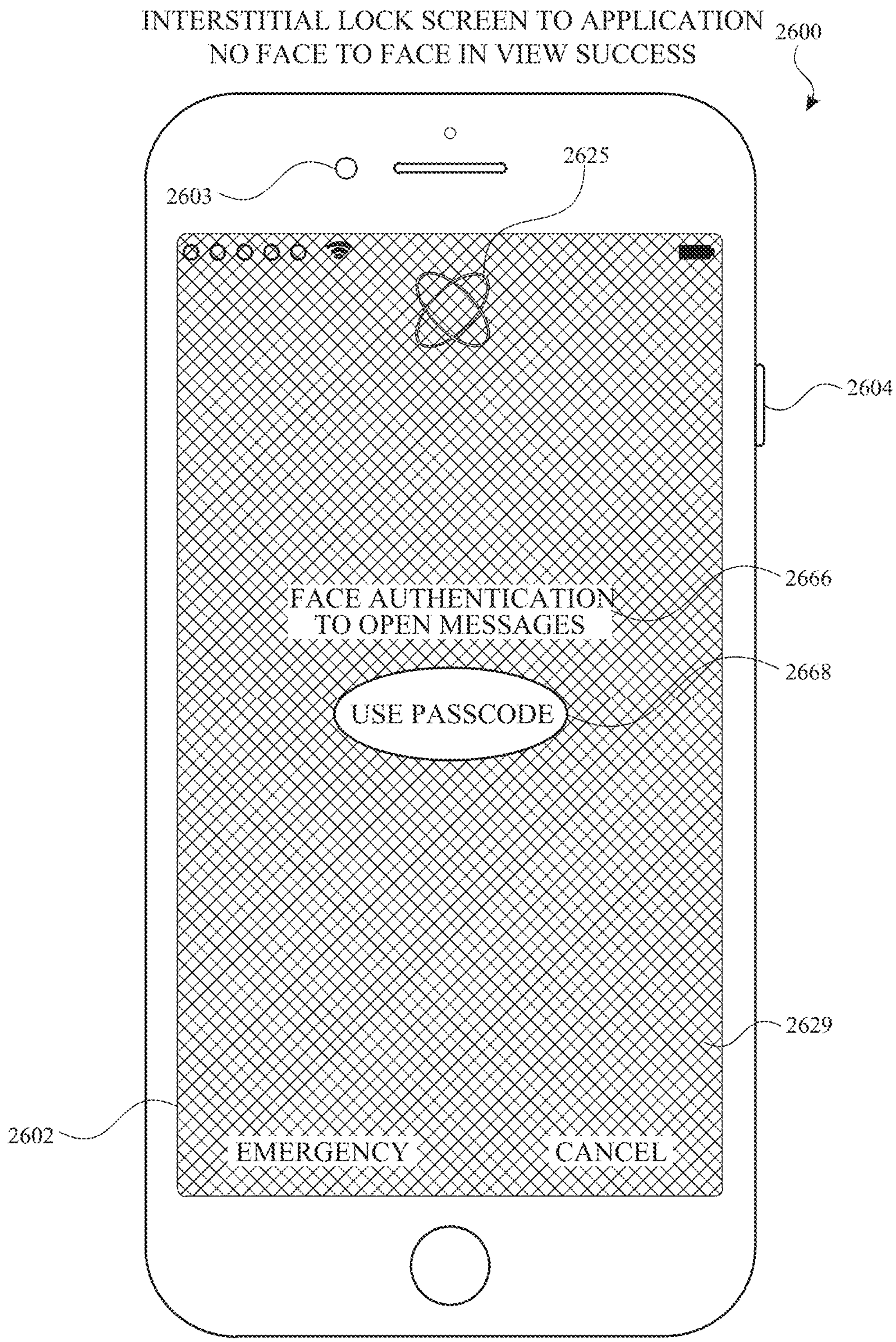
Figure 26A:
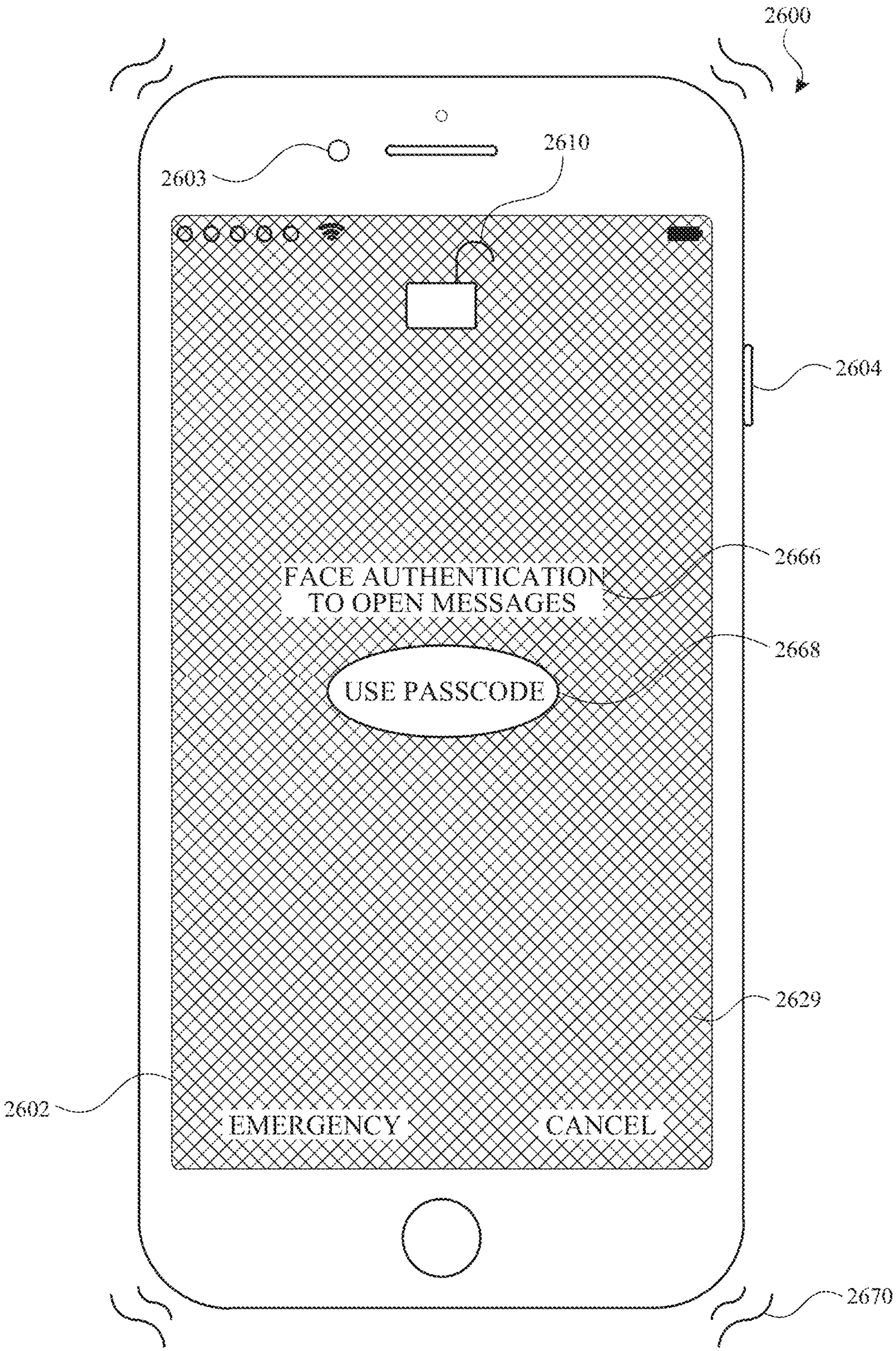
Figure 26A:
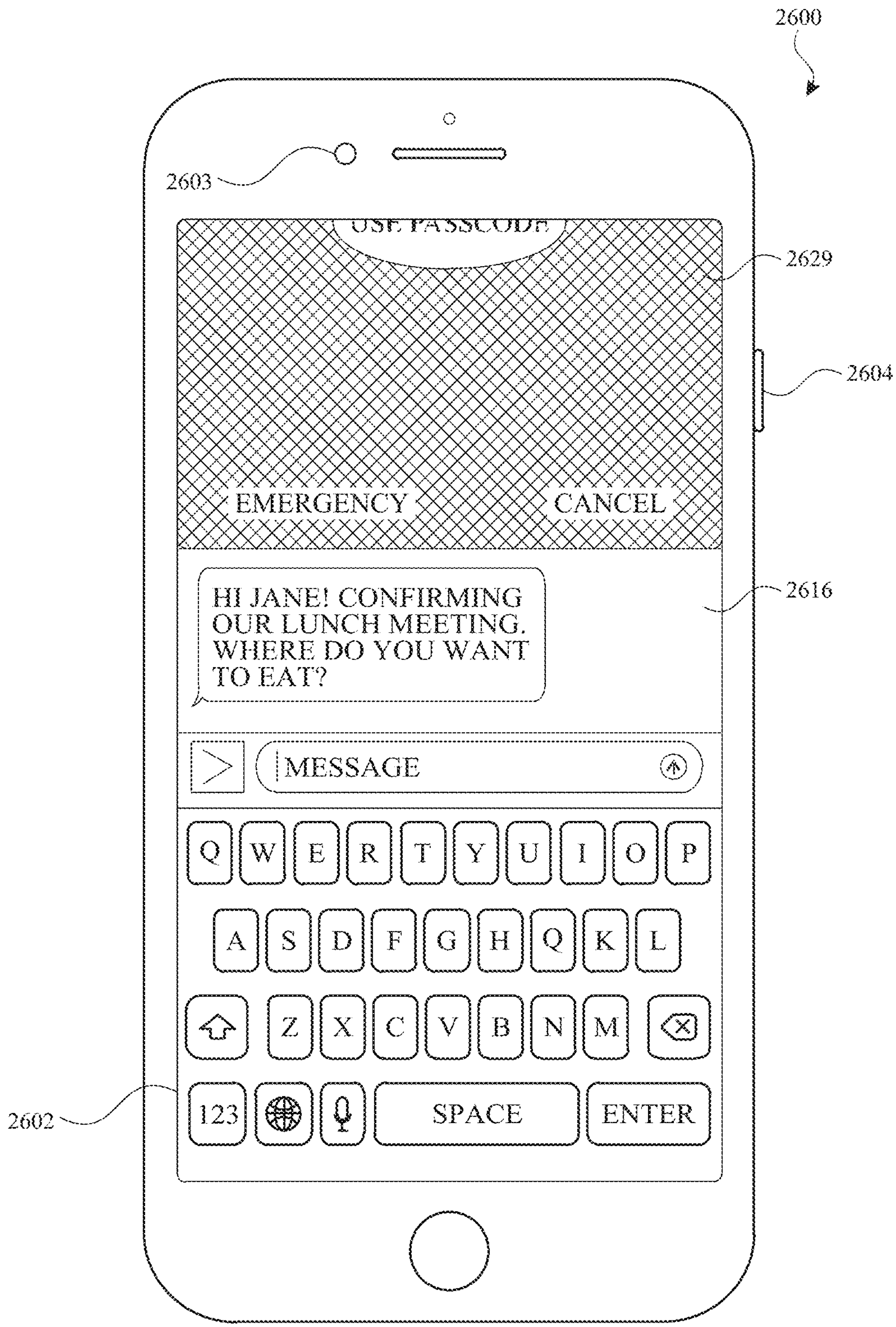
Figure 26A:
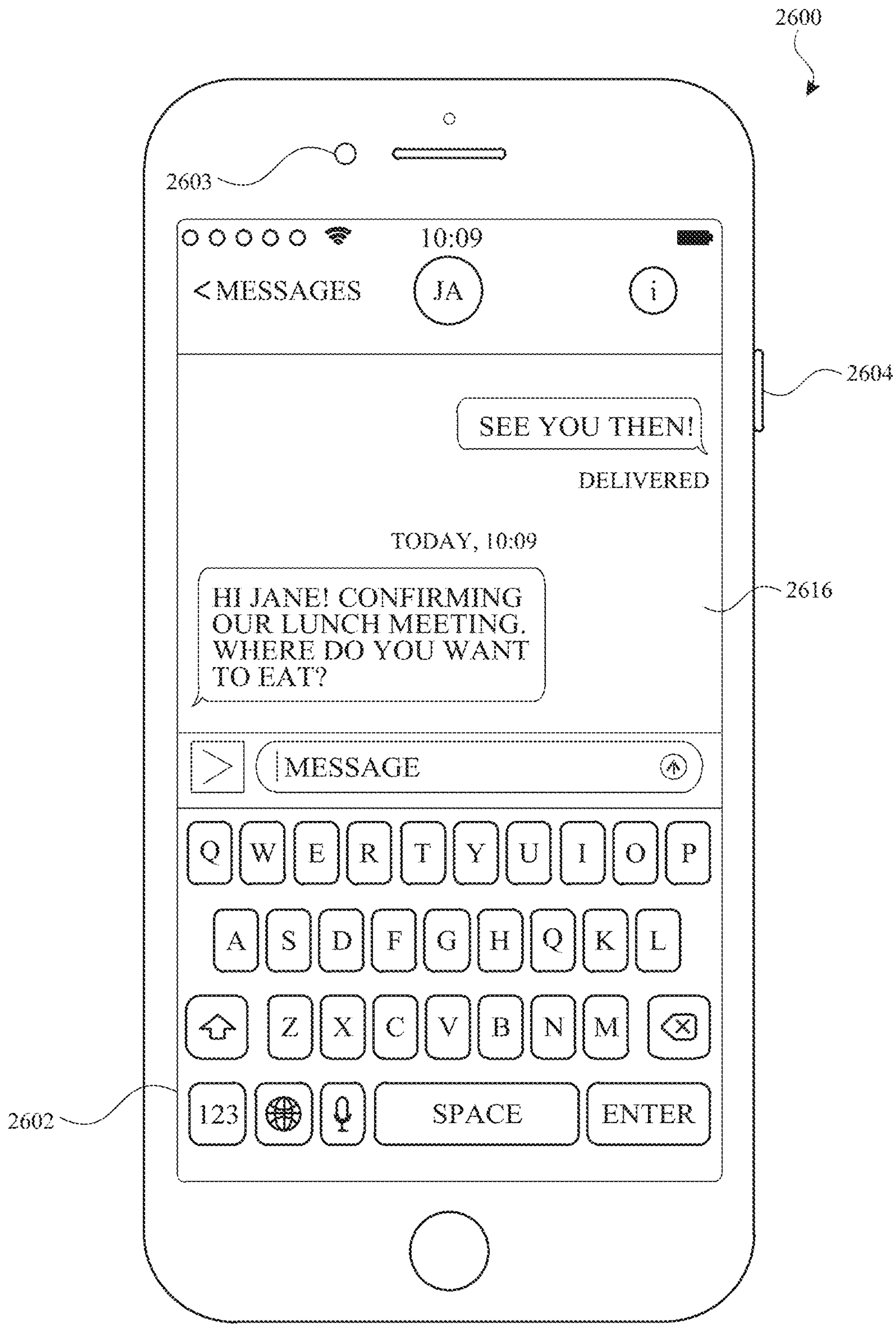
Figure 26A:
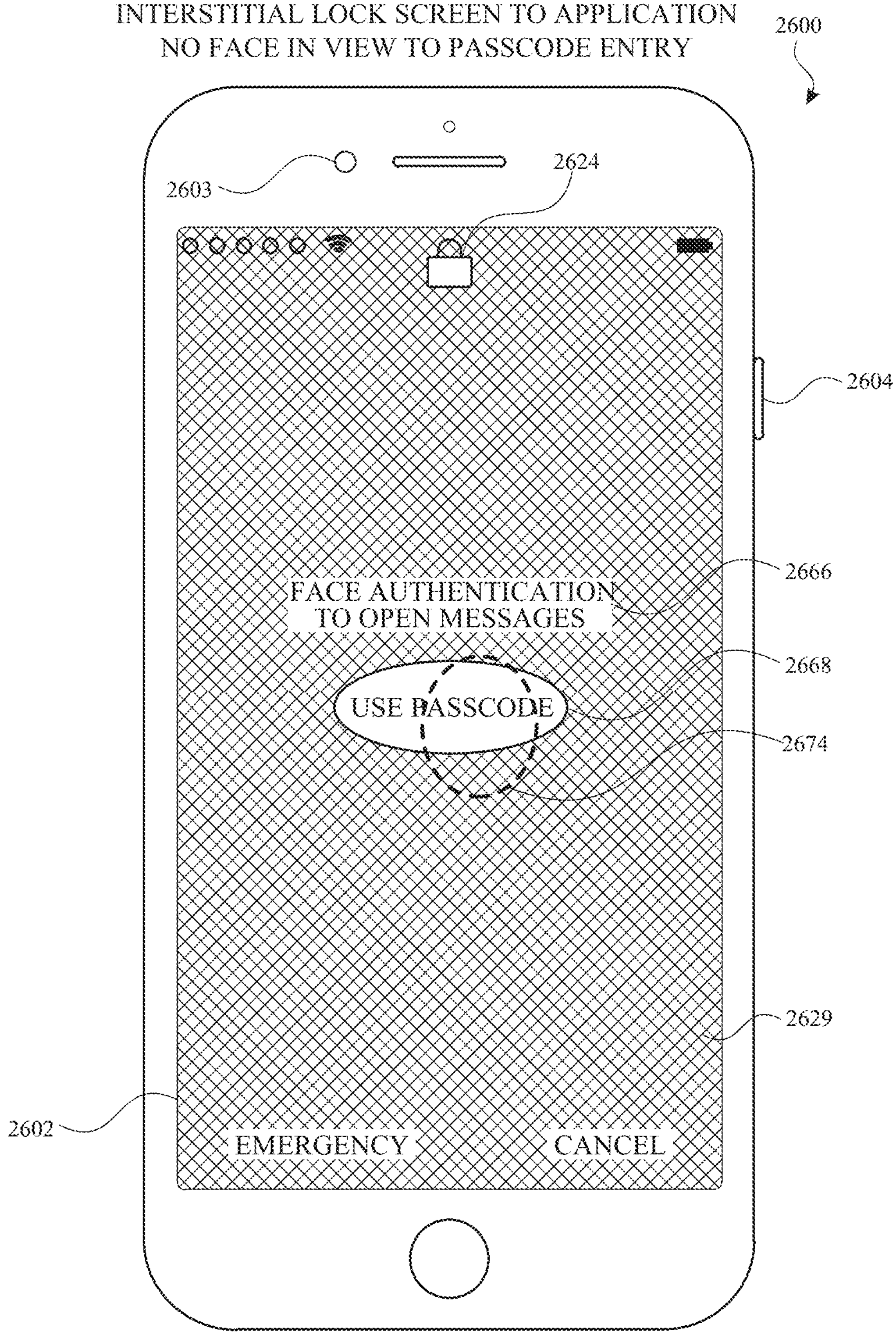
Figure 26A:
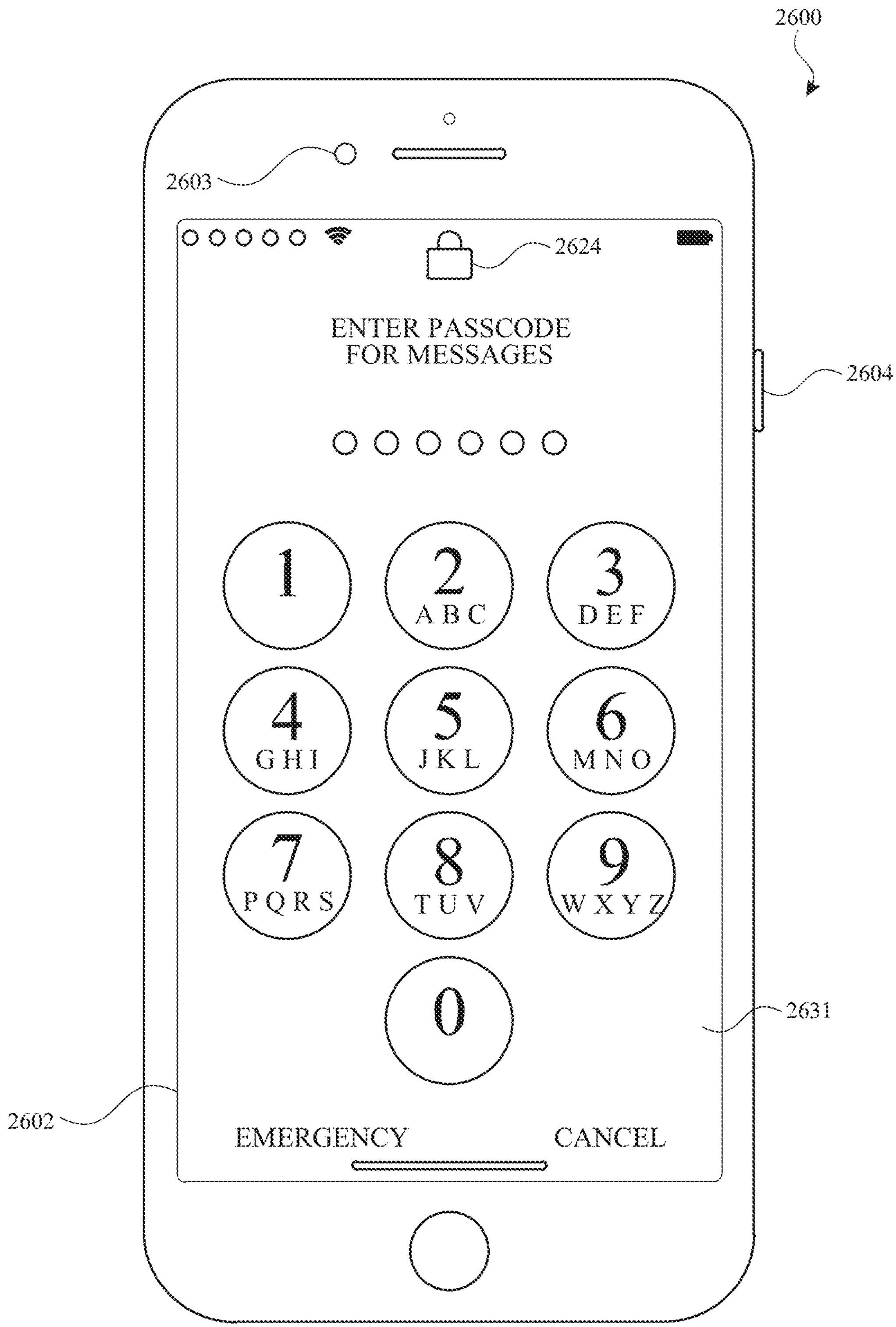
Figure 26A:
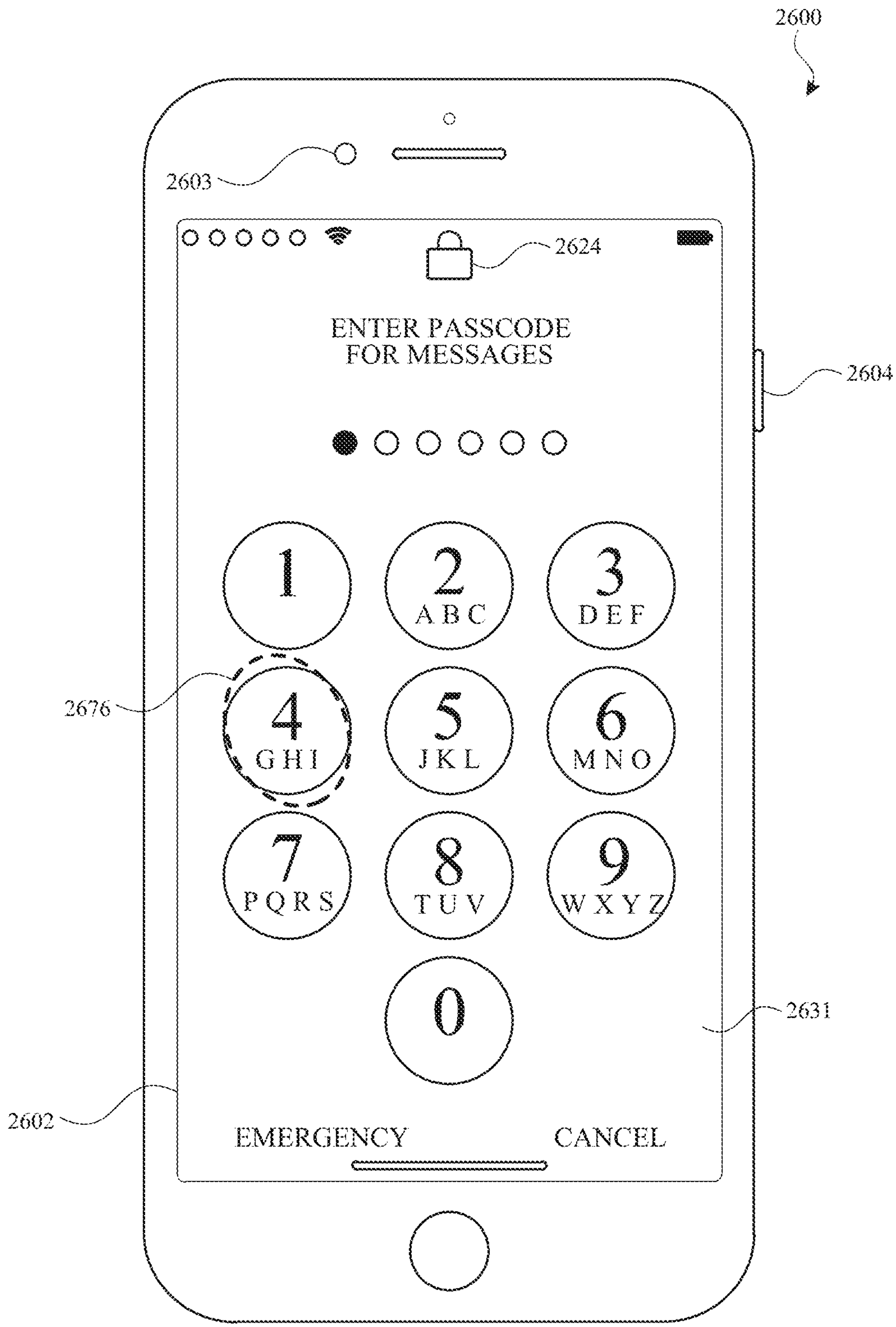
Figure 26A:
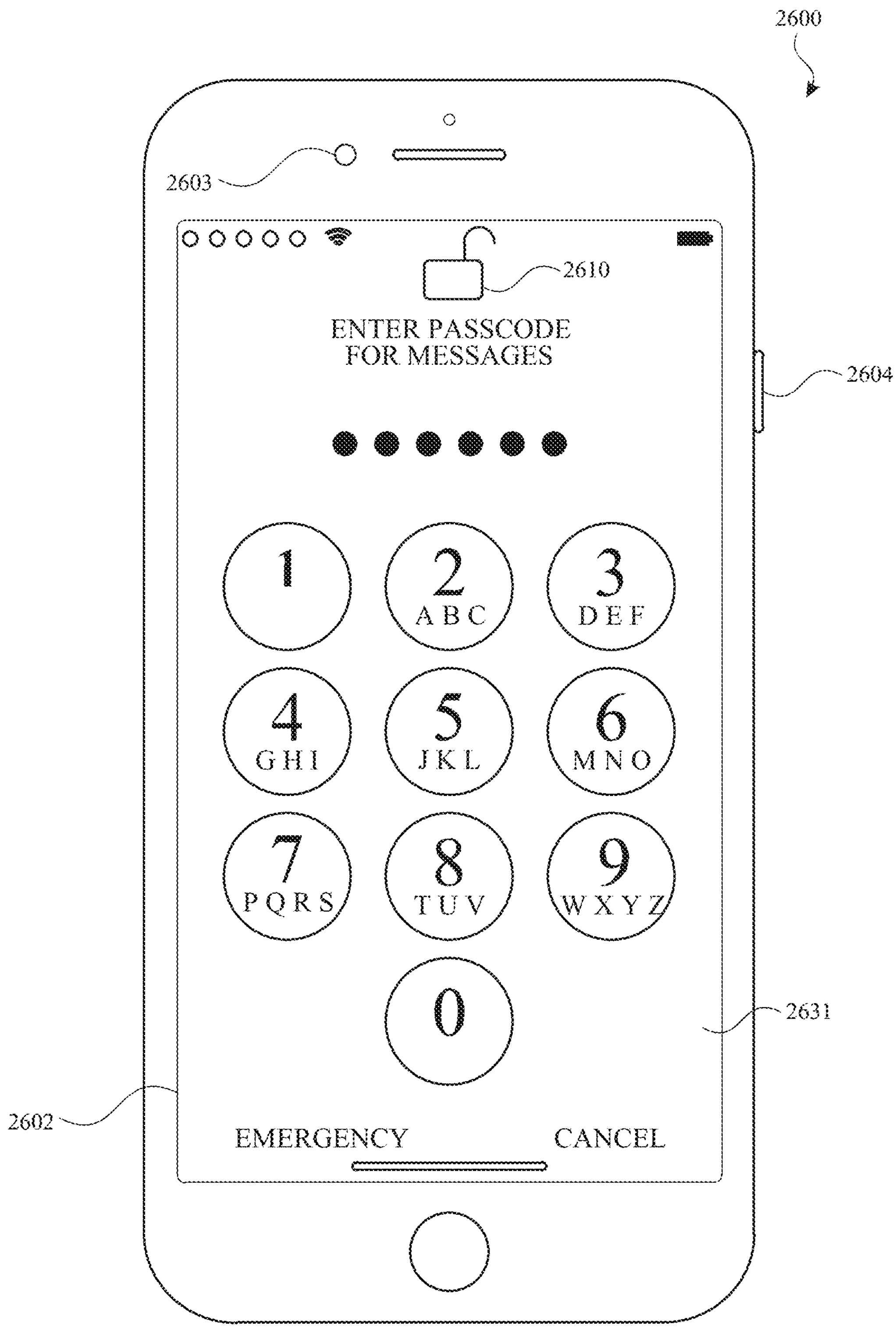
Figure 26A:
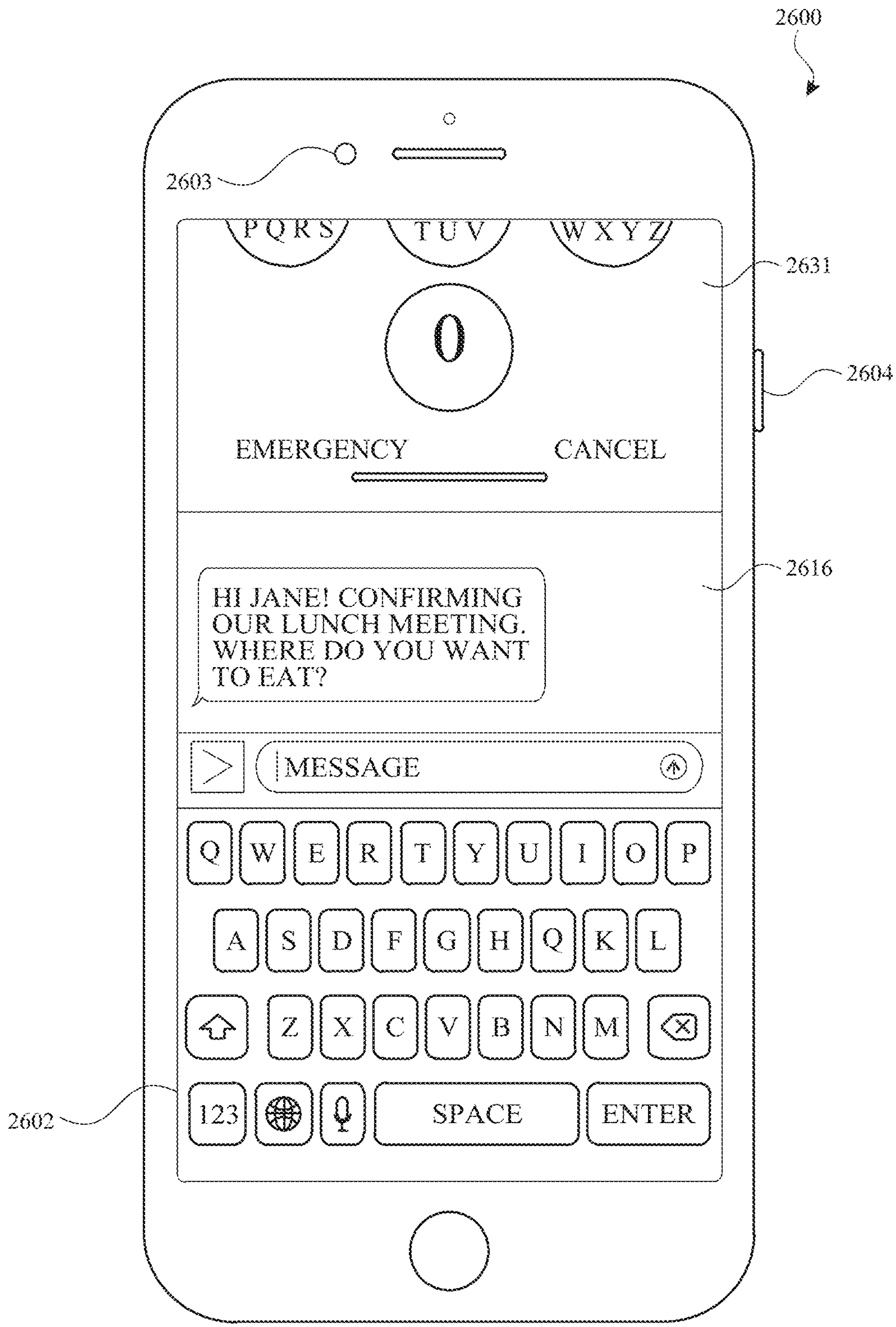
Figure 26A:
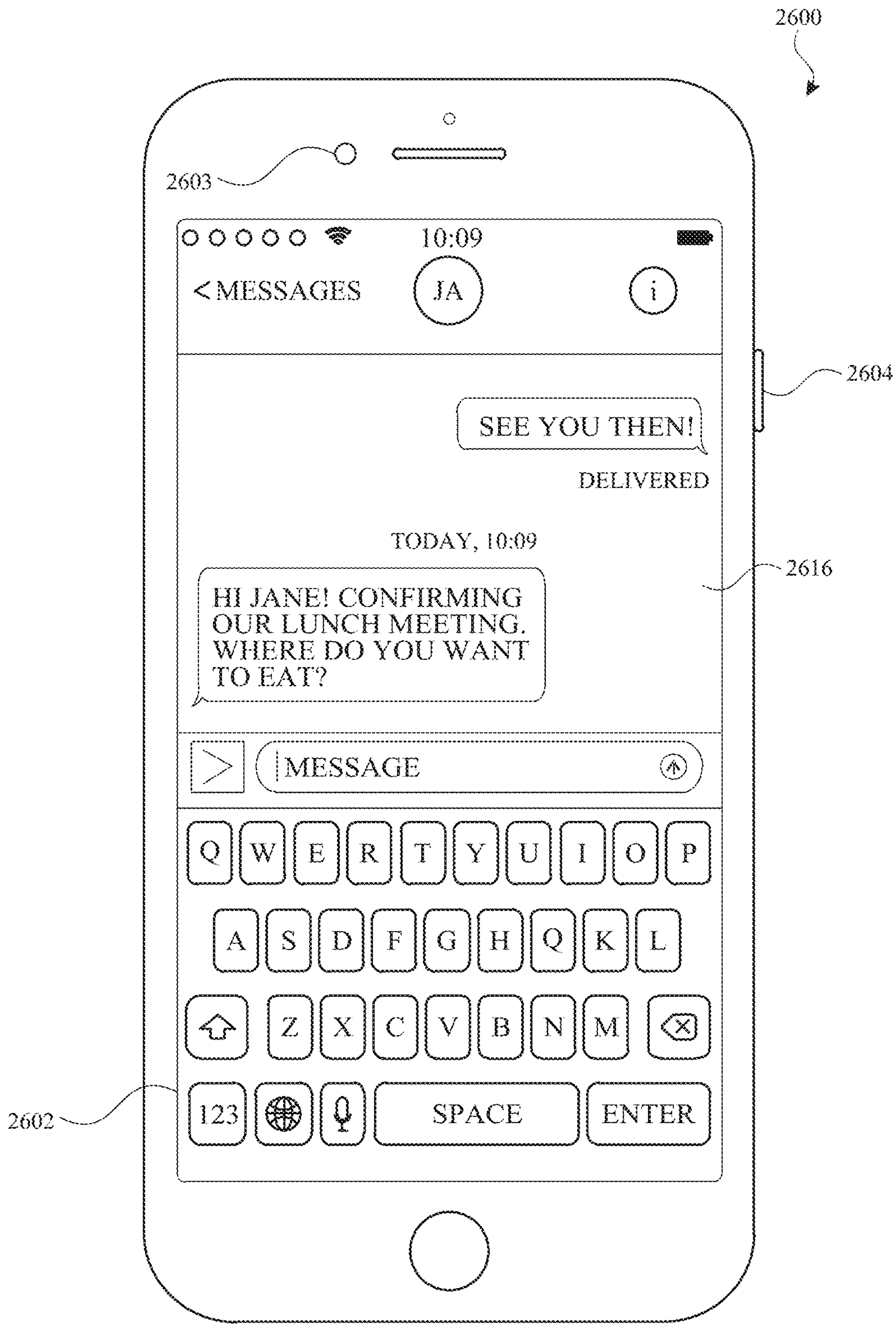
Figure 27A:
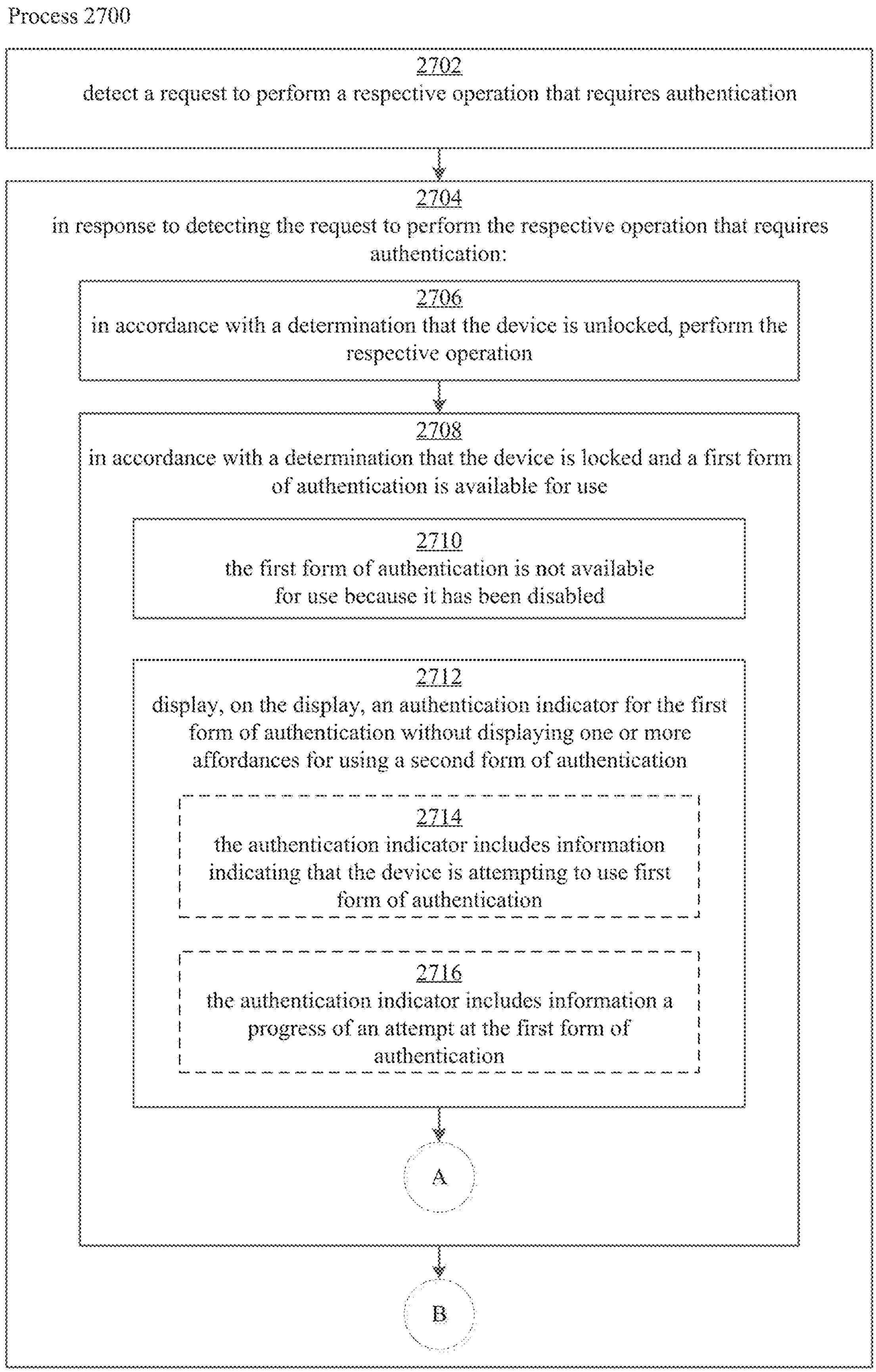
Figure 27B:
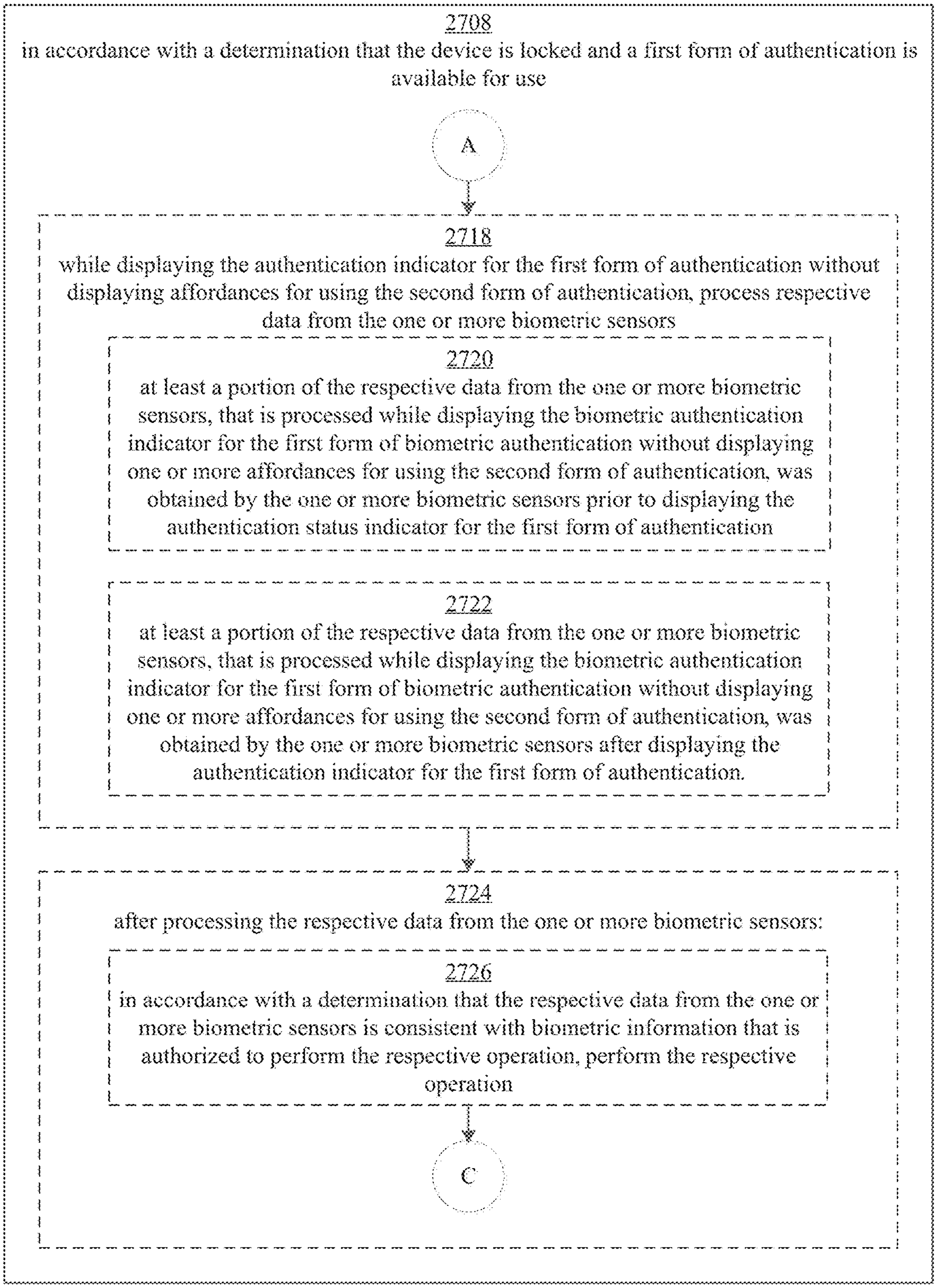
Figure 27C:
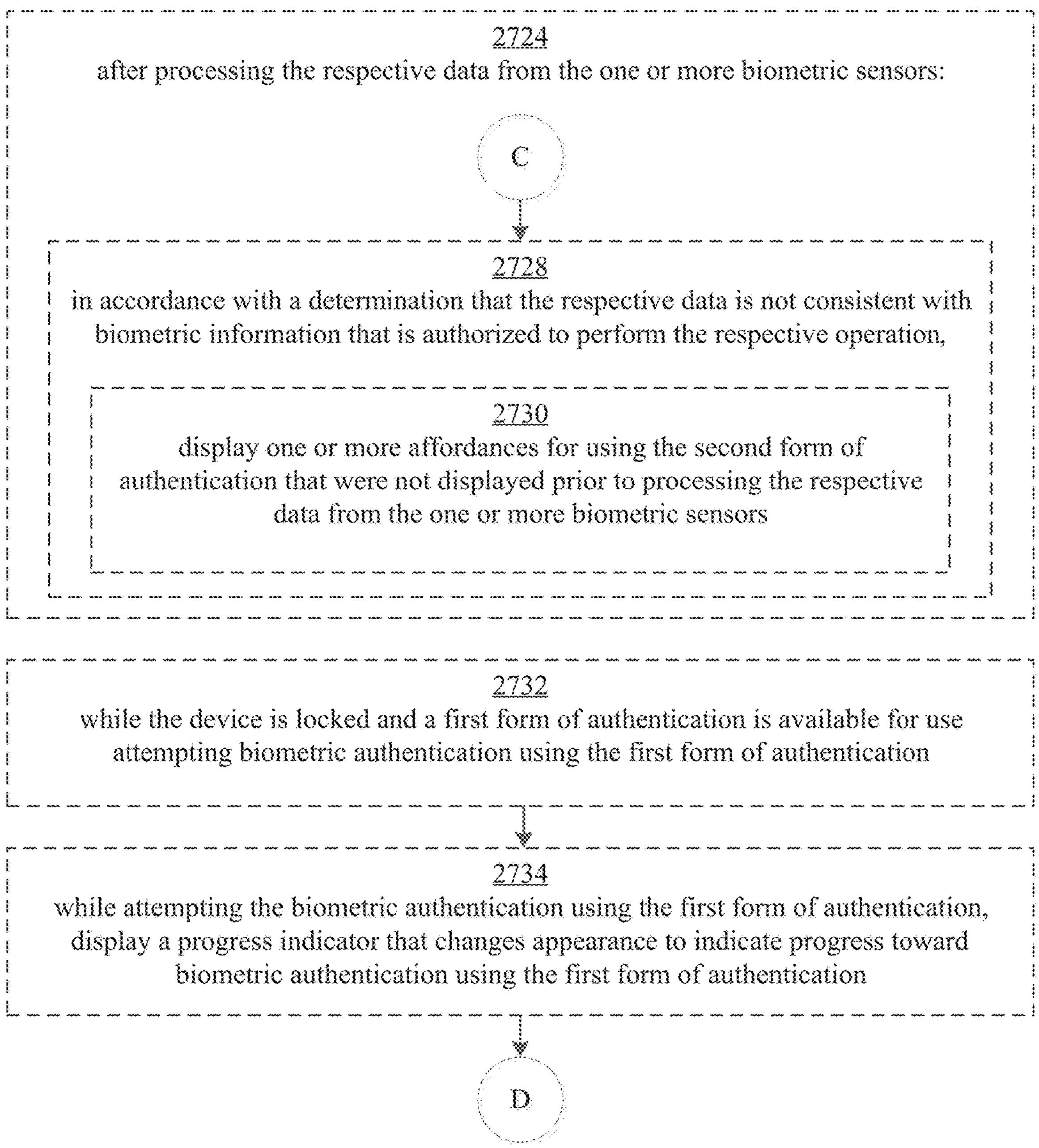

If, during display of the alternative authentication interface 2657, a biometric feature is detected, the electronic device 2600 performs biometric authentication, as described. As shown in FIG. 26Z, the electronic device displays (e.g., replaces display of the locked state indicator 2624 with) biometric progress indicator 2625 to indicate the electronic device is processing biometric data. In FIG. 26AA, the electronic device 2600 determines that biometric authentication is successful. In response, the electronic device displays (replaces display of biometric progress indicator 2625 with) unlocked state indicator 2610 and, optionally, outputs a tactile output 2658 to indicate that the biometric authentication is successful. In some examples, the electronic device 2600 subsequently displays a home screen interface 2614, as shown in FIG. 26AB.

With reference to FIGS. 26AC-AE, if during display of the alternative authentication interface 2657, biometric authentication fails, and at least a portion of an alternative authentication is provided, the electronic device 2600 indicates that the biometric authentication is unsuccessful without providing a tactile output. As shown in FIG. 26AC, the electronic device, while performing biometric authentication (as indicated by biometric progress indicator 2625), receives a portion of an alternative authentication (e.g., passcode) by way of user input (e.g., tap gesture) 2660. In FIG. 26AD, the electronic device determines that the biometric authentication was unsuccessful, and in response, displays the locked state indicator 2627 and further alternates a position of the locked state indicator to simulate a "shake" effect. In some examples, the electronic device 2600 does not output a tactile output, and further maintains display of the alternative authentication interface 2657, as shown in FIG. 26AE.

In FIG. 26AF, the electronic device 2600, while in a locked state, displays locked interface 2620. As described, the locked interface 2620 includes a notification affordance 2622 and a locked state indicator 2624. In some examples, the electronic device receives a request for secured content on the electronic device (e.g., a message associated with notification affordance 2622). The electronic device 2600, for instance, detects activation of the notification affordance 2622. In some examples, the activation of the notification affordance 2622 is a tap gesture 2662.

In some examples, the activation of the notification affordance 2622 is received prior to completion of biometric authentication. Accordingly, as shown in FIG. 26AG, in response to the activation of the notification affordance 2622, the electronic device 2600 displays interstitial interface 2629 including a biometric indicator 2666. The biometric indicator 2666 identifies secured content associated with the received request for secured content in some examples.

As shown in FIG. AH, if, while displaying the interstitial interface 2629, the electronic device 2600 does not detect a biometric feature, the electronic device displays an alternative authentication affordance 2668. In some examples, activation of the alternative authentication affordance 2668 causes the electronic device to display an alternative authentication interface (e.g., alternative authentication interface 2657 of FIG. 26X).

If during display of the alternative authentication interface, a biometric feature is not detected for a predetermined amount of time, and no alternative authentication is provided, the electronic device 2600 transitions to a low-power state (e.g., display-disabled state), as shown in FIG. 26AI.

As described with respect to FIG. AH, the electronic device displays alternative authentication affordance 2668 if no biometric feature is detected. In some examples, a biometric feature is detected after display of alternative authentication affordance 2668, and in response, the electronic device performs biometric authentication, as described above. As shown in FIG. AJ, to indicate that biometric data is being processed, the electronic device 2600 displays biometric progress indicator 2625. In FIG. 26AK, the electronic device 2600 determines that biometric authentication is successful. In response, the electronic device 2600 display unlocked state indicator 2610, and, optionally, provides tactile output 2670 to indicate that the biometric authentication was successful. In some examples, the electronic device 2600 subsequently displays a messaging application interface 2616, as shown in FIG. 26AM. With reference to FIGS. 26AL-AM, some examples, displaying the messaging application interface 2616 includes sliding the interstitial interface 2629 in an upward direction to display (e.g., reveal) messaging application interface 2616, as analogously described with reference to FIGS. 19P-R.

In FIG. 26AN, the electronic device 2600 displays the interstitial interface 2629 having the alternative authentication affordance 2668. While displaying the interstitial interface 2629, the electronic device detects activation of the alternative authentication affordance 2668. In some examples, the activation of the alternative authentication affordance 2668 is a tap gesture 2674 on the alternative authentication affordance 2668.

With reference to FIG. 26AO, in response to activation of the alternative authentication affordance 2668, the electronic device 2600 displays alternative authentication interface 2631. In some examples, the alternative authentication interface 2631 identifies requested secured content ("Enter passcode for messages").

With reference to FIGS. 26AP-AQ, a valid passcode (or password) is received by the electronic device 2600, at least in part, in response to the tap gesture 2076 (FIG. 26AP), and optionally, one or more other inputs indicating additional alphanumeric digits of the valid passcode. As shown in FIGS. 26AR-AS, once a valid passcode has been received, the electronic device is unlocked and displays (e.g., replaces display of the alternative authentication interface 2631 with) the messaging application interface 2616. In some examples, displaying the messaging application interface 2616 includes sliding the alternative authentication interface 2631 in an upward direction to display (e.g., reveal) the messaging application interface 2616, as analogously described with reference to FIGS. 19P-R.

FIGS. 27A-27E are a flow diagram illustrating a method for performing biometric authentication using an electronic device in accordance with some examples. Method 2700 is performed at a device (e.g., 100, 300, 500, 2600) with a display, one or more input devices (e.g., a touchscreen, a mic, a camera), and a wireless communication radio (e.g., a Bluetooth connection, WiFi connection, a mobile broadband connection such as a 4G LTE connection). In some examples, the display is a touch-sensitive display. In some examples, the display is not a touch sensitive display. In some examples, the electronic device includes a plurality of cameras. In some examples, the electronic device includes only one camera. In some examples, the device includes one or more biometric sensors which, optionally, include a camera, such as a infrared camera, a thermographic camera, or a combination thereof. In some examples, the device further includes a light-emitting device, such as an IR flood light a structured light projector, or a combination thereof. The light-emitting device is, optionally, used to illuminate the biometric feature (e.g., the face) during capture of biometric data of the biometric feature by the one or more biometric sensors. Some operations in method 2700 are, optionally, combined, the orders of some operations are, optionally, changed, and some operations are, optionally, omitted.

As described below, method 2700 provides an intuitive way for performing biometric authentication. The method reduces the cognitive burden on a user for authentication of biometric features, thereby creating a more efficient human-machine interface and intuitive user experience. For battery-operated computing devices, enabling a user to performing authentication of biometric features faster and more efficiently conserves power and increases the time between battery charges.

In some examples, while the electronic device (e.g., 2700) is in a locked state in which the device is not authorized to perform a respective operation, the electronic device displays a first graphical indication (e.g., 2624) (e.g., a closed lock icon) that indicates that the device is in the locked state. Displaying a first graphical indication that indicates that the device is in the locked state provides the user with a readily available indication as to the state of the device. In turn, the user is informed as to what functions of the device are enabled and/or available, thereby making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, while the device is in an unlocked state in which the device is authorized to perform the respective operation, displaying a second graphical indication (e.g., 2610) (e.g., an open lock icon) that indicates that the device is in the unlocked state in place of the first graphical indication. Displaying a second graphical indication that indicates that the device is in the unlocked state provides the user with a readily available indication as to the state of the device. In turn, the user is informed as to what functions of the device are enabled and/or available, thereby making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the first graphical indication and the second graphical indication are displayed at a respective location (e.g., substantially near the top-center of the display 2602) in a user interface (e.g., 2606, 2620).

In some examples, the electronic device detects (2702) a request to perform a respective operation that requires authentication. In some examples, the request to perform a respective operation that requires authentication is a request (e.g., 2612) to display a home screen (e.g., 2614) with a plurality of application open icons that, when selected, open corresponding applications, or a request to display an application user interface corresponding to a selected notification. In some examples, the request to perform a respective operation includes a home input (e.g., 2612). In some examples, the home input is a selection of a home button or a home gesture, such as an upward swipe from a respective edge of the display, such as a bottom of the display. In some examples, the request to perform a respective operation includes selection (e.g., 2615) of a notification (e.g., 2608). In some examples, the selection of a notification is a tap, long press, hard press, or swipe on a notification user interface object. In some examples, the respective operation includes displaying a home screen that includes a plurality of application icons for opening different applications. In some examples, the plurality of application icons for opening different applications are application icons that, when selected cause a corresponding application to be opened. In some examples, the home screen also includes one or more widgets, system status indicators, device controls, etc. In some examples, the respective operation includes displaying an application user interface (e.g., 2616) for an application that corresponds to the notification. In some examples, the application interface includes information specifically related to the notification (e.g., the notification is a notification of an electronic communication and the application user interface includes a representation of the electronic communication or the notification).

In response to detecting the request to perform the respective operation that requires authentication (2704), in accordance with a determination that the device is unlocked, the electronic device performs (2706) the respective operation. Further, in accordance with a determination that the device is locked and a first form of authentication is available for use (2708), the electronic device displays (2712), on the display (e.g., 2602), an authentication indicator (e.g., 2625) for the first form of authentication without displaying one or more affordances (e.g., 2636, 2638) for using a second form of authentication. Displaying the authentication indicator without displaying affordances for using a second form of authentication provides the user with an intuitive interface in which the device forgoes providing additional options while biometric authentication is performed. Providing an intuitive interface in this manner enhances the operability of the device (e.g., avoids a user attempting alternative authentication prior to completion of biometric authentication) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the authentication indicator is a visual indication that the first form of authentication is being attempted by the device, such as text or graphical elements describing the first form of authentication (e.g., password, passcode, fingerprint, or other form of authentication). In some examples, the first form of authentication is a form of biometric authentication based on data obtained by the one or more biometric sensors (2710) (e.g., a contactless form of biometric authentication such as face recognition or iris recognition). In some examples, the authentication indicator includes information indicating that the device is attempting to use first form of authentication (2714). In some examples, the authentication indicator includes a graphic or text description indicating that face biometric authentication is available such as "Face ID" or "Face ID to open Messages"). In some examples, the authentication indicator is displayed along with an option to cancel authentication. In some examples, the authentication indicator is displayed along with an option to display emergency information (e.g., an emergency call user interface and/or emergency medical information) without unlocking the device. In some examples, the authentication indicator includes information of progress of an attempt at the first form of authentication (2716), such as a progress indicator as described in greater detail with respect to FIGS. 11A-11O.

In some examples, while displaying the authentication indicator for the first form of authentication without displaying affordances for using the second form of authentication, the electronic device processes (2718) respective data from the one or more biometric sensors (e.g., 2603). In some examples, at least a portion of the respective data from the one or more biometric sensors, that is processed while displaying the biometric authentication indicator for the first form of biometric authentication without displaying one or more affordances for using the second form of authentication, was obtained by the one or more biometric sensors prior to displaying the authentication indicator for the first form of authentication (2720). In some examples, at least a portion of the respective data from the one or more biometric sensors, that is processed while displaying the biometric authentication indicator for the first form of biometric authentication without displaying one or more affordances for using the second form of authentication, was obtained by the one or more biometric sensors after displaying the authentication indicator for the first form of authentication (2722).

In some examples, after processing the respective data from the one or more biometric sensors (2724), in accordance with a determination that the respective data from the one or more biometric sensors is consistent with biometric information that is authorized to perform the respective operation (e.g., the device detects an authorized face in the respective biometric data), the electronic device performs (2726) the respective operation. Performing the respective operation in response to determining that the respective data from the one or more biometric sensors is consistent with biometric information that is authorized to perform the respective operation enhances the operability of the device by, in some examples, allowing a user to authenticate with a device without having to manually authenticate, thereby making the user-device interface more efficient.

In some examples, further after processing the respective data from the one or more biometric sensors, in accordance with a determination that the respective data is not consistent with biometric information that is authorized to perform the respective operation (2728) (e.g., the device detects no face or detects a face that is not consistent with authorized faces), the electronic device displays (2730) one or more affordances (e.g., 2636, 2638) for using the second form of authentication that were not displayed prior to processing the respective data from the one or more biometric sensors. Displaying the one or more affordances for using the second form of authentication that were not displayed prior to processing the respective data from the one or more biometric sensors provides the user with a quick alternative method to access operations (e.g., locked operations) of the device that require successful authentication when the biometric data is unsuccessful. Providing additional control options with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the one or more affordances includes displaying a "use passcode" button, a "use password" button, or a keypad/keyboard for entering a passcode/password. In some examples, the one or more affordances for using the second form of authentication are displayed after a respective delay during which the authentication indicator for the first form of authentication is displayed without displaying one or more affordances for using a second form of authentication.

In some examples, displaying the one or more affordances includes: in accordance with a determination that a biometric feature that corresponds to the first form of authentication is detected by the one or more biometric sensors, displaying the one or more affordances for using the second form of authentication after a first time period has elapsed (e.g., since the authentication indicator was displayed); and in accordance with a determination that no biometric feature that corresponds to the first form of authentication is detected by the one or more biometric sensors, displaying the one or more affordances for using the second form of authentication after a second time period has elapsed (e.g., since the authentication indicator was displayed). In some examples, the second time period is different from (e.g., longer than or shorter than) the first time period.

In some examples, displaying the one or more affordances includes: in accordance with a determination that a biometric feature that can be used in the first form of authentication but that is not consistent with authorized biometric features has been detected, displaying the user interface (e.g., 2656) for the second form of authentication (e.g., displaying a plurality of character entry keys (e.g., a keyboard or keypad) for entering a sequence of characters for authentication (e.g., a password or passcode)) concurrently with respective instructions to provide one or more inputs to authenticate with the second form of authentication (e.g., displaying the instructions to use the one or more character entry keys to enter the sequence of characters for authentication (e.g., the passcode keypad is displayed with "enter passcode to unlock" instructions)); and in accordance with a determination that no biometric feature that corresponds to the first form of authentication has been detected by the one or more biometric sensors, displaying the user interface (e.g., 2657) for the second form of authentication (e.g., displaying a plurality of character entry keys (e.g., a keyboard or keypad) for entering a sequence of characters for authentication (e.g., a password or passcode)) without displaying the respective instructions to provide one or more inputs to authenticate with the second form of authentication. In some examples, the user interface for the second form of authentication is displayed without displaying the respective instructions to use the one or more character entry keys to enter the sequence of characters for authentication (e.g., the passcode keypad is displayed without "enter passcode to unlock" instructions)). In some examples, the plurality of character entry keys are initially displayed without the respective instructions to use the one or more character entry keys to enter the sequence of characters for authentication (e.g., while the device is attempting to use the first form of authentication) and then, when using the first form of authentication fails, the device displays explicit instructions to use the one or more character entry keys to enter the sequence of characters for authentication.

In some examples, displaying the one or more affordances includes: in accordance with a determination that the request to perform the respective operation includes a home input, displaying a plurality of character entry keys (e.g., a keyboard or keypad) for entering a sequence of characters for authentication (e.g., a password or passcode); and in accordance with a determination that the request to perform the respective operation includes selection of a notification, displaying a passcode affordance that, when activated causes display of a plurality of character entry keys (e.g., a keyboard or keypad) for entering a sequence of characters for authentication (e.g., a password or passcode). In some examples, the passcode affordance is restricted from activation in response to tap inputs and is responsive to one or more other types of inputs that include additional input requirements beyond a touch input. In some examples, the one or more additional input requirements include a requirement that the input is a hard press input (e.g., a requirement that the input reach a characteristic intensity that is above a respective intensity threshold), a requirement that the input is a long press input (e.g., a requirement that the input include a contact that is maintained on the touch-sensitive surface for more than a predetermined amount of time without moving more than a predetermined distance), and/or a requirement that the input is a swipe input (e.g., a requirement that the input include movement of a contact by more than a threshold amount of movement in a respective direction). Restricting activation in response to tap inputs in this manner avoids spurious (e.g., accidental and/or unintentional) activations of the passcode affordance, providing improved control and usability of the electronic device, thereby reducing user mistakes when operating/interacting with the device) which, additionally, reduces power usage and improves battery life of the device by enabling the user to use the device more quickly and efficiently.

In some examples, after displaying one or more affordances for using the second form of authentication that were not displayed prior to processing the respective data from the one or more biometric sensors: in accordance with a determination that the request to perform the respective operation includes a home input, the electronic device waits for additional input for a first delay time period before (automatically, without further user input) ceasing to display the one or more affordances for using the second form of authentication (e.g., turning off the display); and in accordance with a determination that the request to perform the respective operation includes selection of a notification, the electronic device waits for additional input for a second delay time period before (automatically, without further user input) ceasing to display the one or more affordances for using the second form of authentication (e.g., turning off the display). In some examples, the second delay time period is different from (e.g., shorter than or longer than) the first delay time period.

In some examples, while the device is locked and a first form of authentication is available for use, the electronic device attempts (2732) biometric authentication using the first form of authentication. In some examples, the device is locked and/or a first form of authentication is available for use in response to the request to perform the respective operation, in response to an attempt to use the second form of authentication, or in response to an input requesting authentication such as lifting the device, pressing a button (e.g., 2604) on the device, tapping a lock icon on the device, or tapping a touch-sensitive display of the device). In some examples, while attempting the biometric authentication using the first form of authentication, the electronic device displays (2734) a progress indicator (e.g., as depicted by progress indicators 2624 and/or 2625) that changes appearance to indicate progress toward biometric authentication using the first form of authentication. In some examples, the electronic progress indicator is a progress bar or an icon that changes from a "face detection" icon or an animation to a "face analysis" icon or animation. In some examples, while attempting the biometric authentication using the first form of authentication, the device replaces the first graphical indication with a progress indicator. In some examples, after completing an attempt at the first form of authentication, in accordance with a determination that the authentication was unsuccessful, the electronic device replaces the progress indicator with the first graphical indication (e.g., the closed lock icon); and in accordance with a determination that the authentication was successful, the electronic device replaces the progress indicator with the second graphical indication (e.g., the open lock icon).

In some examples, after attempting the biometric authentication using the first form of authentication (2736), in accordance with a determination that the biometric authentication with the first form of authentication is successful, the electronic device updates (2738) the progress indicator in a first manner (e.g., displaying a check mark or an open lock icon) to indicate the successful authentication with the first form of authentication (and, optionally, performing the respective operation); and/or generates a second tactile output (e.g., that is different from the first tactile output that indicates authentication failure) that indicates an authentication success (e.g., a single tap).

In some examples, after attempting the biometric authentication using the first form of authentication, in accordance with a determination that the biometric authentication with the first form of authentication detects a biometric feature that can be used in the first form of authentication but that is not consistent with authorized biometric features, the electronic device updates (2740) the progress indicator in a second manner (e.g., shaking a lock icon or face icon side to side to indicate that authentication failed) to indicate unsuccessful authentication. In some examples, the second manner of updating the progress indicator is different from the first manner of updating the progress indicator (2742). In some examples, the electronic device generates a first tactile output that indicates an authentication failure (e.g., a triple tap).

In some examples, after attempting the biometric authentication using the first form of authentication, in accordance with a determination that the biometric authentication with the first form of authentication does not detect a biometric feature that can be used in the first form of authentication, the electronic device updates (2744) the progress indicator in a third manner (e.g., displaying a closed lock icon without shaking the lock icon side to side to indicate that authentication failed) that is different from the first manner and the second manner.

In some examples, after attempting the biometric authentication using the first form of authentication, in accordance with a determination that the biometric authentication with the first form of authentication does not detect a biometric feature that can be used in the first form of authentication, the electronic device displays a graphical indication that a successful authentication has not occurred without generating a tactile output. In some examples, the device does not generate the first tactile output or another tactile output that indicates an authentication failure, because the device did not recognize any biometric feature that could be used for the first form of authentication).

In some examples, after attempting the biometric authentication using the first form of authentication for a first time: the electronic device displays a user interface (e.g., 2654) for the second form of authentication that includes a plurality of character entry keys (e.g., a keyboard or keypad) for entering a sequence of characters for authentication (e.g., a password or passcode). Further, the electronic device, while displaying the user interface for the second form of authentication, attempts the biometric authentication using the first form of authentication for a second time. Further, in accordance with a determination that the biometric authentication with the first form of authentication is successful, the electronic device performs the respective operation (and, optionally, updates the progress indicator in a first manner (e.g., displaying a check mark or an open lock icon (e.g., 2610)) to indicate the successful authentication with the first form of authentication). Further, in accordance with a determination that the biometric authentication with the first form of authentication detects a biometric feature that can be used in the first form of authentication but that is not consistent with authorized biometric features before receiving input entering less than a threshold number of characters (e.g., less than 1, 2, 3, 4, or 5 characters) via one or more of the plurality of character entry keys, the electronic device forgoes performing the respective operation and generates a first tactile output that indicates an authentication failure (e.g., a triple tap) (and, optionally, displays a graphical indication that a successful authentication has not occurred). Further, in accordance with a determination that the biometric authentication with the first form of authentication detects a biometric feature that can be used in the first form of authentication but that is not consistent with authorized biometric features after receiving input entering at least the threshold number of characters (e.g., less than 1, 2, 3, 4, or 5 characters) via one or more of the plurality of character entry keys, the electronic device performs the respective operation and displays a graphical indication that a successful authentication has not occurred without generating a tactile output (e.g., a closed lock icon).

In some examples, in response to detecting the request to perform the respective operation that requires authentication: in accordance with a determination that the device is locked and the first form of biometric authentication is not available for use (e.g., when the request to perform the respective operation is received), the electronic device displays (2746) one or more affordances for using the second form of authentication (e.g., a passcode or password entry user interface or a prompt to use a second form of biometric authentication such as a fingerprint authentication). In some examples, the first form of authentication is not available for use because it has been disabled (2748). In some examples, the first form of authentication is not available for use due to more than a threshold number of failed biometric authentication attempts with the first form of biometric authentication, due to a restart of the device, or due to a user request to disable the first form of biometric authentication. In some examples, the first form of authentication is disabled in response to user entry into an emergency option user interface without selecting an option that corresponds to a request to access additional information at the device (e.g., the user triggers display of the emergency option user interface by pressing two or more buttons concurrently for more than a threshold amount of time and then selects an option to shut down the device or cancel display of the emergency option user interface rather than selecting an option to display medical information or display an emergency dialing interface). In some examples, the first form of authentication is disabled in response to user selection of an option to disable the first form of biometric authentication (e.g., via a biometric authentication setting in a settings user interface). In some examples, the first form of authentication is not available for use because operation of the one or more biometric sensors is limited by current environmental and/or device conditions that reduce the ability of the one or more biometric sensors to operate within predefined parameters (2750). In some examples, the device is too hot, the device is too cold, there is too much light in an environment of the device, there is too little light in the environment of the device, and/or the battery of the device is not sufficiently charged to run the one or more biometric sensors.

In some examples, the electronic device detects a first input (e.g., 2650) (e.g., a tap input) at a location that corresponds to the respective location in the user interface. In some examples, in response to detecting the first input at the location that corresponds to the respective location in the user interface, in accordance with a determination that the device is in a locked state (e.g., the tap input was detected on the closed lock icon), the electronic device attempts the first form of authentication. Attempting the first form of authentication in response to detecting the first input at the location that corresponds to the respective location in the user interface and in accordance with a determination that the device is in a locked state provides an intuitive and convenient feature in which the first form of authentication is initiated, thereby making the user-device interface more efficient, which, additionally, reduces power usage and improves battery life of the device by enabling the user to use the device more quickly and efficiently.

In some examples, the electronic device detects a second input (e.g., a tap input) at a location that corresponds to the respective location in the user interface. In some examples, in response to detecting the second input at the location that corresponds to the respective location in the user interface, in accordance with a determination that the device is in an unlocked state (e.g., the tap input was detected on the open lock icon), the electronic device transitions the device from the unlocked state to the locked state. In some examples, the respective location is on a cover sheet user interface that is displayed when the device screen is initially turned on, and the second graphical indication (e.g., the open lock icon) is displayed when the cover sheet user interface is displayed on the device while the device is still in the unlocked state, while the first graphical indication (e.g., the lock icon) is displayed when the cover sheet user interface is displayed on the device while the device is in the locked state.

Note that details of the processes described above with respect to method 1200 (e.g., FIGS. 27A-27E) are also applicable in an analogous manner to the methods described herein. For example, method 2700 optionally includes one or more of the characteristics of the various methods described herein with reference to methods 800, 1000, 1200, 1400, 1600, 1800, 2000, 2200, and 2500. For example, the enrolled biometric data described in method 1200 can be used to perform biometric authentication as described with respect to FIGS. 26L-N. For another example, one or more interstitial interfaces as described in methods 2000 and 2700 optionally are displayed in response to receipt of an input prior to completion of a biometric authentication process. For brevity, these details are not repeated herein.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 27A-27E are, optionally, implemented by components depicted in FIGS. 1A-1B. For example, detecting operation 2702, performing operation 2706, displaying operation 2712, and display operation 2746 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some examples, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 28A-28AA illustrate exemplary user interfaces for preventing retrying biometric authentication, in accordance with some examples. As described in greater detail below, the exemplary examples of the user interfaces illustrated in FIGS. 28A-28AA are used to illustrate the processes described below, including the processes in FIGS. 29A-29B.

FIG. 28A illustrates electronic device 2800 (e.g., portable multifunction device 100, device 300, device 500, or device 1700). In the exemplary examples illustrated in FIGS. 28A-28AA, electronic device 2800 is a smartphone. In other examples, electronic device 2800 can be a different type of electronic device, such as a wearable device (e.g., a smartwatch). Electronic device 2800 includes display 2802, one or more input devices (e.g., touchscreen of display 2802 and a microphone), and a wireless communication radio. In some examples, the electronic device includes a plurality of cameras. In some examples, the electronic device includes only one camera. In FIG. 28A, the electronic device includes biometric sensor 2803. In some examples, the biometric sensor is one or more biometric sensors that can include a camera, such as an infrared camera, a thermographic camera, or a combination thereof. In some examples, biometric sensor 2803 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

Figure 28B:
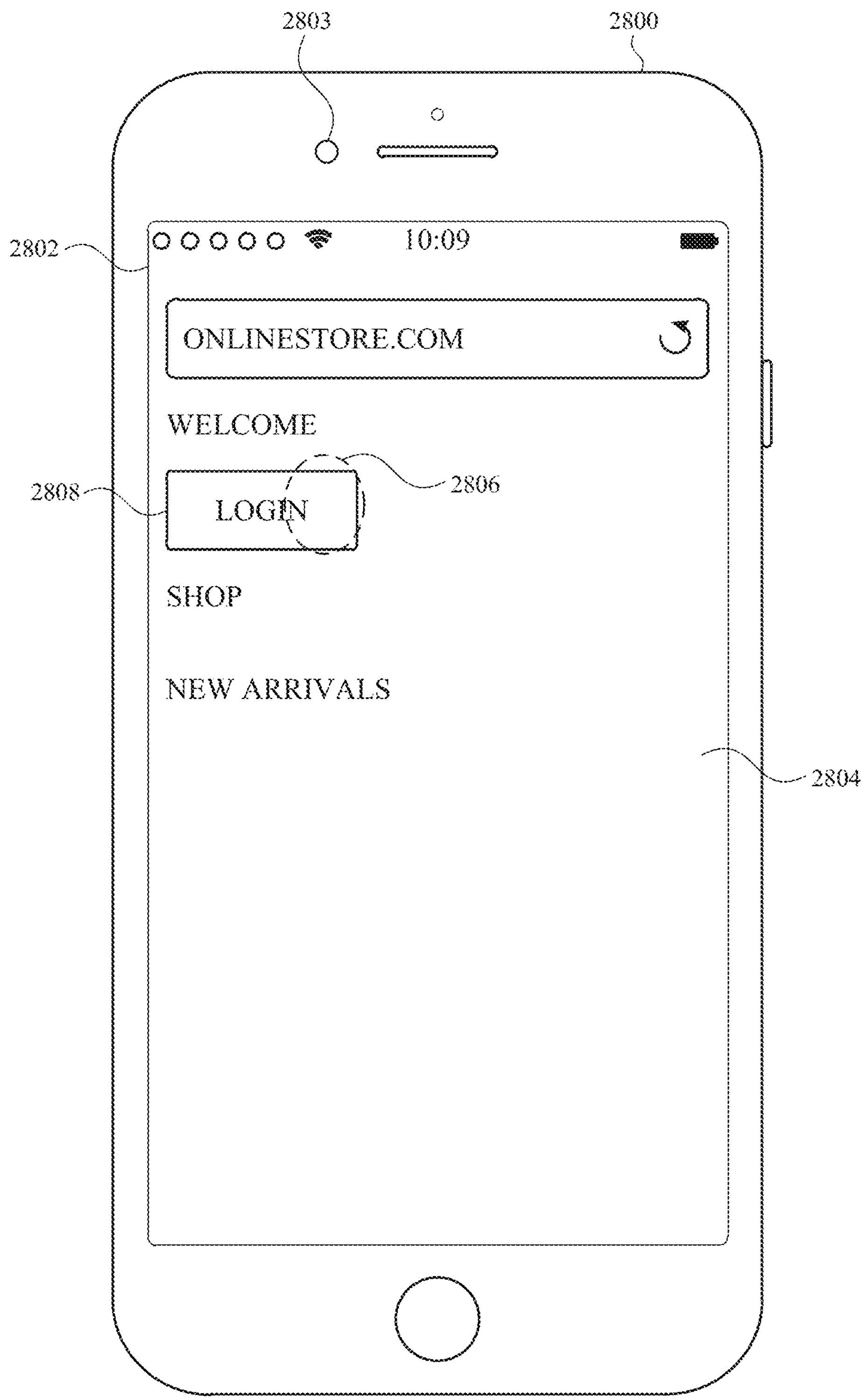

In FIG. 28A, electronic device 2800 displays, on display 2802, user interface 2804 of an application. The application is a mobile browser application, and user interface 2804 corresponds to a website (onlinestore.com). In FIG. 28B, electronic device 2800 detects tap gesture 2806 on log-in affordance 2808. Electronic device 2800 identifies tap gesture 2806 as a request to load log-in user interface 2810 (shown in FIG. 28C). Electronic device 2800 also identifies tap gesture 2806 as a request to autofill fillable fields, username field 2812 and password field 2814, in log-in user interface 2810 with credential information (e.g., a username and password that enables a user to successfully log-in to an account). The request to autofill requires biometric authentication in order to proceed with autofilling the fillable fields. In some examples, the request also includes a request to automatically log-in the user such that the user does not need to tap a submit affordance (e.g., 2860 in FIG. 28Z) in order to submit credentials and log-in.

Figure 28C:
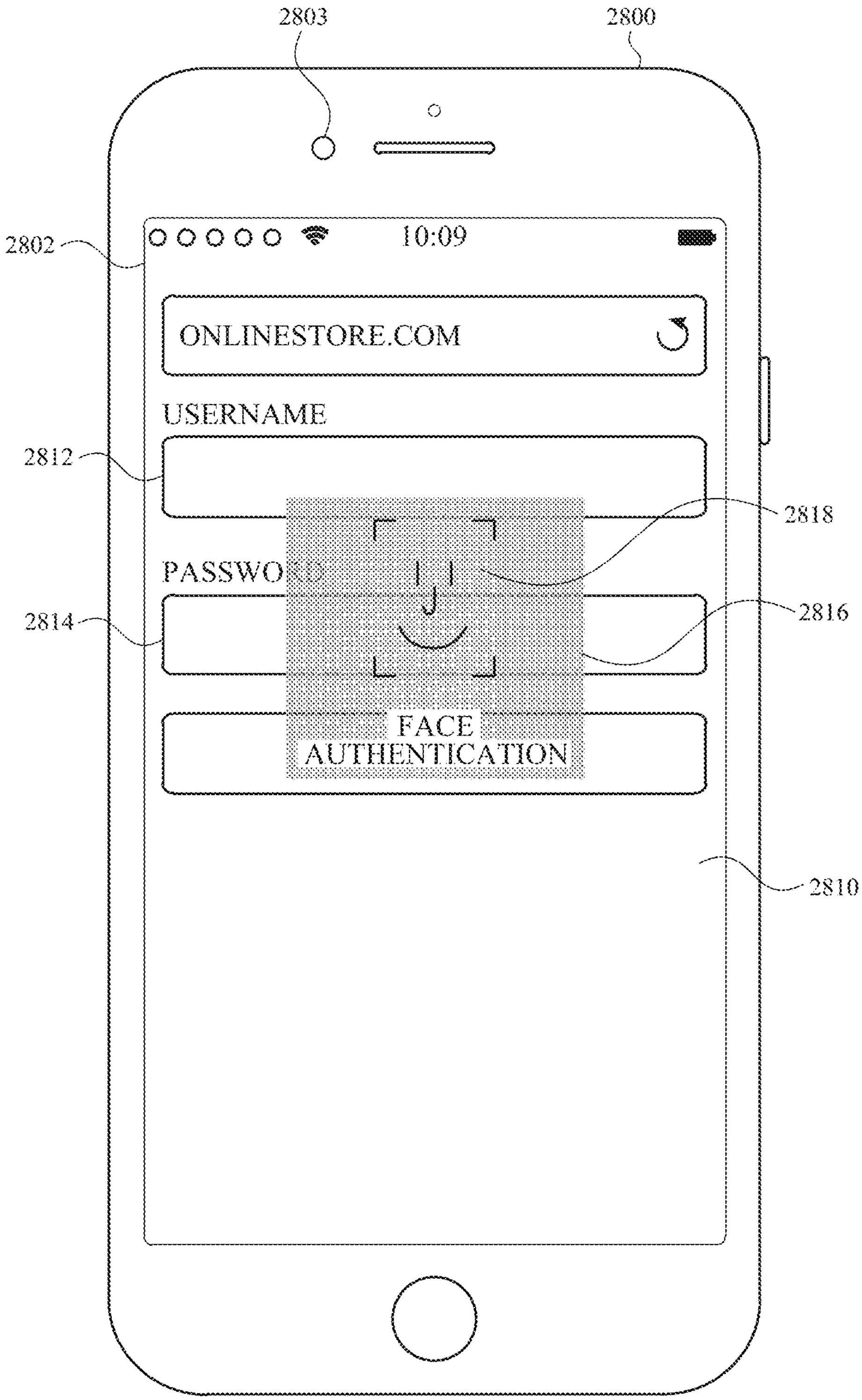

In FIG. 28C, in response to tap gesture 2806 (e.g., the request to autofill the fillable fields), electronic device 2800 uses biometric sensor 2803 to determine whether certain biometric authentication criteria have been met. Electronic device 2800 captures and processes (e.g., analyzes) the biometric data from biometric sensor 2803 to determine, based on the biometric data, whether the biometric feature (or a portion thereof) satisfies biometric authentication criteria (e.g., determine whether the biometric data matches, within a threshold, a biometric template). Biometric sensor 2803 is contactless such that the sensor is configured to perform biometric authentication without physical input from the user (e.g., without any additional gestures after tap gesture 2806). As a result, electronic device 2800 initiates biometric authentication using biometric sensor 2803 without needing to receive an explicit request from a user to initiate biometric authentication.

Performing biometric authentication includes displaying biometric authentication interface 2816 having biometric authentication glyph 2818. Biometric authentication glyph 2818 is a simulation of a representation of a biometric feature (e.g., a face). As shown in FIG. 28C, biometric authentication interface 2816 is overlaid on at least a portion of log-in user interface 2810. Biometric authentication interface 2816, optionally, is an operating system level interface (e.g., an interface generated by an operating system of the device), and log-in user interface 2810 is an application-level interface (e.g., a user interface generated by a third-party application that is separate from the operating system of the device). In some examples, the displayed biometric authentication interface is approximately centered along a horizontal and/or vertical axis such as in FIGS. 28B-28E. In some examples, electronic device 2800 displays the biometric authentication interface at the top, bottom, side, or in a corner of display 2802. For example, electronic device 2800 displays the biometric authentication interface near the top of display 2802, such as in, for example, FIG. 30AL. In some examples, electronic device 3000 does not display the biometric authentication interface while biometric authentication is being performed.

Figure 28D:
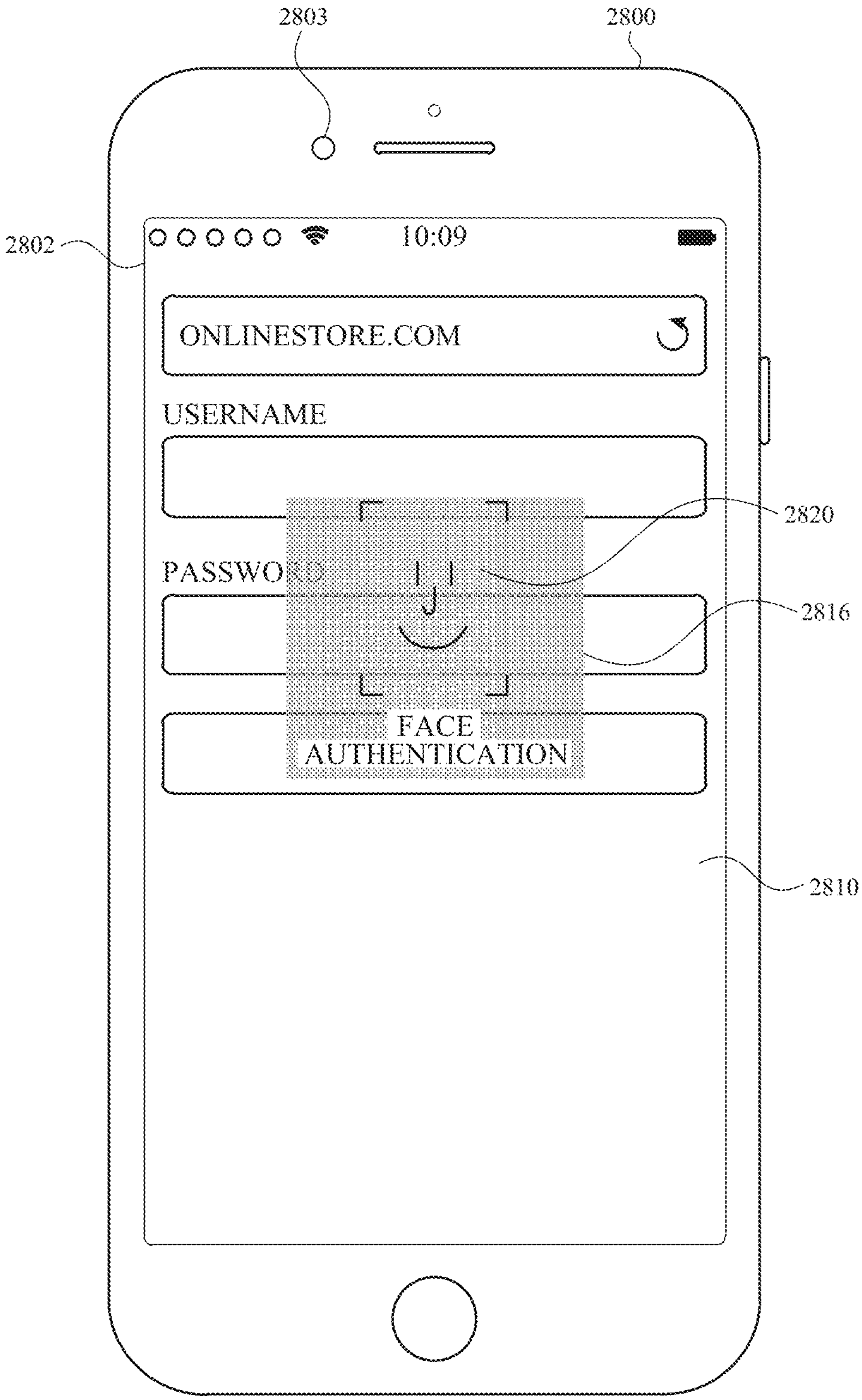
Figure 28E:
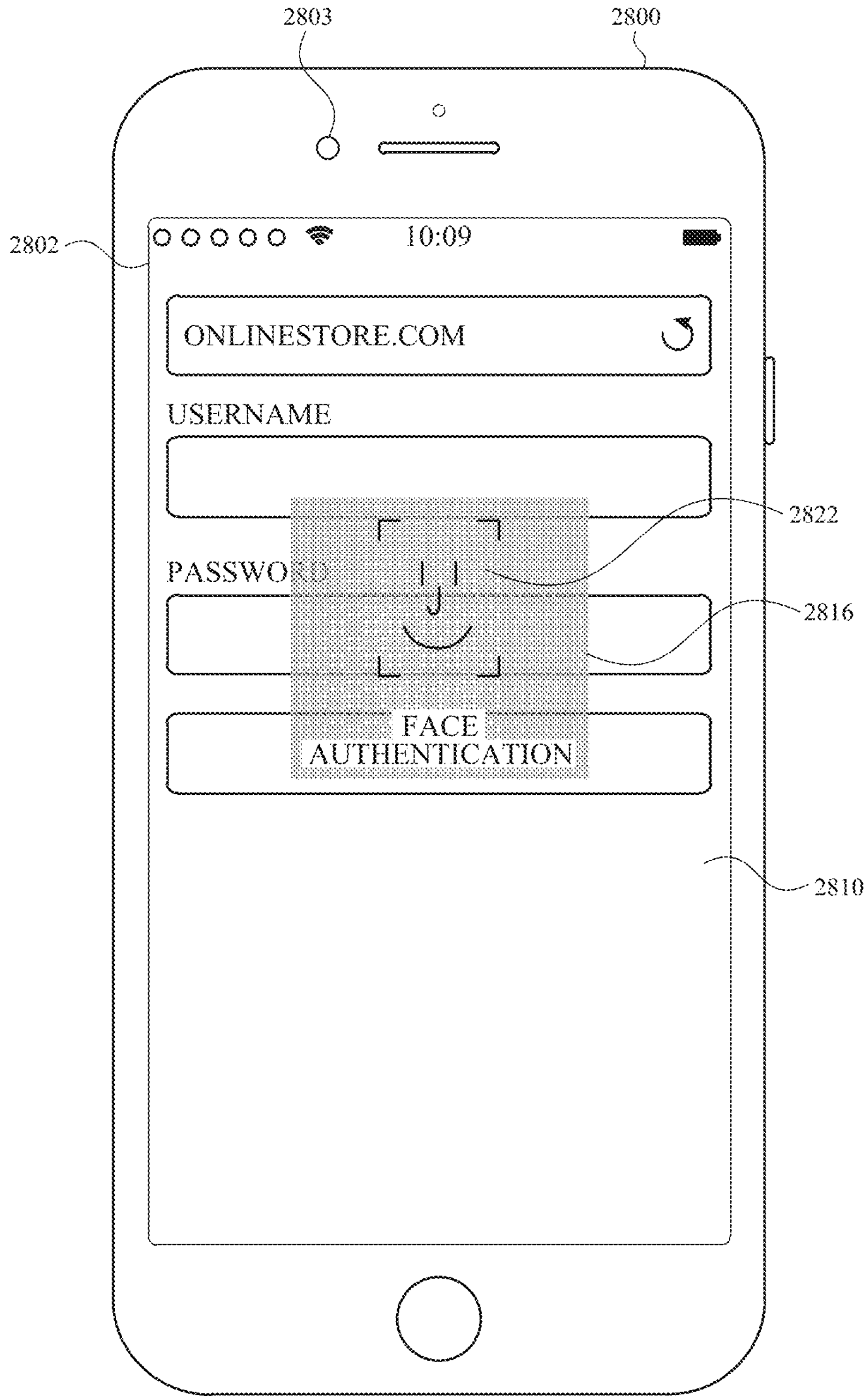

In FIGS. 28D-28E, electronic device 2800 displays a biometric authentication animation including biometric authentication glyph 2820 in FIG. 28D and biometric authentication glyph 2822 in FIG. 28E, which serve as a portion of the animation during which biometric sensor 2803 attempts to obtain biometric data.

Figure 28F:
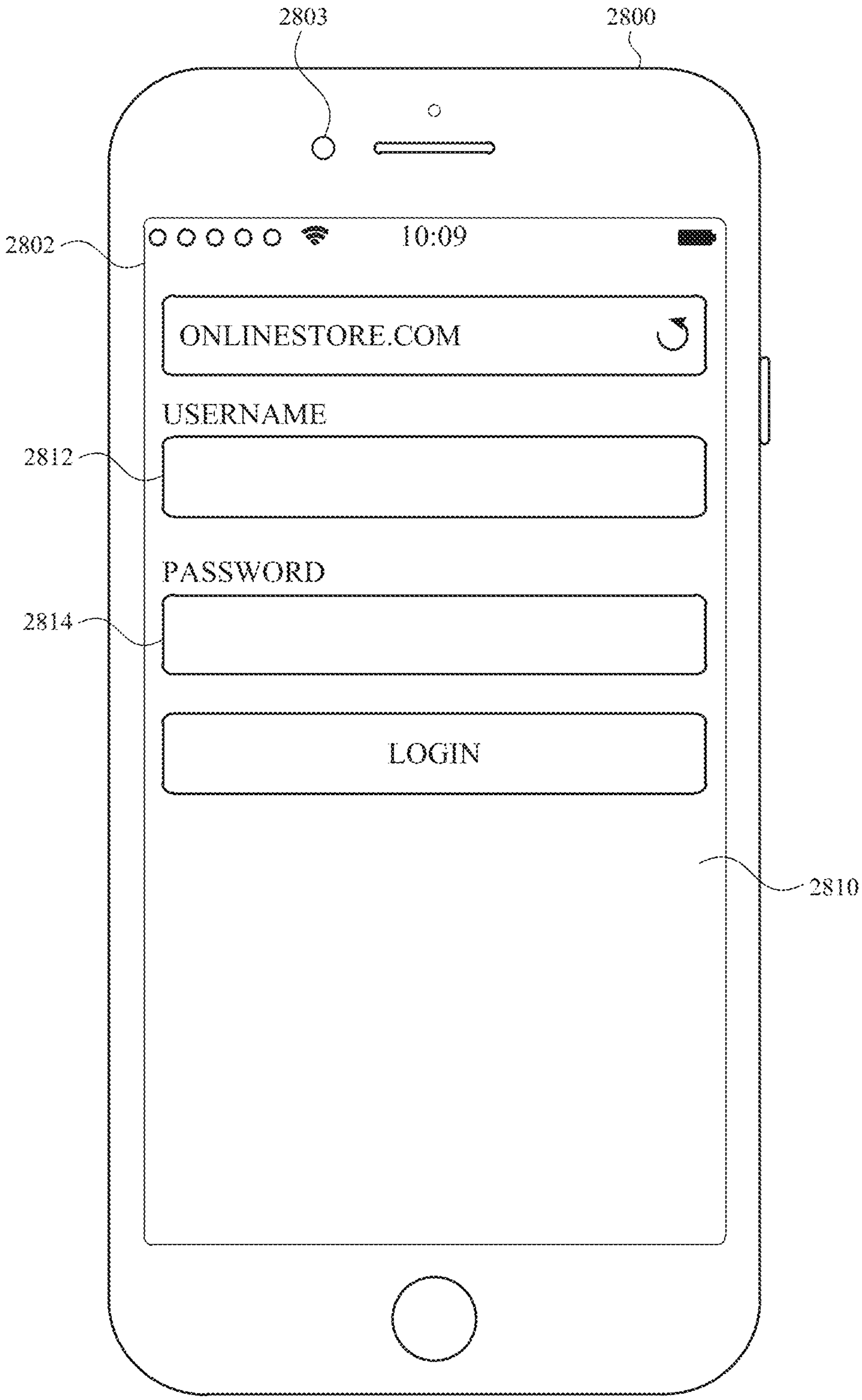

In FIG. 28F, a determination is made that biometric authentication has failed (e.g., biometric authentication criteria have not been met). As a result, electronic device 2800 forgoes autofilling username field 2812 and password field 2814. Additionally, electronic device 2800 does not display an indication to the user that the user should re-attempt biometric authentication. In some examples, a determination is made that biometric authentication is successful (e.g., biometric authentication criteria have been met). As a result, in those examples, electronic device 2800 autofills username field 2812 and password field 2814.

Figure 28G:
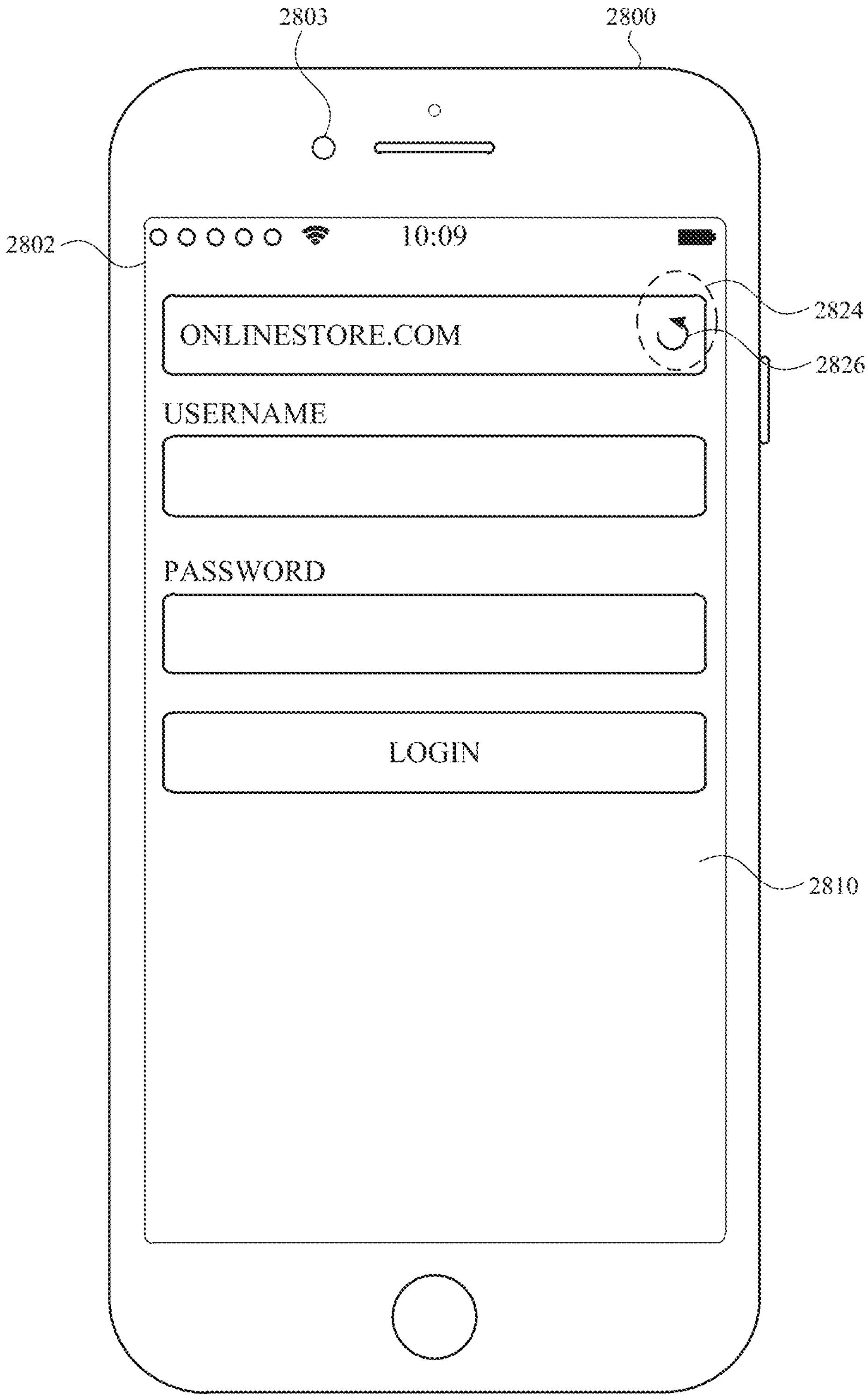

In FIG. 28G, electronic device 2800, after determining that biometric authentication has failed, detects tap gesture 2824 on reload affordance 2826. Electronic device 2800 identifies tap gesture 2824 as a request to reload log-in user interface 2810. Electronic device 2800 also identifies tap gesture 2824 as a request to autofill one or more fillable fields (e.g., username field 2812 and password field 2814) in log-in user interface 2810. As described earlier, the request to autofill requires biometric authentication in order to proceed with autofilling the fillable fields.

Figure 28H:
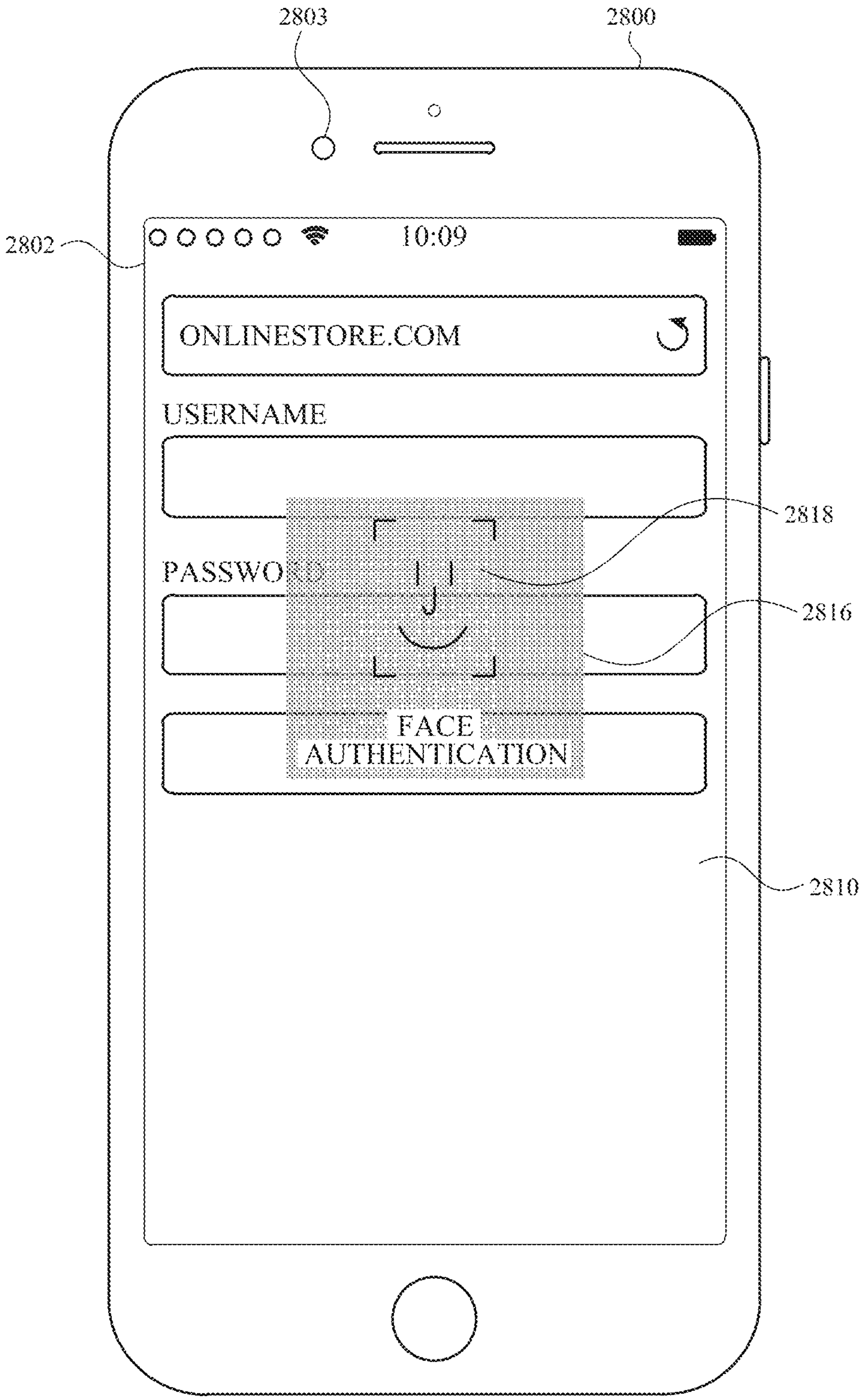

In response to the request to autofill the fillable fields, a determination is made that the failure of biometric authentication in FIG. 28F was due to not detecting the presence of a face for a predetermined amount of time. As a result, electronic device 2800 uses biometric sensor 2803 to re-perform biometric authentication, as shown in FIG. 28H. Electronic device 2800 re-performs biometric authentication automatically without needing a user to provide input to initiate the authentication.

Figure 28I:
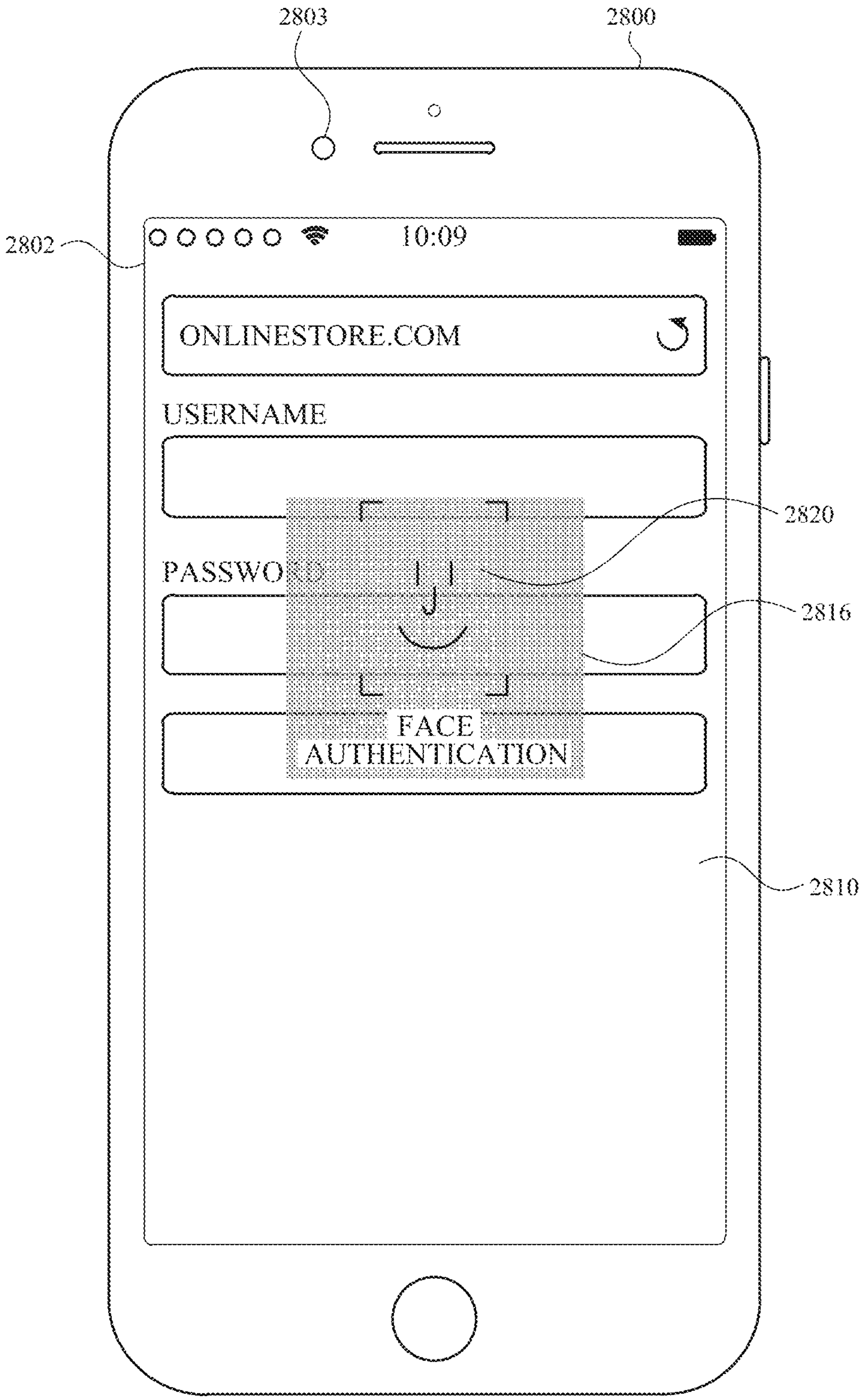

In FIGS. 28H-28I, electronic device 2800 performs biometric authentication, which includes displaying a biometric authentication interface and biometric authentication glyphs, as described with respect to FIGS. 28C-28D. Once electronic device 2800 has obtained biometric data (e.g., obtained sufficient biometric data), electronic device transitions to displaying biometric authentication glyph 2828. Electronic device 2800 displays biometric authentication glyph 2828 to indicate that the biometric data is being processed. In some examples, biometric authentication glyph 2828 includes a plurality of rings, which rotate spherically, for instance, while displayed.

Figure 28J:
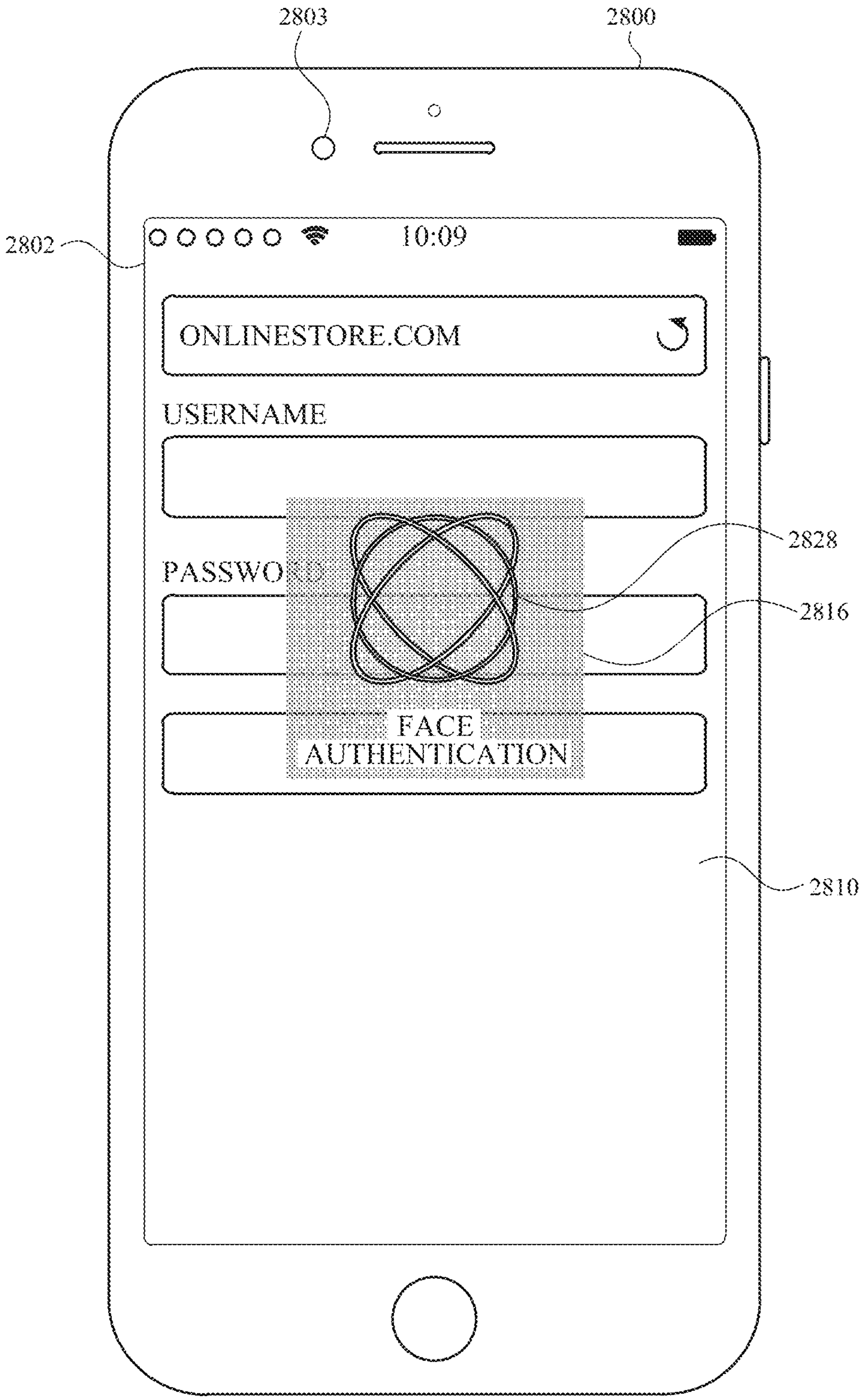
Figure 28K:
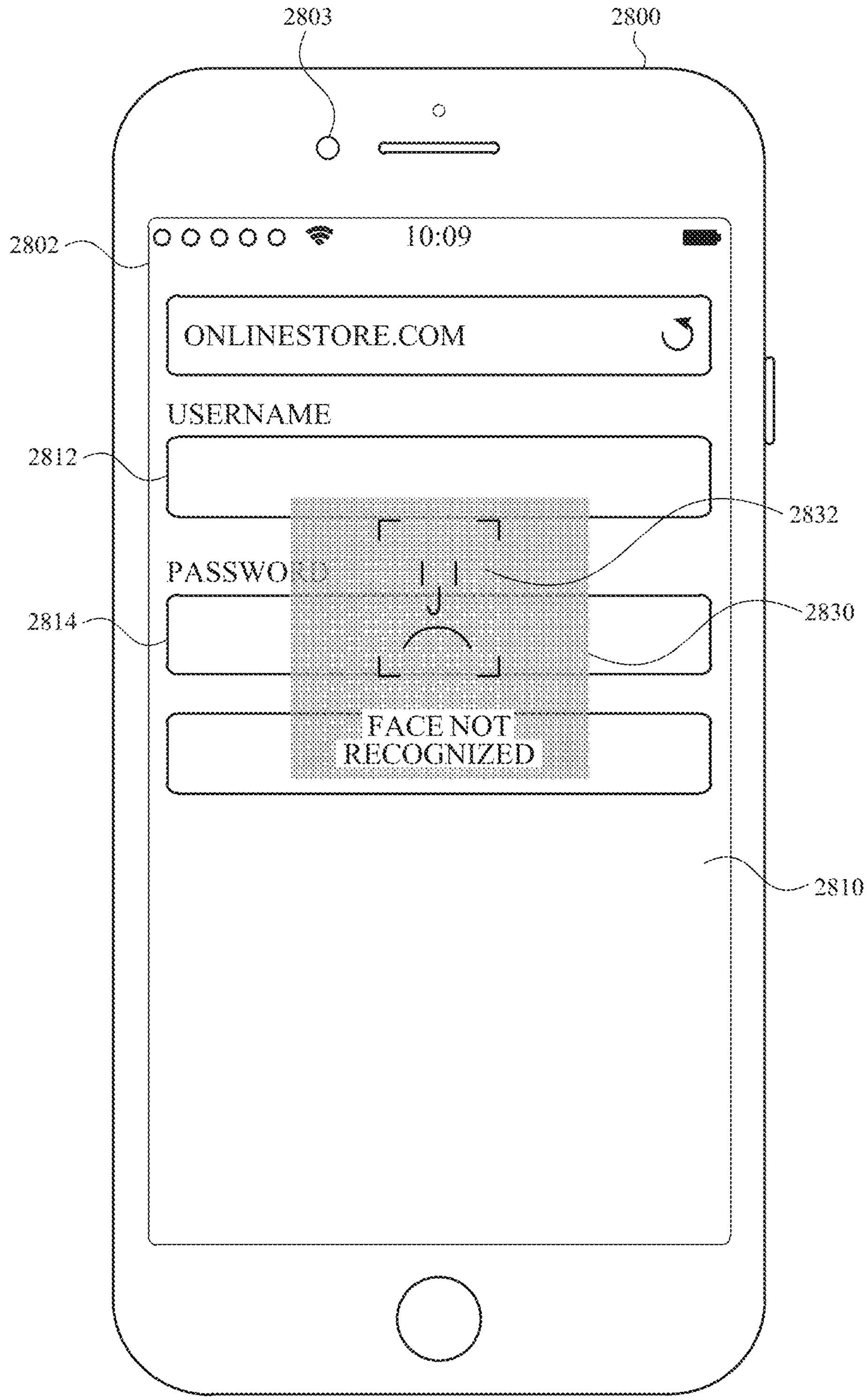

In FIG. 28K, a determination is made that biometric authentication has failed again. As a result, electronic device 2800 displays failed biometric authentication interface 2830 having failed biometric authentication glyph 2832. As a result, electronic device 2800 forgoes autofilling username field 2812 and password field 2814. In some examples, a determination is made that biometric authentication is successful. As a result, in those examples, electronic device 2800 autofills username field 2812 and password field 2814.

Figure 28L:
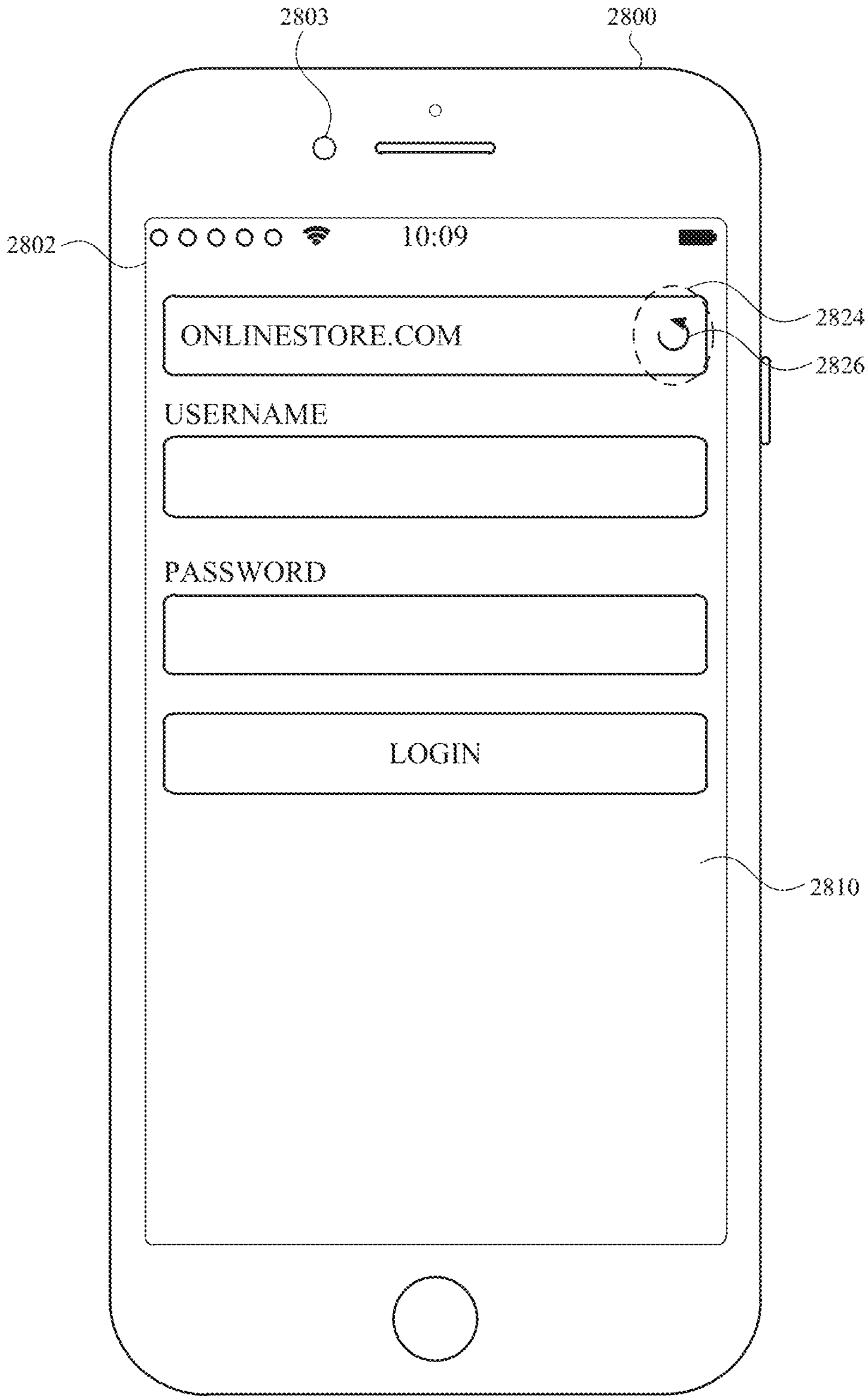

In FIG. 28L, electronic device 2800, after determining that biometric authentication has failed for the second time, detects tap gesture 2824 on reload affordance 2826. Electronic device 2800 identifies tap gesture 2826 as a request to reload log-in user interface 2810. Electronic device 2800 also identifies tap gesture 2826 as a request to autofill one or more fillable fields (e.g., username field 2812 and password field 2814) in log-in user interface 2810. As described earlier, the request to autofill requires biometric authentication in order to proceed with autofilling the fillable fields.

Figure 28M:
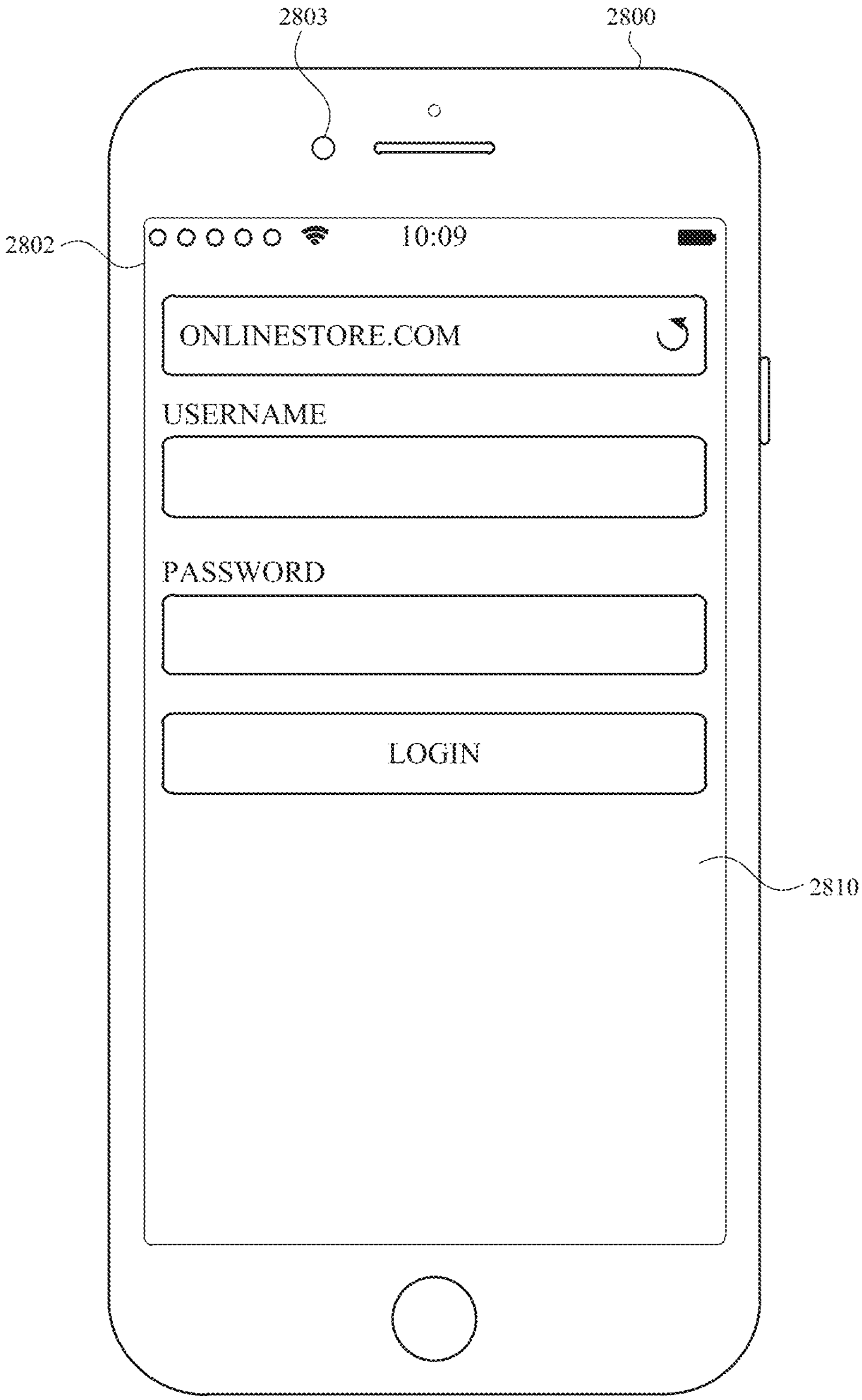

In response to the request to autofill the fillable fields, a determination is made that the failure of biometric authentication in FIG. 28K was due to detecting a face that was not consistent with an authorized face (e.g., the biometric data does not match, within a threshold, a biometric template). As a result, electronic device 2800 forgoes performing biometric authentication, as illustrated by FIG. 28M.

Figure 28N:
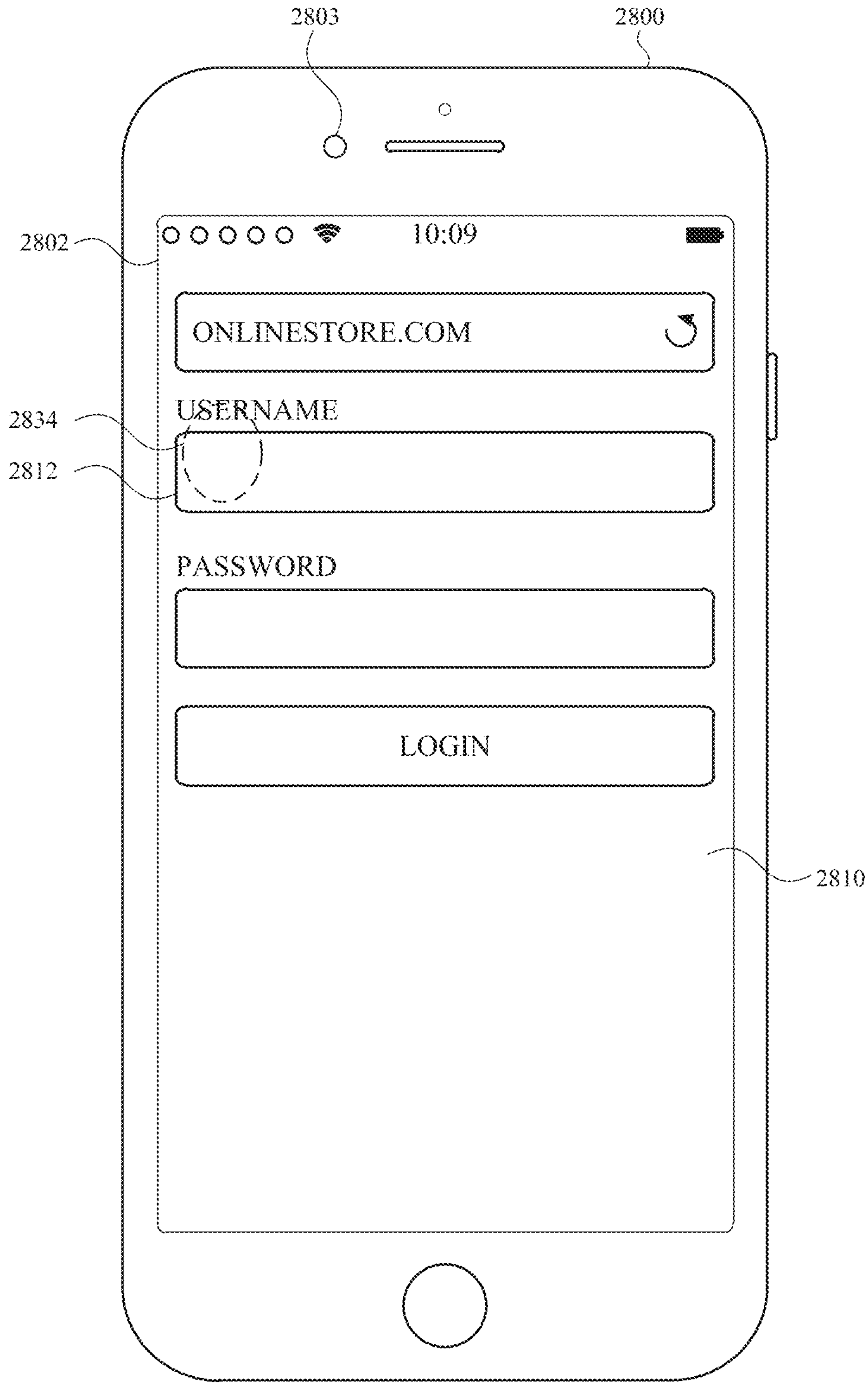
Figure 28O:
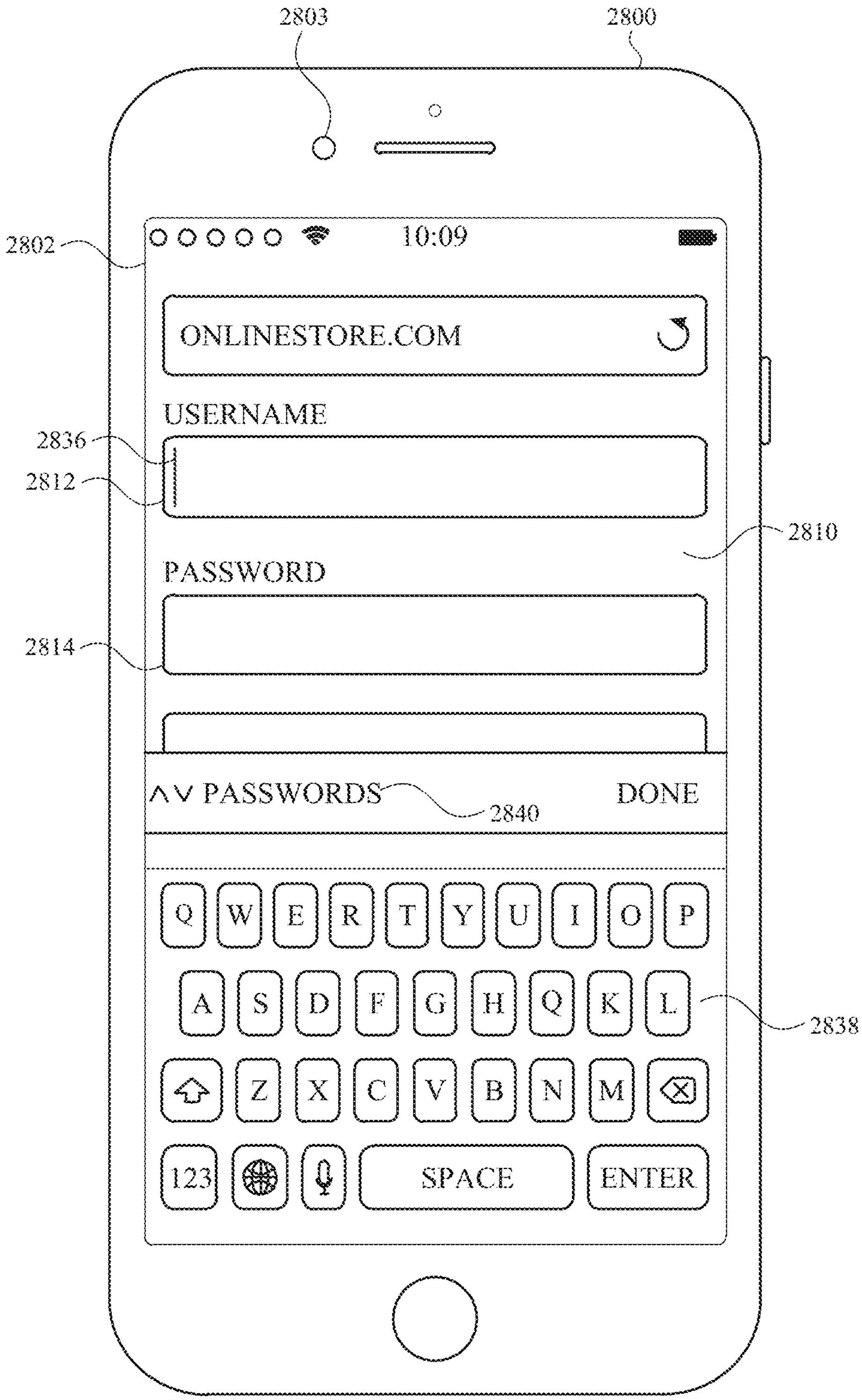
Figure 28P:
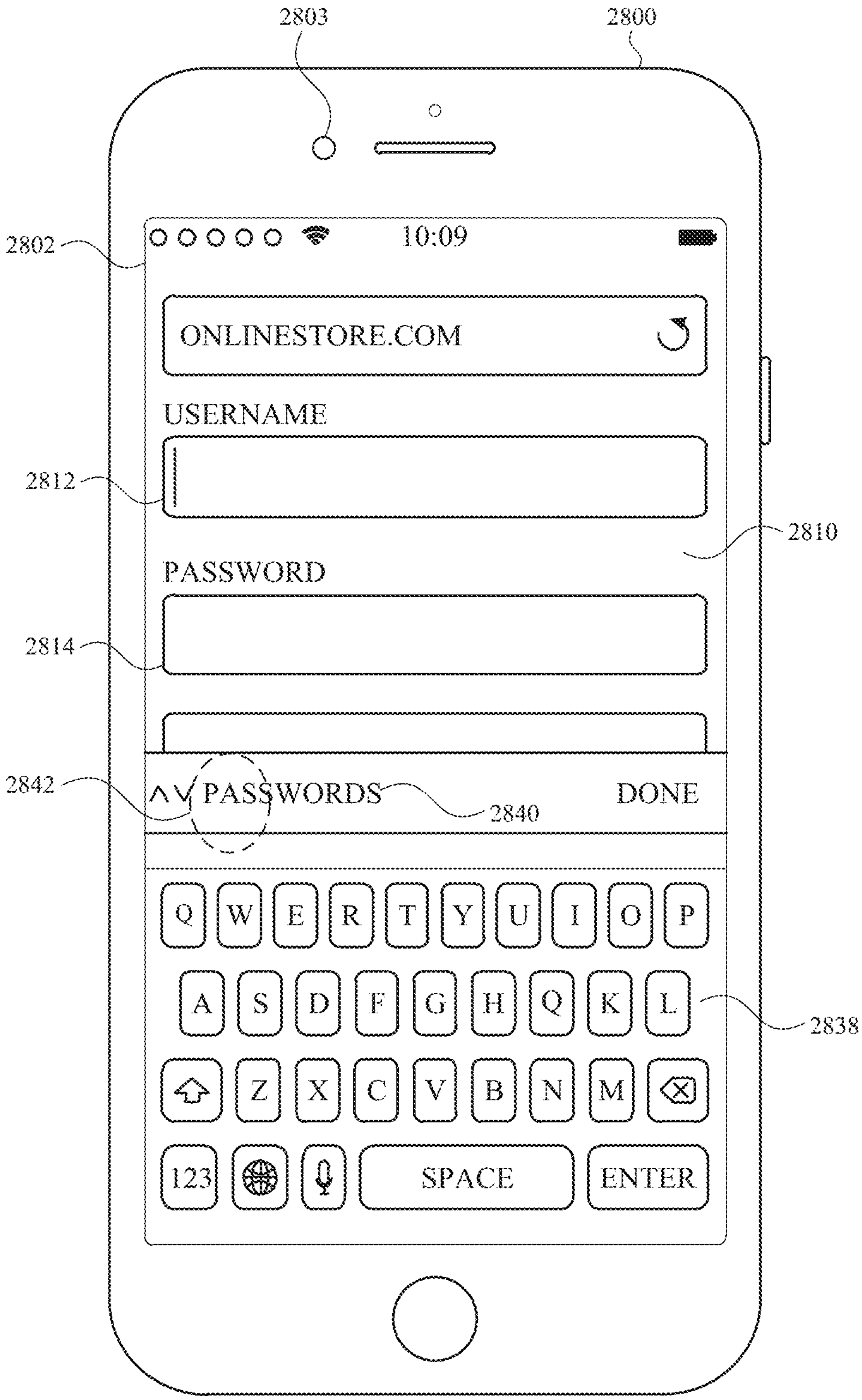
Figure 28Q:
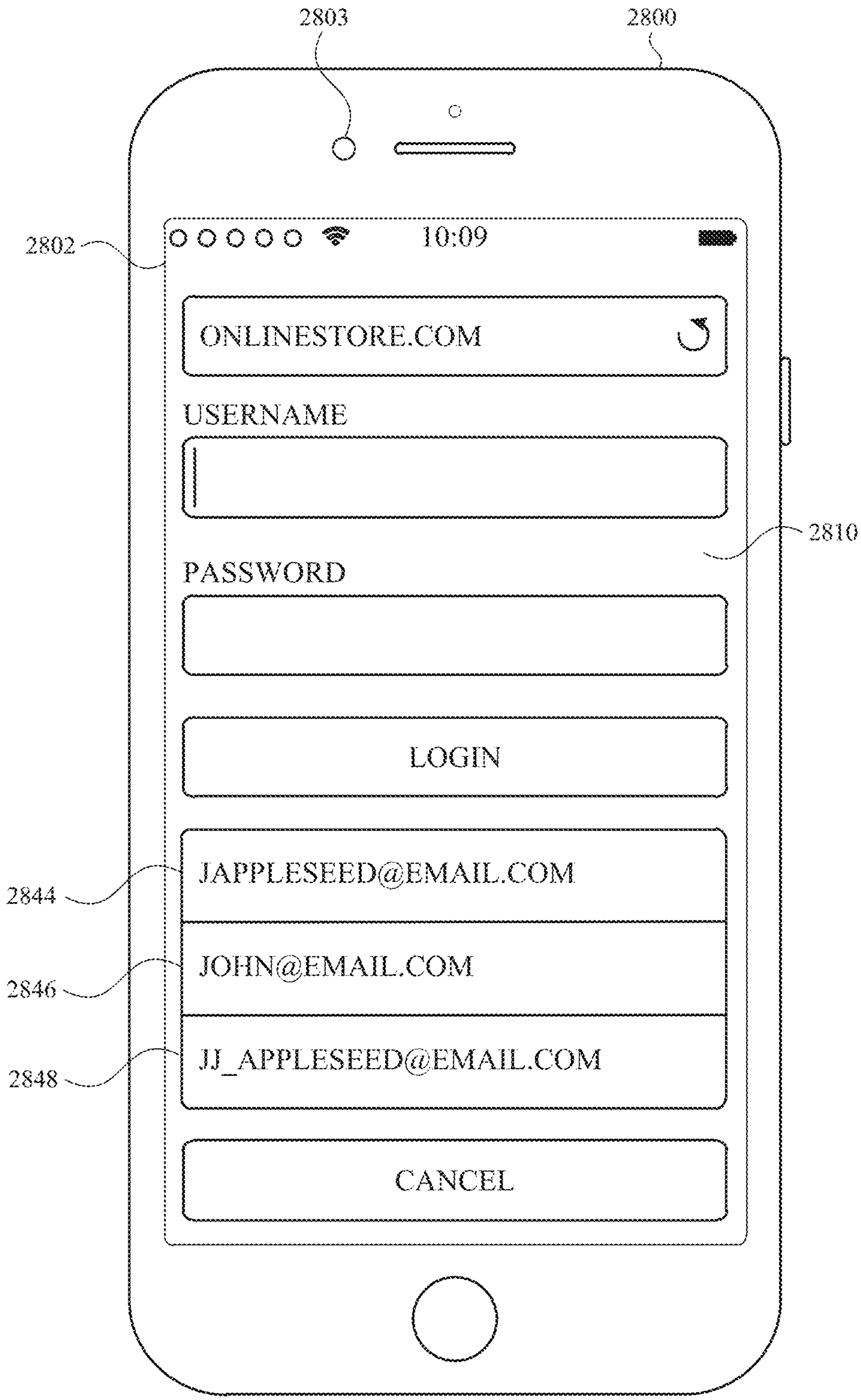

In FIG. 28N, electronic device 2800, after forgoing to perform biometric authentication in response to tap gesture 2826, detects tap gesture 2834 on username field 2812. As a result, electronic device 2800 displays cursor 2836 in username field 2812 and also displays virtual keyboard 2838 and passwords affordance 2840, as shown in FIG. 28O. In FIG. 28P, electronic device 2800 detects tap gesture 2842 on passwords affordance 2840. As a result, electronic device 2800 displays a list of candidate input affordances (e.g., 2844, 2846, and 2848), as shown in FIG. 28Q. In some examples, in response to detecting tap gesture 2834 on username field 2812, electronic device 2800 displays an affordance labeled "usernames" instead of passwords affordance 2840.

Figure 28R:
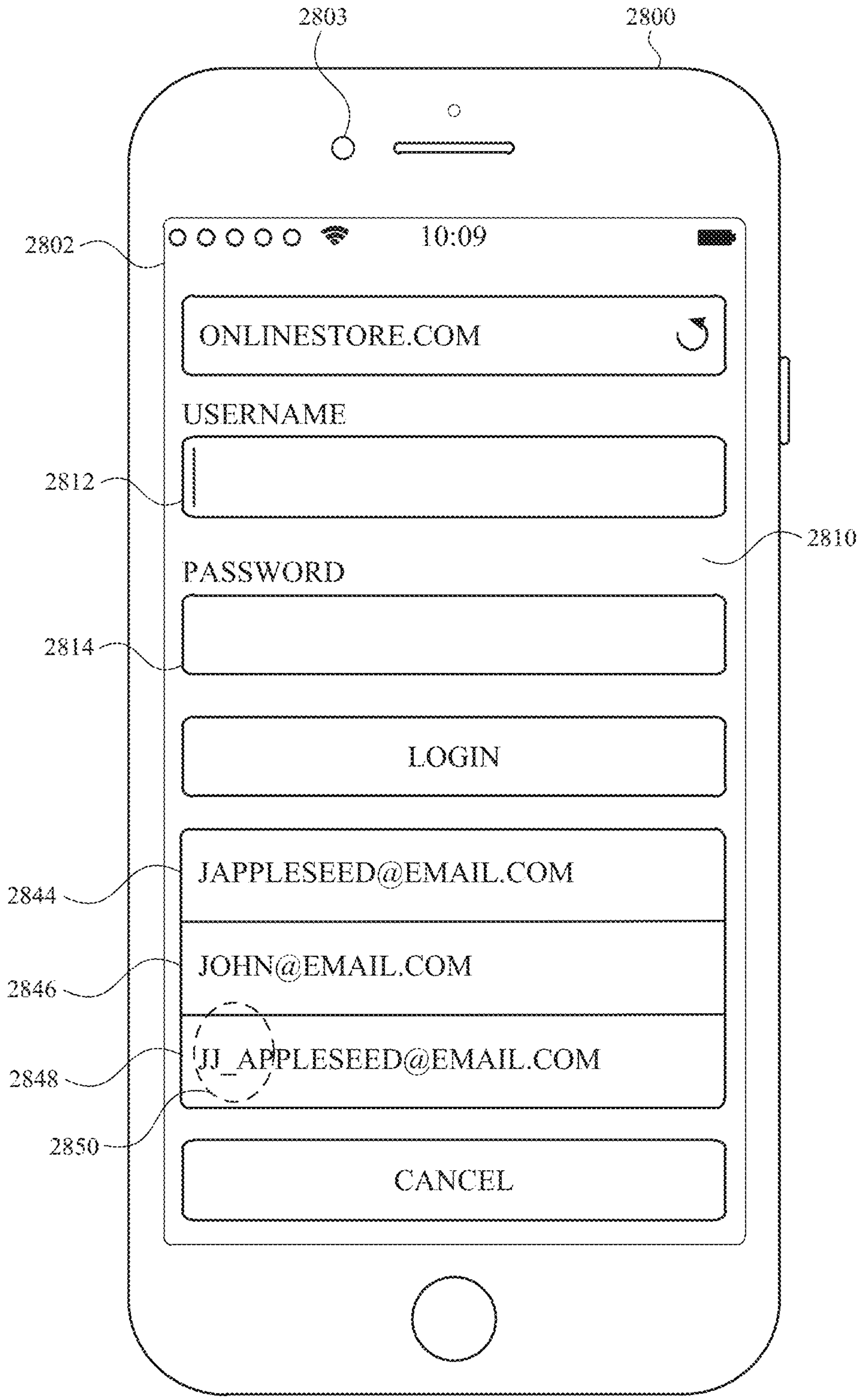

In FIG. 28R, electronic device 2800 detects tap gesture 2850 on candidate input affordance 2848 (labeled "jj_appleseed@email.com"). Electronic device 2800 identifies tap gesture 2850 as a request to autofill username field 2812 and password field 2814 with credential information corresponding to candidate input affordance 2848. This request to autofill the fillable fields is a different type of request to autofill than those resulting from a request to load or reload log-in user interface 2810. A request to autofill via a request to load a log-in user interface is an implicit request, as the request to autofill is performed as part of the request to load the log-in user interface. In contrast, the request to autofill in FIG. 28R is an explicit request by the user to autofill username field 2812 and password field 2814 with credential information corresponding to candidate input affordance 2848. In response to the request to autofill the fillable fields via the explicit request in FIG. 28R, electronic device 2800 initiates biometric authentication, as shown in FIG. 28S.

Figure 28S:
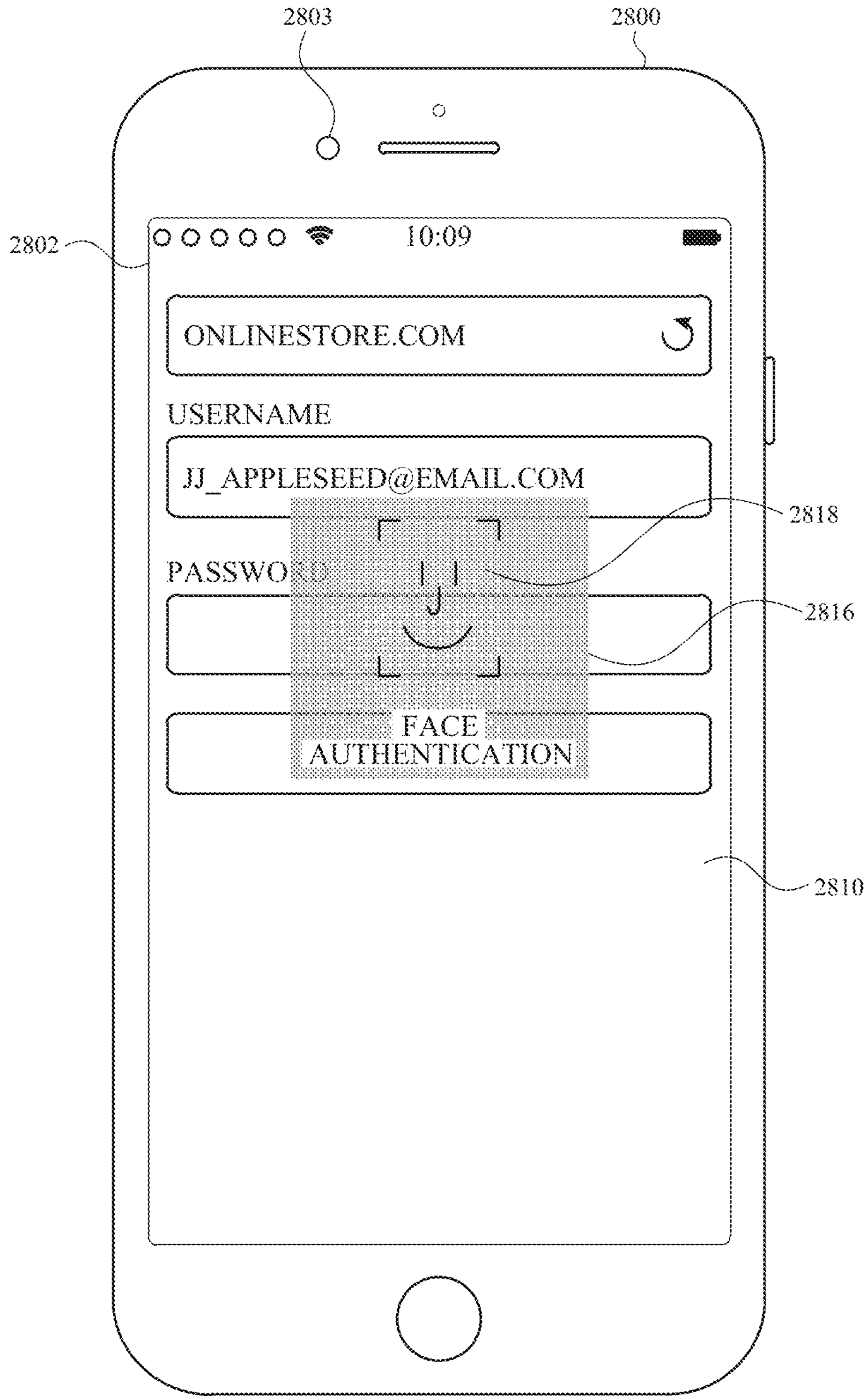
Figure 28T:
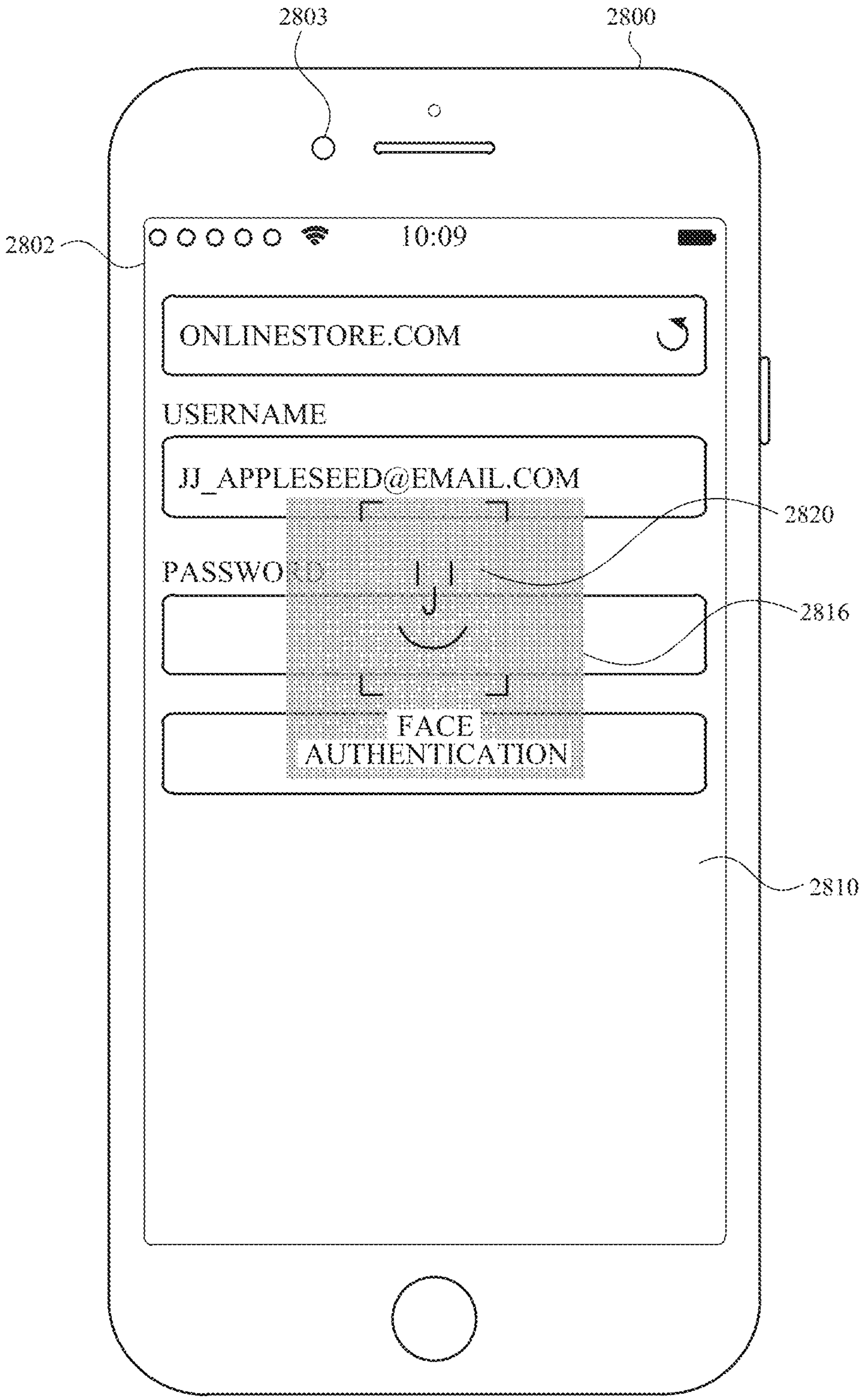
Figure 28U:
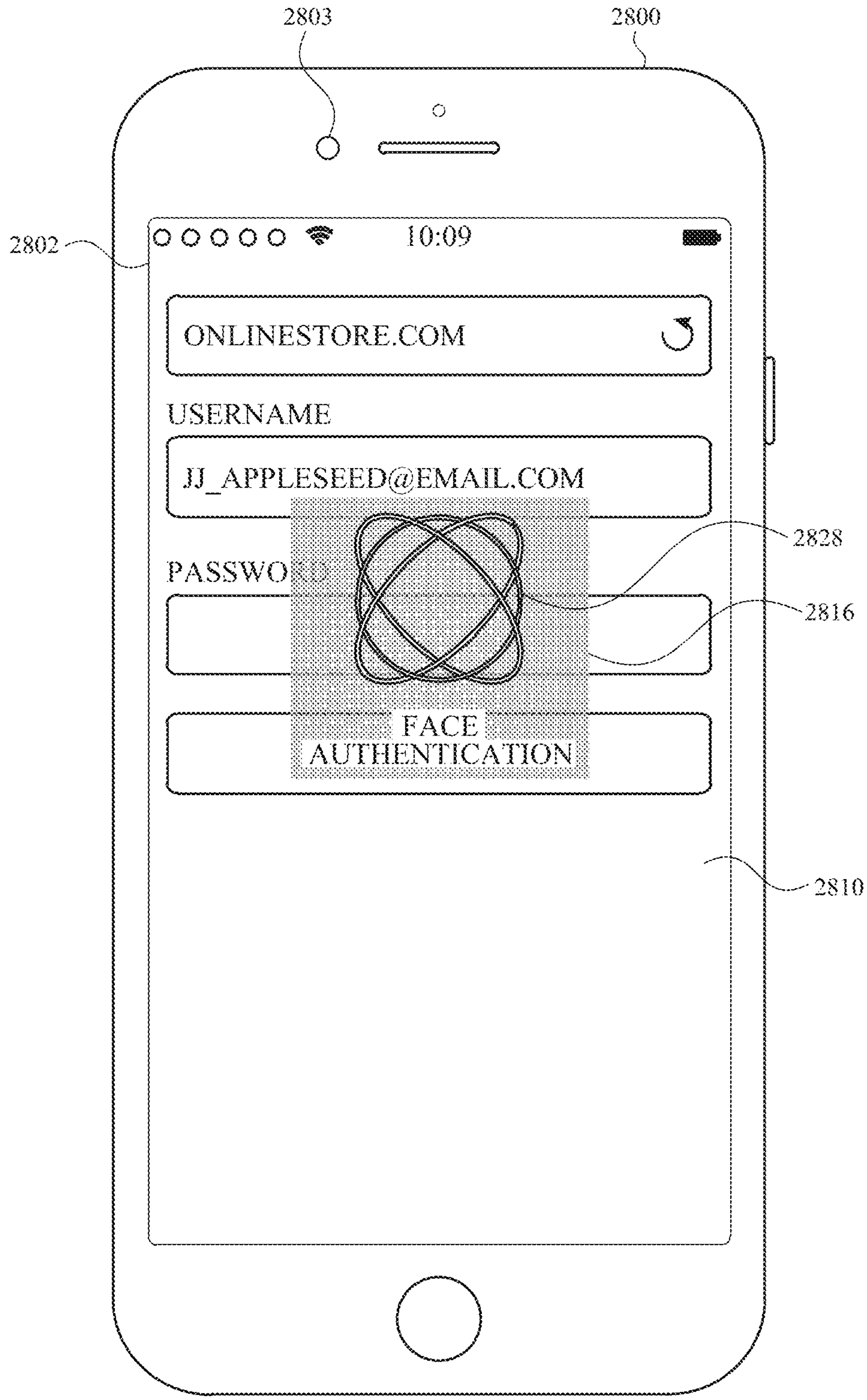

In FIGS. 28S-28U, electronic device 2800 performs biometric authentication, which includes displaying a biometric authentication interface and biometric authentication glyphs, as described with respect to FIGS. 28H-28J.

Figure 28V:
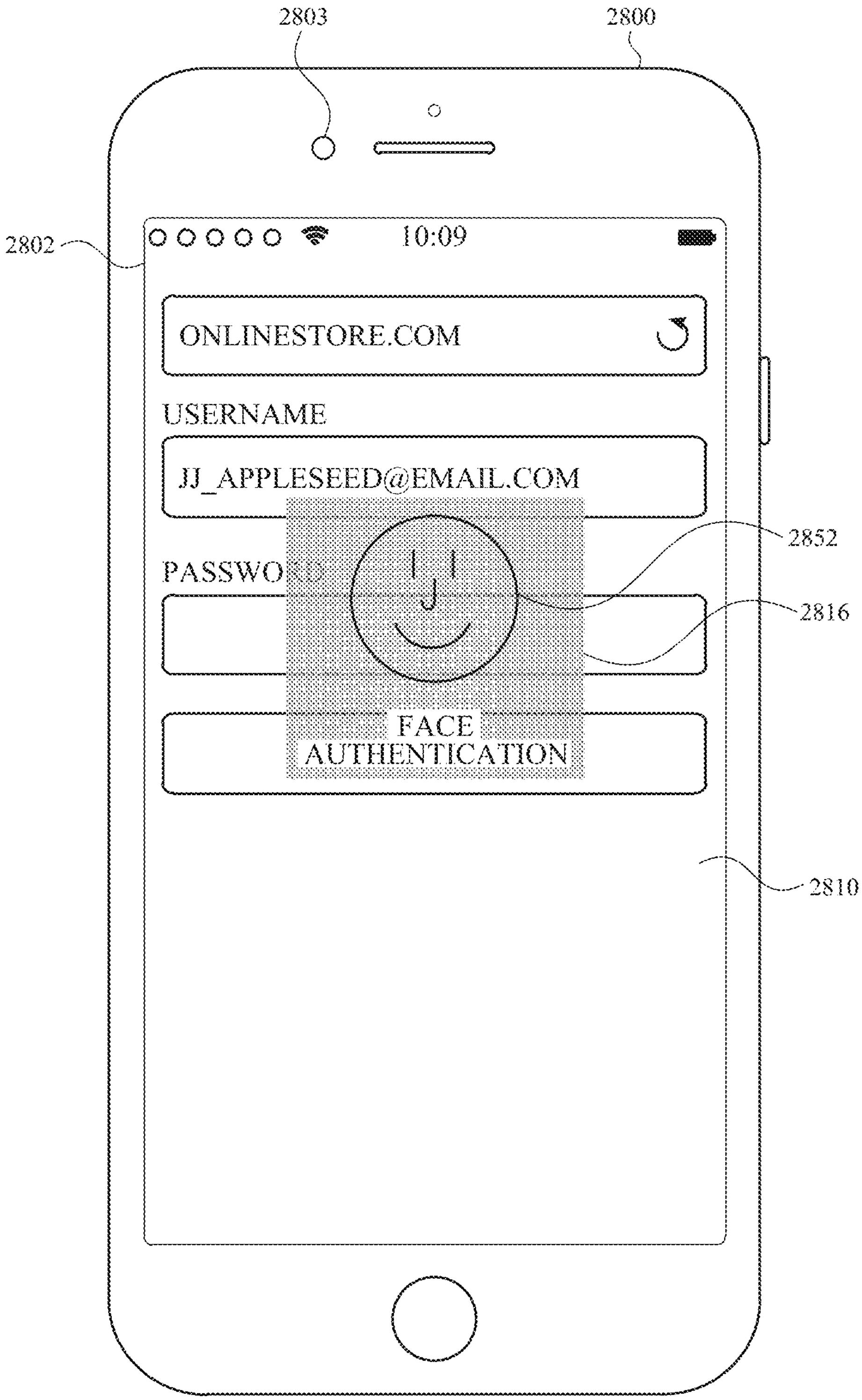

In FIG. 28V, a determination is made that biometric authentication is successful. As a result, electronic device 2800 displays successful biometric authentication glyph 2852 indicating that biometric authentication was successful.

Figure 28W:
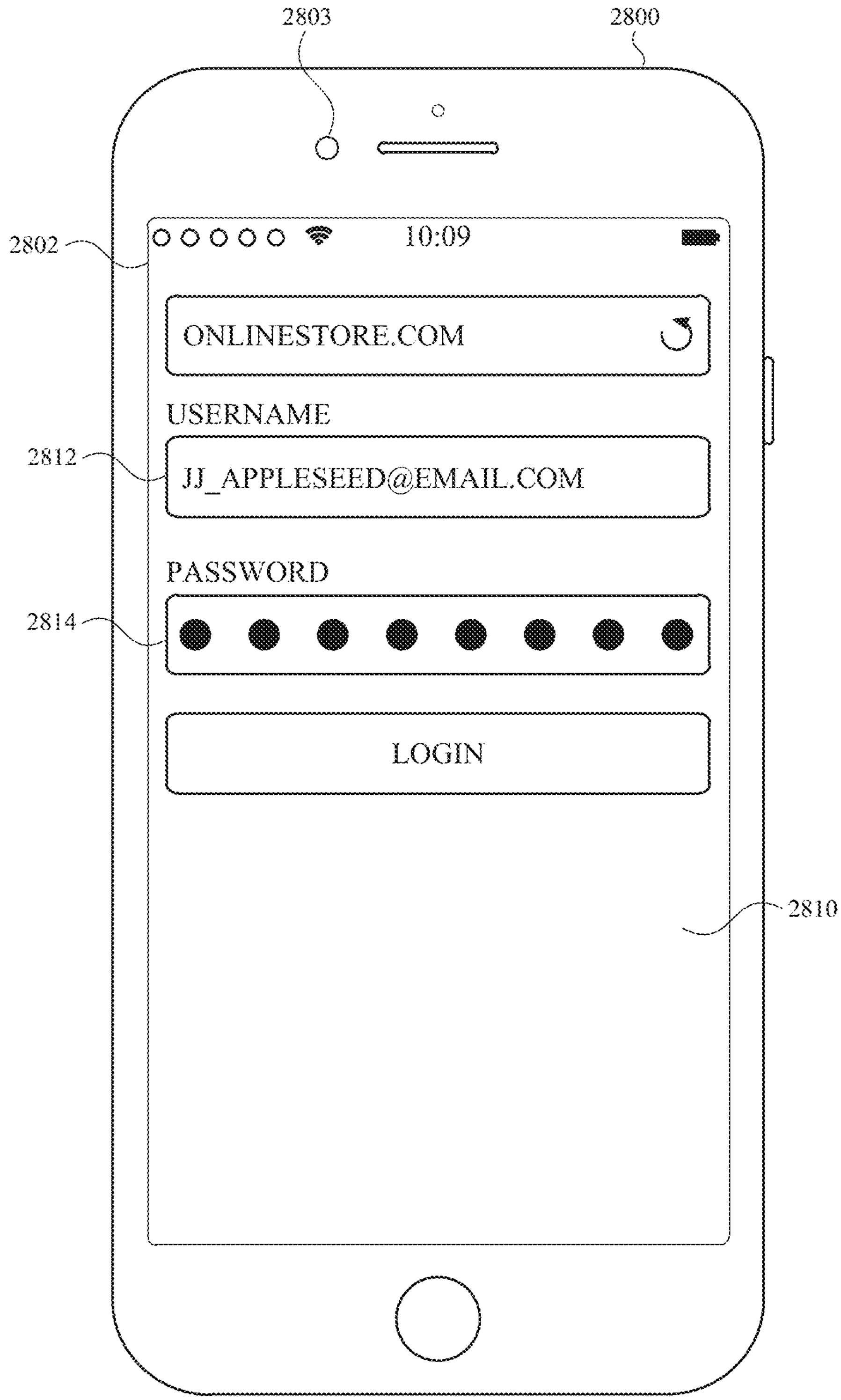
Figure 28X:
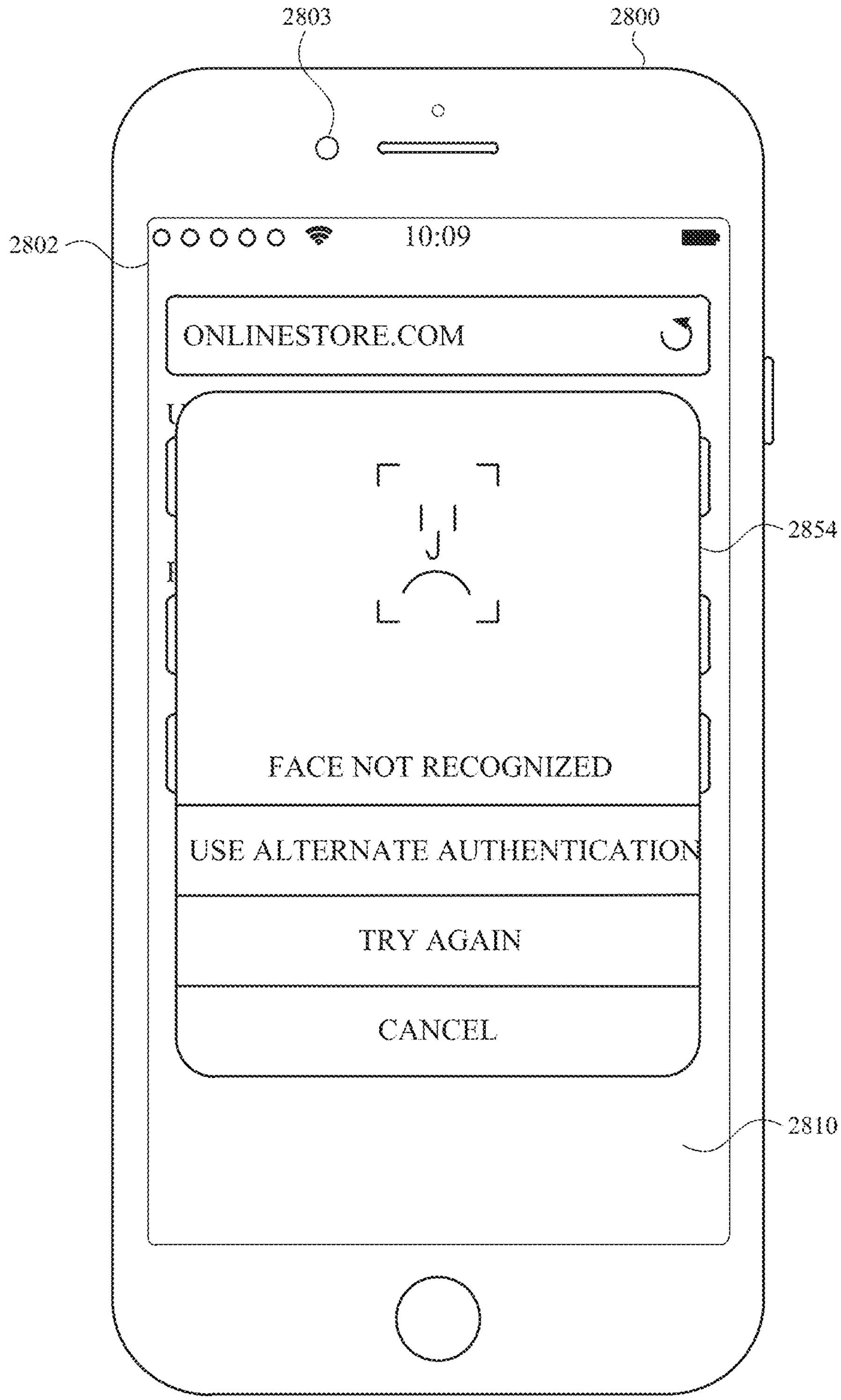
Figure 28Y:
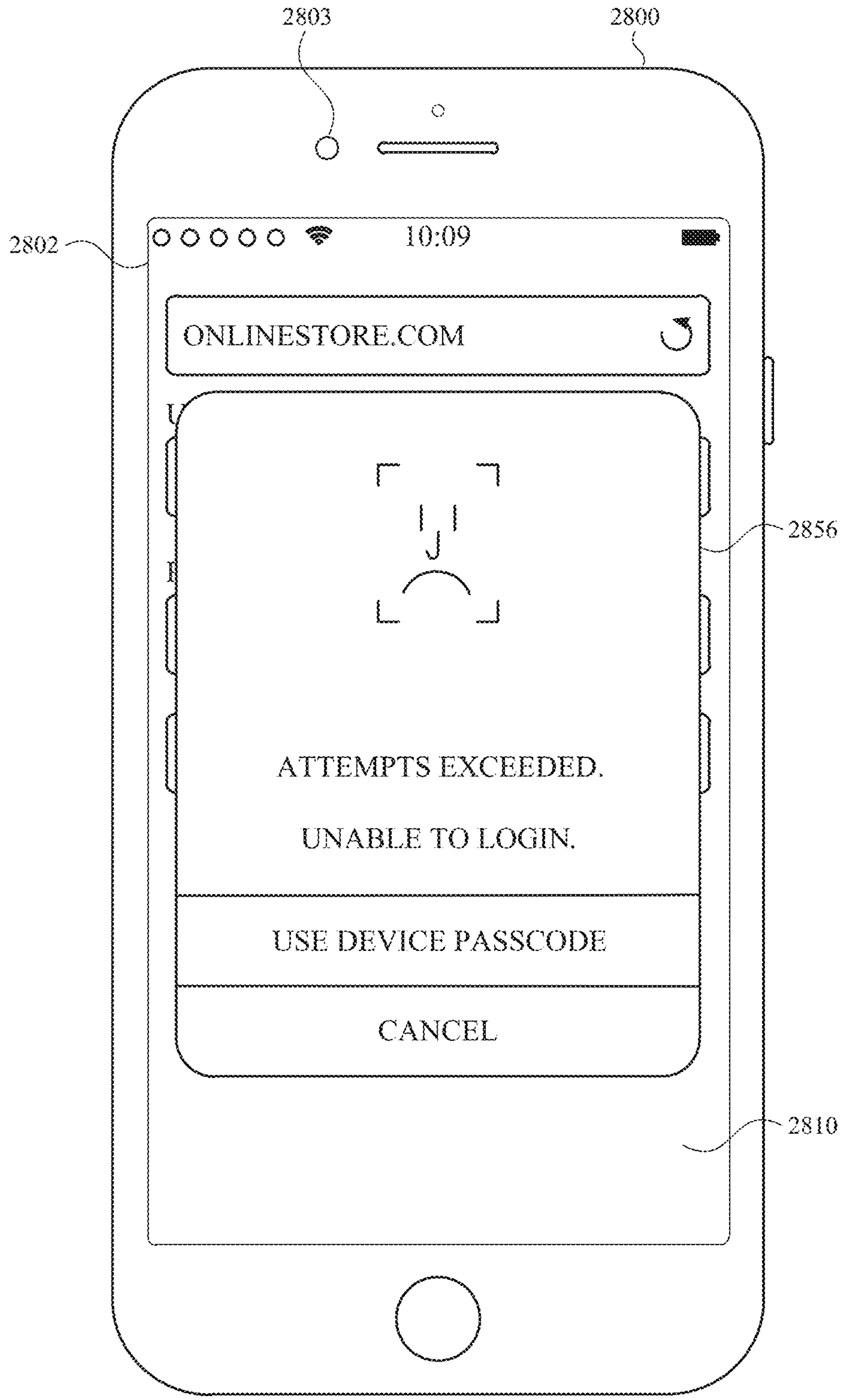

In FIG. 28W, since biometric authentication was successful, electronic device 2800 autofills username field 2812 and password field 2814 with credential information corresponding to candidate input affordance 2848. In some examples, a determination is made that biometric authentication has failed. As a result, in those examples, electronic device 2800 forgoes autofilling the username field 2812 and password field 2814 with the credential information. In some examples, upon failed biometric authentication, electronic device 2800 displays failure interface 2854 in FIG. 28X, as described with respect to FIG. 17M. Alternatively, electronic device 2800 can display failure interface 2856 in FIG. 28Y, as described with respect to FIG. 15S. Failure interface 2854 can be displayed when a user has not reached the maximum number of failed biometric authentication attempts (e.g., a maximum number of failed attempts without an intervening successful authentication attempt). When the maximum number of failed biometric authentication attempts has been reached, failure interface 2856 can instead be displayed.

Figure 28Z:
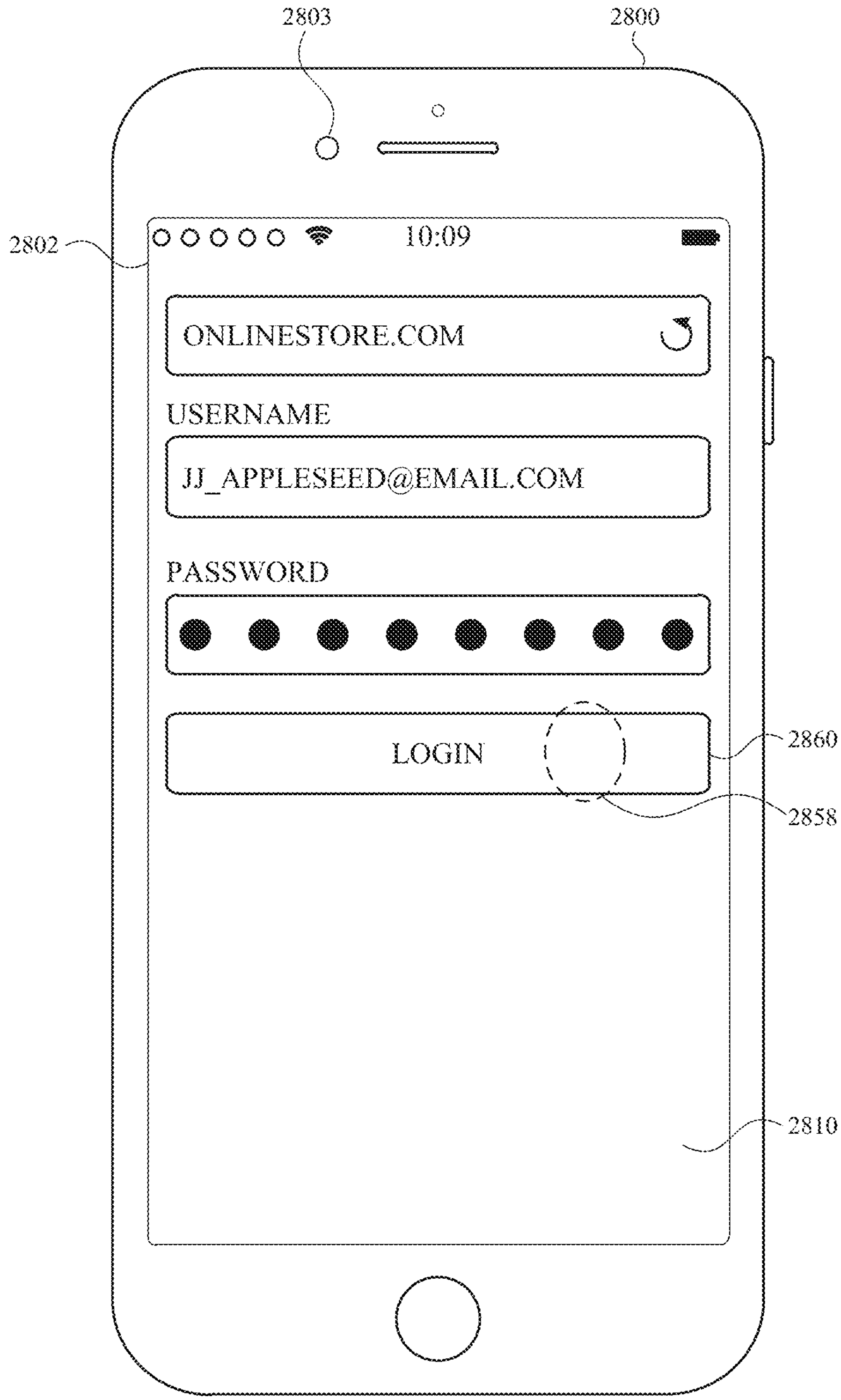
Figure 28A:

After electronic device 2800 autofills username field 2812 and password field 2814 in FIG. 28W, electronic device detects tap gesture 2858 on submit affordance 2860, as illustrated by FIG. 28Z. Electronic device 2800 identifies tap gesture 2858 as a request to submit the credential information in username field 2812 and password field 2814 for user authentication. Upon successful user authentication, electronic device 2800 provides access to restricted content (e.g., content that can only be seen once a user has logged in) in user interface 2862 of FIG. 28AA.

FIGS. 29A-29B are a flow diagram illustrating a method for re-performing biometric authentication after an initial unsuccessful biometric authentication attempt using an electronic device in accordance with some examples. Method 2900 is performed at a device (e.g., 100, 300, 500, 1700, 2800) with one or more biometric sensors (e.g., 2803) (e.g., a fingerprint sensor, a contactless biometric sensor (e.g., a biometric sensor that does not require physical contact, such as a thermal or optical facial recognition sensor), an iris scanner). In some examples, the one or more biometric sensors (e.g., 2803) include one or more cameras. The electronic device (e.g., 100, 300, 500, 1700, 2800) optionally includes a display (e.g., 2802). In some examples, the display (e.g., 2802) is a touch-sensitive display. In some examples, the display (e.g., 2802) is not a touch sensitive display.

Some operations in method 2900 are, optionally, combined, the orders of some operations are, optionally, changed, and some operations are, optionally, omitted. As described below, method 2900 provides an intuitive way for re-performing biometric authentication after an initial unsuccessful biometric authentication attempt. The method reduces the cognitive burden on a user for authenticating on an electronic device thereby creating a more efficient human-machine interface. For battery-operated computing devices, enabling a user to authenticate faster and more efficiently conserves power and increases the time between battery charges.

The electronic device (e.g., 100, 300, 500, 1700, 2800) receives (2902) a first request (e.g., 2806) to perform a respective operation that requires authentication (e.g., autofill, unlock device, make payment). In some examples, the first request (e.g., 2806) is associated with performance of the respective operation. In some examples, the first request (e.g., 2806) is also a request to perform a second operation, different than the respective operation (e.g., a request to display a webpage (e.g., 2810) or load content that requires authentication). In some examples, the second operation does not require authentication.

In accordance with some examples, the first request (e.g., 2806) is also a request to perform an operation that does not require biometric authentication. In response to receiving the first request (e.g., 2806), the electronic device (e.g., 100, 300, 500, 1700, 2800) performs the operation that does not require biometric authentication.

In accordance with some examples, the first request (e.g., 2806) is a request to open a webpage (e.g., 2810).

In response (2904) to receiving the first request (e.g., 2806) to perform the respective operation, the electronic device (e.g., 100, 300, 500, 1700, 2800) proceeds to blocks 2906-2910.

The electronic device (e.g., 100, 300, 500, 1700, 2800) uses (2906) the one or more biometric sensors (e.g., 2803) to determine whether biometric authentication criteria are met, wherein the biometric authentication criteria include a requirement that a biometric feature of a respective type (e.g., a face or fingerprint) that is authorized to perform the respective operation is detected by the biometric sensors (e.g., 2803). In some examples, the biometric authentication criteria include a requirement that an authorized biometric feature is detected by the one or more biometric sensors (e.g., 2803).

In accordance with a determination that the biometric authentication criteria are met, the electronic device (e.g., 100, 300, 500, 1700, 2800) performs (2908) the respective operation.

In accordance with (2910) a determination that the biometric authentication criteria are not met, the electronic device (e.g., 100, 300, 500, 1700, 2800) forgoes (2912) performing the respective operation. Forgoing (or performing) the respective operation based on not meeting biometric authentication criteria provides security and can prevent unauthorized users from initiating sensitive operations. Providing improved security enhances the operability of the device and makes the user-device interface more efficient (e.g., by restricting unauthorized access) which, additionally, reduces power usage and improves battery life of the device by limiting the performance of restricted operations.

In accordance with some examples, further in response (2904) to receiving the first request (e.g., 2806) to perform the respective operation and in accordance with (2910) the determination that the biometric authentication criteria are not met, the electronic device (e.g., 100, 300, 500, 1700, 2800) forgoes (2914) displaying, on the display (e.g., 2802), an indication to re-attempt authentication using the one or more biometric sensors (e.g., 2803) (e.g., visually presented instructions that prompt the user to re-attempt biometric authentication). In some examples, the electronic device (e.g., 100, 300, 500, 1700, 2800) also forgoes displaying an indication to re-request the respective operation.

In accordance with some examples, determining whether the biometric authentication criteria are met includes determining whether at least a portion of a biometric feature, determined based on data obtained from the one or more biometric sensors (e.g., 2803) that correspond to the biometric feature, satisfies biometric authentication criteria. In some examples, when the request (e.g., 2806) is also a request to perform the second operation that does not require authentication and is different than the respective operation, the second operation is performed even in accordance with a determination that the biometric authentication criteria are not met. For example, the first request (e.g., 2806) (e.g., entry of a URL address) is a request to perform the respective operation (e.g., autofilling a username and/or password of the webpage (e.g., 2810) associated with the URL address) that requires authentication and is also a request to perform a second operation (display of the webpage (e.g., 2810) associated with the URL address) that does not require authentication. Performing the second operation that does not require authentication, even when the biometric authentication criteria are not met can provide the user with feedback to the request, even if the biometrically-secured operation is not performed. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Subsequent to the determination that the biometric authentication criteria were not met in response to receiving the first request (e.g., 2806) (e.g., no face was detected or a face that was detected is not consistent with an authorized face), the electronic device (e.g., 100, 300, 500, 1700, 2800) receives (2916) a second request (e.g., 2824) to perform the respective operation. In some examples, a non-user request to reload the webpage (e.g., 2810) is not a request associated with retrying biometric authentication.

In response (2918) to receiving the second request (e.g., 2824) to perform the respective operation, the electronic device (e.g., 100, 300, 500, 1700, 2800) proceeds to blocks 2920-2922.

In accordance with a determination that the biometric authentication criteria were not met in response to the first request (e.g., 2806) due to the one or more biometric sensors (e.g., 2803) not detecting the presence of a biometric feature of the respective type, using (2920) the one or more biometric sensors (e.g., 2803) to determine whether the biometric authentication criteria are met in response to the second request (e.g., 2824). Re-performing biometric authentication when a previous failure to authenticate was due to not detecting the presence of a biometric feature provides the user with the ability to re-attempt authentication without the need for additional inputs and without the need to clutter the user interface with additional displayed controls. Providing the ability to re-attempt authentication without additional input and without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the biometric feature is a face and data from the biometric sensors (e.g., 2803) does not include data indicating that a face was detected. In some examples, the determination that the biometric authentication criteria were not met in response to the first request (e.g., 2806) occurs when the one or more biometric sensors (e.g., 2803) do not detect the presence of the biometric feature of the respective type for a predetermined amount of time.

In accordance with some examples, the determination that the biometric authentication criteria were not met in response to the first request (e.g., 2806) due to the one or more biometric sensors (e.g., 2803) not detecting the presence of a biometric feature of the respective type is a determination that the biometric authentication criteria were not met in response to the first request (e.g., 2806) due to the one or more biometric sensors (e.g., 2803) not detecting, for at least a predetermined time (e.g., a predetermined time after biometric authentication was triggered such as by the first request (e.g., 2806) to perform the respective operation), the presence of a biometric feature of the respective type.

In accordance with a determination that the biometric authentication criteria were not met in response to the first request (e.g., 2806) due to the one or more biometric sensors (e.g., 2803) detecting a biometric feature of the respective type that does not correspond to the authorized biometric feature (e.g., a face that was detected is not consistent with an authorized face), the electronic device (e.g., 100, 300, 500, 1700, 2800) forgoes (2922) using the one or more biometric sensors (e.g., 2803) to determine whether the biometric authentication criteria are met in response to the second request (e.g., 2824) (e.g., the device does not automatically retry biometric authentication in response to reloading webpage (e.g., 2810)). In some examples, forgoing re-performing biometric authentication further includes forgoing performing an operation that is performed if the biometric authentication criteria are met. Forgoing re-attempting biometric authentication when a previous failure to authenticate was due to detecting a biometric feature that is not authorized enhances security and reduces the instances of multiple resource-intensive re-attempts of a likely unauthorized user. Providing improved security enhances the operability of the device and makes the user-device interface more efficient (e.g., by restricting unauthorized access) which, additionally, reduces power usage and improves battery life of the device by limiting the performance of restricted operations.

In accordance with some examples, subsequent to the determination that the biometric authentication criteria were not met in response to receiving the first request (e.g., 2806), the electronic device (e.g., 100, 300, 500, 1700, 2800) receives a third request (e.g., 2850) (e.g., tap secured password field and select password to auto-fill, tap unsecured username field and select username to auto-fill) to perform the respective operation, wherein the third request is a different type of request (e.g., the third request is made using selection of a different affordance from that used to make the first and second requests, the third type of request is not also a request to perform a second operation (e.g., loading of a webpage) whereas the first and second request are also requests to perform the second operation) from the first request (e.g., 2806) and the second request (e.g., 2824). In response to receiving the third request (e.g., 2850) to perform the respective operation, the electronic device (e.g., 100, 300, 500, 1700, 2800) uses the one or more biometric sensors (e.g., 2803) to determine whether the biometric authentication criteria are met in response to the third request (e.g., 2850) (e.g., using the one or more biometric sensors to determine whether the biometric authentication criteria are met regardless of the reason that the biometric authentication criteria were not met in response to the first request (e.g., 2806) (e.g., regardless of whether the biometric authentication criteria were not met due to the one or more biometric sensors detecting a biometric feature of the respective type that does not correspond to the authorized biometric feature or due to the one or more biometric sensors not detecting the presence of a biometric feature of the respective type). Re-performing biometric authentication after receiving a different type of request (e.g., an explicit request), regardless of the reason for a previous authentication failure provide the user with an ability to explicitly request re-authentication provides additional control options to the user. Providing additional control options to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, further in response to receiving the second request (e.g., 2824) to perform the respective operation and in accordance with a determination that biometric authentication is not available (e.g. reached the maximum number of failed biometric authentication attempts, attempts since the last successful authentication have exceeded a predefined number of permitted attempts), the electronic device (e.g., 100, 300, 500, 1700, 2800) prompts (e.g., 2854, 2856) for an alternative form of authentication (e.g., a non-biometric form of authentication, such as a password or passcode). Providing a prompt (e.g., displaying a notification) for alternative authentication when biometric authentication is no longer available provides the user with feedback about the current state of the device and provides feedback to the user indicating what is required to authenticate. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, the electronic device (e.g., 100, 300, 500, 1700, 2800) imposes a respective limit on the number of unsuccessful biometric authentication attempts that are permitted before an alternative form of authentication is required. The electronic device (e.g., 100, 300, 500, 1700, 2800) ceases to use the one or more biometric sensors (e.g., 2803) to determine whether the biometric authentication criteria are met in response to requests to perform the respective operation after a predetermined number of requests to perform the respective operation (e.g., within a threshold time period) have resulted in failed biometric authentication attempts, wherein the predefined number of requests is less than the respective limit.

In some examples, in response to detecting a respective request to perform the respective operation, the device (e.g., 100, 300, 500, 1700, 2800) determines whether the predetermined number of requests to perform the respective operation have resulted in failed biometric authentication attempts. In accordance with a determination that the predetermined number of requests to perform the respective operation have resulted in failed biometric authentication attempts, the electronic device (e.g., 100, 300, 500, 1700, 2800) forgoes attempting biometric authentication. In accordance with a determination that the predetermined number of requests to perform the respective operation have not resulted in failed biometric authentication attempts, the electronic device (e.g., 100, 300, 500, 1700, 2800) proceeds with an additional biometric authentication attempt.

In some examples, the number of biometric authentication attempts or re-attempts that can be made (e.g., made without success) is limited to a pre-determined number of unsuccessful attempts before alternative authentication (e.g., password or passcode) is required. In such examples, the electronic device (e.g., 100, 300, 500, 1700, 2800) forgoes re-attempting biometric authentication after a certain number of attempts, even under conditions where biometric authentication would otherwise be attempted (e.g., after a previous failure due to not detecting the presence of a biometric feature of the respective type) in order to not exceed the pre-determined number of allowable attempts.) Ceasing use of the biometric sensor (e.g., forgoing biometric authentication) prior to exhaustion of the permitted number of attempts after repeated requests avoids the user consuming the permitted number of attempts on repeated requests (e.g., repeated requests of the same type), conserving at least one attempt for requests for other operations that require biometric authentication. Conserving at least one attempt enhances the operability of the device and makes the user-device interface more efficient (e.g., by avoiding exhaustion of authentication attempts on repeated, similar requests) which, additionally, reduces power usage and improves battery life of the device by enabling the user to use the device more quickly and efficiently.

In accordance with some examples, using the one or more biometric sensors (e.g., 2803) to determine whether the biometric authentication criteria are met in response to the second request (e.g., 2824) occurs automatically (e.g., without the need for an input from the user) in response to receiving the second request (e.g., 2824) to perform the respective operation.

In accordance with some examples, the one or more biometric sensors (e.g., 2803) are contactless biometric sensors (e.g., 2803) (e.g., infrared camera, visible light camera, or combinations thereof) configured to perform biometric authentication without physical contact from the user.

In accordance with some examples, in response to the second request (e.g., 2824) and in accordance with a determination that the biometric authentication criteria are met in response to the second request (e.g., 2824), the electronic device (e.g., 100, 300, 500, 1700, 2800) performs the respective operation (e.g., operation includes autofill, access data, unlock device, and/or make payment).

In accordance with some examples, the respective operation is autofilling one or more fillable fields (e.g., 2812, 2814) with credential information. (e.g., credit card information or log-in information). In some examples, credit card information includes information associated with a payment account information (e.g., credit card, bank account, or payment service information). In some examples, log-in information includes information required to log-in to an application, an account, or a website (e.g., 2862). Autofilling credential information upon a request and successful authentication provides the user with a capability to populate credentials without requiring further inputs (beyond the request). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, the respective operation is providing access to restricted content. (e.g., logging in to a webpage (e.g., 2862), displaying a list of passwords associated with a user, displaying credit card information).

In accordance with some examples, the respective operation is transitioning the electronic device (e.g., 100, 300, 500, 1700, 2800) from a locked state to an unlocked state. In some examples, transitioning the electronic device (e.g., 100, 300, 500, 1700, 2800) to an unlocked state includes enabling the display (e.g., 2802), the one or more biometric sensors (e.g., 2803), and/or the microphone of the electronic device.

In accordance with some examples, the respective operation is enabling the electronic device (e.g., 100, 300, 500, 1700, 2800) to participate in a transaction (e.g., financial transaction such as a payment for a good or service).

In accordance with some examples, while using the one or more biometric sensors (e.g., 2803) to determine whether biometric authentication criteria are met, the electronic device (e.g., 100, 300, 500, 1700, 2800) displays, on the display (e.g., 2802), an indication (e.g., a small indicator is displayed at the top, bottom, side, or in a corner) that biometric authentication is being performed. In some examples, no indicator is displayed during biometric authentication. In some examples, the electronic device (e.g., 100, 300, 500, 1700, 2800) forgoes displaying an indication that biometric authentication is being performed, while determining, using the one or more biometric sensors (e.g., 2803), whether biometric authentication criteria are met. In some examples, a first visual indication (e.g., 2822) is displayed if the biometric authentication criteria are not met in response to the first request (e.g., 2806) due to the one or more biometric sensors (e.g., 2803) not detecting the presence of a biometric feature of the respective type. In some examples, a second visual indication (e.g., 2832) (e.g., the same as or different from the first visual indication) is displayed if the biometric authentication criteria are not met in response to the first request (e.g., 2806) due to the one or more biometric sensors (e.g., 2803) detecting a biometric feature of the respective type that does not correspond to the authorized biometric feature. In some examples, a third visual indication (e.g., 2852) is displayed if the biometric authentication criteria are met (e.g., a third visual indication that is different from the first visual indication and/or the second visual indication).

Note that details of the processes described above with respect to method 2900 (e.g., FIGS. 29A-29B) are also applicable in an analogous manner to the methods described below and above. For example, method 2900 optionally includes one or more of the characteristics of the various methods described above with reference to methods 800, 1000, 1200, 1400, 1600, 2000, 2200, 2500, 2700, 3100, 3300, and 3500. For example, the enrolled biometric data described in method 1200 can be used to perform biometric authentication as described with respect to method 2900. As a further example, the authentication caching of method 3100 can be based on successful authentication performed in accordance with a re-performed biometric authentication as described with respect to method 2900. For brevity, these details are not repeated below.

FIGS. 30A-30AL illustrate exemplary user interfaces for cached biometric authentication, in accordance with some examples. As described in greater detail below, the exemplary examples of the user interfaces illustrated in FIGS. 30A-30AL are used to illustrate the processes described below, including the processes in FIGS. 31A-31B.

FIG. 30A illustrates electronic device 3000 (e.g., portable multifunction device 100, device 300, device 500, or device 1700). In the exemplary examples illustrated in FIGS. 30A-30AL, electronic device 3000 is a smartphone. In other examples, electronic device 3000 can be a different type of electronic device, such as a wearable device (e.g., a smartwatch). Electronic device 3000 includes display 3002, one or more input devices (e.g., touchscreen of display 3002, button 3004, and a microphone), and a wireless communication radio. In some examples, the electronic device includes a plurality of cameras. In some examples, the electronic device includes only one camera. In FIG. 30A, the electronic device includes biometric sensor 3003. In some examples, the biometric sensor is one or more biometric sensors that can include a camera, such as an infrared camera, a thermographic camera, or a combination thereof. In some examples, biometric sensor 3003 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In FIG. 30A, electronic device 3000 displays, on display 3002, user interface 3006 of an application. The application is a mobile browser application, and the interface corresponds to a website (online.com). In some examples, the website online.com is the root domain of the online.com domain. Electronic device 3000 detects tap gesture 3008 on log-in affordance 3010. Electronic device 3000 identifies tap gesture 3008 as a request to load log-in user interface 3012 (shown in FIG. 30B). User interface 3012 is the webpage id.online.com. In some examples, id.online.com is a subdomain of online.com domain that requires successful authentication before access is granted to restricted content. Electronic device 3000 also identifies tap gesture 3008 as a request to autofill fillable fields, username field 3014 and password field 3016, in log-in user interface 3012. The request to autofill requires biometric authentication in order to proceed with autofilling the fillable fields. In some examples, the request also includes a request to automatically log-in the user such that the user does not need to tap a submit affordance (e.g., 3030, 3046) in order to submit credentials and log-in.

Figure 30B:
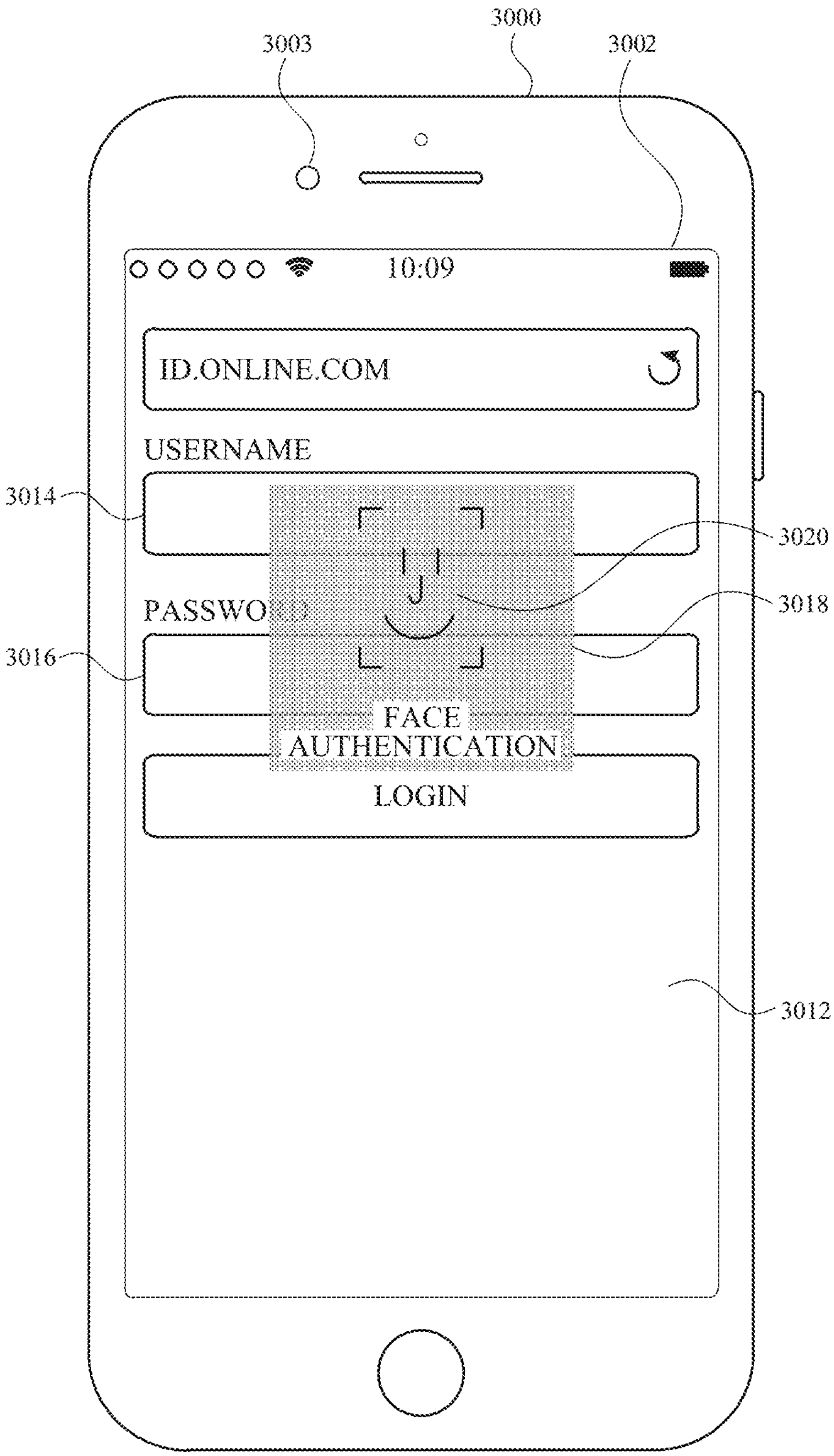

In FIG. 30B, in response to tap gesture 3008 (e.g., the request to autofill Tillable fields), electronic device 3000 uses biometric sensor 3003 to determine whether certain biometric authentication criteria have been met. Electronic device 3000 captures and processes (e.g., analyzes) the biometric data from biometric sensor 3003 to determine, based on the biometric data, whether the biometric feature (or a portion thereof) satisfies biometric authentication criteria (e.g., determine whether the biometric data matches, within a threshold, a biometric template). Biometric sensor 3003 is contactless such that the sensor is configured to perform biometric authentication without physical input from the user (e.g., without any additional gestures after tap gesture 3008). As a result, electronic device 3000 initiates biometric authentication using biometric sensor 3003 without needing to receive an explicit request from a user to initiate biometric authentication.

Performing biometric authentication includes displaying biometric authentication interface 3018 having biometric authentication glyph 3020. Biometric authentication glyph 3020 is a simulation of a representation of a biometric feature (e.g., a face). As shown in FIG. 30B, biometric authentication interface 3018 is overlaid on at least a portion of log-in user interface 3012. Biometric authentication interface 3018, optionally, is an operating system level interface (e.g., an interface generated by an operating system of the device), and log-in user interface 3012 is an application-level interface (e.g., a user interface generated by a third-party application that is separate from the operating system of the device).

Figure 30C:
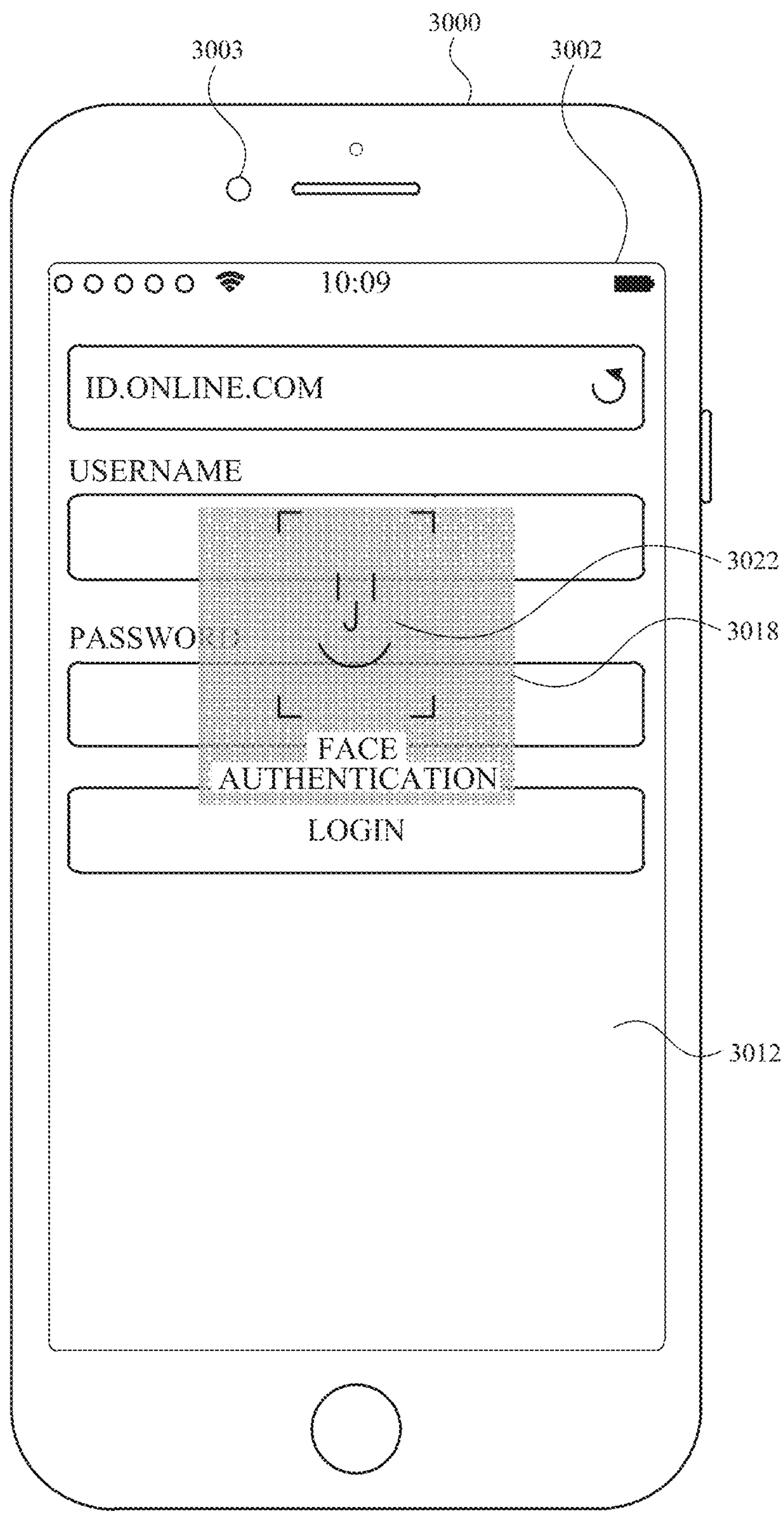
Figure 30D:
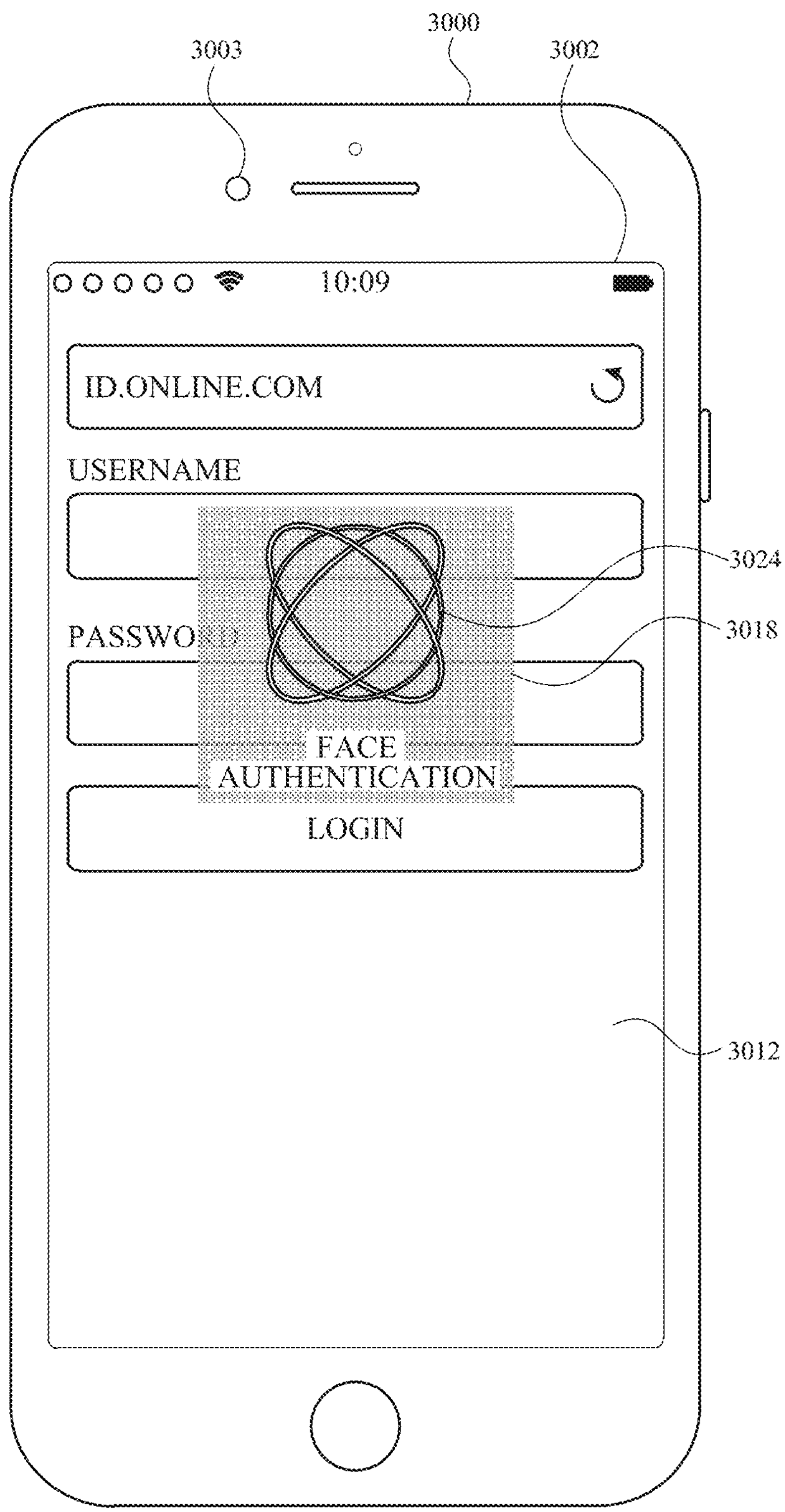

In FIG. 30C, electronic device 3000 displays a portion of a biometric authentication animation including biometric authentication glyph 3022, which serves as a portion of the animation during which biometric sensor 3003 obtains biometric data. In some examples, the animation of which glyphs 3020 and 3022 are a part indicates that the electronic device is attempting to identify a biometric feature of a particular type (e.g., identify a face). Once electronic device 3000 has obtained biometric data (e.g., obtained sufficient biometric data), electronic device 3000 transitions to displaying biometric authentication glyph 3024, as shown in FIG. 30D. Electronic device 3000 displays biometric authentication glyph 3024 to indicate that the biometric data is being processed. In some examples, biometric authentication glyph 3024 includes a plurality of rings, which rotate spherically, for instance, while displayed.

Figure 30E:
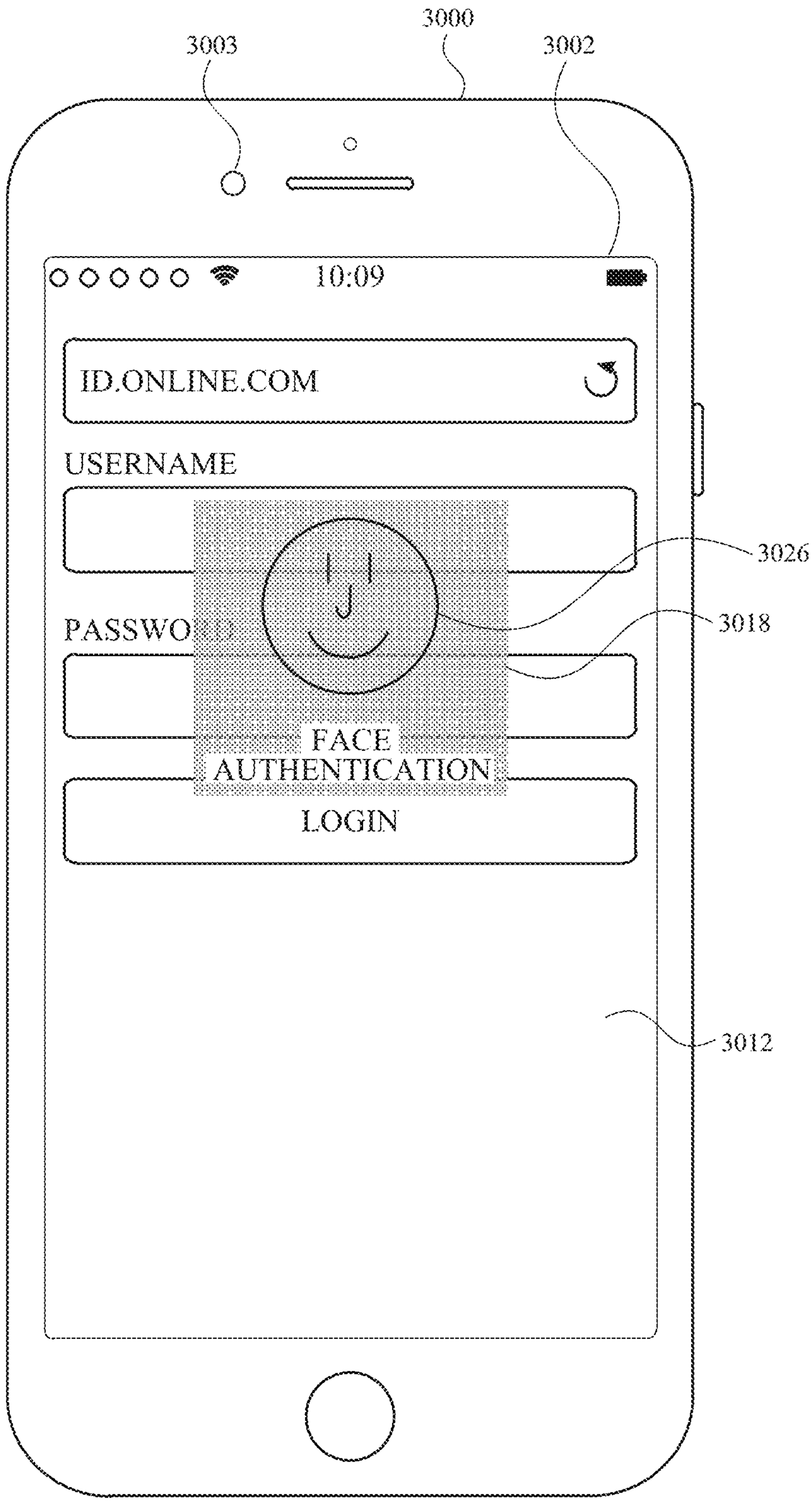

In FIG. 30E, a determination is made that biometric authentication is successful. As a result, electronic device 3000 displays successful biometric authentication glyph 3026 indicating that biometric authentication was successful.

Figure 30F:
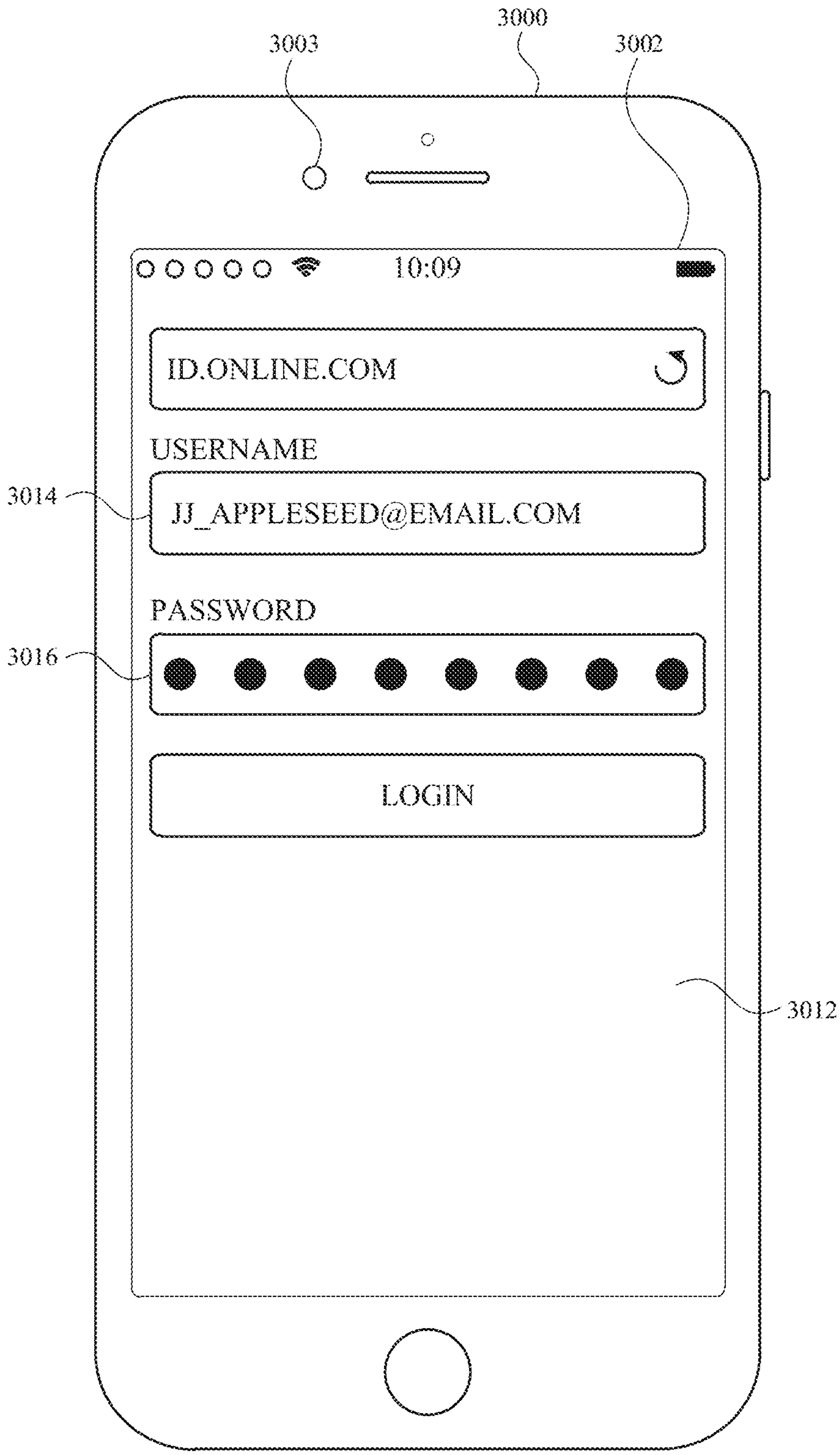

In FIG. 30F, since biometric authentication was successful, electronic device 3000 autofills username field 3014 and password field 3016 with credential information (e.g., a username and password that enables a user to successfully log-in to an account). Electronic device 3000 autofills the fields while the device is in an unlocked state. In some examples, a determination is made that biometric authentication failed (e.g., biometric authentication criteria have not been met). As a result, in those examples, electronic device 3000 forgoes autofilling the one or more fillable fields (e.g., username field 3014 and password field 3016).

Figure 30G:
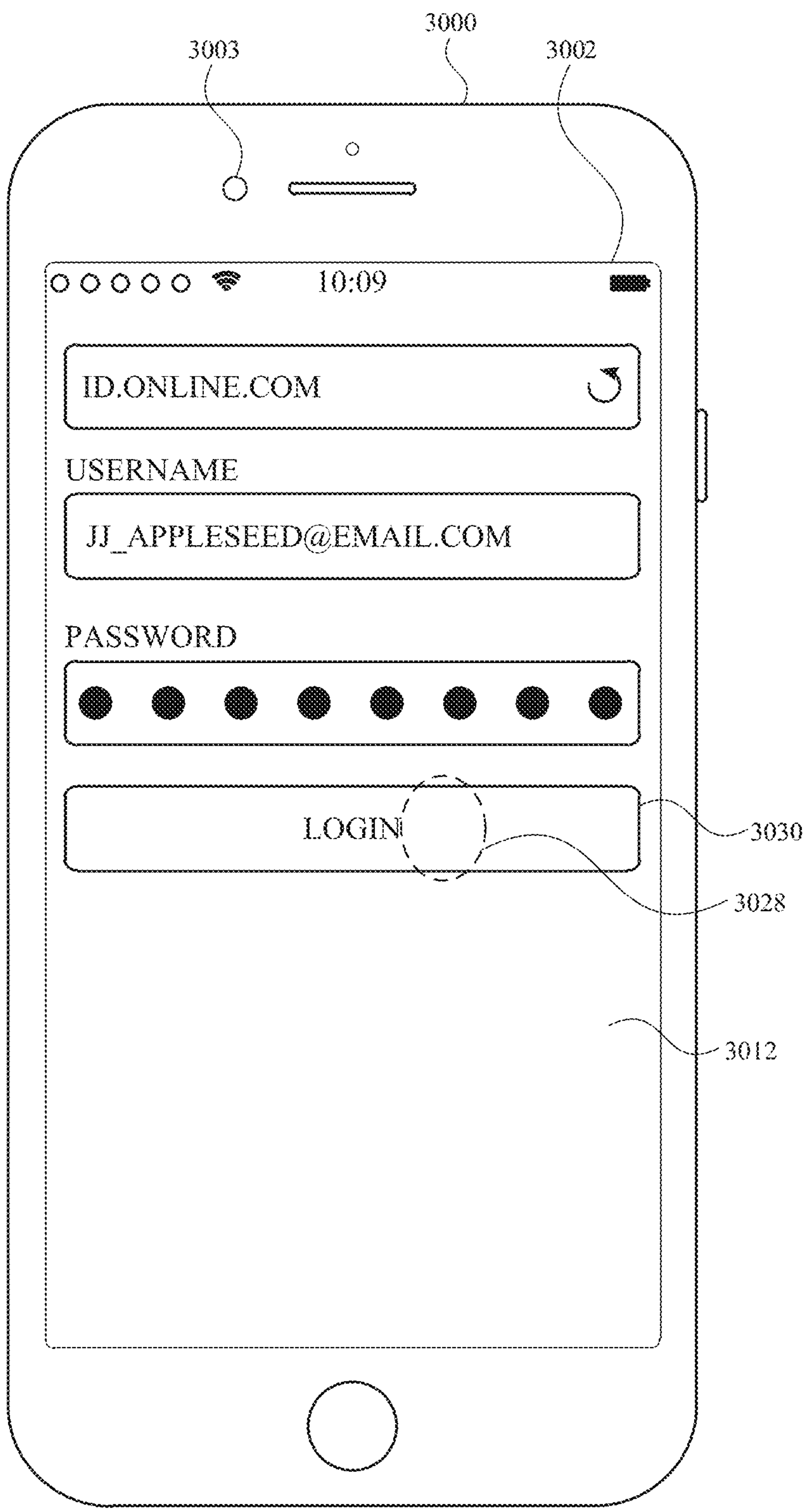
Figure 30H:
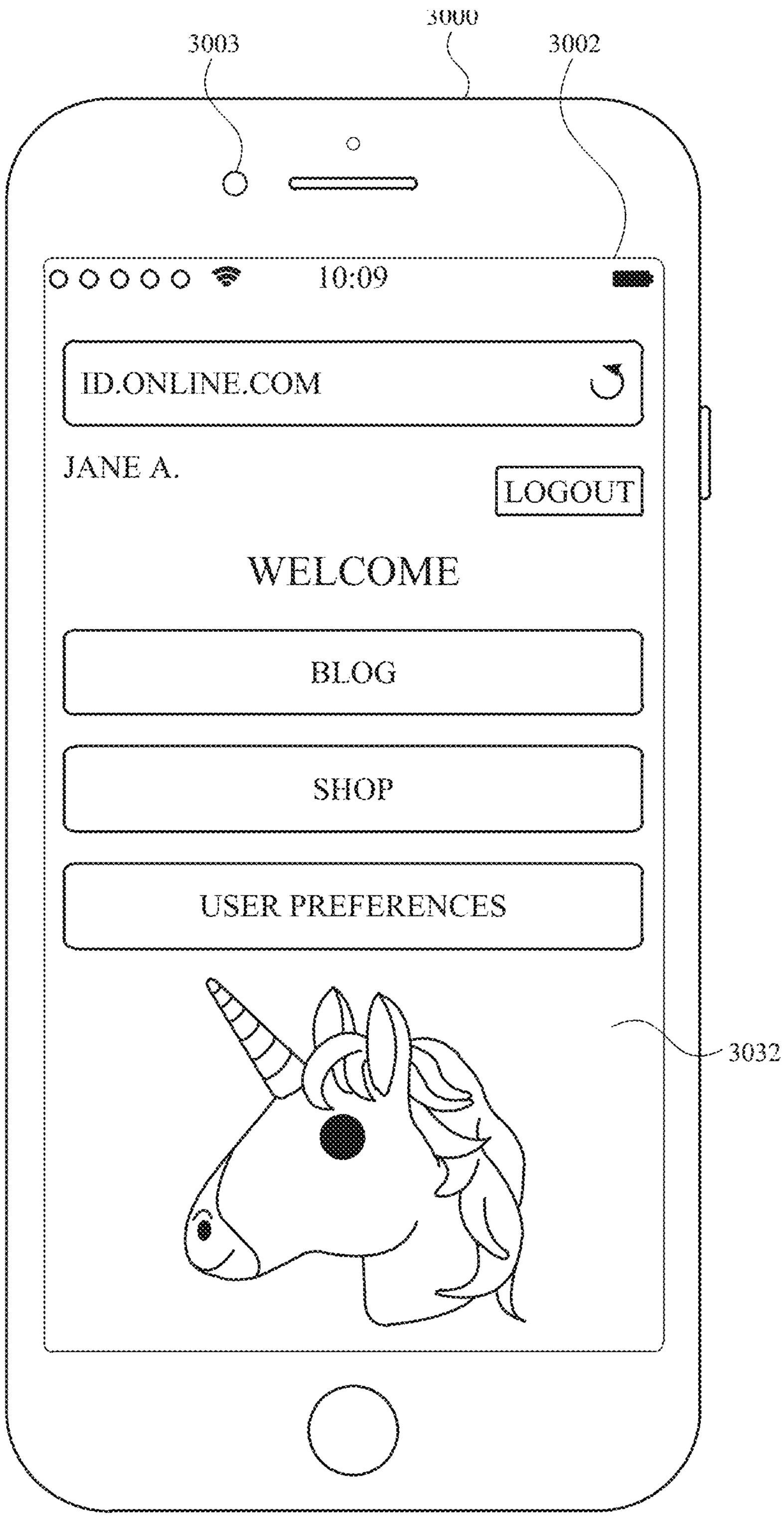

In FIG. 30G, electronic device 3000 detects tap gesture 3028 on submit affordance 3030. In response to detecting tap gesture 3028, electronic device 3000 submits the credential information in username field 3014 and password field 3016 for user authentication. Upon successful user authentication, electronic device 3000 provides access to restricted content (e.g., content that can only be seen once a user has logged in) in account user interface 3032 of FIG. 30H.

Figure 30I:
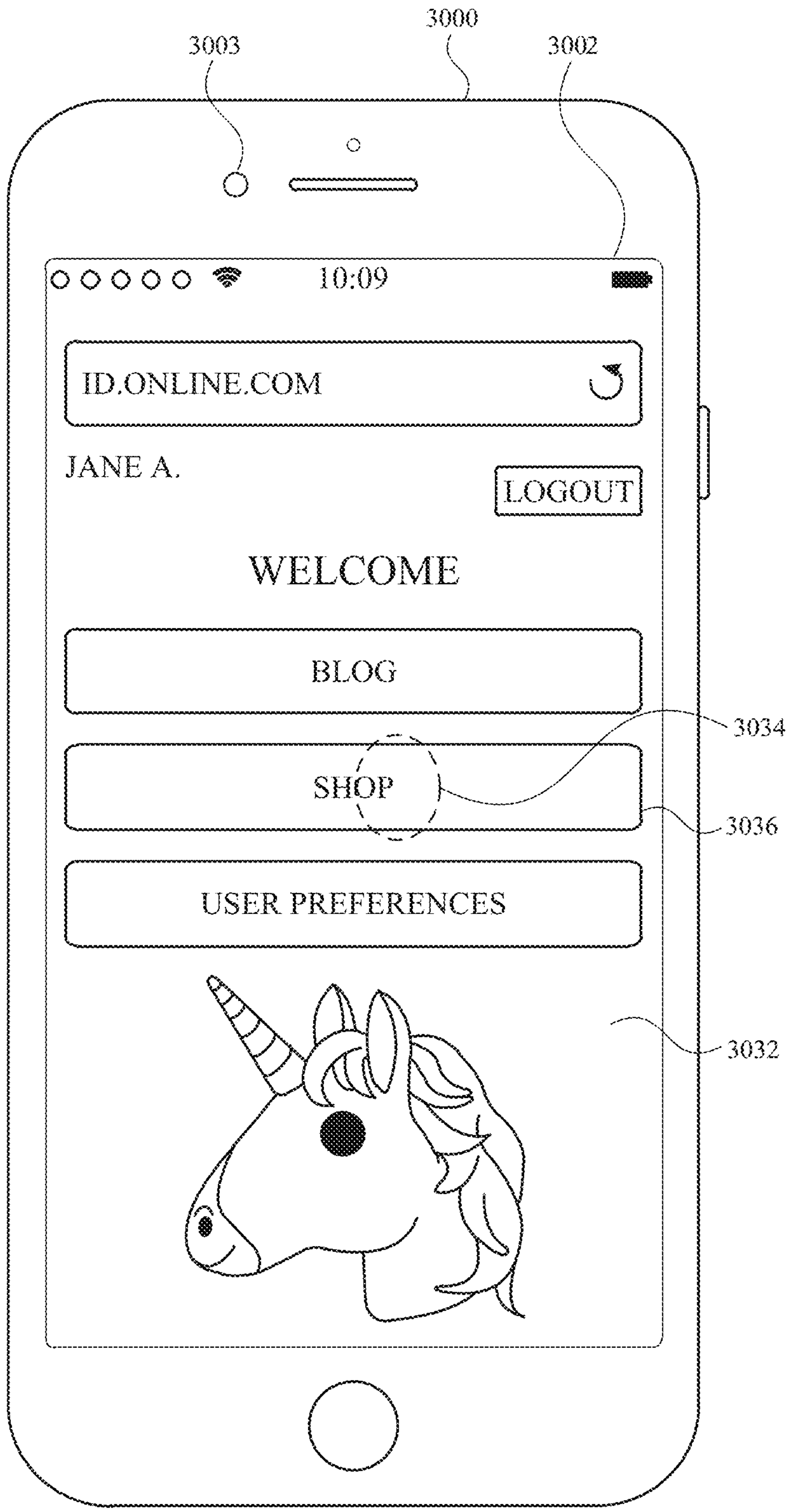

In FIG. 30I, electronic device 3000 detects tap gesture 3034 on shop affordance 3036. Electronic device 3000 identifies tap gesture 3034 as a request to load log-in user interface 3038 (shown in FIG. 30J). User interface 3038 is the webpage shop.online.com. In some examples, shop.online.com is a subdomain of online.com domain that requires successful authentication before access is granted to restricted content. In some examples, such as the example of FIG. 30J, the subdomain shop.online.com requires separate authentication than that required by one or more other subdomains of the online.com domain, such as the subdomain id.online.com, discussed with respect to FIG. 30B-30I. Electronic device 3000 also identifies tap gesture 3034 as a request to autofill one or more fillable fields (e.g., username field 3040 and password field 3042) in log-in user interface 3038. As described earlier, in some examples, the request also includes a request to automatically log-in the user such that the user does not need to tap a submit affordance (e.g., 3030, 3046) in order to submit credentials and log-in.

Figure 30J:
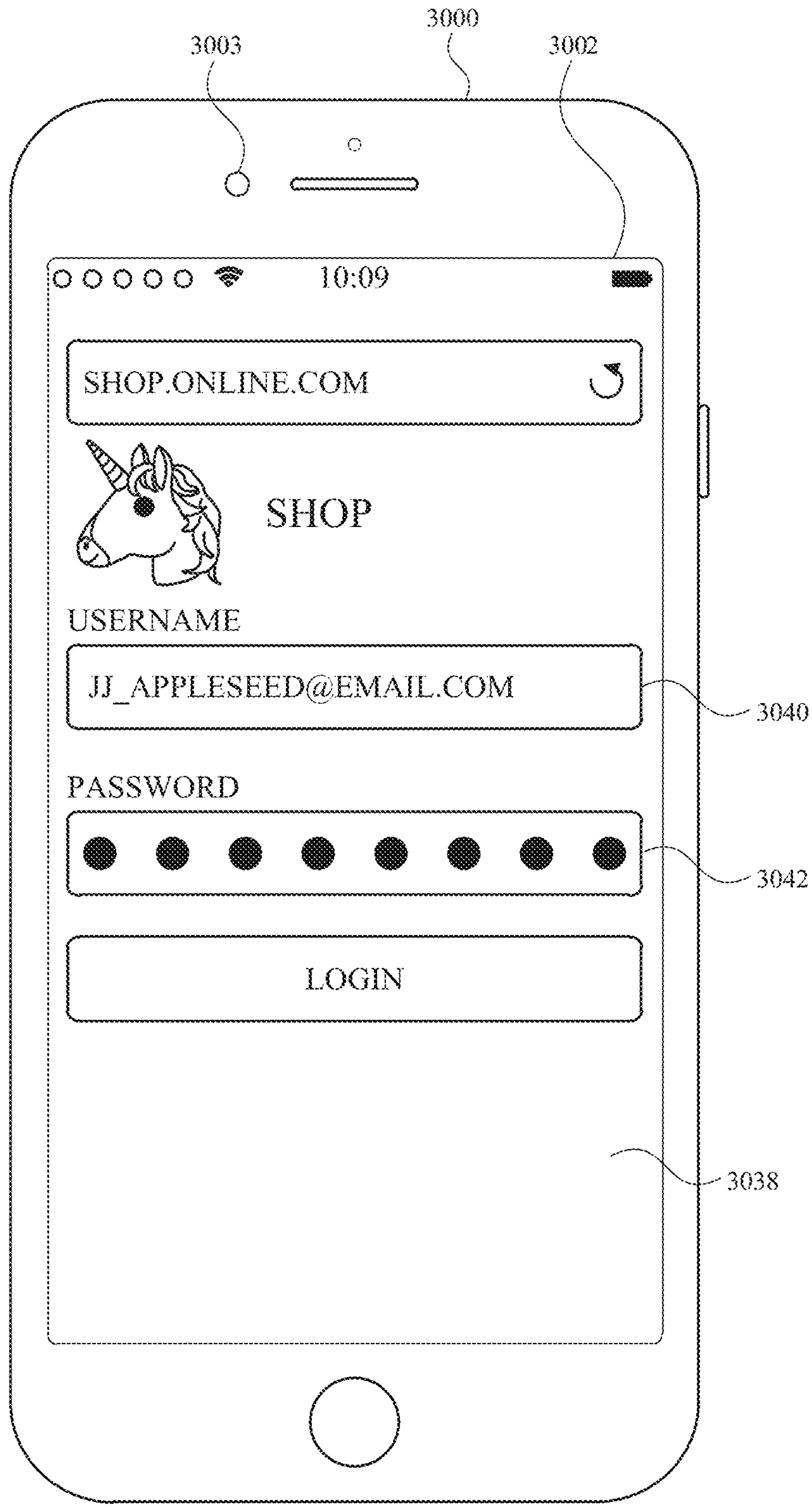
Figure 30K:
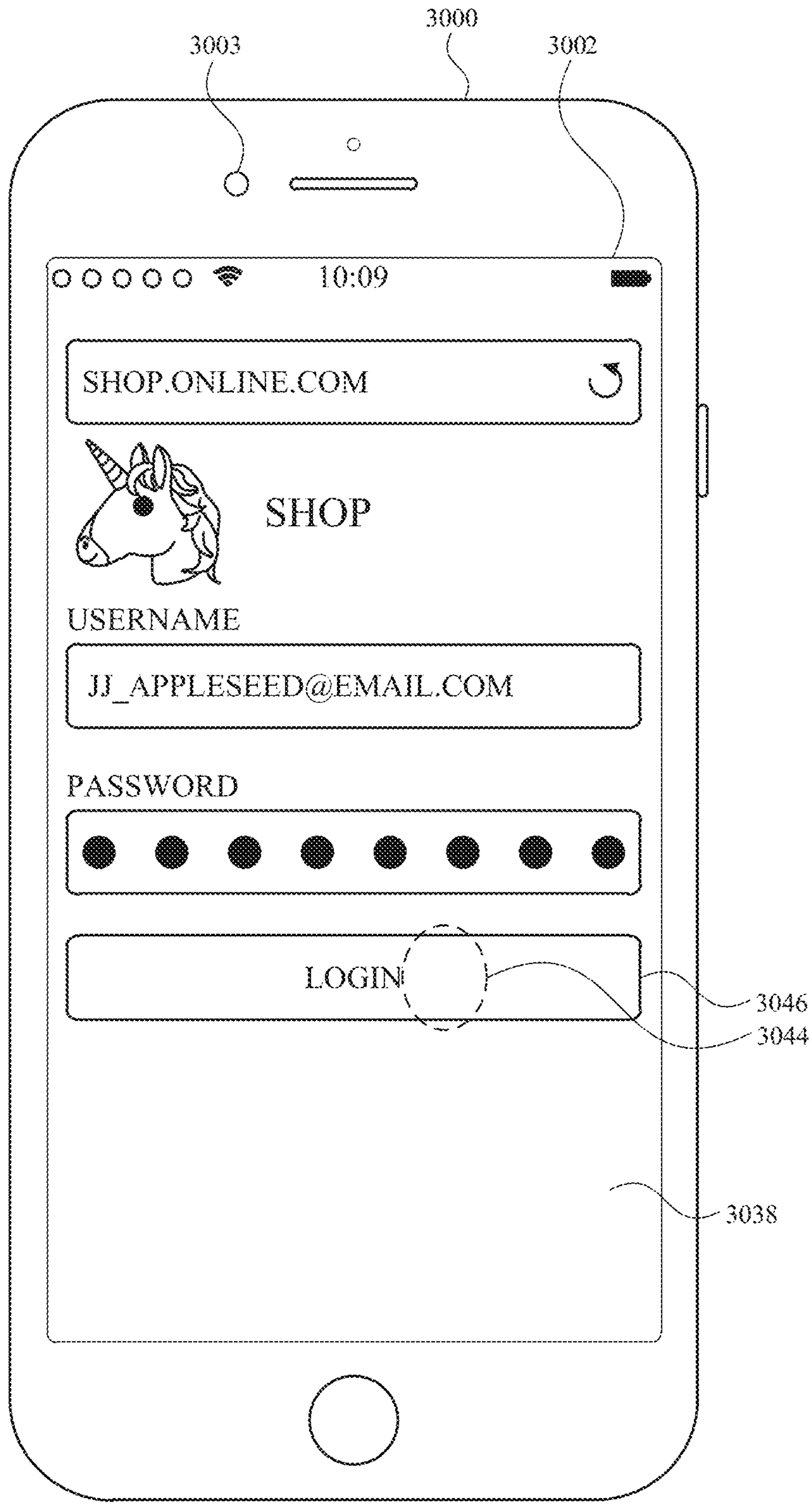
Figure 30L:

In response to the request to autofill the fillable fields, a determination is made that cached authentication is available for use from the successful authentication that occurred in FIG. 30E. As a result, electronic device 3000 forgoes re-performing biometric authentication and proceeds to autofill username field 3040 and password field 3042, as shown in FIG. 30J. Electronic device 3000 autofills the fields regardless of whether biometric sensor 3003 detects a biometric feature (e.g., a face or a finger). In FIG. 30K, electronic device 3000 detects tap gesture 3044 on submit affordance 3046. In response to detecting tap gesture 3044, electronic device 3000 submits the credential information in username field 3040 and password field 3042 for user authentication. Upon successful user authentication, electronic device 3000 provides access to restricted content (e.g., content that can only be seen once a user has logged in) in shop user interface 3048 of FIG. 30L.

Alternatively, in response to the request to autofill the fillable fields, a determination is made that cached authentication is not available for use. FIGS. 30N-30V, as described below, illustrate various examples that cause cached authentication to not be available for use by electronic device 3000. FIGS. 30W-Y, as described below, depict that biometric authentication must be performed when cached authentication is not available for use.

Figure 30M:

In FIG. 30M, electronic device 3000 displays shop user interface 3048 and detects tap gesture 3050 on link affordance 3052. In response to detecting tap gesture 3050, electronic device 3000 displays account user interface 3032, as shown in FIG. 30N.

Figure 30N:
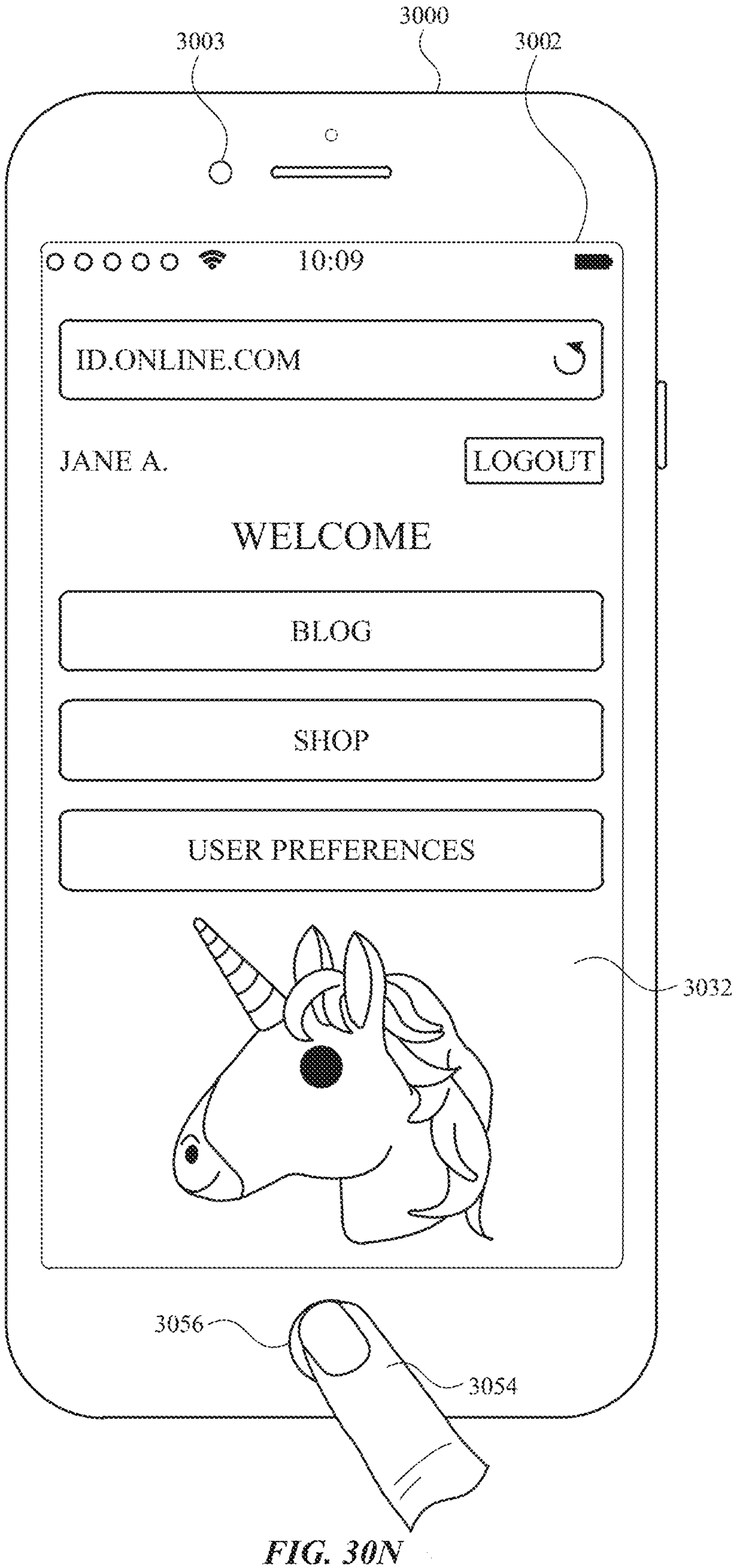
Figure 30O:
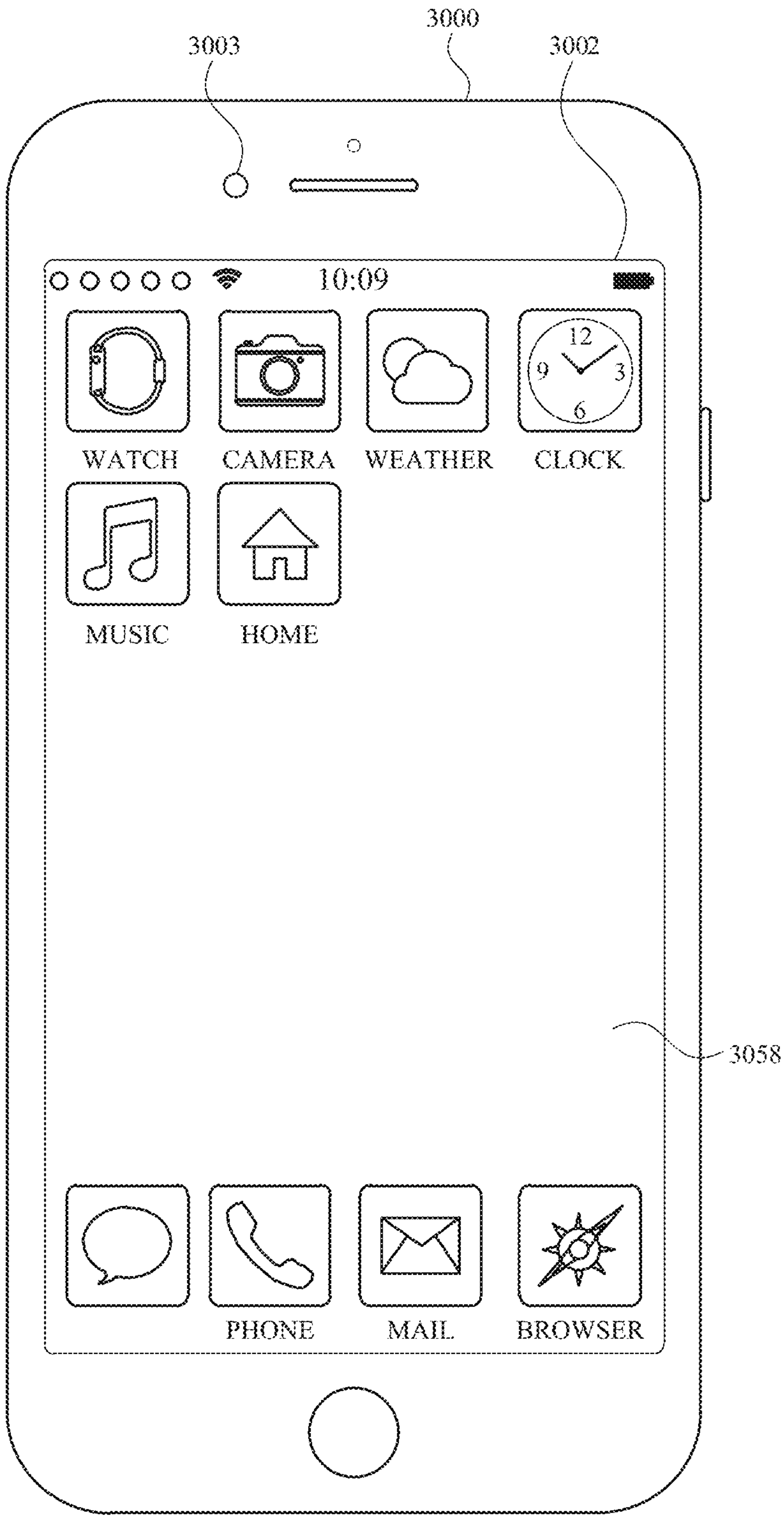

FIGS. 30N-30O depict one example that causes cached authentication to not be available for use by electronic device 3000. In FIG. 30N, electronic device 3000 detects input (e.g., single press) by finger 3054 at home button 3056. In response to detecting the input, electronic device 3000 displays home screen 3058, as shown in FIG. 30O, and causes the application with account user interface 3032 to enter an inactive state (e.g., suspended state, hibernated state, background state, and/or non-active state). If the application has been in an inactive state for more than a threshold amount of time (e.g., two minutes and forty seconds) between when the fillable fields in log-in user interface 3012 (e.g., FIG. 30F) are autofilled and the request to autofill the fillable fields in log-in user interface 3038 (e.g., FIG. 30J) is received, cached authentication is not available for use by electronic device 3000.

Figure 30P:
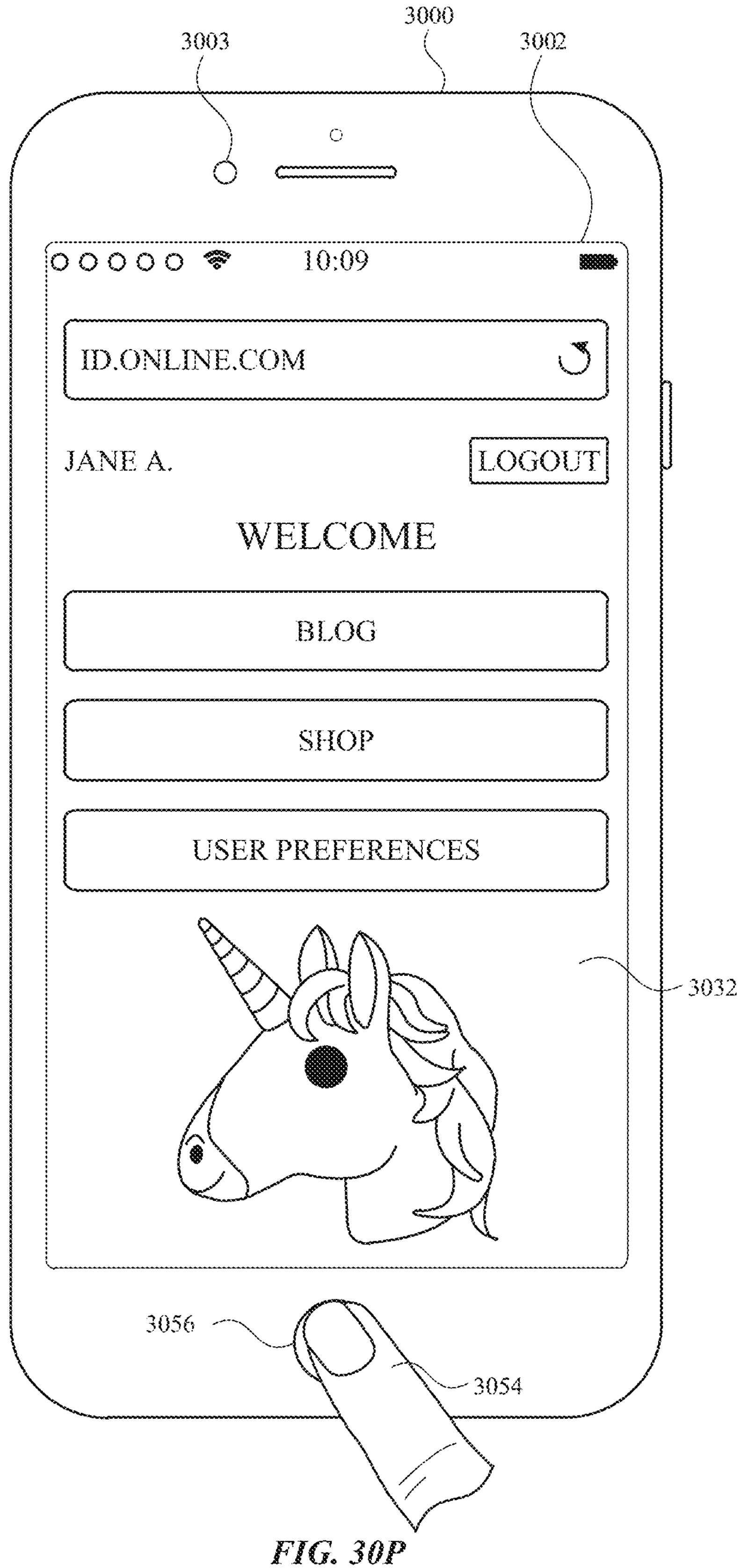
Figure 30Q:
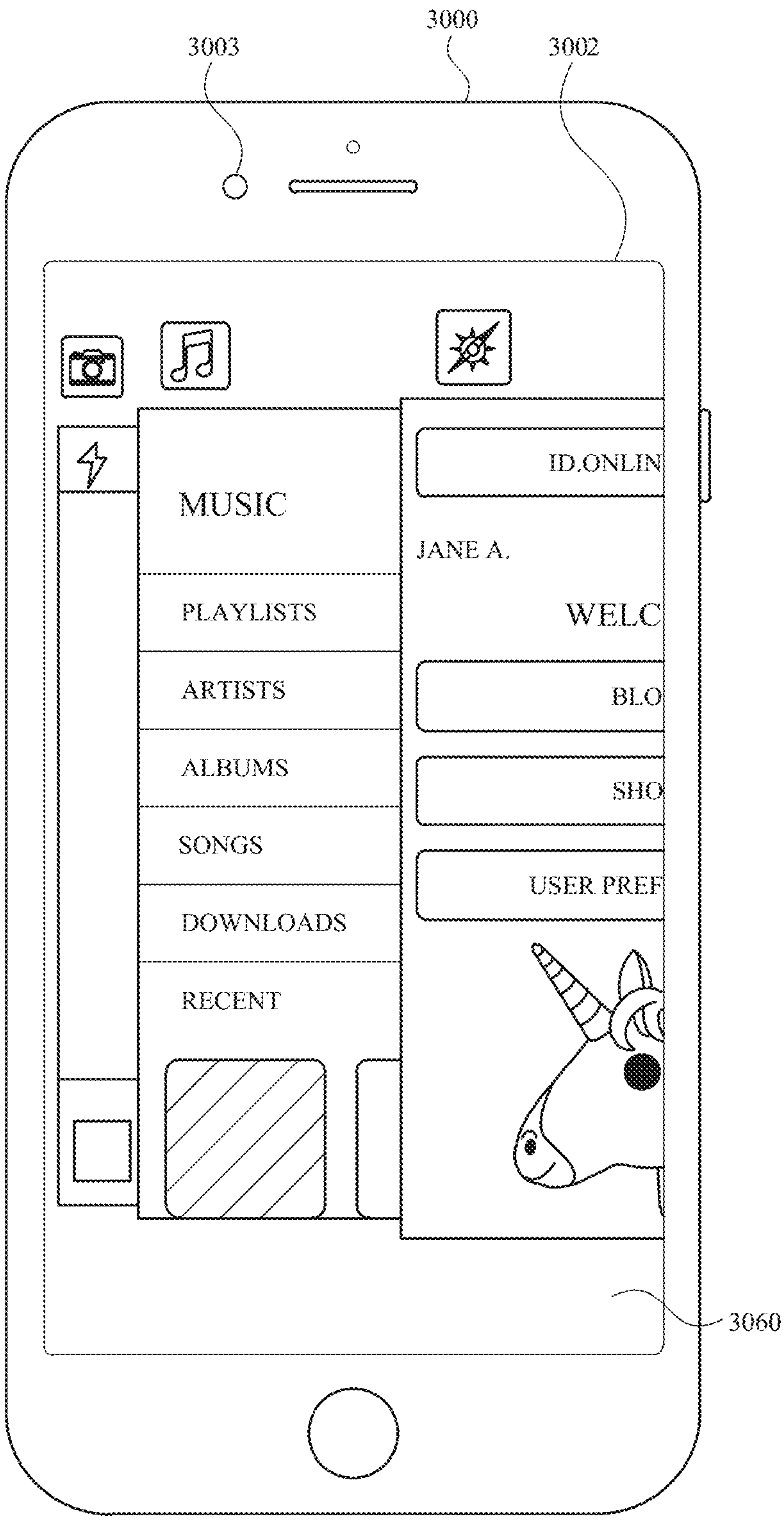
Figure 30R:
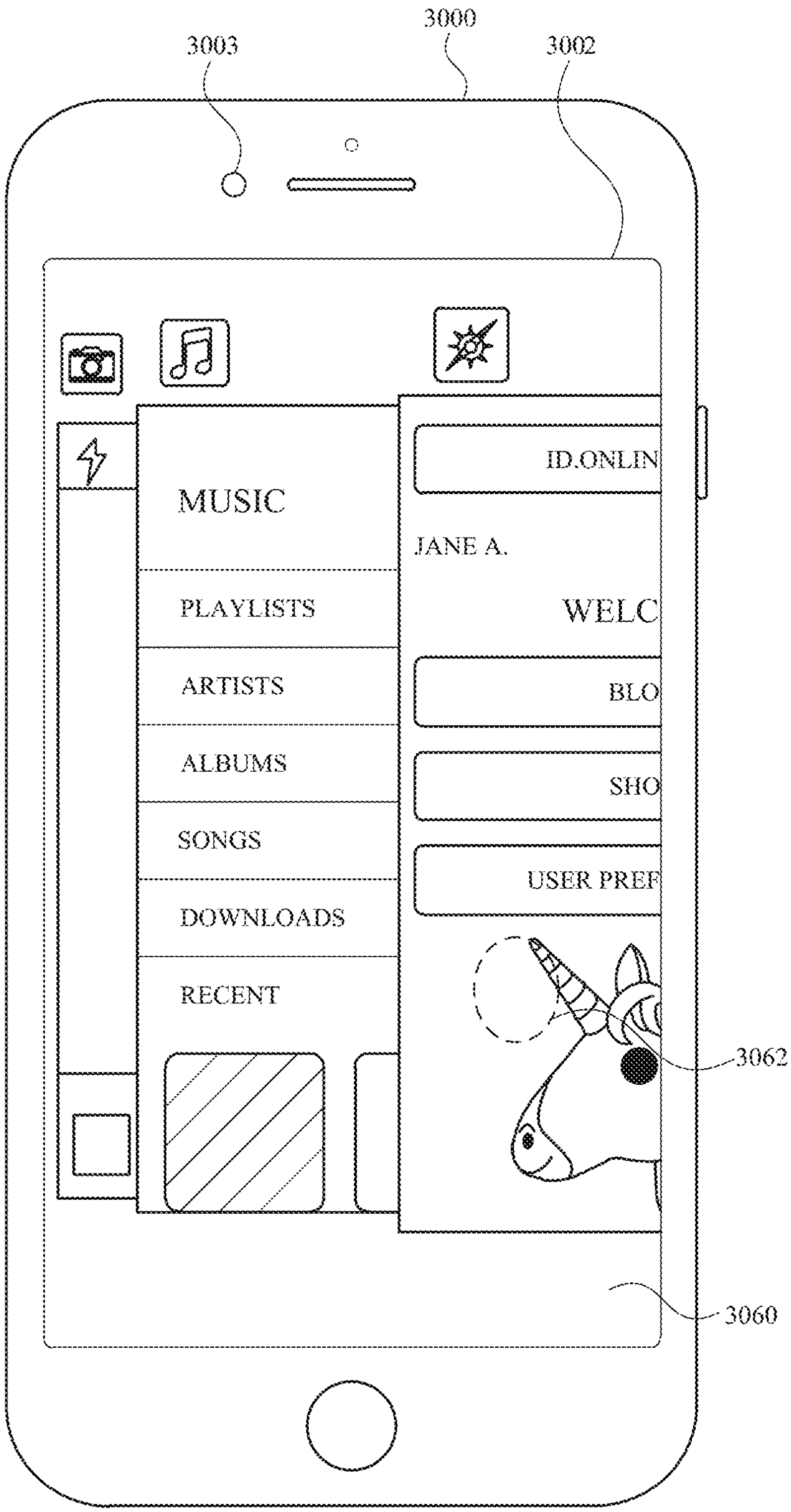
Figure 30S:
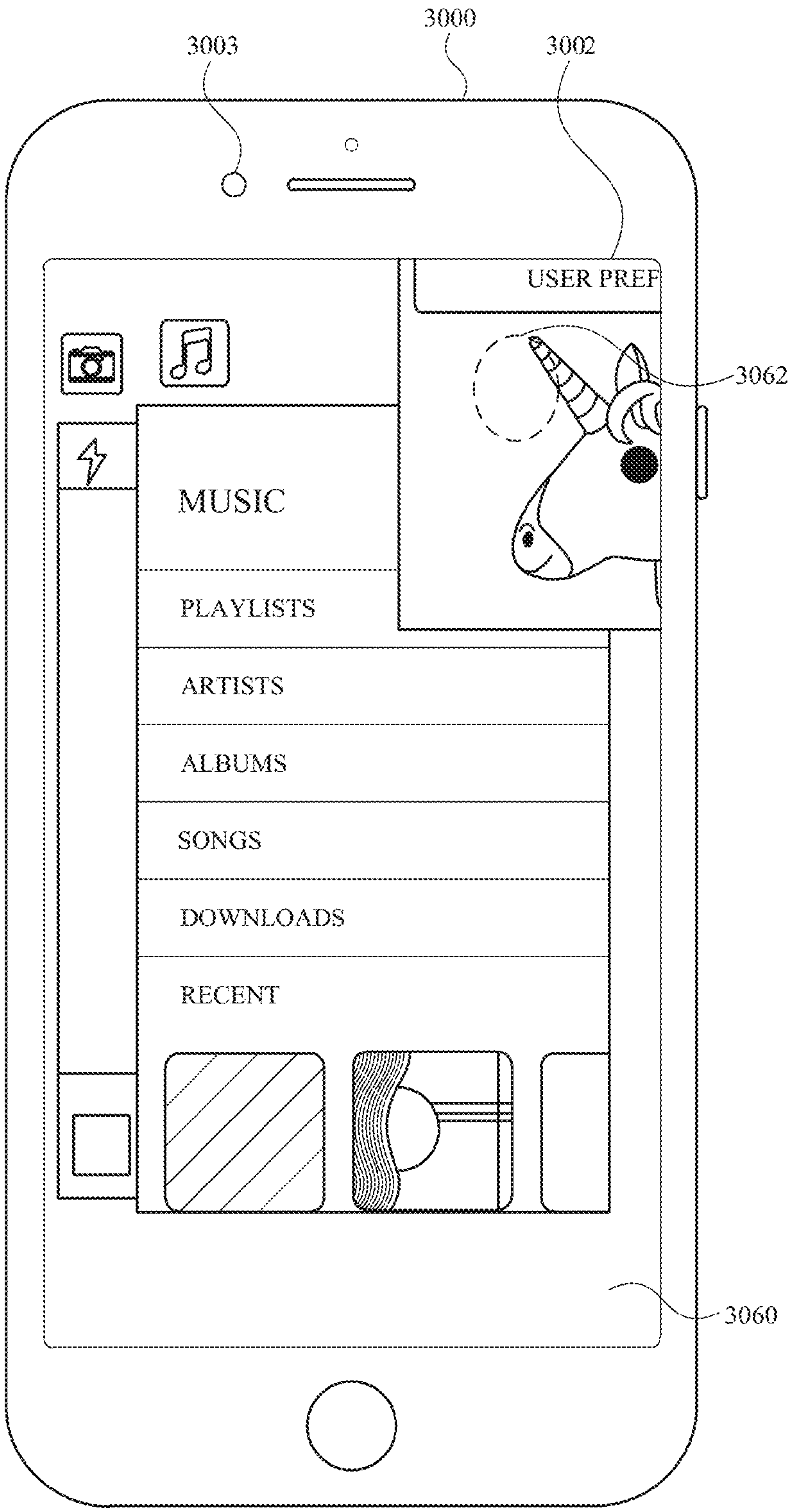
Figure 30T:
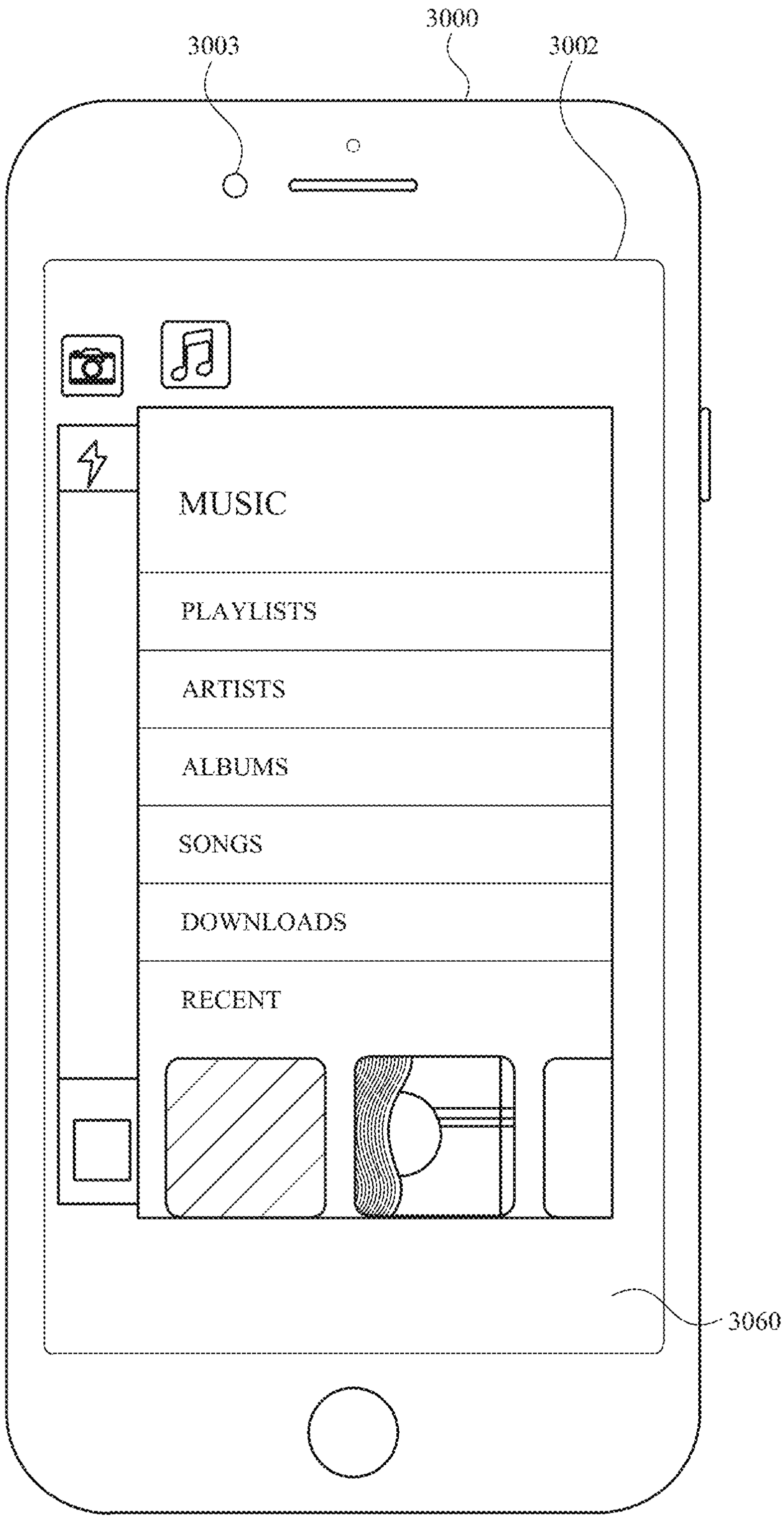

FIGS. 30P-30T depict one example that causes cached authentication to not be available for use by electronic device 3000. In FIG. 30P, electronic device 3000 detects input (e.g., double press) by finger 3054 at home button 3056. In response to detecting the input, electronic device 3000 displays recently used apps view 3060, as shown in FIG. 30Q. In FIGS. 30R-30S, electronic device 3000 detects swipe gesture 3062, which causes the application with account user interface 3032 to close (e.g., terminate). As a result, electronic device 3000 displays recently used apps view 3060, which no longer includes the application with account user interface 3032, as illustrated by FIG. 30T. Once the application has been closed between when the fillable fields in log-in user interface 3012 (e.g., FIG. 30F) are autofilled and the request to autofill the fillable fields in log-in user interface 3038 (e.g., FIG. 30J) is received, cached authentication is not available for use by electronic device 3000.

Figure 30U:
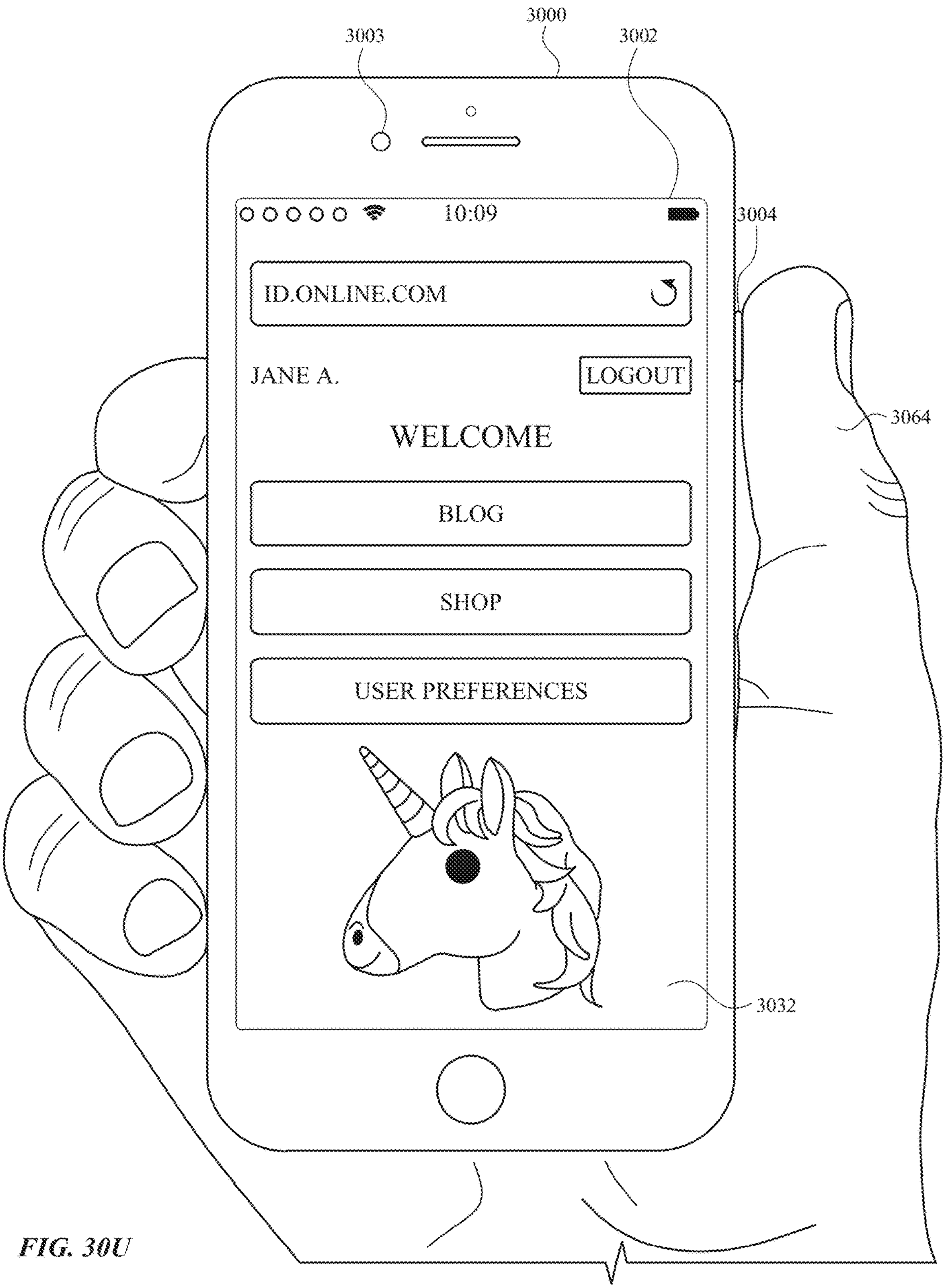
Figure 30V:
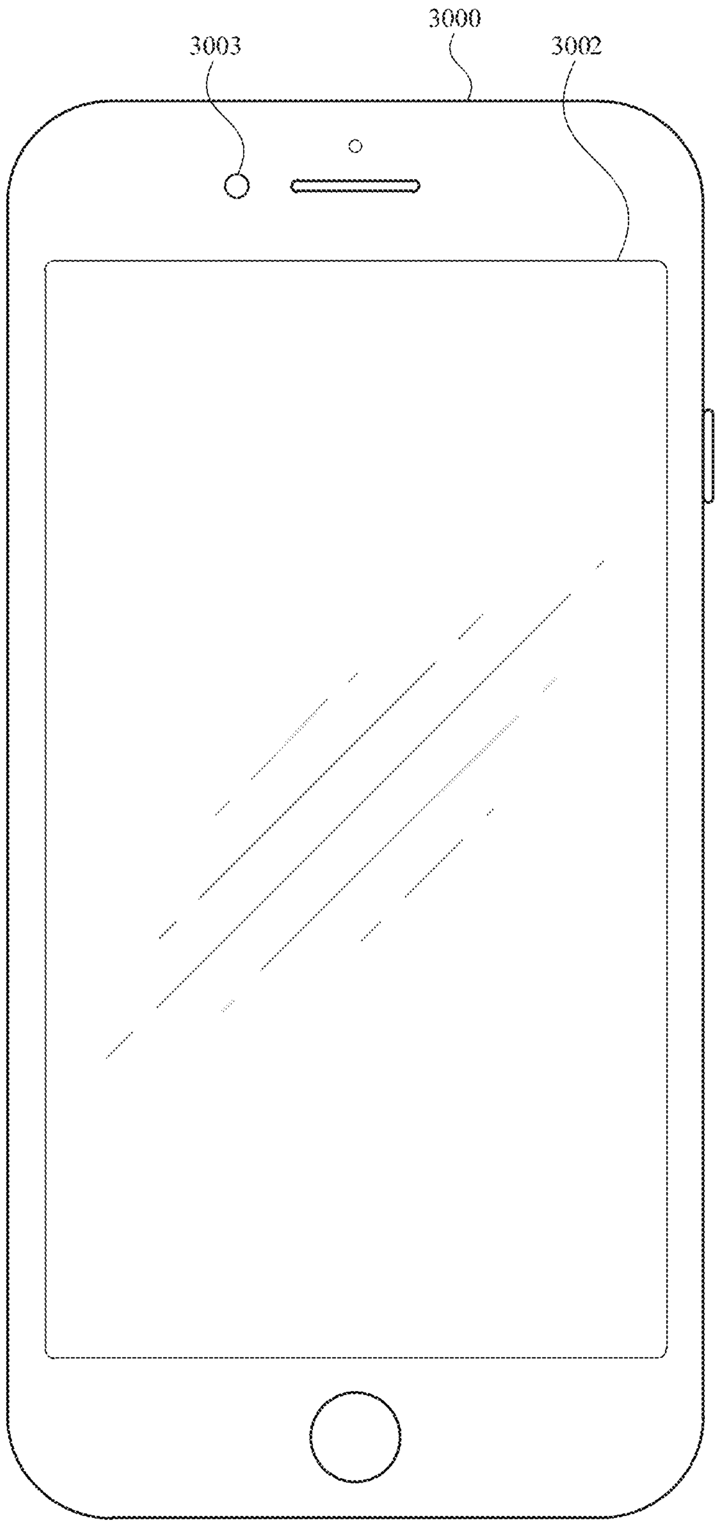
Figure 30W:
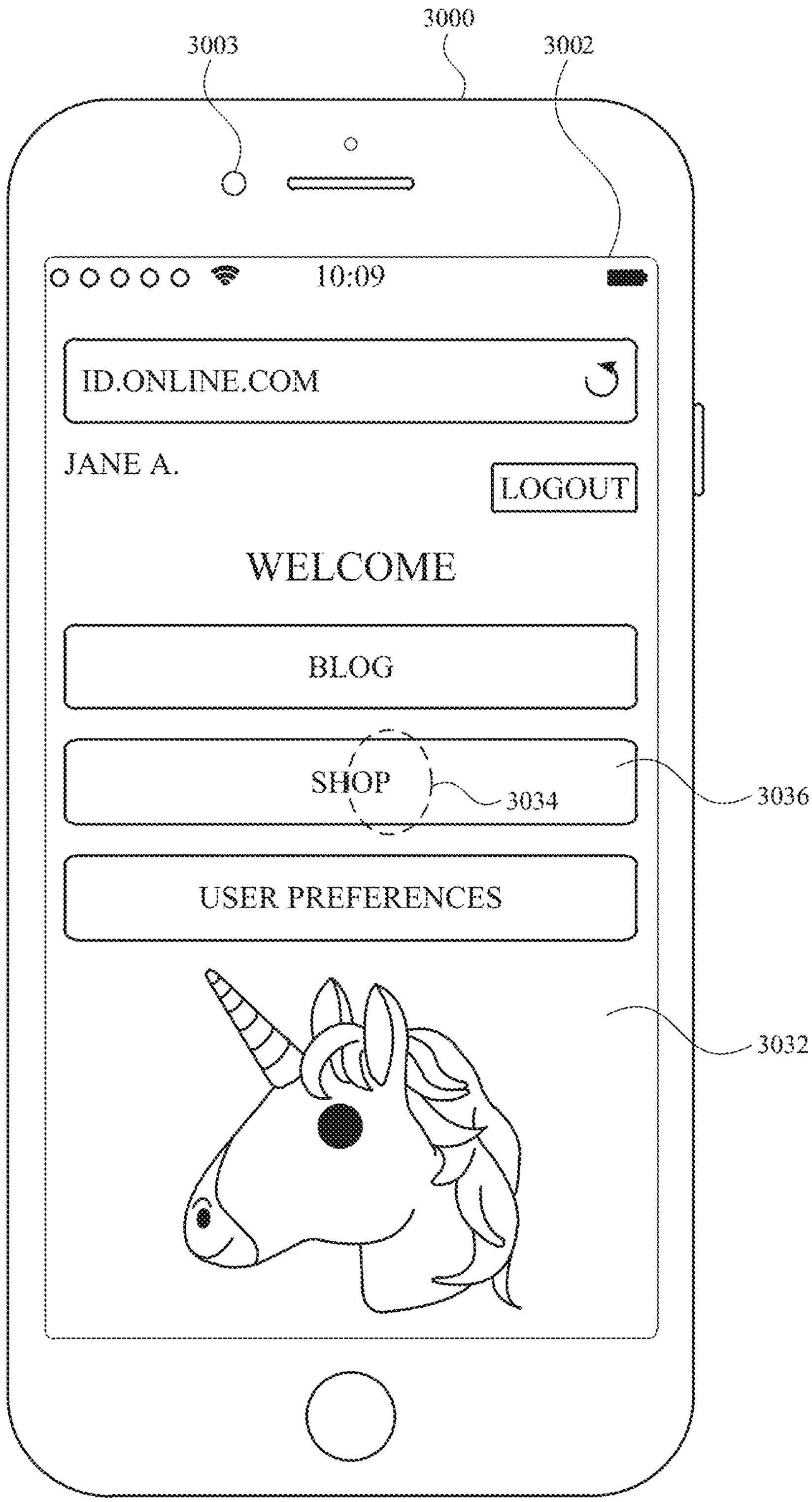
Figure 30X:
Figure 30Y:
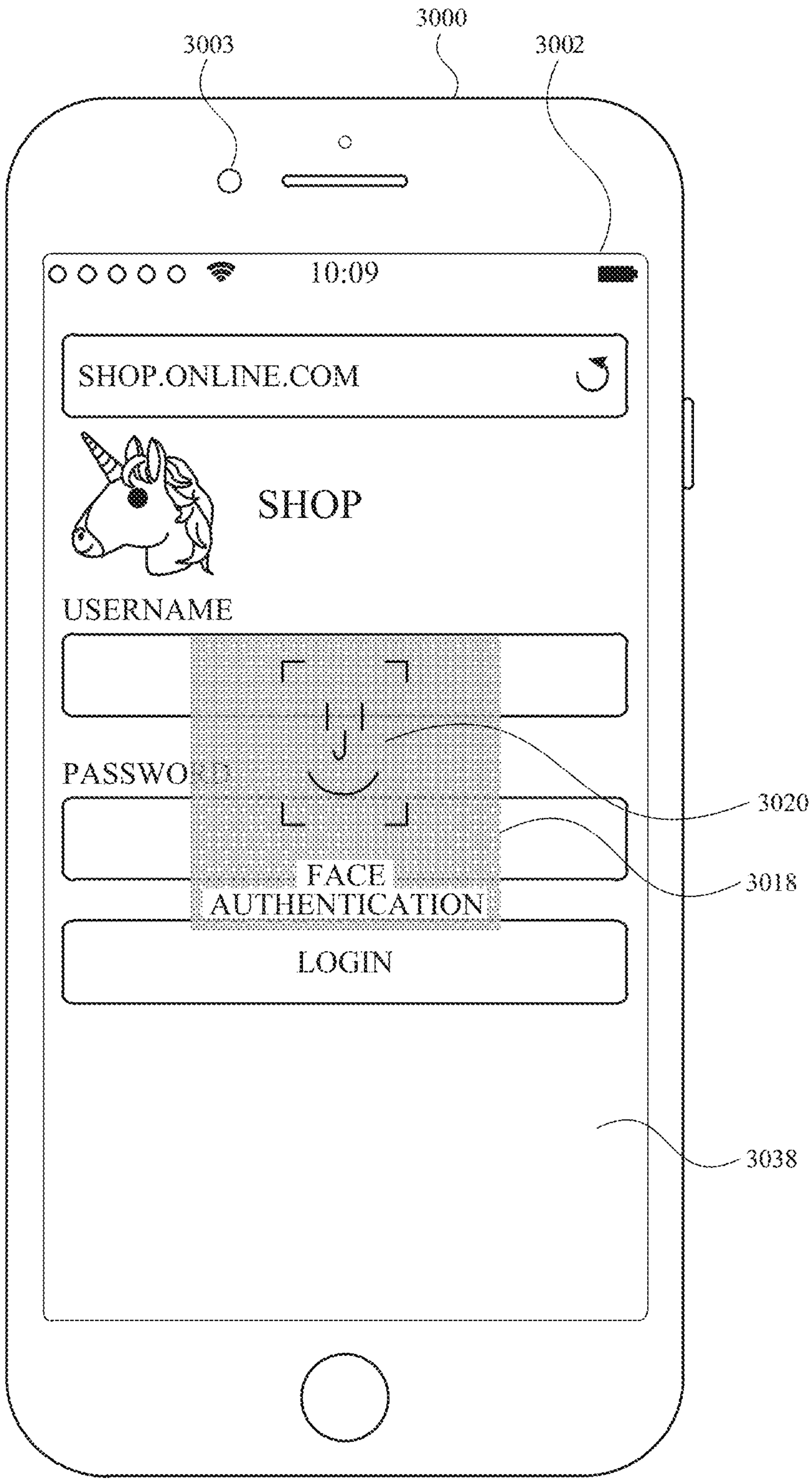

FIGS. 30U-30V depict one example that causes cached authentication to not be available for use by electronic device 3000. In FIG. 30U, electronic device 3000 detects input (e.g., single press) by finger 3064 at button 3004. In response to detecting the input, electronic device 3000 transitions the device from an unlocked state to a locked state. Transitioning the device to a locked state includes deactivating (e.g., disabling) display 3002, the one or more biometric sensors 3003, and/or the microphone of electronic device 3000. In FIG. 30V, electronic device 3000 is in a locked state and does not display anything on display 3002. Once electronic device 3000 transitions to a locked state between when the fillable fields in log-in user interface 3012 (e.g., FIG. 30F) are autofilled and the request to autofill the fillable fields in log-in user interface 3038 (e.g., FIG. 30J) is received, cached authentication is not available for use by electronic device 3000.

In FIG. 30W, electronic device 3000 displays account user interface 3032, after cached authentication is no longer available (e.g., after one or more of the sequence of events discussed with respect to FIG. 30N-30O, 30P-30T, or 30U-30V). Electronic device 3000 detects tap gesture 3034 on shop affordance 3036. Electronic device 3000 identifies tap gesture 3034 as a request to load log-in user interface 3038 (shown in FIG. 30X). Electronic device 3000 also identifies tap gesture 3034 as a request to autofill one or more fillable fields (e.g., username field 3040 and password field 3042) in log-in user interface 3038. As described earlier, in some examples, the request also includes a request to automatically log-in the user such that the user does not need to tap a submit affordance to submit credentials and log-in.

In response to the request to autofill the one or more fillable fields, a determination is made that cached authentication is not available for use by electronic device 3000. In FIG. 30Y, electronic device 3000 re-performs biometric authentication using the one or more biometric sensors 3003. Biometric authentication occurs automatically in response receiving the request to autofill the fillable fields such that intermediate input from the user is not needed to initiate biometric authentication. If biometric authentication is successful (e.g., biometric authentication criteria are met), electronic device autofills the fillable fields. If biometric authentication is not successful (e.g., biometric authentication criteria are not met), electronic device 3000 forgoes autofilling the fillable fields.

Figure 30Z:
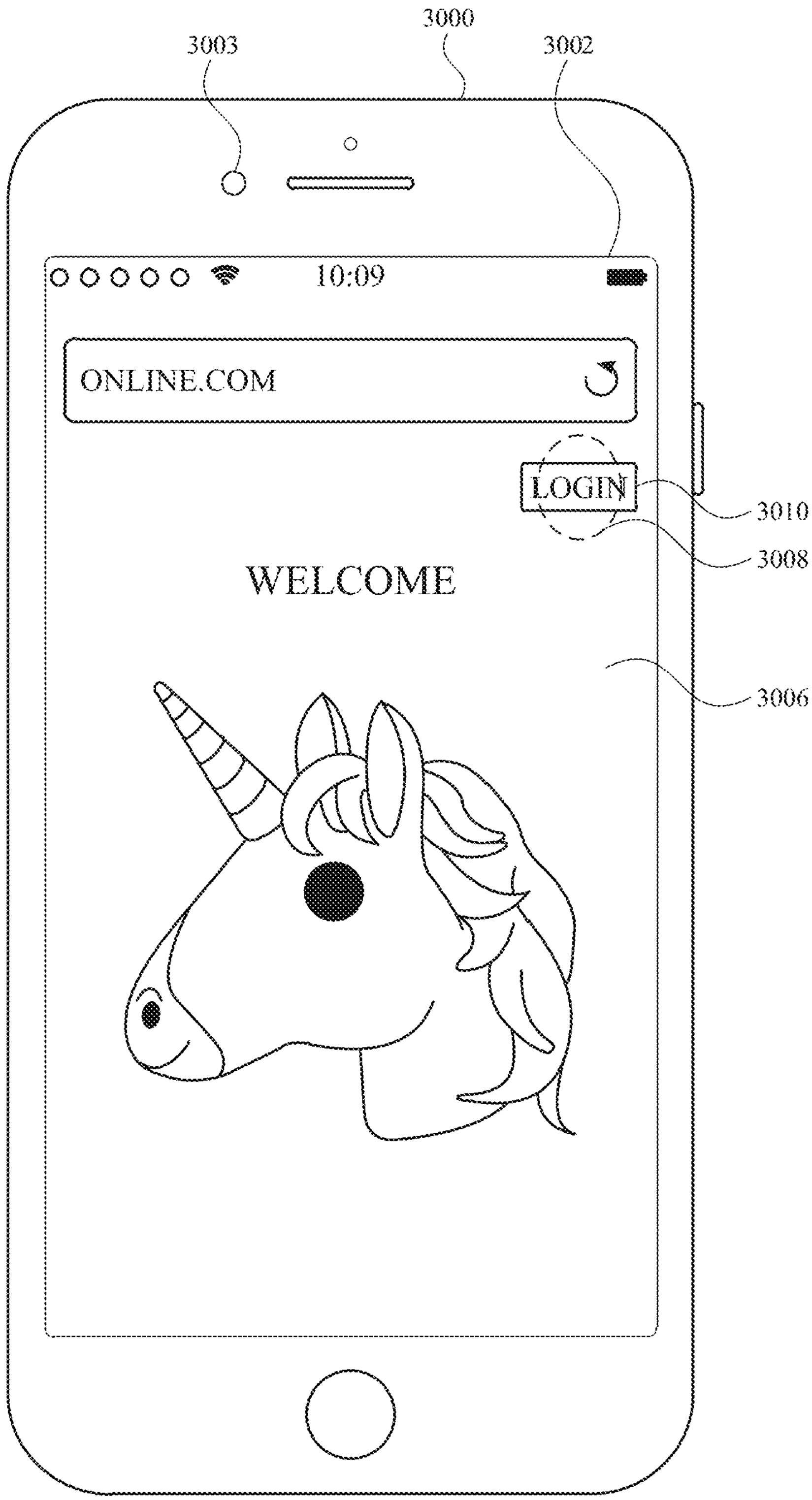
Figure 30A:
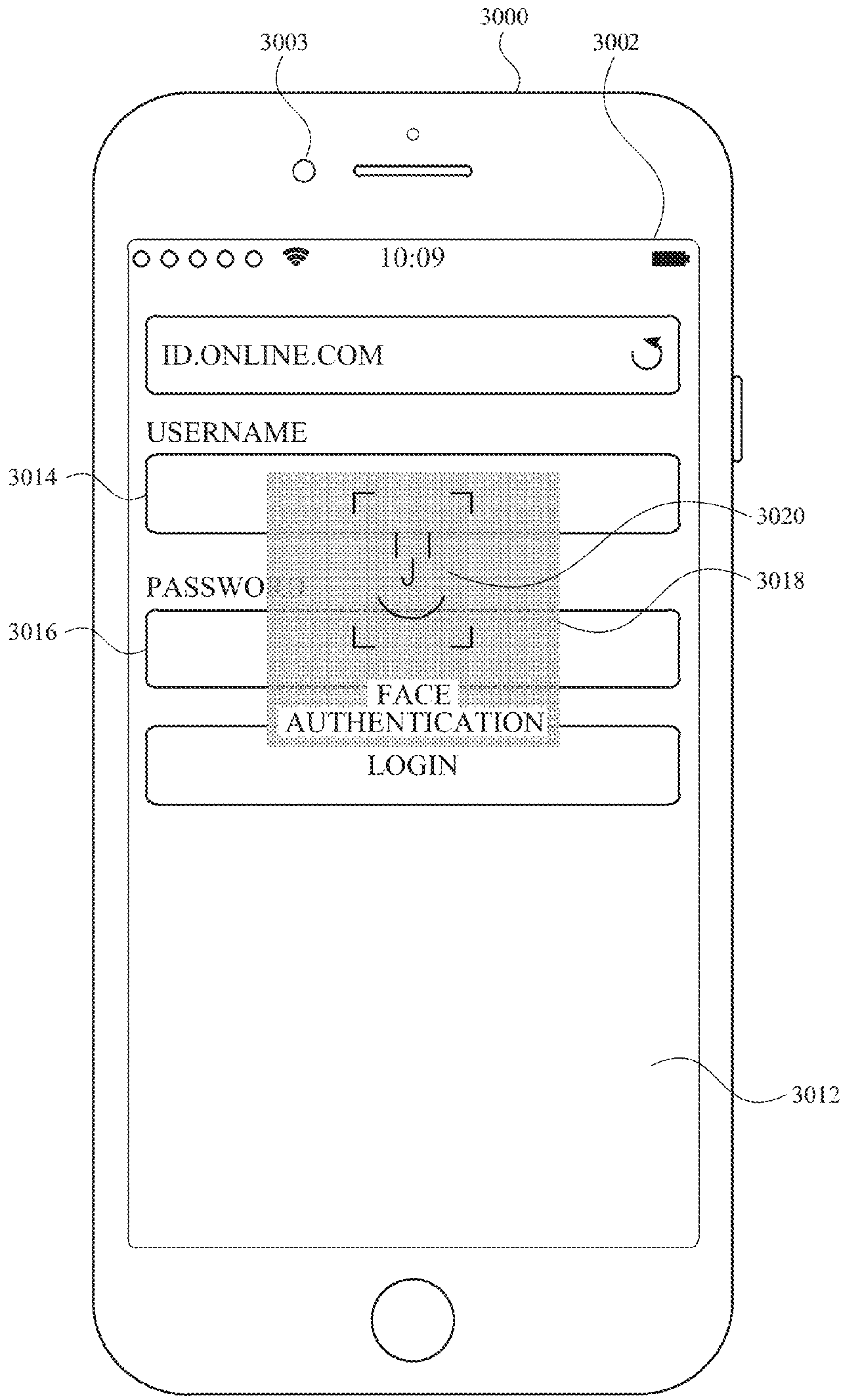
Figure 30A:
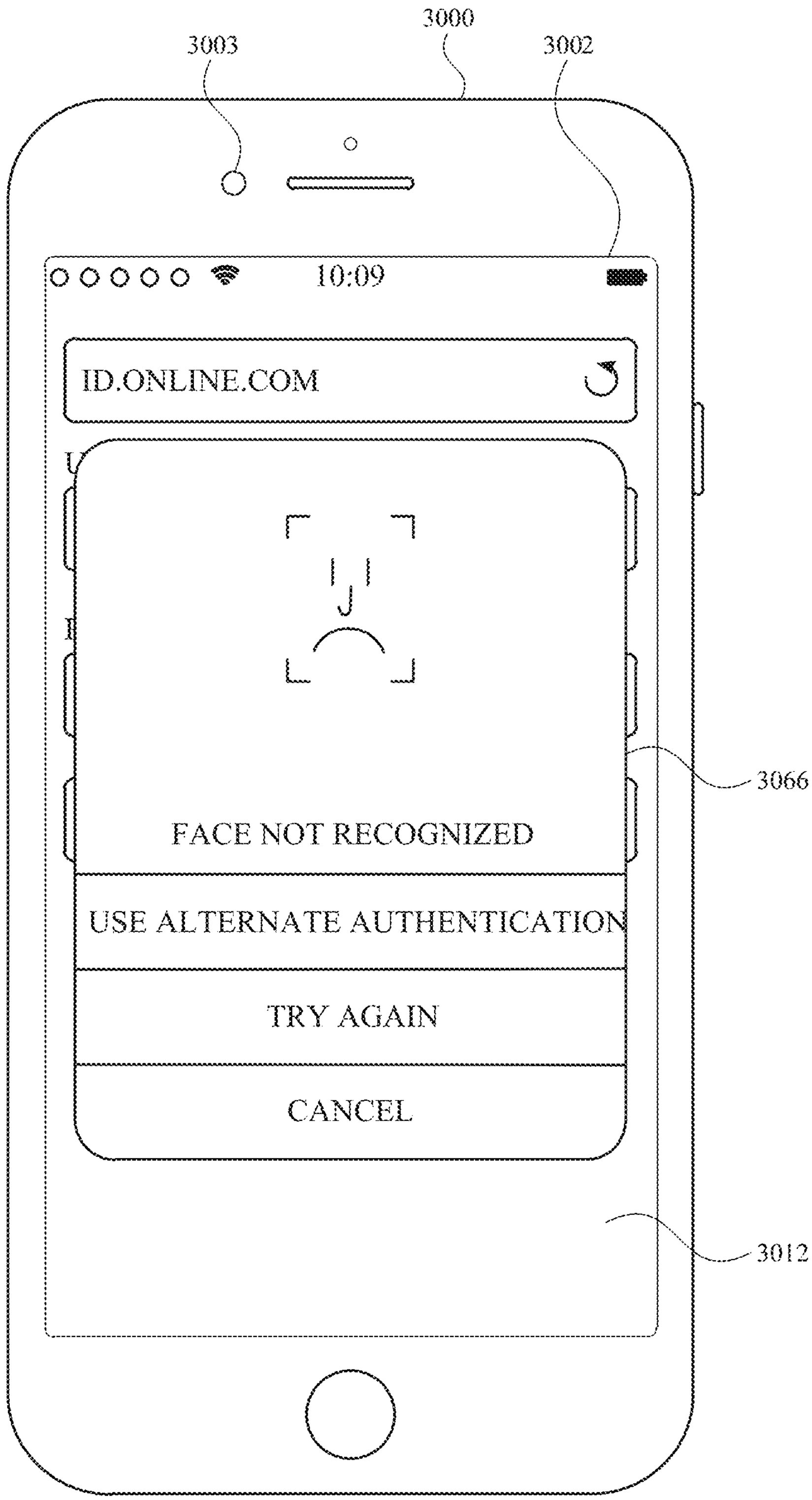
Figure 30A:
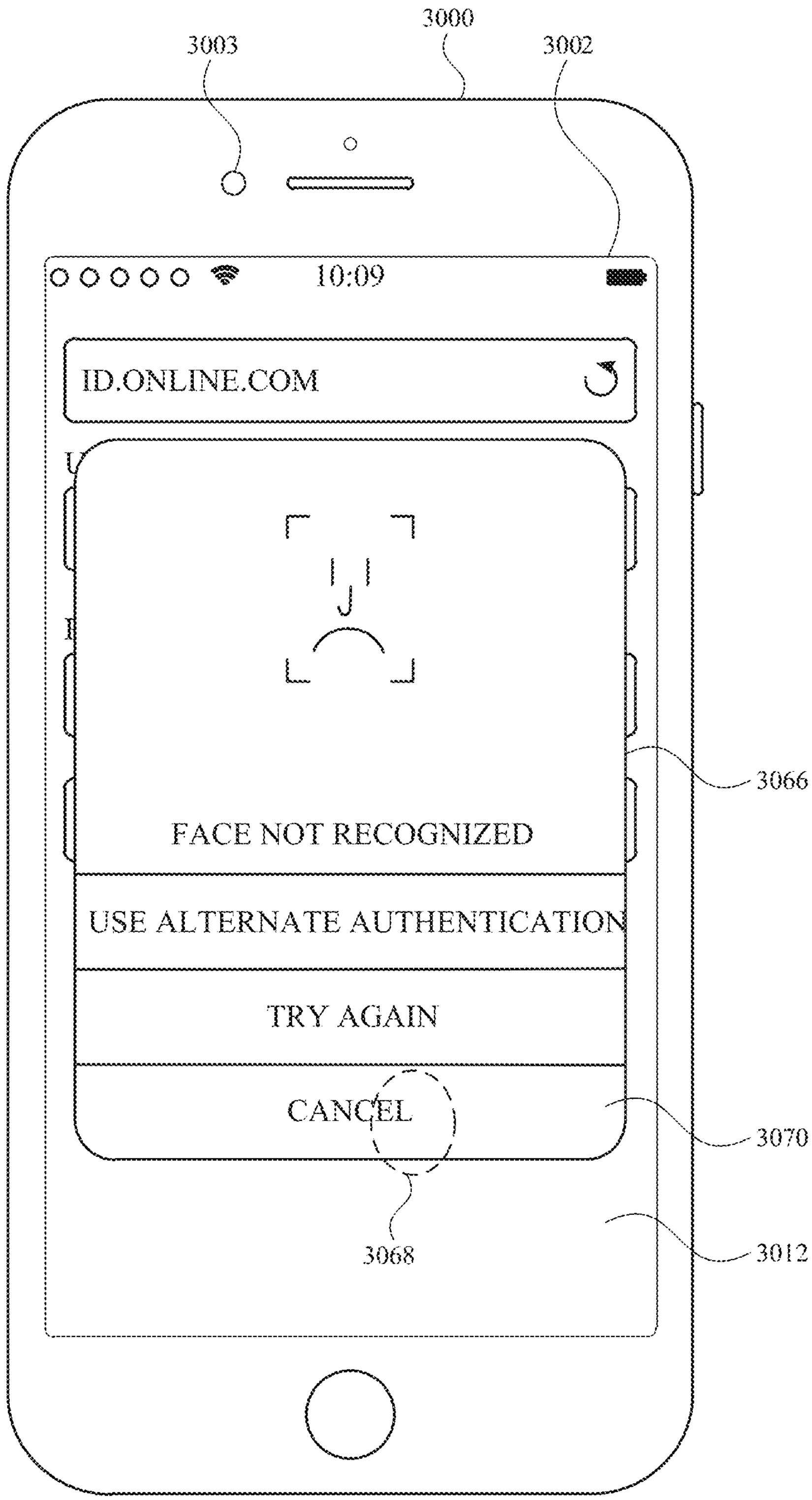
Figure 30A:
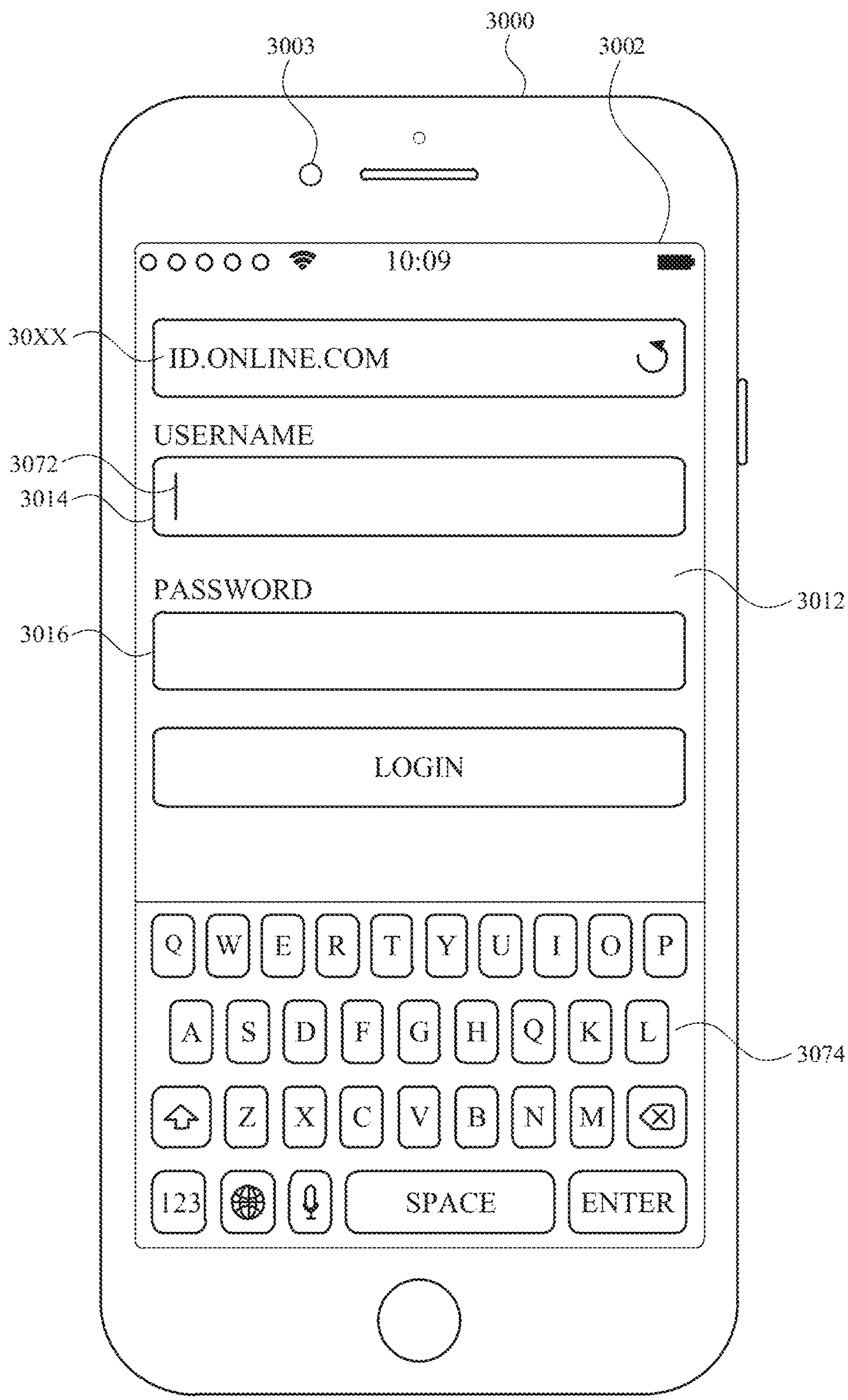
Figure 30A:
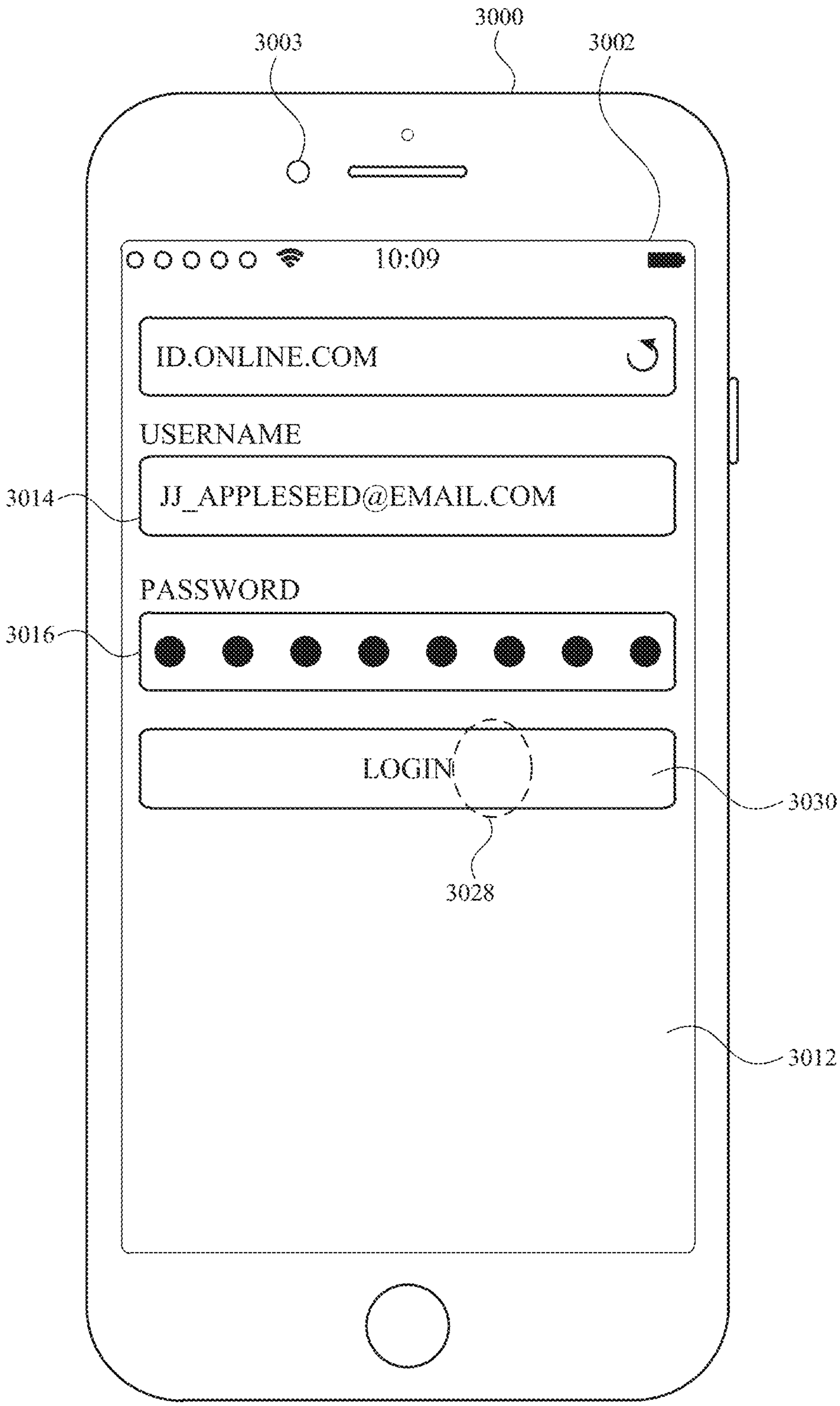
Figure 30A:
Figure 30A:
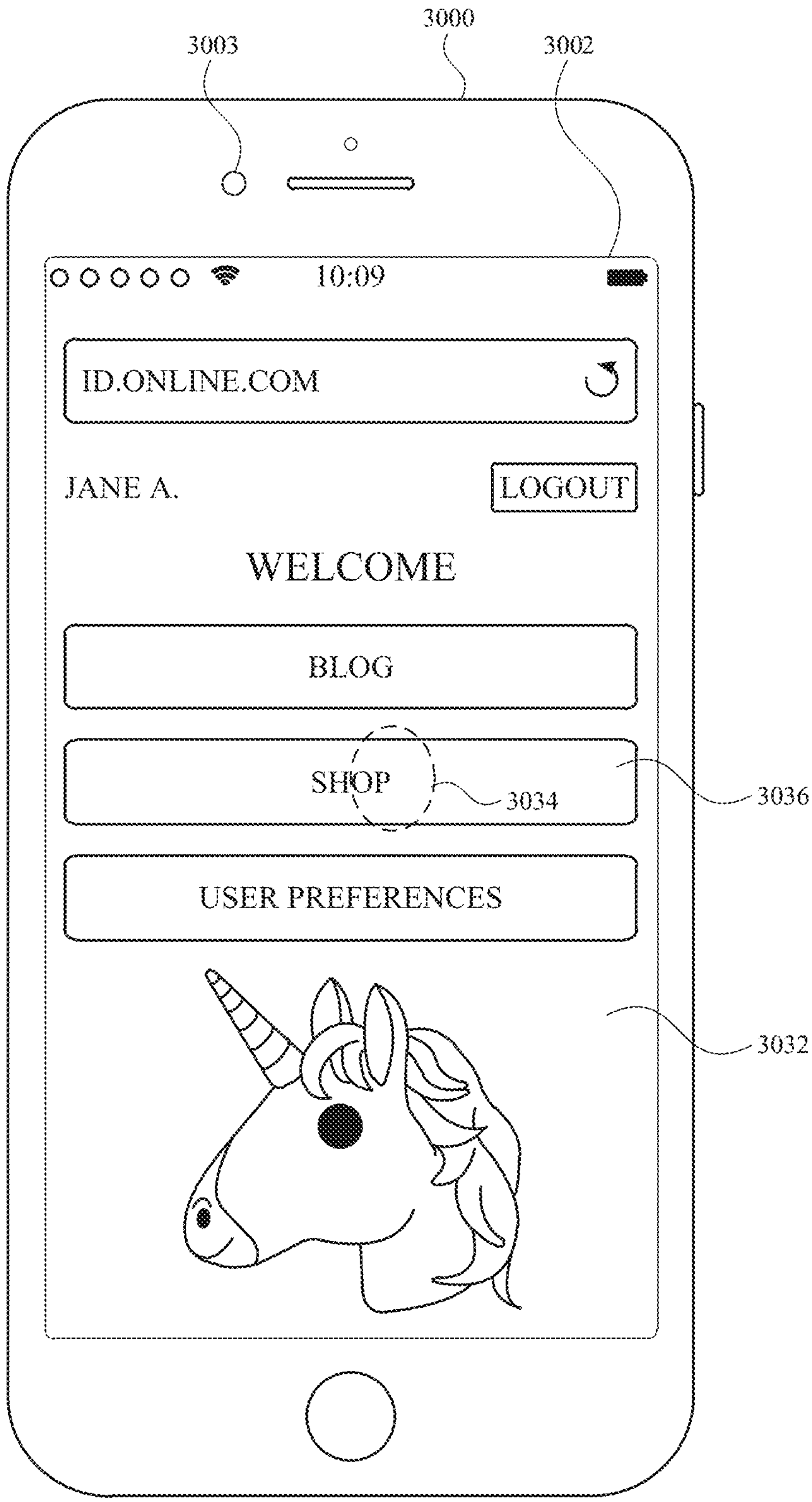
Figure 30A:
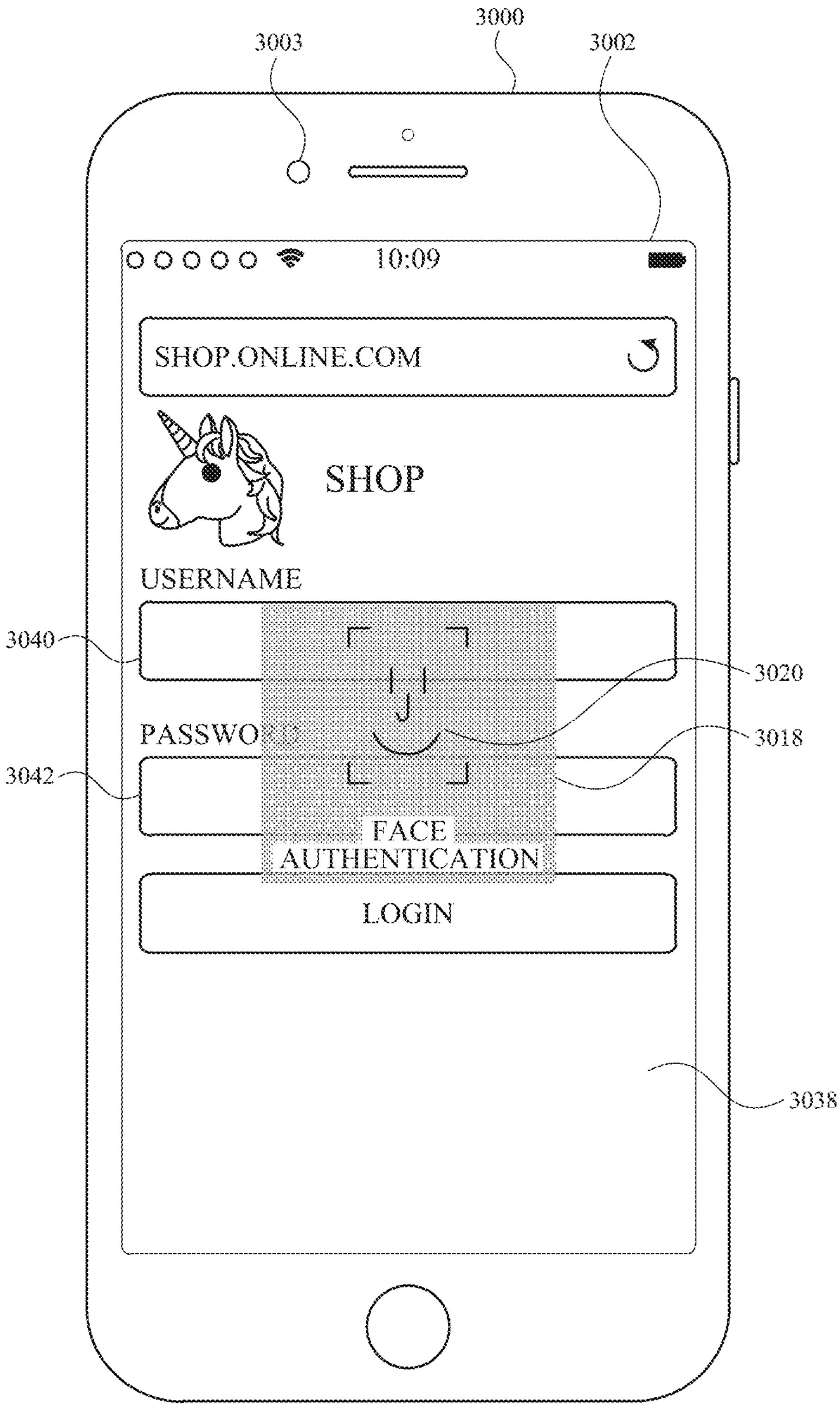
Figure 30A:
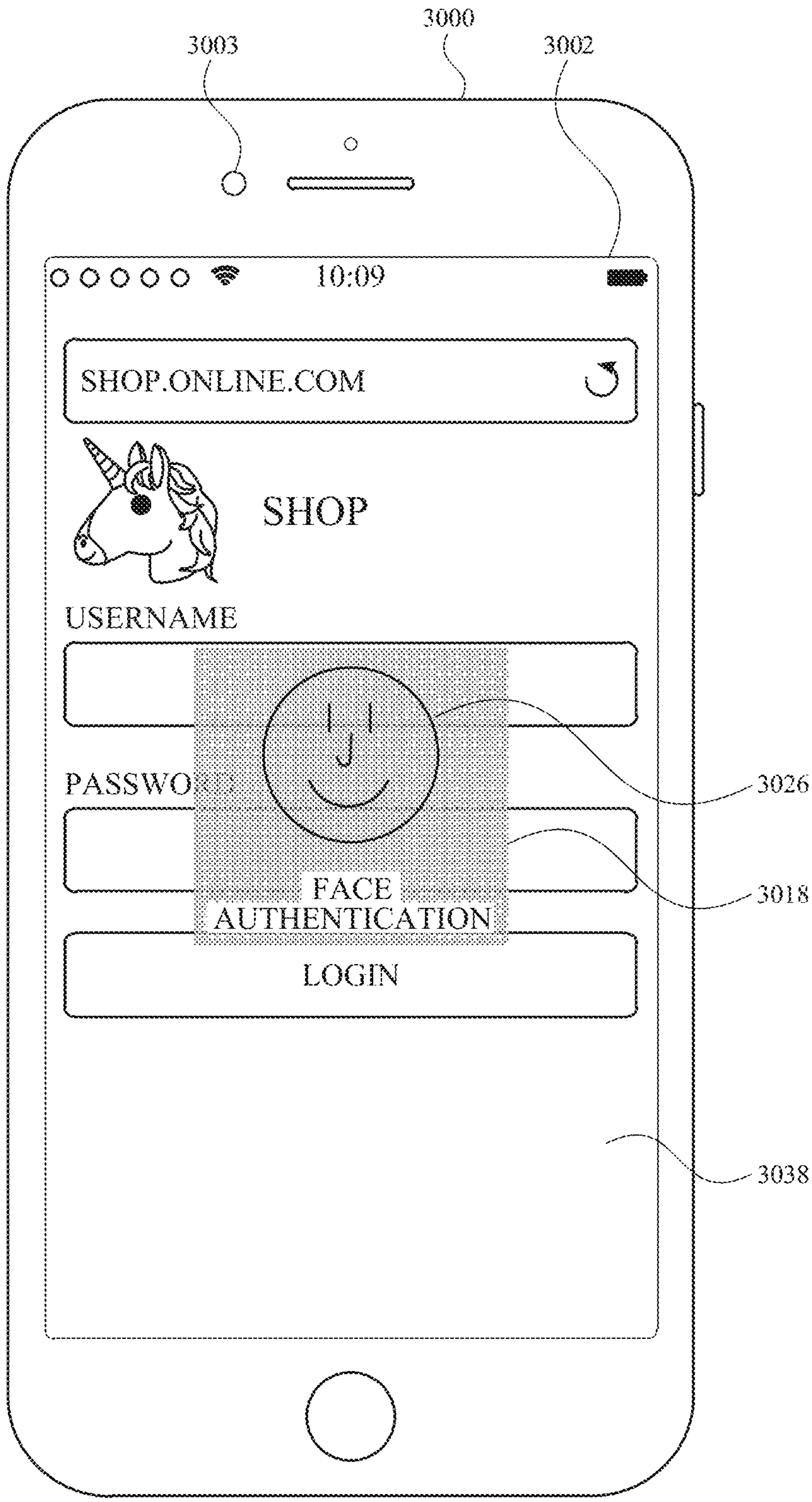
Figure 30A:
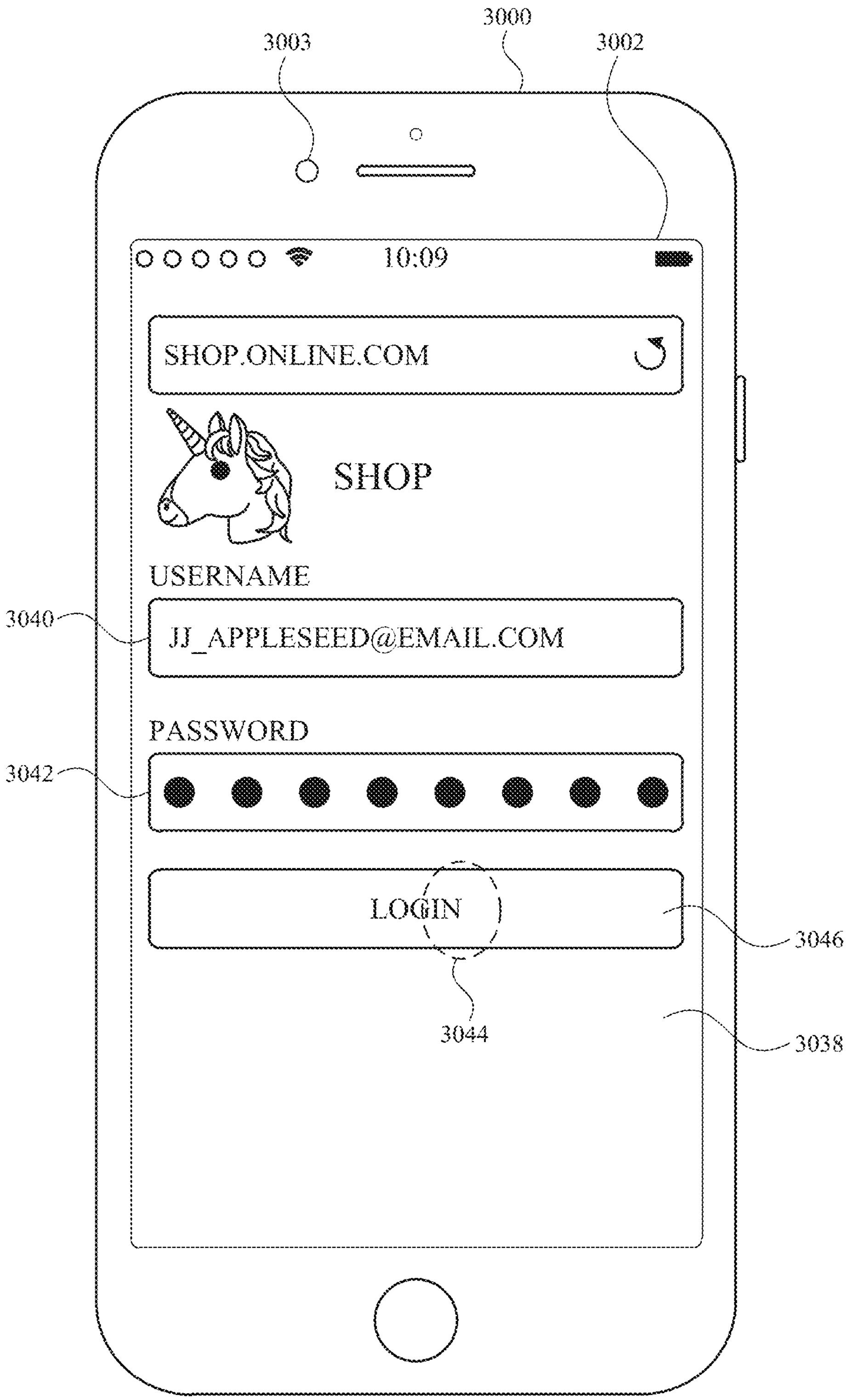
Figure 30A:
Figure 30A:
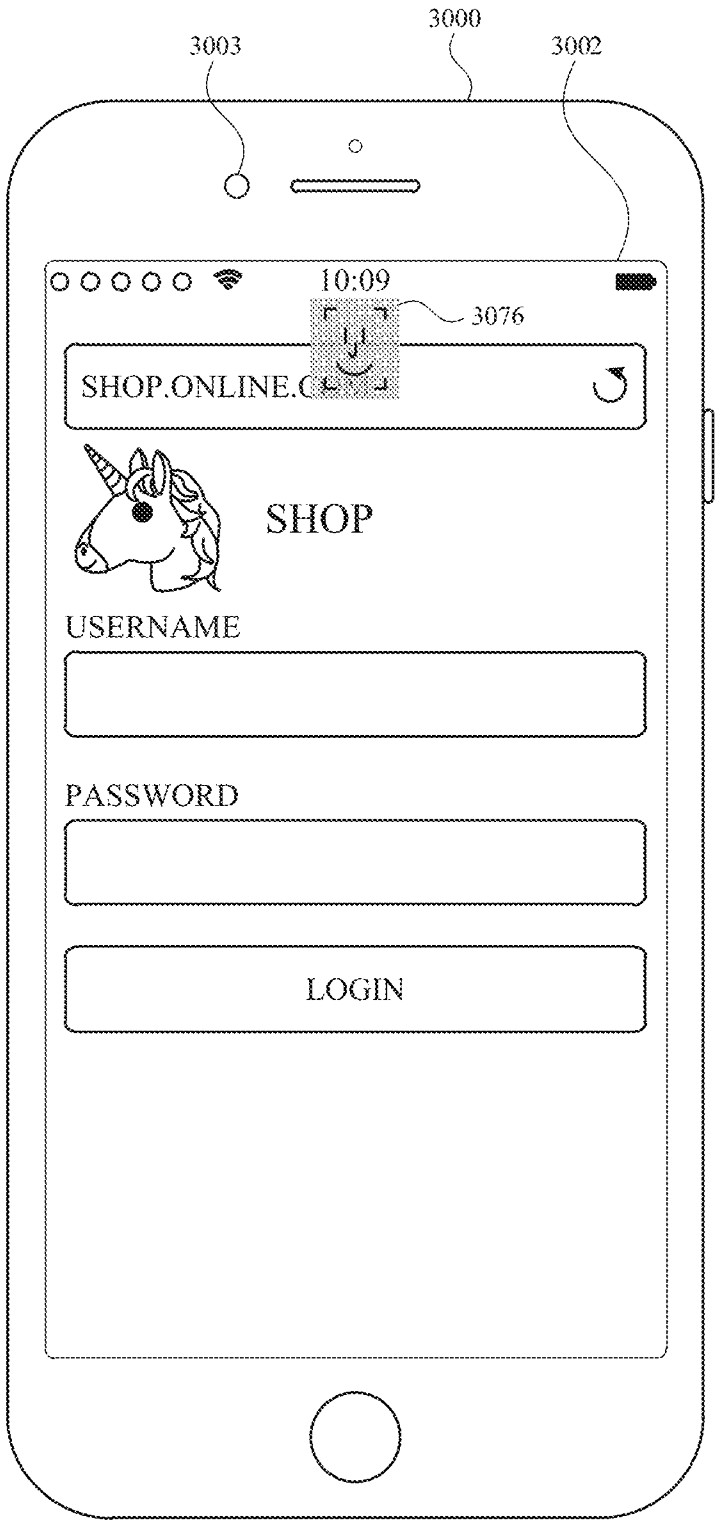

In FIG. 30Z, a user is not logged-in and is presented with a user interface similar to FIG. 30A. Electronic device 3000 displays, on display 3002, user interface 3006 of the application. Electronic device 3000 detects tap gesture 3008 on log-in affordance 3010. Electronic device 3000 identifies tap gesture 3008 as a request to load log-in user interface 3012 (shown in FIG. 30AA). Electronic device 3000 also identifies tap gesture 3008 as a request to autofill one or more fillable fields (e.g., username field 3014 and password field 3016) in log-in user interface 3012. The request to autofill requires biometric authentication in order to proceed with autofilling the fillable fields. As described earlier, in some examples, the request also includes a request to automatically log-in the user such that the user does not need to tap a submit affordance to submit credentials and log-in.

In FIG. 30AA, in response to the request to autofill the fillable fields, electronic device 3000 uses the biometric sensor 3003 to determine whether certain biometric authentication criteria have been met. Biometric sensor 3003 is contactless such that the sensor is configured to perform biometric authentication without physical input from the user. As a result, electronic device 3000 initiates biometric authentication using biometric sensor 3003 without needing to receive an explicit request from a user to initiate biometric authentication. Biometric authentication is not successful (e.g., biometric authentication criteria are not met). As a result, electronic device 3000 displays failure interface 3066 in FIG. 30AB upon failed biometric authentication, as described with respect to FIG. 17M. Failure interface 3066 can be displayed when a user has not reached the maximum number of failed biometric authentication attempts.

In FIG. 30AC, electronic device 3000 detects tap gesture 3068 on cancel affordance 3070. In response to detecting tap gesture 3068, electronic device 3000 displays log-in user interface 3012 (shown in FIG. 30AD). In FIG. 30AD, in response to detecting selection of username field 3014, electronic device 3000 displays cursor 3072 in username field 3014 and also displays virtual keyboard 3074. Electronic device 3000 receives input entering one or more characters corresponding to credential information in username field 3014 and password field 3016. In FIG. 30AE, electronic device 3000 detects tap gesture 3028 on submit affordance 3030. As a result, electronic device 3000 submits the credential information in username field 3014 and password field 3016 for user authentication. Upon successful user authentication, electronic device 3000 provides access to restricted content (e.g., content that can only be seen once a user has logged in) in account user interface 3032 of FIG. 30AF.

In FIG. 30AG, electronic device 3000 detects tap gesture 3034 on shop affordance 3036. Electronic device 3000 identifies tap gesture 3034 as a request to load log-in user interface 3038 (shown in FIG. 30AH). Electronic device 3000 also identifies tap gesture 3034 as a request to autofill one or more fillable fields (e.g., username field 3040 and password field 3042) in log-in user interface 3038. As described earlier, in some examples, the request also includes a request to automatically log-in the user such that the user does not need to tap a submit affordance to submit credentials and log-in.

In response to the request to autofill the one or more fillable fields, a determination is made that cached authentication is not available for use by electronic device 3000. In FIG. 30AH, electronic device 3000 performs biometric authentication using biometric sensor 3003. Biometric authentication occurs automatically in response receiving the request to autofill the fillable fields such that intermediate input from the user is not needed to initiate biometric authentication.

In FIG. 30AI, a determination is made that biometric authentication is successful (e.g., biometric authentication criteria are met). As a result, electronic device 3000 displays biometric authentication interface 3018 with successful biometric authentication glyph 3026 indicating that biometric authentication was successful. Upon successful biometric authentication, electronic device 3000 autofills username field 3040 and password field 3042 with credential information, as shown in FIG. 30AJ.

In FIG. 30AJ, electronic device 3000 detects tap gesture 3044 on submit affordance 3046. In response to detecting tap gesture 3044, electronic device 3000 submits the credential information in username field 3040 and password field 3042 for user authentication. Upon successful user authentication, electronic device 3000 provides access to restricted content (e.g., content that can only be seen once a user has logged in) in shop user interface 3048 of FIG. 30AK.

In some examples, electronic device 3000 displays a biometric authentication interface with a biometric authentication glyph, which indicate that biometric authentication is being performed. In some examples, the displayed biometric authentication interface is approximately centered along a horizontal and/or vertical axis such as in FIGS. 30B-30E. In other examples, electronic device 3000 displays the biometric authentication interface at the top, bottom, side, or in a corner of display 3002. For example, electronic device 3000 displays biometric authentication interface 3076 near the top of display 3002, as shown in FIG. 30AL. In some examples, electronic device 3000 does not display the biometric authentication interface while biometric authentication is being performed.

Figure 31B:
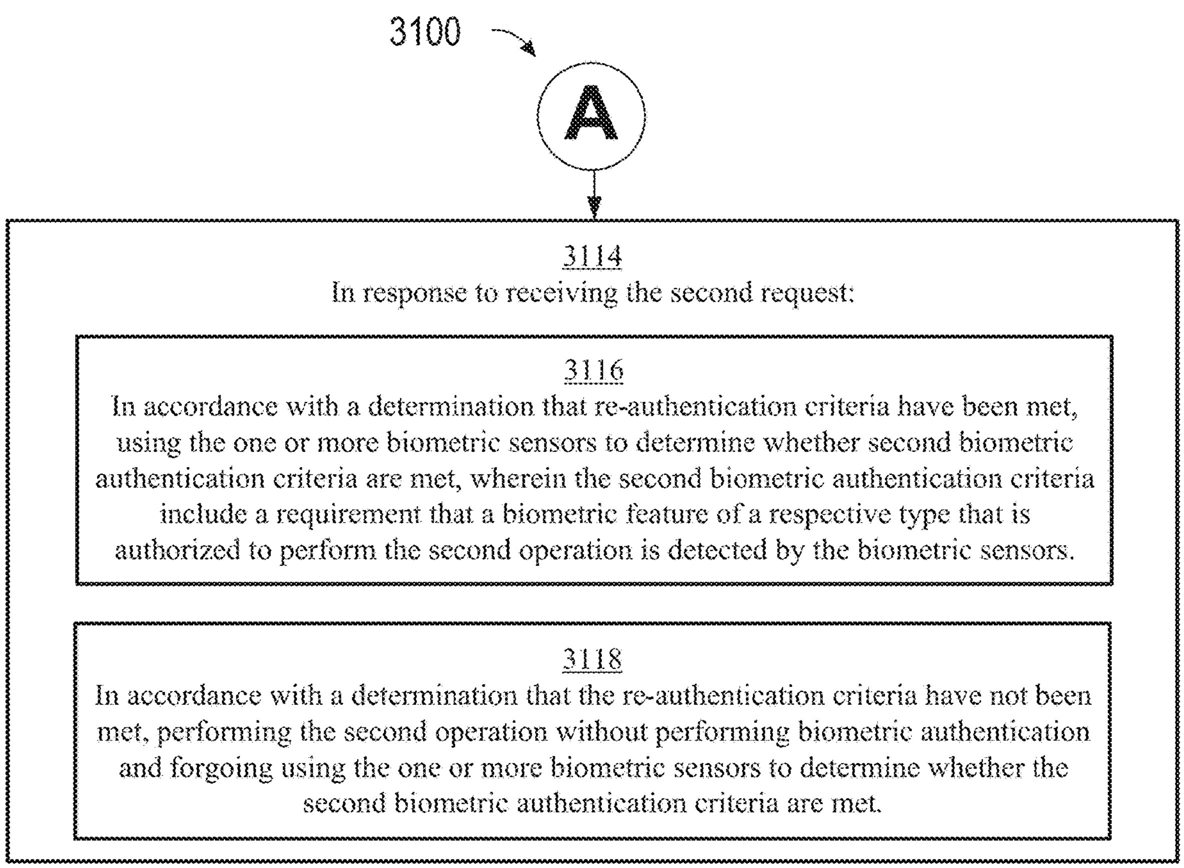

FIGS. 31A-31B are a flow diagram illustrating a method for determining if biometric re-authentication is required or if cached authentication is available for use using an electronic device in accordance with some examples. Method 3100 is performed at a device (e.g., 100, 300, 500, 1700, 3000) with one or more biometric sensors (e.g., 3003) (e.g., a fingerprint sensor, a contactless biometric sensor (e.g., a biometric sensor that does not require physical contact, such as a thermal or optical facial recognition sensor), an iris scanner). In some examples, the one or more biometric sensors (e.g., 3003) include one or more cameras. The electronic device (e.g., 100, 300, 500, 1700, 3000) optionally includes a display (e.g., 3002). In some examples, the display (e.g., 3002) is a touch-sensitive display. In some examples, the display (e.g., 3002) is not a touch sensitive display.

Some operations in method 3100 are, optionally, combined, the orders of some operations are, optionally, changed, and some operations are, optionally, omitted. As described below, method 3100 provides an intuitive way for determining if biometric re-authentication is required or if cached authentication is available for use. The method reduces the cognitive burden on a user for authenticating on an electronic device, thereby creating a more efficient human-machine interface. For battery-operated computing devices, enabling a user to authenticate faster and more efficiently conserves power and increases the time between battery charges.

The electronic device (e.g., 100, 300, 500, 1700, 3000) receives (3102) a first request (e.g., 3008) (e.g., select password to autofill, unlock device, make payment) to perform a first operation that requires authentication.

In response (3104) to receiving the first request (e.g., 3008) to perform the first operation, the electronic device (e.g., 100, 300, 500, 1700, 3000) proceeds to blocks 3106-3110.

The electronic device (e.g., 100, 300, 500, 1700, 3000) uses (3106) the one or more biometric sensors (e.g., 3003) to determine whether first biometric authentication criteria are met. The first biometric authentication criteria include a requirement that a biometric feature of a respective type (e.g., a face or fingerprint) that is authorized to perform the first operation is detected by the biometric sensors (e.g., 3003).

In accordance with a determination that the first biometric authentication criteria are met (e.g., at least a portion of a biometric feature, determined based on data obtained from the one or more biometric sensors (e.g., 3003) that correspond to the biometric feature, satisfies biometric authentication criteria (e.g., a face that was detected is consistent with an authorized face)), the electronic device (e.g., 100, 300, 500, 1700, 3000) performs (3108) the first operation. Performing the first operation upon a request and successful authentication provides the user with capability to perform the first operation without requiring further inputs (beyond the request). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the biometric authentication criteria are not met, the electronic device (e.g., 100, 300, 500, 1700, 3000) forgoes (3110) performing the first operation. Forgoing (or performing) the respective operation based on not meeting biometric authentication criteria provides security and can prevent unauthorized users from initiating sensitive operations. Providing improved security enhances the operability of the device and makes the user-device interface more efficient (e.g., by restricting unauthorized access) which, additionally, reduces power usage and improves battery life of the device by limiting the performance of restricted operations.

After performing the first operation, the electronic device (e.g., 100, 300, 500, 1700, 3000) receives (3112) a second request (e.g., 3034) (e.g., select password to autofill, unlock device, make a payment) to perform a second operation (e.g., an operation that is the same or different than the first operation) that requires authentication.

In response (3114) to receiving the second request (e.g., 3034), the electronic device (e.g., 100, 300, 500, 1700, 3000) proceeds to blocks 3116-3118.

In accordance with a determination that re-authentication criteria have been met (e.g., cached authentication is not permitted for the second operation or cached authentication is not available for use), the electronic device (e.g., 100, 300, 500, 1700, 3000) uses (3116) the one or more biometric sensors (e.g., 3003) to determine whether second biometric authentication criteria are met. The second biometric authentication criteria include a requirement that a biometric feature of a respective type (e.g., a face or fingerprint) that is authorized to perform the second operation is detected by the biometric sensors (e.g., 3003). In some examples, the first and second biometric authentication criteria are the same. In some examples, the first and second biometric authentication criteria are different. Performing biometric authentication when cached authentication is not available provides security and can prevent unauthorized users from initiating sensitive operations. Providing improved security enhances the operability of the device and makes the user-device interface more efficient (e.g., by restricting unauthorized access) which, additionally, reduces power usage and improves battery life of the device by limiting the performance of restricted operations.

In accordance with a determination that the re-authentication criteria have not been met (e.g., cached authentication is available for use), the electronic device (e.g., 100, 300, 500, 1700, 3000) performs (3118) the second operation without performing biometric authentication and forgoing using the one or more biometric sensors (e.g., 3003) to determine whether the second biometric authentication criteria are met. Performing the second operation upon a request without requiring re-authentication provides the user with a capability to perform an operation without requiring further inputs (beyond the request). Performing an operation when a set of conditions has been met without requiring further user input or re-authentication enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, the first operation and the second operation occur while the electronic device (e.g., 100, 300, 500, 1700, 3000) is in an unlocked state. In some examples, using the one or more biometric sensors (e.g., 3003) to determine whether second biometric authentication criteria are met occurs while the electronic device (e.g., 100, 300, 500, 1700, 3000) is in an unlocked state. Performing biometric authentication while the device is an unlocked state enables the device to provide feedback by displaying an indication of the progress of the biometric authentication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, in response to receiving the second request (e.g., 3034) and in accordance with a determination that the second biometric authentication criteria are not met, the electronic device (e.g., 100, 300, 500, 1700, 3000) forgoes performing the second operation.

In accordance with some examples, performing the second operation occurs regardless of whether a biometric feature of the respective type that is authorized to perform the second operation is detected by the biometric sensors (e.g., 3003) in response to receiving the second request (e.g., 3034).

In accordance with some examples, the first operation is logging on (e.g., 3028) a first web domain, and the second operation is logging on (e.g., 3044) a second web domain corresponding to the first web domain. In some examples, the second web domain is the same as the first web domain. In some examples, the second web domain is a subdomain of the first web domain.

In accordance with some examples, the re-authentication criteria include a requirement that the device (e.g., 100, 300, 500, 1700, 3000) has been in a locked state between when the first operation is performed and when the second request (e.g., 3034) is received (e.g., cached authentication is not available for use) (e.g., re-authentication criteria are not met and biometric authentication is not required again when the device has remained in an unlocked state between when the first operation is performed and when the second request is received).

In accordance with some examples, the first operation is performed in an application, and the re-authentication criteria includes a requirement that the application has been closed (e.g., terminated) between when the first operation is performed and when the second request (e.g., 3034) is received (e.g., cached authentication is not available for use) (e.g., re-authentication criteria are not met and biometric authentication is not required again when the application has remained open between when the first operation is performed and when the second request is received).

In accordance with some examples, the re-authentication criteria includes a requirement that the application has been in an inactive state (e.g., suspended state, hibernated state, background state, non-active state) for more than a threshold amount of time (e.g., 2 minutes and 40 seconds) between when the first operation is performed and when the second request (e.g., 3034) is received (e.g., cached authentication is not available for use) (e.g., re-authentication criteria are not met and biometric authentication is not required again when the application has remained in an active state between when the first operation is performed and when the second request is received).

In accordance with some examples, using the one or more biometric sensors (e.g., 3003) to determine whether the second biometric authentication criteria are met occurs automatically (e.g., without the need for an intermediate input from the user) in response to receiving the second request (e.g., 3034) to perform the second operation that requires authentication.

In accordance with some examples, the one or more biometric sensors (e.g., 3003) are contactless biometric sensors (e.g., infrared camera, visible light camera, or combinations thereof) configured to perform biometric authentication without physical contact from the user (e.g., the one or more biometric sensors (e.g., 3003) can perform biometric authentication without a physical input (e.g., a touch or button press) from the user).

In accordance with some examples, while using the one or more biometric sensors (e.g., 3003) to determine whether first or second biometric authentication criteria are met, the electronic device (e.g., 100, 300, 500, 1700, 3000) displays, on the display (e.g., 3002), an indication (e.g., 3076) (e.g., a small indicator is displayed at the top, bottom, side, or in a corner) that biometric authentication is being performed. Displaying a small indicator away from the center of the display provides the user an indication of the progress of the biometric authentication without obstructing or cluttering the display and diverting the user's focus, thereby providing improved visual feedback during the authentication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication. In some examples, the electronic device (e.g., 100, 300, 500, 1700, 3000) forgoes displaying an indication that biometric authentication is being performed, while determining, using the one or more biometric sensors (e.g., 3003), whether biometric authentication criteria are met.

Note that details of the processes described above with respect to method 3100 (e.g., FIGS. 31A-31B) are also applicable in an analogous manner to the methods described below and above. For example, method 3100 optionally includes one or more of the characteristics of the various methods described above with reference to methods 800, 1000, 1200, 1400, 1600, 2000, 2200, 2500, 2700, 2900, 3300, and 3500. For example, the enrolled biometric data described in method 1200 can be used to perform biometric authentication as described with respect to method 3100. As a further example, the visibility criteria of method 3300 can be used in conjunction with method 3100 to control when biometric authentication should be performed (or re-performed). For brevity, these details are not repeated below.

FIGS. 32A-32W illustrate exemplary user interfaces for autofilling Tillable fields based on visibility criteria, in accordance with some examples. As described in greater detail below, the exemplary examples of the user interfaces illustrated in FIGS. 32A-32W are used to illustrate the processes described below, including the processes in FIG. 33.

FIG. 32A illustrates electronic device 3200 (e.g., portable multifunction device 100, device 300, or device 500). In the exemplary examples illustrated in FIGS. 32A-32W, electronic device 3200 is a smartphone. In other examples, electronic device 3200 can be a different type of electronic device, such as a wearable device (e.g., a smartwatch). Electronic device 3200 includes display 3202, one or more input devices (e.g., touchscreen of display 3202 and a microphone), and a wireless communication radio. In some examples, the electronic device includes a plurality of cameras. In some examples, the electronic device includes only one camera. In FIG. 32A, the electronic device includes biometric sensor 3203. In some examples, the biometric sensor is one or more biometric sensors that can include a camera, such as an infrared camera, a thermographic camera, or a combination thereof. In some examples, biometric sensor 3203 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

Figure 32B:
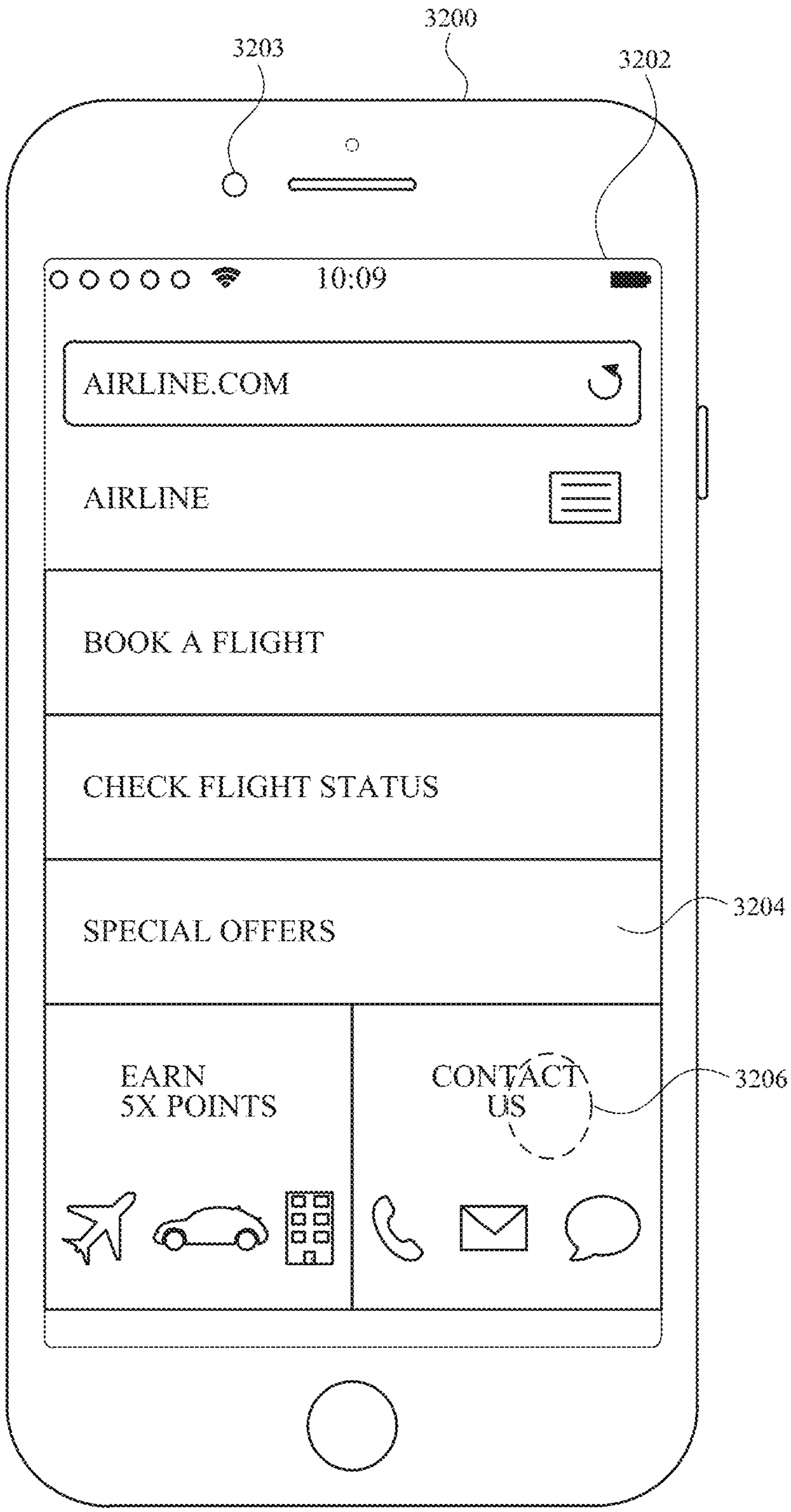
Figure 32C:
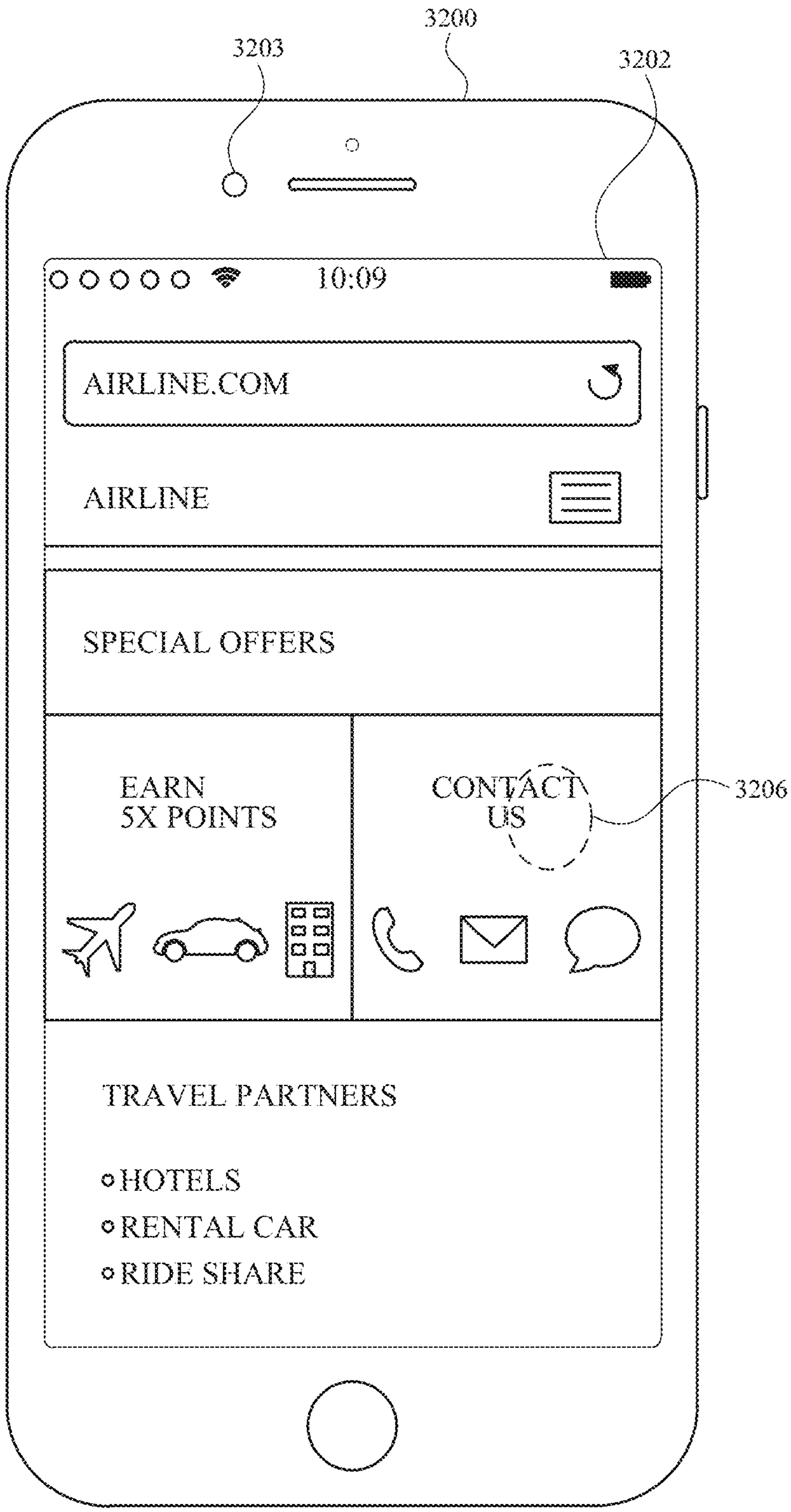
Figure 32D:
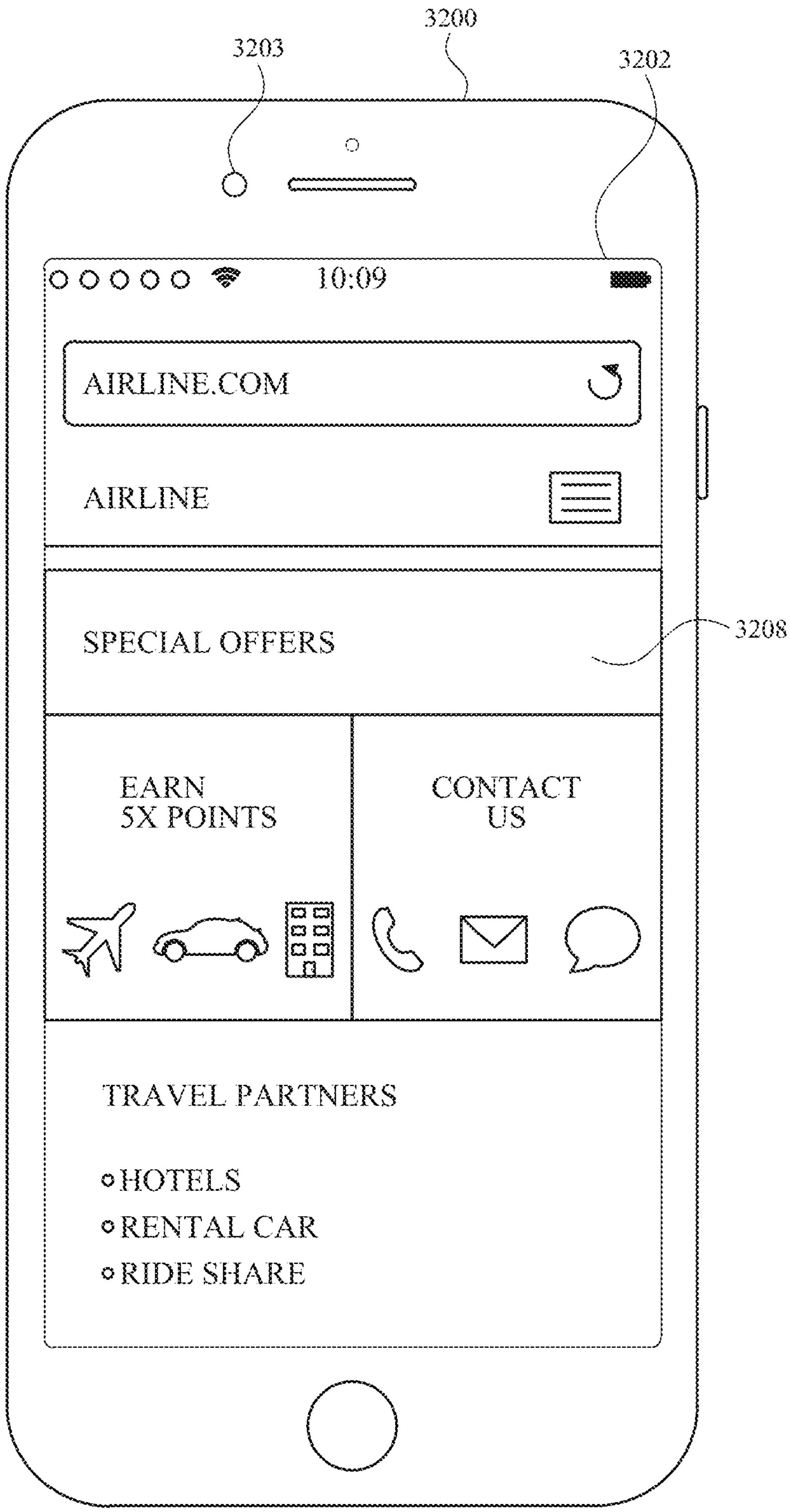

In FIG. 32A, electronic device 3200 displays, on display 3202, user interface 3204 of an application. The application is a mobile browser application, and the interface corresponds to a website (airline.com). In FIGS. 32B-32D, electronic device 3200 does not initiate biometric authentication because a log-in user interface has not met certain visibility criteria. For example, the visibility criteria can include whether a threshold amount of one or more fillable fields (e.g., corresponding to credential information) is displayed within a visible area of a user interface.

In FIGS. 32B-32C, electronic device 3200 detects scroll gesture 3206 in an upward motion. In response to detecting scroll gesture 3206, electronic device 3200 causes user interface 3204 to scroll down. In FIG. 32D, subsequent to scroll gesture 3206, electronic device 3200 displays scrolled user interface 3208. Electronic device 3200 still has not initiated biometric authentication due to a determination that the visibility criteria have not been met.

Figure 32E:
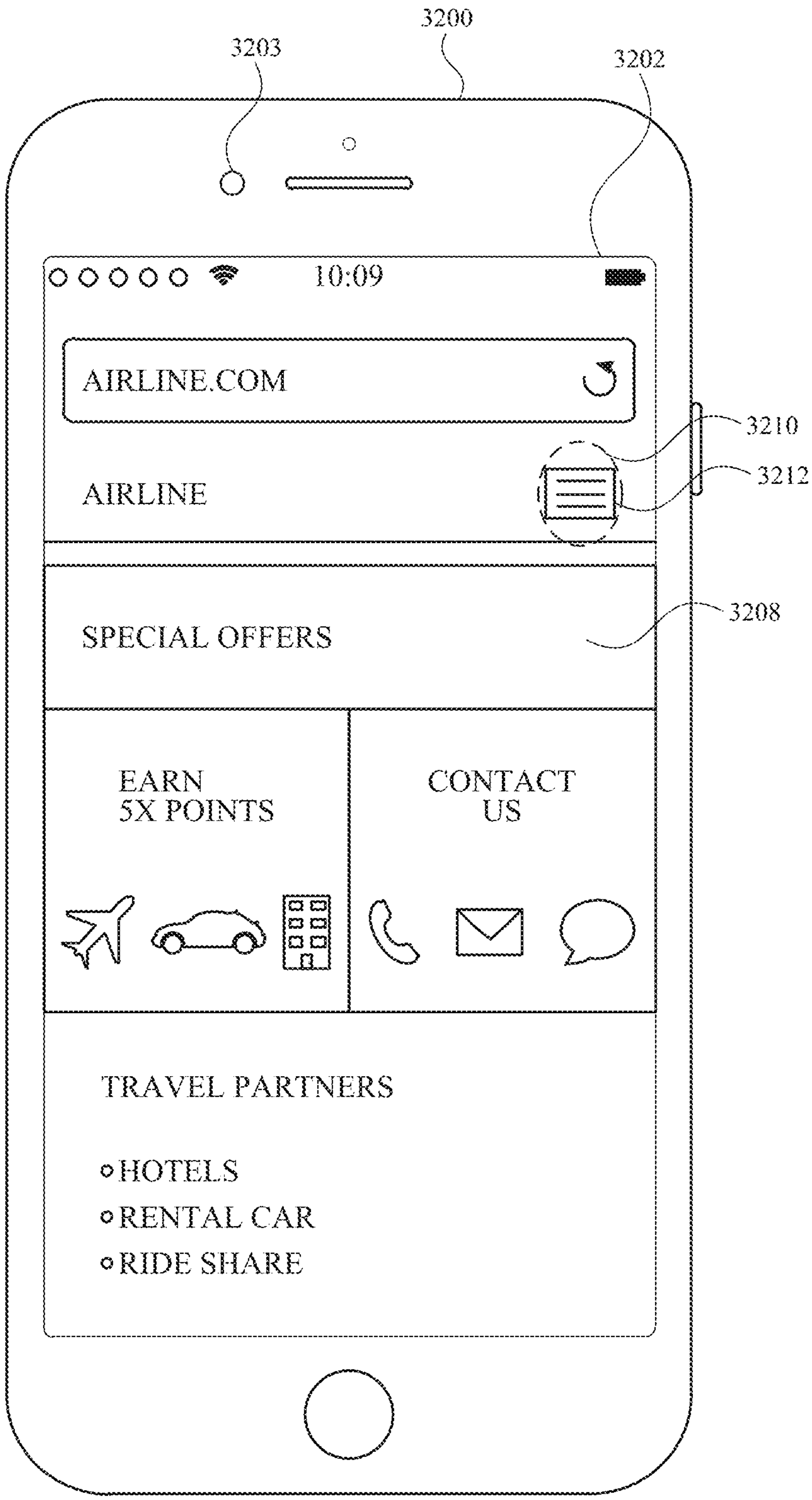
Figure 32F:
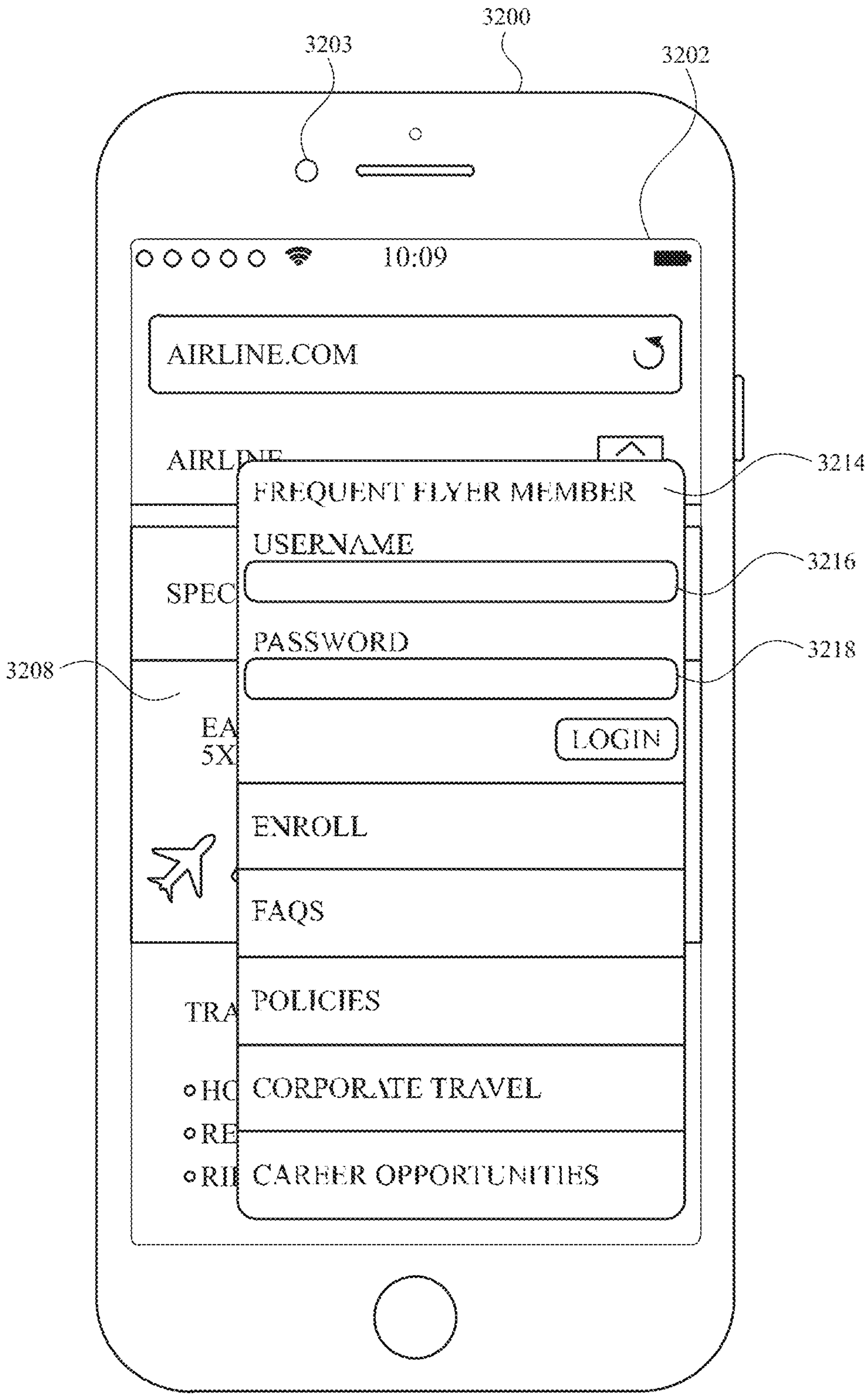

In FIG. 32E, electronic device 3200 detects tap gesture 3210 on hidden menu affordance 3212. In response to detecting tap gesture 3210, electronic device 3200 displays hidden menu 3214, which includes one or more fillable fields (e.g., username field 3216 and password field 3218), as shown in FIG. 32F. Electronic device 3200 displays hidden menu 3214, which is overlaid on scrolled user interface 3208 such that a covered portion of scrolled user interface 3208 is no longer displayed. A determination is made as to whether the fillable fields meet certain visibility criteria.

If it is determined that the fillable fields meet certain visibility criteria, electronic device 3200 receives a request to autofill the fillable fields in hidden menu 3214 with credential information (e.g., a username and password that enables a user to successfully log-in to an account). The request to autofill requires biometric authentication in order to proceed with autofilling the fillable fields. In some examples, the request also includes a request to automatically log-in the user such that the user does not need to tap a submit affordance (e.g., submit affordance 3232 in FIG. 32L) in order to submit credentials and log-in.

Figure 32G:
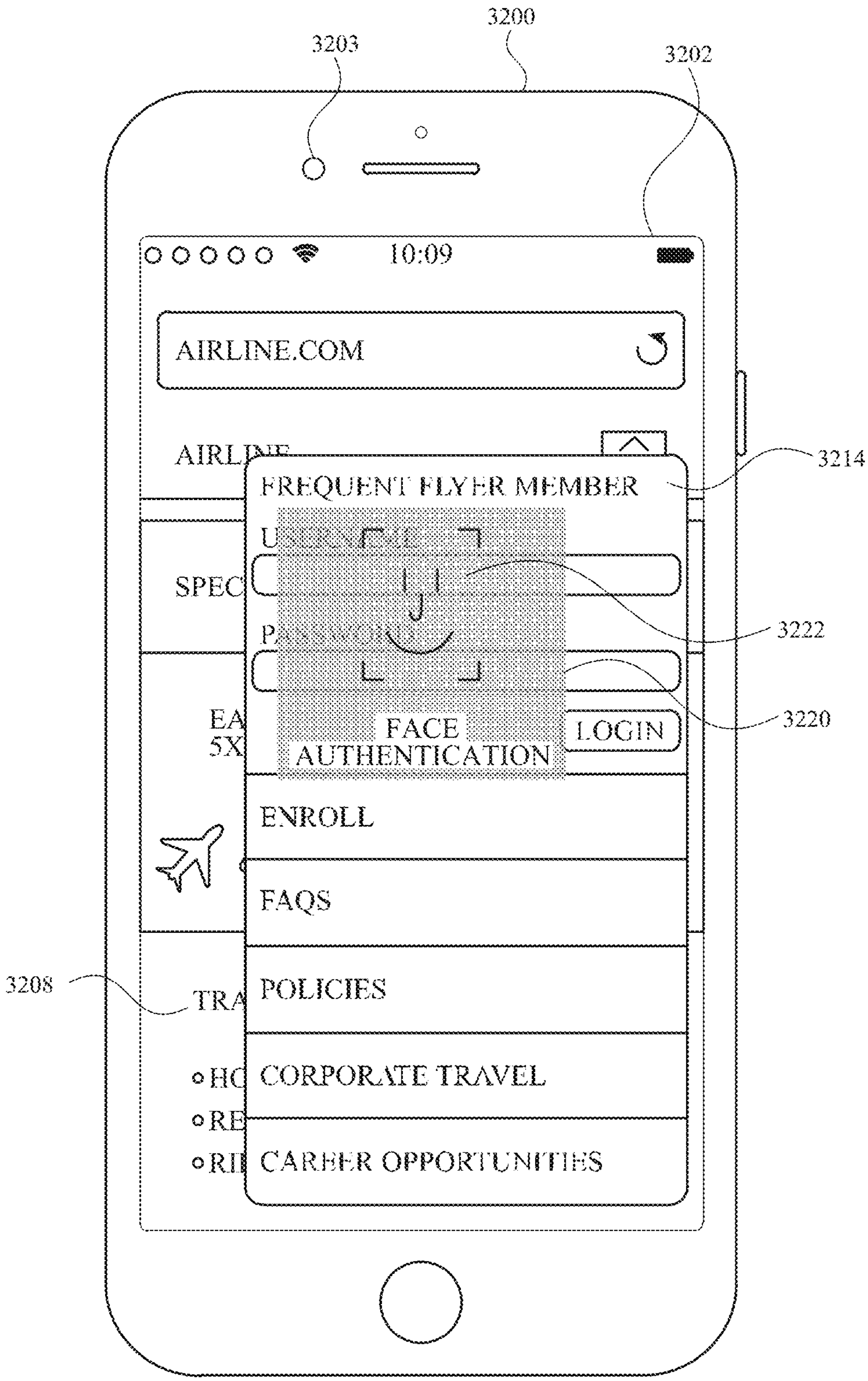

In FIG. 32G, upon a determination that the one or more fillable fields do meet certain visibility criteria, electronic device 3200 uses biometric sensor 3203 to determine whether certain biometric authentication criteria have been met. Electronic device 3200 captures and processes (e.g., analyzes) the biometric data from biometric sensor 3203 to determine, based on the biometric data, whether the biometric feature (or a portion thereof) satisfies biometric authentication criteria (e.g., determine whether the biometric data matches, within a threshold, a biometric template). Biometric authentication occurs automatically once the determination is made that the fillable fields meet the visibility criteria. Biometric sensor 3203 is contactless such that the sensor is configured to perform biometric authentication without physical contact from the user. As a result, electronic device 3200 initiates biometric authentication using biometric sensor 3203 without receiving an explicit request from a user to initiate biometric authentication. In some examples, initiating biometric authentication includes detecting a contact with one or more fingerprint sensors, and determining whether the contact meets certain fingerprint authentication criteria (e.g., determines whether a fingerprint is consistent with a registered fingerprint as discussed above with respect to secure element 115; determines whether a fingerprint matches stored information as discussed above with respect to methods 1600, 1800, 2200, and FIGS. 17O and 21). In some examples, determining whether a fingerprint is consistent with a registered fingerprint is performed according to one or more of the methods discussed in U.S. Pat. App. Pub. No. 2015/0146945 (e.g., at paragraphs [0119]-[0121]). U.S. Pat. App. Pub. No. 2015/0146945 is hereby incorporated by reference, specifically with respect to its disclosure of methods of determining whether a fingerprint is consistent with a registered fingerprint.

Alternatively, a determination can be made that the one or more fillable fields do not meet certain visibility criteria. If the fillable fields do not meet the visibility criteria, electronic device 3200 forgoes initiating biometric authentication.

Performing biometric authentication includes displaying biometric authentication interface 3220 having biometric authentication glyph 3222. Biometric authentication glyph 3222 is a simulation of a representation of a biometric feature (e.g., a face). As shown in FIG. 32G, biometric authentication interface 3220 is overlaid on at least a portion of hidden menu 3214. Biometric authentication interface 3220, optionally, is an operating system level interface (e.g., an interface generated by an operating system of the device), and hidden menu 3214 is an application-level interface (e.g., a user interface generated by a third-party application that is separate from the operating system of the device). In some examples, the displayed biometric authentication interface is approximately centered along a horizontal and/or vertical axis such as in FIGS. 32G-32J. In some examples, electronic device 3200 displays the biometric authentication interface at the top, bottom, side, or in a corner of display 3202. For example, electronic device 3200 displays the biometric authentication interface near the top of display 3202, such as in, for example, FIG. 30AL. In some examples, electronic device 3200 does not display the biometric authentication interface while biometric authentication is being performed.

Figure 32H:
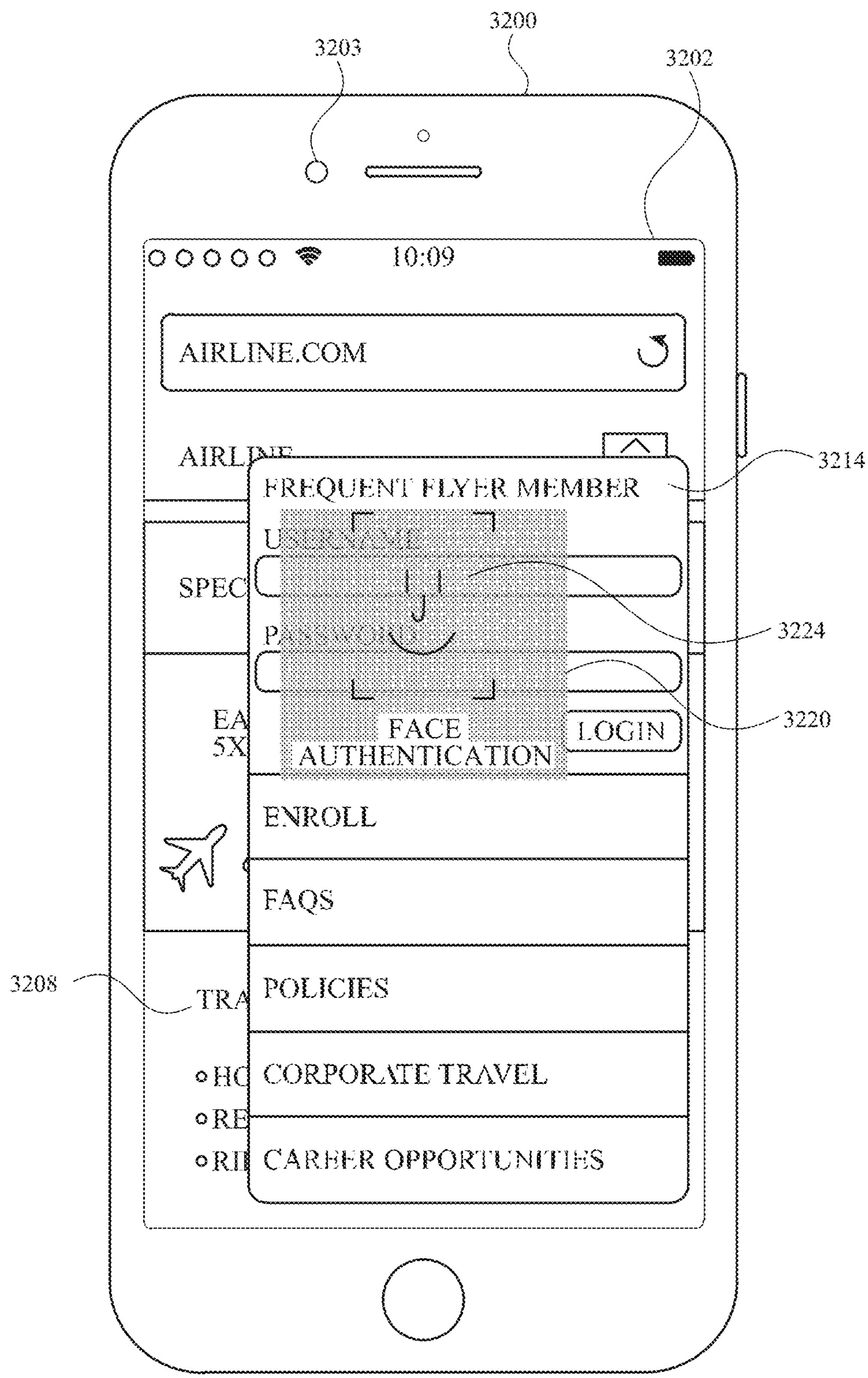
Figure 32I:
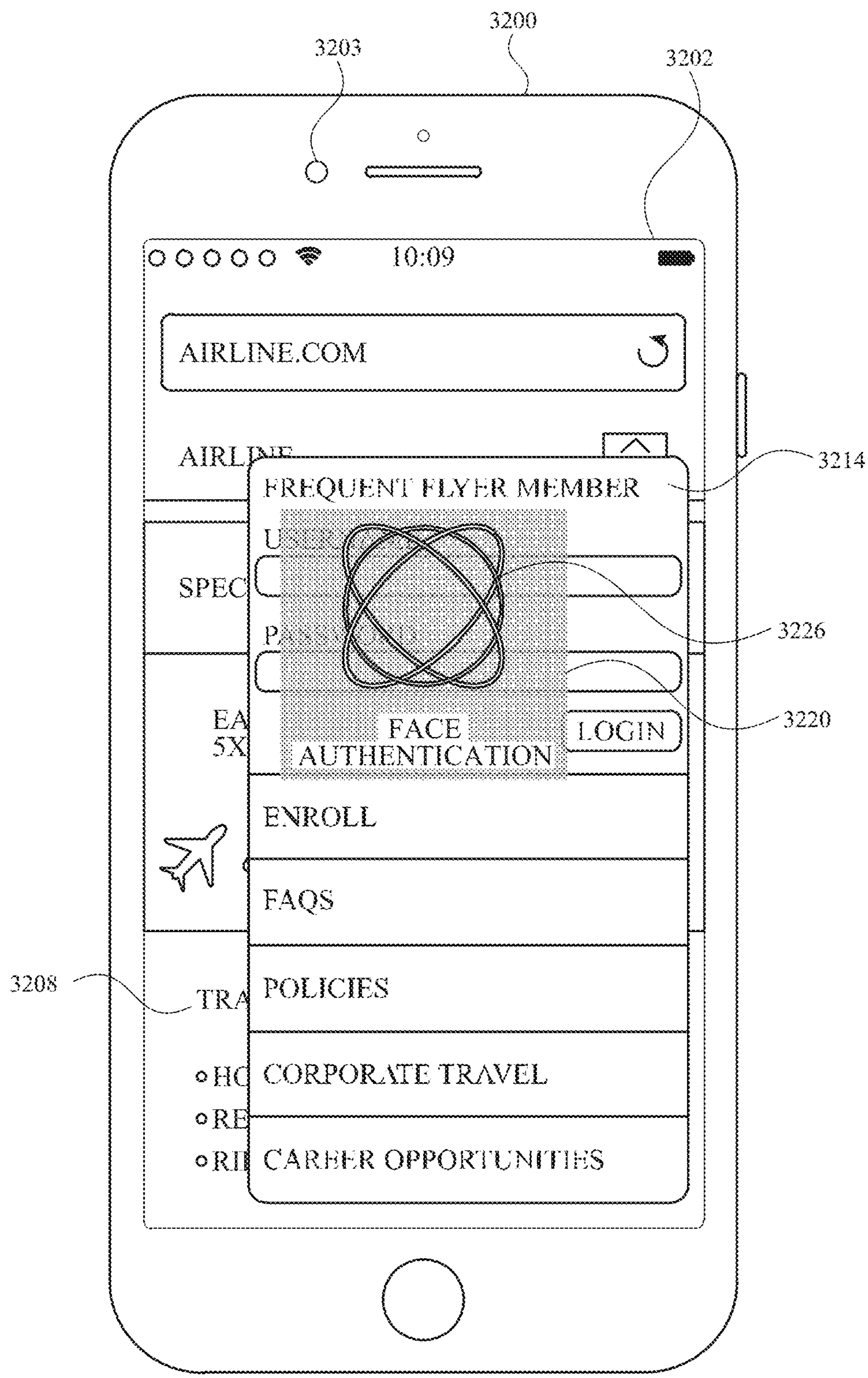

In FIG. 32H, electronic device 3200 displays a portion of a biometric authentication animation including biometric authentication glyph 3224, which serves as a portion of the animation during which biometric sensor 3203 obtains biometric data. Once electronic device 3200 has obtained biometric data (e.g., obtained sufficient biometric data), electronic device 3200 transitions to displaying biometric authentication glyph 3226, as shown in FIG. 32I. Electronic device 3200 displays biometric authentication glyph 3226 to indicate that the biometric data is being processed. In some examples, biometric authentication glyph 3226 includes a plurality of rings, which rotate spherically, for instance, while displayed.

Figure 32J:
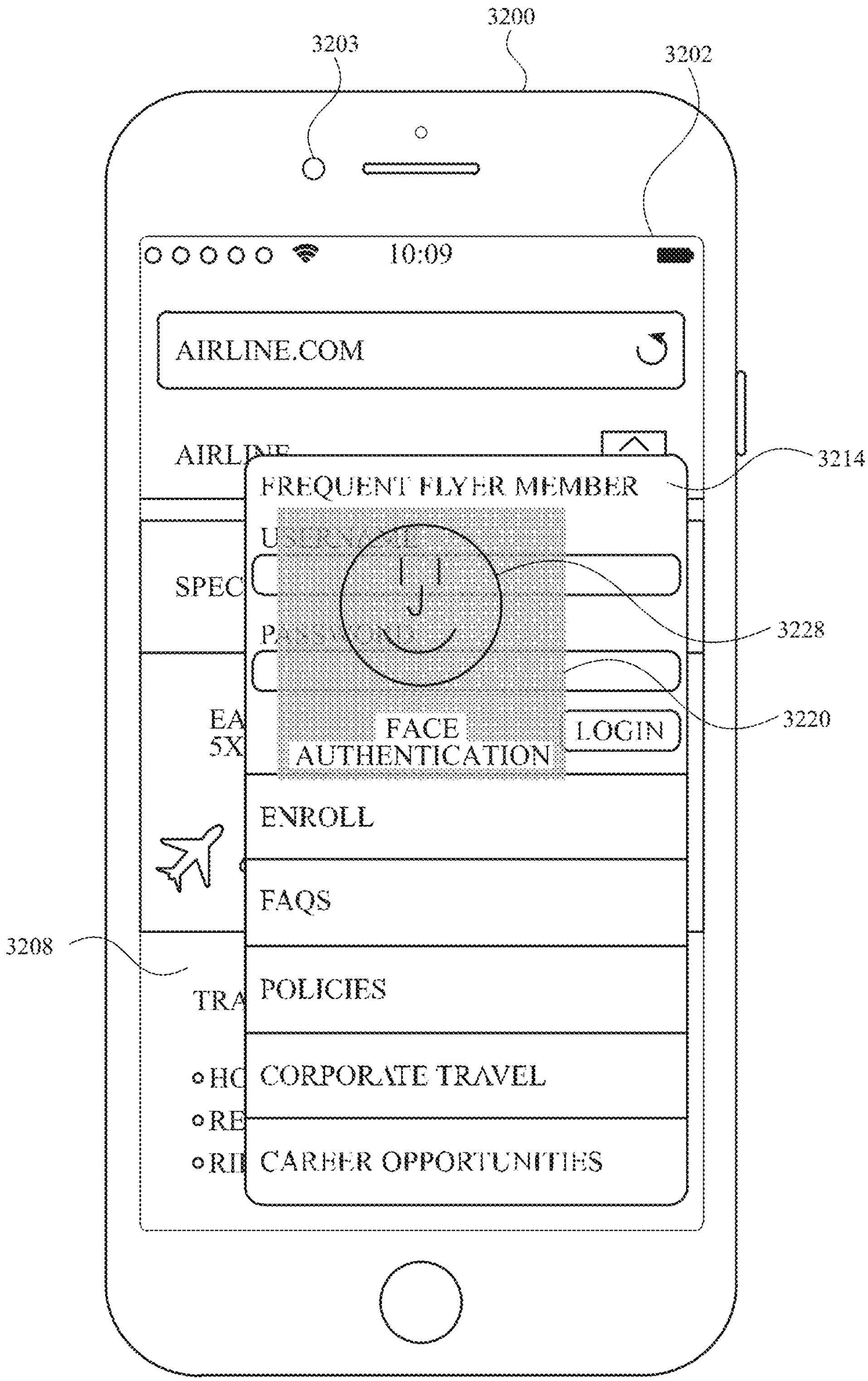

In FIG. 32J, a determination is made that biometric authentication is successful. As a result, electronic device 3200 displays successful biometric authentication glyph 3228 indicating that biometric authentication was successful.

Figure 32K:
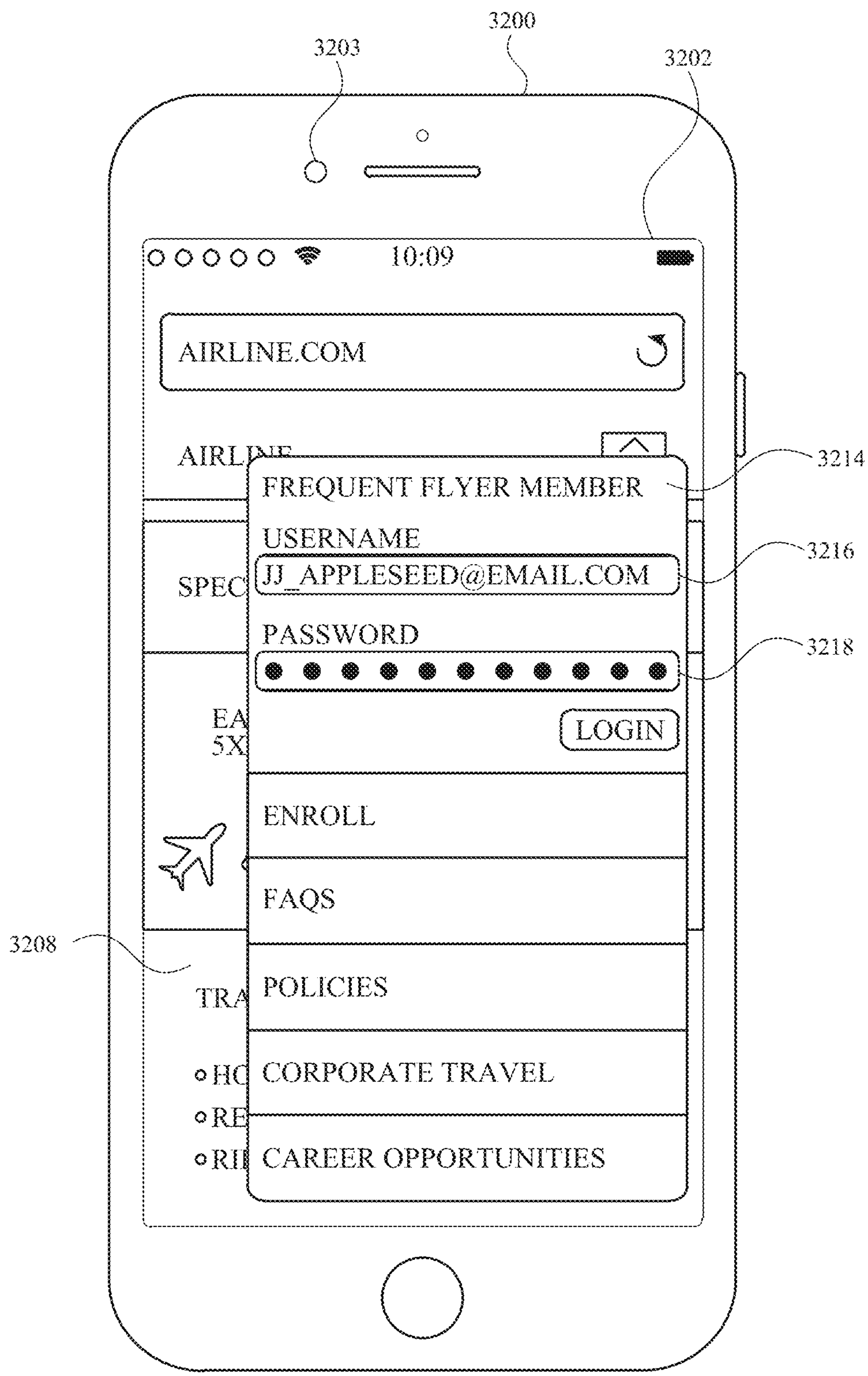

In FIG. 32K, since biometric authentication was successful, electronic device 3200 autofills the one or more fillable fields (e.g., username field 3216 and password field 3218) with credential information (e.g., log-in information such as a username and password that enables a user to successfully log-in to an account). In some examples, electronic device 3200 autofills the fillable fields with credit card information (e.g., information associated with a payment account information).

Alternatively, a determination can be made that biometric authentication criteria have not been met. If biometric authentication failed, electronic device 3200 forgoes autofilling the one or more fillable fields with credential information (e.g., log-in information or credit card information). Forgoing autofilling the one or more fillable fields optionally includes displaying a failure interface such as failure interface 2854 in FIG. 28X or failure interface 2856 in FIG. 28Y.

Figure 32L:
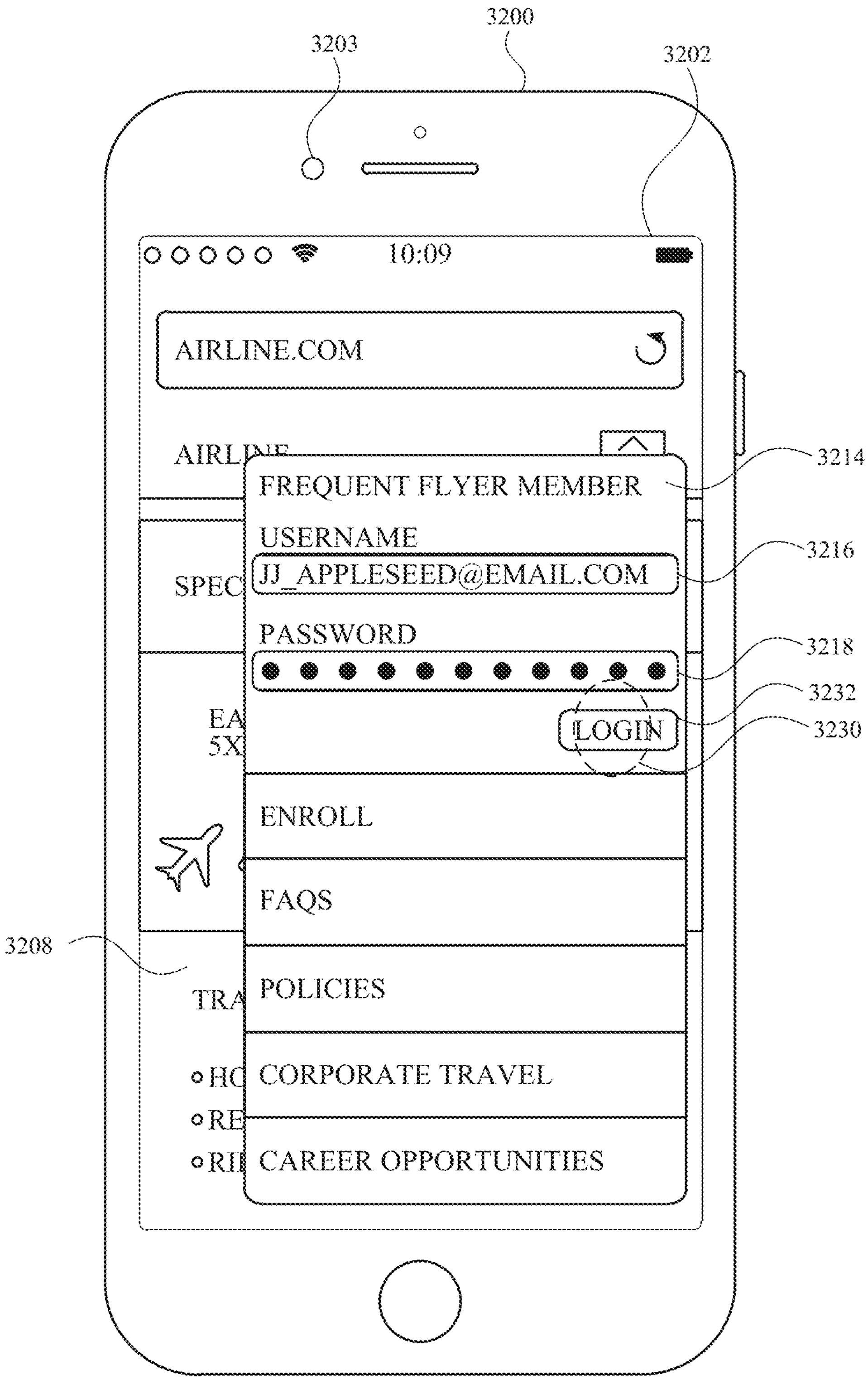
Figure 32M:
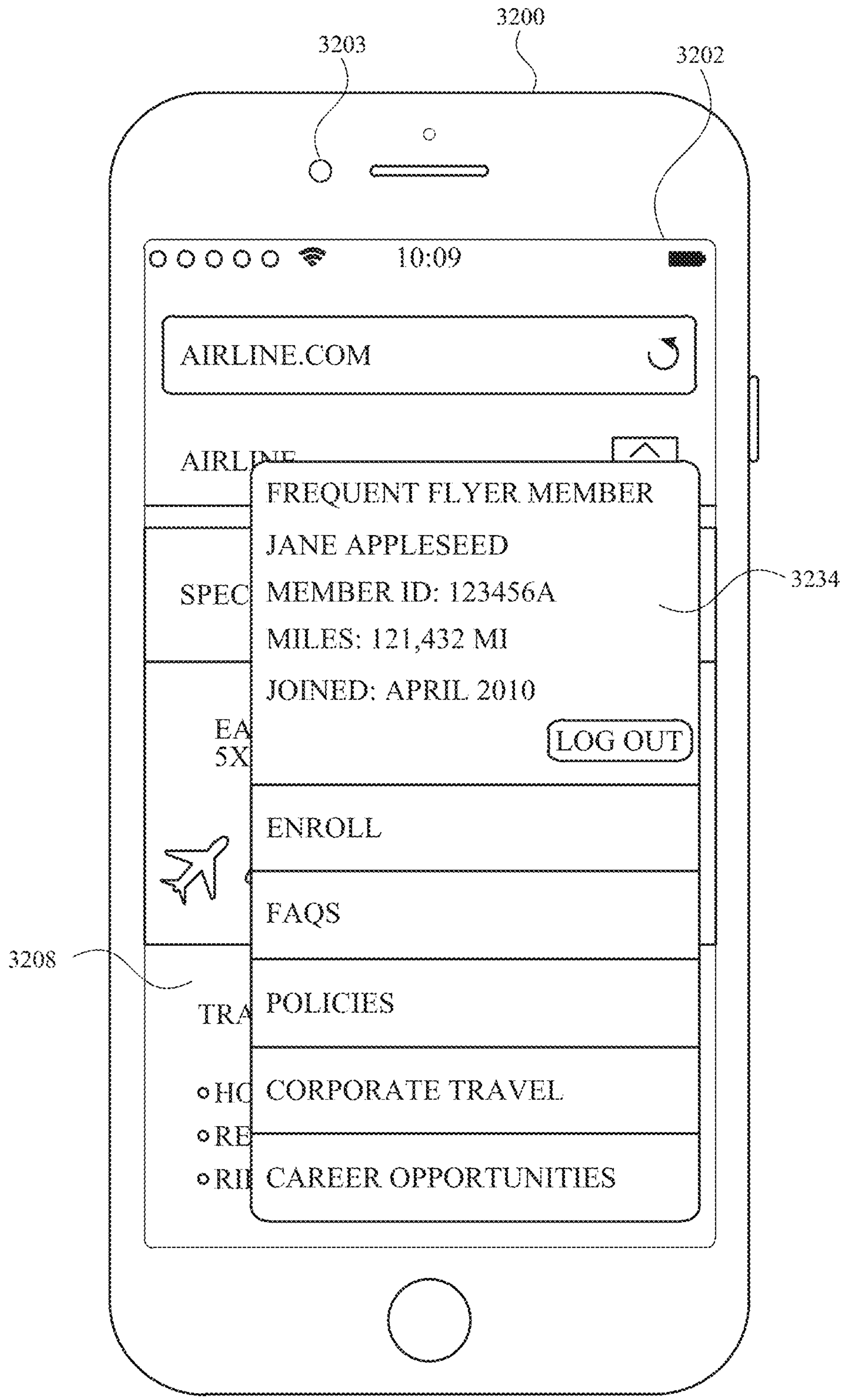

In FIG. 32L, electronic device detects tap gesture 3230 on submit affordance 3232. In response to detecting tap gesture 3230, electronic device 3200 submits the credential information in username field 3216 and password field 3218 for user authentication. Upon successful authentication, electronic device 3200 provides access to restricted content (e.g., content that can only be seen once a user has logged in) in member user interface 3234 of FIG. 32M.

FIGS. 32N-32W illustrate various scenarios in which certain visibility criteria initially were not met, and then subsequent to user input, the visibility criteria were met.

Figure 32N:
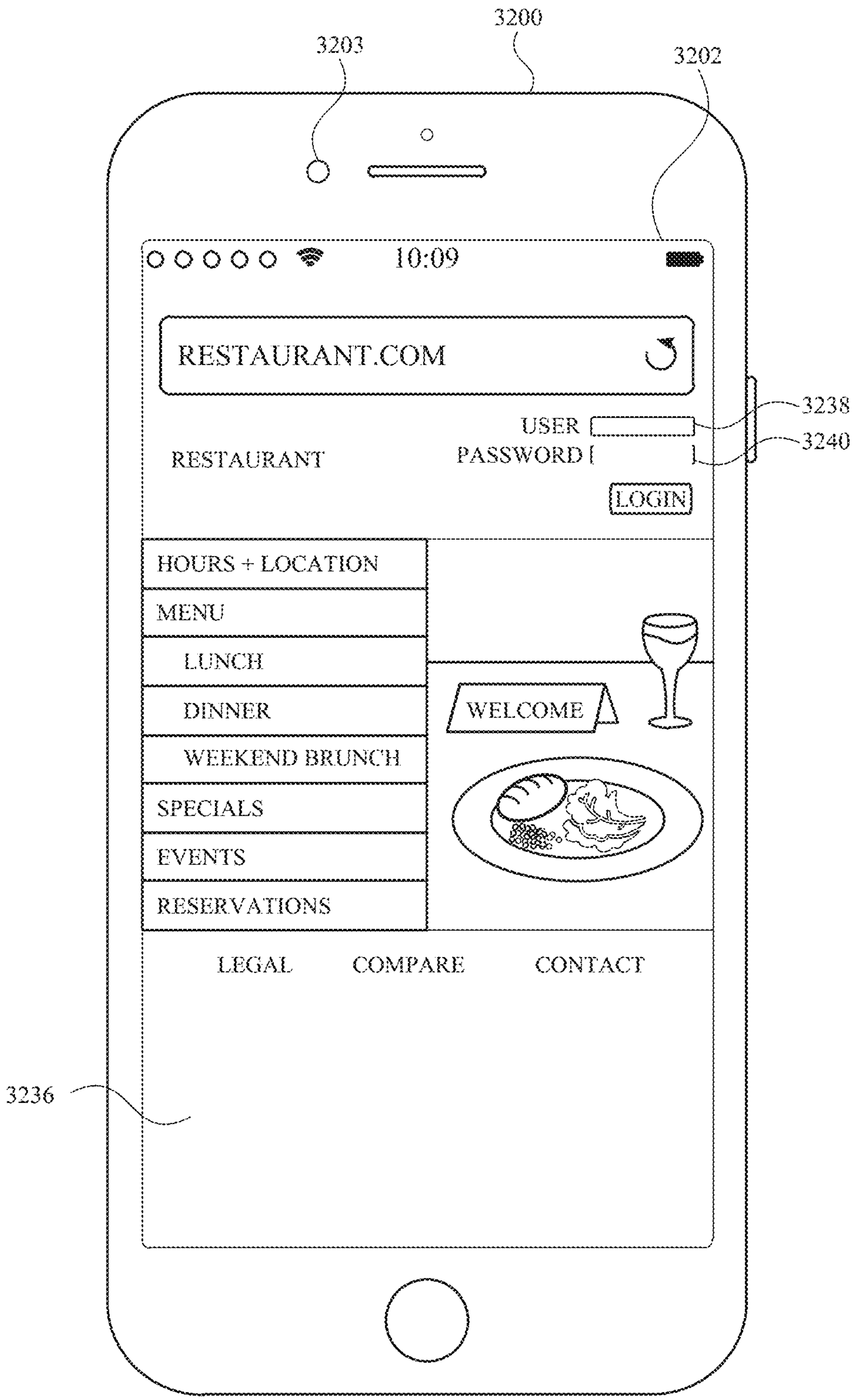

In FIG. 32N, electronic device 3200 displays, on display 3202, user interface 3236 of an application. The application is a mobile browser application, and the interface corresponds to a website (restaurant.com). User interface 3236 includes one or more fillable fields (e.g., username field 3238 and password field 3240). The fillable fields are displayed within the visible area of user interface 3236 at a size that is below a threshold size (e.g., a threshold size that must be met or exceeded in order to meet the certain visibility criteria).

Figure 32O:
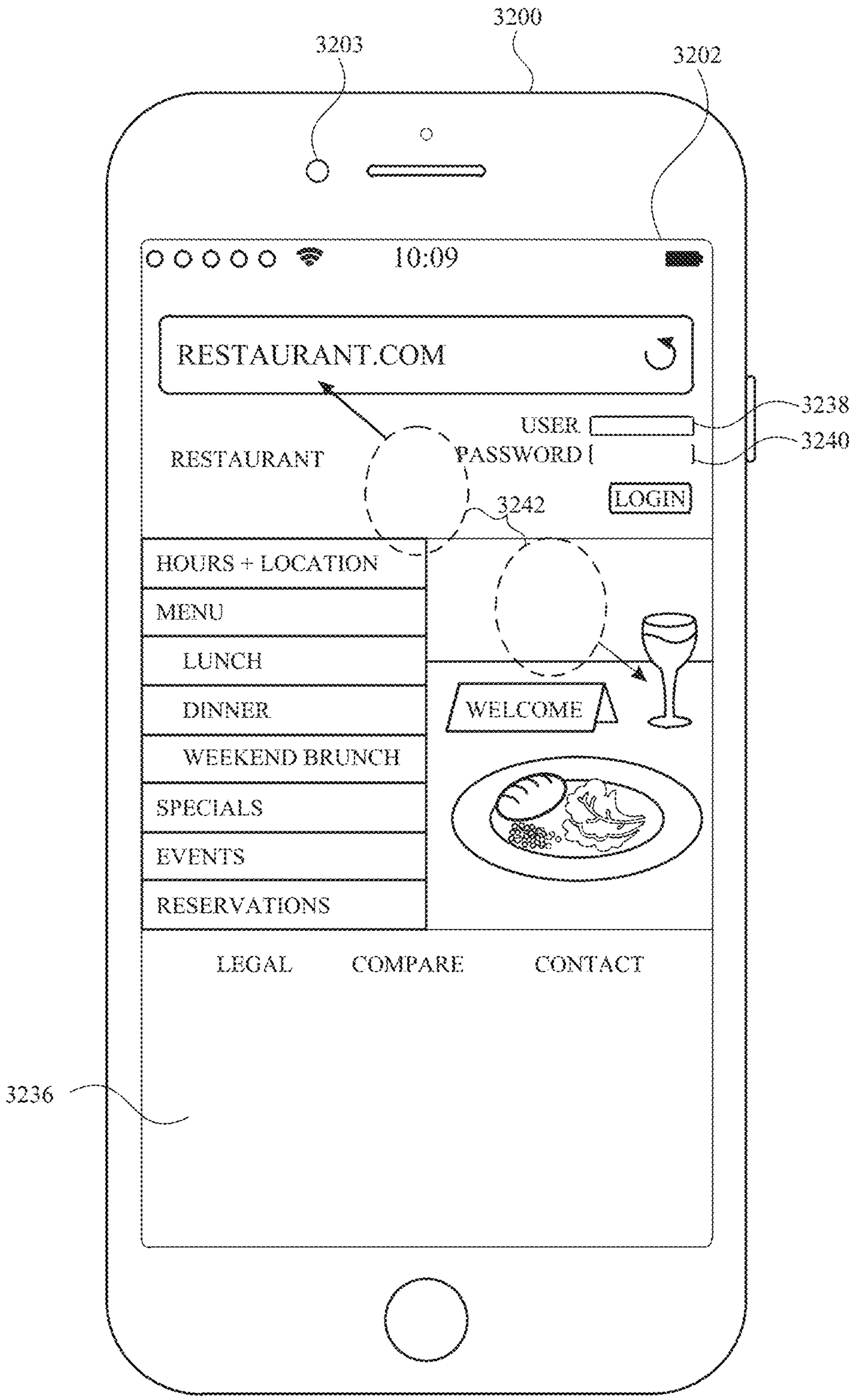
Figure 32P:
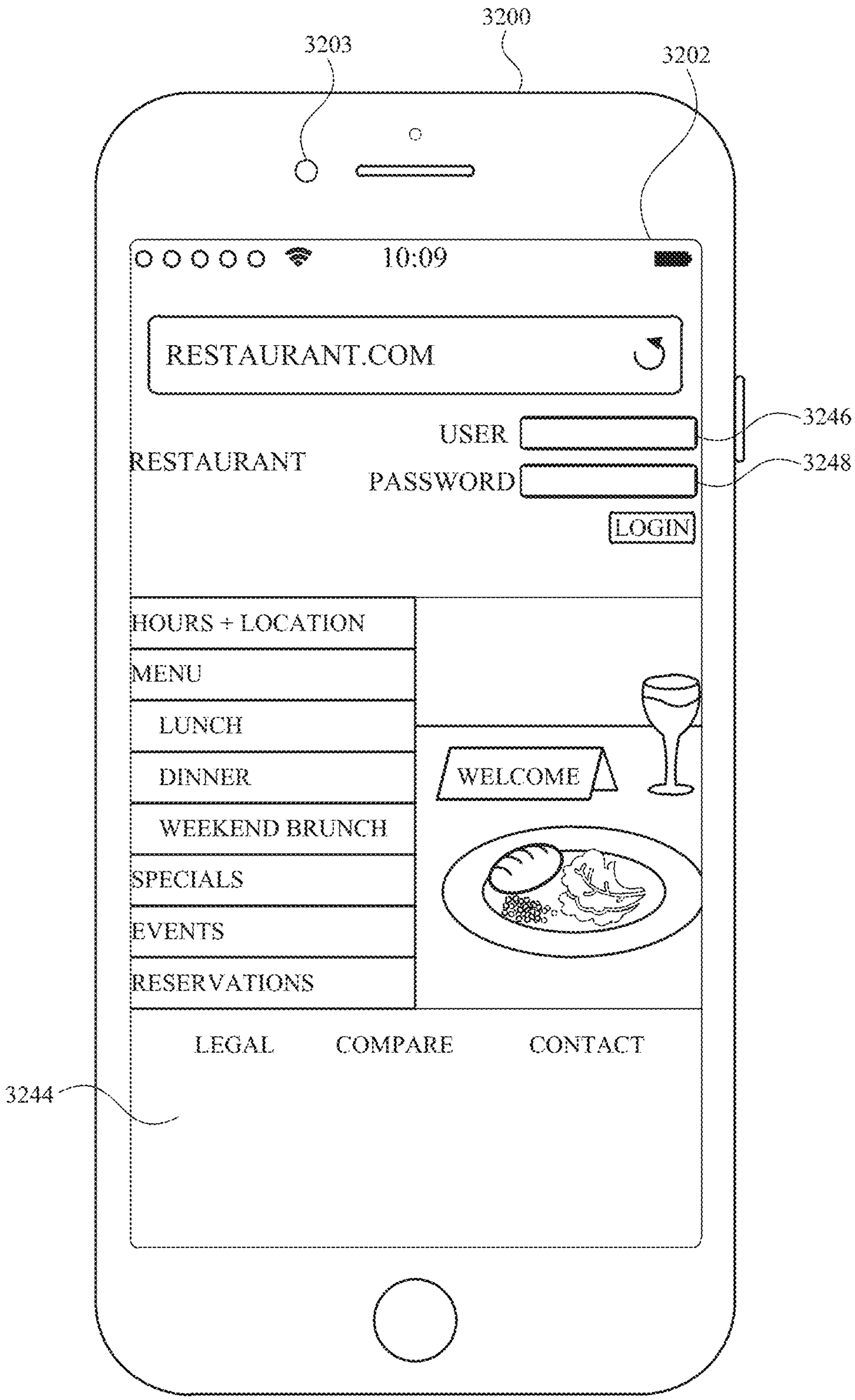

In FIG. 32O, while displaying user interface 3236, electronic device 3200 detects zoom gesture 3242. In response to detecting zoom gesture 3242, electronic device 3200 displays enlarged user interface 3244 as shown in FIG. 32P. Enlarged user interface 3244 includes enlarged username field 3246 and enlarged password field 3248. A determination is made that zoom gesture 3242 did not cause the fillable fields to meet certain visibility criteria. For example, the fillable fields are still displayed within the visible area of enlarged user interface 3244 at a size that is below the threshold size. Upon the determination that the visibility criteria are still not met, electronic device 3200 forgoes initiating biometric authentication.

Figure 32Q:
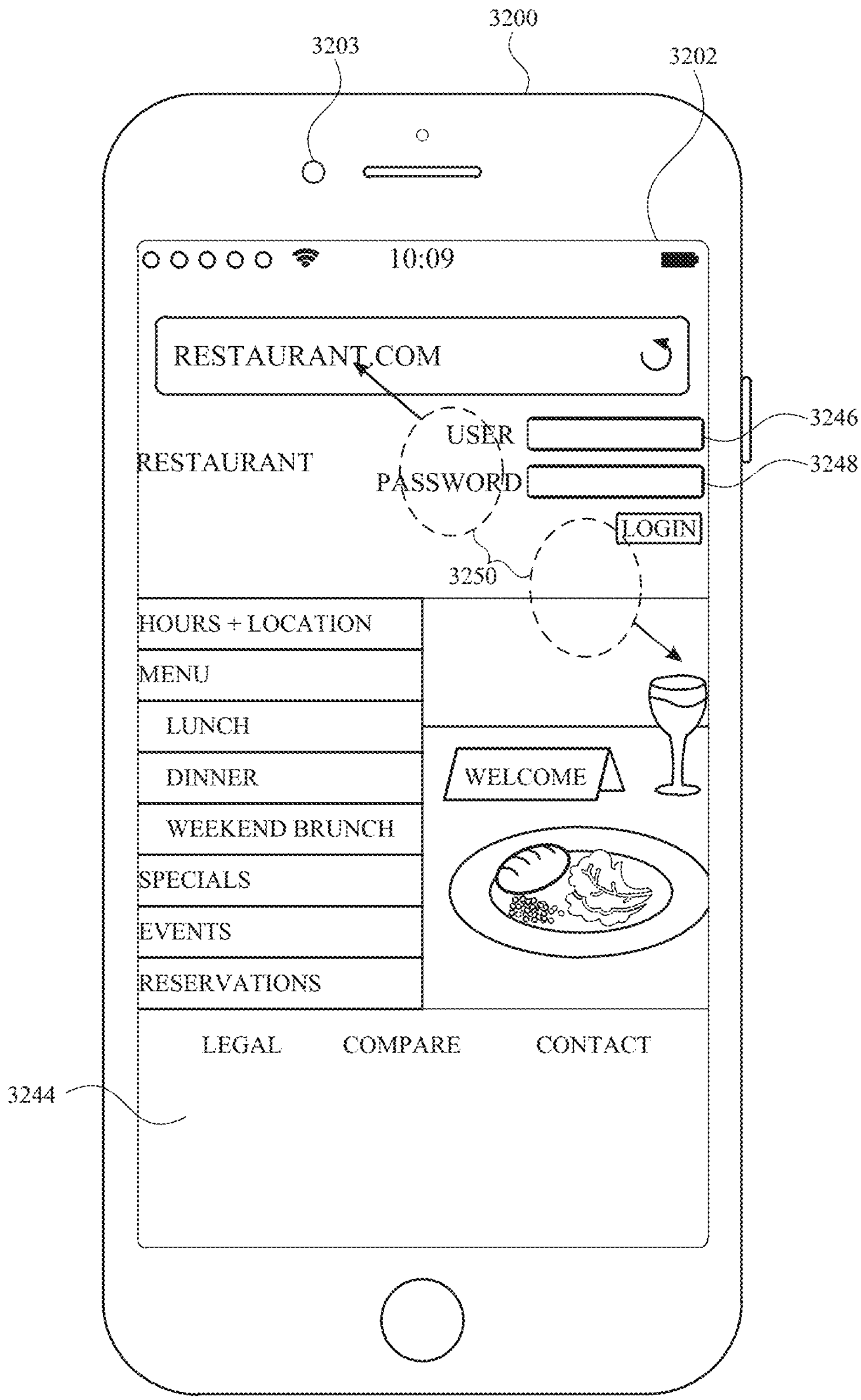
Figure 32R:
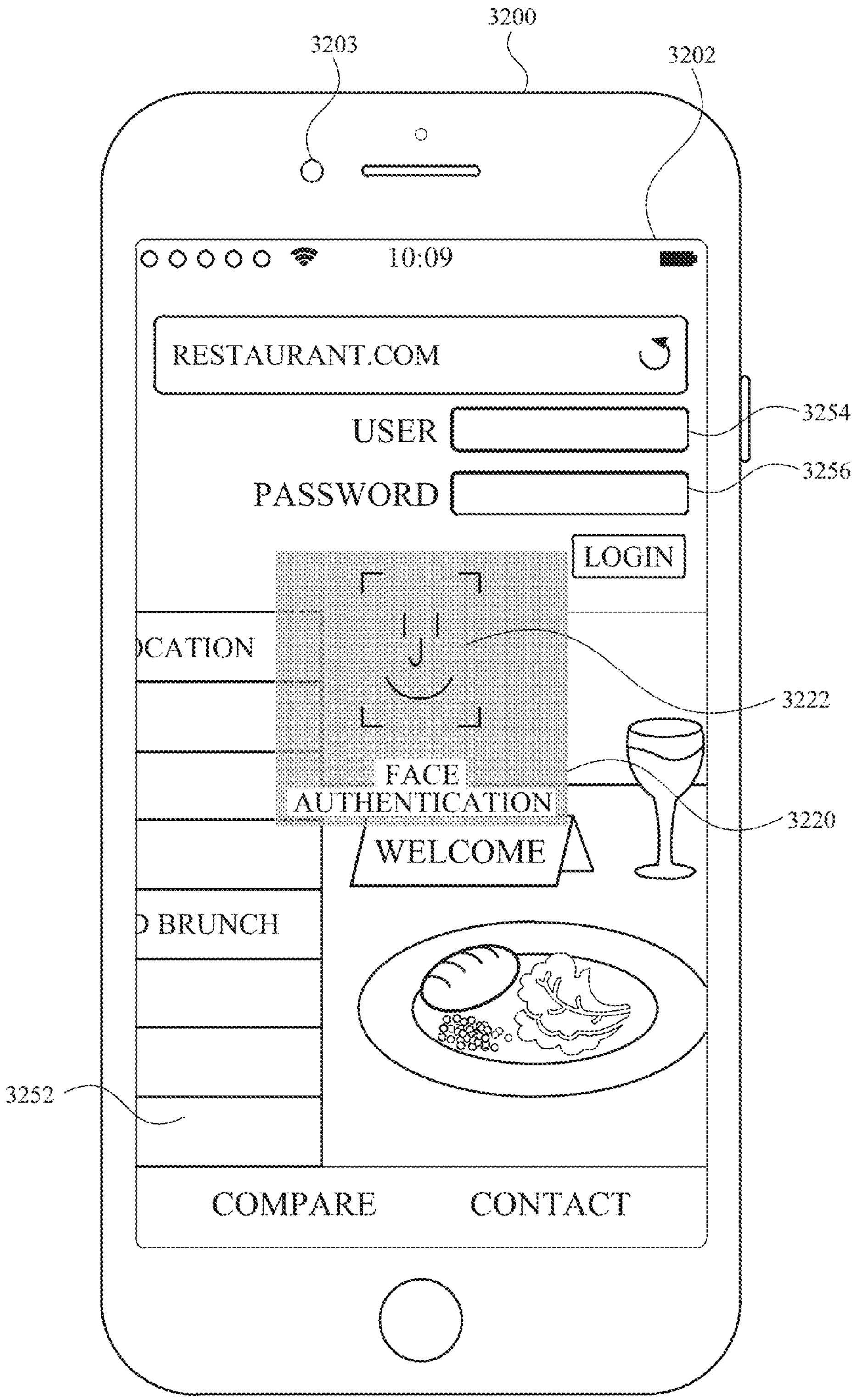

In FIG. 32Q, while displaying enlarged user interface 3244, electronic device 3200 detects zoom gesture 3250. In response to detecting zoom gesture 3250, electronic device 3200 displays enlarged user interface 3252, as shown in FIG. 32R. Enlarged user interface 3252 includes enlarged username field 3254 and enlarged password field 3256. A determination is made that zoom gesture 3250 caused the fillable fields to meet the visibility criteria. For example, the fillable fields are now displayed within the visible area of enlarged user interface 3252 at a size that is at or above the threshold size. Upon the determination that the visibility criteria are met, electronic device 3200 initiates biometric authentication, and displays biometric authentication interface 3220 with biometric authentication glyph 3222, as described with respect to FIG. 32G.

Figure 32S:
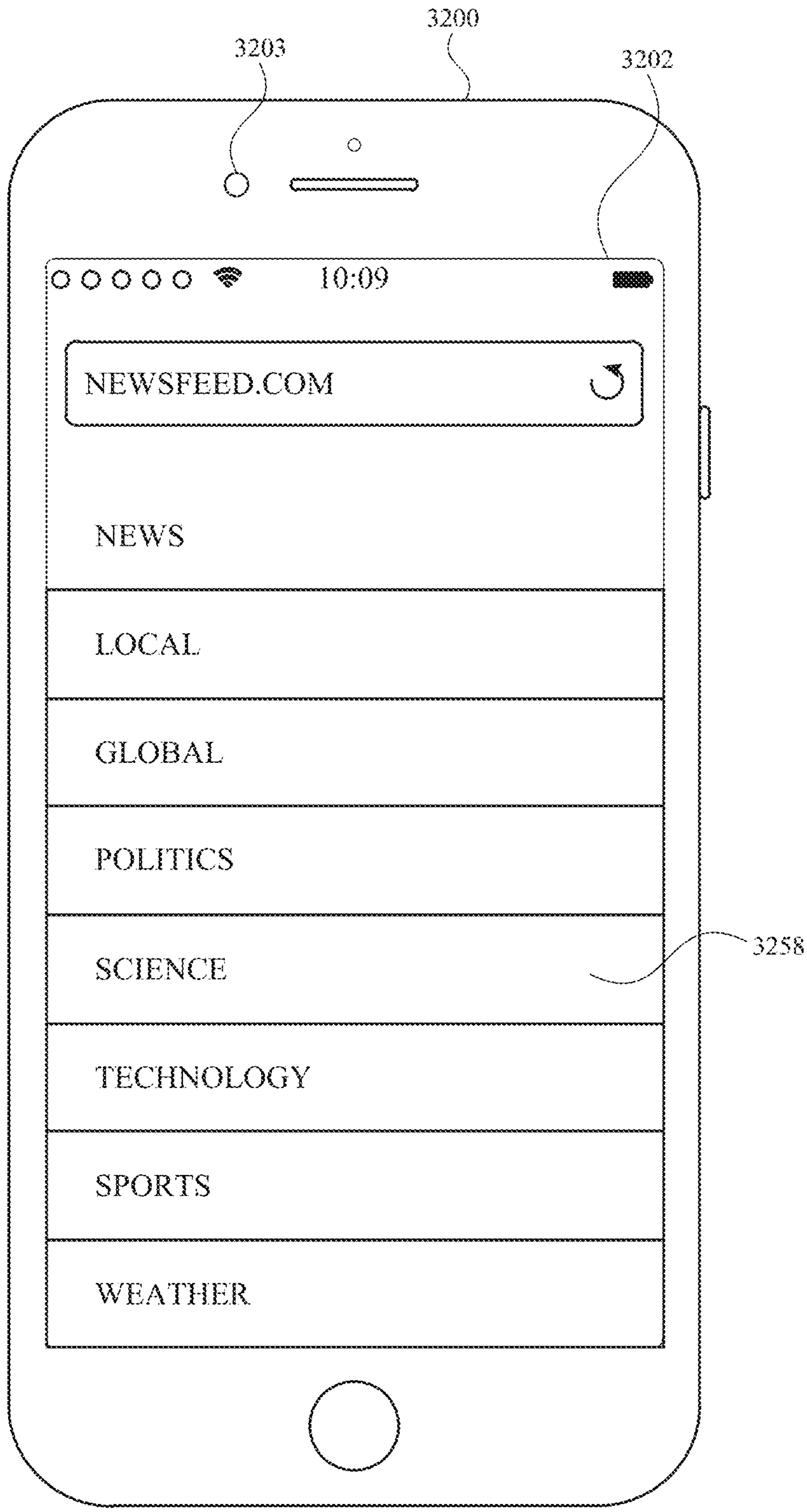

In FIG. 32S, electronic device 3200 displays, on display 3202, user interface 3258 of an application. The application is a mobile browser application, and the interface corresponds to a website (newsfeed.com). User interface 3258 is a user interface region that corresponds to a portion of an electronic document (e.g., an HTML document). The electronic document includes one or more fillable fields (e.g., username field 3268 and password field 3270 in FIG. 32W) that are outside of the visible area of user interface 3258.

Figure 32T:
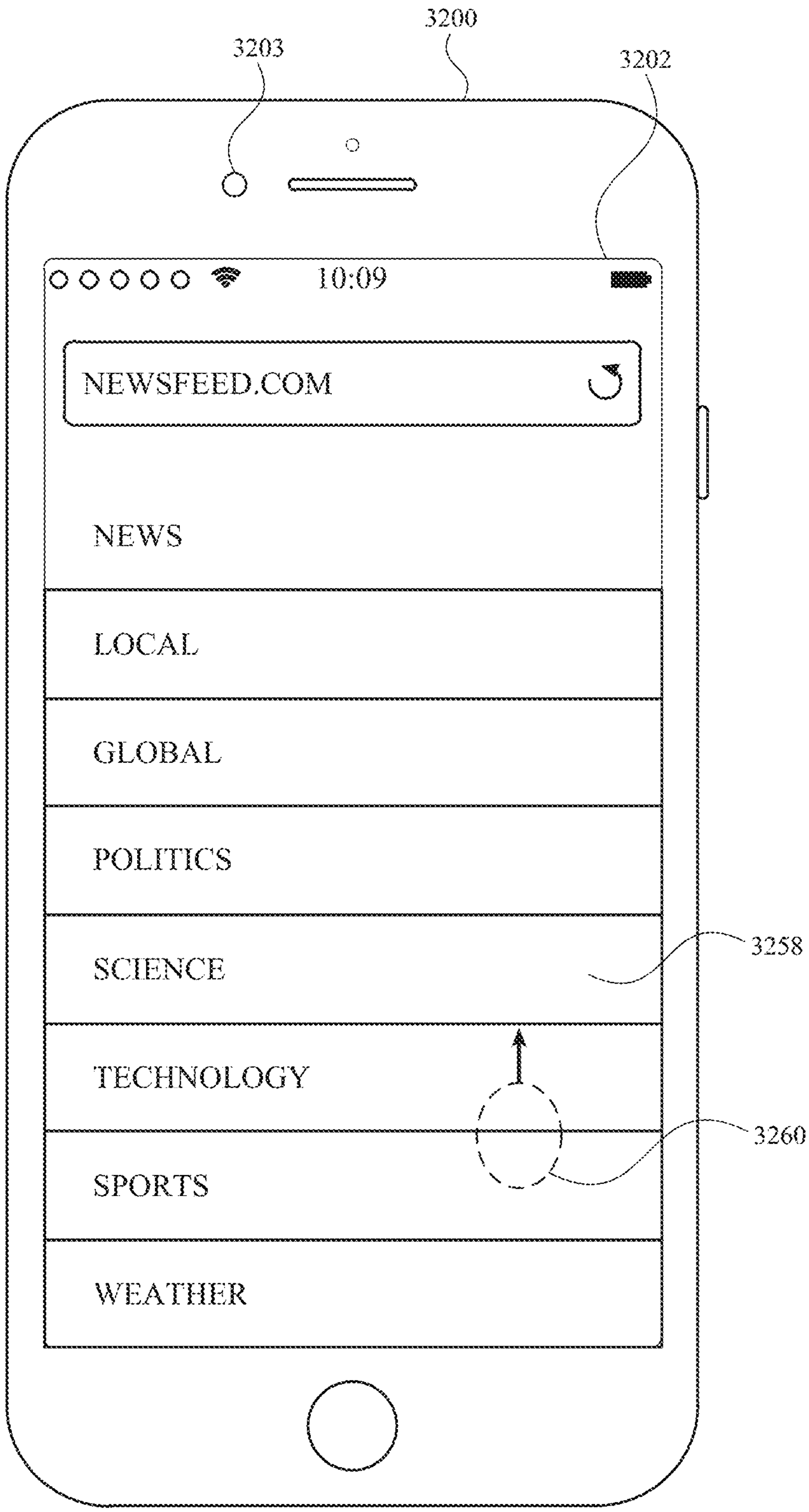
Figure 32U:
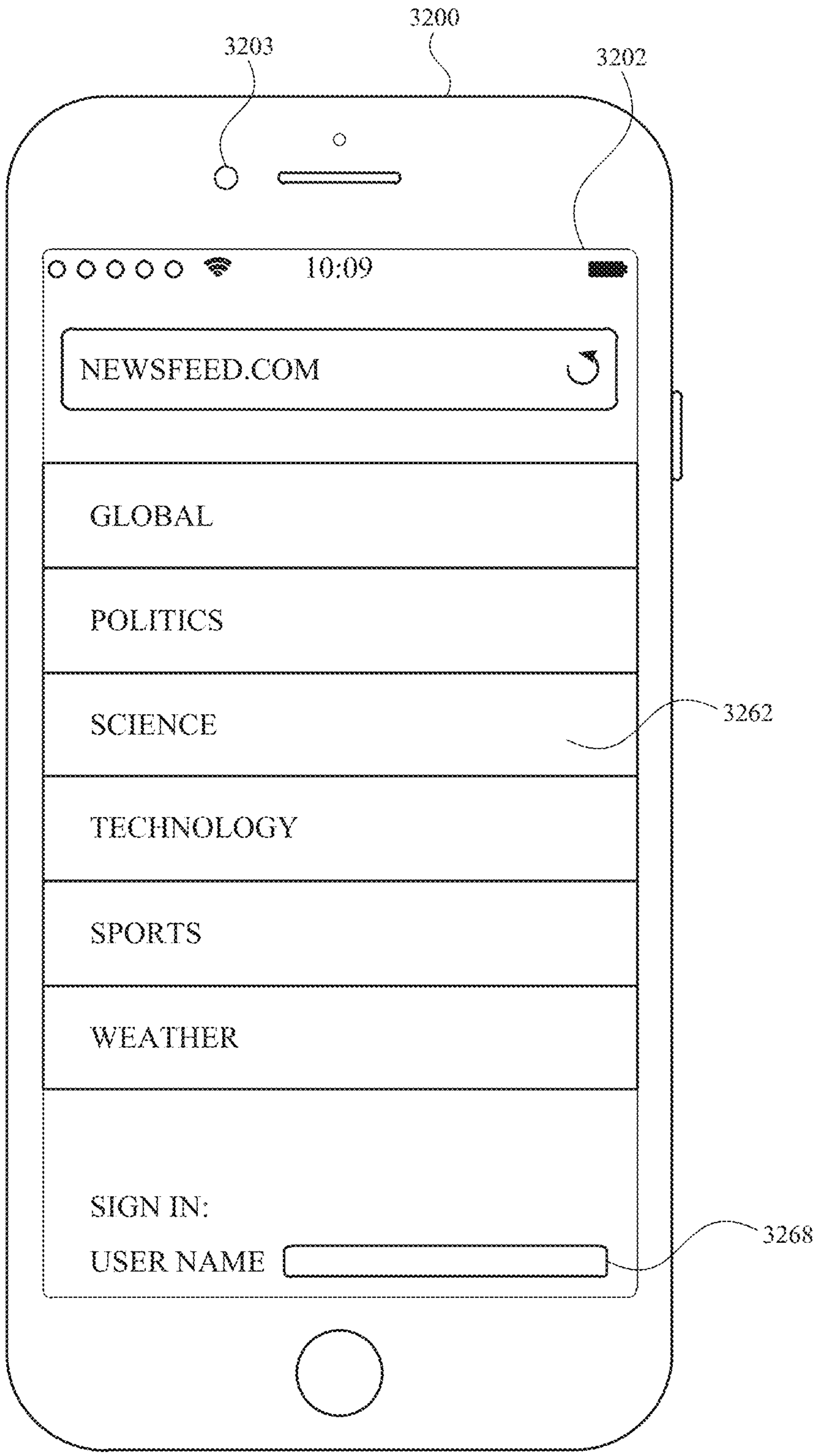

In FIG. 32T, while displaying user interface 3258, electronic device 3200 detects scroll gesture 3260 in an upward motion. In response to detecting scroll gesture 3260, electronic device 3200 causes user interface 3258 to scroll down. In FIG. 32U, subsequent to scroll gesture 3260, electronic device 3200 displays scrolled user interface 3262, which includes displaying a portion of the one or more fillable fields (e.g., username field 3268). A determination is made that scroll gesture 3260 did not cause the one or more fillable fields to meet certain visibility criteria. For example, the visibility criteria includes whether a threshold amount of the one or more fillable fields is displayed within a visible area of scrolled user interface 3262. Upon the determination that the visibility criteria are still not met, electronic device 3200 forgoes initiating biometric authentication.

Figure 32V:
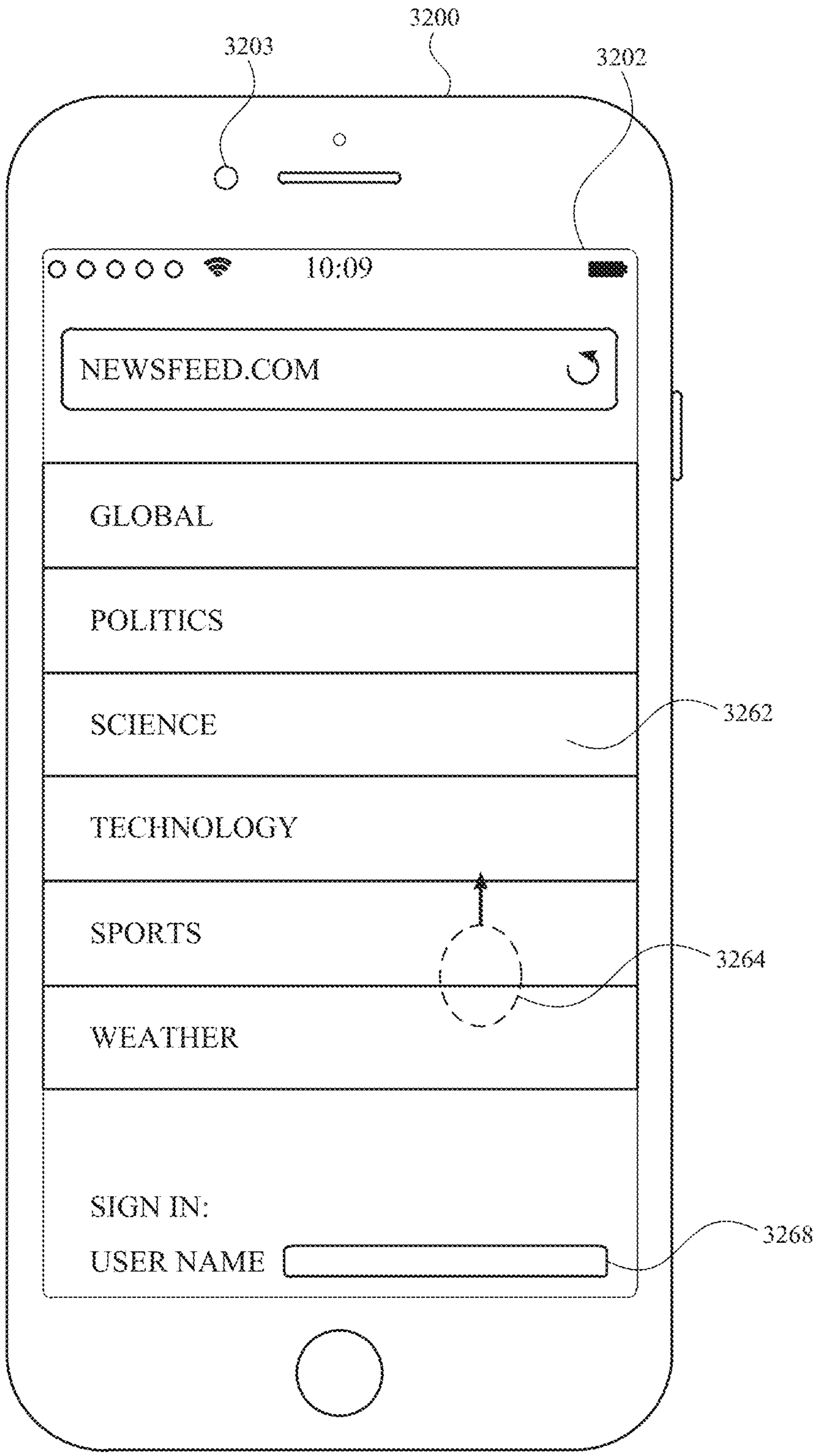

In FIG. 32V, while displaying scrolled user interface 3262, electronic device 3200 detects scroll gesture 3264. In response to detecting scroll gesture 3264, electronic device 3200 causes scrolled user interface 3262 to further scroll down. In FIG. 32W, subsequent to scroll gesture 3264, electronic device 3200 displays scrolled user interface 3266, which includes displaying the one or more fillable fields (e.g., username field 3268 and password field 3270). A determination is made that scroll gesture 3264 caused the fillable fields to meet the visibility criteria. For example, a threshold amount of the one or more fillable fields is now displayed within a visible area of scrolled user interface 3262. Upon the determination that the visibility criteria are met, electronic device 3200 initiates biometric authentication, and displays biometric authentication interface 3220 with biometric authentication glyph 3222, as described with respect to FIG. 32G.

FIG. 33 is a flow diagram illustrating a method for determining when to perform an authentication operation using an electronic device in accordance with some examples. Method 3300 is performed at a device (e.g., 100, 300, 500, 1700, 3200) with a display (e.g., 3202). In some examples, the display (e.g., 3202) is a touch-sensitive display. In some examples, the display (e.g., 3202) is not a touch sensitive display.

Some operations in method 3300 are, optionally, combined, the orders of some operations are, optionally, changed, and some operations are, optionally, omitted. As described below, method 3300 provides an intuitive way for determining when to perform an authentication operation. The method reduces the cognitive burden on a user for performing authentication operations thereby creating a more efficient human-machine interface. For battery-operated computing devices, enabling a user to authenticate faster and more efficiently conserves power and increases the time between battery charges.

The electronic device (e.g., 100, 300, 500, 1700, 3200) receives (3302) a request (e.g., 3210) to display a first portion (e.g., 3214) of respective content (e.g., 3208) (e.g., a request to load a webpage, scroll a webpage, zoom a webpage).

In response (3304) to the request (e.g., 3210) to display the first portion (e.g., 3214) of the respective content (e.g., 3208), the electronic device (e.g., 100, 300, 500, 1700, 3200) proceeds to blocks 3306-3310.

The electronic device (e.g., 100, 300, 500, 1700, 3200) displays (3306), on the display (e.g., 3202), at least the first portion (e.g., 3214) of the respective content (e.g., 3208) (e.g., a region of an electronic document (e.g., an HTML document) having user-interactive elements). The respective content (e.g., 3208) includes an element (e.g., 3216, 3218) associated with an authentication operation (e.g., one or more fillable fields such as a credit card entry field, a log-in user interface element that optionally includes a username and password fields for logging in to a service).

In accordance with a determination that the element (e.g., 3216, 3218) associated with the authentication operation meets visibility criteria (e.g., the element associated with the authentication operation is entirely outside of a visible area of the content, at least a threshold amount of the element associated with the authentication operation is outside of a visible area of the content, the element associated with the authentication operation is displayed within the visible area of the content at a size that is below a threshold size, and/or the element associated with the operation is contained in a portion of the content that is hidden from view such as being contained in a collapsed menu region or other hidden element) (e.g., at least a portion of the one or more fillable fields is displayed, the one or more fillable fields are fully displayed, and/or the one or more fillable fields are greater than a threshold size), the electronic device (e.g., 100, 300, 500, 1700, 3200) initiates (3308) biometric authentication (e.g., as described with reference to FIGS. 17G-17H). In some examples, the region corresponds to a portion of an electronic document (e.g., an HTML document) and the one or more fillable fields are one or more elements of the electronic document having a property that causes the one or elements to be rendered in a visible state (e.g., an HTML element having a "style.display" property of "inline"). Initiating biometric authentication upon meeting visibility criteria provides the user with a capability to perform biometric authentication without requiring further inputs (beyond an input causing the visibility criteria to be met). Performing biometric authentication when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the element (e.g., 3216, 3218) associated with the authentication operation does not meet the visibility criteria (e.g., the element associated with the authentication operation is entirely displayed within a visible area of the content, at least a threshold amount of the element associated with the authentication operation is displayed within a visible area of the content, the element associated with the authentication operation is displayed within the visible area of the content at a size that is above the threshold size, and/or the element associated with the operation is contained in a portion of the content that is not otherwise hidden from view such as being contained in a collapsed menu region or other hidden element), the electronic device (e.g., 100, 300, 500, 1700, 3200) forgoes (3310) initiating biometric authentication. Forgoing initiating biometric authentication based on not meeting visibility criteria prevents biometric authentication from occurring when a user did not intend for the device to initiate biometric authentication. Preventing unintentional biometric authentication enhances the operability of the device and makes the user-device interface more efficient (e.g., by restricting unauthorized access) which, additionally, reduces power usage and improves battery life of the device by limiting the performance of restricted operations.

In accordance with some examples, the first portion (e.g., 3214) of the respective content (e.g., 3208) is displayed without displaying, on the display (e.g., 3202), a second portion of the respective content. In some examples, second portion is displayed before displaying the first portion.

In accordance with some examples, biometric authentication occurs automatically (e.g., without an intermediate input being required to initiate biometric authentication) in accordance with the determination that the element (e.g., 3216, 3218) associated with the authentication operation meets visibility criteria.

In accordance with some examples, while displaying the first portion (e.g., 3236, 3258) of the respective content, the electronic device (e.g., 100, 300, 500, 1700, 3200) detects an input (e.g., 3242, 3250, 3260, 3264) (e.g., zoom, scroll, menu display). In response to detecting the input (e.g., 3250, 3264) and in accordance with a determination that the input causes the element (e.g., 3246, 3248, 3268, 3270) associated with the authentication operation to meet the visibility criteria, the electronic device (e.g., 100, 300, 500, 1700, 3200) initiates biometric authentication. Initiating biometric authentication in response to an input and upon meeting visibility criteria provides the user with a capability to perform biometric authentication without requiring further inputs (beyond the input causing the visibility criteria to be met). Performing biometric authentication when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In response to detecting the input (e.g., 3242, 3260) and in accordance with a determination that the input does not cause the element (e.g., 3238, 3240, 3268, 3270) associated with the authentication operation to meet the visibility criteria, the electronic device (e.g., 100, 300, 500, 1700, 3200) forgoes initiating biometric authentication. In some examples, an input (e.g., 3210, 3242, 3250, 3260, 3264) (e.g., the selection of an affordance, a resizing request) affects the visibility characteristics of the element (e.g., 3216, 3218, 3246, 3248, 3268, 3270) associated with the authentication operation, causing the element to transition from not meeting the visibility criteria to meeting the visibility criteria. Forgoing initiating biometric authentication based on not meeting visibility criteria prevents biometric authentication from occurring when a user did not intend for the device to initiate biometric authentication. Preventing unintentional biometric authentication enhances the operability of the device and makes the user-device interface more efficient (e.g., by restricting unauthorized access) which, additionally, reduces power usage and improves battery life of the device by limiting the performance of restricted operations.

In accordance with some examples, the input (e.g., 3242, 3250) is a request to perform a zoom operation, and the visibility criteria include a requirement that the element (3238, 3240, 3246, 3248, 3254, 3256) associated with the authentication operation has a size that is greater than a threshold size.

In accordance with some examples, the input (3260, 3264) is a request to perform a scroll operation, and the visibility criteria include a requirement that at least a predetermined amount of the element (3268, 3270) associated with the authentication operation is displayed on the display (e.g., 3202).

In accordance with some examples, the input (e.g., 3210) is a request to perform a hidden interface region display operation (e.g., a request to display a hidden menu or other hidden interface region), and the visibility criteria include a requirement that the element (e.g., 3216, 3218) associated with the authentication operation is not designated for display in a hidden interface region.

In accordance with some examples, the electronic device (e.g., 100, 300, 500, 1700, 3200) further includes one or more biometric sensors (e.g., 3203), and initiating biometric authentication includes initiating biometric authentication using the one or more biometric sensors (e.g., 3203).

In accordance with some examples, the one or more biometric sensors (e.g., 3203) includes one or more contactless biometric sensors (e.g., infrared camera, visible light camera, or combinations thereof) configured to perform biometric authentication without physical contact from the user (e.g., the one or more biometric sensors (e.g., 3203) can perform biometric authentication without a physical input (e.g., a touch or button press) from the user). Initiating biometric authentication occurs without receiving an explicit request to initiate biometric authentication.

In accordance with some examples, the one or more biometric sensors (e.g., 3203) include one or more facial recognition sensors. Initiating biometric authentication includes using the one or more facial recognition sensors to determine whether facial authentication criteria have been met (e.g., as described with respect to FIGS. 23D-23F).

In accordance with some examples, the one or more biometric sensors (e.g., 3203) include one or more fingerprint sensors. Initiating biometric authentication includes: detecting a contact with the one or more fingerprint sensors and determining whether the contact meets fingerprint authentication criteria (e.g., fingerprint is consistent with a registered or authorized fingerprint).

In accordance with some examples, initiating biometric authentication includes displaying, on the display (e.g., 3202), a progress indicator (e.g., 3222, 3224, 3226, 3228) indicating the status of a biometric authentication process. In some examples, the progress indicator corresponds to a simulated progress indicator (e.g., a progress indicator that has some or all of the features of the progress indicator displayed surrounding the simulation of the biometric feature such as a plurality of progress elements that are distributed around a representation of the biometric feature of the user). In some examples, a small progress indicator is displayed at the top, bottom, side, or in a corner. Displaying a small indicator away from the center of the display provides the user an indication of the progress of the biometric authentication without obstructing or cluttering the display and diverting the user's focus, thereby providing improved visual feedback during the authentication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication. In some examples, no progress indicator is displayed during biometric authentication. In some examples, the electronic device (e.g., 100, 300, 500, 1700, 3200) forgoes displaying a progress indicator indicating the status of a biometric authentication process.

In accordance with some examples, the element associated with an authentication operation is a fillable field (e.g., 3216, 3218, 3254, 3256, 3268, 3270) (e.g., a user name, password, credential, or payment information entry field). In response to initiating biometric authentication and in accordance with a determination that biometric authentication criteria have been met, the electronic device (e.g., 100, 300, 500, 1700, 3200) autofills the fillable field (e.g., 3216, 3218, 3254, 3256, 3268, 3270) with credential information (e.g., populating a field with data stored by the electronic device (e.g., 100, 300, 500, 1700, 3200) or accessible to the electronic device (e.g., 100, 300, 500, 1700, 3200), such as a user name, password, credit card information or other sensitive information). In response to initiating biometric authentication and in accordance with a determination that biometric authentication criteria have not been met, the electronic device (e.g., 100, 300, 500, 1700, 3200) forgoes autofilling the fillable field (e.g., 3216, 3218, 3254, 3256, 3268, 3270) with credential information.

In accordance with some examples, in response to initiating biometric authentication and in accordance with a determination that biometric authentication criteria have been met, the electronic device (e.g., 100, 300, 500, 1700, 3200) provides access to restricted content (e.g., logging in to a webpage (e.g., 3234), displaying a list of passwords associated with a user, displaying credit card information). In response to initiating biometric authentication and in accordance with a determination that biometric authentication criteria have not been met, the electronic device (e.g., 100, 300, 500, 1700, 3200) forgoes providing access to restricted content.

In accordance with some examples, wherein the credential information includes log-in information (e.g., information required to login to an application, an account, or a website).

In accordance with some examples, wherein the credential information includes information associated with a payment account information (e.g., credit card, bank account, or payment service information).

Note that details of the processes described above with respect to method 3300 (e.g., FIG. 33) are also applicable in an analogous manner to the methods described below and above. For example, method 3300 optionally includes one or more of the characteristics of the various methods described above with reference to methods 800, 1000, 1200, 1400, 1600, 2000, 2200, 2500, 2700, 2900, 3100, and 3500. For example, the enrolled biometric data described in method 1200 can be used to perform biometric authentication as described with respect to method 3300. As a further example, the re-authentication criteria of method 3100 can be used in conjunction with method 3300 to control when biometric authentication should be performed (or re-performed). For brevity, these details are not repeated below.

FIGS. 34A-34N illustrate exemplary user interfaces for automatic log-in using biometric authentication, in accordance with some examples. As described in greater detail below, the exemplary examples of the user interfaces illustrated in FIGS. 34A-34N are used to illustrate the processes described below, including the processes in FIG. 35.

FIG. 34A illustrates electronic device 3400 (e.g., portable multifunction device 100, device 300, device 500, or device 1700). In the exemplary examples illustrated in FIGS. 34A-34N, electronic device 3400 is a smartphone. In other examples, electronic device 3400 can be a different type of electronic device, such as a wearable device (e.g., a smartwatch). Electronic device 3400 includes display 3402, one or more input devices (e.g., touchscreen of display 3402 and a microphone), and a wireless communication radio. In some examples, the electronic device includes a plurality of cameras. In some examples, the electronic device includes only one camera. In FIG. 34A, the electronic device includes biometric sensor 3403. In some examples, the biometric sensor is one or more biometric sensors that can include a camera, such as an infrared camera, a thermographic camera, or a combination thereof. In some examples, the biometric sensor is depth camera 175 of device 100 or a depth camera having one or more features and/or functions of a depth camera as described with respect to device 700 and certain examples of biometric sensor 703. In some examples, biometric sensor 3403 is a depth camera that is used in conjunction with a visible light camera to determine a depthmap of different portions of subject captured by the visible light camera, as described above with respect to biometric sensor 703.

Electronic device 3400, as seen in FIG. 34A, also includes a fingerprint sensor 3414 (e.g., a biometric sensor) that is integrated into a button. In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

In some examples, electronic device 3400 can share one or more features, elements, and/or components with devices 100, 300, 500, 700, 900, 1100, 1300, 1500, 1700, 1900, 2100, 2300, 2400, 2600, 2800, 3000, 3200, 3600, 3800, 4000, and 4200 and each of those devices can share one or more features, elements, and/or components of another of those devices (e.g., device 700 can include a component of device 3200 and vice versa). For example, biometric sensor 3403 can be biometric sensor 903 or biometric sensor 1103 can be biometric sensor 1303. For another example, button-integrated fingerprint sensor 3414 can be fingerprint sensor 1764. For another example, display 3402 can be display 1302 or display 1502 can be display 2102.

Prior to displaying log-in user interface 3404 in FIG. 34A, electronic device 3400 detects a request to load log-in user interface 3404. In response detecting the request, a determination is made as to whether biometric authentication using fingerprint sensor 3414 is available. Upon a determination that biometric authentication is available, electronic device 3400 displays log-in user interface 3404 with prompt 3406 ("SCAN FINGER TO LOGIN") located in submit affordance 3420 (e.g., an affordance that, upon selection, submits credential information in one or more fillable fields (e.g., a username field or a password field)). Prompt 3406 indicates to the user that placing their finger on fingerprint sensor 3414 will cause credential information (e.g., a username and password that enables a user to successfully log-in to an account) to be submitted via username field 3408 and password field 3410. Additionally, username field 3408 is prefilled with a default username (e.g., jj_appleseed@email.com), as shown in FIG. 34A. In some examples, the username field is not prefilled with a username.

Figure 34B:
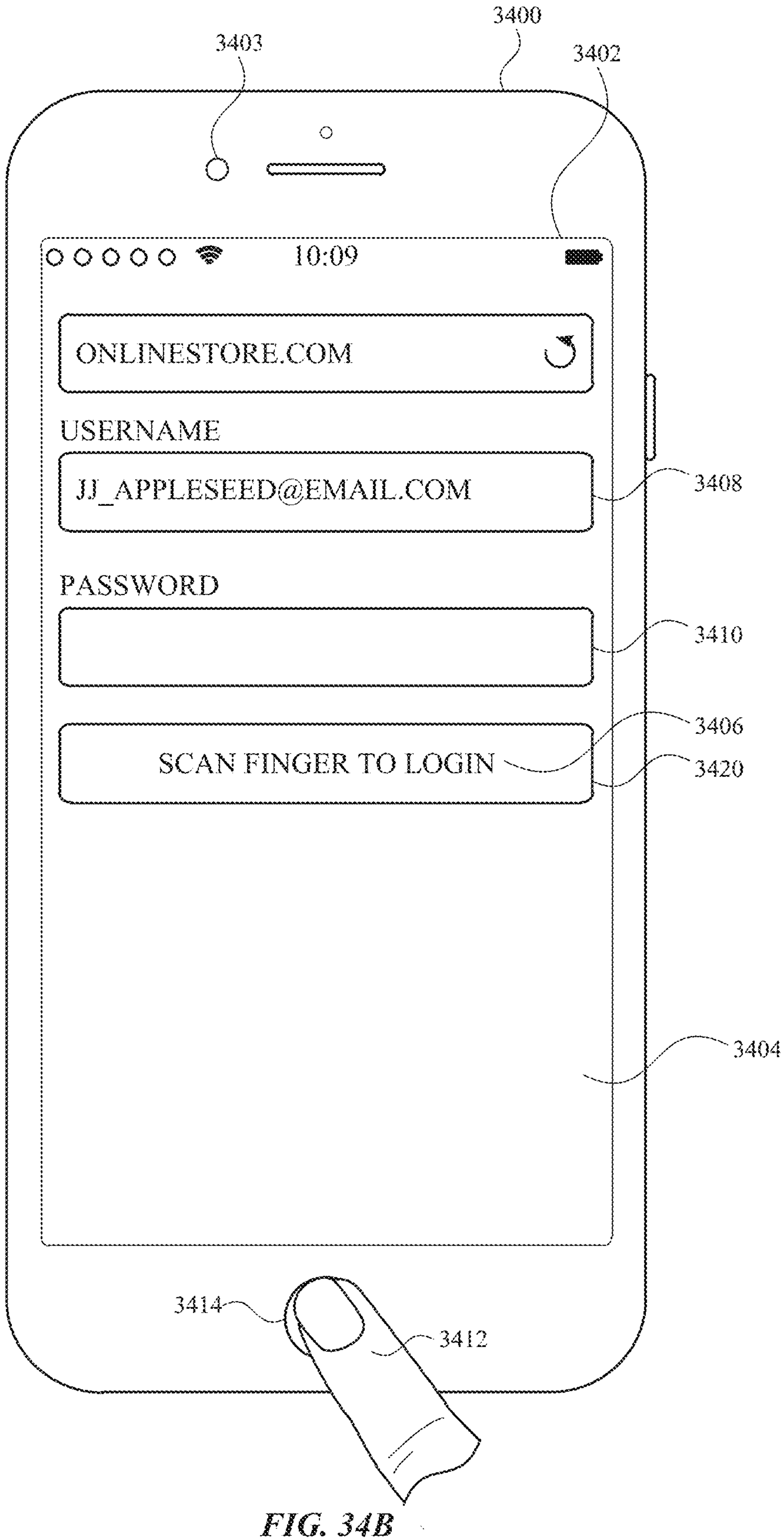
Figure 34C:
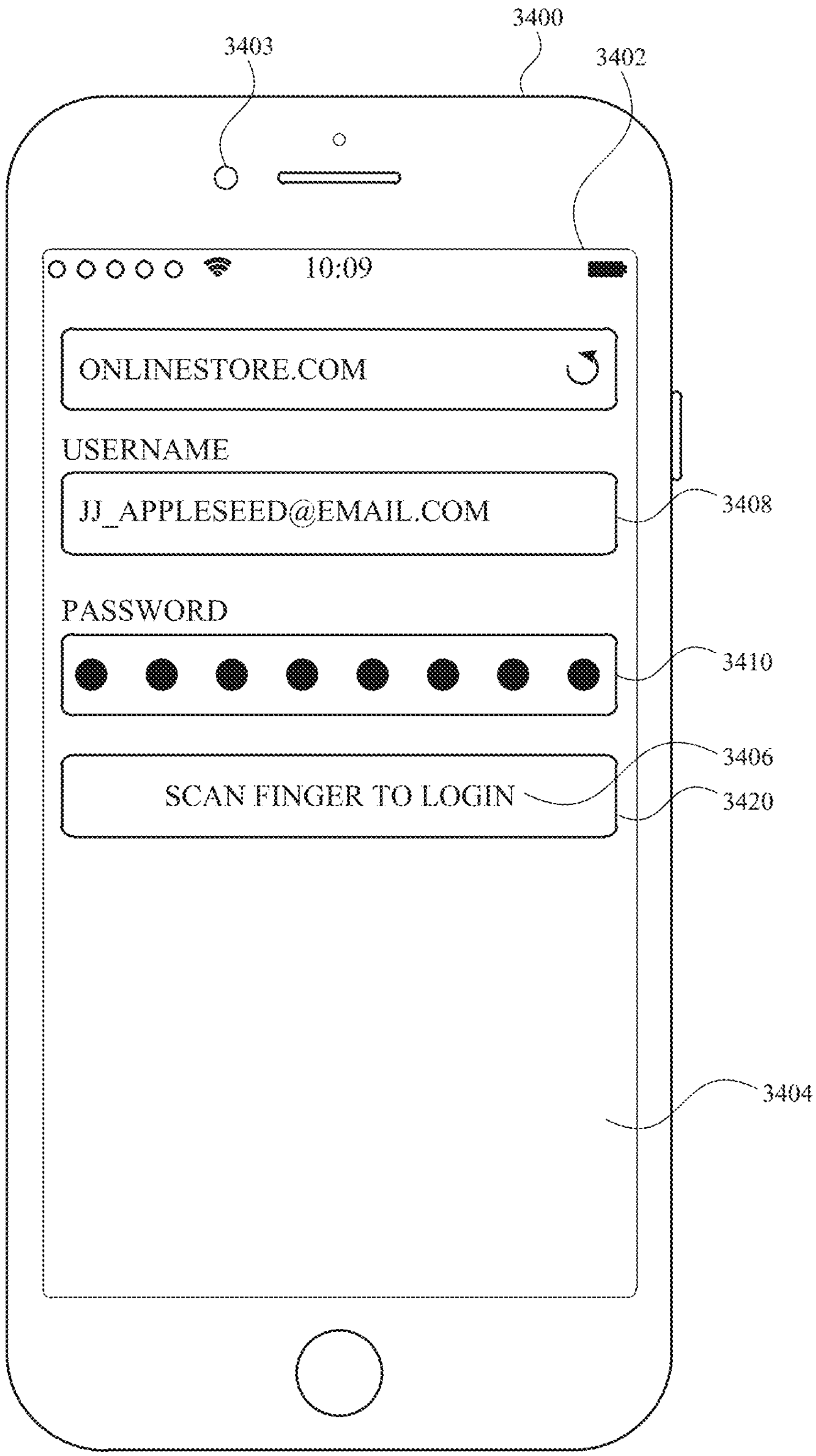
Figure 34D:

In FIG. 34B, while displaying log-in user interface 3404, electronic device 3400 detects finger 3412 using fingerprint sensor 3414. In response to detecting finger 3412, a determination is made that the finger meets certain biometric authentication criteria (e.g., fingerprint is consistent with a registered fingerprint). Upon successful authentication, in FIG. 34C, electronic device 3400 automatically inputs credential information in username field 3408 and/or password field 3410, and submits the credential information for user authentication (e.g., submits the information without requiring further input from the user). Upon successful user authentication, electronic device 3400 provides access to restricted content (e.g., content that can only be seen once a user has logged in) in account user interface 3416 of FIG. 34D.

Figure 34E:
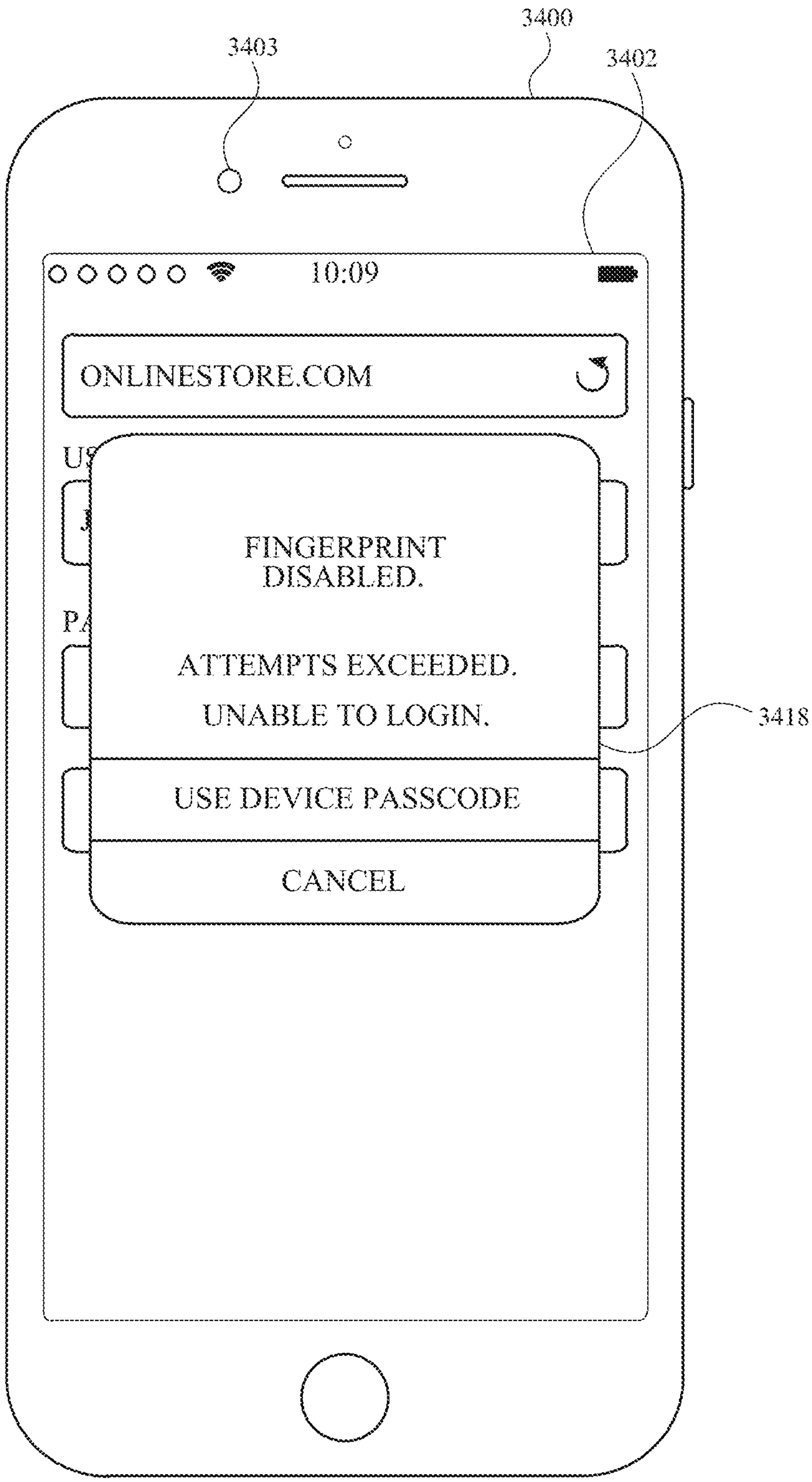

Alternatively, if a determination is made that the finger does not meet certain biometric authentication criteria, electronic device 3400 forgoes inputting and submitting the credential information and displays failure interface 3418, as shown in FIG. 34E. Failure interface 3418 can be displayed when a user has reached the maximum number of failed biometric authentication attempts. If the maximum number of failed biometric authentication attempts have been reached, fingerprint sensor 3414 is not available for biometric authentication.

Figure 34F:
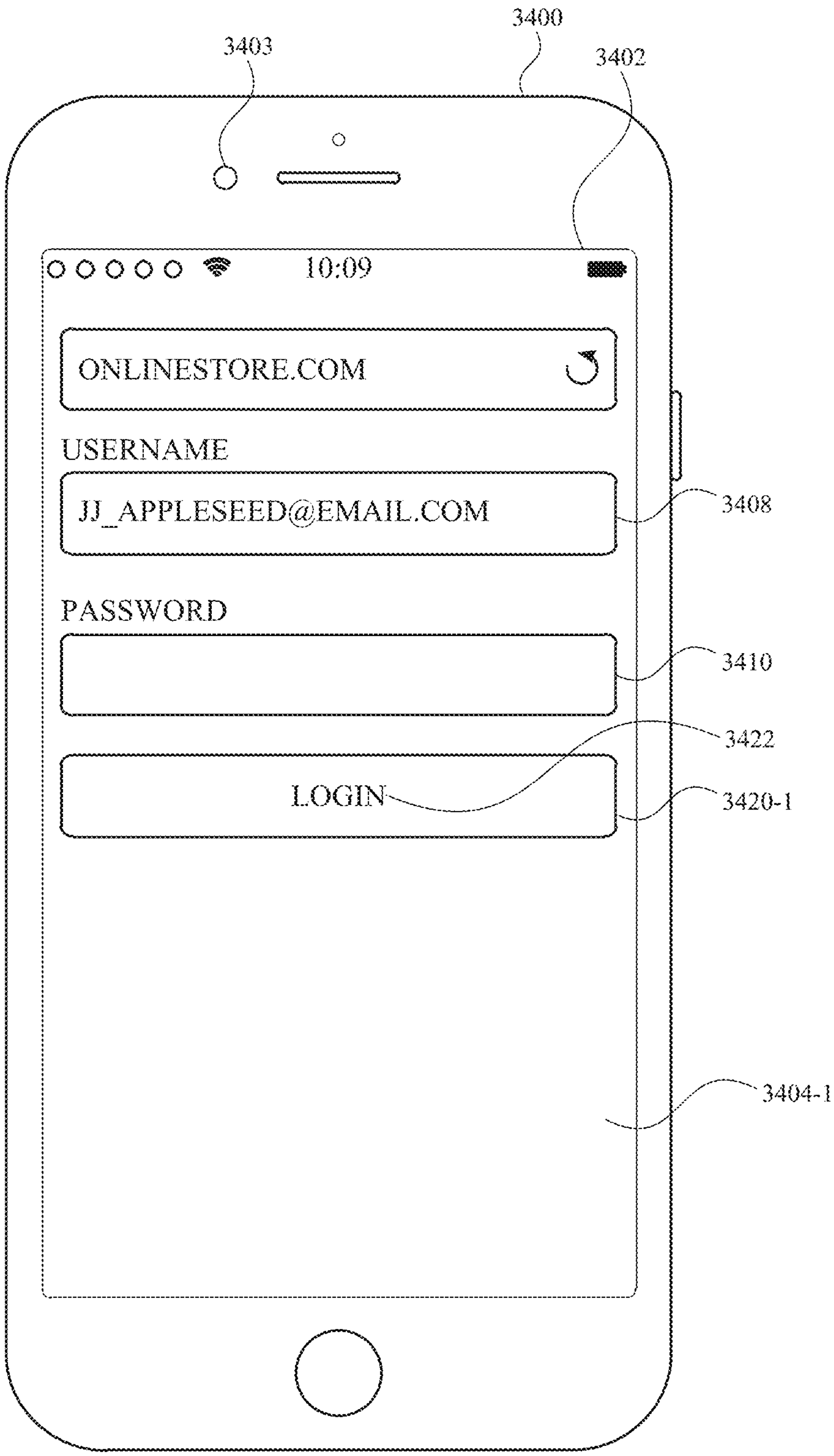

FIG. 34F illustrates log-in user interface 3404-1, which is displayed when biometric authentication is not available using fingerprint sensor 3414 (e.g., when such authentication is disabled via a user-selectable setting or when a maximum number of attempts has been exceeded). In response to detecting a request to display a log-in user interface, a determination is made that biometric authentication using fingerprint sensor 3414 is not available. Upon this determination, electronic device 3400 displays log-in user interface 3404-1 without prompt 3406. Electronic device 3400 displays submit affordance 3420-1 in its original, unmodified state, where text 3422 ("LOGIN") is displayed in submit affordance 3420-1.

Figure 34G:
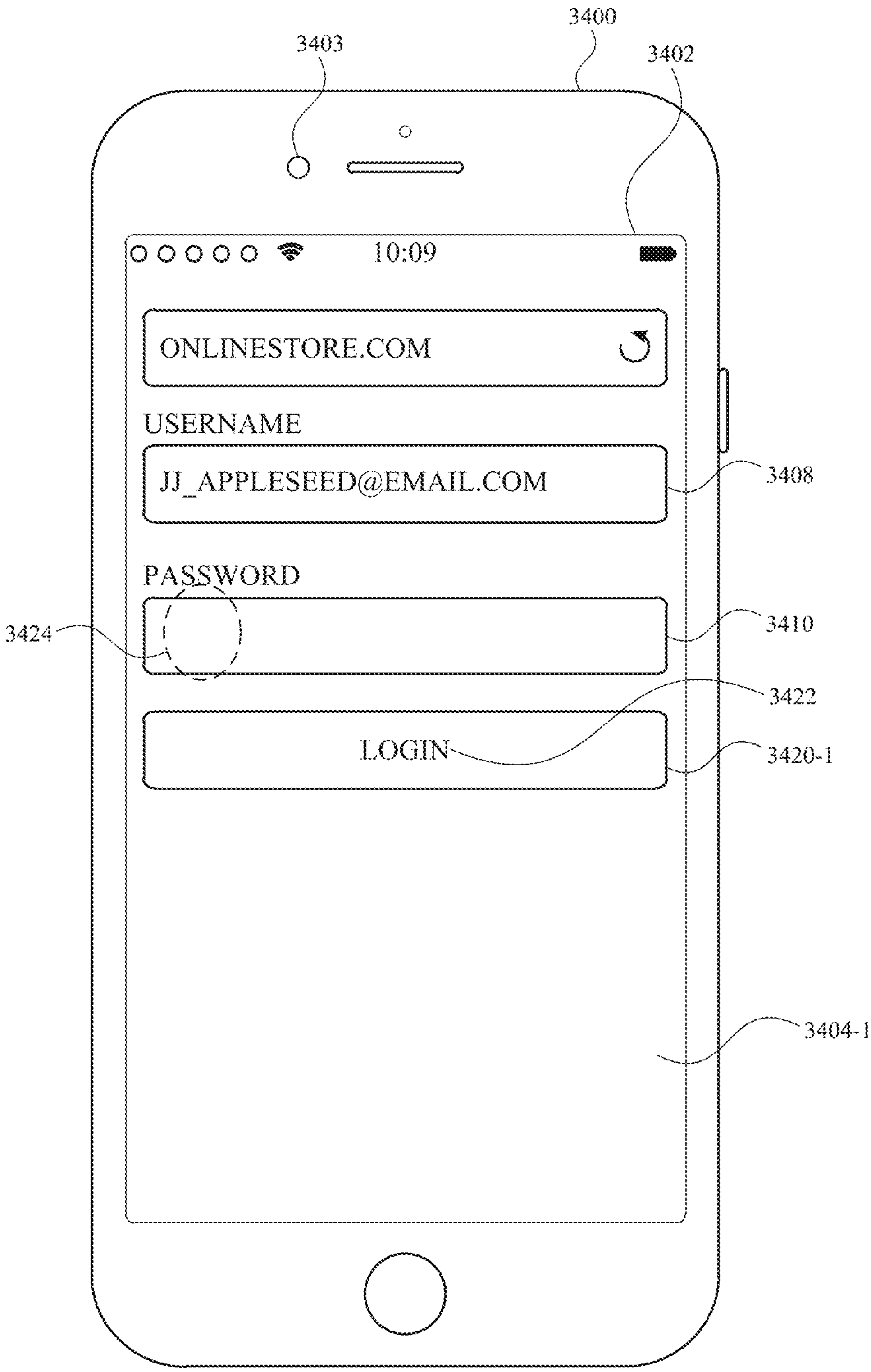
Figure 34H:
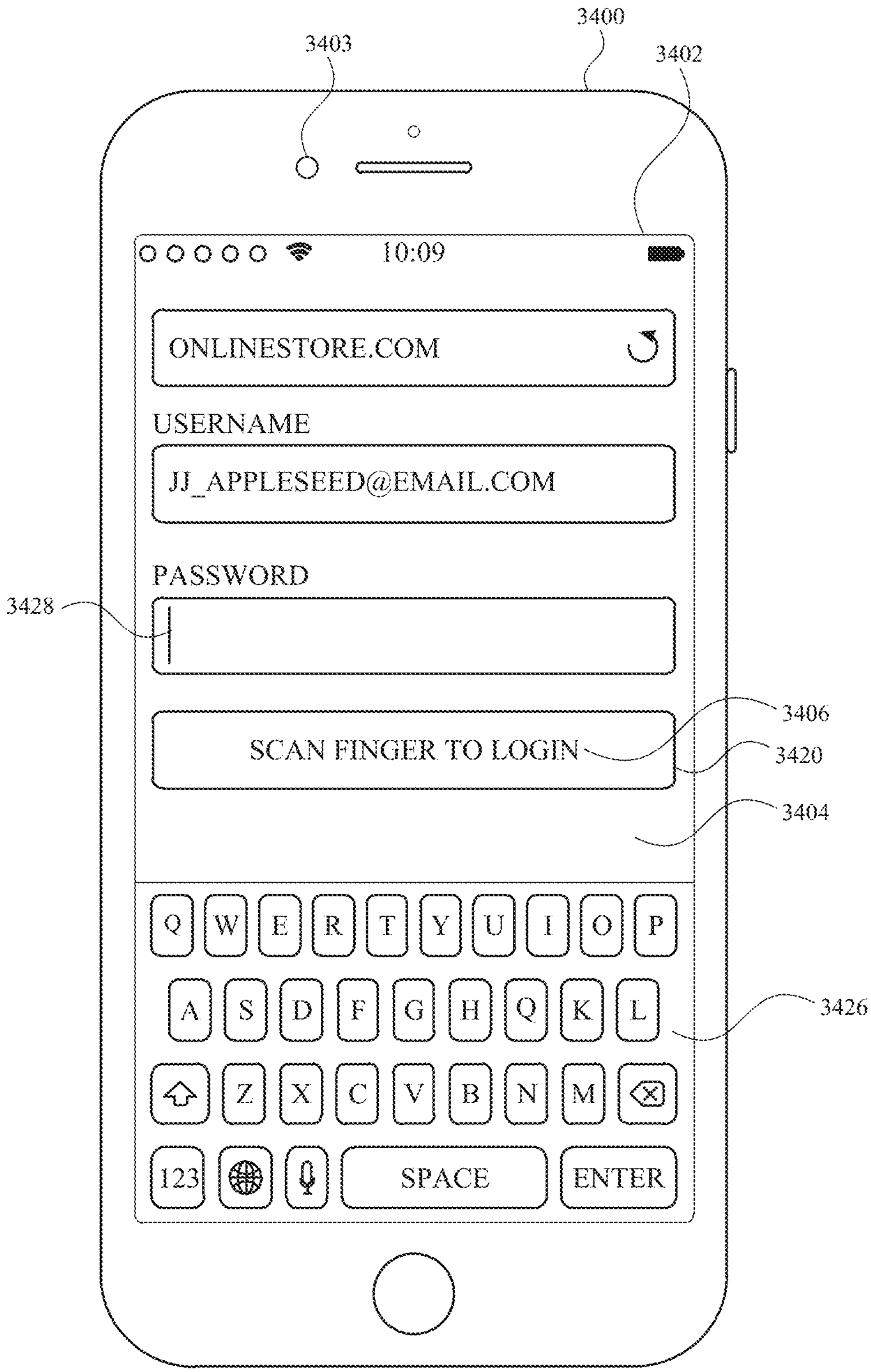

In some examples, electronic device 3400 does not immediately display prompt 3406 in response to a request to load a log-in user interface. Instead, electronic device 3400 displays prompt 3406 after receiving selection of a fillable field in order to enter text. In FIG. 34G, electronic device 3400 initially displays log-in user interface 3404-1 without prompt 3406. Electronic device 3400 detects tap gesture 3424 on password field 3410. In response to detecting tap gesture 3424, electronic device 3400 displays virtual keyboard 3426 (e.g., a keyboard for inputting one or more characters) and cursor 3428 in password field 3410, as shown in FIG. 34H. Further in response to tap gesture 3424, electronic device 3400 displays log-in user interface 3404 with prompt 3406 located in submit affordance 3420.

Figure 34I:
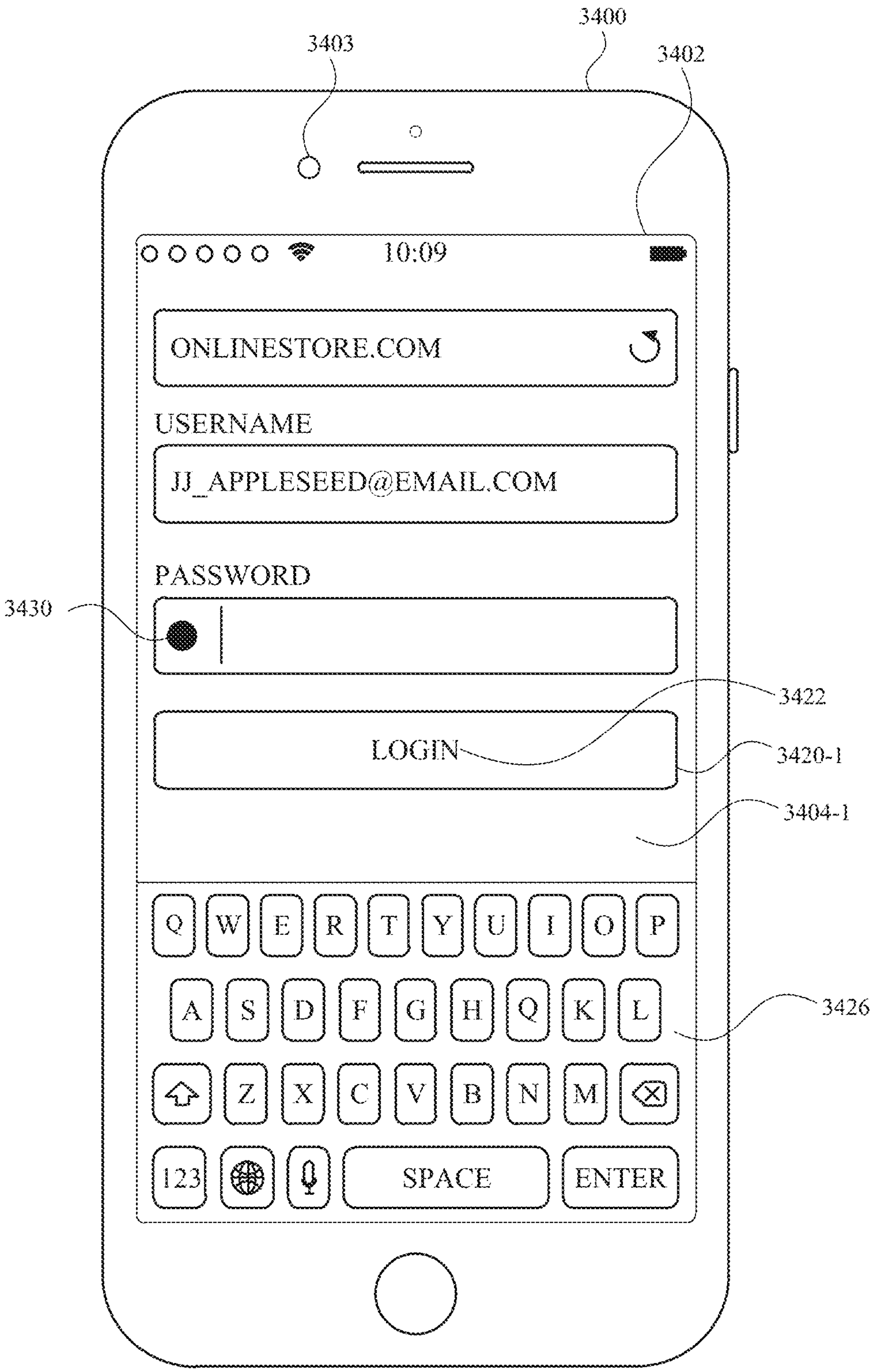

In FIG. 34I, electronic device 3400 receives input via virtual keyboard 3426 corresponding to entry of one or more characters (e.g., character 3430). In response to receiving input of character 3430, electronic device 3400 again displays log-in user interface 3404-1 without prompt 3406. Electronic device 3400 displays submit affordance 3420-1 in its original, unmodified state, where text 3422 is displayed in submit affordance 3420-1.

Figure 34J:
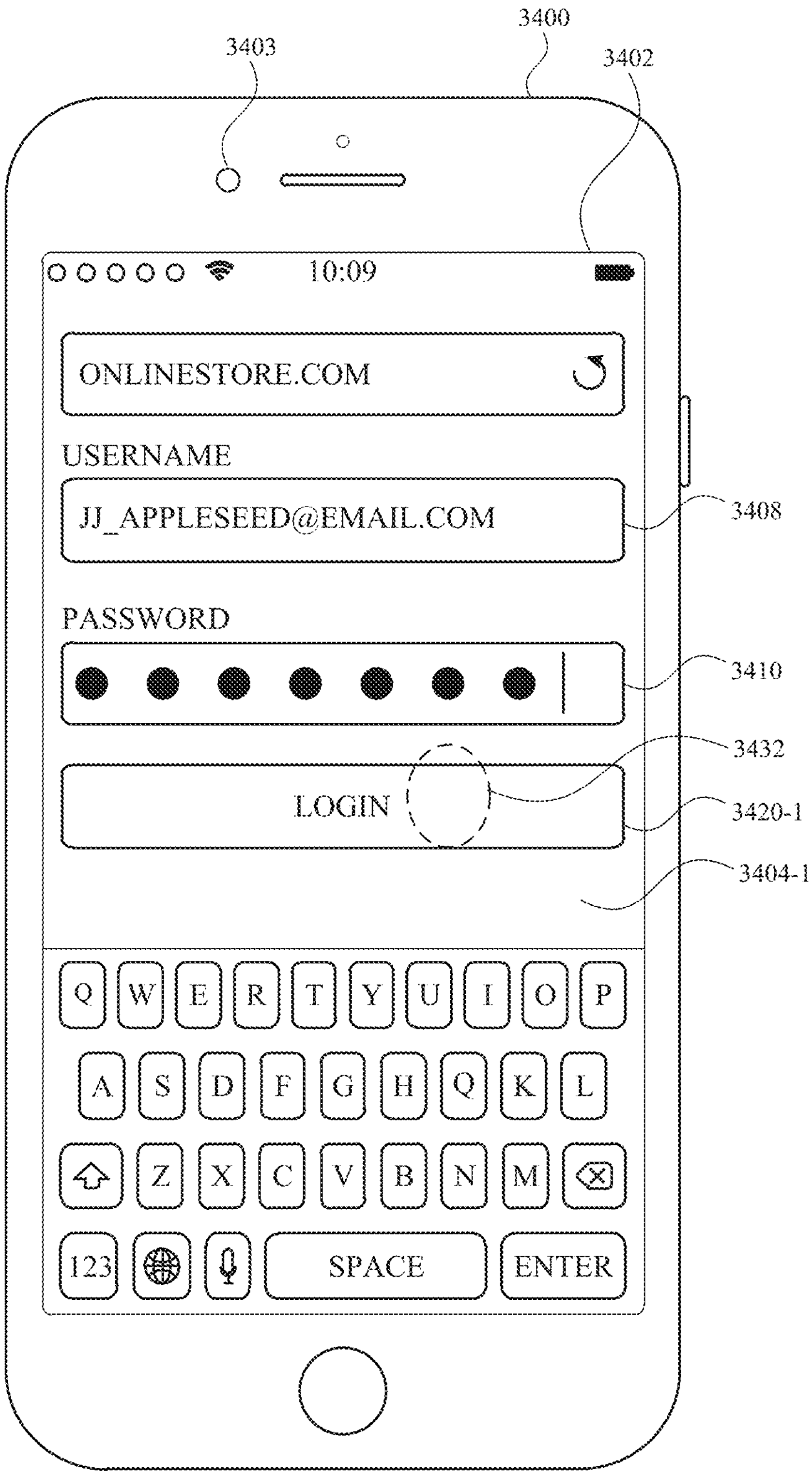
Figure 34K:

In FIG. 34J, after receiving the input via virtual keyboard 3426, electronic device 3400 detects tap gesture 3432 on submit affordance 3420-1. In response to detecting tap gesture 3432, electronic device 3400 submits the one or more characters in username field 3408 and password field 3410 for user authentication. Upon successful user authentication, electronic device 3400 provides access to restricted content (e.g., content that can only be seen once a user has logged in) in account user interface 3416 of FIG. 34K.

In some examples, successful user authentication via fingerprint authentication (as described with respect to FIGS. 34A-34D) results in a certain outcome (e.g., access to a restricted application, webpage, or account). In some examples, successful user authentication by typing and submitting credential information (as described with respect to FIGS. 34F-34K) results in the same outcome (e.g., access to a restricted application, webpage, or account).

Figure 34L:
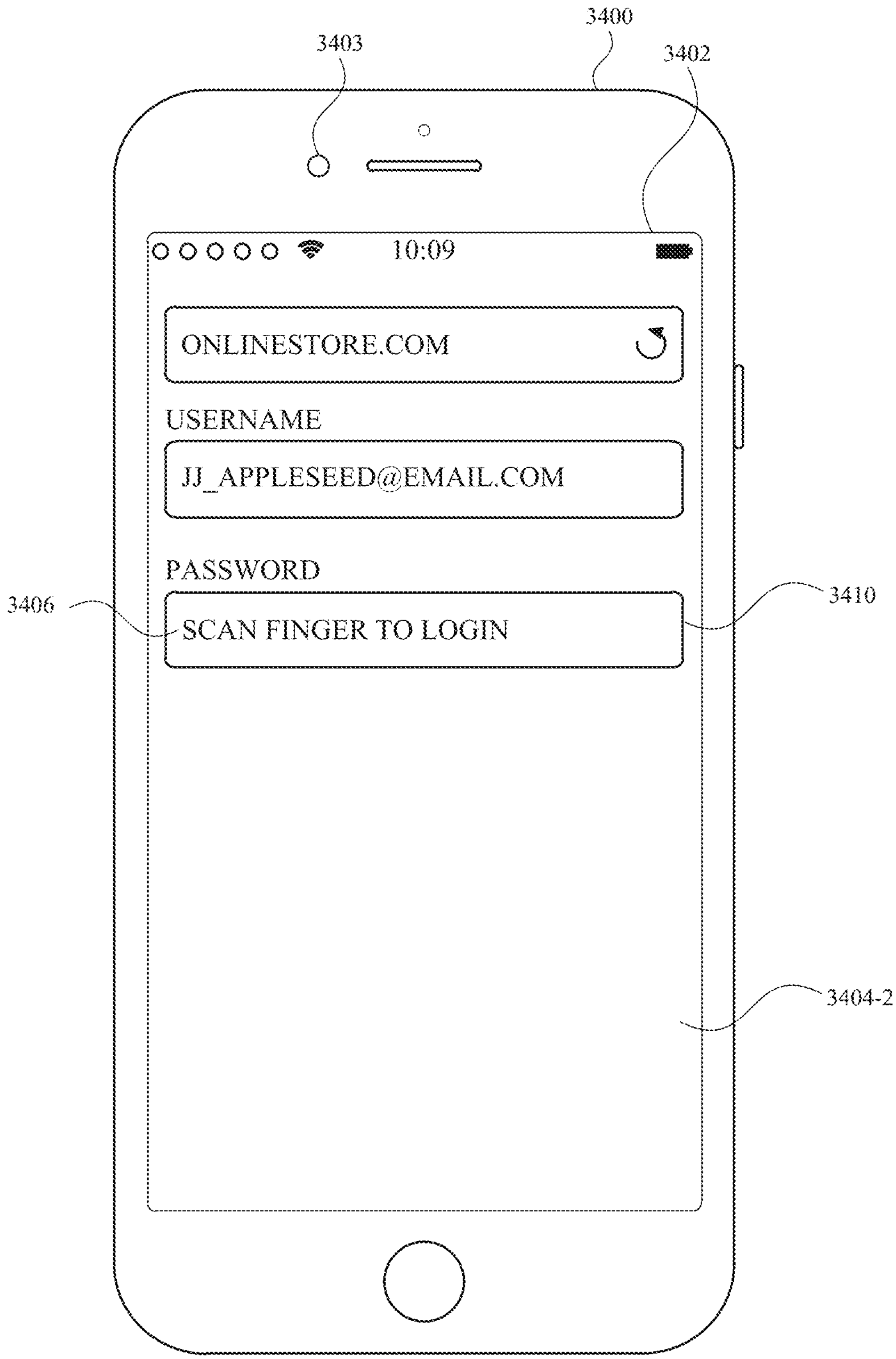

FIG. 34L illustrates that prompt 3406 can be displayed in other locations on a log-in user interface and that some elements discussed with respect to interfaces 3404 and 3404-1 can be omitted. In FIG. 34L, in response to detecting a request to display a log-in user interface and if biometric authentication is available, electronic device 3400 displays log-in user interface 3404-2 where prompt 3406 is displayed in password field 3410 and a submit affordance (e.g., 3420, 3420-1) is not displayed.

Figure 34M:
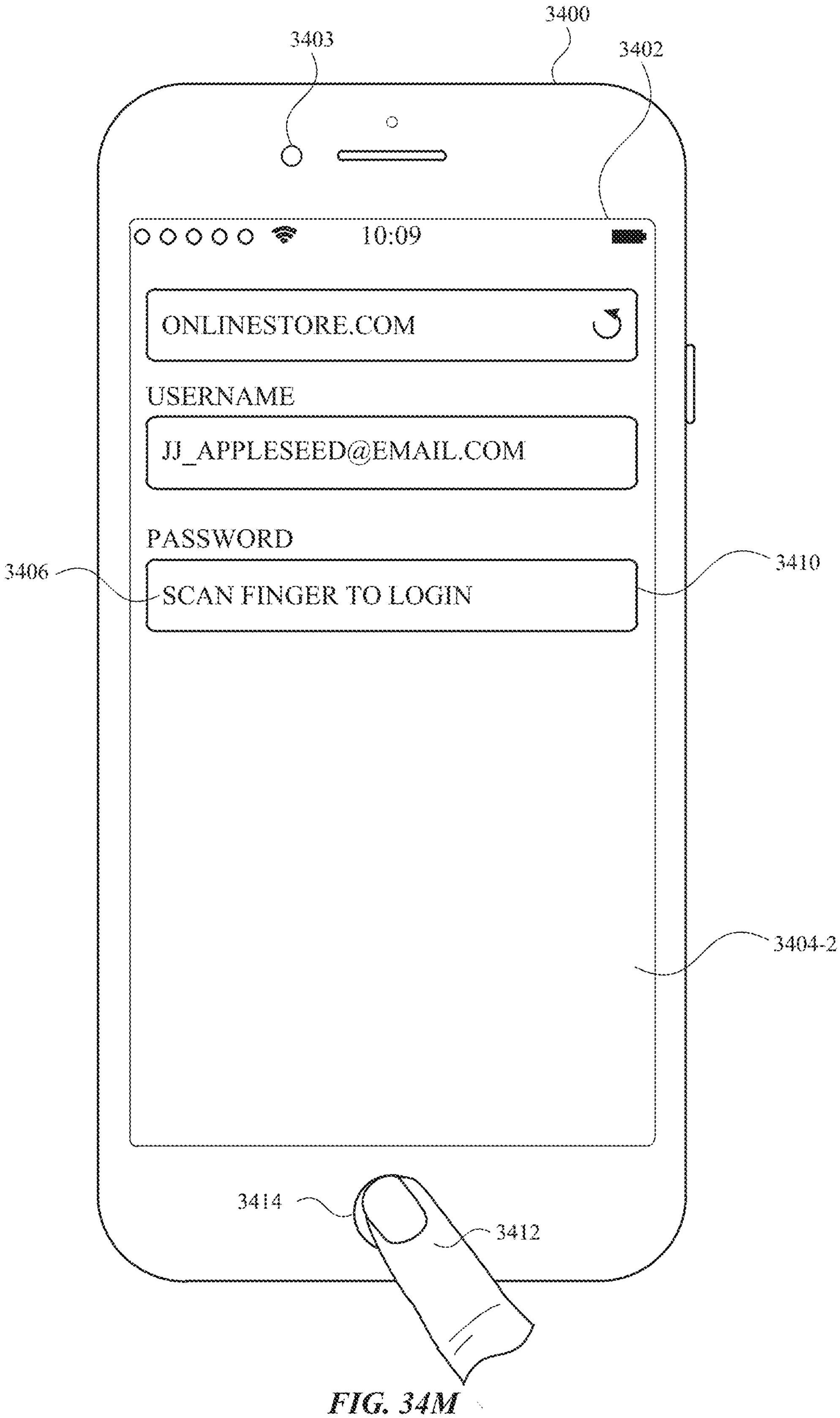

In FIG. 34M, while displaying log-in user interface 3404-2, electronic device 3400 detects finger 3412 using fingerprint sensor 3414. In response to detecting finger 3412, a determination is made that the finger meets certain biometric authentication criteria (e.g., fingerprint is consistent with a registered fingerprint). Upon successful authentication, electronic device 3400 automatically submits credential information for user authentication. Upon successful user authentication, electronic device 3400 provides access to restricted content (e.g., content that can only be seen once a user has logged in).

Alternatively, if a determination is made that the finger does not meet certain biometric authentication criteria (e.g., fingerprint is not consistent with a registered fingerprint), electronic device 3400 forgoes submitting the credential information. Additionally, upon failed biometric authentication, electronic device 3400 displays log-in user interface 3404-1 including the previously hidden submit affordance (e.g., 3420, 3420-1) (shown in FIG. 34N). Further, upon failed biometric authentication, electronic device 3400 prompts a user for manual entry by displaying cursor 28 in a fillable field such as password field 3410.

FIG. 35 is a flow diagram illustrating a method for indicating the availability of biometric authentication using an electronic device in accordance with some examples. Method 3500 is performed at a device (e.g., 100, 300, 500, 1700, 3400) with a display (e.g., 3402) and one or more biometric sensors (e.g., 3403, 3414) (e.g., a fingerprint sensor, a contactless biometric sensor (e.g., a biometric sensor that does not require physical contact, such as a thermal or optical facial recognition sensor), an iris scanner). In some examples, the one or more biometric sensors (e.g., 3403) include one or more cameras. In some examples, the display (e.g., 3402) is a touch-sensitive display. In some examples, the display (e.g., 3402) is not a touch sensitive display.

Some operations in method 3500 are, optionally, combined, the orders of some operations are, optionally, changed, and some operations are, optionally, omitted. As described below, method 3500 provides an intuitive way for indicating the availability of biometric authentication. The method reduces the cognitive burden on a user for determining the availability of biometric authentication, thereby creating a more efficient human-machine interface. For battery-operated computing devices, enabling a user to identify the availability of biometric authentication faster and more efficiently conserves power and increases the time between battery charges.

The electronic device (e.g., 100, 300, 500, 1700, 3400) detects (3502) a predefined operation (e.g., a request to load and/or display the user interface, a selection of a particular element of the user interface) corresponding to a credential submission (e.g., log-in) user interface (e.g., 3404) having a credential submission (e.g., log-in) user interface element (e.g., 3408, 3410) (e.g., fillable field such as a username or password).

In response (3504) to detecting the predefined operation, the electronic device (e.g., 100, 300, 500, 1700, 3400) proceeds to blocks 3506-3516.

In response (3504) to detecting the predefined operation and in accordance with (3506) a determination that biometric authentication (e.g., Touch ID, Face ID) via the one or more biometric sensors (e.g., 3403, 3414) is available, the electronic device (e.g., 100, 300, 500, 1700, 3400) displays (3508), on the display (e.g., 3402), the credential submission (e.g., log-in) user interface (e.g., 3404) with a visual indication (e.g., 3406) that presentation of a biometric feature (e.g., 3412) that meets biometric authentication criteria to the one or more biometric sensors (e.g., 3403, 3414) will cause credentials to be submitted via the credential submission user interface element (e.g., 3408, 3410).

In some examples, the credential submission user interface is generated based on an electronic document (e.g., an HTML document) and the credential submission user interface element is an input element (e.g., log-in button) for submitting the credentials. In some examples, if biometric authentication is available, the electronic device (e.g., 100, 300, 500, 1700, 3400), rather than rendering and displaying the credential-entry element in a first state (e.g., a default state, a state that is displayed when biometric authentication is not available), displays a biometric authentication element (e.g., instructions for providing the required biometric authentication input (e.g., a fingerprint) in place of the credential submission user interface element.) Displaying a prompt to a user indicating that placing their finger on a sensor results in automatically logging in provides the user with feedback about the current state of the device (e.g., biometric authentication is available) and provides feedback to the user indicating an efficient option for logging in. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, in response (3504) to detecting the predefined operation and in accordance with (3506) the determination that biometric authentication via the one or more biometric sensors (e.g., 3403, 3414) is available, the electronic device (e.g., 100, 300, 500, 1700, 3400) forgoes (3516) displaying, on the display (e.g., 3402), the credential submission affordance (e.g., 3420) (e.g., do not display the log-in button). Omitting the display of a log-in button encourages the user to pursue an efficient method of logging in, thereby providing improved feedback. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, in response (3504) to detecting the predefined operation and in accordance with (3510) a determination that biometric authentication via the one or more biometric sensors (e.g., 3403, 3414) is not available, the electronic device (e.g., 100, 300, 500, 1700, 3400) displays (3512), on the display (e.g., 3402), the credential submission (e.g., log-in) user interface (e.g., 3404-1) without displaying the visual indication (e.g., 3406). Forgoing the display of the prompt to log-in via biometric authentication provides the user with feedback about the current state of the device, for it indicates to the user that log-in via biometric authentication is not available. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, further in response (3504) to detecting the predefined operation and in accordance with (3510) the determination that biometric authentication via the one or more biometric sensors (e.g., 3403, 3414) is not available, the electronic device (e.g., 100, 300, 500, 1700, 3400) displays (3514), on the display (e.g., 3402), a credential submission affordance (e.g., 3420) (e.g., a touch activated log-in button that is associated with one or more fillable fields). Receiving an input (e.g., 3432) corresponding to selection of the credential submission affordance (e.g., 3420) causes credentials to be submitted via the credential submission user interface element (e.g., 3408, 3410) (e.g., causes credentials to be submitted without use of biometric authentication).

In accordance with some examples, while displaying the credential submission user interface (e.g., 3404), the electronic device (e.g., 100, 300, 500, 1700, 3400) detects, via the one or more biometric sensors (e.g., 3403, 3414), a biometric feature (e.g., 3412) of a respective type. In response to detecting the biometric feature (e.g., 3412) of the respective type, and in accordance with a determination that the biometric feature (e.g., 3412) meets the biometric authentication criteria, the electronic device (e.g., 100, 300, 500, 1700, 3400) submits credentials via the credential submission user interface element (e.g., 3408, 3410) (e.g., successful authentication results in submitting credentials). In response to detecting the biometric feature (e.g., 3412) of the respective type, and in accordance with a determination that the biometric feature (e.g., 3412) does not satisfy biometric authentication criteria, the electronic device (e.g., 100, 300, 500, 1700, 3400) forgoes submitting credentials via the credential submission user interface element (e.g., 3408, 3410). Forgoing the submission of credentials based on not meeting biometric authentication criteria provides security and can prevent unauthorized users from initiating sensitive operations. Providing improved security enhances the operability of the device and makes the user-device interface more efficient (e.g., by restricting unauthorized access) which, additionally, reduces power usage and improves battery life of the device by limiting the performance of restricted operations.

In accordance with some examples, the credential submission user interface element (e.g., 3408, 3410) includes one or more fillable fields.

In accordance with some examples, displaying the credential submission user interface (e.g., 3404, 3404-1, 3404-2) includes displaying the credential submission user interface element prefilled with the credentials (e.g., default username is prefilled) to be submitted via the credential submission user interface element (e.g., 3408, 3410). Prefilling a default username provides the user with a capability to log-in using fewer inputs. Performing an operation with a reduced number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, the electronic device (e.g., 100, 300, 500, 1700, 3400) receives selection of a fillable field (e.g., 3408, 3410) of the one or more fillable fields. In response to receiving the selection of the fillable field, the electronic device (e.g., 100, 300, 500, 1700, 3400) displays, on the display (e.g., 3402), a character input interface (e.g., 3426) (e.g., a keypad or keyboard that includes character entry keys for entering a password or passcode).

In accordance with some examples, the electronic device (e.g., 100, 300, 500, 1700, 3400) receives input (e.g., 3430) corresponding to entry of one or more characters via the character input interface (e.g., 3426) (e.g., via character entry keys) in the fillable field. In some examples, the character input interface includes character entry keys. Subsequent to receiving the input, the electronic device (e.g., 100, 300, 500, 1700, 3400) receives selection of a second credential submission affordance (e.g., 3420) (e.g., log-in button). In response to receiving the selection of the second credential submission affordance, the electronic device (e.g., 100, 300, 500, 1700, 3400) submits the one or more characters in the fillable field (e.g., 3408, 3410) for credential verification.

In accordance with some examples, the visual indication (e.g., 3406) that presentation of a biometric feature (e.g., 3412) that meets biometric authentication criteria to the one or more biometric sensors (e.g., 3403, 3414) will cause credentials to be submitted via the credential submission user interface element (e.g., 3408, 3410) is displayed in a fillable field (e.g., 3410) of the one or more fillable fields (e.g., username field, password field). Displaying a prompt to a user indicating that placing their finger on a sensor results in automatically logging in provides the user with feedback about the current state of the device (e.g., biometric authentication is available) and provides feedback to the user indicating an efficient option for logging in. Displaying the prompt in the password field can provide feedback as to the operation (e.g., autofilling the password field) that will be performed upon successful authentication. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some examples, the predefined operation is a request to display the credential submission interface (e.g., 3404, 3404-1, 3404-2) on the display (e.g., 3402) (e.g., load the credential submission user interface, scroll the credential submission user interface into view, zoom into the credential submission user interface, reveal the credential submission user interface from a hidden user interface element). In some examples, the predefined operation that is a request to display the credential submission interface is also a request to display a first portion of respective content, as described with respect to method 3300 (e.g., method 3300 at 3302).

In accordance with some examples, the predefined operation is detected while displaying the credential submission interface (e.g., 3404, 3404-1) and the predefined operation includes an input (e.g., 3424) directed to a portion of the credential submission user interface (e.g., a user input (e.g., tap) on the credential submission user interface or user input on a fillable field such a username or password field).

In accordance with some examples, in accordance with submission of the one or more characters in the fillable field (e.g., 3408, 3410) for credential verification and in response to receiving the selection of the second credential submission affordance (e.g., 3420), the electronic device (e.g., 100, 300, 500, 1700, 3400) provides a first result. In accordance with submission of credentials via the credential submission user interface element (e.g., 3408, 3410) and in response to a determination that a biometric feature (e.g., 3412) detected via the one or more biometric sensors (e.g., 3403, 3414) meets the biometric authentication criteria, the electronic device (e.g., 100, 300, 500, 1700, 3400) provides the first result. In some examples, submitting (e.g., successfully submitting) credentials (e.g., valid credentials) via a password or passcode entered via the credential submission user interface element results in the same outcome (e.g., access to a restricted application, webpage, or account) as successful authentication via biometric authentication).

Note that details of the processes described above with respect to method 3500 (e.g., FIG. 33) are also applicable in an analogous manner to the methods described below and above. For example, method 3500 optionally includes one or more of the characteristics of the various methods described above with reference to methods 800, 1000, 1200, 1400, 1600, 2000, 2200, 2500, 2700, 2900, 3100, and 3300. For example, the enrolled biometric data described in method 1200 can be used to perform biometric authentication as described with respect to method 3500. As a further example, the re-authentication criteria of method 3100 can be used in conjunction with method 3500 to control when biometric is available. For brevity, these details are not repeated below.

In some examples (e.g., in some examples of methods 1600, 1800, 2000, 2200, 2900, 3100, 3300, and 3500), the electronic device limits the permitted number of biometric authentication attempts (e.g., in order to provide improved security by preventing brute force attempts to bypass security and to conserve device resources) that can be made before biometric authentication is disabled (e.g., disabled until successful authentication, via alternative means, occurs). In some such examples, ceasing use of the biometric sensor (e.g., forgoing further biometric authentication retries) prior to exhaustion of the permitted/limited number of attempts avoids the user consuming the permitted number of attempts on repeated requests (e.g., repeated requests of the same type), thereby conserving at least one attempt for requests for other operations that require biometric authentication (e.g., requests for other, more critical operations). Conserving at least one attempt enhances the operability of the device and makes the user-device interface more efficient (e.g., by avoiding exhaustion of authentication attempts on repeated, similar requests) which, additionally, reduces power usage and improves battery life of the device by enabling the user to use the device more quickly and efficiently. In addition, conserving at least one biometric authentication attempt can reduce the instances in which a user must provide alternative, non-biometric authentication (e.g., such as password or passcode authentication), which, in turn, can promote the use of more secure (e.g., more complex) passwords/passcodes, as the user is not disincentivized from using more secure passwords/passcodes by the need to frequently use such passwords/passcodes when biometric authentication becomes disabled due to exhaustion of permitted attempts. Promoting the use of more secure passwords/passcodes enhances the operability of the device by reducing the risk of unauthorized access.

FIGS. 36A-36L illustrate exemplary user interfaces for retrying biometric authentication at a credential entry user interface, in accordance with some examples. The user interfaces in these figures are used to illustrate the processes described below, including the processes in FIGS. 37A-37B.

Figure 36A:
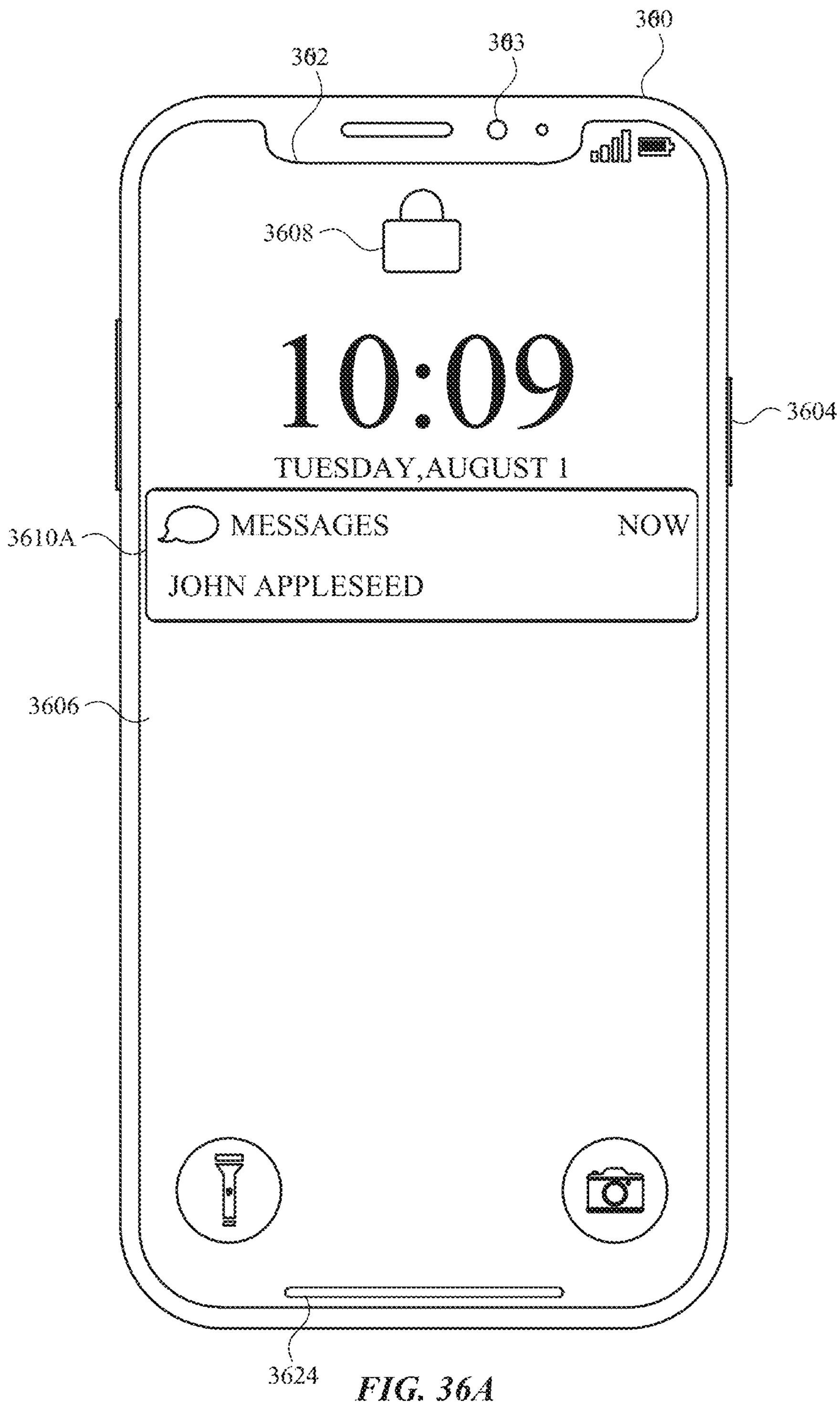
FIGS. 36A-36L illustrate exemplary user interfaces for retrying biometric authentication at a credential entry user interface, in accordance with some examples.

FIG. 36A illustrates electronic device 3600 (e.g., portable multifunction device 100, device 300, device 500). In the exemplary examples illustrated in FIGS. 36A-36L, electronic device 3600 is a smartphone. In other examples, electronic device 3600 can be a different type of electronic device, such as a wearable device (e.g., a smartwatch). Electronic device 3600 includes display 3602, one or more input devices (e.g., touchscreen of display 3002, button 3604, and a microphone), and a wireless communication radio. In some examples, the electronic device includes a plurality of cameras. In some examples, the electronic device includes only one camera. In FIG. 36A, the electronic device includes biometric sensor 3603. In some examples, the biometric sensor is one or more biometric sensors that can include a camera, such as an infrared camera, a thermographic camera, or a combination thereof. In some examples, biometric sensor 3603 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

At FIG. 36A, electronic device 3600 displays locked state user interface (UI) 3606 including lock icon 3608, which provides an indication to the user that electronic device 3600 is in a locked state. Because electronic device 3600 is in a locked state, the user is unable to view the restricted content of notification 3610A (e.g., the message from John Appleseed).

Figure 36B:
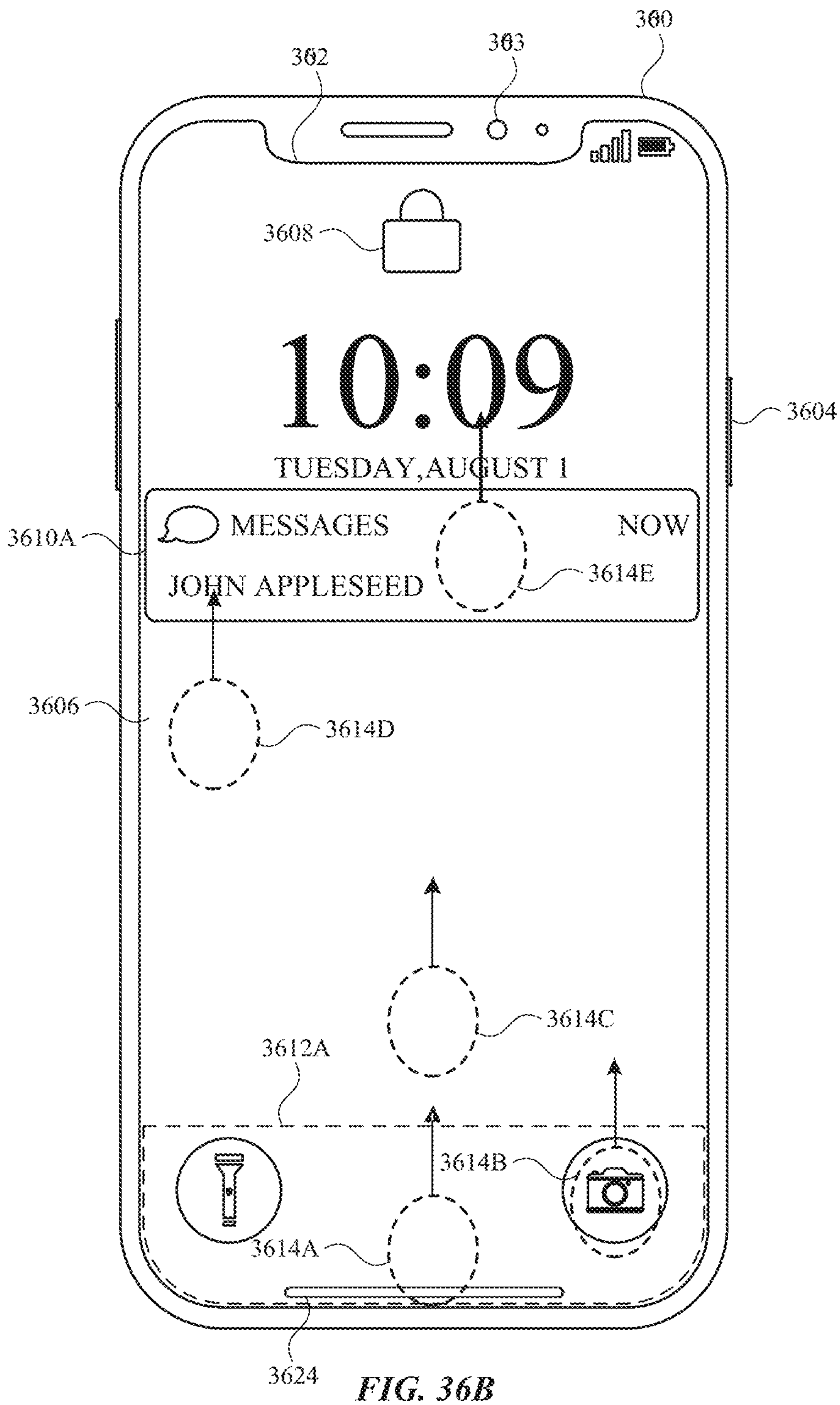
Figure 36C:
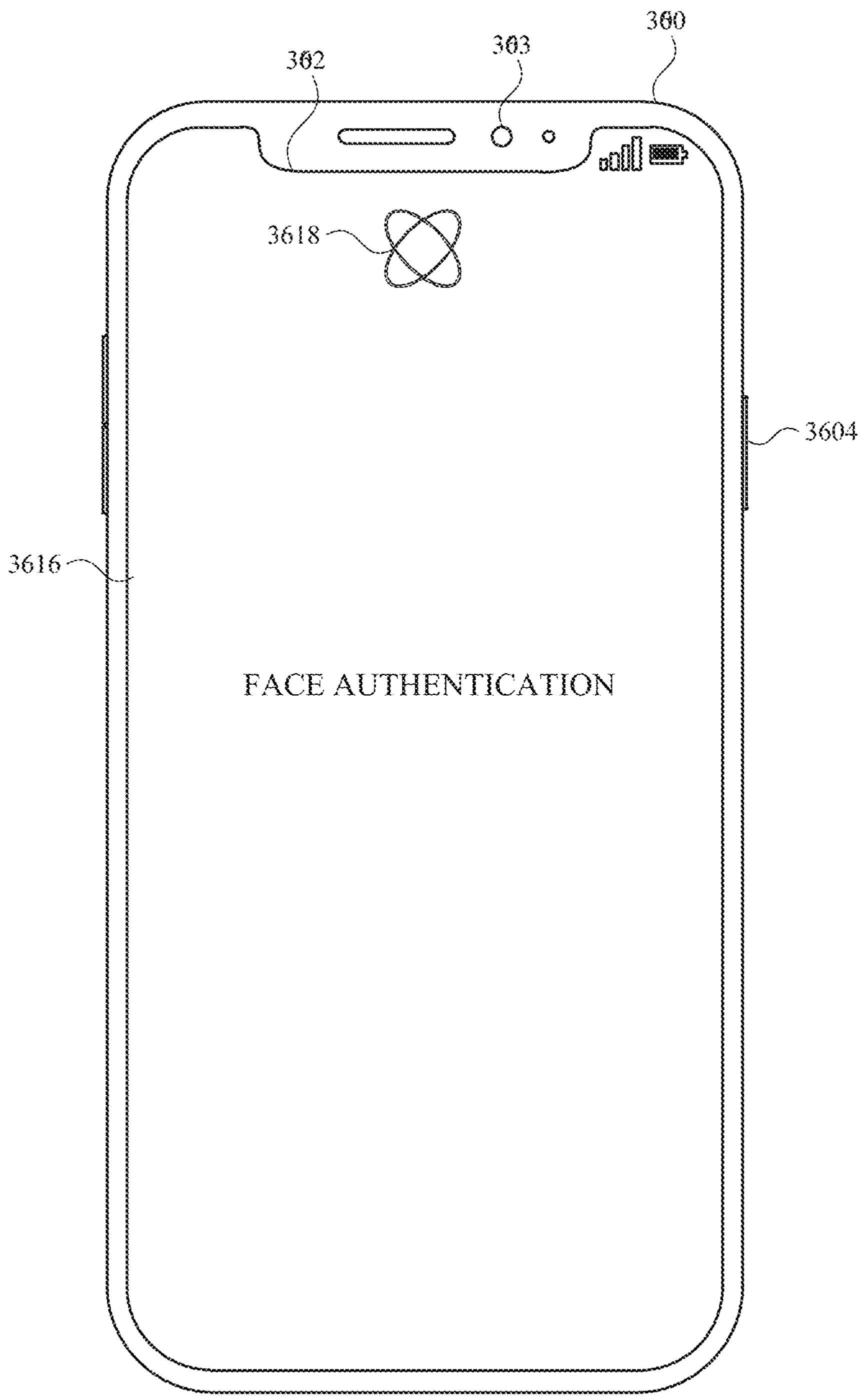
Figure 36D:
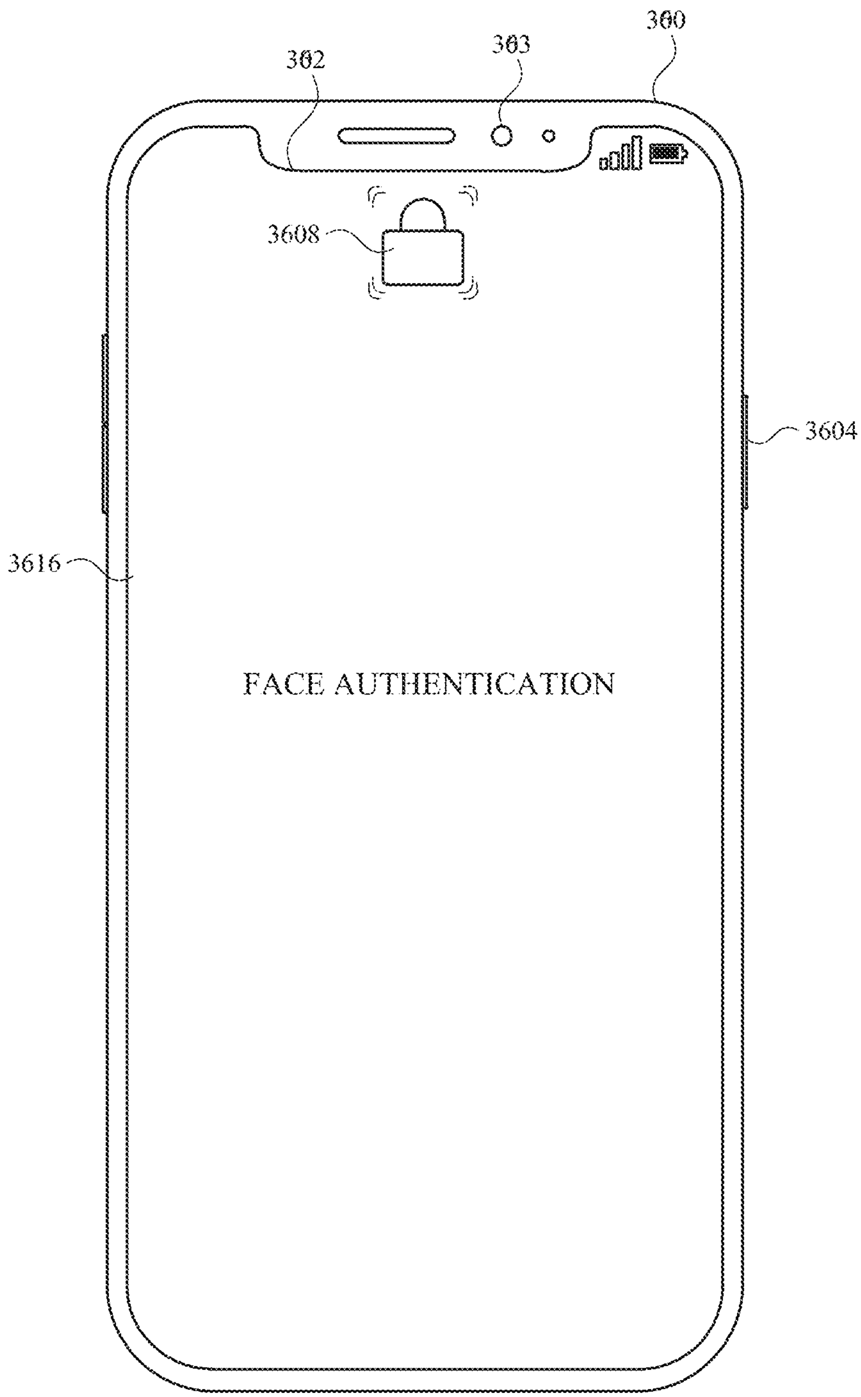
Figure 36E:
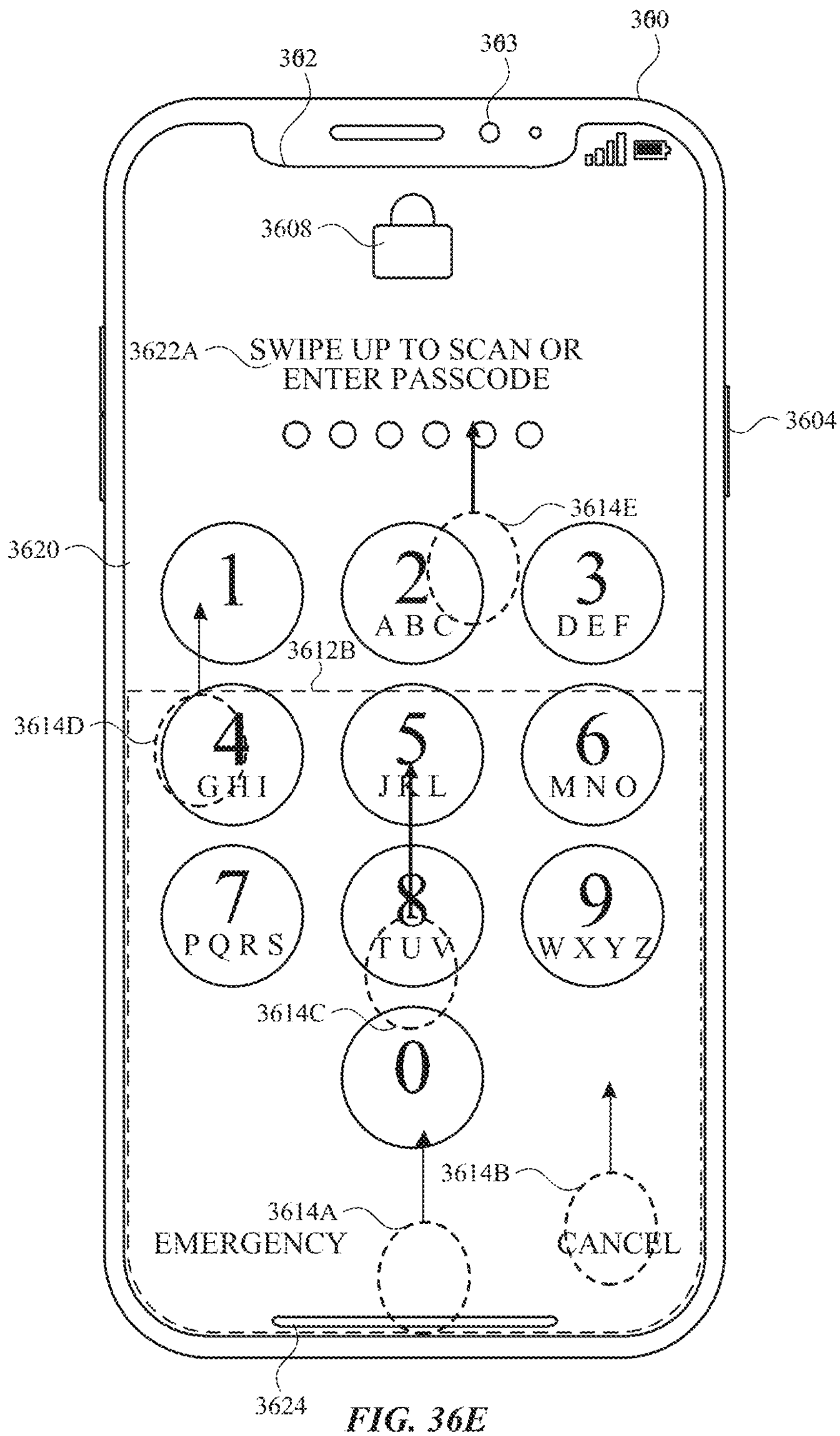
Figure 36F:
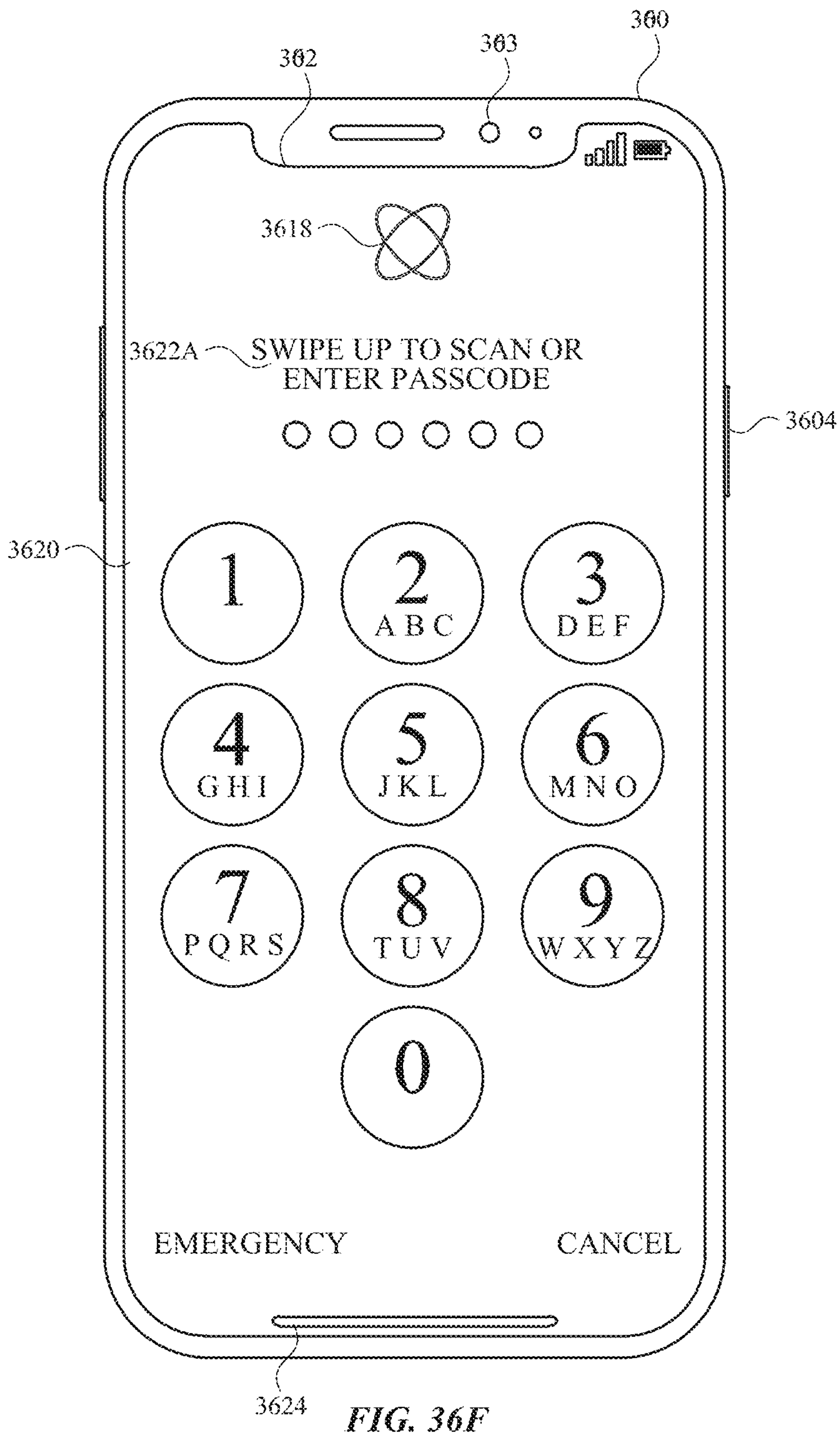
Figure 36G:
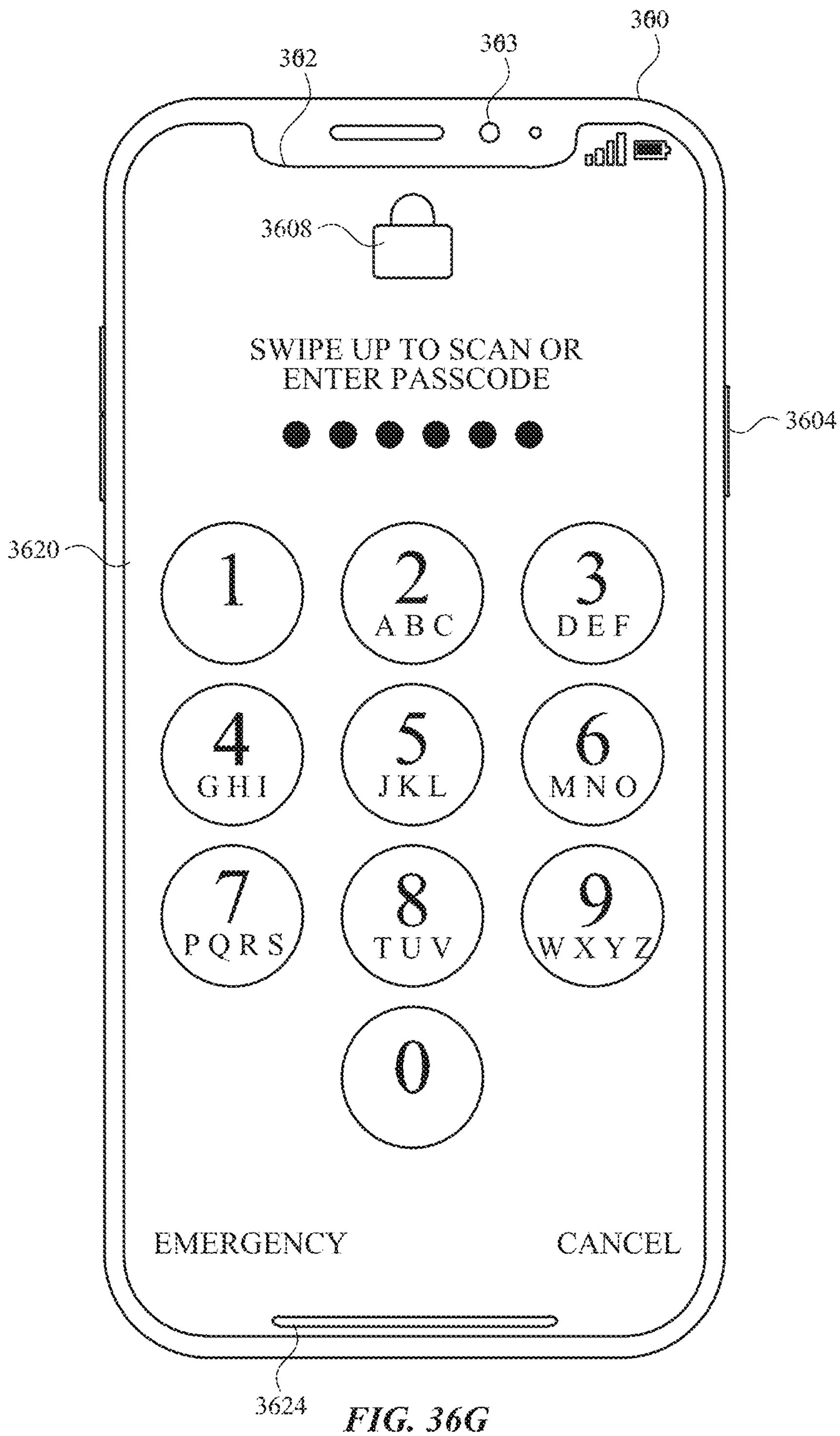
Figure 36H:
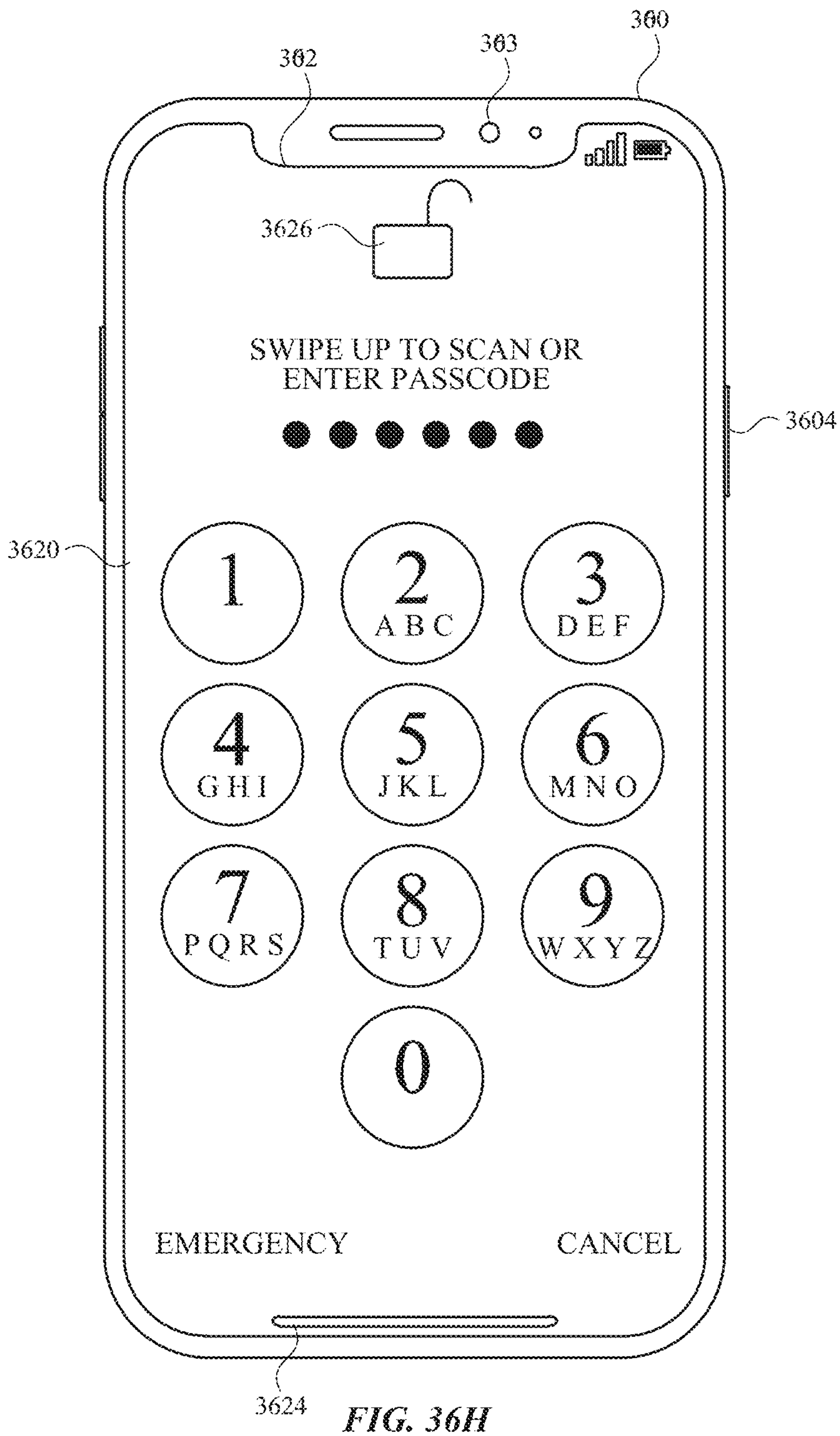
Figure 36I:
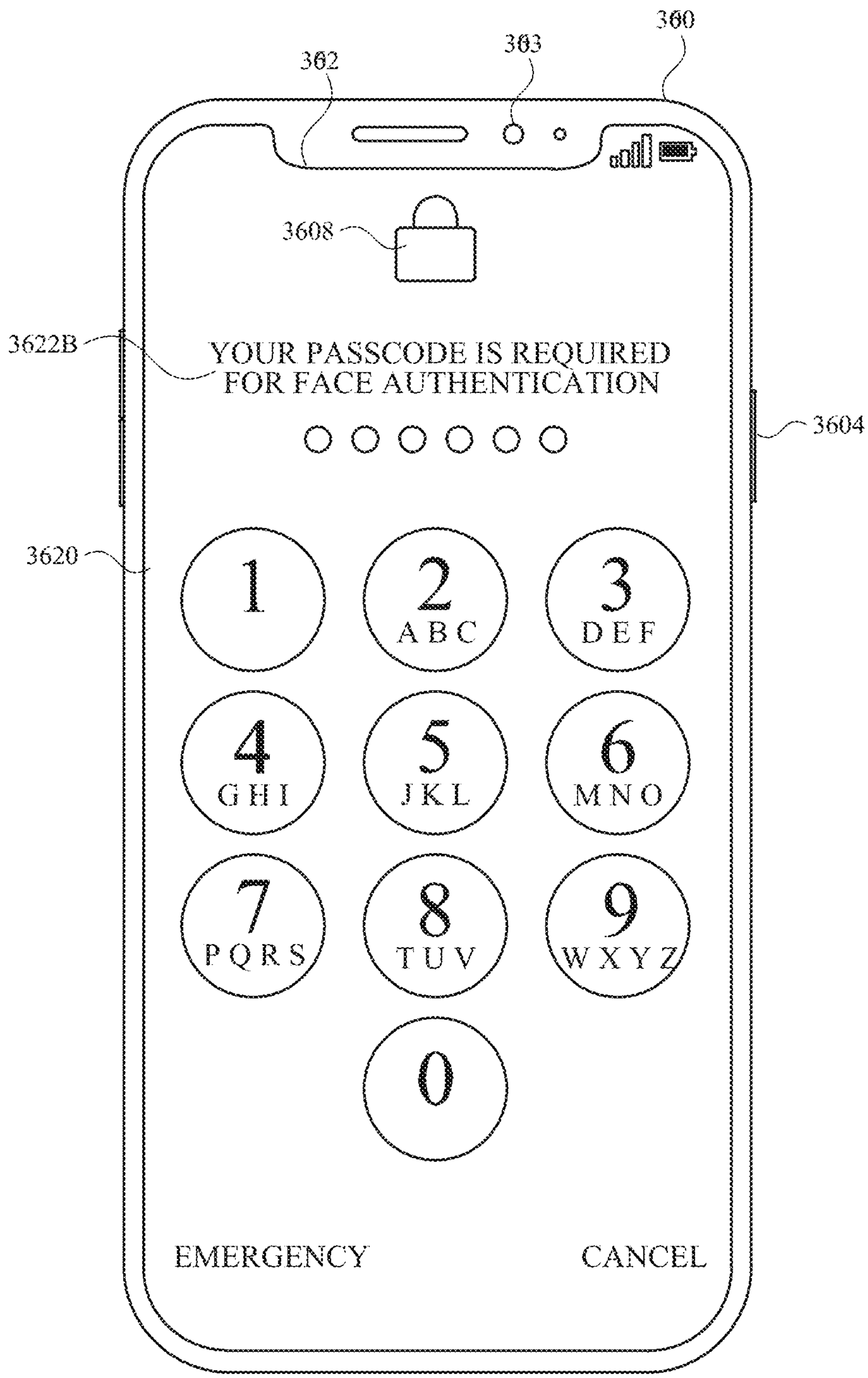
Figure 36J:
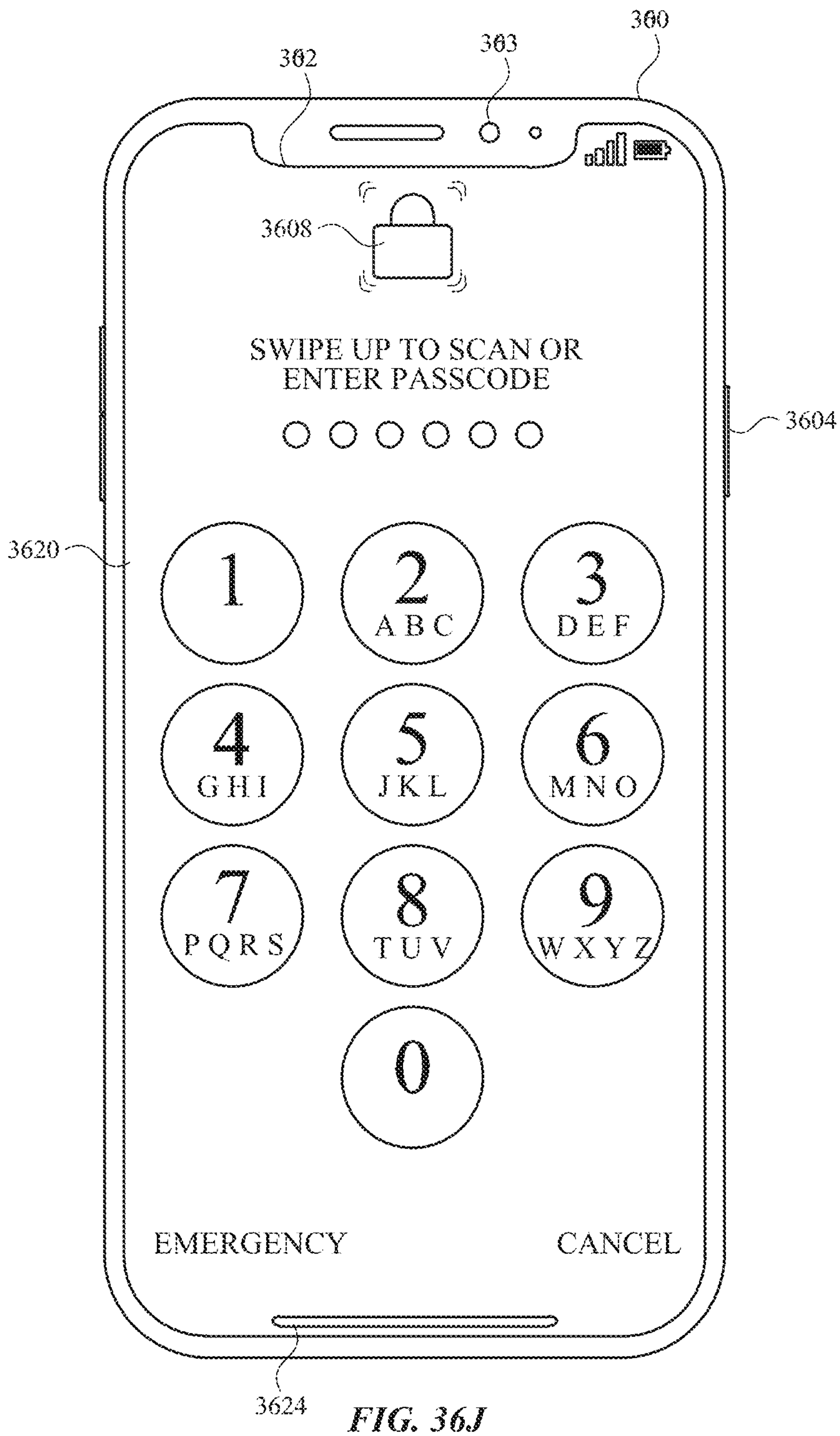
Figure 36K:
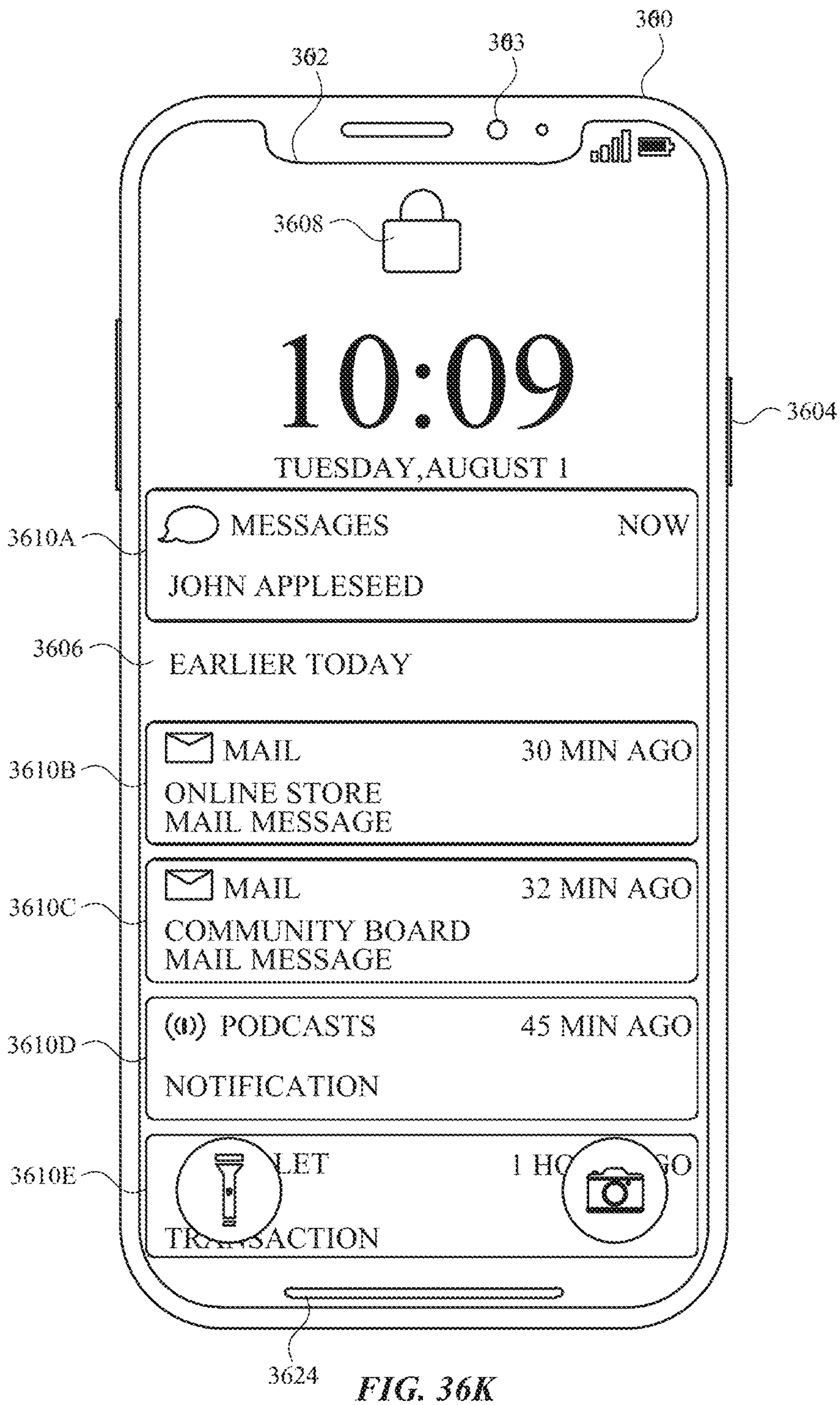
Figure 36L:
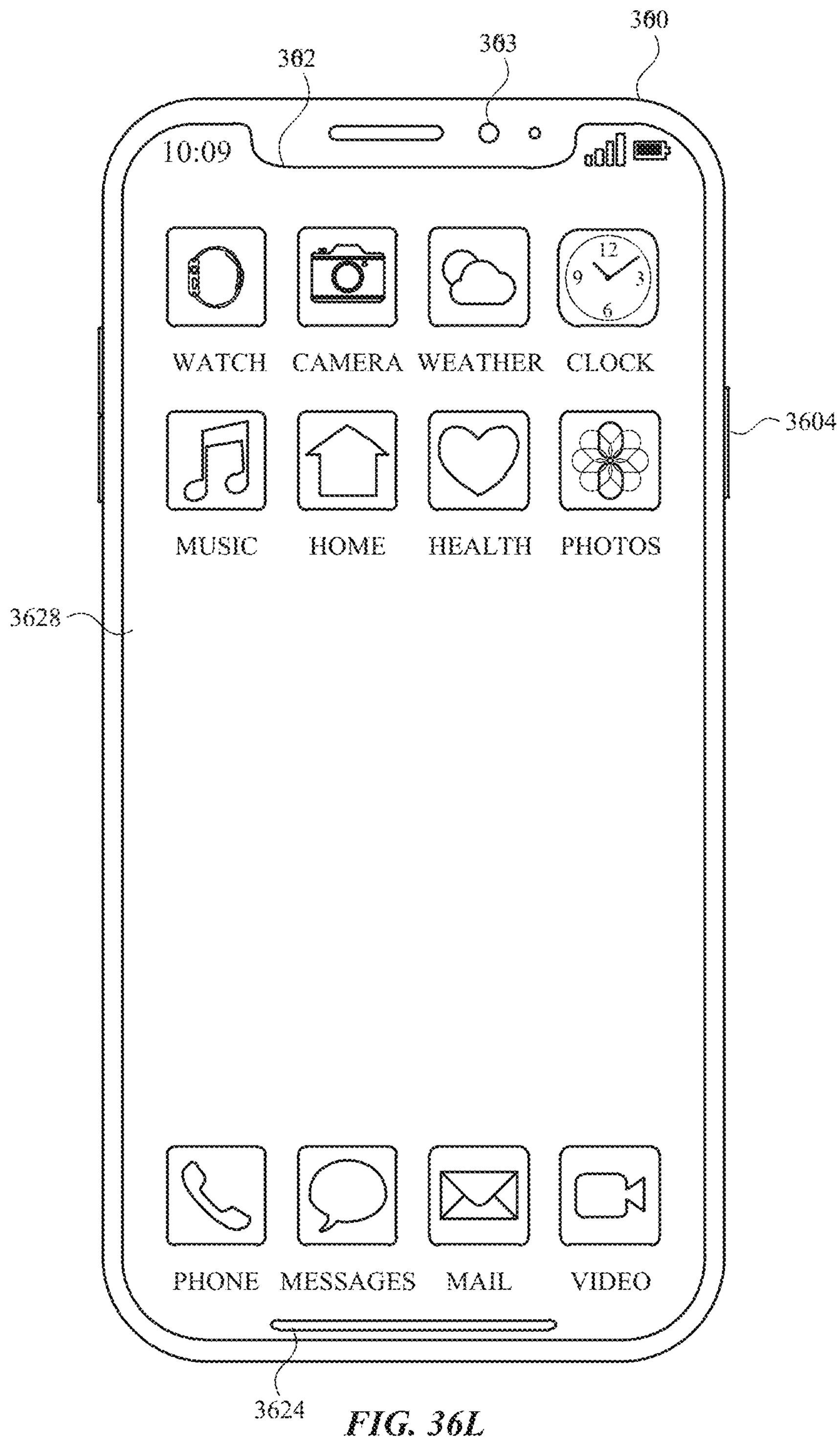

At FIG. 36B, the user wishes to unlock electronic device 3600 to access restricted content on the device (e.g., the message from John Appleseed, home screen 3628 of FIG. 36L, the most recently used application). Unlocking the device requires successful authentication of the user. To request unlocking of the device, the user performs an upward swipe starting from within region 3612A, which is a predefined region adjacent to the bottom edge of display 3602.

While displaying locked state UI 3606, electronic device 3600 receives input 3614A (e.g., an upward swipe). While displaying locked state UI 3606, electronic device 3600 requires that an upward swipe start from within region 3612A to trigger a request to unlock the device. In response to receiving input 3614A, electronic device 3600 determines whether input 3614A starts from within region 3612A.

Upon detecting input 3614A (e.g., an input that begins within region 3612A), electronic device 3600 initiates biometric authentication, and determines whether biometric authentication is currently enabled (or available for use) on the device. Biometric authentication can be unavailable for a variety of reasons including, for example, that biometric authentication has failed more than a predetermined number of times (e.g., 5, 10, 15) since the last successful authentication with the device.

In some examples, instead of receiving input 3614A, electronic device 3600 receives any one of inputs 3614B-E (e.g., swipe inputs that move a similar distance as input 3614A). Like input 3614A, each of inputs 3614B-E is an upward swipe. In some examples, because input 3614B also starts within region 3614A, electronic device 3600 treats input 3614A and 3614B the same (e.g., electronic device 3600 has the same response to both inputs). In contrast, in some examples, the response of electronic device 3600 to inputs 3614C-E is different from the response to inputs 3614A-B. Specifically, in some examples, in response to receiving any one of inputs 3614C-E, electronic device 3600 does not initiate biometric authentication, as described below with respect to FIG. 36C. Instead, electronic device 3600 displays one or more notifications (e.g., 3610A-E) (e.g., unread notifications) while maintaining the device in a locked state, as depicted in FIG. 36K (e.g., by scrolling a portion of the wake screen user interface (e.g., 3606) to display one or more notifications that were previously not visible on the display where the amount of scrolling is optionally determined based on a magnitude or velocity of movement of the contact).

At FIG. 36C, in response to input 3614 and upon determining that biometric authentication is currently enabled, electronic device 3600 attempts to biometrically authenticate the user (e.g., attempts to match information about a user's face obtained using biometric sensor 3603 with stored authorized credentials). While attempting to biometrically authenticate the user, electronic device 3600 displays (e.g., replaces display of locked state UI 3606 with) interstitial interface 3616 with authentication glyph 3618. Authentication glyph 3618, which includes a plurality of rings that rotate about an axis that is parallel to the display so that they appear to rotate out of a z axis of the display, provides an indication to the user that biometric authentication is being performed.

While attempting to biometrically authenticate the user, electronic device 3600 uses biometric sensor 3603 to determine whether certain biometric authentication criteria have been met. More specifically, electronic device 3600 captures and processes (e.g., analyzes) the biometric data from biometric sensor 3603 to determine, based on the biometric data, whether the biometric feature (or a portion thereof) satisfies biometric authentication criteria (e.g., determine whether the biometric data matches, within a threshold, a biometric template (e.g., stored authorized credentials)). After initiating biometric authentication, electronic device 3600 determines that biometric authentication has failed (e.g., the biometric data from biometric sensor 3603 does not match the stored authorized credentials).

At FIG. 36D, upon determining that biometric authentication has failed, electronic device 3600 displays an animation of lock icon 3608 alternating between different positions to simulate a "shake" effect. This "shake" animation provides an indication to the user that electronic device 3600 was unable to biometrically authenticate the user.

As depicted in FIG. 36E, further in response to determining that biometric authentication has failed, electronic device 3600 displays (e.g., replaces display of interstitial interface 3616 with) passcode entry UI 3620, which provides an alternative (e.g., non-biometric) method of authenticating the user at electronic device 3600. Passcode entry UI 3620 includes lock icon 3608 and a plurality of input keys for inputting (or entering) a password or passcode. Passcode entry UI 3620 also includes prompt 3622A, which prompts the user to either swipe up to retry biometric authentication or enter a passcode (or password) to authenticate the user (e.g., non-biometrically). Electronic device 3600 displays prompt 3622A upon determining that biometric authentication is currently enabled on the device. Additionally, upon determining that biometric authentication is currently enabled, electronic device 3600 displays unlock indication 3624, which provides an indication of an approximate location on display 3602 from which a user can start an upward swipe to retry biometric authentication.

At FIG. 36E, the user seeks to retry biometric authentication rather than input a password or passcode to authenticate. While displaying passcode entry UI 3620, electronic device 3600 receives input 3614C, which starts outside region 3612A of FIG. 36B.

Nevertheless, input 3614C triggers retrying biometric authentication because input 3614C starts from within region 3612B. Notably, region 3612B is larger than region 3612A because the parameters for where the upward swipe must start to initiate biometric authentication is relaxed on passcode entry UI 3620 in comparison to locked state UI 3606.

In some examples, instead of receiving input 3614C, electronic device receives any one of inputs 3614A-B and 3614D-E. In some examples, in light of the relaxed parameters on passcode entry UI 3620, all but input 3614E would trigger retrying biometric authentication. In some examples, in response to receiving input 3614E, electronic device 3600 determines that input 3614E does not start from within region 3612B, and in response, does not retry biometric authentication.

At FIG. 36F, in response to receiving input 3614C, electronic device 3600 device determines that input 3614 starts from within region 3612B. Upon determining that input 3614 starts from within region 3612B, electronic device 3600 retries biometric authentication. While retrying biometric authentication, electronic device 3600 displays (e.g., replaces display of lock icon 3608 with) authentication glyph 3618. Authentication glyph 3618 provides an indication to the user that biometric authentication is being performed.

While retrying biometric authentication, electronic device 3600 determines that biometric authentication is successful (e.g., the biometric data obtained using biometric sensor 3603 matches the stored authorized credentials).

At FIGS. 36G-36H, upon determining that biometric authentication is successful, electronic device 3600 transitions from a locked state to an unlocked state. Electronic device 3600 provides an indication of this transition by displaying an animation of lock icon 3608 transitioning to unlock icon 3626 of FIG. 36H, which provides an indication that the electronic device 3600 has transitioned to an unlocked state. Additionally, upon determining that biometric authentication is successful and after displaying unlock icon 3626, electronic device 3600 provides access to restricted content. For example, electronic device 3600 displays home screen 3628 of FIG. 36L or the most recently used application (e.g., a user interface of the most recently used application (e.g., messaging application interface 2616 of FIG. 26G)).

In some examples, instead of determining at FIG. 36C that biometric authentication has failed, electronic device 3600 determines that biometric authentication is successful. In some examples, upon determining that biometric authentication is successful, electronic device 3600 transitions to an unlocked state and displays unlock icon 3626, as described above with respect to FIGS. 36G-36H. Additionally, in some examples, upon determining that biometric authentication is successful and after displaying unlock icon of FIG. 36H, electronic device 3600 displays home screen 3628. (Home screen 3628 can include some or all of the features of home screen interface 2614 of FIG. 26D.) In some examples, upon determining that biometric authentication is successful and after displaying unlock icon 3626, electronic device 3600 displays the most recently used application (e.g., messaging application interface 2616 of FIG. 26G).

In some examples, instead of determining that biometric authentication is enabled on the device as described above with respect to FIGS. 36B-36C, electronic device 3600 determines that biometric authentication is not currently enabled (e.g., because biometric authentication has been (manually) disabled by the user or because a predetermined biometric authentication have been attempted without success). In some examples, upon determining that biometric authentication is not currently enabled, electronic device 3600 displays prompt 3622B of FIG. 36I instead of prompt 3622A of FIG. 36E. In contrast to prompt 3622A, prompt 3622B only prompts the user to enter a passcode (or password) to authenticate the user without prompting the user to swipe to retry biometric authentication. Additionally, in some examples, upon determining that biometric authentication is not currently enabled, electronic device 3600 does not display unlock indication 3624, as depicted in FIG. 36I.

As described above, unlock indication 3624 provides an indication of an approximate location on display 3602 from which a user can start an upward swipe to retry biometric authentication. In some examples, because biometric authentication is not currently enabled, electronic device 3600 does not display unlock indication 3624.

In some examples, instead of determining at FIG. 36F that biometric authentication is successful, electronic device 3600 determines that biometric authentication has failed. In some examples, upon determining that biometric authentication has failed, electronic device 3600 displays an animation of lock icon 3608 alternating between different positions to simulate a "shake" effect (instead of displaying a transition to an unlocked state as described above with respect to FIGS. 36G-36H). As described above, this "shake" animation provides an indication to the user that electronic device 3600 was unable to biometrically authenticate the user.

FIGS. 37A-37B are flow diagrams illustrating a method for retrying biometric authentication at a credential entry user interface using an electronic device, in accordance with some examples. Method 3700 is performed at an electronic device (e.g., 100, 300, 500, 3600) with a touch-sensitive display (e.g., 3602) and one or more biometric sensors (e.g., 3603) (e.g., a first biometric sensor of a device with a plurality of biometric sensors) (e.g., a fingerprint sensor, a contactless biometric sensor (e.g., a biometric sensor that does not require physical contact, such as a thermal or optical facial recognition sensor), an iris scanner). In some examples, the one or more biometric sensors include one or more cameras. Some operations in method 3700 are, optionally, combined, the orders of some operations are, optionally, changed, and some operations are, optionally, omitted.

As described below, method 3700 provides an intuitive way for retrying biometric authentication at a credential entry user interface using an electronic device. The method reduces the cognitive burden on a user for retrying biometric authentication, thereby creating a more efficient human-machine interface. For battery-operated computing devices, enabling a user to retry biometric authentication faster and more efficiently conserves power and increases the time between battery charges.

The electronic device (e.g., 100, 300, 500, 3600) displays (3706), on the touch-sensitive display (e.g., 3602), a credential entry (e.g., passcode, password, pattern) user interface (e.g., 3620) with a plurality of character entry keys. In some examples, the credential entry user interface includes a virtual keypad or virtual keyboard. In some examples, the virtual keypad or virtual keyboard includes a plurality of character entry keys. In some examples, while displaying the credential entry user interface (e.g., 3620), the electronic device receives input corresponding to one or more character entry keys of the plurality of character entry keys. In some examples, in response to (or subsequent to) receiving the input corresponding to the plurality of character entry keys, the electronic device transitions from a locked state (e.g., corresponding to 3606) to an unlocked state (e.g., corresponding to 3628) in accordance with a determination that the received input corresponds to (or matches) authorized credentials (e.g., a stored passcode or password).

While displaying the credential entry user interface (e.g., 3620), the electronic device receives (3708), via the touch-sensitive display (e.g., 3602), a touch gesture input (e.g., 3614A-B) (e.g., a swipe at a predefined location) that includes movement of a contact on the touch-sensitive display.

In response (3712) to receiving the touch gesture input that includes movement of the contact on the touch-sensitive display and in accordance (3714) with a determination that a first set of one or more criteria are met, the first set of one or more criteria including a requirement that biometric authentication is currently enabled on the electronic device, the electronic device attempts to biometrically authenticate a user of the electronic device based on biometric information captured using the one or more biometric sensors. In some examples, the first set of one or more criteria only includes one criterion. In some examples, biometric authentication can become unavailable (or not enabled on the electronic device) when one or more of the following conditions have been met: the electronic device has not been successfully authenticated since being turned on or restarted; the electronic device has not been unlocked for more than a predetermined amount of time (e.g., 48 hours); the passcode has not been used to unlock the device for more than a predetermined amount of time (e.g., 156 hours); biometric authentication using a biometric feature (e.g., face, fingerprint) has not been used to unlock device for more than predetermined amount of time (e.g., 4 hours); the electronic device has received a remote lock command; biometric authentication has failed more than a predetermined number of times (e.g., 5, 10, 15) since the last successful authentication with the device; and the electronic device has received a power off and/or emergency SOS command. In some examples, the touch gesture input is a request to unlock electronic device 3600. Providing the user with the capability to retry biometric authentication by performing a touch gesture input at the credential entry user interface enhances the operability of the device by providing additional control of the device without cluttering the UI with additional displayed controls. Providing this capability enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in response (3712) to receiving the touch gesture input that includes movement of the contact on the touch-sensitive display and in accordance (3716) with a determination that the first set of one or more criteria are not met (e.g., because biometric authentication is not currently enabled on the device), the electronic device forgoes attempting to biometrically authenticate the user of the electronic device based on biometric information captured using the one or more biometric sensors (e.g., 3603). Forgoing attempting to biometrically authenticate the user when biometric authentication is not enabled improves the security of the device by preventing fraudulent use of the device.

In some examples, displaying the credential entry user interface (e.g., 3620) occurs in response to receiving (3702) a request to perform an operation that requires authentication (e.g., a request to unlock the electronic device (e.g., 3614A-B) (e.g., a swipe starting from an edge (e.g., bottom edge) of the display or starting from within a predefined region (e.g., lower portion) of the display)) and failing to biometrically authenticate the user of the electronic device based on biometric information captured using the one or more biometric sensors. In some examples, the electronic device (e.g., 100, 300, 500, 3600) fails to biometrically authenticate the user of the electronic device when the biometric information captured using the one or more biometric sensors does not correspond to (or match) authorized credentials (e.g., stored information about a biometric feature (e.g., face, fingerprint) that are authorized for use in biometric authentication). Displaying the credential entry user interface when a set of conditions has been met provides the user with the capability to authenticate via an alternative method without requiring the user to explicitly request that the credential entry user interface be displayed Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the request to perform the operation that requires authentication (e.g., 3614A-B) is a second touch gesture input (3704) that includes movement of a contact on the touch sensitive display (e.g., a swipe starting from an edge (e.g., bottom edge) of the display or starting from within a predefined region (e.g., 3612A) (e.g., lower portion) of the display). In some examples, the set of one or more criteria includes a requirement that the touch gesture input starts at a first region (e.g., 3612A) of the display (e.g., a region along a bottom edge of the display) and ends (or progresses through) a second region of the display (e.g., a region above the region along the bottom edge of the display (e.g., 3612A)).

In some examples, in accordance with a determination that a second set of one or more criteria are met, the second set of one or more criteria including a requirement that biometric authentication is currently enabled on the electronic device, displaying the credential entry user interface (e.g., 3620) includes displaying, on the touch-sensitive display (e.g., 3602), an indication (e.g., 3622A) (e.g., text, graphics, icons) to perform a gesture on the touch-sensitive display to attempt biometrically authenticating the user. In some examples, in accordance with a determination that the second set of one or more criteria are not met, the electronic device forgoes displaying the indication to perform the gesture on the touch-sensitive display to attempt biometrically authenticating the user. In some examples, the second set of one or more criteria is the same as the first set of one or more criteria. In some examples, the second set of one or more criteria only includes one criterion. Displaying an indication to perform a gesture when biometric authentication is available provides the user with feedback as to the current state of the device (e.g., that biometric authentication is available) and prompts the user to perform the gesture associated with the indication. Moreover, not displaying the indication to perform the gesture when biometric authentication is not available also provides the user with feedback as to the current state of the device (e.g., that biometric authentication is not available). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in accordance with a determination that a third set of one or more criteria are met, the third set of one or more criteria including a requirement that biometric authentication is currently enabled on the electronic device, displaying the credential entry user interface (e.g., 3620) includes displaying, on the touch-sensitive display (e.g., 3602), a user interface element (e.g., 3624) (e.g., a graphical element, a horizontal bar, a home affordance, an indication of a location from which a user should swipe to attempt biometric authentication) adjacent to an edge of the touch-sensitive display (e.g., bottom edge of the display). In some examples, the third set of one or more criteria is the same as the first set of one or more criteria. In some examples, the third set of one or more criteria only includes one criterion. In some examples, in accordance with a determination that the third set of one or more criteria are not met, the electronic device (e.g., 100, 300, 500, 3600) forgoes displaying the user interface element. In some examples, the set of one or more criteria includes a requirement that the touch gesture input starts at a first region (e.g., 3612A) of the display (e.g., a region along a bottom edge of the display) and ends at (or progresses through a) a second region of the display (e.g., a region above the region along the bottom edge of the display. In some examples, the user interface element (e.g., 3624) is displayed at a location that corresponds (e.g., that is within) to the first region of the display. Displaying the user interface element adjacent to the edge of the display when biometric authentication is available provides feedback to the user about the current state of the device and feedback as to how the user can request unlocking of the device. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, while attempting to biometrically authenticate the user of the electronic device based on biometric information captured using the one or more biometric sensors, the electronic device (e.g., 100, 300, 500, 3600) displays, on the touch-sensitive display, an animation with one or more moving elements (e.g., 3618) that indicate that biometric authentication is occurring (e.g., displaying an animation that includes one or more rings (e.g., a graphical icon) moving on the display). In some examples, the animation provides an indication that biometric information is being processed. In some examples, the animation includes rings rotating around an object (e.g., a sphere). In some examples, the sphere is visible. In some examples, the sphere is not visible. Displaying one or more moving elements indicating that biometric authentication is occurring provides the user with feedback about the current state of the device (e.g., biometric authentication is being performed) and that the user does not need to take any action at this time. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, displaying the animation with the one or more moving elements includes transitioning from the animation with one or more moving elements to a lock icon (e.g., 3608) (e.g., an icon indicative of a locked state). In some examples, after transitioning from the animation with one or more moving elements (e.g., 3618) to the lock icon and in accordance with a determination that the biometric information captured using the one or more biometric sensors corresponds to (e.g., matches) authorized credentials (e.g., stored information about a biometric feature (e.g., face, fingerprint) that are authorized for use in biometric authentication), the electronic device transitions from a locked state to an unlocked state. In some examples, transitioning the electronic device from a locked state to an unlocked state includes displaying an animation of the lock icon transitioning to an unlock icon (e.g., 3626) (e.g., an icon indicative of an unlocked state). In some examples, after transitioning from the animation with one or more moving elements to the lock icon and in accordance with a determination that the biometric information captured using the one or more biometric sensors does not correspond to (e.g., does not match) the authorized credentials, the electronic device displays, on the touch-sensitive display (e.g., 3602), an animation with the lock icon (e.g., 3608) alternating between a first position and a second position, the second position being different from the first position. In some examples, the animation with the lock icon is an animation of the lock icon shaking (e.g., side to side, rotating back and forth). In some examples, the electronic device displays an animation involving the lock icon to indicate that biometric authentication has failed. In some examples, a tactile output is provided in combination with the shaking lock icon. In some examples, no tactile output is provided. In some examples, in accordance with a determination that the biometric information captured using the one or more biometric sensors does not correspond to or does not match the authorization credentials, the electronic device (e.g., 100, 300, 500, 3600) maintains the locked state of the electronic device. Displaying an animation of the lock icon transitioning to an unlock icon provides the user with feedback about the current state of the device (e.g., that biometric authentication is successful, that the device has been unlocked, that the user can now access restricted content). Moreover, displaying an animation of the lock icon shaking provides the user with feedback about the current state of the device (e.g., that biometric authentication has failed) and prompts the user to take further action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the touch gesture input that includes movement of the contact on the touch-sensitive display starts (3710) from a location that is away from (e.g., not substantially near) an edge of the touch-sensitive display (e.g., bottom edge of the display). In some examples, the location that is away from the edge of the touch-sensitive display (e.g., 3602) includes a location closer to the center of the display than to the edge. In some examples, the location that is away from the edge of the touch-sensitive display includes a location that is more than a threshold distance from the edge of the display (or outside a predefined region (e.g., 3612A)). In some examples, the threshold distance (or predefined region) is used on the wake screen to determine whether to dismiss the wake screen when a swipe input starts less than the threshold distance away from the edge of the display. In some examples, the threshold distance (or predefined region (e.g., 3612A)) is used to perform a different operation on the wake screen such as scrolling content (e.g., 3610A-E) on the wake screen when a swipe input starts more than the threshold distance away from the edge of the display (or outside a predefined region (e.g., 3612A)). In some examples, the parameters for where the touch gesture input must start are relaxed for the credential entry user interface (e.g., 3620). Relaxing the parameters at the credential entry user interface for where the touch gesture input must start enhances the operability of the device by allowing less precise gestures to initiate biometric authentication. The parameters are relaxed because the user has already conveyed a desire to initiate biometric authentication. As a result, there is less risk at the credential entry user interface that the user does not intend to initiate biometric authentication. Allowing less precise gesture to initiate biometric authentication after the user has already conveyed a desire to initiate biometric authentication enhances the operability of the device and makes the user-device interface more efficient which, additionally, reduces power usage and improves battery life of the device by limiting the performance of restricted operations.

In some examples, in response to receiving the touch gesture input (e.g., 3614C-E) that includes movement of the contact on the touch-sensitive display starting from the location that is away from the edge of the touch-sensitive display and in accordance (3718) with a determination that the biometric information captured using the one or more biometric sensors corresponds to (e.g., matches) authorized credentials (e.g., stored information about a biometric feature (e.g., face, fingerprint) that are authorized for use in biometric authentication), the electronic device transitions from a locked state to an unlocked state. In some examples, transitioning the electronic device to an unlocked state includes displaying an unlocked user interface (e.g., a user interface indicative of an unlocked state, such as a home screen (e.g., 3628) or a most recently used application).

In some examples, prior to displaying the credential entry user interface, the electronic device (e.g., 100, 300, 500, 3600) displays, on the touch-sensitive display (e.g., 3602), a lock user interface (e.g., 3606) (e.g., a user interface indicative of a locked state of the electronic device, a wake screen, a lock screen). In some examples, the lock user interface is different from the credential entry use interface (e.g., 3620). In some examples, while displaying the lock user interface, the electronic device receives, via the touch-sensitive display (e.g., 3602), a touch gesture input (e.g., 3614A-B) with a starting location (e.g., an upward swipe). In response to receiving the touch gesture input with the starting location and in accordance with a determination that a fourth set of one or more criteria are met, the fourth set of one or more criteria including a requirement that the starting location of the touch gesture input is located substantially near an edge (e.g., within a predefined region (e.g., 3612A), within a predefined distance from the edge; a location closer to the edge than to the center of the display) of the touch-sensitive display, the electronic device initiates biometric authentication. In some examples, the fourth set of one or more criteria only includes one criterion. In some examples, initiating biometric authentication includes attempting to biometrically authenticate a user of the electronic device based on biometric information captured using the one or more biometric sensors. In some examples, in response to receiving the touch gesture input with the starting location and in accordance with a determination that the fourth set of one or more criteria are not met, the electronic device forgoes initiating biometric authentication.

Note that details of the processes described above with respect to method 3700 (e.g., FIGS. 37A-37B) are also applicable in an analogous manner to the methods described below. For example, method 3900, method 4100, and/or method 4300 optionally include one or more of the characteristics of the various methods described above with reference to method 3700. For example, the processes for retrying biometric authentication, as described above with respect to method 3700, can be used to retry biometric authentication to authorize payment of goods, as described with respect to method 4100. Similarly, the process for retrying biometric authentication can be used to retry biometric authentication in the processes described with respect to method 3900. For brevity, these details are not repeated below.

FIGS. 38A-38AD illustrate exemplary user interfaces for providing indications of error conditions during biometric authentication, in accordance with some examples. The user interfaces in these figures are used to illustrate the processes described below, including the processes in FIGS. 39A-39B.

FIG. 38A illustrates electronic device 3800 (e.g., portable multifunction device 100, device 300, device 500). In the exemplary examples illustrated in FIGS. 38A-38AD, electronic device 3800 is a smartphone. In other examples, electronic device 3600 can be a different type of electronic device, such as a wearable device (e.g., a smartwatch). Electronic device 3600 includes display 3802, one or more input devices (e.g., touchscreen of display 3802, button 3804, and a microphone), and a wireless communication radio. In some examples, the electronic device includes a plurality of cameras. In some examples, the electronic device includes only one camera. In FIG. 38A, the electronic device includes biometric sensor 3803. In some examples, the biometric sensor is one or more biometric sensors that can include a camera, such as an infrared camera, a thermographic camera, or a combination thereof. In some examples, biometric sensor 3803 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

At FIG. 38A, a user learns from notification 3808 that she has received a message from John Appleseed. The user wishes to view the restricted content of notification 3808 (e.g., the message from John Appleseed), but is unable to do so, as electronic device 3800 is currently in a locked state. Electronic device 3800 displays a locked state user interface (UI) with lock icon 3806, which provides an indication that electronic device 3800 is in a locked state. Viewing the restricted content of notification 3808 requires successful authentication (e.g., determining that information (or data) about a biometric feature obtained using biometric sensor 3803 corresponds to (or matches) stored authorized credentials). To view the restricted content of notification 3808, the user lifts (or raises) electronic device 3800 (e.g., from a substantially horizontal orientation to the orientation of the device as depicted in the user's hand in FIG. 38A). Electronic device 3800 detects the change in orientation of electronic device 3800 and, in response, initiates biometric authentication. In some examples, after initiating biometric authentication, electronic device 3800 determines that biometric authentication is successful. In some examples, upon determining that biometric authentication is successful, electronic device 3800 transitions from a locked state to an unlocked state, and displays the restricted content of notification 3808.

After initiating biometric authentication (e.g., prior to successful authentication), electronic device 3800 determines whether a face is detected by biometric sensor 3803.

Figure 38B:
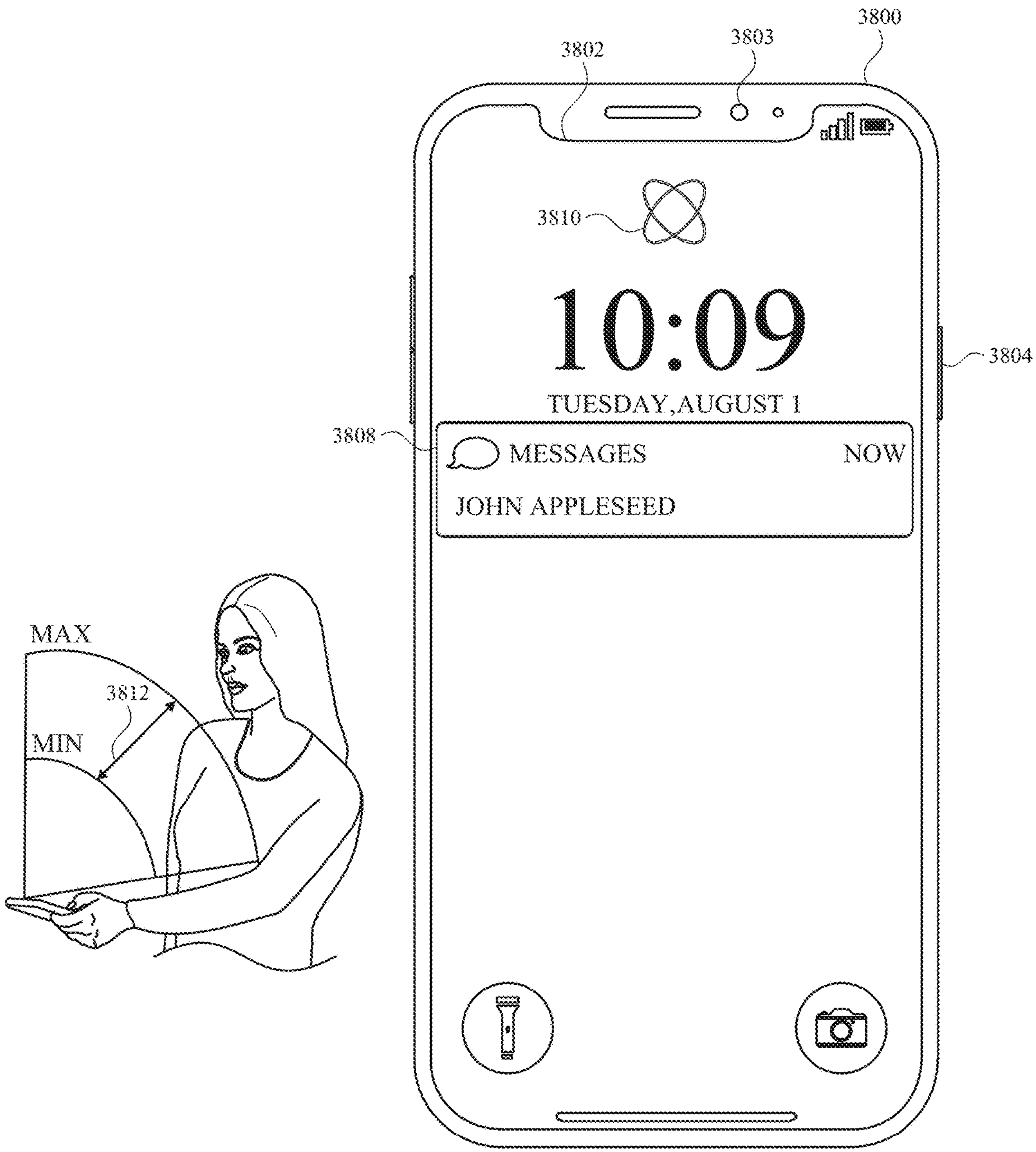
Figure 38C:
Figure 38D:
Figure 38E:
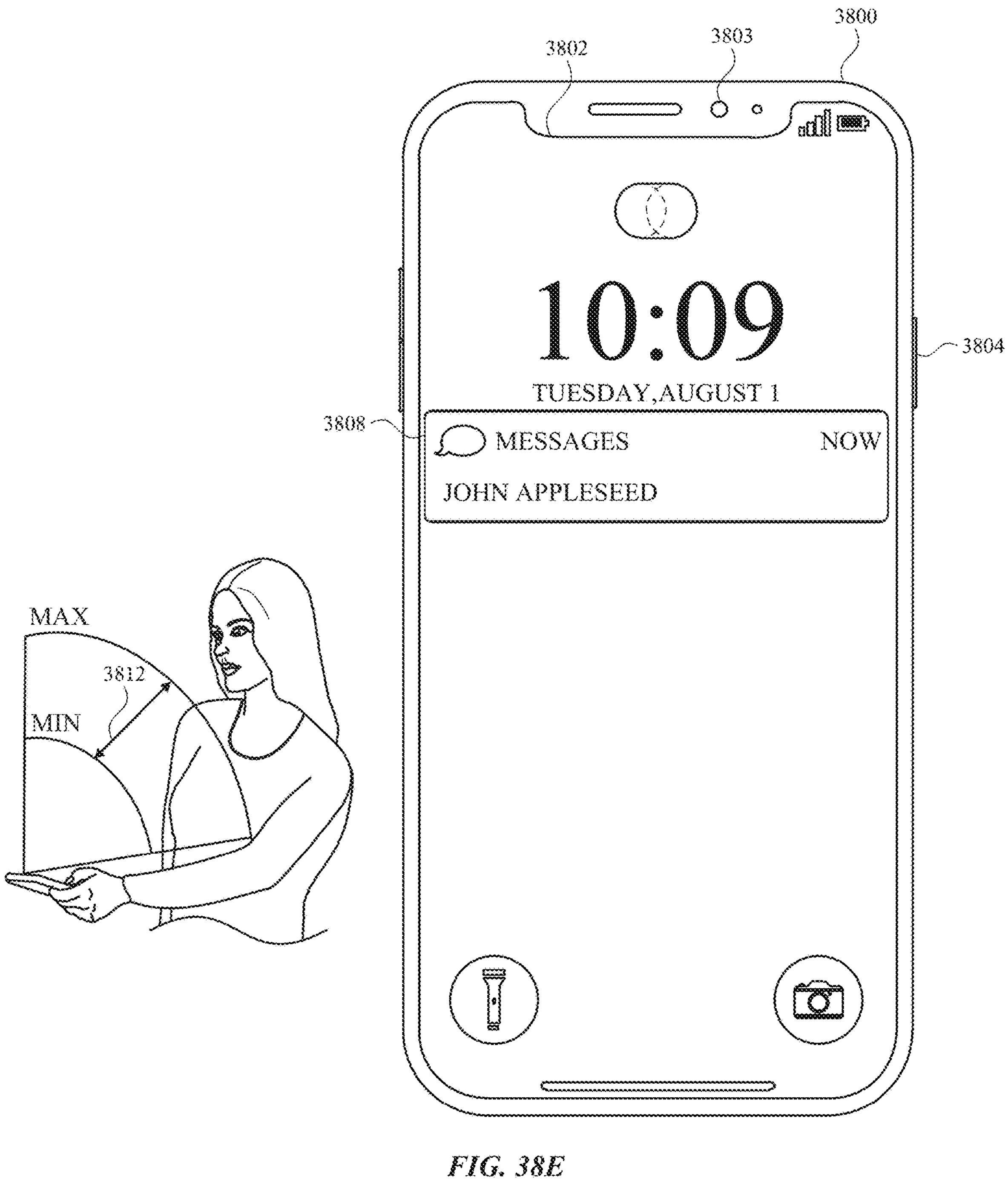
Figure 38F:
Figure 38G:

At FIG. 38B, upon determining that a face is detected, electronic device 3803 displays authentication glyph 3810, which includes a plurality of rings that rotate spherically. Authentication glyph 3810 provides an indication that biometric authentication is being performed. In some examples, electronic device 3800 displays an animation of lock icon 3806 morphing into authentication glyph 3810. In some examples, upon determining that no face is detected using biometric sensor 3803, electronic device 3803 maintains a locked state, and does not display authentication glyph 3810.

After detecting the presence of a face, electronic device 3800 determines that authentication is unsuccessful due to failure to obtain sufficient information about the user's face using biometric sensor 3803. Specifically, as depicted by FIG. 38B, biometric sensor 3803 is positioned outside acceptable distance range 3812 (e.g., above the maximum threshold range), resulting in a failure to obtain sufficient information about the user's face. Upon determining that biometric authentication is unsuccessful due to the user's face being outside acceptable distance range 3812, electronic device 3800 maintains the device in a locked state and does not display the restricted content of notification 3808. In some examples, electronic device 3800 maintains the device in a locked state and does not display the restricted content of notification 3808 upon determining authentication is unsuccessful and that no error condition exists. In some examples, upon determining that authentication is unsuccessful (e.g., due to captured biometric information not matching an authorized biometric information profile (e.g., stored authorized credentials)) and that no error condition exists (e.g., no condition preventing capture of sufficient biometric information), electronic device 3800 maintains a locked state and automatically retries biometric authentication. In some examples, while retrying biometric authentication, electronic device 3800 continues to display authentication glyph 3810 in FIG. 38B.

As depicted in FIGS. 38C-38G, upon determining that biometric authentication is unsuccessful due to the user's face being outside acceptable distance range 3812, electronic device 3800 displays an animation of authentication glyph 3810 morphing into error indication 3814A such that error indication 3814A replaces the display of authentication glyph 3810. At FIG. 38G, electronic device 3800 displays error indication 3814A, which prompts the user to take an action to correct the error condition underlying error indication 3814A. Specifically, error indication 3814A prompts the user to move her face closer to biometric sensor 3803. Error indication 3814A also suggests to the user that the user's face is too far away from biometric sensor 3803, which is the cause of error indication 3814A. As long as the user's face is outside acceptable distance range 3812, electronic device 3800 will continue to determine that error indication 3814A exists. Upon determining that error indication 3814A still exists, electronic device 3800 does not attempt retrying biometric authentication. It is noted that electronic device 3800 displays error indication 3814A at a position coinciding with the position of lock icon 3806 in FIG. 38A. Further, electronic device 3800 displays error indication 3814A on a portion of display 3802 that is adjacent to biometric sensor 3803 to suggest to the user that error indication 3814A is associated with (or corresponds to) biometric sensor 3803.

Figure 38H:
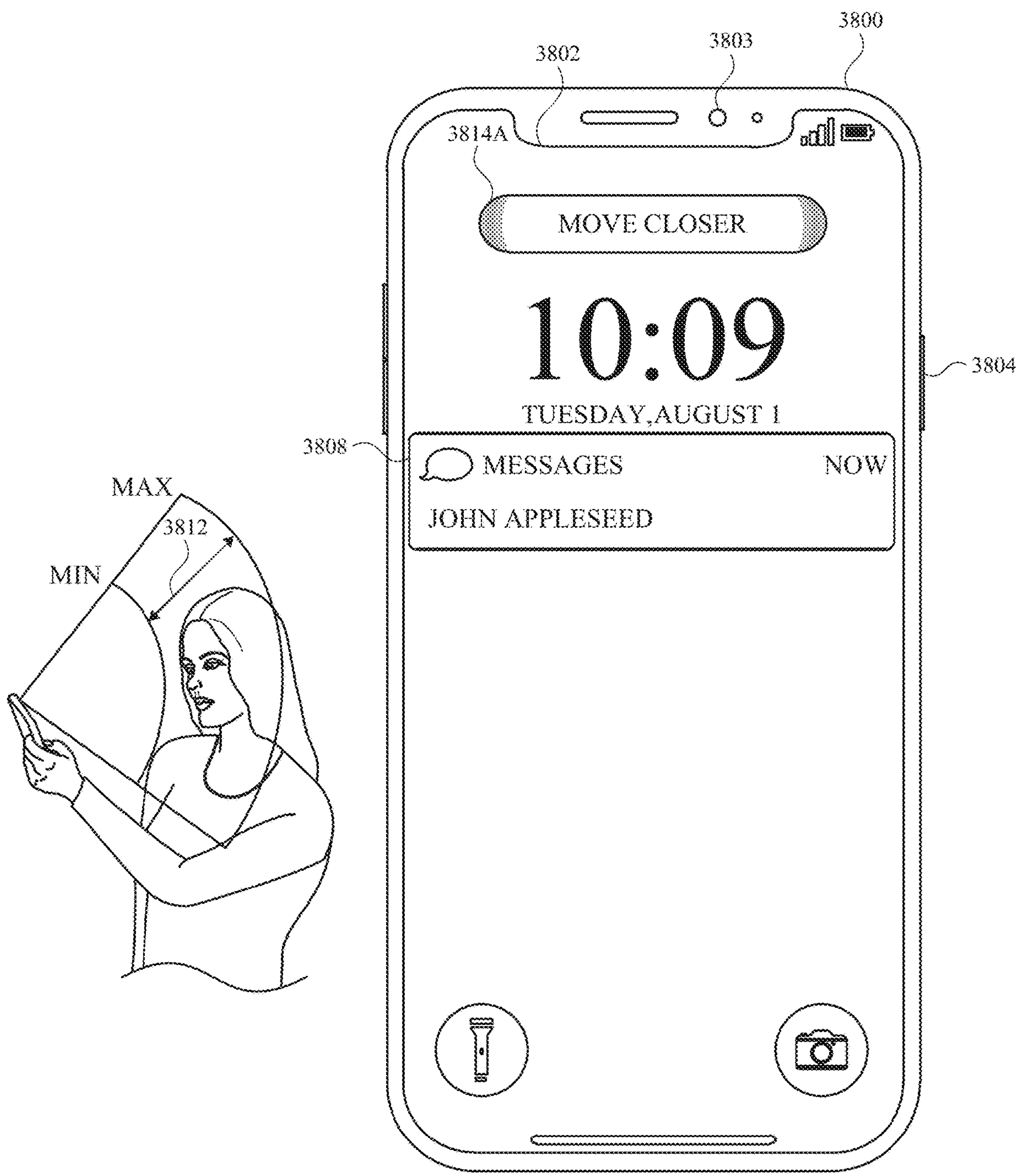
Figure 38I:
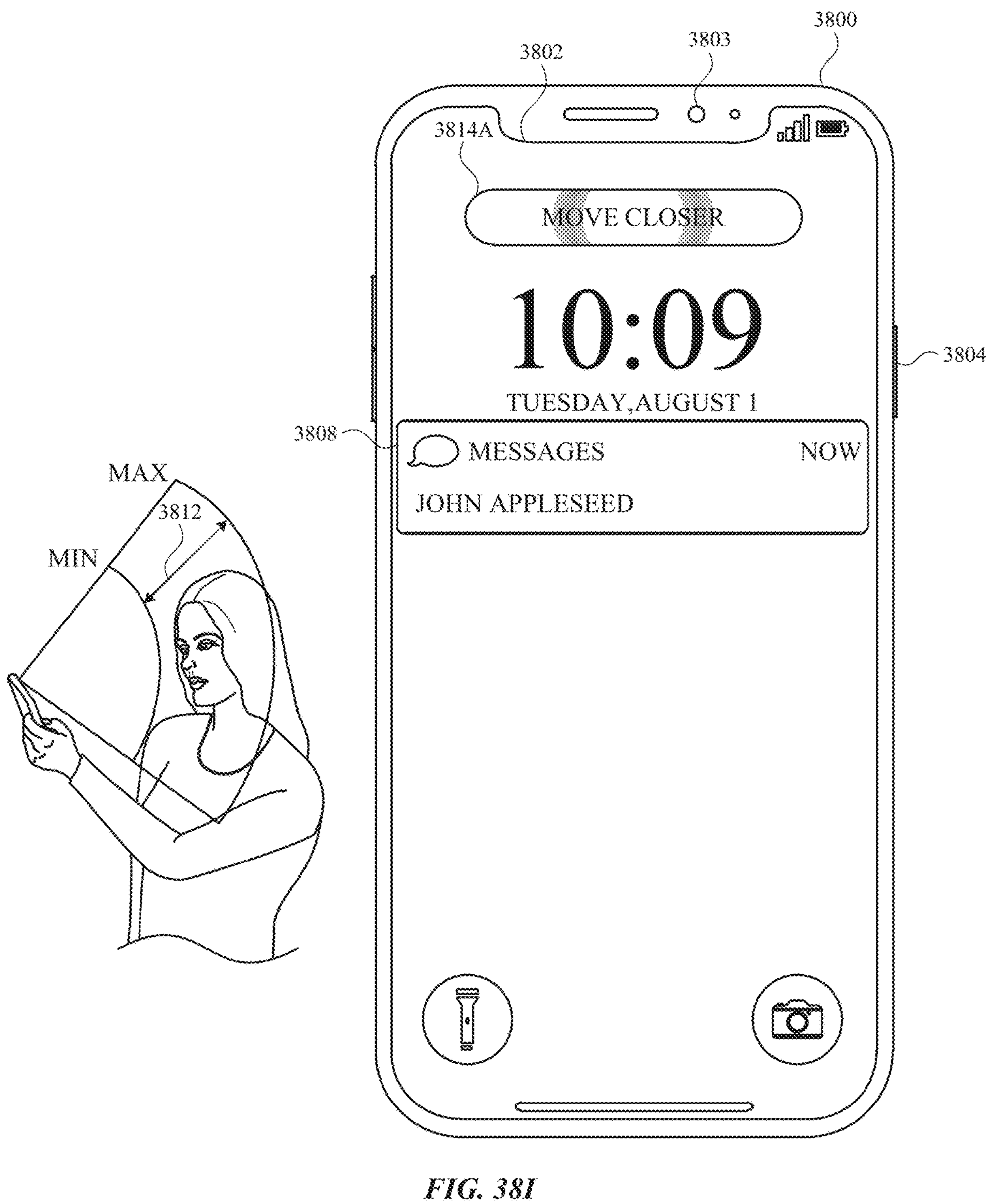
Figure 38J:
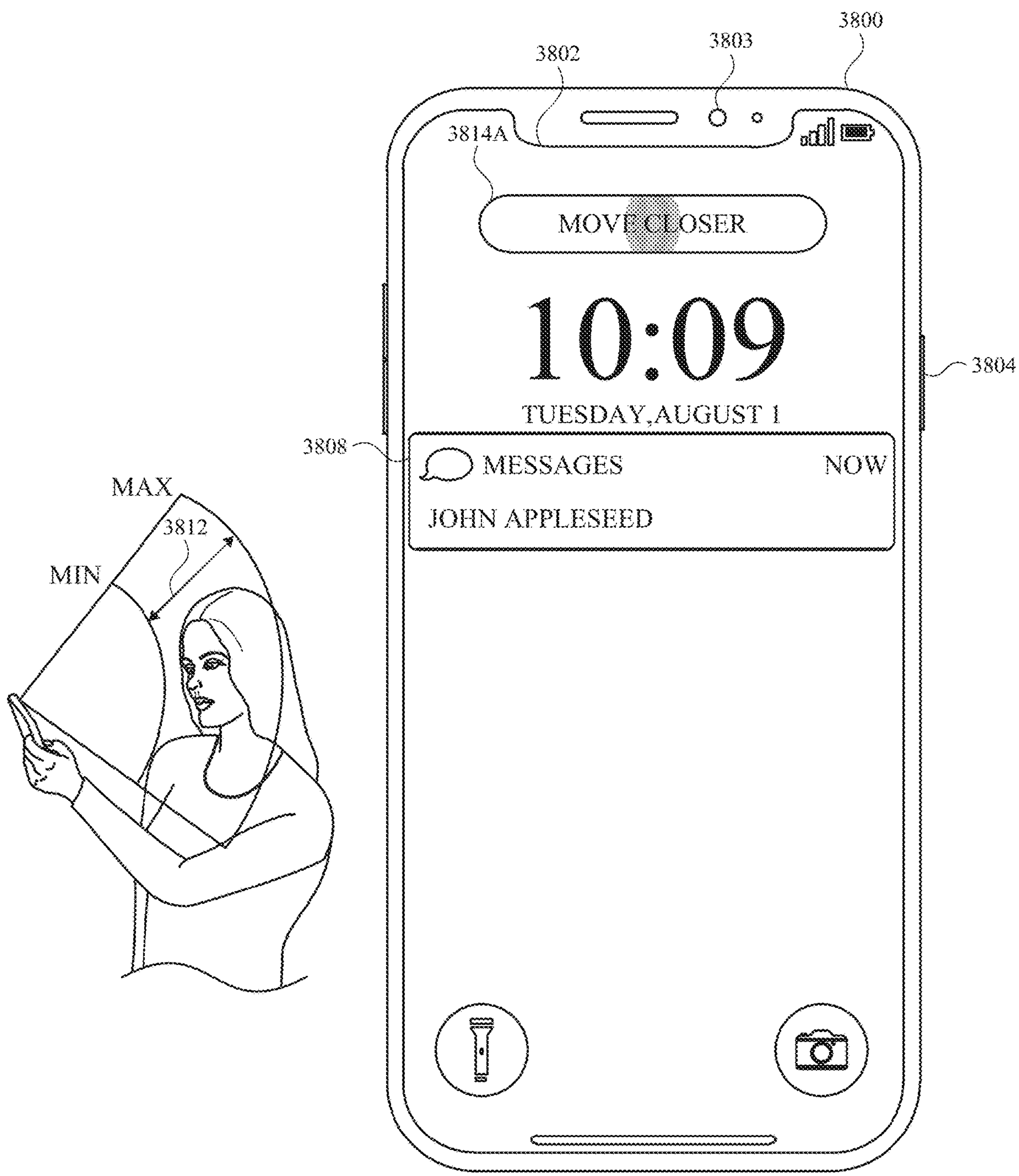
Figure 38K:
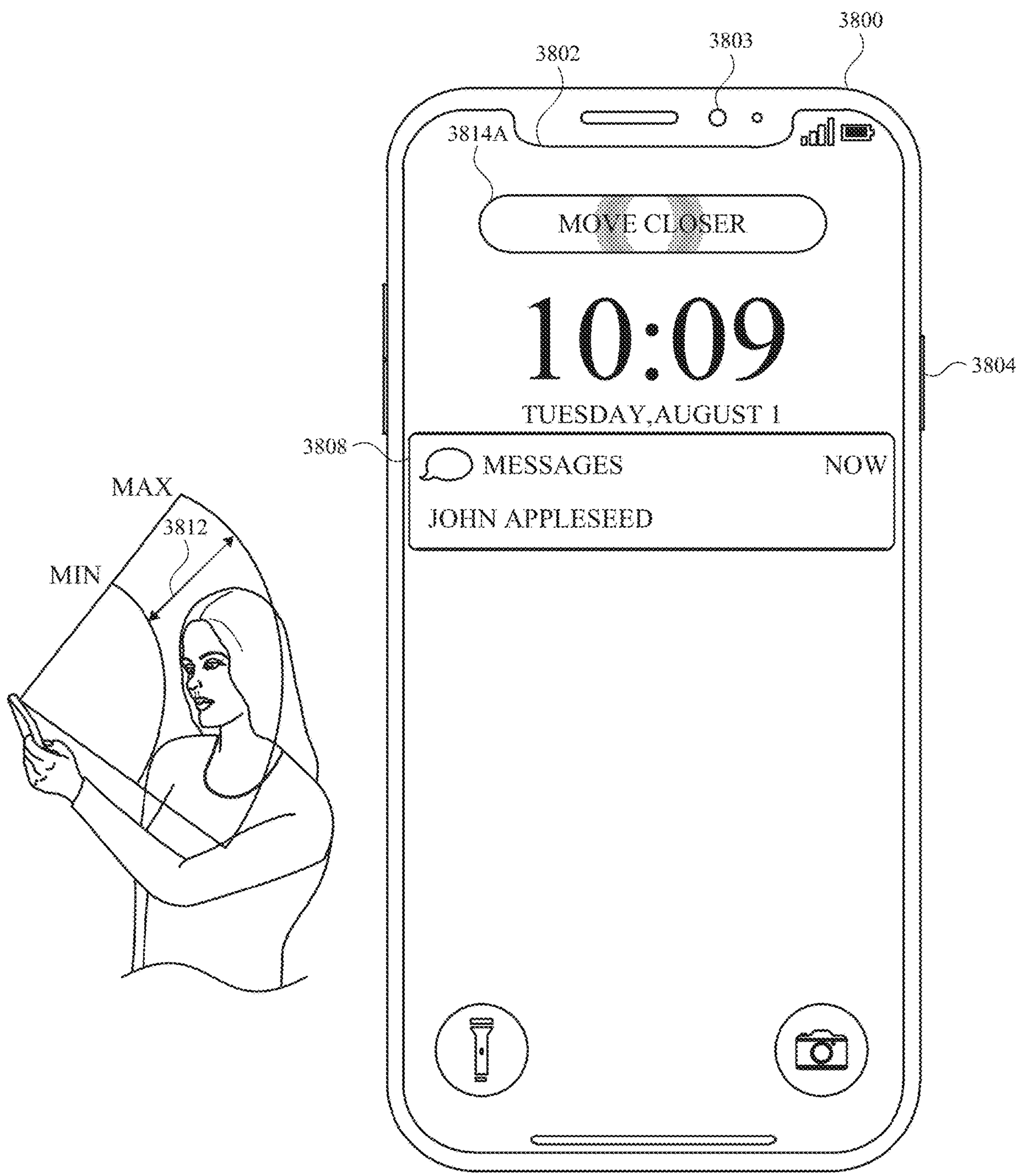

As depicted in FIG. 38H, after being prompted to correct error indication 3814A, the user moves her face closer to biometric sensor 3803 such that the user's face is within acceptable distance range 3812. At FIG. 38H, electronic device determines that error indication 3814A no longer exists. Upon determining that error indication 3814A no longer exists, electronic device 3800 enables biometric authentication on the device and automatically retries biometric authentication using biometric sensor 3803.

In response to automatically retrying biometric authentication, electronic device 3800 displays error indication 3814A with a shimmer effect (e.g., animating the error indication such that one or more portions of the error indication moves side to side so as produce an effect where the error indication appears to shine) to indicate that electronic device 3800 is attempting to biometrically authenticate the user again. FIGS. 38H-38L depict an animation of error indication 3814A with the shimmer effect. In some examples, instead of displaying error indication 3814A with a shimmer effect, electronic device 3800 displays (e.g., replaces display of error indication 3814A with) authentication glyph 3810 to indicate that electronic device 3800 is attempting to biometrically authenticate the user again. Accordingly, in some examples, electronic device 3800 displays an animation of authentication glyph 3814A morphing into lock icon 3806 instead of error indication 3814A morphing into lock icon 3806.

Figure 38L:
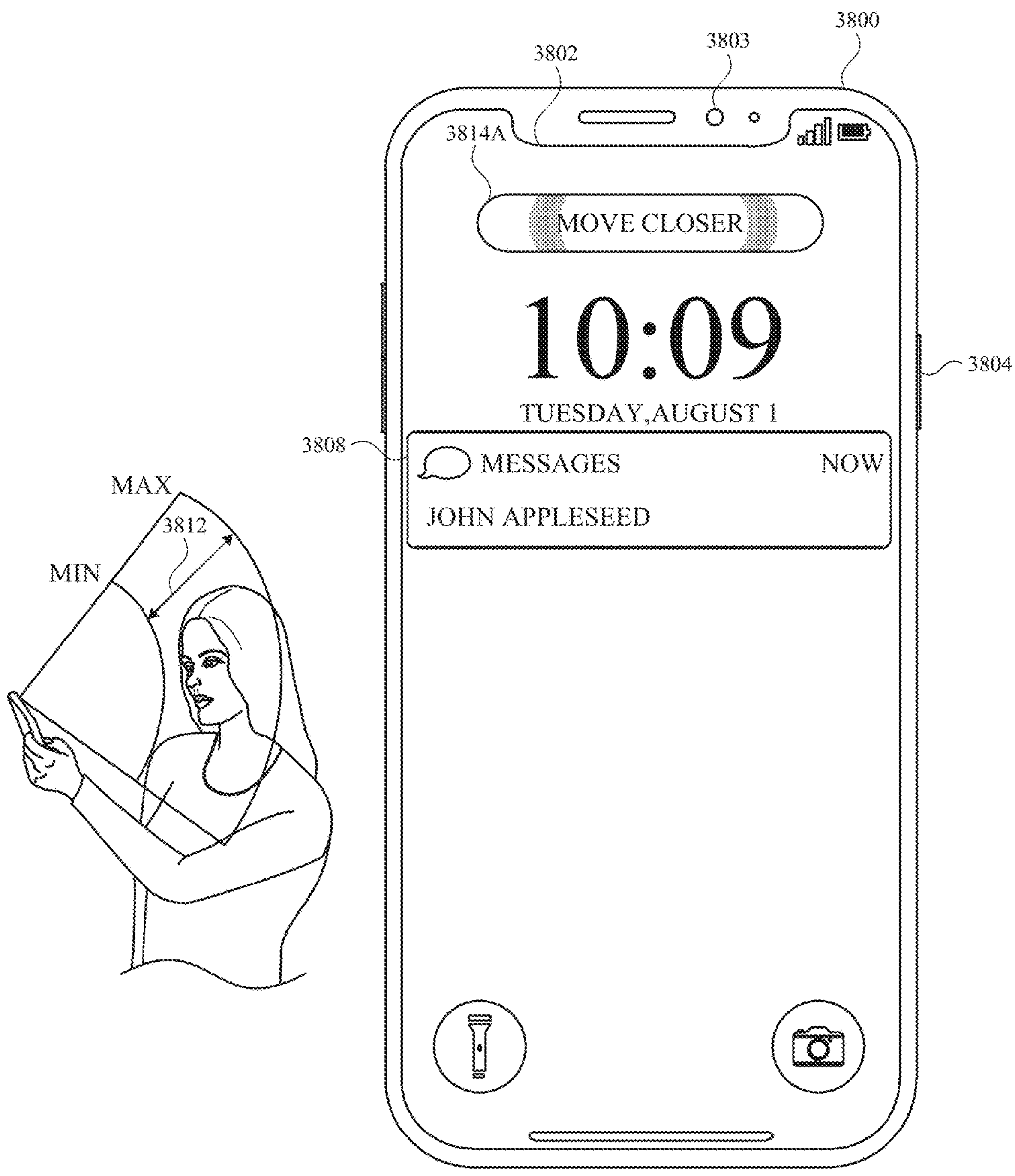
Figure 38M:
Figure 38N:
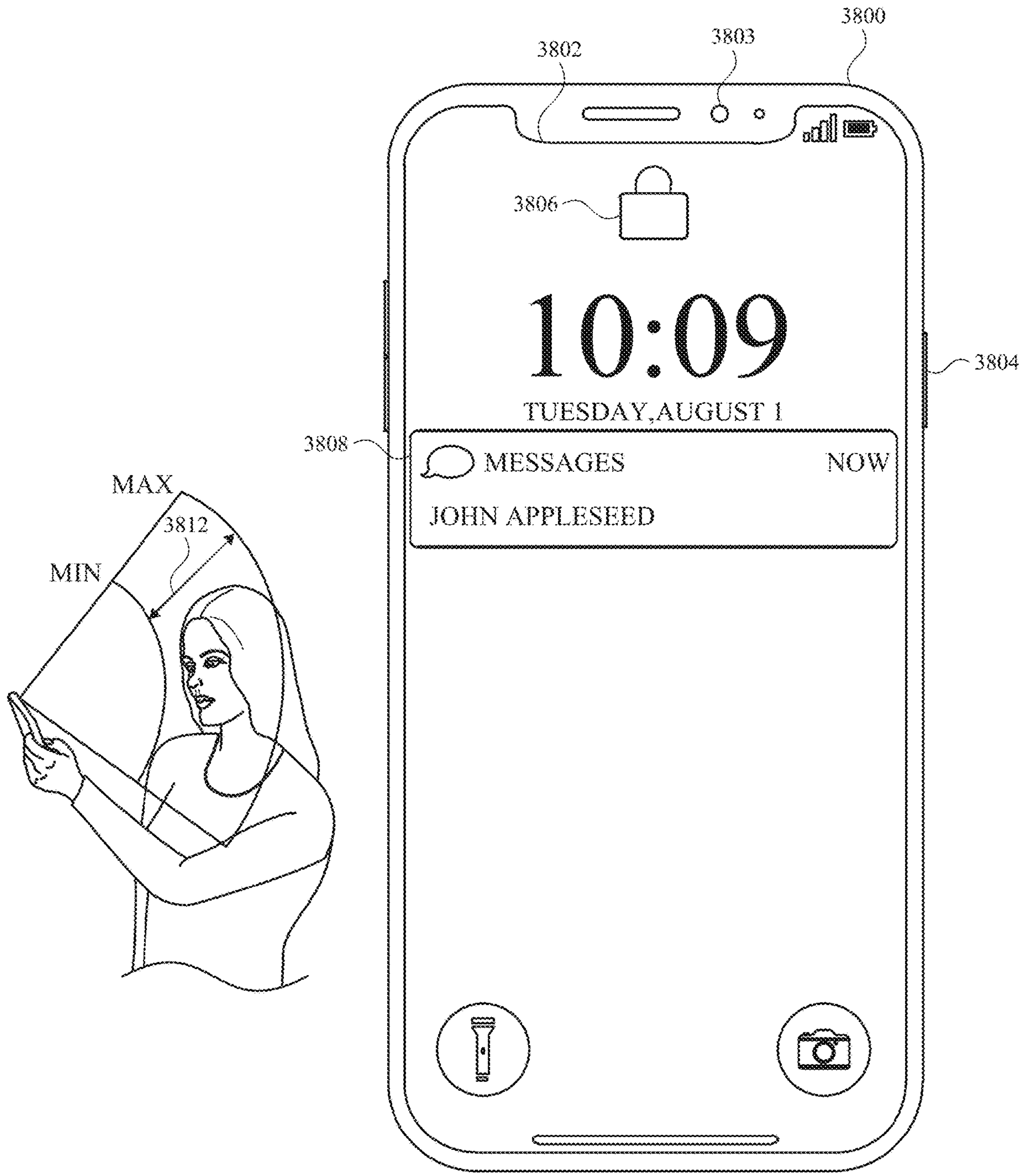
Figure 38O:
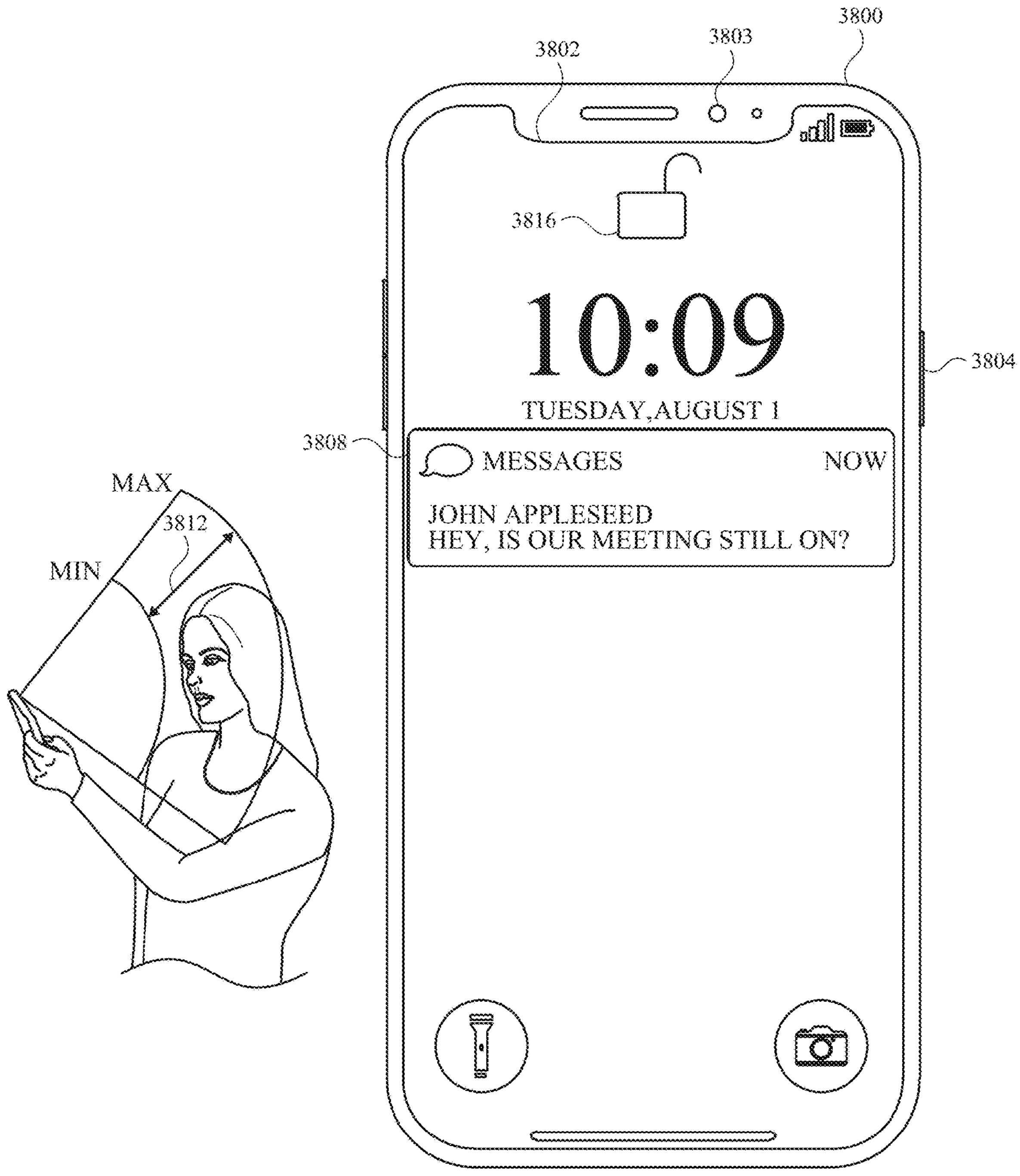

At FIG. 38L, after retrying biometric authentication, electronic device 3800 successfully biometrically authenticates the user. In response to successful biometric authentication, electronic device 3800 transitions the device from a locked state to an unlocked state. While transitioning from a locked state to an unlocked state, electronic device 3800 displays an animation of error indication 3814A morphing into lock icon 3806, as depicted in FIGS. 38L-38N. After displaying an animation of error indication 3814A morphing into lock icon 3806, electronic device 3800 displays an animation of lock icon 3806 transitioning to unlock icon 3816, as depicted in FIGS. 38N-38O. Unlock icon 3816 provides an indication that electronic device 3800 is in an unlocked state. Additionally, as depicted in FIG. 38O, electronic device 3800 displays the restricted content (e.g., "Hey, is our meeting still on?") of notification 3808 in response to biometric authentication being successful.

Figure 38P:
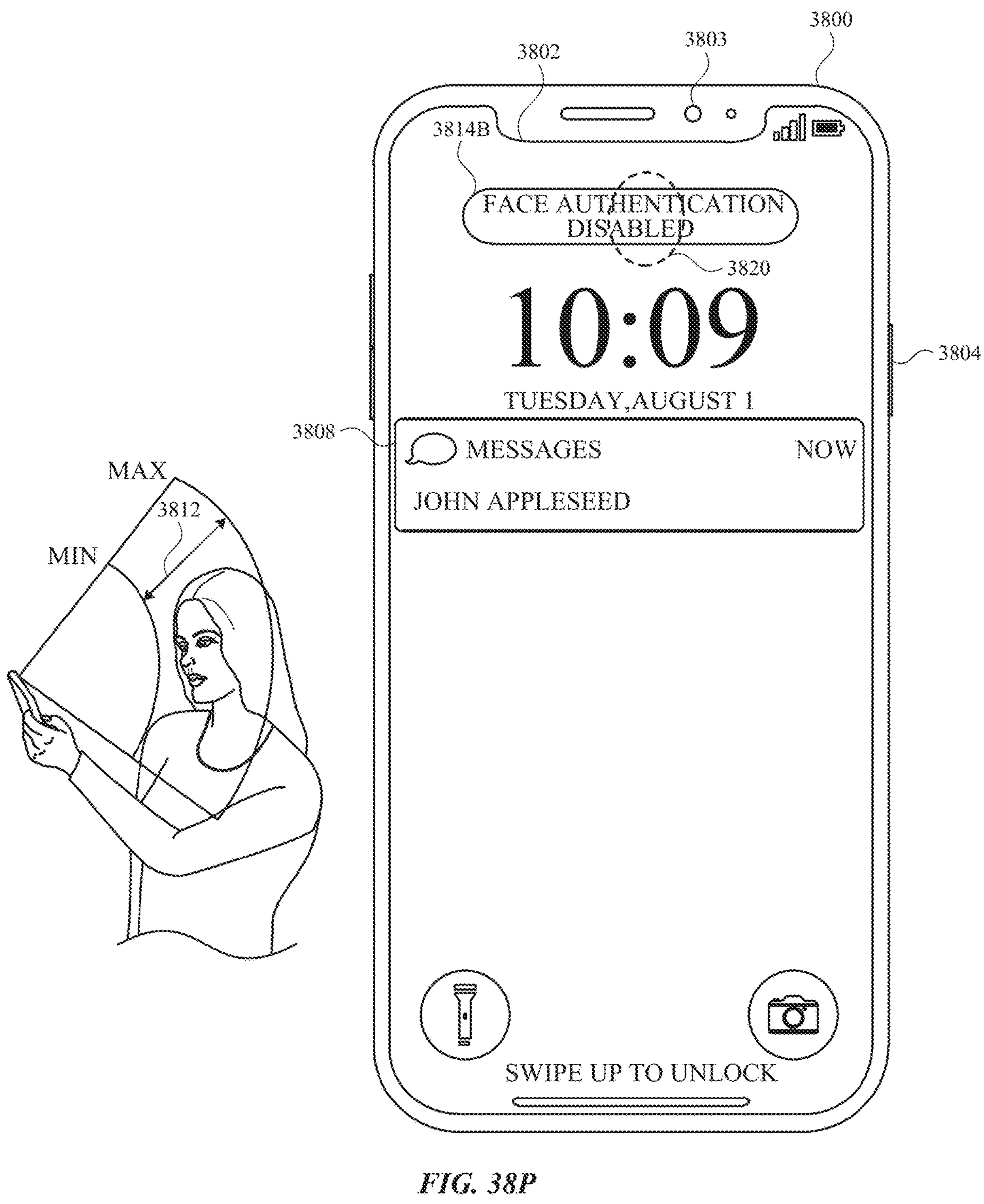

At FIG. 38P, instead of determining that the user's face is outside acceptable distance range 3812 as discussed above with respect to FIG. 38B, electronic device 3800 determines that biometric authentication is not available on the device. Upon determining that biometric authentication is not available, electronic device 3800 displays error indication 3814B in FIG. 38P, which provides an indication that biometric authentication is not currently available on the device. Biometric authentication can be unavailable for a variety of reasons, including that biometric authentication has failed more than a predefined number of times (e.g., 5, 10, 15) since the last successful authentication.

Due to biometric authentication being unavailable, a user must use an alternative method to authenticate the user. For example, the user can authenticate by entering a passcode at electronic device 3800. While displaying error indication 3814B in FIG. 38P, electronic device 3800 receives input 3820 at error indication 3814B.

Figure 38Q:
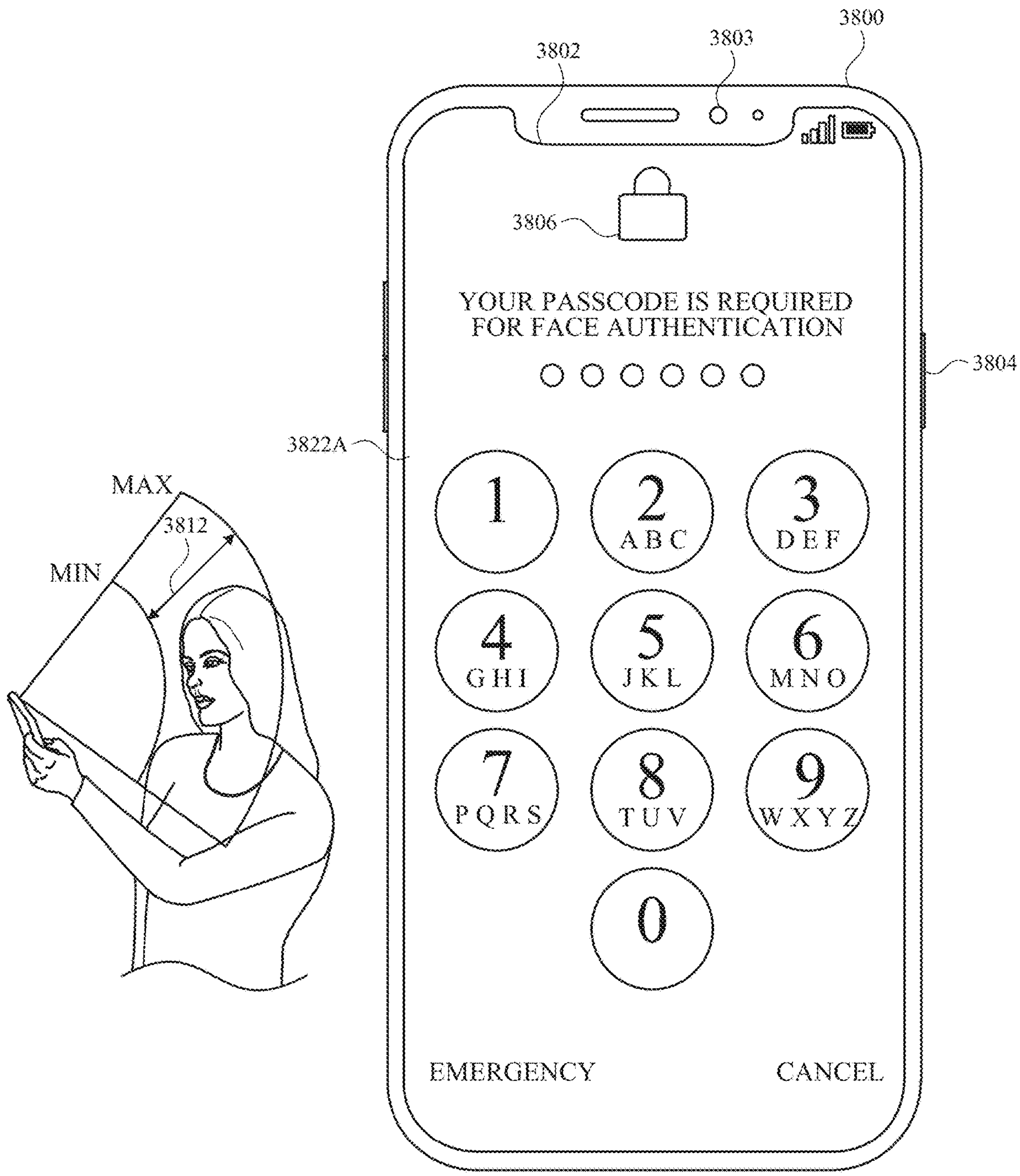

At FIG. 38Q, in response to receiving input 3820 at error indication 3814B, electronic device 3800 displays passcode entry UI 3822A with a plurality of entry affordances for entering a passcode (or password).

Figure 38R:
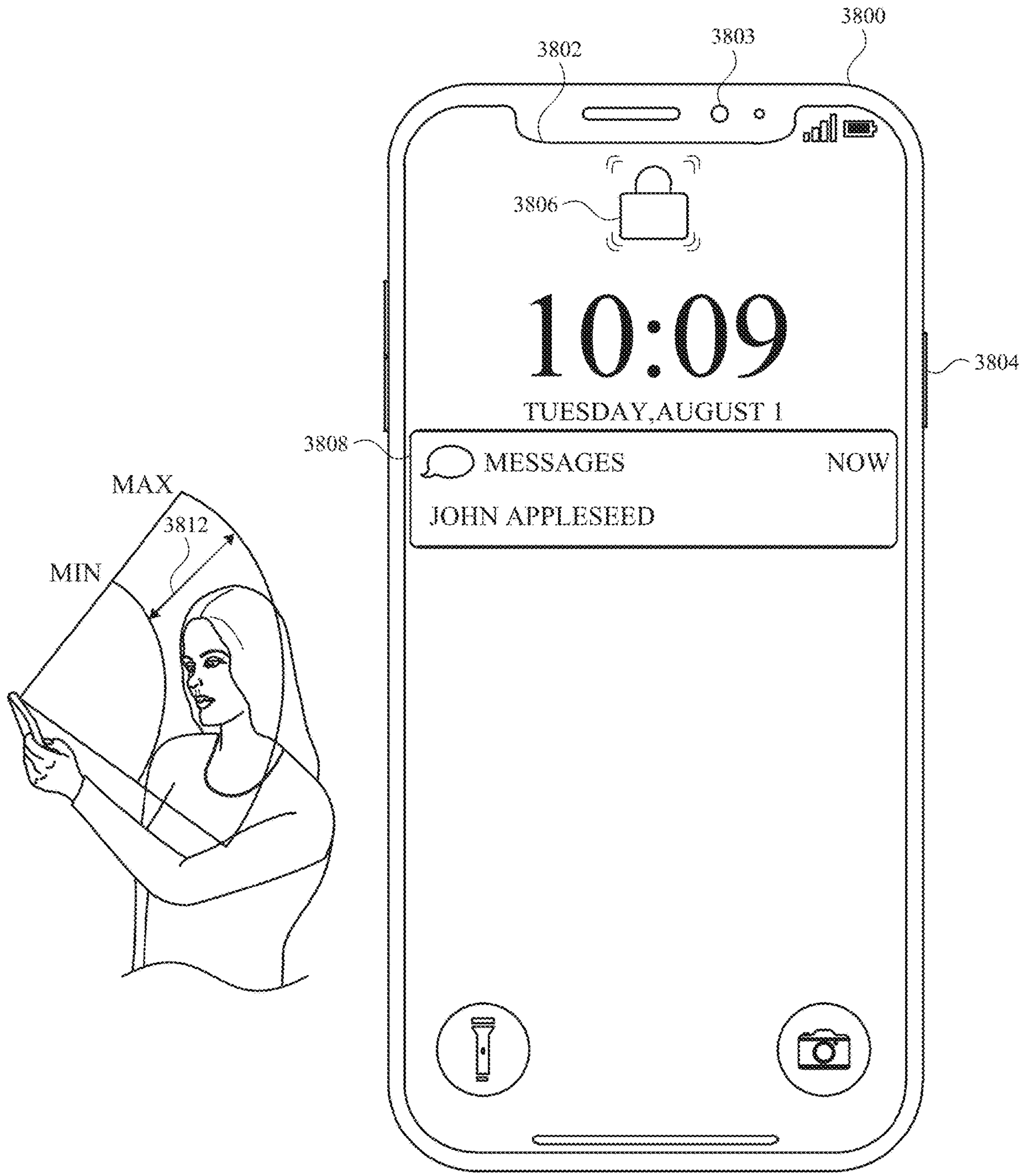

In some examples, instead of determining that authentication is successful as a result of retrying biometric authentication, as discussed above with respect to FIGS. 38L-38O, electronic device 3800 determines that authentication is unsuccessful. In some examples, upon determining that authentication is unsuccessful, electronic device 3800 maintains a locked state, and displays an animation of lock icon 3806 in FIG. 38R alternating between different positions to simulate a "shake" effect. The shake animation provides an indication to the user that biometric authentication has failed and that electronic device 3800 remains in a locked state.

After determining that authentication is unsuccessful, a user can perform an action at electronic device 3800 to trigger retrying biometric authentication. At FIG. 38S, a user triggers retrying biometric authentication by swiping up starting from a region near the bottom edge of display 3802. Electronic device 3800 receives input 3824, and in response, retries biometric authentication. In some examples, after retrying biometric authentication, electronic device 3800 determines that authentication is successful. In some examples, upon determining that authentication is successful as a result of retrying biometric authentication, electronic device 3800 transitions from a locked state to an unlocked state.

Figure 38S:
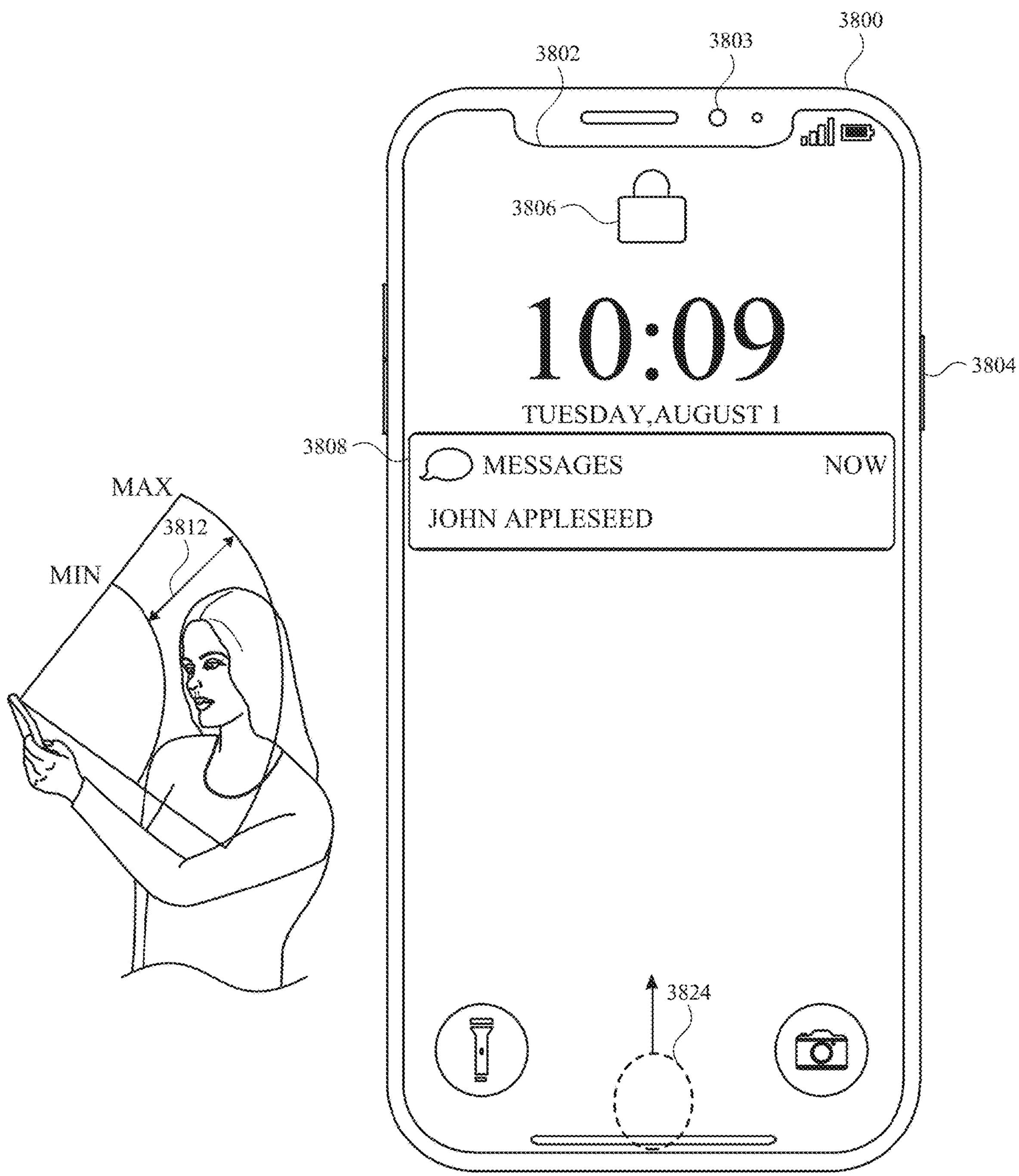
Figure 38T:
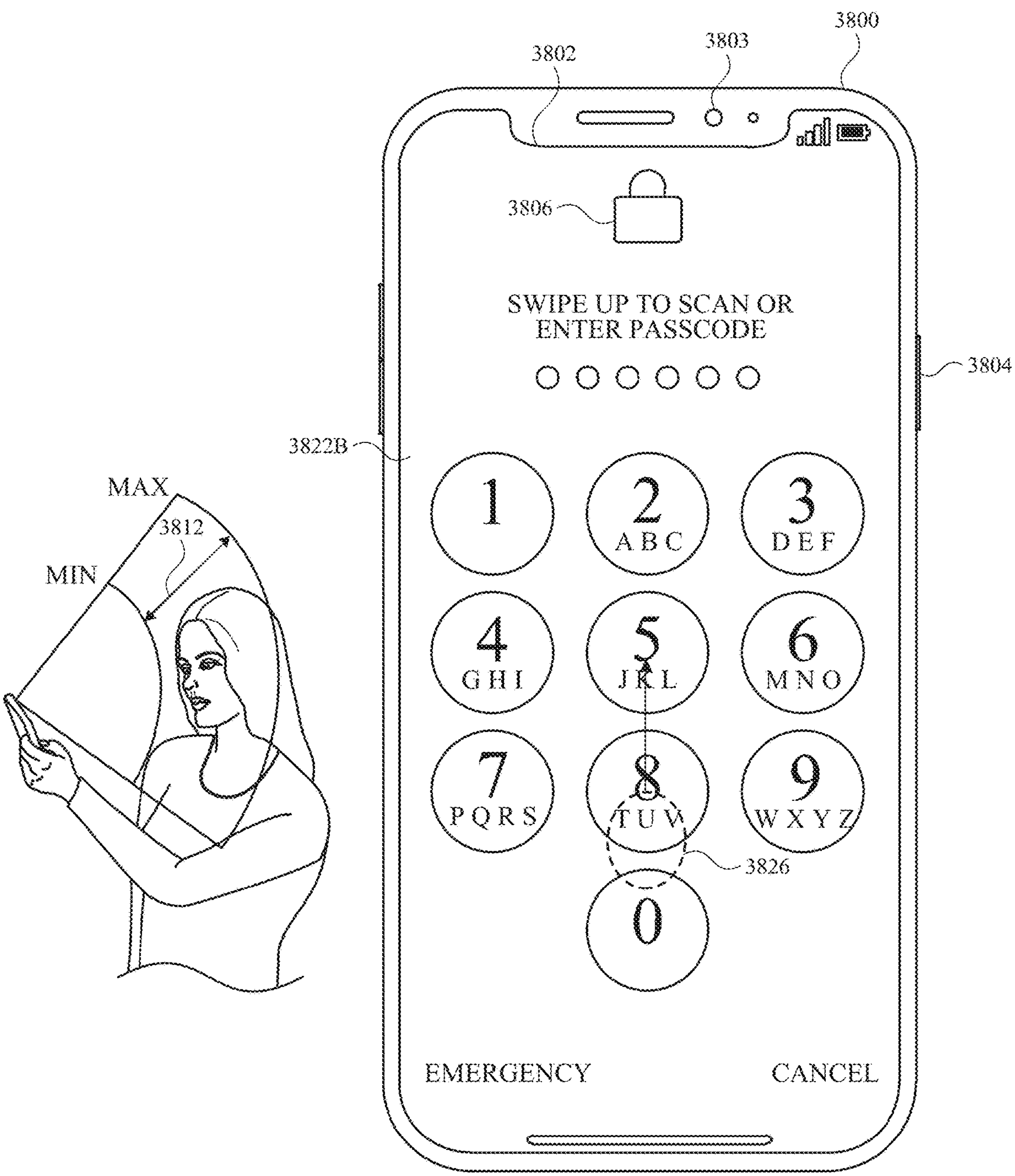

At FIGS. 38S-38T, electronic device determines that authentication is unsuccessful as a result of retrying biometric authentication, in response to input 3824. Upon determining that authentication is unsuccessful as a result of retrying biometric authentication, electronic device 3800 displays passcode entry UI 3822B in FIG. 38T. As described with respect to the processes FIG. 37, a user can again retry biometric authentication at passcode entry UI 3822B by performing an upward swipe (e.g., input 3826). (Passcode entry UI 3822B includes some or all of the features of passcode entry UI 3620, including the relaxed parameters for where the upward swipe must start to initiate biometric authentication.)

Figure 38U:
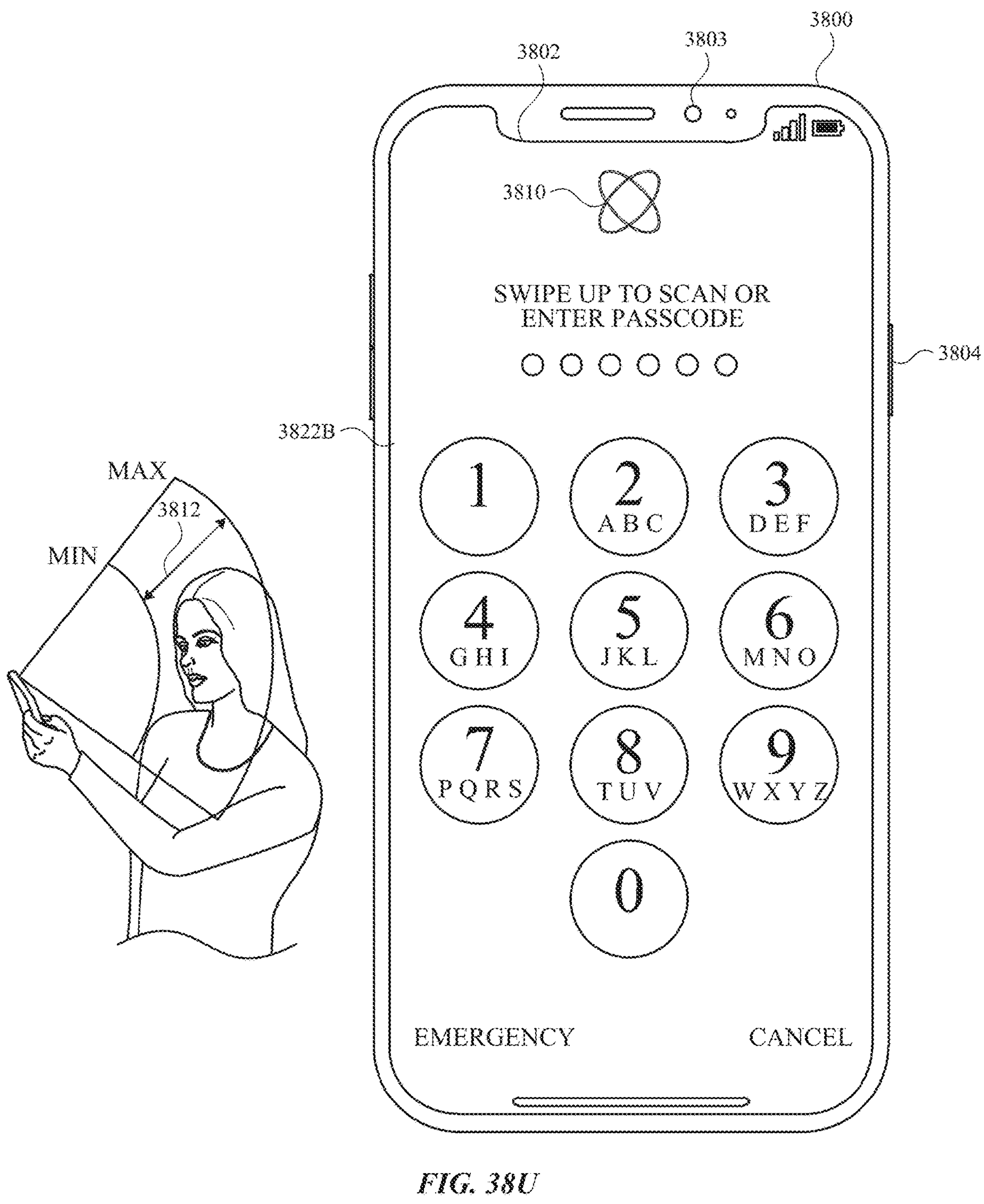
Figure 38V:
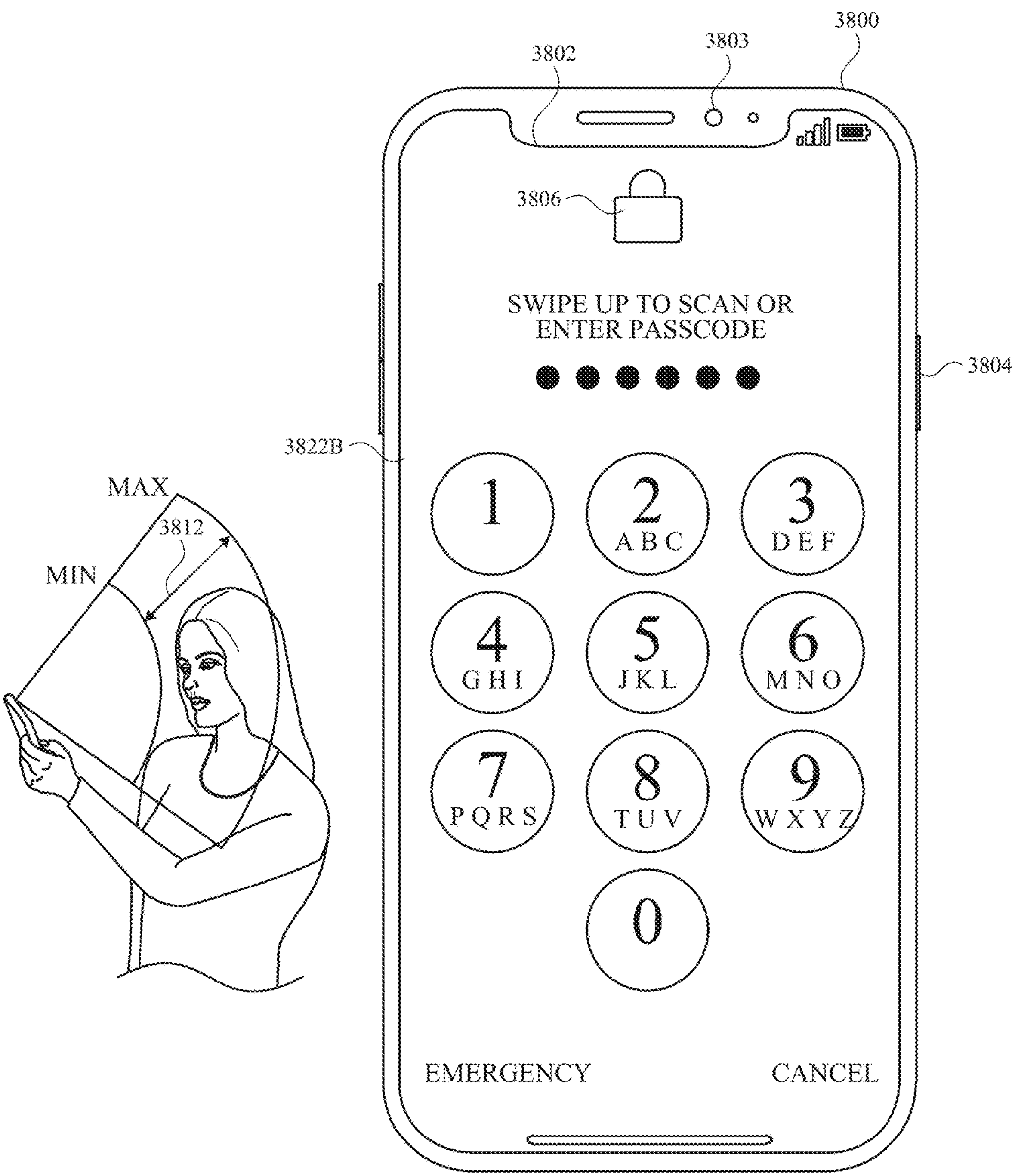
Figure 38W:
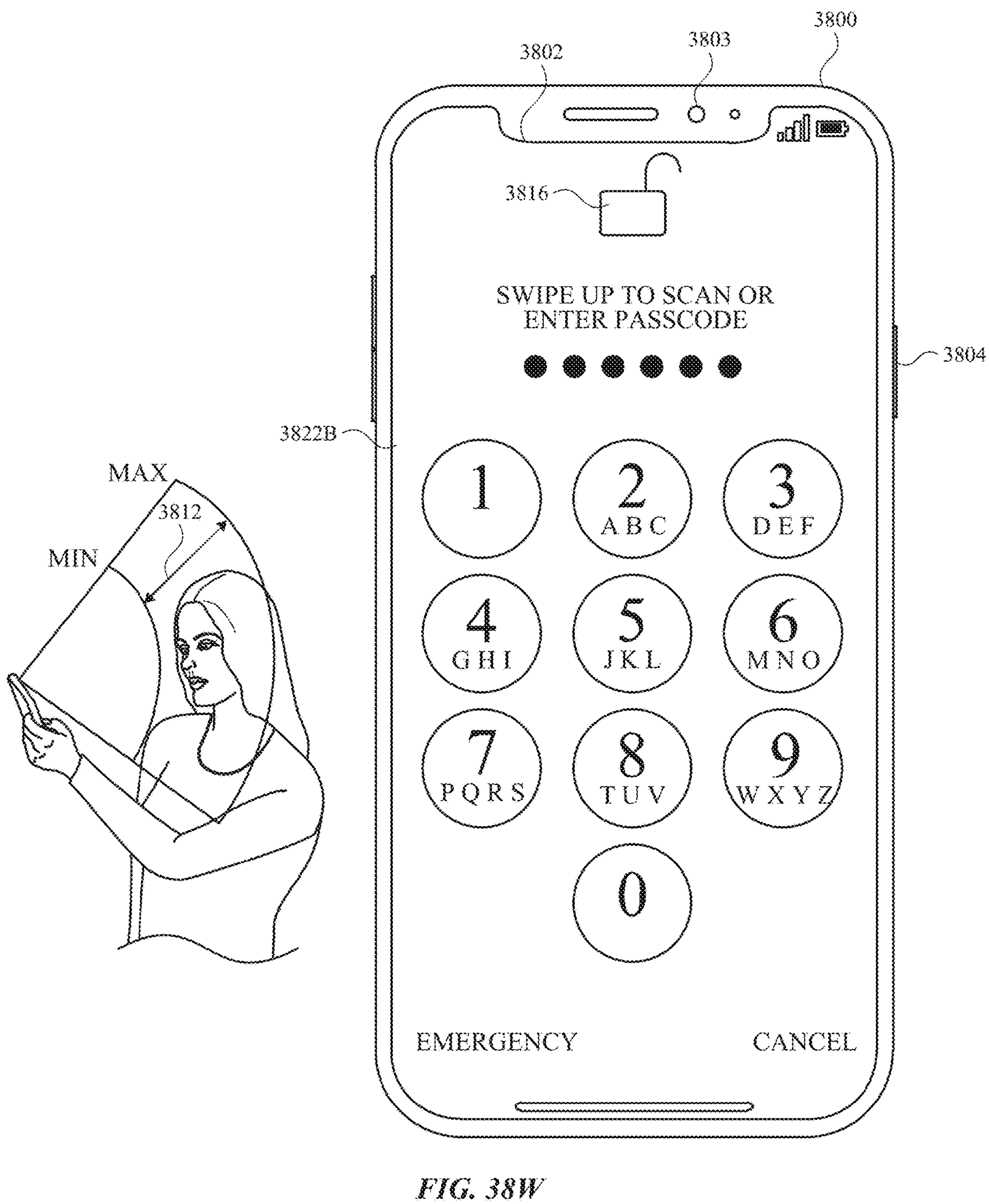

At FIG. 38U, electronic device determines that authentication is successful as a result of retrying biometric authentication at passcode entry UI 3822B. Upon determining that authentication is successful, electronic device transitions from a locked state to an unlocked state, as depicted in FIGS. 38U-38W. In some examples, at FIG. 38U, electronic device determines that authentication is not successful as a result of retrying biometric authentication at passcode entry UI 3822B. In some examples, upon making this determination, electronic device maintains a locked state.

Figure 38X:
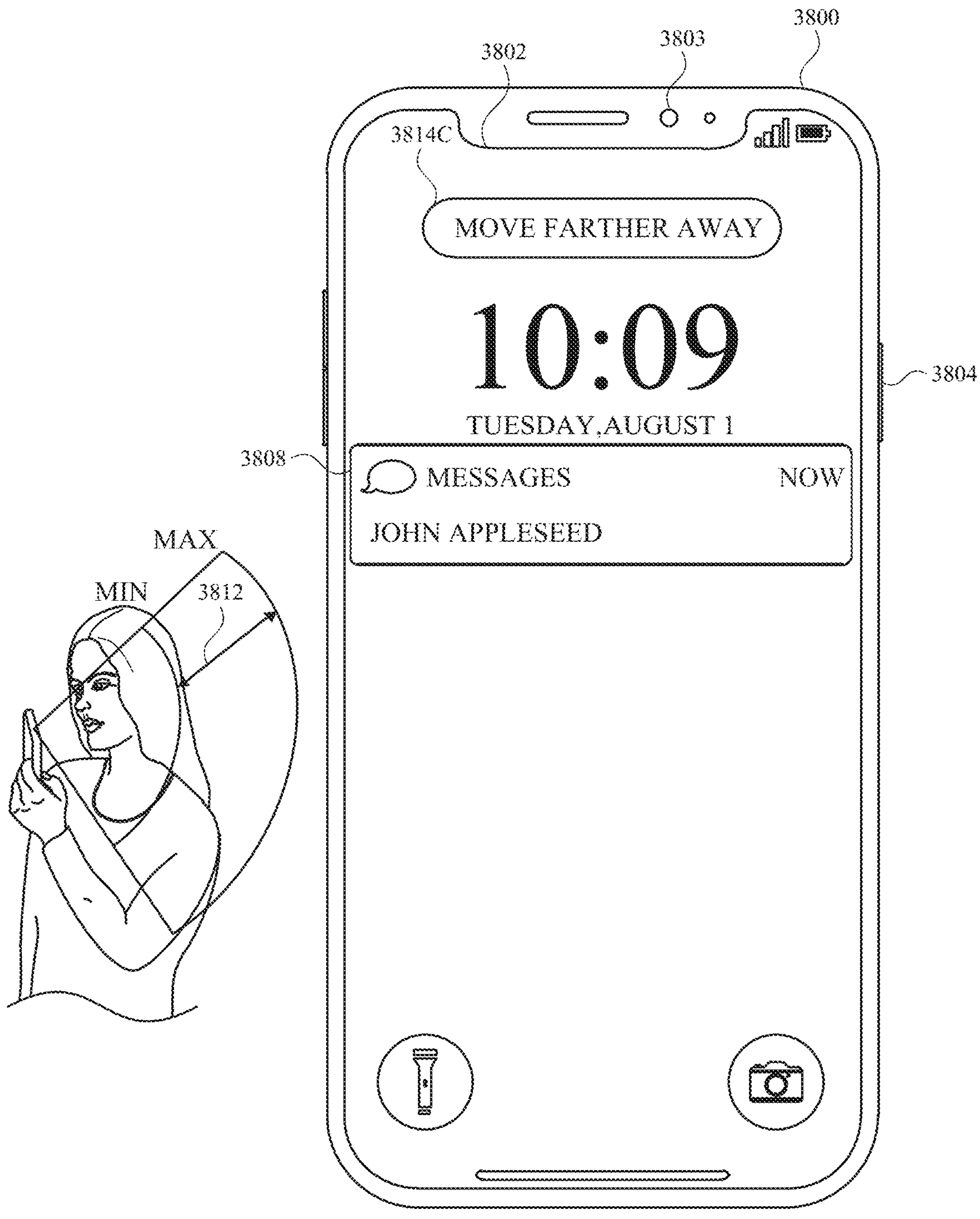

FIGS. 38X-38AD illustrate various error conditions that electronic device 3800 can detect while attempting to biometrically authenticate a user. Instead of displaying error indication 3814A as described above with respect to FIG. 38G, electronic device 3800 can display any one of the error indications described below (e.g., error indication 3814C-I). FIGS. 38X-38AD also depict electronic device 3800 coaching a user (e.g., via error indication 3814C-I) to take an action to correct the detected error condition so that electronic device 3800 can retry biometrically authenticating the user.

At FIG. 38X, a user's face is positioned too close to biometric sensor 3803. As a result, electronic device 3800 determines that the user's face is positioned outside acceptable distance range 3812 (e.g., below the minimum threshold range). Upon determining that the user's face is positioned outside acceptable distance range 3812, electronic device 3800 displays error indication 3814C, which prompts the user to move her face farther away from biometric sensor 3803. Error indication 3814C also provides an indication of the cause of the error condition (e.g., an indication that the user's face is too close to biometric sensor 3803.)

Figure 38Y:

At FIG. 38Y, a user's hand is covering biometric sensor 3803. As a result, electronic device 3800 determines that an object (e.g., a user's hand) is covering biometric sensor 3803 such that the sensor is unable to obtain any information about the user's face. Upon determining that an object is covering biometric sensor 3803, electronic device 3800 displays error indication 3814D, which prompts the user to move the user to move her hand away from biometric sensor 3803. Error indication 3814D also provides an indication of the cause of the error condition (e.g., an indication that biometric sensor 3803 is covered).

Figure 38Z:
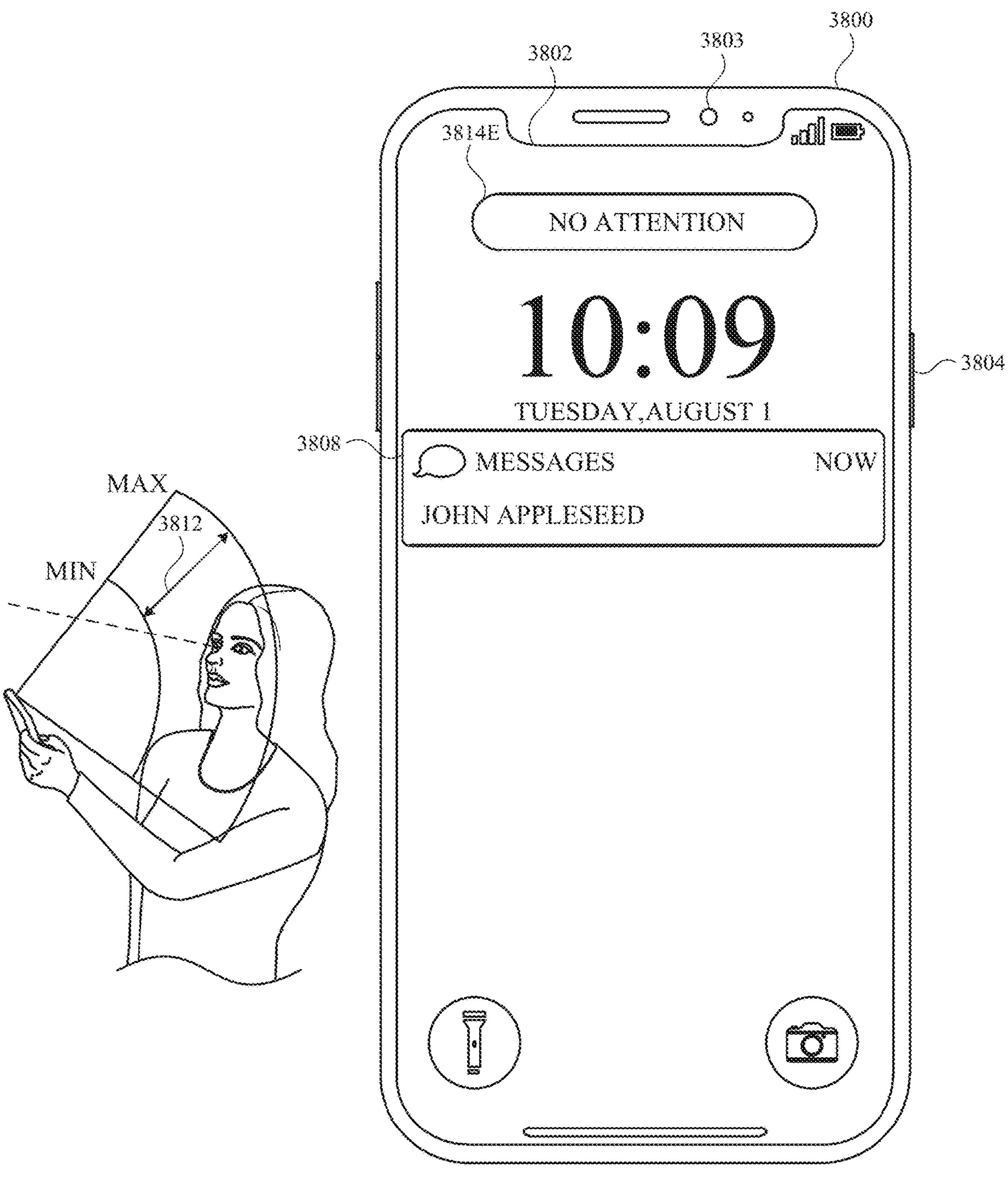
Figure 38A:
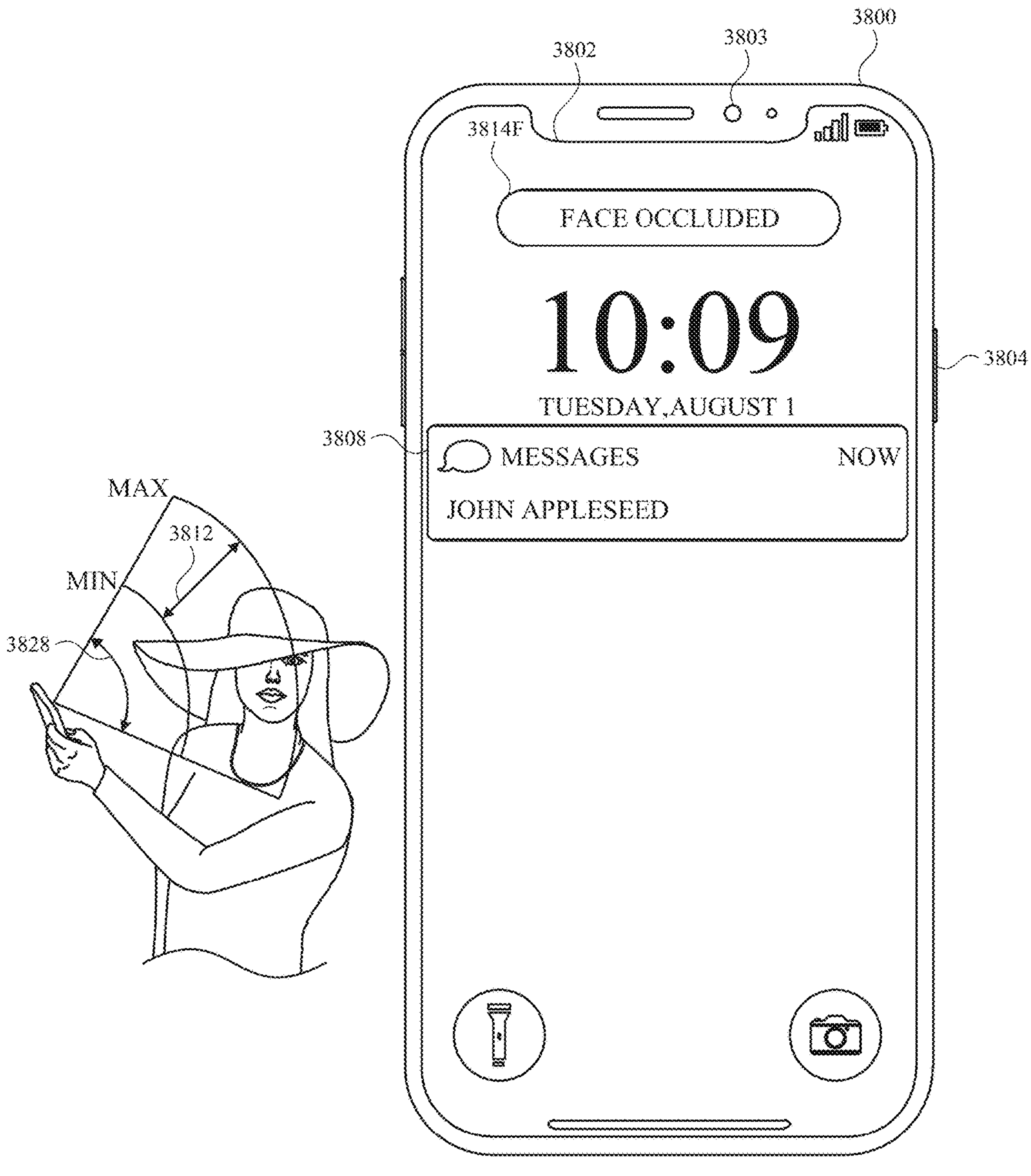
Figure 38A:
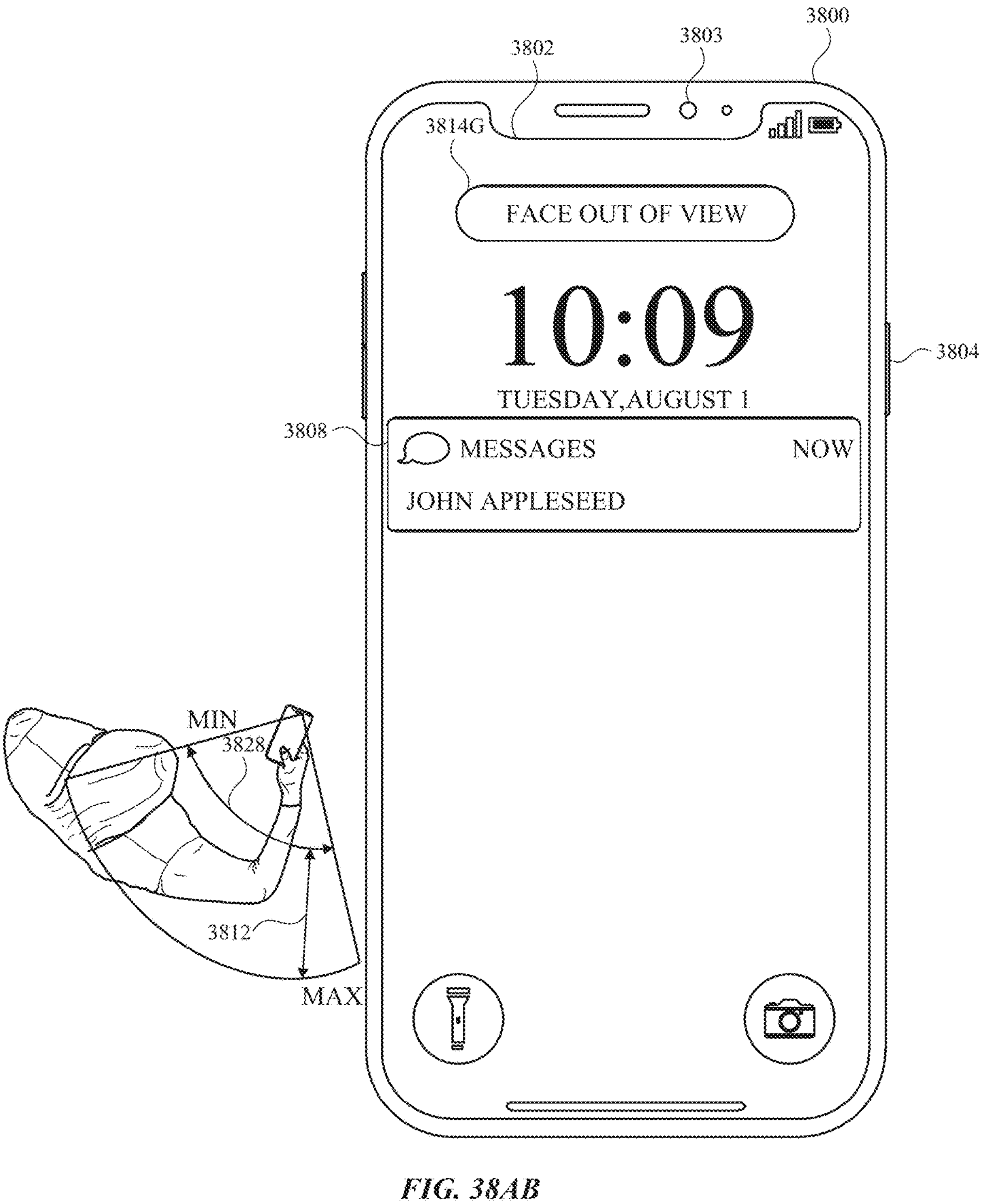
Figure 38A:
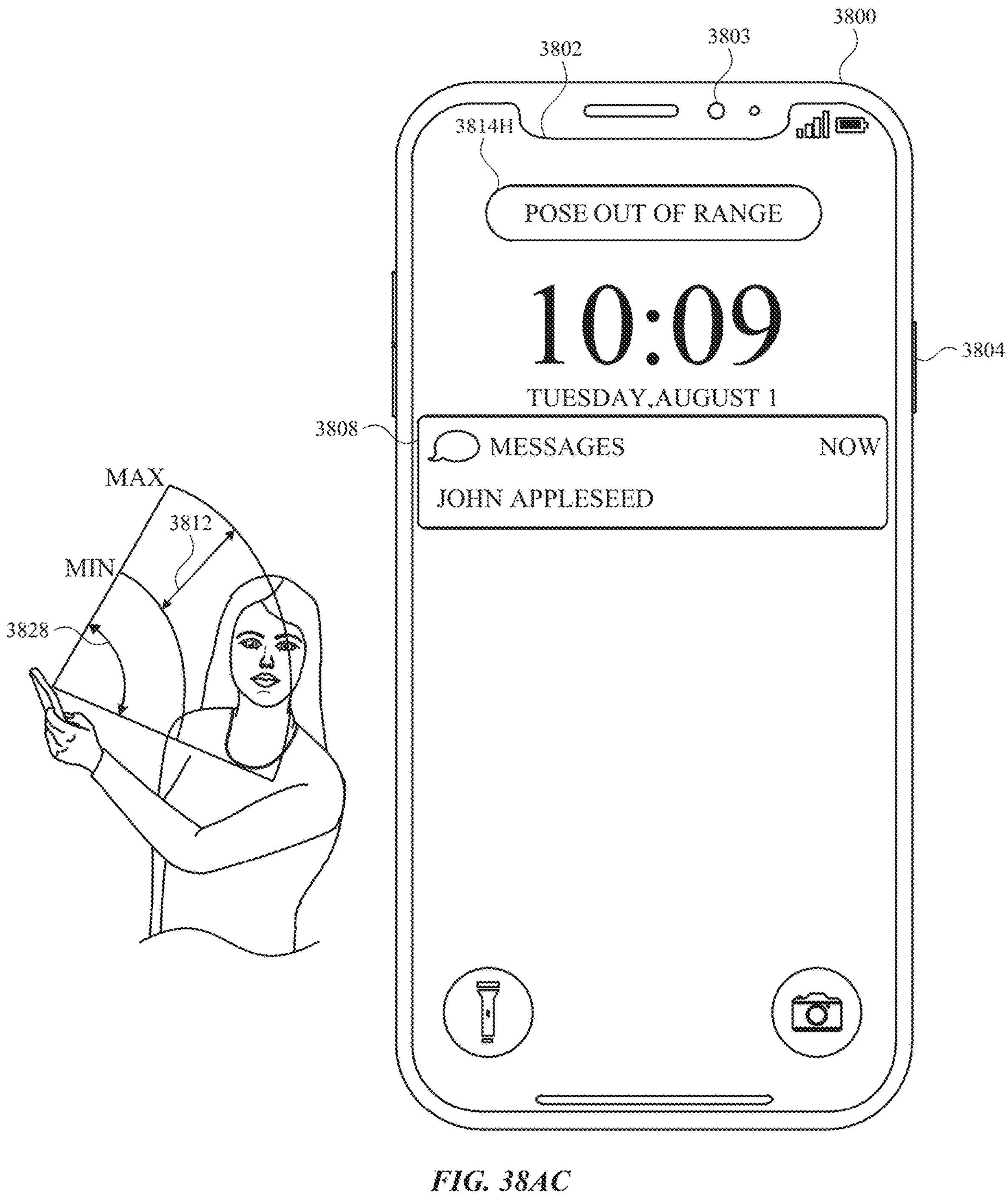
Figure 38A:
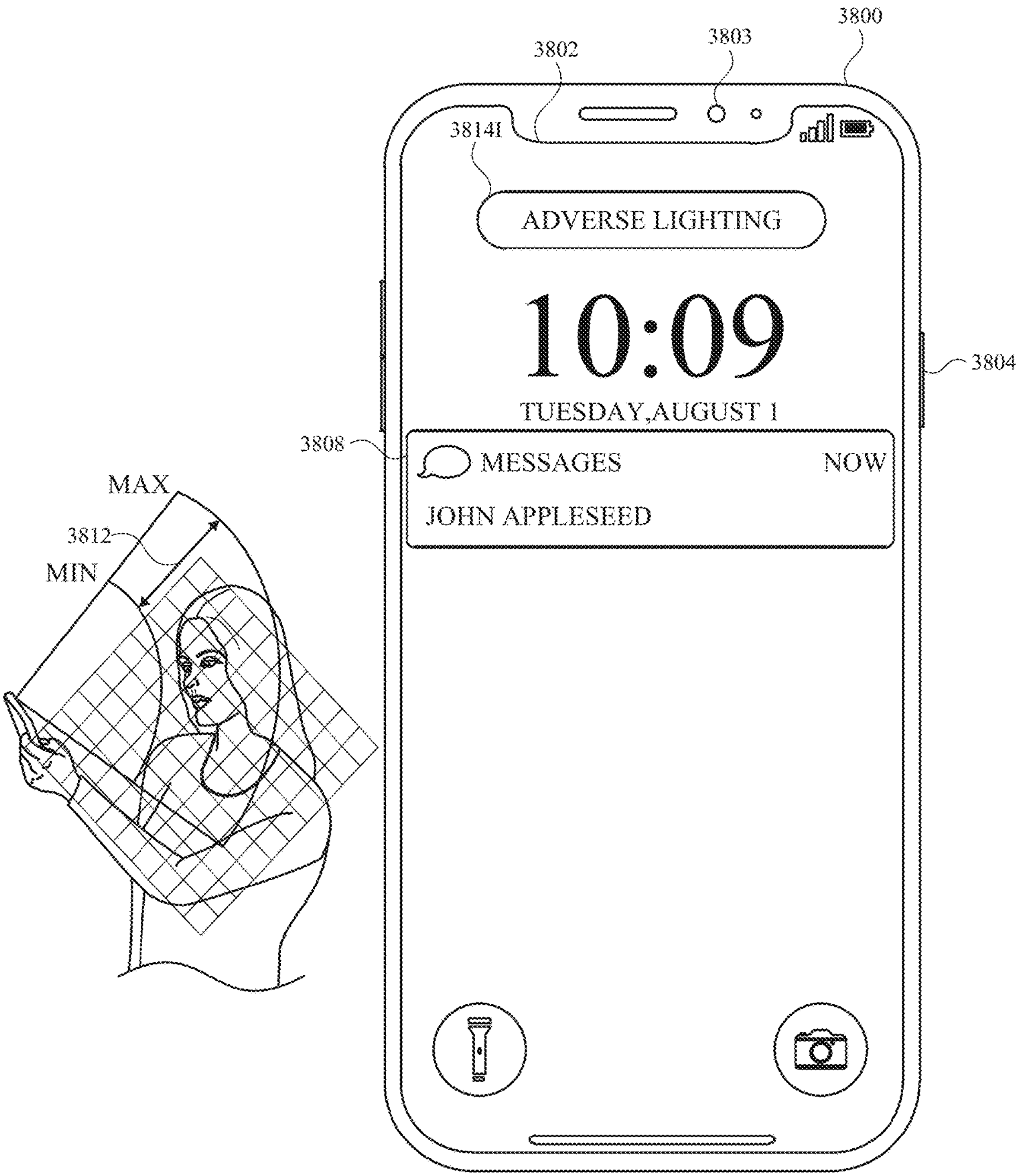

At FIG. 38Z, a user is not looking at electronic device 3800. As a result, electronic device 3800 determines that the user's eyes are not looking at the device. Upon determining that the user's eyes are not looking at the device, electronic device 3800 displays error indication 3814E, which prompts the user to look at the device to correct the error condition. Error indication 3814E also provides an indication of the cause of the error condition (e.g., an indication that the user is not looking at the device.

At FIG. 38AA, a user's face is within field of view 3828, but the user is wearing a hat. As a result, electronic device 3800 determines that a portion of the user's face is obscured (or occluded). For example, electronic device 3800 obtains partial information about a user's face using biometric sensor 3803, where the partial information is below the threshold amount needed for comparison with the stored authorized credentials. Upon determining that a portion of the user's face is obscured, electronic device 3800 displays error indication 3814F, which prompts the user to remove the hat. Error indication 3814F also provides an indication of the cause of the error condition (e.g., an indication that a portion of the user's face is obscured).

At FIG. 38AB, a user's face is outside field of view 3828 of biometric sensor 3803. As a result, electronic device 3800 determines that the user's face is outside field of view 3828 of biometric sensor 3803. In some examples, the user's face is outside field of view 3828 when more than a threshold portion of the face is outside the field of view. In some examples, the user's face is outside field of view 3828 when no face is detected within the field of view. Upon determining that the user's face is outside field of view 3828, electronic device 3800 displays error indication 3814G, which prompts the user to move her face to within field of view 3828. Error indication 3814G also provides an indication of the cause of the error condition (e.g., an indication that the user's face is outside field of view 3814G).

At FIG. 38AC, a user's face is within field of view 3828, but is turned away from biometric sensor 3803. As a result, electronic device 3800 determines that the user's face is turned away from biometric sensor 3803. Upon determining that the user's face is turned away from biometric sensor 3803, electronic device 3800 displays error indication 3814H, which prompts the user to turn her face towards the sensor. Error indication 3814H also provides an indication of the cause of the error condition (e.g., an indication that the user's face is turned away from biometric sensor 3803).

At FIG. 38AD, a user's face is positioned appropriately within the field of view and acceptable distance range of biometric sensor 3803. However, the lighting conditions of the environment in which the user is located are not suitable for performing biometric authentication. Specifically, the amount of light is so great that it interferes with performing biometric authentication. As a result, electronic device 3800 determines (e.g., via one or more ambient light sensors) that the amount of light exceeds a predefined threshold. Upon determining that the amount of light exceeds the threshold, electronic device 3800 displays error indication 3814I, which prompts the user to seek improved lighting conditions with a lower amount of light. Error indication 3814I also provides an indication of the cause of the error condition (e.g., an indication that the light conditions are not suitable for performing biometric authentication).

FIGS. 39A-39B are flow diagrams illustrating a method for providing indications of error conditions during biometric authentication, in accordance with some examples. Method 3900 is performed at an electronic device (e.g., 100, 300, 500, 3800) with a display (e.g., 3802) and one or more input devices (e.g., an accelerometer (e.g., 168), a touchscreen of a display (e.g., 3802)). In some examples, the electronic device includes one or more biometric sensors (e.g., a fingerprint sensor, a contactless biometric sensor (e.g., a biometric sensor that does not require physical contact, such as a thermal or optical facial recognition sensor), an iris scanner). In some examples, the one or more biometric sensors include one or more cameras. Some operations in method 3900 are, optionally, combined, the orders of some operations are, optionally, changed, and some operations are, optionally, omitted.

As described below, method 3900 provides an intuitive way for providing indications of error conditions during biometric authentication. The method reduces the cognitive burden on a user for performing biometric authentication, thereby creating a more efficient human-machine interface. For battery-operated computing devices, enabling a user to perform biometric authentication faster and more efficiently conserves power and increases the time between battery charges.

The electronic device (e.g., 100, 300, 500, 3800) receives (3902), via the one or more input devices (e.g., an accelerometer (e.g., 168), a touchscreen of a display (e.g., 3802)), a request to perform an operation that requires authentication (e.g., biometric authentication). In some examples, the request to perform an operation that requires authentication includes a request to unlock the device (e.g., a swipe at a predefined location). In some examples, the request is triggered by lifting the device from a substantially horizontal position.

In response (3904) to the request to perform the operation that requires authentication (e.g., biometric authentication) and in accordance (3906) with a determination that authentication (e.g., biometric authentication) is successful, the electronic device performs the operation. In some examples, authentication is successful when a user input (e.g., data obtained from one or more biometric sensors that correspond to a biometric feature (e.g., face, finger) of a user, passcode) corresponds to (e.g., matches) an authorized credential (e.g., an enrolled fingerprint, face, or passcode). In some examples, a user input corresponds to an authorized credential when the user input matches the authorized credential.

In response (3904) to the request to perform the operation that requires authentication (e.g., biometric authentication) and in accordance (3908) with a determination that authentication (e.g., biometric authentication) is not successful and that a set of error condition criteria is met (e.g., an error condition exists), the electronic device (e.g., 100, 300, 500, 3800) displays (3910), on the display (e.g., 3802), an indication of an error condition (e.g., 3814A-I) (e.g., of the set of error condition criteria) and forgoes (3916) performing the operation. The indication includes (3912) information about the cause of the error condition. In some examples, authentication is not successful when a user input (e.g., data obtained from one or more biometric sensors that correspond to a biometric feature (e.g., face, finger) of a user, passcode) does not correspond to (e.g., match) an authorized credential (e.g., an enrolled fingerprint, face, or passcode). In some examples, a user input does not correspond to an authorized credential when the user input does not match the authorized credential. In some examples, the set of error condition criteria includes only one criterion. Displaying the indication of the error condition provides the user with feedback about the current state of the device (e.g., that an error condition is preventing successful biometric authentication) and prompts the user to take further action to correct the error condition. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Moreover, forgoing performing the operation when biometric authentication has failed and an error condition is detected enhances security and reduces the instances of multiple resource-intensive re-attempts of biometric authentication that is likely to fail due to the error condition. Providing improved security enhances the operability of the device and makes the user-device interface more efficient (e.g., by restricting unauthorized access) which, additionally, reduces power usage and improves battery life of the device by limiting the performance of restricted operations.

In some examples, in response (3904) to the request to perform the operation that requires authentication and in accordance (3926) with a determination that authentication (e.g., biometric authentication) is not successful and that the set of error condition criteria is not met, the electronic device (e.g., 100, 300, 500, 3800) forgoes (3928) displaying, on the display (e.g., 3802), the indication of the error condition and forgoes (3930) performing the operation.

In some examples, the indication (e.g., 3814A-I) of the error condition includes (3914) an indication of a user action (e.g., visible indication (e.g., graphic or text)) that can be performed to correct the error condition (e.g., for a subsequent authentication attempt). In some examples, the indication of the user action indicates how to correct the error condition for a subsequent authentication attempt. Displaying an indication of a user action that can be performed to correct the error condition provides feedback to the user as to what course of action to take so that the user can be biometrically authenticated in a subsequent authentication attempt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, the indication (e.g., 3814A-I) of the error condition includes information (e.g., an indication of a user action and/or device condition, visible indication (e.g., graphic or text)) about a cause of the error condition. Displaying an indication of the cause of the error condition provides feedback to the user as to what course of action to take so that the user can be biometrically authenticated in a subsequent authentication attempt. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, the set of error condition criteria includes a requirement that is met when a biometric feature (e.g., a fingerprint, a face) of a first type (e.g., a type that corresponds to authorized biometric features) is detected using one or more biometric sensors (e.g., 3803) of the electronic device. In some examples, the indication of the error condition (e.g., 3814A-I) is not displayed if a potentially valid biometric feature is not detected (e.g., signifying that a user is not currently engaging with the device). Forgoing displaying the indication of the error condition when no biometric feature is detected prevents potentially confusing the user, for it is likely that the user did not intend to perform biometric authentication if no biometric feature is detected. Thus, forgoing displaying the indication in this scenario makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in accordance with a determination that authentication (e.g., biometric authentication) is successful, the electronic device (e.g., 100, 300, 500, 3800) forgoes displaying, on the display (e.g., 3802), the indication of the error condition (e.g., 3814A-I).

In some examples, subsequent to displaying the indication of the error condition (e.g., 3814A-I) and in accordance with a determination that the set of error condition criteria continues to be met, the electronic device (e.g., 100, 300, 500, 3800) forgoes (3918) attempting (and, optionally, disabling further attempts at) biometric authentication on the electronic device (e.g., biometric authentication functionality is not available on the device while the set of error conditions are met). In some examples, subsequent to displaying the indication of the error condition and in accordance with a determination that the set of error condition criteria is no longer met, the electronic device enables (3922) retrying biometric authentication on the electronic device (e.g., the error condition is no longer present (e.g., has been corrected (e.g., due to the user taking an action to correct the error condition))). Automatically retrying biometric authentication when the set of error condition criteria is no longer met allows the user to quickly attempt to biometrically authenticate herself without requiring that the user explicitly request biometric authentication. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, subsequent to displaying the indication of the error condition and in response to the determination that the set of error condition criteria is no longer met, the electronic device retries (3924) authentication (e.g., biometric authentication) (e.g., automatically retrying authentication). In some examples, retrying authentication includes attempting to match biometric information obtained by one or more biometric sensors with authorized credentials (e.g., stored data that has been authorized for use in biometric authentication). In some examples, the determination that the error condition is not met occurs subsequent to (or in response to) receiving an input to correct the error condition. In some examples, retrying authentication occurs (or only occurs) in accordance with a determination that the error condition is not met due to detecting a user input that causes the error condition to not be met.

In some examples, subsequent to the determination that the set of error condition criteria is no longer met (e.g., detecting that the error condition has been corrected), the electronic device (e.g., 100, 300, 500, 3800) receives, via the one or more input devices, an input (e.g., 3824, 3826) corresponding to a request to retry authentication. In some examples, the input is a touch gesture input (e.g., tap, a swipe (e.g., an upward swipe)) or an activation of a hardware button (e.g., power button). In some examples, in response to receiving the input corresponding to the request to retry authentication, the electronic device retries authentication (e.g., biometric authentication) (e.g., automatically retrying authentication). In some examples, retrying authentication includes attempting to match biometric information obtained by one or more biometric sensors with authorized credentials (e.g., stored data that has been authorized for use in biometric authentication). In some examples, retrying authentication includes using one or more biometric sensors to obtain data of a biometric feature (e.g., face, fingerprint) of the user.

In some examples, displaying the indication of the error condition (e.g., 3814A-I) includes an animation (e.g., shimmering) indicating that an attempt to authenticate is ongoing. In some examples, the attempt to authenticate includes attempting to detect biometric information using one or more biometric sensors. Displaying a shimmering animation indicating that an attempt to authenticate is ongoing provides feedback to the user as to the current state of the device and that no further action is required at this time. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication In some examples, subsequent to (or in response to) receiving the request to perform the operation that requires authentication and prior to displaying the indication of the error condition (e.g., 3814A-I), the electronic device (e.g., 100, 300, 500, 3800) performs authentication. In some examples, while performing authentication, electronic device 3800 displays, on the display (e.g., 3802), a first indication (e.g., 3810, 3814A-I) (e.g., rings that rotate around a sphere, a user interface object that shimmers, where the user interface object includes the indication of the error condition) that the electronic device is using one or more biometric sensors (e.g., 3803) of the electronic device to obtain information about a biometric feature. In some examples, displaying the indication of the error condition includes replacing the display of the first indication with the display of the indication of the error condition. Displaying an indication that biometric authentication is occurring provides the user with feedback about the current state of the device (e.g., biometric authentication is being performed) and that the user does not need to take any action at this time. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, while performing the authentication, the electronic device (e.g., 100, 300, 500, 3800) displays, on the display (e.g., 3802), a first lock icon (e.g., 3806) (e.g., an icon indicative of the locked state of the electronic device) and a first animation that transitions from the first lock icon to the first indication. In some examples, subsequent to displaying the indication of the error condition (e.g., and in accordance with a determination that authentication is successful) and subsequent to displaying the first animation, the electronic device displays, on the display (e.g., 3802), a second animation that transitions from the indication of the error condition to an unlock icon (e.g., 3816) (e.g., an icon indication of the locked state of the electronic device). In some examples, the first animation and the second animation show a morphing from one object to the next object. In some examples, the second animation includes displaying a first lock icon subsequent to the indication of the error condition and prior to the unlock icon.

In some examples, subsequent to displaying the indication of the error condition, the electronic device displays, on the display (e.g., 3802), an animation that transitions from the indication of the error condition to a second lock icon (e.g., 3806) or from a second indication (e.g., 3810, 3814A-I) (e.g., rings that rotate around a sphere) that the electronic device is using one or more biometric sensors of the electronic device to obtain information about a biometric feature to the second lock icon (e.g., an icon indicative of the locked state of the electronic device). In some examples, the second lock icon is the first lock icon. In some examples, the second indication is the first indication.

In some examples, while retrying authentication and subsequent to displaying the indication of the error condition and in accordance with a determination that the error condition is absent, the electronic device displays, on the display, a third indication (e.g., 3810, 3814A-I) (e.g., rings that rotate around a sphere, a user interface object that shimmers, where the user interface object includes the indication of the error condition) that the electronic device is using one or more biometric sensors of the electronic device to obtain information about a biometric feature. In some examples, the third indication is the first indication.

In some examples, prior to displaying the indication of the error condition, the electronic device (e.g., 100, 300, 500, 3800) displays, on the display (e.g., 3802), a third lock icon (e.g., 3806) at a location on the display (e.g., an icon indicative of the locked state of the electronic device). In some examples, the indication of the error condition (e.g., 3814A-I) is displayed proximate to (e.g., near, adjacent to, at, within a predetermined distance of) the location on the display. In some examples, the third lock icon is the first lock icon and/or the second lock icon.

In some examples, when the electronic device is in a locked state while receiving the request to perform the operation that requires authentication and in accordance with the determination that authentication is successful, the electronic device (e.g., 100, 300, 500, 3800) transitions from the locked state to an unlocked state. In some examples, the operation that requires authentication is transitioning the electronic device from a locked state to an unlocked state. In some examples, when the electronic device is in a locked state while receiving the request to perform the operation that requires authentication and in accordance with the determination that authentication is not successful, the electronic device maintains the locked state. Maintaining the device in the locked state when authentication is unsuccessful enhances device security by preventing fraudulent and/or unauthorized access to the device. Improving security measures of the device enhances the operability of the device by preventing unauthorized access to content and operations and, additionally, reduces power usage and improves battery life of the device by enabling the user to use the device more efficiently.

In some examples, when the electronic device is in a locked state while receiving the request to perform the operation that requires authentication and in accordance with the determination that authentication is not successful, the electronic device (e.g., 100, 300, 500, 3800) maintains the locked state and retries authentication (e.g., biometric authentication) (e.g., automatically retrying authentication). In some examples, retrying authentication includes attempting to obtain information about a biometric feature (e.g., face, fingerprint) using one or more biometric sensors of the electronic device. In some examples, retrying authentication includes attempting to match biometric information obtained by one or more biometric sensors with authorized credentials (e.g., stored data that has been authorized for use in biometric authentication). In some examples, after retrying authentication and in accordance with a determination that authentication resulting from retrying authentication is successful, the electronic device transitions from the locked state to an unlocked state. In some examples, after retrying authentication and in accordance with a determination that authentication resulting from retrying authentication is not successful, the electronic device maintains the locked state.

In some examples, subsequent to (or in response to) receiving the request to perform the operation that requires authentication, the electronic device (e.g., 100, 300, 500, 3800) attempts authentication (e.g., biometric authentication). In some examples, while attempting authentication, the electronic device displays, on the display (e.g., 3802), a third indication (e.g., 3810, 3814A-I) (e.g., rings that rotate around a sphere) that the electronic device is using one or more biometric sensors of the electronic device to obtain information about a biometric feature (e.g., face, fingerprint). In some examples, the indication is a scanning animation. In some examples, the third indication is the first indication and/or the second indication. In some examples, while retrying authentication, the electronic device maintains display of the third indication on the display (e.g., 3802).

In some examples, in accordance with the determination that authentication resulting from retrying authentication is not successful, the electronic device displays, on the display (e.g., 3802), an animation with a lock icon (e.g., 3806) (e.g., an icon indicative of the locked state of the electronic device) alternating between a first position and a second position, the second position being different from the first position. In some examples, the animation with the lock icon is an animation of the lock icon shaking (e.g., side to side, rotating back and forth). In some examples, the electronic device displays an animation involving the lock icon to indicate that biometric authentication has failed. In some examples, a tactile output is provided in combination with the shaking lock icon. In some examples, no tactile output is provided. In some examples, in accordance with a determination that the biometric information captured using the one or more biometric sensors does not correspond to or does not match the authorization credentials, the electronic device (e.g., 100, 300, 500, 3800) maintains the locked state of the electronic device. Displaying an animation of the lock icon shaking provides the user with feedback about the current state of the device (e.g., that biometric authentication has failed) and prompts the user to take further action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 100, 300, 500, 3800) includes a biometric sensor (e.g., 3803) and the set of error condition criteria includes one or more of the following error condition criterions:

A distance of the biometric feature from the biometric sensor exceeds a first predetermined threshold distance (e.g., the biometric feature (e.g., face) is too far from the biometric sensor) or exceeds the maximum of a distance range (e.g., 3812). In some examples, exceeding the first predetermined threshold or the maximum of a distance range is highly correlated with degradation or reduced accuracy of the information about the biometric feature obtained by the biometric sensor). In some examples, the user can correct this error condition by moving the user's face closer to the biometric sensor.

A distance of the biometric feature from the biometric sensor is below a second predetermined threshold distance (e.g., the biometric feature (e.g., face) is too close to the biometric sensor) or falls below the minimum of a distance range (e.g., 3812). In some examples, falling below the second predetermined threshold or the minimum of a distance range is highly correlated with degradation or reduced accuracy of the information about the biometric feature obtained by the biometric sensor. In some examples, the user can correct this error condition by moving the user's face farther away from the biometric sensor.

The biometric sensor (e.g., 3803) is occluded (e.g., partially occluded, fully occluded, occluded to a degree sufficient to inhibit operation of the sensor) (e.g., occluded by a portion of the user (e.g., a hand), while interacting with the electronic device). In some examples, the user can correct this error condition by moving the user's hand away from the biometric sensor.

A sub-portion of a detected biometric feature (e.g., eyes of a detected face) is not oriented towards the biometric sensor (e.g., one or more eyes are not focused on the electronic device (e.g., biometric sensor)). In some examples, the user can correct this error condition by opening the user's eyes or looking at the electronic device (e.g., biometric sensor).

At least a portion of the detected biometric feature is occluded (e.g., partially occluded, fully occluded, occluded to a degree sufficient to result in incomplete information about the biometric feature). In some examples, the user can correct this error condition by removing the accessory (e.g., sunglasses) or article of clothing (e.g., scarf, hat) that is blocking the user's face.

No biometric feature is detected within a field of view (e.g., 3828) of the biometric sensor.

A pose (e.g., an orientation with respect to the biometric sensor) of the detected biometric feature exceeds a threshold range (e.g., the biometric feature (e.g., face) is turned away from the biometric sensor). In some examples, exceeding the threshold range is highly correlated with degradation or reduced accuracy of the information about the biometric feature obtained by the biometric sensor. In some examples, the user can correct this error condition by turning the user's face toward the electronic device (e.g., biometric sensor).

The electronic device detects (e.g., via one or more ambient light sensors) an amount of light (e.g., ambient light) that exceeds a predetermined light threshold (e.g., exceeding the predetermined light threshold is highly correlated with degradation or reduced accuracy of the information about the biometric feature obtained by the biometric sensor). In some examples, the user can correct this error condition by turning the user's back towards the sun so as to reduce the amount of light detected by the electronic device or move to a new location that has less ambient light (e.g., indoors).

In some examples, the set of error condition criteria can be a first subset of the error conditions listed above. For example, the first subset can include one or more error condition criterion selected from the group consisting of: the distance of the biometric feature exceeds a first predetermined threshold distance, the distance of the biometric feature is below a second predetermined threshold distance, the biometric feature is out of the field of view of the biometric sensor, and the pose of the biometric feature exceeds a threshold range. The first subset is focused on guiding the user to correct error conditions involving the positioning and/or orientation of the face. As a further example, a second subset can include one or more error condition criterion selected from the group consisting of: the biometric sensor is occluded, and no biometric feature is detected within a field of view of the biometric sensor. The second subset is focused on guiding the user to correct error conditions where the biometric sensor is unable to obtain any information about the biometric feature of the user. For another example, a third subset can include one or more error condition criterion selected from the group consisting of: the pose of the detected biometric feature exceeds a threshold range and the biometric sensor is occluded. The third subset is focused on the error conditions that are likely to occur for devices of a certain form factor/size (e.g., a tablet device (e.g., iPad)).

In some examples, the electronic device (e.g., 100, 300, 500, 3800) includes a biometric sensor (e.g., 3803) at a portion (e.g., a location) of the electronic device (e.g., a portion that is not on the display). In some examples, in response to the request to perform the operation that requires authentication, the electronic device displays, on the display (e.g., 3802), a progress indicator (e.g., 3814A-I) proximate to (e.g., adjacent to, near, within a predetermined distance of) the portion of the electronic device, the progress indicator including the indication of the error condition. Displaying the progress indicator near the biometric sensor provides the user with feedback as to the association of the biometric sensor with the processes occurring at the device (e.g., attempted authentication). Specifically, the user becomes aware of the biometric sensor during biometric authentication such that the user is less likely to perform an action that interferes with the biometric sensor or alternatively, the user is prompted to take corrective action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the indication of the error condition (e.g., 3814B) includes an indication that biometric authentication is currently not enabled on the electronic device in accordance with a determination that biometric authentication is currently not enabled on the electronic device. In some examples, biometric authentication can become unavailable (or not enabled on the electronic device) when one or more of the following conditions have been met: the electronic device has not been successfully authenticated since being turned on or restarted; the electronic device has not been unlocked for more than a predetermined amount of time (e.g., 48 hours); the passcode has not been used to unlock the device for more than a predetermined amount of time (e.g., 156 hours); biometric authentication using a biometric feature (e.g., face, fingerprint) has not been used to unlock device for more than predetermined amount of time (e.g., 4 hours); the electronic device has received a remote lock command; biometric authentication has failed more than a predetermined number of times (e.g., 5, 10, 15) since the last successful authentication with the device; the electronic device has received a power off and/or emergency SOS command, and an explicit request by the user to disable biometric authentication has been detected. Displaying an indication that biometric authentication is currently not enabled provides feedback to the user of the current state of the device and prompts the user to pursue an alternative method to authenticate herself. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the indication that biometric authentication is currently not enabled includes an affordance (e.g., 3814B) (e.g., the indication is an affordance). In some examples, the electronic device (e.g., 100, 300, 500, 3800) receives an input (e.g., 3820) corresponding to the affordance and in response to receiving the input corresponding to the affordance, the electronic device (e.g., 100, 300, 500, 3800) displays, on the display (e.g., 3802), a credential entry user interface (e.g., 3822A) with a plurality of character entry keys. In some examples, the credential entry user interface includes a virtual keypad or virtual keyboard. In some examples, the virtual keypad or virtual keyboard includes a plurality of character entry keys.

In some examples, the electronic device (e.g., 100, 300, 500, 3800) detects a condition that triggers attempting authentication (e.g., biometric authentication). In some examples, the request to perform an operation that requires authentication includes a request to unlock the device (e.g., a swipe at a predefined location). In some examples, in response to detecting the condition that triggers attempting authentication (e.g., biometric authentication) and in accordance with a determination that the condition corresponds to an alert (e.g., 3808) generated by the device without user input directed to the device (e.g., based on the satisfaction of criteria other than detection of user input) while a biometric feature is available for detection by the one or more biometric sensors (e.g., a face is detected in the field of view of one or more face detection sensors such as a depth camera), the electronic device displays a fifth indication (e.g., 3810) (e.g., rings that rotate around a sphere) that the electronic device is using the one or more biometric sensors of the electronic device to obtain information about a biometric feature. In some examples, in accordance with a determination that the condition corresponds to an alert generated by the device without user input directed to the device (e.g., based on the satisfaction of criteria other than detection of user input) while a biometric feature is not available for detection by the one or more biometric sensors (e.g., no face is detected in the field of view of one or more face detection sensors such as a depth camera), the electronic device forgoes displaying the fifth indication (e.g., rings that rotate around a sphere) that the electronic device is using the one or more biometric sensors of the electronic device to obtain information about a biometric feature. In some examples, in accordance with a determination that the condition corresponds to a user input directed to the device (e.g., a request that is not associated with a notification; a request that is a touch gesture input (e.g., tap, a swipe (e.g., 3824) (e.g., an upward swipe) or an activation of a hardware button (e.g., power button) or sensor data indicative of movement (e.g., lifting) of the device)), the electronic device displays the fifth indication that the electronic device is using one or more biometric sensors of the electronic device to obtain information about a biometric feature (e.g., without regard to whether or not the biometric feature is available for detection by the one or more biometric sensors). Forgoing displaying the indication when no face is detected prevents potentially confusing the user, for it is likely that the user does not intend to initiate biometric authentication if no biometric feature is detected. Thus, forgoing displaying the indication in this scenario makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 3900 (e.g., FIGS. 39A-39B) are also applicable in an analogous manner to the methods described below/above. For example, method 3700, method 4100, and/or method 4300 optionally include one or more of the characteristics of the various methods described above with reference to method 3900. For example, the error indications (e.g., 3814A-I) as described with respect to method 3900 can be used to provide indications of error conditions during biometric authentication that is performed in processes described with respect to method 3700 and method 4100. For brevity, these details are not repeated below.

FIGS. 40A-40U illustrate exemplary user interfaces for providing indications about the biometric sensor during biometric authentication, in accordance with some examples. The user interfaces in these figures are used to illustrate the processes described below, including the processes in FIGS. 41A-41C.

FIG. 40A illustrates electronic device 4000 (e.g., portable multifunction device 100, device 300, device 500). In the exemplary examples illustrated in FIGS. 40A-40U, electronic device 4000 is a tablet computer. In other examples, electronic device 4000 can be a different type of electronic device, such as a wearable device (e.g., a smartwatch). Electronic device 4000 includes display 4002, one or more input devices (e.g., touchscreen of display 4002, button 4004, and a microphone), and a wireless communication radio. In some examples, the electronic device includes a plurality of cameras. In some examples, the electronic device includes only one camera. In FIG. 40A, the electronic device includes biometric sensor 4003. In some examples, the biometric sensor is one or more biometric sensors that can include a camera, such as an infrared camera, a thermographic camera, or a combination thereof. In some examples, biometric sensor 4003 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

At FIG. 40A, a user wishes to purchase goods using payment information stored on electronic device 4000. As depicted in FIG. 40A, electronic device 4000 is in a split screen (e.g., multitasking) mode. While in the split screen mode, electronic device 4000 concurrently displays app store user interface (UI) 4006 in left region 4007 of display 4002 and browser UI 4008 in right region 4009 of display 4002. While concurrently displaying app store UI 4006 and browser UI 4008, electronic device 4000 receives input 4010 at purchase affordance 4012.

Figure 40B:
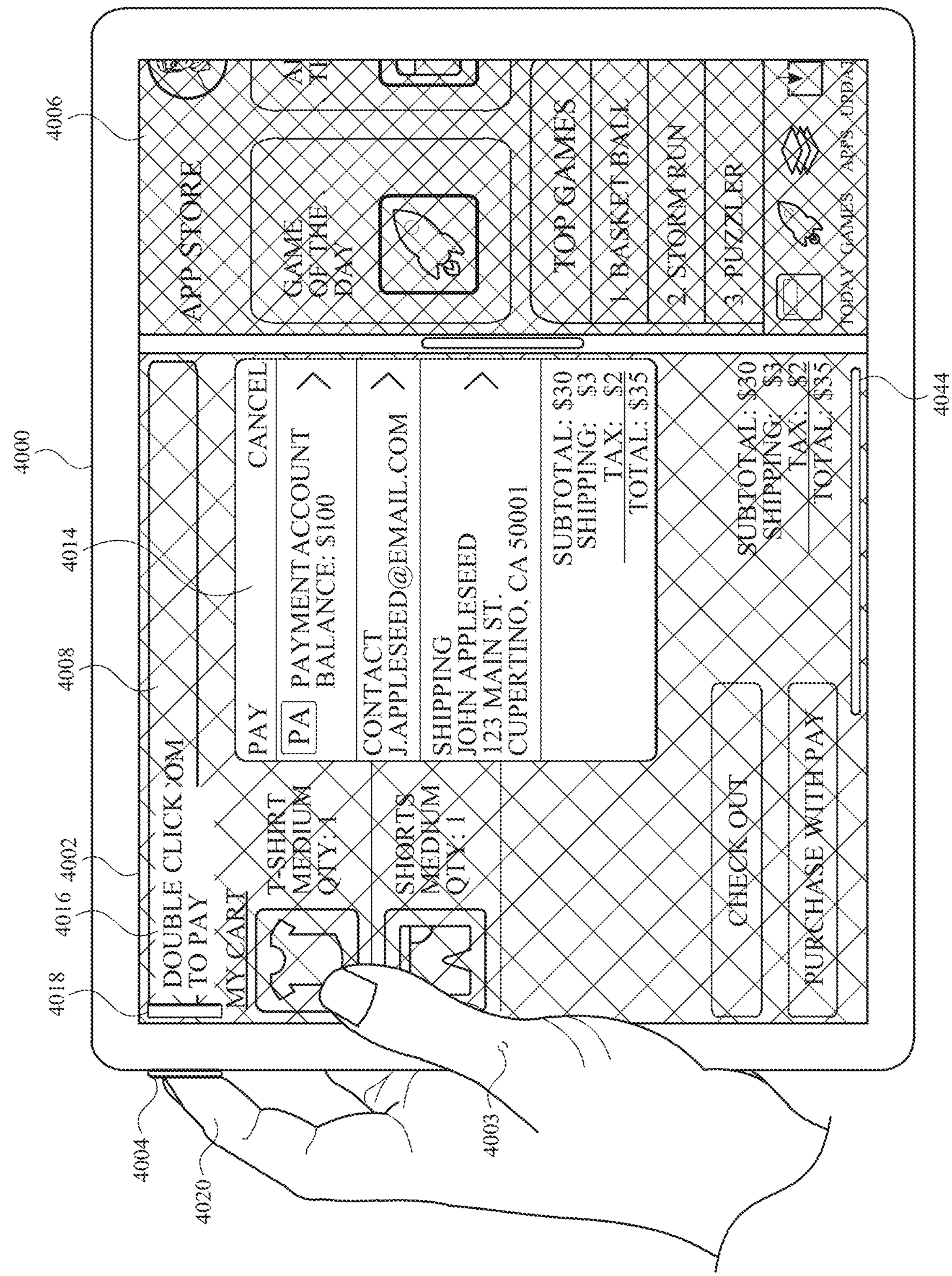

At FIG. 40B, in response to receiving input 4010 at purchase affordance 4012, electronic device 4000 swaps the applications being displayed in left region 4007 and right region 4009 of display 4002. Specifically, electronic device 4000 displays browser UI 4008 in left region 4007, and displays app store UI 4006 in right region 4009. Electronic device 4000 swaps the applications in order to place the application associated with the goods being purchased in the region that is closer to biometric sensor 4003. By placing browser UI 4008 in left region 4007, electronic device 4000 provides an indication to the user of the location of biometric sensor 4003, which is used to authenticate the user prior to authorizing payment for purchasing the goods. As shown in FIG. 40B, swapping the applications also places the application associated with the goods being purchased in the region that is closer to button 4004. In some examples, when the button 4004 and the biometric sensor 4003 are not in close proximity (e.g., on the same side), electronic device 4000 swaps applications, when necessary, to place the application associated with the goods being purchased in the region that is closer to the biometric sensor 4003. In some examples, when button 4004 and biometric sensor 4003 are not in close proximity (e.g., on the same side), electronic device 4000 swaps applications, when necessary, to place the application associated with the goods being purchased in the region that is closer to the button 4004.

Additionally, as depicted in FIG. 40B, in response to receiving input 4010 at purchase affordance 4012, electronic device 4000 darkens browser UI 4008 while darkening app store UI 4006 to a greater degree than that of browser UI 4008. By darkening browser UI 4008 less than app store UI 4006, electronic device 4000 indicates to the user which application is associated with pay sheet interface 4014 and the goods the user wishes to purchase.

Moreover, in response to receiving input 4010 at purchase affordance 4012, electronic device 4000 concurrently displays pay sheet interface 4014 with information about the goods being purchased and prompt 4016 to prompt the user to double-click button 4004 to initiate a process for authorizing payment for the goods. Further in response to receiving input 4010 at purchase affordance 4012, electronic device 4000 displays dynamic indication 4018 to emphasize the location of button 4004. While displaying pay sheet interface 4014, electronic device receives input 4020 at button 4004 (e.g., double-press of button 4004). In some examples, prompt 4016 includes some or all of the features of prompt 2416. In some examples, dynamic indication 4018 includes some or all of the features of dynamic indication 2418. In some examples, pay sheet interface 1014 includes the name of the application to which it corresponds (e.g., the name of the application from which the user initiated the process for authorizing payment).

Figure 40C:
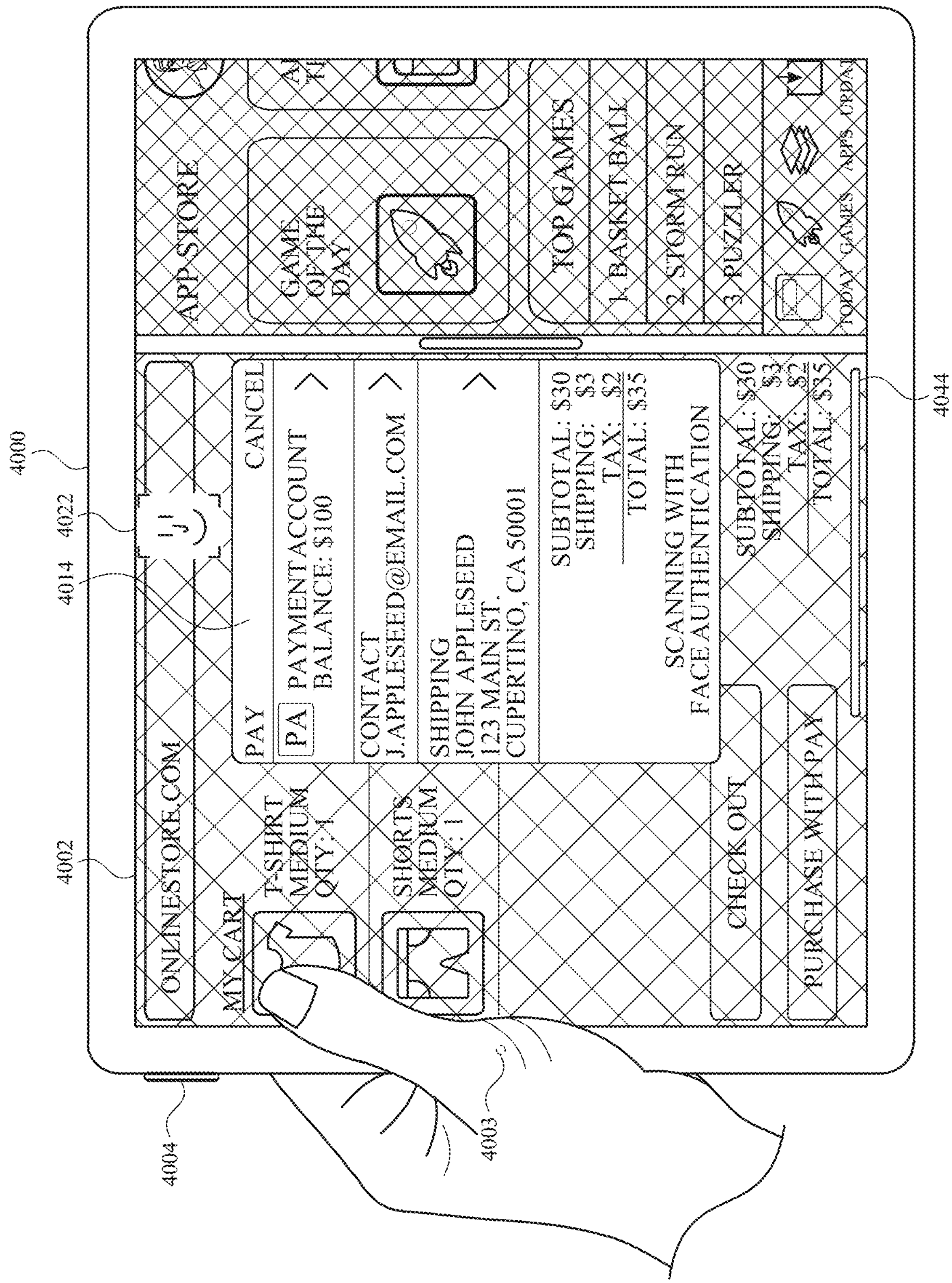

At FIG. 40C, in response to receiving input 4020 at button 4004, electronic device 4000 initiates a process for authorizing payment for the goods. Authorizing payment for the goods requires successfully authenticating the user. As a result, in response to receiving input 4020, electronic device 4000 initiates biometric authentication using biometric sensor 4003. After initiating biometric authentication, electronic device 4000 displays face glyph 4022, which provides an indication that electronic device 4000 is attempting to biometrically authenticate the user (e.g., attempting to obtain biometric information about the user using biometric sensor 4003). In some examples, face glyph 4022 includes some or all of the features of glyph 2468 of FIG. 24F. In some examples, in response to receiving input 4020 at button 4004, electronic device displays an animation of face glyph 4022 moving from the location of prompt 4016 to the location of face glyph 4022, as depicted in FIG. 40C. In some examples, the animation is such that face glyph 4022 appears to slide out of prompt 4016.

Figure 40D:
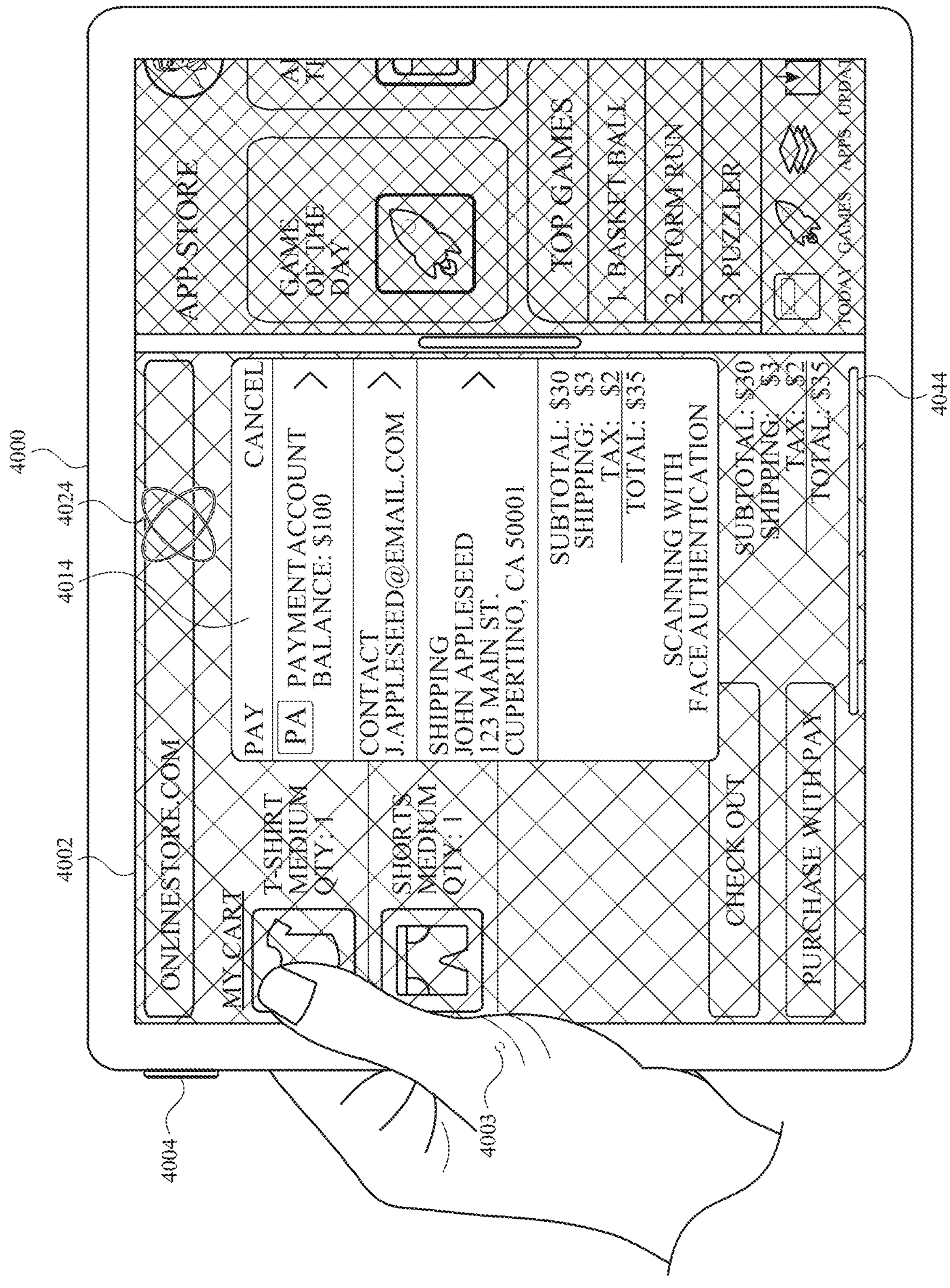

At FIG. 40D, after displaying face glyph 4022, electronic device transitions to displaying authentication glyph 4024, which provides an indication that electronic device 4000 is attempting to biometrically authenticate the user (e.g., continuing to try to obtain biometric information, attempting to match obtained information with stored authorized credentials). Authentication glyph 4024 includes a plurality of rings that rotate spherically. In some examples, authentication glyph 4024 includes some or all of the features of one or more rings 2470 of FIG. 24G.

While displaying authentication glyph 4024, electronic device 4000 detects that an error condition exists (e.g., a condition that prevents biometric sensor 4003 from obtaining sufficient information about the user's face). Specifically, electronic device 4000 detects that biometric sensor 4003 is covered by a physical object (e.g., the user's hand)). In some examples, electronic device 4000 does not detect an error condition, and is able to obtain sufficient information about the user's face. In some examples, after obtaining sufficient information about the user's face and while displaying authentication glyph 4024, electronic device 4000 determines whether the obtained information satisfies biometric authentication criteria (e.g., determines whether the obtained biometric information matches, within a threshold, a biometric template associated with the user (e.g., stored authorized credentials)). In some examples, upon determining that biometric authentication is successful (e.g., biometric authentication criteria is satisfied), electronic device 4000 transitions to an unlocked state.

Figure 40E:
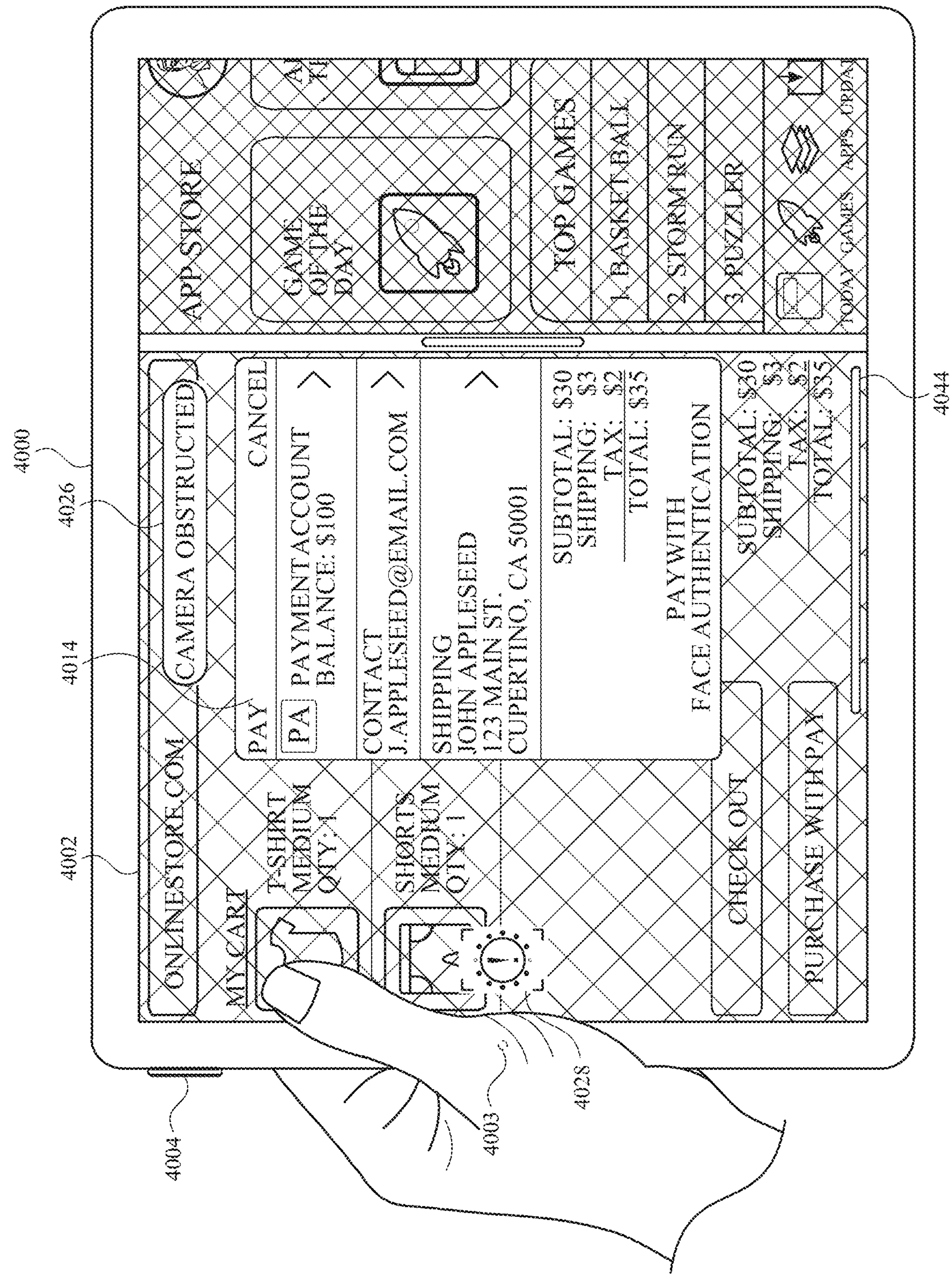

At FIG. 40E, in response to detecting that an error condition exists, electronic device 4000 displays error indication 4026 at a location at the top of display 4002 (e.g., with respect to the ground, with respect to the user). Error indication 4026 provides an indication of the error condition that currently exists. Further in response to detecting that an error conditions exists, electronic device 4000 displays error icon 4028 at a location of display 4002 that is adjacent to biometric sensor 4003, thereby providing an indication of the location of biometric sensor 4003. By providing an indication of the location of biometric sensor 4003, error icon 4028 suggests to the user the cause of the error condition. In some examples, in response to detecting that an error condition exists, electronic device 4000 displays error indication 4026 at a location adjacent to biometric sensor 4003. In some examples, error indication 4026 includes some or all of the features of error indication 3814A, including a shimmer effect.

Figure 40F:
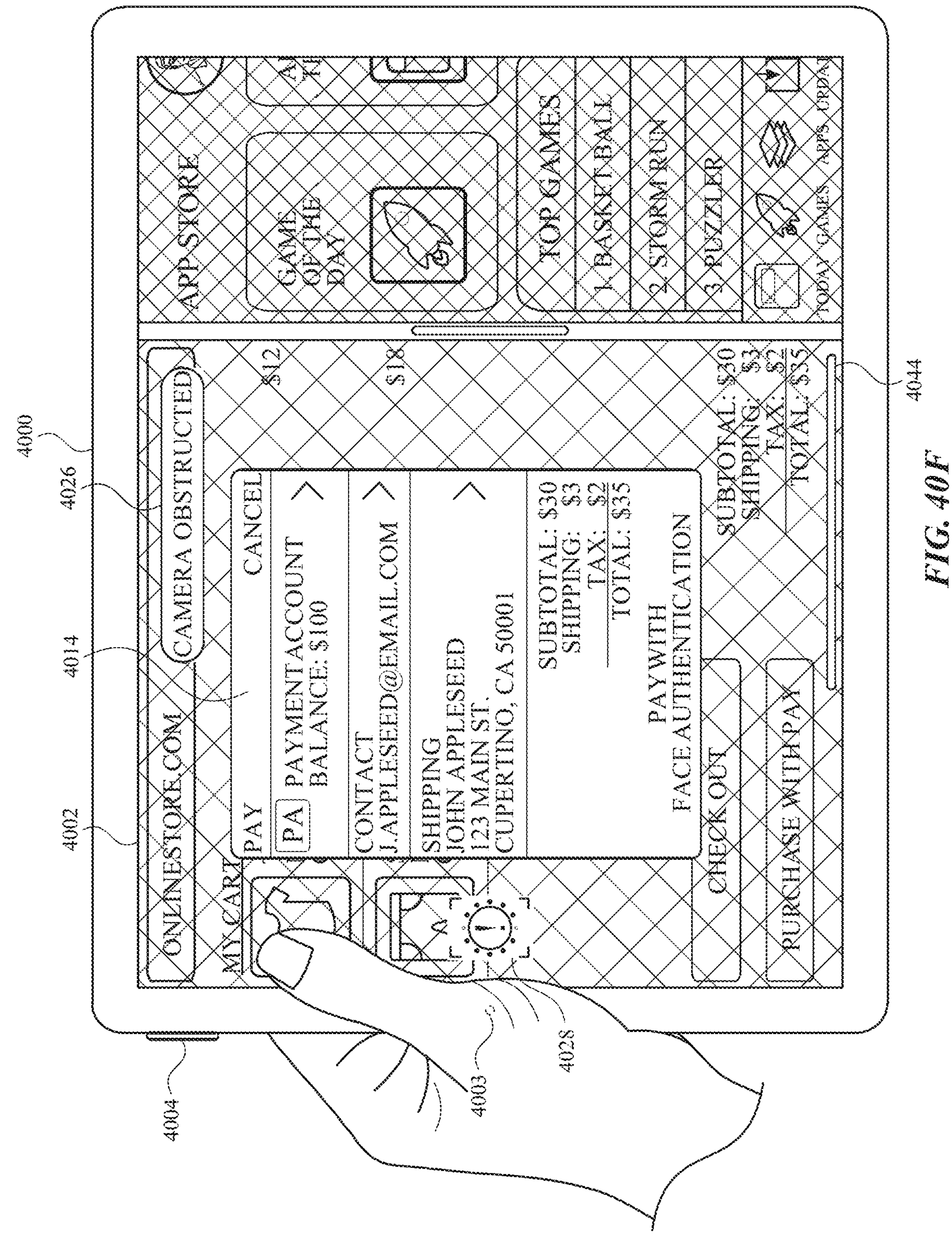

At FIG. 40F, further in response to detecting that an error condition exists, electronic 4000 displays an animation of pay sheet interface 4014 moving from its initial location in FIG. 40E to the location in FIG. 40F, which is closer to biometric sensor 4003. By moving pay sheet interface towards biometric sensor 4003, electronic device 4000 indicates to the user the existence of error icon 4028 in addition to indicating the location of biometric sensor 4003 (and thus suggesting to the user the cause of the error condition).

Figure 40G:
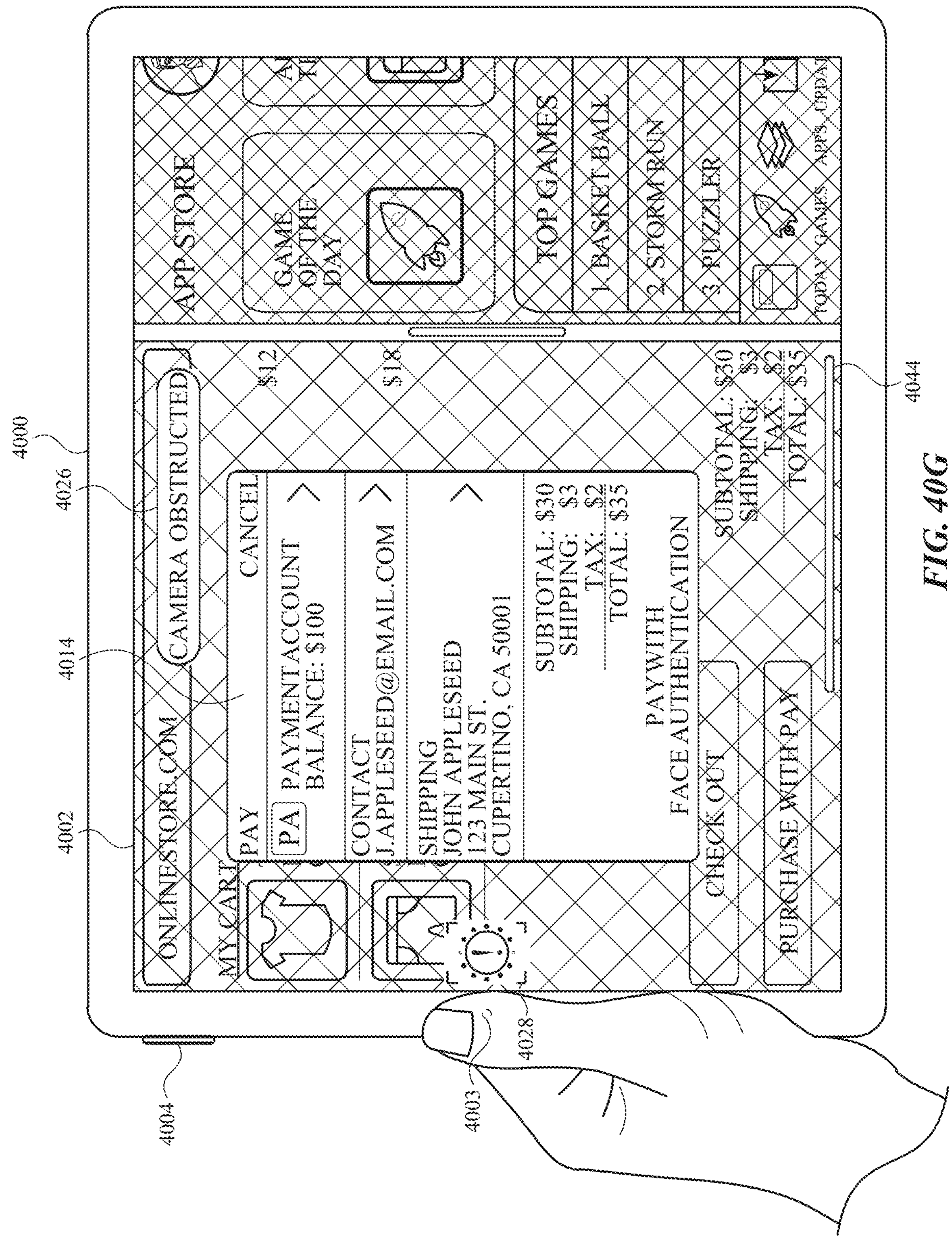
Figure 40H:
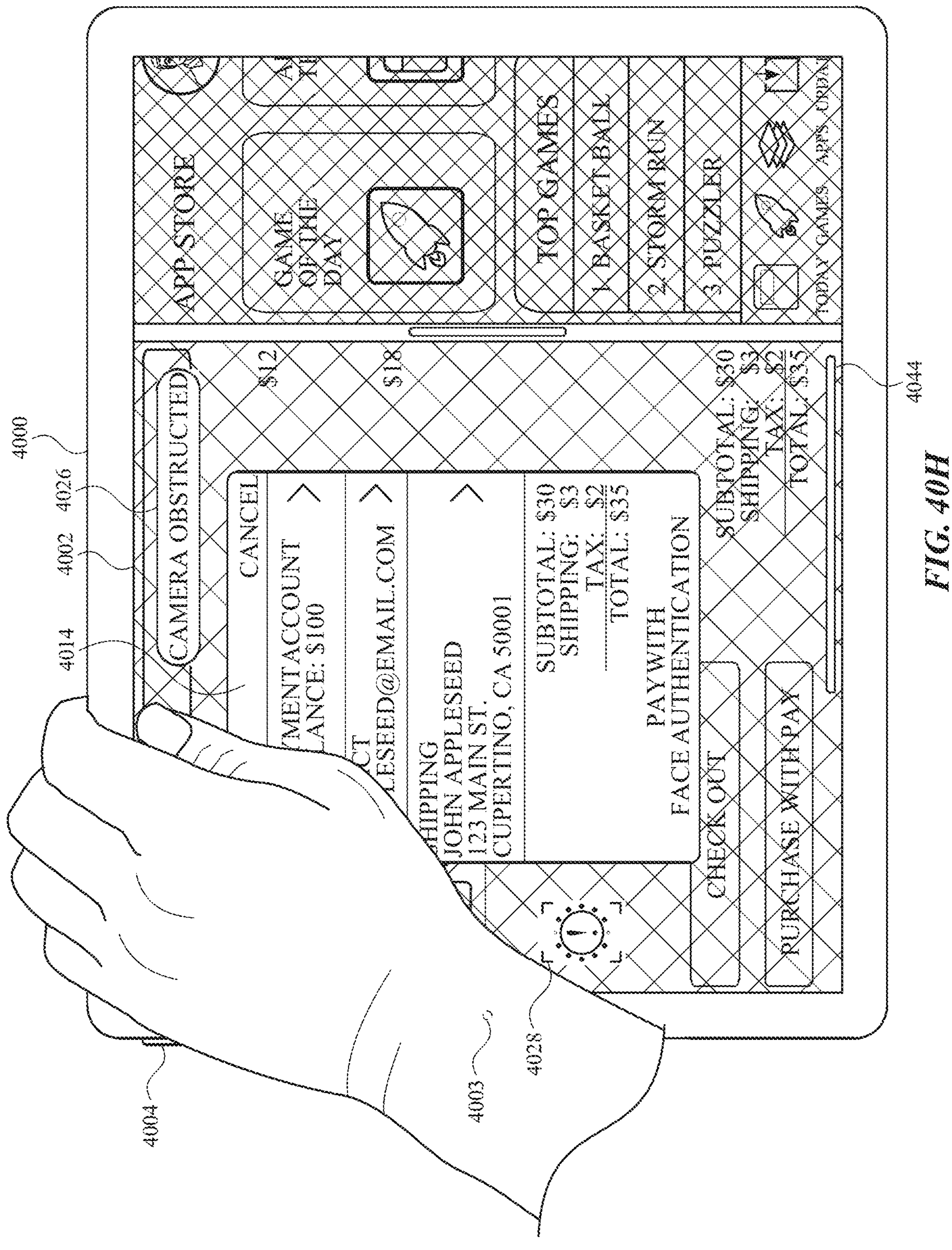

In some examples, error icon 4028 is displayed at different location of display 4002 depending on the positioning of the user's hand on display 4002. As illustrated in FIG. 40F, the user's hand is covering a portion of display 4002 that is adjacent to biometric sensor 4003. While the user's hand is in contact with display 4002, electronic device 4000 detects an input as a result of the contact from the user's hand. In response to detecting this input, electronic device 4000 displays error icon 4028 at a location at which the input is not detected. As another example, in FIG. 40G, the user's hand is covering less of display 4002 than the user's hand in FIG. 40F. In some examples, in response to detecting the input of the user's hand in FIG. 40G, electronic device 4000 displays error icon 4028 at a location that is different from the location in FIG. 40F, where the location in FIG. 40G is closer to biometric sensor 4003 than that of FIG. 40F. As yet another example, in FIG. 40H, the user's hand is covering a large portion of the upper-left side of display 4002. In some examples, in response to detecting the input of the user's hand in FIG. 40H, electronic device 4000 displays error icon 4028 at a location that is different from the locations in FIGS. 40F-40G. Specifically, in some examples, electronic device 4000 displays error icon 4028 at a location that is close to (or substantially near) biometric sensor 4003 without being at a location where the input of the user's hand is detected.

Figure 40I:
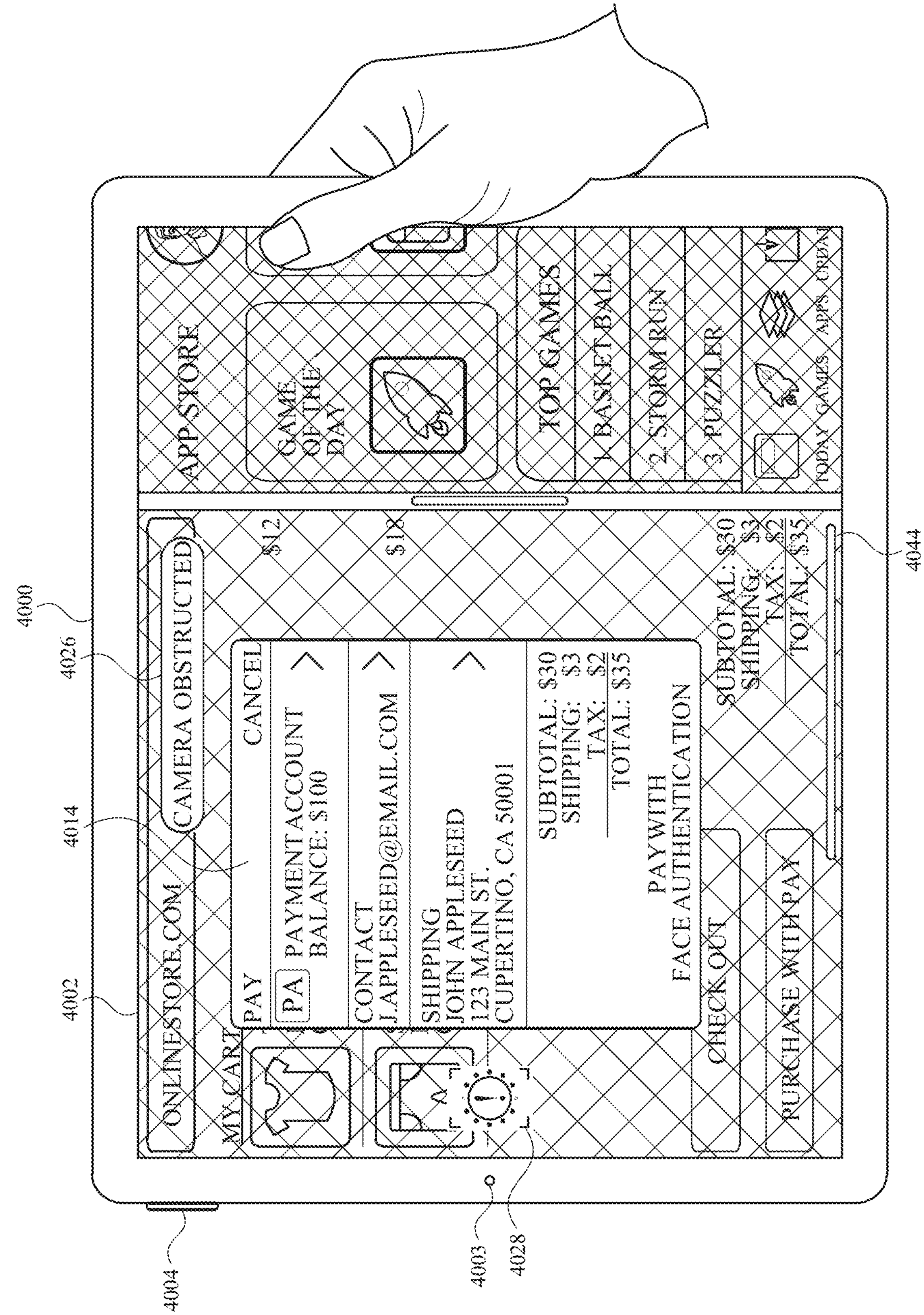

At FIG. 40I, the user removes her hand such that it no longer covers biometric sensor 4003. While displaying error icon 4028 and error icon 4028, electronic device 4000 detects that the error condition no longer exists.

Figure 40J:
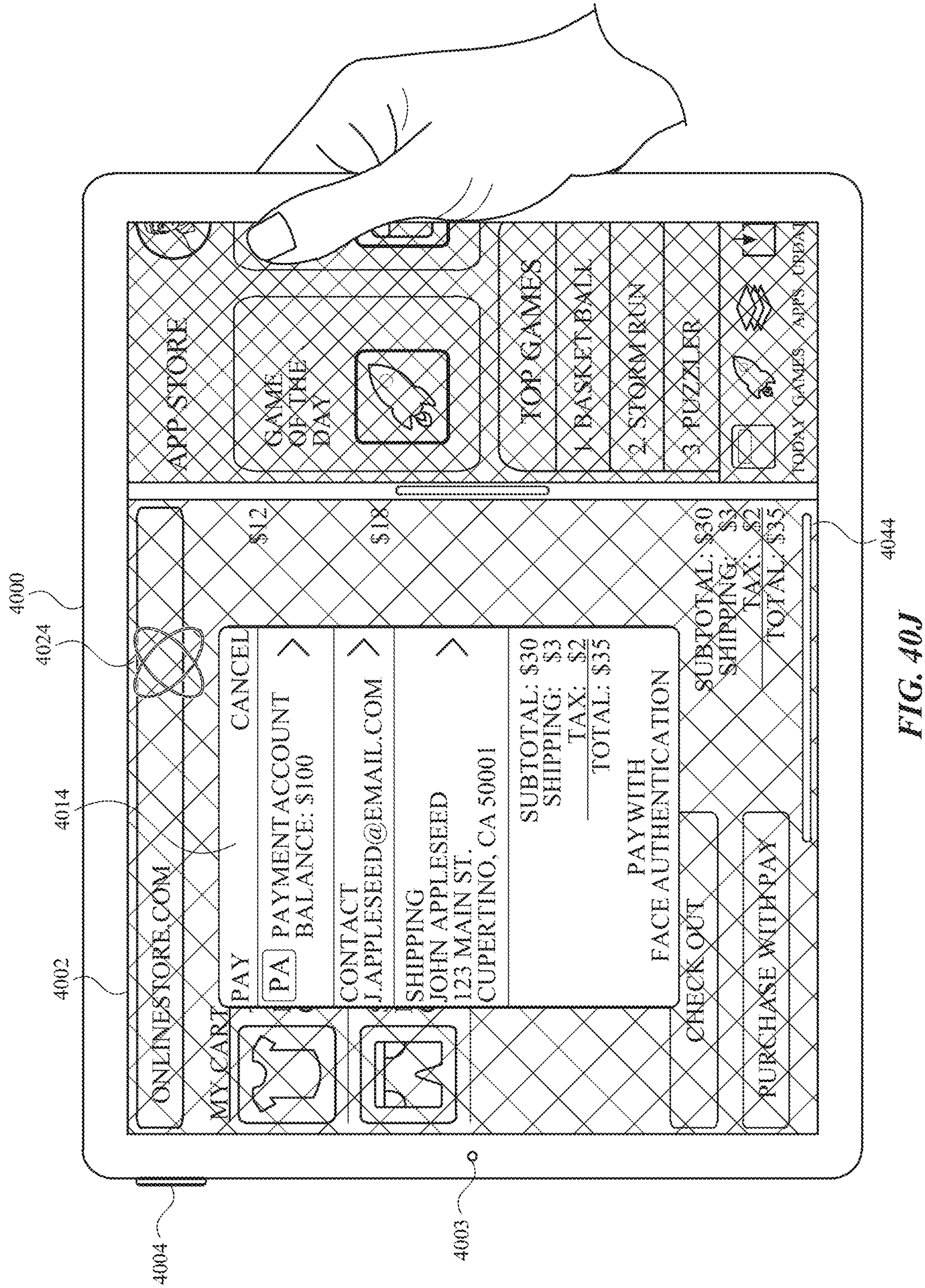

At FIG. 40J, in response to detecting that the error condition no longer exists, electronic device 4000 automatically retries biometric authentication. While retrying biometric authentication, electronic device 4000 displays authentication glyph 4024. While displaying authentication glyph 4024, electronic device 4000 attempts to biometrically authenticate the user. Specifically, electronic device 4000 obtains information about the user's face using biometric sensor 4003, and determines whether biometric authentication is successful (e.g., the obtained information matches stored authorized credentials).

Figure 40K:
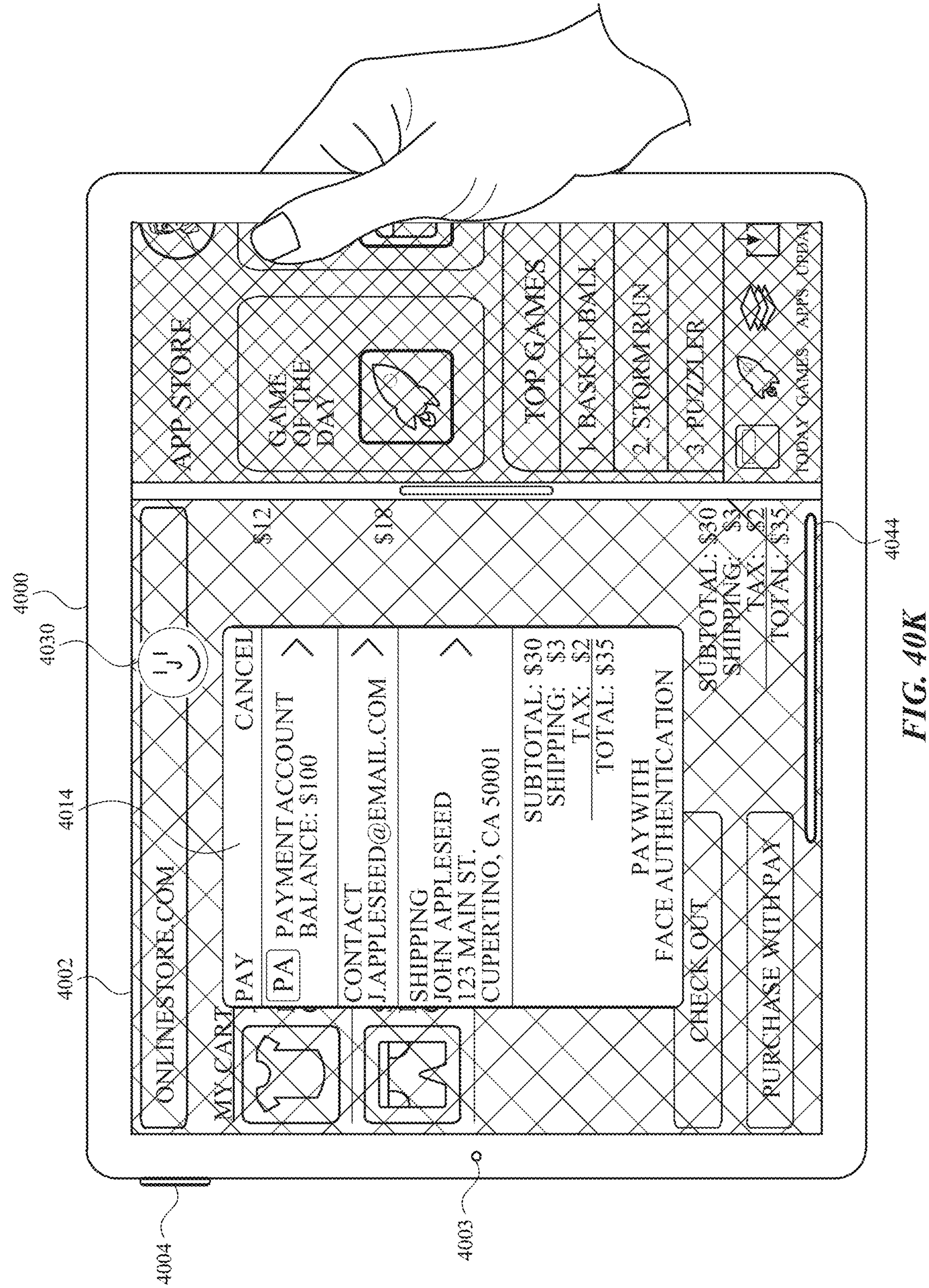

While retrying biometric authentication, electronic device 4000 determines that biometric authentication is successful. At FIG. 40K, upon determining biometric authentication is successful, electronic device 4000 displays success glyph 4030, which provides an indication that biometric authentication was successful. In some examples, success glyph 4030 includes some or all of the features of glyph 2474.

Figure 40L:
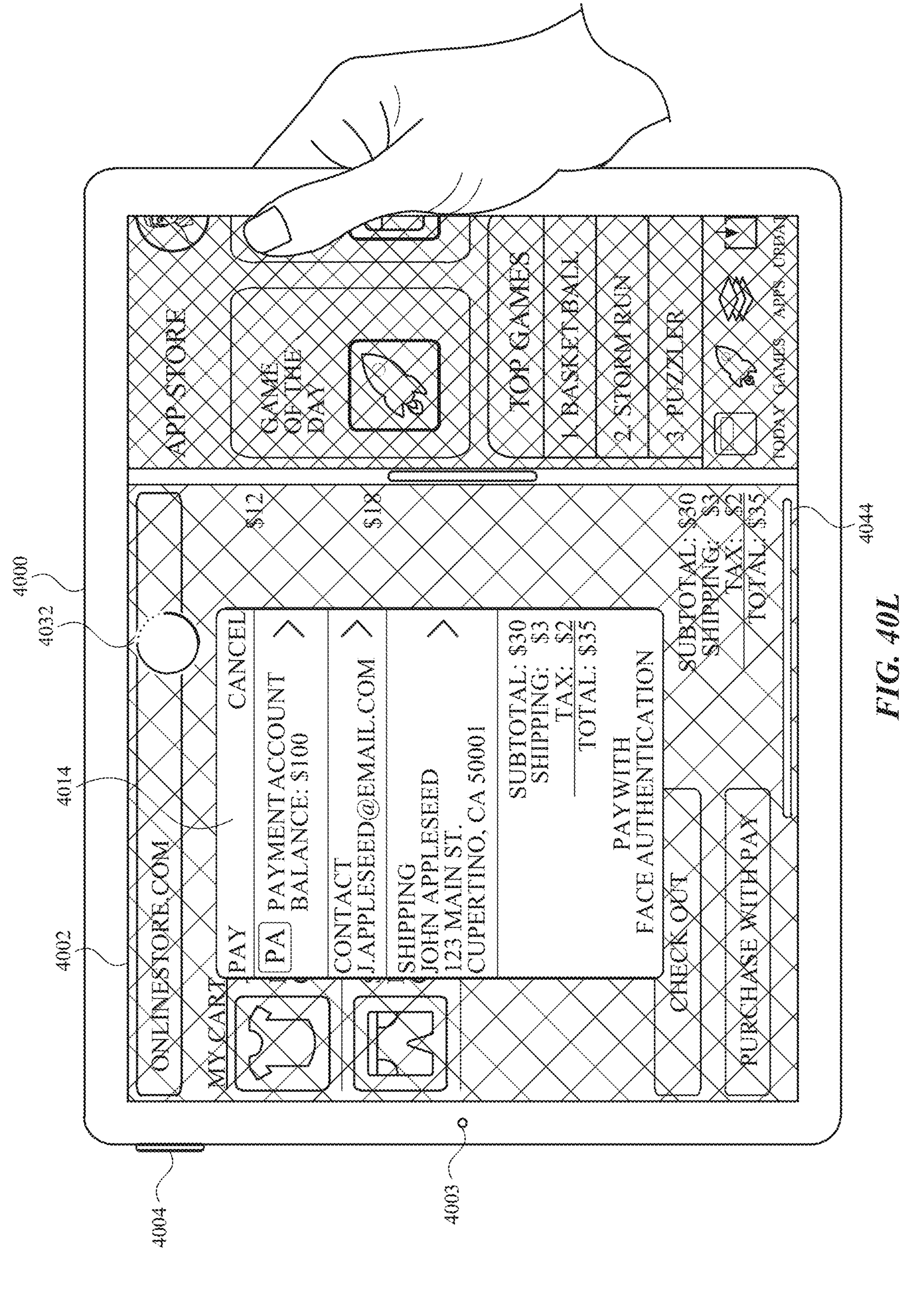

At FIG. 40L, further in response to determining that biometric authentication is successful, electronic device 4000 displays processing indicator 4032, which provides an indication that the payment transaction is being processed (e.g., electronic device 4000 is transmitting payment information (e.g., credentials) to an external device (e.g., server) to authorize payment). In some examples, processing indicator 4032 has some or all of the features of processing indication 2476.

Figure 40M:
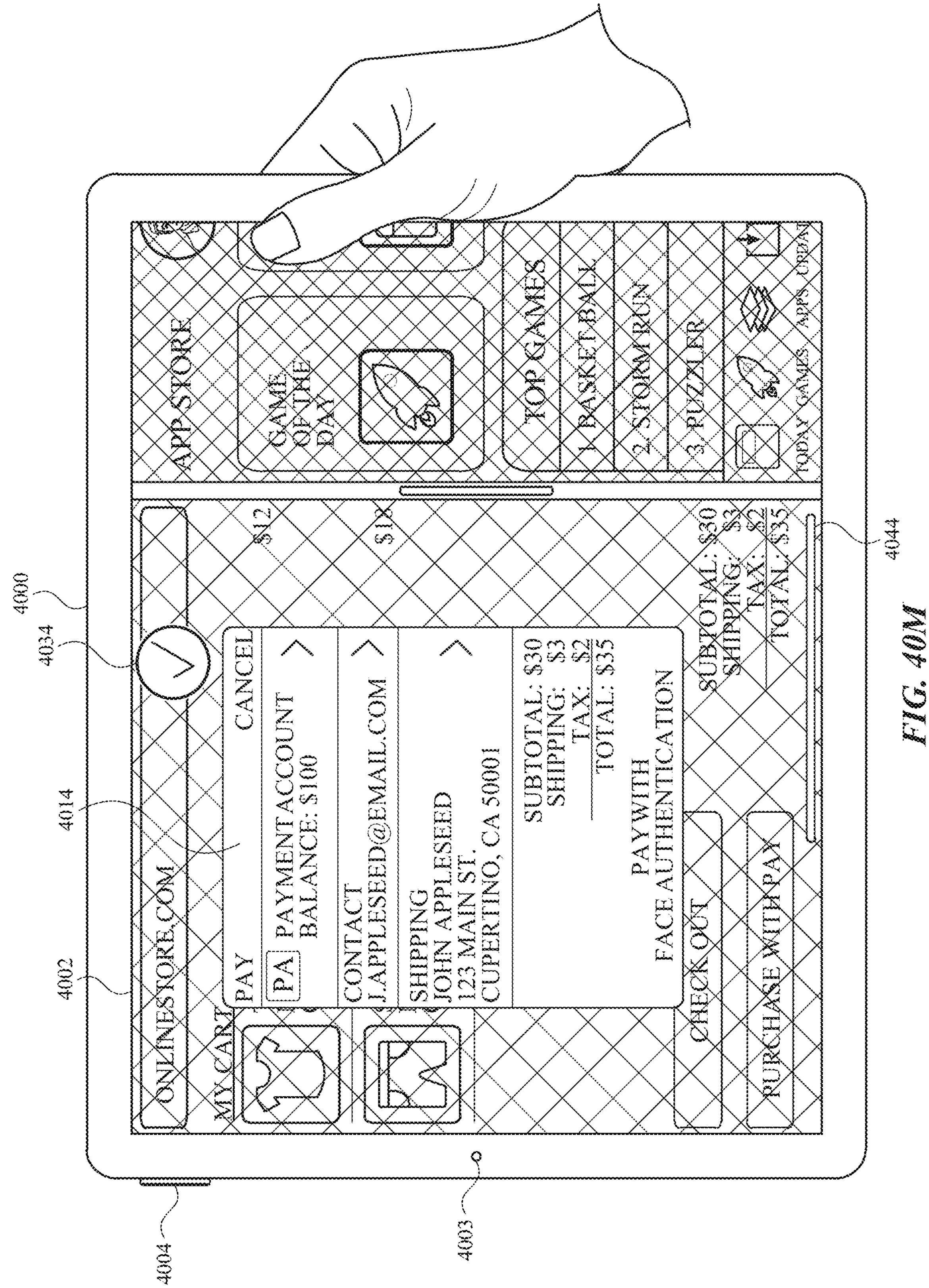

At FIG. 40M, upon receiving an indication that payment has been completed (e.g., authorized), electronic device 4000 displays completed indication 4034, which provides an indication that payment has been completed. In some examples, completed indication 4034 has some or all of the features of completed indication 2478 of FIG. 24AR.

Figure 40N:
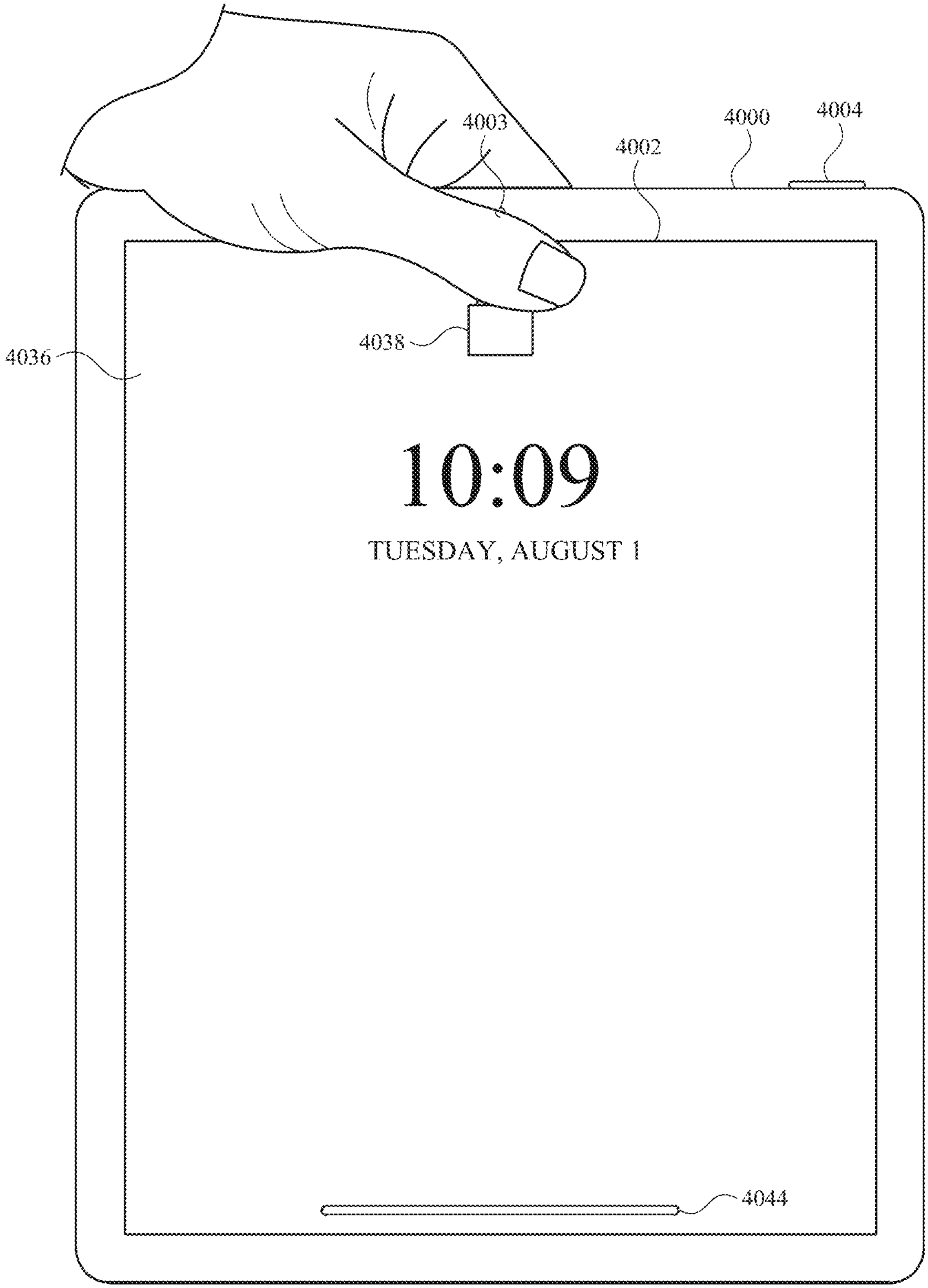

FIGS. 40N-40S illustrate a technique for displaying error indication 4026 and error icon 4028 when error indication 4026 and error icon 4028 are to be displayed in approximately the same location. At FIG. 40N, a user wishes to unlock the device to access restricted content (e.g., a home screen, a most recently used application). FIG. 40N depicts electronic device 4000 in a portrait orientation with respect to the ground, where a user is covering biometric sensor 4003 with her hand. Additionally, electronic device 4000 displays locked state UI 4036 with lock icon 4038. Lock icon 4038 provides an indication that electronic device 4000 is in a locked state.

While displaying locked state UI 4036, electronic device 4000 receives a request to unlock the device. For example, electronic device 4000 detects the user lifting the device from a substantially horizontal position.

Figure 40O:
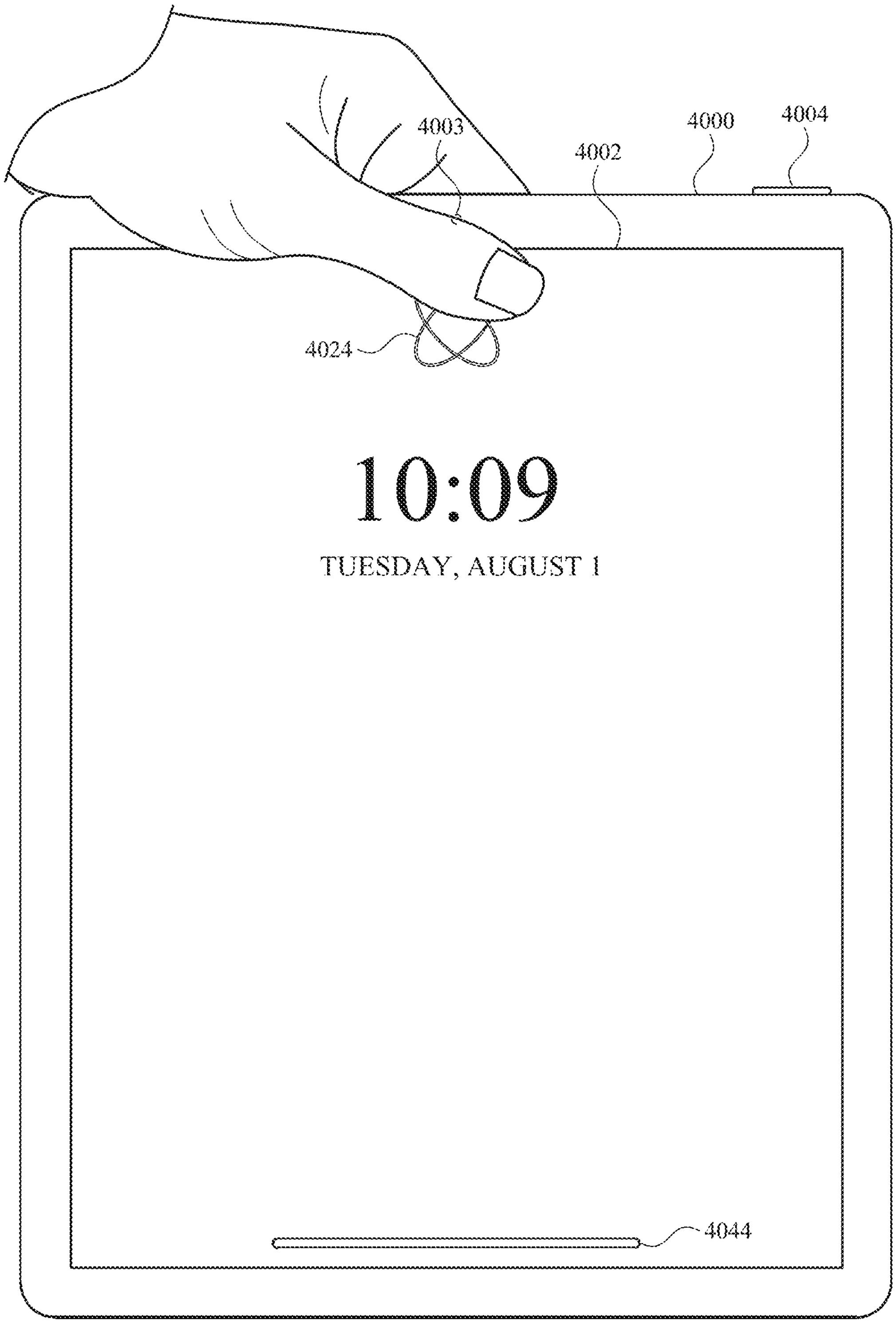

At FIG. 40O, in response to receiving the request to unlock the device, electronic device 4000 attempts to biometrically authenticate the user. While attempting to biometrically authenticate the user, electronic device 4000 displays authentication glyph 4024. Additionally, while attempting to biometrically authenticate the user, electronic device 4000 detects that an error condition exists (e.g., a condition that prevents biometric sensor 4003 from obtaining sufficient information about the user's face). Specifically, electronic device 4000 detects that biometric sensor 4003 is covered by a physical object (e.g., the user's hand)).

Figure 40P:

At FIG. 40P, in response to detecting that an error condition exists, electronic device 4000 displays error icon 4028 at a location of display 4002 that is near biometric sensor 4003 (e.g., at the top of display 4002). Further in response to detecting that an error condition exists, electronic device 4000 determines that error indication 4026 is to be displayed at approximately the same location as error icon 4028. Upon determining that error indication 4026 is to be displayed at approximately the same location, electronic device 4000 does not immediately display error indication 4028, and instead displays error indication 4026 as part of an animation that transitions from error icon 4028 to error indication 4026 to lock icon 4038, as described below with respect to FIGS. 40Q-40R.

Figure 40Q:
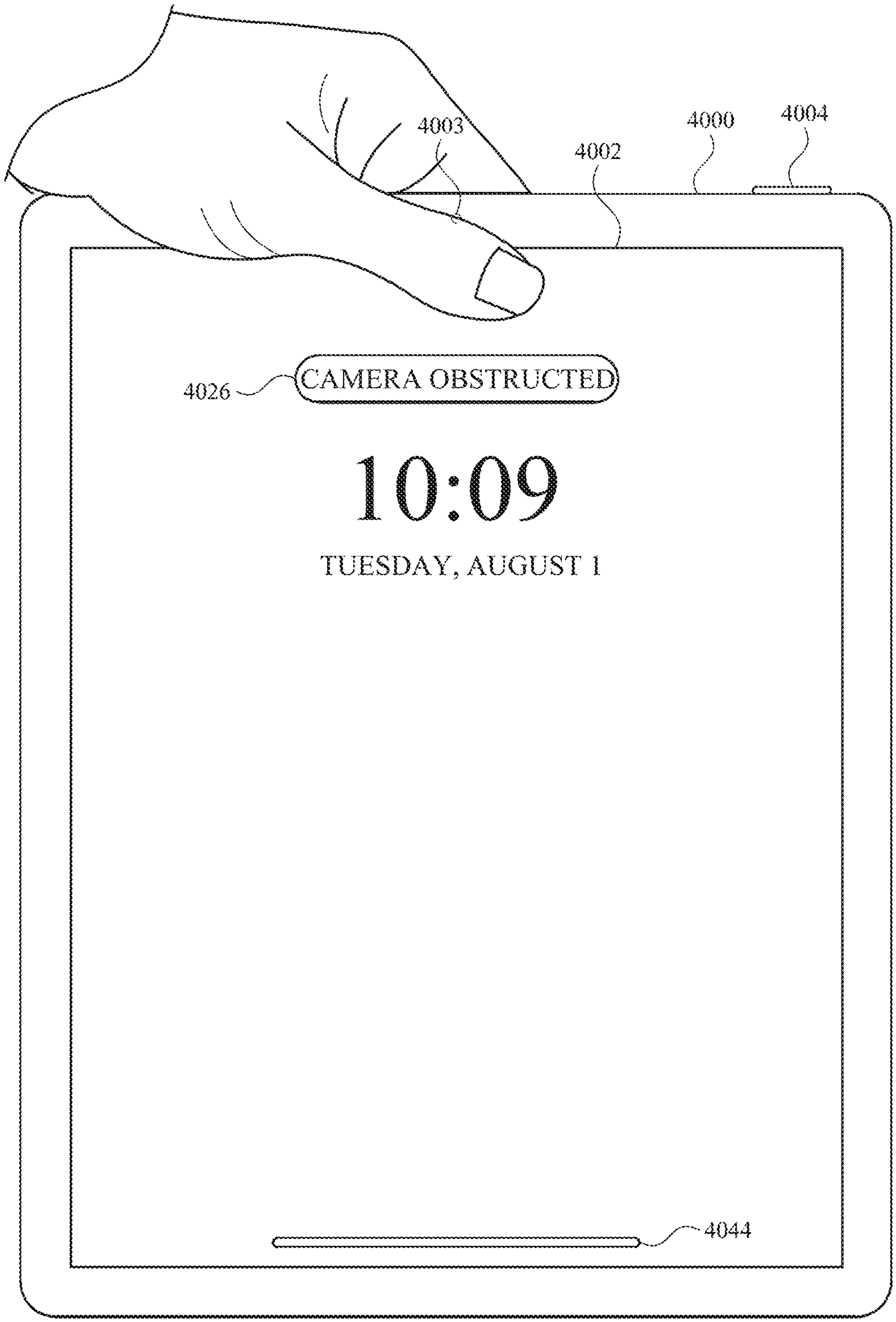

At FIG. 40Q, after displaying error icon 4028, electronic device 4000 displays (e.g., replaces display of error icon 4028 with) error indication 4026, which as discussed above, provides an indication of the cause of the error condition.

While displaying error indication 4026, the user removes her hand from biometric sensor 4003 such that it no longer covers biometric sensor 4003. In response to detecting that the error condition no longer exists, electronic device 4000 automatically retries biometric authentication.

Figure 40R:
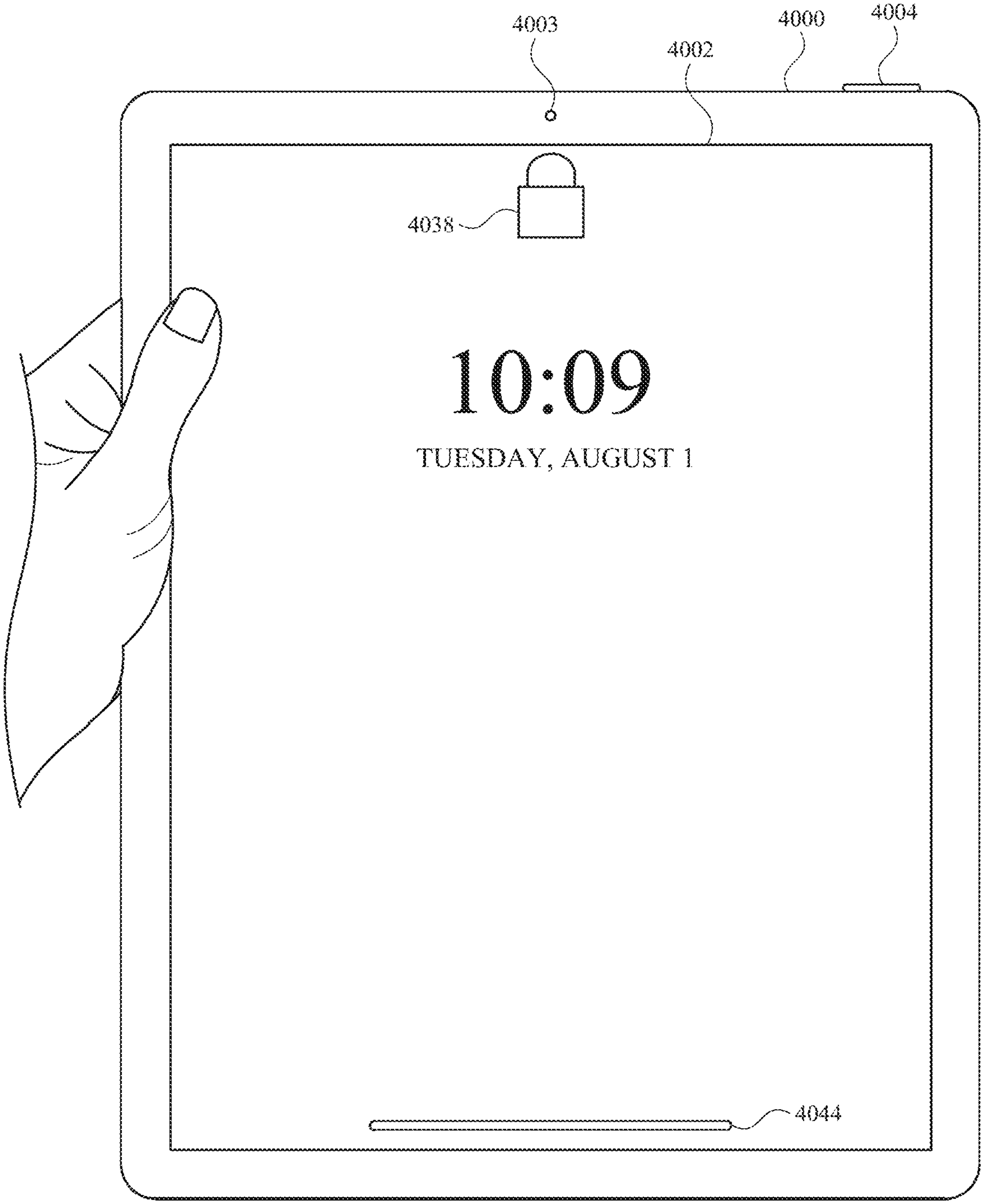
Figure 40S:
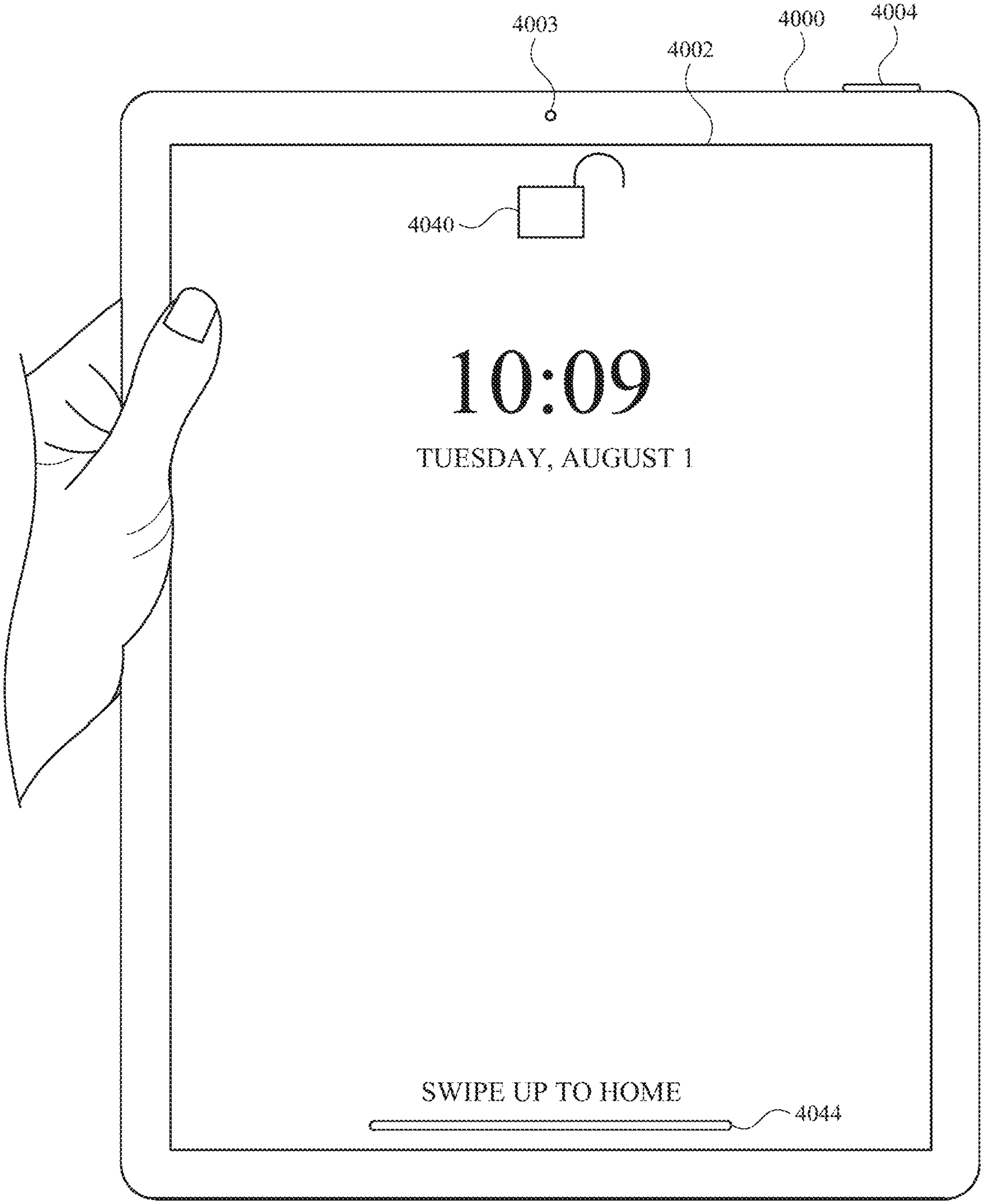

At FIGS. 40R-40S, upon determining that authentication is successful as a result of retrying biometric authentication, electronic device 4000 transitions from a locked state to an unlocked state. Specifically, electronic device 4000 displays (e.g., replaces display of error indication 4026 with) an animation of lock icon 4038 transitioning to unlock icon 4040, which provides an indication to the user that electronic device 4000 has transitioned to an unlocked state. In some examples, instead of successful biometric authentication, electronic device 4000 determines that authentication is unsuccessful as a result of retrying biometric authentication. In some examples, upon determining that authentication is unsuccessful, electronic device 4000 displays a passcode entry UI with an affordance which, when activated, triggers retrying biometric authentication. In some examples, while retrying biometric authentication, electronic device 4000 darkens all portions of display 4002 except for the user interface associated with retrying biometric authentication.

Figure 40T:
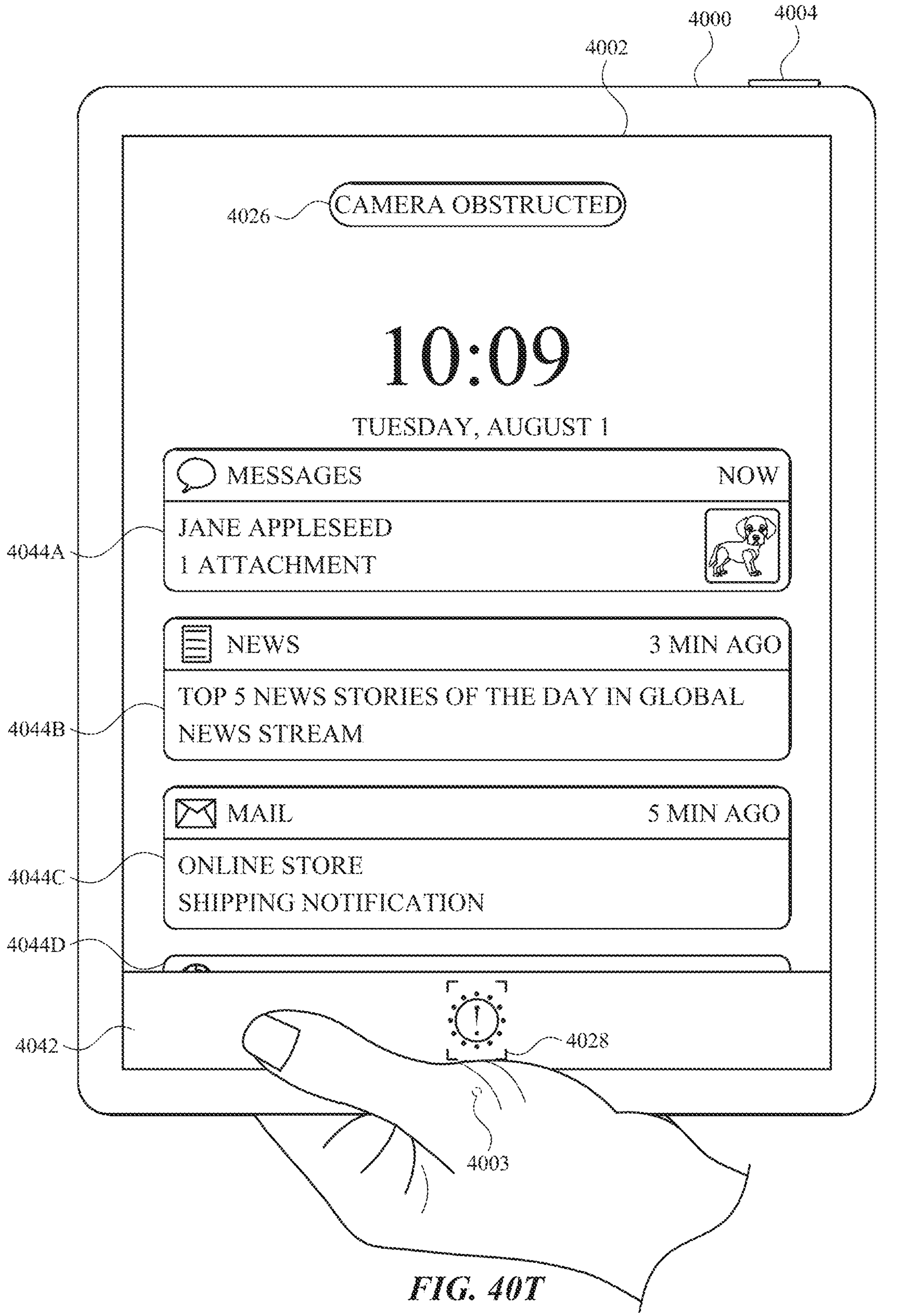
Figure 40U:
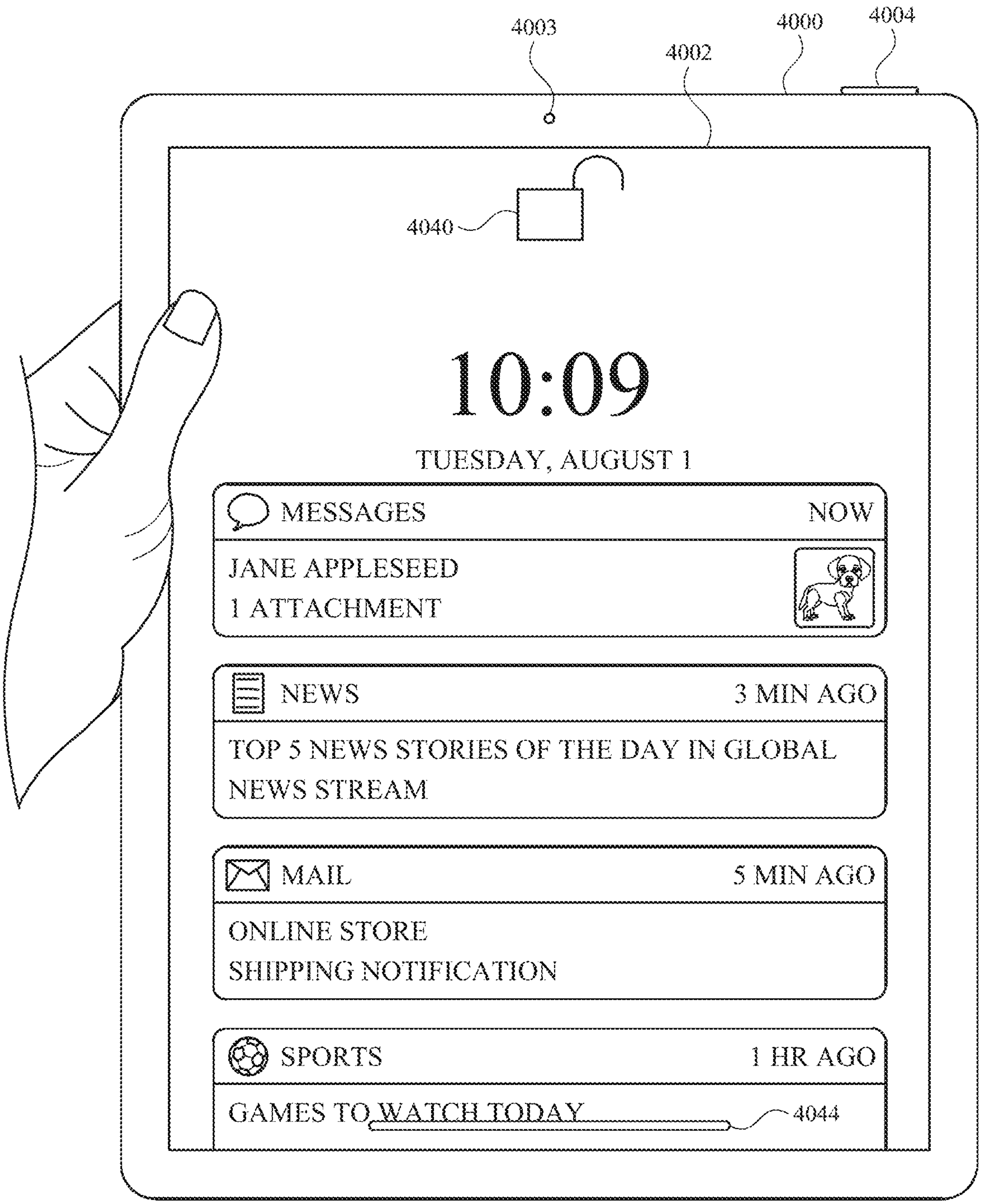

FIG. 40T illustrates a technique for displaying error icon 4028 when error icon 4028 is to be displayed at approximately the same location as one of the notifications being displayed (e.g., 4044A-D). In some examples, a user wishes to view the restricted content of one or more of the notifications (e.g., 4044A-D) that are displayed while electronic device 4000 is in a locked state. As depicted in FIG. 40T, a user is covering biometric sensor 4003 with her hand when the electronic device is a portrait orientation, where biometric sensor 4003 is located near the bottom of the device. In some examples, while attempting to biometrically authenticate a user to access the restricted content of the notifications, electronic device 4000 detects that an error condition exists as a result of the user covering biometric sensor 4003 with her hand. In response to detecting that an error condition exists, electronic device 4000 determines that error icon 4028 is to be displayed at approximately the same location as one of the notifications (e.g., 4044A-D). Upon making this determination and in response to detecting that the error condition exists, electronic device 4000 displays UI element 4042 (e.g., a background) concurrently with error icon 4028 to provide a background on which to overlay the display of error icon 4028. As depicted in FIG. 40T, UI element 4042 is opaque such that the notification on which error icon 4028 is overlaid (e.g., 4042D) is not visible to the user. In some examples, UI element 4042 is transparent such that the notification on which error icon 4028 is overlaid is visible to the user.

FIG. 40T also illustrates a technique for hiding unlock indication 4044 of FIG. 40U when error icon 4028 is to be displayed at approximately the same location as unlock indication 4044. In some examples, electronic device 4000 displays unlock indication 4044, which provides an indication of an approximate location on display 4002 from which a user can start an upward swipe to initiate biometric authentication. In some examples, while displaying unlock indication 4044, electronic device 4000 detects that an error condition exists as a result of the user covering biometric sensor 4003 with her hand. In some examples, in response to detecting that an error condition exists, electronic device 4000 determines that error icon 4028 is to be displayed at approximately the same location as unlock indication 4044. In some examples, upon making this determination and in response to detecting that the error condition exists, electronic device 4000 ceases to display unlock indication 4044, and displays error icon 4028 at approximately the same location at which unlock indication 4044 was displayed.

While displaying error icon 4028, electronic device 4000 detects that the error condition no longer exists (e.g., due to the user removing her hand from biometric sensor 4003). As depicted in FIG. 40U, the user has removed her hand from biometric sensor 4003. At FIG. 40U, upon detecting that the error condition no longer exists, electronic device 4000 ceases to display error icon 4028, and re-displays unlock indication 4044 at the location at which it was previously displayed.

FIGS. 41A-41C are flow diagrams illustrating a method for providing indications about the biometric sensor during biometric authentication, in accordance with some examples. Method 4100 is performed at an electronic device (e.g., 100, 300, 500, 4000) with a display (e.g., 4002) and a biometric sensor (e.g., 4003) (e.g., a first biometric sensor of a device with a plurality of biometric sensors) (e.g., a fingerprint sensor, a contactless biometric sensor (e.g., a biometric sensor that does not require physical contact, such as a thermal or optical facial recognition sensor), an iris scanner) at a first portion of the electronic device (e.g., a portion that is not a part of the display). In some examples, the biometric sensor includes one or more cameras. Some operations in method 4100 are, optionally, combined, the orders of some operations are, optionally, changed, and some operations are, optionally, omitted.

As described below, method 4100 provides an intuitive way for providing indications about the biometric sensor during biometric authentication. The method reduces the cognitive burden on a user for performing biometric authentication, thereby creating a more efficient human-machine interface. For battery-operated computing devices, enabling a user to perform biometric authentication faster and more efficiently conserves power and increases the time between battery charges.

The electronic device (e.g., 100, 300, 500, 4000) detects (4102) (e.g., detects in response to a request to perform an operation that requires authentication) the existence of an error condition that prevents the biometric sensor from obtaining biometric information about a user of the device (e.g., a contactless biometric sensor such as a thermal or optical facial recognition sensor) is occluded (e.g., partially occluded, fully occluded, occluded to a degree sufficient to inhibit operation of the sensor) (e.g., occluded by a portion of the user (e.g., a hand), while interacting with the electronic device).

In response (4104) to detecting the existence of the error condition, the electronic device (e.g., 100, 300, 500, 4000) displays, on the display (e.g., 4002), an error indication (e.g., 4028) (e.g., a graphical icon). In some examples, the error indication includes text (e.g., indicating that the sensor is occluded. In some examples, the error indication does not include text. The error indication is displayed (4106) at a location that is proximate to the first portion of the electronic device. In some examples, the location is at or near the portion of the display that is closest to the location of the biometric sensor (e.g., 4003). Displaying the error indication provides the user with feedback about the current state of the device (e.g., that an error condition is preventing successful biometric authentication) and prompts the user to take further action to correct the error condition. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying the error indication near the biometric sensor provides the user with feedback as to the association of the biometric sensor with the processes occurring at the device (e.g., attempted authentication). Specifically, the user becomes aware of the biometric sensor during biometric authentication such that the user is less likely to perform an action that interferes with the biometric sensor or alternatively, the user is prompted to take corrective action. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the error indication (e.g., 4028) includes (4108) a biometric sensor occluded icon and a reticle, the error indication providing an indication that the biometric sensor is occluded. (ISE, the error indication is associated with the electronic device performing biometric authentication (e.g., using the biometric sensor to obtain biometric information about a biometric feature (e.g., face, fingerprint).) Providing an indication that the biometric sensor is occluded provides the user with feedback about the current state of the device (e.g., that the biometric sensor is occluded) and prompts the user to take further action to correct the error condition. Providing improved feedback with instructions on proper movements of the biometric feature therefore enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In accordance (4110) with a determination that a user interface of the electronic device is in a first orientation relative to the biometric sensor, the electronic device (e.g., 100, 300, 500, 4000) displays the error indication at a first location in the user interface that is proximate to (e.g., adjacent to, near to, within a predetermined distance of) the first portion of the electronic device.

In accordance (4112) with a determination that the user interface of the electronic device is in a second orientation relative to the biometric sensor, the electronic device (e.g., 100, 300, 500, 4000) displays the error indication (e.g., 4028) at a second location in the user interface that is proximate to (e.g., adjacent to, near to, within a predetermined distance of) the first portion of the electronic device, the first orientation being different from the second orientation.

In some examples, while attempting (4114) to obtain biometric information using the biometric sensor (e.g., 4003), the electronic device (e.g., 100, 300, 500, 4000) displays (4116), on the display (e.g., 4002), a first progress indicator (e.g., 4024, 4026, 4038, 4040). In some examples, the first progress indicator provides an indication of the current state of the electronic device (e.g., locked state, unlocked state, performing biometric authentication, error state, error condition). In some examples, in accordance (4118) with a determination that the user interface (e.g., 4006, 4008) of the electronic device is in a third orientation relative to the biometric sensor, the user interface in the third orientation having a first top side, the electronic device displays the first progress indicator proximate to (e.g., adjacent to, near to, within a predetermined distance of) the first top side of the user interface in the third orientation. In some examples, in accordance (4120) with a determination that the user interface of the electronic device is in a fourth orientation relative to the biometric sensor, the user interface in the fourth orientation having a second top side, the electronic device displays the first progress indicator proximate to (e.g., adjacent to, near to, within a predetermined distance of) the second top side of the user interface in the fourth orientation, the third orientation being different from the fourth orientation. In some examples, the first progress indicator is displayed on the display at a location that is closest to or proximate to (e.g., adjacent to, near to, within a predetermined distance of) the biometric sensor. Displaying the first progress indicator near the top of the display regardless of orientation ensures that the user is more likely to be aware of the provided feedback to the user (e.g., the progress indicator). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, the electronic device (e.g., 100, 300, 500, 4000) displays, on the display (e.g., 4002), a second progress indicator (e.g., 4024, 4026, 4038, 4040) of the electronic device. In some examples, the second progress indicator provides an indication of the current state of the electronic device (e.g., locked state, unlocked state, performing biometric authentication, error state). In some examples, the first progress indicator is the second progress indicator. In some examples, the second progress indicator is an animation with a first portion (e.g., an indication that the electronic device is performing biometric authenticating using the biometric sensor (e.g., 4024) (e.g., rotating rings)) and a second portion (e.g., an indication of an error condition or error state (e.g., 4026), an indication of the current lock or unlock state of the electronic device (e.g., lock icon (e.g., 4038), unlock icon (e.g., 4040))) that is different from the first portion. In some examples, in accordance with a determination that the second progress indicator is displayed at the location that is proximate to the first portion of the electronic device, the electronic device displays the error indication (e.g., 4028) as part of the animation subsequent to the first portion and prior to the second portion.

In some examples, the electronic device (e.g., 100, 300, 500, 4000) displays, on the display (e.g., 4002), a home affordance (e.g., 4044) (e.g., an indication of a location of a gesture that when performed, results in displaying a home screen such as a swipe up gesture from an edge of the display or a tap gesture on the affordance) at a third location (e.g., a location proximate to a side (e.g., bottom side) of the user interface) in the user interface. In some examples, in accordance with a determination that the error indication (e.g., 4028) is displayed at the third location, the electronic device ceases to display the home affordance (e.g., 4044) while displaying the error indication at the third location. Ceasing display of the home affordance while displaying an error indication allows the user to quickly realize the home affordance is not accessible because there is an error and prompts the user to take further action to correct the error condition. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, after ceasing to display the home affordance (e.g., 4044), the electronic device (e.g., 100, 300, 500, 4000) detects a correction of the error condition that prevents the biometric sensor (e.g., 4003) from obtaining biometric information about the user of the device. In some examples, the electronic device detects the absence of the error condition subsequent to displaying the error indication (e.g., 4028) at the third location. In some examples, in response to detecting the correction of the error condition, the electronic device displays, on the display (e.g., 4002), the home affordance at the third location in the user interface (e.g., and ceases to display the error indication (e.g., 4028)).

In some examples, the electronic device (e.g., 100, 300, 500, 4000) detects an input (e.g., palm, finger) at the location that is proximate to (e.g., adjacent to, near to, within a predetermined distance of) the first portion of the electronic device. In some examples, in response to detecting the input at the location that is proximate to the first portion of the electronic device, the electronic device displays, on the display, the error indication (e.g., 4028) at a different location. In some examples, the different location is a location at which the input is not detected. In some examples, prior to displaying the error indication at the new location, the electronic device determines the different location based on the location of the input with respect to the display. In some examples, the different location is proximate to the location that is proximate to the first portion of the electronic device. In some examples, the error indication is moved to the different location after being initially displayed at a first location that is proximate to the first portion of the electronic device. In some examples, the error indication is initially displayed at a location selected so as to be away from any regions of the display that are known to be occluded (e.g., occluded by a detected touch input). Displaying the error indication at a different location depending on the location of the input (e.g., a user's hand) provides the user with feedback about the current state of the device (e.g., that an error condition is preventing successful biometric authentication) and prompts the user to take further action to correct the error condition. Further, by adjusting the location, the device ensures that the error indication is visible to the user and thus, the user is more likely to take corrective action at the device. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, the electronic device (e.g., 100, 300, 500, 4000) displays, on the display (e.g., 4002), a first transaction interface (e.g., 4014) (e.g., a transaction (or payment) interface that is separate from (or overlaid on top of) the user interface and includes transaction information such as a credit card number, billing address, etc.) at a position that is proximate to (e.g., adjacent to, near to, within a predetermined distance of) the first portion of the electronic device. In some examples, the first transaction interface is displayed in response to receiving an input (e.g., 4010) corresponding to an affordance (e.g., 4012) of the user interface (e.g., 4008) (e.g., an affordance for making a payment or completing a transaction).

In some examples, displaying the first transaction interface (e.g., 4014) includes displaying an animation of the first transaction interface transitioning (e.g., translating) from an initial position that is substantially centered with respect to the display to the position that is proximate to the first portion of the electronic device. In some examples, the animation includes displaying (e.g., maintaining the display of) the first transaction interface while the first transaction interface transitions (e.g., translates) from the initial position to the position that is proximate to the first portion of the electronic device. In some examples, the animation includes a visual effect where the first transaction interface appears to float while transitioning.

In some examples, the electronic device (e.g., 100, 300, 500, 4000) displays, on the display (e.g., 4002), a prompt (e.g., 4016) to provide one or more activations of a hardware button (e.g., 4004) of the electronic device. In some examples, the electronic device prompts the user by displaying "double click for Apple Pay". In some examples, the prompt is displayed adjacent to the button. In some examples, the prompt is displayed when the device is displaying a transaction user interface region (e.g., 4014) but without receiving any indication that a transaction terminal is nearby and is requesting transaction credentials (e.g., the prompt to provide the one or more activations of the button are displayed before the device as been placed in an NFC field of an NFC reader that is requesting payment information). In some examples, the hardware button is a mechanical button or a solid state button. In some examples, the button is a switch or any other type of toggle. In some examples, the button has a fixed position relative to the electronic device, and in particular, relative to the display of the electronic device such that the electronic device may display prompts based on a position of the button. In some examples, the button is a solid-state button that operates according to capacitive and/or resistive touch, and/or is responsive to changes in the intensity of input without having a mechanical switch that is depressed to activate the button and instead monitors whether an intensity of the input is above an intensity threshold that corresponds to activation of the solid-state button. In some examples, the electronic device (e.g., 100, 300, 500, 4000) receives one or more activations (e.g., 4020) of the hardware button of the electronic device, and in response to receiving the one or more activations of the hardware button, the electronic device displays, on the display (e.g., 4002), an authentication progress indicator (e.g., 4022, 4024, 4030, 4032, 4034). In some examples, displaying the authentication progress indicator includes displaying an animation of the authentication progress indicator transitioning from a location of the prompt (e.g., 4016) to a final position of the authentication progress indicator. In some examples, the authentication indicator provides a status of the authentication (e.g., in progress, successful, unsuccessful). In some examples, the animation includes displaying (e.g., maintaining the display of) the authentication progress indicator while the authentication progress indicator transitions (e.g., translates) from the location of the prompt to the final position. In some examples, the animation includes a visual effect where the authentication progress indicator appears to slide out of the prompt. In some examples, the authentication progress indicator is displayed with (or overlaid on) the user interface (e.g., 4014) (or the transaction user interface region). Prompting the user to activate a hardware button guides the user to perform an action at the device in order to complete a transaction. Prompting the user in this manner enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently. Displaying an authentication progress indicator provides feedback to the user regarding the status of the authentication. Improved feedback enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some examples, the electronic device (e.g., 100, 300, 500, 4000) concurrently displays (4122), on the display (e.g., 4002), a first application (e.g., corresponding to 4006, 4008) in a first region (e.g., 4007, 4009) and a second application (e.g., corresponding to 4006, 4008) in a second region (e.g., 4007, 4009), the second application being adjacent to (e.g., next to, proximate to, within a predetermined distance of) the first application. In some examples, the electronic device displays (4124), on the display, a second transaction interface (e.g., 4014). In some examples, the second transaction interface is the first transaction interface. In some examples, the second transaction interface is displayed overlaid on the first application and/or the second application. In some examples, in accordance (4126) with a determination that the second transaction interface corresponds to the first application, the electronic device modifies a first visual characteristic (e.g., obscure, darken, blur) of the first application. In some examples, the second transaction interface corresponds to the first application when the first application includes information about the good or service (or transaction) that is being purchased (or completed) using (or via) the second transaction interface. In some examples, this determination is made while displaying the second transaction interface. In some examples, in accordance (4130) with a determination that the second transaction interface corresponds to the second application, the electronic device (e.g., 100, 300, 500, 4000) modifies a first visual characteristic (e.g., obscure, darken, blur) of the second application. In some examples, the second transaction interface corresponds to the first application when the first application includes information about the good or service (or transaction) that is being purchased (or completed) using (or via) the second transaction interface. In some examples, this determination is made while displaying the second transaction interface.

In some examples, modifying the first visual characteristic of the first application includes modifying a second visual characteristic of the second application. In some examples, modifying the second visual characteristic of the second application includes increasing darkening and/or increasing blur radius of a blur effect applied to the second application to a greater degree (or amount) than with respect to the first application. In some examples, modifying the first visual characteristic of the second application includes modifying a second visual characteristic of the first application. In some examples, modifying the second visual characteristic of the first application includes increasing darkening and/or increasing blur radius of a blur effect applied to the first application to a greater degree (or amount) than with respect to the second application. Modifying the visual characteristic of one application to a greater degree than with respect to another application provides feedback to the user as to which application is more relevant at the time. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, modifying the first visual characteristic of the first application includes displaying (4128) the first application in the second region in accordance with a determination that the second region is closer (e.g., nearer) to the first portion of the electronic device (e.g., biometric sensor) than the first region. In some examples, displaying the first application in the second region includes ceasing to display the first application in the first region. In some examples, modifying the first visual characteristic of the second application includes displaying (4132) the second application in the first region in accordance with a determination that the first region is closer (e.g., nearer) to the first portion of the electronic device (e.g., biometric sensor) than the second region. In some examples, displaying the second application in the first region includes ceasing to display the second application in the second region. In some examples, the electronic device displays an animation of the first application swapping places with the second application.

In some examples, in accordance with the determination that the second transaction interface (e.g., 4014) corresponds to the first application, the second transaction interface includes an indication of the first application (e.g., the name of the first application). In some examples, in accordance with the determination that the second transaction interface corresponds to the second application, the second transaction interface includes an indication of the second application (e.g., the name of the second application).

Note that details of the processes described above with respect to method 4100 (e.g., FIGS. 41A-41C) are also applicable in an analogous manner to the methods described below/above. For example, method 3700, method 3900, and/or method 4300 optionally include one or more of the characteristics of the various methods described above with reference to method 4100. For example, error icon 4028, as described in method 4100, can be used to indicate that the biometric sensor is obstructed when biometric authentication is being performed in the processes described with respect to method 3700 and method 3900. For brevity, these details are not repeated below.

FIGS. 42A-42P illustrate exemplary user interfaces for orienting the device to enroll a biometric feature (e.g., a face for later use in biometric authentication), in accordance with some examples. The user interfaces in these figures are used to illustrate the processes described below, including the processes in FIGS. 43A-43C.

FIG. 42A illustrates electronic device 4200 (e.g., portable multifunction device 100, device 300, device 500). In the exemplary examples illustrated in FIGS. 42A-42P, electronic device 4200 is a tablet. In other examples, electronic device 4200 can be a different type of electronic device, such as a wearable device (e.g., a smartwatch). Electronic device 4200 includes display 4202, one or more input devices (e.g., touchscreen of display 4202, a button, and a microphone), and a wireless communication radio. In some examples, the electronic device includes a plurality of cameras. In some examples, the electronic device includes only one camera. In FIG. 42A, the electronic device includes biometric sensor 4203. In some examples, the biometric sensor is one or more biometric sensors that can include a camera, such as an infrared camera, a thermographic camera, or a combination thereof. In some examples, biometric sensor 4203 is biometric sensor 703. In some examples, the one or more biometric sensors include one or more fingerprint sensors (e.g., a fingerprint sensor integrated into a button). In some examples, the device further includes a light-emitting device (e.g., light projector), such as an IR flood light, a structured light projector, or a combination thereof. The light-emitting device is, optionally, used to illuminate the biometric feature (e.g., the face) during capture of biometric data of biometric features by the one or more biometric sensors.

At FIG. 42A, a user wishes to set up biometric (e.g., face) authentication on electronic device 4200. Successfully setting up biometric authentication on the device enables a user to perform operations on the device that require authentication (e.g., unlocking the device) by presenting the user's face for biometric authentication. To set up biometric authentication on the electronic device, a user must first enroll her face. The process for enrolling the face can include some or all of the features (or processes) of FIGS. 11A-11O.

As illustrated in FIG. 42A, electronic device 4200 displays introduction user interface (UI) 4206 with initiate affordance 4208. Electronic device 4200 receives input 4210 at initiate affordance 4208 to start the process of enrolling the user's face for biometric authentication.

Figure 42B:
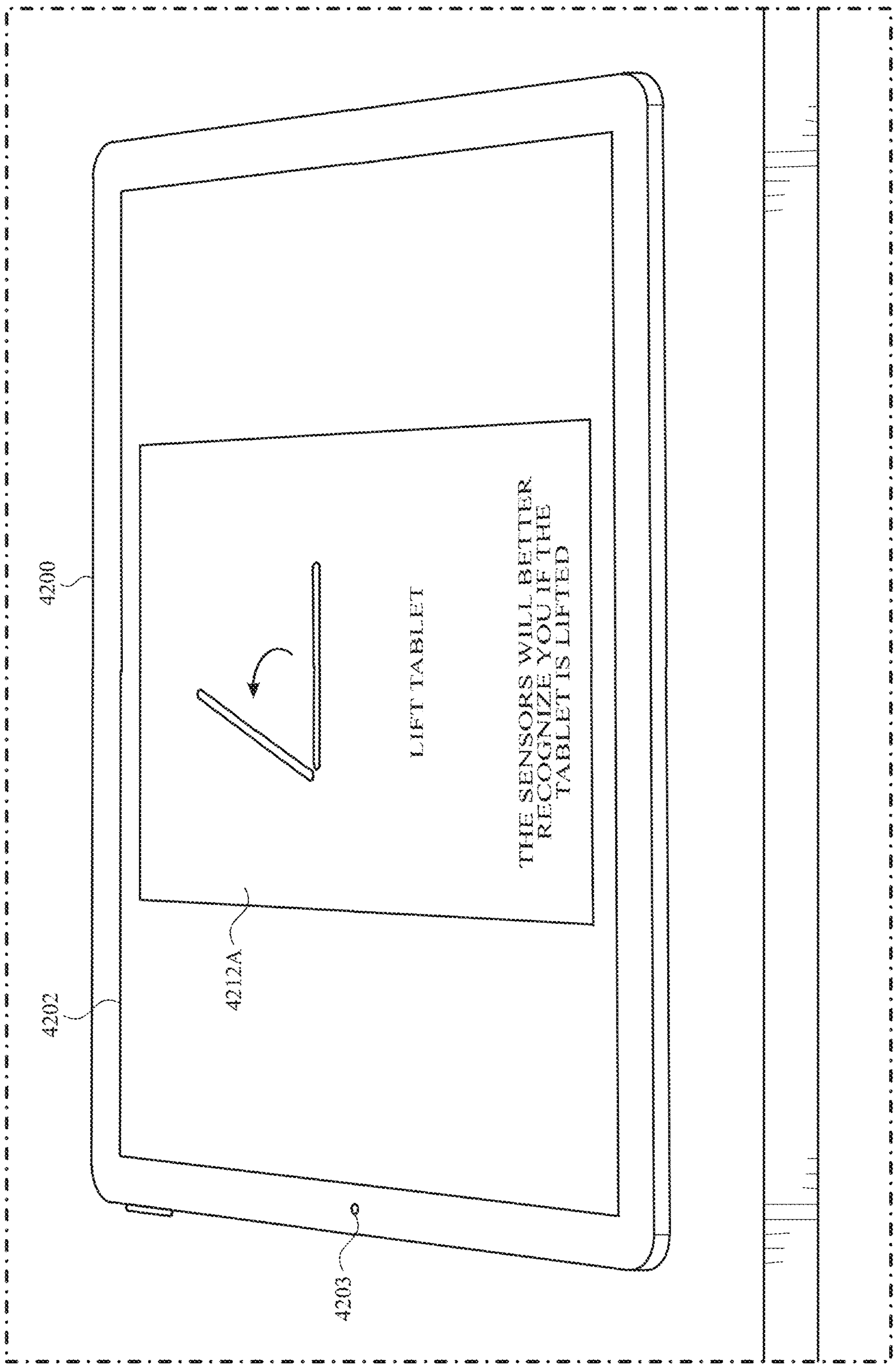

At FIG. 42B, in response to receiving input 4210 at initiate affordance 4208, electronic device 4200 determines that the orientation of the device is not suitable for enrolling the user's face. In some examples, a suitable orientation for enrolling the user's face is a portrait orientation that is upright (e.g., vertical), where the portrait orientation is such that biometric sensor 4203 is at the top of the device (e.g., the side of the device that is farthest away from the ground). In response to determining that the orientation of the device is not suitable for enrolling the user's face, electronic device 4200 displays (e.g., replaces display of introduction UI 4206 with) one or more prompts to prompt the user to orient electronic device 4200 to a suitable orientation. More specifically, electronic device 4200 determines that electronic device 4200 is in a substantially horizontal orientation (e.g., approximately parallel to the ground). As a result, as depicted in FIG. 42B, electronic device 4200 displays prompt 4212A to prompt the user to lift electronic device 4200 to an upright position.

In some examples, in response to receiving input 4210 at initiate affordance 4208, electronic device determines that the orientation of the device is suitable for enrolling the user's face. In some examples, upon determining that the orientation if suitable for enrolling the user's face, electronic device 4200 automatically initiates a process for enrolling the user's face, as described below with respect to FIG. 42D.

Figure 42C:
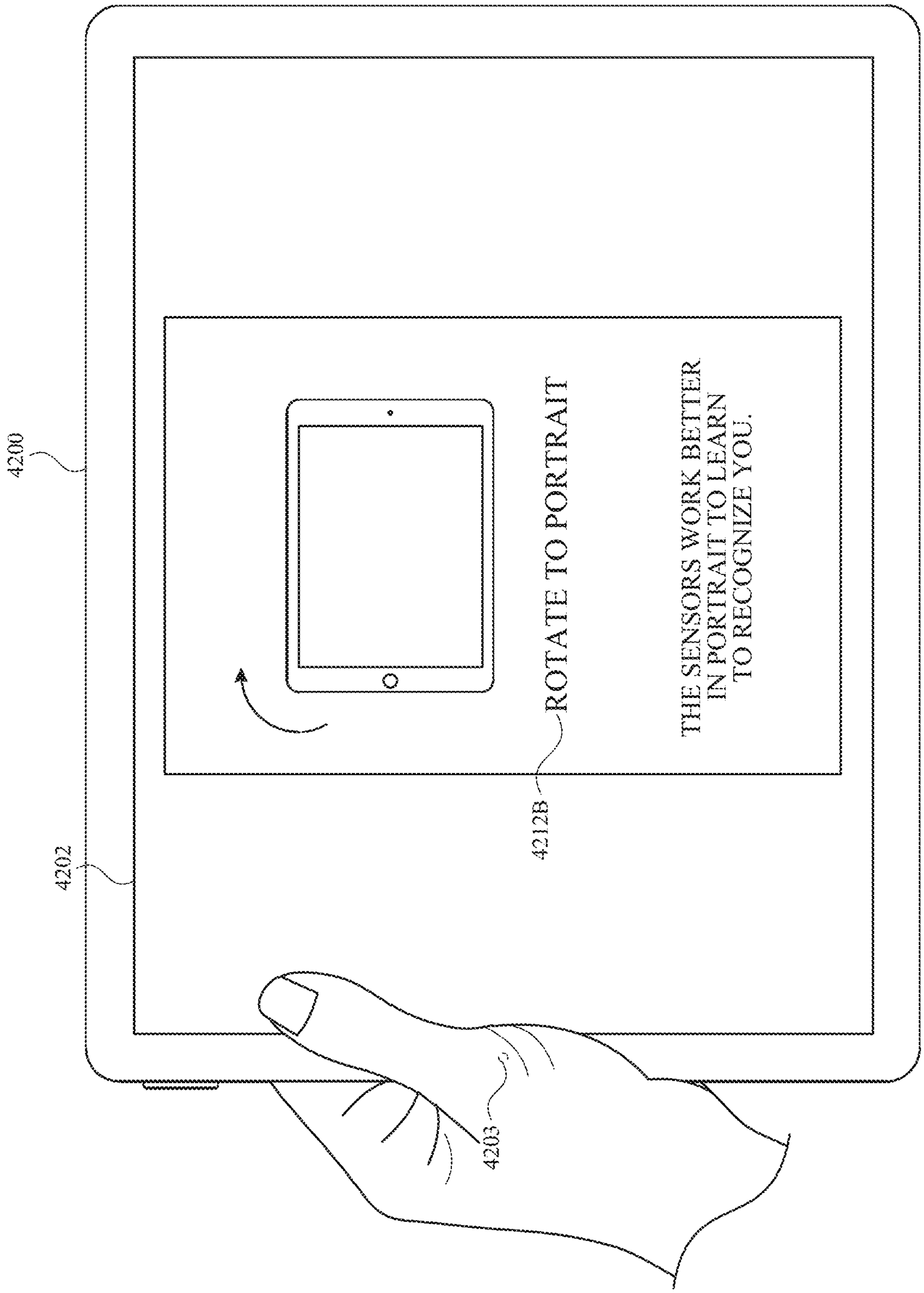

At FIG. 42C, in response to determining that electronic device 4200 is in an upright position but not in a portrait orientation (e.g., the user has lifted the device off the table in response to prompt 4212A), electronic device 4200 displays (e.g., replaces display of prompt 4212A with) prompt 4212B to prompt the user to rotate electronic device 4200 to a portrait orientation (e.g., with the biometric sensor 4203 at the top). Specifically, prompt 4212B prompts the user to rotate in a specific direction such that minimal rotation is required to achieve the desired (or suitable) orientation. For example, rotating electronic device 4200 clockwise requires less rotation to achieve the desired orientation rather than rotating the device counterclockwise.

Figure 42D:
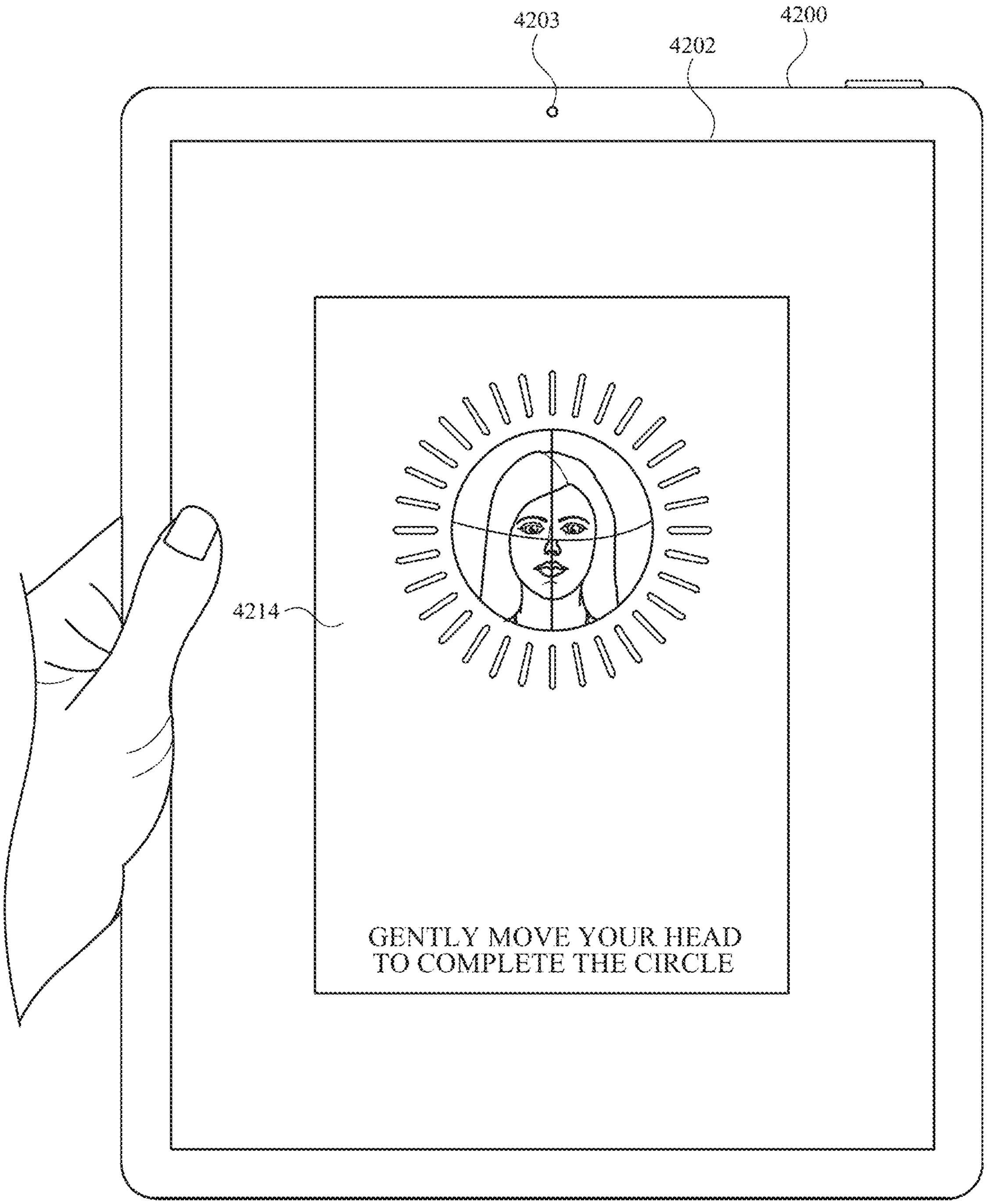
Figure 42E:
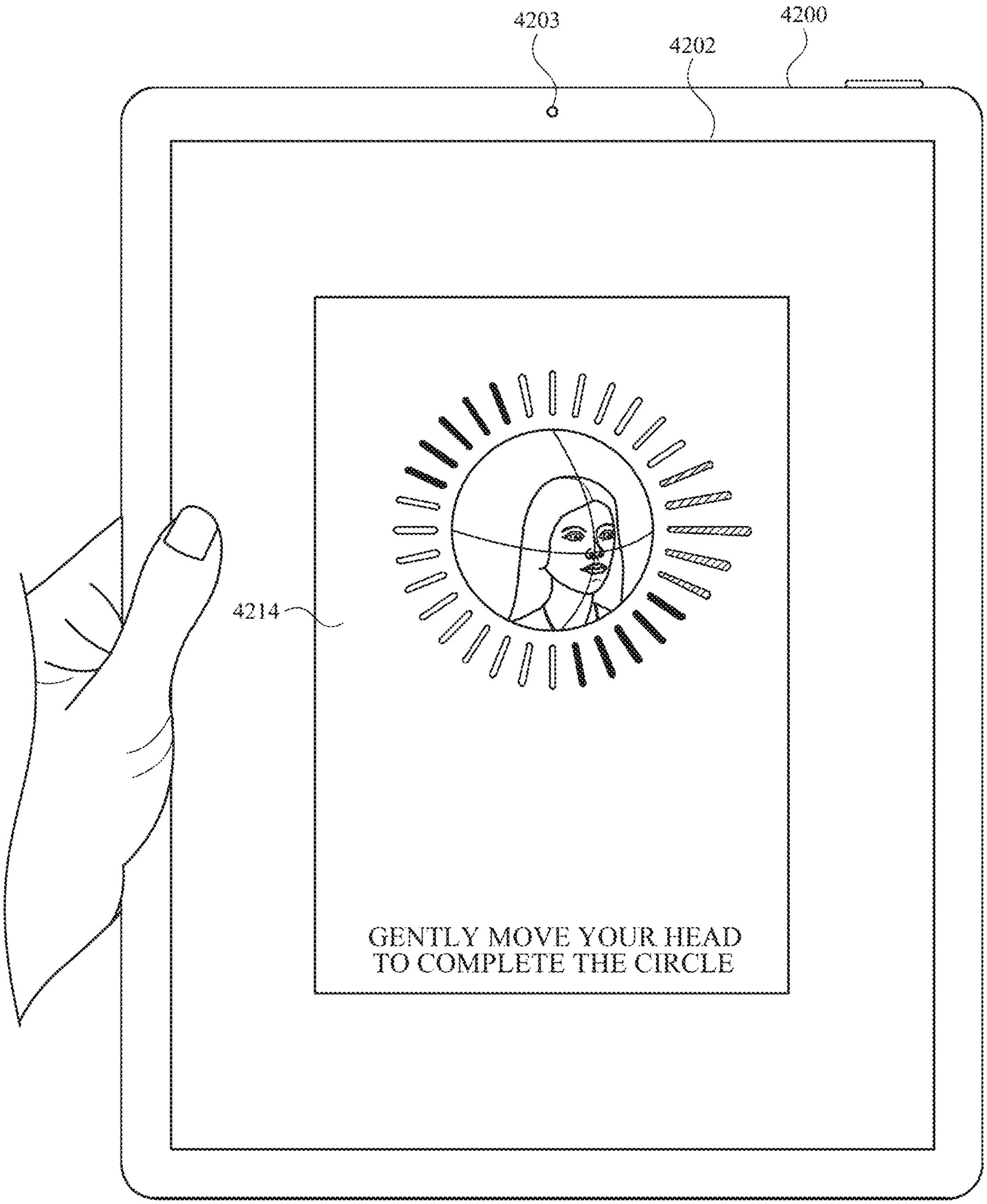
Figure 42F:
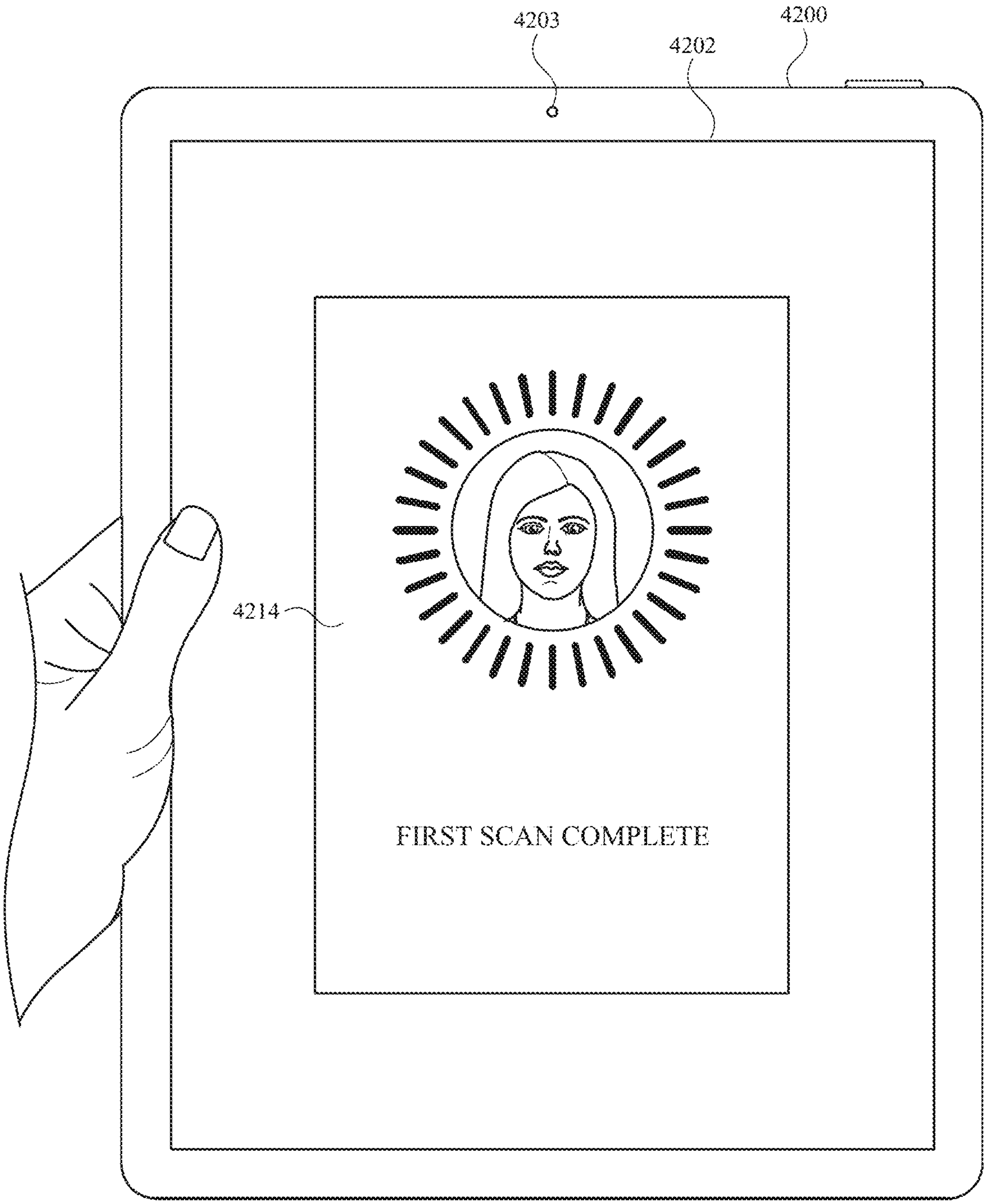

At FIG. 42D, in response to determining that electronic device 4200 is in a suitable orientation, electronic device 4200 automatically initiates a process for enrolling the user's face. As illustrated in FIGS. 42D-42F, after initiating the process for enrolling the user's face, electronic device 4200 displays face enrollment UI 4214. Face enrollment UI 4214 includes some or all of the features of face enrollment UI 1104.

Figure 42G:
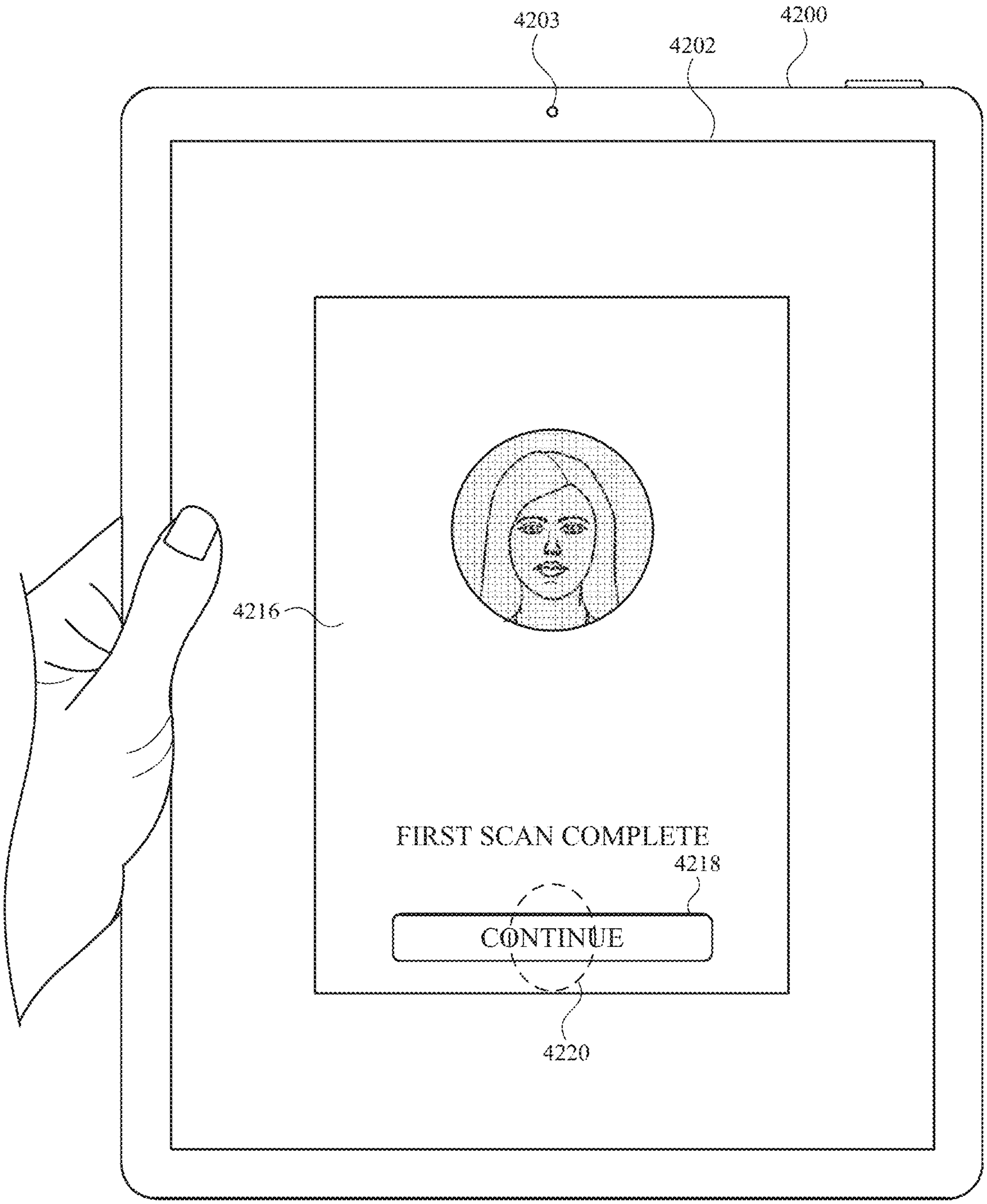

At FIG. 42G, after successfully completing the enrollment of the user's face, electronic device 4200 displays (e.g., replaces display of face enrollment UI 4214 with) scan completion interface 4216, which includes continue affordance 4218. Scan completion interface 4216 includes some or all of the features of scan completion interface 1130.

After completing enrollment of the user's face, a second iteration of the enrollment process is performed without requiring that the user re-orient the device. As depicted in FIG. 42G, while displaying scan completion interface 4216, electronic device 4200 receives input 4220 at continue affordance 4218 to initiate the second iteration of the enrollment process.

Figure 42H:
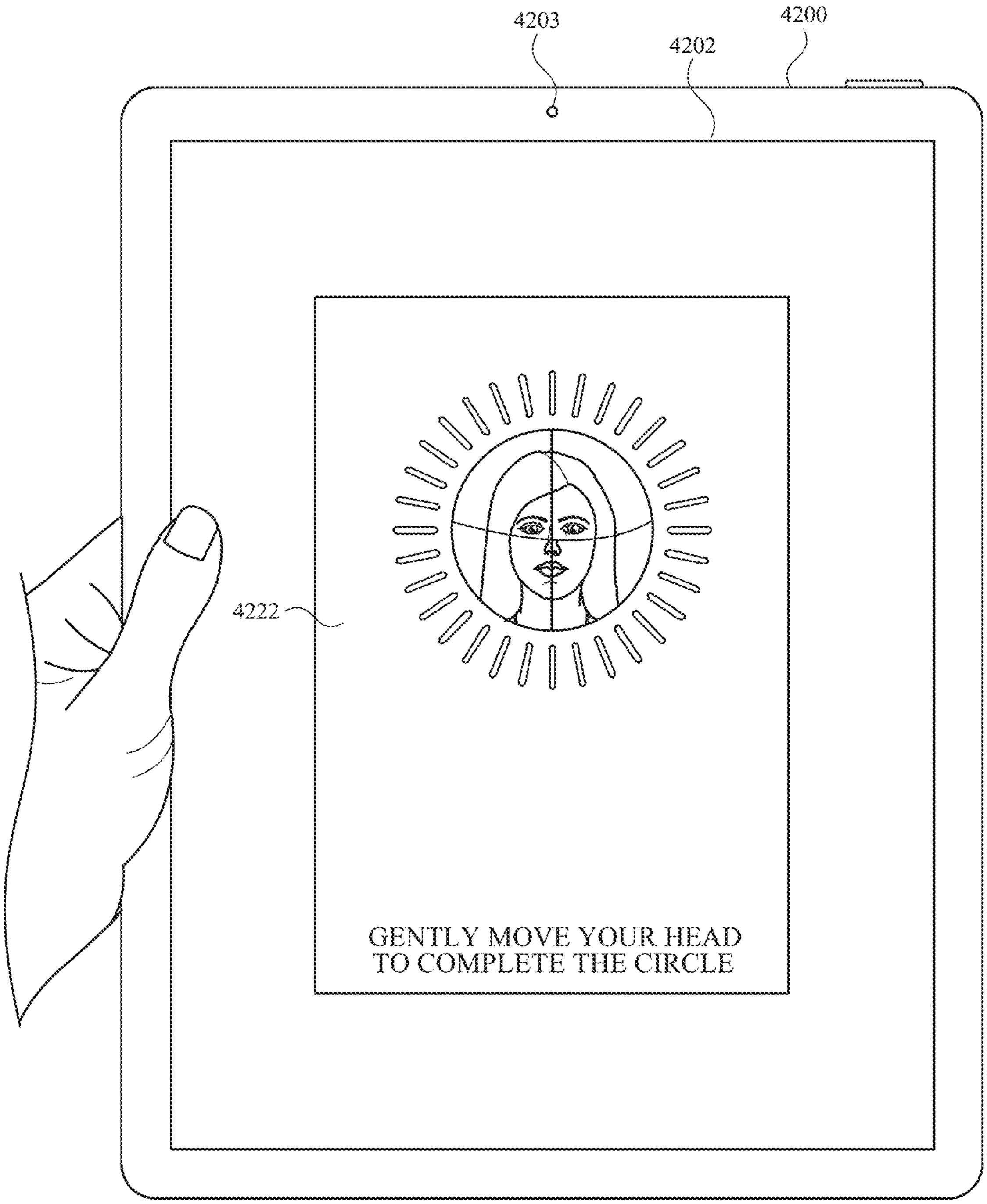

At FIG. 42H, in response to receiving input 4220 at continue affordance 4218, electronic device 4200 initiates a second iteration of the enrollment process, analogous to the processes described above with respect to FIGS. 42D-42F. Electronic device 4200 initiates the second iteration without prompting the user to re-orient the device to an orientation different from its current orientation. Initiating the second iteration of the enrollment process includes displaying second face enrollment UI 4222. Second face enrollment UI 4222 includes some or all of the features of second face enrollment UI 1138.

Figure 42I:
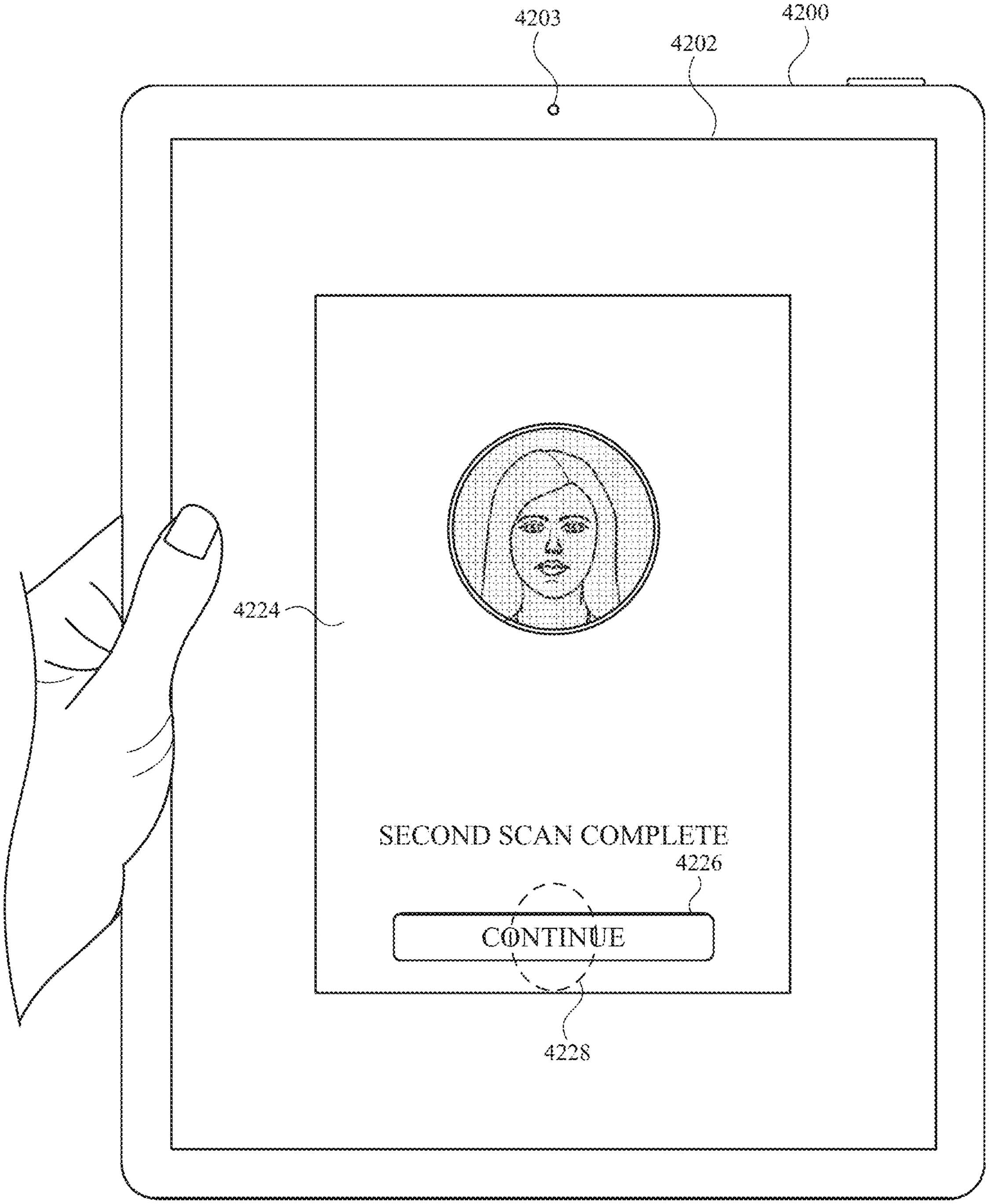

At FIG. 42I, after successfully completing the second iteration of the enrollment process, electronic device 4200 displays (e.g., replaces display of second face enrollment UI 4222 with) second scan completion interface 4224, which includes continue affordance 4226. Second scan completion interface 4224 includes some or all of the features of second scan completion interface 1156. As illustrated in FIG. 42I, electronic device 4200 receives input 4228 at continue affordance 4226.

Figure 42J:
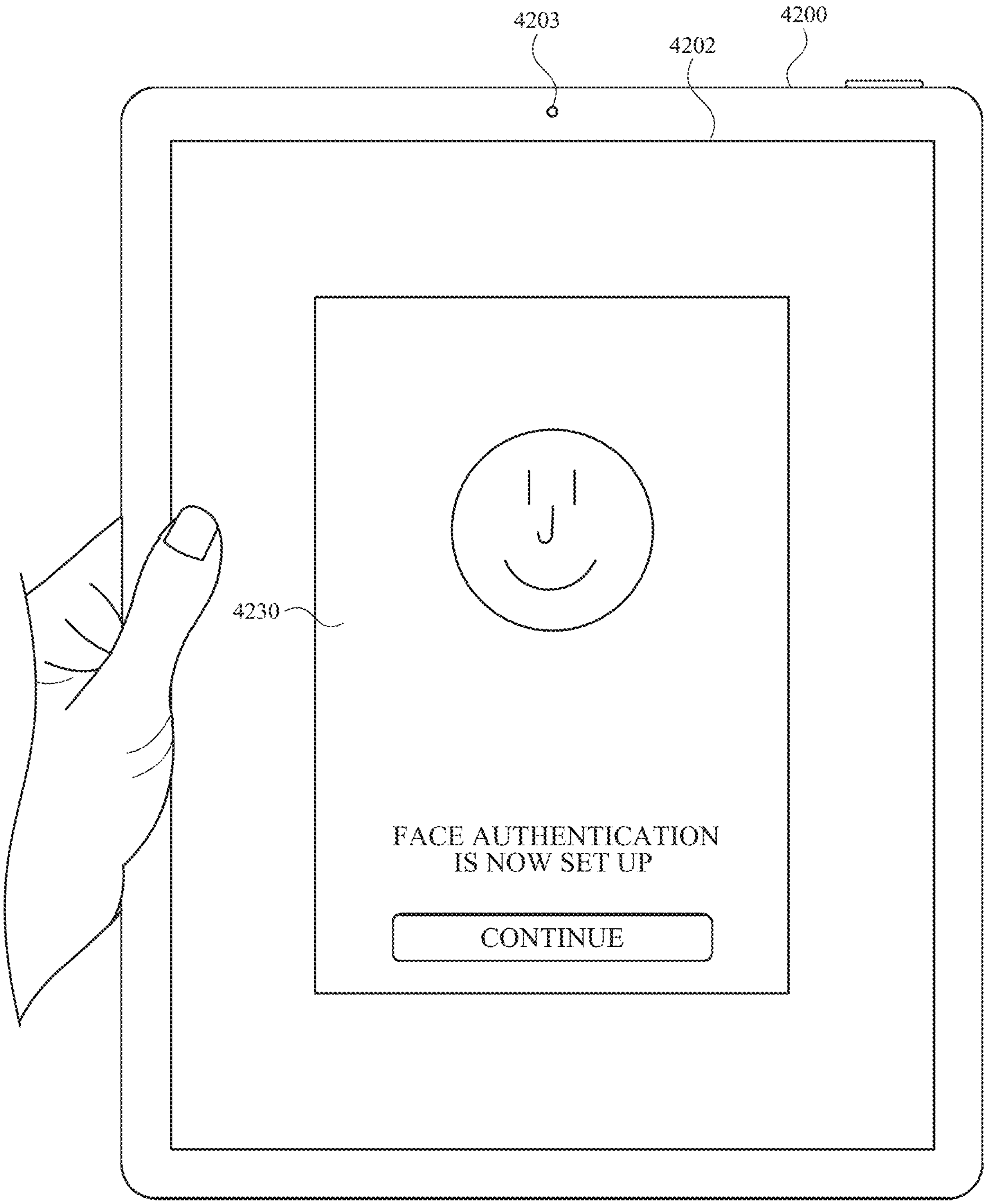

At FIG. 42J, in response to receiving input 4228 at continue affordance 4226, electronic device 4200 displays (e.g., replaces display of second scan completion interface 4224 with) enrollment completion interface 4230, providing an indication to the user that biometric authentication has been successfully set up on electronic device 4200. Enrollment completion interface 4230 includes some or all of the features of enrollment completion interface 1166.

Figure 42K:
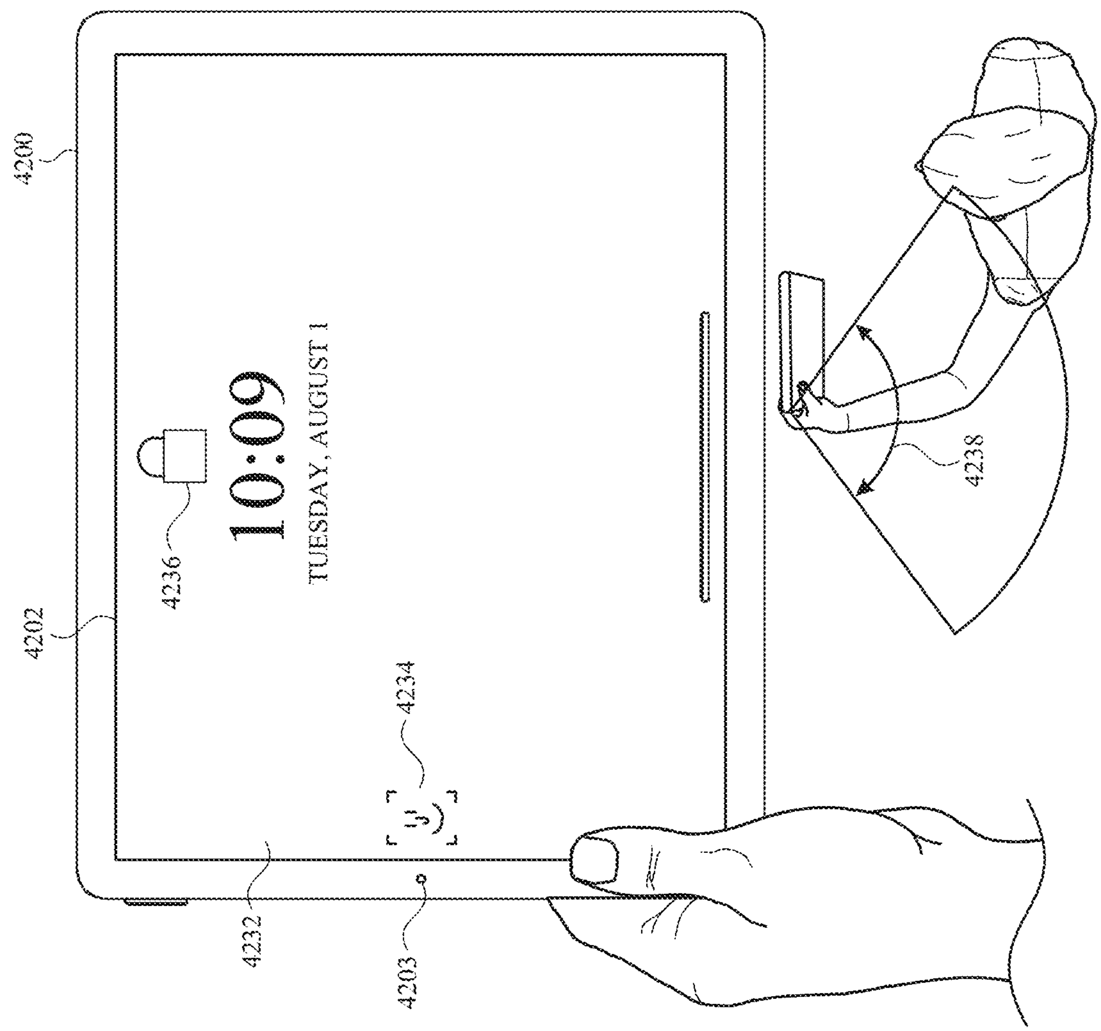

At FIG. 42K, after biometric authentication has been set up on electronic device 4200, a user can unlock electronic device 4200 (e.g., transition the device from a locked state to an unlocked state) using biometric authentication by presenting the user's face to biometric sensor 4203. In some examples, the user initiates biometric authentication to unlock the device by lifting (or raising) electronic device 4200 (e.g., from a substantially horizontal orientation). While electronic device 4200 is being lifted, electronic device 4200 detects a change in orientation of the device, and in response, initiates biometric authentication to unlock the device. It is noted that while electronic device 4200 is in a locked state, electronic device 4200 displays locked state interface 4232 including biometric sensor indicator 4234, which provides an indication to the user of the location of biometric sensor 4203, and lock icon 4236, which provides an indication that electronic device 4200 is in a locked state. In some examples, electronic device 4200 does not display biometric sensor indicator 4234 while electronic device 4200 is in a locked state.

Figure 42L:
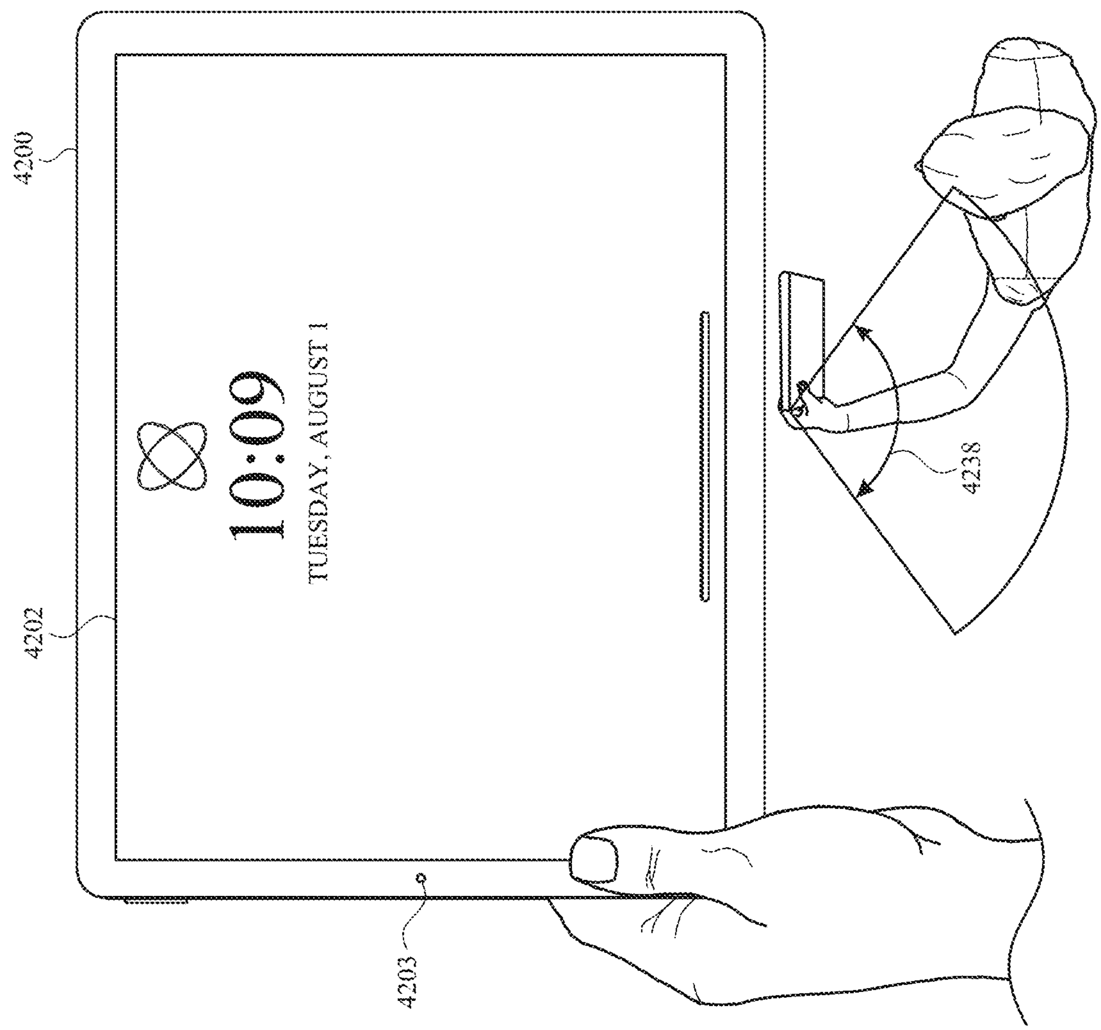

As depicted in FIG. 42L, when electronic device 4200 initiates biometric authentication, the user is holding electronic device 4200 such that the user's face is outside field of view 4238 of biometric sensor 4203. In some examples, the user's face is outside field of view 4238 when more than a threshold portion of the face is outside the field of view. In some examples, the user's face is outside field of view 4238 when no face is detected within the field of view. While attempting to biometrically authenticate the user's face, electronic device 4200 is unable to obtain sufficient information about the user's face using biometric sensor 4203. As a result, electronic device 4200 does not have sufficient information for comparison with the stored authorized credentials, which were generated from the enrollment process described above with respect to FIGS. 42D-42J.

Figure 42M:
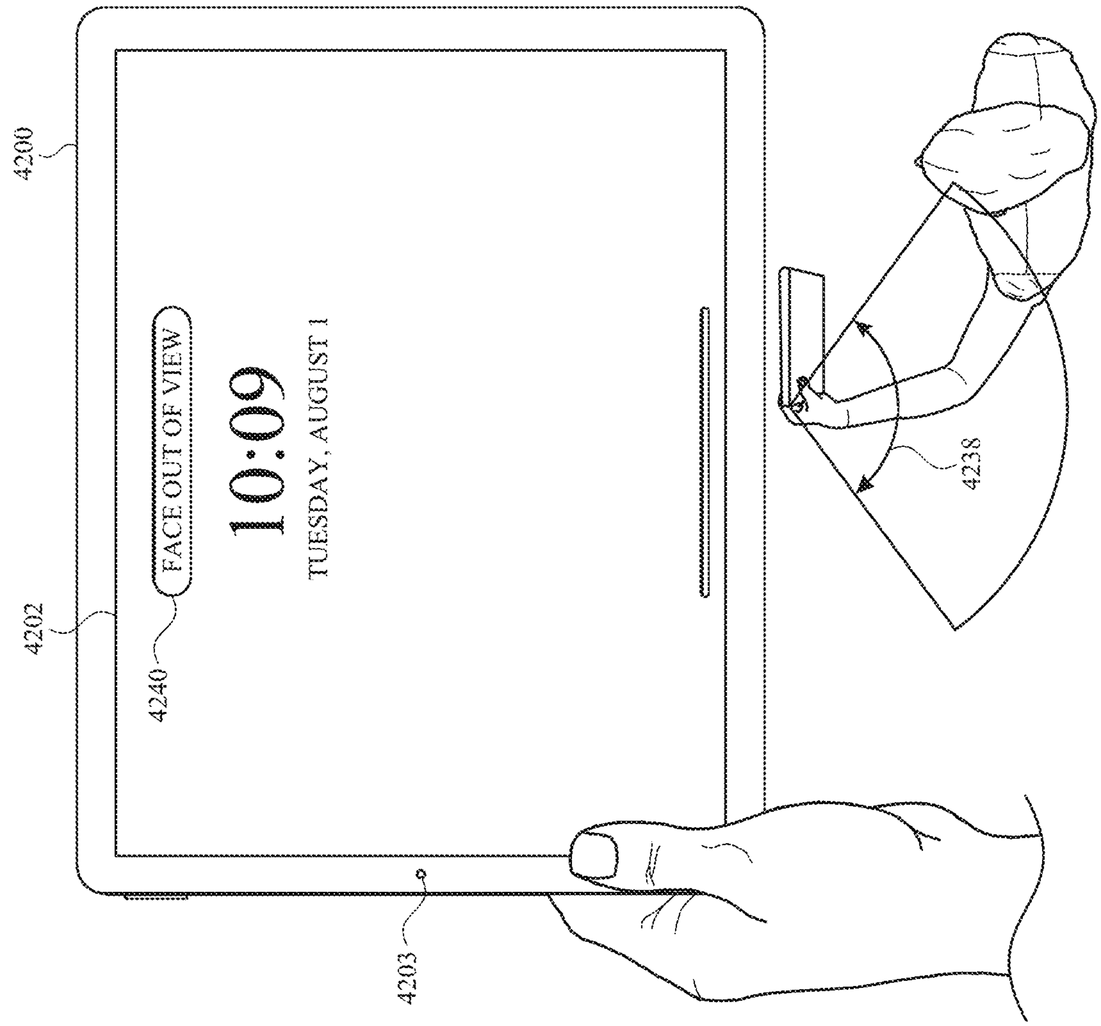

At FIG. 42M, upon determining that the user's face is outside field of view 4238, electronic device 4200 displays error indication 4240, which provides an indication to the user that the user's face is outside field of view 4238. (Error indication 4240 includes some or all of the features of error indication 3814G.) Additionally, upon determining that the user's face is outside field of view 4238, electronic device 4200 does not automatically retry authentication. In some examples, electronic device 4200 also displays biometric sensor indicator 4234. In some examples, if sufficient information had been obtained but authentication nevertheless failed (e.g., the obtained information did not match the stored authorized credentials), electronic device 4200 automatically retries biometric authentication.

Figure 42N:
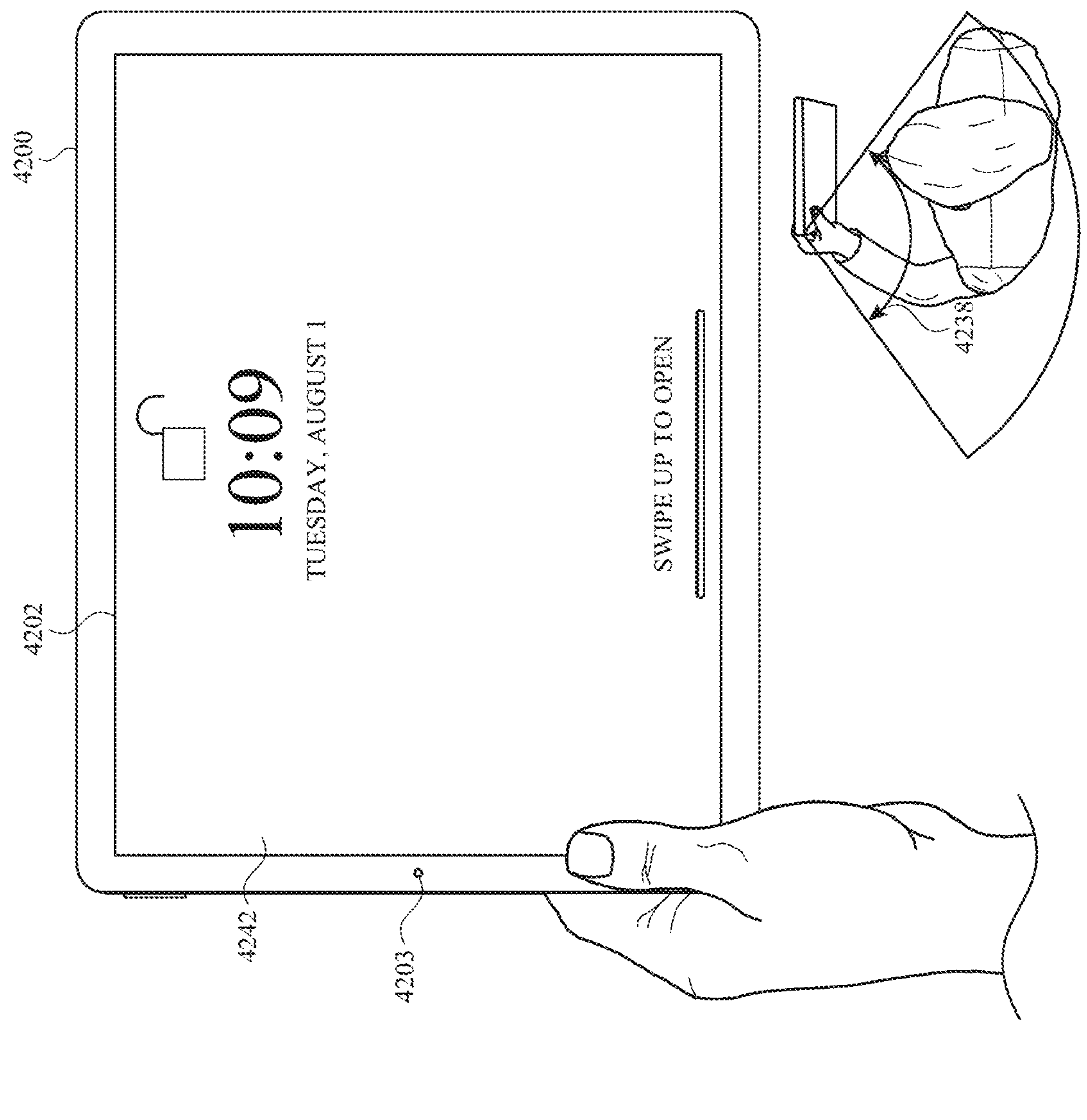

As depicted in FIG. 42N, after learning from error indication 4240 that the user's face is outside field of view 4238 of biometric sensor 4203, the user moves her face into field of view 4238 such that the user's face is within field of view 4238. In response to detecting that the cause of error indication 4240 has been corrected (e.g., detects more than a threshold amount of the user's face), electronic device 4200 automatically retries biometric authentication. Upon determining that authentication is successful as a result of retrying biometric authentication (e.g., the information obtained using biometric sensor 4203 matches the stored authorized credentials), electronic device 4200 transitions from a locked state to an unlocked state. After transitioning to the unlocked state, electronic displays unlocked state interface 4242.

Figure 42O:
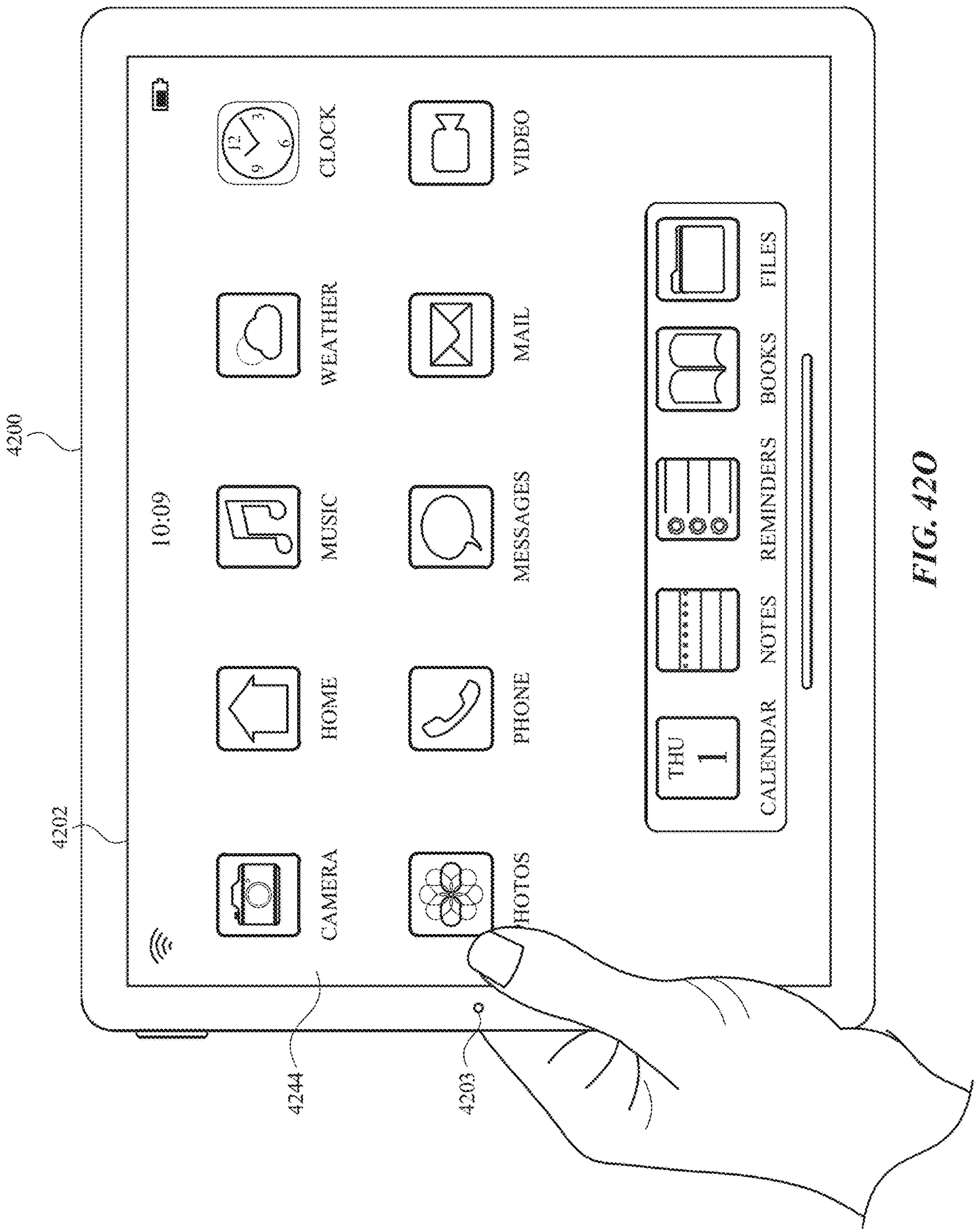

In some examples, while displaying unlocked state interface 4242, electronic device 4200 receives a request (e.g., an upward swipe starting from within a region adjacent to the bottom edge of display 4202) to access restricted content on the device (e.g., home screen 4244 of FIG. 42O, the most recently used application). In response to receiving the request to access restricted content, electronic device 4200 displays home screen 4244, including a plurality of icons that, when activated, result in launching an application corresponding to the activated icon. In some examples, instead of displaying home screen 4244, electronic device 4200 displays the most recently used application (e.g., a user interface of the application). It is noted that the above processes described above with respect to FIGS. 42K-42O are performed when electronic device 4200 is in a landscape orientation. However, in some examples, some or all of the processes described above with respect to FIGS. 42K-42N can be performed when electronic device 4200 is in a portrait orientation.

In some examples, instead of transitioning to an unlocked state as described with respect to FIG. 42N, electronic device 4200 maintains a locked state if the obtained information does not match the stored authorized credentials. In some examples, as depicted in FIG. 42P, upon determining that the obtained information does not match the stored authorized credentials, electronic device 4200 displays locked state interface 4232 while alternating the position of lock icon 4236 such that it simulates a "shake" effect, thereby providing an indication to the user that electronic device 4200 remains in a locked state.

FIGS. 43A-43C are flow diagrams illustrating a method for orienting the device to enroll a biometric feature (e.g., a face for later use in biometric authentication), in accordance with some examples. Method 4300 is performed at an electronic device (e.g., 100, 300, 500, 4200) with a display (e.g., 4202) and one or more biometric sensor (e.g., 4203) (e.g., a first biometric sensor of a device with a plurality of biometric sensors) (e.g., a fingerprint sensor, a contactless biometric sensor (e.g., a biometric sensor that does not require physical contact, such as a thermal or optical facial recognition sensor), an iris scanner). In some examples, the one or more biometric sensors include one or more cameras. Some operations in method 4300 are, optionally, combined, the orders of some operations are, optionally, changed, and some operations are, optionally, omitted.

As described below, method 4300 provides an intuitive way for prompting a user to orient a device to enroll a biometric feature. The method reduces the cognitive burden on a user for enrolling a biometric feature (e.g., a face for later use in biometric authentication), thereby creating a more efficient human-machine interface. For battery-operated computing devices, enabling a user to enroll a biometric feature faster and more efficiently conserves power and increases the time between battery charges.

The electronic device (e.g., 100, 300, 500, 4200) displays (4302), on the display (e.g., 4202), a biometric enrollment user interface (e.g., 4206) for initiating biometric enrollment with the one or more biometric sensors.

While displaying (4304) the biometric enrollment user interface, the electronic device receives input (e.g., 4210) (e.g., touch gesture (e.g., tap), spoken user input) corresponding to a request to initiate biometric enrollment.

In response (4306) to receiving the input (e.g., 4210) and in accordance (4308) with a determination that an orientation of the electronic device (e.g., current orientation, an orientation of the electronic device at (or near) the time of the input) satisfies a set of enrollment criteria, the electronic device initiates a process for enrolling a biometric feature with the one or more biometric sensors (e.g., 4203). In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. In some examples, the set of enrollment criteria includes whether the electronic device is in a certain (e.g., proper) orientation relative to a biometric feature (e.g., face) (e.g., a primary plane of the device (e.g., a plane defined by the display of the device) is facing the biometric feature). In some examples, initiating a process for enrolling a biometric feature includes capturing data corresponding to a face of a user using the one or more biometric sensors.

In response (4306) to receiving the input (e.g., 4210) and in accordance (4322) with a determination that the orientation of the electronic device does not satisfy the set of enrollment criteria, outputting one or more prompts (e.g., 4212A-B) (e.g., a visual, audio and/or tactile prompt) to change the orientation of the electronic device to a different orientation that satisfies the set of enrollment criteria. Outputting one or more prompts when the set of enrollment criteria are not satisfied provides the user with feedback as to what corrective actions to take to continue enrolling a biometric feature. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, outputting the one or more prompts includes outputting (4324) a first prompt (e.g., 4212A) to orient the electronic device to an initial orientation. In some examples, the initial orientation is an orientation such that the electronic device is not approximately parallel with respect to the ground. In some examples, the initial orientation is an orientation such that the electronic device is approximately parallel to the force of gravity. In some examples, the set of enrollment criteria includes a requirement that a primary plane of a device be substantially aligned with a predetermined plane (e.g., a plane that is substantially normal to the ground) such that the display of the device is substantially vertical. In some examples, the set of enrollment criteria includes a requirement that the primary plane of the device is not substantially aligned with a (second) predetermined plane (e.g., a plane that is substantially parallel to the ground) such that the device is not resting on a horizontal surface while attempting to enroll a biometric feature. In some examples, outputting the one or more prompts includes, subsequent to outputting the first prompt (e.g., 4212A), outputting (4326) a second prompt (e.g., 4212B) to orient the electronic device to the different orientation that satisfies the set of enrollment criteria, the first prompt being different from the second prompt. In some examples, the electronic device outputs the first prompt without outputting the second prompt. In some examples, the electronic device ceases outputting the first prompt when the orientation of the electronic device changes to the initial orientation. In some examples, the electronic device outputs the second prompt when the orientation of the electronic device changes to the initial orientation. In some examples, the electronic device outputs the second prompt without outputting the first prompt (e.g., when the electronic device is already in the initial orientation). In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. Outputting the first prompt without outputting the second prompt provides improved feedback to the user as it reduces the chances of confusion when the user is taking corrective actions to trigger enrollment of a biometric feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some examples, no indicator is displayed during biometric authentication.

In some examples, outputting the one or more prompts includes outputting a third prompt (e.g., 4212B) to rotate the electronic device (e.g., about an axis perpendicular to the electronic device) to the different orientation that satisfies the set of enrollment criteria, the third prompt being based on the orientation of the electronic device while receiving the input. In some examples, the third prompt is the second prompt. In some examples, in accordance with a determination that the orientation of the electronic device is in a first orientation, the electronic device outputs a first rotation prompt to rotate the electronic device to the different orientation that satisfies the set of enrollment criteria. In some examples, in accordance with a determination that the orientation of the electronic device is in a second orientation that is different from the first orientation, the electronic device outputs a second rotation prompt to rotate the electronic device to the different orientation that satisfies the set of enrollment criteria, the second rotation prompt being different from the first rotation prompt. In some examples, the first rotation prompt or the second rotation prompt is the second prompt. In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. Outputting a prompt based on the orientation of the device provides feedback to the user as to an efficient process for achieving a suitable orientation of the device for enrolling a biometric feature. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples outputting the one or more prompts includes outputting a fourth prompt (e.g., 4212B) to rotate (e.g., a long an axis parallel to a primary plane (e.g., a plane defined by the display of the device) of the device) the electronic device (e.g., about an axis perpendicular to the electronic device) to the different orientation that satisfies the set of enrollment criteria, the third prompt being based on an alignment of a primary plane of the device (e.g., a plane defined by the display of the device) to a predetermined plane (e.g., a plane that is substantially normal to the ground; a plane that is substantially parallel to the ground). In some examples, the electronic device outputs the fourth prompt in accordance with a determination that the electronic device is oriented substantially parallel to the ground. In some examples, the set of enrollment criteria includes a requirement that a primary plane of a device be substantially aligned with a predetermined plane (e.g., a plane that is substantially normal to the ground) such that the display of the device is substantially vertical. In some examples, the set of enrollment criteria includes a requirement that the primary plane of the device is not substantially aligned with a (second) predetermined plane (e.g., a plane that is substantially parallel to the ground) such that the device is not resting on a horizontal surface while attempting to enroll a biometric feature.

In some examples, subsequent to initiating the process for enrolling the biometric feature (e.g., subsequent to successfully enrolling a biometric feature), the electronic device (e.g., 100, 300, 500, 4200) receives a request to perform an operation that requires authentication (e.g., a request to unlock the device (e.g., perform a swipe at a predefined location)). In some examples, the electronic device receives the request to perform the operation that requires authentication subsequent to performing (or completing) biometric enrollment. In some examples, the electronic device receives the request to perform the operation that requires authentication subsequent to outputting the one or more prompts (e.g., 4212A-B) (e.g., a visual, audio and/or tactile prompt) to change the orientation of the electronic device to the different orientation that satisfies the set of enrollment criteria. In some examples, in response to receiving the request to perform the operation that requires authentication, the electronic device attempts authentication using the one or more biometric sensors (e.g., 4203) (e.g., that includes obtaining data by the one or more biometric sensors). In some examples, after attempting (e.g., unsuccessfully attempting) authentication using the one or more biometric sensors and in accordance with a determination that data obtained by the one or more biometric sensors corresponds to less than a threshold amount of a biometric feature (e.g., part of a face/fingerprint, not a whole face/fingerprint) (e.g., due to the face being outside the field of view (e.g., 4238), the electronic device forgoes retrying authentication. In some examples, the electronic device forgoes automatically retrying authentication. In some examples, after attempting authentication using the one or more biometric sensors, the electronic device forgoes retrying authentication due to biometric authentication having failed more than a predetermined number of times (e.g., 5, 10, 15) since the last successful authentication with the device. In some examples, the electronic device forgoes retrying authentication without an explicit request to perform an operation that requires authentication (e.g., a request to unlock the device (e.g., perform a swipe at a predefined location)). In some examples, after an initial attempt at authentication does not succeed, the electronic device retries biometric authentication if a determination is not made that data obtained by the one or more biometric sensors corresponds to only a portion of a biometric feature. Forgoing retrying authentication when less than a threshold amount of a biometric feature is obtained avoids the user consuming the permitted number of attempts on repeated requests (e.g., repeated requests of the same type), thereby conserving at least one attempt for requests for other operations that require biometric authentication. Conserving at least one attempt enhances the operability of the device and makes the user-device interface more efficient (e.g., by avoiding exhaustion of authentication attempts on repeated, similar requests) which, additionally, reduces power usage and improves battery life of the device by enabling the user to use the device more quickly and efficiently.

In some examples, after attempting (e.g., unsuccessfully attempting) authentication using the one or more biometric sensors and in accordance with a determination that the data obtained by the one or more biometric sensors corresponds to not less (e.g., more) than the threshold amount of the biometric feature, the electronic device retries authentication. Automatically retrying authentication when a threshold amount of the biometric feature is obtained provides the user the ability to attempt authentication when the conditions are appropriate without requiring the user to explicitly request retrying authentication. Performing an operation when a set of conditions has been met without requiring further user input enhances the operability of the device (e.g., increases the chances of successful authentication) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, in accordance with a determination that authentication resulting from retrying authentication is successful, the electronic device (e.g., 100, 300, 500, 4200) performs an operation corresponding to the request. In some examples, in accordance with a determination that authentication resulting from retrying authentication is not successful, the electronic device forgoes performing the operation corresponding to the request. In some examples, authentication is successful when the biometric information captured using the one or more biometric sensors corresponds to (or matches) authorized credentials (e.g., stored information about a biometric feature (e.g., face, fingerprint) that are authorized for use in biometric authentication). In some examples, authentication is unsuccessful when the biometric information captured using the one or more biometric sensors does not correspond to (or match) authorized credentials (e.g., stored information about a biometric feature (e.g., face, fingerprint) that are authorized for use in biometric authentication). Forgoing performing the operation when authentication is not successful enhances device security by preventing fraudulent and/or unauthorized access to the device. Improving security measures of the device enhances the operability of the device by preventing unauthorized access to content and operations and, additionally, reduces power usage and improves battery life of the device by enabling the user to use the device more efficiently.

In some examples, subsequent to outputting the one or more prompts (e.g., 4212A-B) (e.g., a visual, audio and/or tactile prompt) to change the orientation of the electronic device to the different orientation that satisfies the set of enrollment criteria, the electronic device (e.g., 100, 300, 500, 4200) detects (4328) that the current orientation of the electronic device satisfies the set of enrollment criteria. In some examples, in response (4330) to determining that the current orientation of the electronic device satisfies the set of enrollment criteria, the electronic device initiates the process for enrolling the biometric feature with the one or more biometric sensors. In some examples, the set of enrollment criteria includes whether the electronic device is oriented in a portrait orientation with respect to a frame of reference (e.g., Earth, ground), whether the one or more biometric sensors are oriented (or located) at a particular side of the electronic device in the portrait orientation (e.g., the side furthest away from Earth), or whether the electronic device is oriented such that it is not approximately parallel with respect to the ground. In some examples, the set of enrollment criteria includes a requirement that a primary plane of a device be substantially aligned with a predetermined plane (e.g., a plane that is substantially normal to the ground) such that the display of the device is substantially vertical. In some examples, the set of enrollment criteria includes a requirement that the primary plane of the device is not substantially aligned with a (second) predetermined plane (e.g., a plane that is substantially parallel to the ground) such that the device is not resting on a horizontal surface while attempting to enroll a biometric feature. In some examples, the set of enrollment criteria includes whether the electronic device is in a certain (e.g., proper) orientation relative to a biometric feature (e.g., face) (e.g., a primary plane of the device (e.g., a plane defined by the display of the device) is facing the biometric feature).

In some examples, initiating the process for enrolling the biometric feature with the one or more biometric sensors includes successfully enrolling the biometric feature. In some examples, subsequent to successfully enrolling the biometric feature, the electronic device (e.g., 100, 300, 500,

4200) outputs (4312) a prompt (e.g., corresponding to 4222) to enroll the biometric feature for a second time with the one or more biometric sensors. In some examples, the electronic device outputs the prompt to enroll the biometric feature without prompting to change the orientation of the electronic device.

In some examples, initiating the process for enrolling the biometric feature with the one or more biometric sensors includes (4310) successfully enrolling the biometric feature. In some examples, subsequent to successfully enrolling the biometric feature, the electronic device (e.g., 100, 300, 500, 4200) receives (4314) a request to perform an operation that requires authentication (e.g., a request to unlock the device (e.g., perform a swipe at a predefined location), request to access home screen (e.g., 4244)). In some examples, in response (4316) to receiving the request to perform the operation that requires authentication and in accordance (4318) with a determination that data obtained by the one or more biometric sensors corresponds to (e.g., matches) the enrolled biometric feature, the electronic device performs the operation that requires authentication. In some examples, in response to receiving the request to perform the operation that requires authentication, the electronic device performs authentication (or attempts to authenticate) using the one or more biometric sensor (e.g., 4203). In some examples, in response (4316) to receiving the request to perform the operation that requires authentication and in accordance (4320) with a determination that data obtained by the one or more biometric sensors does not correspond to (e.g., does not match) the enrolled biometric feature, the electronic device forgoes performing the operation that requires authentication.

Note that details of the processes described above with respect to method 4300 (e.g., FIGS. 43A-43C) are also applicable in an analogous manner to the methods described below/above. For example, method 3700, method 3900, and/or method 4100 optionally include one or more of the characteristics of the various methods described above with reference to method 4300. For example, the processes described in method 4300 for enrolling a biometric feature can be used to enroll a face for later use in biometric authentication, such as retrying biometric authentication at a passcode entry user interface, as described in method 3700. As another example, the enrolled face can be used to authorized payment for goods, as described in method 4100. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that can be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:

a display;

a biometric sensor at a first portion of the electronic device;

one or more processors; and memory storing one or more programs configured to be executed by the one or more processors, the one or more programs including instructions for:

while the device is locked, detecting the existence of an error condition that prevents the biometric sensor from obtaining biometric information about a user of the device;

in response to detecting the existence of the error condition, concurrently displaying, on the display:

a first error indication in a first region of a user interface; and a second error indication, wherein the second error indication is displayed at a location that is proximate to the first portion of the electronic device, including:

in accordance with a determination that the user interface of the electronic device is in a first orientation relative to the biometric sensor, displaying the second error indication at a first location in the user interface that is proximate to the first portion of the electronic device; and in accordance with a determination that the user interface of the electronic device is in a second orientation relative to the biometric sensor, displaying the second error indication at a second location in the user interface that is proximate to the first portion of the electronic device, the first orientation being different from the second orientation; and after the error condition has been corrected, obtaining biometric information about a user of the device, and in response to obtaining the biometric information about the user of the device, in accordance with a determination that the biometric information matches enrolled biometric information, unlocking the device and displaying an indication that the device has been unlocked in the first region of the user interface.

2. The electronic device of claim 1, wherein the second error indication includes a biometric sensor occluded icon and a reticle, the second error indication providing an indication that the biometric sensor is occluded.

3. The electronic device of claim 1, the one or more programs further including instructions for:

while attempting to obtain biometric information using the biometric sensor:

displaying, on the display, a first progress indicator, including:

in accordance with a determination that the user interface of the electronic device is in a third orientation relative to the biometric sensor, the user interface in the third orientation having a first top side, displaying the first progress indicator proximate to the first top side of the user interface in the third orientation; and in accordance with a determination that the user interface of the electronic device is in a fourth orientation relative to the biometric sensor, the user interface in the fourth orientation having a second top side, displaying the first progress indicator proximate to the second top side of the user interface in the fourth orientation, the third orientation being different from the fourth orientation.

4. The electronic device of claim 1, the one or more programs further including instructions for:

displaying, on the display, a second progress indicator of the electronic device, the second progress indicator being an animation with a first portion and a second portion that is different from the first portion, including:

in accordance with a determination that the second progress indicator is displayed at the location that is proximate to the first portion of the electronic device, displaying the second error indication as part of the animation subsequent to the first portion and prior to the second portion.

5. The electronic device of claim 1, the one or more programs further including instructions for:

displaying, on the display, a home affordance at a third location in the user interface; and in accordance with a determination that the second error indication is displayed at the third location, ceasing to display the home affordance while displaying the second error indication at the third location.

6. The electronic device of claim 5, the one or more programs further including instructions for:

after ceasing to display the home affordance, detecting a correction of the error condition that prevents the biometric sensor from obtaining biometric information about the user of the device; and in response to detecting the correction of the error condition, displaying, on the display, the home affordance at the third location in the user interface.

7. The electronic device of claim 1, the one or more programs further including instructions for:

detecting an input at the location that is proximate to the first portion of the electronic device; and in response to detecting the input at the location that is proximate to the first portion of the electronic device, displaying, on the display, the second error indication at a different location, wherein the different location is a location at which the input is not detected.

8. The electronic device of claim 1, the one or more programs further including instructions for:

displaying, on the display, a first transaction interface at a position that is proximate to the first portion of the electronic device.

9. The electronic device of claim 8, wherein displaying the first transaction interface includes displaying an animation of the first transaction interface transitioning from an initial position that is substantially centered with respect to the display to the position that is proximate to the first portion of the electronic device.

10. The electronic device of claim 1, the one or more programs further including instructions for:

displaying, on the display, a prompt to provide one or more activations of a hardware button of the electronic device; receiving one or more activations of the hardware button of the electronic device; and in response to receiving the one or more activations of the hardware button, displaying, on the display, an authentication progress indicator, wherein displaying the authentication progress indicator includes displaying an animation of the authentication progress indicator transitioning from a location of the prompt to a final position of the authentication progress indicator.

11. The electronic device of claim 1, the one or more programs further including instructions for:

concurrently displaying, on the display, a first application in a first region and a second application in a second region, the second application being adjacent to the first application;

displaying, on the display, a second transaction interface;

in accordance with a determination that the second transaction interface corresponds to the first application, modifying a first visual characteristic of the first application; and in accordance with a determination that the second transaction interface corresponds to the second application, modifying a first visual characteristic of the second application.

12. The electronic device of claim 11, wherein:

modifying the first visual characteristic of the first application includes modifying a second visual characteristic of the second application, and modifying the first visual characteristic of the second application includes modifying a second visual characteristic of the first application.

13. The electronic device of claim 11, wherein:

modifying the first visual characteristic of the first application includes displaying the first application in the second region in accordance with a determination that the second region is closer to the first portion of the electronic device than the first region, and modifying the first visual characteristic of the second application includes displaying the second application in the first region in accordance with a determination that the first region is closer to the first portion of the electronic device than the second region.

14. The electronic device of claim 11, wherein, displaying the second transaction interface includes:

in accordance with the determination that the second transaction interface corresponds to the first application, the second transaction interface includes an indication of the first application, and in accordance with the determination that the second transaction interface corresponds to the second application, the second transaction interface includes an indication of the second application.

15. A non-transitory computer-readable storage medium storing one or more programs configured to be executed by one or more processors of an electronic device with a display and a biometric sensor at a first portion of the electronic device, the one or more programs including instructions for:

while the device is locked, detecting the existence of an error condition that prevents the biometric sensor from obtaining biometric information about a user of the device;

in response to detecting the existence of the error condition, concurrently displaying, on the display:

a first error indication in a first region of a user interface; and a second error indication, wherein the second error indication is displayed at a location that is proximate to the first portion of the electronic device, including:

in accordance with a determination that the user interface of the electronic device is in a first orientation relative to the biometric sensor, displaying the second error indication at a first location in the user interface that is proximate to the first portion of the electronic device; and in accordance with a determination that the user interface of the electronic device is in a second orientation relative to the biometric sensor, displaying the second error indication at a second location in the user interface that is proximate to the first portion of the electronic device, the first orientation being different from the second orientation; and after the error condition has been corrected, obtaining biometric information about a user of the device, and in response to obtaining the biometric information about the user of the device, in accordance with a determination that the biometric information matches enrolled biometric information, unlocking the device and displaying an indication that the device has been unlocked in the first region of the user interface.

16. The non-transitory computer-readable storage medium of claim 15, wherein the second error indication includes a biometric sensor occluded icon and a reticle, the second error indication providing an indication that the biometric sensor is occluded.

17. The non-transitory computer-readable storage medium of claim 15, the one or more programs further including instructions for:

while attempting to obtain biometric information using the biometric sensor:

displaying, on the display, a first progress indicator, including:

in accordance with a determination that the user interface of the electronic device is in a third orientation relative to the biometric sensor, the user interface in the third orientation having a first top side, displaying the first progress indicator proximate to the first top side of the user interface in the third orientation; and in accordance with a determination that the user interface of the electronic device is in a fourth orientation relative to the biometric sensor, the user interface in the fourth orientation having a second top side, displaying the first progress indicator proximate to the second top side of the user interface in the fourth orientation, the third orientation being different from the fourth orientation.

18. The non-transitory computer-readable storage medium of claim 15, the one or more programs further including instructions for:

displaying, on the display, a second progress indicator of the electronic device, the second progress indicator being an animation with a first portion and a second portion that is different from the first portion, including:

in accordance with a determination that the second progress indicator is displayed at the location that is proximate to the first portion of the electronic device, displaying the second error indication as part of the animation subsequent to the first portion and prior to the second portion.

19. The non-transitory computer-readable storage medium of claim 15, the one or more programs further including instructions for:

displaying, on the display, a home affordance at a third location in the user interface; and in accordance with a determination that the second error indication is displayed at the third location, ceasing to display the home affordance while displaying the second error indication at the third location.

20. The non-transitory computer-readable storage medium of claim 19, the one or more programs further including instructions for:

after ceasing to display the home affordance, detecting a correction of the error condition that prevents the biometric sensor from obtaining biometric information about the user of the device; and in response to detecting the correction of the error condition, displaying, on the display, the home affordance at the third location in the user interface.

21. The non-transitory computer-readable storage medium of claim 15, the one or more programs further including instructions for:

detecting an input at the location that is proximate to the first portion of the electronic device; and in response to detecting the input at the location that is proximate to the first portion of the electronic device, displaying, on the display, the second error indication at a different location, wherein the different location is a location at which the input is not detected.

22. The non-transitory computer-readable storage medium of claim 15, the one or more programs further including instructions for:

displaying, on the display, a first transaction interface at a position that is proximate to the first portion of the electronic device.

23. The non-transitory computer-readable storage medium of claim 22, wherein displaying the first transaction interface includes displaying an animation of the first transaction interface transitioning from an initial position that is substantially centered with respect to the display to the position that is proximate to the first portion of the electronic device.

24. The non-transitory computer-readable storage medium of claim 15, the one or more programs further including instructions for:

displaying, on the display, a prompt to provide one or more activations of a hardware button of the electronic device; receiving one or more activations of the hardware button of the electronic device; and in response to receiving the one or more activations of the hardware button, displaying, on the display, an authentication progress indicator, wherein displaying the authentication progress indicator includes displaying an animation of the authentication progress indicator transitioning from a location of the prompt to a final position of the authentication progress indicator.

25. The non-transitory computer-readable storage medium of claim 15, the one or more programs further including instructions for:

concurrently displaying, on the display, a first application in a first region and a second application in a second region, the second application being adjacent to the first application;

displaying, on the display, a second transaction interface; in accordance with a determination that the second transaction interface corresponds to the first application, modifying a first visual characteristic of the first application; and in accordance with a determination that the second transaction interface corresponds to the second application, modifying a first visual characteristic of the second application.

26. The non-transitory computer-readable storage medium of claim 25, wherein:

modifying the first visual characteristic of the first application includes modifying a second visual characteristic of the second application, and modifying the first visual characteristic of the second application includes modifying a second visual characteristic of the first application.

27. The non-transitory computer-readable storage medium of claim 25, wherein:

modifying the first visual characteristic of the first application includes displaying the first application in the second region in accordance with a determination that the second region is closer to the first portion of the electronic device than the first region, and modifying the first visual characteristic of the second application includes displaying the second application in the first region in accordance with a determination that the first region is closer to the first portion of the electronic device than the second region.

28. The non-transitory computer-readable storage medium of claim 25, wherein, displaying the second transaction interface includes:

in accordance with the determination that the second transaction interface corresponds to the first application, the second transaction interface includes an indication of the first application, and in accordance with the determination that the second transaction interface corresponds to the second application, the second transaction interface includes an indication of the second application.

29. A method, comprising:

at an electronic device with a display and a biometric sensor at a first portion of the electronic device:

while the device is locked, detecting the existence of an error condition that prevents the biometric sensor from obtaining biometric information about a user of the device;

in response to detecting the existence of the error condition, concurrently displaying, on the display:

a first error indication in a first region of a user interface; and a second error indication, wherein the second error indication is displayed at a location that is proximate to the first portion of the electronic device, including:

in accordance with a determination that the user interface of the electronic device is in a first orientation relative to the biometric sensor, displaying the second error indication at a first location in the user interface that is proximate to the first portion of the electronic device; and in accordance with a determination that the user interface of the electronic device is in a second orientation relative to the biometric sensor, displaying the second error indication at a second location in the user interface that is proximate to the first portion of the electronic device, the first orientation being different from the second orientation; and after the error condition has been corrected, obtaining biometric information about a user of the device, and in response to obtaining the biometric information about the user of the device, in accordance with a determination that the biometric information matches enrolled biometric information, unlocking the device and displaying an indication that the device has been unlocked in the first region of the user interface.

30. The method of claim 29, wherein the second error indication includes a biometric sensor occluded icon and a reticle, the second error indication providing an indication that the biometric sensor is occluded.

31. The method of claim 29, further comprising:

while attempting to obtain biometric information using the biometric sensor:

displaying, on the display, a first progress indicator, including:

in accordance with a determination that the user interface of the electronic device is in a third orientation relative to the biometric sensor, the user interface in the third orientation having a first top side, displaying the first progress indicator proximate to the first top side of the user interface in the third orientation; and in accordance with a determination that the user interface of the electronic device is in a fourth orientation relative to the biometric sensor, the user interface in the fourth orientation having a second top side, displaying the first progress indicator proximate to the second top side of the user interface in the fourth orientation, the third orientation being different from the fourth orientation.

32. The method of claim 29, further comprising:

displaying, on the display, a second progress indicator of the electronic device, the second progress indicator being an animation with a first portion and a second portion that is different from the first portion, including:

in accordance with a determination that the second progress indicator is displayed at the location that is proximate to the first portion of the electronic device, displaying the second error indication as part of the animation subsequent to the first portion and prior to the second portion.

33. The method of claim 29, further comprising:

displaying, on the display, a home affordance at a third location in the user interface; and in accordance with a determination that the second error indication is displayed at the third location, ceasing to display the home affordance while displaying the second error indication at the third location.

34. The method of claim 33, further comprising:

after ceasing to display the home affordance, detecting a correction of the error condition that prevents the biometric sensor from obtaining biometric information about the user of the device; and in response to detecting the correction of the error condition, displaying, on the display, the home affordance at the third location in the user interface.

35. The method of claim 29, further comprising:

detecting an input at the location that is proximate to the first portion of the electronic device; and in response to detecting the input at the location that is proximate to the first portion of the electronic device, displaying, on the display, the second error indication at a different location, wherein the different location is a location at which the input is not detected.

36. The method of claim 29, further comprising:

displaying, on the display, a first transaction interface at a position that is proximate to the first portion of the electronic device.

37. The method of claim 36, wherein displaying the first transaction interface includes displaying an animation of the first transaction interface transitioning from an initial position that is substantially centered with respect to the display to the position that is proximate to the first portion of the electronic device.

38. The method of claim 29, further comprising:

displaying, on the display, a prompt to provide one or more activations of a hardware button of the electronic device; receiving one or more activations of the hardware button of the electronic device; and in response to receiving the one or more activations of the hardware button, displaying, on the display, an authentication progress indicator, wherein displaying the authentication progress indicator includes displaying an animation of the authentication progress indicator transitioning from a location of the prompt to a final position of the authentication progress indicator.

39. The method of claim 29, further comprising:

concurrently displaying, on the display, a first application in a first region and a second application in a second region, the second application being adjacent to the first application;

displaying, on the display, a second transaction interface;

in accordance with a determination that the second transaction interface corresponds to the first application, modifying a first visual characteristic of the first application; and in accordance with a determination that the second transaction interface corresponds to the second application, modifying a first visual characteristic of the second application.

40. The method of claim 39, wherein:

modifying the first visual characteristic of the first application includes modifying a second visual characteristic of the second application, and modifying the first visual characteristic of the second application includes modifying a second visual characteristic of the first application.

41. The method of claim 39, wherein:

modifying the first visual characteristic of the first application includes displaying the first application in the second region in accordance with a determination that the second region is closer to the first portion of the electronic device than the first region, and modifying the first visual characteristic of the second application includes displaying the second application in the first region in accordance with a determination that the first region is closer to the first portion of the electronic device than the second region.

42. The method of claim 39, wherein, displaying the second transaction interface includes:

in accordance with the determination that the second transaction interface corresponds to the first application, the second transaction interface includes an indication of the first application, and in accordance with the determination that the second transaction interface corresponds to the second application, the second transaction interface includes an indication of the second application.

* * * * *